US008601149B2

United States Patent

(12) United States Patent
Ando et al.
(10) Patent No.: US 8,601,149 B2
(45) Date of Patent: Dec. 3, 2013

(54) INFORMATION PROCESSING REGARDING DIFFERENT TRANSFER

(75) Inventors: Hideo Ando, Hino (JP); Eita Shuto, Tokyo (JP); Yasufumi Tsumagari, Yokohama (JP); Haruhiko Toyama, Kawasaki (JP); Takero Kobayashi, Akishima (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 13/482,395

(22) Filed: May 29, 2012

(65) Prior Publication Data

US 2012/0237181 A1 Sep. 20, 2012

Related U.S. Application Data

(60) Division of application No. 11/563,179, filed on Nov. 25, 2006, now Pat. No. 8,208,788, which is a continuation of application No. 11/549,353, filed on Oct. 13, 2006, now abandoned.

(30) Foreign Application Priority Data

Oct. 17, 2005 (JP) ................................ 2005-302319

(51) Int. Cl.
*G06F 15/16* (2006.01)

(52) U.S. Cl.
USPC .......................................... 709/231; 709/233

(58) Field of Classification Search
USPC .................................................. 709/231, 233
See application file for complete search history.

(56) References Cited

U.S. PATENT DOCUMENTS

| | | | | |
|---|---|---|---|---|
| 6,654,931 | B1 | 11/2003 | Haskell et al. | |
| 6,741,242 | B1 | 5/2004 | Itoh et al. | |
| 7,178,106 | B2 | 2/2007 | Lamkin et al. | |
| 2002/0175931 | A1 | 11/2002 | Holtz et al. | |
| 2002/0186485 | A1 | 12/2002 | Cho et al. | |
| 2003/0161615 | A1 | 8/2003 | Tsumagari et al. | |
| 2004/0096186 | A1 | 5/2004 | Tsumagari et al. | |
| 2005/0066339 | A1 * | 3/2005 | Thoen | 719/328 |
| 2005/0094973 | A1 | 5/2005 | Kim et al. | |
| 2005/0185929 | A1 | 8/2005 | Kang et al. | |
| 2006/0026302 | A1 * | 2/2006 | Bennett et al. | 709/246 |
| 2007/0033225 | A1 | 2/2007 | Davis | |
| 2007/0050382 | A1 | 3/2007 | Bugir et al. | |

FOREIGN PATENT DOCUMENTS

| | | | |
|---|---|---|---|
| JP | 2003-249057 | A | 9/2003 |
| JP | 2004-172868 | A | 6/2004 |
| JP | 2005-116161 | A | 4/2005 |
| JP | 3673166 | | 4/2005 |
| JP | 2006-260611 | A | 9/2006 |
| WO | WO 2004/019318 | A2 | 3/2004 |

* cited by examiner

*Primary Examiner* — Andy Ho

(74) *Attorney, Agent, or Firm* — Oblon, Spivak, McClelland, Maier & Neustadt, L.L.P.

(57) ABSTRACT

According to one embodiment, an information storage medium, and the program comprises referring to a manifest from a playlist that manages playback presentation of a playback presentation object, referring to one of a markup and a script from the manifest, monitoring defining of a name corresponding to an event in the markup, and generation of an event in response to the name corresponding to the event defined in the markup using an event listener in the script, and designating function contents that execute processing when the event is generated.

11 Claims, 194 Drawing Sheets

| Required functions | Problems of prior art | Solutions (technical device contents to solve problems) | New effects obtained as result of technical devices |
|---|---|---|---|
| Flexible and diversified powers of expression (PC window like) | Since user requests are of too greater variety such requests cannot be met by only custom-made like minor change of data structure in existing DVD-Video standards | Expression formats in PC world having versatility are adopted, and concept of timeline is newly introduced | 1] Make flexible and impressive reactions in response to user's actions<br>1.1) Make response by means of change in animation and image at the time of button selection or execution instruction<br>1.2) Make voice response at the time of button selection or execution instruction<br>1.3) Start execution operation at purposely delayed timing in response to user's execution instruction<br>1.4) Give voice answer to help (like PC)<br>1.5) Audibly and visually output how to use guide of menu, etc. |
| | | | 2] Allow flexible switching processing for video information itself and its playback method<br>2.1) Switching presentation of audio information<br>2.2) Switching presentation of subtitle information (telop, subtitle, still picture icon, etc.)<br>2.3) Allow enlarged-scale presentation of subtitle according to user's favor<br>2.4) Allow user to mark subtitle and to issue subtitle execution command<br>2.5) Mark specific image part in synchronism with comment while director is making that comment |
| | | | 3] Simultaneously present independent information to be superimposed on image during playback<br>3.1) Simultaneously present a plurality of pieces of video information by means of multi-windows<br>3.2) Allow to freely switch size of each of multi-windows<br>3.3) Simultaneously present prior audio message and after-recorded audio message by user<br>3.4) Simultaneously present scrolling text to be superimposed on video information<br>3.5) Simultaneously present graphic menus and figures (of select buttons, etc.) in flexible forms |
| | | | 4] Allow easy search to video location to be seen<br>4.1) Conduct keyword (text) search of location to be seen using pull-down menu |

FIG. 2A

| Required functions | Problems of prior art | Solutions (technical device contents to solve problems) | New effects obtained as result of technical devices |
|---|---|---|---|
| Network action | Disjunction between data structure specified by existing DVD-Video standards and network compatible window is too large | Homepage presentation format (XML and scripts) of Web which has good track record in window expression of network is adopted as basic part of data management structure, and video playback management format is adjusted to it | 5] Provide update function of information on disc using network<br>5.1) Automatic updating of object information and intra-disc management information<br>5.2) Network downloading of how to use guide of menus<br>5.3) Automatic notification of information to user<br>5.4) Notification of OK/NG of update information presentation to user<br>5.5) Manual update function by user |
| | | | 6] Real-time online processing<br>6.1) Switching or mixing processing to audio information downloaded via network upon video playback (commentary presentation by means of voice of movie director, etc.)<br>6.2) Network shopping<br>6.3) Interactive real-time video change |
| | | | 7] Real-time information sharing with another user via network<br>7.1) Simultaneously present specific window even for another user at remote place<br>7.2) Play battle game or interactive game with another user at remote place<br>7.3) Participate in chatting during video playback<br>7.4) Transmit or receive message to or from fan club simultaneously with video playback |

FIG. 2B

| Required functions | Problems of prior art | Solutions (technical device contents to solve problems) | New effects obtained as result of technical devices |
|---|---|---|---|
| Easy processing of video related information and easy transmission of information after processing | New management data structure that can flexibly and easily cope with complicated information processing is needed | XML is adopted and concept of timeline is introduced | 8] Allow user to select and generate playlist and to transmit it<br>8.1) Allow user to select or generate playlist<br>8.2) Allow user to transmit playlist selected or generated by him or her to friend<br>8.3) Allow to play back playlist selected or generated by user only on specific disc<br>8.4) Allow user to also select collection of highlight scenes of video information<br>8.5) Publish scrapbook that captures favorite frames in video information on Web<br>8.6) Store and play back angles or scenes in multi-angles or multi-scenes selected by user |
| | | | 9] Allow user to append specific information associated with video information and to transmit result via network<br>9.1) Allow user to add comment about video information, and to share it with another user on network<br>9.2) Paste input image to character's face in video information<br>9.3) Paste user information or experience information upon seeing video information onto image information<br>9.4) Use use r information in parental lock to impose automatic limitation on video information to be presented |
| | | | 10] Automatically save playback log information<br>10.1) Provide automatic saving function of resume (playback pause) information<br>10.2) Automatically save halfway information of game progress until previous time<br>10.3) Automatically save previous playback environment (battle game environment with a plurality of users, etc.) |

FIG. 2C

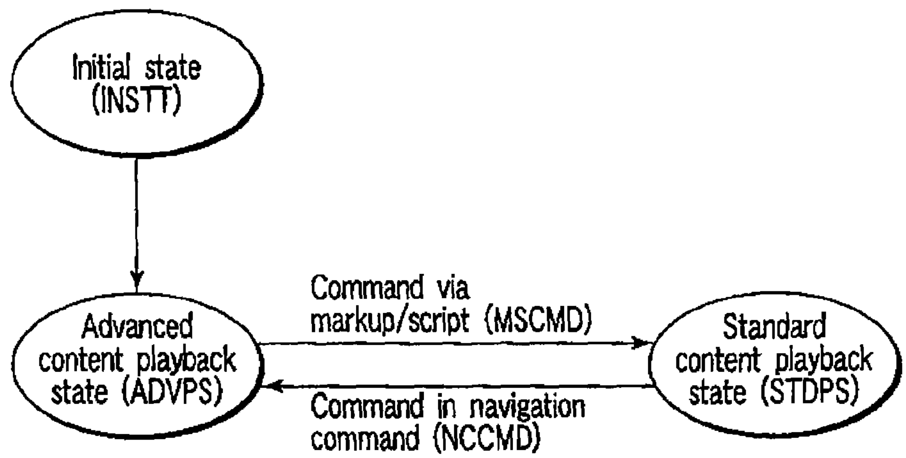
F I G. 6
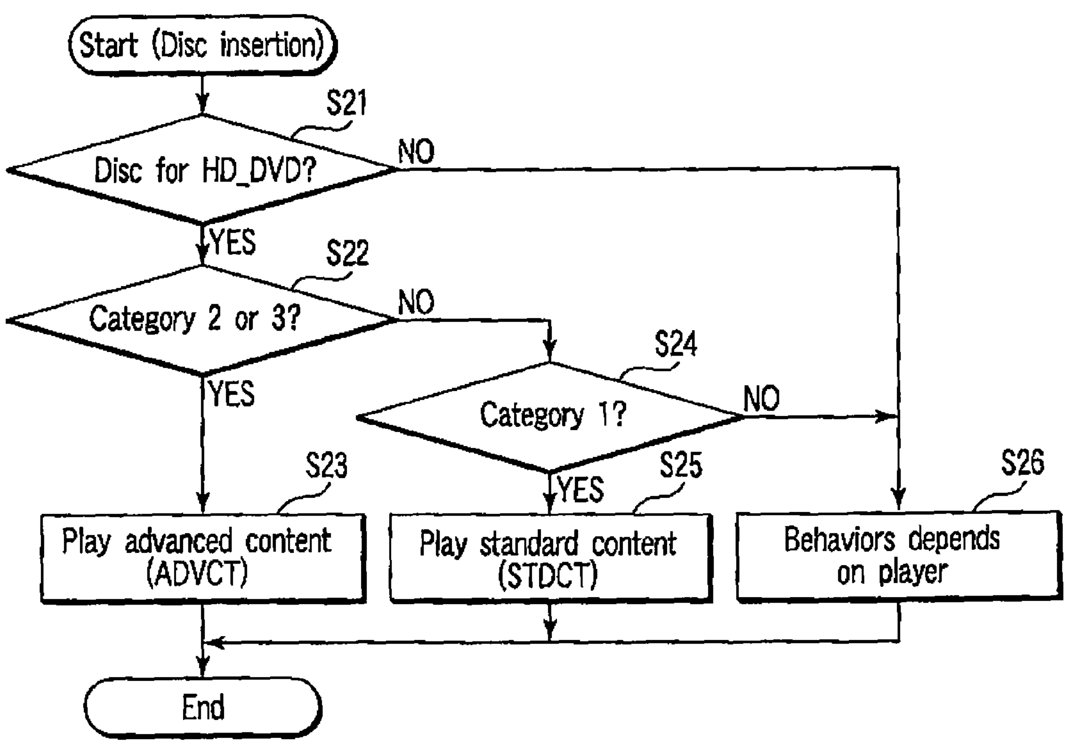
F I G. 7

| Presentation object | Data source | Data type | | Player | Decoder |
|---|---|---|---|---|---|
| Primary video set (PRMVS) | Disc (DISC) | Primary audio video (PRMAV) | Main video (MANVD) | Primary video player (PRMVP) | Main video decoder (MVDEC) |
| | | | Main audio (MANAD) | | Main audio decoder (MADEC) |
| | | | Sub video (SUBVD) | | Sub video decoder (SVDEC) |
| | | | Sub audio (SUBAD) | | Sub audio decoder (SADEC) |
| | | | Sub-picture (SUBPT) | | Sub-picture decoder (SPDEC) |
| Secondary video set (SCDVS) | Disc (DISC), persistent storage (RPSTR), network or file cache (FLCCH) (or data cache (DTCCH)) | Substitute audio video (SBTAV) | Main video (MANVD) | Secondary video player (SCDVP) | Main video decoder (MVDEC) |
| | | | Main audio (MANAD) | | Main audio decoder (MADEC) |
| | | Substitute audio (SBTAD) | Main audio (MANAD) | | Main audio decoder (MADEC) |
| | | Secondary audio video (SCDAV) | Sub video (SUBVD) | | Sub video decoder (SVDEC) |
| | | | Sub audio (SUBAD) | | Sub audio decoder (SADEC) |
| Advanced application (ADAPL) | File cache (FLCCH) (or data cache (DTCCH)) | Markup (MRKUP)/Script (SCRPT)/Image (IMAGE)/Effect audio (EFTAD)/Font (FONT) | | Advanced application presentation engine (AAPEN) | |
| Advanced subtitle (ADSBT) | File cache (FLCCH) (or data cache (DTCCH)) | Markup for advanced subtitle (MRKUPS)/Font (FONT)/Image (IMAGE) | | Advanced subtitle player (ASBPL) | |

FIG. 10

| Point number | Feature and point contents in this embodiment | Explanation of effect contents |
|---|---|---|
| (1) | Hierarchical structure of playlist PLLST and markup file MRKUP is provided as setting management information associated with layout on time axis and two-dimensional layout on user presentation window.<br>⇒Both playlist PLLST and markup file MRKUP are described using identical description format (XML). | 1) Extendability and flexibility of setting management information associated with layouts are improved.<br>2) Easy interpretation processing and sharing of management information can be attained since identical description format is used. |
| (2) | Playlist PLLST has media clock synchronized with title timeline TMLE and markup file MRKUP has page clock and application clock synchronized with setting based on timing element. These clocks can be independently set (they need not be synchronized). | When movie information synchronized with title timeline TMLE is played back at high speed or rewound, it can be presented simultaneously with window which undergoes standard playback on application clock, thus greatly improving power of expression to user. |
| (3) | Initial layout on window of movie (enhanced video object EVOB) is designated on playlist PLLST (video attribute item element VABITM), and can be changed in correspondence with execution of script file SCRPT. | Since movie presentation region on user window can be arbitrarily set, power of expression to user can be greatly improved. |
| (4) | Layout of presentation region (application region APPRGN) of advanced application ADAPL on window is designated in manifest file MNFST, and layouts for respective element in that region are designated on markup file MRKUP | 1) Since layout locations of respective elements of advanced application ADAPL are grouped (by application region APPRGN), management by advanced application manager ADAMNG is facilitated.<br>2) Layout management with movie expression region (prevention of overlapping, etc.) is facilitated. |

F I G. 13A

| Point number | Feature and point contents in this embodiment | Explanation of effect contents |
|---|---|---|
| (5) | A plurality of markup files MRKUP can be set for one playlist PLLST. | Jump presentation among a plurality of markup pages MRKUP can be attained during presentation of single movie, thus improving power of expression to user. |
| (6) | Jump among a plurality of markup pages MRKUP in single playlist PLLST is attained by executing script file SCRPT set in markup pages MRKUP. | Jump method among a plurality of markup pages MRKU is greatly and flexibly implemented.<br>⇒Example: Jump between markup pages MRKUP, which does not take place immediately after user designates action, and takes place with delay in synchronism with movie presentation window can be set using script file SCRPT (see effect (1. 3) in FIG. 2A). |
| (7) | 1) A plurality of markup pages MRKUP to be jumped in single playlist PLLST is designated by a plurality of manifest files MNFST.<br>2) Designated markup files MRKUP are temporarily saved in file cache FLCCH in advance. | Since markup page MRKUP information designated by manifest files MNFST can be saved in advance in file cache FLCCH, jump among a plurality of markup pages can be attained at high speed, and such function can be easily used by user (favorable impression). |
| (8) | Markup page MRKUP to be presented initially is designated from playlist PLLST via SRC attribute information of advanced application ADAPL and SRC attribute information of markup element MRKUP in manifest file MNFST. | Extendability about markup page MRKUP designation from playlist PLLST can be improved, and easy edit is assured. |

FIG. 13B

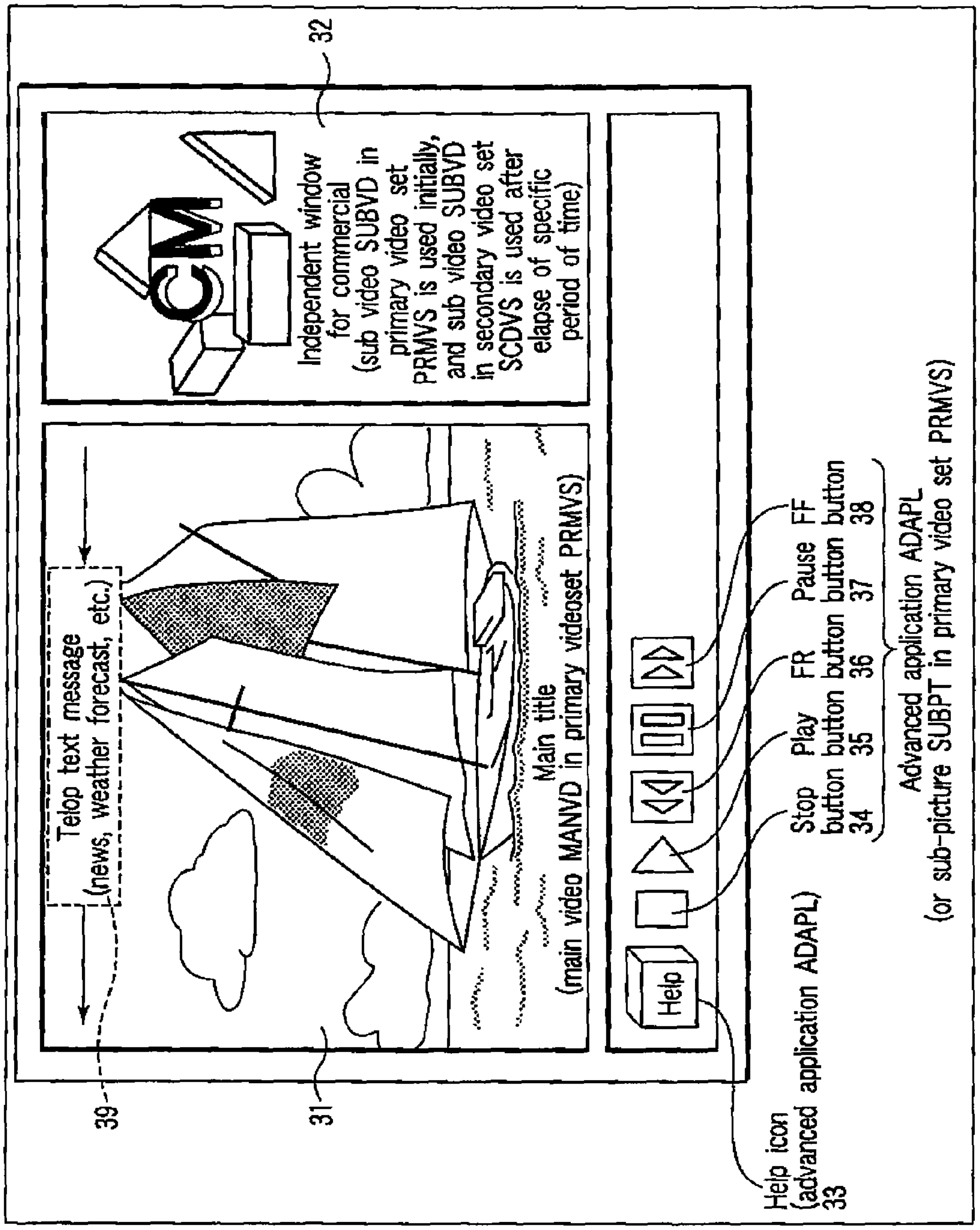
F I G. 16

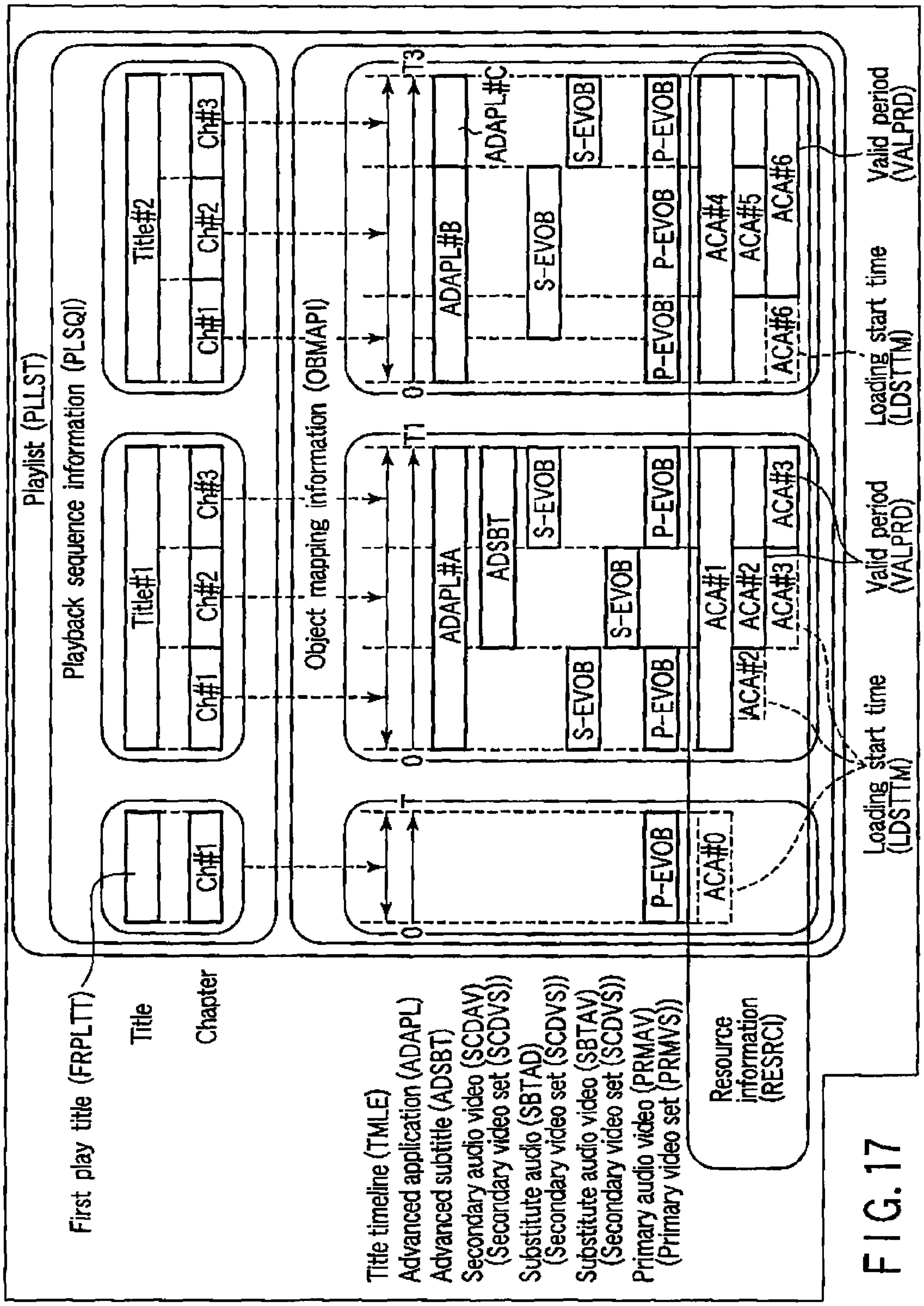
F I G. 17

| Clip element name (see FIG. 24) | Object name to be played back and used (see FIG. 10) | File name to be referred to as index upon playing back and using object (see FIG. 11) | Originally recorded location of object (see FIG. 14) |
| --- | --- | --- | --- |
| Primary audio video clip PRAVCP | Primary audio video PRMAV | Time map file PTMAP of primary video set | Information storage medium DISC |
| Substitute audio video clip SBAVCP | Substitute audio video SBTAV (secondary video set SCDVS) | Time map file STMAP of secondary video set | Information storage medium DISC<br>Persistent storage PRSTR<br>Network server NTSRV<br>File cache FLCCH |
| Secondary audio video clip SCAVCP | Secondary audio video SCDAV (secondary video set SCDVS) | Time map file STMAP of secondary video set | Information storage medium DISC<br>Persistent storage PRSTR<br>Network server NTSRV<br>File cache FLCCH |
| Substitute audio clip SBADCP | Substitute audio SBTAD (secondary video set SCDVS) | Time map file STMAP of secondary video set | Information storage medium DISC<br>Persistent storage PRSTR<br>Network server NTSRV<br>File cache FLCCH |
| Advanced subtitle segment ADSTSG | Advanced subtitle ADSBT | Manifest file MNFSTS of advanced subtitle | File cache FLCCH [**] |
| Application segment ADAPSG | Advanced application segment ADAPL | Manifest file MNFST of advanced application | File cache FLCCH [**] |

* Only playlist PLLST is recorded in information storage medium DISC, and various objects to be played back and used recorded in network server NTSRV or persistent storage PRSTR can be designated from playlist PLLST

** In information storage medium DISC or persistent storage PRSTR, source files in network server NTSRV must be temporarily saved in file cache FLCCH

FIG. 18

| URI scheme | Possible resource locations |
|---|---|
| File | Disc (DISC), file cache (FLCCH), persistent storage (PRSTR) (or data cache (DTCCH)) |
| http | HTTP server |
| https | HTTPS server |

FIG. 19

| URI Path | Possible resource locations |
|---|---|
| File:///dvddisc/ | Disc (DISC) |
| File:///filecache/ | API managed area of file cache (FLCCH) (or data cache (DTCCH)) (in contemporary directory in file cache managed by advanced application) |
| File:///required/ | The area of own content provider in required persistent storage (PRSTR) |
| File:///additional/ | The area of own content provider in additional persistent storage(s) (PRSTR) |
| File:///common/required/ | The common area in required persistent storage (PRSTR) |
| File:///common/additional/ | The common area in additional persistent storage(s) (PRSTR) |

FIG. 20

<?xml[xml attribute information XMATRI]?>

<playlist[name space definition information PLTGNM of playlist tag][playlist attribute information PLATRI]>

Configuration Information CONFGI

Media attribute information MDATRI

Title information TTINFO

</playlist>

*1 Configuration information CONFGI is described at first position in playlist element PLLST
⇒Setting of conditions (parameters) in system commonly used by playlist PLLST can be executed initially, and time required until start of playback upon activation can be shortened

*2 Media attribute information MDATRI and title information TTINFO are separately described
⇒Different titles can share identical attribute information, and saving of description text volume and simple processing of parameter setting, etc. in decoder can be attained

*3 Media attribute information MDATRI is described before title information TTINFO
⇒Since processing such as parameter setting, etc. in decoder is executed first, time required until start of playback upon activation can be shortened

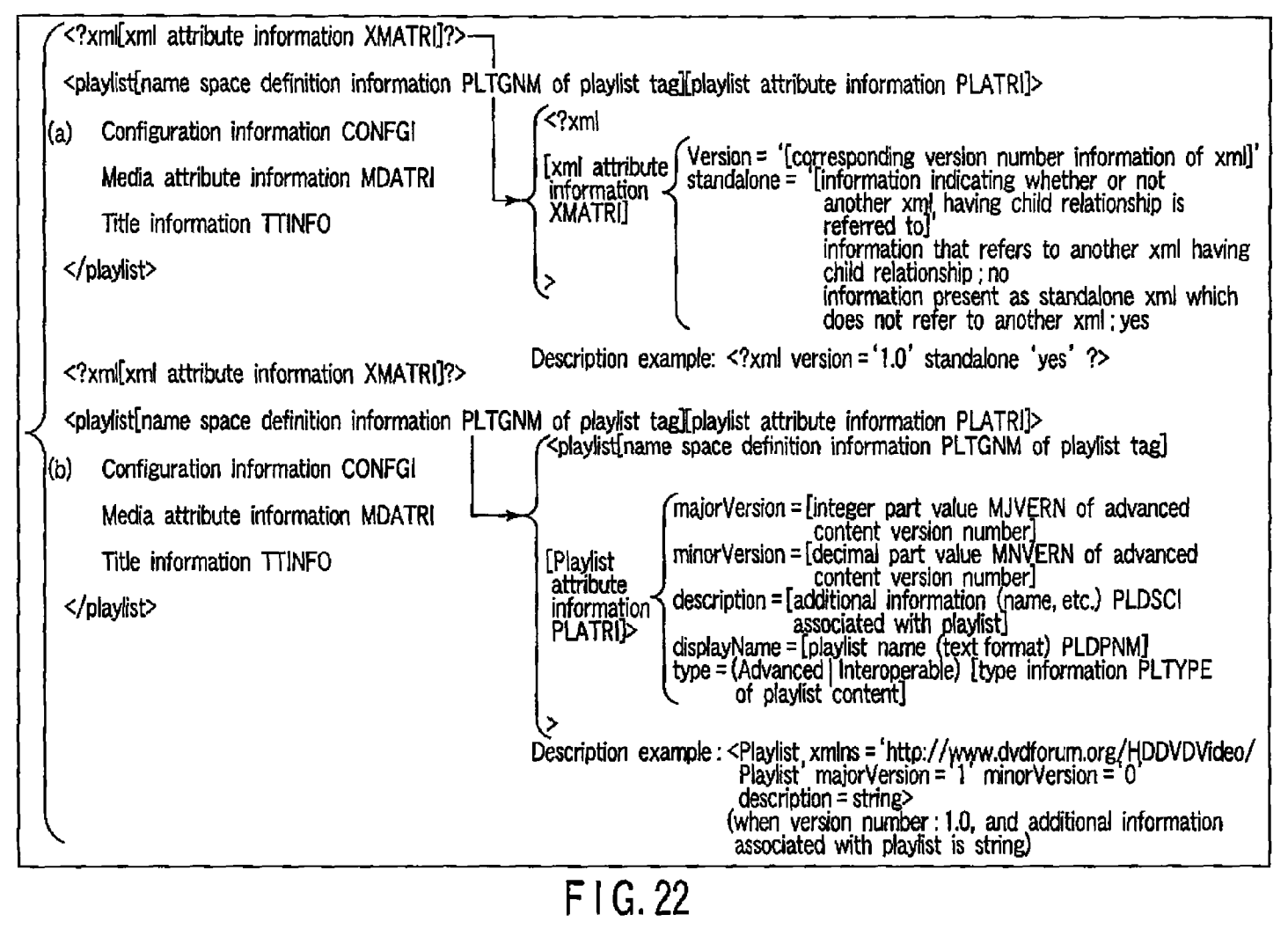

<?xml[xml attribute information XMATRI]?>

<playlist[name space definition information PLTGNM of playlist tag][playlist attribute information PLATRI]>

Configuration information CONFGI

Media attribute information MDATRI

Title information TTINFO

</playlist>

<?xml

[xml attribute information XMATRI]

- Version = '[corresponding version number information of xml]'
- standalone = '[information indicating whether or not another xml having child relationship is referred to]'
  - information that refers to another xml having child relationship ; no
  - information present as standalone xml which does not refer to another xml ; yes

?>

Description example: <?xml version = '1.0' standalone 'yes' ?>

(b)

<?xml[xml attribute information XMATRI]?>

<playlist[name space definition information PLTGNM of playlist tag][playlist attribute information PLATRI]>

Configuration information CONFGI

Media attribute information MDATRI

Title information TTINFO

</playlist>

<playlist[name space definition information PLTGNM of playlist tag]

[Playlist attribute information PLATRI]>

- majorVersion = [integer part value MJVERN of advanced content version number]
- minorVersion = [decimal part value MNVERN of advanced content version number]
- description = [additional information (name, etc.) PLDSCI associated with playlist]
- displayName = [playlist name (text format) PLDPNM]
- type = (Advanced | Interoperable) [type information PLTYPE of playlist content]

>

Description example : <Playlist xmlns = 'http://www.dvdforum.org/HDDVDVideo/Playlist' majorVersion = '1' minorVersion = '0' description = string>
(when version number : 1.0, and additional information associated with playlist is string)

F I G. 22

Figure 23A:
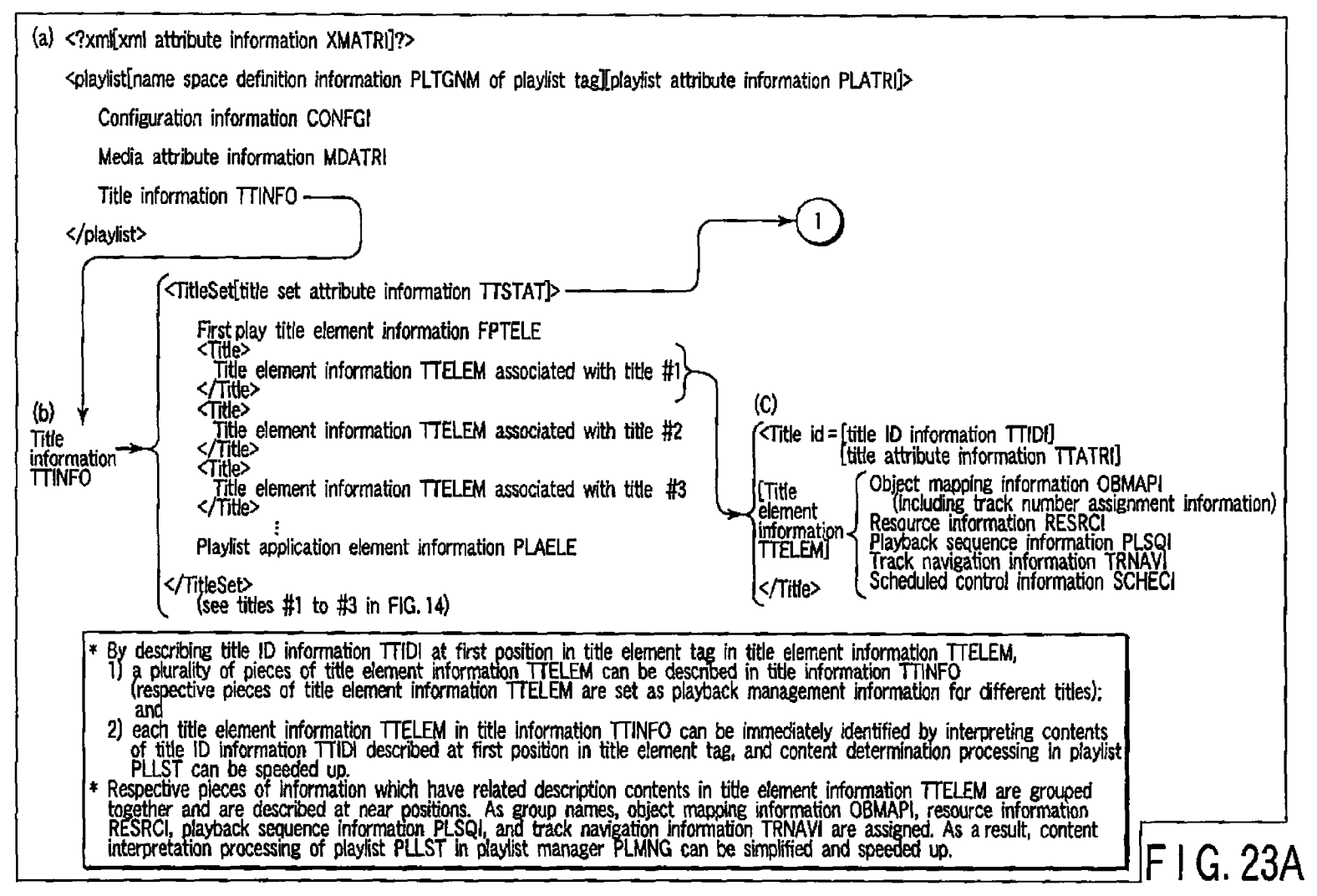

(a) <?xml[xml attribute information XMATRI]?>

<playlist[name space definition information PLTGNM of playlist tag][playlist attribute information PLATRI]>

Configuration information CONFGI

Media attribute information MDATRI

Title information TTINFO

</playlist>

(b) Title information TTINFO

<TitleSet[title set attribute information TTSTAT]> → 1

First play title element information FPTELE
<Title>
Title element information TTELEM associated with title #1
</Title>
<Title>
Title element information TTELEM associated with title #2
</Title>
<Title>
Title element information TTELEM associated with title #3
</Title>
⋮
Playlist application element information PLAELE </TitleSet>
(see titles #1 to #3 in FIG. 14)

(C)

<Title id=[title ID information TTIDI]
[title attribute information TTATRI]

[Title element information TTELEM]
- Object mapping information OBMAPI (Including track number assignment information)
- Resource information RESRCI
- Playback sequence information PLSQI
- Track navigation information TRNAVI
- Scheduled control information SCHECI </Title>

* By describing title ID information TTIDI at first position in title element tag in title element information TTELEM,
1) a plurality of pieces of title element information TTELEM can be described in title information TTINFO (respective pieces of title element information TTELEM are set as playback management information for different titles); and
2) each title element information TTELEM in title information TTINFO can be immediately identified by interpreting contents of title ID information TTIDI described at first position in title element tag, and content determination processing in playlist PLLST can be speeded up.

* Respective pieces of information which have related description contents in title element information TTELEM are grouped together and are described at near positions. As group names, object mapping information OBMAPI, resource information RESRCI, playback sequence information PLSQI, and track navigation information TRNAVI are assigned. As a result, content interpretation processing of playlist PLLST in playlist manager PLMNG can be simplified and speeded up.

FIG. 23A (d)

<TitleSet

Title set attribute information TTSTAT (1)

- timeBase = [frame rate (number of frames per sec) information FRMRT]
  - * unit: fps (description example: "60 fps")
- tickBase = [frequency information TKBASE of tick clock used in markup page]
  - * Frequency of page clock set for each markup page MRKUP and frequency of application clock set for each advanced application ADAPL match frequency of tick clock
  - ** Frequency TKBASE of tick clock can be uniquely set independently of frequency of media clock on title timeline TMLE
- defaultLanguage = [menu language information DEFLNG in default state of title set]

>

* Media clock → title timeline TMLE = timeBase/FRAMRT
  basic clock, Aapplication clock → tick clock = tickBase/TKBASE
  (Independent from each other)

⇓

- FF, FR, and pause playback operations can be made on title timeline TMLE while playing back advanced application ADAPL at standard speed
- By greatly slowing down tickBase/TKBASE with respect to timeBase/FRAMRT, load on advanced content playback unit ADVPL is reduced

* Set timeBase/FRAMRT and tickBase/TKBASE are set in title set element
  ⇒By adopting common setting in single title set, processing in advanced content playback unit ADVPL can be simplified

F I G. 23B (a)

Figure 24A:
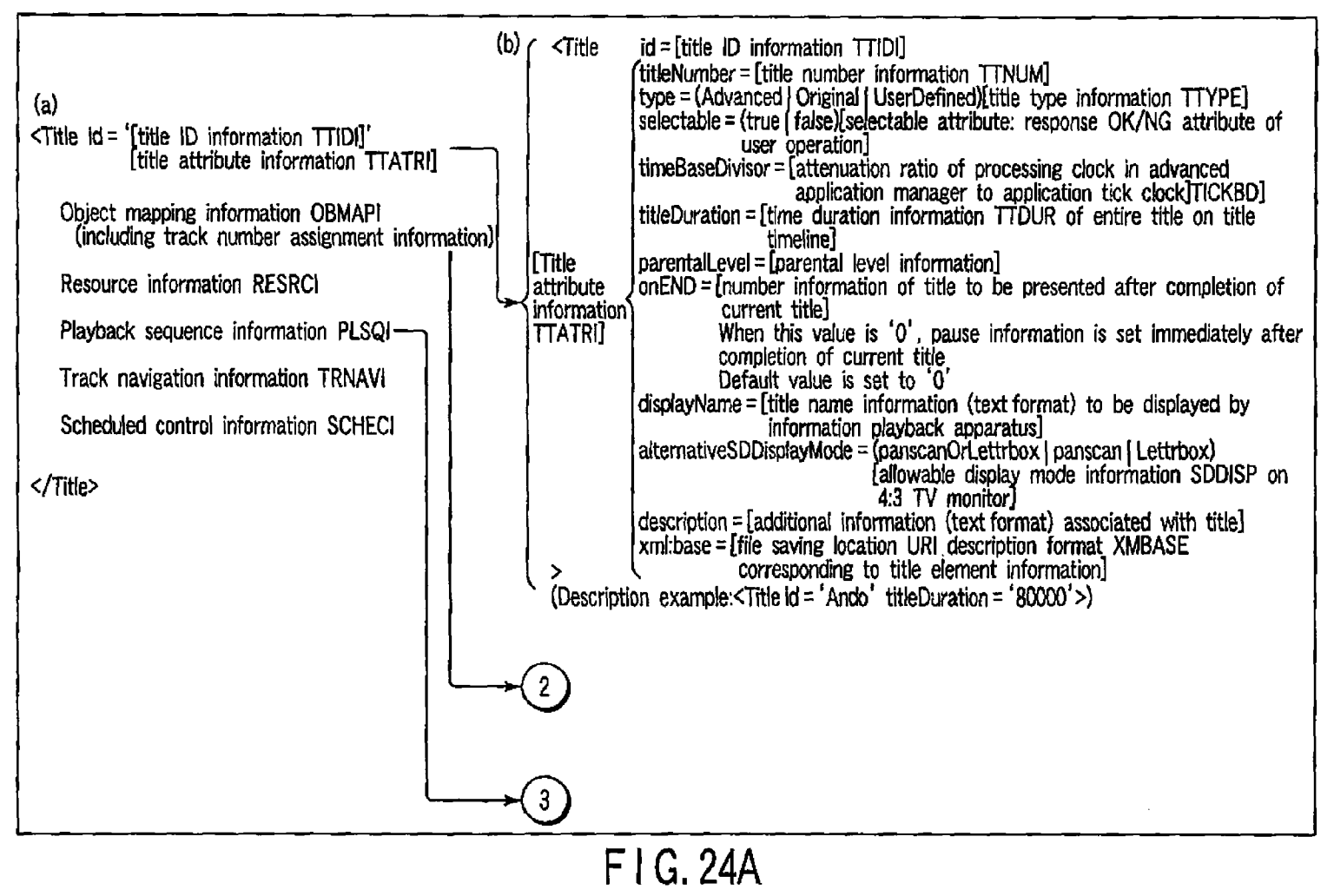

<Title Id = '[title ID information TTIDI]'
[title attribute information TTATRI]

Object mapping information OBMAPI
(including track number assignment information)

Resource information RESRCI

Playback sequence information PLSQI

Track navigation information TRNAVI

Scheduled control information SCHECI

</Title>

(b) <Title id = [title ID information TTIDI]

[Title attribute information TTATRI]

titleNumber = [title number information TTNUM]
type = (Advanced | Original | UserDefined)[title type information TTYPE]
selectable = (true | false)[selectable attribute: response OK/NG attribute of user operation]
timeBaseDivisor = [attenuation ratio of processing clock in advanced application manager to application tick clock]TICKBD]
titleDuration = [time duration information TTDUR of entire title on title timeline]
parentalLevel = [parental level information]
onEND = [number information of title to be presented after completion of current title]
When this value is '0', pause information is set immediately after completion of current title
Default value is set to '0'
displayName = [title name information (text format) to be displayed by information playback apparatus]
alternativeSDDisplayMode = (panscanOrLettrbox | panscan | Lettrbox)
[allowable display mode information SDDISP on 4:3 TV monitor]
description = [additional information (text format) associated with title]
xml:base = [file saving location URI description format XMBASE corresponding to title element information]
>

(Description example:<Title Id = 'Ando' titleDuration = '80000'>)

2

3

FIG. 24A (c)
Primary audio video clip element PRAVCP
<PrimaryAudioVideoClip>··</PrimaryAudioVideoClip>
Substitute audio video clip element SBAVCP
<SubstituteAudioClip>··</SubstituteAudioClip>
Substitute audio clip element SBADCP
<SubstituteAudioClip>··</SubstituteAudioClip>
Secondary audio video clip element SCAVCP
<SecondaryAudioVideoClip>··</SecondaryAudioVideoClip>
Advanced subtitle segment element ADSTSG
<AdvancedSubtitleSegment>··</AdvancedSubtitleSegment>
Application segment element ADAPSG
<ApplicationSegment>··</ApplicationSegment>

(d)
<ChapterList>
<Chapter
id = '[chapter element ID information CHPTID#1]'
titleTimingBegin = '[time information CHSTTM on title timeline indicating chapter start position]'
description = '[additional information (text format) for each chapter element]'
displayName = '[corresponding chapter name (text format)]'
/>
<Chapter
id = '[chapter element ID information CHPTID#2]'
titleTimingBegin = '[time information CHSTTM on title timeline indicating chapter start position]'
description = '[additional information (text format) for each chapter element]'
displayName = '[corresponding chapter name (text format)]'
/>
⋮
</ChapterList>

List of user input events

| Virtual key code | Default input handler | Value | Instruction | Function overview |
|---|---|---|---|---|
| VK_PLAY | playHandler | 0XFA | Play normal speed | Normal speed playback |
| VK_PAUSE | pauseHandler | 0XB3 | Pause ON/OFF playback | Pause/playback |
| VK_FF | fastForwardHandler | 0XC1 | Fastforward playback | Fastforward playback |
| VK_FR | fastReverseHandler | 0XC2 | Fast reverse playback | Fast reverse playback |
| VK_SF | slowForwardHandler | 0XC3 | Slow forward playback | Slow forward playback |
| VK_SR | slowReverseHandler | 0XC4 | Slow reverse playback | Slow reverse playback |
| VK_STEP_PREV | stepPreviousHandler | 0XC5 | Previous step backward | Return to previous step |
| VK_STEP_NEXT | stepNextHandler | 0XC6 | Next step backward | Jump to next step |
| VK_SKIP_PREV | skipPreviousHandler | 0XC7 | Change previous chapter | Play back previous chapter |
| VK_SKIP_NEXT | skipNextHandler | 0XC8 | Change next chapter | Play back next chapter |
| VK_SUBTITLE_SWITCH | switchSubtitleHandler | 0XC9 | Subtitle track ON/OFF | ON/OFF of presentation of subtitle |
| VK_SUBTITLE | changeSubtitleHandler | 0XCA | Change subtitle track | Change subtitle track |
| VK_CC | showClosedCaptionHandler | 0XCB | Show closed caption | Present closed caption |
| VK_ANGLE | changeAngleHandler | 0XCC | Change angle track | Switch angle |
| VK_AUDIO | changeAudioHandler | 0XCD | Change audio track | Switch audio track |
| VK_MENU | | 0XCE | Display menu | Present menu |
| VK_TOP_MENU | | 0XCF | Display top menu | Present top menu |
| VK_BACK | | 0XD0 | Return | Return |
| VK_RESUME | | 0XD1 | Resume return | Return from menu |
| VK_LEFT | | 0X25 | Cursor left | Shift cursor to left |
| VK_UP | | 0X26 | Cursor up | Shift cursor upward |
| VK_RIGHT | | 0X27 | Cursor right | Shift cursor to right |
| VK_DOWN | | 0X28 | Cursor down | Shift cursor downward |
| VK_UPLEFT | | 0X29 | Cursor up left | Shift cursor left upward |
| VK_UPRIGHT | | 0X30 | Cursor up right | Shift cursor right upward |
| VK_DOWNLEFT | | 0X31 | Cursor down left | Shift cursor left downward |
| VK_DOWNRIGHT | | 0X32 | Cursor down right | Shift cursor right downward |
| VK_TAB | | 0X09 | Tab | Tab |
| VK_A_BUTTON | | 0X70 | A button | A button |
| VK_B_BUTTON | | 0X71 | B button | B button |
| VK_C_BUTTON | | 0X72 | C button | C button |
| VK_D_BUTTON | | 0X73 | D button | D button |
| VK_ENTER | | 0X0D | OK | OK |
| VK_ESC | | 0X1B | Cancel | Cancel |
| VK_0 | | 0X30 | 0 | 0 |
| VK_1 | | 0X31 | 1 | 1 |
| VK_2 | | 0X32 | 2 | 2 |
| VK_3 | | 0X33 | 3 | 3 |
| VK_4 | | 0X34 | 4 | 4 |
| VK_5 | | 0X35 | 5 | 5 |
| VK_6 | | 0X36 | 6 | 6 |
| VK_7 | | 0X37 | 7 | 7 |
| VK_8 | | 0X38 | 8 | 8 |
| VK_9 | | 0X39 | 9 | 9 |
| VK_MOUSEDOWN | | 0X01 | Mouse button down | Disable input of designated element (shift to non-frontmost plane) |
| VK_MOUSEUP | | 0X02 | Mouse button up | Enable input of designated element (shift to frontmost plane) |

FIG. 45

List of player parameters in this embodiment

| Object | Property | Contents |
|---|---|---|
| Player parameter | mainVersion | Integer part value of version number of corresponding specification |
| | minorVersion | Value below decimal point of version number of corresponding specification |
| | VideoCapabilitySub | Use support of sub video |
| | audioCapabilityMain | Use support of main video |
| | audioCapabilitySub | Use support of sub audio |
| | audioCapabilityAnalog | Use support of analog audio |
| | audioCapabilityPCM | Use support of PCM audio |
| | audioCapabilitySPDIF | Use support of S/PDIF audio |
| | regionCode | Region code |
| | countryCode | Country code |
| | displayAspectRatio | Display of aspect ratio |
| | currentDisplayMode | Display mode |
| | networkThroughput | Network throughput |
| Data cache | dataCacheSize | Data cache size |

FIG. 46

List of profile parameters in this embodiment

| Object | Property | Contents |
|---|---|---|
| Profile parameter | parentalLevel | Parental level |
| | menuLanguage | Menu language |
| | initialAudioLanguage | Initial audio language |
| | initialSubtitleLanguage | Initial subtitle language |

FIG. 47

List of presentation parameters in this embodiment

| Object | Property | Contents |
|---|---|---|
| Playlist manager PLMNG | playlist | Playlist |
| | titleId | Title ID |
| | titleElapsedTime | Elapsed time on title timeline |
| | currentVideoTrack | Track number of main video |
| | currentAudioTrack | Track number of main audio |
| | currentSubtitleTrack | Track number of subtitle |
| | selectedAudioLanguage | Selected audio language |
| | selectedAudioLanguageExtension | Extension field of selected audio language |
| | selectedSubtitleLanguage | Selected subtitle language |
| | selectedSubtitleLanguageExtension | Extension field of selected subtitle language |
| | selectedApplicationGroup | Selected application group |
| Audio mixing engine ADMXEN | volumeL | Tone volume of left channel |
| | volumeR | Tone volume of right channel |
| | volumeC | Tone volume of center channel |
| | volumeLS | Tone volume of left surround channel |
| | volumeRS | Tone volume of right surround channel |
| | volumeLB | Tone volume of left behind channel |
| | volumeRB | Tone volume of right behind channel |
| | volumeLFE | Tone volume of sub woofer channel |
| | mixSubXtoX | Sub audio down mix coefficient (percentages) |
| | mixEffectXtoX | Sub effect audio down mix coefficient (percentages) |
| Data cache DTCCH | streamingBufferSize | Streaming buffer size |

FIG. 48

List of layout parameters in this embodiment

| Object | Property | Contents |
|---|---|---|
| Presentation engine PRSEN | mainVideo.x | X-coordinate value of origin position of main video |
| | mainVideo.y | Y-coordinate value of origin position of main video |
| | mainVideoScaleNumerator | Numerator value of main video scaling value |
| | mainVideoScaleDenominator | Denominator value of main video scaling value |
| | mainVideoCrop.x | X-coordinate value of main video presentation area |
| | mainVideoCrop.y | Y-coordinate value of main video presentation area |
| | mainVideoCrop.width | Width of main video presentation area |
| | mainVideoCrop.height | Height of main video presentation area |
| | subVideo.x | X-coordinate value of origin position of sub video |
| | subVideo.y | Y-coordinate value of origin position of sub video |
| | subVideoScaleNumerator | Numerator value of sub video scaling value |
| | subVideoScaleDenominator | Denominator value of sub video scaling value |
| | subVideoCrop.x | X-coordinate value of sub video presentation area |
| | subVideoCrop.y | Y-coordinate value of sub video presentation area |
| | subVideoCrop.width | Width of sub video presentation area |
| | subVideoCrop.height | Height of sub video presentation area |

FIG. 49

(a) <Title id=[ID information TTID of title][attribute information TTATRI of title]>
Object mapping information OBMAP
(including track number assignment information)
Resource information RESRCI
Playback sequence information PLSQI
Track navigation information TRNAVI
Scheduled control information SCHECI
</Title>

(b) Primary audio video clip element PRAVCP
<PrimaryAudioVideoClip [ID information PRAVID]
[Attribute information PRATRI of primary audio video clip element]> → (B)
Track number assignment information:
Main video element MANVD
Main audio element MANAD
Subtitle element SBTELE
Sub video element SUBVD
Sub audio element SUBAD
</PrimaryAudioVideoClip>
Substitute audio video clip element SBAVCP
<SubstituteAudioVideoClip [ID information SBAVID]
[Attribute information SVATRI of substitute audio video clip element]>
Network source element NTSELE
Main video element MANVD
Main audio element MANAD
</SubstituteAudioVideoClip>
Substitute audio clip element SBADCP
<SubstituteAudioClip [ID information SBADID]
[Attribute information SAATRI of substitute audio clip element]>
Network source element NTSELE
Main audio element MANAD
</SubstituteAudioClip>
Secondary audio video clip element SCAVCP
<SecondaryAudioVideoClip [ID information SCAVID]
[Attribute information SCATRI of secondary audio video clip element]> → (C)
Network source element NTSELE
Track number assignment information:
Sub video element SUBVD
Sub audio element SUBAD
</SecondaryAudioVideoClip>
Advanced subtitle element ADSTSG
<AdvancedSubtutleSegment [ID information ADSTID]
[Attribute information SCATRI of advanced subtitle segment element]>
Subtitle element SBTELE
Application resource element APRELE
</AdvancedSubtutleSegment>
Application segment element APPLSG
<AppricationSegment [ID information APPLID] [Attribute information APATRI of application segment element]>
Application resource element APRELE
</AppricationSegment>

FIG. 54A (c) <PrimaryAudioVideoClip

[Attribute information PRATRI of primary audio video clip element] (B)

id=ID information PRAVID
dataSource=(Disc)[Data source DTSORC in which playback/display object is recorded]
titleTimeBegin=[Start time TTSTTM on title timeline]
clipTimeBegin=[Start position VBSTTM in enhanced video object data EVOB [specified by presentation start time PTS in video stream]]
titleTimeEnd=End time TTEDTM on title timeline
src=[Index information file storage position SRCTMP of playback/display object to be referred]
URI (uniform resource identifier)
*) Indicating time map file PTMAP storage position of primary enhanced video object data P-EVOB or storage position of time map file PTMAP of interleaved block of primary enhanced video object data P-EVOB
seamless=(true | false)[Seamless flag information SEAMLS]
*) If "true", this means seamless playback is satisfied
description=[Additional information (text format) concerning primary audio video clip]
>

(d) <SecondaryAudioVideoClip

[Attribute information SCATRI of secondary audio video clip element] (C)

id=ID information SCAVID
dataSource=(Disc | P-Storage | Network | FileCache):
[Data source DTSORC in which playback/display object is recorded]
titleTimeBegin=[Start time TTSTTM on title timeline]
clipTimeBegin=[Start position VBSTTM in enhanced video object data EVOB [specified by presentation start time PTS in video stream]]
titleTimeEnd=[End time TTEDTM on title timeline]
src=[Index information file storage position SRCTMP of playback/display object to be referred]
URI (uniform resource identifier)
*) Indicating time map file PTMAP storage position of secondary enhanced video object data S-EVOB
preload=[Time PRLOAD on title timeline at which fetching of playback/display object is started]
sync=(hard | soft | none)[Synchronization attribute information SYNCAT of playback/display object]
noCache=(true | false) [No-cache information NOCACH]
*) If "true", Cach-Control header and Pragma header must be included in GET request message of HTTP
description=[Additional information (text format) concerning secondary audio video clip
>

※"id=ID information" is equally written at top position of information written in each clip element tag in object mapping information OBMAPI (see FIGS. 55 and 56)
⇒Not only plurality of clip elements of same type can be set in same object mapping information OBMAPI (clip elements of same type can be identified based on "ID information"), but also identification of respective clip elements using playlist manager PLMNG (see FIG. 28) can be facilitated, thereby reducing time until start of playback in activation.

※"description=additional information" is equally written at end position of information written in each clip element tag in object mapping information (see FIGS. 55 and 56).
⇒Retrieval of "additional information" for each clip element using playlist manager PLMNG (see FIG. 19) is facilitated.

※Information written in each clip element tag in object mapping information OBMAP is equally arranged in order of "titleTimeBegin"="[start time TTSTTM on title timeline]⇒("clipTimeBegin=[start time VBSTTM from top position in enhanced video object data]"⇒) "titleTimeEnd=[end time TTEDTM on title timeline]" irrespective of type of clip element tag.
⇒Retrieval of relevant information in each clip element using playlist manager PLMNG (see FIG. 28) can be facilitated and speeded up.

FIG. 54B (a) <Title id=[ID information TTID of title][attribute information TTATRI of title]>
Object mapping information OBMAPI
(including track number assignment information)
Resource information RESRCI
Playback sequence information PLSQI
Track navigation information TRNAVI
Scheduled control information SCHECI
</Title>

(b) Primary audio video clip element PRAVCP
<PrimaryAudioVideoClip [ID information PRAVID]
[Attribute information PRATRI of primary audio video clip element]>
Track number assignment information:
- Main video element MANVD
- Main audio element MANAD
- Subtitle element SBTELE
- Sub video element SUBVD
- Sub audio element SUBAD </PrimaryAudioVideoClip>
Substitute audio video clip element SBAVCP
<SubstituteAudioVideoClip [ID information SBAVID]
[Attribute information SVATRI of substitute audio video clip element]> → (D)
Network source element NTSELE
- Main video element MANVD
- Main audio element MANAD </SubstituteAudioVideoClip>
Substitute audio clip element SBADCP
<SubstituteAudioClip [ID information SBADID]
[Attribute information SAATRI of substitute audio clip element]>
Network source element NTSELE
Main audio element MANAD
</SubstituteAudioClip>
Secondary audio video clip element SCAVCP
<SecondaryAudioVideoClip [ID information SCAVID]
[Attribute information SCATRI of secondary audio video clip element]> → (E)
Network source element NTSELE
Track number assignment information:
- Sub video element SUBVD
- Sub audio element SUBAD </SecondaryAudioVideoClip>
Advanced subtitle element ADSTSG
<AdvancedSubtutleSegment [ID information ADSTID]
[Attribute information SCATRI of advanced subtitle segment element]>
Subtitle element SBTELE
Application resource element APRELE
</AdvancedSubtutleSegment>
Application segment element APPLSG
<Apprication Segment [ID information APPLID] [Attribute information APATRI of application segment element]>
Application resource element APRELE
</AppricationSegment>

FIG. 55A (c) <SubsutituteAudioVideoClip id=ID information SBAVID dataSource=(Disc | P-Storage | Network | FileCache): [Data source DTSORC in which playback/display object is recorded]

titleTimeBegin=[Start time TTSTTM on title timeline]

clipTimeBegin=[Start time VBSTTM in enhanced video object data EVOB [specified by presentation start time PTS in video stream]]

titleTimeEnd=[End time TTEDTM on title timeline]

src=[Index information file storage position SRCTMP of playback/display object to be referred]
URI (uniform resource identifier)
*) indicating time map file PTMAP storage position of secondary enhanced video object data S-EVOB preload=[Time PRLOAD on title timeline at which fetching of playback/display object is started]

sync=(hard | none)[Synchronization attribute information SYNCAT of playback/display object]

noCache=(true | false)[No-cache information NOCACH]
*) If "true", Cach-Control header and Pragma header must be included in GET request message of HTTP description=[Additional information (text format) concerning substitute audio video clip]

>

Ⓓ [Attribute information SVATRI of substitute audio video clip element]

(d) <SubsutituteAudioClip id=ID information SBADID dataSource=(Disc | P-Storage | Network | FileCache): [Data source DTSORC in which playback/display object is recorded]

titleTimeBegin=[Start time TTSTTM on title timeline]

clipTimeBegin=[Start position VBSTTM in enhanced video object data EVOB [specified by presentation start time PTS in video stream]]

titleTimeEnd=[End time TTEDTM on title timeline]

src=[Index information file storage position SRCTMP of playback/display object to be referred]
URI (uniform resource identifier)
*) indicating time map file PTMAP storage position of secondary enhanced video object data S-EVOB preload=[Time PRLOAD on title timeline at which fetching of playback/display object is started]

sync=(hard | soft)[Synchronization attribute information SYNCAT of playback/display object]

noCache=(true | false)[No-cache information NOCACH]
*) If "true", Cach-Control header and Pragma header must be included in GET request message of HTTP description=[Additional information (text format) concerning substitute audio clip]

>

Ⓔ [Attribute information SAATRI of substitute audio clip element]

FIG. 55B (a) <Title id=[ID information TTID of title][attribute information TTATRI of title]>
Object mapping information OBMAPI
(including track number assignment information)
Resource information RESRCI
Playback sequence information PLSQI
Track navigation information TRNAVI
Scheduled control information SCHECI
</Title>

(b) Primary audio video clip element PRAVCP
<PrimaryAudioVideoClip [ID information PRAVID]
[Attribute information PRATRI of primary audio video clip element]>
Track number assignment information { Main video element MANVD
Main audio element MANAD
Subtitle element SBTELE
Sub video element SUBVD
Sub audio element SUBAD }
</PrimaryAudioVideoClip>
Substitute audio video clip element SBAVCP
<SubstituteAudioVideoClip [ID information SGAVID]
[Attribute information SVATRI of substitute audio video clip element]>
Network source element NTSELE
{ Main video element MANVD
Main audio element MANAD }
</SubstituteAudioVideoClip>
Substitute audio clip element SBADCP
<SubstituteAudioClip [ID information SBADID]
[Attribute information SAATRI of substitute audio clip element]>
Network source element NTSELE
Main audio element MANAD
</SubstituteAudioClip>
Secondary audio video clip element SCAVCP
<SecondaryAudioVideoClip [ID information SCAVID]
[Attribute information SCATRI of secondary audio video clip element]>
Network source element NTSELE
Track number assignment information { Sub video element SUBVD
Sub audio element SUBAD }
</SecondaryAudioVideoClip>
Advanced subtitle element ADSTSG
<AdvancedSubtutleSegment [ID information ADSTID]
[Attribute information SCATRI of advanced subtitle segment element]> → (F)
Subtitle element SBTELE
Application resource element APRELE
</AdvancedSubtutleSegment>
Application segment element APPLSG
<AppricationSegment [ID information APPLID] [Attribute information APATRI of application segment element]> → (G)
Application resource element APRELE
</AppricationSegment>

FIG. 56A (c) <AdvancedSubtutleSegment

[Attribute information PDATRI of advanced subtitle segment element] (F)

id = ID information ADSTID
titleTimeBegin = [Start time TTSTTM on title timeline]
titleTimeEnd = [End time TTEDTM on title timeline]
src = [Manifest file storage position SRCMNF of advanced subtitle]
URI (uniform resource identifier)
sync = (hard | soft)[Synchronization attribute information SYNCAT of playback/display object]
description = [Additional information (text format) concerning advanced subtitle segment]

>

(d) <AppricationSegment

[Attribute information APATRI of application segment element] (G)

id = ID information APPLID
titleTimeBegin = [Start time TTSTTM on title timeline]
titleTimeEnd = [End time TTEDTM on title timeline]
src = [Manifest file storage position URIMNF including initial setting information of advanced application]
URI (uniform resource identifier)
zOrder = [Z-order attribute (Z-index) information ZORDER]
*) meaning information of layer number information ("0" or positive number value) in which applications or application elements superimposed and arranged in graphic plane GRPHPL exist
language = [Language attribute information LANGAT]
*) Specification information of language used for character or sound displayed in screen (e.g., menu screen) by advanced application ADAPL
**) When language contents specified here are different from language contents specified by application language system parameter (see FIGs. 46 to 49), execution of advanced application ADAPL specified in this application segment become invalid (not active)
appblock = [Attribute (index number) information APBLAT of application block]
*) Indicating index number (positive number value) concerning advanced application block to which advanced application ADAPL specified by this application segment element belongs
group = [Attribute (index number) information APGLAT of advanced application group]
*) Indicating index number (positive number value) concerning advanced application group to which advanced application ADAPL specified by this application segment element belongs
**) When advanced application group specified here is in execution state (active), advanced application ADAPL specified by this application segment element enters execution state (active)
***) Plurality of advanced applications ADAPL which can be simultaneously set to execution state (active) are collectively grouped by API command including user action in same screen, and index number APGRAT is set for each group. This index number APGRAT is written after "group=".
aoutrun = (true | false)[Auto run attribute information ATRNAT]
*) If "true" when count value of title timeline TMLE is in valid period (range from titleTimeBegin (TTSTTM) to titleTimeEnd (TTEDTM), advanced application ADAPL is automatically started up (becomes active). If "false", it does not become active unless specified by API command.
description = [Additional information (text format) concerning application segment]

>

FIG. 56B (a) <Title id=[ID information TTID of title] [attribute information TTATRI of title]>
Object mapping information OBMAPI
(including track number assignment information) → (H)
Resource information RESRCI
Playback sequence information PLSQI
Track navigation information TRNAVI
Scheduled control information SCHECI
</Title>

FIG. 59A (c) Ⓘ→
<Video
track = [Track number information TRCKAT] (video track number VDTKNM)
angleNumber = [Angle number information ANGLNM selected in interleaved block (compatible with multi-angle)]
mediaAttr = [Index number MDATNM of corresponding media attribute element in media attribute information]
description = [Additional information (text format) concerning video element]
/>

(d) Ⓙ→
<Audio
track = [Track number information TRCKAT] (audio track number ADTKNM)
streamNumber = [Audio stream number ADSTRN of audio pack corresponding to track number]
mediaAttr = [Index number MDATNM of corresponding media attribute element in media attribute information]
description = [Additional information (text format) concerning audio element]
/>

(e) Ⓚ→
<Subtitle
track = [Track number information TRCKAT] (Subtitle track number STTKNM)
streamNumber = [Sub-picture stream number SPSTRN of sub-picture pack corresponding to track number]
mediaAttr = [Index number MDATNM of corresponding media attribute element in media attribute information]
description = [Additional information (text format) concerning subtitle element]
/>

(f) Ⓛ→
<SubVideo
track = [Track number information TRCKAT]
mediaAttr = [Index number MDATNM of corresponding media attribute element in media attribute information]
description = [Additional information (text format) concerning sub video element]
/>

(g) Ⓜ→
<SubAudio
track = [Track number information TRCKAT] (audio track number ADTKNM)
streamNumber = [Sub audio stream number SASTRN of sub audio pack corresponding to track number]
mediaAttr = [Index number MDATNM of corresponding media attribute element in media attribute information]
description = [Additional information (text format) concerning sub audio element]
/>

※Information in each element tag shown in (c) to (g) equally has the following characteristics irrespective of type of element tag.
① "track=[track number TRCKAT]" is written (arraigned) first (to facilitate identification of track number for each element tag).
② "description=[additional information]" is written (arranged) last (equalization of arrangement with information in each clip element shown in FIGS. 54 to 56 can be achieved).
③ Meanwhile, "mediaAttr=[index number MDATNM of corresponding media attribute element in media attribute information]" is written (arranged).
④ "streamNumber=[stream number]" or "angleNumber=[angle number information ANGLNM]" is written (arranged) between "track=···" and "mediaAttr=···".
⇒Retrieval of relevant information in each element tag by playlist manager PLMNG (see FIG. 28) can be facilitated and speeded up.

FIG. 59C

| Element | Track | Presentation object | Elementary stream/data |
|---|---|---|---|
| Main video element MANVD | Main video track MVTRK | Primary audio video PRMAV | Main video stream MANVD (Main video pack VM_PCK in primary enhanced video object data P-EVOB) |
| | | Substitute audio video SBTAV | Main video stream MANVD (Main video pack VM_PCK in secondary enhanced video object data S-EVOB) |
| Main audio element MANAD | Main audio track MATRK | Primary audio video PRMAV | Main audio stream MANAD (Main audio pack AM_PCK in primary enhanced video object data P-EVOB) |
| | | Substitute audio SBTAD | Main audio stream MANAD (Main audio pack AM_PCK in secondary enhanced video object data S-EVOB) |
| | | Substitute audio video SBTAV | Main audio stream MANAD (Main audio pack AM_PCK in secondary enhanced video object data S-EVOB) |
| Subtitle element SBTELE | Subtitle track SBTTRK | Primary audio video PRMAV | Sub-picture stream SUBPT (Sub-picture pack SP_PCK in primary enhanced video object data P-EVOB) |
| | | Advanced subtitle ADSBT | Advanced subtitle ADSBT (Markup file MRKUPS of advanced subtitle) |
| Sub video element SUBVD | Sub video track SVTRK | Primary audio video PRMAV | Sub video stream SUBVD (Sub video pack VS_PCK in primary enhanced video object data P-EVOB) |
| | | Secondary audio video SCDAV | Sub video stream SUBVD (Sub video pack VS_PCK in secondary enhanced video object data S-EVOB) |
| Sub audio element SUBAD | Sub audio track SATRK | Primary audio video PRMAV | Sub audio stream SUBAD (Sub audio pack AS_PCK in primary enhanced video object data P-EVOB) |
| | | Secondary audio video SCDAV | Sub video stream SUBAD (Sub audio pack AS_PCK in secondary enhanced video object data S-EVOB) |

<Title id = [ID information TTID #2 of title] [title attribute information TTATRI] >
Object mapping information OBMAPI (including track number assignment information)
Resource information RESRCI
Playback sequence information PLSQI
Track navigation information TRNAVI
Scheduled control information SCHECI
</Title>

Primary audio video clip element PRAVCP
<PrimaryAudioVideoClip [ID information PRAVID]
[Attribute information PRATRI of primary audio video clip element]>
Main video element MANVD
Main audio element MANAD
Subtitle element SBTELE
</PrimaryAudioVideoClip>

Substitute audio clip element SBADCP
<SubstituteAudioClip [ID information SBADID]
[Attribute information SAATRI of substitute audio clip element]>
Main audio element MANAD
</SubstituteAudioClip>

Advanced subtitle segment element ADSTSG
<AdvancedSubtitleSegment [ID information ADSTID]
[Attribute information ADATRI of advanced subtitle segment element]>
Subtitle element SBTELE
</AdvancedSubtitleSegment>

```
<PrimaryAudioVideoClip id = "MainTitle-Primary001"
        dataSource = 'Disc' src = "file://dvddisc/HVDVD_TS/AVMAP001.MAP"
        titleTimeBegin = "00:00:00:00" titleTimeEnd = "00:10:21:12"
        clipTimeBegin = "00:00:00:00" >
    <Video track= "1" angleNumber = "1" />
    <Video track= "2" angleNumber = "2" />
    <Audio track= "1" streamNumber = "0" />
    <Audio track= "2" streamNumber = "2" />
    <Audio track= "3" streamNumber = "3" />
    <Subtitle track= "1" streamNumber = "0" />
    <Subtitle track= "2" streamNumber = "1" />
</PrimaryAudioVideoClip>

<SubstituteAudioClip id = "MainTitle-SubstituteAudio001"
        dataSource = 'P-Storage' src = "file://aditional/A002001.MAP"
        titleTimeBegin = "00:00:00:00" titleTimeEnd = "00:10:21:12"
        clipTimeBegin = "00:00:00:00"
    <Audio track= "4" streamNumber = "0" />
</SubstituteAudioClip>

<AdvancedSubtitleSegment id = "MainTitle-AdvancedSubtitle001"
        dataSource = 'P-Storage' src = "file://requiredl/SUBTITLE-ZH.XML"
        titleTimeBegin = "00:00:00:00" titleTimeEnd = "00:10:21:12"
        clipTimeBegin = "00:00:00:00"
    <Subtitle track= "3" />
</AdvancedSubtitleSegment>
```

F I G. 61C (d)

| Element | Track | Attribution name | Written contents |
|---|---|---|---|
| Video track element VDTRK | Main video track MVTRK | track | Video track number VDTKNM |
| | | selectable | Flag USIFLG indicating whether user selection is enabled |
| | | description | Additional information (text format) concerning video track |
| Audio track element ADTRK | Main audio track MATRK and sub audio track SATRK | track | Audio track number ADTKNM |
| | | selectable | Flag USIFLG indicating whether use selection is enabled |
| | | Langcode | Audio language code and audio language code extension descriptor ADLCEX |
| | | description | Additional information (text format) concerning audio track |
| Subtitle track element SBTREL | Subtitle track SBTTRK | track | Subtitle track number STTKNM |
| | | selectable | Flag USIFLG indicating whether user selection is enabled |
| | | Langcode | Subtitle language code and subtitle language code extension descriptor STLCEX |
| | | forced | Flag FRCFLG indicating forced screen output |
| | | description | Additional information (text format) concerning subtitle track |

FIG. 62B (e)

```
<TrackNavigationList>
    <VideoTrack track='1' selectable='true' />
    <VideoTrack track='2' selectable='true' />
    <VideoTrack track='3' selectable='false' />

    <AudioTrack track='1' langcode='en:01' selectable='true' />
    <AudioTrack track='2' langcode='ja:01' selectable='true' />
    <AudioTrack track='3' langcode='ja:02' selectable='true' />
    <AudioTrack track='4' selectable='false' />

    <SubtitleTrack track='1' langcode='en:01' selectable='true' forced='true' />
    <SubtitleTrack track='2' langcode='ja:01' selectable='true' />
    <SubtitleTrack track='3' langcode='ch:01' selectable='true' />
    <SubtitleTrack track='4' selectable='false' />
</TrackNavigationList>
```

(Q) →

※ As shown in example of FIG. 84(a), in another application example different from a method by which audio track number ADTKNM of main audio track MATRK and audio track number ADTKNM of sub audio track SATRK are set without overlapping and track navigation information TRNAVI is utilized to select one of main audio track MATRK and sub audio track SATRK, target track in FIG. 62B(d) is main audio track MATRK alone (sub audio track SATRK is not target of track navigation information TRNAVI). In this case, when user uses track navigation information TRNAVI to select specific main audio track MATRK, sub audio track SATRK to be played back/displayed is also automatically selected in accordance with this selection result.

<NetworkSoruce src = [Storage position SRCNTS of network source corresponding to allowable minimum value of network throughput] URI (uniform resource identifier)

*) When set in secondary audio video clip element SCAVCP, substitute audio video clip element SBAVCP or substitute audio clip element SBADCP, time map file STMAP storage position of secondary enhanced video object data S-EVOB is specified. When set in application resource element APRELE or title resource element, storage position of file (e.g., manifest file MNFST, markup file MRKUP, script file SCRPT, still image file IMAGE, effect audio file EFTAD or font file FONT) to be loaded into file cache FLCCH is specified.

networkThroughput = [Allowable minimum value information NTTRPT of network throughput]

*) Indicating minimum value allowed as network system in relation to network throughput (data transfer rate) when downloading network source (data or file) from storage position specified in src attribute information SRCNTS (display unit; 1000 bps).

/>

F I G. 63B (d)

<ApplicationResource
src = [Storage position SRCDTC of data or file to be downloaded into data cache]
URI (uniform resource identifier)
size = [Size information DTFLSZ of data or file to be loaded into data cache]
*) represented in positive value in bytes
priority = [Priority information PRIORT with respect to removal of corresponding resource
*) Priority information when removing corresponding resource which is not referred from title or currently executed advanced application from data cache DTCCH
**) Integral value from 0 to $2^{31}-1$ is written (removal is performed from resource having higher value)
multiplexed = (true | false)[Multiplexed attribute information MLTPLX]
*) In case of "true", stored data is loaded from advanced pack ADV_PCK in primary enhanced video object P-EVOB during loading period LOADPE on title timeline. In case of "false", stored data must be preloaded from original storage position SRCDTC (specified URI)
loadingBegin = [Period PRLOAD on title timeline at which fetching (loading) of target resource is started]
*) Written in form of "HH:MM:SS:FF"
noCache = (true | false)[No cache information NOCACH]
*) If "true", Cach-Control header and Pragma header must be included in GET request message of HTTP.
description=[Additional information (text format) concerning application resource element]
>
Network source element NTSELE → (T)
</ApplicationResource>

<Contents of technical ingenuity for displaying/executing various playback/display objects as expected in accordance with progress of title timeline TMLE>

1. Scheme capable of guaranteeing start of display or execution in accordance with progress of title timeline TMLE

*1 Advanced application ADAPL, advanced subtitle ADSET and part of secondary video set SCDVS are temporarily stored in data cache DTCCH in advance, and data temporarily stored in the data cache DTCCH is used to perform display or execution processing for user (see FIG. 25)

*2 Name of data or file to be temporarily stored in data cache in advance and its original storage position information are written in src attribute information (source attribute information) in playlist PLLST (in various clip elements, network source element NTSELE, application resource element APRELE, title resource element, playlist application resource element PLRELE) (see FIG. 83)

…Data or file to be temporarily stored in data cache DTCCH in advance and its access destination can be recognized

*3 Timing of starting loading into data cache DTCCH in advance is specified by "time PRLOAD (loadingBegin attribute or preload attribute) on title timeline at which fetching (loading) of target resource begins" in playlist PLLST (in clip element, application resource element APRELE or title resource element) (see FIGS. 65A-65D, 54A-55B, 63A-63C and 66A-66C)

*4 Information which can select data or file optimum for loading is written in playlist PLLST (network source element NTSELE) in accordance with network environment of information recording and playback apparatus 1 (see FIGS. 67 and 68)

2. Scheme of countermeasure when previous loading into data cache DTCCH cannot be performed in time

*5 Countermeasure according to playback/display object is specified in "synchronization attribute information SYNAT (sync attribute information) in playlist PLLST (in clip element or in segment element) is specified (see FIGS. 54A-56B)

◎ In case of sync="hard" (hard synchronization attribute), progress of title timeline TMLE is stopped until loading is completed, and moving image is paused ◎ In case of sync="soft" (soft synchronization attribute), progress of title timeline TMLE is continued, and playback is started after completion of loading (in retard of display start time TTSTTM/titleTimeBegin specified on title timeline TMLE)

FIG. 64B (a) <?xml[xml attribute information XMATRI]?>

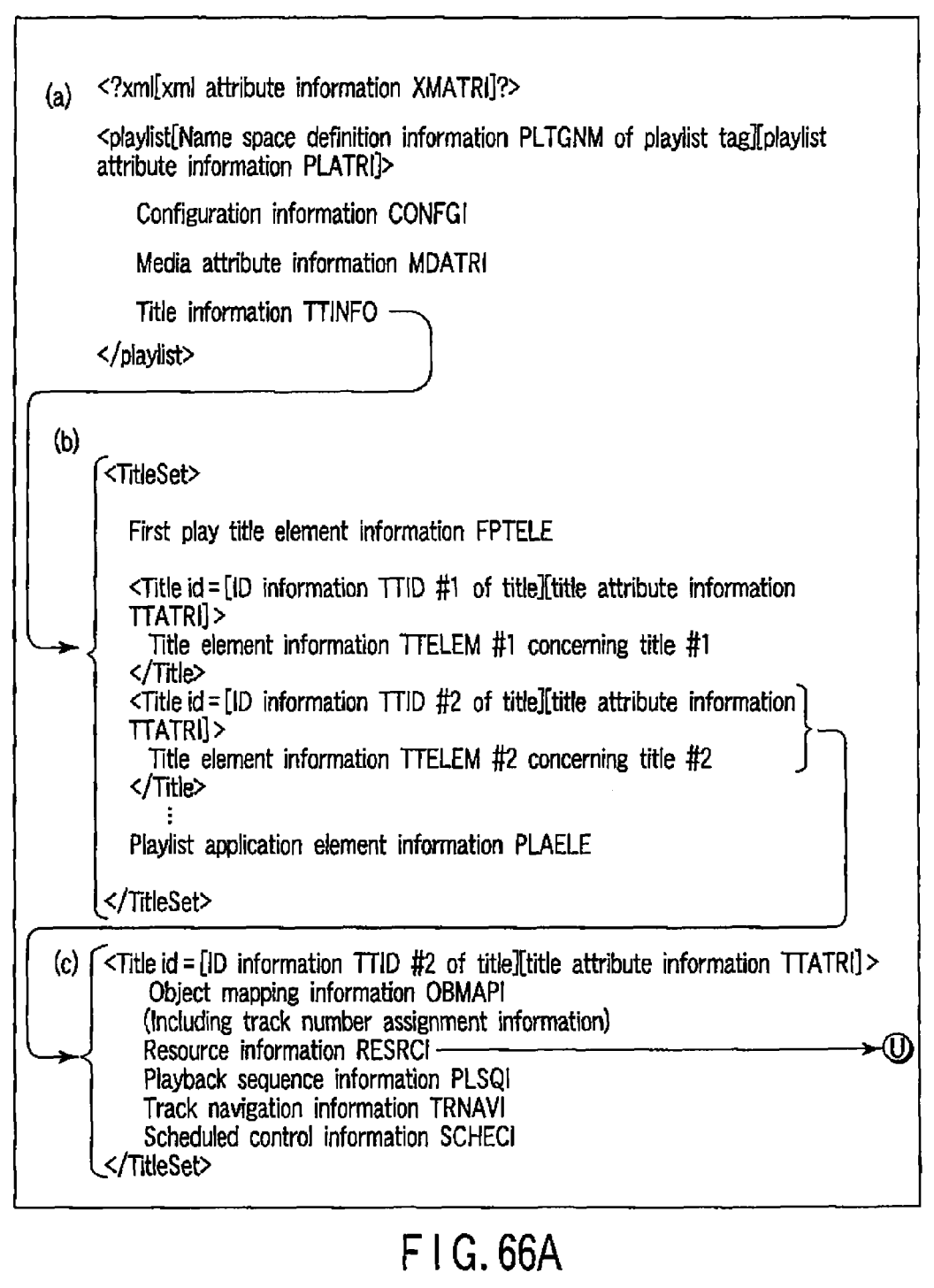

<playlist[Name space definition information PLTGNM of playlist tag][playlist attribute information PLATRI]>

Configuration information CONFGI

Media attribute information MDATRI

Title information TTINFO

</playlist>

(b)

<TitleSet>

First play title element information FPTELE

<Title id=[ID information TTID #1 of title][title attribute information TTATRI]>
Title element information TTELEM #1 concerning title #1
</Title>
<Title id=[ID information TTID #2 of title][title attribute information TTATRI]>
Title element information TTELEM #2 concerning title #2
</Title>
⋮
Playlist application element information PLAELE </TitleSet>

(c) <Title id=[ID information TTID #2 of title][title attribute information TTATRI]>
Object mapping information OBMAPI
(Including track number assignment information)
Resource information RESRCI → (U)
Playback sequence information PLSQI
Track navigation information TRNAVI
Scheduled control information SCHECI
</TitleSet>

F I G. 66A

<TitleResource
src = [Storage position SRCDTC of data or file to be downloaded into data cache]
URI (uniform resource identifier)
size = [Size information DTFLSZ of data or file to be loaded into data cache]
*) Represented in positive value in bytes
titleTimeBegin = [Start time TTSTTM on title timeline of corresponding resource]
*) Written in form of "HH:MM:SS:FF"
titleTimeEnd = [End time TTEDTM on title timeline of corresponding resource]
*) Written in form of "HH:MM:SS:FF"
priority = [Priority information PRIORT with respect to removal of corresponding resource]
*) Priority information when corresponding resource which is not referred by title or currently executed advanced application is removed from data cache
**) Write integral value from 0 to $2^{31}-1$ (removal is performed from resource having higher value)
multiplexed = (true | false)[Multiplexed attribute information MLTPLX]
*) If "true", stored data is loaded from advanced pack ADV_PCK in primary enhanced video object P-EVOB during loading period LOADPE on title timeline. If "false", preloading must be performed from original storage position SRCDTC (specified URI).

(U)

loadingBegin = [Time PRLOAD on title timeline at which fetching (loading) of target resource begins]
*) Written in form of "HH:MM:SS:FF"
noCache = (true | false) [No-cache information NOCACH]
*) If "true", Cach-Control header and Pragma header must be included in GET request message of HTTP
description=[Additional information (text format) concerning title resource element]
>
Network source element NTSELE
< /TitleResource>
<TitleResource > ⋮
Network source element NTSELE
< /TitleResource>
⋮

<NetworkSoruce
src = [Storage position SRCNTS of network source corresponding to allowable minimum value of network throughput]
URI (uniform resource identifier)
*) When set in secondary audio video clip element SCAVCP, substitute audio video clip element SBAVCP or substitute audio clip element SBADCP, storage position of time map file STMAP of secondary enhanced video object data S-EVOB is specified. When set in application resource element APRELE or title resource element, storage position of file (e.g., manifest file MNFST, markup file MRKUP, script file SCRPT, still image file IMAGE, effect audio file EFTAD or font file FONT) to be loaded into file cache FLCCH is specified.
networkThroughput = [Allowable minimum value information NTTRPT of network throughput]
*) Indicating minimum value allowed as network system in relation to network throughput (data transfer rate) when network source (data or file) is downloaded from storage position specified in src attribute information SRCNTS (indicated unit: 1000 bps)
/>

FIG. 66C (a)

Figure 69A:
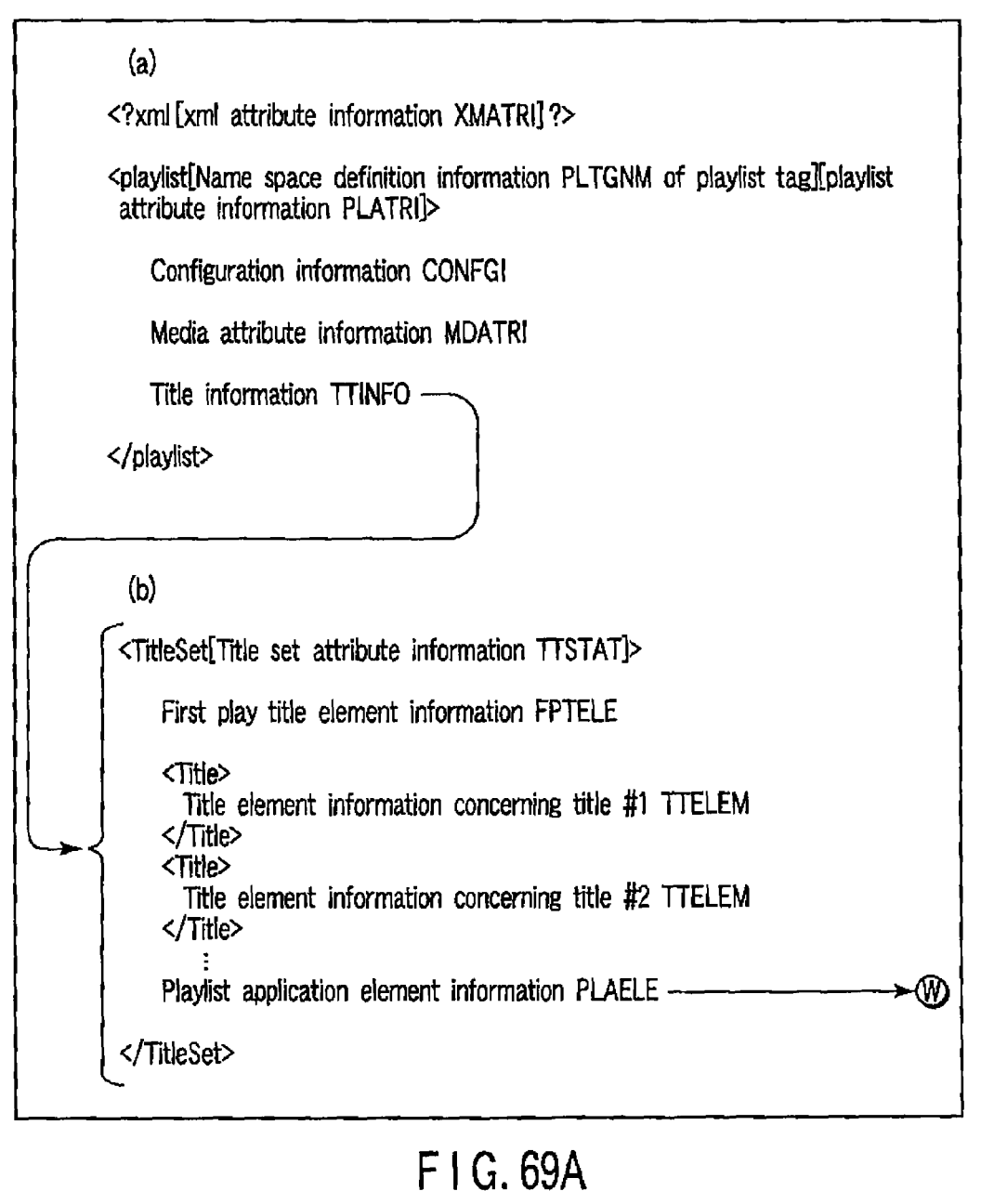

<?xml [xml attribute information XMATRI] ?>

<playlist[Name space definition information PLTGNM of playlist tag][playlist attribute information PLATRI]>

Configuration information CONFGI

Media attribute information MDATRI

Title information TTINFO

</playlist>

(b)

<TitleSet[Title set attribute information TTSTAT]>

First play title element information FPTELE

<Title>
Title element information concerning title #1 TTELEM
</Title>
<Title>
Title element information concerning title #2 TTELEM
</Title>
⋮
Playlist application element information PLAELE → (W)

</TitleSet>

F I G. 69A (c)

```
<PlaylistApplication
    id=[ID information PLAPID of playlist application]
    src=[Storage position URIMNF of manifest file including initial setting information of corresponding application]]
        URI (uniform resource identifier)
    zOrder=[Z-order attribute (Z-index) information ZORDER]
       *) Meaning layer number information ("0" or positive value) in which applications or application elements
          superimposed and arranged in graphic plane exist
      **) Used (subjected to setting change) in accordance with frequency of tick clock
    language=[Language attribute information LANGAT]
       *) Specification information of language used for character or voice displayed in screen (e.g., menu screen)
    description=[Additional information (text format) concerning playlist application]
>
    Playlist application resource element information PLRELE #1
    Playlist application resource element information PLRELE #2
                 :
</PlaylistApplication>
```

(d)

```
<PlaylistApplicationResource
    src=[Storage position SRCDTC of data or file to be downloaded into data cache]
        URI (uniform resource identifier)
      *) API management region in file cache FLCCH or network must not specified
    size=[Size information DTFLSZ of data or file to be downloaded into data cache] (in bytes)
    multiplexed=(true | false)[Multiplexed attribute information MLTPLX]
      *) If "true", this information is loaded from advanced pack ADV_PCK in primary enhanced video object
         P-EVOB during loading period (during playback of first play title FRPLTT). If "false", resource must be
         preloaded from specific URI
    description=[Additional information (text format) concerning playlist application resource]
    />
```

| Name of resource to be temporarily stored in file cache FLCCH | Playlist application resource PLAPRS | Title resource TTRSRC | Application resource APRSRC |
|---|---|---|---|
| Contents of various resources | Resource shared by arbitrary advanced applications ADAPL (including playlist associated advanced application PLAPL and title associated advanced application TTAPL) between titles. Playlist associated advanced application PLAPL can be shared (display for user) between different titles. | Resource shared by plurality of advanced applications ADAPL in same title. Corresponding resource can be used in title associated advanced application TTAPL and advanced application ADAPL in title. | Resource uniquely used for each advanced application ADAPL. It is used in specific advanced application ADAPL in title alone. |
| Resource element name in playlist PLLST (description name) | Playlist application resource element PLRELE (PlaylistApplicationResource element) | Title resource element (TitleResource element) | Application resource element APRELE (ApplicationResource element) |
| Storage period of target resource in file cache FLCCH | When first play title FRPLTT exists, this resource is downloaded during playback of first play title FRPLTT, and it is kept being stored in file cache even if playback target title is changed. | It is kept being stored in file cache as long as playback target title is not changed, but it is removed from file cache FLCCH when playback target title is changed. | It is stored in file cache FLCCH before use (execution) of each advanced application ADAPL, and it is removed from file cache FLCCH after use (execution) of a dvanced application file ADAPL. |
| Effect obtained by setting | Display for user can be continuously performed even in period of transition between different titles. Since loading period is unnecessary in period other than playback of first play title FRPLTT, start of display or display switching can be effected at high speed. | Continuous display in same title is possible. When contents are constituted of plurality of titles, file cache FLCCH can be effectively used. | Since corresponding resource is removed after use (execution) of specific advanced application ADAPL, file cache FLCCH can be effectively used. Since necessary memory size of file cache FLCCH can be reduced, apparatus becomes inexpensive. |

※1 Loading of playlist application resource PLAPRS into file cache FLCCH is completed in playback of first play title FRPLTT
⇒Display/execution of playlist associated advanced application PLAPL when starting playback of arbitrary title other than first play title FRPLTT ※2 Multiplexed attribute information MLTPLX is arranged (written) in playlist application resource element PLRELE
⇒Preliminary preparation of demultiplexer DEMUX in primary video player is possible⇒reduction in loading time LOADPE ※3 Restriction conditions (e.g., number of video tracks = number of audio tracks = 1) for first play title FRPLTT are set ※4 Storage position of playlist application resource PLRSFL is set outside network server NTSRV (※3, ※4) ⇒Completion of loading in playback period of first play title FRPLTT is guaranteed

FIG. 73B (a)

Figure 74A:
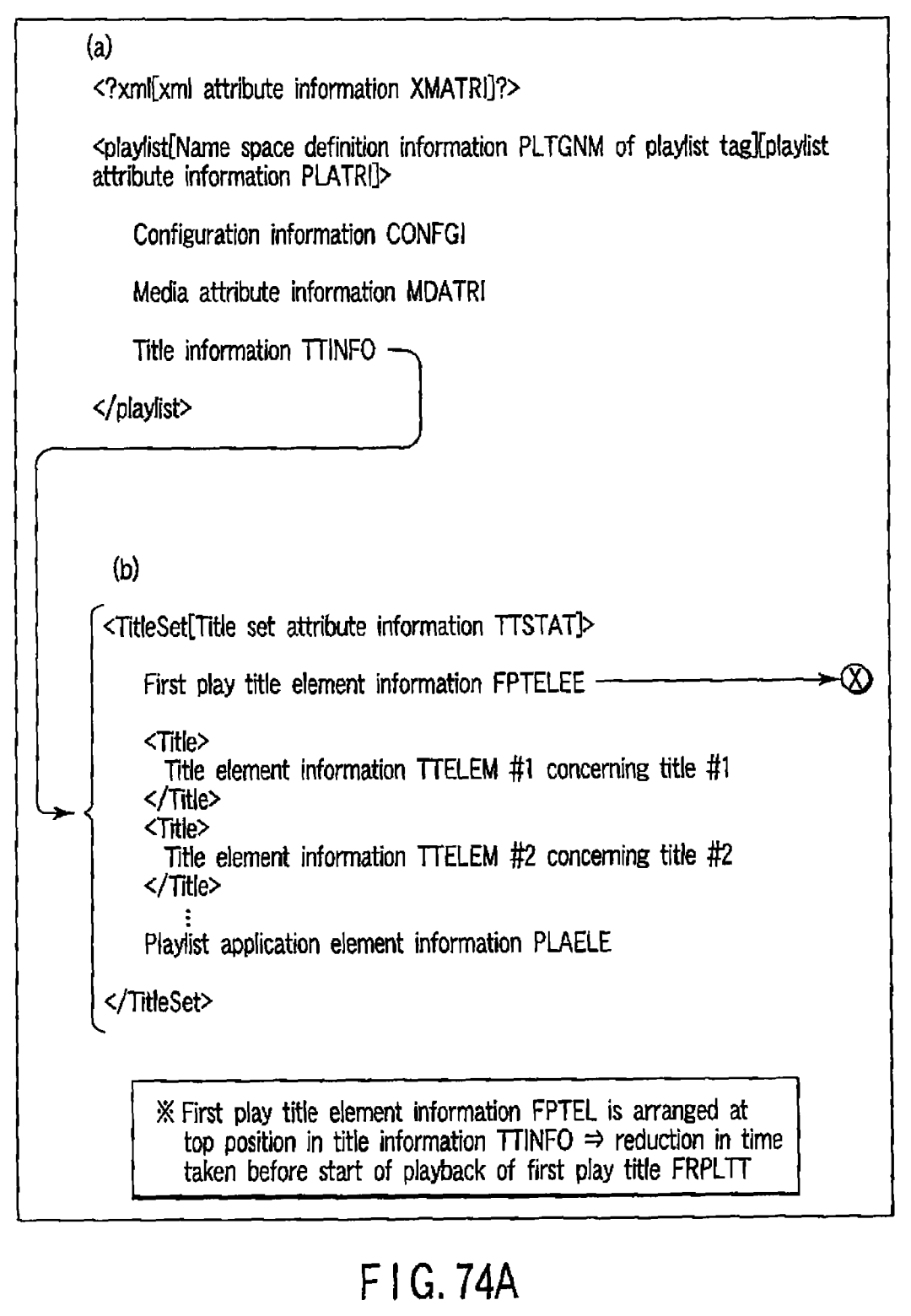

<?xml[xml attribute information XMATRI]?>

<playlist[Name space definition information PLTGNM of playlist tag][playlist attribute information PLATRI]>

Configuration information CONFGI

Media attribute information MDATRI

Title information TTINFO

</playlist>

(b)

<TitleSet[Title set attribute information TTSTAT]>

First play title element information FPTELEE → ※

<Title>
Title element information TTELEM #1 concerning title #1
</Title>
<Title>
Title element information TTELEM #2 concerning title #2
</Title>
⋮
Playlist application element information PLAELE </TitleSet>

※ First play title element information FPTEL is arranged at top position in title information TTINFO ⇒ reduction in time taken before start of playback of first play title FRPLTT

FIG. 74A (c)

```
<FirstPlayTitle
    titleDuration = [Time length information TTDUR of entire title on title timeline]
    alternativeSDDisplayMode = (panscanOrLetterbox | panscan | letterbox)
          [Allowed display mode information SDDISP in 4:3 TV monitor]
    xml:base = [Storage position FPTXML of main (basic) resource used in first play title element]
        URI (uniform resource identifier)
>
    Primary audio video clip element PRAVCP
      <PrimaryAudioVideoClip[ID information PRAVID]
                 [Attribute information PRATRI of primary audio video clip element]>
                   ⋮
      </PrimaryAudioVideoClip>

    Substitute audio video clip element SBAVCP
      <SubstituteAudioVideoClip[ID information SBAVID]
                 [Attribute information PRATRI of substitute audio video clip element]>
                   ⋮
      </SubstituteAudioVideoClip>
< /FirstPlayTitle>
```

FIG. 74B (a)

<?xml[xml attribute information XMATRI]?>

<playlist[Name space definition information PLTGNM of playlist tag][playlist attribute information PLATRI]>

Configuration information CONFGI

Media attribute information MDATRI

Title information TTINFO

</playlist>

(b)

<TitleSet[Title set attribute information TTSTAT]>

First play title element information FPTELE

<Title id=[Title ID information TTID #1][title attribute information TTATRI]>
Title element information TTELEM #1 concerning title #1
</Title>
<Title id=[Title ID information TTID #2][title attribute information TTATRI]>
Title element information TTELEM #2 concerning title #2
</Title>
⋮

Playlist application element information PLAELE

</TitleSet>

(c)

<Title id=[Title ID information TTID #2][title attribute information TTATRI]>
Object mapping information OBMAPI
(Including track number assignment information)
Resource information RESRCI
Playback sequence information PLSQI
Track navigation information TRNAVI
Scheduled control information SCHECI → (Y)
</Title>

FIG. 75A 31
(b) Example of display picture at T0

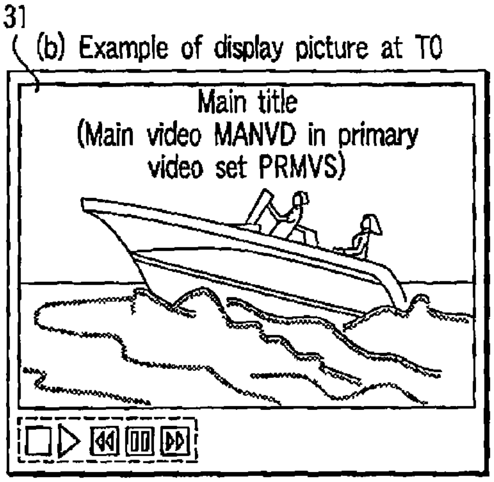

31
(c) Example of display picture at T1

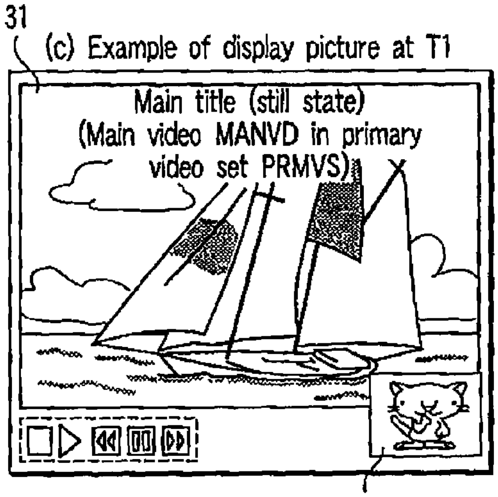

(d) Characteristics of pause-at element function

- Tick clock (page clock or application clock) indicative of display timing of advanced subtitle ADSBT, advanced application ADAPL, playlist associated advanced application PLAPL or title associated advanced application TTAPL is not synchronized with media clock corresponding to progress on title timeline TMLE
- When pause is specified by API command, shifting of stop frame occurs due to delay of API command processing

⇩

1. Display timings of both clocks can be synchronized by pause-at element PAUSEL in scheduled control information SCHECI
2. Accurate pause position can be specified in frames (fields)

FIG. 76B (c) Explanatory view of data configuration in font file FONTS of advanced subtitle in this embodiment

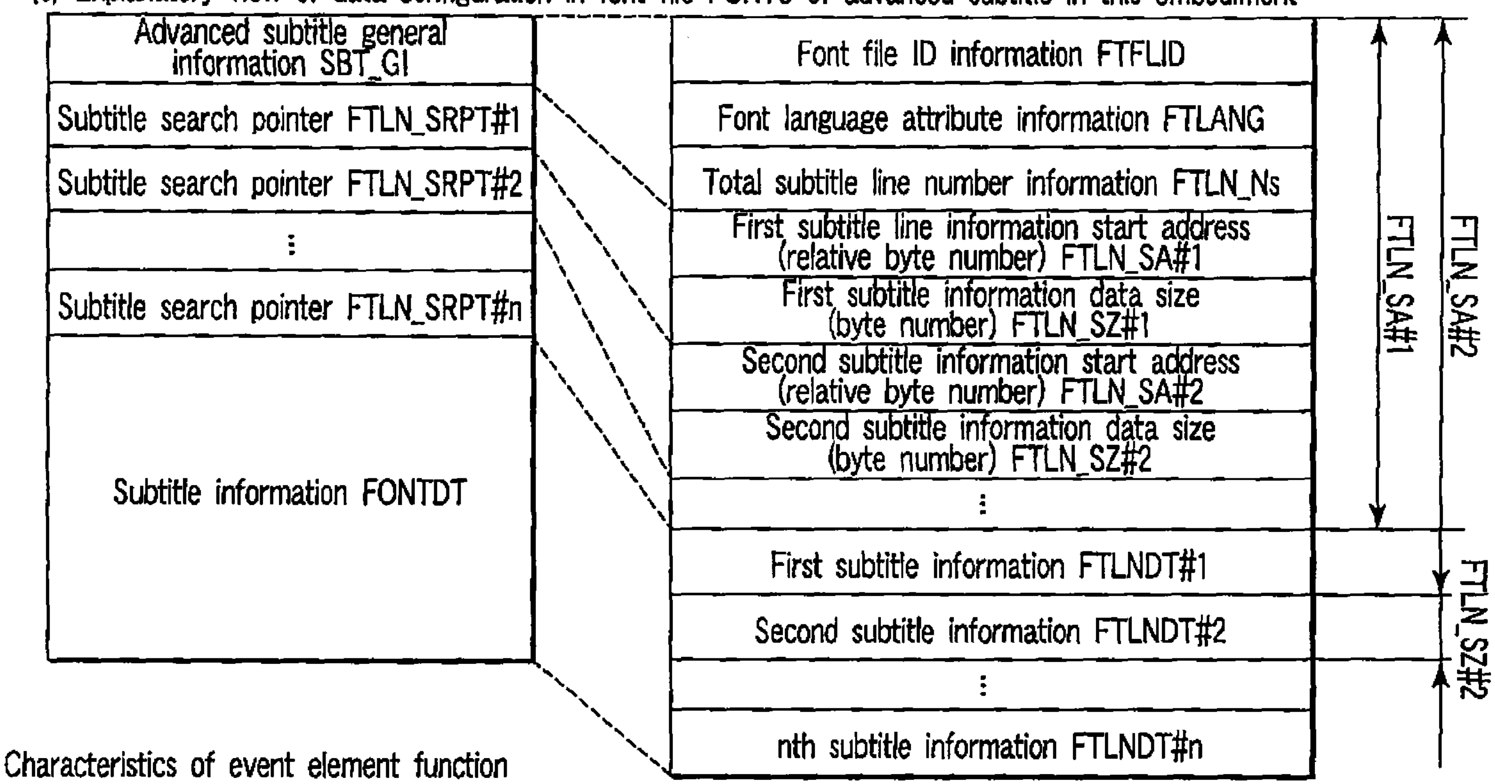

(d) Characteristics of event element function

- ● Tick clock (page clock or application clock) indicative of display timing of advanced subtitle ADSBT, advanced application ADAPL, playlist associated advanced application PLAPL or title associated advanced application TTAPL is not synchronized with media clock corresponding to progress of title timeline TMLE

⇩

- ☆ Display timings of both clocks can be achieved by event element EVNTEL in scheduled control information SCHECI

FIG. 77B (c)

```
<AudioAttributeItem
    index = [Media index number information INDEX]
    codec = [Audio compression code information ADCDC]
    sampleRate = [Audio stream sampling frequency ADSPRT]
    sampleDepth = [Sample depth information or quantization bit number SPDPT]
    channels = [Audio channel number information ADCNL]
    bitrate = [Data bit rate (data transfer rate) information DTBTRT]
/>
```

(d)

```
<VideAttributeItem
    index = [Media index number information INDEX]
    codec = [Video compression code information VDCDC]
    sampleAspectRatio = (16:9 | 4:3) [Aspect ratio information ASPRT]
    horizontalResolution = [Horizontal resolution attribute information HZTRL]
    verticalResolution = [Vertical resolution attribute information VTCRL]
    encodedFrameRate = [Frame rate attribute information VENFRRT in display for user]
    sourceFrameRate = [Source frame rate attribute information SOFRRT]
    bitrate = [Data bit rate (data transfer rate) information DTBTRT]
    activeAreaX1 = [X coordinate value APARX1 at upper left end position of video display screen in aperture]
    activeAreaY1 = [Y coordinate value APARY1 at upper left end position of video display screen in aperture]
    activeAreaX2 = [X coordinate value APARX2 at lower right end position of video display screen in aperture]
    activeAreaY2 = [Y coordinate value APARY2 at lower right end position of video display screen in aperture]
/>
```

(e)

```
<SubpictureAttributeItem
    index = [Media index number information INDEX]
    codec = [Sub-picture compression code information SPCDC]
/>
```

C → (c); Aa → (d); Ba → (e)

FIG. 79B (a) List of elements with/without ID information

| Elements with ID information | Elements without ID information |
|---|---|
| Elements which are often referred by API command | Elements which are rarely referred by API command |
| Title element TTELEM<br>Playlist application element PLAELE<br>Primary audio video clip element PRAVCP<br>Secondary audio video clip element SCAVCP<br>Substitute audio video clip element SBAVCP<br>Substitute audio clip element ASBADCP<br>Advanced subtitle segment element ADSTSG<br>Application segment element APPLSG<br>Chapter element<br>Pause-at element PAUSEL<br>Event element EVNTEL | Streaming buffer element STRBUF<br>Aperture element APTR<br>Main video default color element MVDFCL<br>Network timeout element NTTMOT<br>Video attribute item element VABITM<br>Audio attribute item element AABITM<br>Sub-picture attribute item element SPAITM<br>First play title element FPTELE<br>Title set element<br>Main video element MANVD<br>Main audio element MANAD<br>Subtitle element SBTELE<br>Sub video element SUBVD<br>Sub audio element SUBAD<br>Network source element NTSELE<br>Application resource element APRELE<br>Title resource element<br>Playlist application resource element PLRELE<br>Video track element VDTRK<br>Audio track element ADTRK<br>Subtitle track element SBTREL<br>Scheduled control list element |

(b) Example of utilization of ID information by API command

◎Title ID information TTID (see FIG. 24A(b)) is specified by API command to execute processing of transition between titles.

◎Chapter element ID information CHPTID (see FIG. 24B(d)) is specified by API command to execute control access to specific chapter.

(c) Points of ID information setting

1] ID information is set at top position of element which is referred by API command relatively often. (Specific element is referred from API command by using ID information)
…API command processing is facilitated.
…Since ID information is arranged at top position of each element, retrieval of ID information is facilitated.

2] "ID information" rather than "number" is utilized to identify each element.
…Change processing in updating playlist is facilitated
(In case of "number", processing of shifting number is required in updating playlist)

FIG. 82

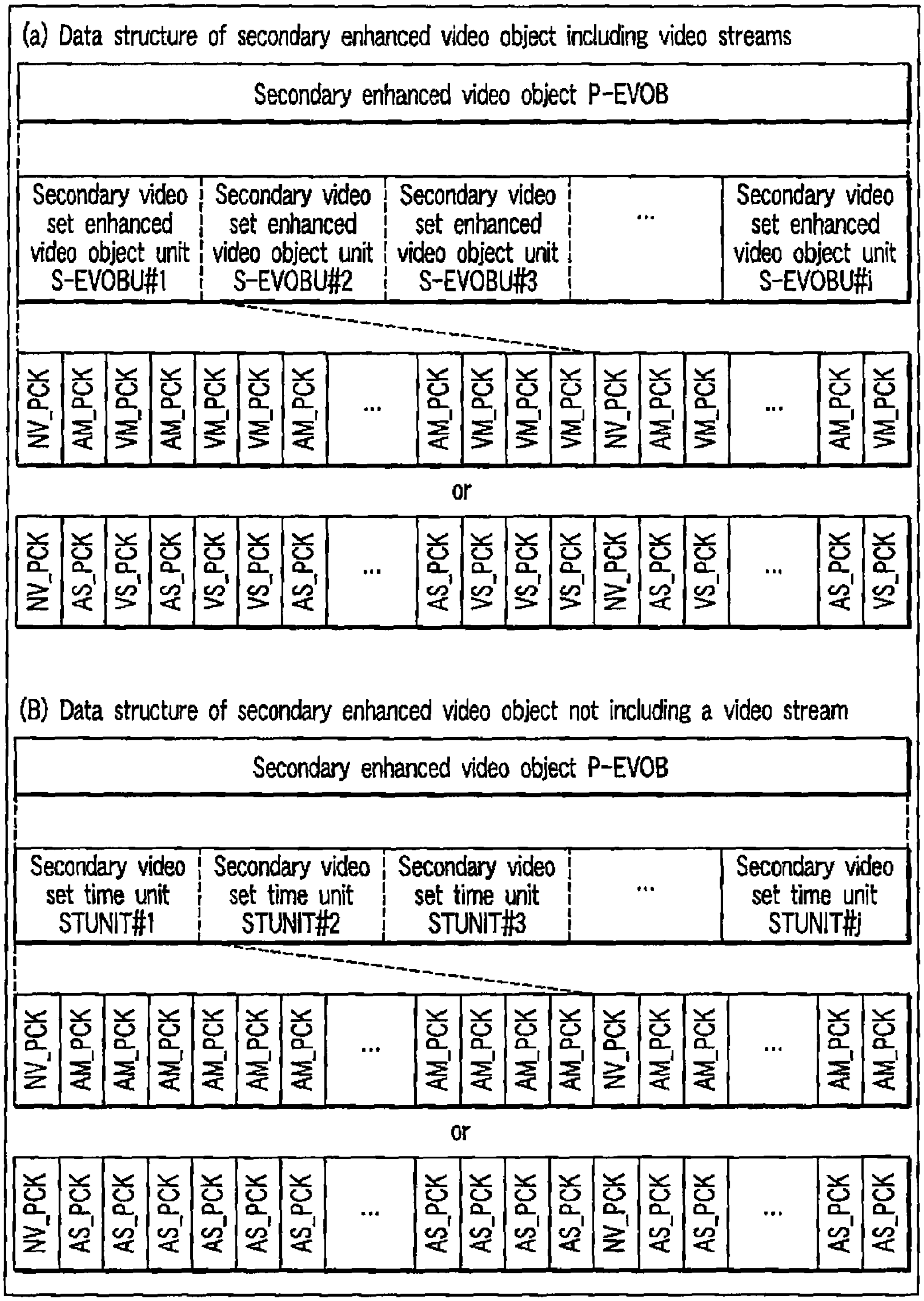
F I G. 89

(a) Characteristic of the embodiment concerning content information CONTNT

☆ Specific element (xml descriptive sentence) can be set as content information CONTNT
…When a specific element (xml descriptive sentence) has been set as content information CONTNT, the element set as content information CONTNT is called "child element" and the element including the content information CONTNT is called "parent element."
⇩
Combining parent element attribute information and child element attribute information makes it possible to realize various functions efficiently (b) Characteristic of the embodiment concerning required attribute information RQATRI ☆ In specific element (xml descriptive sentence), display or execution timing on the time axis is set on the basis of required attribute information RQATRI
…begin attribute information = beginning time MUSTTM of execution (or display) period, dur attribute information = time interval MUDRTM of execution (or display) period, end attribute information = ending time MUENTM of execution (or display) period, and others
⇩
It is possible to perform control along the time axis which was not found in a conventional markup page MRKUP (such as appearance or disappearance in the middle of processing or the start or end of execution in the middle of processing)

(c) Basic data structure of an element (xml descriptive sentence)

<content model information CONTMD[required attribute information RQATRI][optional attribute information OPATRI]>[content information CONTNT]</content model information CONTMD>
content model / required model / optional model / content / content model (d) Characteristic of the embodiment concerning optional attribute information OPATRI ☆ Arbitrary attribute information STNSAT defined in a style name space can be used (or set) as optional attribute information OPATRI in many elements (xml descriptive sentences)
⇩
Display and representation methods (or formats) in a markup page MRKUP can be set on the basis of arbitrary attribute information STNSAT defined in a style name space and a wide variety of options are prepared as the attribute information STNSAT
⇩
The power of expression in the markup page MRKUP is improved remarkably as compared with a conventional equivalent (e) List of content model information usable in the embodiment

| Vocabulary | Characters written in content model information | Element name | |
|---|---|---|---|
| Content vocabulary CNTVOC | area | Area element | AREAEL |
| | body | Body element | BODYEL |
| | br | br element | BREKEL |
| | button | Button element | BUTNEL |
| | div | Div element | DVSNEL |
| | head | Head element | HEADEL |
| | include | Include element | INCLEL |
| | input | Input element | INPTEL |
| | meta | Meta element | METAEL |
| | object | Object element | OBJTEL |
| | p | p element | PRGREL |
| | param | Param element | PRMTEL |
| | rout | Root element | ROOTEL |
| | span | Span element | SPANEL |
| Style vocabulary STLVOC | styling | Styling element | STNGEL |
| | style | Style element | STYLEL |
| Timing vocabulary TIMVOC | animate | Animate element | ANIMEL |
| | cue | Cue element | CUEEL |
| | event | Event element | EVNTEL |
| | defs | Defs element | DEFSEL |
| | g | g element | GROEL |
| | link | Link element | LINKEL |
| | par | Par element | PARAEL |
| | seq | Seq element | SEQNEL |
| | set | Set element | SETELE |
| | timing | Timing element | TIMGEL |

FIG. 90

(a) Basic structure of markup descriptive sentence

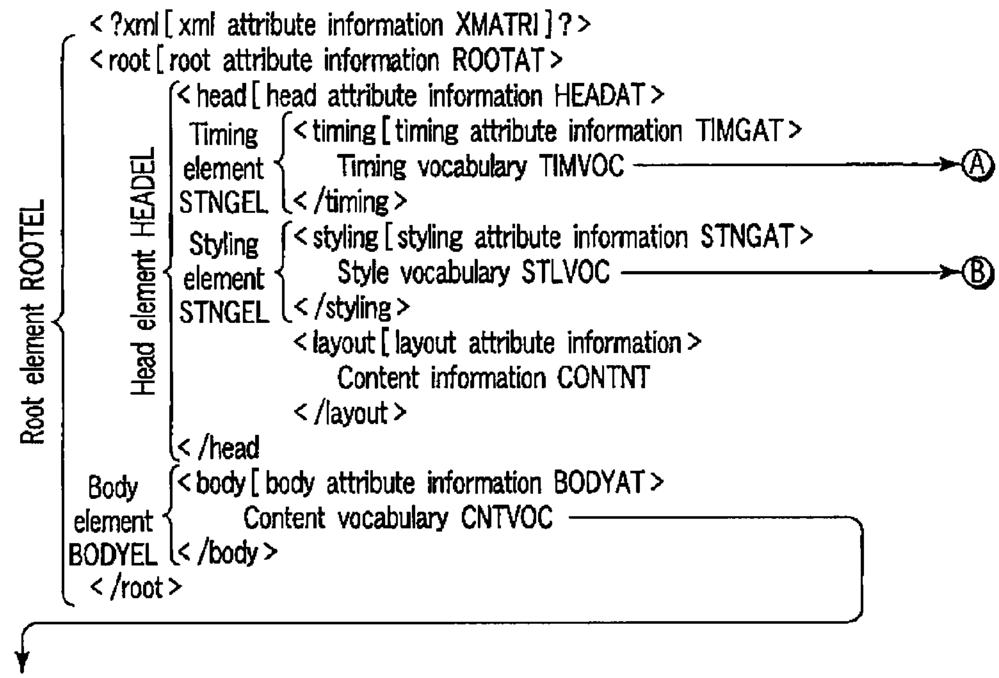

(b) List of content vocabulary CNTVOC put (or written) in body element BODYEL

| Element name | Classification | Description |
|---|---|---|
| Area elementa AREAEL | Transition to execution | Determine an area on the screen where transition to execution (active state) can be specified (by click or the like) |
| br element BREKEL | Display | Carry out forced display and output |
| Button element BUTNEL | State | Set the user input button |
| div element DVSNEL | Operation | Set divisions of block splitting of elements related to the same block type |
| Include element INCLEL | Nondisplay | Specify a document to be referred to |
| Input element INPTEL | State | Set a text box to which the user can input |
| Meta element METAEL | Nondisplay | Set (a combination of) elements representing the contents of advanced applications |
| Object element OBJTEL | Display | Set an object file name and display format attached to a markup page |
| p element PRGREL | Operation | Set the display timing and display format of a paragraph block (text extending over a plurality of rows) |
| Param element PRMTEL | Nondisplay | Set parameters for an object element |
| Span element SPANEL | Operation | Set the display timing and display format of one row of content (text) (in a block) |

F I G. 91A

Ⓐ→(c) List of timing vocabulary TIMVOC

| Element name | Description |
|---|---|
| Animate element ANIMEL | Set animation display |
| Cue element CUEEL | Select a child element on the basis of the specified condition and carry out an execution process (or a replacement process) with specific timing |
| Event element EVNTEL | Create an event handled by a script |
| Defs element DEFSEL | Define a set (or group) of specific animation elements |
| g element GROEL | Define the grouping of animation elements |
| Link element LINKEL | load a specified resource and set a hyperlink to replace the current process with a new one |
| Par element PARAEL | Define parallel advance of time |
| Seq element SEQNEL | Define sequential advance of time |
| Set element SETELE | Set various attribute conditions and characteristic conditions |
| Timing element TIMGEL | Set timing conditions for all of the advanced applications |

Ⓑ→(d) List of style vocabulary

| Element name | Description |
|---|---|
| Styling element STNGEL | Set a style sheet |
| Style element STYLEL | Set display formats (or styles) collectively |

* Display a subtitle (or a ticker) changing in synchronization with the screen on the basis of span element SPANEL or p element PRGREL (or a combination of object element OBJTEL and one of them)
…the value of timing element TIMGEL syncbase attribute information is set in "media"

FIG. 91B

<table>
<tr><th>Name of attribute information used on content element</th><th>General description of attribute information</th><th>Description of "value" to be set as attribute information</th><th>Initial value (default)</th><th>State of value change</th><th>Characteristic</th></tr>
<tr><td>accessKey</td><td>Sets specified key information to make the transition to an execution state</td><td>Key information list</td><td>Nil</td><td>Fixed</td><td>Required</td></tr>
<tr><td>coords</td><td>Sets shape parameters in an area element</td><td>Shape parameter list</td><td>Nil</td><td>Fixed</td><td>Optional</td></tr>
<tr><td>id</td><td>Sets identification data (ID data) on each element</td><td>Identification data (ID data)</td><td>Nil</td><td>Fixed</td><td>Optional</td></tr>
<tr><td>condition</td><td>Defines use conditions in an include element</td><td>Boolean expression</td><td>Nil</td><td>Fixed</td><td>Required</td></tr>
<tr><td>mode</td><td>Defines a user input format in an input element</td><td>Password | one row | plural rows | display</td><td>Nil</td><td>Fixed</td><td>Required</td></tr>
<tr><td>name</td><td>Sets a variable name, a data name, or a name corresponding to an event</td><td>Name information</td><td>Nil</td><td>Fixed</td><td>Required</td></tr>
<tr><td>shape</td><td>Specifies an area shape defined in an area element</td><td>Round | square | continuous line | default</td><td>Nil</td><td>Fixed</td><td>Optional</td></tr>
<tr><td>src</td><td>Specifies the storage location (path) of a resource and its file name</td><td>URI (Uniform Resource Identifier)</td><td>Nil</td><td>Fixed</td><td>Optional</td></tr>
<tr><td>type</td><td>Specifies a file type (MIME type)</td><td>MIME type information</td><td>Nil</td><td>Fixed</td><td>Required</td></tr>
<tr><td>value</td><td>Sets the value (variable value) of name attribute information</td><td>Variable value</td><td>Variable value</td><td>Variable</td><td>Optional</td></tr>
<tr><td>xml : base</td><td>Specifies reference resource information for the corresponding element/child element</td><td>URI (Uniform Resource Identifier)</td><td>Nil</td><td>Fixed</td><td>Optional</td></tr>
<tr><td>xml : lang</td><td>Specifies text language code for the corresponding element/child element</td><td>Language code information</td><td>Nil</td><td>Fixed</td><td>Optional</td></tr>
<tr><td>xml : space</td><td>Place a blank column (or blank row) just in front</td><td>Nil</td><td>Nil</td><td>Fixed</td><td>Optional</td></tr>
</table>

FIG. 93

| Name of attribute information used in timing vocabulary | General description of attribute information | Description of "value" to be set as attribute information | Initial value (default) | State of value change | Characteristic |
|---|---|---|---|---|---|
| additive | Sets whether a variable value is added to or replaced with an existing value | Addition/replacement | Replacement | Fixed | Required |
| begin | Defines an execution start (using a specified time or a specific element) | <time information> \| <specific element specification> | Variable value | Fixed | Required |
| calcMode | Sets a calculation mode (consecutive value/discrete value) to a variable | consecutive value \| discrete value | Consecutive value | Fixed | Required |
| dur | Sets the length of an execution period for the corresponding element | <time information> ("HH : MM : SS : FF") | Variable value | Fixed | Optional |
| end | Sets the ending time of the execution period of the corresponding element | <time information> \| <specific element specification> | Variable value | Fixed | Optional |
| fill | Sets the state of subsequent change when the relevant element has ended before the ending time of the parent element | calcel \| remaining unchanged | Cancel | Fixed | Optional |
| select | Selects and specifies a content element to be set or changed | specific element specification | Nil | Fixed | Required |
| clock | Defines a reference clock determining a time attribute in an element | Title clock \| page clock \| application clock | — | Fixed | Required |
| clockDivisor | Sets the value of [frame rate (time clock frequency)]/[tick clock frequency] | Integer equal to or larger than "0" | 1 | Fixed | Required |
| timeContainer | Determines the timing (time progress) state used in an element | Parallel simultaneous progress \| monotonous sequential progress | Parallel simultaneous progress | Fixed | Optional |
| use | Refers to an animate element or a group of animate elements and event elements | Element identification ID data | Nil | Fixed | Optional |

FIG. 94

<table>
<tr><th>Name of attribute information defined in style name space</th><th>General description of attribute information</th><th>Description of "value" to be set as attribute information</th><th>Initial value (default)</th><th>Target element in which attribute information is used</th><th>Continuity</th></tr>
<tr><td>style : anchor</td><td>Shows a method of converting x, y, width, and height attributes into "XSL" positions</td><td>startBefore | centerBefore | afterBefore | startCenter | center | afterCenter | startAfter | centerAfter | endAfter</td><td>start Before</td><td>Position specifying element</td><td>No</td></tr>
<tr><td>style : backgroundColor</td><td>Sets (changes) a background color</td><td><color> | transparency | takeover</td><td>Transparency</td><td>Content element</td><td>No</td></tr>
<tr><td>style : backgroundFrame</td><td>Sets (changes) a background frame</td><td><integer> | takeover</td><td>0</td><td>area, body, div, button, input, object</td><td>No</td></tr>
<tr><td>style : backgroundImage</td><td>Sets a background image</td><td><URI specification>*1 | nil | takeover</td><td>Nil</td><td>area, body, div, button, input, object</td><td>No</td></tr>
<tr><td>style : background PositionHorizontal</td><td>Sets the horizontal position of a still image</td><td><%> | <length> | left | center | right | takeover</td><td>0%</td><td>area, body, div, button, input, object</td><td>No</td></tr>
<tr><td>style : background PositionVertical</td><td>Sets the vertical position of a still image</td><td><%> | <length> | left | center | right | takeover</td><td>0%</td><td>area, body, div, button, input, object</td><td>No</td></tr>
<tr><td>style : backgroundRepeat</td><td>Pastes a specific still image in a background area repeatedly</td><td>repeating | nonrepeating | takeover</td><td>Nonrepeating</td><td>area, body, div, button, input, object</td><td>No</td></tr>
<tr><td>style : backProgression Dimension</td><td>Sets (changes) the distance between the front edge and back edge of a square content area</td><td>automatic setting | <length> | <%> | takeover</td><td>Automatic setting</td><td>Position specifying element, button, object, input</td><td>No</td></tr>
</table>

FIG. 95A

| Name of attribute information defined in style name space | General description of attribute information | Description of "value" to be set as attribute information | Initial value (default) | Target element in which attribute information is used | Continuity |
|---|---|---|---|---|---|
| style : border | Sets the width, style, and color at the edge border of each of front/back/start/end | <width> ?<style> ?<color> ? \| color | Nil | Block element | No |
| style : borderAfter | Sets the width, style, and color at the border of the back edge of a block area | <width> ?<style> ?<color> ? \| color | Nil | Block element | No |
| style : borderBefore | Sets the width, style, and color at the border of the front edge of a block area | <width> ?<style> ?<color> ? \| color | Nil | Block element | No |
| style : borderEnd | Sets the width, style, and color at the border of the end edge of a block area | <width> ?<style> ?<color> ? \| color | Nil | Block element | No |
| style : borderStart | Sets the width, style, and color at the border of the start edge of a block area | <width> ?<style> ?<color> ? \| color | Nil | Block element | No |
| style : breakAfter | Does setting (changing) so as to force a specific row to appear immediately after the execution of the relevant element | automatic setting \| specified row \| takeover | Automatic setting | Inline element | No |
| style : breakBefore | Does setting (changing) so as to force a specific row to appear immediately after the execution of the relevant element | automatic setting \| specified row \| takeover | Automatic setting | Inline element | No |
| style : color | Sets (changes) the color characteristic of content | <color> \| transparency \| takeover | White color | input, p, span, area | Yes |
| style : contentWidth | Sets (changes) the width characteristic of content | automatic setting \| overall display \| <length> \| <%> \| takeover | Automatic setting | area, body, div, button, input, object | No |
| style : contentHeight | Sets (changes) the height characteristic of content | automatic setting \| overall display \| <length> \| <%> \| takeover | Automatic setting | area, body, div, button, input, object | No |

※1 : URI (Uniform Resource Identifier)

FIG. 95B

<table>
<tr><th>Name of attribute information defined in style name space</th><th>General description of attribute information</th><th>Description of "value" to be set as attribute information</th><th>Initial value (default)</th><th>Target element in which attribute information is used</th><th>Continuity</th></tr>
<tr><td>style : crop</td><td>Does setting (changing) so as to clip (trim) into a square shape</td><td>clipping dimension (positive value) | automatic setting</td><td>Automatic setting</td><td>area, body, div, button, input, object</td><td>Yes</td></tr>
<tr><td>style : direction</td><td>Sets (changes) a direction characteristic</td><td>ltr | rtl | takeover</td><td>ltr</td><td>input, p, span</td><td>Yes</td></tr>
<tr><td>style : display</td><td>Sets (changes) a display format (including block/inline)</td><td>automatic setting | Nil | takeover</td><td>Automatic setting</td><td>Content element</td><td>No</td></tr>
<tr><td>style : displayAlign</td><td>Sets (changes) an aligned display method</td><td>automatic setting | left-aligned | centering | right-aligned | takeover</td><td>Automatic setting</td><td>Block element</td><td>Yes</td></tr>
<tr><td>style : endIndent</td><td>Sets (changes) the amount of displacement between the edge positions set by the related elements</td><td><length> | <%> | takeover</td><td>0px</td><td>Block element</td><td>Yes</td></tr>
<tr><td>style : flip</td><td>Sets a moving characteristic of a background image</td><td>fixed | moving row by row | moving block by block | moving in both</td><td>Fixed</td><td>Position specifying element</td><td>No</td></tr>
<tr><td>style : font</td><td>Sets (changes) a font characteristic</td><td><font name> | takeover</td><td>Nil</td><td>input, p, span</td><td>Yes</td></tr>
<tr><td>style : fontSize</td><td>Sets (changes) a font size characteristic</td><td><size> | <%> | 40% | 60% | 80% | 90% | 100% | 110% | 120% | 140% | 160% | takeover</td><td>100%</td><td>input, p, span</td><td>Yes</td></tr>
</table>

FIG. 96A

<table>
<tr><th>Name of attribute information defined in style name space</th><th>General description of attribute information</th><th>Description of "value" to be set as attribute information</th><th>Initial value (default)</th><th>Target element in which attribute information is used</th><th>Continuity</th></tr>
<tr><td>style : fontStyle</td><td>Sets (changes) a font style attribute</td><td>standard | italic | others | takeover</td><td>Standard</td><td>input, p, span</td><td>Yes</td></tr>
<tr><td>style : height</td><td>Sets (changes) a height characteristic</td><td>automatic setting | <height> | <%> | takeover</td><td>Automatic setting</td><td>Position specifying element button, object, input</td><td>No</td></tr>
<tr><td>style : inlineProgression Dimension</td><td>Sets (changes) the distance between the front edge and back edge of a content square area</td><td>automatic setting | <length> | <%> | takeover</td><td>Automatic setting</td><td>Position specifying element button, object, input</td><td>No</td></tr>
<tr><td>style : linefeedTreatment</td><td>Sets a line spacing process</td><td>neglect | kepping | treating as a margine | treating as a margin width of 0 | takeover</td><td>Treating as a margin</td><td>p, input</td><td>Yes</td></tr>
<tr><td>style : lineHeight</td><td>Sets (changes) the characteristic of the height of one row (or line space)</td><td>automatic setting | <height> | <%> | takeover</td><td>Automatic setting</td><td>p, input</td><td>Yes</td></tr>
<tr><td>style : opacity</td><td>Sets (changes) the transparency of a specified mark to the background color with which the mark overlaps</td><td><alpha value> | takeover</td><td>1.0</td><td>Content element</td><td>No</td></tr>
<tr><td>style : padding</td><td>Sets (changes) the insertion of a margin area</td><td><front margin length><lower margin length> ?<back margin length> ?<upper margin length> ? | takeover</td><td>0px</td><td>Block element</td><td>No</td></tr>
<tr><td>style : paddingAfter</td><td>Sets (changes) the insertion of a back margin area</td><td><back margin length> | takeover</td><td>0px</td><td>Block element</td><td>No</td></tr>
<tr><td>style : paddingBefore</td><td>Sets (changes) the insertion of a front margin area</td><td><front margin length> | takeover</td><td>0px</td><td>Block element</td><td>No</td></tr>
<tr><td>style : paddingEnd</td><td>Sets (changes) the insertion of a lower margin area</td><td><lower margin length> | takeover</td><td>0px</td><td>Block element</td><td>No</td></tr>
</table>

FIG. 96B

<table>
<tr><th>Name of attribute information defined in style name space</th><th>General description ofattribute information</th><th>Description of "value" to be set as attribute information</th><th>Initial value (default)</th><th>Target element in which attribute information is used</th><th>Continuity</th></tr>
<tr><td>style : paddingStart</td><td>Sets (changes) the insertion of an upper margin area</td><td><upper margin length> | takeover</td><td>0px</td><td>Block element</td><td>No</td></tr>
<tr><td>style : position</td><td>Sets (changes) a method of defining the starting point position of a specified area in the relevant element</td><td>static value | relative value | absolute value | takeover</td><td>Static value</td><td>Position specifying element</td><td>No</td></tr>
<tr><td>style : scaling</td><td>Sets whether or not an image complying with the relevant element keeps a specified aspect ratio</td><td>aspect ratio compatible | aspect ratio incompatible | takeover</td><td>Aspect ratio incompatible</td><td>area, body, div, button, input, object</td><td>No</td></tr>
<tr><td>style : startIndent</td><td>Sets (changes) the distance between the starting point positions of the relevant square area and the adjacent square area</td><td><length> | <%> | takeover</td><td>0px</td><td>Block element</td><td>Yes</td></tr>
<tr><td>style : suppressAt LineBreak</td><td>Sets (changes) whether to "decrease" or "keep as-is" the character spacing in the same row</td><td>automatic setting | decreasing | keeping as-is | takeover</td><td>Automatic setting</td><td>Inline element including only PC data content</td><td>No</td></tr>
<tr><td>style : textAlign</td><td>Sets (changes) a location in a row in a text area</td><td>left-aligned | centering | right-aligned | takeover</td><td>Left-aligned</td><td>p, input</td><td>Yes</td></tr>
<tr><td>style : textAltitude</td><td>Sets (changes) the height of a text area in a row</td><td>automatic setting | <height> | <%> | takeover</td><td>Automatic setting</td><td>p, input, span</td><td>No</td></tr>
<tr><td>style : textDepth</td><td>Sets (changes) a depth of text information displayed in a raised manner</td><td>automatic setting | <length> | <%> | takeover</td><td>Automatic setting</td><td>p, input, span</td><td>No</td></tr>
<tr><td>style : textIndent</td><td>Sets (changes) the amount of bend of the entire text character string displayed in a row</td><td><length> | <%> | takeover</td><td>0px</td><td>p, input</td><td>Yes</td></tr>
</table>

FIG. 97A

<table>
<tr><th>Name of attribute information defined in style name space</th><th>General description ofattribute information</th><th>Description of "value" to be set as attribute information</th><th>Initial value (default)</th><th>Target element in which attribute information is used</th><th>Continuity</th></tr>
<tr><td>style : visibility</td><td>Sets (changes) a method of displaying a background to a foreground (or the transparency of a foreground)</td><td>displaying the background | hiding the background | takeover</td><td>Displaying the background</td><td>Content element</td><td>Yes</td></tr>
<tr><td>style : whiteSpace Collapse</td><td>Sets (changes) a white space squeezing process</td><td>no white space squeezing | white space squeezing | takeover</td><td>White space squeezing</td><td>input, p</td><td>Yes</td></tr>
<tr><td>style : whiteSpace Treatment</td><td>Sets (changes) white space processing</td><td>ignoring | maintaining the white space | ignoring the front white space | ignoring the back white space | ignoring the peripheral white space | takeover</td><td>Ignoring the peripheral white space</td><td>input, p</td><td>Yes</td></tr>
<tr><td>style : width</td><td>Sets (changes) the width of a squared area</td><td>automatic setting | <width> | <%> | takeover</td><td>Automatic setting</td><td>Position specifying element, button, object, input</td><td>No</td></tr>
<tr><td>style : wrapOption</td><td>Sets (changes) whether to skip one row in front of and behind a specified row by automatic setting</td><td>continuing | skipping one row | takeover</td><td>Skipping one row</td><td>input, p, span</td><td>Yes</td></tr>
<tr><td>style : writingMode</td><td>Sets (changes) a direction in which characters are written in a block or a row</td><td>lr-tb | rl-tb | tb-rl | takeover</td><td>lr-tb</td><td>div, input</td><td>Yes</td></tr>
<tr><td>style : x</td><td>Sets (changes) an x-ordinate value of the starting point position of a square area</td><td><coordinate value> | <%> | automatic setting | takeover</td><td>Automatic setting</td><td>Position specifying element</td><td>No</td></tr>
<tr><td>style : y</td><td>Sets (changes) a y-ordinate value of the starting point position of a square area</td><td><coordinate value> | <%> | automatic setting | takeover</td><td>Automatic setting</td><td>Position specifying element</td><td>No</td></tr>
<tr><td>style : zIndex</td><td>Sets (changes) a z index (an anteroposterior relationship in a stacked representation) of a specified area</td><td>automatic setting | <z index (positive) value> | takeover</td><td>Automatic setting</td><td>Position specifying element</td><td>No</td></tr>
</table>

FIG. 97B

| Name of attribute information defined in style name space | General description of attribute information | Setting value | Setting value when nothing is written | Change of setting value |
|---|---|---|---|---|
| state : foreground | Describes that the screen specified by an element is arranged in the foreground | true \| false | false | Impossible |
| state : enabled | Indicates whether the target element can be executed | true \| false | true | Possible |
| state : focused | Indicates that the target element is in the user input (or user specifying) state | true \| false | false | Possible |
| state : actioned | Indicates that the target element is executing a process | true \| false | false | Possible |
| state : pointer | Indicates whether the cursor position is within or outside an element specifying position | true \| false | false | Impossible |
| state : value | Sets a variable value in the target element | Variable | Variable | Possible |

F I G. 98

| | | area element AREAEL | body element BODYEL | br element BREKEL | button element BUTNEL | div element DVSNEL | head element HEADEL | include element INCLEL | input element INPTEL | meta element METAEL | object element OBJTEL | p element PRGREL | param element PRMTEL | root element ROOTEL | span element SPANEL |
|---|---|---|---|---|---|---|---|---|---|---|---|---|---|---|---|
| Required attribute information RQATRI | accessKey | ○ | | | ○ | | | | ○ | | | | | | |
| | begin | | ○ | | | ○ | | | | | | ○ | | | ○ |
| | condition | | | | | | | ○ | | | | | | | |
| | mode | | | | | | | | ○ | | | | | | |
| | type | | | | | | | | | | ○ | | | | |
| | name | | | | | | | | | | | | ○ | | |
| Optional attribute information OPATRI | coords | ○ | | | | | | | | | | | | | |
| | shape | ○ | | | | | | | | | | | | | |
| | class | ○ | ○ | ○ | ○ | ○ | | | ○ | | ○ | ○ | | | ○ |
| | id | ○ | ○ | ○ | ○ | ○ | ○ | ○ | ○ | ○ | ○ | ○ | ○ | ○ | ○ |
| | dur | | ○ | | | ○ | | | | | | ○ | | | ○ |
| | end | | ○ | | | ○ | | | | | | ○ | | | ○ |
| | timeContainer | | ○ | | | ○ | | | | | | ○ | | | ○ |
| | xml : base | | | | | | | | | | | | | | |
| | xml : lang | | ○ | ○ | ○ | ○ | ○ | | ○ | ○ | ○ | ○ | ○ | ○ | ○ |
| | xml : space | | ○ | ○ | ○ | ○ | ○ | | ○ | ○ | ○ | ○ | | ○ | ○ |
| | href | | | | | | | ○ | | | | | | | |
| | src | | | | | | | | | | ○ | | | | |
| | content | | | | | | | | | | ○ | | | | |
| | value | | | | | | | | | | | | ○ | | |
| | Arbitrary attribute information in style name space | ○ | ○ | | ○ | ○ | | | ○ | | ○ | ○ | | | ○ |
| | Arbitrary attribute information | ○ | ○ | ○ | ○ | ○ | ○ | ○ | ○ | ○ | ○ | ○ | ○ | | ○ |
| Content information CONTNT | area element AREAEL | | | | | | | | | ○ | ○ | | | | |
| | body element BODYEL | | | | | | | | | ○ | | | | ○ | |
| | br element BREKEL | | | | | | | | | ○ | | ○ | | | ○ |
| | button element BUTNEL | | | | | ○ | | | | ○ | | ○ | | | ○ |
| | div element DVSNEL | | ○ | | | ○ | | | | ○ | | | | | |
| | head element HEADEL | | | | | | | | | ○ | | | | ○ | |
| | include element INCLEL | | ○ | | | | ○ | | | ○ | | | | | |
| | input element INPTEL | | | | | ○ | | | | ○ | | ○ | | | ○ |
| | meta element METAEL | | ○ | | ○ | ○ | ○ | | | ○ | ○ | ○ | | | ○ |
| | object element OBJTEL | | ○ | | | ○ | | | ○ | ○ | | ○ | | | ○ |
| | p element PRGREL | | | | ○ | ○ | | | | ○ | ○ | | | | |
| | param element PRMTEL | | | | | | | | ○ | ○ | ○ | | | | |
| | root element ROOTEL | | | | | | | | | ○ | | | | | |
| | span element SPANEL | | | | | | | | | ○ | | ○ | | | ○ |
| | animate element ANIMEL | | | | | | | | | ○ | | | | | |
| | cue element CUEELE | | | | | | | | | ○ | | | | | |
| | event element EVENTEL | | | | | | | | | ○ | | | | | |
| | defs element DEFSEL | | | | | | | | | ○ | | | | | |
| | g element GROPEL | | | | | | | | | ○ | | | | | |
| | link element LINKEL | | | | | | | | | ○ | | | | | |
| | par element PARAEL | | | | | | | | | ○ | | | | | |
| | seq element SEQNEL | | | | | | | | | ○ | | | | | |
| | set element SETELE | | | | | | | | | ○ | | | | | |
| | timing element TIMGEL | | | | | | ○ | | | ○ | | | | | |
| | styling element STNGEL | | | | | | ○ | | | ○ | | | | | |
| | style element STYLEL | | | | | | | | | ○ | | | | | |
| | PC data | | | | | | | | | | | ○ | ○ | | ○ |

FIG. 99

| | | animate element ANIMEL | cue element CUEELE | event element EVNTEL | defs element DEFSEL | g element GROPEL | link element LINKEL | par element PARAEL | seq element SEQNEL | set element SETELE | timing element TIMGEL |
|---|---|---|---|---|---|---|---|---|---|---|---|
| Required attribute information RQATRI | begin | | ○ | | | | | ○ | ○ | | ○ |
| | name | | | ○ | | | | | | | |
| | additive | ○ | | | | | | | | | |
| | calcMode | ○ | | | | | | | | | |
| | select | | ○ | | | | | | | | |
| | clock | | | | | | | | | | ○ |
| | clockDivisor | | | | | | | | | | ○ |
| Optional attribute information OPATRI | id | ○ | ○ | ○ | ○ | ○ | | ○ | ○ | ○ | ○ |
| | dur | | ○ | | | | | ○ | ○ | | ○ |
| | end | | ○ | | | | | ○ | ○ | | ○ |
| | timeContainer | | | | | | | | | | ○ |
| | xml : base | | | | | | ○ | | | | |
| | href | | | | | | ○ | | | | |
| | fill | | ○ | | | | | | | | |
| | use | | ○ | | | | | | | | |
| | Arbitrary attribute information | ○ | ○ | ○ | ○ | ○ | | ○ | ○ | ○ | ○ |
| | Arbitrary attribute information in content, style, and state name space | ○ | | | | | | | | ○ | |
| Content information CONTNT | param element PRMTEL | | | ○ | | | | | | | |
| | animate element ANIMEL | | ○ | | ○ | ○ | | | | | |
| | cue element CUEELE | | | | | | | ○ | ○ | | |
| | event element EVNTEL | | ○ | | ○ | ○ | | | | | |
| | defs element DEFSEL | | | | | | | | | | ○ |
| | g element GROPEL | | | | ○ | ○ | | | | | |
| | link element LINKEL | | ○ | | ○ | | | | | | |
| | par element PARAEL | | | | | | | ○ | ○ | | ○ |
| | seq element SEQNEL | | | | | | | ○ | ○ | | ○ |
| | set element SETELE | | ○ | | ○ | ○ | | | | | |

Example of setting select attribute information used in each element

```
<?xml[xml attribute information XMATRI]?>
<root[root attribute information ROOTAT]>
    <head[head attribute information HEADAT]>
        <timing[timing attribute information TIMGAT]>
                Timing vocabulary TIMVOC#1
                <cue select=[specific element specifying
information SLCTEL in body element][other attribute
information OTHATR#1]/>
                Timing vocabulary TIMVOC#2
            </timing>
            <styling[styling attribute information STNGAT]>
                Style vocabulary STLVOC#1
                <style select=[specific element specifying
information SLCTEL in body element][other attribute
information OTHATR#2]/>
                Style vocabulary STLVOC#2
                </styling>
            </head>
            <body[body attribute information BODYAT]>
                Content vocabulary CNTVOC
            </body>
</root>
```

Head element HEADEL

Timing element TIMGEL

Styling element STNGEL

Body element BODYEL

FIG. 101A (b)

Method of writing specific element specifying information SLCTEL in a body element written as a select attribute 1) When a specific element in a body element and the element name to which the element belongs are specified at the same time select="//[content model information CONTMD][@id=[specific element identification data ELEMID]]"

2) When all of the elements having the same element name (or the same content model information) in a body element are specified at the same time select="//[content model information CONTMD]"

3) When only a specific element in a body element is specified select="*[@id=[specific element identification data ELEMID]]"

4) Example of writing

```
<?xml[xml attribute information XMATRI]?>
<root[root attribute information ROOTAT]>
    <head[head attribute information HEADAT]>
        <timing[timing attribute information TIMGAT]>
          Timing vocabulary TIMVOC#1
          <cue select="//p[@id='P1ID']"[other attribute information
            OTHATR#1]/>   ↑(1)

                Timing vocabulary TIMVOC#2
        </timing>
        <styling[styling attribute information STNGAT]>
          <style select="//p"[other attribute information OTHATR#2]/>
                  ↑(2)

          <style select="*[id='P1ID']"[other attribute information
            OTHATR#3]/>   ↑(3)
        </styling>
    </head>
    <body[body attribute information BODYAT]>
        <object[object attribute information OBJCAT]>
          <p id="P1ID">XXXXX is</p>
        </object>
    </body>
</root>
```

FIG. 101B (e) Ⓐ Ⓑ Ⓒ

```
<?xml[xml attribute information XMATRI]?>
<root[root attribute information ROOTAT]>
  <head[head attribute information HEADAT]>
    <styling[styling attribute information STNGAT]>
      <style select="//p"style.textAlign="center"/> ←-------- γ
δ
      <style select="//*[@id="P1ID"]"style:fontStyle="normal"style:color="black"style:width="wa"
        Style:textAltitude="ha"style:y="ya"/>
ε
      <style select="//*[@id="P2ID"]"style:fontStyle="italic"style:color="red"style:width="wb"
        Style:textAltitude="hb"style:y="yb"/>
ζ
      <style select="//*[@id="P3ID"]"style:fontStyle="normal"style:color="black"style:width="wc"
        Style:textAltitude="hc"style:y="yc"/>
    </styling>
    <timing id"TIMEID"begin="T0"dur="TN-T0"end="TN"clock="title"clockDivisor="4"timeContainer="seq">
                                                  α
δ
      <cue select="//*[@id="P1ID"]"begin="T1"end="T2"/> ←------- β
ε
      <cue select="//*[@id="P2ID"]"begin="T2"end="T3"/> ←------- β
ζ
      <cue select="//*[@id="P3ID"]"begin="T3"end="T4"/> ←------- β
    </timing>
  </head>
  <body[body attribute information BODYAT]>
δ   <object src="files:///additional/FONTS.OTF"type="OTF">
ε     <p id="P1ID">○○ is</p>                                λ
ζ     <p id="P2ID">excellent</p>                            μ
      <p id="P3ID">company</p>                              ν
    </object>
  </body>
</root>
```

(f)

Description of the effect produced by using select attribute information

1) Attribute information, which would have to be written repeatedly in the individual elements in a conventional body element BODYEL, can be written in one place in a shared manner in a style sheet (in a styling element STNGEL) or a time sheet (in a timing element TIMGEL) (shown by broken line β and broken line γ
→ The total amount of descriptive sentence in the markup MRKUP → It is easy to download data from the file cache FLCCH 2) The writing location of attribute information can be distributed in the style sheet/in the time sheet/in the body element BODYEL for each content → It is possible to simplify the process of changing the contents of the markup MRKUP → It is easy to edit a program

FIG. 102B

| System event name | Event state name | Setting value | General description of SystemEventHandler |
|---|---|---|---|
| Title begin event | Start | title_begin | Starts the reproduction of a title |
| Title end event | End | title_end | Ends the reproduction of the title |
| Scheduled event | Event | scheduled_event | Executes an event scheduled beforehand |
| Chapter event | Change | chapter | Changes the chapter of an object to be reproduced |
| Clip begin event | Start | clip_begin | Starts the reproduction of a presentation object (or starts the reproduction of various clip elements in the playlist PLLST (see FIG. 54(b)) |
| Clip end event | End | clip_end | Ends the reproduction of the presentation object (or ends the reproduction of various clip elements in the playlist PLLST (see FIG. 54(b)) |
| Video track event | Change | video_track | Changes the video track number to be reproduced and displayed |
| Audio track event | Change | audio_track | Changes the audio track number to be reproduced and displayed |
| Subtitle track event | Change | subtitle_track | Changes the subtitle track number to be reproduced and displayed |
| Application end event | End | application_end | Ends the execution of an application |

FIG. 103A

| System event name | Event state name | Setting value | General description of SystemEventHandler |
|---|---|---|---|
| Play state event | Change | play_state | Changes the reproduced state |
| Play speed event | Change | play_speed | Changes the reproducing speed |
| Controller event | Connected | controller_ connected | Indicates the connected state of a controller (or the start of the connection with a controller) |
| Controller event | Disconnected | controller_ disconnected | Indicates the disconnected state of a controller (or the stop of the connection with a controller) |
| Persistent storage event | Change | persistent_storage | Changes a persistent storage unit to be set |
| Network timeout event | Timeout | netwook_timeout | Carries out a timeout process of a network line (or disconnects the network line corresponding to the timeout time) |
| Resource not found event | Unconfirmed | resource_not_ found | Indicates the unconfirmed state of a resource storage location |
| Streaming buffer empty event | Blank | buffer_empty | Indicates that the streaming buffer is empty |
| Streaming buffer restart event | Restart | buffer_restart | Restarts the streaming buffer |
| Network connection event | connection | netwook_ connection | Connects the network line |
| Stop request event | Stop | stop-request | Request a stop |

F I G. 103B

| API type | Object name | Function name | Brief summary | Setting parameter | Return value | Flowchart drawing number |
|---|---|---|---|---|---|---|
| Player API | Track selection object | SelectVideo TrackNumber | Set track of video used in playback presentation | Track number of main video | None | FIG. 111 |
| Player API | Track selection object | SelectAudio TrackNumber | Designate audio track number | Main audio track number | None | FIG. 112 |
| Player API | Track selection object | SelectAudio Language | Specify language code of main audio, and change main audio track | (1) Language code<br>(2) Language code extension | None | FIG. 113 |
| Player API | Track selection object | SelectSubtitle TrackNumber | Specify track number of subtitle, and change presentation state | Subtitle track number | None | FIG. 112 |
| Player API | Track selection object | SelectSubtitle Language | Specify language code of subtitle, and change subtitle track | (1) Language code<br>(2) Language code extension | None | FIG. 113 |
| Player API | Bookmark object | save | Save current playback position, and current playback state | None | None | FIG. 114 |

FIG. 106A

| API type | Object name | Function name | Brief summary | Setting parameter | Return value | Flowchart drawing number |
|---|---|---|---|---|---|---|
| Player API | Bookmark object | jump | Interrupt current playback and restart playback from recorded (designated) position. Change state of bookmark (latest playback position (information) which is kept periodically updated on memory) | None | None | FIG. 115 |
| Player API | Playlist object | load | Change playlist and reset player | URI (Uniform Resource Identifier) | None | FIG. 116 |
| Player API | Playlist object | playPlaylist | Perform playback at normal speed | None | None | FIG. 117 |
| Player API | Playlist object | pause | Pause current playback | None | None | FIG. 118 |
| Player API | Playlist object | stopPlaylist | Stop processing of advanced content playback unit | None | None | None |
| Player API | Playlist object | fastForward | Perform fastforward playback | Playback speed | None | FIG. 119 |
| Player API | Playlist object | fastReverse | Perform fastreverse playback | Reverse playback speed | None | FIG. 119 |
| Player API | Playlist object | slowForward | Perform slow playback in forward direction | Playback speed | None | None |
| Player API | Playlist object | slowReverse | Perform slow playback in reverse direction | Playback speed | None | None |

FIG. 106B

| API type | Object name | Function name | Brief summary | Setting parameter | Return value | Flowchart drawing number |
|---|---|---|---|---|---|---|
| Player API | Playlist object | stepForward | Perform step playback in forward direction | None | None | FIG. 120 |
| Player API | Playlist object | stepBackward | Perform step playback in reverse direction | None | None | FIG. 120 |
| Player API | Title object | jumpInTitle | Change playback time on title timeline in single title | (1) Change time<br>(2) Bookmark | None | FIG. 121 |
| Player API | Chapter object | jumpOn Chapter | Start playback from designated time in single chapter | Playback start time and bookmark | None | FIG. 122 |
| Player API | Chapter object | top | Restart playback from top position in chapter | None | None | FIG. 123 |
| Player API | Audio track object | getMedia Attribute | Acquire media attribute value of corresponding track from playlist | (1) Time on title timeline<br>(2) Media attribute name | Designated media attribute value | FIG. 124 |

F I G. 107A

| API type | Object name | Function name | Brief summary | Setting parameter | Return value | Flowchart drawing number |
|---|---|---|---|---|---|---|
| Player API | Main video object | capture | Save current main video image in file cache | (1) URI (Uniform Resource Identifier) of video image file<br>(2) Callback function | None | FIG. 126<br>FIG. 127 |
| Player API | Main video object | changeImage Size | Reduce presentation size of image file captured in file cache | (1) URI (Uniform Resource Identifier) of source file<br>(2) URI (Uniform Resource Identifier) of file after reduction<br>(3) Denominator value and numerator value indicating reduction ratio<br>(4) Callback function | None | FIG. 128<br>FIG. 129 |
| Player API | Main video object | setOuter FrameColor | Change outer frame color of main video | (1) Y value<br>(2) Cr value<br>(3) Cb value | None | FIG. 125 |
| Player API | Main video object | changeLayout MainVideo | Change layout of main video | (1) Canvas X-coordinate value of main video<br>(2) Canvas Y-coordinate value of main video<br>(3) Scaling size of main video<br>(4) cropX value of main video<br>(5) cropY value of main video<br>(6) cropWidth value of main video<br>(7) cropHeight value of main video<br>(8) Presentation period of main video to be cropped | None | FIG. 130<br>FIG. 131 |

FIG. 107B

| API type | Object name | Function name | Brief summary | Setting parameter | Return value | Flowchart drawing number |
|---|---|---|---|---|---|---|
| Player API | Sub video object | changeLayout SubVideo | Change layout of sub video | (1) Canvas X-coordinate value of sub video<br>(2) Canvas Y-coordinate value of sub video<br>(3) Scaling size of sub video<br>(4) cropX value of sub video<br>(5) cropY value of sub video<br>(6) cropWidth value of sub video<br>(7) cropHeight value of sub video<br>(8) Presentation period of sub video to be cropped | None | FIG. 132<br>FIG. 133 |
| Player API | Main audio object | setVolume | Change audio volume value | (1) Volume value of left speaker<br>(2) Volume value of right speaker<br>(3) Volume value of center speaker<br>(4) Volume value of left surround speaker<br>(5) Volume value of right surround speaker<br>(6) Volume value of left rear speaker<br>(7) Volume value of right rear speaker<br>(8) Volume value of sub woofer | None | FIG. 134 |

FIG. 108A

| API type | Object name | Function name | Brief summary | Setting parameter | Return value | Flowchart drawing number |
|---|---|---|---|---|---|---|
| Player API | Sub audio object | setMixing SubAudio | Perform downmix processing of sub audio channels | (1) Downmix value to left speaker<br>(2) Downmix value to right speaker<br>(3) Downmix value to center speaker<br>(4) Downmix value to left surround speaker<br>(5) Downmix value to right surround speaker<br>(6) Downmix value of left rear speaker<br>(7) Downmix value of right rear speaker<br>(8) Downmix value of sub woofer<br>of right and left sub audio channels | None | FIG. 135 |
| Player API | Effect audio object | playEffect Audio | Perform playback presentation of effect audio | (1) URI (Uniform Resource Identifier) of effect audio file<br>(2) Playback repeat count of effect audio file<br>(3) Callback function | None | FIG. 137<br>FIG. 138 |
| Player API | Effect audio object | stopEffect Audio | Stop playback presentation of effect audio | None | None | FIG. 136 |

FIG. 108B

| API type | Object name | Function name | Brief summary | Setting parameter | Return value | Flowchart drawing number |
|---|---|---|---|---|---|---|
| Player API | Effect audio object | setMixing EffectAudio | Perform downmix processing of effect audio channels | (1) Downmix value to left speaker<br>(2) Downmix value to right speaker<br>(3) Downmix value to center speaker<br>(4) Downmix value to left surround speaker<br>(5) Downmix value to right surround speaker<br>(6) Downmix value of left rear speaker<br>(7) Downmix value of right rear speaker<br>(8) Downmix value of sub woofer<br>of right and left effect audio channels | None | None |
| Player API | Standard content player object | playStandard ContentPlayer | Change playback state from advanced content playback state to standard content playback state | Domain name of standard content | None | FIG. 139 |

F I G. 109A

| API type | Object name | Function name | Brief summary | Setting parameter | Return value | Flowchart drawing number |
|---|---|---|---|---|---|---|
| Player API | Secondary video player object | play Secondary VideoPlayer | Start playback of secondary video player | (1) URI (Uniform Resource Identifier) of time map file<br>(2) Time until playback start of secondary video player<br>(3) Offset time to playback start position in secondary video set<br>(4) Playback end time in secondary video set<br>(5) Callback function | None | FIG. 140<br>FIG. 141<br>FIG. 142<br>FIG. 143 |
| Player API | Secondary video player object | pauseOn | Pause playback presentation of secondary video set | None | None | FIG. 144 |
| Player API | Secondary video player object | pauseOff | Restart playback presentation of secondary video set from paused state | None | None | FIG. 145 |
| Player API | Secondary video player object | stop Secondary VideoPlayer | End playback presentation of secondary video set | None | None | FIG. 146 |
| Player API | General parameter object | getValue | Acquire general parameter value designated by specific key | Key information | General parameter value corresponding to specific key | FIG. 147 |

FIG. 109B

| API type | Object name | Function name | Brief summary | Setting parameter | Return value | Flowchart drawing number |
|---|---|---|---|---|---|---|
| Player API | General parameter object | setValue | Save general parameter value together with specific key | (1) Key information<br>(2) General parameter value corresponding to specific key | None | FIG. 148 |
| Data cache API | Data cache | getPriority | Acquire delete priority order of files in file cache | URI<br>(Uniform Resource Identifier) | Delete priority order number | FIG. 149 |
| Data cache API | Data cache | getPriority | Set delete priority order of files in file cache | (1) URI (Uniform Resource Identifier)<br>(2) Priority order number | None | FIG. 150 |
| Application API | Application object | moveToTop | Move and present current application to frontmost side | None | None | FIG. 151 |
| Application API | Application object | moveTo Bottom | Move and present current application to backmost side | None | None | FIG. 152 |
| Application API | Application object | link | Replace currently activated markup page by linked markup page | URI<br>(Uniform Resource Identifier) | None | FIG. 153<br>FIG. 154 |

FIG. 110A

| API type | Object name | Function name | Brief summary | Setting parameter | Return value | Flowchart drawing number |
|---|---|---|---|---|---|---|
| Application API | Application object | setMarkup LoadHandler | Set callback function to be called upon loading current markup page | Callback function | None | None |
| Application API | Advanced application object | activate | Activate application | None | None | FIG. 155 |
| Application API | Advanced application object | inactivate | Inactivate application | None | None | FIG. 156 |
| Application API | Advanced application object | moveBefore | Move and present designated application to position immediately before target application | Z-order value of target application | None | FIG. 157 |
| Application API | Advanced application object | moveAfter | Move and present designated application to position immediately after target application | Z-order value of target application | None | FIG. 158 |
| XML API | XML parser object | parse | Load XML document and parse its contents | (1) URI (Uniform Resource Identifier) (2) Callback function | None | FIG. 159 FIG. 160 |
| XML API | XML parser object | parseString | Parse specific data as XML document | Designation information of data to be parsed | Parsing result information | None |

F I G. 110B

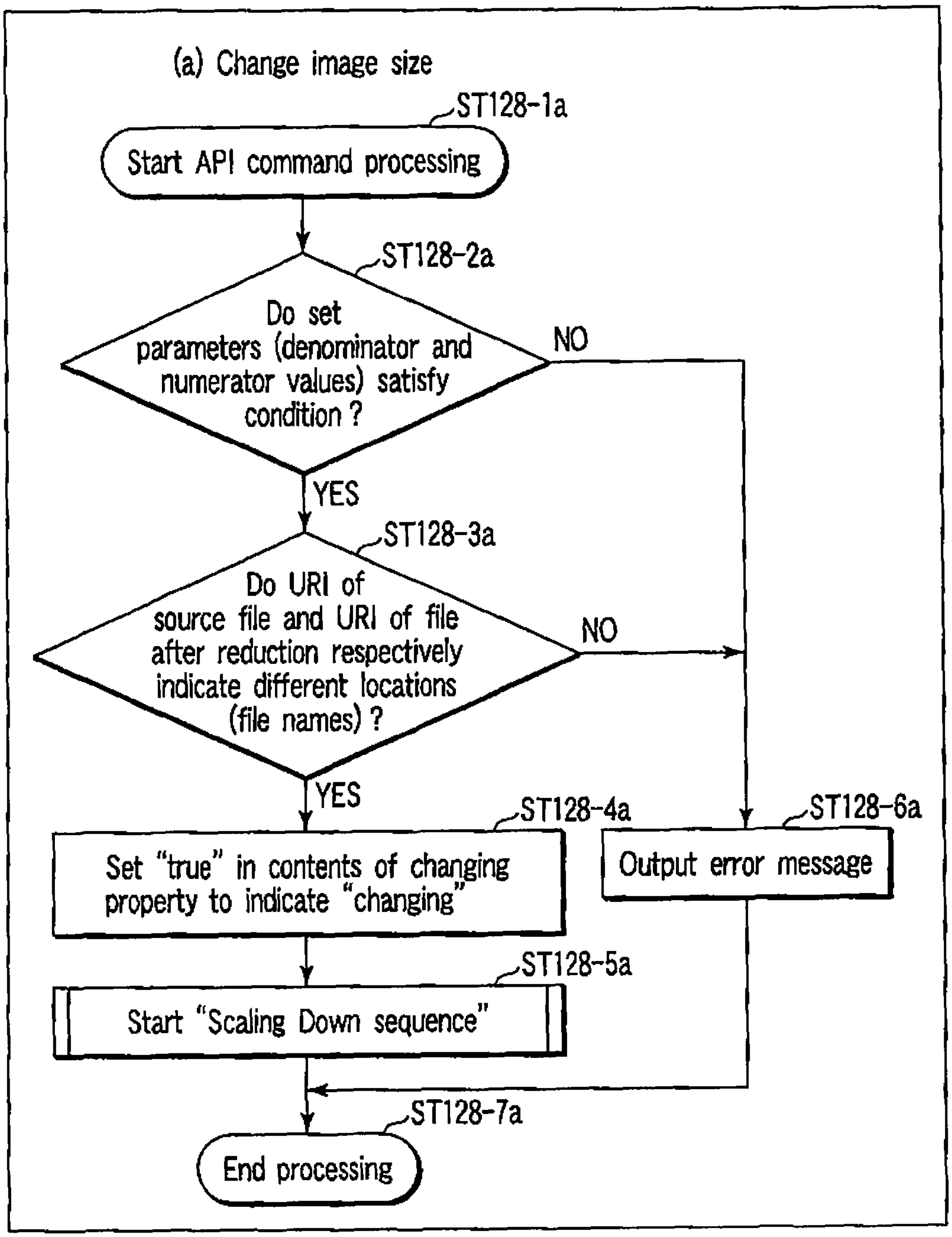
F I G. 128

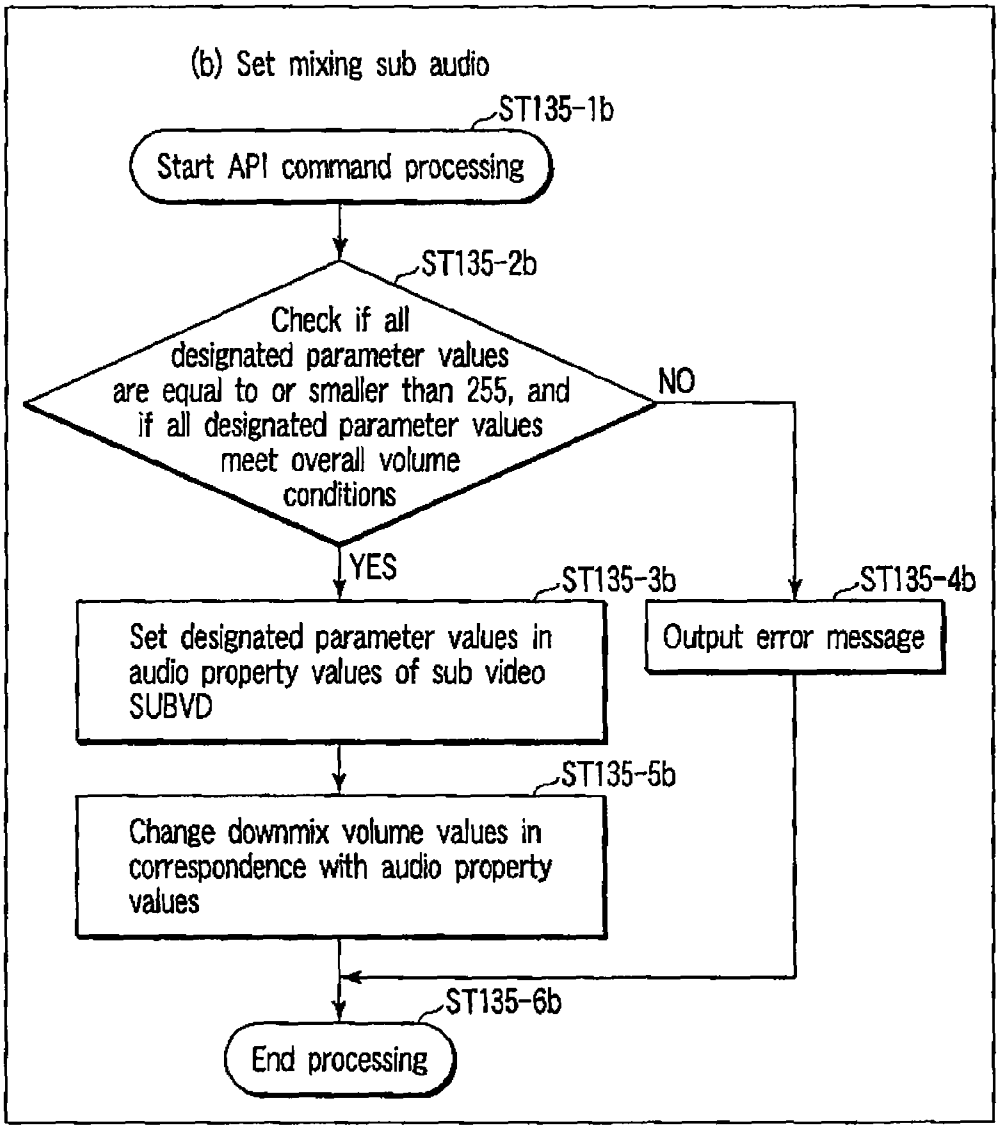
F I G. 135

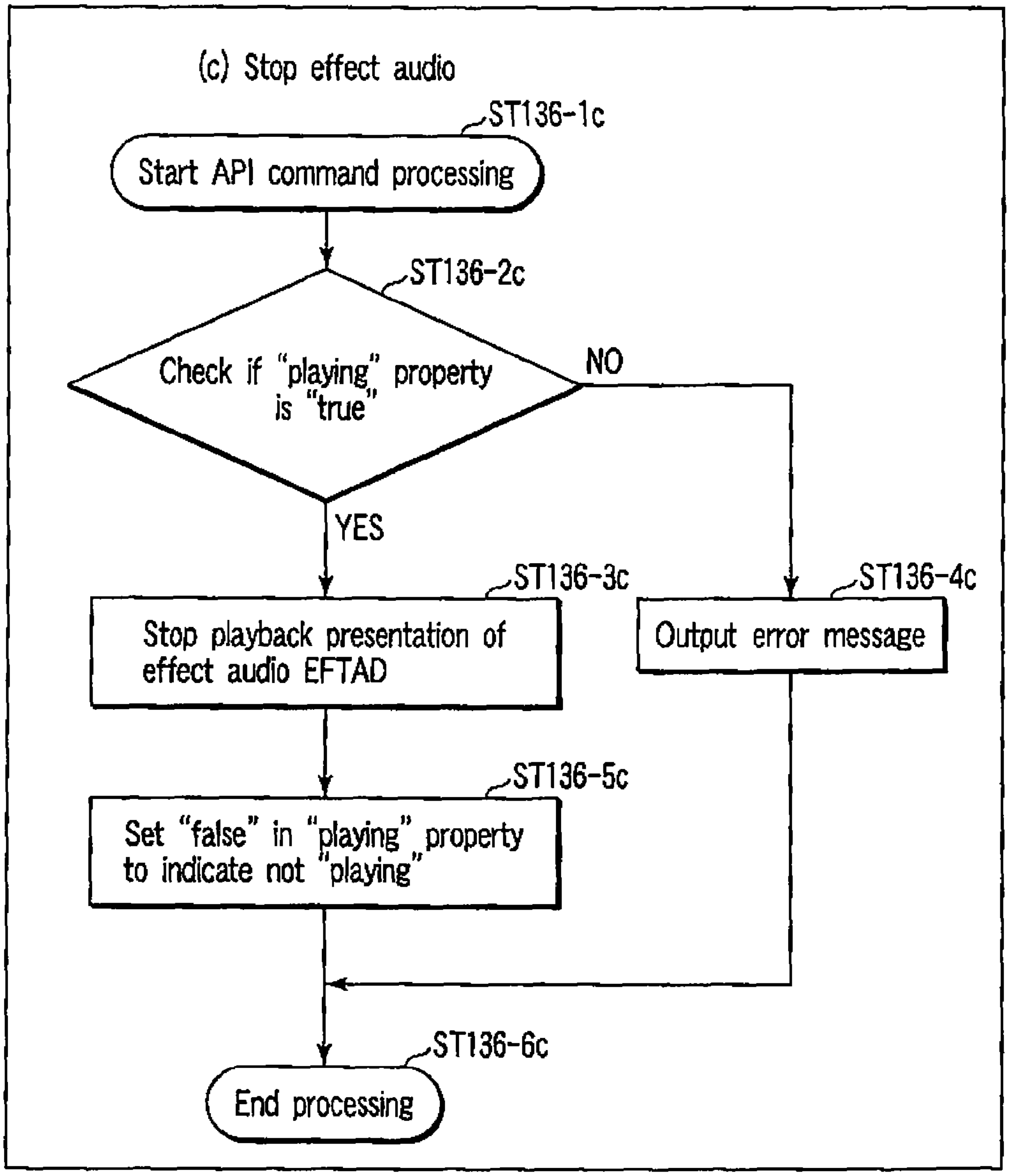
F I G. 136

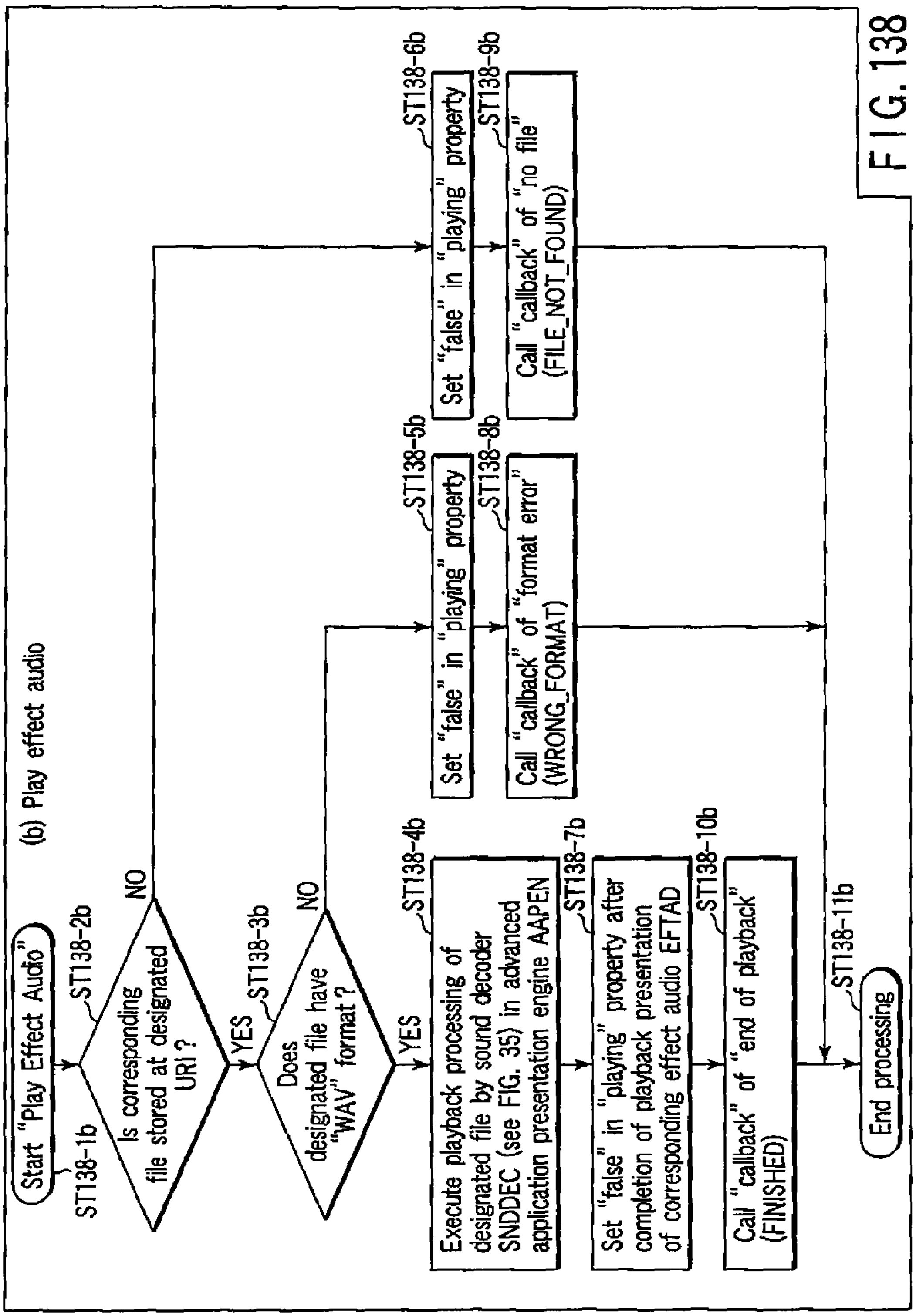
F I G. 138

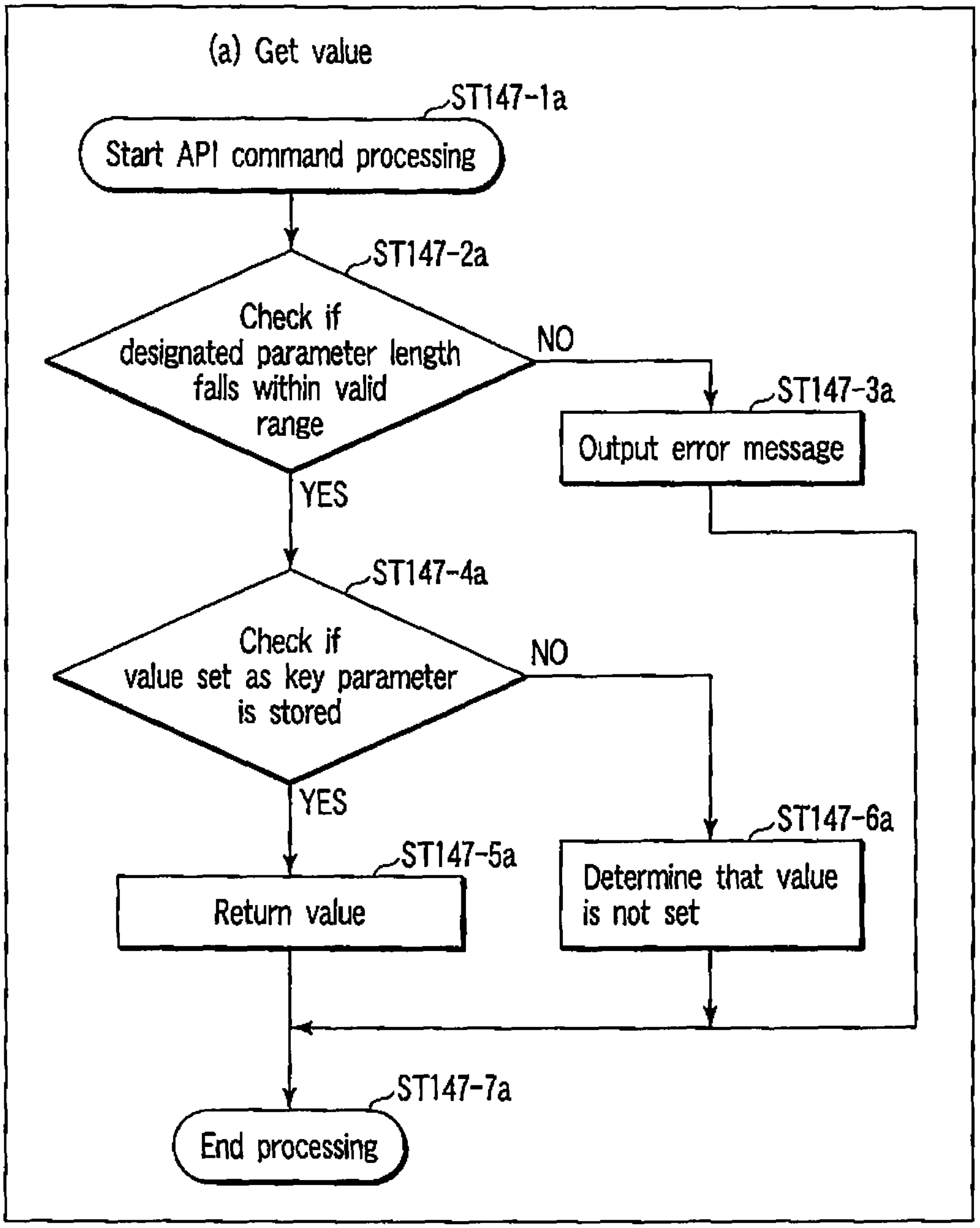
F I G. 147

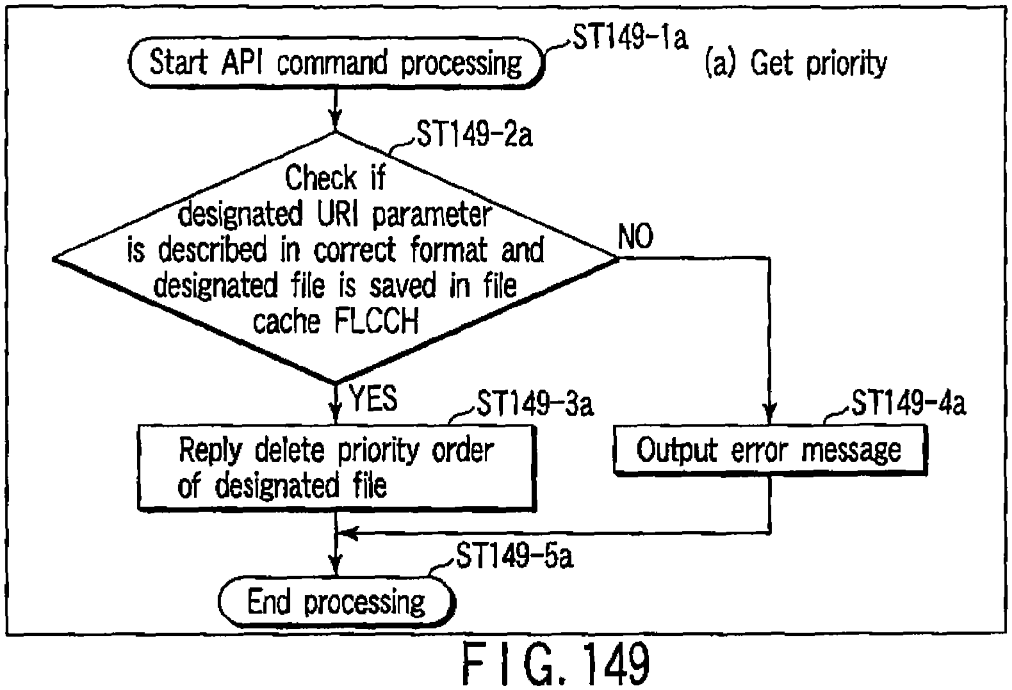
F I G. 149
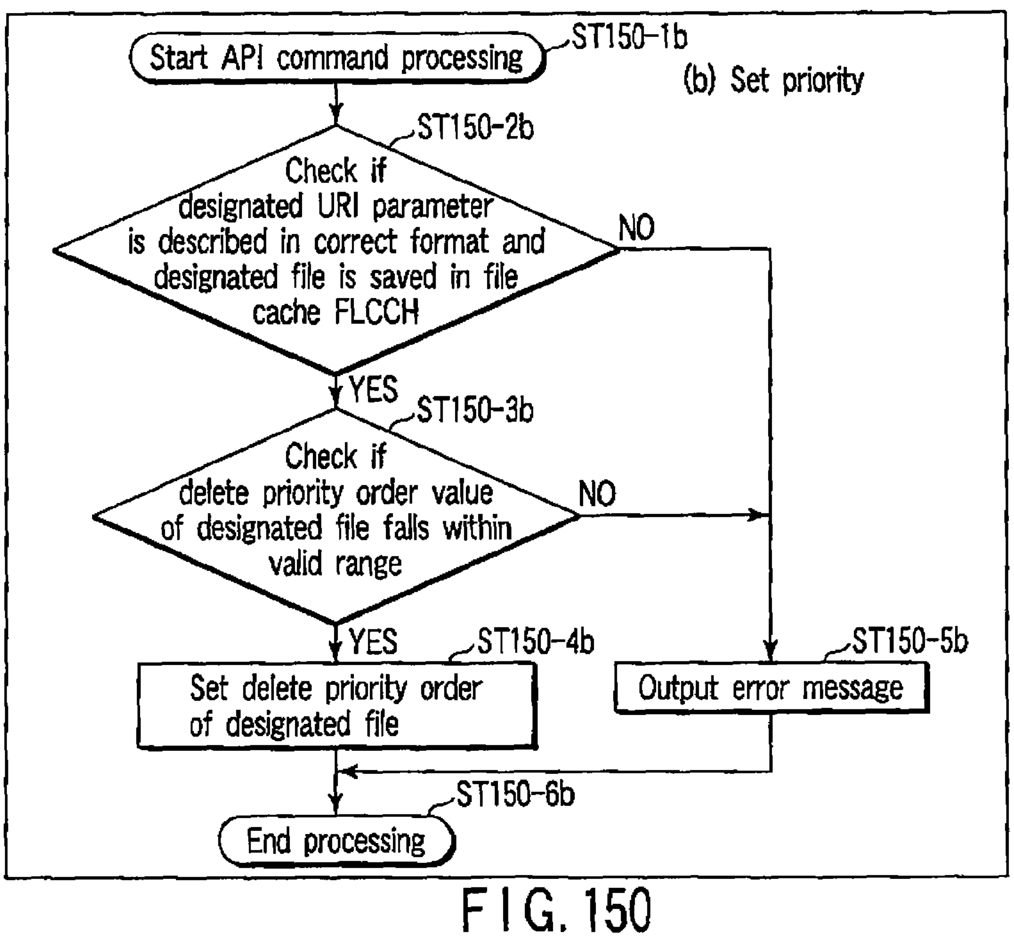
F I G. 150

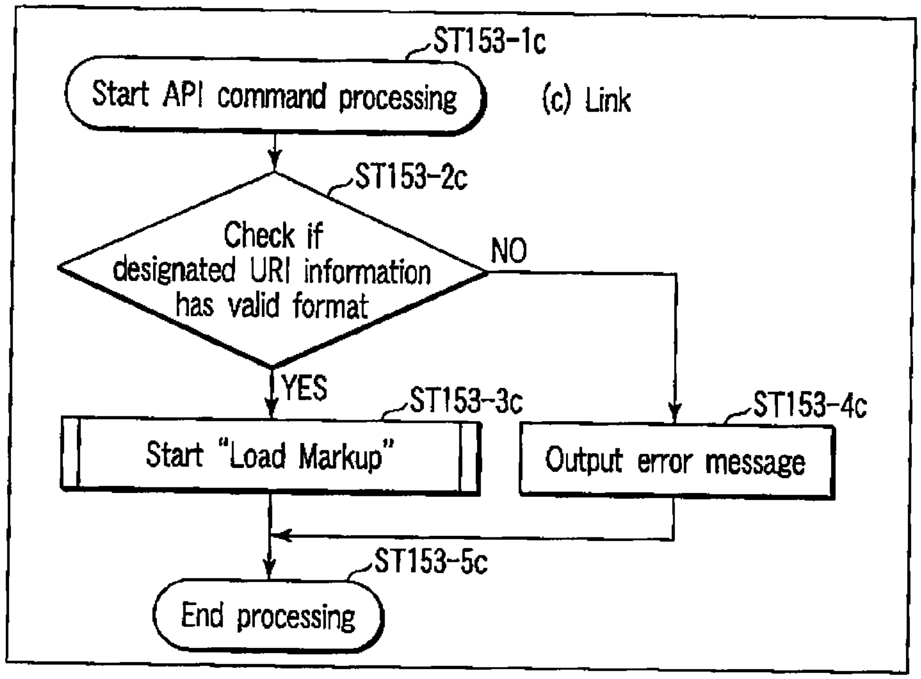
F I G. 153
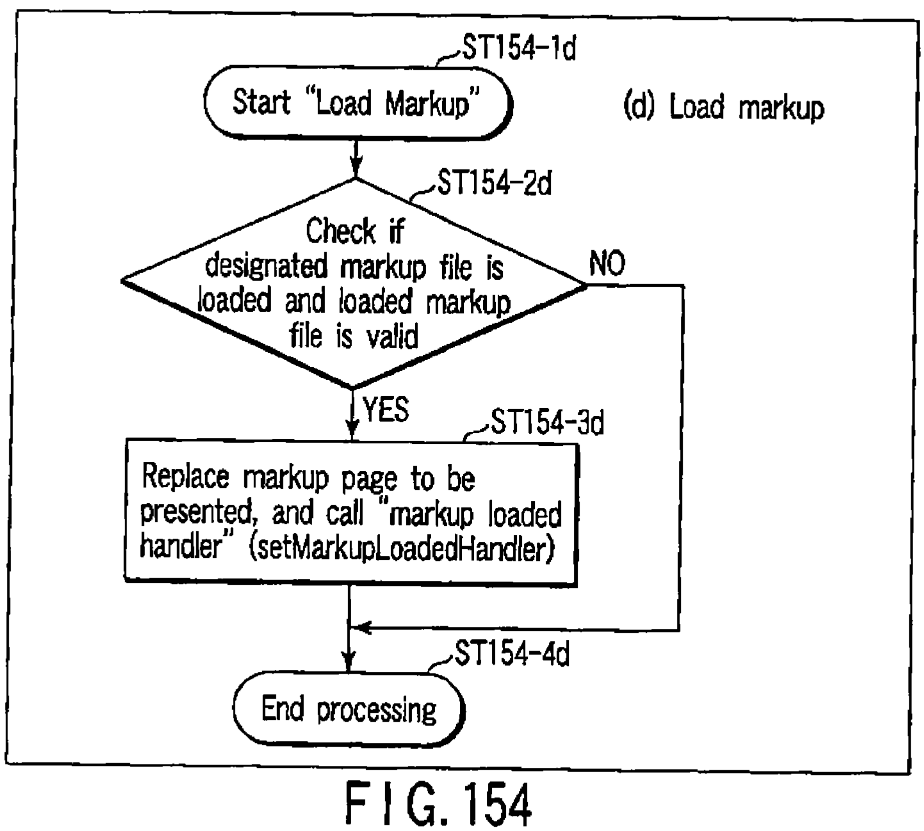
F I G. 154

| Playback presentation object type and application type | Broadly-defined resource information RESRCI | Clip element name |
|---|---|---|
| Hard-Synchronized playback presentation object | – | Substitute audio video clip SBAVCP<br>Secondary audio video clip SCAVCP<br>Substitute audio clip SBADCP |
| Soft-Synchronized playback presentation object | – | Substitute audio video clip SBAVCP<br>Substitute audio clip SBADCP |
| Non-Synchronized playback presentation object | – | Substitute audio video clip SBAVCP<br>Secondary audio video clip SCAVCP |
| Hard-Sync application | Application resource APRSRC<br>Title resource TTRSRC | – |
| Soft-Sync application | Application resource APRSRC<br>Title resource TTRSRC | – |

↑ (Broadly-defined resource information RESRCI column) Start playback presentation after pre-download into file cache FLCCH is completely finished ↑ (Clip element name column) Allow to start playback presentation only when pre-download is done in streaming buffer STRBUF

FIG. 165

INFORMATION PROCESSING REGARDING DIFFERENT TRANSFER

CROSS-REFERENCE TO RELATED APPLICATIONS

This application is a Divisional of U.S. Ser. No. 11/563,179 filed Nov. 25, 2006, now U.S. Pat. No. 8,208,788, which is a continuation of U.S. Ser. No. 11/549,353 filed Oct. 13, 2006, now abandoned, which is based upon and claims the benefit of priority from JP Application No. 2005-302319, filed Oct. 17, 2005. The entire contents of U.S. Ser. Nos. 11/563,179 and 11/549,353, and JP 2005-302319 are incorporated herein by reference in their entirely.

BACKGROUND

1. Field

One embodiment of the invention relates to an information playback system using information storage medium such as an optical disc.

2. Description of the Related Art

In recent years, DVD-Video discs having high image quality and advanced functions, and video players which play back these discs have prevailed, and peripheral devices and the like used to play back such multi-channel audio data have broader options. Accordingly, for content users, an environment for personally implementing a home theater that allows the users to freely enjoy movies, animations, and the like with high image quality and high sound quality has become available.

Further, utilizing a network to acquire image information from a server on the network and playing back/displaying the acquired information by a device on a user side have been readily carried out. For example, Japanese Patent No. 3673166 (FIGS. 2 to 5, FIGS. 11 to 14 and the like) discloses supplying information to a device of a user who wants to accept advertisement through a web site in the Internet and displaying information in the device of the user.

However, current web sites on the Internet are mostly "static screens" as described in the reference. Even if animation or some moving pictures can be displayed in web sites, it is difficult to realize a variety of expressions in which timings of display start/display end of the animation or moving picture or a switching timing of the moving picture/animation are intricately programmed.

Furthermore, even if a moving picture can be expressed on a web site, it is often the case that the moving picture to be displayed is interrupted (playback is stopped) in midstream depending on an network environment (a network throughput value) of a user.

SUMMARY

An information reproducing apparatus for playing back an information storage medium that stores a first representation object and a second representation object according to a title, and that stores a third representation object, includes: a reading unit configured to read the first representation object for displaying a main video and the second representation object for displaying a sub video from the information storage medium, and to read the third representation object for displaying an icon from a memory; and a reproducing unit configured to reproduce the first representation object based on a first playback display range on a title timeline according to the title, to reproduce the second representation object based on a second playback display range on the title timeline, and to reproduce the third representation object based on a third playback display range including the first playback display range and the second playback display range on the title timeline, and to reproduce the main video and the sub video based on reproducing control via the icon.

An information reproducing method of playing back an information storage medium that stores a first representation object and a second representation object according to a title, and that stores a third representation object, includes: reading the first representation object for displaying a main video and the second representation object for displaying a sub video from the information storage medium, and reading the third representation object for displaying an icon from a memory; and reproducing the first representation object based on a first playback display range on a title timeline according to the title, reproducing the second representation object based on a second playback display range on the title timeline, and reproducing the third representation object based on a third playback display range including the first playback display range and the second playback display range on the title timeline, and reproducing the main video and the sub video based on reproducing control via the icon.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIGS. 2A, 2B, and 2C are exemplary tables showing the needs from users and the like for the existing DVD-Video standards and problems posed when the related existing DVD-Video standards are extended, and solutions of the embodiment of the invention and new effects as a result of the solutions of the embodiment of the invention;

FIG. 6 is an exemplary diagram showing transitions upon playback of the advanced content and upon playback of the standard content;

FIG. 7 is an exemplary flowchart showing a medium identification processing method by an information playback apparatus when an information storage medium is mounted;

FIG. 10 is an exemplary view for explaining the relationship among various objects;

FIGS. 13A and 13B are exemplary views for explaining technical features and effects concerning the structure shown in FIG. 12;

FIG. 16 shows an exemplary presentation window at point α when a main title, another window for a commercial, and a help icon are simultaneously presented in (c) of FIG. 15B;

FIG. 17 is an exemplary view showing an overview of information in a playlist;

FIG. 18 is an exemplary view showing the relationship between various presentation clip elements and corresponding object names of objects to be presented and used;

FIG. 19 is an exemplary view showing a method of designating a file storage location;

FIG. 20 is an exemplary view showing a path designation description method to a file;

FIG. 21 is an exemplary view showing the data structure in a playlist file;

FIG. 22 is an exemplary view showing details contents of respective pieces of attribute information in an XML tag and playlist tag;

FIGS. 23A and 23B are exemplary views showing details of title information in a playlist;

FIGS. 24A and 24B are exemplary views showing details of title attribute information, object mapping information, and playback information;

FIG. 45 is an exemplary view showing a list of user input events;

FIG. 46 is an exemplary view showing a list of player parameters;

FIG. 47 is an exemplary view showing a list of profile parameters;

FIG. 48 is an exemplary view showing a list of presentation parameters;

FIG. 49 is an exemplary view showing a list of layout parameters;

FIGS. 54A and 54B are exemplary views showing data structures in a primary audio video clip element tag and a secondary video clip element tag;

FIGS. 55A and 55B are exemplary views showing data structures in a substitute audio video clip element tag and a substitute audio clip element tag;

FIGS. 56A and 56B are exemplary views showing data structures in an advanced subtitle segment element tag and an application element tag;

FIGS. 59A, 59B and 59C are exemplary views showing data structures in a video element, an audio element, a subtitle element and an sub audio element;

FIG. 60 is an exemplary view showing a relationship between a track type and a track number assign element;

FIGS. 61A, 61B and 61C are exemplary views showing description examples of track number assign information;

FIGS. 62A, 62B and 62C are exemplary views showing information contents written in each element in track navigation information and description examples;

FIGS. 63A, 63B and 63C are exemplary views showing data structures in an application resource element and a network source element;

FIGS. 64A and 64B are exemplary views showing transition of data storage states in a file cache in a resource management model;

FIGS. 66A, 66B and 66C are exemplary views showing a data structure in resource information;

FIGS. 69A and 69B are exemplary views showing a data structure in a playlist application element;

FIG. 71 is an exemplary explanatory view of a structure depicted in FIG. 70;

FIGS. 73A and 73B are exemplary views showing a relationship between a first play title and a playlist application resource;

FIGS. 74A and 74B are exemplary views showing a data structure in a first play title element;

FIGS. 75A and 75B are exemplary views showing a data structure in a scheduled control information;

FIGS. 76A and 76B are exemplary views showing use examples of an event element;

FIGS. 77A and 77B are exemplary views showing a use example of an event element;

FIGS. 79A and 79B are exemplary views showing a data structure in media attribute information;

FIG. 82 is an exemplary explanatory view about an element having ID information in a playlist;

FIG. 89 is a diagram to help explain the data structure of a secondary enhanced video object according to the embodiment;

FIG. 90 is a diagram to help explain the data structure of an element (xml descriptive sentence) according to the embodiment;

FIGS. 91A and 91B are a diagram to help explain the data structure of a markup descriptive sentence according to the embodiment;

FIG. 93 is a diagram to help explain attribute information used in a content element according to the embodiment;

FIG. 94 is a diagram to help explain attribute information used in each element belonging to a timing vocabulary according to the embodiment;

FIGS. 95A and 95B a diagram to help explain various types of attribute information defined as options in a style name space according to the embodiment;

FIGS. 96A and 96B are a diagram to help explain various types of attribute information defined as options in the style name space according to the embodiment;

FIGS. 97A and 97B are a diagram to help explain various types of attribute information defined as options in the style name space according to the embodiment;

FIG. 98 is a diagram to help explain various types of attribute information defined as options in a state name space according to the embodiment;

FIG. 99 is a diagram to help explain attribute information and content information in the content element of FIG. 91;

FIG. 100 is a diagram to help explain attribute information and content information in each element belonging to the timing vocabulary of FIG. 91;

FIGS. 101A and 101B are a diagram to help explain how to use and how to describe select attribute information shown in FIGS. 100 and 94;

FIGS. 102A and 102B are a diagram to help explain another describing method of FIG. 92 when select information shown in FIGS. 101A and 101B are used;

FIGS. 103A and 103B show a list describing various system events in the embodiment;

FIGS. 106A and 106B are explanatory view No. 1 of various API commands according to the embodiment;

FIGS. 107A and 107B are explanatory view No. 2 of various API commands according to the embodiment;

FIGS. 108A and 108B are explanatory view No. 3 of various API commands according to the embodiment;

FIGS. 109A and 109B are explanatory view No. 4 of various API commands according to the embodiment;

FIGS. 110A and 110B are explanatory view No. 5 of various API commands according to the embodiment;

FIG. 119 is flowchart No. 9 showing the function contents in API commands according to the embodiment;

FIG. 120 is flowchart No. 10 showing the function contents in API commands according to the embodiment;

FIG. 121 is flowchart No. 11 showing the function contents in API commands according to the embodiment;

FIG. 122 is flowchart No. 12 showing the function contents in API commands according to the embodiment;

FIG. 123 is flowchart No. 13 showing the function contents in API commands according to the embodiment;

FIG. 124 is flowchart No. 14 showing the function contents in API commands according to the embodiment;

FIG. 125 is flowchart No. 15 showing the function contents in API commands according to the embodiment;

FIG. 126 is flowchart No. 16 showing the function contents in API commands according to the embodiment;

FIG. 127 is flowchart No. 17 showing the function contents in API commands according to the embodiment;

FIG. 128 is flowchart No. 18 showing the function contents in API commands according to the embodiment;

FIG. 129 is flowchart No. 19 showing the function contents in API commands according to the embodiment;

FIG. 130 is flowchart No. 20 showing the function contents in API commands according to the embodiment;

Figure 131:
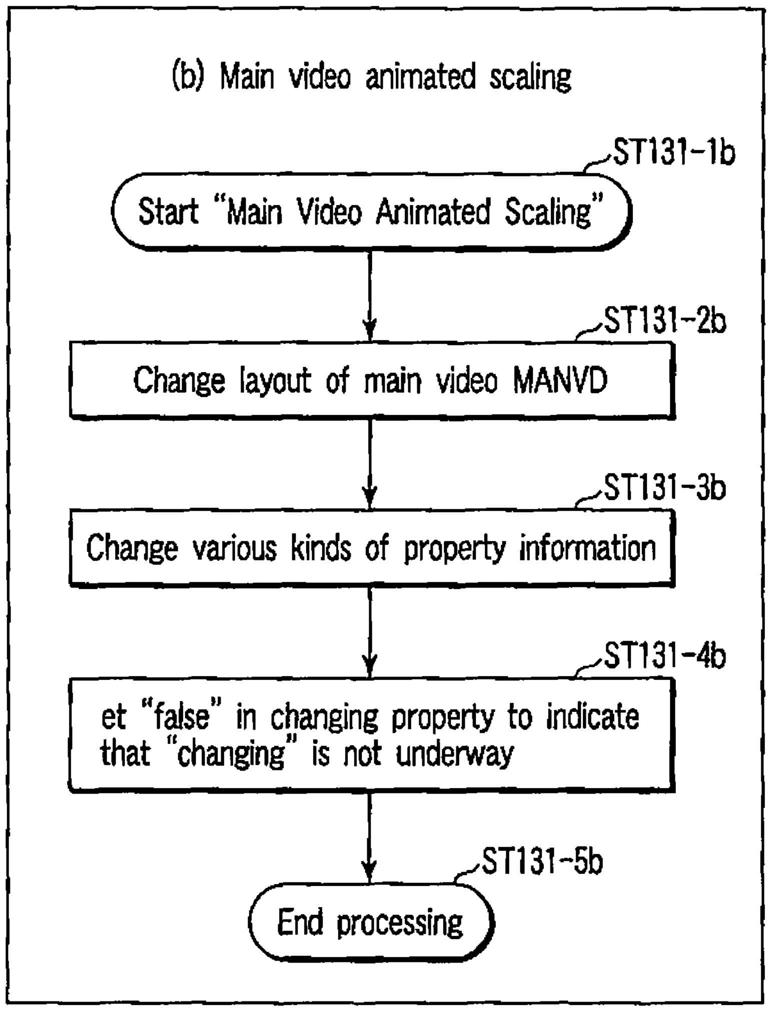
Figure 132:
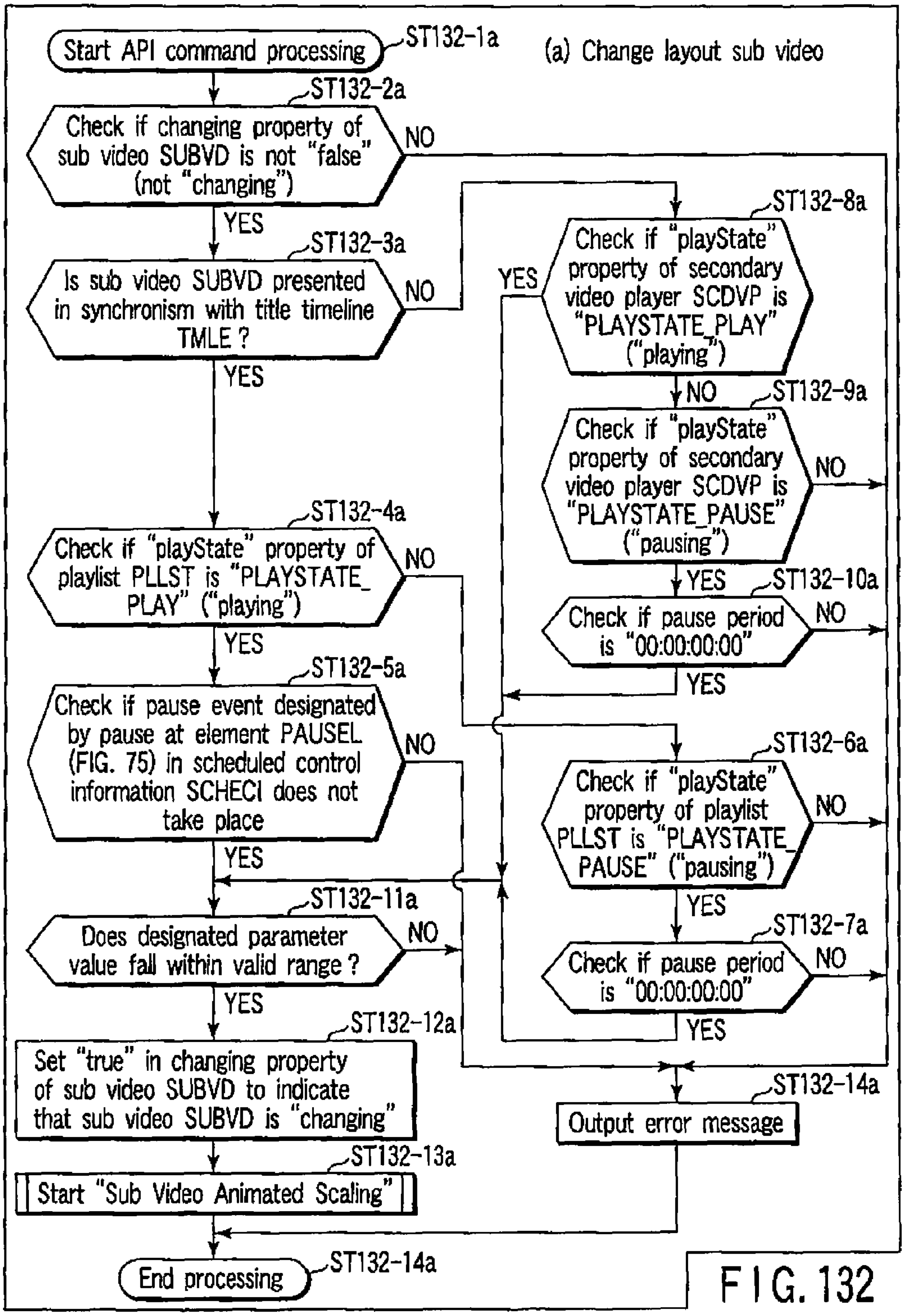
Figure 133:
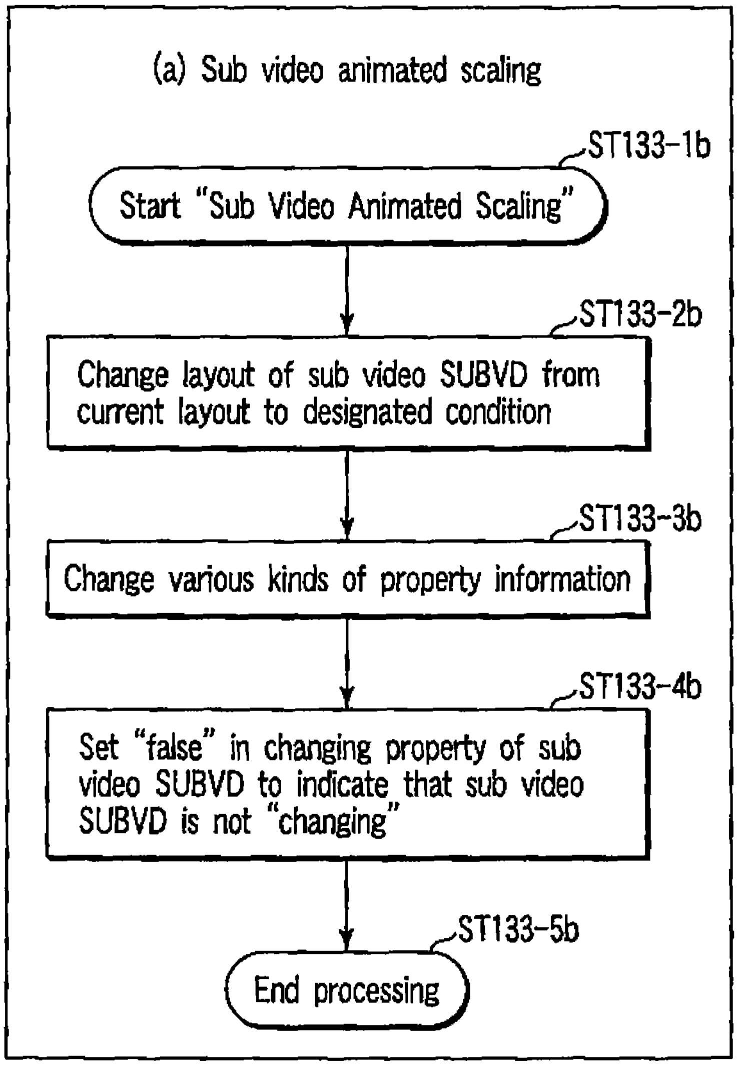
Figure 134:
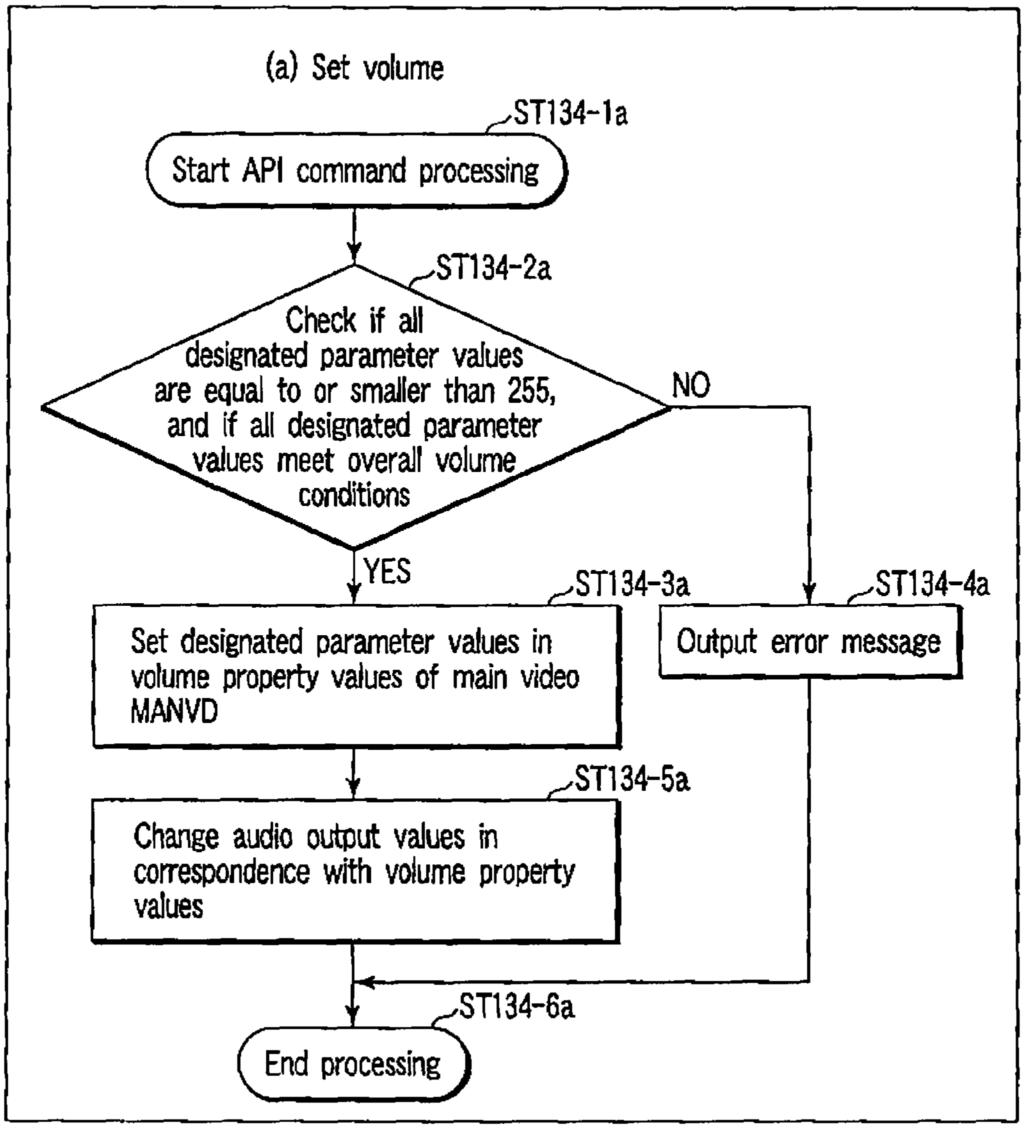
Figure 137:
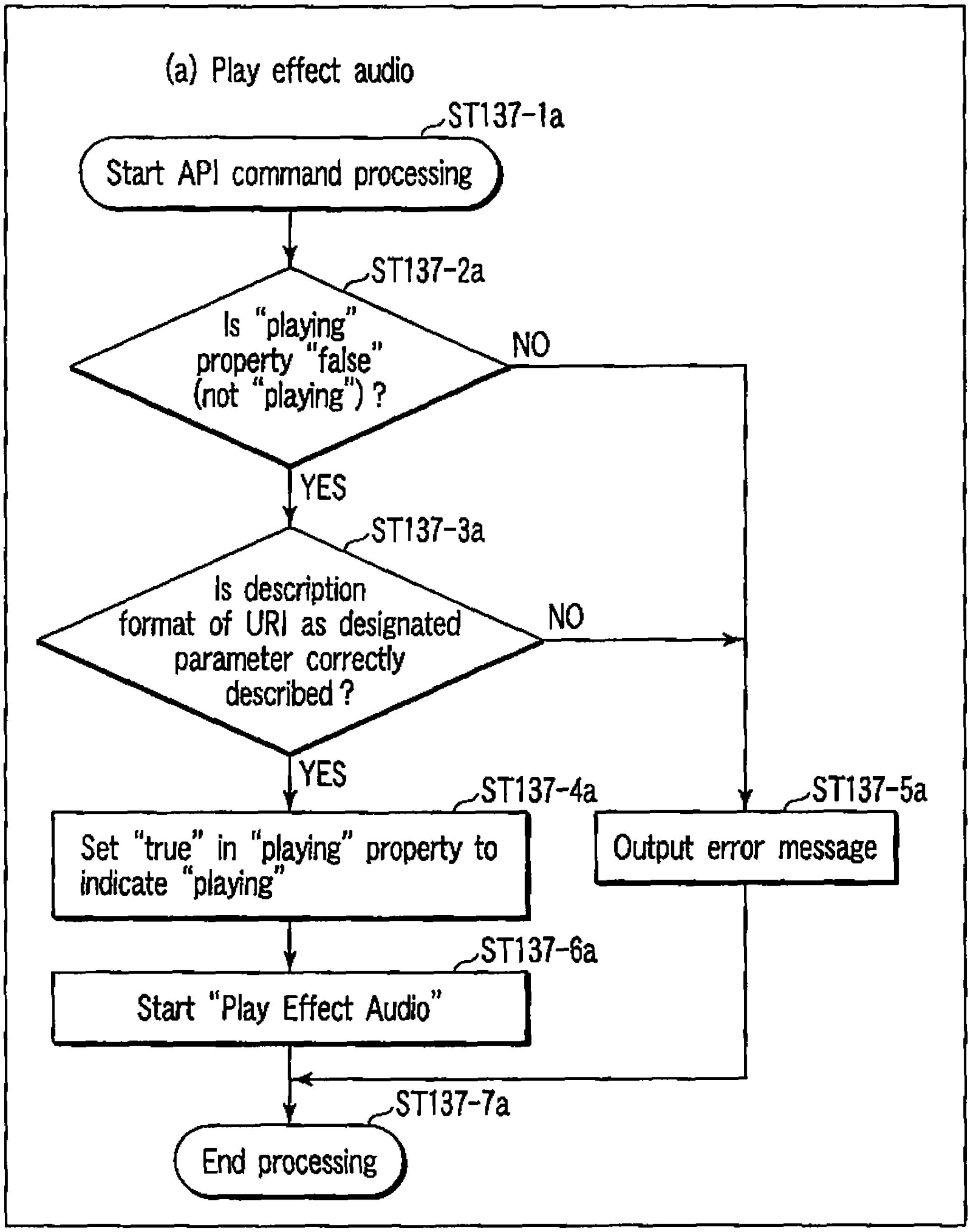
Figure 139:
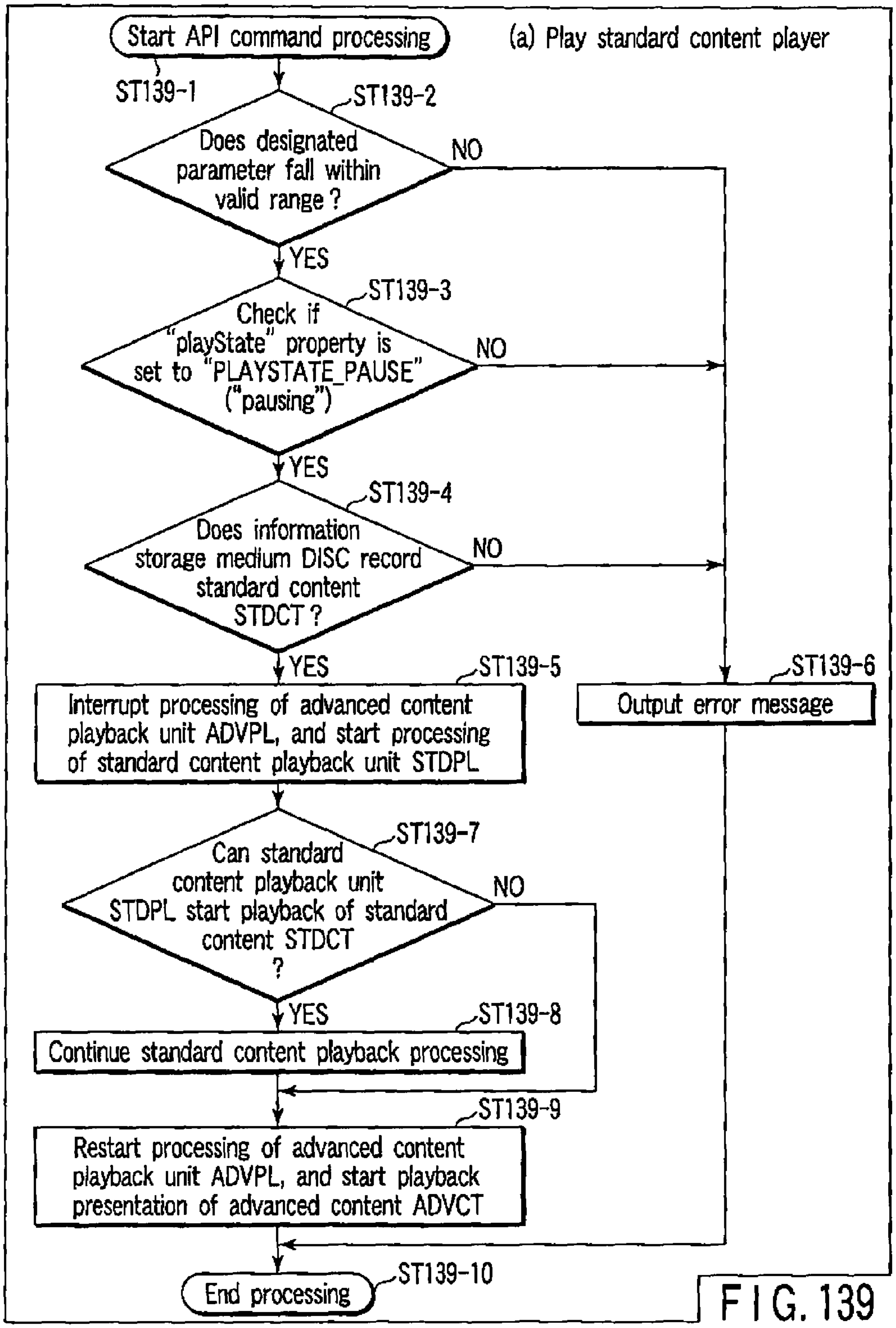
Figure 140:
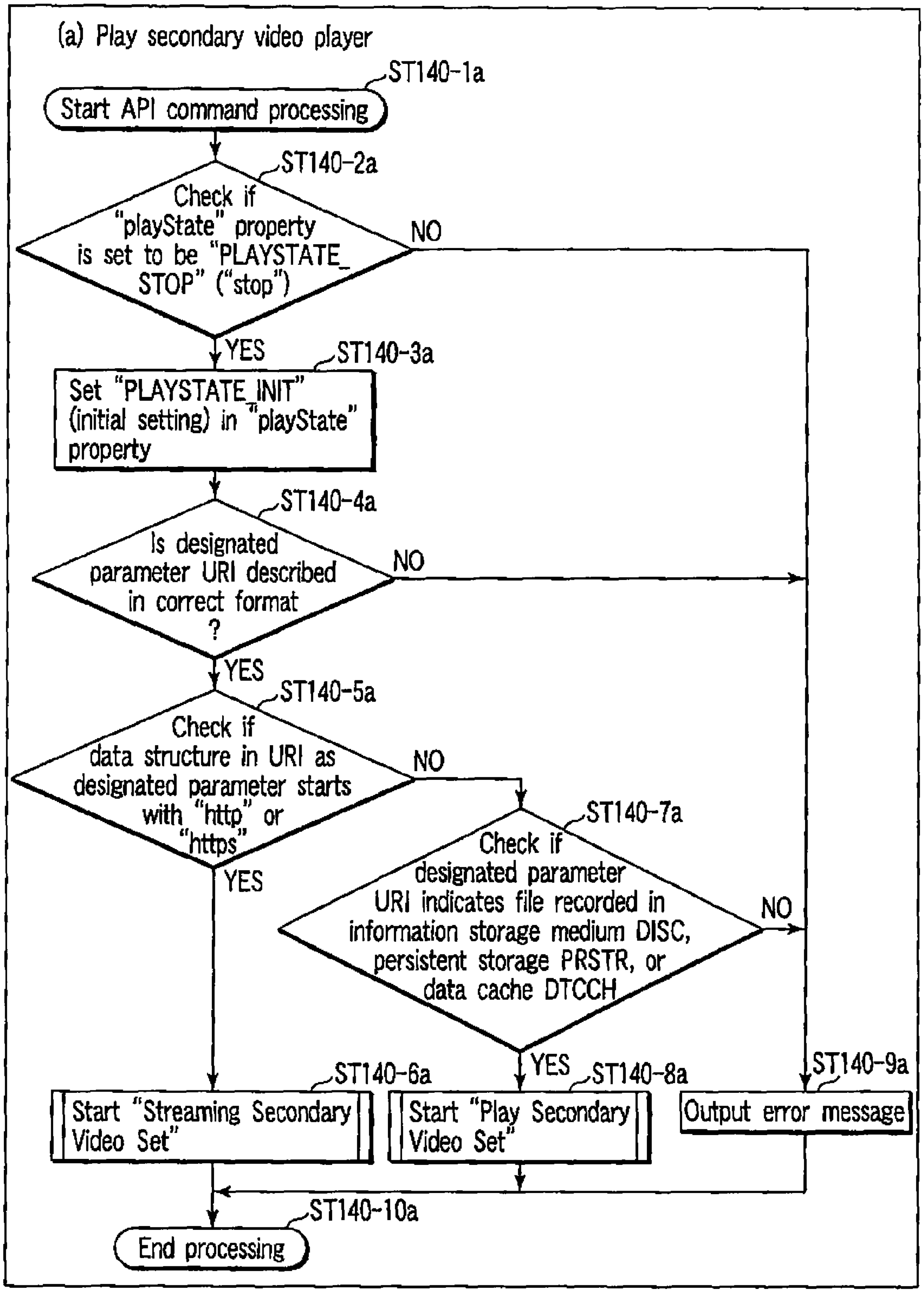
Figure 141:
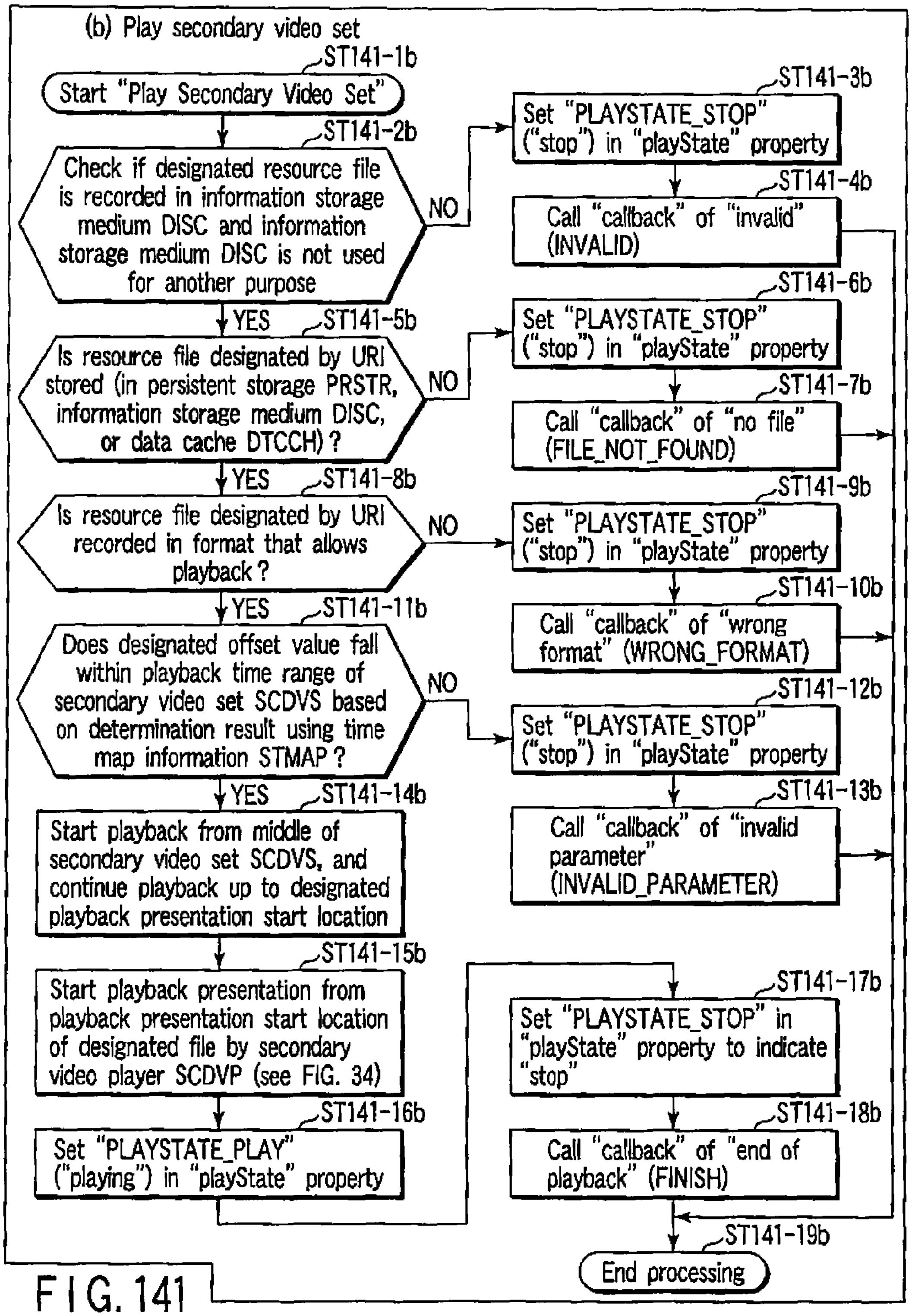
Figure 142:
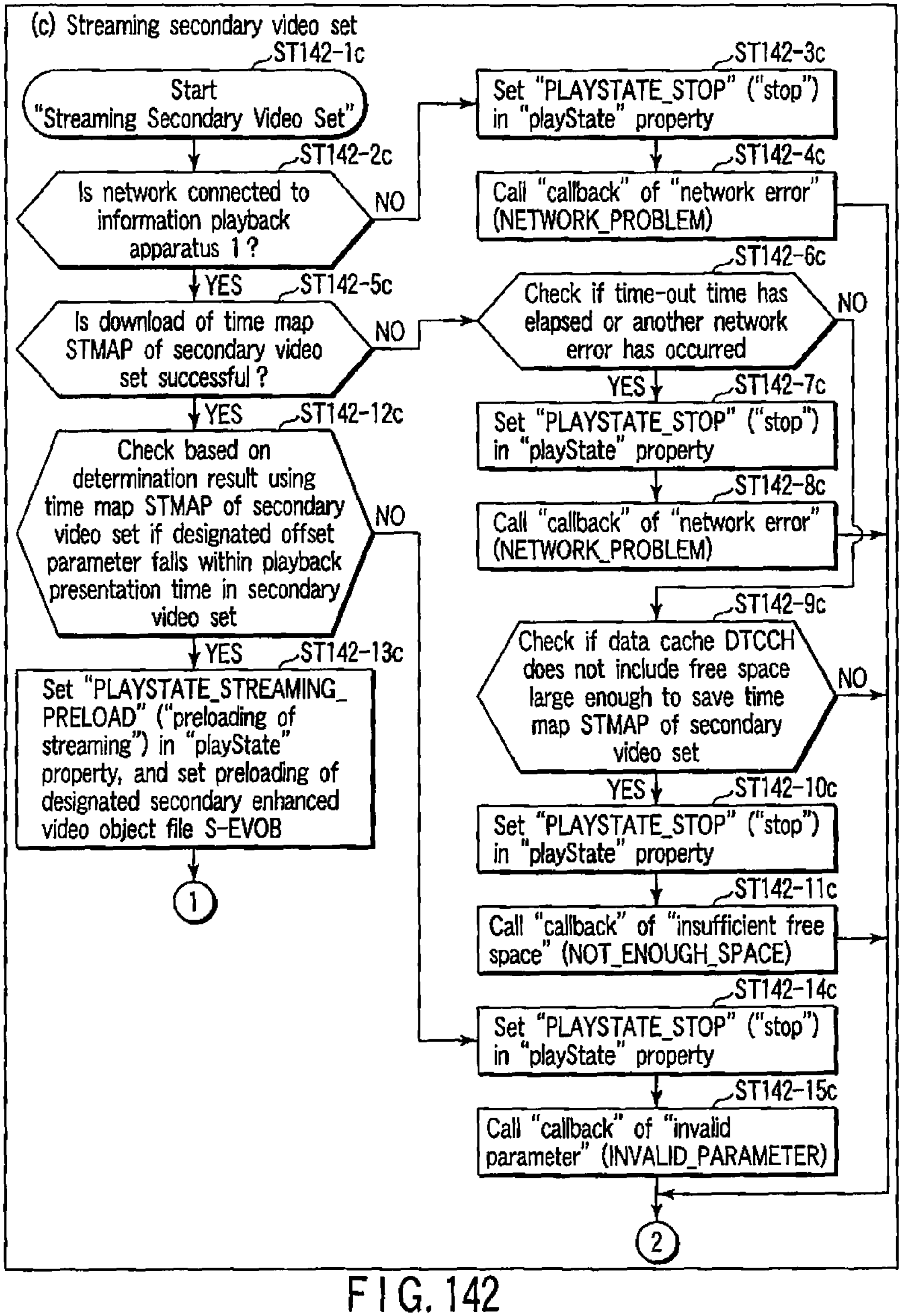
Figure 143:
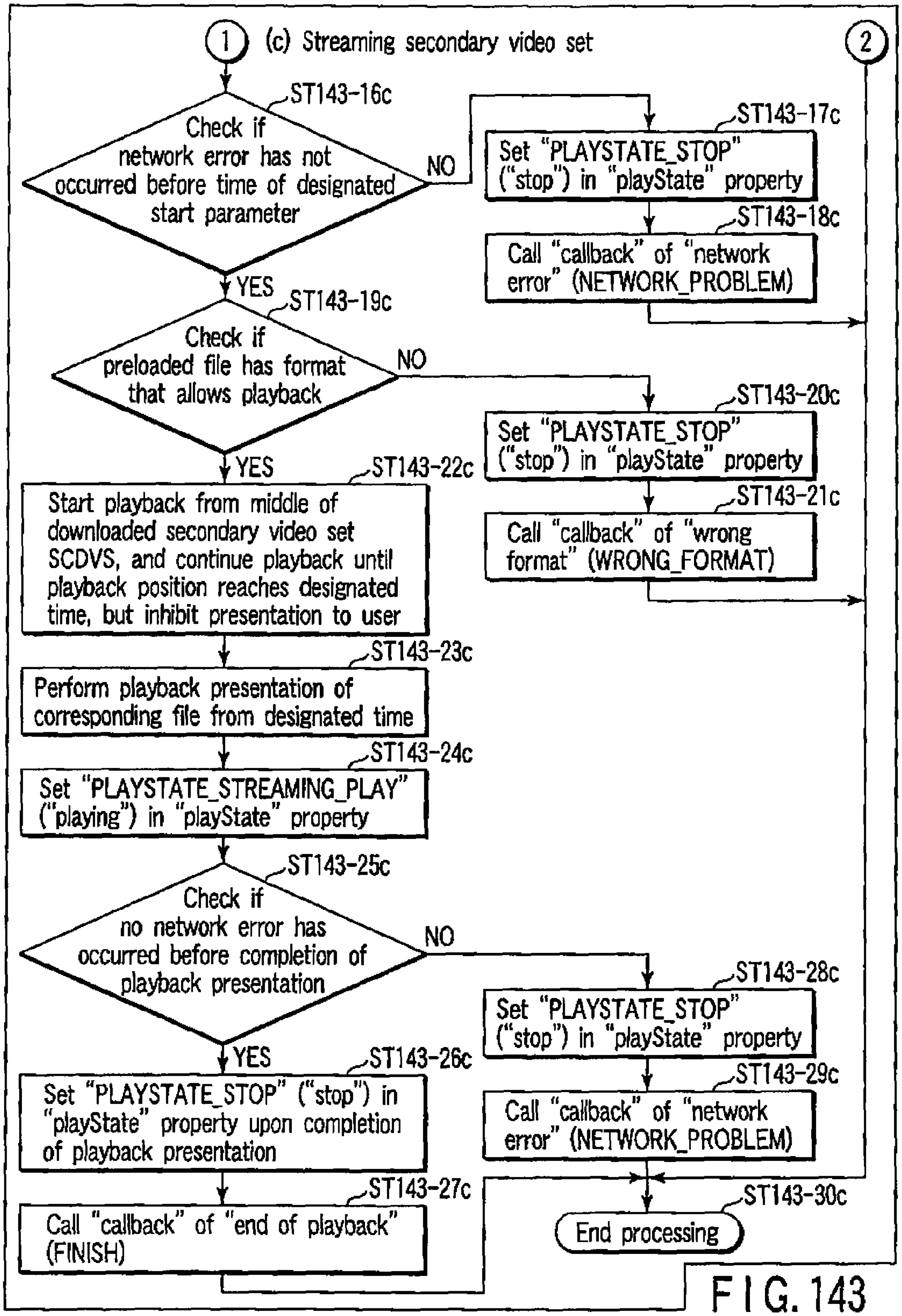
Figure 144:
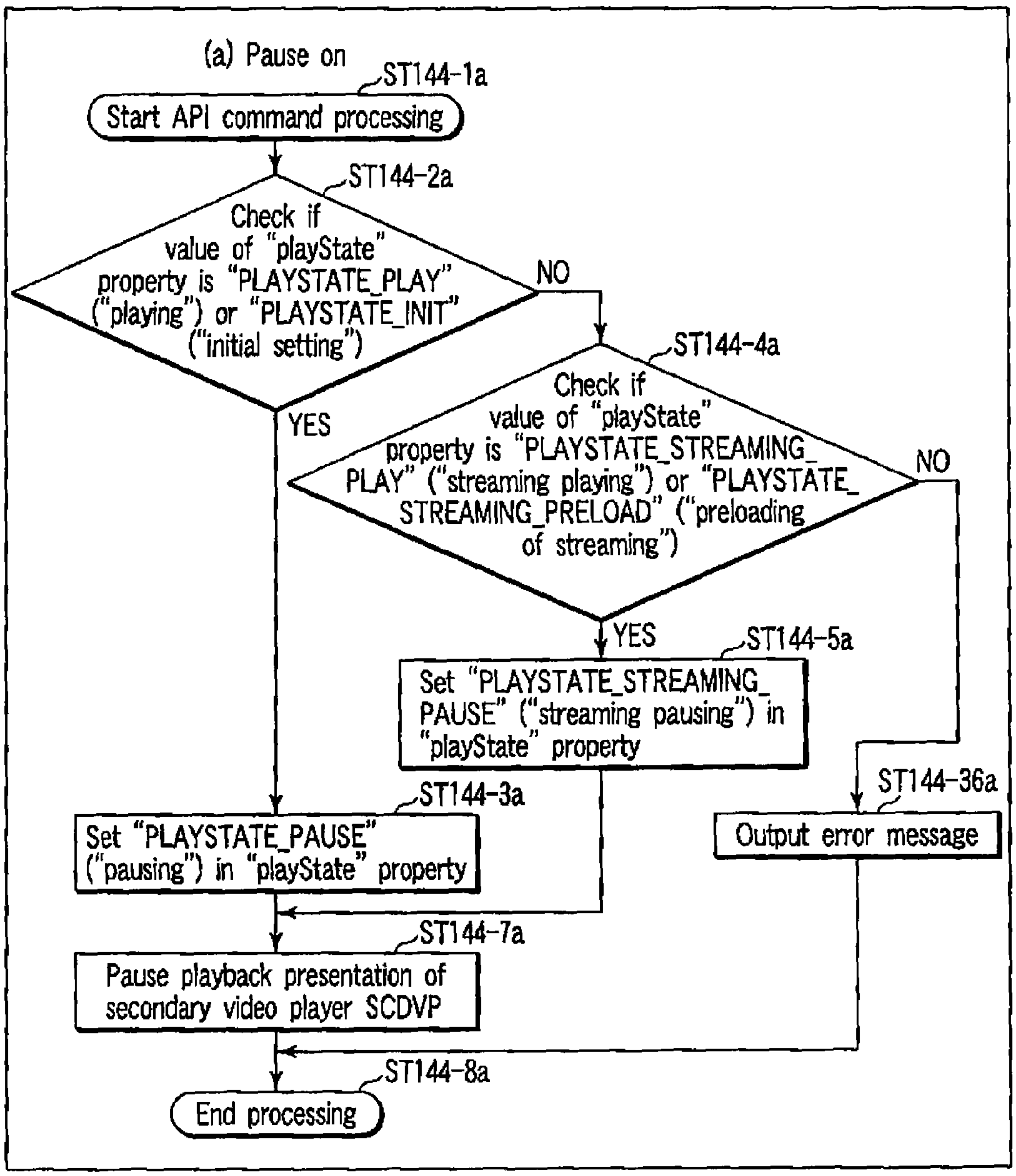
Figure 145:
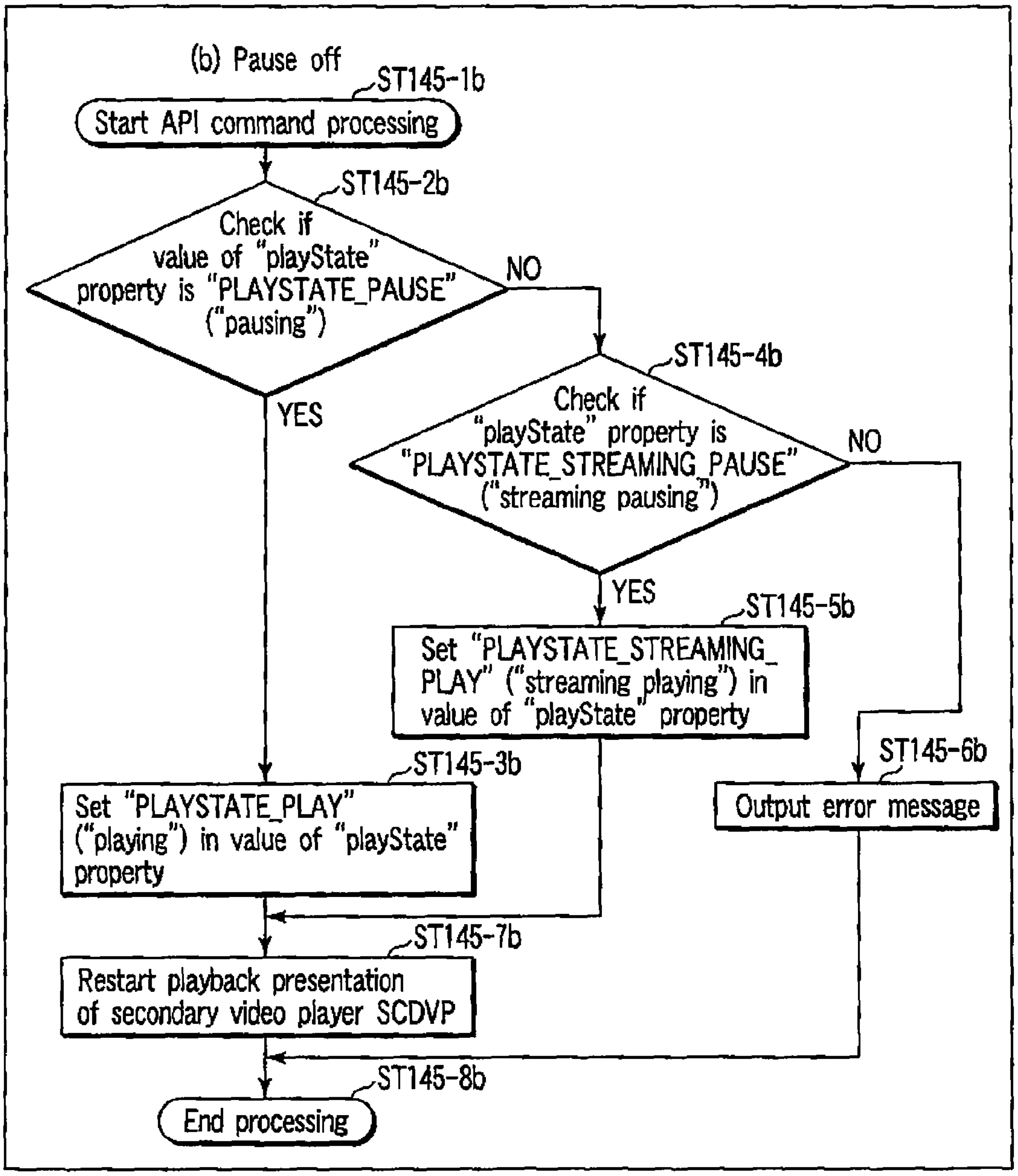
Figure 146:
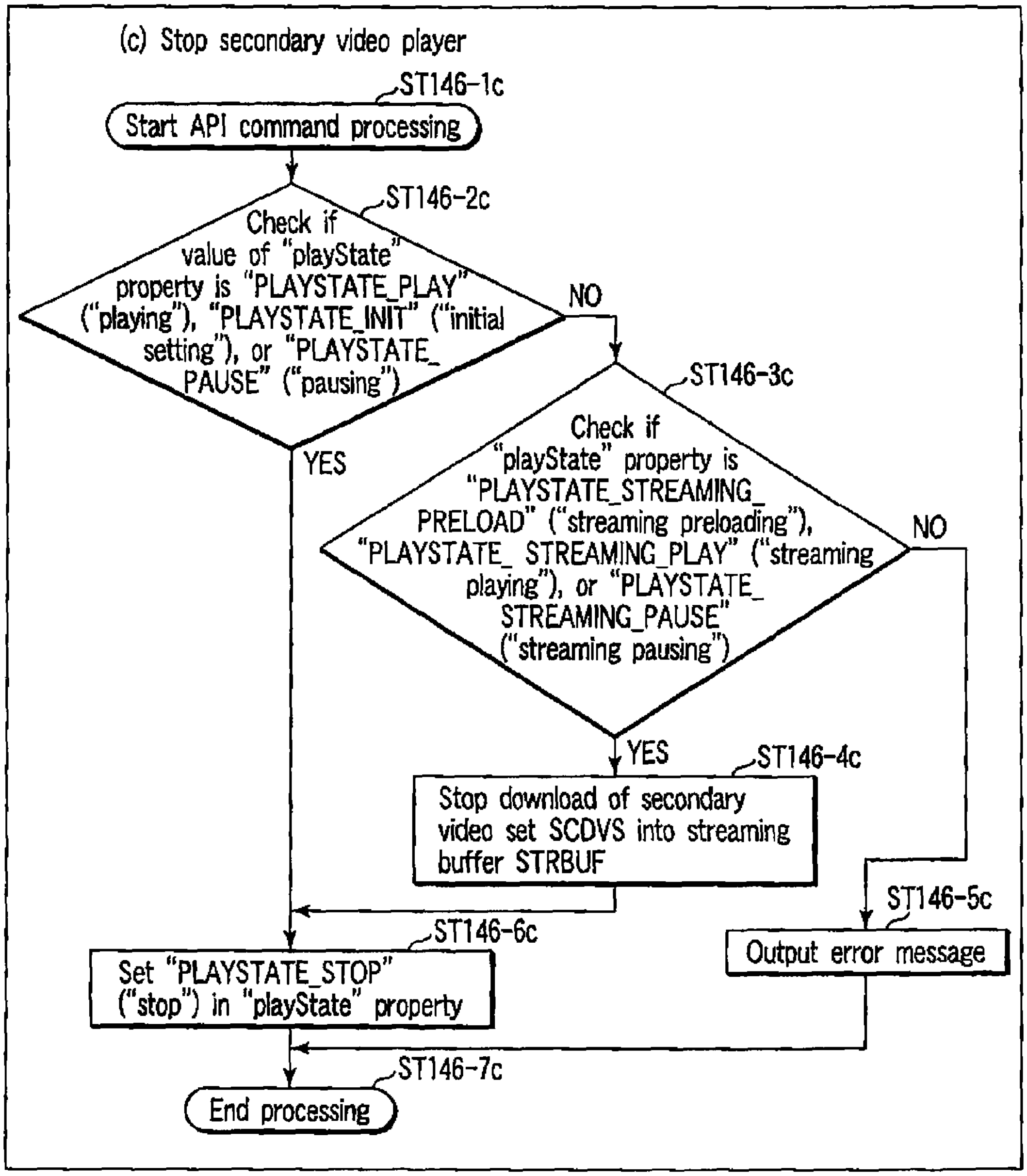
Figure 148:
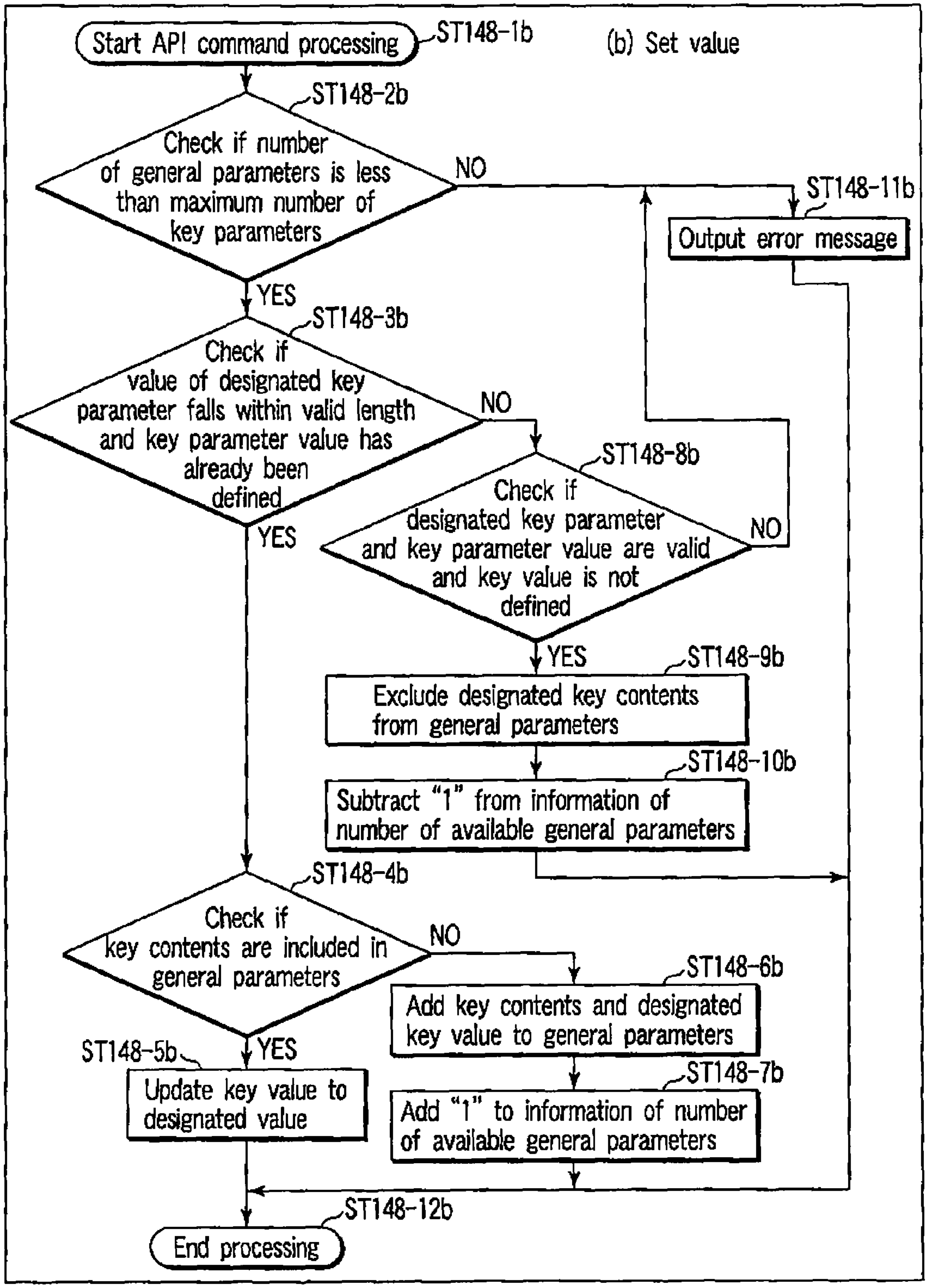
Figure 151:
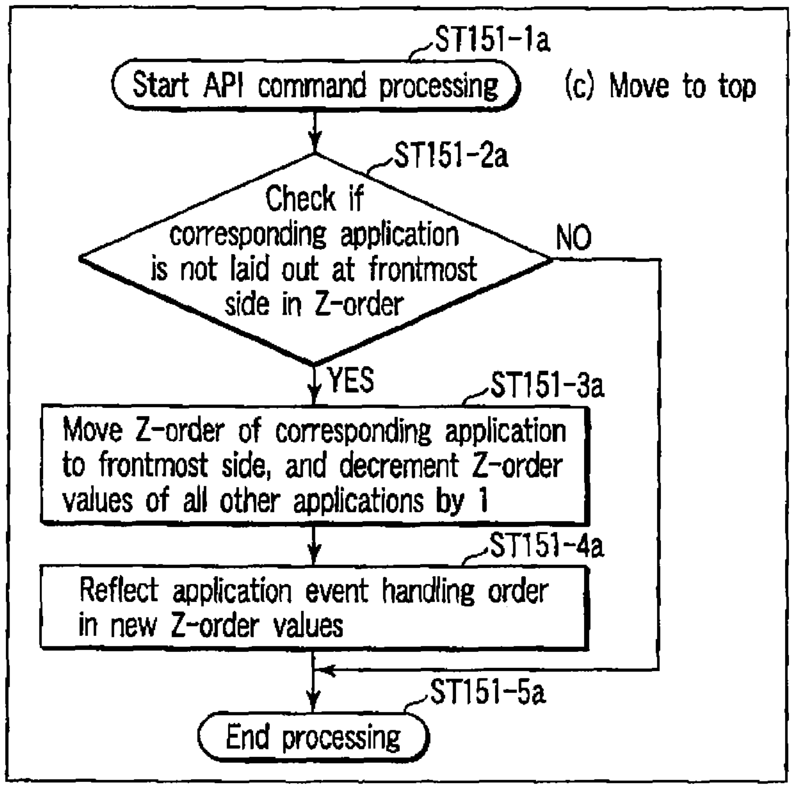
Figure 152:
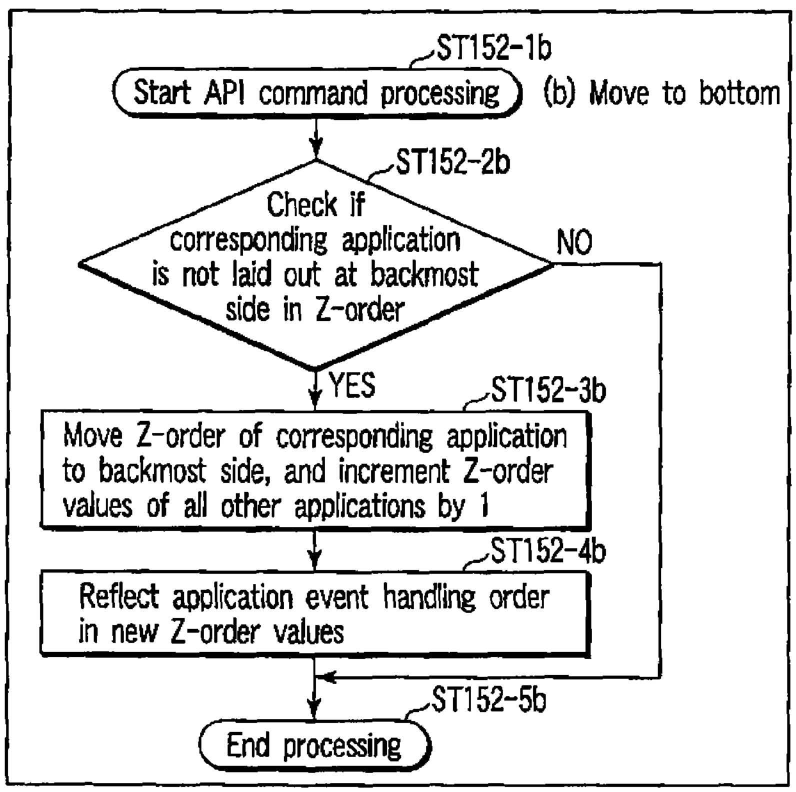
Figure 155:
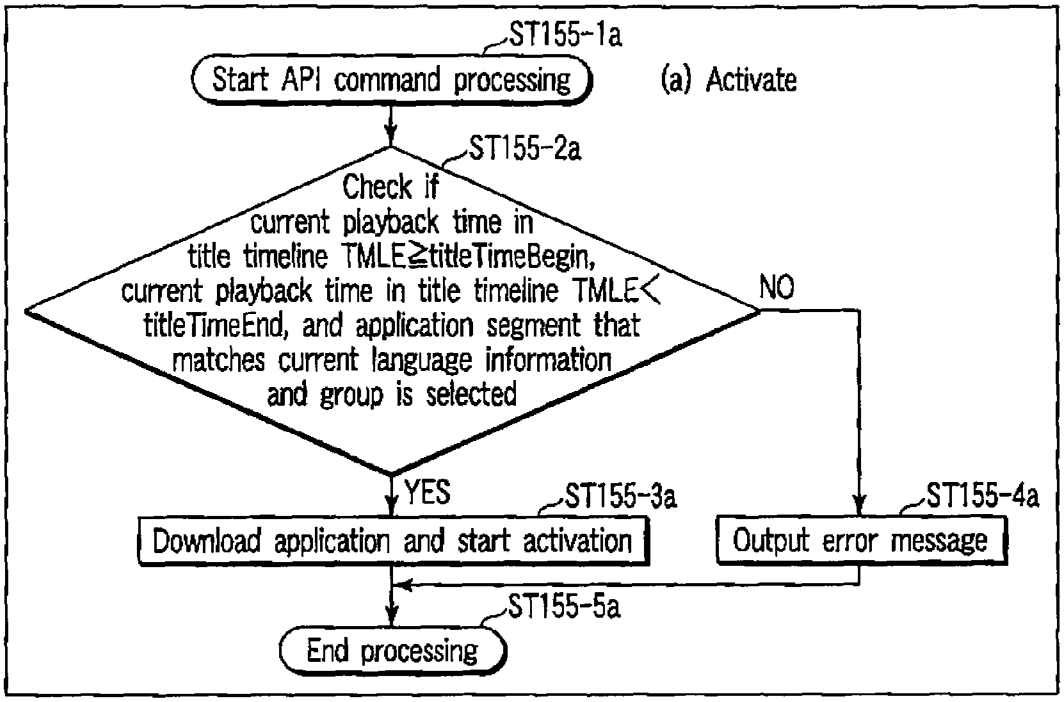
Figure 156:
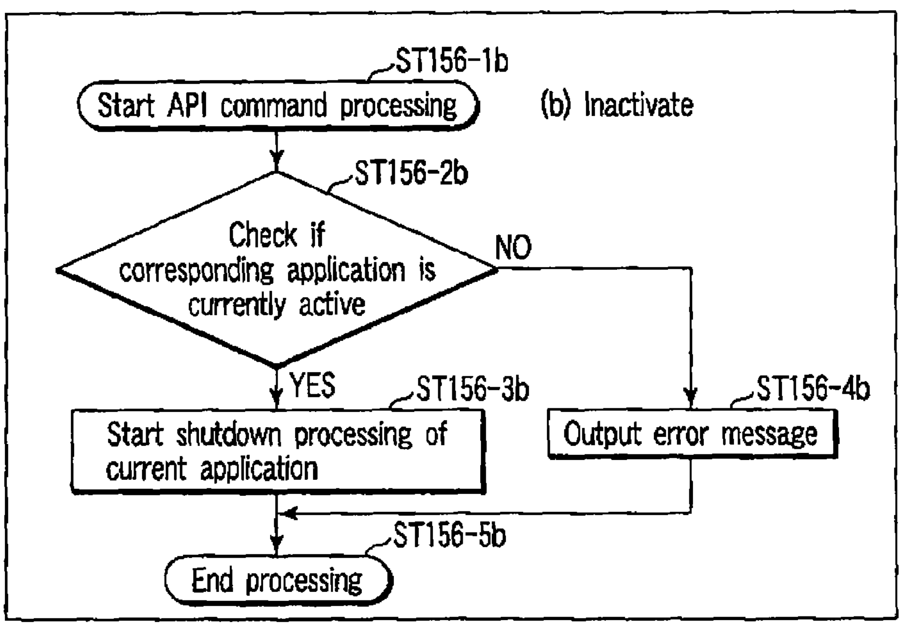
Figure 157:
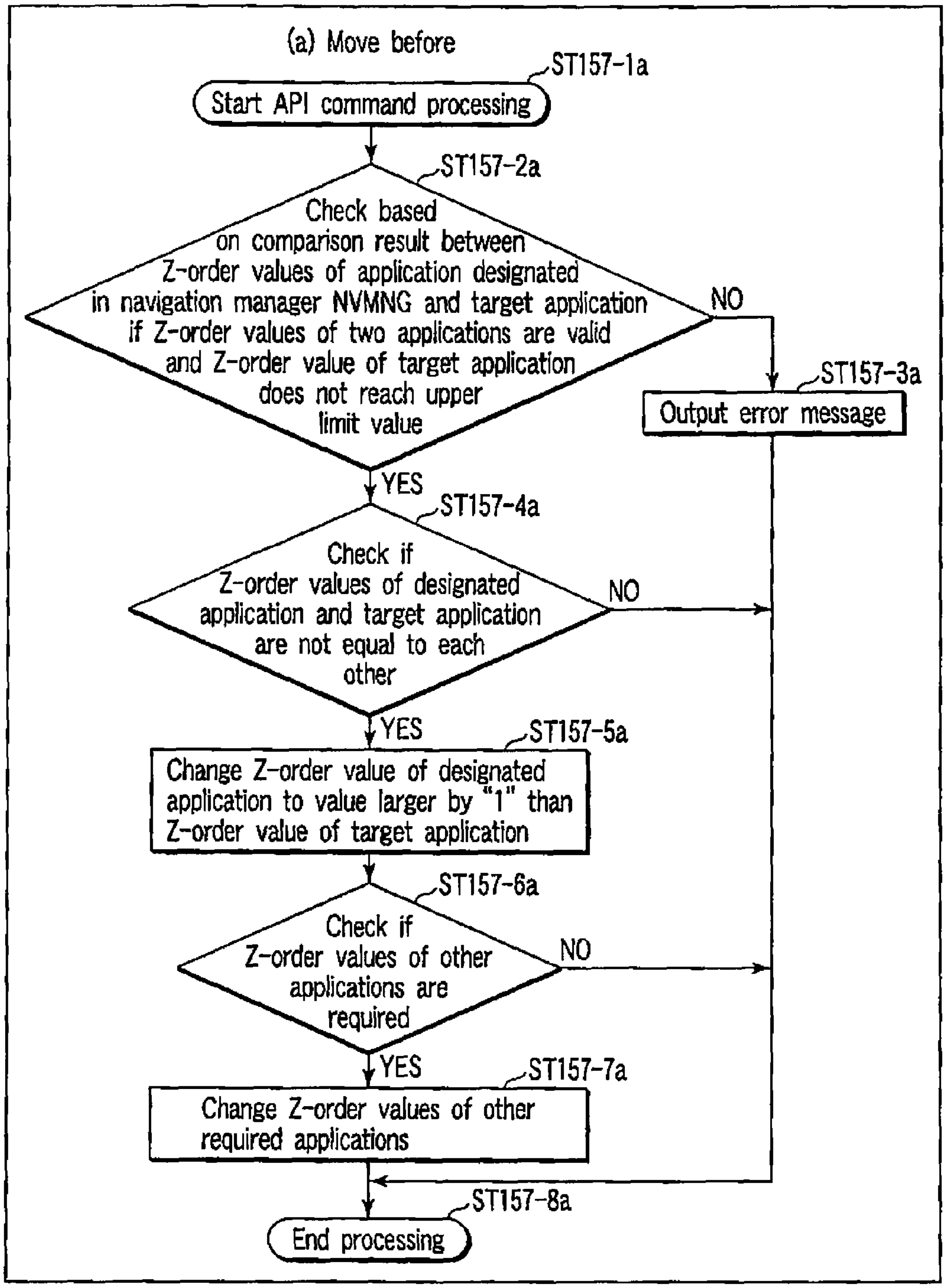
Figure 158:
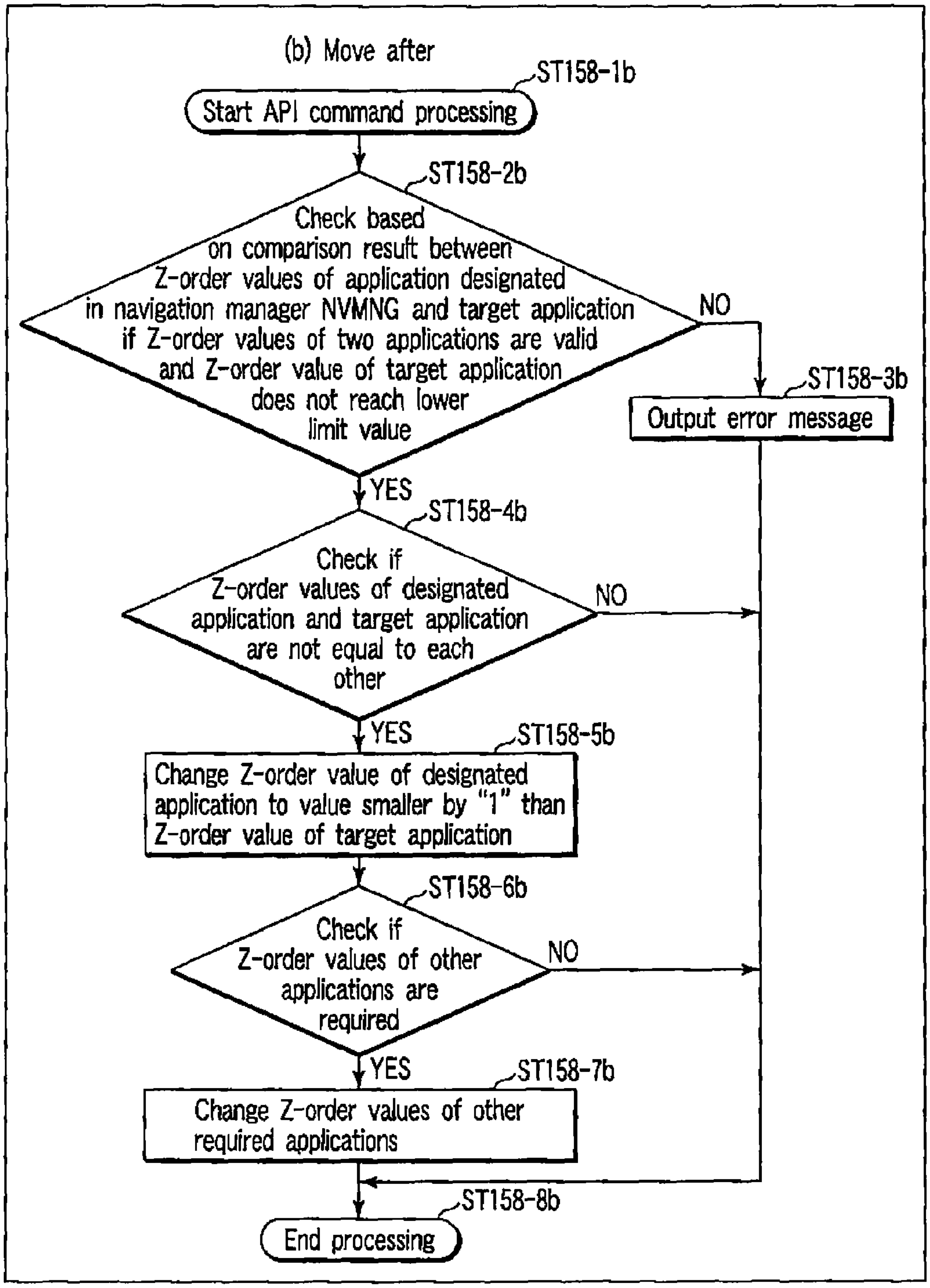
Figure 159:
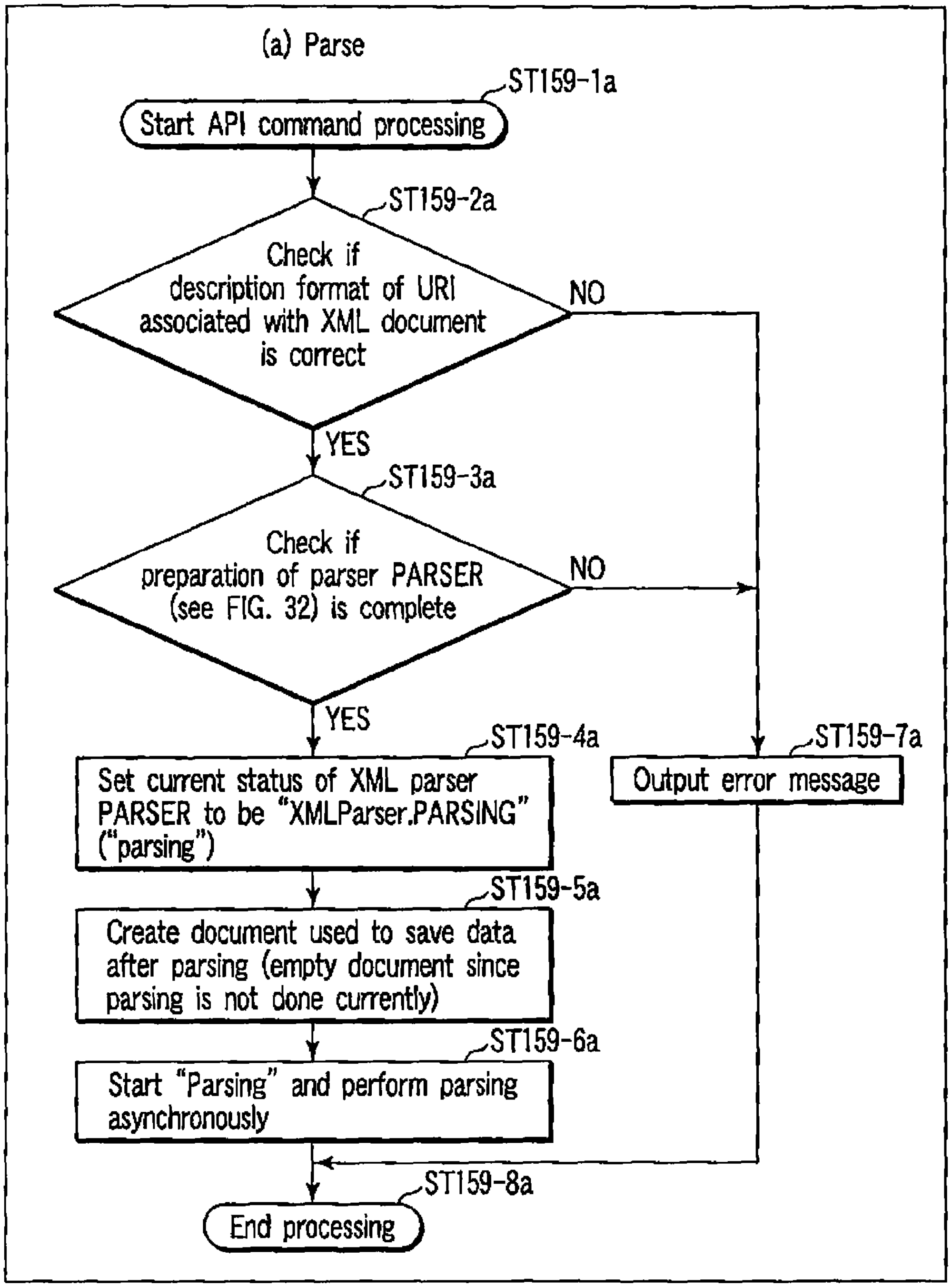
Figure 160A:
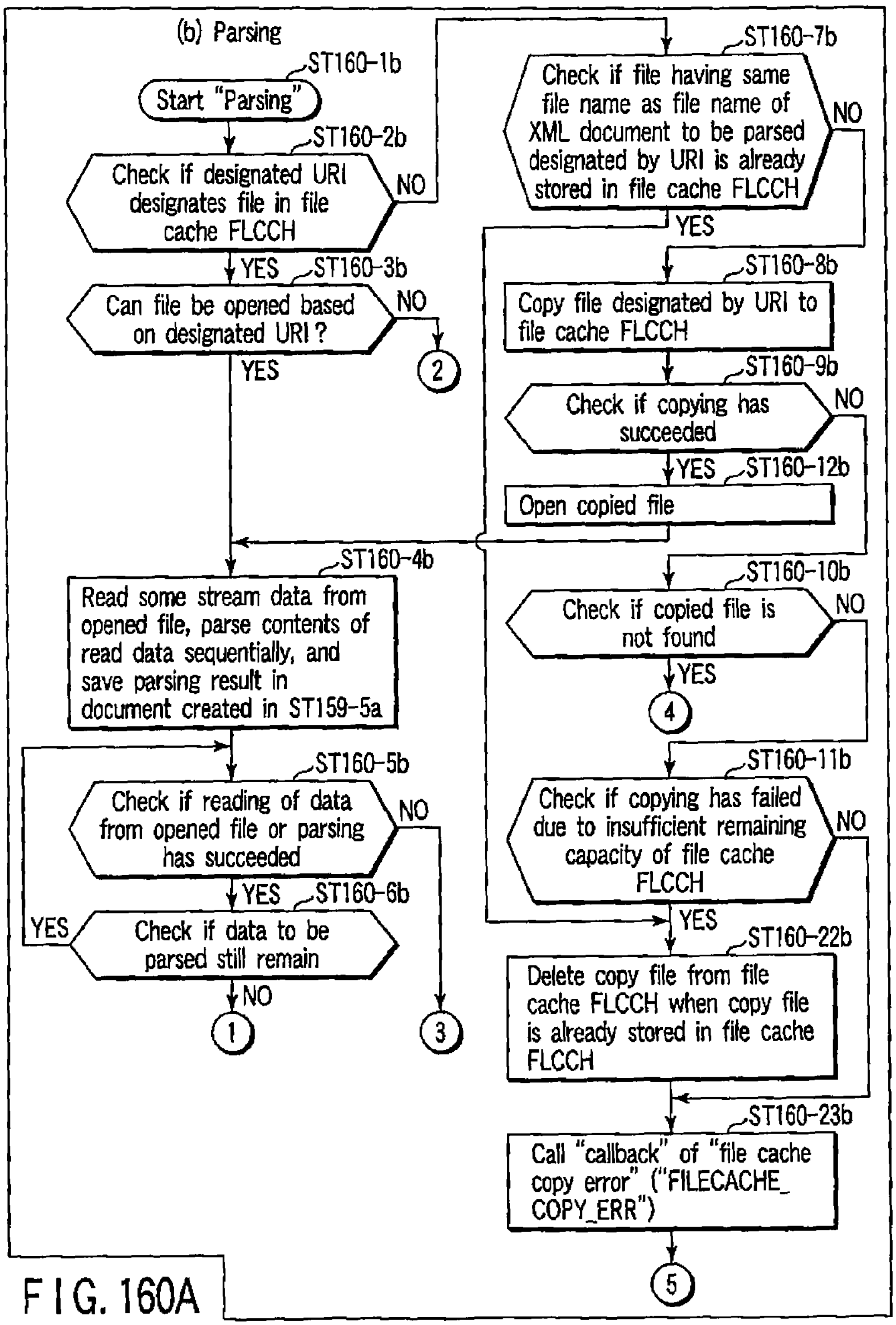
Figure 160B:
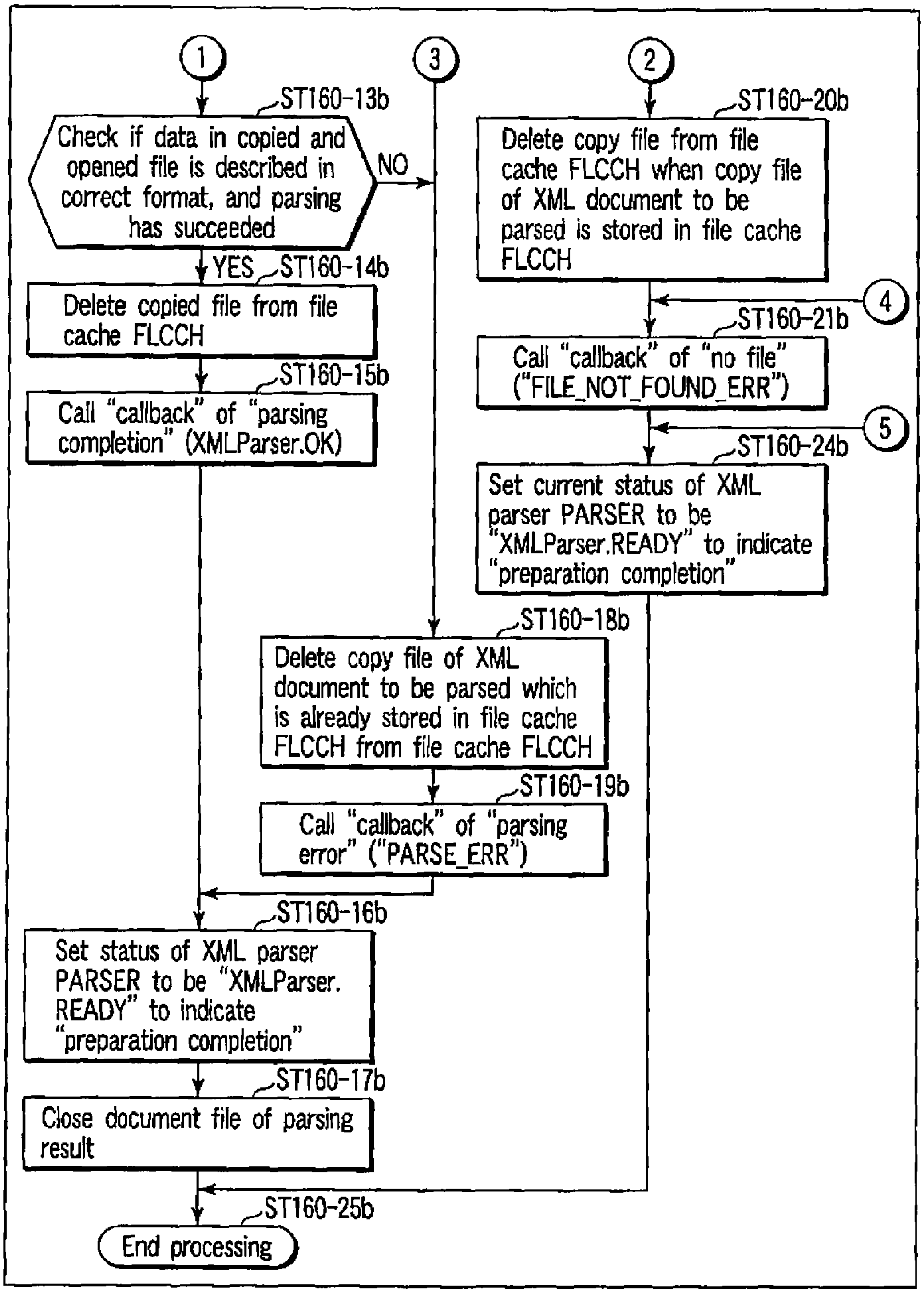
Figure 161:
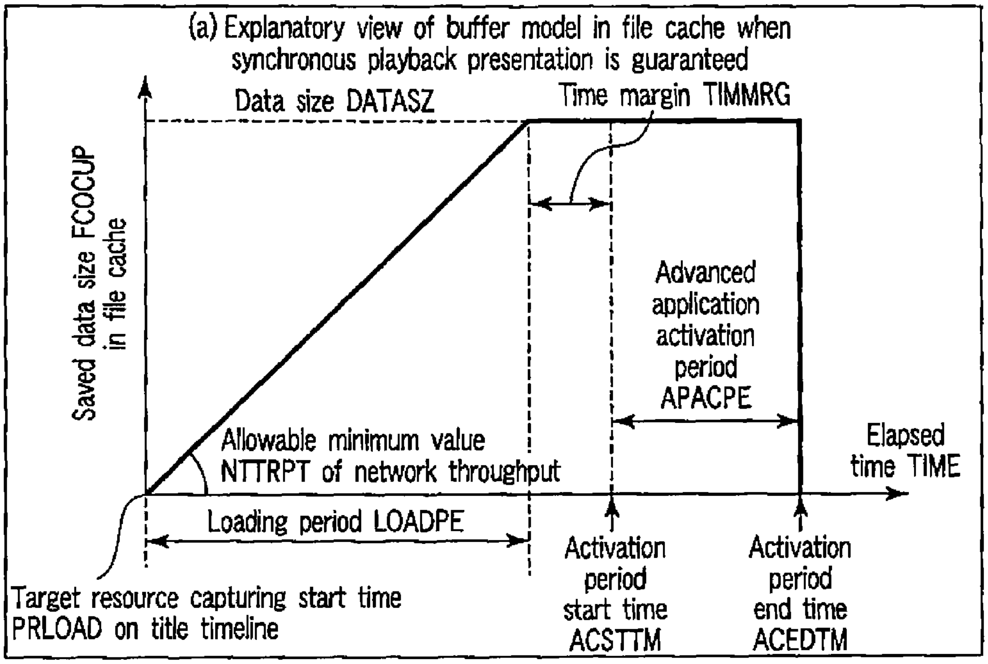
Figure 162:
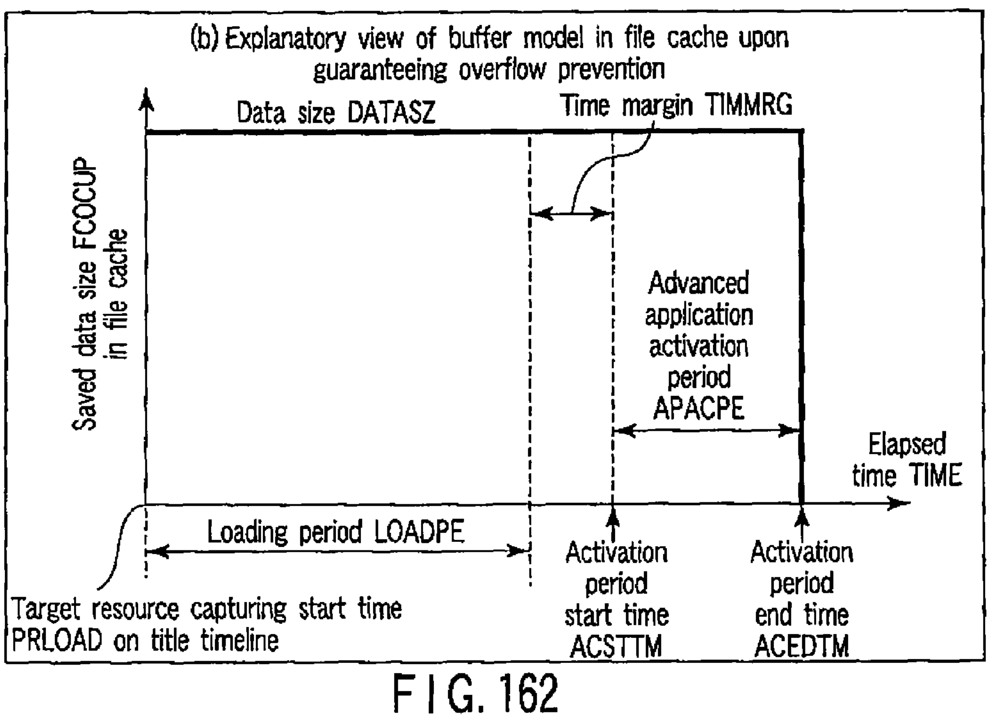
Figure 163:
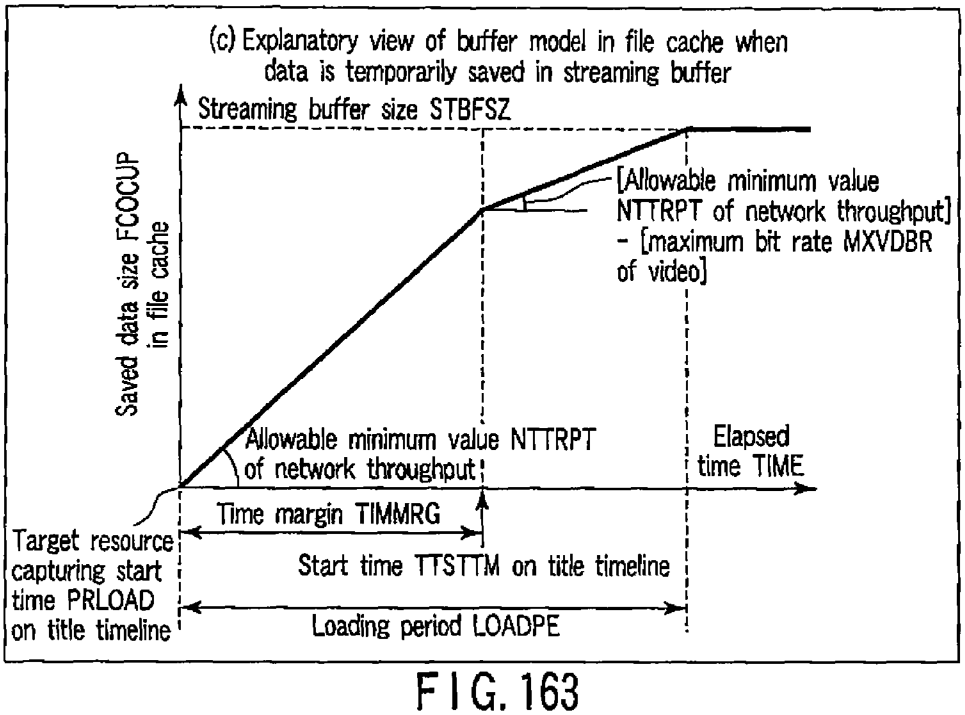
Figure 164:
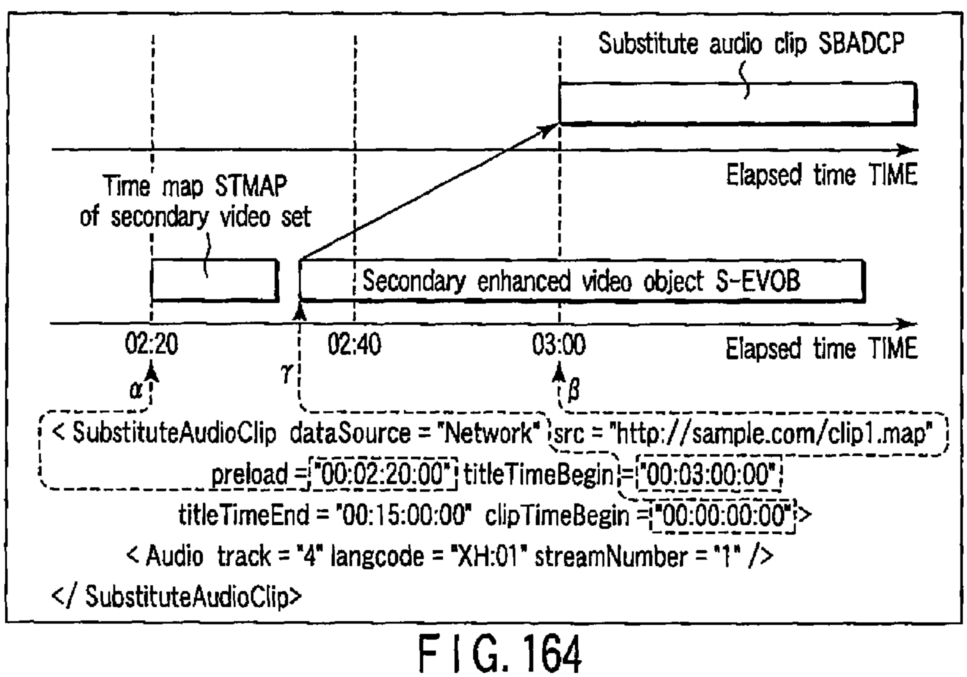
Figure 166:
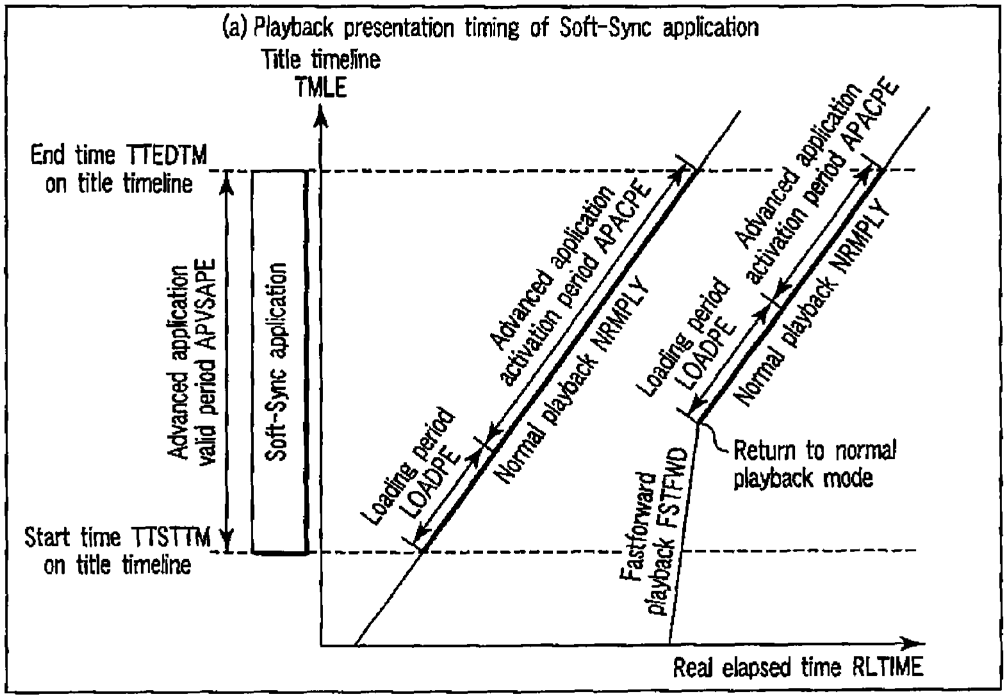
Figure 167:
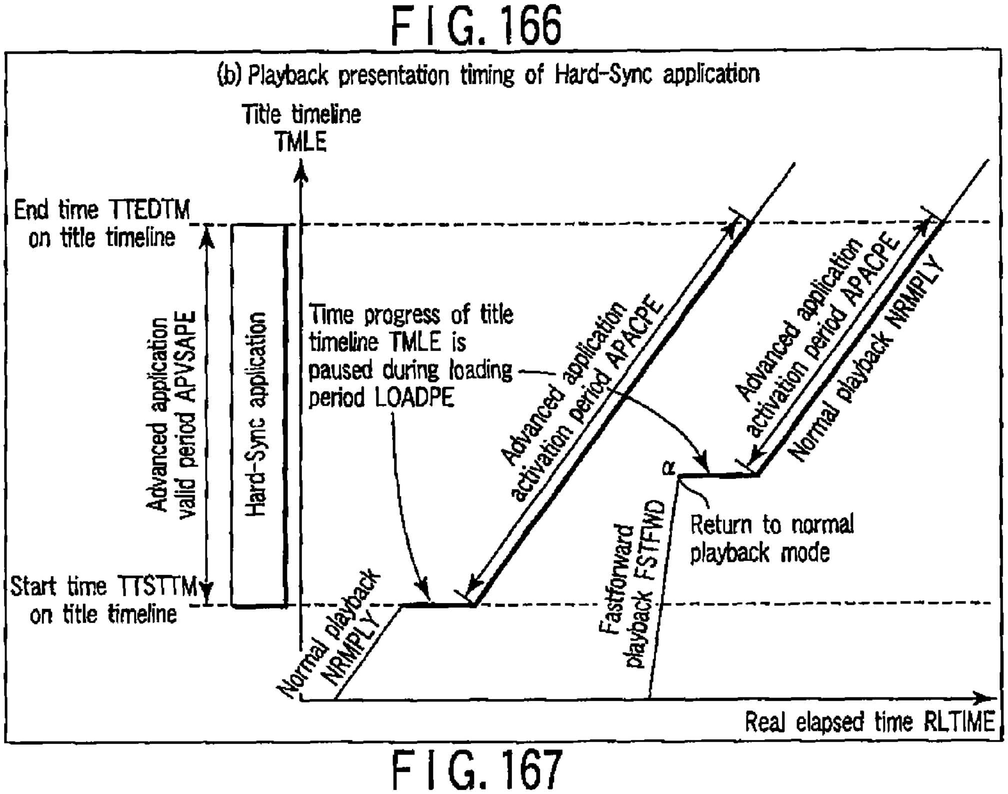

FIG. 131 is flowchart No. 21 showing the function contents in API commands according to the embodiment;

FIG. 132 is flowchart No. 22 showing the function contents in API commands according to the embodiment;

FIG. 133 is flowchart No. 23 showing the function contents in API commands according to the embodiment;

FIG. 134 is flowchart No. 24 showing the function contents in API commands according to the embodiment;

FIG. 135 is flowchart No. 25 showing the function contents in API commands according to the embodiment;

FIG. 136 is flowchart No. 26 showing the function contents in API commands according to the embodiment;

FIG. 137 is flowchart No. 27 showing the function contents in API commands according to the embodiment;

FIG. 138 is flowchart No. 28 showing the function contents in API commands according to the embodiment;

FIG. 139 is flowchart No. 29 showing the function contents in API commands according to the embodiment;

FIG. 140 is flowchart No. 30 showing the function contents in API commands according to the embodiment;

FIG. 141 is flowchart No. 31 showing the function contents in API commands according to the embodiment;

FIG. 142 is flowchart No. 32-1 showing the function contents in API commands according to the embodiment;

FIG. 143 is flowchart No. 32-2 showing the function contents in API commands according to the embodiment;

FIG. 144 is flowchart No. 33 showing the function contents in API commands according to the embodiment;

FIG. 145 is flowchart No. 34 showing the function contents in API commands according to the embodiment;

FIG. 146 is flowchart No. 35 showing the function contents in API commands according to the embodiment;

FIG. 147 is flowchart No. 36 showing the function contents in API commands according to the embodiment;

FIG. 148 is flowchart No. 37 showing the function contents in API commands according to the embodiment;

FIG. 149 is flowchart No. 38 showing the function contents in API commands according to the embodiment;

FIG. 150 is flowchart No. 39 showing the function contents in API commands according to the embodiment;

FIG. 151 is flowchart No. 40 showing the function contents in API commands according to the embodiment;

FIG. 152 is flowchart No. 41 showing the function contents in API commands according to the embodiment;

FIG. 153 is flowchart No. 42 showing the function contents in API commands according to the embodiment;

FIG. 154 is flowchart No. 43 showing the function contents in API commands according to the embodiment;

FIG. 155 is flowchart No. 44 showing the function contents in API commands according to the embodiment;

FIG. 156 is flowchart No. 45 showing the function contents in API commands according to the embodiment;

FIG. 157 is flowchart No. 46 showing the function contents in API commands according to the embodiment;

FIG. 158 is flowchart No. 47 showing the function contents in API commands according to the embodiment;

FIG. 159 is flowchart No. 48 showing the function contents in API commands according to the embodiment;

FIGS. 160A and 160B are flowchart No. 49 showing the function contents in API commands according to the embodiment;

FIG. 161 is an explanatory view of a buffer model in a file cache upon guaranteeing synchronous playback presentation according to the embodiment;

FIG. 162 is an explanatory view of a buffer model in a file cache upon guaranteeing overflow prevention according to the embodiment;

FIG. 163 is an explanatory view of a buffer model upon temporarily saving data in a streaming buffer according to the embodiment;

FIG. 164 is an explanatory view of an example of the settings of the loading and playback presentation timings of streaming according to the embodiment;

FIG. 165 is a comparison explanatory view of download types of a playback presentation object and application source according to the embodiment;

FIG. 166 is an explanatory view of the playback presentation timing of a soft-sync application according to the embodiment; and FIG. 167 is an explanatory view of the playback presentation timing of a hard-sync application according to the embodiment.

DETAILED DESCRIPTION

Various embodiments according to the invention will be described hereinafter with reference to the accompanying drawings. In general, according to one embodiment of the invention, an information storage medium stores a program which refers to a manifest on the basis of a playlist that manages the reproduction and display of presentation objects and further refers to either a markup or a script on the basis of the manifest, with a name corresponding to an event being defined in the markup and an event listener being caused to monitor in the script the occurrence of an event in response to the name corresponding to the event defined in the markup, and which specifies a function to be performed when the event has occurred.

Figure 12:
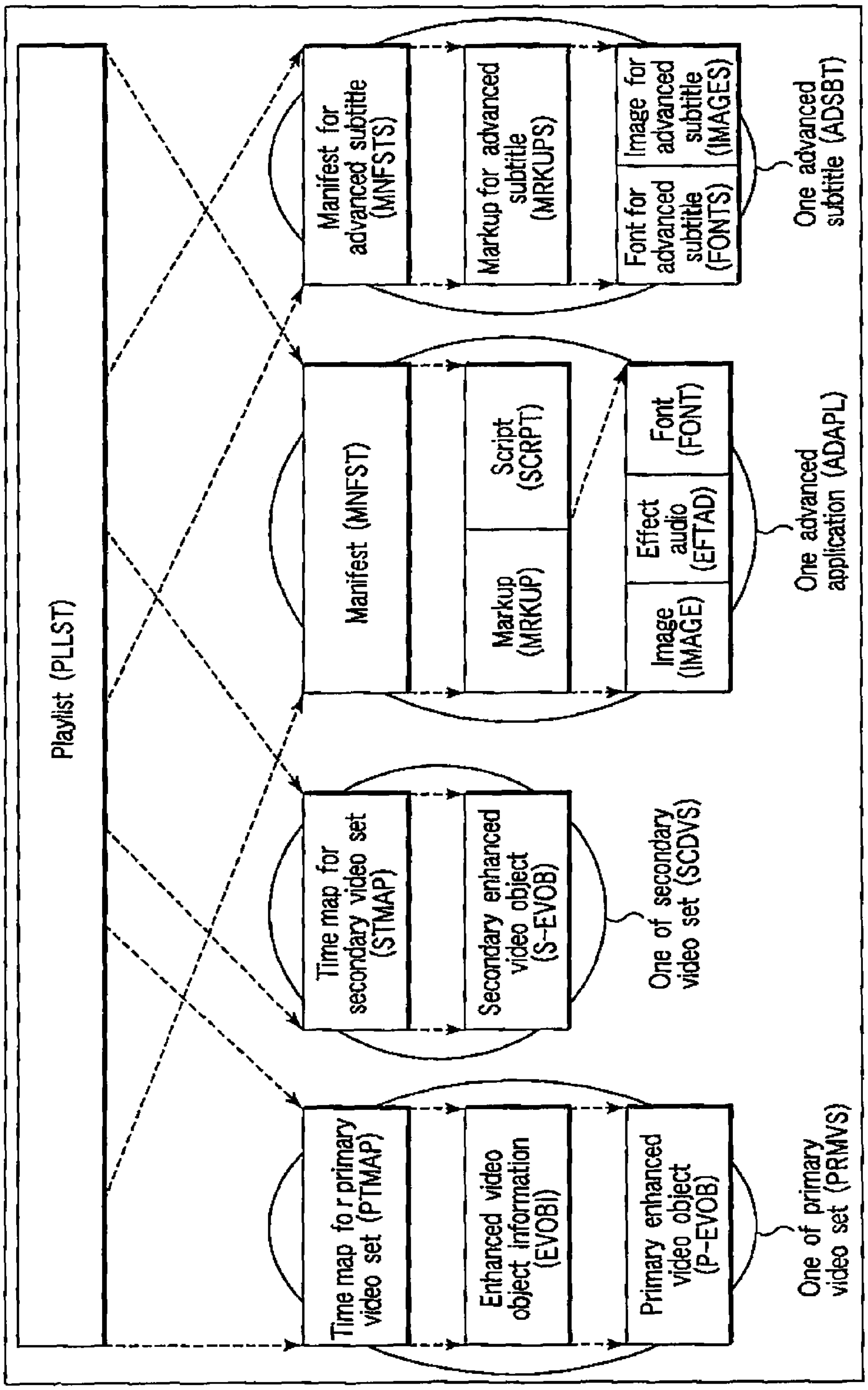
FIG. 12 is an exemplary views showing the data structure of an advanced content.

In the embodiment, as shown in FIG. 12, the following are possible:

1. Accessing/managing is done on this route: playlist PLLST→manifest MNFST→markup MRKUP.

2. In the markup MRKUP, a name corresponding to an event is defined. In the script SCRPT, an event listener is caused to monitor the occurrence of an event in response to the name corresponding to the event defined in the markup MRKUP. When the event has occurred, a function to be performed is specified.

In this embodiment, as shown in FIG. 12, the following are possible:

1. Primary enhanced video objects P-EVOB are accessed and managed in the following path: playlist PLLST→time map PTMAP→enhanced video object information EVOBI→primary enhanced video object P-EVOB.

2. Secondary enhanced video objects S-EVOB are accessed and managed in the following path: playlist PLLST→time map STMAP→secondary enhanced video object S-EVOB.

Since in any path, a time map never fails to be used, this makes it possible to maintain a high compatibility with the existing Video Recording standard which manages the playback display range using time information and which comes already equipped with time map information used to convert the time information into address information. Moreover, since enhanced video object information EVOBI is used as management information related to primary enhanced video objects P-EVOB, this makes it possible to maintain the compatibility with the existing DVD-Video standard.

<System Arrangement>

Figure 1:
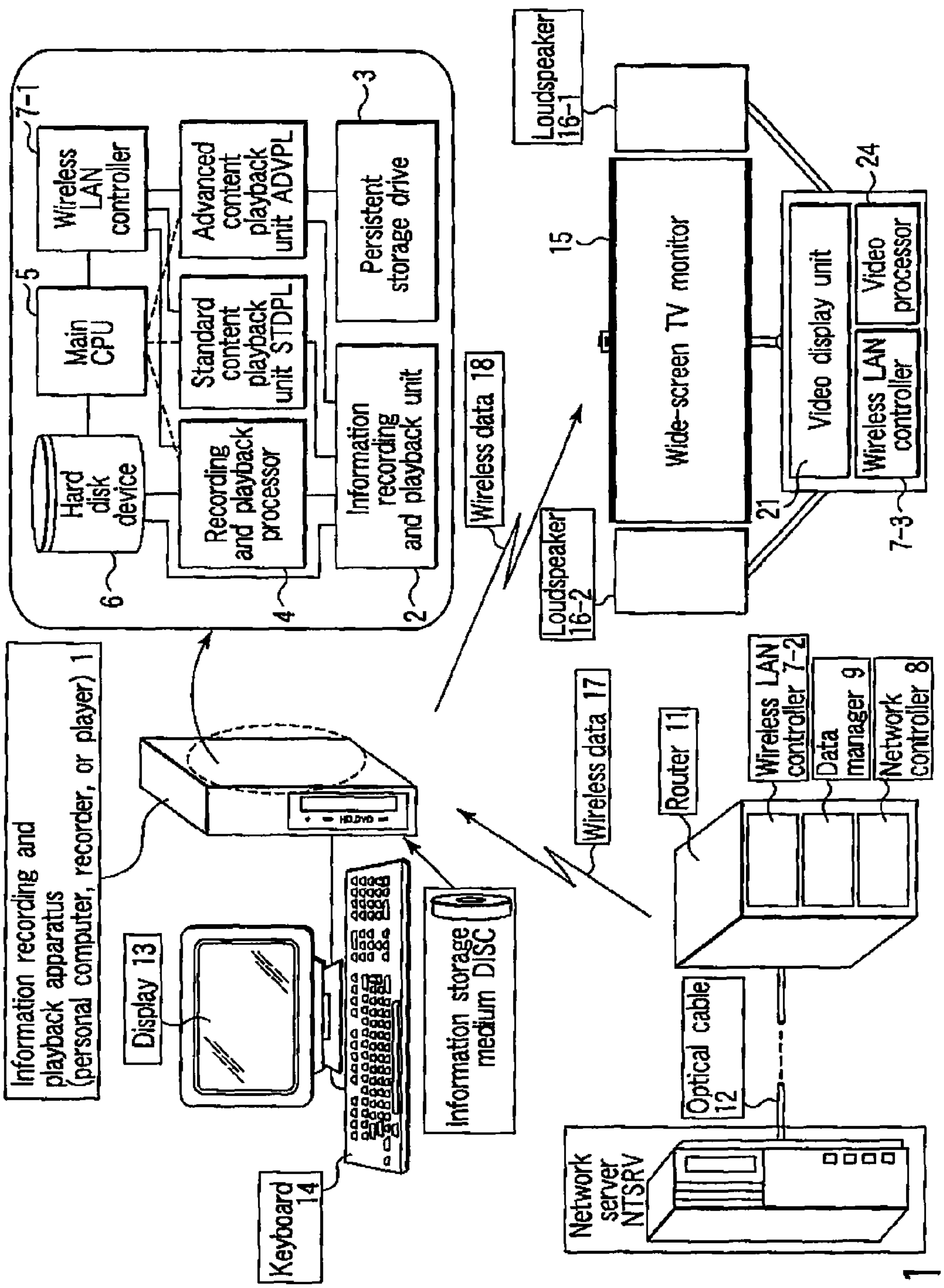
FIG. 1 is an exemplary diagram showing the arrangement of a system according to an embodiment of the invention.

FIG. 1 is a diagram showing the arrangement of a system according to an embodiment of the invention.

This system comprises an information recording and playback apparatus (or an information playback apparatus) 1 which is implemented as a personal computer (PC), a recorder, or a player, and an information storage medium DISC implemented as an optical disc which is detachable from the information recording and playback apparatus 1. The system also comprises a display 13 which displays information stored in the information storage medium DISC, information stored in a persistent storage PRSTR, information obtained from a network server NTSRV via a router 11, and the like. The system further comprises a keyboard 14 used to make input operations to the information recording and playback apparatus 1, and the network server NTSRV which supplies information via the network. The system further comprises the router 11 which transmits information provided from the network server NTSRV via an optical cable 12 to the information recording and playback apparatus 1 in the form of wireless data 17. The system further comprises a wide-screen TV monitor 15 which displays image information transmitted from the information recording and playback apparatus 1 as wireless data, and loudspeakers 16-1 and 16-2 which output audio information transmitted from the information recording and playback apparatus 1 as wireless data.

The information recording and playback apparatus 1 comprises an information recording and playback unit 2 which records and plays back information on and from the information storage medium DISC, and a persistent storage drive 3 which drives the persistent storage PRSTR that includes a fixed storage (flash memory or the like), removable storage (secure digital (SD) card, universal serial bus (USB) memory, portable hard disk drive (HDD), and the like). The apparatus 1 also comprises a recording and playback processor 4 which records and plays back information on and from a hard disk device 6, and a main central processing unit (CPU) 5 which controls the overall information recording and playback apparatus 1. The apparatus 1 further comprises the hard disk device 6 having a hard disk for storing information, a wireless local area network (LAN) controller 7-1 which makes wireless communications based on a wireless LAN, a standard content playback unit STDPL which plays back a standard content STDCT (to be described later), and an advanced content playback unit ADVPL which plays back an advanced content ADVCT (to be described later).

The router 11 comprises a wireless LAN controller 7-2 which makes wireless communications with the information recording and playback apparatus 1 based on the wireless LAN, a network controller 8 which controls optical communications with the network server NTSRV, and a data manager 9 which controls data transfer processing.

The wide-screen TV monitor 15 comprises a wireless LAN controller 7-3 which makes wireless communications with the information recording and playback apparatus 1 based on the wireless LAN, a video processor 24 which generates video information based on information received by the wireless LAN controller 7-3, and a video display unit 21 which displays the video information generated by the video processor 24 on the wide-screen TV monitor 15.

Note that the detailed functions and operations of the system shown in FIG. 1 will be described later.

<Points of This Embodiment>

1. An advanced content playback unit ADVPL includes a data access manager DAMNG, a navigation manager NVMNG, a data cache DTCCH, a presentation engine PRSEN, and an AV renderer AVRND (see FIG. 14).

2. The navigation manager NVMNG includes a playlist manager PLMNG, a parser PARSER, and an advanced application manager ADAMNG (see FIG. 28).

3. A frame to be presented to the user is obtained by compositing a main video plane MNVDPL, a sub video plane SBVDPL, and a graphic plane GRPHPL (see FIG. 39).

User requests to the next generation standards based on the existing DVD-Video and problems posed when the related existing DVD-Video standards are expanded, and solutions of the embodiment of the invention and new effects as a result of such solutions will be described below with reference to FIGS. 2A, 2B, and 2C. There are three following prominent request functions demanded by the users for the current-generation DVD-Video standards:

1. flexible and diversified expressive power (to assure expressive power close to window presentation of an existing personal computer)

2. network actions 3. easy processing of video related information and easy transmission of information after processing When the request function of "1. flexible and diversified expressive power" listed first is to be made by only a minor change of the existing DVD-Video standards, since user requests are of too greater variety, the following problem is posed. That is, such need cannot be met by only a custom-made like minor change of the data structure in the existing DVD-Video standards. As technical device contents to solve this problem, this embodiment adopts expression formats in the PC world having versatility, and newly introduces the concept of timeline. As a result, according to this embodiment, the following new effects can be obtained.

1] Make flexible and impressive reactions in response to user's actions:

1.1) Make response by means of change in animation and image at the time of button selection or execution instruction;

1.2) Make voice response at the time of button selection or execution instruction;

1.3) Start execution operation at purposely delayed timing in response to user's execution instruction;

1.4) Give voice answer to help (like PC); and 1.5) Audibly and visually output how to use guide of menu, etc.

2] Allow flexible switching processing for video information itself and its playback method:

2.1) Switching presentation of audio information;

2.2) Switching presentation of subtitle information (telop, subtitle, still picture icon, etc.);

2.3) Allow enlarged-scale presentation of subtitle according to user's favor;

2.4) Allow user to mark subtitle and to issue subtitle execution command; and 2.5) Mark specific video part in synchronism with comment while movie director is making that comment.

3] Simultaneously present independent information to be superimposed on video information during playback:

3.1) Simultaneously present a plurality of pieces of video information by means of multi-windows;

3.2) Allow to freely switch window size of each of multi-windows;

3.3) Simultaneously present prior audio message and after-recorded audio message by user;

3.4) Simultaneously present scrolling text to be superimposed on video information; and 3.5) Simultaneously present graphic menus and figures (of select buttons, etc.) in flexible forms.

4] Allow easy search to video location to be seen:

4.1) Conduct keyword (text) search of location to be seen using pull-down menu.

As for 2, "Realization of flexible responses to various actions via network," above, a disjunction between the data structure specified by the existing DVD-Video standards and a network compatible window is too large. As technical device contents to solve this problem, this embodiment adopts a homepage presentation format (XML and scripts) of a Web which has a good track record in window expression of a network as a basic part of the data management structure, and adjusts a video playback management format to it. As a result, according to the embodiment of the invention, the following new effects can be obtained.

5] Provide update function of information on disc using network:

5.1) Automatic updating of object information and intra-disc management information;

5.2) Network downloading of how to use guide of menus;

5.3) Notification of automatic updating of information to user;

5.4) Notification of OK/NG of update information presentation to user; and 5.5) Manual update function by user.

6] Real-time online processing:

6.1) Switching or mixing processing to audio information downloaded via network upon video playback (commentary presentation by means of voice of movie director);

6.2) Network shopping; and 6.3) Interactive real-time video change.

7] Real-time information sharing with another user via network:

7.1) Simultaneously present specific window even for another user at remote place;

7.2) Play battle game or interactive game with another user at remote place;

7.3) Participate in chatting during video playback; and 7.4) Transmit or receive message to or from fan club simultaneously with video playback.

When 3, "Realization of easy processing of video related information and easy transmission of information after processing," above, is to be implemented by a minor change of the existing DVD-Video standards, complicated edit processing cannot be flexibly and easily coped with. In order to flexibly and easily cope with the complicated edit processing, a new management data structure is needed. As technical device contents to solve this problem, this embodiment adopts XML and the concept of timeline to be described later. As a result, according to the embodiment of the invention, the following new effects can be obtained.

8] Allow user to select and generate playlist and to transmit it:

8.1) Allow user to select or generate playlist;

8.2) Allow user to transmit playlist selected or generated by him or her to friend;

8.3) Allow to play back playlist selected or generated by user only on specific disc;

8.4) Allow user to also select collection of highlight scenes of video information;

8.5) Publish scrapbook that captures favorite frames in video information on Web; and 8.6) Store and play back angles or scenes in multi-angles or multi-scenes selected by user.

9] Allow user to append specific information related with video information and to transmit result via network:

9.1) Allow user to add comment about video information, and to share it with another user on network;

9.2) Paste input image to character's face in video information;

9.3) Paste user information or experience information upon seeing video information onto image information; and 9.4) Use user information in parental lock to impose automatic limitation on video information to be presented.

10] Automatically save playback log information:

10.1) Provide automatic saving function of resume (playback pause) information;

10.2) Automatically save halfway information of game progress until previous time; and 10.3) Automatically save previous playback environment (battle game environment with a plurality of users, etc.).

Figure 3A:
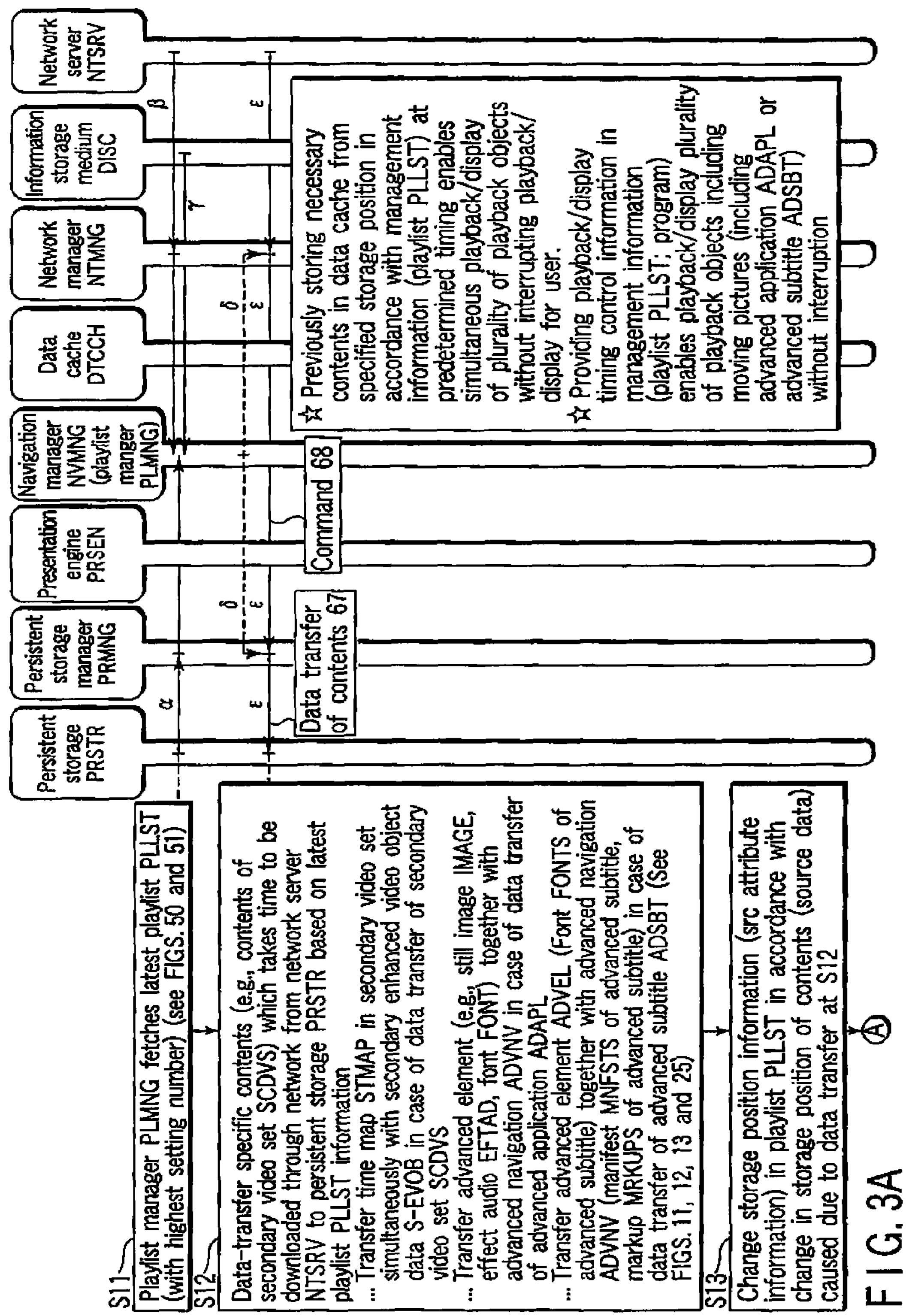
FIGS. 3A and 3B are exemplary views showing an example of video content playback method by an information recording and playback apparatus.
Figure 3B:
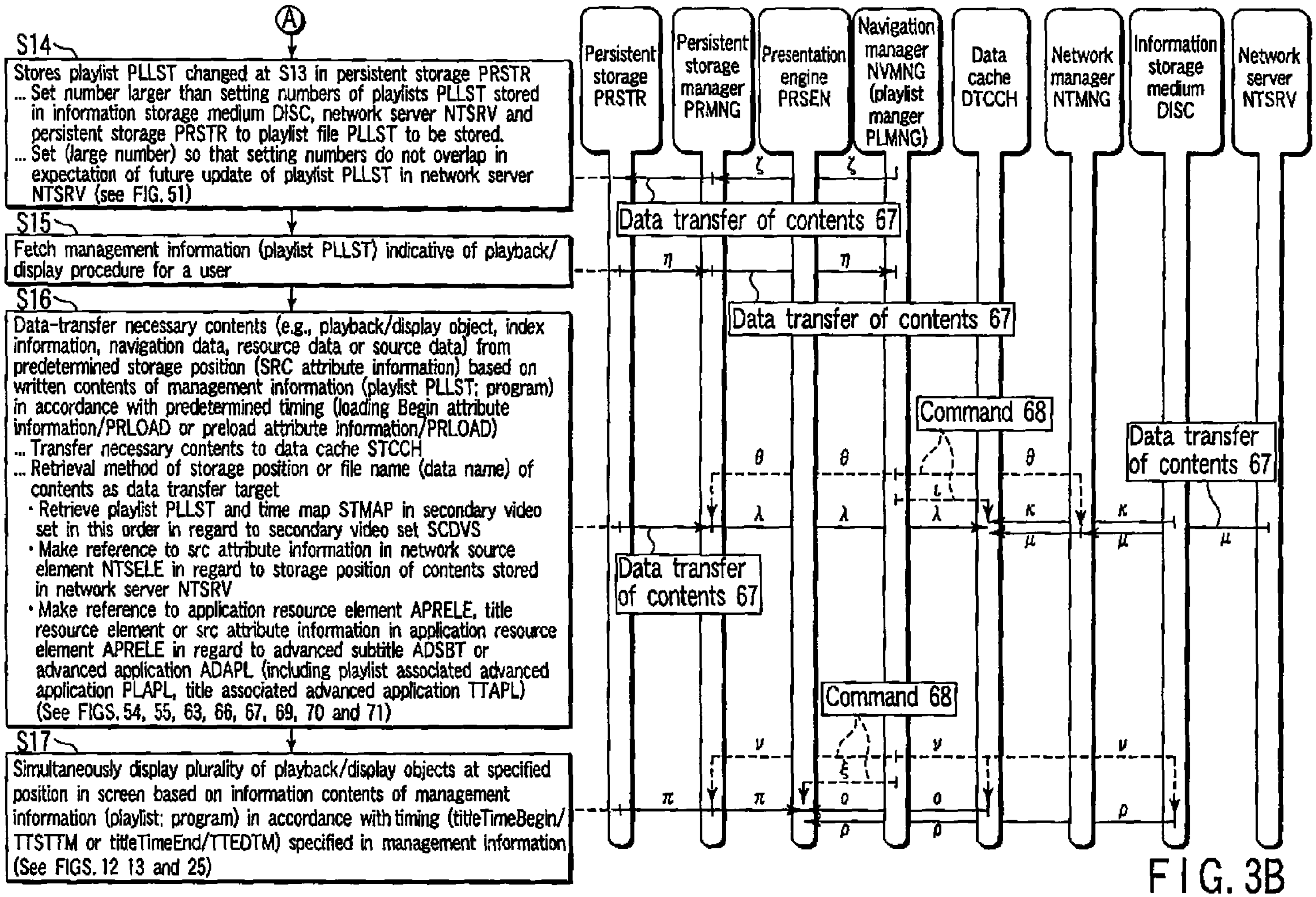
Figure 14:
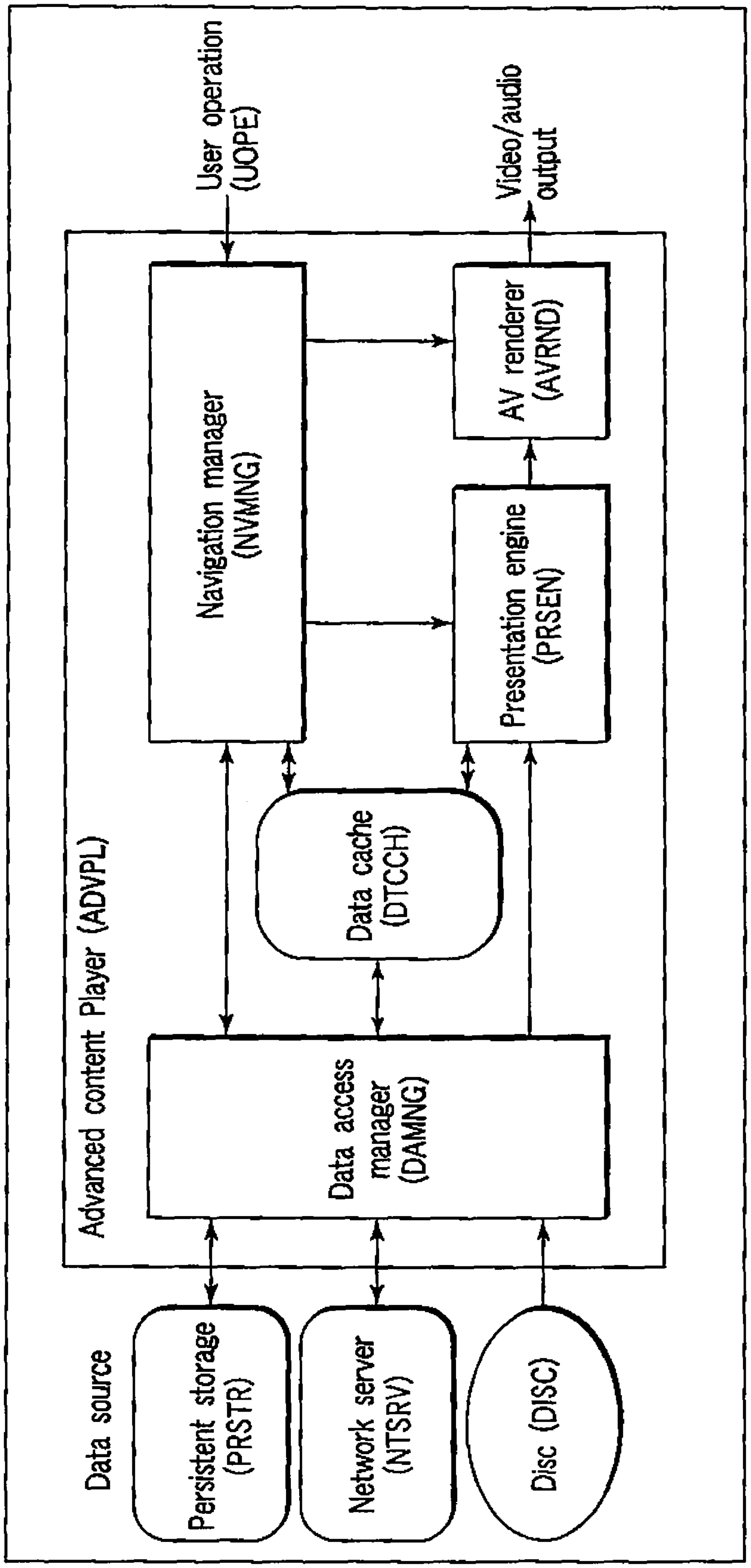
FIG. 14 is an exemplary block diagram showing the internal structure of an advanced content playback unit.
Figure 26:
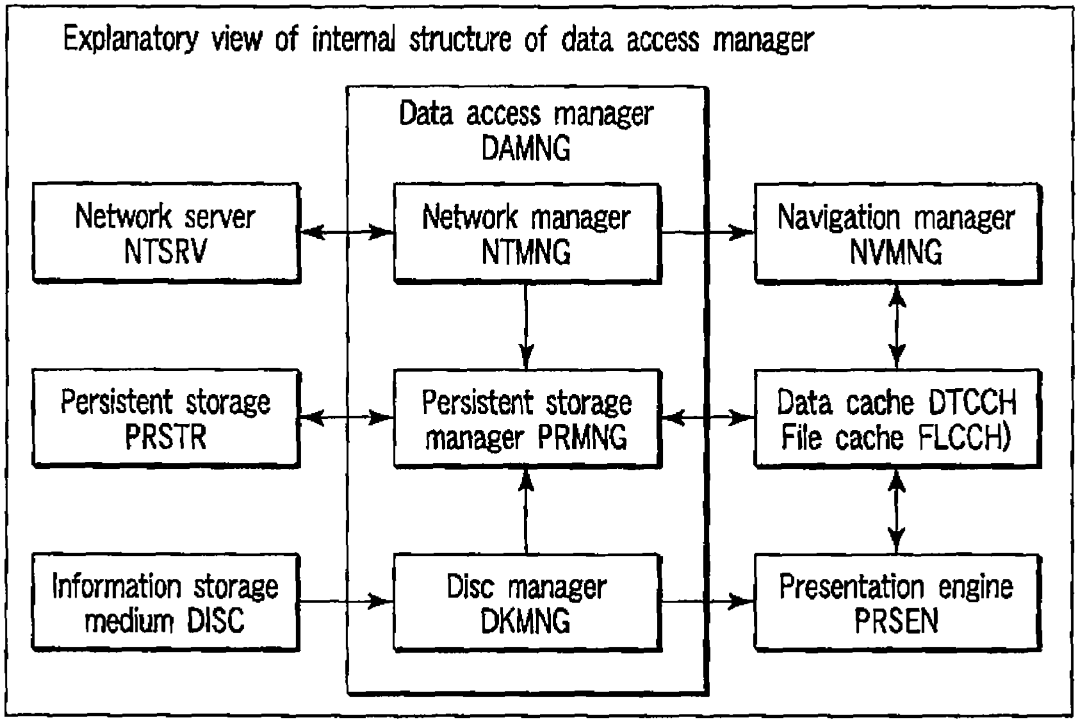
FIG. 26 is an exemplary view showing the structure in a data access manager.
Figure 28:
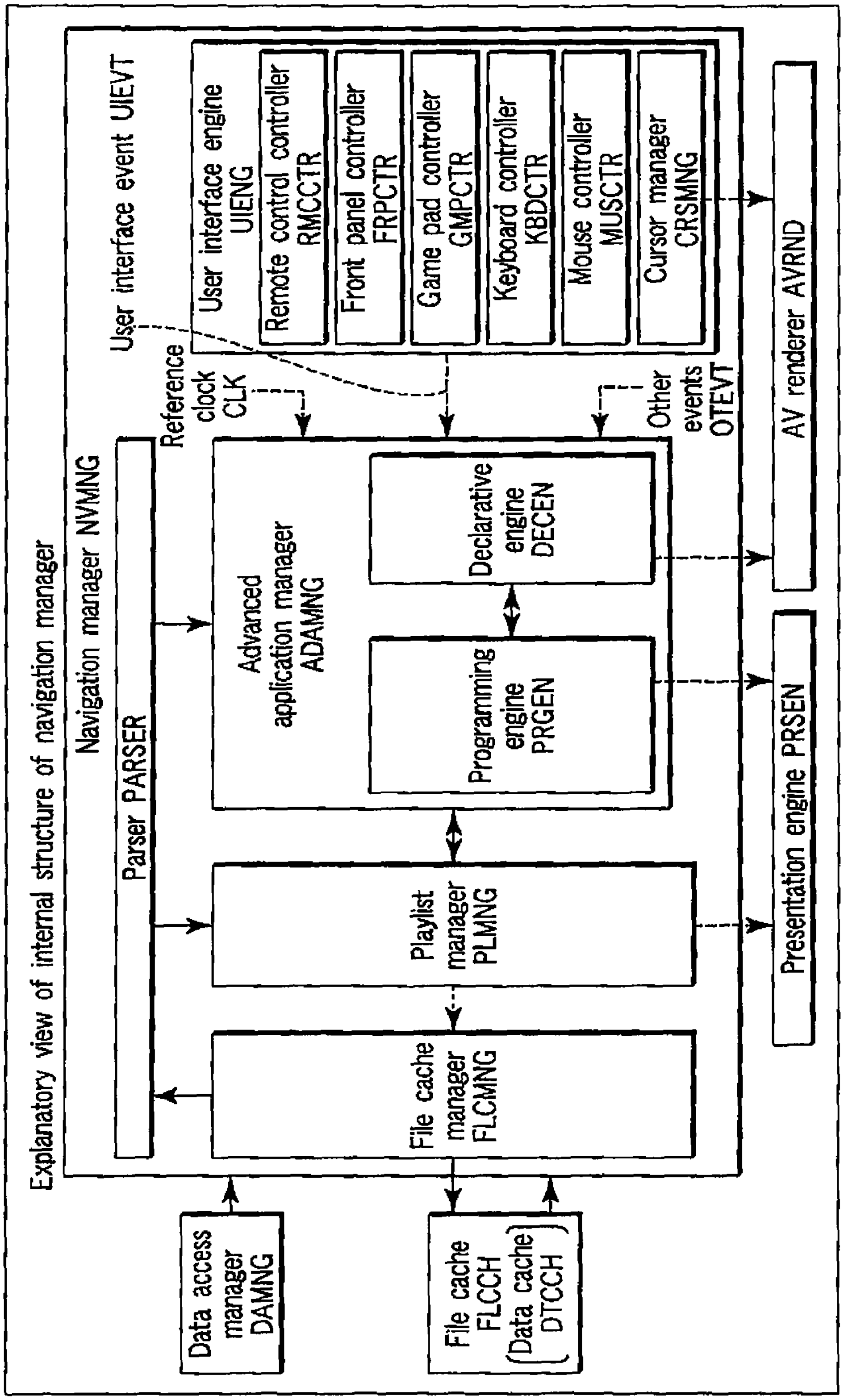
FIG. 28 is an exemplary view showing the structure in a navigation manager.

Descriptions will be given as to a basic concept concerning a data processing method or a data transfer method and a program structure in this embodiment with reference to FIGS. 3A and 3B. A horizontal solid line on a right-hand side in FIGS. 3A and 3B represents data transfer 67 of contents in an information recording and playback apparatus 1 according to this embodiment, and a horizontal broken line means a command 68 transferred from a playlist manager PLMNG in a navigation manager NVMNG depicted in FIG. 28 to each part in an advanced content playback unit ADVPL. The advanced content playback unit ADVPL exists in the information recording and playback apparatus 1 depicted in FIG. 1. A structure in the advanced content playback unit ADVPL has a configuration depicted in FIG. 14. A persistent storage PRSTR shown in a vertical column on the right-hand side in FIGS. 3A and 3B corresponds to a persistent storage PRSTR in FIG. 14, and a network server NTSRV shown in a vertical column in FIGS. 3A and 3B corresponds to a network server NTSRV in FIG. 14. Moreover, an information storage medium DISC shown in a vertical column in FIGS. 3A and 3B corresponds to an information storage medium DISC depicted in FIG. 14. Additionally, a presentation engine PRSEN shown in a vertical column on the right-hand side in FIGS. 3A and 3B means a presentation engine PRSEN depicted in FIG. 14 and is utilized for playback processing of contents. Further, a data cache DTCCH shown in the vertical column on the right-hand side in FIGS. 3A and 3B corresponds to a data cache DTCCH in FIG. 14, and advanced contents ADVCT are temporarily stored in the data cache DTCCH from a storage position of each advanced contents as required. FIG. 28 shows an internal structure of the navigation manager NVMNG depicted in FIG. 14. A playlist manager PLMNG exists in the navigation manager NVMNG, and the playlist manger PLMNG interprets contents in a playlist PLLST in which management information indicative of a playback/display procedure of contents in this embodiment is written. A command issued from the navigation manager NVMNG indicated by a vertical line on the right-hand side in FIGS. 3A and 3B is mainly issued from a playlist manager PLMNG in the navigation manager NVMNG. An internal structure of a data access manager DAMNG shown in FIG. 14 is constituted of a network manager NTMNG, a persistent storage manager PRMNG and a disk manager DKMNG as illustrated in FIG. 26. The network manager NTMNG in the data access manager DAMNG performs communication processing with each network server NTSRV, and executes intermediation of processing of the data transfer 67 of contents from the network server NTSRV. Actually, when data is transferred from the network server NTSRV to the data cache DTCCH, a command 68 is transferred from the playlist manager PLMNG in the navigation manager NVMNG to the network manager NTMNG, and the network manager NTMNG carries out processing of the data transfer 67 of contents from the corresponding network server NTSRV based on the command 68. The network manager shown in FIG. 26 represents a network manger NTMNG shown in the vertical column on the right-hand side in FIGS. 3A and 3B. Furthermore, the persistent storage manger PRMNG shown in FIG. 26 represents a persistent storage manager PRMNG illustrated in the vertical column on the right-hand side in FIGS. 3A and 3B. As shown in FIG. 26, the persistent storage manager PRMGN in the data access manager DAMNG executes processing with respect to a persistent storage PRSTR, and performs transfer processing of necessary data from the persistent storage PRSTR. The command 68 is also issued with respect to the persistent storage manager PRMNG from the playlist manager PLMNG in the navigation manager NVMNG. On the right-hand side in FIGS. 3A and 3B, when a horizontal line (or a broken line) is clearly written on each vertical column, data transfer 67 of contents or transmission of the command 68 is executed via a part shown in each vertical column. Further, when a line is drawn behind each vertical column, data transfer 67 of contents or transmission of the command 68 is executed without using a part shown in each vertical column. Furthermore, each processing step shown on the left-hand side in FIGS. 3A and 3B is written in synchronization with data transfer 67 of contents indicated by each horizontal line on the right-hand side in FIGS. 3A and 3B.

A flow from step S11 to step S14 in a flowchart on the left-hand side in FIGS. 3A and 3B represents that contents of a playlist PLLST are changed and saved in accordance with a change in a storage position of contents obtained as a result of performing data transfer of contents. Furthermore, a flow from step S15 to step S17 in the flowchart shown on the left-hand side in FIGS. 3A and 3B represents a core part of a basic concept concerning a data processing method, a data transfer method or a program structure in this embodiment. That is, it represents a flow of previously storing in the data cache DTCCH data of contents which should be displayed based on the playlist PLLST, and displaying data from the data cache DTCCH for a user at a necessary timing. In FIGS. 3A and 3B, a file of the playlist PLLST which is management information indicative of a playback/display procedure for a user exists in the persistent storage PRSTR, the network server NTSRV or the information storage medium DISC. Contents of the flowchart shown on the left-hand side in FIGS. 3A and 3B will now be described in detail. At step S11, the playlist PLLST stored in the persistent storage PRSTR is transferred to the playlist manager PLMNG via the persistent storage manager PRMNG as indicated by a line α. Moreover, a playlist manager PLMNG file stored in the network server NTSRV is transferred to the playlist manager PLMNG from the network server NTSRV via the network manager NTMNG as indicated by a line β. Additionally, the playlist manager PLMNG stored in the information storage medium DISC is transferred to the playlist manager PLMNG from the information storage medium DISC via a disk manager DKMNG although not shown. The data processing method or the data transfer method shown at the step S11 matches with processing from step S44 to step S46 in FIG. 50 or processing at step S61 in FIG. 51. That is, when the plurality of playlists PLLST similar to a plurality of storage mediums exist, a playlist file PLLST to which the highest number of numbers set to the playlists PLLST is set is utilized as the latest file as indicated at the step S46 in FIG. 50 or the step S61 in FIG. 51. Then, data of specific contents (e.g., contents of a secondary video set SCDVS) which take time for network download processing is transferred from the network server NTSRV toward the persistent storage PRSTR based on information of the latest playlist PLLST selected at step S11 (step S12). At this time, the command 68 is previously transferred from the playlist manager PLMNG to the network manager NTMNG and the persistent storage manager PRMNG (a line δ), and the network manager NTMNG executes processing to fetch data of contents from a corresponding network server NTSRV based on the command 68 and transfers this data to a specified persistent storage PRSTR via the persistent storage manager PRMNG (a line ϵ). In this embodiment, at the step S12, in case of transferring data of a secondary video set SCDVS, a time map STMAP of a secondary video set must be also transferred simultaneously with a secondary enhanced video object data S-EVOB. Furthermore, in case of transferring data of an advanced application ADAPL, a still image IMAGE, effect audio EFTAD, a font FONT or the like as an advanced element is also transferred with an advanced navigation ADVNV (a manifest MNFST, a markup MRKUP, a script SCRPT). Moreover, in case of transferring data of an advanced subtitle ADSBT, a font FONT of the advanced subtitle as an advanced element ADVEL is also transferred with the manifest MNFSTS of the advanced subtitle as an advanced navigation and the markup MRKUPS of the advanced subtitle (see FIGS. 12, 25 and 11). At the next step (step S13), playlist PLLST storage position information (src attribute information) is changed from the network server NTSRV before execution at the step S12 to the persistent storage PRSTR in accordance with a change in a storage position of contents (source data) generated by data transfer illustrated at the step S12. At this time, a number larger than the set numbers of the playlists PLLST stored in the information storage medium DISC, the network server NTSRV and the persistent storage PRSTR before changing from the network server NTSRV to the persistent storage PRSTR must be set to the playlist file PLL which is to be stored. Additionally, there is a possibility that a content provider changes the playlist PLLST stored in the network server NTSRV. In such a case, a value which is larger than the number already set in the network server NTSRV by "1" is set to the playlist file PLLST. Therefore, a sufficiently large number which does not overlap the set number must be set to the playlist PLLST which is currently updated in such a manner that the updated playlist PLLST in the network server NTSRV can be discriminated from the playlist PLLST which is to be stored this time, and the playlist PLLST must be then stored in the persistent storage PRSTR. The core part of the basic concept concerning the data processing method, the data transfer method or the program structure in this embodiment roughly consists of three steps as indicated by the steps S15 to S17. That is, at the first step (the step S15), the playlist PLLST as management information (a program) indicative of a playback/display procedure for a user is read by the playlist manager PLMNG in the navigation manager NVMNG. In the embodiment shown in FIGS. 3A and 3B, since the updated playlist file PLLST is stored in the persistent storage PRSTR (the step S14), the playlist manager PLMNG reads the latest playlist PLLST from the persistent storage PRSTR as indicated by a line η. In the data processing method or the data transfer method according to this embodiment, a playback/display object, index information, navigation data, resource data, source data or the like as necessary contents is transferred from a predetermined storage position (arc attribute information) in accordance with description contents of the playlist PLLST (a program) as management information at a predetermined timing (LoadingBegin attribute information/PRLOAD or preload attribute information/PRLOAD) as indicated at the step S16. This embodiment is characterized in that the necessary contents (the resource) is previously transferred into the data cache DTCCH. Storing all of the necessary contents in the data cache DTCCH from a specified storage position at a predetermined timing enables simultaneously playback/display of a plurality of playback objects without interrupting playback/display for a user. A method of retrieving a storage position or a file name (a data name) of contents (a resource) to be transferred differs depending on types of corresponding contents, and the method is carried out in accordance with the following procedure.

In regard to a secondary video set SCDVS, retrieval is executed in the order of the playlist PLLST and the time map STMAP of the secondary video set.

In this embodiment, a secondary enhanced video object S-EVOB file name is written in the time map STMAP of the secondary video set, and secondary enhanced video object data S-EVOB can be retrieved from information of the time map STMAP of the secondary video set.

In regard to an advanced subtitle ADSBT or an advanced application ADAPL (including a playlist associated advanced application PLAPL or a title associated advanced application TTAPL), reference is made to an application resource element APRELE, a title resource element or src attribute information (source attribute information) in the application resource element APRELE (see FIGS. 54A and 54B, FIGS. 55A and 55B, FIGS. 63A to 63C, FIGS. 66A to 66C, FIG. 67, FIGS. 69A and 69B, FIG. 70 and FIG. 71).

That is, when a storage position of a resource (contents) is specified as the persistent storage PRSTR in the playlist PLLST, the corresponding resource (contents) is transferred to the data cache DTCCH from the corresponding persistent storage PRSTR via the persistent storage manager PRMNG (a line λ). Furthermore, information stored in the information storage medium DISC is transferred to the data cache DTCCH from the information storage medium DISC as indicated by a line κ. Moreover, when there is a description that a resource (contents) specified in the playlist PLLST is stored in the network server NTSRV, data is transferred to the data cache DTCCH from the corresponding network server NTSRV via the network manager NTMNG as indicated by a line μ. In this case, prior to data transfer 67 of the contents (the resource), the command 68 of a data transfer request is issued from the playlist manager PLMNG to the persistent storage manager PRMNG, the network manager NTMNG and a disk manager DKMNG although not shown (a line θ). At the last step, as indicated at S17 a plurality of playback/display objects are simultaneously displayed at a specified position in a screen based on information contents of management information (a playlist/a program) at a timing specified in the management information (titleTimeBegin/TTSTTM or titleTimeEnd/TTEDTM) (see FIGS. 11, 12 and 25). At this time, the command 68 (a line ν) is transmitted to the data cache DTCCH from the playlist manager PLMNG in the navigation manager NVMNG, and the command 68 of preliminary preparation is transmitted to a presentation engine PRSEN from the playlist manager PLMNG as indicated by a line ξ. Based on this, information of contents (a resource) previously stored in the data cache DTCCH is transferred toward the presentation engine PRSEN, and a playback/display object is displayed to a user (a line ο). Additionally, a primary video set PRMVS and some of secondary video sets SCDVS can be directly transferred from the information storage medium DISC to the presentation engine PRSEN without using the data cache DTCCH simultaneously with the above-described processing. This data transfer corresponds to a line ρ in FIGS. 3A and 3B. Further, some of secondary video sets SCDVS can be directly transferred to (a secondary video player SCDVP in) the presentation engine PRSEN from the persistent storage manager PRMNG without using the data cache DTCCH. This data transfer corresponds to a line π in FIGS. 3A and 3B, and the instruction command 68 of data transfer is issued from the playlist manager PLMNG to the persistent storage manager PRMNG prior to the data transfer 67 (a line ν). In this manner, the data transfer is carried out, and a plurality of playback/display objects can be simultaneously played back. When playback/display timing control information is provided to management information (a playlist PLLST/a program), a plurality of playback/display objects (including an advanced application ADAPL or an advanced subtitle ADSBT) including moving pictures (enhanced video object data EVOB) can be simultaneously played back/displayed without interruption. The data processing method and the data transfer method are mainly illustrated in FIGS. 3A and 3B, but this embodiment is not restricted thereto, and a scope of characteristics of this embodiment includes program description contents which describes a necessary possible timing or a storage position of a resource and can realize the data processing method or the data transfer method.

In order to meet the three needs shown in FIGS. 2A, 2B, and 2C, this embodiment innovates the XML and scripts and the concept of timeline in correspondence with the expression format in the PC world. However, by merely adopting such data structure, compatibility with the existing DVD-Video standards is lost. In order to meet the requirements of the users and the like described using FIGS. 2A, 2B, and 2C, network connection is needed, and it becomes difficult to provide a very inexpensive information playback apparatus to the user. Hence, this embodiment adopts an arrangement which can use the advanced content ADVCT which meets the requirements of the users and the like described using FIGS. 2A, 2B, and 2C, and the standard content STDCT which cannot meet the requirements of the users and the like described using FIGS. 2A, 2B, and 2C but can be played back by a very inexpensive information playback apparatus (without any precondition of Internet connection) while assuring the compatibility to the existing DVD-Video standards. This point is a large technical feature in this embodiment.

Note that the data structure of the standard content STDCT and that of the advanced content ADVCT will be described in detail later.

<Example of Content Playback Method>

Figure 15A:
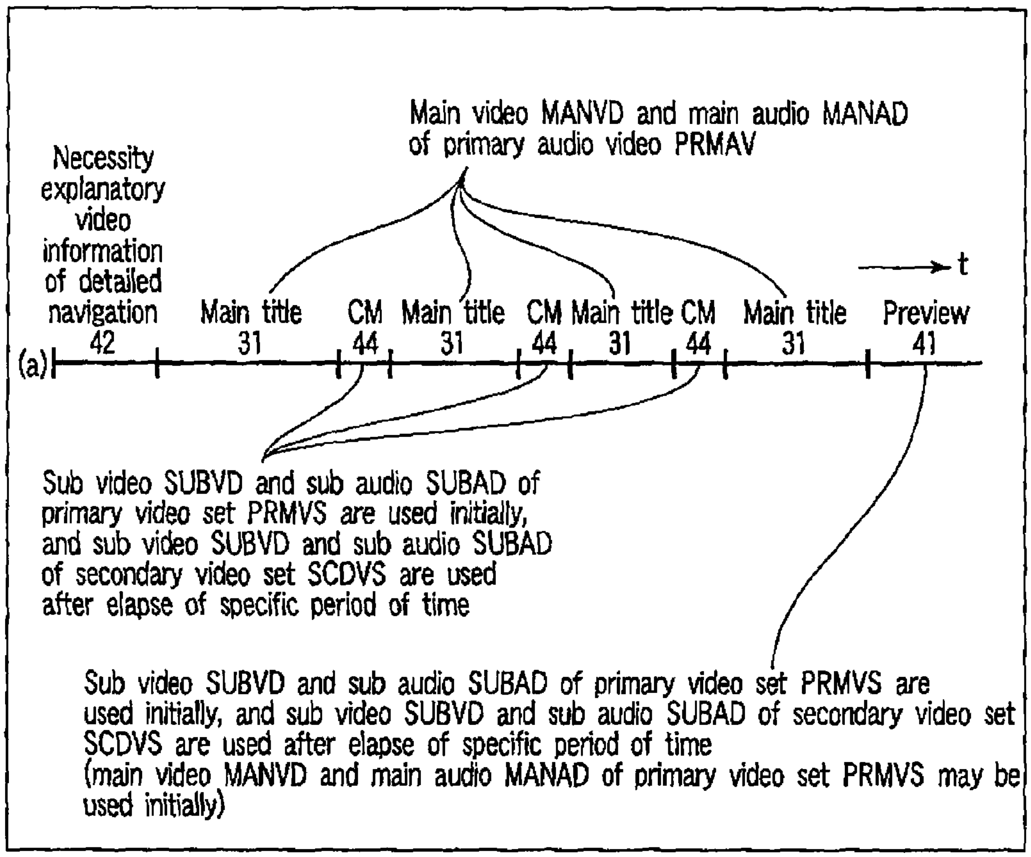
FIGS. 15A and 15B are exemplary views showing examples of video content playback methods by an information recording and playback apparatus.
Figure 15B:
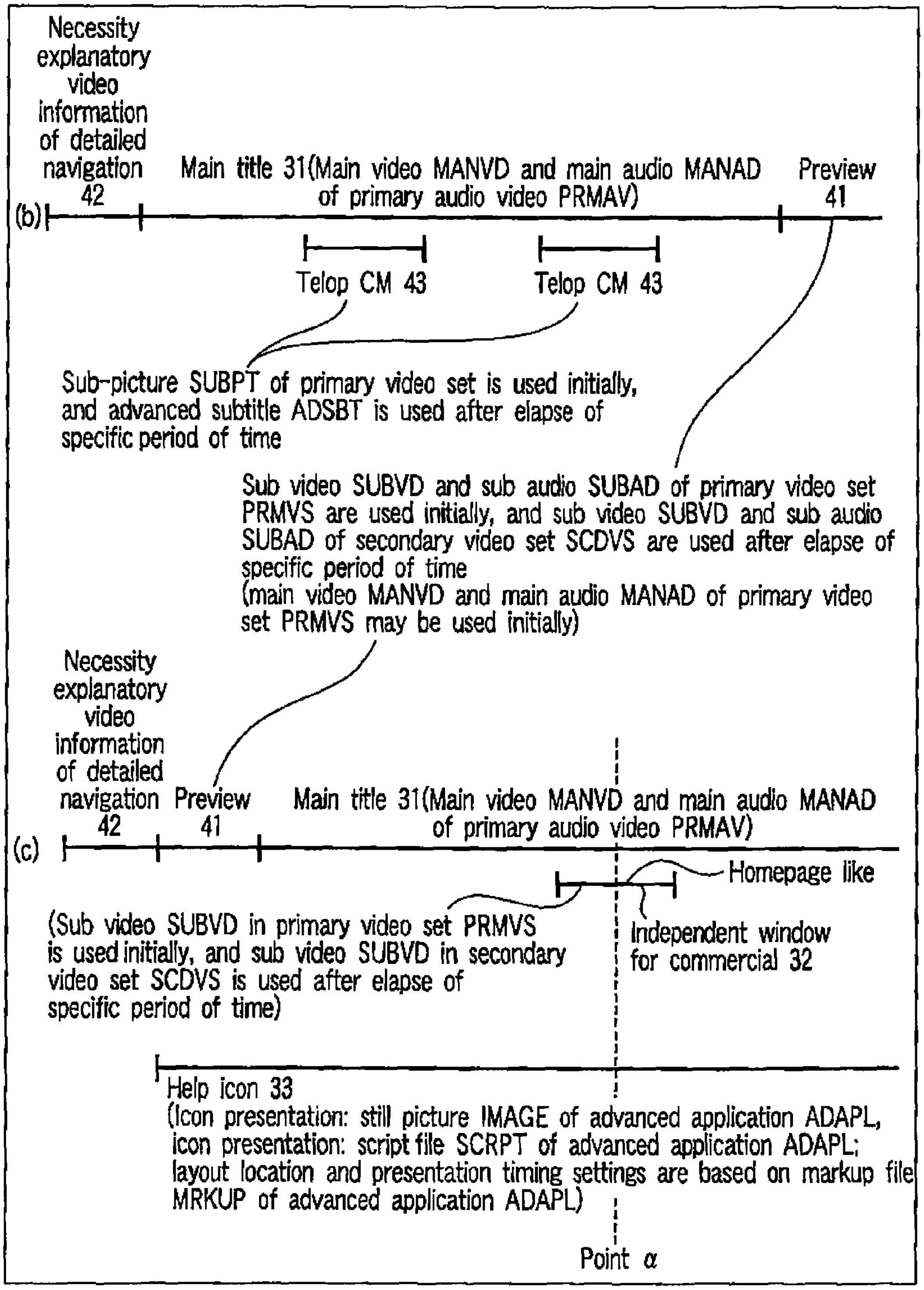

FIGS. 15A and 15B show examples of video content playback methods by the information recording and playback apparatus 1.

An example of a case is shown in FIG. 15A(a) wherein a main title 31 is presented like a television broadcast video information after video information 42 used to give an explanation of detailed navigation, commercial 44 for a product, service, or the like is presented to be inserted into the main title 31, a preview 41 of a movie is presented after completion of presentation of the main title 31.

An example of a case is shown in FIG. 15B(b) wherein a main title 31 is presented like a television broadcast video information after video information 42 used to give an explanation of detailed navigation, a commercial 43 in the form of a telop is presented to be superimposed on presentation of the main title 31, and a preview 41 of a movie is presented after completion of presentation of the main title 31.

An example of a case is shown in FIG. 15B(c) wherein a preview 41 of a movie is presented after video information 42 used to give an explanation of detailed navigation, a main title 31 is then presented, an independent window 32 for a commercial is presented on a presentation area different from the main title 31 during presentation of the main title 31, and a help icon 33 is presented on a presentation area different from the main title 31 during presentation of the preview 41 and main title 31.

Note that what kind of information is used to present the main title, commercial, preview, telop commercial, and the like will be described in detail later.

<Example of Presentation Window>

FIG. 16 shows an example of a presentation window at point α when the main title 31, the independent window 32 for a commercial, and the help icon 33 are simultaneously presented in FIG. 15B(c).

In the example of this presentation window, the main title 31 is presented as a moving picture of a main picture on the upper left area, the independent window 32 for a commercial is presented as a moving picture of a sub-picture on the upper right area, and the help icon 33 is presented as a still picture (graphic) on the lower area. Also, a stop button 34, play button 35, FR (fast-rewinding) button 36, pause button 37, FF (fast-forwarding) button 38, and the like are also presented as still pictures (graphics). In addition, a cursor (not shown) or the like is presented.

Note that what kind of information is used to present each individual moving picture or still picture on the presentation window will be described in detail later.

<Content Type>

This embodiment defines 2 types of contents; one is Standard Content and the other is Advanced Content. Standard Content consists of Navigation data and Video object data on a disc. On the other hand, Advanced Content consists of Advanced Navigation such as Playlist, Manifest, Markup and Script files and Advanced Data such as Primary/Secondary Video Set and Advanced Element (image, audio, text and so on). At least one Playlist file and Primary Video Set shall be located on a disc which has Advanced Content, and other data can be on a disc and also be delivered from a server.

More intelligible explanations will be provided below.

This embodiment defines two different types of contents, i.e., the standard content STDCT and the advanced content ADVCT. This point is a large technical feature in this embodiment.

The standard content STDCT of this embodiment includes enhanced video object EVOB which records video information itself and navigation data IFO which records management information of that enhanced video object. The standard content STDCT has a data structure obtained by purely extending the existing DVD-Video data structure.

By contrast, the advanced content ADVCT has a data structure which records various kinds of information to be described later.

Figure 4:
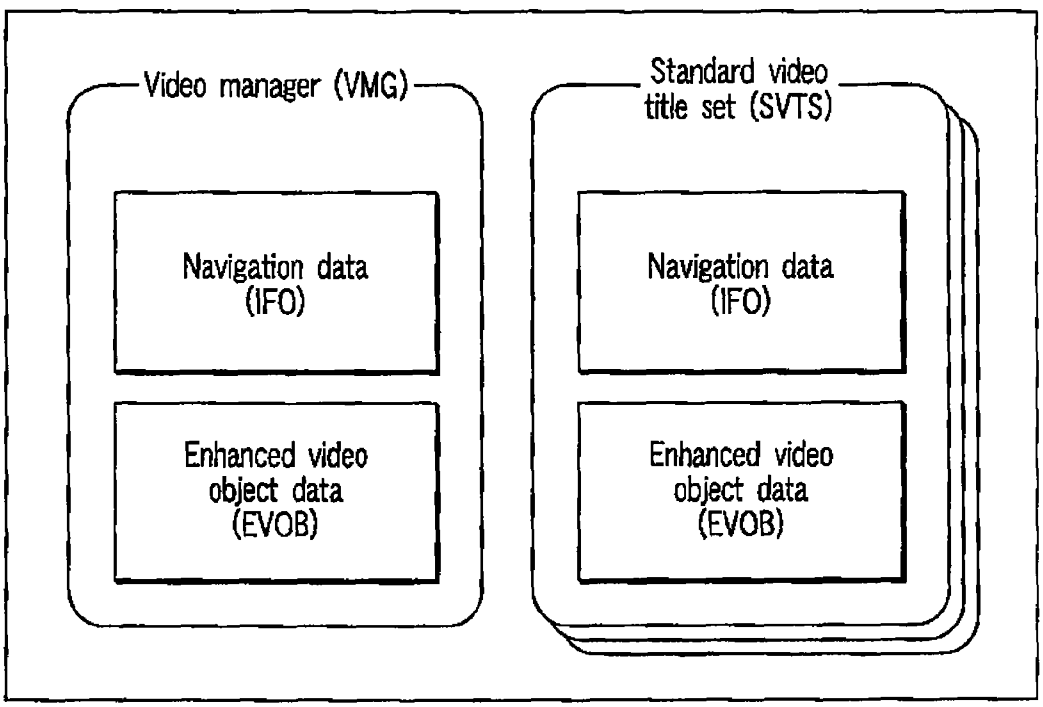
FIG. 4 shows an exemplary data structure of a standard content.

FIG. 4 shows the data structure of the standard content STDCT. FIGS. 12, 13A and 13B show the data structure of an advanced content and explanations of effects and the like. FIG. 10 shows the relationship among various objects in this embodiment. These figures will be referred to as needed in the following description.

<Standard Content>

Standard Content is just extension of content defined in DVD-Video specification especially for high-resolution video, high-quality audio and some new functions. Standard Content basically consists of one VMG space and one or more VTS spaces (which are called as "Standard VTS" or just "VTS"), as shown in FIG. 4. In comparison to the existing DVD-Video specification, this embodiment gives new functionalities. For instance,

- Extension of Video stream such as codec/resolution
- Extension of Audio stream such as codec/frequency/channel number
- Extension of Sub-picture stream/Highlight Information stream
- Extension of Navigation Command
- Elimination of some restrictions for FP_DOM/VMGM_DOM/VTSM_DOM
- Elimination of some restrictions for transition among domains
- Introduction of Resume Sequence, and so on More intelligible explanations will be provided below.

The data structure of the standard content STDCT will be described below using FIG. 4.

The standard content STDCT includes a video manager VMG that represents a menu frame, and a standard video title set SVTS that records video data.

The video manager VMG that records the menu frame includes enhanced video object EVOB that records video information itself, and navigation data IFO that records management data of that EVOB. The standard video title set SVTS includes enhanced video object EVOB that records video information itself and navigation data IFO that records management data of that EVOB.

The standard content STDCT represents an extended structure of the content specified by the conventional DVD-Video. Especially, new functionalities that improve the resolution of video data and the sound quality of audio data compared to the conventional DVD-Video are added. As shown in FIG. 4, the standard content STDCT consists of one video manager VMG space, and one or more video title set VTS spaces, which is called the standard video title set SVTS or VTS.

In comparison to the existing DVD-Video specification, this embodiment gives the following new functionalities.

- A new compression method which assures a high resolution for video information and a high compression efficiency is adopted.
- The number of channels of audio information is increased, and a higher sampling frequency is supported. An audio information compression method that assures high sound quality and a high compression efficiency is adopted.
- Sub-picture information are extended, and a new stream for highlight information is defined.
- Navigation command is extended.
- Some restrictions which are conventionally included in a first play domain that executes processing upon activation, a video manager domain that manages a menu image, and a video title set domain that executes processing upon playback of video information are eliminated, thus allowing more flexible expression.
- Some restrictions for transition among domains are eliminated, thus defining a more flexible expression environment.
- A new resume sequence function that represents processing upon pausing playback is added, and user's convenience after pausing is improved.

<Standard VTS>

Standard VTS is basically used in Standard Content, however this VTS may be utilized in Advanced Content via time map TMAP. The EVOB may contain some specific information for Standard Content, and such information as highlight information HLI and presentation control information PCI shall be ignored in Advanced Content.

More intelligible explanations will be provided below.

The standard video title set SVTS in this embodiment is basically used on the standard content STDCT described above. However, this standard video title set SVTS may be utilized in the advanced content ADVCT via a time map TMAP (to be described later).

The enhanced video object EVOB as object data used in the standard video title set SVTS may contain some pieces of specific information for the standard content STDCT. Some pieces of specific information contain, e.g., highlight information HLI and presentation control information PCI which are used in the standard content STDCT, but shall be ignored in the advanced content ADVCT in this embodiment.

<HDDVD_TS Directory>

"HDDVD_TS" directory shall exist directly under the root directory. All files related with Primary Video Set (i.e. a VMG, Standard Video Set(s) and an Advanced VTS) shall reside under this directory.

More intelligible explanations will be provided below.

The directory structure upon recording the standard content STDCT shown in FIG. 4 in the information storage medium DISC will be described below. In this embodiment, the standard content STDCT and the advanced content ADVCT (to be described later) are recorded in the HDDVD_TS directory together. The HDDVD_TS directory exists directly under the root directory of the information storage medium DISC. For example, all files related with a primary video set PRMVS (to be described later) such as the video manager VMG, standard video title set SVTS, and the like shall reside under this directory.

<Video Manager (VMG)>

A Video Manager Information (VMGI), an Enhanced Video Object for First Play Program Chain Menu (FP_PGCM_ EVOB), a Video Manager Information for backup (VMGI_ BUP) shall be recorded respectively as a component file under the HDDVD_TS directory. An Enhanced Video Object Set for Video Manager Menu (VMGM_EVOBS) which should be divided into up to 98 files under the HDDVD_TS directory. For these files of a VMGM_EVOBS, every file shall be allocated contiguously.

More intelligible explanations will be provided below.

Components of the video manager VMG shown in FIG. 4 will be described below. The video manager VMG basically include menu frame information and control information of the conventional DVD-Video. Under the aforementioned HDDVD_TS directory, video manager information VMGI, enhanced video object EVOB related with a menu FP_PGCM_EVOB which is to be presented first immediately after insertion of the information storage medium DISC, video manager information VMGI_BUP as backup data of the navigation data IFO of the video manager VMG, and the like are separately recorded as component files.

Under the HDDVD_TS directory, an enhanced video object set VMGM_EVOBS related with a video manager menu has a size of 1 GB or more, and these data shall be recorded while being divided into up to 98.

In a read-only information storage medium in this embodiment, all the files of the enhanced video object set VMGM_EVOBS of the video manager menu shall be allocated contiguously for the sake of convenience upon playback. In this manner, since the information of the enhanced video object set VMGM_EVOBS related with the video manager menu is recorded at one location together, data access convenience, data collection convenience, and high presentation speed can be assured.

<Standard Video Title Set (Standard VTS)>

A Video Title Set Information (VTSI) and a Video Title Set Information for backup (VTSI_BUP) shall be recorded respectively as a component file under the HDDVD_TS directory. An Enhanced Video Object Set for Video Title Set Menu (VTSM_EVOBS), and an Enhanced Video Object Set for Titles (VTSTT_EVOBS) may be divided into up to 99 files. These files shall be component files under the HDDVD_TS directory. For these files of a VTSM_EVOBS, and a VTSTT_EVOBS, every file shall be allocated contiguously.

More intelligible explanations will be provided below.

In this embodiment, video title set information VTSI and backup data VTSI_BUP of the video title set information shall be recorded respectively as a component file under the HDDVD_TS directory. The sizes of an enhanced video object set VTSM_EVOBS of a video title set menu and an enhanced video object set VTSTT_EVOBS of each title are allowed to exceed 1 GB. However, their data should be recorded while being divided into up to 99 files. As a result, each file size can be set to be 1 GB or less. These files shall be independent component files under the HDDVD_TS directory. Every file of the enhanced video object set VTSM_EVOBS of the video title set menu and the enhanced video object set VTSTT_EVOBS of each title shall be allocated contiguously, respectively. As a result, since data are recorded at one location, the data access convenience, speeding up, and easy data processing management can be attained, and these pieces of information for the user can be presented at high speed.

<Structure of Standard Video Title Set (VTS)>

A VTS is a collection of Tides. Each VTS is composed of control data referred to as Video Title Set Information (VTSI), Enhanced Video Object Set for the VTS Menu (VTSM_VOBS), Enhanced Video Object Set for Titles in a VTS (VTSTT_EVOBS) and backup control data (VISI_P).

The following rules shall apply to Video Title Set (VTS):

1) Each of the control data (VTSI) and the backup of control data (VTSI_BUP) shall be a single File.

2) Each of the EVOBS for the VTS Menu (VTSM_EVOBS) and the EVOBS for Titles in a VTS (VTSTT_ EVOBS) may be divided into Files, up to maximum of 99 respectively.

3) VTSI, VTSM_EVOBS (if present), VTSTT_EVOBS and VTSI_BUP shall be allocated in this order.

4) VTSI and VTSI_BUP shall not be recorded in the same ECC block.

5) Files comprising VTSM_EVOBS shall be allocated contiguously. Also files comprising VTSTT_EVOBS shall be allocated contiguously.

6) The contents of VTSI_BUP shall be exactly the same as VTSI completely. Therefore, when relative address information in VTSI_BUP refers to outside of VTSI_BUP, the relative address shall be taken as a relative address of VTSI.

7) VTS numbers are the consecutive numbers assigned to VTS in the Volume. VTS numbers range from '1' to '511' and are assigned in the order the VTS are stored on the disc (from the smallest LBN at the beginning of VTSI of each VTS).

8) In each VTS, a gap may exist in the boundaries among VTSI, VTSM_EVOBS (if present), VTSTT_EVOBS and VTSI_BUP.

9) In each VTSM_EVOBS (if present), each EVOB shall be allocated in contiguously.

10) In each VTSTT_EVOBS, each EVOB shall be allocated in contiguously.

11) VTSI and VTSI_BUP shall be recorded respectively in a logically contiguous area which is composed of consecutive LSNs.

More intelligible explanations will be provided below.

The video title set VTS is a collection of a set of video titles. This video title set includes video title set information VTSI as control information related with the video title set, an enhanced video object set VTSM_EVOBS of a video title set menu, an enhanced video object set (video information itself) VTSTT_EVOBS of each title, and backup data VTSI_BUP of the video title set information.

In this embodiment, the following rules shall apply to the video title set VTS.

1) Each of the video title set information VTSI that records control information, and the backup data VTSI_BUP of the video title set information shall be recorded in a single file of 1 GB or less.

2) The enhanced video object set VTSM_EVOBS of the video title set menu and the enhanced video object set (video information itself) VTSTT_EVOBS of each title shall be recorded while being divided into files, up to maximum of 99 respectively, per information storage medium DISC, each having a size of 1 GB or less.

3) The video title set information VTSI, the enhanced video object set VTSM_EVOBS of the video title set menu, the enhanced video object set (video information itself) VTSTT_EVOBS of each title, and the backup data VTSI_BUP of the video title set information shall be allocated in this order.

4) The video title set information VTSI and the backup data VTSI_BUP of the video title set information shall not be recorded in one ECC block together. That is, the video title set information VTSI and the backup data VTSI_BUP of the video title set information are recorded contiguously, but the boundary position of them is inhibited from being allocated at the center of a single ECC block. That is, when the boundary portion of these data is allocated in the single ECC block, if that ECC block cannot be played back due to any defect, both pieces of information cannot be played back. Therefore, padding information is recorded in the residual area in the ECC block at the end position of the video title set information VTSI to allocate the head of the next backup data VTSI_BUP of the video title set information at the head position of the next ECC block, thus avoiding both the data from being recorded in the single ECC block. This point is a large technical feature in this embodiment. With this structure, not only the reliability of data playback can be greatly improved, but also the playback processing upon data playback can be facilitated.

5) A plurality of files comprising the enhanced video object set VTSM_EVOBS of the video title set menu shall be recorded contiguously on the information storage medium DISC. Also, a plurality of files comprising the enhanced video object set (video information itself) VTSTT_EVOBS of each title shall be recorded contiguously. Since the files are allocated contiguously, respective pieces of information can be played back at a time by a single continuous playback operation of an optical head upon playback (the need for jumping processing of the optical head is obviated). In this way, easy processing of various kinds of information upon data playback can be assured, and the time from when data playback until presentation can be shortened.

6) The contents of the backup data VTSI_BUP of the video title set information shall be exactly the same as the video title set information VTSI completely. Therefore, if the video title set information VTSI as management information cannot be played back due to an error, video information can be stably played back by playing back the backup data VTSI_BUP of the video title set information.

7) The video title set VTS numbers are the consecutive numbers assigned to the video title sets VTS recorded in a volume space. The numbers of respective video title sets VTS ranges numbers 1 to 511 and are assigned in ascending order of logical block number LBN as the address in the logical space indicating the allocation position of the video title set VTS recorded on the information storage medium DISC.

8) In each video title set VTS, gap may exist in boundary areas between neighboring ones of the video title set information VTSI, the enhanced video object set VTSM_EVOBS of the video title set menu, the enhanced video object set (video information itself) VTSTT_EVOBS of each title in the video title set VTS, and the backup data VTSI_BUP of the video title set information. More specifically, the aforementioned four types of information are allocated in different ECC blocks, thus assuring high reliability and easy playback processing of data upon playback, and speeding up of processing. For this reason, this embodiment is designed as follows. That is, when the recording position of the last data of each information ends at the middle of one ECC block, padding information is recorded in the residual area, so that the head position of the next information matches that of the next ECC block. The part of the padding information in the ECC block will be referred to as a gap in this embodiment.

9) In the enhanced video object set VTSM_EVOBS of each video title set menu, enhanced video object EVOB shall be allocated in contiguously on the information storage medium DISC. Thus, the convenience of playback processing can be improved.

10) In the enhanced video object set (video information itself) VTSTT_EVOBS of each title in the video title set VTS, respective enhanced video objects shall be allocated in contiguously on the information storage medium DISC. In this manner, the convenience of information playback can be assured, and the time required until playback can be shortened.

11) The video title set information VTSI and the backup data VTSI_BUP of the video title set information shall be recorded respectively in a logically contiguous areas defined by serial logical block numbers LSN which represent the address positions on the information storage medium DISC. In this way, the information can be read by single continuous playback (without any jumping processing), thus assuring the convenience of playback processing and speeding up of processing.

<Structure of Video Manager (VMG)>

The VMG is the table of contents for Standard Video Title Sets which exist in the "HD DVD-Video zone". A VMG is composed of control data referred to as Video Manager Information (VMGI), Enhanced Video Object for First Play PGC Menu (FP_PGCM_EVOB), Enhanced Video Object Set for VMG Menu (VMGM_EVOBS) and a backup of the control data (VMGI_BUP). The control data is static information necessary to playback titles and providing information to support User Operation. The FP_PGCM_EVOB is an Enhanced Video Object (EVOB) used for the selection of menu language. The VMGM_EVOBS is a collection of Enhanced Video Objects (EVOBs) used for Menus that support the volume access.

The following rules shall apply to Video Manager (VMG):

1) Each of the control data (VMGI) and the backup of control data (VMGI_BUP) shall be a single File.

2) EVOB for FP PGC Menu (FP_PGCM_EVOB) shall be a single File. EVOBS for VMG Menu (VMGM_EVOBS) may be divided into Files, up to maximum of 98.

3) VMGI, FP_PGCM_EVOB (if present), VMGM_EVOBS (if present) and VMGI_BUP shall be allocated in this order.

4) VMGI and VMGI_BUP shall not be recorded in the same ECC block.

5) Files comprising VMGM_EVOBS shall be allocated contiguously.

6) The contents of VMGI_BUP shall be exactly the same as VMGI completely. Therefore, when relative address information in VMGI_BUP refers to outside of VMGI_BUP, the relative address shall be taken as a relative address of VMGI.

7) A gap may exist in the boundaries among VMGI, FP_PGCM_EVOB (if present), VMGM_EVOBS (if present) and VMGI_BUP.

8) In VMGM_EVOBS (if present), each EVOB shall be allocated contiguously.

9) VMGI and VMGI_BUP shall be recorded respectively in a logically contiguous area which is composed of consecutive LSNs.

More intelligible explanations will be provided below.

The video manager VMG is the table of contents for the standard video title set SVTS, and is recorded in an HDDVD-Video zone to be described later. Constituent elements of the video manager VMG are control information as video manager information VMGI, a menu FP_PGCM_EVOB which is to be presented first immediately after insertion of the information storage medium DISC, an enhanced video object set VMGM_EVOBS of a video manager menu, and backup data VMGI_BUP of control information as the video manager information VMGI. The control information as the video manager information VMGI records information required to play back each title, and information used to support user's operations. The menu FP_PGCM_EVOB which is to be presented first immediately after insertion of the information storage medium DISC is used to select a language presented in the menu. That is, the user himself or herself selects an optimal menu language immediately after insertion of the information storage medium DISC, thus presenting various menu frames using the best understandable language. The enhanced video object set VMGM_EVOBS related with the video manager menu is a collection of the enhanced video objects EVOBs used for in menus that support volume access. That is, information of a menu frame (a frame provided as independent information for each individual language) presented in the language selected by the user is recorded as the enhanced video object set.

In this embodiment, the following rules shall apply to the video manager VMG.

1) Each of the video manager information VMGI and the backup file VMGI_BUP of the video manager information shall be recorded in the information storage medium DISC to have each file size of 1 GB or less.

2) The enhanced video object EVOB of the menu FP_PGCM_EVOB which is to be presented first immediately after insertion of the information storage medium DISC shall be divisionally recorded in the information storage medium DISC to have each file size of 1 GB or less. The enhanced video object set VMGM_EVOBS of the video manager menu is divisionally recorded to have each file size of 1 GB or less, and the number of files of the enhanced video object set VMGM_EVOBS of the video manager menu recorded per information storage medium DISC is set to be 98 or fewer. Since the data size of one file is set to 1 GB or less, a buffer memory can be easily managed, and data accessibility is improved.

3) The video manager information VMGI, the menu FP_PGCM_EVOB which is to be presented first immediately after insertion of the information storage medium DISC, the enhanced video object set VMGM_EVOBS of the video manager menu, and the backup file VMGI_BUP of the video manager information shall be allocated in this order on the information storage medium DISC.

4) The video manager information VMGI and the backup file VMGI_BUP of the video manager information shall not be recorded in a single ECC block.

Since the video manager information VMGI, the menu FP_PGCM_EVOB which is to be presented first immediately after insertion of the information storage medium DISC, and the enhanced video object set VMGM_EVOBS of the video manager menu are optional, they are not often recorded on the information storage medium DISC. In such case, the video manager information VMGI and the backup file VMGI_BUP of the video manager information may be contiguously allocated in turn. This means that the boundary position of the video manager information VMGI and the backup file VMGI_BUP of the video manager information is not allocated at the center of one ECC block. Basically, information is played back from the information storage medium for each ECC block. For this reason, if the boundary position of both pieces of information is recorded in the single ECC block, not only the convenience of data processing of playback information is impaired, but also if an error occurs in the ECC block which stores the boundary portion to disable playback, both the video manager information VMGI and the backup file VMGI_BUP of the video manager information cannot often be played back. Therefore, when the boundary portion of both the pieces of information is allocated at that of ECC blocks, the superiority of processing upon playback is assured. Even when one of these ECC blocks includes many errors and cannot be played back, information can be restored and played back using the residual data. Therefore, by setting the boundary of both the pieces of information to that between neighboring ECC blocks, the data playback reliability of the video manager information VMGI can be improved.

5) Files comprising the enhanced video object set VMGM_EVOBS of the video manager menu that represents menu information shall be allocated contiguously. As described above, the data size of the enhanced video object set VMGM_EVOBS of the video manager menu is allowed to exceed 1 GB. In this embodiment, it is specified to divisionally record the data of the enhanced video object set VMGM_EVOBS of the video manager menu in a plurality of files to have each file size of 1 GB or less. The divided files are required to be recorded contiguously on the information storage medium DISC. In this way, all enhanced video object sets of the video manager menu can be fetched by single continuous playback, thus assuring high reliability of playback control and speeding up of presentation processing for the user.

6) The contents of the backup file VMGI_BUP of the video manager information shall be exactly the same of the video manager information VMGI completely.

7) A gap may exist in the boundary positions between neighboring ones of video manager information VMGI, the menu FP_PGCM_EVOB which is to be presented first immediately after insertion of the information storage medium DISC, the enhanced video object set VMGM_EVOBS of the video manager menu, and the backup file VMGI_BUP of the video manager information. As described in 4), when information of each data is recorded together for each ECC block, the position of the last data may have a difference from the boundary position of ECC blocks, and a residual area may be formed in the ECC block. This residual area is called a gap. Since existence of the gap areas is allowed in this way, each information can be recorded for respective ECC blocks. As a result, the convenience upon playback and the reliability upon data playback can be assured, as described above.

8) Each enhanced video object EVOB in the enhanced video object set VMGM_EVOBS of the video manager menu shall be allocated contiguously. As described above, the enhanced video object set VMGM_EVOBS of the video manager menu can have a size which exceeds 1 GB, and can be divisionally recorded in files of 1 GB or less. This means that the divided files are recorded contiguously on the information storage medium DISC. As a result, the enhanced video object set VMGM_EVOBS of the video manager menu can be read together by a single playback operation, thus assuring the convenience of the playback processing and shortening the time required for presentation for the user.

9) When the menu FP_PGCM_EVOB which is to be presented first immediately after insertion of the information storage medium DISC and the enhanced video object set VMGM_EVOBS of the video manager menu do not exist, the video manager information VMGI and the backup file VMGI_BUP of the video manager information shall be recorded respectively in continuous areas defined by continuous logical sector numbers. In this manner, the playback convenience of the video manager information VMGI and the backup file VMGI_BUP of the video manager information can be improved.

<Structure of Enhanced Video Object Set (EVOBS) in Standard Content>

The EVOBS is a collection of Enhanced Video Object which is composed of data on Video, Audio, Sub-picture and the like.

The following rules shall apply to EVOBS:

1) In an EVOBS, EVOBs are to be recorded in Contiguous Block and Interleaved Block.

2) An EVOBS is composed of one or more EVOBs. EVOB_ID numbers are assigned from the EVOB with the smallest LSN in EVOBS, in ascending order starting with one (1).

3) An EVOB is composed of one or more Cells. C_ID numbers are assigned from the Cell with the smallest LSN in an EVOB, in ascending order starting with one (1).

4) Cells in EVOBS may be identified by the EVOB_ID number and the C_ID number.

5) An EVOB shall be allocated in ascending order in logical sector number contiguously (without any gaps).

More intelligible explanations will be provided below.

The enhanced video object set EVOBS is a collection of the enhanced video object EVOB, which is composed of data on video, audio, sub-picture, and the like. In this embodiment, the following rules shall apply to the enhanced video object set EVOBS.

1) In the enhanced video object set EVOBS, enhanced video objects EVOBs are to be recorded in contiguous blocks and interleaved blocks.

2) An enhanced video object set EVOBS is composed of one or more enhanced video objects EVOBs.

3) ID numbers EVOB_ID assigned to respective enhanced video object EVOB are assigned in ascending order of logical sector number LSN, which indicates the recording address of enhanced video object EVOB on the information storage medium DISC. The first number is "1", and is incremented in turn.

One enhanced video object EVOB is composed of one or more cells. As ID numbers C_ID set for respective cells, numerals which are incremented in turn to have a minimum value "1" in ascending order of logical sector number LSN which indicates the recording location of each cell on the information storage medium DISC are set.

4) Respective cells in the enhanced video object set EVOBS may be individually identified by the ID number EVOB_ID assigned to the enhanced video object EVOB and the ID numbers C_ID set for respective cells.

<Category of Information Storage Medium>

In this embodiment, for example, as video information and its management information to be recorded on the information storage medium DISC, two different types of contents, i.e., the advanced content ADVCT and standard content STDCT are set. By providing the advanced content ADVCT, the requirements of the user who wants to assure flexible and diversified expressions, easy processing of video related information of network actions, and easy transmission of information after processing, can be satisfied. By providing the standard content STDCT at the same time, the data compatibility to the conventional DVD-Video can be assured, and even an inexpensive information playback apparatus without any precondition of network connection can play back video information of this embodiment. This point is a large technical feature in this embodiment.

Figure 5:
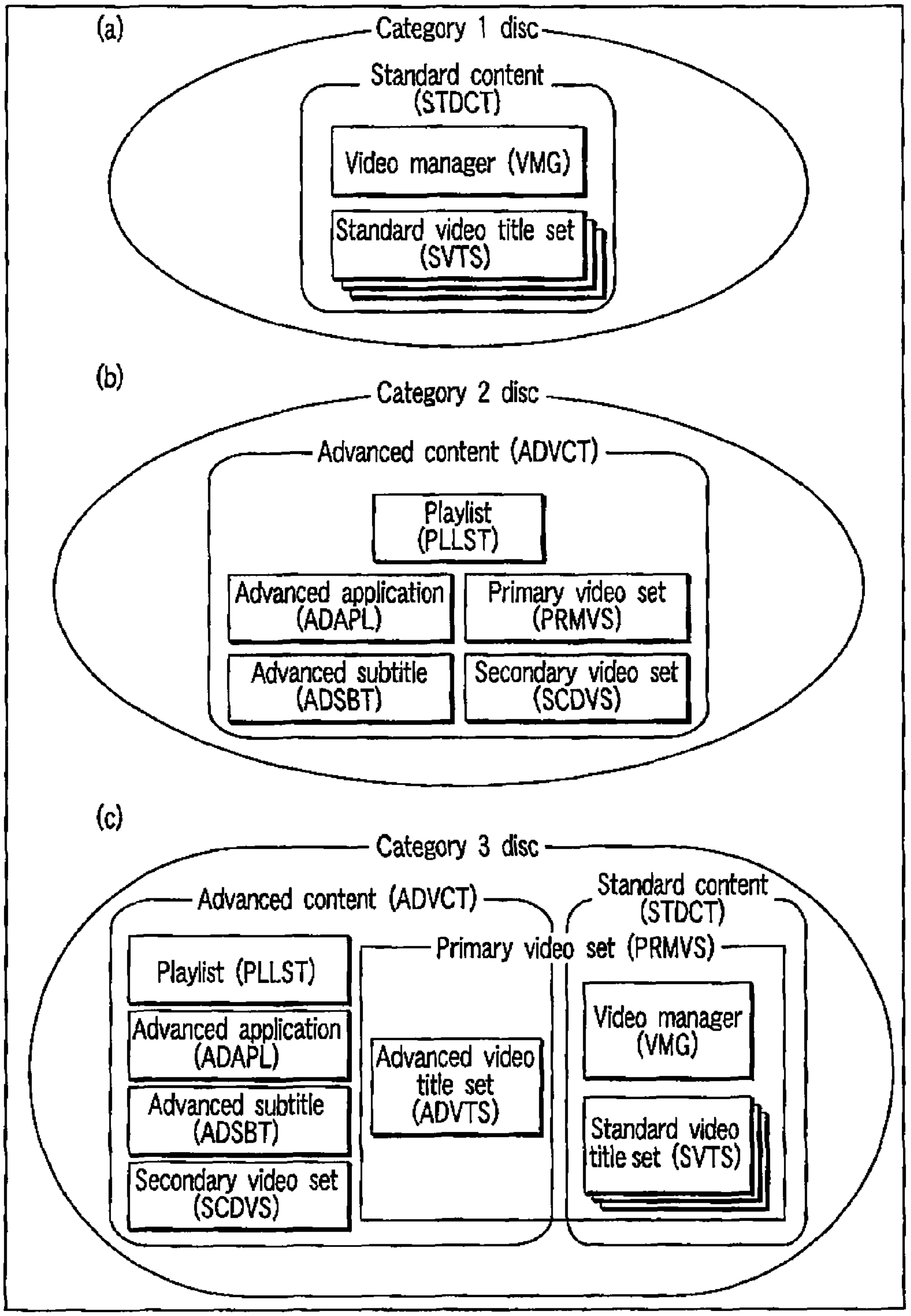
FIG. 5 is an exemplary view showing various categories of information storage media.

As shown in FIG. 5, information storage media DISC corresponding to three different categories are defined as the information storage media DISC that record respective contents. That is, as shown in FIG. 5(*a*), a medium which records only information of the standard content STDCT as data to be recorded in the information storage medium DISC compliant to category 1 is defined. The information storage medium DISC compliant to category 1 can be played back by both an inexpensive information playback apparatus without any precondition of network connection and an advanced information playback apparatus premised on network connection.

An information storage medium DISC which records only advanced content ADVCT as data recorded in an information storage medium compliant to category 2 is defined, as shown in FIG. 5(*b*). The information storage medium DISC compliant to category 2 can be played back by only an advanced information playback apparatus premised on network connection. Furthermore, as shown in FIG. 5(*c*), an information storage medium DISC compliant to category 3 that records identical video information in both the formats of the advanced content ADVCT and standard content STDCT is defined. This point is a large technical feature of this embodiment. Using the information storage medium DISC compliant to category 3, an advanced information playback apparatus having a network connection function can play back the advanced content ADVCT, and an inexpensive information playback apparatus without any precondition of network connection can play back the standard content STDCT. Hence, the contents optimal to every models can be presented (provided) to the user.

<Category 1 Disc>

This disc contains only Standard Content which consists of one VMG and one or more Standard VTSs. This disc contains no Advanced Content such as a Playlist, Advanced VTS and so on. As for an example of structure, see FIG. 5(*a*).

More intelligible explanations will be provided below.

The information storage medium DISC compliant to category 1 shown in FIG. 5(*a*) records the standard content STDCT which consists of one video manager VMG which forms a menu frame, and one or more standard video title sets SVTS that manage video information. No information of the advanced content ADVCT is recorded on this information storage medium DISC.

<Category 2 Disc>

This disc contains only Advanced Content which consists of Playlist, Primary Video Set (only Advanced VTS), Secondary Video Set and Advanced Subtitle. This disc contains no Standard Content such as VMG or Standard VTS. As for an example of structure, see FIG. 5(*b*).

More intelligible explanations will be provided below.

The information storage medium DISC compliant to category 2 shown in FIG. 5(*b*) records only the advanced content ADVCT, and does not record any standard content STDCT.

<Category 3 Disc>

This disc contains both Advanced Content which consists of Playlist, Advanced VTS in Primary Video Set, Secondary Video Set, Advanced Application and Advanced Subtitle and Standard Content which consists of one or more Standard VTSs in Primary Video Set. That is, neither FP_DOM nor VMGM_DOM should exist in this Primary Video Set. Even though FP_DOM and VMGM_DOM may exist on a disc, some navigation command to transit to FP_DOM or VMGM_DOM shall be ignored by a player. As for an example of structure, see FIG. 5(*c*). Even though this disc contains Standard Content, basically this disc follows rules for the Category 2 disc. Standard Content may be referred by Advanced Content with cancellations of some functions. In addition, for playback of this disc, there are kinds of state such as Advanced Content Playback State and Standard Content Playback State, and the transition between the states is allowed.

More intelligible explanations will be provided below.

Figure 9:
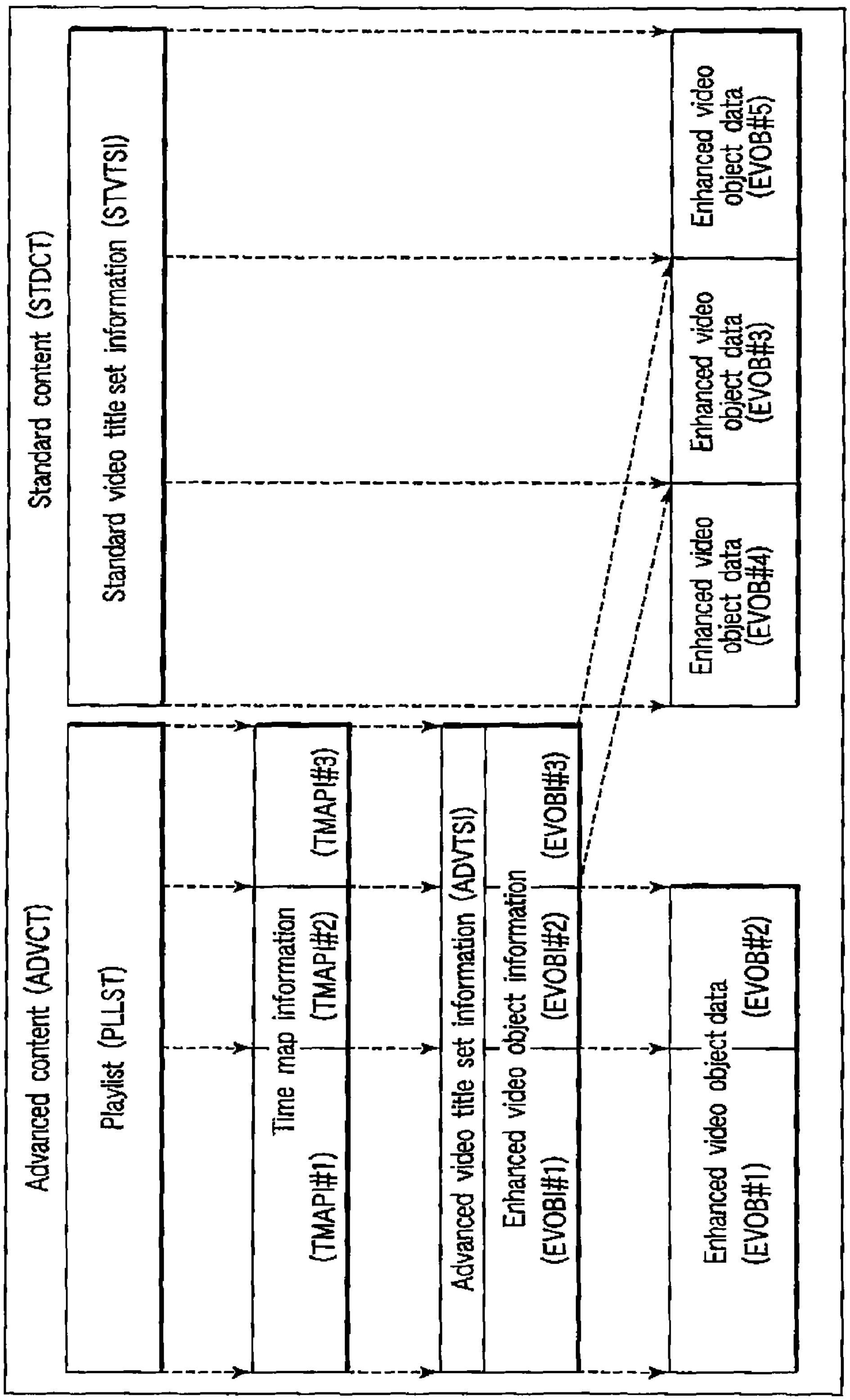
FIG. 9 is an exemplary view showing different access methods to two different types of contents.

The information storage medium DISC compliant to category 3 shown in FIG. 5(*c*) records the advanced content ADVCT and standard content STDCT. In the information storage medium DISC compliant to category 3, a primary video set PRMVS (to be described later) is defined. In the primary video set PRMVS, neither a first play domain FP_DOM corresponding to a frame to be presented immediately after insertion of the information storage medium DISC nor a video manager menu domain VMGM_DOM that presents a menu is defined in the primary video set PRMVS. However, the first play domain FP_DOM and video manager menu domain VMGM_DOM may exist in an area other than the primary video set PRMVS in the information storage medium DISC compliant to category 3. Furthermore, an information playback apparatus shall ignore a navigation command to transit to the first play domain FP_DOM or the video manager domain VMGM_DOM. The first play domain FP_DOM corresponding to a frame to be presented immediately after insertion of the information storage medium DISC and the video manager domain VMGM_DOM are basically required in a menu operation in the standard content STDCT. However, in this embodiment, as shown in FIG. 9 or 6, menu processing is executed in the advanced content ADVCT to refer to the standard video title set SVTS which records video information in the standard content STDCT as needed. In this way, by inhibiting jump to the first play domain FP_DOM of a menu presented immediately after insertion of the information storage medium DISC and the video manager domain VMGM_DOM, the menu processing on the advanced content ADVCT can always be assured, thus avoiding confusion to the user. Even though the information storage medium DISC compliant to category 3 contains the standard content STDCT, basically this information storage medium DISC follows rules for the information storage medium DISC compliant to category 2 shown in FIG. 5(*b*).

<Primary Video Set>

Primary Video Set in Advanced Content consists of Advanced VTS space, Standard VTS space and VMG. Basically Advanced VTS is used only in Advanced Content, and Standard VTS may be used in Advanced Content even though this VTS is mainly used for Standard Content. In Advanced Content, VMG may exist in Primary Video Set, however the transition to VMGM_DOM or FP_DOM is not allowed. The data for Primary Video Set is located on a disc under HDDVD_TS directory.

More intelligible explanations will be provided below.

The contents of the primary video set PRMVS shown in FIG. 5(*c*) will be described below. The primary video set PRMVS in the advanced content ADVCT includes an advanced video title set ADVTS, a standard video title set SVTS, and a video manager VMG. These video title sets are mainly used in the standard content STDCT. However, the advanced video title set ADVTS is used only in the advanced content ADVCT, and the standard video title set SVTS may be used in the advanced content ADVCT. In the advanced content ADVCT, the video manager VMG in the primary video set PRMVS may exist. However, during use of the advanced content ADVCT, the transition to the aforementioned video manager menu domain VMGM_DOM and first play domain FP_DOM is inhibited. The first play domain FP_DOM corresponding to a frame to be presented immediately after insertion of the information storage medium DISC and the video manager domain VMGM_DOM are basically required in a menu operation in the standard content STDCT. However, in this embodiment, as shown in FIG. 9 or 6, the menu processing is executed in the advanced content ADVCT to refer to the standard video title set SVTS which records video information in the standard content STDCT as needed. In this way, by inhibiting the transition to the first play domain FP_DOM of a menu presented immediately after insertion of the information storage medium DISC and the video manager domain VMGM_DOM, the menu processing on the advanced content ADVCT can always be assured, thus effectively avoiding confusion to the user. The primary video set PRMVS are recorded in the information storage medium DISC compliant to category 3. The primary video set PRMVS is allocated in the HDDVD_TS directory described above as the data structure to be recorded. However, the embodiment of the invention is not limited to this, and the primary video set PRMVS may be recorded in the persistent storage.

At least the primary video set PRMVS and at least one playlist PLLST (details will be described later) shall be recorded in the information storage medium DISC compliant to category 2 or 3. Other pieces of information related with the advanced content ADVCT described in FIGS. 6 and 7 shall be located in on information storage medium DISC but can be delivered from a server via the network.

<Structure of Volume Space>

The Volume Space of an HD DVD-Video disc consists of

1) The Volume and File structure, which shall be assigned for the UDF structure.

2) Single "HD DVD-Video zone", which shall be assigned for the data structure of HD DVD-Video format. This zone consists of "Standard Content zone" and "Advanced Content zone".

3) "DVD others zone", which may be used for other than HD DVD-Video applications.

The following rules apply for HD DVD-Video zone.

1) "HD DVD-Video zone" shall consist of a "Standard Content zone" in Category 1 disc.

"HD DVD-Video zone" shall consist of an "Advanced Content zone" in Category 2 disc.

"HD DVD-Video zone" shall consist of both a "Standard Content zone" and an "Advanced Content zone" in Category 3 disc.

2) "Standard Content zone" shall consist of single Video Manager (VMG) and at least 1 with maximum 511 Video Title Set (VTS) in Category 1 disc and Category 3 disc. "Standard Content zone" should not exist in Category 2 disc.

3) VMG shall be allocated at the leading part of "HD DVD-Video zone" if it exists, that is Category 1 disc case.

4) VMG shall be composed of at least 2 with maximum 102 files.

5) Each VTS (except Advanced VTS) shall be composed of at least 3 with maximum 200 files.

6) "Advanced Content zone" shall consist of files supported in Advanced Content with an Advanced VTS. The maximum number of files for Advanced Content zone under ADV_OBJ directory is 512×2047.

7) Advanced VTS shall be composed of at least 3 with maximum 5995 files.

More intelligible explanations will be provided below.

The recording locations of the advanced content ADVCT and standard content STDCT recorded in the information storage medium DISC will be described below using FIG. 5(*c*). In the following description, a medium in which the recording location of only the advanced content ADVCT is set corresponds to the information storage medium DISC shown in FIG. 5(*b*), and a medium in which the recording location of only the standard content STDCT corresponds to the information storage medium DISC of category 1 shown in FIG. 5(*a*). A space that records each content on the information storage medium DISC, as shown in FIG. 5(*c*), is defined as a volume space, and logical sector numbers LSN are assigned to all locations in the volume space. In this embodiment, the volume space is formed of the following three zones.

1) Zone that Describes the Volume and File Structure (File System Management Information Recording Area)

This zone is defined as an area that records management information of a file system, although it is not described in FIG. 5(*c*). In this embodiment, a file system compliant to uniform disc format (UDF) is built. The above zone indicates a zone which records management information of that file system.

2) Single HD_DVD-Video Zone

This zone records data in this embodiment described in FIG. 5(*c*). This zone consists of a zone that records the advanced content ADVCT, and a zone that records the standard content STDCT.

Other DVD related information recording zone.

3) DVD Others Zone

This zone records DVD related information other than information used in the HD_DVD-Video of this embodiment. This zone can record information related with the HD_DVD-Video recording standards and information related with the existing DVD-Video and DVD-Audio standards.

In this embodiment, the following rules apply for the HD_DVD-Video zone described in 2) above and FIG. 5(*c*).

1) The information storage media compliant to categories 1 and 3 can record information of one video manager VMG and 1 to 511 video title sets VTS in the recording area of the standard content STDCT. The information storage medium DISC compliant to category 2 cannot set the recording area of the standard content STDCT.

2) In the information storage medium DISC compliant to category 1, the video manager VMG shall be recorded at the first location in the HD_DVD-Video recording area.

3) The video manager VMG shall be composed of 2 with maximum 102 files.

4) Each video title set VTS except the advanced video title sets ADVTS shall be composed of at least 3 with maximum 200 files.

5) The recording area of the advanced content ADVCT shall consists of files supported in the advanced content ADVCT with an advanced video title set ADVTS. The maximum number of files for advanced content ADVCT to be recorded in the recording area is 512×2047.

6) The advanced video title set ADVTS shall be composed of 3 with 5995 files.

<Transition Upon Playback>

The transitions upon playback of the advanced content ADVCT and upon playback of the standard content STDCT will be explained below using FIG. 6. The information storage medium DISC compliant to category 3 shown in FIG. 5(*c*) has a structure that can independently play back the advanced content ADVCT and standard content STDCT. When the information storage medium DISC compliant to category 3 is inserted into an advanced information playback apparatus having an Internet connection function, the playback apparatus reads advanced navigation data ADVNV included in the advanced content ADVCT in an initial state INSTT. After that, the playback apparatus transits to an advanced content playback state ADVPS. The same processing applies when the information storage medium DISC compliant to category 2 shown in FIG. 5(*b*) is inserted. In the advanced content playback state ADVPS shown in FIG. 6, a playback situation can transit to a standard content playback state STDPS by executing a command MSCMD corresponding to a markup file MRKUP or script file SCRPT. In the standard content playback state STDPS, the playback situation can return to the advanced content playback state ADVPS by executing a command NCCMD of navigation commands set in the standard content STDCT.

In the standard content STDCT, system parameters which record information, e.g., the presentation angle numbers, playback audio numbers, and the like that are set by the system as in the existing DVD-Video standards are defined. In this embodiment, the advanced content ADVCT can play back data to be set in the system parameter or can change the system parameter values in the advanced content playback state ADVPS. In this manner, compatibility to the existing DVD-Video playback can be assured. Independently of the transition direction between the advanced content playback state ADVPS and the standard content playback state STDPS, the consistency of the setting values of the system parameters can be maintained in this embodiment.

When an arbitrary transition is made according to user's favor between the advanced content ADVCT and standard content STDCT in the information storage medium DISC compliant to category 3 shown in FIG. 5(*c*), since the system parameter values have consistency, as described above, for example, the same presentation language is used before and after transition, and the user's convenience upon playback can be assured.

<Medium Identification Processing Method>

FIG. 7 shows a medium identification processing method by the information playback apparatus of this embodiment when three different types of information storage media DISC shown in FIG. 5 are mounted.

When the information storage medium DISC is mounted on a high-end information playback apparatus having a network connection function, the information playback apparatus determines if the information storage medium DISC is compliant to HD_DVD (step S11). In case of the information storage medium DISC compliant to HD_DVD, the information playback apparatus goes to find a playlist file PLLST recorded in an advanced content directory ADVCT located directly under the root directory shown in FIG. 11 and determines if the information storage medium DISC is compliant to category 2 or 3 (step S12). If the playlist file PLLST is found, the information playback apparatus determines that the information storage medium DISC is compliant to category 2 or 3, and plays back the advanced content ADVCT (step S13). If the playlist file PLLST is not found, the information playback apparatus checks the video manager ID number VMGM_ID recorded in the video manager information VMGI in the standard content STDCT and determines if the information storage medium DISC is compliant to category 1 (step S14). In case of the information storage medium DISC compliant to category 1, the video manager ID number VMGM_ID is recorded as specific data, and it can be identified based on the information in a video manager category VMG_CAT that the standard content STDCT compliant to category 1 alone is recorded. In this case, the standard content STDCT is played back (step S15). If the mounted information storage medium DISC belongs to none of categories described in FIG. 5, a processing method depending on the information playback apparatus is adopted (step S16).

<Playback of Only Audio>

Figure 8:
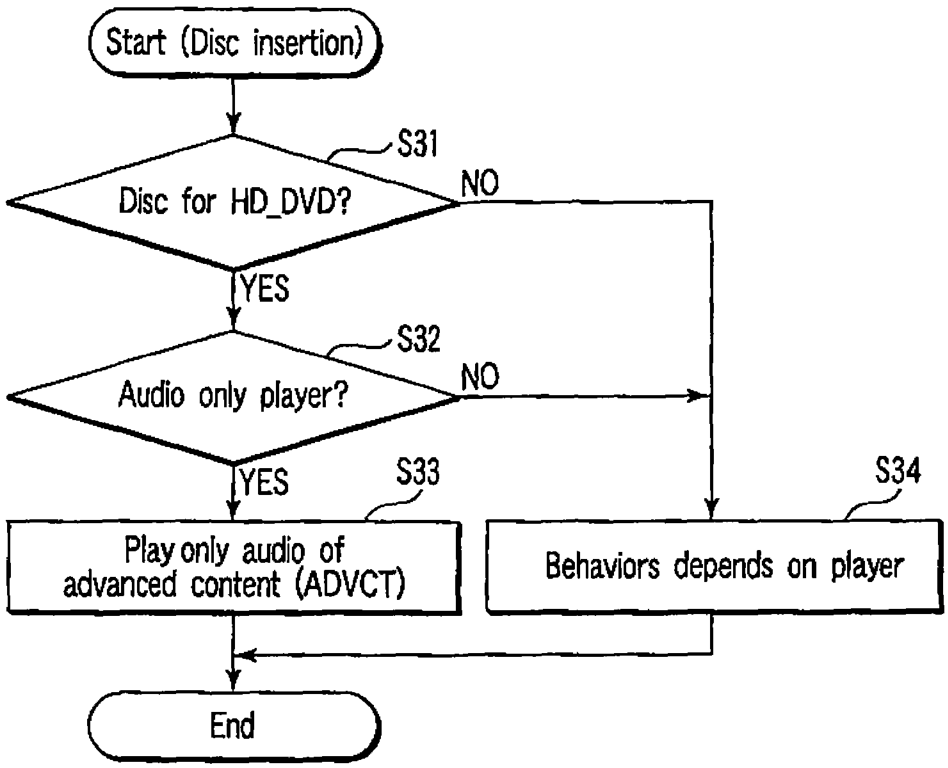
FIG. 8 is an exemplary flowchart showing a startup sequence in an information playback apparatus of only audio.

This embodiment supports a playback apparatus which does not have any video display function and plays back only audio information. FIG. 8 shows the startup sequence in an audio-only information playback apparatus.

When the information storage medium DISC is mounted on the information playback apparatus, the information playback apparatus determines if the information storage medium DISC is compliant to HD_DVD (step S21). If the information storage medium DISC is not compliant to HD_DVD in this embodiment, a processing method depending on the information playback apparatus is adopted (step S24). Also, if the information playback apparatus is not the one which plays back only audio information, a processing method depending on the information playback apparatus is adopted (steps S22 and S24). If the mounted information storage medium DISC is compliant to HD_DVD of this embodiment, the information playback apparatus checks the presence/absence of a playlist file PLLST recorded in the advanced content directory ADVCT located directly under the root directory. If the playlist file PLLST is found, the information playback apparatus which plays back only audio information plays back audio information (steps S22 and S23). At this time, the information playback apparatus plays back information via the playlist file PLLST.

<Data Access Method>

Different management methods (different data access methods to contents and the like) for the enhanced video object EVOB in the standard content STDCT and those in the advanced content ADVCT in this embodiment will be described below with reference to FIG. 9.

On standard video title set information STVTSI as management information in the standard content STDCT in this embodiment, access to each enhanced video object EVOB is designated by a logical sector number LSN as address information on the logical space. In this way, since access is managed using the address information, compatibility to the existing DVD-Video standards can be assured. By contrast, access to each enhanced video object EVOB in the advanced content ADVCT is managed not by address information but by time information. This point is a large technical feature in this embodiment. With this feature, not only compatibility to the video recording standards that allow existing video recording and playback can be assured, but also easy edit processing is guaranteed. More specifically, in a playlist PLLST which represents playback management information on the advanced content ADVCT, the playback range of advanced video object data at a playback position is set by time information. In the advanced content ADVCT of this embodiment, time information designated in the playlist PLLST can be converted into address information by time map information TMAPI. The time map information TMAPI is used to convert the designated time information into a logical sector number LSN indicating a logical address position on the information storage medium DISC. The time map information TMAPI is recorded at a position different from the playlist PLLST. Furthermore, advanced video title set information ADVTSI in the advanced content ADVCT corresponds to the standard video title set information STVTSI in the standard content STDCT. This advanced video title set information ADVTSI records enhanced video object information EVOBI which records individual attribute information of respective enhanced video object EVOB. This enhanced video object information EVOBI refers to and manages each individual enhanced video object EVOB as management information of attribute information. When this enhanced video object information EVOBI#3 manages and refers to attributes of the enhanced video object EVOB in the standard content STDCT, the playlist PLLST that manages playback of the advanced content ADVCT can designate playback of enhanced video object EVOB in the standard content STDCT.

<Utilization of Standard Content by Advanced Content>

Standard Content can be utilized by Advanced Content. VTSI of Advanced VTS can refer EVOBs which is also be referred by VTSI of Standard VTS, by use of TMAP (see FIG. 9). In this case, a TMAP Information refers one or more EVOBUs in an EVOB. However, the EVOB may contain HLI, PCI and so on, which are not supported in Advanced Content. In the playback of such EVOBs, some information which is not supported in Advanced Content such as HLI and PCI shall be ignored in Advanced Content.

More intelligible explanations will be provided below.

As described above, the advanced content ADVCT can utilize some data in the standard content STDCT. This point is a large technical feature in this embodiment.

For example, as shown in FIG. 9, the enhanced video object information EVOBI#3 in the advanced video title set information ADVTSI can refer to and play back enhanced video object EVOB#3 in the standard content STDCT by utilizing time map information TMAPI#3 in the advanced content ADVCT. Also, as shown in FIG. 9, the enhanced video object EVOB#3 referred to by the enhanced video object information EVOBI#3 in the advanced content can also be referred to by the standard video title set information STVTSI. As described above, in this embodiment, since the enhanced video object EVOB#3 in the standard content STDCT can be referred to by a plurality of pieces of information, it can be commonly utilized, and the efficiency of data to be recorded on the information storage medium DISC can be improved.

This enhanced video object EVOB#3 includes information such as highlight information HLI, presentation control information PCI, and the like. However, the advanced content ADVCT does not support these pieces of information, and information specified by these highlight information HLI and presentation control information PCI is ignored upon playback of the advanced content ADVCT based on the playlist PLLST.

<Advanced VTS>

Advanced VTS is utilized Video Title Set for Advanced Content. In comparison to Standard VTS, followings are additionally defined.

1) More Enhancement for an EVOB

1 Main Video stream

8 Main Audio streams (Maximum)

1 Sub Video stream

8 Sub Audio streams (Maximum)

32 Sub-picture streams (Maximum)

1 Advanced stream

2) Integration of Enhanced VOB Set (EVOBS)

Integration of both Menu EVOBS and Title EVOBS

3) Elimination of a Layered Structure

No Tide, no PGC, no PTT and no Cell

No supports of Navigation Command and UOP control

4) Introduction of New Time Map Information (TMAPI)

In case of Contiguous Block, one TMAPI corresponds to one EVOB and it shall be stored as a file.

In case of Interleaved Block, the TMAPIs which correspond to EVOBs in the Block shall be stored as a file.

Some information in a NV_PCK are simplified.

More intelligible explanations will be provided below.

The advanced video title set ADVTS shown in FIG. 5(*c*) will be described below with reference to FIG. 9. The advanced video title set ADVTS is utilized as a video title set for the advanced content ADVCT. Differences between the advanced video title set ADVTS shown in FIG. 5(*c*) and the standard video title set SVTS will be listed below.

1) More Enhancement for the Enhanced Video Object EVOB in Advanced Content ADVCT The advanced video title set ADVTS can have one main video stream MANVD, eight (maximum) or fewer main audio streams MANAD, one sub video stream SUBVD, eight (maximum) or less sub audio streams SUBAD, 32 (maximum) or fewer sub-picture streams SUBPT, and one advanced stream (stream data that records an advanced application ADAPL to be described later).

2) Integration of Enhanced Video Object Set EVOBS

In the standard content STDCT, as shown in FIG. 4, enhanced video object EVOB in the video manager VMG that represents a menu frame is completely separated from enhanced video object EVOB in the standard video title set SVTS which represents video information to be played back, and a moving image and menu frame cannot be simultaneously presented. By contrast, the advanced video title set ADVTS in this embodiment can manage and present a menu frame and a picture frame that represents a moving image by integrating them.

3) Elimination of a Layered Structure of Management Information for Video Information The existing DVD-Video and standard content STDCT adopts a layered structure of program chains PGC/parts of title PTT/cells as a video management unit. However, the management method of the advanced content ADVCT in this embodiment does not adopt such layered structure. Also, the standard content STDCT of the existing DVD-Video uses navigation commands to execute special processing such as transition processing and the like and performs user operation processing. However, the advanced content ADVCT of this embodiment does not perform these processes.

4) Introduction of New Time Map Information TMAPI

In a contiguous block to be described later, one time map information TMAPI corresponds to one enhanced video object EVOB, and respective pieces of time map information TMAPI are recorded as one file on the information storage medium DISC. In case of an interleaved block, a plurality of enhanced video object EVOB corresponding to each stream in that interleaved block are included. Time map information TMAPI is set for each individual enhanced video object EVOB, and a plurality of pieces of time map information TMAPI are recorded in one file for each interleaved block. Furthermore, information in a navigation pack NV_PCK defined in the conventional DVD-Video and standard content STDCT is recorded after it is simplified.

<Structure of Advanced Video Title Set (Advanced VTS)>

This VTS consists of only one Title. This VTS is composed of control data referred to as Video Title Set Information (VTSI), Enhanced Video Object Set for Titles in a VTS (VTSTT_EVOBS), Video Title Set Time Map Information (VTS_TMAP), backup control data (VTSI_BUP) and backup of Video Title Set Time Map Information (VTS_TMAP_BUP).

The following rules shall apply to Video Title Set (VTS):

1) The control data (VTSI) and the backup of control data (VTSI_BUP) (if exists: this data is recorded optionally) shall be a single File.

2) VTSI and VTSI_BUP (if exists) shall not be recorded in the same ECC block.

3) Each of a Video Title Set Time Map Information (VTS_TMAP) and the backup of this (VTS TMAP_BUP) (if exists: this data is recorded optionally) shall be composed of files, up to a maximum of 999 respectively.

4) VTS_TMAP and VTS_TMAP_BUP (if exists) shall not be recorded in the same ECC block.

5) Files comprising VTS_TMAP shall be allocated continuously.

6) Files comprising VTS_TMAP_BUP (if exists) shall be allocated continuously.

7) An EVOB which belongs to Contiguous Block shall be a single File.

8) EVOBs which consist of an Interleaved Block shall be included in a single File.

9) An EVOBS of a VTS (VTSTT_EVOBS) shall be composed of files, up to a maximum of 999.

10) Files comprising VTSTT_EVOBS shall be allocated continuously.

11) The contents of VTSI_BUP (if exists) shall be exactly the same as VTSI completely. Therefore, when relative address information in VTSI_BUP refers to outside of VTSI BUP, the relative address shall be taken as a relative address of VTSI.

More intelligible explanations will be provided below.

The data structure in the advanced video title set ADVTS in the advanced content ADVCT shown in FIG. 9 will be described below.

In this embodiment, one advanced video title set ADVTS is composed of only one title that represents video information itself. In this embodiment, the advanced video title set ADVTS is composed of advanced video title set information ADVTSI which records control information, an enhanced video object set VTSTT_EVOBS which stores a video title representing the video information itself, video title set time map information VTS_TMAP which records time map information TMAPI shown in FIG. 9, backup information ADVTSI_BUP of the advanced video title set information ADVTSI, and backup information VTS_TMAP_BUP of the time map information. These pieces of information shall be recorded contiguously in this order on the information storage medium DISC. The following rules shall apply to the advanced video title set ADVTS in this embodiment.

1) The advanced video title set information ADVTSI as control information and its backup information ADVTSI_BUP shall be recorded as a single file on the information storage medium DISC.

2) The advanced video title set information ADVTSI and its backup information ADVTSI_BUP shall not be stored in one ECC block together. When the advanced video title set information ADVTSI and its backup information ADVTSI_BUP are recorded contiguously, if the last information in the advanced video title set information ADVTSI is located in the middle of one ECC block, padding information should be recorded in the residual area in that ECC block so that the next backup information ADVTSI_BUP is allocated in a different ECC block. In this manner, even when an ECC block at the boundary between the advanced video title set information ADVTSI and the next backup information ADVTSI_BUP cannot be read due to an error, one of these two pieces of information can be played back, thus improving the reliability upon playback.

3) Each of the video title set time map information VTS_TMAP and its backup information VTS_TMAP_BUP shall be recorded in 1 to 999 (maximum) or fewer files.

4) Each of the video title set time map information VTS_TMAP and its backup information VTS_TMAP_BUP shall not be recorded in one ECC block together. That is, as in 2), when the boundary between these two pieces of information is to be allocated in one ECC block, i.e., when the last part of the video title set time map information VTS_TMAP is allocated in the middle of one ECC block, padding data is recorded to allocate the next backup information VTS_TMAP_BUP to be recorded from the head position of the next ECC block. In this manner, the reliability upon playback can be assured.

5) A plurality of files comprising the video title set time map information VTS_TMAP shall be recorded continuously on the information storage medium DISC. In this way, the need for unwanted transition processing of an optical head can be obviated, and the video title set time map information VTS_TMAP can be played back by single continuous playback, thus attaining easy playback processing and speeding up.

6) A plurality of files comprising the backup information VTS_TMAP_BUP of each video title set time map information VTS_TMAP shall be recorded continuously on the information storage medium DISC. In this way, as in 5), easy playback processing and speeding up can be attained.

7) An enhanced video object set VTSTT_EVOBS that record titles of the advanced video title set shall be recorded on the information storage medium DISC as 1 to 999 (maximum) or fewer files.

8) A plurality of files which record the enhanced video object sets VTSTT_EVOBS that record titles of the advanced video title set shall be recorded continuously on the information storage medium DISC. In this manner, the enhanced video object sets VTSTT_EVOBS that record titles of the advanced video title set can be played back by single continuous playback, thus assuring continuity upon playback.

9) The contents of the backup information ADVTSI_BUP of the advanced video title set information ADVTSI shall be the same as the advanced video title set information ADVTSI completely.

<Structure of Enhanced Video Object Set (EVOBS) in Advanced VTS>

The EVOBS is a collection of Enhanced Video Object which is composed of data on Video, Audio, Sub-picture and the like.

The following rules shall apply to EVOBS:

1) In an EVOBS, EVOBs are to be recorded in Contiguous Block and Interleaved Block.

2) An EVOBS is composed of one or more EVOBs. EVOB_ID numbers are assigned from the EVOB with the smallest LSN in EVOBS, in ascending order starting with one (1). EVOB_ID number is also corresponding to the same number of EVOBI in VTSI.

3) Each EVOB has one corresponded TMAP file if the EVOB belongs to Contiguous Block. EVOBs which compose Interleaved Block have one corresponded TMAP file.

4) An EVOB shall be allocated in ascending order in logical sector number contiguously (without any gaps).

More intelligible explanations will be provided below.

The data structure of the enhanced video object EVOB in the advanced content ADVCT shown in FIG. 9 will be described below. In this embodiment, a collection of enhanced objects EVOBs is called an enhanced video object set EVOBS, and is composed of data of video, audio, subpicture, and the like. In this embodiment, the following rules shall apply to the enhanced video object set EVOBS in the advanced content ADVCT.

1) Enhanced video objects EVOBs are recorded in a contiguous block and interleaved block (to be described later).

2) One enhanced video object set EVOBS includes one or more enhanced video object EVOB. The aforementioned ID numbers EVOB_ID of the enhanced video object are assigned in the layout order of enhanced video object EVOB recorded on the information storage medium DISC. That is, the ID numbers EVOB_ID are assigned in ascending order of logical sector number LSN which indicates the recording address of enhanced video object EVOB on the logical space, and the first number is set to 1. The ID number EVOB_ID of the enhanced video object is corresponding to the same number of the enhanced video object information EVOBI described in the advanced title set information ADVTSI. That is, as shown in FIG. 9, enhanced video object EVOB#1 has an ID number EVOB_ID="1", and enhanced video object EVOB#2 has an ID number EVOB_ID="2". Enhanced video object information EVOBI#1 which controls that data is set to have a number="1", and enhanced video object information EVOBI#2 that manages the enhanced video object EVOB#2 is set to have a number="2".

3) Each enhanced video object EVOB has one corresponded time map file if the enhanced video object EVOB belongs to the contiguous block. That is, as shown in FIG. 9, time map information TMAPI#1 exists as a part for managing the time of enhanced video object EVOB#1, and this time map information TMAPI#1 is recorded on the information storage medium DISC as one time map file. When a plurality of enhanced video objects EVOBs compose an interleaved block, one time map file is recorded on the information storage medium DISC in correspondence with one interleaved block.

<Relation Among Presentation Objects>

FIG. 10 shows the relation among Data Type, Data Source and Player/Decoder for each presentation object defined above.

More intelligible explanations will be provided below.

The advanced content ADVCT in this embodiment uses objects shown in FIG. 10. The correspondence among the data types, data sources, and players/decoders, and player for each presentation object is shown in FIG. 10. Initially, "via network" and "persistent storage PRSTR" as the data sources will be described below.

<Network Server>

Network Server is an optional data source for Advanced Content playback, but a player should have network access capability. Network Server is usually operated by the content provider of the current disc. Network Server usually locates in the internet.

More intelligible explanations will be provided below.

"Via network" related with the data sources shown in FIG. 10 will be explained.

This embodiment is premised on playback of object data delivered from the network server NTSRV via the network as the data source of objects used to play back the advanced content ADVCT. Therefore, a player with advanced functions in this embodiment is premised on network access. As the network server NTSRV which represents the data source of objects upon transferring data via the network, a server to be accessed is designated in the advanced content ADVCT on the information storage medium DISC upon playback, and that server is operated by the content provider who created the advanced content ADVCT. The network server NTSRV is usually located in the Internet.

<Data Categories on Network Server>

Any Advanced Content files can exist on Network Server. Advanced Navigation can download any files on Dada Sources to the File Cache or Persistent Storage by using proper API(s). For S-EVOB data read from Network Server, Secondary Video Player can use Streaming Buffer.

More intelligible explanations will be provided below.

Files which record the advanced content ADVCT in this embodiment can be recoded in the network server NTSRV in advance. An application processing command API which is set in advance downloads advanced navigation data ADVNV onto a file cache FLCCH (data cache DTCCH) or the persistent storage PRSTR. In this embodiment, a primary video set player cannot directly play back a primary video set PRMVS from the network server NTSRV. The primary video set PRMVS is temporarily recorded on the persistent storage PRSTR, and data are played back via the persistent storage PRSTR (to be described later). A secondary video player SCDVP can directly play back secondary enhanced video object S-EVOB from the network server NTSRV using a streaming buffer. The persistent storage PRSTR shown in FIG. 10 will be described below.

<Persistent Storage/Data Categories on Persistent Storage>

There are two categories of Persistent Storage. One is called as "Required Persistent Storage". This is a mandatory Persistent Storage device attached in a player. FLASH memory is typical device for this. The minimum capacity for Fixed Persistent Storage is 128 MB. Others are optional and called as "Additional Persistent Storage". They may be removable storage devices, such as USB Memory/HDD or Memory Card. NAS (Network Attached Storage) is also one of possible Additional Persistent Storage device. Actual device implementation is not specified in this specification. They should pursuant API model for Persistent Storage.

Any Advanced Content files can exist on Persistent Storage. Advanced Navigation can copy any files on Data Sources to Persistent Storage or File Cache by using proper API(s). Secondary Video Player can read Secondary Video Set from Persistent Storage.

More intelligible explanations will be provided below.

This embodiment defines two different types of persistent storages PRSTRs. The first type is called a required persistent storage (or a fixed persistent storage as a mandatory persistent storage) PRSTR. The information recording and playback apparatus 1 (player) in this embodiment has the persistent storage PRSTR as a mandatory component. As a practical recording medium which is most popularly used as the fixed persistent storage PRSTR, this embodiment assumes a flash memory. This embodiment is premised on that the fixed persistent storage PRSTR has a capacity of 64 MB or more. When the minimum required memory size of the persistent storage PRSTR is set, as described above, the playback stability of the advanced content ADVCT can be guaranteed independently of the detailed arrangement of the information recording and playback apparatus 1. As shown in FIG. 10, the file cache FLCCH (data cache DTCCH) is designated as the data source. The file cache FLCCH (data cache DTCCH) represents a cache memory having a relatively small capacity such as a DRAM, SRAM, or the like. The fixed persistent storage PRSTR in this embodiment incorporates a flash memory, and that memory itself is set not to be detached from the information playback apparatus. However, this embodiment is not limited to such specific memory, and for example, a portable flash memory may be used in addition to the fixed persistent storage PRSTR.

The other type of the persistent storage PRSTR in this embodiment is called an additional persistent storage PRSTR. The additional persistent storage PRSTR may be a removable storage device, and can be implemented by, e.g., a USB memory, portable HDD, memory card, or the like.

In this embodiment, the flash memory has been described as an example the fixed persistent storage PRSTR, and the USB memory, portable HDD, memory card, or the like has been described as the additional persistent storage PRSTR. However, this embodiment is not limited to such specific devices, and other recording media may be used.

This embodiment performs data I/O processing and the like for these persistent storages PRSTR using the data processing API (application interface). A file that records a specific advanced content ADVCT can be recorded in the persistent storage PRSTR. The advanced navigation data ADVNV can copy a file that records it from a data source to the persistent storage PRSTR or file cache FLCCH (data cache DTCCH). A primary video player PRMVP can directly read and present the primary video set PRMVS from the persistent storage PRSTR. The secondary video player SCDVP can directly read and present a secondary video set SCDVS from the persistent storage PRSTR.

<Note about Presentation Objects>

Resource files in a disc, in Persistent Storage or in network need to be once stored in File Cache.

More intelligible explanations will be provided below.

In this embodiment, the advanced application ADAPL or an advanced subtitle ADSBT recorded in the information storage medium DISC, the persistent storage PRSTR, or the network server NTSRV needs to be once stored in the file cache, and such information then undergoes data processing. When the advanced application ADAPL or advanced subtitle ADSBT is once stored in the file cache FLCCH (data cache DTCCH), speeding up of the presentation processing and control processing can be guaranteed.

The primary video player PRMVP and secondary video player SDCVP as the playback processors shown in FIG. 10 will be described later. In short, the primary video player PRMVP includes a main video decoder MVDEC, main audio decoder MADEC, sub video decoder SVDEC, sub audio decoder SADEC, and sub-picture decoder SPDEC. As for the secondary video player SCDVP, the main audio decoder MADEC, sub video decoder SVDEC, and sub audio decoder SADEC are commonly used as those in the primary video player PRMVP. Also, an advanced element presentation engine AEPEN and advanced subtitle player ASBPL will also be described later.

<Primary Video Set>

There is only one Primary Video Set on Disc. It consists of IFO, one or more EVOB files and TMAP files with matching names.

More intelligible explanations will be provided below.

In this embodiment, only one primary video set PRMVS exists in one information storage medium DISC. This primary video set PRMVS includes its management information, one or more enhanced video object files EVOB, and time map files TMAP, and uses a common filename for each pair.

<Primary Video Set> (Continued)

Primary Video Set is a container format of Primary Audio Video. The data structure of Primary Video Set is in conformity to Advanced VTS which consists of Video Title Set Information (VTSI), Time Map (TMAP) and Primary Enhanced Video Object (P-EVOB). Primary Video Set shall be played back by the Primary Video Player.

More intelligible explanations will be provided below.

The primary video set PRMVS contains a format of a primary audio video PRMAV. The primary video set PRMVS consists of advanced video title set information ADVTSI, time maps TMAP, and primary enhanced video object P-EVOB, and the like. The primary video set PRMVS shall be played back by the primary video player PRMVP.

Components of the primary video set PRMVS shown in FIG. 10 will be described below.

In this embodiment, the primary video set PRMVS mainly means main video data recorded on the information storage medium DISC. The data type of this primary video set PRMVS consists of a primary audio video PRMAV, and a main video MANVD, main audio MANAD, and sub-picture SUBPT mean the same information as video information, audio information, and sub-picture information of the conventional DVD-Video and the standard content STDCT in this embodiment. The advanced content ADVCT in this embodiment can newly present a maximum of two frames at the same time. That is, a sub video SUBVD is defined as video information that can be played back simultaneously with the main video MANVD. Likewise, a sub audio SUBAD that can be output simultaneously with the main audio MANAD is newly defined.

In this embodiment, the following two different use methods of the sub audio SUBAD are available:

1) A method of outputting audio information of the sub video SUBVD using the sub audio SUBAD when the main video MANVD and sub video SUBVD are presented at the same time; and 2) A method of outputting the sub audio SUBAD to be superimposed on the main audio MANAD as a comment of a director when only the main video MANVD is played back and presented on the screen and the main audio MANAD as audio information corresponding to video data of the main video MANVD is output and when, for example, the comment of the director is audibly output to be superposed.

<Secondary Video Set>

Secondary Video Set is used for substitution of Main Video/Main Audio streams to the corresponding streams in Primary Video Set (Substitute Audio Video), substitution of Main Audio stream to the corresponding stream in Primary Video Set (Substitute Audio), or used for addition to/substitution of Primary Video Set (Secondary Audio Video). Secondary Video Set may be recoded on a disc, recorded in Persistent Storage or delivered from a server. The file for Secondary Video Set is once stored in File Cache or Persistent Storage before playback, if the data is recorded on a disc, and it is possible to be played with Primary Video Set simultaneously. Secondary Video Set on a disc may be directly accessed in case that Primary Video Set is not played back (i.e. it is not supplied from a disc). On the other hand, if Secondary Video Set is located on a server, whole of this data should be once stored in File Cache or Persistent Storage and played back ("Complete downloading"), or a part of this data should be stored in Streaming Buffer sequentially and stored data in the buffer is played back without buffer overflow during downloading data from a server ("Streaming").

More intelligible explanations will be provided below.

The secondary video set SCDVS is used as a substitution for the main audio MANAD in the primary video set PRMVS, and is also used as additional information or substitute information of the primary video set PRMVS. This embodiment is not limited to this. For example, the secondary video set SCDVS may be used as a substitution for a main audio MANAD of a substitute audio SBTAD or as an addition (superimposed presentation) or substitution for a secondary audio video SCDAV. In this embodiment, the content of the secondary video set SCDVS can be downloaded from the aforementioned network server NTSRV via the network, or can be recorded and used in the persistent storage PRSTR, or can be recorded in advance on the information storage medium DISC of the embodiment of the invention. If information of the secondary video set SCDVS is recorded in the information storage medium DISC of the embodiment, the following mode is adopted. That is, the secondary video set file SCDVS is once stored in the file cache FLCCH (data cache DTCCH) or the persistent storage PRSTR, and is then played back from the file cache or persistent storage PRSTR. The information of the secondary video set SCDVS can be played back simultaneously with some data of the primary video set PRMVS. In this embodiment, the primary video set PRMVS recorded on the information storage medium DISC can be directly accessed and presented, but the secondary video set SCDVS recorded on the information storage medium DISC in this embodiment cannot be directly played back. In this embodiment, information in the primary video set PRMVS is recorded in the aforementioned persistent storage PRSTR, and can be directly played back from the persistent storage PRSTR. More specifically, when the secondary video set SCDVS is recorded on the network server NTSRV, whole of the secondary video set SCDVS are once stored in the file cache FLCCH (data cache DTCCH) or the persistent storage PRSTR, and are then played back. This embodiment is not limited to this. For example, a part of the secondary video set SCDVS recorded on the network server NTSRV is once stored in the streaming buffer within the range in which the streaming buffer does not overflow, as needed, and can be played back from there.

<Secondary Video Set> (Continued)

Secondary Video Set can carry three types of Presentation Objects, Substitute Audio Video, Substitute Audio and Secondary Audio Video. Secondary Video Set may be provided from Disc, Network Server, Persistent Storage or File Cache in a player. The data structure of Secondary Video Set is a simplified and modified structure of Advanced VTS. It consists of Time Map (TMAP) with attribute information and Secondary Enhanced Video Object (S-EVOB). Secondary Video Set shall be played back by the Secondary Video Player.

More intelligible explanations will be provided below.

The secondary video set SCDVS can carry three different types of presentation objects, i.e., a substitute audio video SBTAV, a substitute audio SBTAD, and secondary audio video SCDAV. The secondary video set SCDVS may be provided from the information storage medium DISC, network server NTSRV, persistent storage PRSTR, file cache FLCCH, or the like. The data structure of the secondary video set SCDVS is a simplified and partially modified structure of the advanced video title set ADVTS. The secondary video set SCDVS consists of time map TMAP and secondary enhanced video object S-EVOB. The secondary video set SCDVS shall be played back by the secondary video player SCDVP.

Components of the secondary video set SCDVS shown in FIG. 10 will be described below.

Basically, the secondary video set SCDVS indicates data which is obtained by reading information from the persistent storage PRSTR or via the network, i.e., from a location other than the information storage medium DISC in this embodiment, and presenting the read information by partially substituting for the primary video set PRMVS described above. That is, the main audio decoder MADEC shown in FIG. 10 is common to that of the primary video player PRMVP and the secondary video player SCDVP. When the content of the secondary video set SCDVS is to be played back using the main audio decoder MADEC in the secondary video player SCDVP, the sub audio SUBAD of the primary video set PRMVS is not played back by the primary video player PRMVP, and is output after it is substituted by data of the secondary video set SCDVS. The secondary video set SCDVS consists of three different types of objects, i.e., the substitute audio video SBTAV, substitute audio SBTAD, and secondary audio video SCDAV. A main audio MANAD in the substitute audio SBTAD is basically used when it substitutes for the main audio MANAD in the primary video set PRMVS. The substitute audio video SBTAV consists of the main video MANDV and the main audio MANAD. The substitute audio SBTAD consists of one main audio stream MANAD. For example, when the main audio MANAD recorded in advance on the information storage medium DISC as the primary video set PRMVS records Japanese and English in correspondence with video information of the main video MANVD, the main audio MANAD can only present Japanese or English audio information upon presentation to the user. By contrast, this embodiment can attain as follows. That is, for a user who speaks Chinese as the native language, Chinese audio information recorded in the network server NTSRV is downloaded via the network, and audio information upon playing back the main video MANVD of the primary video set PRMVS can be output instead of presenting the audio information in Japanese or English while it is substituted by Chinese as the main audio MANAD of the secondary video set SCDVS. Also, the sub audio SUBAD of the secondary video set SCDVS can be used when audio information synchronized with the window of the sub video SUBVD of the secondary audio video SCDAV is to be presented upon presentation on two windows (e.g., when comment information of a director is simultaneously presented to be superposed on the main audio MANAD which is output in synchronism with the main video MANVD of the primary video set PRMVS described above).

<Secondary Audio Video>

Secondary Audio Video contains zero or one Sub Video stream and zero to eight Sub Audio streams. This is used for addition to Primary Video Set or substitution of Sub Video stream and Sub Audio stream in Primary Video Set.

More intelligible explanations will be provided below.

In this embodiment, the secondary audio video SCDAV contains zero or one sub video SUBVD and zero to eight sub audio SUBAD. In this embodiment, the secondary audio video SCDAV is used to be superimposed on (in addition to) the primary video set PRMVS. In this embodiment, the secondary audio video SCDAV can also be used as a substitution for the sub video SUBVD and sub audio SUBAD in the primary video set PRMVS.

<Secondary Audio Video> (Continued)

Secondary Audio Video replaces Sub Video and Sub Audio presentations of Primary Audio Video. It may consist of Sub Video stream with/without Sub Audio stream or Sub Audio stream only. While being played back one of presentation stream in Secondary Audio Video, it is prohibited to be played Sub Video stream and Sub Audio stream in Primary Audio Video. The container format of Secondary Audio Video is Secondary Video Set.

More intelligible explanations will be provided below.

The secondary audio video SCDAV replaces the sub video SUBVD and sub audio SUBAD in the primary video set PRMVS. The secondary audio video SCDAV has the following cases.

1) Case of consisting of the video SUBAD stream only;

2) Case of consisting both the sub video SUBVD and sub audio SUBAD; and

3) Case of consisting of the sub audio SUBAD only.

At the time of playing back a stream in the secondary audio video SCDAV, the sub video SUBVD and sub audio SUBAD in the primary audio video PRMAV cannot be played back. The secondary audio video SCDAV is included in the secondary video set SCDVS.

<Advanced Application>

An Advanced Application consists of one Manifest file, Markup file(s) (including content/style/timing/layout information), Script file(s), Image file(s) (JPEG/PNG/MNG/Capture Image Format), Effect Audio file(s) (LPCM wrapped by WAV), Font file(s) (Open Type) and others. A Manifest file gives information for display layout, an initial Markup file to be executed, Script file(s) and resources in the Advanced Application.

More intelligible explanations will be provided below.

The advanced application ADAPL in FIG. 10 consists of information such as a markup file MRKUP, script file SCRPT, still picture IMAGE, effect audio file EFTAD, font file FONT, and others. As described above, these pieces of information of the advanced application ADAPL are used once they are stored in the file cache. Information related with downloading to the file cache FLCCH (data cache DTCCH) is recorded in a manifest file MNFST (to be described later). Also, information of the download timing and the like of the advanced application ADAPL is described in resource information RESRCI in the playlist PLLST. In this embodiment, the manifest file MNFST also contains information related with loading of the markup file MRKUP information executed initially, information required upon loading information recorded in the script file SCRPT onto the file cache FLCCH (data cache DTCCH), and the like.

<Advanced Application> (Continued)

Advanced Application provides three functions. The first is to control entire presentation behavior of Advanced Content. The next is to realize graphical presentation, such as menu buttons, over the video presentation. The last is to control effect audio playback. Advanced Navigation files of Advanced Application, such as Manifest, Script and Markup, define the behavior of Advanced Application. Advanced Element files are used for graphical and audio presentation.

More intelligible explanations will be provided below.

The advanced application ADAPL provides the following three functions.

The first function is a control function (e.g., jump control between different frames) for presentation behavior of the advanced content ADVCT. The second function is a function of realizing graphical presentation of menu buttons and the like. The third function is an effect audio playback control function. An advanced navigation file ADVNV contains a manifest MNFST, script file SCRPT, markup file MRKUP, and the like to implement the advanced application ADAPL. Information in an advanced element file ADVEL is related with a still picture IMAGE, font file FONT, and the like, and is used as presentation icons and presentation audio upon graphical presentation and audio presentation of the second function.

<Advanced Subtitle>

An advanced subtitle ADSBT is also used after it is stored in the file cache FLCCH (data cache DTCCH) as in the advanced application ADAPL. Information of the advanced subtitle ADSBT can be fetched from the information storage medium DISC or persistent storage PRSTR, or via the network. The advanced subtitle ADSBT in this embodiment basically contains a substituted explanatory title or telop for a conventional video information or images such as pictographic characters, still pictures, or the like. As for substitution of the explanatory title, it is basically formed based on text other than the images, and can also be presented by changing the font file FONT. Such advanced subtitles ADSBT can be added by downloading them from the network server NTSRV. For example, a new explanatory title or a comment for a given video information can be output while playing back the main video MANVD in the primary video set PRMVS stored in the information storage medium DISC. As described above, the following use method is available. That is, when the sub-picture SUBPT stores only Japanese and English subtitles as, for example, the subtitles in the primary video set PRMVS, the user who speaks Chinese as the native language downloads a Chinese subtitle as the advanced subtitle ADSBT from the network server NTSRV via the network, and presents the downloaded subtitle. The data type in this case is set as the type of markup file MRKUPS for the advanced subtitle ADSBT or font file FONT.

<Advanced Subtitle> (Continued)

Advanced Subtitle is used for subtitle synchronized with video, which may be substitution of the Sub-picture data. It consists of one Manifest file for Advanced Subtitle, Markup file(s) for Advanced Subtitle (including content/style/timing/layout information), Font file(s) and Image file(s). The Markup file for Advanced Subtitle is a subset of Markup for Advanced Application.

More intelligible explanations will be provided below.

In this embodiment, the advanced subtitle ADSBT can be used as a subtitle (explanatory title or the like) which is presented in synchronism with the main video MANVD of the primary video set PRMVS. The advanced subtitle ADSBT can also be used as simultaneous presentation (additional presentation processing) for the sub-picture SUBPT in the primary video set PRMVS or as a substitute for the sub-picture SUBPT of the primary video set PRMVS. The advanced subtitle ADSBT consists of one manifest file MNFSTS for the advanced subtitle ADSBT, markup file(s) MRKUPS for the advanced subtitle ADSBT, font file(s) FONTS and image file(s) IMAGES. The markup file MRKUPS for the advanced subtitle ADSBT exists as a subset of the markup file MRKUP of the advanced application ADAPL.

<Advanced Subtitle> (Continued)

Advanced Subtitle provides subtitling feature. Advanced Content has two means for subtitling. The one is by using with Sub-picture stream in Primary Audio Video as well as Sub-picture function of Standard Content. The other is by using with Advanced Subtitle. Both means shall not be used at the same time. Advanced Subtitle is a subset of Advanced Application.

More intelligible explanations will be provided below.

The advanced content ADVCT has two means for a subtitle.

As the first mean, the subtitle is used as a sub-picture stream in the primary audio PRMAV as in the sub-picture function of the standard content STDCT. As the second mean, the subtitle is used as the advanced subtitle ADSBT. Both means shall not be used in both the purposes at the same time. The advanced subtitle ADSBT is a subset of the advanced application ADAPL.

<Advanced Stream>

Advanced Stream is a data format of package files containing one or more Advanced Content files except for Primary Video Set. Advanced Stream is multiplexed into Primary Enhanced Video Object Set (P-EVOBS) and delivered to File Cache with P-EVOBS data supplying to Primary Video Player. The same files which are multiplexed in P-EVOBS and are mandatory for Advanced Content playback, should be stored as files on Disc. These duplicated copies are necessary to guarantee Advanced Content playback. Because Advanced Stream supply may not be finished, when Advanced Content playback is jumped. In this case, necessary files are directly copied by File Cache Manager from Disc to Data Cache before re-starting playback from specified jump timing.

More intelligible explanations will be provided below.

An advanced stream is a data format of package files containing one or more advanced content files ADVCT except for the primary video set PRMVS. The advanced stream is recorded to be multiplexed in a primary enhanced video object set P-EVOBS, and is delivered to the file cache FLCCH (data cache DTCCH). This primary enhanced video object set P-EVOBS undergoes playback processing by the primary video player PRMVP. These files which are recorded to be multiplexed in the primary enhanced video object set P-EVOBS are mandatory for playback of the advanced content ADVCT, and should be stored on the information storage medium DISC of this embodiment to have a file structure.

<Advanced Navigation>

Advanced Navigation files shall be located as files or archived in package file. Advanced Navigation files are read and interpreted for Advanced Content playback. Playlist, which is Advanced Navigation file for startup, shall be located on "ADV_OBJ" directory. Advanced Navigation files may be multiplexed in P-EVOB or archived in package file which is multiplexed in P-EVOB.

More intelligible explanations will be provided below.

Files related with the advanced navigation ADVNV are used in interrupt processing upon playback of the advanced content ADVCT.

<Primary Audio Video>

Primary Audio Video can provide several presentation streams, Main Video, Main Audio, Sub Video, Sub Audio and Sub-picture. A player can simultaneously play Sub Video and Sub Audio, in addition to Main Video and Main Audio. Primary Audio Video shall be exclusively provided from Disc. The container format of Primary Audio Video is Primary Video Set. Possible combination of video and audio presentation is limited by the condition between Primary Audio Video and other Presentation Object which is carried by Secondary Video Set. Primary Audio Video can also carry various kinds of data files which may be used by Advanced Application, Advanced Subtitle and others. The container stream for these files is called Advanced Stream.

More intelligible explanations will be provided below.

The primary audio video PRMAV is composed of streams containing a main video MANVD, main audio MANAD, sub video SUBVD, sub audio SUBAD, and sub-picture SUBPT. The information playback apparatus can simultaneously play back the sub video SUBVD and sub audio SUBAD, in addition to the main video MANVD and main audio MANAD. The primary audio video PRMAV shall be recorded in the information storage medium DISC or the persistent storage PRSTR. The primary audio video PRMAV is included as a part of the primary video set PRMVS. Possible combination of video and audio presentation is limited by the condition between the primary audio video PRMAV and the secondary video set SDCVS. The primary audio video PRMAV can also carry various kinds of data files which may be used by the advanced application ADAPL, advanced subtitle ADSBT, and others. The stream contained in these files are called an advanced stream.

<Substitute Audio>

Substitute Audio replaces the Main Audio presentation of Primary Audio Video. It shall consist of Main Audio stream only. While being played Substitute Audio, it is prohibited to be played back Main Audio in Primary Video Set. The container format of Substitute Audio is Secondary Video Set. If Secondary Video Set includes Substitute Audio Video, then Secondary Video Set can not contain Substitute Audio.

More intelligible explanations will be provided below.

The substitute audio SBTAD replaces the main audio MANAD presentation of the primary audio video PRMAV.

This substitute audio SBTAD shall consists of a main audio MANAD stream only. Wile being played the substitute audio SBTAD, it is prohibited to be played back the main audio MANAD in the primary video set PRMVS. The substitute audio SBTAD is contained in the secondary video set SCDVS.

<Primary Enhanced Video Object (P-EVOB) for Advanced Content>

Primary Enhanced Video Object (P-EVOB) for Advanced Content is the data stream which carries presentation data of Primary Video Set. Primary Enhanced Video Object for Advanced Content is just referred as Primary Enhanced Video Object or P-EVOB. Primary Enhanced Video Object complies with Program Stream prescribed in "The system part of the MPEG-2 standard (ISO/IEC 13818-1)". Types of presentation data of Primary Video Set are Main Video, Main Audio, Sub Video, Sub Audio and Sub-picture. Advanced Stream is also multiplexed into P-EVOB.

Possible pack types in P-EVOB are followings.

Navigation Pack (NV_PCK)

Main Video Pack (VM_PCK)

Main Audio Pack (AM_PCK)

Sub Video Pack (VS_PCK)

Sub Audio Pack (AS_PCK)

Sub-picture Pack (SP_PCK)

Advanced Pack (ADV_PCK)

Time Map (TMAP) for Primary Video Set specifies entry points for each Primary Enhanced Video Object Unit (P-EVOBU).

Access Unit for Primary Video Set is based on access unit of Main Video as well as traditional Video Object (VOB) structure. The offset information for Sub Video and Sub Audio is given by Synchronous Information (SYNCI) as well as Main Audio and Sub-picture.

Advanced Stream is used for supplying various kinds of Advanced Content files to the File Cache without any interruption of Primary Video Set playback. The demux module in the Primary Video Player distributes Advanced Stream Pack (ADV_PCK) to the File Cache Manager in the Navigation Manager.

More intelligible explanations will be provided below.

The primary enhanced video object P-EVOB for the advanced content ADVCT is the data stream which carries presentation data of the primary video set PRMVS. As the types of presentation data of the primary video set PRMVS, the main video MANVD, main audio MANAD, sub video SUBVD, sub audio SUBAD, and sub-picture SUBPT are included. In this embodiment, as packs included in the primary enhanced video object P-EVOB, a navigation pack NV_PCK exists as in the existing DVD and the standard content STDCT, and an advanced stream pack that records the advanced stream exists. In this embodiment, offset information to the sub video SUBVD and sub audio SUBAD is recorded in synchronous information SYNCI as in the main audio MANAD and sub-picture SUBPT.

<File Structure>

Figure 11:
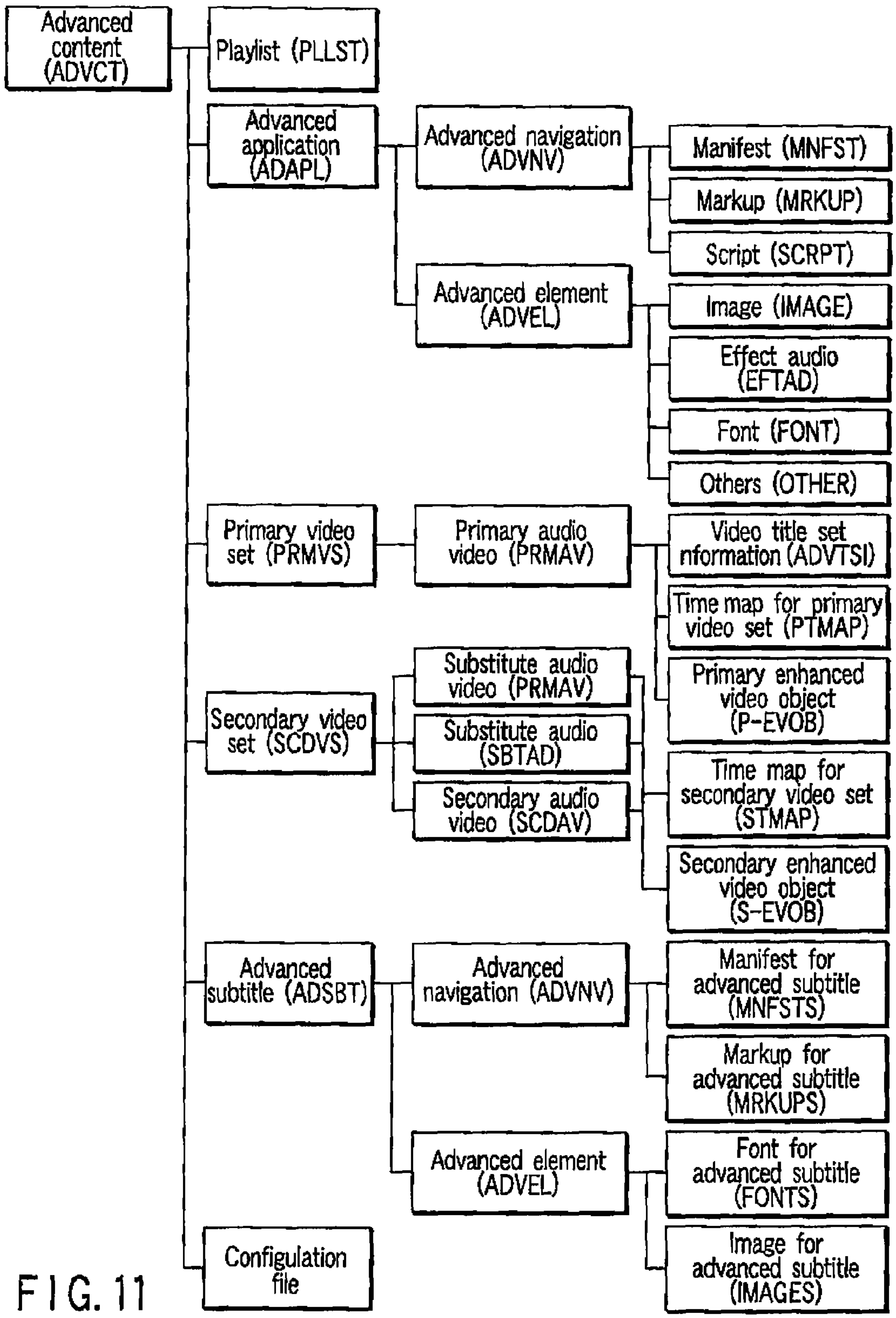
FIG. 11 is an exemplary view showing the file configuration when various object streams are recorded on an information storage medium.

FIG. 11 shows the file structure when various object streams shown in FIG. 10 are recorded on the information storage medium DISC. In this embodiment, as for the advanced content ADVCT, an advanced content directory ADVCT is allocated immediately under the root directory of the information storage medium DISC, and all files are recorded in that directory. A playlist file PLLST that records information related with playback exists under the advanced content directory ADVCT. Together with this file, an advanced application directory ADAPL that records information related with the advanced application, a primary video set directory PRMVS that records information related with the primary video set, a secondary video set directory SCDVS that records information related with the secondary video set, and an advanced subtitle directory ADSBT that records information related with the advanced subtitle are recorded.

Under the advanced application directory ADAPL, an advanced navigation directory ADVNV that records management information related with the advanced application, and an advanced element directory ADVEL that records information related with various advanced elements (object information and the like) use in the advanced application. The advanced navigation directory ADVNV includes a manifest file MNFST related with a manifest which records the relationship among various kinds of management information used in the advanced application and information lists required for network downloading together, a markup file MRKUP which records markup data related with page layouts and the like, a script file SCRPT which records script commands. The advanced element directory ADVEL includes a still picture file IMAGE which records still pictures, an effect audio file EFTAD which records effect audio data, a font file FONT which records font information, and other file OTHER.

Under the primary video set directory PRMVS, a primary audio video directory PRMAV exists. This directory includes a video title set information file ADVTSI which records attribute information and management information related with the enhanced video objects of the primary audio video, a time map file PTMAP of the primary video set which records time map information used to convert time information of the primary video set into address information, and a primary enhanced video object file P-EVOB which records the primary enhanced video objects.

Under the secondary video set directory SCDVS, a substitute audio directory SBTAD and secondary audio video directory SCDAV exist. Under the secondary audio video directory SCDAV, a time map file STMAP of the secondary video set which records time map information used to convert time information of the secondary video set into address information, and a secondary enhanced video object file S-EVOB which records the secondary enhanced video objects exist. Under the substitute audio directory SBTAD as well, the time map file STMAP used to convert time information of the secondary video set into address information, and the secondary enhanced video object file S-EVOB can be stored.

Under the advanced subtitle directory ADSBT, an advanced navigation directory ADVNV which records management information related with the advanced subtitle, and an advanced element directory ADVEL as element information of the advanced subtitle exist. The advanced navigation directory ADVNV includes a manifest file MNFSTS of the advanced subtitle, and a markup file MRKUPS of the advanced subtitle. The manifest file MNFSTS of the advanced subtitle records the relationship among various kinds of management information related with the advanced subtitle and information required for network downloading. The markup file MRKUPS of the advanced subtitle records markup information used to designate the presentation position of the advanced subtitle on the screen and the like. The advanced element directory ADVEL includes a font file FONTS of the advanced subtitle which records font information of the advanced subtitle.

<Directories for Advanced Content>

"Directories for Advanced Content" may exist only under the "ADV_OBJ" directory. Any files of Advanced Navigation, Advanced Element and Secondary Video Set can reside at this directory. The name of this directory shall be consisting of character set defined in Files for Advanced Content below. The total number of "ADV_OBJ" sub-directories (excluding "ADV_OBJ" directory) shall be less than 512. Directory depth shall be equal or less than 8 from "ADV_OBJ" directory.

More intelligible explanations will be provided below.

The name of the advanced content directory ADVCT and directories and filenames included in this directory are described using d-characters or dl-characters. Sub-directories exist under the advanced content directory ADVCT. The depth of layers of the sub-directories is eight layers or less, and the total number of sub-directories shall be less than 512 in this embodiment. If the directories are too deep, or if the total number of sub-directories is too large, accessibility drops. Therefore, in this embodiment, high-speed access is assured by limiting the number of layers and that of directories.

<Files for Advanced Content>

The total number of files under the "ADV_OBJ" directory shall be limited to 512×2047, and the total number of files in each directory shall be less than 2048. Character code set "A to Z a to z 0 to 9 SP ! $ & ' ( ) +, −. ; = @ _" (20h, 21h, 24h to 29h, 2Bh to 2Eh, 30h to 39h, 3Bh, 3Dh, 40h to 5Ah, 5Fh, 61h to 7Ah in ISO 8859-1) are used for filename. The length of the filename shall be equal to or less than 255 characters. For use of the filename, following rule shall be applied.

A disc may have characters in both upper case and lower case.

A disc must not have the same filename where only the difference case character. (e.g. test.jpg and TEST.JPG must not co-exist in a disc)

Filename referred in XML/Script document shall match the filename for Advanced Element in a disc/Persistent Storage/network. <case-sensitive> (e.g. test.jpg is not linked to TEST.JPG)

More intelligible explanations will be provided below.

The total number of files that can be recorded under the advanced content directory ADVCT shall be limited to be 512×2047, and the total number of files that can be recorded in each directory is shall be less than 2048. The filename adopts a structure in which a dot "." is allocated after each filename, and an extension is allocated after the dot ".". The advanced content directory ADVCT is recorded directly under the root directory of the information storage medium, and the playlist file PLLST is recorded directly under this advanced content directory ADVCT.

<Playlist>

A Playlist file shall reside under "ADV_OBJ" directory with having the filename "VPLST%%%.XPL" for a player which connects with a display device, or the filename "APLST&&&.XPL" for a player which doesn't connect with a display device, in case of Category 2 disc and Category 3 disc. If the Playlist file is necessary to be read in the startup sequence, the Playlist file shall reside directly under "ADV_OBJ" directory (its sub-directories are not included), and "%%%" and "&&&" are described by the value "000" to "999". In this case, the Playlist file which has the maximum number shall be read initially in the startup sequence.

More intelligible explanations will be provided below.

A plurality of playlist files PLLST can be recorded on the information storage medium DISC. As the playlist file PLLST, two different types of playlist files PLLST can be set. The filename of a playlist file PLLST which is directly accessed by the information playback apparatus upon playback is set to be "VPLIST%%%.XML", and that of a playlist file PLLST which is not directly accessed by the information playback apparatus is set to be "APLIST&&&.XML". Note that "%%%" and "&&&" store numerals ranging from 000 to 999.

<Filename for Advanced Video Title Set (Advanced VTS)>

The filename for Video Title Set Information shall be "HVA00001.VTI".

The filename for Enhanced Video Object shall have extension of "EVO".

The filename of Time Map Information for Contiguous Block shall have same body in filename as that of a corresponding EVOB, with extension of "MAP".

The filename of Time Map Information for Interleaved Block shall have same body in filename as that of corresponding EVOBs, with extension of "MAP".

The filename of Time Map Information for Standard VTS referred in Advanced Content shall be "HVSO@@@@.MAP".

"@@@@" shall be four characters of "0001" to "1998" which are same number as EVOB index number assigned to each EVOBI and TMAP.

More intelligible explanations will be provided below.

The advanced video title set information file ADVTSI shown in FIG. 11 shall have a filename of "HVA00001.VTI". The extension of the filename of the primary enhanced video object file P-EVOB and that of the secondary enhanced video object file S-EVOB shall be "EVO". The extension of the filename of the time map file PTMAP of the primary video set and that of the time map file STMAP of the secondary video set shall be "MAP".

The number of files of the primary video set time map files PTMAP and secondary video set time map files STMAP shall be limited to 999 or fewer. By specifying the number of time map files, speeding up of access control to the enhanced object EVOB is guaranteed.

FIGS. 12, 13A and 13B show the data structure of an advanced content and explanations of effects and the like.

<Advanced Content>

Advanced Content realizes more interactivity in addition to the extension of audio and video realized by Standard Content. Advanced Content consists of followings.

Playlist

Primary Video Set

Secondary Video Set

Advanced Application

Advanced Subtitle

Playlist gives playback information among presentation objects as shown in FIG. 12. For instance, to play back Primary Video Set, a player reads a TMAP file by using URI described in the Playlist, interprets an EVOBI referred by the TMAP and access appropriate P-EVOB defined in the EVOBI. To present Advanced Application, a player reads a Manifest file by using URI described in the Playlist, and starts to present an initial Markup file described in the Manifest file after storing resource elements (including the initial file).

More intelligible explanations will be provided below.

In this embodiment, there is provided the advanced content ADVCT which further extends the audio and video expression format implemented by the standard content STDCT and realizes interactivity. The advanced content ADVCT consists of the playlist PLLST, the primary video set PRMVS, secondary video set SCDVS, advanced application ADAPL, and advanced subtitle ADSBT shown in FIG. 10. The playlist PLLST shown in FIG. 12 records information related with the playback methods of various kinds of object information, and these pieces of information are recorded as one playlist file PLLST under the advanced content directory ADVCT, as shown in FIG. 11.

<Playlist> (Again)

A Playlist file is described by XML and one or more Playlist file are located on a disc. A player interprets initially a Playlist file to play back Advanced Content. The Playlist file consists of following information.

Object Mapping Information
Track Number Assignment Information
Track Navigation Information
Resource Information
Playback Sequence Information
System Configuration Information
Scheduled Control Information More intelligible explanations will be provided below.

The playlist PLLST or the playlist file PLLST which records the playlist PLLST is described using XML, and one or more playlist files PLLST are recorded in the information storage medium DISC. In the information storage medium DISC which records the advanced content ADVCT that belongs to category 2 or category 3 in this embodiment, the information playback apparatus searches for the playlist file PLLST immediately after insertion of the information storage medium DISC. In this embodiment, the playlist file PLLST includes the following information.

1) Object Mapping Information OBMAPI

Object mapping information OBMAPI is set as playback information related with objects such as the primary video set PRMVS, secondary video set SCDVS, advanced application ADAPL, advanced subtitle ADSBT, and the like. In this embodiment, the playback timing of each object data is described in the form of mapping on a title timeline to be described later. In the object mapping information OBMAPI, the locations of the primary video set PRMVS and secondary video set SCDVS are designated with reference to a location (directory or URL) where their time map file PTMAP or time map file STMAP exists. In the object mapping information OBMAPI, the advanced application ADAPL and advanced subtitle ADSBT are determined by designating the manifest file MNFST corresponding to these objects or its location (directory or URL).

2) Track Number Assignment Information

This embodiment allows to have a plurality of audio streams and sub-picture streams. On the playlist PLLST, information indicating what number of stream data is to be presented is described. The information indicating what number of stream is used is described as a track number. As the track number to be described, video track numbers for video streams, sub video track numbers for sub video streams, audio track numbers for audio streams, sub audio track numbers for sub audio streams, subtitle track numbers for subtitle streams, and application track numbers for application streams are set.

3) Track Navigation Information TRNAVI

Track navigation information TRNAVI describes related information for the assigned track numbers, and records attribute information for respective track numbers as lists for the sake of convenience for user's selection. For example, language codes and the like are recorded in the navigation information for respective track numbers: track No. 1=Japanese; track No. 2=English; track No. 3=Chinese; and so forth. By utilizing the track navigation information TRNAVI, the user can immediately determine a favorite language.

4) Resource Information RESRCI

Resource information RESRCI indicates timing information such as a time limit of transfer of a resource file into the file cache and the like. This resource information also describes reference timings of resource files and the like in the advanced application ADAPL.

5) Playback Sequence Information PLSQI

Playback sequence information PLSQI describes information, which allows the user to easily execute jump processing to a given chapter position, such as chapter information in a single title and the like. This playback sequence information PLSQI is presented as a time designation point on a title timeline TMLE.

6) System Configuration Information

System configuration information records structural information required to constitute a system such as a stream buffer size that represents the data size required upon storing data in the file cache via the Internet, and the like.

7) Scheduled Control Information SCHECI

Scheduled control information SCHECI records schedule indicating pause positions (timings) and event starting positions (timings) on the title timeline TMLE.

<Data Reference from Playlist>

FIG. 12 shows the data reference method to respective objects by the playlist PLLST. For example, when specific primary enhanced object P-EVOB is to be played back on the playlist PLLST, that primary enhanced object P-EVOB shall be accessed after enhanced video object information EVOBI which records its attribute information is referred to. The playlist PLLST specifies the playback range of the primary enhanced object P-EVOB as time information on the timeline. For this reason, the time map information PTMAP of the primary video set shall be referred to first as a tool used to convert the designated time information into the address position on the information storage medium DISC. Likewise, the playback range of secondary enhanced video object S-EVOB is also described as time information on the playlist PLLST. In order to search the data source of the secondary enhanced video object S-EVOB on the information storage medium DISC within that range, the time map information STMAP of the secondary video set SCDVS is referred to first. Data of the advanced application ADAPL shall be stored on the file cache before they are used by the information playback apparatus, as shown in FIG. 10. For this reason, in order to use various data of the advanced application ADAPL, the manifest file MNFST shall be referred to from the playlist PLLST to transfer various resource files described in the manifest file MNFST (the storage locations and resource filenames of the resource files are also described in the manifest file MNFST) onto the file cache FLCCH (data cache DTCCH). Similarly, in order to user various data of the advanced subtitle ADSBT, they shall be stored on the file cache FLCCH (data cache DTCCH) in advance. By utilizing the manifest file MNFSTS of the advanced subtitle ADSBT, data transfer to the file cache FLCCH (data cache DTCCH) can be made. Based on the markup file MRKUPS in the advanced subtitle ADSBT, the representation position and timing of the advanced subtitle ADSBT on the screen can be detected, and the font file FONTS in the advanced subtitle ADSBT can be utilized when the advanced subtitle ADSBT information is presented on the screen.

<Reference to Time Map>

In order to present the primary video set PRMVS, the time map information PTMAP shall be referred to and access processing to primary enhanced video object P-EVOB defined by the enhanced video object information EVOBI shall be executed.

Point contents and effects in a data structure in advanced contents ADVCT according to this embodiment will now be described with reference to FIGS. 13A and 13B. There are the following eight point contents and effects.

Characteristics/point contents according to this embodiment will now be described hereinafter.

1) As setting management information concerning a time axis layout and a two-dimensional layout in a user display screen, hierarchical structures of a playlist PLLST and a markup MRKUP are provided, and both structures are written in the same description format (XML).

2) A media clock according to a title timeline TMLE is provided in the playlist PLLST, and a page clock/application clock according to a setting by a timing element is provided in the markup MRKUP. Moreover, both clocks can be independently set (they do not have to be synchronized with each other).

3) A screen layout on an initial stage in a moving picture (an enhanced video object EVOB) is specified in the playlist PLLST (a video attribute item element VABITM), and can be changed in accordance with execution of a script SCRPT.

4) A layout of a display region (an application region APPRGN) of an advanced application ADAPL in the screen is specified in a manifest MNFST, and a layout for each element is specified in the markup MRKUP.

5) A plurality of markups MRKUP can be set with respect to one playlist PLLST.

6) Executing a script SCRPT set in a markup page allows transition between a plurality of markup pages MRKUP in the same playlist PLLST.

7) A plurality of markup pages MRKUP which can be targets of transition in the same playlist PLLST can be specified by a plurality of manifests MNFST. Additionally, a markup page MRKUP which is displayed first in the plurality of markup pages MRKUP is written in each corresponding manifest MNFST. A specified markup file MRKUP is temporarily stored in a file cache FLCCH in advance, and original storage positions of element files such as a markup file MRKUP, a still image IMAGE or effect audio EFTAD which should be temporarily stored in the file cache are written in a playlist PLLST as a list of application resource elements APRELE (see FIGS. 63A to 63C).

8) A markup page MRKUP which is displayed on an initial stage is specified from a playlist PLLST via SRC attribute information (resource attribute information) of an advance application segment ADAPL or SRC attribute information (resource attribute information) of an markup element MRKUP in a manifest MNFST.

Effects with respect to the characteristics/point contents (1) to (8) will now be described.

(1) Expandability and flexibility of setting management information concerning a layout are improved. Further, interpretation processing of management information can be facilitated and shared by the same description format.

(2) Application screens (screens concerning an advanced application ADAPL and an advanced subtitle ADSBT) played back with an application clock at a standard speed can be simultaneously displayed during high-speed playback/rewind playback of moving picture information synchronized with a title timeline TMLE, and the expression for a user can be greatly improved.

(3) Since a display region of a moving picture can be arbitrarily set in a user screen, the expression for a user can be greatly improved.

(4) Arrangement positions of respective elements of an advanced application ADAPL are grouped (by an application region APPRGN), thereby facilitating management using an advanced application manager ADAMNG. Furthermore, layout management with respect to a display region of a moving picture (e.g., prevention of overlapping) can be facilitated.

(5) Transition between a plurality of markup pages MRKUP can be displayed during display of the same moving picture, thus greatly improving the expression for a user.

(6) A method of transition between a plurality of markup pages MRKUP becomes considerably flexible (for example, transition between markup pages MRKUP does not occur immediately after a user specifies an action, and delayed transition can be set in a script SCRPT in accordance with a display screen of a moving picture (see new effects (1.3) obtained as a result of technical innovation of FIGS. 2A to 2C). The delayed transition can be set by using an event element EVNTEL shown in (f) of FIG. 75B.

(7) Since markup page MRKUP information specified by a manifest MNFST can be stored in the file cache FLCCH in advance, transition between a plurality of markup pages MRKUP can be carried out at a high speed, thus improving user-friendliness (leaving a favorite impression on a user). Moreover, since an original storage position of an element file such as a markup file MRKUP, a still image IMAGE or effect audio EFTAD which should be temporarily stored in the file cache FLCCH is written in the playlist PLLST as a list of application resource elements APRELE, a list of resources which should be temporarily stored in the file cache can be recognized in advance, and the efficiency of download processing of resources to the file cache FLCCH can be promoted.

(8) The expandability for specification of a markup page MRKUP from the playlist PLLST can be improved, and the editing simplicity can be also enhanced.

<Network Route>

FIG. 1 shows an example of the network route from the network server NTSRV to the information recording and playback apparatus 1, which goes through the router 11 in the home via the optical cable 12 to attain data connection via a wireless LAN in the home. However, this embodiment is not limited to this. For example, this embodiment may have another network route. FIG. 1 illustrates a personal computer as the information recording and playback apparatus 1. However, this embodiment is not limited to this. For example, a single home recorder or a single home player may be set as the information recording and playback apparatus. Also, data may be directly displayed on the monitor by a wire without using the wireless LAN.

In this embodiment, the network server NTSRV shown in FIG. 1 stores information of the secondary video set SCDVS, advanced application ADAPL, and advanced subtitle ADSBT shown in FIG. 10 in advance, and these pieces of information can be delivered to the home via the optical cable 12. Various data sent via the optical cable 12 are transferred to the information recording and playback apparatus 1 in the form of wireless data 17 via the router 11 in the home. The router 11 comprises the wireless LAN controller 7-2, data manager 9, and network controller 8. The network controller 8 controls data updating processing with the network server NTSRV, and the wireless LAN controller 7-2 transfers data to the home wireless LAN. The data manager 9 controls such data transfer processing. Data of various contents of the secondary video set SCDVS, advanced application ADAPL, and advanced subtitle ADSBT, which are sent to be multiplexed on the wireless data 17 from the router 11, are received by the wireless LAN controller 7-1, and are then sent to the advanced content playback unit ADVPL, and some data are stored in the data cache DTCCH shown in FIG. 14. The information playback apparatus of this embodiment incorporates the advanced content playback unit ADVPL which plays back the advanced content ADVCT, the standard content playback unit STDPL which plays back the standard content STDCT, and the recording and playback processor 4 which performs video recording on the recordable information storage medium DISC or the hard disk device 6 and can play back data from there. These playback units and the recording and playback processor 4 are organically controlled by the main CPU 5. As shown in FIG. 1, information is played back or recorded from or on the information storage medium DISC in the information recording and playback unit 2. In this embodiment, media to be played back by the advanced content playback unit ADVPL are premised on playback of information from the information recording and playback unit 2 or the persistent storage drive (fixed or portable flash memory drive) 3. In this embodiment, as described above, data recorded on the network server NTSRV can also be played back. In this case, as described above, data saved in the network server NTSRV go through the optical cable 12, go through the wireless LAN controller 7-2 in the router 11 under the network control in the router 11 to be transferred in the form of wireless data 17, and are then transferred to the advanced content playback unit ADVPL via the wireless LAN controller 7-1. Video information to be played back by the advanced content playback unit ADVPL can be displayed on the wide-screen TV monitor 15 from the wireless LAN controller 7-1 in the form of wireless data 18 when it can be displayed on the display 13 or when a user request of presentation on a wider screen is detected. The wide-screen TV monitor 15 incorporates the video processor 24, video display unit 21, and wireless LAN controller 7-3. The wireless data 18 is received by the wireless LAN controller 7-3, then undergoes video processing by the video processor 24, and is displayed on the wide-screen TV monitor 15 via the video display unit 21. At the same time, audio data is output via the loudspeakers 16-1 and 16-2. The user can make operations on a window (menu window or the like) displayed on the display 13 using the keyboard 14.

<Internal Structure of Advanced Content Playback Unit>

The internal structure of the advanced content playback unit ADVPL in the system explanatory diagram shown in FIG. 1 will be described below with reference to FIG. 14. In this embodiment, the advanced content playback unit ADVPL comprises the following five logical functional modules.

<Data Access Manager>

Data Access Manager is responsible to exchange various kind of data among data sources and internal modules of Advanced Content Player.

More intelligible explanations will be provided below.

A data access manager DAMNG is used to manage data exchange between the external data source where the advanced content ADVCT is recorded, and modules in the advanced content playback unit ADVPL. In this embodiment, as the data source of the advanced content ADVCT, the persistent storage PRSTR, network server NTSRV, and information storage medium DISC are premised, and the data access manager DAMNG exchanges information from them. Various kinds of information of the advanced content ADVCT are exchanged with a navigation manager NVMNG (to be described later), the data cache DTCCH, and a presentation engine PRSEN via the data access manager DAMNG.

<Data Cache>

Data Cache is temporal data storage for Advanced Content playback.

More intelligible explanations will be provided below.

The data cache DTCCH is used as a temporal data storage (temporary data save location) in the advanced content playback unit ADVPL.

Navigation Manager

Navigation Manager is responsible to control all functional modules of Advanced Content player in accordance with descriptions in Advanced Application. Navigation Manager is also responsible to control user interface devices, such as remote controller or front panel of a player. Received user interface device events are handled in Navigation Manager.

More intelligible explanations will be provided below.

The navigation manager NVMNG controls all functional modules of the advanced content playback unit ADVPL in accordance with the description contents of the advanced application ADAPL. This navigation manager NVMNG also makes control in response to a user operation UOPE. The user operation UOPE is generated based on key in on a front panel of the information playback apparatus, that on a remote controller, and the like. Information received from the user operation UOPE generated in this way is processed by the navigation manager NVMNG.

<Presentation Engine>

Presentation Engine is responsible for playback of presentation materials, such as Advanced Element of Advanced Application, Advanced Subtitle, Primary Video Set and Secondary Video set.

The presentation engine PRSEN performs presentation playback of the advanced content ADVCT.

<AV Renderer>

AV Renderer is responsible to composite video inputs and mix audio inputs from other modules and output to external devices such as speakers and display.

More intelligible explanations will be provided below.

An AV renderer AVRND executes composition processing of video information and audio information input from other modules, and externally outputs composite information to the loudspeakers 16-1 and 16-2, the wide-screen TV monitor 15, and the like. The audio information used in this case may be either independent stream information or audio information obtained by mixing the sub audio SUBAD and main audio MANAD.

<Implementation of Automatic Updating of Object Information, etc.>

A practical example of new effects obtained as a result of the technical devices according to this embodiment, which have been described using FIGS. 2A, 2B, and 2C, will be described below with reference to FIGS. 15A and 15B. As a method of exhibiting a new effect 5.1) "Automatic updating of object information and intra-disc management information" of 5] "Provide information update function on disc using network," in this embodiment, as shown in FIGS. 15A and 15B, the commercial 44 as commercial information, the independent window 32 for a commercial, the telop commercial 43, and the preview 41 can always be supplied to the user as the latest video information. This point is a large technical feature in this embodiment.

By always changing the preview 41 to the latest information, the preview of the movie can be timely conducted to the users so as to create an opportunity to call them to a movie theater. In this embodiment, since the commercials (commercial 44, independent window 32 for a commercial, and telop commercial 43) are presented to be linked with playback of the main title 31, sponsor charges are collected from commercial sponsors like in normal TV broadcasting, thus holding down the sales prices of the information storage media to the users. The concept of insertion of commercials into video information has been popularly proposed conventionally. In this embodiment, the latest commercial information is read from the network server NTSRV and the latest commercial information is presented to be linked with showing of the main title 31 recorded on the information storage medium DISC. This point is a large technical feature in this embodiment. The latest preview 41 and commercial information are sequentially updated and saved in the network server NTSRV shown in FIG. 1, and are downloaded via the network in synchronism with the playback timing of the main title 31 recorded in the information storage medium DISC. The relationship between respective objects shown in FIGS. 15A and 15B and those shown in FIG. 10 will be described below.

In FIGS. 15A and 15B, the main title 31 includes the main video MANVD and main audio MANAD of the primary audio video PRMAV in the primary video set PRMVS. The preview 41, commercial 44, and independent window 32 for a commercial are also recorded as the sub video SUBVD and sub audio SUBAD of the primary audio video PRMAV in the primary video set PRMVS in the information storage medium DISC. However, when a specific period of time has elapsed after creation of the information storage medium DISC, these pieces of information become too old to be presented. In such case, these pieces of information are substituted by the sub video SUBVD and sub audio SUBAD of the secondary audio video SCDAV in the secondary video set SCDVS saved in the network server NTSRV, and are presented as the commercial 44 or the independent window 32 for a commercial. In this embodiment, the commercial 44 which is recorded in advance on the information storage medium DISC can be recorded as the main video MANVD and main audio MANAD of the primary audio video PRMAV in the primary video set PRMVS as another embodiment. Likewise, when information of the preview 41 is recorded in the information storage medium DISC, it is recorded in the sub video SUBVD and sub audio SUBAD of the primary audio video PRMAV in the primary video set PRMVS or in the main video MANVD and main audio MANAD of the primary audio video PRMAV. When a specific period of time has elapsed after creation of the information storage medium DISC upon playback, that information is downloaded from the network server NTSRV as information of the sub video SUBVD and sub audio SUBAD in the secondary audio video SCDAV in the secondary video set SCDVS, and the downloaded information is presented. In this way, according to this embodiment, the commercial 44, information of the independent window 32 for a commercial or telop commercial 43, and the preview 41 can always be presented to the user as the latest ones, thus improving the PR effects.

<Detailed Playback Method of Video Content>

Presentation examples of the video content in this embodiment will be described in detail below with reference to FIGS. 15A and 15B.

In FIG. 15A(a), when the information storage medium DISC is inserted into the information recording and playback apparatus 1, the necessity explanatory video information 42 of detailed navigation is presented first. If the user does not feel the necessity of detailed navigation, he or she ignores it. However, if the user wants to see an explanation of the method of playing back the advanced content ADVCT on this information storage medium DISC, he or she inputs necessity of detailed navigation to present directions of use of detailed navigation (not shown). In case of FIG. 15B(c), how to use a help key (to be described later) is explained in the necessity explanatory video information 42 of detailed navigation, and a help icon is presented all the time. As a result, the user can designate the help icon when needed to ask for an explanation of the use method.

In FIG. 15A(a), the aforementioned commercial 44 is inserted in the middle of presentation of the main title 31 like in the broadcast TV screen, and the presentation method and timing of the commercial 44 are the same as those of commercials normally presented on broadcast reception TVs. In FIG. 15A(a), the preview 41 of a forthcoming movie of the content provider of the information storage medium DISC is presented after completion of presentation of the main title 31.

In FIG. 15B(b), the latest commercial 43 is presented to be superimposed on presentation of the main title 31 in the form of a telop. As a method of always updating the presentation information of the telop commercial 43 to the latest information, this embodiment utilizes the advanced subtitle ADSBT with the aid of network downloading. This point is a large technical feature in this embodiment. That is, at an early timing, the telop commercial 43 is presented in the form of a telop (running text information) in the sub-picture SUBPT of the primary audio video PRMAV in the primary video set PRMVS. When a specific period of time has elapsed after the manufacture of the information storage medium DISC, since the latest information of the telop commercial 43 is recorded as the advanced subtitle ADSBT in the network server NTSRV, it is downloaded via the network and is presented as the telop commercial 43.

A video content presentation example in FIG. 15B(c) will be explained below. In FIG. 15B(c), the preview 41 of a movie to be screened in a movie theater is presented immediately after the necessity explanatory video information 42 of detailed navigation, and the main title 31 is presented after presentation of the preview 41. In this case, the independent window 32 for a different commercial is presented in addition to the main title 31, and the help icon 33 is presented at the same time. In this embodiment, the contents of the main title 31 are recorded in advance in the information storage medium DISC as the main video MANVD and main audio MANAD of the primary audio video PRMAV in the primary video set PRMVS. The independent window 32 for a different commercial is recorded as the sub video SUBVD and sub audio SUBAD of the primary audio video PRMAV in the primary video set PRMVS in the information storage medium DISC. This information is presented to the user at an early timing. When a specific period of time has elapsed after the manufacture of the information storage medium DISC, the independent window 32 for a different commercial can present an updated video information in this embodiment. As this method, information of the independent window 32 for the latest commercial is saved in the network server NTSRV as the sub video SUBVD and sub audio SUBAD of the secondary audio video SCDAV in the secondary video set SCDAV, and is downloaded as needed via the network, thus presenting the latest information to the user. In the embodiment in FIG. 15B(c), the help icon 33 includes the still picture file IMAGE and script file SCRPT of the advanced application ADAPL.

<Practical Example of Presentation Window>

FIG. 16 shows an example of the presentation window at point α when the main title 31, the independent window 32 for a commercial, and the help icon 33 are displayed at the same time in FIG. 15B(c).

The main title 31 is presented on the upper left area in FIG. 16, the independent window 32 for a commercial is presented on the upper right area, and the help icon 33 is presented on the lower area. New effects as a result of the technical devices according to this embodiment shown in the window of FIG. 16 and FIGS. 2A, 2B, and 2C will be described below.

As for 1] "Make flexible and impressive reactions in response to user's actions" as the new effect obtained as a result of the technical devices according to this embodiment described using FIGS. 2A, 2B, and 2C, a flexible and impressive window close to a homepage on the Internet can be created in this embodiment. The help icon 33 in FIG. 16 corresponds to 1.4) "PC-like help" and 1.5) "How to use guide of menu, etc.," as the practical new effects of this embodiment. Picture data of the help icon 33 on this window exists as the still picture file IMAGE of the advanced application ADAPL, and its information is stored in the advanced element directory ADVEL in the advanced application directory ADAPL under the advanced content directory ADVCT in the information storage medium DISC shown in FIG. 11. When the user clicks the help icon 33, a help compatible picture begins to move. Command processing related with such movement is recorded in the script file SCRPT in the advanced application ADAPL, i.e., it is stored in the script file SCRPT under the advanced navigation directory ADVNV in the advanced application directory ADAPL under the advanced content directory ADVCT in FIG. 11. Information used to designate the still picture of the help icon 33 and an area defined by the script file is recorded in the markup file MRKUP shown in FIG. 11, and associating information (related information required to download data) among these pieces of information is recorded in the manifest file MNFST. A plurality of pieces of information such as the stop button 34, play button 35, FR (fast-rewinding) button 36, pause button 37, FF (fast-forwarding) button 38, and the like shown in FIG. 16 are categorized as the advanced application ADAPL. Still pictures corresponding to these icons are stored in the still picture file IMAGE in FIG. 11, execution commands upon designation of each of these buttons are recorded in the script file in FIG. 11, and their area designations are recorded in the markup file MRKUP.

The window in FIG. 16 which corresponds to 3.1) "Simultaneously present a plurality of pieces of video information by means of multi-windows" and 3.4) "Simultaneously present scrolling text to be superimposed on video information" of 3] "Simultaneously present independent information to be superimposed on video information during playback" of the new effects as a result of the technical devices according to this embodiment shown in FIGS. 2A, 2B, and 2C will be described below.

In the existing DVD, only one type of video information can be displayed on one window. By contrast, in this embodiment, the sub video SUBVD and sub audio SUBAD can be presented simultaneously with the main video MANVD and main audio MANAD. More specifically, the main title 31 in FIG. 16 corresponds to the main video MANVD and main audio MANAD in the primary video set PRMVS, and the independent window 32 for a commercial on the right side corresponds to the sub video SUBVD and sub audio SUBAD, so that the two windows can be displayed at the same time. Furthermore, in this embodiment, the independent window 32 for a commercial on the right side in FIG. 16 can be presented by substituting it by the sub video SUBVD and sub audio SUBAD in the secondary video set SCDVS. This point is a large technical feature in this embodiment. That is, the sub video SUBVD and sub audio SUBAD in the primary audio video of the primary video set PRMVS are recorded in advance in the information storage medium DISC, and the sub video SUBVD and sub audio SUBAD in the secondary video set SCDVS to be updated are recorded in the network server NTSRV. Immediately after creation of the information storage medium DISC, the independent window 32 for a commercial recorded in advance in the information storage medium DISC is presented. When a specific period of time has elapsed after creation of the information storage medium DISC, the sub video SUBVD and sub audio SUBAD in the secondary video set SCDVS recorded in the network server NTSRV are downloaded via the network and are presented to update the independent window 32 for a commercial to the latest video information. In this manner, the independent window 32 for the latest commercial can always be presented to the user, thus improving the commercial effect of a sponsor. Therefore, by collecting a large amount of commercial charge from the sponsor, the price of the information storage medium DISC to be sold can be hold down, thus promoting prevalence of the information storage medium DISC in this embodiment. In addition, a telop text message 39 shown in FIG. 16 can be presented to be superimposed on the main title 31. As the telop text message, the latest information such as news, weather forecast, and the like is saved on the network server NTSRV in the form of the advanced subtitle ADSBT, and is presented while being downloaded via the network as needed, thus greatly improving the user's convenience. Note that text font information of the telop text message at that time can be stored in the font file FONTS in the advanced element directory ADVEL in the advanced subtitle directory ADSBT, as shown in FIG. 11. Information about the size and presentation position on the main title 31 of this telop text message 39 can be recorded in the markup file MRKUPS of the advanced subtitle ADSBT in the advanced navigation directory ADVNV under the advanced subtitle directory ADSBT in FIG. 11.

<Overview of Information in Playlist>

An overview of information in the playlist PLLST in this embodiment will be described below with reference to FIG. 17. The playlist PLLST in this embodiment is recorded in the playlist file PLLST located immediately under the advanced content directory ADVCT in the information storage medium DISC or persistent storage PRSTR, as shown in FIG. 11, and records management information related with playback of the advanced content ADVCT. The playlist PLLST records information such as playback sequence information PLSQI, object mapping information OBMAPI, resource information RESRCI, and the like. The playback sequence information PLSQI records information of each title in the advanced content ADVCT present in the information storage medium DISC, persistent storage PRSTR, or network server NTSRV, and division position information of chapters that divide video information in the title. The object mapping information OBMAPI manages the presentation timings and positions on the screen of respective objects of each title. Each title is set with a title timeline TMLE, and the presentation start and end timings of each object can be set using time information on that title timeline TMLE. The resource information RESRCI records information of the prior storage timing of each object information to be stored in the data cache DTCCH (file cache FLCCH) before it is presented on the screen for each title. For example, the resource information RESRCI records information such as a loading start time LDSTTM for starting loading onto the data cache DTCCH (file cache FLCCH), a use valid period VALPRD in the data cache DTCCH (file cache FLCCH), and the like.

Figure 70:
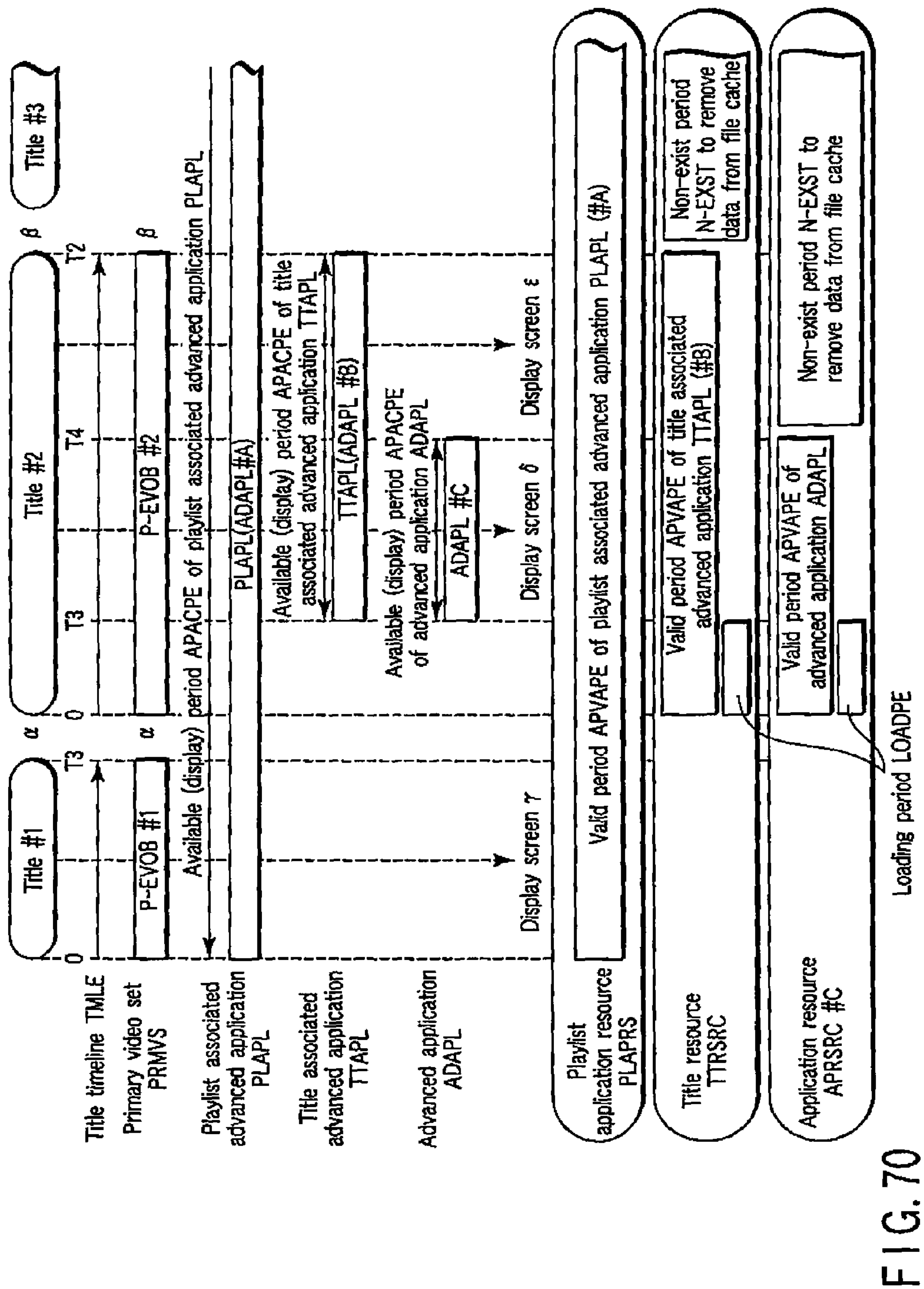
FIG. 70 is an exemplary view showing a relationship between a playlist application resource, a title resource and an application resource.

A set of pictures (e.g., one show program) which is displayed for a user is managed as a title in the playlist PLLST. A title which is displayed first when playing back/displaying advanced contents ADVCT based on the playlist PLLST can be defined as a first play title FRPLTT. A playlist application resource PLAPRS can be transferred to the file cache FLCCH during playback of the first play title FRPLTT as shown in FIG. 70, and a download time of the resource required for playback of a title #1 and subsequent titles can be shortened. It is also possible to set the playlist PLLST in such a manner that the first play title FRPLTT cannot be set based on a judgment by a content provider.

<Presentation Control Based on Title Timeline>

As shown in FIG. 17, management information which designates an object to be presented and its presentation location on the screen is hierarchized into two levels, i.e., the playlist PLLST, and the markup file MRKUP and the markup file MRKUPS in the advanced subtitle ADSBT (via the manifest file MNFST and the manifest file MNFSTS in the advanced subtitle ADSBT), and the presentation timing of an object to be presented in the playlist PLLST is set in synchronism with the title timeline TMLE. This point is a large technical feature in this embodiment. In addition, the presentation timing of an object to be presented is set in synchronism with the title timeline TMLE similarly in the markup file MRKUP or the markup file MRKUPS of the advanced subtitle ADSBT. This point is also a large technical feature in this embodiment. Furthermore, in this embodiment, the information contents of the playlist PLLST as management information that designates the object to be presented and its presentation location, the markup file MRKUP, and the markup file MRKUPS of the advanced subtitle ADSBT are described using an identical description language (XML). This point is also a large technical feature in this embodiment, as will be described below. With this feature, easy edit and change processing of the advanced content ADVCT by its producer can be greatly improved compared to the conventional DVD-Video. As another effect, processing such as skip processing of the playback location and the like in the advanced content playback unit ADVPL which performs presentation processing upon special playback can be simplified.

<Relationship Between Various Kinds of Information on Window and Playlist>

A description of features of this embodiment will be continued with reference to FIG. 16. In FIG. 16, the main title 31, the independent window 32 for a commercial, and various icon buttons on the lower area are presented on the window. The main video MANVD in the primary video set PRMVS is presented on the upper left area of the window as the main title 31, and its presentation timing is described in the playlist PLLST. The presentation timing of this main title 31 is set in synchronism with the title timeline TMLE. The presentation location and timing of the independent window 32 for a commercial recorded as, e.g., the sub video SUBVD are also described in the aforementioned same playlist PLLST. The presentation timing of this the independent window 32 for a commercial is also designated in synchronism with the title timeline TMLE. In the existing DVD-Video, the window from the help icon 33 to the FF button 38 in, e.g., FIG. 16 is recorded as the sub-picture SUBPT in a video object, and command information executed upon depression of each button from the help icon 33 to the FF button 38 is similarly recorded as highlight information HLI in a navigation pack in the video object. As a result, easy edit and change processing by the content producer is not allowed. By contrast, in this embodiment, a plurality of pieces of command information corresponding to window information from the help icon 33 to the FF button 38 are grouped together as the advanced application ADAPL, and only the presentation timing and the presentation location on the window of the grouped advanced application ADAPL are designated on the playlist PLLST. Information related with the grouped advanced application ADAPL shall be downloaded onto the file cache FLCCH (data cache DTCCH) before it is presented on the window. The playlist PLLST describes only the filename and file saving location of the manifest file MNFST (manifest file MNFSTS) that records information required to download data related with the advanced application ADAPL and advanced subtitle ADSBT. The plurality of pieces of window information themselves from the help icon 33 to the FF button 38 in FIG. 16 are saved in the advanced element directory ADVEL as still picture files IMAGE (see FIG. 11). Information which manages the locations on the window and presentation timings of respective still pictures IMAGE from the help icon 33 to the FF button 38 in FIG. 16 is recorded in the markup file MRKUP. This information is recorded in the markup file MRKUP in the advanced navigation directory ADVNV in FIG. 11. Each control information (command information) to be executed upon pressing of each of buttons from the help icon 33 to the FF button 38 is saved in the script file SCRPT in the advanced navigation directory ADVNV in FIG. 11, and the filenames and file saving locations of these script files SCRPT are described in the markup file MRKUP (and manifest file MNFST). In FIG. 11, the markup file MRKUP, script file SCRPT, and still picture file IMAGE are recorded in the information storage medium DISC. However, this embodiment is not limited to this, and these files may be saved in the network server NTSRV or persistent storage PRSTR. In this way, the overall layout and presentation timing on the window are managed by the playlist PLLST, and the layout positions and presentation timings of respective buttons and icons are managed by the markup file MRKUP. The playlist PLLST makes designation with respect to the markup file MRKUP via the manifest file MNFST. Video information and commands (scripts) of various icons and buttons, and command information are stored in independent files compared to the conventional DVD-Video in which they are stored in a video object, and undergo middle management using the markup file MRKUP. This structure can greatly facilitate edit and change processing of the content producer. As for the telop text message 39 shown in FIG. 16, the playlist PLLST designates the filename and file saving location of the markup file MRKUPS of the advanced subtitle via the manifest file MNFSTS of the advanced subtitle (see FIG. 11). The markup file MRKUPS of the advanced subtitle is recorded not only in the information storage medium DISC but it can also be saved on the network server NTSRV or persistent storage PRSTR in this embodiment.

<Playlist> (Again)

Playlist is used for two purposes of Advanced Content playback. The one is for initial system configuration of a player. The other is for definition of how to play plural kind of presentation objects of Advanced Content. Playlist consists of following configuration information for Advanced Content playback.

Object Mapping Information for each Title
Track Number Assignment
Resource Information
Playback Sequence for each Title
Scheduled Control Information for each Title
System Configuration for Advanced Content playback More intelligible explanations will be provided below.

In this embodiment, upon playback of the advanced content ADVCT, there are two use purposes of the playlist PLLST, as will be described below. The first use purpose is to define the initial system structure (advance settings of the required memory area in the data cache DTCCH and the like) in the information playback apparatus 1. The second use purpose is to define the playback methods of plural kind of presentation objects in the advanced content ADVCT. The playlist PLLST has the following configuration information.

1) Object mapping information OBMAPI of each title
Track number assignment
Resource information RESRCI
2) Playback sequence information PLSQI of each title 3) System configuration for playback of the advanced content ADVCT <Resource Information>

On Object Mapping Information in Playlist, there is information element which specifies when resource files are needed for Advanced Application playback or Advanced Subtitle playback. They are called Resource Information. There are two types of Resource Information. The one is the Resource Information which is associated to Application. The other is the Resource Information which is associated to Title.

More intelligible explanations will be provided below.

An overview of the resource information RESRCI shown in FIG. 17 will be described below. The resource information RESRCI records information indicating which timings resource files that record information needed to play back the advanced application ADAPL and advanced subtitle ADSBT are to be stored on the data cache DTCCH (file cache FLCCH) in the object mapping information OBMAPI in the playlist PLLST. In this embodiment, there are two different types of resource information RESRCI. The first type of resource information RESRCI is that related with the advanced application ADAPL, and the second type is that related with the advanced subtitle ADSBT.

<Relationship Between Track and Object Mapping>

Each Object Mapping Information of Presentation Object on Title Timeline can contain Track Number Assignment information in Playlist. Track is to enhance selectable presentation streams through the different Presentation Objects in Advanced Content. For example, it is possible to select to play main audio stream in Substitute Audio in addition to the selection of main audio streams in Primary Audio Video. There are five types of Tracks. They are main video, main audio, subtitle, sub video and sub audio.

More intelligible explanations will be provided below.

The object mapping information OBMAPI corresponding to various objects to be presented on the title timeline TMLE shown in FIG. 17 includes track number assignment information defined in the playlist PLLST.

In the advanced content ADVCT of this embodiment, track numbers are defined to select various streams corresponding to different objects. For example, audio information to be presented to the user can be selected from a plurality of pieces of audio information (audio streams) by designating the track number. As shown in, e.g., FIG. 10, the substitute audio SBTAD includes the main audio MANAD, which often includes a plurality of audio streams having different contents. By designating an audio track number defined in advance in the object mapping information OBMAPI (track number assignment), an audio stream to be presented to the user can be selected from a plurality of audio streams. Also, audio information which is recorded as the main audio MANAD in the substitute audio SBTAD can be output to be superposed on the main audio MANAD in the primary audio video PRMAV. In some cases, the main audio MANAD in the primary audio video PRMAV, which is to be superposed upon output, often has a plurality of pieces of audio information (audio streams) having different contents. In such case, an audio stream to be presented to the user can be selected from a plurality of audio streams by designating an audio track number which is defined in advance in the object mapping information OBMAPI (track number assignment).

In the aforementioned track, five different objects, i.e., the main video MANVD, main audio MANAD, subtitle ADSBT, sub video SUBVD, and sub audio SUBAD exist, and these five different objects can simultaneously record a plurality of streams having different contents. For this reason, track numbers are assigned to individual streams of these five different object types, and a stream to be presented to the user can be selected by selecting the track number.

<Information of Explanatory Title, Telop, etc.>

In this embodiment, there are two methods of displaying information of the explanatory title, telop, and the like, i.e., a method of displaying such information using the sub-picture SUBPT in the primary audio video PRMAV and a method of displaying such information using the advanced subtitle ADSBT. In this embodiment, mapping of the advanced subtitle ADBST on the timeline TMLE can be independently defined on the object mapping information OBMAPI irrespective of, e.g., the mapping situation of the primary audio video PRMAV and the like. As a result, not only pieces of information such as a title and telop, i.e., the sub-picture SUBPT in the primary audio video PRMAV and the advanced subtitle ADSBT can be simultaneously presented, but also their presentation start and end timings can be respectively uniquely set. Also, one of them can be selectively presented, thereby greatly improving the presentation performance of the subtitle and telop.

In FIG. 17, a part corresponding to the primary audio video PRMAV is indicated by a single band as P-EVOB. In fact, this band includes main video MANVD tracks, main audio MANAD tracks, sub video SUBVD tracks, sub audio SUBAD tracks, and sub-picture SUBPT tracks. Each object includes a plurality of tracks, and one track (stream) is selected and presented upon presentation. Likewise, the secondary video set SCDVS is indicated by bands as S-EVOB, each of which includes sub video SUBVD tracks and sub audio SUBAD tracks. Of these tracks, one track (one stream) is selected and presented. If the primary audio video PRMAV alone is mapped on the object mapping information OBMAPI on the title timeline TMLE, the following rules are specified in this embodiment to assure easy playback control processing.

- The main video stream MANVD shall always be mapped on the object mapping information OBMAPI and played back.
- One track (one stream) of the main audio streams MANAD is mapped on the object mapping information OBMAPI and played back (but it may not be played back). This embodiment permits to map none of the main audio streams MANAD on the object mapping information OBMAPI, regardless of such rule.
- Under the precondition, the sub video stream SUBVD mapped on the title timeline TMLE is to be presented to the user, but it is not always presented (by user selection or the like).
- Under the precondition, one track (one stream) of the sub audio streams SUBAD mapped on the title timeline TMLE is to be presented to the user, but it is not always presented (by user selection or the like).

If the primary audio video PRMAV and the substitute audio SBTAD are simultaneously mapped on the title timeline TMLE and are simultaneously presented, the following rules are specified in this embodiment, thus assuring easy control processing and reliability in the advanced content playback unit ADVPL.

- The main video MANVD in the primary audio video PRMAV shall be mapped in the object mapping information OBMAPI and shall be necessarily played back.
- The main audio stream MANAD in the substitute audio SBTAD can be played back in place of the main audio stream MANAD in the primary audio video PRMAV.
- Under the precondition, the sub video stream SUBVD is to be simultaneously presented with given data, but it is not always presented (by user selection or the like).

Under the precondition, one track (one stream) (of a plurality of tracks) of the sub audio SUBAD is to be presented, but it is not always presented (by user selection or the like).

When the primary audio video PRMAV and the secondary audio video SCDAV are simultaneously mapped on the title timeline TMLE in the object mapping information OBMAPI, the following rules are specified in this embodiment, thus assuring simple processing and high reliability of the advanced content playback unit ADVPL.

The main video stream MANVD in the primary audio video PRMAV shall be played back.

Under the precondition, one track (one stream) of the main audio streams MANAD is to be presented, but it is not always presented (by user selection or the like).

The sub video stream SUBVD and sub audio stream SUBAD in the secondary audio video SCDAV can be played back in place of the sub video stream SUBVD and sub audio stream SUBAD in the primary audio video PRMAV. When sub video stream SUBVD and sub audio stream SUBAD are multiplexed and recorded in the secondary enhanced video object S-EVOB in the secondary audio video SCDAV, playback of the sub audio stream SUBAD alone is inhibited.

<Object Mapping Position>

Time code for Title Timeline is 'Time code'. It is based on non-drop frame and described as HH:MM:SS:FF.

The life period of all presentation objects shall be mapped and described by Time code values onto Title Timeline. Presentation end timing of audio presentation may not be exactly same as Time code timing. In this case, the end timing of audio presentation shall be rounded up to Video System Time Unit (VSTU) timing from the last audio sample presentation timing. This rule is to avoid overlapping of audio presentation objects on the time on Title Timeline.

Video presentation timing for 60 Hz region, even if presentation object is 1/24 frequency, it shall be mapped at 1/60 VSTU timing. For video presentation timing of Primary Audio Video or Secondary Audio Video, it shall have 3:2 pull-down information in elementary stream for 60 Hz region, so presentation timing on the Title Timeline is derived from this information for video presentation. For graphical presentation timing of Advanced Application or Advanced Subtitle with 1/24 frequency, it shall follow graphic output timing model in this specification.

There are two conditions between 1/24 timing and 1/60 time code unit timing. The one is exactly matches both timings, and the other is mismatches between them. In case mismatch timing of 1/24 presentation object frame, it shall be rounded up to the most recent 1/60 time unit timing.

More intelligible explanations will be provided below.

A method of setting a unit of the title timeline TMLE in this embodiment will be explained below.

The title timeline TMLE in this embodiment has time units synchronized with the presentation timings of frames and fields of video information, and the time on the title timeline TMLE is set based on the count value of time units. This point is a large technical feature in this embodiment. For example, in the NTSC system, interlaced display has 60 fields and 30 frames per second. Therefore, the duration of a minimum time unit on the title timeline TMLE is divided into 60 per second, and the time on the title timeline TMLE is set based on the count value of the time units. Also, progressive display in the NTSC system has 60 fields=60 frames per second, and matches the aforementioned time units. The PAL system is a 50-Hz system, and interlaced display has 50 fields and 25 frames per second, and progressive display has 50 fields=50 frames per second. In case of video information of the 50-Hz system, the title timeline TMLE is equally divided into 50 units per second, and the time and timing on the title timeline TMLE is set based on a count value with reference to the equally divided one interval (1/50 sec). In this manner, since the reference duration (minimum time unit) of the title timeline TMLE is set in synchronism with the presentation timings of fields and frames of video information, synchronized timing presentation control among respective pieces of video information can be facilitated, and time settings with the highest precision within a practically significant range can be made.

As described above, in this embodiment, the time units are set in synchronism with fields and frames of video information, i.e., one time unit in the 60-Hz system is 1/60 sec, and one time unit in the 50-Hz system is 1/50 sec. At respective time unit positions (times), the switching timings (presentation start or end timing or switching timing to another frame) of all presentation objects are controlled. That is, in this embodiment, the presentation periods of every presentation objects are set in synchronism with the time units (1/60 sec or 1/50 sec) on the title timeline TMLE. The frame interval of audio information is often different from the frame or field interval of the video information. In such case, as the playback start and end timings of the audio information, the presentation period (presentation start and end times) is set based on timings which are rounded out in correspondence with the unit interval on the title timeline TMLE. In this way, presentation outputs of a plurality of audio objects can be prevented from overlapping on the title timeline TMLE.

When the presentation timing of the advanced application ADAPL information is different from the unit interval of the title timeline TMLE (for example, when the advanced application ADAPL has 24 frames per second and its presentation period is expressed on the title timeline of the 60-Hz system), the presentation timings (presentation start and end times) of the advanced application ADAPL are rounded out in correspondence with the title timeline TMLE of the 60-Hz system (time unit=1/60 sec).

<Timing Model for Advanced Application>

Advanced Application (ADV APP) consists of one or plural Markup(s) files which can have one-directional or bi-directional links each other, script files which shares a name space belonging to the Advanced Application, and Advanced Element files which are used by the Markup(s) and Script(s). Valid period of each Markup file in one Advanced Application is the same as the valid period of Advanced Application which is mapped on Title Timeline. During the presentation of one Advanced Application, active Markup is always only one. An active Markup jumps one to another. The valid period one Application is divided to three major periods; pre-script period, Markup presentation period and post-script period.

More intelligible explanations will be provided below.

In this embodiment, the valid period of the advanced application ADAPL on the title timeline TMLE can be divided into three periods i.e., a pre-script period, markup presentation period, and post-script period. The markup presentation period represents a period in which objects of the advanced application ADAPL are presented in correspondence with time units of the title timeline TMLE based on information of the markup file MRKUP of the advanced application ADAPL. The pre-script period is used as a preparation period of presenting the window of the advanced application ADAPL prior to the markup presentation period. The post-script period is set immediately after the markup presentation period, and is used as an end period (e.g., a period used in release processing of memory resources) immediately after presentation of respective presentation objects of the advanced application ADAPL. This embodiment is not limited to this. For example, the pre-script period can be used as a control processing period (e.g., to clear the score of a game given to the user) prior to presentation of the advanced application ADAPL. Also, the post-script period can be used in command processing (e.g., point-up processing of the score of a game of the user) immediately after playback of the advanced application ADAPL.

<Application Sync Model>

There are two kind of application which has following two Sync Models:

Soft-Sync Application

Hard-Sync Application

The information of sync type is defined by sync attribute of application segment in Playlist. In Soft-Sync Application and Hard-Sync Application, the behavior to Title Timeline differs at the time of execution preparation of application. Execution preparation of application is resource loading and other startup process (such as script global code execution). Resource loading is reading resource from storage (DISC, Persistent Storage and Network Server) and store to the File Cache. Every application shall not execute before all resource loading is finished.

More intelligible explanations will be provided below.

The window during the aforementioned markup presentation period will be described below. Taking the presentation window in FIG. 16 as an example, when the stop button 34 is pressed during presentation of video information in this embodiment, that video information stops, and the window presentation of, e.g., changing the shape and color of the stop button 34 can be changed. This means the effect of 1.1) "Make response by means of change in animation and image at the time of button selection or execution instruction" in 1] "Make flexible and impressive reactions in response to user's actions" described in the column "New effects obtained as a result of technical devices" shown in FIGS. 2A, 2B, and 2C. When the display window itself of FIG. 16 is largely changed as in the above example, the corresponding markup file MRKUP jumps to another markup file MRKUP in the advanced application ADAPL. In this way, by jumping the markup file MRKUP that sets the presentation window contents of the advanced application ADAPL to another markup file MRKUP, the apparent window presentation can be greatly changed. That is, in this embodiment, a plurality of markup files MRKUP are set in correspondence with different windows during the markup presentation period, and are switched in correspondence with switching of the window (the switching processing is executed based on a method described in the script file SCRPT). Therefore, the start timing of a markup page on the title timeline TMLE during the presentation period of the markup file MRKUP matches the presentation start timing of the one to be presented first of the plurality of markup files MRKUP, and the end timing of a markup page on the title timeline TMLE matches the presentation end timing of the last one of the plurality of markup files MRKUP. As a method of jumping the markup pages (changing the presentation window of the advanced application ADAPL part in the presentation window), this embodiment specifies the following two sync models.

Soft-Sync Application

Hard-Sync Application

<Soft-Sync Application>

Soft-Sync Application gives preference to seamless proceeding of Title Timeline over execution preparation. If 'auto Run' attribute is 'true' and application is selected then resources will load into the File Cache by soft synced mechanism. Soft-Sync Application is activated after that all resources loading into the File Cache. The resource which cannot read without Title Timeline stopping shall not be defined as a resource of Soft-Sync Application. In case, Title Timeline jump into the valid period of Soft-Sync Application, the Application may not execute. And also, during the varied period of Soft-Sync Application, playback mode changes trick play to normal playback, the Application may not run.

More intelligible explanations will be provided below.

The first jump method is soft sync jump (jump model) of markup pages. At this jump timing, the time flow of the title timeline TMLE does not stop on the window to be presented to the user. That is, the switching timing of the markup page matches that of unit position (time) of the aforementioned title timeline TMLE, and the end timing of the previous markup page matches the start timing of the next markup page (presentation window of the advanced application ADAPL) on the title timeline TMLE. To allow such control, in this embodiment, a time period required to end the previous markup page (e.g., a time period used to release the assigned memory space in the data cache DTCCH) is set to overlap the presentation time period of the next markup page. Furthermore, the presentation preparation period of the next markup page is set to overlap the presentation period of the previous markup page. The soft sync jump of the markup page can be used for the advanced application ADAPL or advanced subtitle ADSBT synchronized with the title timeline TMLE.

<Hard-Sync Application>

Hard-Sync Application gives preference to execution preparation over seamless progress of Title Timeline. Hard-Sync Application is activated after all resources loading into the File Cache. If 'auto Run' attribute is 'true' and application is selected then resources will load into the File Cache by hard synced mechanism. Hard-Sync Application holds the Title Timeline during the resource loading and execution preparation of application.

More intelligible explanations will be provided below.

As the other jump method, this embodiment also specifies hard sync jump of markup pages. In general, a time change on the title timeline TMLE occurs on the window to be presented to the user (count-up on the title timeline TMLE is made), and the window of the primary audio video PRMAV changes in synchronism with such change. For example, when the time on the title timeline TMLE stops (the count value on the title timeline TMLE is fixed), the window of the corresponding primary audio video PRMAV stops, and a still window is presented to the user. When the hard sync jump of markup pages occurs in this embodiment, a period in which the time on the title timeline TMLE stops (the count value on the title timeline TMLE is fixed) is formed. In the hard sync jump of markup pages, the end timing time of a markup page before apparent switching on the title timeline TMLE matches the playback start timing of the next markup page on the title timeline TMLE. In case of this jump, the end period of the previously presented markup page does not overlap the preparation period required to present the next markup page. For this reason, the time flow on the title timeline TMLE temporarily stops during the jump period, and presentation of, e.g., the primary audio video PRMAV or the like is temporarily stopped. The hard sync jump processing of markup pages is used in only the advanced application ADAPL in this embodiment. In this way, the window change of the advanced subtitle ADSBT can be made without stopping the time change on the title timeline TMLE (without stopping, e.g., the primary audio video PRMAV) upon switching the presentation window of the advanced subtitle ADSBT.

The windows of the advanced application ADAPL, advanced subtitle ADSBT, and the like designated by the markup page are switched for respective frames in this embodiment. For example, interlaced display, the number of frames per second is different from that of fields per second. However, when the windows of the advanced application ADAPL and advanced subtitle ADSBT are controlled to be switched for respective frames, switching processing can be done at the same timing irrespective of interlaced or progressive display, thus facilitating control. That is, preparation of a window required for the next frame is started at the immediately preceding frame presentation timing. The preparation is completed until the presentation timing of the next frame, and the window is displayed in synchronism with the presentation timing of the next frame. For example, since NTSC interlaced display corresponds to the 60-Hz system, the interval of the time units on the title timeline is 1/60 sec. In this case, since 30 frames are displayed per sec, the frame presentation timing is set at an interval of two units (the boundary position of two units) of the title timeline TMLE. Therefore, when a window is to be presented at the n-th count value on the title timeline TMLE, presentation preparation of the next frame starts at the (n−2)-th timing two counts before, and a prepared graphic frame (a window that presents various windows related with the advanced application ADAPL will be referred to as a graphic frame in this embodiment) is presented at the timing of the n-th count on the title timeline TMLE. In this embodiment, since the graphic frame is prepared and presented for respective frames in this way, the continuously switched graphic frames can be presented to the user, thus preventing the user from feeling odd.

<Presentation Clip Element and Object Mapping Information>

Title element in Playlist file contains a list of element, called by Presentation Clip element, which describes Object Mapping Information of the segment of Presentation Object.

Presentation Clip elements and the corresponding Presentation Object type are shown in FIG. 18.

PrimaryAudioVideoClip element, SubstituteAudioVideoClip element, SecondaryAudioVideoClip element and SubstituteAudioClip element, AdvancedSubtitleSegment element ApplicationSegment element respectively describe Object Mapping Information of Primary Audio Video, Secondary Audio Video, Substitute Audio, Advanced Subtitle of Advanced Subtitle of Advanced Subtitle Profile markup and Advanced Application of Markup and Script.

Presentation Object shall be referred by the URI of the index information file as described in FIG. 18. The URI shall be described by rules.

Object Mapping Information of a Presentation Object in a Title Timeline, is a valid period of the Presentation Object in a Title Timeline.

The valid period on Title Timeline of a Presentation Object is determined by start time and end time on Title Timeline. The start time and end time on Title Timeline are described by titleTimeBegin attribute and titleTimeEnd attribute of each Presentation Clip element, respectively. For the Presentation Clip except for Advanced Subtitle and Application, the starting position of the Presentation Object is described by clipTimeBegin attribute of each Presentation Clip element.

For PrimaryAudioVideoClip, SubstituteAudioVideoClip, SubstituteAudioClip and SecondaryAudioVideoClip element, the Presentation Object shall be present at the starting position, described by clipTimeBegin.

The clipTimeBegin attribute value shall be the presentation start time (PTS) of Coded-Frame of the video streams in P-EVOB (S-EVOB).

Attribute values of titleTimeBegin, titleTimeEnd and clipTimeBegin, and the duration time of the Presentation Object shall satisfy the following relation:

titleTimeBegin<titleTimeEnd and titleTimeEnd≤duration time of the Title

If the Presentation Object is synchronized with Title Timeline, the following relation shall be satisfied:

clipTimeBegin+titleTimeEnd−titleTimeBegin≤duration time of the Presentation Object The valid period of PrimaryAudioVideoClip element shall not overlap each other on Title Timeline.

The valid period of SecondaryAudioVideoClip element shall not overlap each other on Title Timeline.

The valid period of SubstituteAudioClip element shall not overlap each other on Title Timeline.

The valid period of SubstituteAudioVideoClip element shall not overlap each other on Title Timeline.

For any of PrimaryAudioVideoClip element and SubstituteAudioVideoClip element, the valid periods on Title Timeline shall not overlap.

For any of SubstituteAudioVideoClip element, SecondaryAudioVideoClip element and SubstituteAudioClip element, the valid periods on Title Timeline shall not overlap.

For any Presentation Clip element with 'Disc' dataSource, the valid periods on Title Timeline shall not overlap to those of other Presentation Clip element with 'Disc' dataSource.

More intelligible explanations will be provided below.

The object mapping information OBMAPI described in the playlist PLLST shown in FIG. 17 describes list information of elements called presentation clip elements. FIG. 18 shows the relationship between various presentation clip elements and corresponding object names to be presented and used.

As shown in FIG. 18, a primary audio video clip element PRAVCP described in the object mapping information OBMAPI explains object mapping information OBMAPI related with the primary audio video PRMAV. A secondary audio video clip element SCAVCP explains object mapping information OBMAPI of the secondary audio video SCDAV. A substitute audio clip element SBADCP explains object mapping information OBMAPI of the substitute audio SBTAD. An advanced subtitle segment element ADSTSG in the object mapping information OBMAPI describes information related with the markup file MRKUPS in the advanced subtitle ADSBT. An application segment element ADAPSG in the object mapping information OBMAPI describes information related with the markup file MRKUP and script file SCRPT of the advanced application ADAPL. The object mapping information OBMAPI related with each object to be played back and used describes information related with the valid period (including a presentation period or a preparation period and end processing period) of each object on the title timeline TMLE. The valid period on the title timeline TMLE is specified by the start time and end time on the title timeline TMLE. In each clip element, the start time and end time on the title timeline TMLE are specified by a titleTimeBegin attribute and titleTimeEnd attribute. That is, each clip element individually records the titleTimeBegin attribute and titleTimeEnd attribute. Presentation of a corresponding object begins from the time described by the titleTimeBegin attribute on the title timeline TMLE, and ends at the time described by the titleTimeEnd attribute. In the primary audio video clip element PRAVCP, secondary audio video clip element SCAVCP, and substitute audio clip element SBADCP except for the advanced subtitle segment element ADSTSG and application segment element ADAPSG, each of the primary audio video PRMAV, secondary audio video SCDAV, and substitute audio SBTAD begins to be presented by clipTimeBegin which means an presentation elapsed time period calculated from a start position where each object is recorded. That is, the aforementioned titleTimeBegin attribute and titleTimeEnd attribute mean time information on the title timeline TMLE. On the other hand, clipTimeBegin means an independent time elapse in each object. By synchronizing the times of the titleTimeBegin attribute and clipTimeBegin, a plurality of different objects can be synchronously presented on the same title timeline TMLE.

Note that various objects to be played back and used are not recorded in the information storage medium (DISC) but only the playlist (PLLST) is recorded in the information storage medium (DISC). The information playback apparatus may designate and acquire from the corresponding playlist (PLLST) various objects to be played back and used recorded in the network server (NTSRV) or persistent storage (PRSTR).

In this embodiment, the following relationship is set among the presentation period of each presentation object, and titleTimeBegin, titleTimeEnd, and clipTimeBegin to improve the precision of the presentation processing without producing any conflict among presentation timings.

$$\text{titleTimeBegin} < \text{titleTimeEnd and}$$

$$\text{titleTimeEnd} < \text{duration time of the Title}$$

$$\text{clipTimeBegin} + \text{titleTimeEnd} - \text{titleTimeBegin} \leq \text{duration time of the Presentation Object}$$

Furthermore, in this embodiment, the presentation precision is improved by setting the following conditions.

- The valid periods of respective primary audio video clip elements PRAVCP shall not overlap on the title timeline TMLE.
- The valid periods of respective secondary audio video clip elements SCAVCP shall not overlap on the title timeline TMLE.
- The valid periods of respective substitute audio clip elements SBADCP shall not overlap on the title timeline TMLE.
- The valid period of the secondary audio video clip element SCAVCP shall not overlap that of the substitute audio clip element SBADCP on the title timeline TMLE.

As shown in FIGS. 12, 13A and 13B, the time map file PTMAP of the primary video set PRMVS, the time map file STMAP of the secondary video set SCDVS, the manifest file MNFST, and the manifest file MNFSTS of the advanced subtitle ADSBT are referred to from the playlist PLLST.

More specifically, as shown in FIG. 18, the primary audio video clip element PRAVCP describes the filename and saving location of the time map file PTMAP of the primary video set PRMVS as the filename to be referred to in the primary audio video clip element PRAVCP. Likewise, the second audio video clip element SCAVCP describes the filename and saving location of the time map file STMAP of the secondary video set SCDVS. Furthermore, the substitute audio clip element SBADCP describes the filename and saving location of the time map file STMAP of the secondary video set SCDVS. The advanced subtitle segment element ADSTSG describes the filename and saving location of the manifest file MNFSTS of the advanced subtitle ADSBT. The application segment element ADAPSG describes the filename and saving location of the manifest file MNFST of the advanced application ADAPL.

The locations of files to be referred to as indices upon playing back and using objects shown in FIG. 18 are described in FIG. 10. For reconfirmation, they are described in the column of the original data sources of objects in FIG. 18.

The files which are described in respective clip elements and are referred to as indices upon playing back and using objects can be recorded in various recording media (including the network server NTSRV), as shown in FIG. 18. FIG. 19 shows the saving location designation method of the files described in respective clip elements. More specifically, when files are saved in the network server NTSRV, the address of an HTTP server or HTTPS server is designated by "http: . . . " or "https: . . . ", as shown in FIG. 19. In this embodiment, the description range of file saving location designation information (URI: Uniform Resource Identifier) described in each clip element shall be described using 1024 bytes or less. When such information is recorded in the information storage medium DISC, file cache FLCCH (data cache DTCCH), or persistent storage PRSTR, the file saving location is designated as a data file.

When each file is saved in the information storage medium DISC, file cache FLCCH (data cache DTCCH), or persistent storage PRSTR shown in FIG. 19, each medium shall be identified. In this embodiment, each medium can be identified by adopting a path designation description method shown in FIG. 20 in respective clip elements. This point is a large technical feature in this embodiment.

<Content Referencing>

Every resource available on the disc or the network has an address that encoded by a Uniform Resource Identifier.

The following is a URI example which refers to a XML file on a Disc.

file:///dvddisk/ADV_OBJ/file.xmu

The total length of URI shall be less than 1024.

By the 'file' URI scheme, URI can refer to the resources on DVD Disc contents, File Cache, and Persistent Storages. There is two type of Persistent Storage. One is Required Persistent Storage, which all Player shall have only one. The other is Additional Persistent Storage, which Player can have one or more. The path of URI includes storage type and identifier for Persistent Storage in the following manner.

All Advanced Navigation files (Manifest/Markup/Script) and Advanced Element files shall be loaded into File Cache by Resource Information element in Playlist, or API. All files loaded by Resource Information element shall be referred by URI of the original file location, not location in the File Cache.

Files in archived file shall be referred by sub path of URI of archived file. At this time URI of archived file shall be referred by original location, not location in file cache.

The path 'file:///file cache/' is resolved as/temp directory in File Cache. For file cache, only application managed directory may be accessed.

Playlist, Manifest and Markup may use relative URI reference. The base URI shall be derived from the URI of the original file location, if xml: base attribute is not specified. If xml: base attribute is specified, base URI is determined by rule.

The path-segment ". ." shall not used in URI.

More intelligible explanations will be provided below.

In this embodiment, two different recording media are brought into view as the persistent storage PRSTR. The first one is the fixed persistent storage PRSTR, and specifies only one persistent storage drive 3 in the information recording and playback apparatus 1 in this embodiment. The other one is the portable persistent storage PRSTR, and one or more storages (a plurality of storages are allowed) can be mounted in the information recording and playback apparatus 1 in this embodiment. In the path designation description to a file, the description method shown in FIG. 20 is specified, and the contents are described in each clip element in the playlist PLLST. That is, when a file is recorded in the information storage medium DISC, "file:///dvddisc/" is described. When a file is stored in the file cache FLCCH (data cache DTCCH), "file:///filecache/" is described as the path designation description method. When a file is recorded in the fixed persistent storage PRSTR, "file:///fixed/" is described as the path designation description method. When a file is recorded in the portable persistent storage PRSTR, "file:///removable/" is described as the path designation description method. When various files are recorded in the information storage medium DISC, file cache FLCCH (data cache DTCCH), or persistent storage PRSTR, the file structure shown in FIG. 11 is formed in each recording medium, and files are recorded under corresponding directories.

<Playlist File>

Playlist File describes the navigation, the synchronization and the initial system configuration information for Advanced Content. Playlist File shall be encoded as well-formed XML. FIG. 21 shows an outline example of Playlist file. The root element of Playlist shall be Playlist element, which contains Configuration element, Media Attribute List element and Title Set element in a content of Playlist element.

More intelligible explanations will be provided below.

FIG. 21 shows the data structure in the playlist file PLLST that records information related with the playlist PLLST shown in FIG. 17. This playlist file PLLST is directly recorded in the form of the playlist file PLLST under the advanced content directory ADVCT, as shown in FIG. 11. The playlist file PLLST describes management information, synchronization information among respective presentation objects, and information related with the initial system structure (e.g., information related with pre-assignment of a memory space used in the data cache DTCCH or the like). The playlist file PLLST is described by a description method based on XML. FIG. 21 shows a schematic data structure in the playlist file PLLST.

A field bounded by <Playlist[playlist] . . . > and </Playlist> is called a playlist element in FIG. 21. As information in the playlist element, configuration information CONFGI, media attribute information MDATRI, and title information TTINFO are described in this order. In this embodiment, the allocation order of various elements in the playlist element is set in correspondence with the operation sequence before the beginning of video presentation in the advanced content playback unit ADVPL in the information recording and playback apparatus 1 shown in FIG. 1. That is, the assignment of the memory space used in the data cache DTCCH in the advanced content playback unit ADVPL shown in FIG. 14 is most necessary in the process of playback preparation. For this reason, a configuration information CONFGI element 134 is described first in the playlist element. The presentation engine PRSEN in FIG. 14 shall be prepared in accordance with the attributes of information in respective presentation objects. For this purpose, a media attribute information MDATRI element 135 shall be described after the configuration information CONFGI element 134 and before a title information TTINFO element 136. In this manner, after the data cache DTCCH and presentation engine PRSEN have been prepared, the advanced content playback unit ADVPL starts presentation processing according to the information described in the title information TTINFO element 136. Therefore, the title information TTINFO element 136 is allocated after the information required for preparations (at the last position).

A description 131 of the first line in FIG. 21 is definition text that declares "the following sentences are described based on the XML description method", and has a structure in which information of xml attribute information XMATRI is described between "<?xml" and "?>".

FIG. 22 shows the information contents in the xml attribute information XMATRI in (a).

The xml attribute information XMATRI describes information indicating whether or not another XML having a child relationship with corresponding version information of XML is referred to. Information indicating whether or not the other XML having the child relationship is referred to is described using "yes" or "no". If the other XML having the child relationship is directly referred to in this target text, "no" is described; if this XML text does not directly refer to the other XML and is present as standalone XML, "yes" is described. As an XML statement, for example, when the corresponding version number of XML is 1.0, and XML text does not refer to the other XML but is present as standalone XML, "<?xml version='1.0' standalone='yes' ?>" is described as a description example (a) of FIG. 22.

Description text in a playlist element tag that specifies the range of a playlist element describes name space definition information PLTGNM of the playlist tag and playlist attribute information PLATRI after "<Playlist", and closes with ">", thus forming the playlist element tag. FIG. 22 shows description information in the playlist element tag in (b). In this embodiment, the number of playlist elements which exit in the playlist file PLLST is one in principle. However, in a special case, a plurality of playlist elements can be described. In such case, since a plurality of playlist element tags may be described in the playlist file PLLST, the name space definition information PLTGNM of the playlist tag is described immediately after "<Playlist" so as to identify each playlist element. The playlist attribute information PLATRI describes an integer part value MJVERN of the advanced content version number, a decimal part value MNVERN of the advanced content version number information, and additional information (e.g., a name or the like) PLDSCI related with the playlist in the playlist element in this order. For example, as a description example, when the advanced content version number is "1.0", "1" is set in the integer part value MJVERN of the advanced content version number, and "0" is set in the decimal part value MNVERN of the advanced content version number. If the additional information related with the playlist PLLST is "string", and the name space definition information PLTGNM of the playlist tag is "http://www.dvdforum.org/HDDVDVideo/Playlist", the description text in the playlist element is:

"<Playlist xmlns='http://www.dvdforum.org/HDDVDVideo/Playlist' majorVersion='1' minorVersion='0' description=string>"

The advanced content playback unit ADVPL in the information recording and playback apparatus 1 shown in FIG. 1 plays back the advanced content version number described in the playlist element tag first, and determines if the advanced content version number falls within the version number range supported by it.

If the advanced content version number falls outside the support range, the advanced content playback unit ADVPL shall immediately stop the playback processing. For this purpose, in this embodiment, the playlist attribute information PLATRI describes the information of the advanced content version number at the foremost position.

Various kinds of information described in the playlist PLLST in this embodiment have a hierarchical structure, as shown in FIGS. 23A and 23B, and FIGS. 24A and 24B.

<Title Information>

A Playlist file contains a list of Title elements in the Title Set element. The Title Set element describes information of a set of Titles for Advanced Contents in the Playlist.

Title Timeline is assigned for each Title. The duration of Title Timeline shall be described by title Duration attribute of Title element by the time Expression value. The duration of Title Timeline shall be greater than '00:00:00:00'.

Note: To describe Title which contains only Advanced Application, set duration to some value such as '00:01:00:00', and pause the time on Tide Timeline at the beginning of Title.

The total number of Title shall be less than 1000.

Each Title element describes a set of information of a Title for Advanced Content.

More intelligible explanations will be provided below.

In information recorded in the aforementioned playlist file PLLST, the title information TTINFO included in the playlist element is described using a title set element bounded by <TitleSet> and </TitleSet>, as shown in (b) of FIG. 23A. This title set element describes information related with a title set of the advanced content ADVCT defined in the playlist PLLST. As title set attribute information TTSTAT written in the title set element tag, there are frame rate (the number of frames per second) information FRAMRT (timeBase attribute information), frequency information TKBASE (tickBase attribute information) of a tick clock used in a markup page, menu language information DEFLNG (defaultLanguage attribute information) in a default state in a title set, as shown in (d) of FIG. 23B.

<Datatypes (Data Types) and TitleSet (Title Set) element>

Datatypes

The additional data type of attribute value is defined.

1) timeExpression

Describe Timecode of a non-drop frame count described by the following format:

timeExpression:=HH ':' MM ':' SS ':' FF

HH:=[0-2][0-9] (HH=00-23)

MM:=[0-5][0-9]

SS:=[0-5][0-9]

FF:=[0-5][0-9]

(FF=00-49 for frame rate=50 fps

FF=00-59 for frame rate=60 fps)

The frame rate is the value described by timeBase attribute of Title element.

The non-drop frame count is calculated by:

$$\text{non-drop frame count}:=(3600\times HH+60\times MM+SS)\times \text{frame rate}+FF.$$

2) frameRate

Describes the frame rate value. The frameRate data type follows the following BNF syntax:

frameRate:=rateValue 'fps' rateValue:='50'|'60'

A value of rateValue describes the frame rate.

3) tickRate

Describes the tick rate value. The tickRate data type follows the following BNF syntax:

tickRate:=tickValue 'fps' tickValue:='24'|'50'|'60'

A value of tickValue describes the tick rate value in frame rate. The value shall be '50', or '24' if the frame rate is '50'. The value shall be '60', or '24' if the frame rate is '60'.

4) langCode

Describes the specific code and the specific code extension for the Audio stream and for the Subtitle stream this Substitute Subtitle. The language code attribute value follows the following BNF scheme. The specificCode and specificCodeExt describes specific code and specific code extension, respectively. The specificCode value'*' describes 'Not Specified'.

langCode:= specificCode ':' specificCodeExtension specificCode:=[a-z][a-z]|'*' specificCodeExt:=[0-9A-F][0-9A-F]

5) anyURI

Describes the content reference in the URI following rules.

6) parentalList

Describes the list of parental level for each country code. The parentalList data type follows the following BNF syntax:

parentalList:=parental (#×20 parental)* parental:=

(countryCode|'*') ':' parentalLevel country Code:=[A-Z][A-Z]

parental Level:=[1-8]

The parentalList is space delimited list of parental data, which describes the minimum parental level to playback the title for the specified country code. The parentalLevel and the countryCode describe the minimum parental level and country code, respectively. The '*' means Not Specified country code. If '*' is used for countryCode, the parental data describes the minimum parental level for unspecified country code. The countryCode shall be Alpha-2 code defined in ISO-3166. The countryCode and '*' shall be unique in a parentalList value.

TitleSet Element

The TitleSet element describes information of a set of Titles for Advanced Contents in the Playlist.

XML Syntax Representation of TitleSet Element:

```
<TitleSet
timeBase = frameRate
tickBase = tickRate
defaultLanguage = language
>
    FirstPlayTitle ?
    Title +
    PlaylistApplication *
</TitleSet>
```

The TitleSet element consists of a list of Title element, FirstPlayTitle element and a list of PlaylistApplication element. According to the document order of Title element, the Title number for Advanced Navigation shall be assigned continuously from '1'. A Title element describes information of each Title.

(a) timeBase Attribute

Describes the frame rate value. The frame rate value determines the frame rate for timeExpression in the Title.

(b) tickBase Attribute

Describes the tick clock frequency used in Markup. This value can be omitted. If the value is omitted, tick clock frequency is frame rate value.

(c) defaultLanguage Attribute

Describes the default menu language of the TitleSet. The attribute value consists of two-letter lowercase symbols defined in ISO-639. If there is no Application Segment in a Title matching to the Menu Language setting, the Application Segment with language of defaultLanguage shall be activated. This attribute can be omitted.

More intelligible explanations will be provided below.

A set of titles concerning advanced contents ADVCT in the playlist PLLST is written in the title set element. Each title number is set in accordance with an arrangement order of title element information TTELEM written in the title set element. That is, a title number of a title managed based on the title element information TTELEM which is written first in the title set element is 1, and a continuous number is sequentially set as a title number of a title managed based on each title element information TTELEM.

The frameRate (the number of frames per second) FRAMRT (timeBase attribute information) shown in (d) of FIG. 23B represents a frame rate value. Time management in each title is carried out based on a count value (a value of FF in "HH:MM:SS:FF") on a title timeline TMLE. A 50 Hz system or a 60 Hz system is set as a count frequency of a title timeline TMLE at this time based on a value of the frame rate information FRAMRT (timeBase attribute information). The frameRate is represented as a rate value in units of "fps" (frames per sec), and a value of "50" or "60" is selectively set as the rate value. A description will now be given as to tick clock frequency information TKBASE (tickBase attribute information) used in a markup page. A frequency of a page clock set in accordance with each markup page MRKUP and a frequency of an application clock set in accordance with each advanced application ADAPL match with the tick clock frequency TKBASE. Moreover, the tick clock frequency TKBASE can be set independently from a frequency of a media clock on a title timeline TMLE. A clock of frame rate (the number of frames per second) information FRAMRT (timeBase attribute information) representing a reference frequency of the title timeline TMLE for each title is referred to as a media clock. Additionally, this embodiment is characterized in that a page clock as a clock set in accordance with each markup page MRKUP and an application clock set in accordance with each application can be set independently from the media clock. As a result, there can be obtained an effect that FF, FR and pause playback can be performed on a title timeline TMLE while playing back an advanced application ADAPL at a standard speed. Further, there is also obtained an effect that greatly delaying TickBase/TKBASE with respect to timeBase/FRAMRT can alleviate a burden on an advanced playback unit ADVPL. The tick clock frequency information TKBASE (tickBase attribute information) is represented as a tickValue in units of "fps", and one of values "24", "50" and "60" is set as the tickValue. If a value of the frame rate (the number of frames per second) information FRAMRT (timeBase attribute information) is "50", a value of "50" or "24" is set as a value of the tick clock frequency information TKBASE (tickBase attribute information). If a value of the frame rate (the number of frames per second) information FRAMRT (timeBase attribute information) is "60", a value of "60" or "24" is set as a value of the tick clock frequency information TKBASE (tickBase attribute information). When a value of the tick clock frequency information TKBASE (tickBase attribute information) is set to a value obtained by a dividing a value of the frame rate (the number of frames per second) information FRAMRT (timeBase attribute information) by an integer in this manner, clock settings between the tick clock and the media clock can be facilitated (for example, dividing a frequency of the media clock can readily generate the tick clock). The description of the tick clock frequency information TKBASE (tickBase attribute information) can be eliminated in the title set attribute information TTSTAT. In this case, the tick clock frequency matches with the frame rate value. This embodiment is characterized in that timeBase/FRAMRT and tickBase/TKBASE are set in the title set element. As a result, sharing these values in the same title set can simplify processing in the advanced content playback unit ADVPL.

A description will now be given as to menu language information DEFLNG (defaultLangulage attribute information) in a default state in the TitleSet. As shown in FIG. 47, a menu language is set as a profile parameter. When there is no application segment APPLSG (see (d) in FIG. 56B) in a title matching with the menu language, an application segment APPLSG corresponding to a language set based on the menu language information DEFLNG (defaultLanguage attribute information) in a default state in the TitleSet can be executed/displayed. The description of the menu language information DEFLNG (defaultLanguage attribute information) in a default state in the TitleSet can be eliminated in title set attribute information TTSTAT.

<Title Information> (Again)

FirstPlaytitle element information FPTELE can be written first in the title set element, one or more sets of title element information TTELEM can be sequentially written, and management information concerning each title is recorded in each corresponding title element information TTELEM. The example of FIG. 17 has three titles, i.e., titles #1 to #3, and (b) of FIG. 23A describes title element information TTELEM related with title #1 to that related with title #3. However, this embodiment is not limited to such example, and title element information TTELEM related with one to an arbitrary number of titles can be described. Further, playlist application element information PLAELE can be written after the title element information TTELEM in the title set element. A title timeline TMLE is set to each title corresponding to the title element information TTELEM. The presentation period of the title timeline TMLE of each title is described in titleDuration attribute information (time duration information TTDUR of the entire title on the title timeline TMLE) in the title element information TTELEM. The numbers of corresponding titles are set in accordance with the order of description of respective pieces of title element information TTELEM described in the title set element. As shown in (b) of FIG. 23A, the title number of a title corresponding to the title element information TTELEM described first in the title set element is set to "1". In this embodiment, the number of pieces of title element information TTELEM (the number of titles defined per playlist PLLST) that can be described in the title set element is set to be 512 or less. By setting the upper limit value of the number of titles, the processing in the advanced content playback unit ADVPL is prevented from diffusing. Each title element information TTELEM describes object mapping information OBMAPI, resource information RESRCI, playback sequence information PLSQI, and track navigation information TRNAVI in this order. The object mapping information OBMAPI includes information of track number assignment information that sets stream (track) numbers in respective presentation objects. The object mapping information describes a list of various clip elements described using FIGS. 24A and 24B. Also, the object mapping information OBMAPI describes a list related with track number assignment information which represents the setting information of track numbers in the aforementioned presentation clip elements. In this embodiment, each playback object such as video information, audio information, sub-picture information, or the like can have a plurality of streams, independent tracks are related with these streams, and track numbers are set, thus identifying playback streams in each presentation object. By setting the track number assignment element list in this way, the number of streams included in each presentation object and individual streams can be identified. The resource information RESRCI explains a list of resource elements in the title element information TTELEM. The track navigation information TRNAVI describes information related with a track navigation list element. The playback sequence information PLSQI describes information of a chapter list element indicating the head positions of chapters corresponding to divisions of the video contents in a single title.

As shown in (c) of FIG. 23A, the arrangement order of the object mapping information OBMAPI, resource information RESRCI, playback sequence information PLSQI, and track navigation information TRNAVI in the title element information TTELEM corresponds to the processing sequence of the advanced content playback unit ADVPL in the information recording and playback apparatus 1 (see FIG. 1). That is, information of the object mapping information OBMAPI which describes the information of the advanced application ADAPL and advanced subtitle ADSBT used in a single title is described at the first location in the title element information TTELEM. The advanced content playback unit ADVPL recognizes the contents of the advanced application ADAPL and advanced subtitle ADSBT used in the single title first from the object mapping information OBMAPI recorded first. As has been described using FIG. 10, the information of the advanced application ADAPL and advanced subtitle ADSBT shall be saved in the file cache FLCCH (data cache DTCCH) in advance prior to presentation to the user. For this reason, the advanced content playback unit ADVPL in the information recording and playback apparatus 1 requires information related with the advanced application ADAPL and advanced subtitle ADSBT set in the title and their storage timings in the file cache FLCCH (data cache DTCCH) prior to playback. The advanced content playback unit ADVPL then reads the resource information RESRCI, and can detect the storage timings of the advanced application ADAPL and advanced subtitle ADSBT in the file cache FLCCH (data cache DTCCH). Therefore, since the resource information RESRCI is described after the object mapping information OBMAPI, the processing of the advanced content playback unit ADVPL is facilitated. Since the playback sequence information PLSQI becomes important to allow the user to immediately move video information that he or she wants to see upon playing back the advanced content ADVCT, the playback sequence information PLSQI is allocated after the resource information RESRCI. Since the track navigation information TRNAVI is information required immediately before presentation to the user, it is described at the last location in the title element information TTELEM.

By describing the title ID information TTIDI at the first position in the title element tag in the title element information TTELEM as shown in FIG. 23A(c), 1) a plurality of pieces of title element information TTELEM can be described in the title information TTINFO (respective pieces of title element information TTELEM can be set as playback management information for different titles), and 2) each title ID information TTIDI in the title information TTINFO can be immediately identified by interpreting contents of the title ID information TTIDI described at the first position in the title element tag, and content determination processing in the playlist PLLST can be speeded up.

Furthermore, in this embodiment, respective pieces of information which have related description contents in the title element information TTELEM are grouped together and are described at near positions. As group names, object mapping information OBMAPI, resource information RESRCI, playback sequence information PLSQI, and track navigation information TRNAVI are assigned. As a result, content interpretation processing of the playlist PLLST in the playlist manager PLMNG can be simplified and speeded up.

<Title Element>

The Title element describes information of a Title for Advanced Contents, which consists of Object Mapping Information, Track Number Assignment for elementary stream and Playback Sequence in a Title.

The content of Title element consists of Chapter List element, Track Navigation List element, Title Resource element and list of Presentation Clip element. Presentation Clip elements are Primary Audio Video Clip, Substitute Audio Video Clip, Substitute Audio Clip, Secondary Audio Video Clip, Advanced Subtitle Segment and Application Segment.

Presentation Clip elements in Title element describe the Object Mapping Information in the Title.

Presentation Clip elements also describe Track Number Assignment for elementary stream.

Chapter List element describes the information of Playback Sequence in the Title.

Track Navigation List element describes the information of Track Navigation Information in the Title.

Title Resource element describes the information of Resource Information par Title.

(a) titleNumber Attribute

Describes the number of Title. The Title number shall follow the constraints.

(b) typeattribute

Describes type of Title. If the content is Interoperable Content and Title is Original Title, the value shall be 'Original'. If the content is Interoperable Content and Title is User Defined Title, the value shall be 'User Defined'. Otherwise it shall be omitted, or 'Advanced'. The value may be omitted. The default value is 'Advanced'.

(c) Selectable Attribute

Describes whether the Title can be selectable by User Operation, or not. If the value is "false", the title shall not be navigated by User Operation. The value may be omitted. The default value is "true".

(d) titleDuration Attribute

Describes the duration of the Title Timeline. The attribute value shall be described by time Expression.

The end time of all Presentation Object shall be less than the duration time of Title Timeline.

(e) parentalLevel Attribute

Describes the list of parental level for each country code. The attribute value shall be described by parental List value. This attribute can be omitted. Default value is '*: 1'.

(f) tickBaseDivisor Attribute

Describes the reducing rate of the Application Ticks to process in Advanced Application Manager. For example, if tick Base Divisor value is 3, Advanced Application Manager shall process one of the three Application Ticks, and ignore the rest of them.

(g) onEnd Attribute

Describes the id attribute value of Title element describing Title to be played after end of current Title. This value can be omitted. If this value is omitted, player shall be stopped after Title playback.

(h) displayName Attribute

Describes the name of Title in the human consumable text form. Player may display this name as title name. This attribute can be omitted.

alternative SD Display Mode Attribute

Describes the permitted display modes on 4:3 monitor in this Title playback. 'pan scan Or Letter box' allows both Pan-scan and Letterbox, 'pan scan' allows only Pan-scan, and 'letterbox' allows only Letterbox for 4:3 monitor. Player shall output into 4:3 monitor forcedly in allowed display modes. This attribute can be omitted. The default value is 'pan scan Or Letter box'.

(j) Description Attribute

Describes additional information in the human consumable text form. This attribute can be omitted.

(k) xml:base attribute

Describes the base URI in this element. The semantics of xml:base shall follow to XML Base.

More intelligible explanations will be provided below.

FIGS. 24A and 24B show information described in the title element tag that represents the start of each title element information TTELEM in this embodiment. The title element tag describes ID information TTIDI of a title used to identify each title first. Next, title number information TTNUM is described. In this embodiment, a plurality of title element information TTELEM can be described in the title information TTINFO as shown in FIG. 24A (b). The title number is set in description order and is recorded in the title number information TTNUM, whereas the title element information TTELEM is described at first position in the title information TTINFO. Furthermore, with respect to the type (kind) of the title managed in the title element information TTELEM, the title type information is described. In this embodiment, as the title type information TTTYPE, three types of values of type information: "Advanced", "Original", and "UserDefined" can be set. In this embodiment, video information recorded in the advanced video recording format which enables recording, editing, and playback by a user can be utilized as part of the advanced content ADVCT. The video information recorded in the advanced video recording format is referred to as interoperable content. The title type information TTTYPE for an original title (the interoperable content in a time immediately after the recording and before the editing) with respect to the interoperable content is set to "Original". On the other hand, the title type information TTTYPE for a title in a time after a user has edited (i.e., defined by the user) with respect to the interoperable content, the title type information TTTYPE is set to "UserDefined". For other advanced contents ADVCT, the title type information TTTYPE is set to "Advanced". In this embodiment, description of the title type information TTTYPE in the title attribute information TTATRI can be omitted. In this case, the value of "Advanced" as a default is automatically set. Next, selectable attribute information is described. This selectable attribute information indicates selection information as to whether or not the designated title can be operated in response to user operations. For example, in case of the system shown in FIG. 1, the user may oppose the wide-screen TV monitor 15 and may perform screen operations (e.g., fast-forwarding FF or first-rewinding FR) using a remote controller (not shown). Processing designated by the user in this way is called a user operation, and the selectable attribute information indicates whether or not the title is processed in response to user operations. In this information, a word of either "true" or "false" is described. For example, when the video contents of the corresponding title, i.e., the commercial 44 and preview 41 are not allowed to be fast-forwarded by the user, the entire corresponding title may be set to inhibit user operations. In such case, the selectable attribute information is set to "false" to inhibit user operations with respect to the corresponding title, thus rejecting requests such as fast-forwarding, fast-rewinding, and the like by the user. When this value is "true", user operations are supported, and processing (user operations) such as fast-forwarding, fast-rewinding, and the like can be executed in response to user's requests. In this embodiment, the default value of the selectable attribute information is set to "true". The title playback processing method of the advanced content playback unit ADVPL (see FIG. 1) largely changes depending on the selectable attribute information. Therefore, by allocating the selectable attribute information at a position immediately after the title ID information TTIDI and after other kinds of information, the convenience of the processing of the advanced content playback unit ADVPL can be improved. In this embodiment, a description of the selectable attribute information can be omitted in the title element tag. When the description of this information is omitted, it is set as a default value "true".

The frame rate information (timebase attribute information) in the title set element, shown in FIG. 23B(d), represents the number of frames per sec of video information to be presented on the screen, and corresponds to a reference time interval of the title timeline TMLE. As has been described using FIG. 17, in this embodiment, two systems, i.e., the 50-Hz system (50 counts are counted up per sec on the title timeline TMLE) and 60-Hz system (60 counts are counted up per sec on the title timeline TMLE) can be set as the title timeline TMLE. For example, in case of NTSC interlaced display, 30 frames (60 fields) are displayed per sec. This case corresponds to 60-Hz system, and a unit interval (time interval of one count of the title timeline is set to 1/60 sec. In this embodiment, the clock according to a title timeline TMLE is referred to as a media clock, which is differently identified from a page clock as the clock set for each markup MRKUP. Furthermore, in this embodiment, there is an application clock which is defined in execution of the advanced application ADAPL specified in the markup MRKUP. The page clock and the application clock have the same reference frequency. This frequency is referred to a frequency of a tick clock. The media clock according to the title timeline TMLE and the tick clock can be independently set. This point is a large technical feature in this embodiment. As a result, for example, animation defined by the advanced application ADAPL can be played back with the tick clock (application clock) at a standard speed during high-speed playback/rewind playback of video information of the primary audio video PRMAV, and the expression for a user can be greatly improved. The frequency information TKBASE for the tick clock used in the markup MRKUP is described after "tickBase=" as shown in FIG. 23B(d). The value of the frequency information TKBASE for the tick clock used in the markup MRKUP must be set as a value less than the value described as the information of the frame rate (a number of frames per second). As a result, execution of the advanced application (display of the animation or the like) with tick clock can be smoothly performed according to the title timeline TMLE (avoiding inconsistency with the media clock), and the circuit structure within the advanced content playback unit ADVPL can be simplified. The timeBaseDivisor attribute information shown in (b) in FIG. 24A is indicative of a damping ratio TICKBD with respect to an application tick clock of a processing clock in the advanced application manager. That is, the information means a damping ratio with respect to the application tick (tick clock frequency information TKBASE) when the advanced application manager ADAMNG shown in FIG. 28 executes processing. For example, when a value of the timeBaseDivisor attribute information is set to "3", processing of the advanced application manager ADAMNG advances one step every time a clock of the application tick (an application clock) is incremented by 3 counts. When the processing clock of the advanced application manager ADAMNG is delayed to be behind the tick clock (the application clock) in this manner, the processing can be executed without applying a CPU power to the advanced application ADAPL which operates at a low speed, thereby suppressing a calorific value in the advanced content playback unit ADVPL.

Time duration information TTDUR of the entire title on the title timeline TMLE represents the duration of the entire title timeline TMLE on the corresponding title. The time duration information TTDUR of the entire title on the title timeline TMLE is described using the total number of counts of the 50-Hz system or 60-Hz system corresponding to the frame rate (number of frames per sec) information. For example, when the presentation time of the corresponding entire title is n sec, a value "60n" or "50n" is set in the total number of counts as the time duration information TTDUR of the entire title on the title timeline TMLE. In this embodiment, the end times of all playback objects shall be smaller than the time duration information TTDUR of the entire title on the title timeline TMLE. In this manner, since the time duration information TTDUR of the entire title on the title timeline TMLE depends on the time unit interval on the title timeline TMLE, it is allocated behind the frame rate information, thus assuring easy data processing of the advanced content playback unit ADVPL.

Next parental level information indicates a parental level of the corresponding title to be played back.

A numeral equal to or smaller than 8 is entered as the parental level value. In this embodiment, this information may be omitted in the title element tag. A default value of this information is set to "1".

Information "on End" that represents the number information of a title to be presented after completion of the current title describes information of the title number related with the next title to be played back after completion of the current title. When a value set in the title number is "0", the window is kept paused (to present the end window) after completion of the title. A default value of this information is set to "0". A description of this information can be omitted in the title element tag, and in such case, that information is set to "0" as a default value.

Title name information "displayName" to be displayed by the information recording and playback apparatus 1 describes the name of the corresponding title in a text format. Information described in this information can be displayed as the title name of the information recording and playback apparatus 1. Also, this information can be omitted in the title element tag.

The alternativeSDDisplayMode attribute information indicative of allowed display mode information SDDISP in a 4:3 TV monitor represents a display mode which is allowed when outputting data to the 4:3 TV monitor when playing back a corresponding title. When the value is set to "panscanOrLetterbox", outputting data in either a pan-scan mode and a letter box mode is allowed at the time of outputting data to the 4:3 TV monitor. Further, when the value is set to "panscan", outputting data in the pan-scan mode alone is allowed at the time of outputting data to the 4:3 TV monitor. Furthermore, when the value is set to "letterbox", the letter box display mode alone is allowed at the time of outputting data to the 4:3 TV monitor. When data is output to the 4:3 TV monitor, the information recording and playback apparatus 1 must forcibly display/output data in an allowed display mode. Although the description of the allowed display mode information SDDISP in the 4:3 TV monitor can be eliminated, "panscanOrLetterbox" as a default value is automatically set in such a case.

Furthermore, the column of additional information (description) related with a title describes additional information related with the title in a text format. A description of this information can be omitted in the title element tag. The title name information (displayName) to be displayed by the information recording and playback apparatus 1 and additional information (description) related with the title are not essential upon executing the playback processing of the advanced content playback unit ADVPL. Therefore, these pieces of information are recorded at the last location in title attribute information TTATRI. Finally, the file storage position URI description format XMBASE corresponding to the title element indicates a description format (XML_BASE) for a URI (uniform resource identifier) complying to XML.

As a practical information example of the title element tag, for example, when the identification ID information of a title is "Ando" and the time duration of the entire title in the 60-Hz system is 80000, a description example is:

<Title='Ando' titleDuration='80000'>

In the 60-Hz system, since the number of counts of the title timeline TMLE is counted up by 60 per sec, the value "80000" amounts to 22 min (≈80000÷60÷60).

Information in the title element information TTELEM includes the object mapping information OBMAPI that describes a presentation clip element list, the resource information RESRCI that records a title resource element, the playback sequence information PLSQI that describes a chapter list element, and the track navigation information TRNAVI that describes a track list navigation list element, as shown in (c) of FIG. 23A. The presentation clip elements describe the primary audio video clip PRAVCP, substitute audio video clip SBAVCP, substitute audio clip SBADCP, secondary audio video clip SCAVCP, advanced subtitle segment ADSTSG, and application segment ADAPSG, as shown in (c) of FIG. 24B. The presentation clip elements are described in the object mapping information OBMAPI in each title. The presentation clip elements are described as a part of track number assignment information in correspondence with each elementary stream.

The playback sequence information PLSQI is described as a list of chapter list elements, as shown in (d) of FIG. 24B.

<Chapter Elements and Playback Sequence Information>

Title element in Playlist file contains a list of Chapter elements in a Chapter List element. Chapter List element describes chapter structure, called by Playback Sequence Information.

The Chapter List element consists of a list of Chapter element. According to the document order of Chapter element in Chapter List, the Chapter number for Advanced Navigation shall be assigned continuously from '1'.

The total number of chapters in a Title shall be less than 2000.

The total number of chapters in a Playlist shall be less than 100000.

The titleTimeBegin attribute of Chapter element describes the chapter start position by the time value on the Title Timeline. Chapter end position is given as the next chapter start position or the end of the Title Timeline for the last chapter.

The chapter start position in a Title Timeline shall be monotonically increased according to the chapter number, and be less than or equals to the duration of Title Timeline. The chapter start position of chapter 1 shall be 00:00:00:00.

The following description is an example of Playback Sequence.

```
<ChapterList>
    <Chapter titleTimeBegin="00:00:00:00"/>
```

-continued

```
        <Chapter titleTimeBegin="00:01:02:00"/>
        <Chapter titleTimeBegin="00:02:01:03"/>
        <Chapter titleTimeBegin="00:04:02:30"/>
        <Chapter titleTimeBegin="00:05:21:22"/>
        <Chapter titleTimeBegin="00:06:31:23"/>
</ChapterList>
```

More intelligible explanations will be provided below.

The chapter list element in the playback sequence information PLSQI describes a chapter structure in the title. The chapter list element is described as a list of chapter elements (respective lines starting with a <Chapter titleTimingBegin> tag, as shown in (d) of FIG. 24B). The number of a chapter element described first in the chapter list is set to "1", and the chapter numbers are set in accordance with the order of description of respective chapter elements. The number of chapters in one chapter list (title) is set to be 512 or less, thus preventing diffusion in the processing of the advanced content playback unit ADVPL. A titleTimingBegin attribute (information described after "<Chapter titleTimingBegin>=") in each chapter element represents time information (the number of counts on the title timeline TMLE) indicating the start position of each chapter on the title timeline.

Time information indicating the start position of each chapter is presented in the form of "HH:MM:SS:FF" which respectively represent hours, minutes, seconds, and the number of frames. The end position of this chapter is expressed by the start position of the next chapter. The end position of the last chapter is interpreted as the last value (count value) on the title timeline TMLE. The time information (count value) indicating the start position of each chapter on the title timeline TMLE must be set to monotonously increase in correspondence with increments of chapter number. With this setting, sequential jump access control according to the playback order of chapters is facilitated.

Additional information for each chapter element is described in a text format to be easy to understand by the users. Also, the additional information for each chapter element can omit a description in a chapter element tag. Furthermore, immediately after "displayName=", a corresponding chapter name can be described in a text format that can be easily understood by the users. The advanced content playback unit ADVPL (see FIG. 1) can present the corresponding chapter name information on the wide-screen TV monitor 15 as a name of each chapter. The corresponding chapter name information can omit a description in the chapter element tag.

Figure 25:
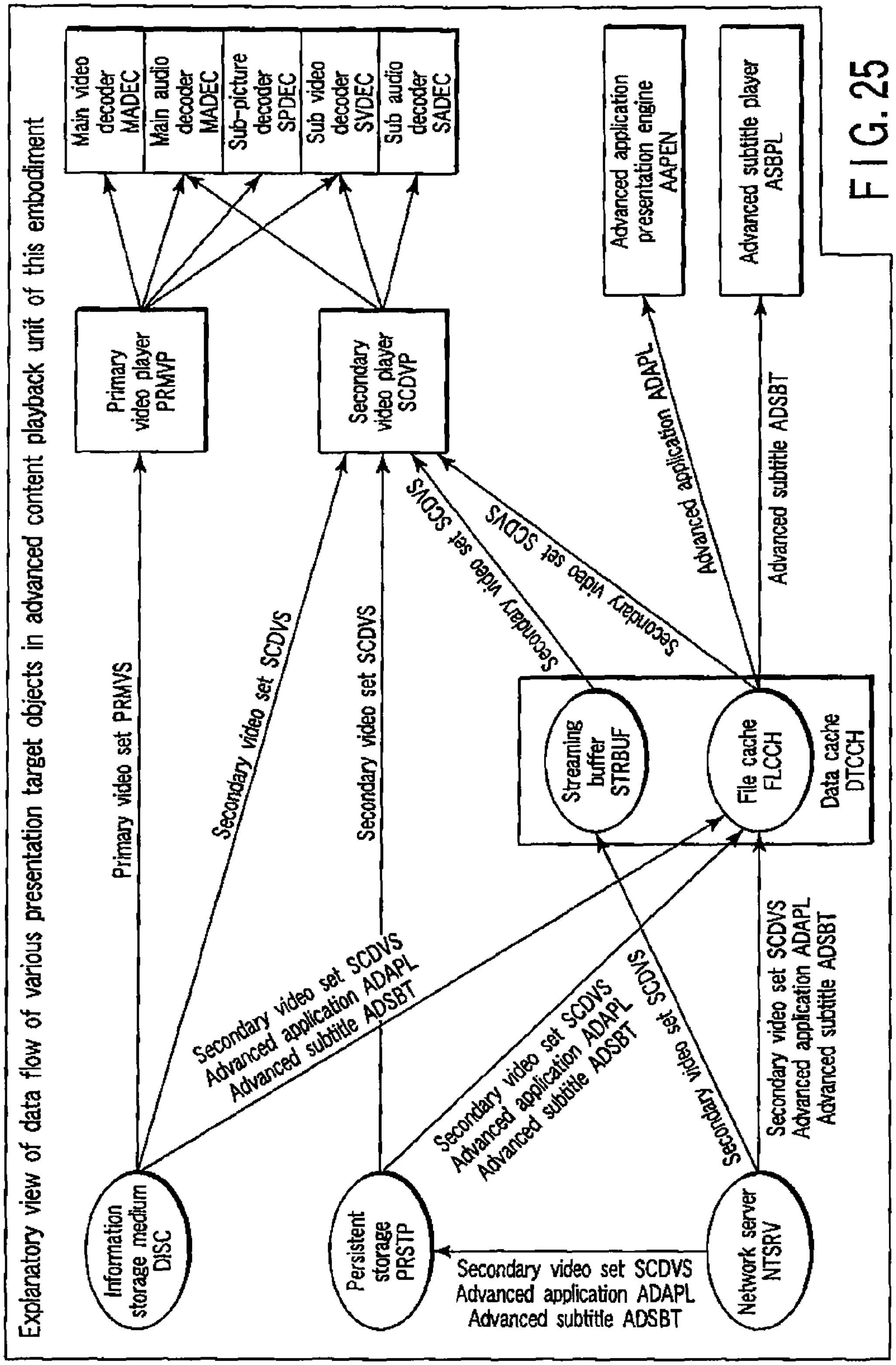
FIG. 25 is an exemplary view showing the data flow in an advanced content playback unit.

FIG. 25 shows the data flow in the advanced content playback unit ADVPL of various playback presentation objects defined in FIG. 10 described previously.

FIG. 14 shows the structure in the advanced content playback unit ADVPL shown in FIG. 1. An information storage medium DISC, persistent storage PRSTR, and network server NTSRV in FIG. 25 respectively match the corresponding ones in FIG. 14. A streaming buffer STRBUF and file cache FLCCH in FIG. 25 will be generally called as a data cache DTCCH, which corresponds to the data cache DTCCH in FIG. 14. A primary video player PRMVP, secondary video player SCDVP, main video decoder MVDEC, main audio decoder MADEC, sub-picture decoder SPDEC, sub video decoder SVDEC, sub audio decoder SADEC, advanced application presentation engine AAPEN, and advanced subtitle player ASBPL in FIG. 25 are included in the presentation engine PRSEN in FIG. 14. The navigation manager NVMNG in FIG. 14 manages the flow of various playback presentation object data in the advanced content playback unit ADVPL, and the data access manager DAMNG in FIG. 14 mediates data between the storage locations of various advanced contents ADVCT and the advanced content playback unit ADVPL.

As shown in FIG. 10, upon playing back playback objects, data of the primary video set PRMVS must be recorded in the information storage medium DISC.

Figure 43:
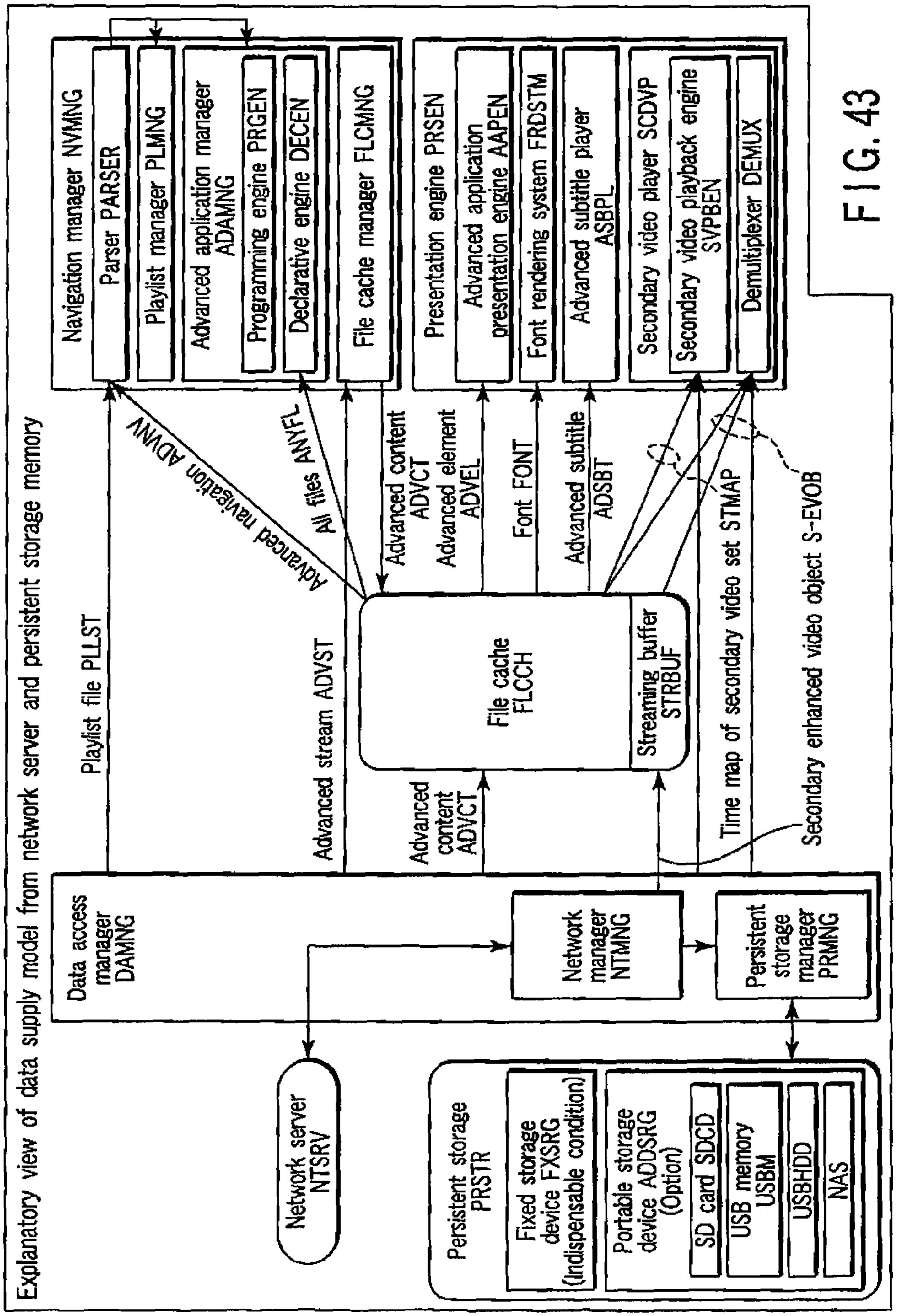
FIG. 43 is an exemplary view showing a data supply model from a network server and persistent storage memory.

In this embodiment, the primary video set PRMVS can also handle high-resolution video information. Therefore, the data transfer rate of the primary video set PRMVS may become very high. When direct playback from the network server NTSRV is attempted, or when the data transfer rate on a network line temporarily drops, continuous video expression to the user may be interrupted. As shown in FIG. 43, various information storage media such as an SD card SDCD, USB memory USBM, USBHDD, NAS, and the like are assumed as the persistent storage PRSTR, and some information storage media used as the persistent storage PRSTR may have a low data transfer rate. Therefore, in this embodiment, since the primary video set PRMVS that can also handle high-resolution video information is allowed to be recorded in only the information storage medium DISC, continuous presentation to the user can be guaranteed without interrupting high-resolution data of the primary video set PRMVS. The primary video set read out from the information storage medium DISC in this way is transferred into the primary video player PRMVP. In the primary video set PRMVS, a main video MANVD, main audio MANAD, sub video SUBVD, sub audio SUBAD, and sub-picture SUBPT are multiplexed and recorded as packs in 2048-byte units. These packs are demultiplexed upon playback, and undergo decode processing in the main video decoder MVDEC, main audio decoder MADEC, sub video decoder SVDEC, sub audio decoder SADEC, and sub-picture decoder SPDEC. This embodiment allows two different playback methods of objects of the secondary video set SCDVS, i.e., a direct playback route from the information storage medium DISC or persistent storage PRSTR, and a method of playing back objects from the data cache DTCCH after they are temporarily stored in the data cache DTCCH. In the first method described above, the secondary video set SCDVS recorded in the information storage medium DISC or persistent storage PRSTR is directly transferred to the secondary video player SCDVP, and undergoes decode processing by the main audio decoder MADEC, sub video decoder SVDEC, or sub audio decoder SADEC. As the second method described above, the secondary video set SCDVS is temporarily recorded in the data cache DTCCH irrespective of its storage location (i.e., the information storage medium DISC, persistent storage PRSTR, or network server NTSRV), and is then sent from the data cache DTCCH to the secondary video player SCDVP. At this time, the secondary video set SCDVS recorded in the information storage medium DISC or persistent storage PRSTR is recorded in the file cache FLCCH in the data cache DTCCH. However, the secondary video set SCDVS recorded in the network server NTSRV is temporarily stored in the streaming buffer STRBUF. Data transfer from the information storage medium DISC or persistent storage PRSTR does not suffer any large data transfer rate drop. However, the data transfer rate of object data sent from the network server NTSRV may temporarily largely drop according to network circumstances. Therefore, since the secondary video set SCDVS sent from the network server NTSRV is recorded in the streaming buffer STRBUF, a data transfer rate drop on the network can be backed up in terms of the system, and continuous playback upon user presentation can be guaranteed. This embodiment is not limited to these methods, and can store data of the secondary video set SCDVS recorded in the network server NTSRV in the persistent storage PRSTR. After that, the information of the secondary video set SCDVS is transferred from the persistent storage PRSTR to the secondary video player SCDVP, and can be played back and presented.

As shown in FIG. 10, all pieces of information of the advanced application ADAPL and advanced subtitle ADSBT are temporarily stored in the file cache FLCCH in the data cache DTCCH irrespective of the recording locations of objects. In this way, the number of times of access of an optical head in the information recording and playback unit shown in FIG. 1 is reduced upon simultaneous playback with the primary video set PRMVS and secondary video set SCDVS, thus guaranteeing continuous presentation to the user. The advanced application ADAPL temporarily stored in the file cache FLCCH is transferred to the advanced application presentation engine AAPEN, and undergoes presentation processing to the user. The information of the advanced subtitle ADSBT stored in the file cache FLCCH is transferred to the advanced subtitle player ASBPL, and is presented to the user.

Data Access Manager:

Data Access Manager consists of Disc Manger, Network Manager and Persistent Storage Manager (see FIG. 26).

Disc Manager:

The Disc Manager controls data reading from HD DVD disc to internal modules of the Advanced Content Player.

The Disc Manager is responsible to provide file access API set for HD DVD Disc. HD DVD Disc shall not support write function.

Persistent Storage Manager:

The Persistent Storage Manager controls data exchange between Persistent Storage Devices and internal modules of Advanced Content Player. The Persistent Storage Manager is responsible to provide file access API set for Persistent Storage devices. Persistent Storage devices may support file read/write functions.

Network Manager:

The Network Manager controls data exchange between Network Server and internal modules of the Advanced Content Player. The Network Manager is responsible to provide file access API set for Network Server. Network Server usually supports file download and some Network Servers may support file upload.

The Navigation Manager invokes file download/upload between Network Server and the File Cache in accordance with Advanced Application. The Network Manager also provides protocol level access functions to the Presentation Engine. The Secondary Video Player in the Presentation Engine can utilize these functions for streaming from Network Server.

More intelligible explanations will be provided below.

FIG. 26 shows the structure of the data access manager DAMNG in the advanced content playback unit ADVPL shown in FIG. 14.

The data access manager DAMNG in this embodiment controls exchange of various playback objects recorded in the persistent storage PRSTR, network server NTSRV, and information storage medium DISC into the advanced content playback unit ADVPL. The data access manager DAMNG includes a disc manager DKMNG, persistent storage manager PRMNG, and network manager NTMNG. The operation of the disc manager DKMNG will be described first. In this embodiment, the disc manager DKMNG performs data control upon reading information from the information storage medium DISC and transferring data to various internal modules in the advanced content playback unit ADVPL. The disc manager DKMNG plays back various files recorded in the information storage medium DISC in accordance with API (application interface) commands with respect to the information storage medium DISC of this embodiment. This embodiment is not premised on a write function of information in the information storage medium DISC.

The persistent storage manager PRMNG controls data transfer between the persistent storage PRSTR and various internal modules in the advanced content playback unit ADVPL. The persistent storage manager PRMNG also performs file access control (file read control) in the persistent storage PRSTR in correspondence with an API command set as in the disc manager DKMNG. The persistent storage PRSTR of this embodiment is premised on recording and playback functions.

The network manager NTMNG performs data transfer control between the network server NTSRV and internal modules in the advanced content playback unit ADVPL. The network manager NTMNG performs file access control (file read control) based on an API command set with respect to the network server NTSRV. In this embodiment, the network server NTSRV not only normally supports file downloading from the network server NTSRV but also can support file uploading to the network server NTSRV.

Furthermore, in this embodiment, the network manager NTMNG also manages an access control function in protocol level of various playback objects to be sent to the presentation engine PRSEN. Also, the network manager NTMNG can perform data transfer control of the secondary video set SCDVS from the network server NTSRV to the secondary video player SCDVP via the streaming buffer STRBUF, as shown in FIG. 25. The network manager NTMNG also controls and manages these control operations.

Data Cache:

The Data Cache can be divided into two kinds of temporal data storages. One is the File Cache which is temporal buffer for file data. The other is the Streaming Buffer which is temporal buffer for streaming data.

The Data Cache quota for the Streaming Buffer is described in Play list and the Data Cache is divided during startup sequence of the Advanced Content playback. Minimum size of Data Cache is 64 MB (see FIG. 27).

Data Cache Initialization:

The Data Cache configuration is changed during startup sequence of Advanced Content playback. Play list can include size of the Streaming Buffer. If there is no Streaming Buffer size configuration, it indicates Streaming Buffer size equals zero. The byte size of Streaming Buffer size is calculated as follows.

<streaming Buf size="1024"/>

Streaming Buffer size=1024 (kB)=1024×1024 bytes.

The Streaming Buffer size shall be multiple of 2048 bytes.

Minimum Streaming Buffer size is zero byte.

File Cache:

The File Cache is used for temporal file cache among Data Sources, Navigation Manager and Presentation Engine.

Streaming Buffer:

The Streaming Buffer is used for temporal data buffer for Secondary Video Set by the Secondary Video Presentation Engine in the Secondary Video Player. The Secondary Video Player requests the Network Manager to get a part of S-EVOB of Secondary Video Set to the Streaming Buffer. And then Secondary Video Player reads S-EVOB data from the Streaming Buffer and feeds it to the Demux Module in the Secondary Video Player.

More intelligible explanations will be provided below.

Figure 27:
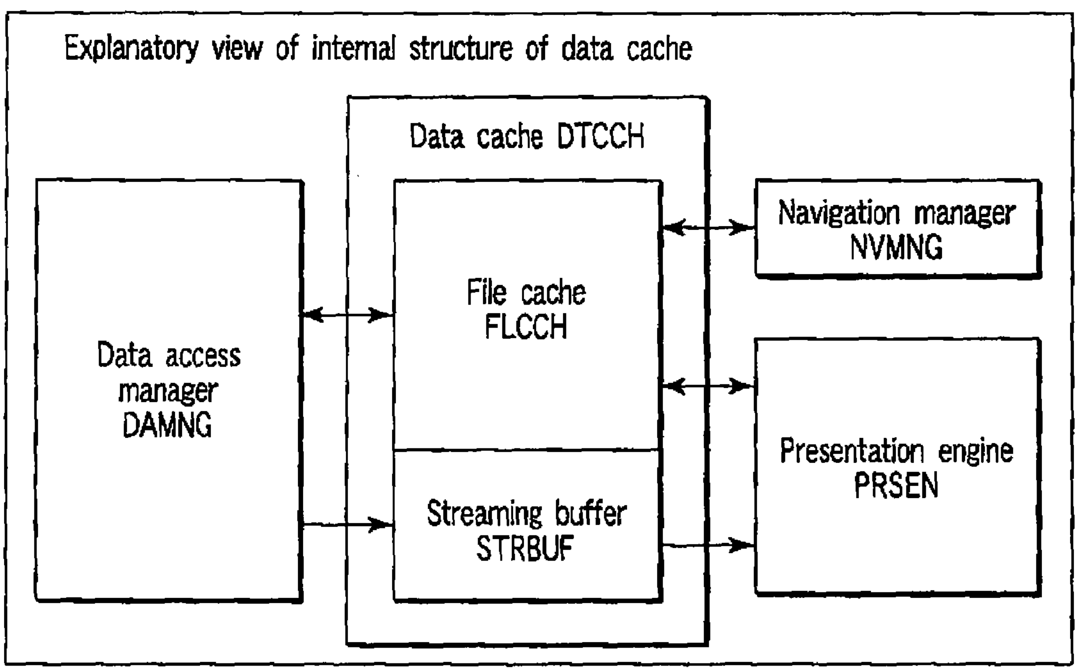
FIG. 27 is an exemplary view showing the structure in a data cache.

FIG. 27 shows the structure in the data cache DTCCH in the advanced content playback unit ADVPL shown in FIG. 14.

In this embodiment, the data cache DTCCH is divided into two different types of areas to be described below as temporal data storage locations. The first area is the file cache FLCCH which is used as a temporary storage location (temporal buffer) for file data. As the second area, in this embodiment, the streaming buffer STRBUF which is used as a temporary storage location for streaming data can be defined. As shown in FIG. 25, in this embodiment, the streaming buffer STRBUF can temporarily store the secondary video set SCDVS transferred from the network server NTSRV. A substitute audio SBTAD, substitute audio video SBTAV, or secondary audio video included in the secondary video set SCDVS is temporarily recorded in the streaming buffer STRBUF. An information description column associated with the streaming buffer in resource information RESRCI in a playlist PLLST describes information associated with the streaming buffer STRBUF area assigned to the data cache DTCCH (the size of the streaming buffer STRBUF area, the address range on the memory space assigned as the streaming buffer STRBUF area, and the like).

During playback startup processing (startup sequence) of the advanced content ADVCT, an assignment job of the data cache DTCCH (assignment processing of the data size to be assigned to the file cache FLCCH and that to be assigned to the streaming buffer) is executed. In this embodiment, the data size in the data cache DTCCH is premised on 64 MB or more. Smooth execution of the presentation processing of the advanced application ADAPL and advanced subtitle ADSBT premised on 64 MB or more to the user is guaranteed.

In this embodiment, during the startup processing (startup sequence) upon playback of the advanced content ADVCT, the assignment job in the data cache DTCCH (settings of the assigned memory sizes of the file cache FLCCH and streaming buffer STRBUF, and the like) is changed. The playlist file PLLST describes memory size information to be assigned to the streaming buffer STRBUF. If the size of the streaming buffer STRBUF is not described in the playlist PLLST, the memory size to be assigned to the streaming buffer STRBUF is considered as "0". The size information of the streaming buffer STRBUF described in configuration information CONFGI in the playlist file PLLST shown in FIGS. 23A and 23B is described using a pack size (logical block size or logical sector size) as a unit. In this embodiment, all of one pack size, one logical block size, and one logical sector size are equal to each other, i.e., 2048 bytes (about 2 kbytes). For example, when the aforementioned configuration information CONFGI describes that the streaming buffer size is 1024, the size of the streaming buffer on the memory space, which is actually assigned in the data cache DTCCH, is 1024×2=2048 kbytes. The minimum size of the streaming buffer STRBUF is specified as 0 byte. In this embodiment, primary enhanced video objects P-EVOB included in the primary video set PRMVS and secondary enhanced video objects S-EVOB included in the secondary video set SCDVS are recorded as streams in pack units for respective logical blocks (logical sectors). Therefore, in this embodiment, by describing the size information of the streaming buffer STRBUF using a pack size (logical block size or logical sector size) as a unit access control to respective stream packs can be facilitated.

The file cache FLCCH is used as a location used to temporarily store data of the advanced content ADVCT externally fetched via the data access manager DAMNG, and can be used by both the navigation manager NVMNG and presentation engine PRSEN, as shown in FIG. 27.

As shown in FIG. 27, in this embodiment, the streaming buffer STRBUF is a memory space used by the presentation engine PRSEN alone. As shown in FIG. 25, in this embodiment, the streaming buffer STRBUF records data of the secondary video set SCDVS, and can be used by a secondary video playback engine SVPBEN in the secondary video player SCDVP. The secondary video player SCDVP issues a request to the network manager NTMNG (included in the data access manager DAMNG shown in FIG. 26) to read at least some of secondary enhanced video object data S-EVOB in the secondary video set SCDVS from the network server NTSRV and to temporarily store them in the streaming buffer STRBUF. After that, the secondary video player SCDVP reads the secondary enhanced video object data S-EVOB temporarily stored in the streaming buffer STRBUF, transfers them to a demultiplexer DEMUX in the secondary video player SCDVP shown in FIG. 35, and make them undergo decoder processing in a decoder engine DCDEN.

Navigation Manager:

Navigation Manager consists of five major functional modules, Parser, Play list Manager, Advanced Application Manager, File Cache Manager and User Interface Engine (see FIG. 28).

Parser:

Parser reads and parses Advanced Navigation files in response to the request from Play list Manager and Advanced Application Manager. Parsed results are sent to the requested modules.

Play List Manager:

Play list Manager has following responsibilities.

Initialization of all playback control modules

Title Timeline control

File Cache resource management

Playback control module management

Interface of player system

Initialization of all playback control modules:

Play list Manager executes startup procedures based on the descriptions in Play list. Play list Manager changes File Cache size and Streaming Buffer size. Play list Manager tells playback information to each playback control modules, for example, information of TMAP file and playback duration of P-EVOB to Primary Video Player, manifest file to Advanced Application Manager, and so on.

Title Timeline Control:

Play list Manager controls Title Timeline progress in response to the request from Advanced Application, playback progress status from each playback control modules and default playback schedule of the current Play list. Play list Manager also observes each playback modules, such as Primary Video Player, Secondary Video Player and so on, whether they can keep seamless playback the own Presentation Object which is synchronized to Title Timeline. When some synchronized Presentation Object can not keep seamless playback, Play list Manager arbitrates presentation timing among synchronized Presentation Objects and time of Title Timeline.

File Cache Resource Management:

Play list Manager reads and parses Resource Information of Object Mapping information in Play list. Play list Manager gives Resource Information to File Cache Manager which generates resource management table in it.

Play list Manager orders File Cache Manager to load and discard resource files based on this table along with Title Timeline progress.

Playback Control Module Management:

Play list Manager provides variety set of APIs of playback control modules to programming engine in Advanced Application Manager. There are APIs of Secondary Video Player control, Effect Audio control, Audio Mixing control and so on.

Interface of Player System:

Play list Manager provides player system APIs to programming engine in Advanced Application Manager.

There are APIs to access System Information and so on.

Advanced Application Manger:

Advanced Application Manager controls entire playback behavior of Advanced Content and also controls Advanced Application Presentation Engine in accordance with the cooperation of Markup and Script of Advanced Application. Advanced Application Manager consists of Declarative Engine and Programming Engine (See FIG. 28).

Declarative Engine:

Declarative Engine manages and controls declarative behavior of Advanced Content in accordance with the Markup of Advanced Application. Declarative Engine has following responsibilities:

Control of Advanced Application Presentation Engine

Layout of graphics object and advanced text

Style of graphics object and advanced text

Timing control of scheduled graphics plane behaviors and effect audio playback

Control of main video

Attributes control of main video in Primary Audio Video via the object element which is assigned to main video.

Control of sub video

Attributes control of sub video in Primary Audio Video or Secondary Audio Video via the object element which is assigned to sub video.

Scheduled script call

Control script call timing by executing timing element.

Programming Engine:

Programming Engine manages event driven behaviors, API set calls, or any kind of control of Advanced Content. User Interface events are typically handled by Programming Engine and it may change the behavior of Advanced Content or Advanced Application which is defined in Declarative Engine.

File Cache Manager:

File Cache Manager is responsible for

Storing resource files including package file which is multiplexed in P-EVOBS from demux module in Primary Video Player to File Cache Storing resource files including package file on Disc, Network Server or Persistent Storage Retrieving resource files including package file from Data Source to File Cache which is requested by Play list Manager or Advanced Application Manager.

File System management of File Cache

File Cache Manager receives PCKs of Advanced Stream multiplexed in P-EVOBS from demux module in Primary Video Player. PS header of Advanced Stream PCK is removed, and then stored Advanced Stream data into File Cache. File Cache Manager also gets resource files including package file on Disc, Network Server or Persistent Storage in response to the request from Play list Manager or Advanced Application.

User Interface Engine

The User Interface Engine includes the Cursor Manager and several user interface device controllers, such as Front Panel, Remote Control, Mouse, Game Pad controller and so on. At least support one device which can generate User Input Event is mandatory. Support of Cursor Manager is mandatory. Support of a way for slipping out of a hang-up (such as, Reset Button, DISC tray compulsorily open button and so on) is mandatory. To support other user interfaces are optional.

Each controller detects availability of the device and observes user operation events. Every User Input Event is defined in this specification. The user input events are notified to Programming Engine in Advanced Application Manager in Navigation Manager.

The Cursor Manager controls cursor shape and position. Cursor position, image and hotspot may be updated via API call from the Programming Engine in Advanced Application Manager. The Cursor Manager updates the Cursor Plane according to moving events from related devices, such as Mouse, Game Pad and so on. The area to which Cursor can move is called ‘Cursor Region’. This area may be changed by API call.

More intelligible explanations will be provided below.

FIG. 28 shows the internal structure of the navigation manager NVMNG in the advanced content playback unit ADVPL shown in FIG. 14. In this embodiment, the navigation manager NVMNG includes five principal functional modules, i.e., a parser PARSER, playlist manager PLMNG, advanced application manager ADAMNG, file cache manager FLCMNG, and user interface engine UIENG.

In this embodiment, the parser PARSER shown in FIG. 28 parses an advanced navigation file (a manifest file MNFST, markup file MRKUP, and script file SCRPT in the advanced navigation directory ADVNV shown in FIG. 11) in response to a request from the playlist manager PLMNG or advanced application manager ADAMNG to execute analysis processing of the contents. The parser PARSER sends various kinds of required information to respective functional modules based on the analysis result.

The playlist manager PLMNG shown in FIG. 28 executes the following processes:

initialization of all playback control modules such as the presentation engine PRSEN, AV renderer AVRND, and the like in the advanced content playback unit ADVPL shown in FIG. 14;

title timeline TMLE control (synchronization processing of respective presentation objects synchronized with the title timeline TMLE, pause or fast-forwarding control of the title timeline TMLE upon user presentation, and the like);

resource management in the file cache FLCCH (data cache DTCCH);

management of playback presentation control modules such as the presentation engine PRSEN, AV renderer AVRND, and the like in the advanced content playback unit ADVPL; and interface processing of the player system.

In this embodiment, the playlist manager PLMNG sown in FIG. 28 executes initialization processing based on the contents described in the playlist file PLLST. As practical contents, the playlist manager PLMNG changes the memory space size to be assigned to the file cache FLCCH and the data size on the memory space to be assigned as the streaming buffer STRBUF in the data cache DTCCH shown in FIG. 27. Upon playback and presentation of the advanced content ADVCT, the playlist manager PLMNG executes transfer processing of required playback presentation information to respective playback control modules. For example, the playlist manager PLMNG transmits a time map file PTMAP of the primary video set PRMVS to the primary video player PRMVP during the playback period of the primary enhanced video object data P-EVOB. The playlist manager PLMNG transfers the manifest file MNFST to the advanced application manager ADAMNG from the playlist manager PLMNG.

The playlist manager PLMNG performs the following three control operations.

1) The playlist manager PLMNG executes progress processing of the title timeline TMLE in response to a request from the advanced application ADAPL. In the description of FIG. 17, a markup page jump takes place due to a hard sync jump upon playback of the advanced application ADAPL. The following description will be given using the example of FIG. 16. In response to pressing of a help icon 33 included in the advanced application ADAPL by the user during simultaneous presentation of a main title 31 and independent window 32 for a commercial, the screen contents which are presented on the lower side of the screen and are configured by the advanced application ADAPL are often changed (markup page jump). At this time, preparation for the contents (the next markup page to be presented) often requires a predetermined period of time. In such case, the playlist manager PLMNG stops progress of the title timeline TMLE to set a still state of video and audio data until the preparation for the next markup page is completed. These processes are executed by the playlist manager PLMNG.

2) The playlist manager PLMNG controls playback presentation processing status of playback states from various playback presentation control modules. As a practical example, in this embodiment, the playlist manager PLMNG recognizes the progress states of respective modules, and executes corresponding processing when any abnormality has occurred.

3) Playback presentation schedule management in a default state in the current playlist PLLST In this embodiment, the playlist manager PLMNG monitors playback presentation modules such as the primary video player PRMVP, secondary video player SCDVP, and the like irrespective of the necessity of continuous (seamless) playback of various presentation objects to be presented in synchronism with the title timeline TMLE. When continuous (seamless) playback of various presentation objects to be presented in synchronism with the title timeline TMLE is disabled, the playlist manager PLMNG adjusts playback timings between the objects to be synchronously presented and played back, and time (time period) on the title timeline TMLE, thus performing presentation control that does not make the user feel uneasy.

The playlist manager PLMNG in the navigation manager NVMNG reads out and analyzes resource information RESRCI in the playlist PLLST. The playlist manager PLMNG transfers the readout resource information RESRCI to the file cache FLCCH. The playlist manager PLMNG instructs the file cache manager FLCMNG to load or erase resource files based on a resource management table in synchronism with the progress of the title timeline TMLE.

The playlist manager PLMNG in the navigation manager NVMNG generates various commands (API) associated with playback presentation control to a programming engine PRGEN in the advanced application manager ADAMNG to control the programming engine PRGEN. As an example of various commands (API) generated by the playlist manager PLMNG, a control command for the secondary video player SCDVP (FIG. 34), a control command for an audio mixing engine ADMXEN (FIG. 38), an API command associated with processing of an effect audio EFTAD, and the like are issued.

The playlist manager PLMNG also issues player system API commands for the programming engine PRGEN in the advanced application manager ADAMNG. These player system API commands include a command required to access system information, and the like.

In this embodiment, the functions of the advanced application manager ADAMNG shown in FIG. 28 will be described below. The advanced application manager ADAMNG performs control associated with all playback presentation processes of the advanced content ADVCT. Furthermore, the advanced application manager ADAMNG also controls the advanced application presentation engine AAPEN shown in FIG. 30 as a collaboration job in association with the information of the markup file MRKUP and script file SCRPT of the advanced application ADAPL. As shown in FIG. 28, the advanced application manager ADAMNG includes a declarative engine DECEN and the programming engine PRGEN.

The declarative engine DECEN manages and controls declaration processing of the advanced content ADVCT in correspondence with the markup file MRKUP in the advanced application ADAPL. The declarative engine DECEN copes with the following items.

Figure 30:
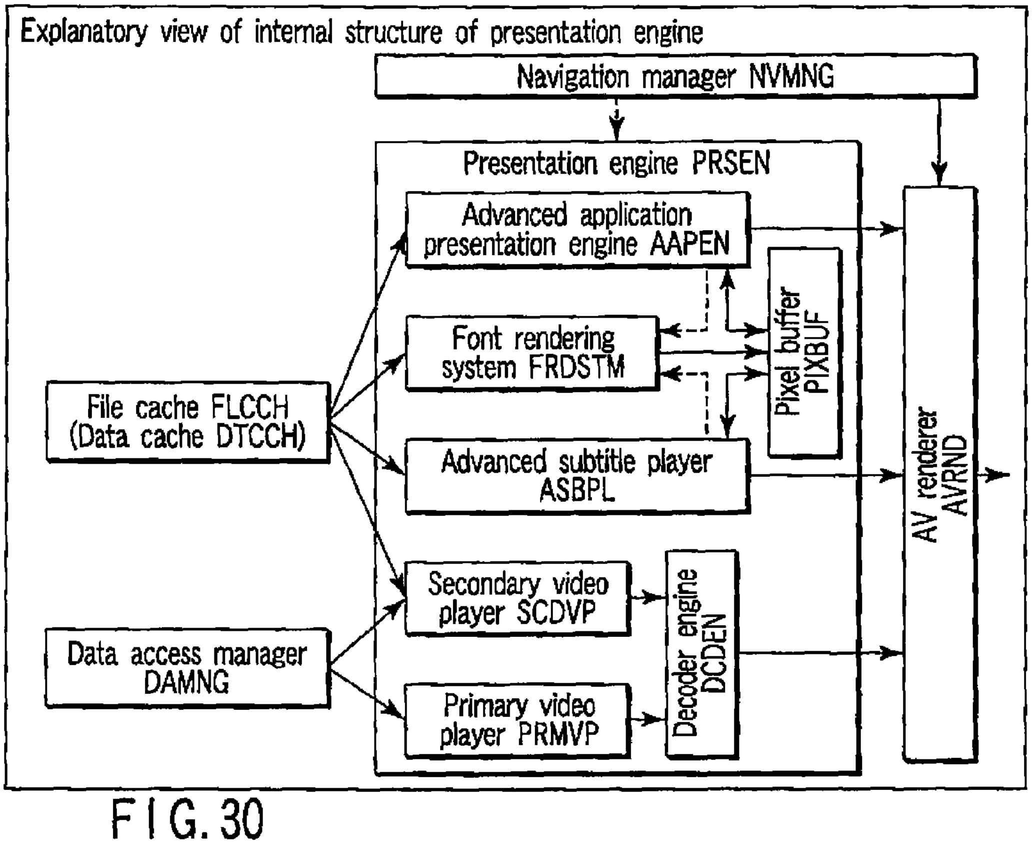
FIG. 30 is an exemplary view showing the structure in a presentation engine.

1. Control of Advanced Application Presentation Engine AAPEN (FIG. 30)

Layout processing of graphic object (advanced application ADAPL) and advanced text (advanced subtitle ADSBT)

Presentation style control of graphic object (advanced application ADAPL) and advanced text (advanced subtitle ADSBT)

Figure 39:
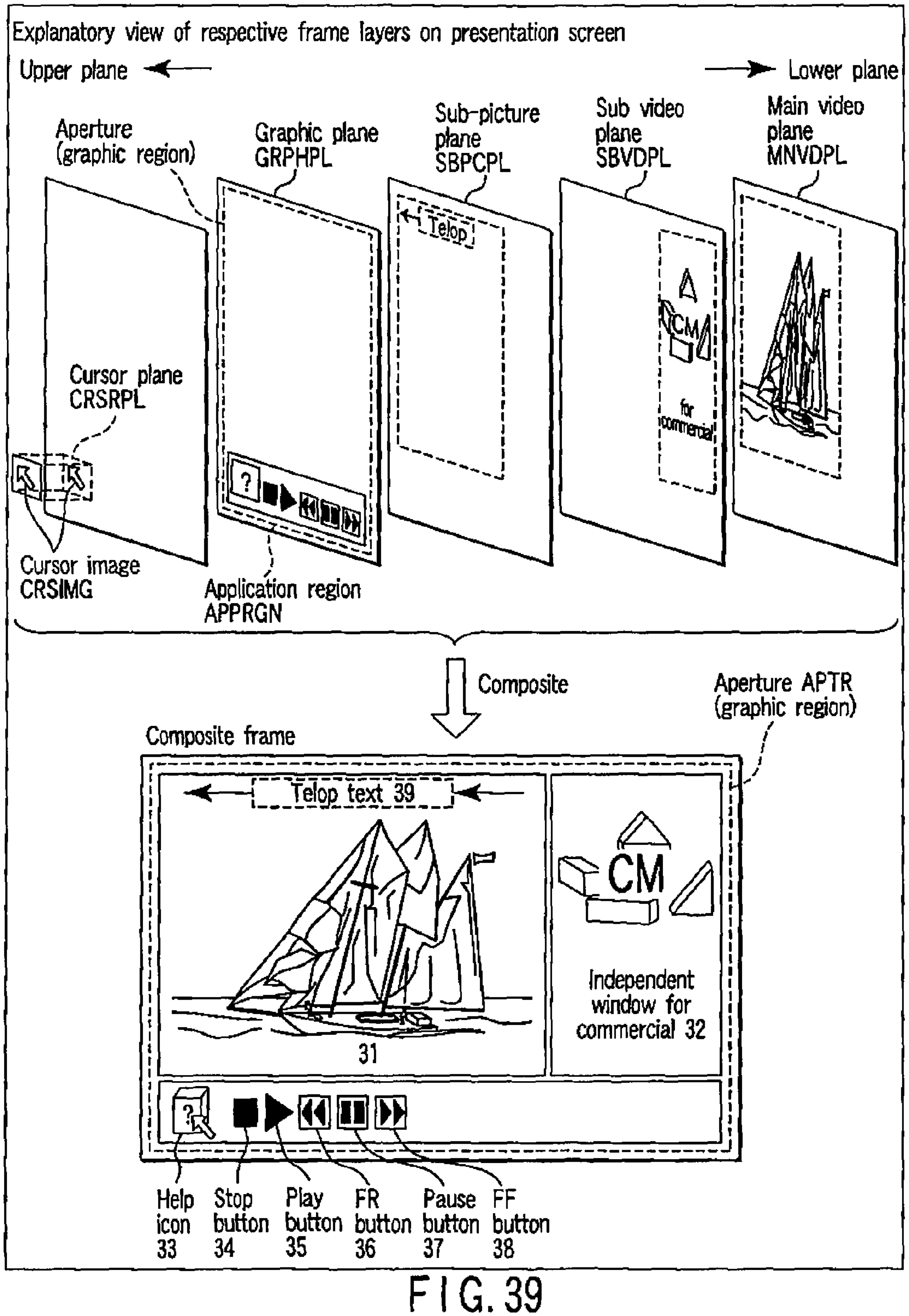
FIG. 39 is an exemplary view showing respective frame layers on the presentation frame.

Presentation timing control in synchronism with presentation plan of graphic plane (presentation associated with advanced application ADAPL) and timing control upon playback of effect audio EFTAD 2. Control Processing of Main Video MANVD Attribute control of main video MANVD in primary audio video PRMAV As shown in FIG. 39, the frame size of a main video MANVD in the main video plane MNVDPL is set by an API command in the advanced application ADAPL. In this case, the declarative engine DECEN performs presentation control of the main video MANVD in correspondence with the frame size and frame layout location information of the main video MANVD described in the advanced application ADAPL.

3. Control of Sub Video SUBVD

Attribute control of sub video SUBVD in primary audio video PRMAV or secondary audio video SCDAV As shown in FIG. 39, the frame size of a sub video SUBVD in the sub video plane SBVDPL is set by an API command in the advanced application ADAPL. In this case, the declarative engine DECEN performs presentation control of the sub video SUBVD in correspondence with the frame size and frame layout location information of the sub video SUBVD described in the advanced application ADAPL.

4. Schedule-Managed Script Call

The script call timing is controlled in correspondence with execution of a timing element described in the advanced application ADAPL.

In this embodiment, the programming engine PRGEN manages processing corresponding to various events such as an API set call, given control of the advanced content ADVCT, and the like. Also, the programming engine PRGEN normally handles user interface events such as remote controller operation processing and the like. The processing of the advanced application ADAPL, that of the advanced content ADVCT, and the like defined in the declarative engine DECEN can be changed by a user interface event UIEVT or the like.

The file cache manager FLCMNG processes in correspondence with the following events.

1. The file cache manager FLCMNG extracts packs associated with the advanced application ADAPL and those associated with the advanced subtitle ADSBT, which are multiplexed in a primary enhanced video object set P-EVOBS, combines them as resource files, and stores the resource files in the file cache FLCCH. The packs corresponding to the advanced application ADAPL and those corresponding to the advanced subtitle ADSBT, which are multiplexed in the primary enhanced video object set P-EVOBS, are extracted by the demultiplexer DEMUX shown in FIG. 35.

2. The file cache manager FLCMNG stores various files recorded in the information storage medium DISC, network server NTSRV, or persistent storage PRSTR in the file cache FLCCH as resource files.

3. The file cache manager FLCMNG plays back source files, which were previously transferred from various data sources to the file cache FLCCH, in response to requests from the playlist manager PLMNG and the advanced application manager ADAMNG.

4. The file cache manager FLCMNG performs file system management processing in the file cache FLCCH.

As described above, the file cache manager FLCMNG performs processing of the packs associated with the advanced application ADAPL, which are multiplexed in the primary enhanced video object set P-EVOBS and are extracted by the demultiplexer DEMUX in the primary video player PRMVP. At this time, a presentation stream header in an advanced stream pack included in the primary enhanced video object set P-EVOBS is removed, and packs are recorded in the file cache FLCCH as advanced stream data. The file cache manager FLCMNG acquires resource files stored in the information storage medium DISC, network server NTSRV, and persistent storage PRSTR in response to requests from the playlist manager PLMNG and the advanced application manager ADAMNG.

The user interface engine UIENG includes a remote control controller RMCCTR, front panel controller FRPCTR, game pad controller GMPCTR, keyboard controller KBDCTR, mouse controller MUSCTR, and cursor manager CRSMNG, as shown in FIG. 28. In this embodiment, one of the front panel controller FRPCTR and remote control controller RMCCTR must be supported. In this embodiment, the cursor manager CRSMNG is indispensable, and the user processing on the screen is premised on the use of a cursor like in a personal computer. Various other controllers are handled as options in this embodiment. Various controllers in the user interface engine UIENG shown in FIG. 28 detect if corresponding actual devices (a mouse, keyboard, and the like) are available, and monitor user operation events. If the above user input processing is made, its information is sent to the programming engine PRGEN in the advanced application manager ADAMNG as a user interface event UIEVT. The cursor manager CRSMNG controls the cursor shape and the cursor position on the screen. The cursor manager CRSMNG updates a cursor plane CRSRPL shown in FIG. 39 in response to motion information detected in the user interface engine UIENG.

Player State Machine for Advanced Content Player

Figure 29:
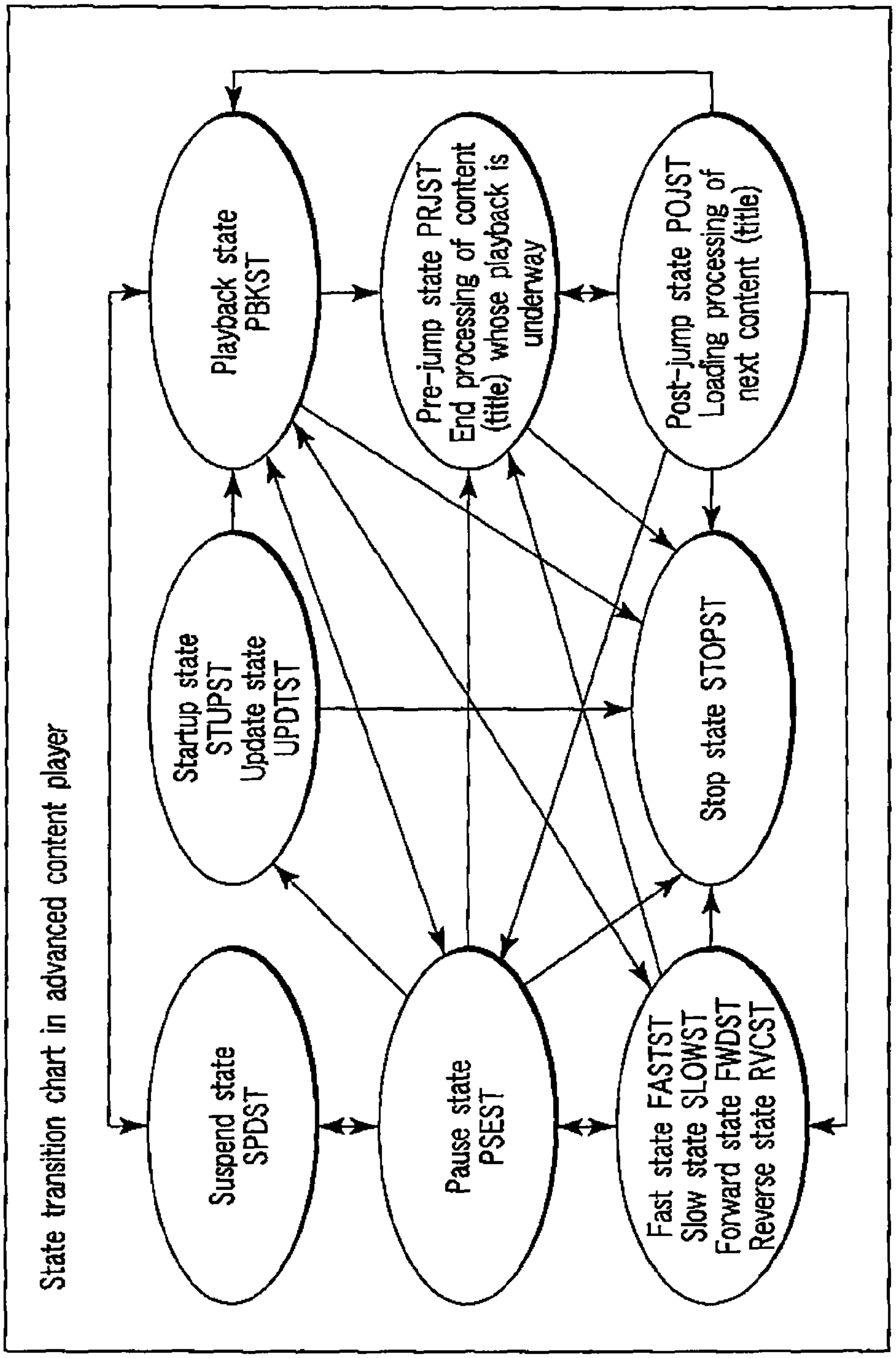
FIG. 29 is an exemplary view showing a state transition chart of an advanced content player.

FIG. 29 shows state machine of Advanced Content Player. There are eight states in the state machine, Startup, Playback, Pause, Pre Jump, Post Jump, Stop and Suspend.

A) Startup/Update State

When the player starts Startup Sequence or Update Sequence, player state machine moves to Startup/Update State. After Startup/Update Sequence is completed normally, state machine moves to Playback State.

B) Playback State

While the Title Timeline progress at normal speed, player state machine in Playback State.

C) Stop State

On this state, the Title Timeline shall not progress and also every application shall not progress.

D) Pause State

While the Title Timeline has stopped temporarily, the player state machine moves to Pause State.

E) Fast/Slow—Forward/Reverse State

While the Title Timeline has run fast forward, slow forward, fast reverse or slow reverse, player state machine moves to Fast/Slow—Forward/Reverse State.

F) Pre Jump State

When user clicks 'jump' button which is presented by Menu Application, the player state machine moves to Pre Jump State. In this state, among current running applications, all applications which are invalid at destination point on Title Time line, are terminated. After this processing is completed, state machine moves to Post Jump State.

G) Post Jump State

In the beginning of this state, jump to certain jump destination time on Title Timeline. And then, the preparations for starting next presentation, such as buffering for video presentation, resource loading for application, are made. After that, the state machine moves to Playback State.

H) Suspend State

While Standard Contents is playing or Persistent Storage Management Menu is in execution, the state machine moves to Suspend State. In this state, Title Timeline and all presentation objects are suspended.

More intelligible explanations will be provided below.

States to be processed by the advanced content playback unit ADVPL in the information recording and playback apparatus 1 shown in FIG. 1 include eight states, i.e., a suspend state SPDST, pause state PSEST, fast state FASTST/slow state SLOWST/forward state FWDST/reverse state RVCST, startup state STUPST/update state UPDTST, stop state STOPST, playback state PBKST, pre-jump state PRJST, and post-jump state POJST. FIG. 29 is a state transition chart among the states of the advanced content playback unit ADVPL. Respective states shown in this state transition chart are controlled by the navigation manager NVMNG in the advanced content playback unit ADAPL, as shown in FIG. 14. For example, in case of the system example shown in FIG. 1, when the user operates a remote controller toward the wide-screen TV monitor 15, wireless data 18 is input to the advanced content playback unit ADVPL via the wireless LAN controller 7-1 in the information recording and playback apparatus 1. When information of the user operation UOPE is input to the navigation manager NVMNG in the advanced content playback unit ADVPL, the remote control controller RMCCTR operates, and inputs that information to the advanced application manager ADAMNG as a user interface event UIEVT, as shown in FIG. 28. The advanced application manager ADAMNG interprets the user designated contents in correspondence with the position on the screen designated by the user, and notifies the parser PARSER of them. The parser PARSER causes transition to each of the states shown in FIG. 29. When each state transition has occurred, as shown in FIG. 29, the parser PARSER controls optimal processing in correspondence with information of the playlist PLLST interpreted by the playlist manager PLMNG. The operation contents of respective states will be described below.

A) Startup State STUPST/Update State UPDTST

When the advanced content playback unit ADVPL starts the startup processing or update processing, it transits to the startup state STUPST/update state UPDTST. When the startup state STUPST/update state UPDTST is normally complete, the advanced content playback unit ADVPL transits to the playback state PBKST.

B) Playback State PBKST

The playback state PBKST means a playback state of the advanced content ADVCT at a normal speed. That is, when the advanced content playback unit ADVPL is in the playback state PBKST, it executes processing along the title timeline TMLE at a normal playback speed.

C) Stop State STOPST

The stop state STOPST means that the advanced content playback unit ADVPL reaches an end state. At this time, the processing along the time axis of the title timeline TMLE is not executed, and every application processes are also stopped.

D) Pause State PSEST

The pause state PSEST represents a paused state. At this time, the time progress of the title timeline TMLE (count-up on the title timeline TMLE) is paused.

E) Fast State FASTST/Slow State SLOWST/Forward State FWDST/Reverse State RVCST

The fast state FASTST means a fast playback mode of a movie, and the slow state SLOWST means a slow playback mode of a movie. The forward state FWDST means information playback in a normal playback direction and also includes jump processing to an identical title in the forward direction (to access a playback position after an elapse of a specific time period). The reverse state RVCST means playback in the reverse direction with respect to the normal playback direction (rewinding), and also includes jump playback to a position a specific time period before. When the advanced content playback unit ADVPL is in each of the above states, the time change (count-up/count-down) processing on the title timeline TMLE is executed in correspondence with each of these playback states as the time progress (count change state) on the title timeline.

F) Pre-Jump State PRJST

The pre-jump state means end processing of a content (title), playback of which is underway. In this embodiment, the advanced application ADAPL presents various control buttons on the screen. When the user clicks a "jump button" of these buttons, the advanced content playback unit ADVPL transits to the pre-jump state PRJST. A jump destination designated by the "jump button" presented by the advanced application ADAPL indicates jump to a different title or is largely different from the time (count value) designated by the title timeline TMLE even in an identical title. The advanced application ADVPL currently presented on the screen is often not used (its validity period has expired) on the time (count value) of a title timeline TMLE corresponding to the jump destination. In this case, the end processing of the advanced application ADAPL currently presented on the screen is needed. Therefore, in this embodiment, in the pre-jump state PRJST, the time (count value) of the title timeline TMLE at the jump destination is checked, and the end processing of the advanced application ADAPL, the validity period of which has expired and presentation preparation processing of an advanced application ADAPL, the validity period of which newly starts (which is not presented on the frame before jump) are executed. After that, the advanced content playback unit ADVPL transits to the post-jump state POJST.

G) Post-Jump State POJST

The post-jump state POJST represents a loading processing mode of the next content (title). As shown in FIG. 17, unique title timelines TMLE are set for respective titles. When transition is made to the pre-jump state PRJST during playback of, e.g., title #2, the time progress of the title timeline TMLE of title #2 is stopped. When playback preparation of next title #3 is made in the post-jump state POJST, the title timeline TMLE shifts from the one for title #2 to that corresponding to title #3. In the post-jump state POJST, preparation processes such as the setting of the memory space of the data cache DTCCH, loading processing of the advanced application ADAPL into the set data cache DTCCH, and the like are executed. Upon completion of these series of preparation processes, the advanced content playback unit ADVPL transits to the playback state PBKST.

H) Suspend State SPDST

The suspend state means that the advanced content playback unit ADVPL is in a standby state. In this state, the time progress of the title timeline TMLE is paused, and various playback presentation objects are in a presentation standby state. As an example of this state, in, e.g., FIG. 1, this state is set when only the standard content STDCT is presented on the wide-screen TV monitor 15, and the advanced content ADVCT is not presented.

When the user inserts the information storage medium DISC into the information recording and playback unit 2 in the information recording and playback apparatus 1, the advanced content playback unit ADVPL is set in the startup state STUPST, and also enters the update state UPDTST as an initial state. After that, in a normal case, the advanced content playback unit ADVPL transits to the playback state PBKST soon to start a presentation mode of the advanced content ADVCT. At this time, when the user switches the advanced content ADVCT to the standard content STDCT, the advanced content playback unit ADVPL transits to the suspend state SPDST. When the user starts to play back the advanced content ADVCT again, the advanced content playback unit ADVPL transits to the playback state PBKST. Next, when the user instructs frame transition to another frame (title), the advanced content playback unit ADVPL transits to the post-jump state POJST via the pre-jump state PRJST, and then transits to the playback state PBKST of the title designated by the user. In this case, when the user presses a pause button during playback, the advanced content playback unit ADVPL transits to the pause state PSEST. After that, when the user designates fast-forwarding, the advanced content playback unit ADVPL transits to the fast state. After that, when the user quits the information recording and playback apparatus 1, the advanced content playback unit ADVPL transits to the stop state STOPST. The state transition of the advanced content playback unit ADVPL takes place in response to user operations UOPE in this way.

Presentation Engine:

The Presentation Engine is responsible to decode presentation data and output AV Renderer in response to control commands from the Navigation Manager. It consists of six major modules and one graphic buffering memory. These six major modules are Advanced Application Presentation Engine, Advanced Subtitle Player, Font Rendering System, Secondary Video Player, Primary Video Player and Decoder Engine.

And, one graphics buffering memory is Pixel Buffer. The Pixel buffer is shared graphics memory which is stores pixel images, such as text images and decoded PNG images. The Pixel buffer is used for the Advanced Application Presentation Engine, Font Rendering System and Advanced Subtitle Player (See FIG. 30).

Advanced Application Presentation Engine:

More intelligible explanations will be provided below.

FIG. 30 shows the internal structure of the presentation engine PRSEN in the advanced content playback unit ADVPL shown in FIG. 14.

Positioning of the presentation engine PRSEN will be described first. The advanced content ADVCT recorded on each of various recording media passes through the data access manager DAMNG, as shown in FIG. 14, and then undergoes data transfer to the AV renderer AVRND via the presentation engine PRSEN. Control at this time is done by the navigation manager NVMNG. That is, the presentation engine PRSEN decodes playback presentation data corresponding to various presentation objects in response to control commands generated by the navigation manager NVMNG, and transfers the decoded results to the AV renderer AVRND. As shown in FIG. 30, the presentation engine PRSEN includes six different principal processing functional modules and one graphic buffer memory. The six different principal functional modules include the advanced application presentation engine AAPEN, a font rendering system FRDSTM, the advanced subtitle player ASBPL, the secondary video player SCDVP, the primary video player PRMVP, and the decoder engine DCDEN. A pixel buffer PIXBUF corresponds to the graphic buffer memory. For example, the pixel buffer PIXBUF is shared as a graphic memory that stores, e.g., a text image and a pixel image such as a PNG image or the like.

As shown in FIG. 30, the pixel buffer PIXBUF is shared by the advanced application presentation engine AAPEN, font rendering system FRDSTM, and advanced subtitle player ASBPL. That is, as will be described later, the advanced application presentation engine AAPEN generates image pictures associated with the advanced application ADAPL (for example, a series of frame images from the help icon 33 to the FF button 38 shown in FIG. 16). At this time, the advanced application presentation engine AAPEN uses the pixel buffer PIXBUF as a temporary storage location of the image pictures. Likewise, the font rendering system FRDSTM generates text information corresponding to font. An image picture as the text information of the font shape which is specified and designated temporarily shares the pixel buffer PIXBUF as its temporary storage location. Also, when the advanced subtitle player ASBPL generates, e.g., subtitle information of the advanced subtitle ADSBT, its image picture can be temporarily stored in the pixel buffer PIXBUF.

As shown in FIG. 10, in this embodiment, there are four different types of playback presentation objects, and FIG. 25 describes the data flow of these playback presentation objects in the advanced content playback unit ADVPL. The relationship between FIG. 30 and FIG. 25 described above will be explained below.

The primary video set PRMVS will be explained first. As shown in FIG. 25, the primary video set PRMVS recorded in the information storage medium DISC is directly transferred to the primary video player PRMVP, and is decoded by various decoders. A relevant explanation will be given using FIG. 30. The primary video set PRMVS recorded in the information storage medium DISK goes through the data access manager DAMNG, is then decoded by the decoder engine DCDEN via the primary video player PRMVP, and undergoes picture composition by the AV renderer AVRND.

The secondary video set SCDVS will be described below. As shown in FIG. 25, the secondary video set SCDVS goes through the secondary video player SCDVP and is decoded by various decoders. A relevant explanation will be given using FIG. 30. The secondary video set SCDVS goes through the data access manager DAMNG, is processed by the secondary video player SCDVP, is then decoded by the decoder engine DCDEN, and undergoes picture composition by the AV renderer AVRND. Also, as shown in FIG. 25, the secondary video set SCDVS recorded in the network server NTSRV goes through the streaming buffer STRBUF, and reaches the secondary video player SCDVP. A relevant explanation will be given using FIG. 30. The secondary video set SCDVS recorded in the network server NTSRV is temporarily stored in the streaming buffer STRBUF (not shown) in the data cache DTCCH, is sent from the streaming buffer STRBUF in the data cache DTCCH to the secondary video player SCDVP, is decoded by the decoder engine DCDEN, and undergoes picture composition by the AV renderer AVRND.

The advanced application ADAPL will be explained below. As shown in FIG. 25, the advanced application ADAPL is temporarily stored in the file cache FLCCH, and is then transferred to an advanced element presentation engine AEPEN. A relevant explanation will be given using FIG. 30. The advanced application ADAPL is transferred from the file cache FLCCH in which it is temporarily stored to the advanced application presentation engine AAPEN, is formed as an image picture in the advanced application presentation engine AAPEN, and then undergoes picture composition by the AV renderer AVRND.

Finally, the advanced subtitle ADSBT will be described below. As shown in FIG. 25, the advanced subtitle ADSBT is inevitably temporarily stored in the file cache FLCCH, and is then transferred to the advanced subtitle player ASBPL. A relevant explanation will be given using FIG. 30. The advanced subtitle ADSBT stored in the file cache FLCCH is converted into an image picture that expresses the text contents by the advanced subtitle player ASBPL, and undergoes picture composition on the AV renderer AVRND. Especially, when the advanced subtitle ADSBT is to be presented on the screen in a designated font format, a font file FONT stored in the advanced element directory ADVEL, as shown in FIG. 11, is used. Using this data, the advanced subtitle ADSBT stored in the file cache FLCCH is converted into a character picture (image picture) in the designated font format in the font rendering system FRDSTM, and then undergoes picture composition by the AV renderer AVRND. In this embodiment, a character picture (image picture) in a unique font format generated by the font rendering system FRDSTM is temporarily stored in the pixel buffer PIXBUF, and that image picture is transferred to the AV renderer AVRND via the advanced subtitle player ASBPL.

The Advanced Application Presentation Engine outputs two presentation streams to the AV Renderer.

One is frame image for the Graphics Plane. The other is effect audio stream. The Advanced Application Presentation Engine consists of Sound Decoder, Graphics Decoder and Layout Manager (See FIG. 31).

Sound Decoder:

The Sound Decoder reads WAV file from the File Cache and continuously outputs LPCM data to AV Renderer triggered by API call from the Programming Engine.

Graphics Decoder:

The Graphics Decoder retrieves graphics data, such as MNG, PNG or JPEG image from the File Cache.

These image files are decoded and stored in the Pixel Buffer. And then, it sent (bitblt) to the Layout Manager in response to request from the Layout Manager.

Layout Manager:

The Layout Manager has responsibility to make frame image for the Graphics Plane to the AV Renderer.

Layout information comes from the Declarative Engine in the Advanced Application Manager, when frame image is changed. The Layout Manager has the memory called "Graphics Surface" for creating frame image.

The Layout Manger invokes the Graphics Decoder to decode specified graphics object which is to be located on frame image. The Layout Manger also invokes the Font Rendering System to make text image which is also to be located on frame image. The Layout Manager locates graphical images on proper position from bottom to top and calculates the pixel alpha value when the object has alpha channel/value. Then finally it sends frame image to AV Renderer.

More intelligible explanations will be provided below.

Figure 31:
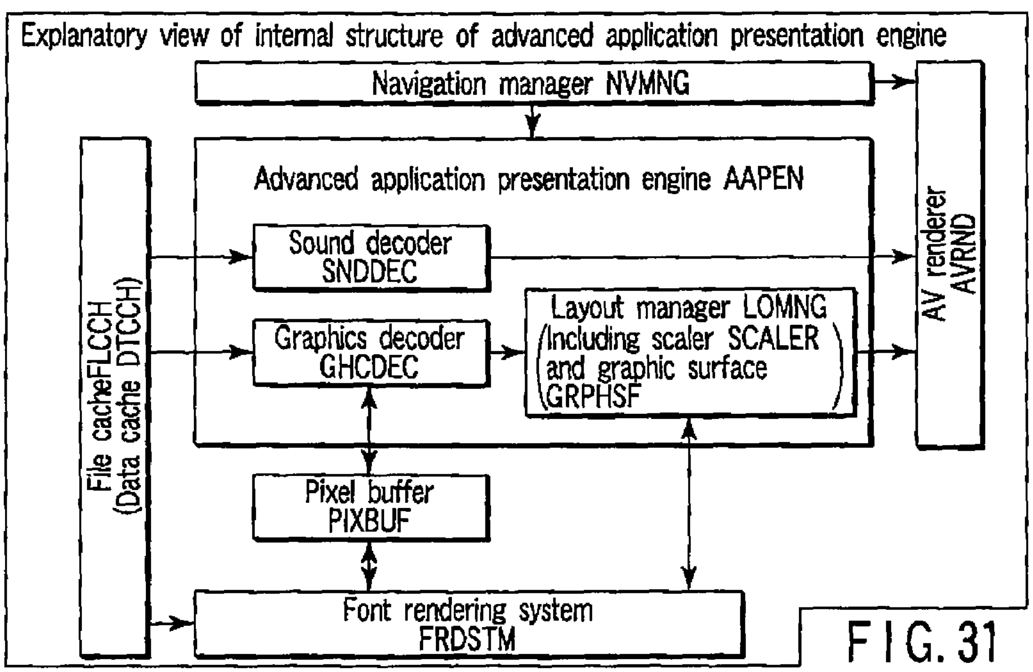
FIG. 31 is an exemplary view showing the structure in an advanced application presentation engine.

As shown in FIG. 14, in this embodiment, the advanced content playback unit ADVPL includes the presentation engine PRSEN. FIG. 31 shows the internal structure of the advanced application presentation engine AAPEN in the presentation engine PRSEN shown in FIG. 30.

In this embodiment, the advanced application presentation engine AAPEN transfers two different types of playback presentation streams (playback presentation objects) to be described below to the AV renderer AVRND. One of playback presentation streams to be transferred to the AV renderer AVRND is a frame image presented on the graphic plane GRPHPL shown in FIG. 39. An effect audio stream EFTAD corresponds to the other playback presentation stream. As shown in FIG. 31, the advanced application presentation engine AAPEN includes a sound decoder SNDDEC, graphics decoder GHCDEC, and layout manager LOMNG.

Effect audio EFTAD (see FIG. 10) information in the advanced application ADAPL is transferred from the file cache FLCCH in which it is temporarily stored in advance to the sound decoder SNDDEC, is decoded in the sound decoder SNDDEC, and then undergoes audio mixing in the AV renderer AVRND. Each individual still picture IMAGE (see FIG. 10) which forms the image picture in the advanced application ADAPL is transferred from the file cache FLCCH in which it is temporarily stored to the graphics decoder GHCDEC, and is converted into (an element of) the image picture on the bitmap in the graphics decoder GHCDEC. Furthermore, each still picture IMAGE undergoes size conversion (scaler processing) in the layout manager LOMNG, is composited on the layout to form the image picture, and then undergoes image composition by the AV renderer.

The above processing will be described below using the example shown in FIG. 16. As shown in FIG. 16, a plurality of pieces of individual still picture information corresponding to the help icon 33, stop button 34, play button 35, FR button 36, pause button 37, and FF button 38 are stored in the file cache FLCCH in correspondence with the advanced application ADAPL. In the graphics decoder GHCDEC, each individual still picture is converted into (an element of) the image picture on the bitmap by decoder processing. Next, the layout manager LOMNG sets the position of the help icon 33, that of the stop button 34, and the like, and the image picture formed as an array of pictures from the help icon 33 to the FF button 38 is generated in the layout manager LOMNG. This image picture as an array of pictures from the help icon 33 to the FF button 38 generated by the layout manager LOMNG is composited to other pictures by the AV renderer AVRND.

The sound decoder SNDDEC reads a WAV file from the file cache FLCCH, and continuously outputs that file in the linear PCM format to the AV renderer AVRND. As shown in FIG. 28, the navigation manager NVMNG includes the programming engine PRGEN. This programming engine PRGEN issues an API command to the presentation engine PRSEN, and the above data processing is executed in response to that API command as a trigger.

The graphics decoder GHCDEC executes decode processing of graphics data stored in the file cache FLCCH. In this embodiment, (elements of) image pictures to be handled include an MNG image, PNG image, MPEG image, and the like. An image file that records information associated with these image pictures is decoded in the graphics decoder GHCDEC, and the decoded (elements of) image pictures are temporarily stored in the pixel buffer PIXBUF shown in FIG. 30. After that, the temporarily stored (elements of) image pictures are transferred to the layout manager LOMNG in response to a request from this layout manager LOMNG.

In this embodiment, the image pictures to be handled by the advanced application presentation engine AAPEN form a presentation frame on the graphic plane GRPHPL shown in FIG. 39. The layout manager LOMNG executes processing for generating these image pictures on the graphic plane GRPHPL, and transferring them to the AV renderer AVRND for composition. Layout information corresponding to each presentation frame (elements of image picture) in the graphic plane GRPHPL shown in FIG. 39 is available. That is, different pieces of corresponding layout information exist every time the frame contents in the graphic plane GRPHPL change, and the layout in the layout manager LOMNG is set based on such layout information. This layout information issued by the declarative engine DECEN included in the advanced application manager ADAMNG in the navigation manager NVMNG is transferred to the layout manager LOMNG, as shown in FIG. 28. The layout manager LOMNG incorporates a memory called a graphics surface GRPHSF, which is used upon generating image pictures on the graphic plane GRPHPL. Upon laying out a plurality of pictures (elements of the image picture) in the graphic plane GRPHPL, the layout manager LOMNG individually activates the graphics decoder GHCDEC to decode each element of the image picture, and then sets the layout for respective elements of image pictures as a frame image (image picture). As shown in FIG. 30, the presentation engine PRSEN includes the font rendering system FRDSTM, which converts character information based on the designated font format into an image picture. Upon making presentation using such specific font, the layout manager LOMNG activates the font rendering system FRDSTM to convert text information into a frame image (image picture) and to lay it out on the graphic plane GRPHPL. In this embodiment, as shown in FIG. 39, the entire image picture or each individual element of the image picture on the graphic plane GRPHPL is set to be translucent, so that a video picture of a sub-picture plane SBPCPL, sub video plane SBVDPL, or main video plane MNVDPL which exists below the graphic plane GRPHPL can be seen through it. The transparency of each element of the image picture (or the entire image picture) in the graphic plane GRPHPL with respect to the lower planes is defined by an alpha value. When the alpha value is set in this way, the layout manager LOMNG sets to lay out the elements at designated positions on the graphic plane GRPHPL as translucent patterns according to the alpha value.

Figure 32:
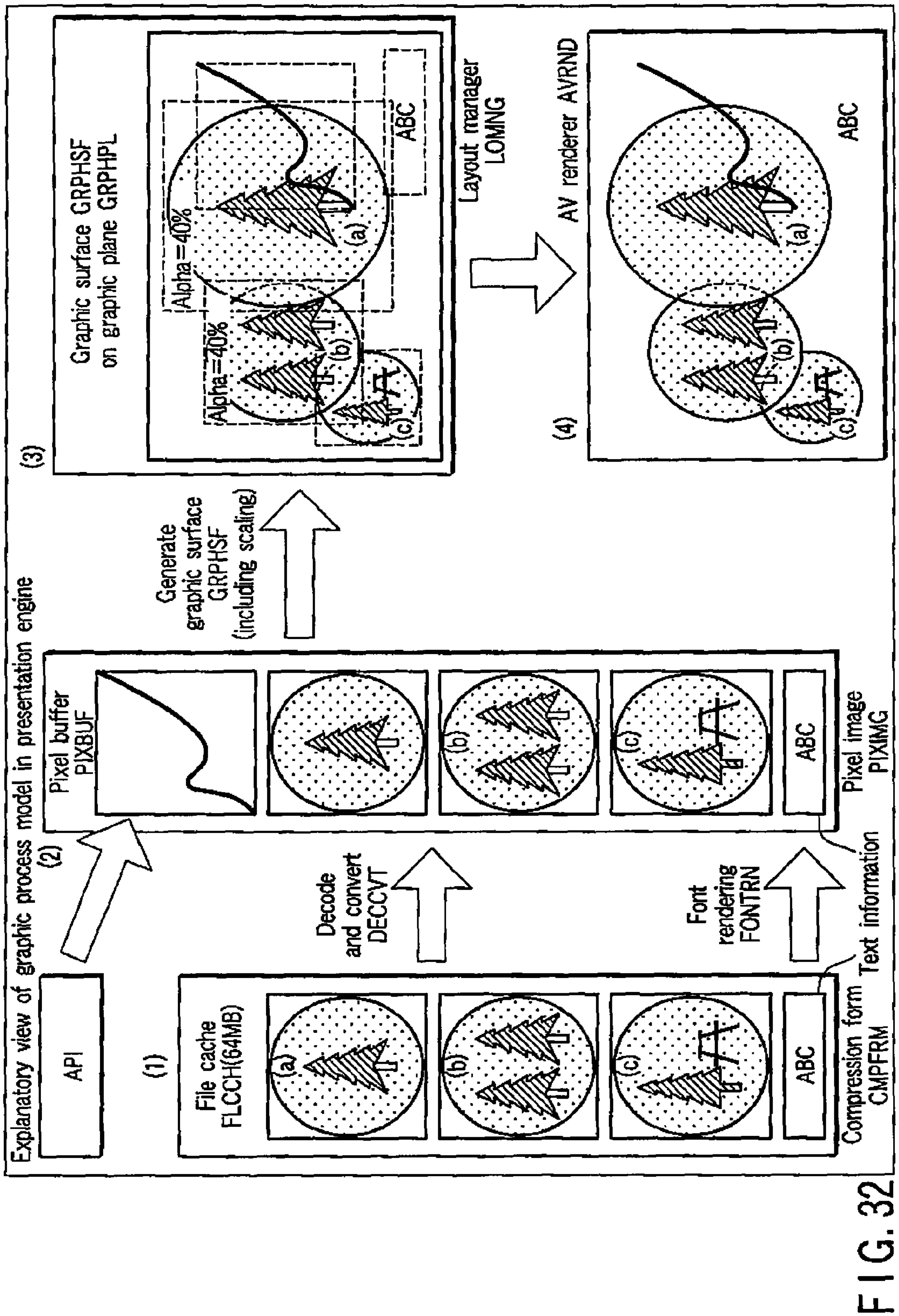
FIG. 32 is an exemplary view showing a graphic process model in the presentation engine.

FIG. 32 shows an example behavior of Graphic Process Model how objects in the File Cache and Drawing Canvas are treated.

1) There are three graphics objects (Face marks "Smile", "Angry" and "Cry") on the File Cache. In a similar way, texts for advanced application are stored on the File Cache.

2) The Presentation Engine decoded all face marks using Graphic Decoder and stores it in the Pixel Buffer. In a similar way, the text "ABC" is converted by Font Rendering System and is stored in the Pixel Buffer. A Line Object on drawing canvas written by API is stored in the Pixel Buffer.

3) These face mark objects are scaled and positioned on the Graphics Surface. At this time, alpha value of these graphics is calculated. In this example, alpha value of “Face mark Angry” and “Face mark Smile” is 40% transparent. In a similar way, the text object and the line object are positioned on the Graphics Surface.

4) Layout Manager sends frame image to AV Render. More intelligible explanations will be provided below.

FIG. 32 shows a graphic process model in the presentation engine PRSEN in this embodiment.

Figure 40:
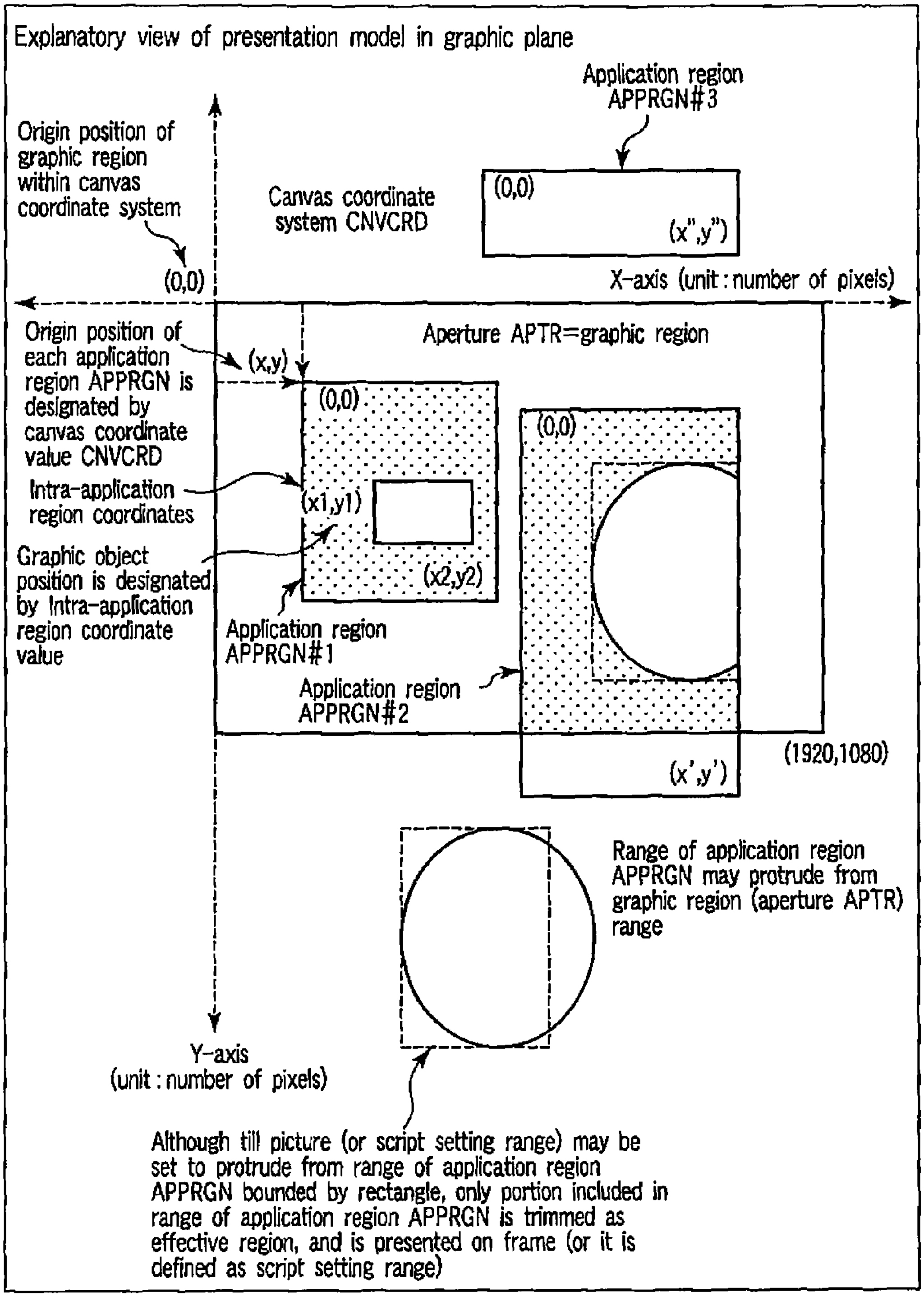
FIG. 40 is an exemplary view showing a presentation model in a graphic plane.

Before a graphic process, information of the advanced application ADAPL is recorded in the file cache FLCCH in a compressed form (compression form CMPFRM) in this embodiment. A graphic image (image picture) generated by the graphic process is presented on the graphic plane GRPHPL in FIG. 39, as will be described later. On the graphic plane GRPHPL, a canvas coordinate system CNVCRD is defined, as shown in FIG. 40, and each decoded graphic image (image picture including an animation) is laid out on the canvas coordinate system CNVCRD.

1) In the embodiment shown in FIG. 32, three types of graphic objects (a), (b), and (c) are recorded in advance in the file cache FLCCH in the compression form CMPFRM (compressed form). Also, text information of the advanced application ADAPL can be recorded in the file cache FLCCH, as indicated by an example of “ABC”.

2) The graphics decoder GHCDEC shown in FIG. 31 decodes the three pieces of compressed information (a), (b), and (c) shown in FIG. 32 (1) to convert them into image pictures (pixel images PIXIMG), and stores the decoded results in the pixel buffer PIXBUF (FIG. 32 (2)). Likewise, the font rendering system FRDSTM converts the text information “ABC” recorded in the file cache FLCCH into an image picture (pixel image PIXIMG) and records it in the pixel buffer PIXBUF. As shown in FIG. 28, this embodiment also supports the mouse controller MUSCTR in the navigation manager NVMNG. When the user draws a figure using a mouse via the mouse controller MUSCTR, that figure is input in the form of a line object as the coordinates of the start and end point positions of each line. The line object is drawn as an image picture (pixel image PIXIMG) on the canvas coordinate system CNVCRD in the form of an API command via the mouse controller MUSCTR. The image picture (pixel image PIXIMG) drawn as the line object is similarly recorded in the pixel buffer PIXBUF.

3) The layout manager LOMNG in FIG. 31 sets the layout positions and presentation sizes on the graphic surface GRPHSF (on the graphic plane GRPHPL) of various decoded image pictures (pixel images PIXIMG) which are temporarily stored. As shown in FIG. 32 (3), the drawings (a), (b), and (c), the text image “ABC”, and the figure drawn by the API command are presented on the identical graphic surface GRPHSF (on the graphic plane GRPHPL) to overlap each other. In this embodiment, by specifying the transparency to each image picture (pixel image PIXIMG), a figure on the reverse side of the overlapping portion is seen through. The translucency of each image picture (pixel image PIXIMG) is defined by the alpha value (alpha information). The layout manager LOMNG can calculate the alpha value for each image picture (pixel image PIXIMG), and can set so that the reverse side of the overlapping portion can be seen through. In the example of FIG. 32 (3), the alpha value of (a) and (b) is set to be 40% (40% transparency).

4) The composite image picture (frame image) on the graphic surface GRPHSF (on the graphic plane GRPHPL) is sent from the layout manager LOMNG to the AV renderer AVRND.

As shown in FIG. 1, the information recording and playback apparatus 1 includes the advanced content playback unit ADVPL. The advanced content playback unit ADVPL includes the presentation engine PRSEN, as shown in FIG. 14. Also, the presentation engine PRSEN includes the advanced subtitle player ASBPL, as shown in FIG. 30. The structure in the advanced subtitle player ASBPL will be described below.

Figure 33:
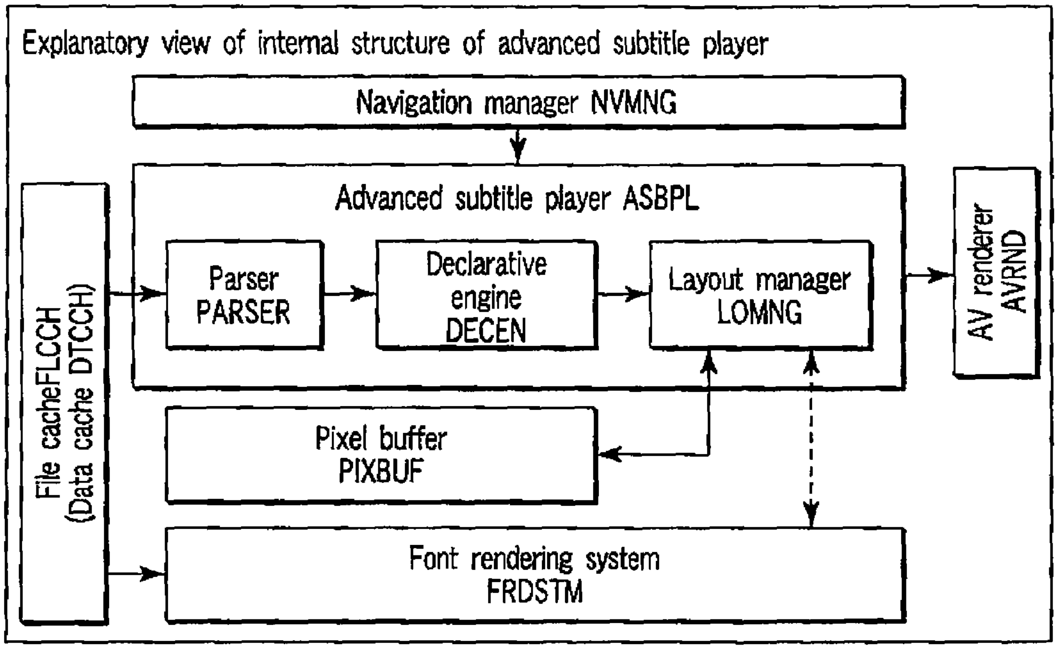
FIG. 33 is an exemplary view showing the structure in an advanced subtitle player.

As shown in FIG. 39, the sub-picture plane SBPCPL which presents a sub-picture and advanced subtitle ADSBT exists on the presentation frame. The advanced subtitle player ASBPL outputs a subtitle image to be presented on the sub-picture plane SBPCPL. As shown in FIG. 33, the advanced subtitle player ASBPL comprises the parser PARSER, declarative engine DECEN, and layout manager LOMNG.

Advanced Subtitle Player:

The Advanced Subtitle Player outputs Subtitle image to the Subpicture Plane. Advanced Subtitle is a subset of Advanced Application, so the Advanced Subtitle Player has subset modules of the Advanced Application Manager and the Advanced Application Presentation Engine. The Advanced Subtitle Player consists of Parser, Declarative Engine and Layout Engine (see FIG. 33).

Parser reads Markup from the File Cache, and then the parsed results are transferred to Declarative Engine.

Declarative Engine manages the presentation information of layout, style and timing of Advanced Subtitle.

Along with the progress of Title Timeline, Declarative Engine sends commands to Layout Manager to generate Subpicture image. Layout Manager invokes Font Rendering System to generate text image in accordance with the information comes from Declarative Engine, and then locates generated image on proper position in Subpicture frame image. At this time, a required graphic image is stored at Pixel Buffer, and a frame image is created on the Graphics Surface in the Layout Manager. Finally, outputs a frame image onto the Subpicture Plane.

More intelligible explanations will be provided below.

The advanced subtitle ADSBT is positioned as a subset of the advanced application ADAPL. Therefore, the advanced subtitle player ASBPL has subset modules of the advanced application manager ADAMNG (see FIG. 28) and the advanced application presentation engine AAPEN (see FIG. 30). That is, as shown in FIG. 30, the advanced subtitle player ASBPL and advanced application presentation engine AAPEN share one pixel buffer PIXBUF. As shown in FIG. 33, the layout manager LOMNG in the advanced subtitle player ASBPL shares that in the advanced application presentation engine AAPEN, as shown in FIG. 31, and the declarative engine DECEN in the advanced subtitle player ASBPL shares that in the advanced application manager ADAMNG, as shown in FIG. 28.

Initially, the parser PARSER in the advanced subtitle player ASBPL reads a markup file MRKUPS of the advanced subtitle stored in the file cache FLCCH in the data cache DTCCH, and parses its contents. The parser PARSER transfers the parsing result to the declarative engine DECEN. The declarative engine DECEN manages presentation information associated with the presentation format (style) and presentation timing of the layout of the advanced subtitle ADSBT. In order to generate a subtitle image (an image of telop text or the like) in synchronism with the time progress on the title timeline TMLE, the declarative engine DECEN transfers various commands to the layout manager LOMNG. In accordance with the command information transferred from the declarative engine DECEN, the layout manager LOMNG activates the font rendering system FRDSTM in the presentation engine PRSEN to generate a text image (image picture). After that, the layout manager LOMNG lays out the generated text image (image picture) at an appropriate position in a sub-picture frame image (sub-picture plane SBPCPL). At this time, the generated text image (image picture) is recorded on the pixel buffer PIXBUF, and undergoes layout processing on the sub-picture plane SBPCPL by the layout manager LOMNG. The image picture (frame image) as the processing result is output onto the sub-picture plane SBPCPL.

Figure 34:
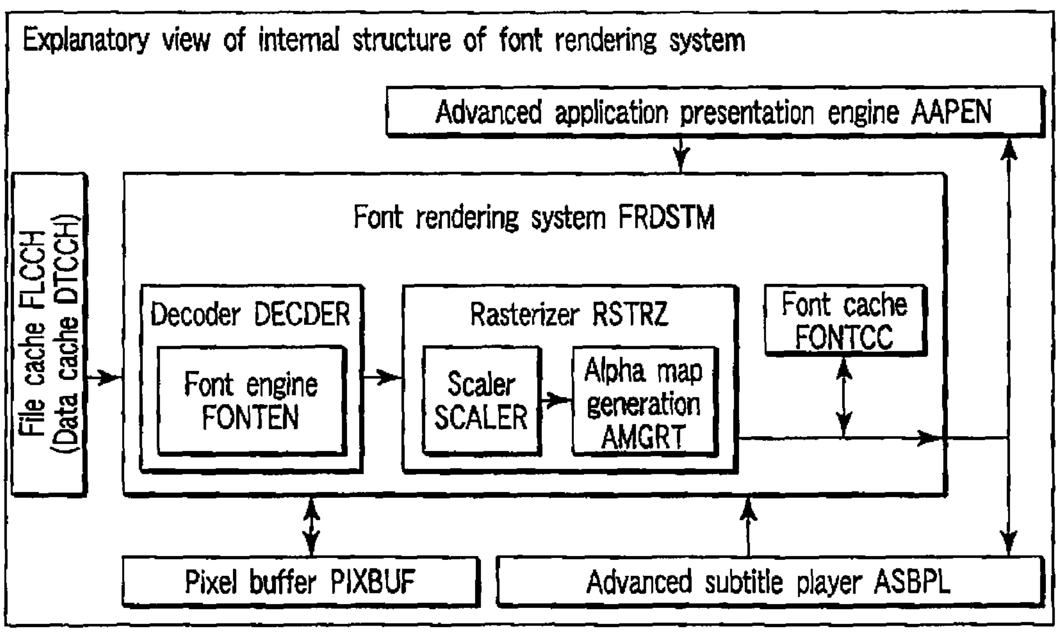
FIG. 34 is an exemplary view showing the structure in a font rendering system.

As shown in FIG. 30, the font rendering system FRDSTM is included in the presentation engine PRSEN, and generates a text image (image picture) in response to requests from the advanced application presentation engine AAPEN and the advanced subtitle player ASBPL. FIG. 34 shows the structure in the font rendering system FRDSTM.

Font Rendering System:

The Font Rendering System is responsible for generating text image in response to the request from the Advanced Application Presentation Engine or the Advanced Subtitle Player. "The Font Rendering System uses Pixel Buffer, in order to decode text images. Font Type that Font Rendering System supports is Open Type font.

More intelligible explanations will be provided below.

The font rendering system FRDSTM includes a decoder DECDER which incorporates a font engine FONTEN, a rasterizer RSTRZ, and a font cache FONTCC. The advanced subtitle ADSBT information or advanced application ADAPL information read out from the font cache FLCCH is used to generate a text image (image picture) in the decoder DECDER using the font engine FONTEN. The presentation size of the generated text image (image picture) in the sub-picture plane SBPCPL (see FIG. 39) is set by a scaler SCALER in the rasterizer RSTRZ. After that, the transparency of the generated text image (image picture) is designated by an alpha map generation AMGRT. The generated text image (image picture) is temporarily stored in the font cache FONTCC as needed, and is read out from the font cache FONTCC at a required timing, thus presenting the picture. The transparency of the generated text image (image picture) is specified by the alpha map generation AMGRT. As a result, a video picture on the sub video plane SBVDPL or main video plane MNVDPL (see FIG. 39) located below the overlapping portion of the text image can be seen through.

In this embodiment, the alpha map generation AMGRT not only can evenly set the transparency of the overall text image (image picture) generated by the decoder DECDER but also can partially change the transparency in the text image (image picture). In this embodiment, in the process of conversion from a text character into a text image (image picture) by the decoder DECDER, the pixel buffer PIXBUF can be used. In this embodiment, a font type supported by the font rendering system FRDSTM is basically an open type (conventionally, generally used font type). However, this embodiment is not limited to such specific type, and a text image can be generated in the form of a font type corresponding to a font file FONT using the font file FONT located under the advanced element directory ADVEL shown in FIG. 11.

As shown in FIG. 14, the advanced content playback unit ADVPL includes the presentation engine PRSEN, which includes the secondary video player SCDVP (see FIG. 30). The internal structure of the secondary video player SCDVP in this embodiment will be described below using FIG. 35.

Secondary Video Player:

Secondary Video Player is responsible to play Substitute Audio Video, Substitute Audio and Secondary Audio Video which are carried by Secondary Video Set. These Presentation Objects may be stored on Disc, Network Server, Persistent Storage and File Cache. In order to play Secondary Video Set from disc while Primary Video Set is playing back from disc, it needs to be stored Secondary Video Set on File Cache in advance to be played by Secondary Video Player. The contents from Network Server should be stored in Streaming Buffer before feeding it to Demux module in Secondary Video Player to avoid data lack because of bit rate fluctuation of network transporting path. For relatively short length contents, may be stored on File Cache before being read by Secondary Video Player. Secondary Video Player consists of Secondary Video Playback Engine and Demux. Secondary Video Player connects proper decoders in Decoder Engine according to presentation stream types in Secondary Video Set (see FIG. 35).

Secondary Video Playback Engine:

Secondary Video Playback Engine is responsible to control all functional modules. In Secondary Video Player in response to the request from Play list Manager in Navigation Manager. Secondary Video Playback Engine reads and analyses TMAP file to find proper reading position of S-EVOB.

Demux:

Demux reads and distributes S-EVOB stream to proper decoder modules in Decoder Engine, which are connected to Secondary Video Player. Demux has also responsibility to output each PCK in S-EVOB in accurate SCR timing. When S-EVOB consists of single stream of video or audio, Demux just supplies it to the decoder in accurate SCR timing.

More intelligible explanations will be provided below.

Figure 35:
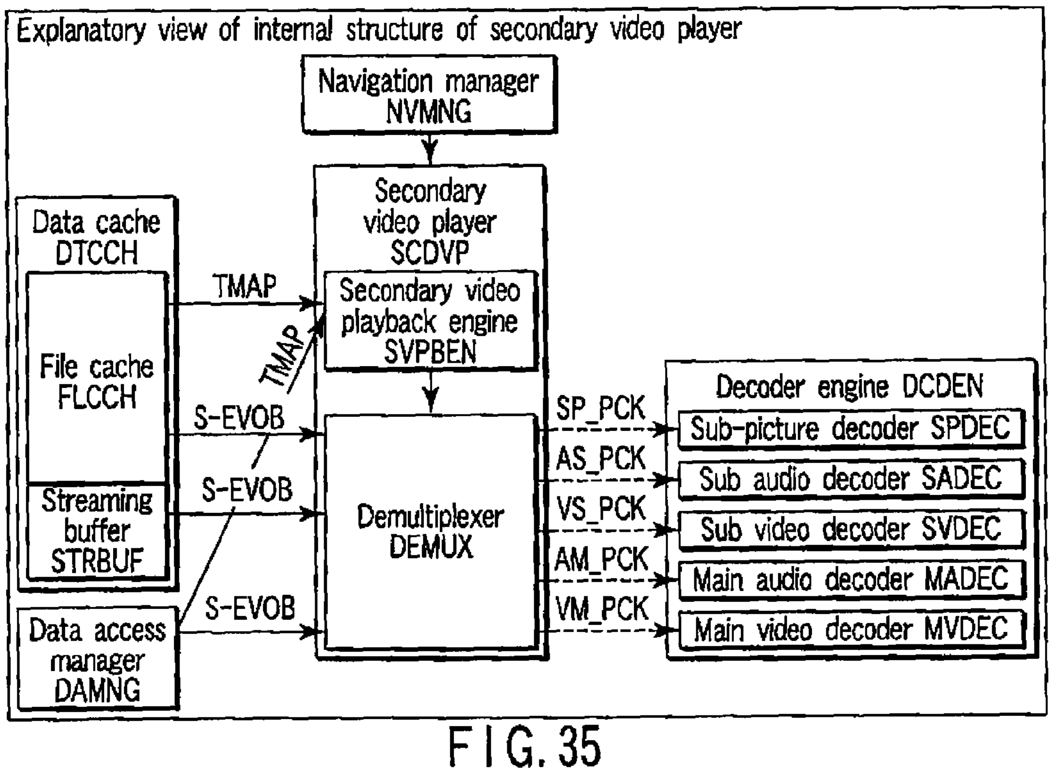
FIG. 35 is an exemplary view showing the structure in a secondary video player.

As shown in FIG. 10, the secondary video set SCDVS includes a substitute audio video SBTAV, substitute audio SBTAD, and secondary audio video SCDAV, and the secondary video player SCDVP performs playback processing of them. Playback presentation objects of the secondary video set SCDVS can be stored in any of the information storage medium DISC, network server NTSRV, and persistent storage PRSTR. As in the presentation frame example shown in FIG. 16, when the primary video set PRMVS and secondary video set SCDVS are simultaneously presented on a single frame, playback presentation objects of the secondary video set SCDVS must be stored in advance in the file cache FLCCH, and must be played back from the file cache FLCCH. For example, when the primary video set PRMVS and secondary video set SCDVS are stored at different locations in the single information storage medium DISC, if they are to be simultaneously played back, an optical head (not shown) included in the information recording and playback unit 2 in the information recording and playback apparatus 1 shown in FIG. 1 is required to repeat access control between the recording locations of the primary video set PRMVS and secondary video set SCDVS, and they become hard to be continuously played back due to the influence of the access time of the optical head. To avoid this, in this embodiment, the secondary video set SCDVS is stored in the file cache FLCCH to allow the optical head in the information recording and playback unit 2 to play back only the primary video set PRMVS. As a result, the number of times of access of the optical head is greatly reduced, and the primary video set PRMVS and secondary video set SCDVS can be continuously presented on a single frame. When the secondary video player SCDVP executes playback processing of the secondary video set SCDVS recorded in the network server NTSRV, the secondary video set SCDVS must be stored in the streaming buffer STRBUF in the data cache DTCCH in advance before data is transferred to the demultiplexer DEMUX in the secondary video player SCDVP (see FIG. 25). In this way, depletion of data to be transferred can be prevented even when the transfer rate of the network route has varied. Basically, the secondary video set SCDVS stored in the network server NTSRV is stored in advance in the streaming buffer STRBUF in the data cache DTCCH. However, this embodiment is not limited to this. When the data size of the secondary video set SCDVS is small, the secondary video set SCDVS can be stored in the file cache FLCCH in the data cache DTCCH. In this case, the secondary video set SCDVS is transferred from the file cache FLCCH in the data cache DTCCH to the demultiplexer DEMUX. As shown in FIG. 35, the secondary video player SCDVP includes a secondary video playback engine SVPBEN and the demultiplexer DEMUX. As shown in FIG. 10, a main audio MANAD and main video MANVD are multiplexed in the secondary video set SCDVS for respective packs, and data are recorded (a sub video SUBVD and sub audio SUBAD are also multiplexed and recorded for respective packs). The demultiplexer DEMUX demultiplexes these data for respective packs, and transfers the packs to the decoder engine DCDEN. That is, sub-picture packs SP_PCK extracted by the demultiplexer DEMUX are transferred to the sub-picture decoder SPDEC, and sub audio packs AS_PCK are transferred to the sub audio decoder SADEC. Sub video packs VS_PCK are transferred to the sub video decoder SVDEC, main audio packs AM_PCK are transferred to the main audio decoder MADEC, and main video packs VM_PCK are transferred to the main video decoder MVDEC.

The secondary video playback engine SVPBEN shown in FIG. 35 executes control processing of all functional modules in the secondary video player SCDVP. In the control of the secondary video playback engine SVPBEN, processing is executed in response to a request from the playlist manager PLMNG in the navigation manager NVMNG shown in FIG. 28. When the secondary video set SCDVS is played back and presented, the playlist PLLST refers to the time map file STMAP of the secondary video set SCDVS, as shown in FIG. 12, as has been described previously. The secondary video playback engine SVPBEN plays back the time map file STMAP of the secondary video set SCDVS, and interprets its contents, thus calculating an optimal playback start position of secondary enhanced video object data S-EVOB and issuing an access instruction to the optical head in the information recording and playback unit 2 (see FIG. 1).

The demultiplexer DEMUX in the secondary video player SCDVP plays back a secondary enhanced video object data stream S-EVOB, demultiplexes it into packs, and transfers data to various decoders in the decoder engine DCDEN for respective packs. Upon transferring packs to the decoder engine DCDEN, the demultiplexer DEMUX transfers them to various decoders at the timings of DTS (decoding time stamp) data described in respective packs in synchronism with system clock timings (SCR timings) of a standard clock included in the decoder engine DCDEN.

Figure 36:
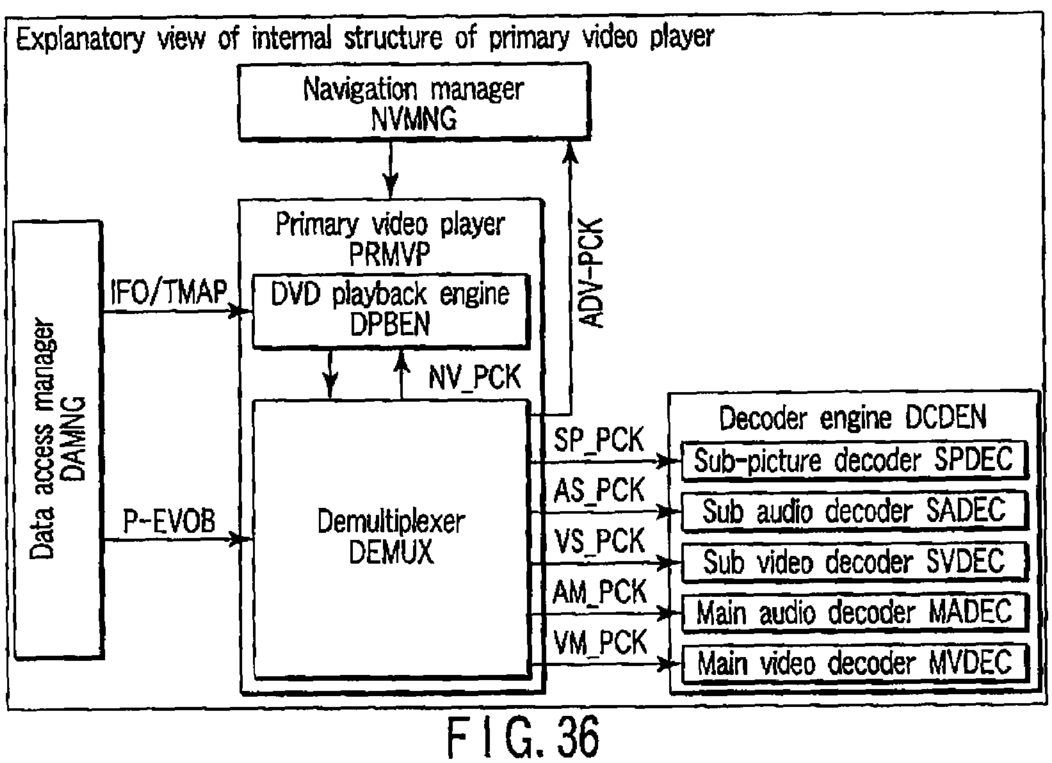
FIG. 36 is an exemplary view showing the structure in a primary video player.

The advanced content playback unit ADVPL shown in FIG. 1 includes the presentation engine PRSEN, as shown in FIG. 14. As shown in FIG. 30, the presentation engine PRSEN includes the primary video player PRMVP. FIG. 36 shows the internal structure of the primary video player PRMVP.

Primary Video Player:

Primary Video Player is responsible to play Primary Video Set. Primary Video Set shall be stored on Disc.

Primary Video Player consists of DVD Playback Engine and Demux. Primary Video Player connects proper decoder modules in Decoder Engine according to presentation stream types in Primary Video Set (see FIG. 36).

DVD Playback Engine:

DVD Playback Engine is responsible to control all functional modules in Primary Video Player in response to the request from Play list Manager in Navigation Manager. DVD Playback Engine reads and analyses IFO and TMAP(s) to find proper reading position of P-EVOB and controls special playback features of Primary Video Set, such as multi angle, audio/Subpicture selection and sub video/audio playback.

Demux:

Demux reads and distributes P-EVOB stream to proper decoder modules in Decoder Engine, which are connected to Primary Video Player. Demux also has a responsibility to output each PCK in P-EVQB in accurate SCR timing to each decoder. For multi angle stream, it reads proper interleaved block of P-EVOB on Disc or Persistent Storage in accordance with location information in the TMAP or navigation pack (NV PCK). Demux is responsible to provide the selected audio pack (AM_PCK or AS PCK) to the audio decoder (main audio decoder or sub audio decoder). And also it is responsible to provide the selected Subpicture pack (SP PCK) to Subpicture decoder.

More intelligible explanations will be provided below.

In this embodiment, the primary video player PRMVP supports playback of the primary video set PRMVS. The primary video set PRMVS is stored in only the information storage medium DISC. As shown in FIG. 36, the primary video player PRMVP includes a DVD playback engine DPBKEN and demultiplexer DEMUX. As shown in FIG. 10, various data types of the primary video set PRMVS include those from a main video MANVD to sub-picture SUBPT. The demultiplexer DEMUX is connected to corresponding decoders in the decoder engine DCDEN in accordance with these various data types. That is, sub-picture packs SP_PCK included in primary enhanced video object data P-EVOB are transferred to the sub-picture decoder SPDEC, and sub audio packs AS_PCK are transferred to the sub audio decoder SADEC. Sub video packs VS_PCK are transferred to the sub video decoder SVDEC, main audio packs AM_PCK are transferred to the main audio decoder MADEC, and main video packs VM_PCK are transferred to the main video decoder MVDEC.

As shown in FIG. 28, the navigation manager NVMNG includes the playlist manager PLMNG which interprets the contents of the playlist file PLLST. The DVD playback engine DPBKEN shown in FIG. 36 supports control of every functional modules in the primary video player PRMVP in response to a request from the playlist manager PLMNG. The DVD playback engine DPBKEN interprets the contents of management information associated with playback (the playlist file PLLST and video title set information ADVTSI shown in FIG. 11), and controls access to the playback start position in the primary enhanced video object data P-EVOB using the time map file PTMAP located under the primary video set directory PRMAV. In addition, the DVD playback engine DPBKEN controls special playback functions of the primary video set PRMVS such as switching of multi-angle, audio, and sub-picture tracks (streams), two-window simultaneous playback using a sub video SUBVD and sub audio SUBAD, and the like.

The demultiplexer DEMUX transfers various stream (pack) data distributed and allocated in the primary enhanced video object data P-EVOB to corresponding decoders in the decoder engine DCDEN connected to the primary video player PRMVP to make them execute decode processing. Although not shown, each pack PCK in the primary enhanced video object data P-EVOB includes DTS (decoding time stamp) information to transfer each pack information to the corresponding decoder at the designated DTS time. For a multi-angle stream, the demultiplexer DEMUX supports processing for playing back appropriate data in interleaved blocks of the primary enhanced video object data P-EVOB recorded in the information storage medium DISC in correspondence with information in the time map file PTMAP or information of navigation packs NV_PCK of the primary video set.

Figure 37:
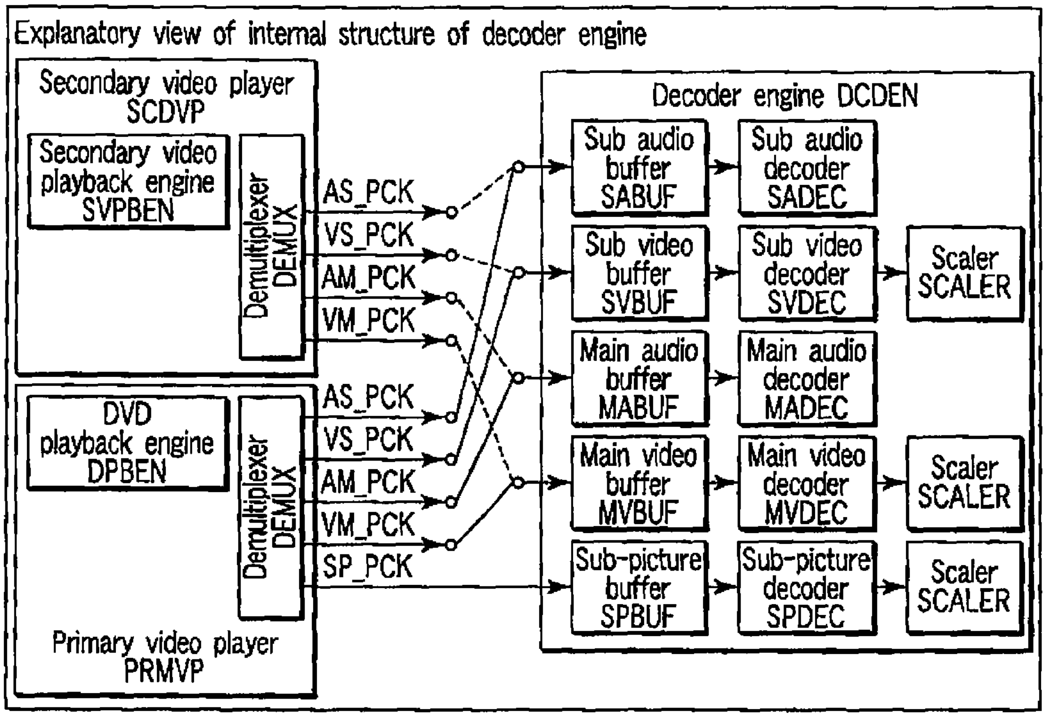
FIG. 37 is an exemplary view showing the structure in a decoder engine.

As shown in FIG. 14, the advanced content playback unit ADVPL in this embodiment includes the presentation engine PRSEN, which includes the decoder engine DCDEN, as shown in FIG. 30. The decoder engine DCDEN includes five different decoders, i.e., the sub audio decoder SADEC, sub video decoder SVDEC, main audio decoder MADEC, main video decoder MVDEC, and sub-picture decoder SPDEC, as shown in FIG. 37.

Decoder Engine:

Decoder Engine is an aggregation of five kinds of decoders, Subpicture Decoder, Sub Audio Decoder, Sub Video Decoder, Main Audio Decoder and Main Video Decoder. Each decoder module has own input buffer module. For Subpicture Decoder, Sub Video Decoder and Main Video Decoder, each of them has scaler function for output frame. Each decoder is connected and controlled by the playback engine of the connected Player, Secondary Video Playback Engine in Secondary Video Player or DVD Playback engine in Primary Video Player (See FIG. 37).

The decode function modules for each presentation stream type can be connected to Secondary Video Player or Primary Video Player depends on the current playback combination of presentation streams.

Subpicture Decoder:

The Subpicture Decoder is responsible to decode Subpicture stream in response to request from the DVD Playback Engine. The output plane is called Subpicture plane and it shall be exclusively shared between the output from the Advanced Subtitle Player and the Subpicture Decoder.

Sub Audio Decoder:

The Sub Audio Decoder supports decoding the audio stream which is called as ‘sub audio’. Number of channels of sub audio is up to 2 ch and its sampling rate is up to 48 kHz. The output audio stream of Sub Audio Decoder is called as ‘sub audio stream’.

Sub Video Decoder:

The Sub Video Decoder supports video stream which is called as ‘sub video’. The Sub Video Decoder support SD resolution is mandatory, and support HD resolution is optional. The output video plane of Sub Video Decoder is. called as ‘sub video plane’.

Scaling Function in Sub Video Decoder:

Scaling function in Sub Video decoder consists of three kinds of functionality as follows:

1) Scaling of source picture resolution to expected display resolution

If the source picture resolution is different from expected display resolution, scaling for up-sampling the Sub Video shall be performed.

2) Scaling of non-square pixel to square pixel

Since pixel aspect ratio is non-square pixel if Sub Video is SD, the Sub Video shall be scaled horizontally to obtain square pixel image.

3) Scaling by API defined in Annex Z

This scaling corresponds to the layout of Sub Video. This scaling will not change the aspect ratio of Sub Video. The scaling ratio shall be specified by API when the Sub Video is composed to Aperture.

Main Audio Decoder:

The Main Audio Decoder can support up to 7.1 ch multi channel audio and up to 192 kHz sampling rate, which is called as ‘main audio’. The output audio stream of the Main Audio Decoder is called as ‘main audio stream’.

Main Video Decoder:

The Main Video Decoder can support HD resolution video stream which is called as ‘main video’. The output video plane of the Main Video Decoder is called as ‘main video plane’.

The Main Video Decoder decodes main video stream and locates it specified size of the Graphic Plane which is called as ‘Aperture’. Decoded main video is scaled by the scaler and located proper position on canvas in accordance with the position and scale information from the Navigation Manager. The information also includes outer frame color information. This is applied to the outside area from main video in canvas.

The default color value of outer frame is “16, 128, 128” (=black).

Scaling Function in Main Video Decoder:

Scaling function in Main Video decoder consists of three kinds of functionalities as follows:

1) Scaling of Source Picture Resolution to Expected Display Resolution

If the source picture resolution is different from expected display resolution, scaling for up-sampling the Main Video shall be performed.

2) Scaling of Non-Square Pixel to Square Pixel

Since pixel aspect ratio is non-square pixel if Main Video is SD, the Main Video shall be scaled horizontally to obtain square pixel image.

3) Scaling by API Defined in Annex Z

This scaling corresponds to the layout of Main Video. This scaling will not change the aspect ratio of Main Video. It is allowed not to specify the scaling ratio by API. In this case, the default behavior is to scale Main Video to fit to full screen. In case of 4:3 source materials, there are vertical side panels on both left and right side so that the scaled-up image is placed in the middle of the Aperture. More specifically, if the size of Aperture is 1920×1080, 240 pixels side panels are put on both left and right side. If the size of Aperture is 1280×720, 160 pixels side panels are put on both left and right side.

More intelligible explanations will be provided below.

A sub audio buffer SABUF, sub video buffer SVBUF, main audio buffer MABUF, main video buffer MVBUF, and sub-picture buffer SPBUF are respectively connected to these decoders. Also, scalers SCALER, each of which sets the presentation size and presentation location on the frame, are connected to the sub video decoder SVDEC, main video decoder MVDEC, and sub-picture decoder SPDEC. The respective decoders are connected to and controlled by the DVD playback engine DPBKEN in the primary video player PRMVP, and are also connected to and controlled by the secondary video playback engine SVPEN in the secondary video player SCDVP.

The primary video set PRMVS and secondary video set SCDVS have various data described in a data type column in FIG. 10.

Respective data included in the primary video set PRMVS are demultiplexed into five types of streams and these streams are output from the demultiplexer DEMUX in the primary video player PRMVP. The processing method of respective streams will be described below. Main video packs VM_PCK that record data of a main video MANVD undergo decode processing in the main video decoder MVDEC via the main video buffer MVBUF. Main audio packs AM_PCK that record data of a main audio MANAD undergo decode processing in the main audio decoder MADEC via the main audio buffer MABUF. Sub video packs VS_PCK that record data of a sub video SUBVD undergo decode processing in the sub video decoder SVDEC via the sub video buffer SVBUF. Sub audio packs AS_PCK that record data of a sub audio SUBAD undergo decode processing in the sub audio decoder SADEC via the sub audio buffer SABUF. Finally, sub-picture packs SP_PCK that record data of a sub-picture SUBPT undergo decode processing in the sub-picture decoder SPDEC via the sub-picture buffer SVBUF.

Likewise, respective data included in the secondary video set SCDVS are demultiplexed into four types of streams and are output from the demultiplexer DEMUX in the secondary video player SCDVP. The processing method of respective streams will be described below. Main audio packs AM_PCK that record data of a main audio MANAD included in a substitute audio SBTAD or substitute audio video SBTAV undergo decode processing in the main audio decoder MADEC via the main audio buffer MABUF. Main video packs VM_PCK that record data of a main video MANVD in the substitute audio video SBTAV undergo decode processing in the main video decoder MVDEC via the main video buffer MVBUF. Sub video packs VS_PCK that record data of a sub video SUBVD in a secondary audio video SCDAV undergo decode processing in the sub video decoder SVDEC via the sub video buffer SVBUF. Finally, sub audio packs AS_PCK that record data of a sub audio SUBAD in the secondary audio video SCDAV undergo decode processing in the sub audio decoder SADEC via the sub audio buffer SABUF.

In response to a request from the DVD playback engine DPBKEN in the primary video player PRMVP or the secondary video playback engine SVPBEN in the secondary video player SCDVP shown in FIG. 37, the sub-picture decoder SPDEC executes decode processing of a sub-picture stream. Respective frame layers on the presentation frame will be explained using FIG. 39. The output from the sub-picture decoder SPDEC is presented on the sub-picture plane SBPCPL. In this embodiment, in the sub-picture plane SBPCPL, the decode results of a sub-picture SUBPT and advanced subtitle ADSBT are commonly (alternatively) presented. The advanced subtitle ADSBT is decoded and output by the advanced subtitle player ASBPL shown in FIG. 30.

The sub audio decoder SADEC processes decoding of an audio stream called a sub audio SUBAD. In this embodiment, the sub video decoder SVDEC can support up to a maximum of two channels, and sets a sample rate of 48 kHz or less. By holding down the performance of the sub audio decoder SADEC in this way, the manufacturing cost in the decoder engine DCDEN can be reduced. An audio stream output from the sub audio decoder SADEC is called a sub audio stream SUBAD.

The sub video decoder SVDEC supports decode processing of a video stream called a sub video SUBVD. The sub video decoder SVDEC indispensably supports SD (standard definition) resolutions, and can also support HD (high definition) resolutions. Data output from the sub video decoder SVDEC is presented on the sub video plane SBVDPL (see FIG. 39).

The scaler SCALER connected to the output side of the sub video decoder SVDEC has the following three functions.

1) The scaler SCALER changes the resolution of a sub video SUBVD in correspondence with the display resolution required to output. When the ideal resolution of the sub video SUBVD upon outputting to the wide-screen TV monitor 15 shown in FIG. 1 is determined, the scaler SCALER changes the resolution of the sub video SUBVD in correspondence with the resolutions of every wide-screen TV monitors 15.

2) Scaling Function Corresponding to Aspect Ratio Upon Presentation

If the aspect ratio of the frame to be presented on the wide-screen TV monitor 15 is different from that to be originally presented by the sub video SUBVD, the scaler SCALER performs aspect ratio conversion to execute processing for making optimal presentation on the wide-screen TV monitor 15.

3) Scaling Processing Based on API Command

As in the example shown in FIG. 39, when the independent window 32 for a commercial is presented on a part of a single frame as the sub video SUBVD, the size of the independent window 32 for a commercial (sub video SUBVD) can be set by an API command compliant to the advanced application ADAPL. In this manner, according to this embodiment, the optimal presentation frame size is set in the scaler SCALER based on the API command. In this case, the aspect ratio of the sub video SUBVD which is originally set remains unchanged, and only the entire size is changed.

In this embodiment, the main audio decoder MADEC supports decoding of a multi-channel audio up to 7.1 channels, and an audio up to a sampling rate of 192 kHz. Data decoded by the main audio decoder MADEC is called a main audio MANAD.

The main video decoder MVDEC can support HD (high definition) resolutions, and decoded video information is called a main video MANVD. In this manner, since the main video decoder MVDEC can implement decoding of high resolutions, high picture quality that meets the users demand can be attained. Since the sub video decoder SVDEC is provided in addition to this decoder, two windows can be presented at the same time. Also, by limiting the decode performance of the sub video decoder SVDEC, the price of the decoder engine DCDEN can be suppressed. The frame decoded by the main video decoder MVDEC is presented on the main video plane MNVDPL (see FIG. 39). The main video decoder MVDEC decodes a main video MANVD. In this embodiment, the presentation size of the decoded video information must match the size called an aperture APTR (see FIG. 40) on the graphic plane GRPHPL (see FIG. 39). In this embodiment, the decoded main video MANVD is scaled to an appropriate size on the aperture APTR and is laid out at an appropriate position on the aperture APTR by the scaler SCALER in correspondence with position information POSITI and scale information SCALEI (see FIG. 41) supplied from the navigation manager NVMNG. The scale information transferred from the navigation manager NVMNG includes information for the color of a frame part that presents the border of the frame of the main video plane MNVDPL. In this embodiment, the color of the border is set as "0, 0, 0" (black) in a default state.

The scaler SCALER connected to the output side of the main video decoder MVDEC has the following three functions.

1) The scaler SCALER changes the resolution of a main video MANVD in correspondence with the display resolution required to output. When the ideal resolution of the main video MANVD upon outputting to the wide-screen TV monitor 15 shown in FIG. 1 is determined, the scaler SCALER changes the resolution of the main video MANVD in correspondence with the resolutions of every wide-screen TV monitors 15.

2) Scaling Function Corresponding to Aspect Ratio Upon Presentation

If the aspect ratio of the frame to be presented on the wide-screen TV monitor 15 is different from that to be originally presented by the main video MANVD, the scaler SCALER performs aspect ratio conversion processing to make optimal presentation on the wide-screen TV monitor 15.

3) Scaling Processing Based on API Command

When the main video MANVD (main title 31) is to be presented, as shown in FIG. 39, the size of the main video MANVD (main title 31) can be designated by an API command compliant to the advanced application ADAPL. In this manner, when an optimal frame size is set in the scaler SCALER, the aspect ratio of the main video MANVD which is originally set remains unchanged, and only the entire size is changed (conversion to a specific aspect ratio is inhibited depending on the API command). In this case, the main video MANVD is presented on a full screen in a default state. For example, in case of the aspect ratio=4:3, when a frame having that aspect ratio is presented on the wide screen, since its width becomes narrow, a presentation frame having a narrow width is presented at the center on the wide screen. Especially, when the size of the aperture APTR is set to "1920×1080" or "1280×720" (wide screen compatible), a full-size frame is displayed on the wide screen.

Figure 38:
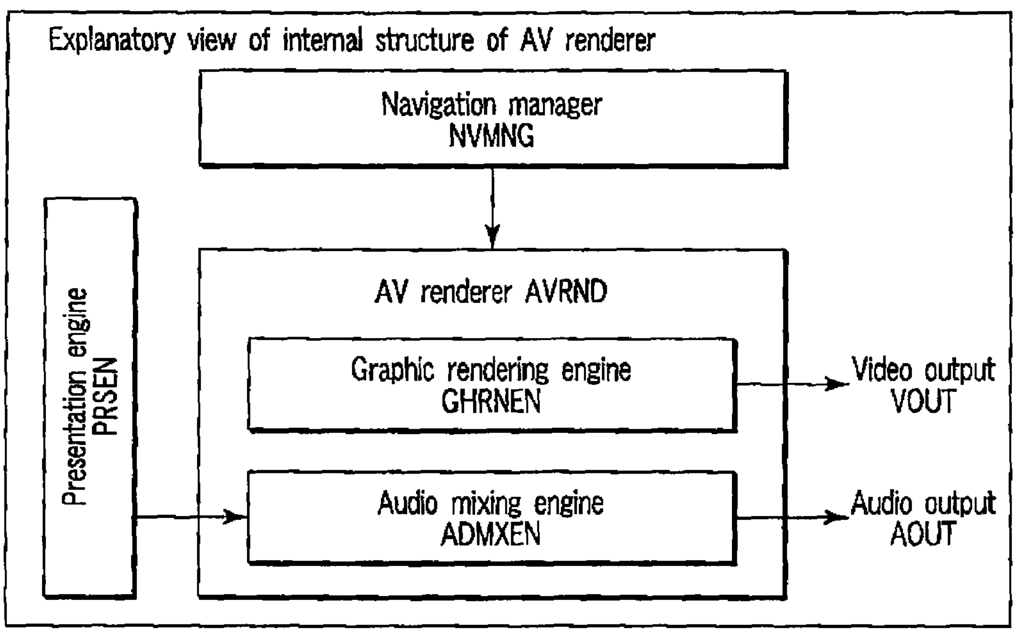
FIG. 38 is an exemplary view showing the structure in an AV renderer.

As shown in FIG. 1, the information recording and playback apparatus 1 includes the advanced content playback unit ADVPL, which includes the AV renderer AVRND, as shown in FIG. 14. The AV renderer AVRND includes a graphic rendering engine GHRNEN and audio mixing engine ADMXEN, as shown in FIG. 38.

AV Renderer:

The AV Renderer has two responsibilities. One is to composite graphic planes come from the Presentation Engine and the Navigation Manager and output composite video signal. The other is to mix PCM streams from the Presentation Engine and output mixed audio signal. The AV Renderer consists of the Graphic Rendering Engine and the Sound Mixing Engine (see FIG. 38).

Graphic Rendering Engine:

The Graphic Rendering Engine can receive four graphic plane inputs from the Presentation Engine. The Graphics Rendering Engine has the Cursor Plane and updates it in accordance with cursor-image and position information from the Navigation Manager. The Graphic Rendering Engine composites these five planes in accordance with control information from the Navigation Manager, then output composite video signal.

Audio Mixing Engine:

The Audio Mixing Engine can receive three LPCM streams from the Presentation Engine. The Audio Mixing Engine mixes these three LPCM streams in accordance with mixing level information from the Navigation Manager, and then outputs mixed audio signal.

More intelligible explanations will be provided below.

The graphic rendering engine GHRNEN performs composition processing of pictures on the graphic plane GRPHPL (see FIG. 39) based on information coming from the navigation manager NVMNG and presentation engine PRSEN shown in FIG. 14. The audio mixing engine ADMXEN mixes audio information (PCM streams) coming from the presentation engine PRSEN and outputs mixed audio information.

A frame to be presented to the user is configured by five planes, i.e., a cursor plane CRSRPL, graphic plane GRPHPL, sub-picture plane SBPCPL, sub video plane SBVDPL, and main video plane MNVDPL, as will be described in FIG. 39 in detail. These five planes undergo composition processing on the graphic rendering engine GHRNEN. The presentation engine PRSEN shown in FIG. 38 generates pictures on the respective planes, i.e., the graphic plane GRPHPL, sub-picture plane SBPCPL, sub video plane SBVDPL, and main video plane MNVDPL, and transfers them to the graphic rendering engine GHRNEN. The graphic rendering engine GHRNEN newly generates a cursor plane CRSRPL. The graphic rendering engine GHRNEN generates a cursor image CRSIMG, and lays it out on the cursor plane CRSRPL based on position information of the cursor image CRSIMG of the cursor sent from the navigation manager NVMNG. As a result, the graphic rendering engine GHRNEN executes composition processing of the five planes based on control information from the navigation manager NVMNG, and then outputs a composite picture as a video signal.

The audio mixing engine ADMXEN simultaneously can receive linear PCM streams up to a maximum of three types sent from the presentation engine PRSEN and can mix these audio streams. At this time, the audio mixing engine ADMXEN sets a tone volume for each linear PCM stream based on mixing level information sent from the navigation manager NVMNG, and then outputs the mixed stream.

As shown in FIG. 39, on the presentation screen, the frame is configured by five frame layers, i.e., the cursor plane CRSRPL, graphic plane GRPHPL, sub-picture plane SBPCPL, sub video plane SBVDPL, and main video plane MNVDPL. In this embodiment, one frame layer as the cursor plane CRSRPL is generated in the graphic rendering engine GHRNEN (see FIG. 41) in the AV renderer AVRND. Four frame layers, i.e., the graphic plane GRPHPL, sub-picture plane SBPCPL, sub video plane SBVDPL, and main video plane MNVDPL in FIG. 39, are generated in the presentation engine PRSEN (see FIG. 41). The frame rates of the four frame layers, i.e., the graphic plane GRPHPL, sub-picture plane SBPCPL, sub video plane SBVDPL, and main video plane MNVDPL, which are input to the graphic rendering engine GHRNEN and are generated in the presentation engine PRSEN, can be respectively independently set. More specifically, video information output from the advanced application presentation engine AAPEN in the presentation engine PRSEN, that output from the advanced subtitle player ASBPL, that output from the secondary video player SCDVP, and that output from the primary video player PRMVP can have unique frame rates. The main video plane MNVDPL shown in FIG. 39 is obtained as an output which is output from the primary video player PRMVP shown in FIG. 41 or 30 and goes through the decoder engine DCDEN and the scaler SCALER. The frame layer of the sub video plane SBVDPL is generated as an output of the scaler SCALER after it is output from the secondary video player SCDVP and goes through the decoder engine DCDEN. The sub video plane SBVDPL is generated by selecting one of the output from the advanced subtitle player ASBPL shown in FIG. 41 or 30, and the frame which is output from the sub video decoder SVDEC and goes through the scaler SCALER. The graphic plane GRPHPL is obtained as the output from the advanced application presentation engine AAPEN.

The region definition in the graphic plane GRPHPL will be described below using the example of FIG. 39. A composite frame shown on the lower side of FIG. 39 represents a full-size frame to be viewed by the user. The frame dimension size (resolution) to be optimally presented varies depending on a wide screen, standard screen, or the like with respect to the screen of the television. In this embodiment, an optimal frame size to be presented to the user is defined by the graphic plane GRPHPL. That is, the optimal frame size to be presented to the user on the graphic plane GRPHPL is set based on the number of scan lines and the number of dots. In this case, the optimal frame size (the number of pixels) to be presented to the user is defined as the size of the aperture APTR (graphic region) on the graphic plane GRPHPL. Therefore, when the frame to be presented to the user is a high-resolution frame, the size of the aperture APTR (graphic region) on the graphic plane GRPHPL becomes large, and when the frame size (resolution) to be presented to the user is a conventional standard size, the size of the aperture APTR (graphic region) becomes smaller compared to the resolution (the total number of pixels). Unlike the example shown in FIG. 39, when the main video MANVD of the primary audio video PRMAV is presented on the full screen, i.e., over the full user frame, the frame size on the main video plane MNVDPL completely matches the size of the aperture APTR (graphic region) on the graphic plane GRPHPL. As shown in FIG. 39, when the advanced application ADAPL from the help icon 33 to the FF button 38 is presented together on the lower region of the composite frame, presentation control can be facilitated by defining a region (application region APPRGN) that presents the advanced application ADAPL together within the aperture APTR (graphic region). For this reason, in this embodiment, the application region APPRGN can be defined as a region for presenting a plurality of elements included in the advanced application ADAPL together. In this embodiment, a plurality of application regions APPRGN can be set within the aperture APTR (graphic region) on the graphic plane GRPHPL. Details of the following contents will be described later using FIG. 40.

FIG. 39 has explained that the aperture APTR (graphic region) can be set on the graphic plane GRPHPL in correspondence with the frame size of the composite frame. Also, FIG. 39 has explained that one or more application regions APPRGN can be set as those for presenting one or more elements of the advanced application ADAPL within the aperture APTR (graphic region). A detailed explanation will be given using FIG. 40.

On the graphic plane GRPHPL, a coordinate system called a canvas (canvas coordinate system CNVCRD) can be defined. In this embodiment, a rectangular region that allows frame composition on the graphic plane GRPHPL can be defined within the canvas coordinate system CNVCRD. This rectangular region is called the aperture APTR (graphic region). In this embodiment, the origin position (0, 0) of the graphic region on the canvas coordinate system CNVCRD matches the position of an end point (origin) of the aperture APTR (graphic region). Therefore, the position of the end point (origin) of the aperture APTR (graphic region) is (0, 0) on the canvas coordinate system CNVCRD. Units of the X-axis and Y-axis of the aperture APTR (graphic region) are respectively identified by the number of pixels. For example, when the number of pixels of the frame to be presented to the user is 1920×1080, the corresponding position (1920, 1080) of the other end of the aperture APTR (graphic region) can be defined. The size of the aperture APTR (graphic region) can be defined in the playlist PLLST. In this embodiment, the advanced application ADAPL can set a unique coordinate system. The unique coordinate system can be set in the canvas coordinate system CNVCRD as a rectangular region. This rectangular region is called an application region APPRGN. Each advanced application ADAPL can have at least one application region APPRGN. The setting location of the application region APPRGN can be designated by X- and Y-coordinate values on the canvas coordinate system CNVCRD. That is, as shown in FIG. 40, the layout location of an application region APPRGN#1 on the aperture APTR (graphic region) is set by the canvas coordinate CNVCRD coordinate values within the canvas coordinate system CNVCRD of an end point (origin) of the application region APPRGN#1.

In this embodiment, a specific still picture IMAGE and the like can be laid out in the application region APPRGN as a plurality of elements (application elements or child elements) in the advanced application ADAPL. As a method of indicating the layout location of each element in the application region, the X- and Y-values of an independent coordinate system in the application region APPRGN can be defined. That is, as shown in FIG. 40, the application region APPRGN#1 has a unique intra-application region coordinate system, and the layout location of each element can be designated by intra-application region coordinate values. For example, as shown in FIG. 40, when the size of the application region APPRGN#1 is specified by the range from the origin (0, 0) to (y2, y2), coordinates (x1, y1) upon laying out an open rectangle portion as an element example can designate the position of that open rectangle in the application region APPRGN. In this way, the plurality of elements can be laid out using the unique coordinate system (intra-application region coordinate system), and a portion of the element may protrude from the application region APPRGN. In this case, only the element portion included in the application region APPRGN which is laid out within the aperture APTR (graphic region) is presented to the user.

Figure 41:
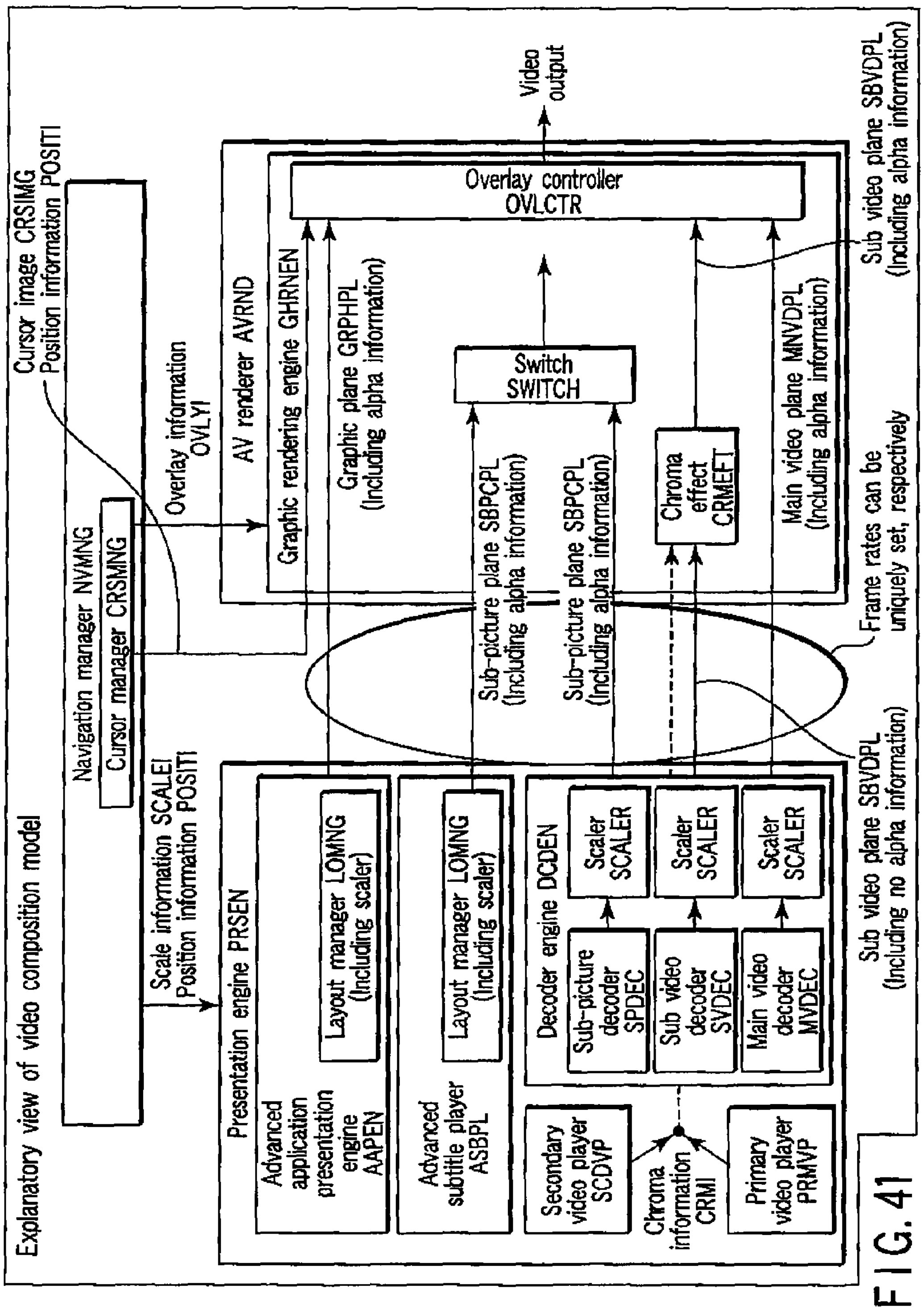
FIG. 41 is an exemplary view showing a video composition model.

FIG. 41 shows the relationship between the detailed structure in the graphic rendering engine GHRNEN in the AV renderer AVRND shown in FIG. 38, and various engines and players in the presentation engine PRSEN shown in FIG. 30.

Video Compositing Model:

Video Compositing Model in this specification is shown in FIG. 41. There are five graphic plane inputs in this model. They are Cursor Plane, Graphics Plane, Subpicture Plane, Sub Video Plane and Main Video Plane. Those planes have the coordinate system called 'Canvas'. The area of Canvas is from $31^{St}$ power of −2 to the $31^{st}$ power of 2 minus 1 in x directions, and from $31^{st}$ power of −2 to the 31 St power of 2 minus 1 in y directions. The origin point (0, 0) and direction of x-y axis are correspond with each other.

There is a rectangle area which is to be rendered to each plane. This rectangle area is called 'Aperture'.

The origin of Aperture is (0, 0) in Canvas coordinate system. The size of Aperture is defined in Play list.

Frame rates of all graphic inputs to Graphic Rendering Engine shall be identical to video output of a player.

Cursor Plane:

The Cursor Plane is the topmost plane of five graphic planes in the Graphic Rendering Engine in this Video Compositing Model. The Cursor Plane is managed by the Overlay Controller in the Graphic Rendering Engine. The Cursor Manager in the Navigation Manager is responsible to supply cursor image to the Overlay Controller. The Cursor Manager is also responsible to manage cursor position and update the position information to the Overlay Controller.

More intelligible explanations will be provided below.

In this embodiment, as shown in FIG. 38, the frame to be presented to the user is configured by five frame layers, and pictures of these frame layers are composited by an overlay controller OVLCNT. A large characteristic feature of this embodiment lies in that the frame rate (the number of frames to be presented per sec) of each frame layer input to the overlay controller OVLCNT can be independently set for each frame layer. With this feature, an optimal frame rate for each frame layer can be set without being limited by the frame rate, and an effective frame can be presented to the user.

As for the main video plane MNVDPL shown in FIG. 39, one of an output moving picture of the primary video player PRMVP and the substitute audio video STBAV of an output moving picture of the secondary video player SCDVP is selected, and is decoded by the main video decoder MVDEC in the decoder engine DCDEN after chroma information CRMI is considered. After that, the frame size and presentation frame position of the decoded output are set by the scaler SCALER, and the decoded output is input to the overlay controller OVLCTR.

In the sub video plane SBVDPL, one of the sub video SUBVD output from the primary video player PRMVP and that output from the secondary video player SCDVP is input to the sub video decoder in the decoder engine DCDEN in consideration of chroma information CRMI. The presentation size and presentation position on the frame of the output moving picture decoded by that decoder are set by the scaler SCALER, and the output moving picture then undergo chroma effect processing CRMEFT. Then, the processed output can be input to the overlay controller OVLCTR in a translucent form in correspondence with alpha information indicating the transparency that allows to display the main video plane MNVDPL as the lower layer.

As a video picture to be presented on the sub-picture plane SBPCPL, one of the advanced subtitle ADSBT and the sub-picture SUBPT of the primary audio video PRMAV is presented. That is, the advanced subtitle ADSBT is input to a switch (module) SWITCH after its presentation frame size and presentation position are set by the layout manager LOMNG in the advanced subtitle player ASBPL. The sub-picture SUBPT of the primary audio video PRMAV is input from the primary video player PRMVP to the sub-picture decoder SPDEC in the decoder engine DCDEN and is decoded by that decoder, and the presentation frame size and presentation position of the sub-picture SUBPT are then set by the scaler SCALER. After that, the sub-picture SUBPT is similarly input to the switch SWITCH. In this embodiment, one of the advanced subtitle ADSBT and the sub-picture SUBPT in the primary audio video PRMAV is selected by selection processing by the switch SWITCH, and is input to the overlay controller OVLCNT, as shown in FIG. 41.

An output for the graphic plane GRPHPL is directly input to the overlay controller OVLCNT after the presentation size and presentation position are set by the layout manager LOMNG in the advanced application presentation engine AAPEN.

For the cursor plane CRSRPL, the cursor manager CRSMNG in the navigation manager NVMNG outputs a cursor image CRSIMG and position information POSITI indicating the presentation position of the cursor, and the frame layer of the cursor is generated in the overlay controller OVLCTR. A detailed description of the respective frame layers will be given below.

The cursor plane CRSRPL indicates the frame layer which is located at the uppermost position of the five frame layers, and its frame is generated in the graphic rendering engine GHRNEN. The resolution of the cursor plane CRSRPL matches that of the aperture APTR (graphic region) on the graphic plane GRPHPL (see the explanation of FIG. 39). As described above, the cursor plane CRSRPL is generated and managed in the overlay controller OVLCTR in the graphic rendering engine GHRNEN. The cursor manager CRSMNG included in the navigation manager NVMNG generates the cursor image CRSIMG and transfers it to the overlay controller OVLCTR. The cursor manager CRSMNG manages and generates the position information POSITI that represents the cursor position on the screen, and transfers it to the overlay controller OVLCTR. Also, the cursor manager CRSMNG timely updates the position information POSITI of the cursor in response to the user input, and transfers the updated information to the overlay controller OVLCTR. The cursor image CRSIMG and X- and Y-coordinates (hotspotXY) indicating the position of the cursor in a default state (initial state) depend on the advanced content playback unit ADVPL to be used. In this embodiment, the cursor position (X, Y) in the default state (initial state) is set at (0, 0) (origin position). The cursor image CRSIMG and position information POSITI indicating its position are updated by API commands from the programming engine PRGEN (see FIG. 28) in the advanced application manager ADAMNG. In this embodiment, a maximum resolution of the cursor image CRSIMG is set to be 256×256 pixels. By setting this numerical value, a cursor image CRSIMG having certain expressive power can be expressed, and the cursor presentation processing speed can be increased by preventing an unnecessarily high resolution setting. The file format of the cursor image CRSIMG is set by PMG (8-bit color expression). In this embodiment, the cursor image CRSIMG can be switched by an API command between a state in which it is completely presented on the screen or a state in which it is 100% transparent and cannot be seen on the screen. According to the position information POSITI sent from the cursor manager CRSMNG, the cursor image CRSIMG is laid out on the cursor plane CRSRPL in the overlay controller OVLCTR. In addition, the overlay controller OVLCTR can set alpha mixing (i.e., setting of transparency based on alpha information) indicating a translucent state with respect to the frames of lower frame layers than the cursor plane CRSRPL.

The graphic plane GRPHPL in the video composition model of this embodiment corresponds to the second uppermost frame layer generated in the graphic rendering engine GHRNEN. Under the control of the advanced application manager ADAMNG in the navigation manager NVMNG shown in FIG. 28, the advanced application presentation engine AAPEN shown in FIG. 41 generates the frame of the graphic plane GRPHPL. The advanced application manager ADAMNG in the navigation manager NVMNG shown in FIG. 28 controls the graphic decoder GHCDEC and font rendering system FRDSTM in the advanced application presentation engine AAPEN shown in FIG. 31 to generate a part of the frame of the graphic plane GRPHPL. Finally, the layout manager LOMNG in the advanced application presentation engine AAPEN generates a composite frame of the graphic plane GRPHPL. The layout manager LOMNG sets the output video size and presentation location of the frame output from there. The frame rate (the number of frames changes per sec) output from the layout manager LOMNG can be uniquely set independently of the frame rate of video pictures of, e.g., the main video MANVD, sub video SUBVD, and the like. In this embodiment, an animation effect can be presented as continuation of graphic images such as animation or the like.

When the layout manager LOMNG shown in FIG. 31 sets the frame on the graphic plane GRPHPL, it cannot set the conditions of alpha information (alpha value) for individual building frames. In this embodiment, an alpha value cannot be set for respective graphic images (individual building frames) in the graphic plane GRPHPL, but an alpha value for the entire graphic plane GRPHPL can be set. Therefore, the transparency (alpha value) for lower frames is set to be constant everywhere on the graphic plane GRPHPL.

The sub-picture plane SBPCPL in the video composition model of this embodiment corresponds to the third uppermost frame layer generated by the graphic rendering engine GHRNEN. The sub-picture plane SBPCPL is generated by the advanced subtitle player ASBPL or the sub-picture decoder SPDEC in the decoder engine DCDEN (see FIG. 41). The primary video set PRMVS includes an image of the sub-picture SUBPT having a designated presentation frame size. When the presentation size of the image of the sub-picture SUBPT is designated, the sub-picture decoder SPDEC does not change the size of the image of the sub-picture SUBPT by directly by the scaler SCALER, and that image is directly transferred to the graphic rendering engine GHRNEN. As has been described using, e.g., FIG. 39, the presentation size of the composite frame is specified by the size of the aperture APTR (graphic region) on the graphic plane GRPHPL. When the main video MANVD on the main video plane MNVDPL is presented on the composite frame to have the full-screen size, the presentation size of the main video MANVD matches the size of the aperture APTR (graphic region). In this case, the presentation size of the sub-picture SUBPT is automatically determined based on the size of the aperture APTR (graphic region). In such case, the output frame of the sub-picture decoder SPDEC is directly transferred to the graphic rendering engine GHRNEN without being processed by the scaler SCALER. Conversely, as shown in FIG. 39, when the presentation size of the main title 31 on the main video plane MNVDPL is considerably smaller than the size of the aperture APTR (graphic region), the frame size of the sub-picture SUBPT need be changed accordingly. As described above, when an appropriate presentation size of the image of the sub-picture SUBPT is not set, the scaler SCALER connected at the output side of the sub-picture decoder SPDEC sets an optimal presentation size and presentation position of the aperture APTR (graphic region) and then transfers them to the graphic rendering engine GHRNEN. However, this embodiment is not limited to the above description. When an appropriate presentation size of the sub-picture is unknown (not designated), the sub-picture SUBPT can be presented to be aligned to the upper left corner of the aperture APTR (graphic region). In this embodiment, the frame rate of the frame to be transferred to the graphic rendering engine GHRNEN of the sub-picture plane SBPCPL can be uniquely set independently of that of the video output, as shown in FIG. 41. In this way, since the frame rates of the sub-picture plane SBPCPL and graphic plane GRPHPL that presents the sub-picture SUBPT and the advanced subtitle ADSBT or advanced application ADAPL are uniquely set independently of those of the main video plane MNVDPL and sub video plane SBVDPL, high processing efficiency of the presentation engine PRSEN can be achieved. This is because the main video plane MNVDPL and sub video plane SBVDPL change 50 to 60 fields per sec, but frames presented on the sub-picture plane SBPCPL and graphic plane GRPHPL have relatively low change rates. For example, an identical frame is presented for 10 seconds on the graphic plane GRPHPL in some cases. At this time, when a picture is transferred to the AV renderer AVRND at the frame rate in accordance with that (50 to 60 fields per sec) of the video plane, the loads on the advanced application presentation engine AAPEN and advanced subtitle player ASBPL become too heavy. Hence, by uniquely setting the frame transfer rates, the loads on these engine and player can be greatly reduced. The advanced subtitle player ASBPL can provide the frame of the sub-picture plane SBPCPL corresponding to the subset of the advanced application ADAPL. As described above, as the sub-picture plane SBPCPL to be transferred to the overlay controller OVLCTR which generates a composite frame by compositing the respective frame layers, one of the outputs from the advanced subtitle player ASBPL and sub-picture decoder SPDEC is used. In this embodiment, based on overlay information OVLYI transferred from the navigation manager NVMNG, the frame to be presented on the sub-picture plane SBPCPL supplied from the presentation engine PRSEN is selected by the switch module SWITCH in the graphic rendering engine GHRNEN. In this embodiment, the transparency of the frame to be presented on the sub-picture plane SBPCPL can also be set, so that the frames of the sub video plane SBVDPL and main video plane MNVDPL as its lower layers are seen through that plane. In this embodiment, an alpha value (alpha information) indicating transparency can be set for the sub-picture plane SBPCPL, and a constant alpha value (alpha information) is set everywhere in the sub-picture plane SBPCPL.

As for the video composition model of this embodiment, the sub video plane SBVDPL corresponds to the fourth uppermost frame layer to be generated by the graphic rendering engine GHRNEN (see FIG. 39). The sub video plane SBVDPL presents a video picture decoded in the sub video decoder SVDEC in the decoder engine DCDEN. Based on scale information SCALEI and position information POSITI sent from the navigation manager NVMNG, the scaler SCALER connected on the output side of the sub video decoder SVDEC sets the frame size and presentation position of the sub video SUBVD on the sub video plane SBVDPL, and outputs a final presentation video size (see FIG. 41). In a default (initial value), a scaling ratio indicated by the scale information SCALEI is set to be 1 (to be presented on the full aperture APTR (graphic region) size without being reduced in size). Also, in a default (initial value), the position information POSITI is set to include an X-position="0" and Y-position="0" (the origin position of the aperture APTR (graphic region)), and the alpha value is set to be 100% transparent. This embodiment is not limited to this, and the alpha value may be set to 100% presentation (transparency=0%). The values of the alpha value, scale information SCALEI, and position information POSITI can be changed by API commands. If a new title is to be presented, these values are set to be default values (initial values). In this embodiment, the output frame rate of the sub video plane SBVDPL can be uniquely set irrespective of that of a video output of the advanced content playback unit ADVPL (the frame rate of the main video plane MNVDPL). In this way, for example, by decreasing the frame rate of the sub video plane SBVDPL, continuity upon loading can be guaranteed when a stream is transferred from the network server NTSRV. When chroma information CRMI is set in the sub video stream SUBVD, the edge of a video object in the sub video SUBVD can be extracted by the chroma effect processing CRMEFT in the graphic rendering engine GHRNEN. When a video picture includes that of a person who appears on, e.g., a blue background, chroma key processing allows to set the blue part to be transparent and a person or the like in colors other than blue to be opaque, and to superimpose another frame on the blue part. For example, in case of the example using the explanatory view of the respective frame layers in FIG. 39, a case will be examined below wherein, for example, the frame of the main video plane MNVDPL is presented to have the full frame size of the aperture APTR (graphic region), and the frame on the sub video plane SBVDPL is presented to be superimposed on the former frame. At this time, when the frame on the sub video plane SBVDPL includes a video picture in which a specific person appears on the blue background, only the person on the sub video plane can be presented to be superimposed on a video picture on the main video plane MNVDPL as the lower layer by setting the chroma color to be blue, i.e., setting only the blue part to be transparent. By utilizing the chroma key (chroma effect CRMEFT) technique, processing for extracting the edge of a specific object on the sub video plane SBVDPL, and superimposing the extracted object on the main video plane MNVDPL as the lower layer by setting a transparent background color can be done. As described above, in this embodiment, the chroma information CRMI can be applied to the sub video player module corresponding to the secondary video player SCDVP or the primary video player PRMVP. Two alpha values (alpha information) are set for an output video picture from the chroma effect CRMEFT. That is, one alpha value is set in a 100% visible state, and a video picture of the sub video plane SBVDPL located on the back side cannot be seen through. In the above example, the object (person) or the like which exists in the blue background and has colors different from blue has this alpha value. The other alpha value is set to be 100% transparent, and the blue background has this value in the above example. This portion allows 100% transparency, and the frame of the main video plane MNVDPL as the lower layer can be seen through. This embodiment is not limited to such specific values, and an intermediate value between 100% and 0% can be set as an alpha value. An intermediate value of alpha values (alpha information) at respective positions of a video picture in the sub video plane SBVDPL which overlaps the main video plane MNVDPL as the lowermost layer is set by the overlay information OVLYI transferred from the navigation manager NVMNG, and is actually set based on the value of that information by the overlay controller OVLCTR in the graphic rendering engine GHRNEN.

In the video composition model of this embodiment, the main video plane MNVDPL corresponds to the lowermost frame layer to be composited in the graphic rendering engine GHRNEN. A video picture of the main video plane MNVDPL includes that decoded by the main video decoder MVDEC in the decoder engine DCDEN. Based on scale information SCALEI and position information POSITI transferred from the navigation manager NVMNG, the scaler SCALER connected to the output stage of the main video decoder MVDEC sets the presentation frame size and presentation position on the main video plane MNVDPL. The size and presentation location as defaults (initial values) of the main video frame on the main video plane MNVDPL match the size of the aperture APTR (graphic region). The size information of the aperture APTR (graphic region) in this embodiment is specified in configuration information CONFGI in the playlist file PLLST, as shown in FIG. 21, and is designated while the aspect ratio of the frame is held in an original state. For example, when the aspect ratio of a video picture to be presented on the main video plane MNVDPL is 4:3, and the designated aspect ratio of the aperture APTR (graphic region) is 16:9, the presentation position of a video picture of the main video plane MNVDPL in the aperture APTR (graphic region) is set so that the height of the presentation frame matches that of the aperture APTR (graphic region), and a frame having a narrow width with respect to the full frame is presented at the central position of the aperture APTR (graphic region) in the widthwise direction of the screen. When video expression colors designated by the configuration information CONFGI in the playlist file PLLST are different from those set on the main video plane MNVDPL, the presentation color condition as a default (initial value) in the main video plane MNVDPL is not converted into the configuration information CONFGI, and original default colors are used. The values of the presentation size, presentation position, presentation colors, aspect ratio, and the like in the main video plane MNVDPL can be changed by API commands. Upon jumping to another title in the playlist PLLST, the information values of the video size, video presentation position, presentation colors, aspect ratio, and the like are set to be defaults (initial values) before jump. After that, the values of the video size, presentation position, presentation colors, aspect ratio, and the like are changed to designated values set by the playlist PLLST at the beginning of playback of the next title.

Figure 42:
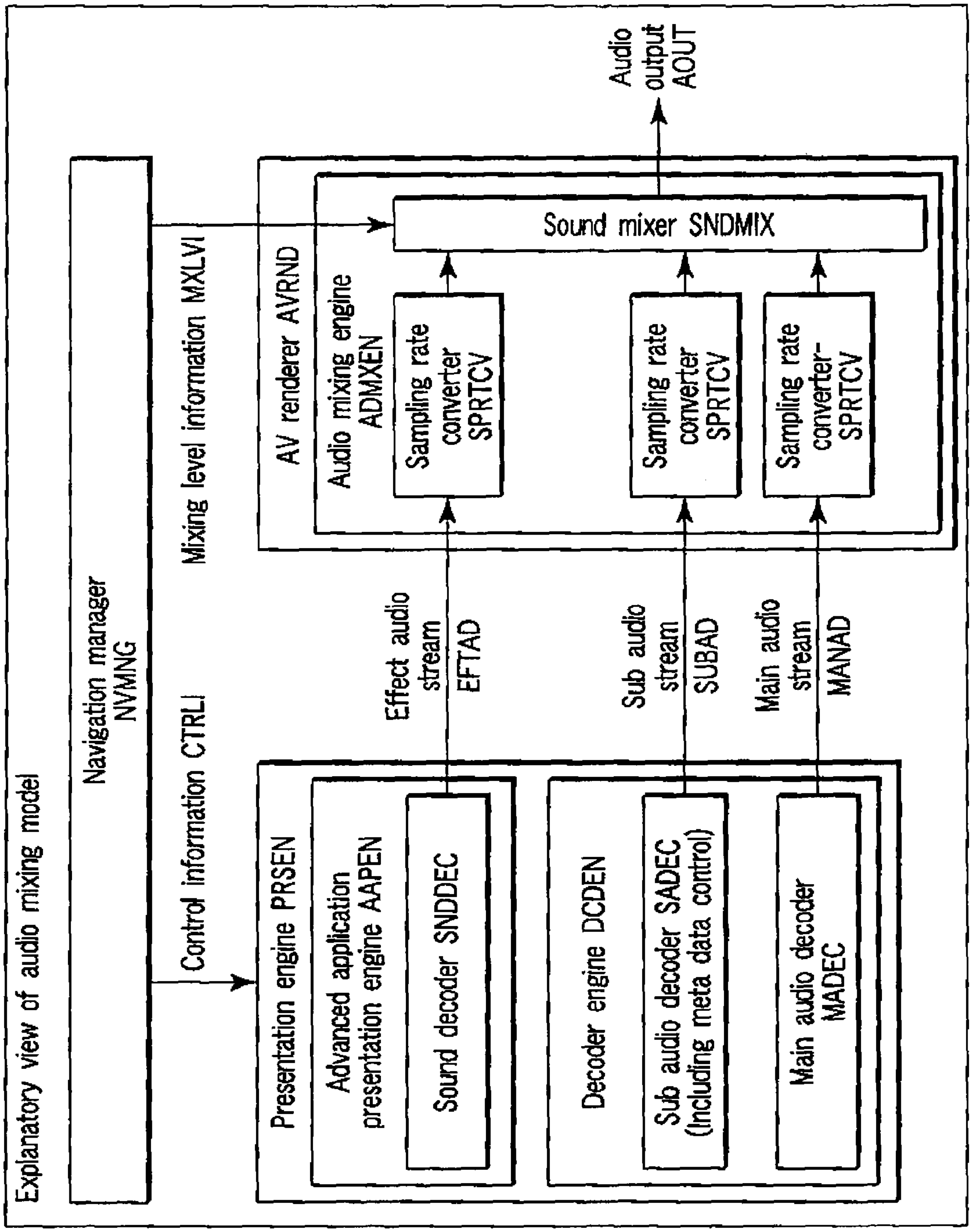
FIG. 42 is an exemplary view showing an audio mixing model.

The information recording and playback apparatus 1 of this embodiment includes the advanced content playback unit ADVPL (see FIG. 1). As shown in FIG. 14, the advanced content playback unit ADVPL includes the AV renderer AVRND, which includes the audio mixing engine ADMXEN, as shown in FIG. 38. FIG. 42 shows an audio mixing model representing the relationship between the audio mixing engine ADMXEN and the presentation engine PRSEN which is connected on the input side of the engine ADMXEN.

Audio Mixing Model:

Audio Mixing Model in this specification is shown in FIG. 42. There are three audio stream inputs in this model. They are effect audio, sub audio and main audio. Sampling Rate Converter adjusts audio sampling rate from the output of each sound/audio decoder to the sampling rate of final audio output.

Static mixing levels among three audio streams are handled by Sound Mixer in Audio Mixing Engine in accordance with the mixing level information from Navigation Manager. Final output audio signal depends on a player.

Effect Audio Stream:

Effect audio steam is typically used when graphical button is clicked. Single channel (mono) and stereo channel WAV formats are supported. Sound Decoder reads WAV file from File Cache and sends LPCM stream to Audio Mixing Engine in response to the request from Navigation Manager. Two or more streams are not present simultaneously. In case that presentation of the other stream is requested while one stream is being presented, presentation of current stream is stopped and presentation of next stream is started.

Sub Audio Stream:

There are two sources of sub audio stream. The one is sub audio stream in Secondary Audio Video and the other is sub audio stream in Primary Audio Video. Secondary Audio Video may be synchronized or not to Title Timeline. If Secondary Audio Video consists of sub video and sub audio, they shall be synchronized each other no matter what Secondary Audio Video is synchronized to Title Timeline. For sub audio in Primary Audio Video, it shall be synchronized with Title Timeline.

Main Audio Stream:

There are three sources of main audio stream. The first one is main audio stream in Substitute Audio Video.

The next one is main audio stream in Substitute Audio. The last one is main audio stream in Primary Audio Video. Every main audio stream in different Presentation Object shall be synchronized with Title Timeline.

More intelligible explanations will be provided below.

In this embodiment, three different types of audio streams, i.e., an effect audio EFTAD, sub audio SUBAD, and main audio MANAD (see FIG. 10) are input to the audio mixing engine ADMXEN. Of these three different types of audio streams, the effect audio EFTAD is supplied as the output from the sound decoder SNDDEC in the advanced application presentation engine AAPEN shown in FIG. 42. The sub audio stream SUBAD is supplied as the output from the sub audio decoder SADEC in the decoder engine DCDEN. The main audio stream MANAD is supplied as the output from the main audio decoder MADEC in the decoder engine DCDEN.

In this embodiment, the sampling frequencies of these audio streams need not match, and these audio streams can have different sampling frequencies (sampling rates). Upon mixing the audio streams having three different sampling frequencies, the audio mixing engine ADMXEN includes sampling rate converters SPRTCV corresponding to the respective audio streams. That is, the sampling rate converters SPRTCV have a function of changing the sampling frequencies (sampling rates) upon output from the audio decoders (SNDDEC, SADEC, MADEC) to that of a final audio output. In this embodiment, as shown in FIG. 42, mixing level information MXLVI is transferred from the navigation manager NVMNG to a sound mixer SNDMIX in the audio mixing engine ADMXEN, and a mixing level upon mixing the three different types of audio streams is set based on the transferred information in the sound mixer SNDMIX. The output dynamic range of a final audio output AOUT can be uniquely set by the advanced content playback unit ADVPL to be used.

The handling method and contents of the three different types of audio streams in the audio mixing model of this embodiment will be described below.

The effect audio stream EFTAD (see FIG. 10) is an audio stream basically used when the user clicks a graphical button. A use example will be explained below using FIG. 16. As shown in FIG. 16, the advanced application ADAPL is presented on the screen, and the help icon 33 is presented in it. For example, when the user clicks (designates) the help icon 33, a specific audio is output immediately after the help icon 33 is pressed as one means for indicating clicking of the help icon 33 to the user, thus clearly demonstrating the fact of clicking of the help icon 33 to the user. An effect sound that informs the user of clicking corresponds to the effect audio EFTAD. In this embodiment, the effect audio EFTAD supports a single-channel (monaural) or stereo-channel (two-channel) WAV format. In this embodiment, the sound decoder SNDDEC in the advanced application presentation engine AAPEN generates an effect audio stream EFTAD in accordance with the information contents of control information CTRLI sent from the navigation manager NVMNG, and transfers it to the audio mixing engine ADMXEN. The sound source of this effect audio stream EFTAD is saved in advance as a WAV file in the file cache FLCCH. The sound decoder SNDDEC in the advanced application presentation engine AAPEN reads this WAV file, converts it into a linear PCM format, and transfers the converted file to the audio mixing engine ADMXEN. In this embodiment, the effect audio EFTAD cannot present two or more streams at the same time. In this embodiment, when a presentation output request of the next effect audio stream EFTAD is issued while one effect audio stream EFTAD is presented, the effect audio stream EFTAD designated next is preferentially output. A practical example will be explained using FIG. 16. For example, a case will be examined wherein the user holds down the FF button 38. That is, a case will be examined below wherein upon holding down the effect (FF) button 38, a corresponding effect audio EFTAD continuously sounds for several seconds to present that fact to the user. When the user presses the play button 35 immediately after he or she holds down the FF button 38 before sounding of the effect audio EFTAD ends, an effect audio EFTAD indicating pressing of the play button 35 is output instead before sounding of the effect audio EFTAD ends. As a result, when the user successively presses a plurality of image objects of the advanced application ADAPL presented on the screen, a quick response to the user can be presented, thus greatly improving user's convenience.

In this embodiment, the sub audio stream SUBAD supports two sub audio streams SUBAD, i.e., the sub audio stream SUBAD in the secondary audio video SCDAV and that in the primary audio video PRMAV.

The secondary audio video SCDAV can be presented in synchronism with the title timeline TMLE or can also be presented asynchronously. If the secondary audio video SCDAV includes both the sub video SUBVD and sub audio SUBAD, the sub video SUBVD and sub audio SUBAD must be synchronized with each other independently of whether or not the secondary audio video SCDAV is synchronized with the title timeline TMLE. The sub audio SUBAD in the primary audio video PRMAV must be synchronized with the title timeline TMLE. In this embodiment, meta data control information in an elementary stream of the sub audio stream SUBAD is also processed by the sub audio decoder SADEC.

In this embodiment, as the main audio stream MANAD, three different types of main audio streams MANAD, i.e., a main audio stream MANAD in a substitute audio video SBTAV, that in a substitute audio SBTAD, and that in a primary audio video PRMAV are available. All main audio streams MANAD included in different playback presentation objects must be synchronized with the title timeline TMLE.

FIG. 43 shows a data supply model from the network server NTSRV and persistent storage PRSTR memory in this embodiment.

Network and Persistent Storage Data Supply Model

Persistent Storage can store any Advanced Content files. Network Server can store any Advanced Content files except for Primary Video Set. Network Manager and Persistent Storage Manager provide file access functions. Network Manager also provides protocol level access functions.

File Cache Manager in Navigation Manager can get Advanced Stream file directly from Network Server and Persistent Storage via Network Manager and Persistent Storage Manager. Parser in Navigation Manager cannot read Advanced Navigation files directly from Network Server and Persistent Storage except for Play list in startup sequence. Files shall be stored to File Cache at once before being read by Parser.

Advanced Application Presentation Engine has a way to copy the files from Network Server or Persistent Storage to File Cache. Advanced Application Presentation Engine invokes File Cache Manager to get the files which are not located on File Cache. File Cache Manager compares with File Cache Table whether requested file is cached on File Cache or not. The case the file exists on File Cache, File Cache Manager passes the file data to Advanced Application Presentation Engine directly from File Cache. The case the file does not exist on File Cache, File Cache Manager get the file from its original location to File Cache, and then passes the file data to Advanced Application Presentation Engine.

Secondary Video Player can directly get files of Secondary Video Set, such as TMAP and S-EVOB, from Network Server and Persistent Storage via Network Manager and Persistent Storage Manager as well as File Cache. Typically, Secondary Video Playback Engine uses Streaming Buffer to get S-EVOB from Network Server. It stored part of S-EVOB data to Streaming Buffer at once, and feed to it to Demux module in Secondary Video Player.

More intelligible explanations will be provided below.

In this embodiment, the advanced content file ADVCT can be stored in the persistent storage PRSTR. Also, the advanced content ADVCT except for the primary video set PRMVS can be stored in the network server NTSRV. In this embodiment, the network manager NTMNG and persistent storage manager PRMNG in the data access manager DAMNG in FIG. 43 execute access processing to various files associated with the advanced content ADVCT. Furthermore, the network manager NTMNG has an access function on the protocol level. The file cache manager FLCMNG in the navigation manager NVMNG makes control upon directly acquiring an advanced stream file associated with the advanced application ADAPL from the network server NTSRV or persistent storage PRSTR via the network manager NTMNG or persistent storage manager PRMNG. The parser PARSER can directly read the contents of the playlist file PLLST upon startup of the advanced content playback unit ADVPL. To this end, the playlist file PLLST must be stored in the information storage medium DISC. However, this embodiment is not limited to this. For example, the playlist file PLLST may be stored in the persistent storage PRSTR, network server NTSRV, or the like, and may be directly read from there. In this embodiment, the parser PARSER in the navigation manager NVMNG cannot directly play back files such as a manifest file MNFST, markup file MRKUP, script file SCRPT, and the like, which are located under the advanced navigation directory ADVNV indicated by advanced navigation files (see FIG. 11) and are obtained from the network server NTSRV or persistent storage PRSTR.

That is, this embodiment is premised on that when the parser PARSER plays back advanced navigation files ADVNV (i.e., files such as the manifest file MNFST, markup file MRKUP, script file SCRPT, and the like under the directory ADVNV), these files are temporarily recorded in the file cache FLCCH, and the parser PARSER plays back the advanced navigation files ADVNV from the file cache FLCCH. It is also premised on that advanced elements ADVEL (files such as a still picture file IMAGE, effect audio file EFTAD, font file FONT, and other files OTHER shown in FIG. 11) are stored in the file cache FLCCH in advance. That is, the advanced content ADVCT including the advanced elements ADVEL is transferred in advance from the network server NTSRV or persistent storage PRSTR via the network manager NTMNG or persistent storage manager PRMNG in the data access manager DAMNG, and is stored in advance in the file cache FLCCH. Then, the advanced application presentation engine AAPEN reads the advanced elements ADVEL stored in the file cache FLCCH. The advanced application presentation engine AAPEN in the presentation engine PRSEN controls to copy various files in the network server NTSRV or persistent storage PRSTR to the file cache FLCCH. The advanced application presentation engine AAPEN controls the file cache manager FLCMNG in the navigation manager NVMNG to store required files (or short files of required information) in the file cache FLCCH. With this control, the file cache manager FLCMNG confirms the contents of a file cache table which indicates a list stored in the file cache FLCCH to see if files requested from the advanced application presentation engine AAPEN are temporarily stored in the file cache FLCCH. In the description of this embodiment, the advanced application presentation engine AAPEN in the presentation engine PRSEN controls the file cache manager FLCMNG in the navigation manager NVMNG to store the required advanced content ADVCT in the file cache FLCCH in advance. However, this embodiment is not limited to this. For example, the playlist manager PLMNG in the navigation manager NVMNG may interpret the contents of resource information RESRCI in the playlist PLLST and may report the parser PARSER on that result, and the parser PARSER may control the file cache manager FLCMNG based on the resource information RESRCI to store the required advanced content ADVCT in the file cache FLCCH in advance. As a result, if all the required files are temporarily stored in the file cache FLCCH, the file cache manager FLCMNG directly transfers the required file data from the file cache FLCCH to the advanced application presentation engine AAPEN. Contrary to this, if not all the required files are stored in the file cache FLCCH, the file cache manager FLCMNG reads required files from their original storage location (network server NTSRV or persistent storage PRSTR) and transfers them to the file cache FLCCH. After that, the required file data are transferred to the advanced application presentation engine AAPEN. The secondary video player SCDVP controls to transfer the time map file STMAP (see FIG. 11) and secondary enhanced video object file S-EVOB of the secondary video set file SCDVS from the network server NTSRV or persistent storage PRSTR to the file cache FLCCH via the network manager NTMNG or persistent storage manager PRMNG. The secondary enhanced object data S-EVOB read from the network server NTSRV is temporarily stored in the streaming buffer STRBUF. After that, the secondary video playback engine SVPBEN in the secondary video player SCDVP plays back the stored secondary enhanced video object data S-EVOB from the streaming buffer STRBUF. Some of the secondary enhanced video object data S-EVOB stored in the streaming buffer STRBUF are transferred to the demultiplexer DEMUX in the secondary video player SCDVP, and are demultiplexed.

Figure 44:
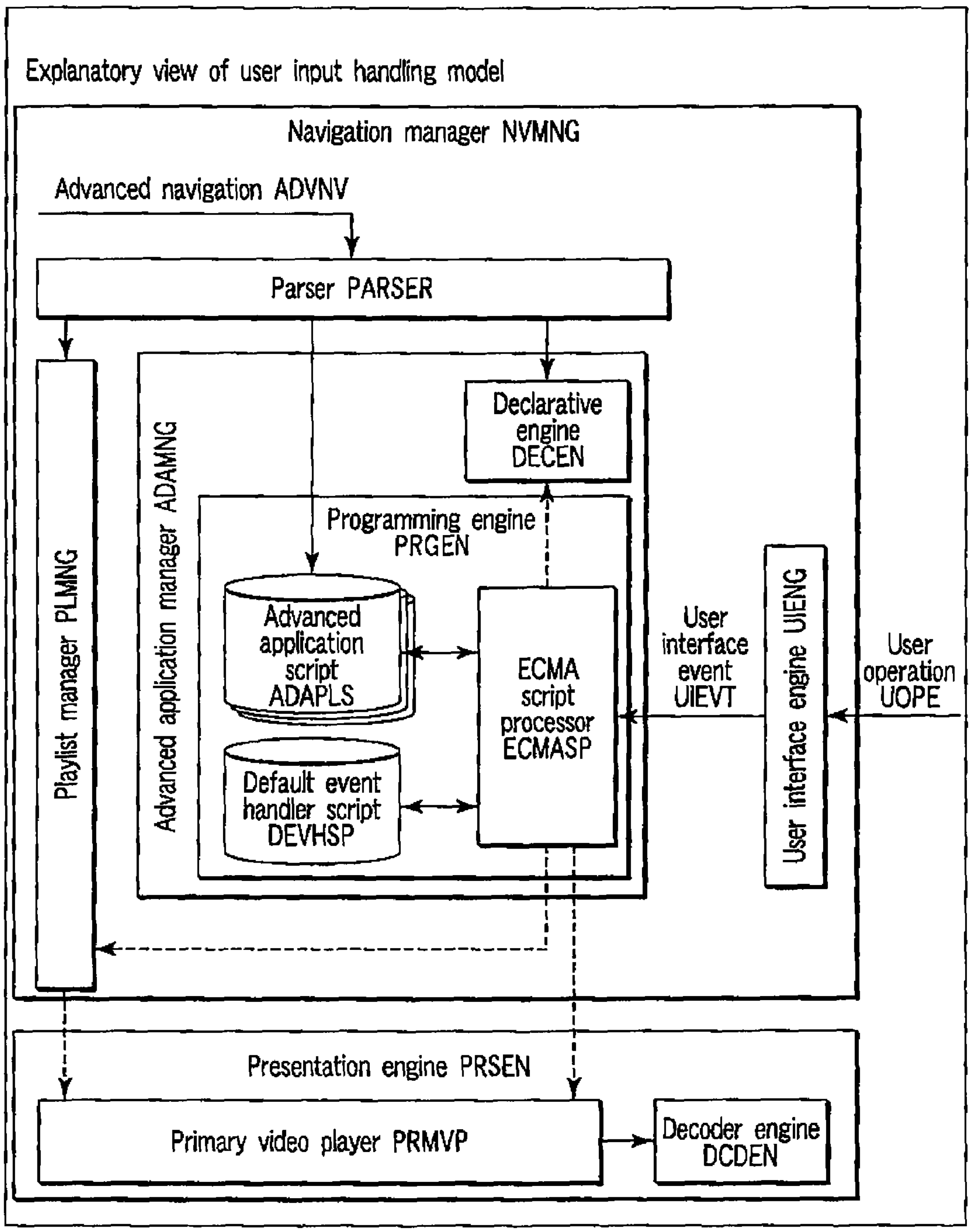
FIG. 44 is an exemplary view showing a user input handling model.

In this embodiment, upon playback of the advanced content ADVCT, every user input events are processed first by the programming engine PRGEN in the advanced application manager ADAMNG. FIG. 44 shows a user input handling model in this embodiment.

User Input Model:

All user input events shall be handled by Programming Engine at first while Advanced Content is played back.

User operation signal via user interface devices are inputted into each device controller module in User Interface Engine. Some of user operation signals may be translated to defined events, "U/I Event" of "Interface Remote Controller Event". Translated U/I Events are transmitted to Programming Engine.

Programming Engine has ECMA Script Processor which is responsible for executing programmable behaviors. Programmable behaviors are defined by description of ECMA Script which is provided by script file(s) in each Advanced Application. User event handlers which are defined in Script are registered into Programming Engine.

When ECMA Script Processor receives user input event, ECMA Script Processor searches whether the user event handler which is corresponding to the current event in the registered Script of Advanced Application.

If exists, ECMA Script Processor executes it. If not exist, ECMA Script Processor searches in default event handler script which is defined by in this specification. If there exists the corresponding default event handler code, ECMA Script Processor executes it. If not exist, ECMA Script Processor discards the event.

More intelligible explanations will be provided below.

For example, signals of user operations UOPE generated by various user interface drives such as a keyboard, mouse, remote controller, and the like are input as user interface events UIEVT by various device controller modules (e.g., the remote control controller RMCCTR, keyboard controller KBDCTR, mouse controller MUSCTR, and the like) in the user interface engine UIENG, as shown in FIG. 28. That is, each user operation signal UOPE is input to the programming engine PRGEN in the advanced application manager ADAMNG as a user interface event UIEVT through the user interface engine UIENG, as shown in FIG. 44. An ECMA script processor ECMASP which supports execution of various script files SCRPT is included in the programming engine PRGEN in the advanced application manager ADAMNG. In this embodiment, the programming engine PRGEN in the advanced application manager ADAMNG includes the storage location of an advanced application script ADAPLS and that of a default event handler script DEVHSP, as shown in FIG. 44. FIG. 45 shows a list of user input events in this embodiment.

Default Input Handler:

Definition of Default Input Handler for User Input Event is defined in FIG. 45.

When user input events are not consumed by Advanced Application, Default Input Handler shall implement the action defined by the following Scripts.

Virtual Key Code: Virtual Key Code that is created by Player in response to user input devices Instruction: An Instruction for Virtual Key Code Default Input Handler: Script that define the default action Mandatory/Optional: When Virtual Key Code is "Mandatory", Player shall provide user input devices that are able to send this code.

Value: The value used in Script for user input events

More intelligible explanations will be provided below.

As shown in FIG. 45, for example, a simple operation for moving a cursor on the screen, or a combination of such simple operations is called a user input event, and combination processing of a series of operations such as FF playback and the like is called an input handler. Virtual key codes (input handler codes) are set in correspondence with the user input events and input handlers. In this embodiment, a plurality of pieces of information of virtual key codes corresponding to default input handler codes and user input events shown in FIG. 45 are recorded in advance in the default event handler script DEVHSP in the programming engine PRGEN. Information recorded in the script file SCRPT (see FIG. 11) of the advanced application ADAPL, which is fetched from the network server NTSRV, information storage medium DISC, or persistent storage PRSTR, is recorded in the advanced application script recording area ADAPLS in the programming engine PRGEN, as shown in FIG. 44. Upon reception of a user interface event UIEVT, the ECMA script processor ECMASP interprets event handler codes (virtual key codes corresponding to default input handler codes or user input events) included in that user interface event UIEVT, and searches to see if all the event handler codes described in the user interface event UIEVT correspond to those which are registered in the advanced application script recording area ADAPLS. If all the event handler codes described in the user interface event UIEVT correspond to those registered in the advanced application script recording area ADAPLS, the ECMA script processor ECMASP immediately starts execution processing according to their contents. If the event handler codes described in the user interface event UIEVT includes those which are not registered in the advanced application script recording area ADAPLS, the default event handler script DEVHSP is searched for corresponding event handler codes. If all pieces of information of short event handler codes are stored in the default event handler script DEVHSP, the ECMA script processor ECMASP performs execution processing according to the contents of the user interface event UIEVT using the event handler codes registered in the advanced application script recording area ADAPLS and default event handler script DEVHSP. If the event handler codes included in the user interface event UIEVT are not registered in the default event handler script DEVHSP, either, the ECMA script processor ignores the contents of the user interface event UIEVT, and invalidates execution of the user interface event UIEVT.

FIG. 45 shows the contents of the event handlers and event handler codes described in the description of FIG. 44. FIG. 45 shows the contents of event handlers and virtual key codes which are registered in advance in the default event handler script DEVHSP, the user event handlers described using FIG. 44 correspond to default input handlers in FIG. 45, and the default event handler codes described using FIG. 44 correspond to virtual key codes in FIG. 45. Instructions in FIG. 45 represent execution contents corresponding to the virtual key codes, and their detailed contents will be explained in the following paragraphs of function overview.

As shown in FIG. 45, events having default input handlers correspond to 15 different types of virtual key codes. When the virtual key code is "VK_PLAY", the default input handler is "playHandler", the value is "0xFA", and this event is set upon normal speed playback. When the virtual key code is "VK_PAUSE", the default input handler is "pauseHandler", the value is "0xB3", and this event is set upon pausing and playback. When the virtual key code is "VK_FF", the default input handler is "fastForwardHandler", the value is "0xC1", and this event is set upon fastforward playback. When the virtual key code is "VK_FR", the default input handler is "fastReverseHandler", the value is "0xC2", and this event is set upon fast-reverse playback. When the virtual key code is "VK_SF", the default input handler is "slowForwardHandler", the value is "0xC3", and this event is set upon slow-forward playback. When the virtual key code is "VK_SR", the default input handler is "slowReverseHandler", the value is "0xC4", and this event is set upon slow-reverse playback. When the virtual key code is "VK_STEP_REV", the default input handler is "stepPreviousHandler", the value is "0xC5", and this event is set upon returning to the previous step. When the virtual key code is "VK_STEP_NEXT", the default input handler is "stepNextHandler", the value is "0xC6", and this event is set upon jumping to the next step. When the virtual key code is "VK_SKIP_PREV", the default input handler is "skipPreviousHandler", the value is "0xC7", and this event is set upon playing back the previous chapter. When the virtual key code is "VK_SKIP_NEXT", the default input handler is "skipNextHandler", the value is "0xC8", and this event is set upon playing back the next chapter. When the virtual key code is "VK_SUBTITLE_SWITCH", the default input handler is "switchSubtitleHandler", the value is "0xC9", and this event is set upon setting ON/OFF of presentation of a subtitle. When the virtual key code is "VK_SUBTITLE", the default input handler is "changeSubtitleHandler", the value is "0xCA", and this event is set upon changing a subtitle track. When the virtual key code is "VK_CC", the default input handler is "showClosedCaptionHandler", the value is "0xCB", and this event is set upon presenting a closed caption. When the virtual key code is "VK_ANGLE", the default input handler is "changeAngleHandler", the value is "0xCC", and this event is set upon switching an angle. When the virtual key code is "VK_AUDIO", the default input handler is "changeAudioHandler", the value is "0xCD", and this event is set upon switching an audio track.

Even for events having no default input handlers, values and instructions can be set for virtual key codes. When the virtual key code is "VK_MENU", the value is "0xCE", and this event is set upon presenting a menu. When the virtual key code is "VK_TOP_MENU", the value is "0xCF", and this event is set upon presenting a top menu. When the virtual key code is "VK_BACK", the value is "0xD0", and this event is set upon returning to the previous frame or the playback start position. When the virtual key code is "VK_RESUME", the value is "0xD1", and this event is set upon returning from a menu. When the virtual key code is "VK_LEFT", the value is "0x25", and this event is set upon shifting the cursor to the left. When the virtual key code is "VK_UP", the value is "0x26", and this event is set upon shifting the cursor upward. When the virtual key code is "VK_RIGHT", the value is "0x27", and this event is set upon shifting the cursor to the right. When the virtual key code is "VK_DOWN", the value is "0x28", and this event is set upon shifting the cursor downward. When the virtual key code is "VK_UPLEFT", the value is "0x29", and this event is set upon shifting the cursor left upward. When the virtual key code is "VK_UPRIGHT", the value is "0x30", and this event is set upon shifting the cursor right upward. When the virtual key code is "VK_DOWNLEFT", the value is "0x31", and this event is set upon shifting the cursor left downward. When the virtual key code is "VK_DOWNRIGHT", the value is "0x32", and this event is set upon shifting the cursor right downward. When the virtual key code is "VK_TAB", the value is "0x09", and this event is set upon using a tab. When the virtual key code is "VK_A_BUTTON", the value is "0x70", and this event is set upon pressing an A button. When the virtual key code is "VK_B_BUTTON", the value is "0x71", and this event is set upon pressing a B button. When the virtual key code is "VK_C_BUTTON", the value is "0x72", and this event is set upon pressing a C button. When the virtual key code is "VK_D_BUTTON", the value is "0x73", and this event is set upon pressing a D button. When the virtual key code is "VK_ENTER", the value is "0x0D", and this event is set upon pressing an OK button. When the virtual key code is "VK_ESC", the value is "0x1B", and this event is set upon cancel. When the virtual key code is "VK_0", the value is "0x30", and "0" is set. When the virtual key code is "VK_1", the value is "0x31", and "1" is set. When the virtual key code is "VK_2", the value is "0x32", and "2" is set. When the virtual key code is "VK_3", the value is "0x33", and "3" is set. When the virtual key code is "VK_4", the value is "0x34", and "4" is set. When the virtual key code is "VK_5", the value is "0x35", and "5" is set. When the virtual key code is "VK_6", the value is "0x36", and "6" is set. When the virtual key code is "VK_7", the value is "0x37", and "7" is set. When the virtual key code is "VK_8", the value is "0x38", and "8" is set. When the virtual key code is "VK_9", the value is "0x39", and "9" is set. When the virtual key code is "VK_MOUSEDOWN", the value is "0x01", and this event is set upon disabling input of the designated element (shifting it to the non-frontmost plane). When the virtual key code is "VK_MOUSEUP", the value is "0x02", and this event is set upon enabling input of the designated element (shifting it to the frontmost plane).

In the existing DVD-Video or the standard content STDCT in this embodiment, an SPRM (system parameter) is defined to set a parameter used by the system. However, in this embodiment, the advanced content navigation does not use any SPRM (system parameters), and system parameters shown in FIGS. 50 to 53 are set as alternatives to the SPRM (system parameters). Upon playing back the advanced content ADVCT, the SPRM (system parameter) value can be detected by API command processing. As the system parameter in this embodiment, the following four different types of parameters can be set. The system parameters are set for each advanced content playback unit ADVPL in the information recording and playback apparatus 1. Player parameters shown in FIG. 46 can be commonly set for each information recording and playback apparatus 1. Profile parameters shown in FIG. 47 indicate data of a user profile. Presentation parameters shown in FIG. 48 indicate the presentation state on the screen. Layout parameters shown in FIG. 49 mean parameters associated with the layout upon video presentation (see FIG. 39).

In this embodiment, the system parameters are temporarily set in the data cache DTCCH shown in FIG. 14. However, this embodiment is not limited to this. For example, the system parameters can be set in a temporary memory (not shown) set in the parser PARSER in the navigation manager NVMNG shown in FIG. 28. An explanation will be given below for respective drawings.

FIG. 46 shows a list of player parameters in this embodiment.

In this embodiment, the player parameters include two objects, i.e., a player parameter object and a data cache object. The player parameters mean general parameter information required upon executing video playback processing of the advanced content playback unit ADVPL in the information recording and playback apparatus 1 shown in FIG. 1. Of the player parameters, general parameter information which is not associated with network downloading and data transfer from the persistent storage PRSTR to the data cache DTCCH belongs to the player parameters. The processing in the advanced content playback unit ADVPL in this embodiment is premised on the data transfer processing to the data cache DTCCH. As parameter information required for the advanced content playback unit ADVPL, a parameter required for the data transfer processing to the data cache is defined as a player parameter corresponding to the data cache.

In the player parameter object, 13 player parameters are set. As the contents of the player parameters, "majorVersion" means an integer value of the version number of the corresponding specification. "minorVersion" means a value below the decimal point of the version number of the corresponding specification. "videoCapabilitySub" means the presentation capability of a sub video. "audioCapablityMain" means the presentation capability of a main audio. "audioCapabilitySub" means the presentation capability of a sub audio. "audioCapabilityAnalog" means the presentation capability of an analog audio. "audioCapabilityPCM" means the presentation capability of a PCM audio. "audioCapabilitySPDIF" means the presentation capability of an S/PDIF audio. "regionCode" means a region code. The region code means that the earth is divided into six regions, and region code numbers are set for respective regions. Upon video playback, playback presentation is permitted in only a region that matches the region code number. "countryCode" means a country code. "displayAspectRatio" means an aspect ratio. The aspect ratio means the horizontal to vertical ratio of the video screen to be presented to the user. "currentDisplayMode" means a display mode. "networkThroughput" means a network throughput. The network throughput means the transfer rate of data transferred from the network server NTSRV via the network.

Also, "dataCacheSize" is set in the data cache object, and means the data cache size as its contents.

FIG. 47 shows a list of profile parameters in this embodiment.

In this embodiment, the profile parameters include a profile parameter object. The profile parameters mean parameters associated with the frame presentation format processed by the advanced content playback unit ADVPL in the information recording and playback apparatus 1 shown in FIG. 1. In the profile parameter object, four profile parameters are set. As the contents of the profile parameters, "parentalLevel" means a parameter that specifies a level that permits children to view with respect to adult video, video pictures including violent/cruel scenes, and the like that cannot be presented to children. By utilizing this parameter, when, for example, a video picture with a high parental level is presented to children, a video picture obtained by editing only scenes the children can watch can be presented. "menuLanguage" means a menu language. "initialAudioLanguage" means an initial audio language. "initialSubtitleLanguage" means an initial subtitle language.

FIG. 48 shows a list of presentation parameters.

In this embodiment, the presentation parameters mean parameters associated with the presentation frame and presentation audio processed by the advanced content playback unit ADVPL in the information recording and playback apparatus shown in FIG. 1, and include three objects, i.e., a playlist manager PLMNG object, audio mixing engine ADMXEN object, and data cache DTCCH object. The playlist manager PLMNG object includes parameters required for the processing in the playlist manager PLMNG in the navigation manager NVMNG shown in FIG. 28. The audio mixing engine ADMXEN object can be classified to parameters required for the processing in the audio mixing engine ADMXEN in the AV renderer AVRND shown in FIG. 38. The data cache DTCCH object can be classified to a parameter (data cache) required for the processing in the streaming buffer STRBUF in the data cache DTCCH shown in FIG. 27.

In the playlist manager PLMNG object, 11 playlist manager PLMNG parameters are set. As the contents of the playlist manager parameters PLMNG, "playlist" will be described below. To the playlist file PLLST, a number can be appended to a file name. When the playlist file PLLST is edited or updated, that edited or updated file is appended with a number which has a value larger by "1" than the largest number of the previous appended numbers, and the file is saved, thus generating a latest playlist file PLLST. When the appended number of the playlist file PLLST to be played back by the advanced content playback unit ADVPL is set as the parameter, video playback can be implemented based on an optimal playlist PLLST that the user wants. However, this embodiment is not limited to this. As another embodiment, a combination of a title ID (titleid) and an elapsed time on the title timeline (titleElapsedTime) may be used to record the last position where the user interrupted playback (the last position where the user ended playback). As for "titleid", by recording identification information (title ID) of a title upon interrupting playback (or played back last), the user can restart playback from the title whose playback was interrupted previously. "titleElapsedTime" means an elapsed time on the title timeline. "currentVideoTrack" means the track number of a main video. "currentAudioTrack" means the track number of a main audio. "currentSubtitleTrack" means the track number of a subtitle. "selectedAudioLanguage" means a language (Japanese JA, English EN, etc.) which is selected by the user and is audibly output upon playback. "selectedAudioLanguageExtension" means an extension field of the selected audio language. "selectedSubtitleLanguage" means a language (Japanese JA, English EN, etc.) of a subtitle which is selected by the user and is output upon playback. "selectedSubtitleLanguageExtension" means an extension field of the selected subtitle language. "selectedApplicationGroup" means a language (Japanese JA, English EN, etc.) of an application group which is selected by the user and is output upon playback. For example, this parameter represents presentation language identification as to whether text presented on the help icon 33 shown in FIG. 16 is presented as "ヘルプ" or "help".

In the audio mixing engine ADMXEN object, 10 audio mixing engine ADMXEN parameters are set. As the contents of the audio mixing engine parameters ADMXEN, "volumeL" means the tone volume of a left channel. "volumeR" means the tone volume of a right channel. "volumeC" means the tone volume of a center channel. "volumeLS" means the tone volume of a left surround channel. "volumeRS" means the tone volume of a right surround channel. "volumeLB" means the tone volume of a left behind surround channel. "volumeRB" means the tone volume of a right behind surround channel. "volumeLFE" means the tone volume of a sub woofer channel. "mixSubXtoX" means a sub audio down mix coefficient (percentages). For example, when the main title 31 presented by the main video MANVD and the independent window 32 for a commercial presented by the sub video SUBVD are to be simultaneously presented, as shown in FIG. 16, the main audio MANAD corresponding to the main title 31 and the sub audio SUBAD corresponding to the independent window 32 for a commercial need be simultaneously audibly output. The ratio of the output tone volume of the sub audio SUBAD to that of the main audio MANAD at that time is called the sub audio down mixing coefficient. "mixEffectXtoX" means a sub effect audio down mix coefficient (percentages). For example, as shown in FIG. 16, the user often presses various icons 33 to 38 formed by the advanced application ADAPL. An effect sound which expresses that the user instructs to execute each element (icon) in the advanced application ADAPL means an example of the sub effect audio. In this case, the sub effect audio need be audibly output simultaneously with the main audio MANAD corresponding to the main title 31. The ratio of the tone volume of the sub effect audio to that of the main audio MANAD at that time is called the sub effect audio down mix coefficient.

In the data cache DTCCH object, "streamingBufferSize" is set, and means the streaming buffer size as its contents. Data of the secondary video set SCDVS transferred from the network server NTSRV are temporarily stored in the streaming buffer STRBUF. To allow such storage, the size of the streaming buffer STRBUF in the data cache DTCCH need be assigned in advance. The size of the streaming buffer STRBUF required at that time is specified in the configuration information CONFGI in the playlist file PLLST.

FIG. 49 shows a list of layout parameters in this embodiment. In this embodiment, the layout parameters include a presentation engine PRSEN object. The layout parameters mean those which are processed by the advanced content playback unit ADVPL in the information recording and playback apparatus 1 shown in FIG. 1, and are associated with the layout on the frame to be presented to the user.

In the presentation engine PRSEN object, 16 presentation engine PRSEN parameters are set. As the contents of the presentation engine PRSEN parameters, "mainVideo.x" means the x-coordinate value of the origin position of the main video. "mainVideo.y" means the y-coordinate value of the origin position of the main video. "mainVideoScaleNumerator" means the value of the numerator of a main video scaling value. "mainVideoScaleDenominator" means the value of the denominator of the main video scaling value. "mainVideoCrop.x" means the x-coordinate value of the main video presentation area. "mainVideoCrop.y" means the y-coordinate value of the main video presentation area. "mainVideoCrop.width" means the width of the main video presentation area. "mainVideoCrop.height" means the height of the main video presentation area. "subVideo.x" means the x-coordinate value of the origin position of the sub video. "subVideo.y" means the y-coordinate value of the origin position of the sub video. "subVideoScaleNumerator" means the numerator of a sub video scaling value. "subVideoScale-Denominator" means the denominator of the sub video scaling value. "subVideoCrop.x" means the x-coordinate value of the sub video presentation area. "subVideoCrop.y" means the y-coordinate value of the sub video presentation area. "subVideoCrop.width" means the width of the sub video presentation area. "subVideoCrop.height" means the height of the sub video presentation area.

A description will now be given as to a method of setting a playlist file PLLST used for playback of advanced contents ADVCT in this embodiment with reference to FIGS. 50 and 51. In this embodiment, it is basically assumed that a playlist file PLLST exists in the information storage medium DISC. At an initial stage, playback processing of the advanced contents ADVCT is performed by using the playlist file PLLST stored in the information storage medium DISC. However, in this embodiment, contents of the playlist file PLLST for playback of the advanced contents ADVCT can be updated by methods described below.

1. The network server NTSRV is utilized to update contents of the playlist file PLLST.

2. A playlist file obtained by uniquely editing or creating a playback procedure of the advanced contents ADVCT by a user is used to execute playback processing of the advanced contents ADVCT.

The network server NTSRV described in 1 can be used to store a downloaded new playlist file PLLST in the persistent storage PRSTR. Then, the playlist file PLLST in the persistent storage PRSTR is used to play back the advanced contents ADVCT. In each of the methods described in 1 and 2, sequential numbers are set to (file names of) playlist files PLLST, and the highest number is set to the latest playlist file PLLST in this embodiment in order to allow identification of the old playlist file PLLST and the updated or edited/created new playlist file PLLST. As a result, even if a plurality of playlist files PLLST exist with respect to the same advanced contents ADVCT, utilizing the playlist file PLLST having the highest number added thereto allow recognition of the playback method for the latest advanced contents ADVCT.

The method of 2 will now be described.

In case of prohibiting a user from editing the advanced contents ADVCT supplied by a content provider, copy protection processing (scramble processing) is performed with respect to a playback/display object in the advanced contents ADVCT, thereby prohibiting the user from editing the contents. Moreover, in case of supplying a playback/display object which allows a user to perform editing from a content provider, copy control processing (scramble processing) is not executed with respect to the playback/display object, thereby allowing editing processing by the user. A playlist file PLLST which is created when a user edges a playback/display objected which is not allowed to be edited (copy control/scramble processing) by the content provider can be stored in the persistent storage PRSTR in this embodiment. As described above, allowing a predetermined playlist file PLLST to be recorded in the persistent storage PRSTR can obtain the following effects.

A) Since a download timing of an updated playlist file PLLST stored in the network server NTSRV is no longer necessary, a playback start time based on the updated playlist file PLLST can be shortened.

B) When a user freely edits/creates advanced contents ADVCT allowed to be edited/created, the advanced contents ADVCT matching with preferences of the user can be played back.

A relationship between the method of 2 and the effects of this embodiment shown in FIGS. 2A to 2C will now be described.

As illustrated in FIGS. 2A to 2C, a management data structure itself is relatively customized in the conventional DVD-Video standards for a user request to assure the processing simplicity of image related information and the transmission simplicity of processed information as shown in FIGS. 2A to 2C, it is impossible to flexibly and readily cope with complicated editing processing. On the other hand, in this embodiment, XML is used in written contents of a playlist file PLLST, and a concept of title timeline TMLE is introduced into a description concept of the playlist file. Additionally, in this embodiment, allowing updating the thus created playlist file PLLST facilitates selective creation or transmission of a playlist file PLLST by a user shown in [8] of FIG. 2C. That is, not only selection or creation/editing of a playlist file PLLST by a user shown in (8.1) of FIG. 2C can be performed in accordance with the method of 2, but also a transmitted playlist file PLLST can be utilized on a reception side by transmitting the playlist file PLLST selected/created by the user as shown in (8.2) of FIG. 2C and optimizing a set number of the playlist file PLLST received by a friend.

In this embodiment, the updated or edited/created new playlist file PLLST is stored in the persistent storage PRSTR with its set number being incremented. Therefore, when starting up playback of advanced contents ADVCT, as shown in FIG. 50, all playlist files PLLST existing in the information storage medium DISC and the persistent storage PRSTR are searched, and a playlist file PLLST having the highest set number is extracted, thereby enabling playback control based on the latest playlist file PLLST.

Figure 51:
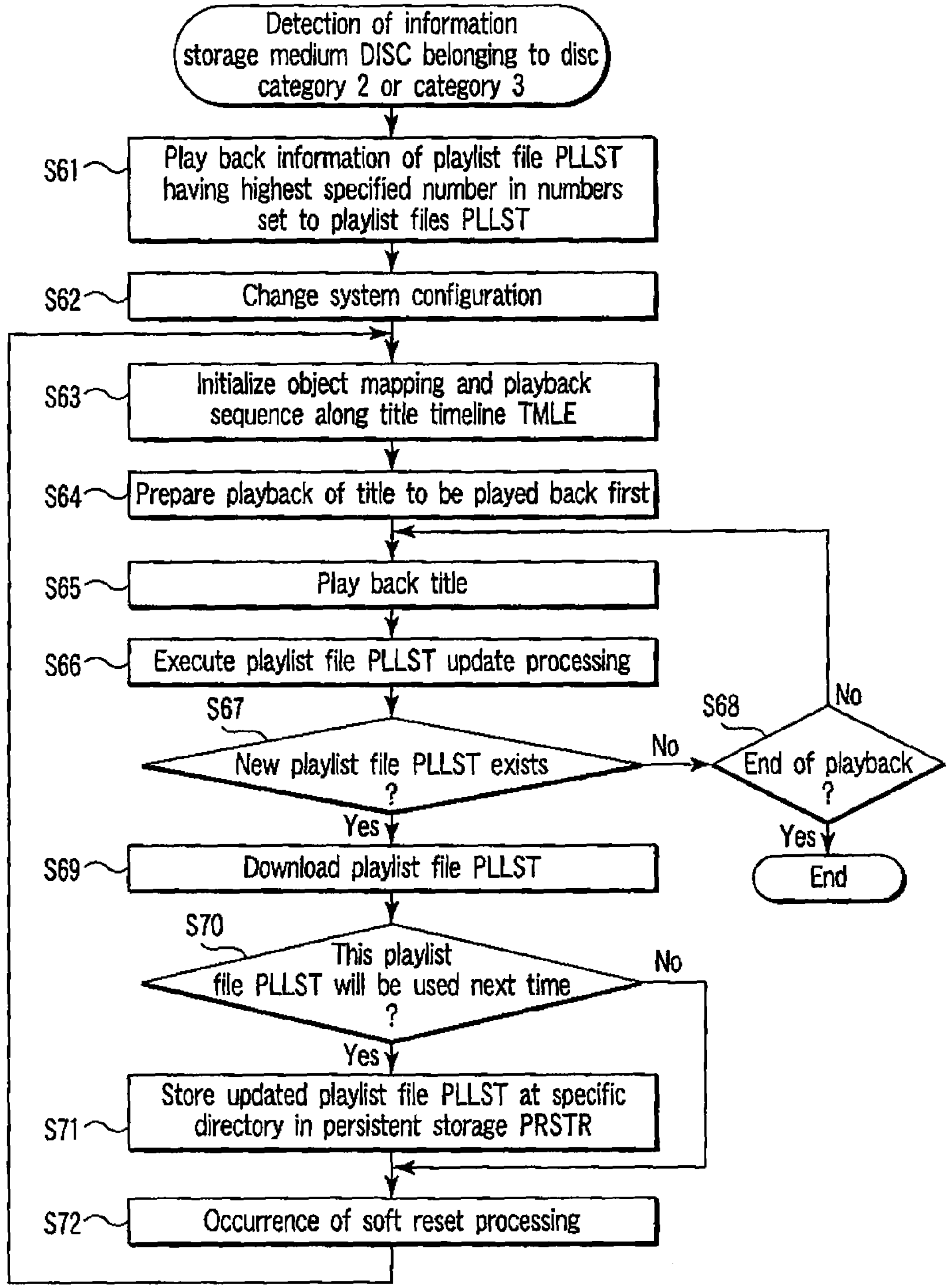
FIG. 51 is an exemplary view showing an update sequence at the time of playing back advanced contents.

Further, in case of downloading an updated playlist file PLLST existing in the network server NTSRV, as shown in FIG. 51, the latest playlist file PLLST is downloaded from the network server NTSRV, and its set number is changed to a value larger than those of existing playlist files PLLST. Then, this file is stored in the persistent storage PRSTR, thereby enabling playback based on the playlist file PLLST obtained after updating the playlist file PLLST stored in the network server NTSRV.

<Startup Sequence of Advanced Content>

Figure 50:
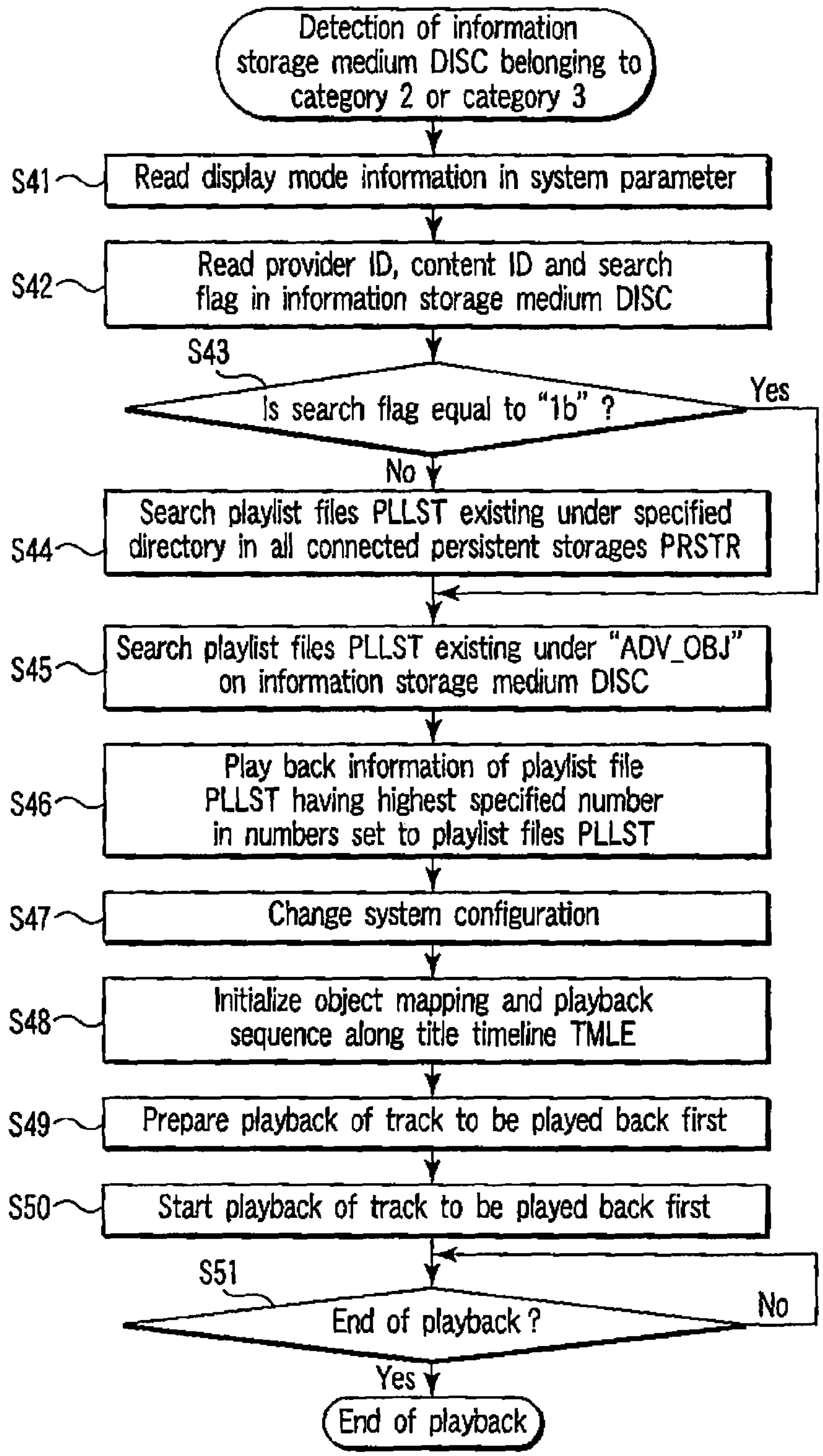
FIG. 50 is an exemplary view showing a sequence at the time of start-up with respect to advanced contents.

FIG. 50 shows a flow chart of startup sequence for Advanced Content in disc.

1) Read 'DISCID.DAT' on a disc:

After detecting inserted HD_DVD-Video disc is Disc Category 2 or Category 3, the Playlist Manager reads PROVIDER_ID, CONTENT_ID and SEARCH_FLG from the 'DISCID.DAT' file to access the Persistent Storage area associated with this disc.

2) Read Display Mode Information in System Parameters:

The Playlist Manager reads 'Display Mode' information. Move to VPLST search steps, when 'Display Mode' indicates that the player is connecting to some display. Otherwise, move to APLST search steps.

3) VPLST Search Steps 3-1) Search VPLST Files Under Specified Directory in All Connected Persistent Storage:

If SEARCH_FLG is '0b', the Playlist Manager searches 'VPLST$$$.XPL' files in the area specified by Provider ID and Content ID in all connected Persistent Storages. ('$$$' indicates the number from '000' to '999') If SEARCH_FLG is '1b', skip this step.

3-2) Search a VPLST Files Under 'ADV_OBJ' Directory on a Disc:

The Playlist Manager searches 'VPLST$$$.XPL' files under 'ADV_OBJ' directory on a disc. ('$$$' indicates the number from '000' to '999')

3-3) Detect VPLST$$$.XPL

If the Playlist Manager does not detect 'VPLST$$$.XPL' file, then move to APLST search steps.

3-4) Read the VPLST File which has the Highest Number:

The Playlist Manager reads a VPLST file which has the highest number (described as '$$$' above) in those VPLST files found in the preceding VPLST search procedures. After that, moves to 'Change System Configuration' step.

4) APLST Search Steps 4-1) Search APLST Files Under Specified Directory in all Connected Persistent Storage:

If SEARCH_FLG is '0b', the Playlist Manager searches 'APLST###.XPL' files in the area specified by Provider ID and Content ID in all connected Persistent Storages. ('###' indicates the number from '000' to '999') If SEARCH_FLG is '1b', skip this step.

4-2) Search APLST Files Under 'ADV_OBJ' Directory on a Disc:

The Play list Manager searches 'APLST###.XPL' files under 'ADV_OBJ' directory on a disc. ('###' indicates the number from '000' to '999')

4-3) Detect APLST###.XPL

If the Playlist Manager does not detect 'APLST###.XPL' file, then move to Failure step.

4-4) Read the APLST File which has the Highest Number:

The Playlist Manager reads a APLST file which has the highest number (described as '###' above) in those APLST files found in the preceding APLST search procedures. And moves to 'Change System Configuration' step.

5) Change System Configuration:

The player changes system resource configuration of the Advanced Content Player. The Streaming Buffer size is changed in accordance with streaming buffer size described in Playlist during this phase. All files and data currently in File Cache and Streaming Buffer are withdrawn.

6) Initialize Title Timeline Mapping & Playback Sequence:

The Playlist Manager calculates when the Presentation Object(s) to be presented on the Title Timeline of the first Title and where are the chapter entry point(s).

7) Preparation for the First Title Playback:

The File Cache Manager shall read and store all files which are needed to be stored in the File Cache in advance to start the first Title playback. They may be Advanced Navigation files for the Advanced Application Manager, Advanced Element files for the Advanced Application Presentation Engine or TMAP/S-EVOB file(s) for the Secondary Video Player. The Playlist Manager initializes presentation modules, such as the Advanced Application Presentation Engine, the Secondary Video Player and the Primary Video Player in this phase.

If there is Primary Audio Video in the first Title, the Playlist Manager informs the presentation mapping information of Primary Audio Video onto the Title Timeline of the first Title in addition to specifying navigation files for Primary Video Set, such as IFO and TMAP(s). The Primary Video Player reads IFO and TMAPs from disc, and then prepares internal parameters for playback control to Primary Video Set in accordance with the informed presentation mapping information in addition to establishment the connection between the Primary Video Player and required decoder modules in Decoder Engine.

If there is the presentation object which is played by the Secondary Video Player, such as Secondary Audio Video and Substitute Audio in the first Title, the Navigation Manager informs the presentation mapping information of the first presentation object of the Title Timeline in addition to specifying navigation files for the presentation object, such as TMAP. The Secondary Video Player reads TMAP from data source, and then prepares internal parameters for playback control to the presentation object in accordance with the informed presentation mapping information in addition to establishment the connection between the Secondary Video Player and required decode modules in Decoder Engine.

8) Start to Play the First Title:

After preparation for the first Title playback, the Advanced Content Player starts the Title Timeline. The presentation object mapped onto the Title Timeline start presentation in accordance with its presentation schedule.

9) Failure:

If the Playlist Manager is not able to detect neither 'VPLST$$$.XPL' nor 'APLST###.XPL' move to this step. In this step, the behavior of restart is left to player.

More intelligible explanations will be provided below.

A startup sequence of advanced contents ADVCT in this embodiment will now be described with reference to FIG. 50. Basically, playlist files PLLST in all persistent storages PRSTR connected with the information storage medium DISC are searched, a playlist file PLLST having the highest set number is extracted, and playback processing based on this file is executed.

As shown in FIG. 5, in this embodiment, three types of information storage mediums DISC classified into Category 1 to Category 3 are set. Of such information storage mediums DISC, information of advanced contents ADVCT can be recorded in the information storage medium DISC corresponding to Category 2 and Category 3 shown in FIGS. 5(*a*) and 5(*c*). First, a category of the information storage medium DISC is judged, and the information recording medium DISC having advanced contents ADVCT recorded therein and corresponding to Category 2 or Category 3 is detected.

As shown in FIG. 14, the navigation manager NVMNG exists in the advanced content playback unit ADVPL in the information recording and playback apparatus 1 according to this embodiment, and the playlist manager PLMNG exists in the navigation manager NVMNG (see FIG. 28). The playlist manager PLMNG reads display mode information concerning a system parameter from the information storage medium (step S41). The display mode information is utilized so that the play list manager PLMNG reads a "VPLIST$$$.XML" file. Furthermore, this embodiment is not restricted to this configuration, and the playlist manager PLMNG can also read a "VPLIST$$$.XML" file (each "$$$" means a number from "000" to "999").

In this embodiment, when playing back the information storage medium DISC, a necessary provider ID/content ID and search flag are recorded in a DISCID/DAT file in the persistent storage PRSTR. The playlist manager PLMNG reads the DISCID.DAT file in the persistent storage PRSTR, and reads the provider ID/content ID and the search flag from this file (step S42). The playlist manager PLMNG interprets contents of the search flag, and judges whether this search flag is "1b" (step S43). When the search flag is "0b", contents of all connected persistent storages PRSTR are searched, and a playlist file PLLST corresponding to the provider ID and the content ID is extracted (step S44). Furthermore, when the search flag is "1b", the step S44 is skipped. Then, the playlist manager PLMNG searches for playlist files PLL existing under a directory "ADV_OBJ" in the information storage medium DISC (step S45). Thereafter, a playlist file PLLST having the highest specified number is extracted from the playlist files PLLST stored in the information storage medium DISC and the persistent storage PRSTR, and the playlist manager PLMNG plays back contents of the extracted file (step S46). Subsequently, the advanced content playback unit ADVPL changes a system configuration based on contents of the playlist file PLLST extracted at the step S46 (step S47). Moreover, at this time, a size of a streaming buffer STRBUF is changed based on a streaming buffer size written in the playlist file PLLST. Additionally, all files and all data contents already recorded in the file cache FLCCH and the streaming buffer STRBUF shown in FIG. 27 are erased. Then, object mapping and playback sequence initialization according to the title timeline TMLE are executed (step S48). As shown in FIGS. 24A and 24B, object mapping information OBMAPI and playback sequence information PLSQI are recorded in the playlist file PLLST, and the playlist manager PLMNG utilizes such information to calculate a playback timing of each playback/display object on a title timeline TMLE corresponding to a title which is displayed first and also calculate a position of each capture entry point on the title timeline TMLE based on the playback sequence. Then, playback preparation of a title which is played back first is carried out (step S49). Specific contents of processing at the step S49 will now be described. As shown in FIG. 28, a file cache manager FLCMNG exists in the navigation manager NVMNG. Prior to starting a title which is played back first, the file cache manager FLCMNG performs necessary playback control over various kinds of files, and temporarily stores these files in the file cache FLCCH. A file which is temporarily stored in the file cache FLCCH is used by the advanced application manager (see FIG. 28). As specific file names, there are a manifest file MNFST, a markup file MRKUP, a script file SCRPT and others existing in an advanced navigation directory ADVNV shown in FIG. 11. Besides, in the file cache are stored a time map file STMAP and a secondary enhanced video object file S-EVOB (see FIG. 11) of a secondary video set used by a secondary video player SCDVP (see FIG. 35), a still image file IMAGE, an effect audio file EFTAD and a font file FONT existing in an advanced element directory ADVEL used by an advanced application presentation engine AAPEN (see FIG. 30), and other files OTHER. Moreover, at this timing, the playlist manager PLMNG executes initialization processing with respect to various playback modules such as an advanced application presentation engine AAPEN in the presentation engine PRSEN, a secondary video player SCDVP or a primary video player PRMVP shown in FIG. 30. A description will now be given as to a method of playback preparation concerning primary audio video PRMAV as a part of the playback preparation of the title explained at the step S49. As shown in FIGS. 24A and 24B, object mapping information OBMAPI exists in the playlist file PLLST, and a primary audio video clip element PRAVCP exists in the object mapping information OBMAPI. The playlist manager PLMNG analyzes information of the primary audio video clip element PRAVCP in the object mapping information OBMAPI, and transmits this information to the primary video player PRMVP (see FIG. 30) in the presentation engine PRSEN. Further, as shown in FIG. 11, as management files concerning the primary video set PRMAV, there are a video title set information file ADVTSI existing in the primary audio video directory PRMAV, a time map file PTMAP of the primary video set and others, and the playlist manager PLMNG transfers information of storage positions of these files to the primary video player PRMVP. After executing playback control over the video title set information file ADVTSI or the time map file PTMAP of the primary video set PRMVS from the information storage medium DISC, the primary video player PRMVP performs preparation of initial parameters required for playback control over the primary video set PRMVS based on the object mapping information OBMAPI. Moreover, as shown in FIG. 36, the primary video player PRMVP also performs preparation for connection with a video recorder in a corresponding decoder engine DCDEN. Additionally, in case of playing back substitute audio video SBTAV, substitute audio SBTAD or secondary audio video SCDAV played back by the secondary video player SCDVP, the playlist manager PLMNG likewise transfers information of a clip element concerning the object mapping information OBMAPI to the secondary video player SCDVP, and also transfers a storage position of the time map file STMAP (see FIG. 11) of the secondary video set to the secondary video player SCDVP. The secondary video player SCDVP carries out playback control concerning information of the time map file STMAP of the secondary video set, sets initial parameters concerning the playback control based on information of the object mapping information OBMAPI, and performs preparation for connection with a related recorder in the decoder engine DCDEN shown in FIG. 35. Upon completion of the playback preparation for the title, a track from which information is played back first is prepared (step S50). At this time, the advanced content playback unit ADVPL starts counting up the title timeline TMLE, and executes playback/display processing of each playback/display object with progress of the title timeline TMLE in accordance with a schedule written in the object mapping information OBMAPI. When playback is started, a timing of termination of playback is constantly detected (step S51), and playback termination processing is performed when a playback end time is reached.

<Update Sequence of Advanced Content Playback>

FIG. 51 shows a flow chart of update sequence of Advanced Content playback.

Playback Title

Advanced Content Player playback Title.

New Playlist file exist?

In order to update Advanced Content playback, it is required that Advanced Application to execute updating procedures. If the Advanced Application tries to update its presentation, Advanced Application on disc has to have the search and update script sequence in advance. Script searches the specified data source(s), typically Network Server, whether there is available new Playlist file.

Download Playlist file

If there is available new Playlist file, Script which is executed by Programming Engine, downloads it to File Cache or Persistent Storage.

The Playlist file will be used next time?

Store the Playlist file under specified directory in a Persistent Storage

Before Soft Reset, Advanced Application decides whether the Playlist file will be used next time or not. If the Playlist file is used temporarily, the file shall be stored in File Cache. In this case, when the next startup sequence, current Playlist file will be read by a player. If the Playlist file is used next time, the file shall be stored in File Cache, and it should be stored in the area specified by Provider ID and Content ID in Persistent Storage, and next time this file will be read by a player.

Issue Soft Reset

Advanced Application shall issue Soft Reset API to restart Startup Sequence. Soft Reset API registers the new Playlist file to Advanced Application Player, and resets some of current parameters and playback configurations. After that, "Change System Configuration" and following procedures are executed based on new Playlist file. Advanced Content Player restores the registered Playlist file to File Cache. In a similar way, Advanced Content Player restores Assignment Information Files associated with the registered Playlist to File Cache.

Initialize Title Timeline Mapping & Playback Sequence Preparation for the first Title playback More intelligible explanations will be provided below.

A description will now be given as to an update sequence method in playback of advanced contents in this embodiment with reference to FIG. 51. When contents of a playlist file PLLST are updated mainly in the network server NTSRV, the advanced content playback unit ADVPL in the information recording and playback apparatus 1 set on a user side can also update contents of the playlist file PLLST in accordance with this operation. FIG. 51 shows a method of updating contents of the playlist file PLLST executed by the advanced content playback unit ADVPL.

As shown in FIG. 5, in this embodiment, three types of information storage mediums DISC classified into Category 1 to Category 3 are set. Of these information storage mediums DISC, information of advanced contents ADVCT is included in the information storage mediums DISC corresponding to Category 2 and Category 3 shown in (b) and (c) of FIG. 5. First, a category of the information storage medium DISC is judged, and the information storage medium DISC having advanced contents ADVCT recorded therein and corresponding to Category 2 or Category 3 is detected. Then, in FIG. 51, processing from the step S41 to the step S45 in FIG. 50 is likewise executed, and a playlist file PLLST stored in the information storage medium DISC and a playlist file PLLST recorded in the persistent storage PRSTR are retrieved. Subsequently, the playlist files PLLST stored in the information storage medium DISC and the persistent storage PRSTR are compared with each other, the playlist file PLLST having the highest number in numbers set to the playlist files PLLST is extracted, and the playlist manager PLMNG plays back contents of this file (step S61). Then, a system configuration is changed based on contents of the playlist file PLLST extracted at the step S61 (step S62). In this embodiment, the system configuration is specifically changed as follows.

1. A system resource configuration is changed.

2. A size of a streaming buffer STRBUF (see FIG. 27) in the data cache DACCH is changed.

Figure 80:
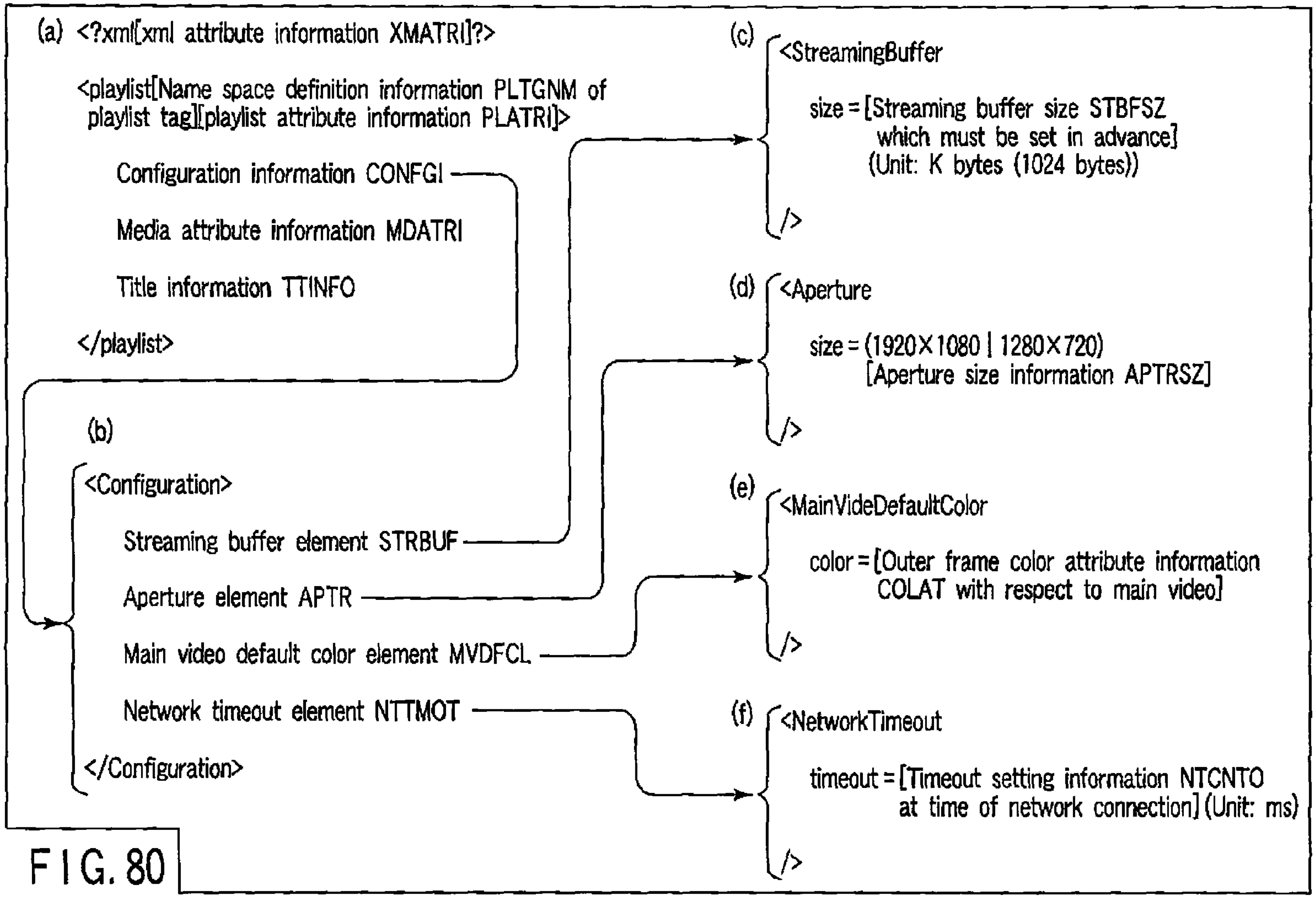
FIG. 80 is an exemplary view showing a data structure in configuration information existing in a playlist.

The size is changed in accordance with a "streaming buffer size STBFSZ (size attribute information) which must be set in advance" of a streaming buffer element STRBUF arranged in configuration information CONFGI in the playlist PLLST illustrated in (c) in FIG. 80.

3. Erase processing or the like of all files and all data contents already recorded in the file cache FLCCH and the streaming buffer STRBUF shown in FIG. 27 is mainly executed by the playlist manger PLMNG (FIG. 28) in the navigation manger NVMNG existing in the advanced content playback unit ADVPL.

Then, at step S63, object mapping and initialization of a playback sequence are executed along a title timeline TMLE. As shown in FIGS. 24A and 24B, object mapping information OBMAPI and playback sequence information PLSQI are recorded in the playlist file PLLST, and the playlist manager PLMNG utilizes such information to calculate a playback timing of each playback/display object on a title timeline TMLE corresponding to a title which is displayed first and also calculate a position of each capture entry point on the title timeline TMLE based on the playback sequence. Then, playback preparation of the title which is played back first is carried out at step S64. Specific contents of processing at the step S64 will now be described. As shown in FIG. 14, the navigation manger NVMNG exists in the advanced content playback unit ADVPL, and the file cache manager FLCMNG exists in the navigation manger NVMNG (see FIG. 28). Prior to starting playback of the title which is played back first, the file cache manager FLCMNG temporarily stores various files required for playback in the file cache FLCCH. As shown in FIG. 11, as files temporarily stored in the file cache FLCCH, there are a manifest file MNFST, a markup file MRKUP and a script file SCRPT existing in the advanced navigation directory ADVNV, a still image file IMAGE, an effect audio file EFTAD and a font file FONT existing in the advanced element directory ADVEL, and other files OTHER. Besides, as files stored in the file cache, there are a time map file STMAP and a secondary enhanced video object file S-EVOB of a secondary video set used by the secondary video player SCDVP. Further, the playlist manager PLMNG initializes various playback modules such as an advanced application presentation engine AAPEN, a secondary video player SCDVP, a primary video player PRMVP or the like in the presentation engine PRSEN shown in FIG. 30 simultaneously with a timing of "playback preparation of the title which is played back first" described at the step S64. Concrete contents of the initialization of various playback modules executed by the playlist manager PLMNG will now be described.

1. Initialization processing of the primary video player PRMVP.

(When the primary audio video PRMAV must be played back/displayed in a playback target title)

The following information is transferred from the playlist manager PLMNG to the primary video player PRMVP.

Information written in the primary audio video clip element PRAVCP (see FIGS. 54A and 54B) such as a playback timing of the primary audio video PRMAV on the title timeline TMLE.

Management information concerning the primary video set PRMVS such as time map information PTMAP or enhanced video object information EVOBI (see FIG. 12) of the primary video set.

The primary video player sets initial parameters based on the above-described information.

The primary video player PRMVP performs preparation for connection between a necessary decoder module in the decoder engine DCDEN and the primary video player PRMVP (see FIG. 36).

2. Initialization processing of the secondary video player SCDVP (When the secondary video set SCDVS must be played back/displayed in a playback target title)

The navigation manager NVMNG transfers the following information to the secondary video player SCDVP.

Information written in the secondary audio video clip element SCAVCP (see FIGS. 54A and 54B), the substitute audio video clip element SBAVCP or the substitute audio clip element SBADCP such as a playback timing on the title timeline TMLE concerning various kinds of playback/display objects in the secondary video set SCDVS.

Management information concerning the secondary video set SCDVS such as time map information STMAP (see FIG. 12) of the secondary video set.

The secondary video player SCDVP sets initial parameters based on the above-described information.

The primary video player SCDVP performs preparation for connection between a necessary decoder module in the decoder engine DCDEN and the secondary video player SCDVP (see FIG. 37).

Upon completion of the preparation for playback of the title, playback of a track from which information is to be played back is started (step S65). At this time, the advanced content playback unit ADVPL starts counting up the title timeline TMLE, and performs playback/display processing of each playback/display object with progress of the title timeline TMLE in accordance with a schedule written in the object mapping information OBMAPI. When the title is played back at the step S65, if a user wants to perform playback by using a new updated title, execution of update processing of a playlist file PLLST is started (step S66).

When execution of update processing of the playlist file PLLST is started at the step S66 as described above, retrieval processing of judging whether a new playlist file PLLST exists is started as the next step. In order to perform update concerning the method of playing back advanced contents ADVCT, update processing using an advanced application ADAPL must be executed. In order to perform update processing concerning the playback method using the advanced application ADAPL, the advanced application ADAPL recorded in the information storage medium DISC must have from the beginning a script sequence (a processing program set by a script SCRPT) in which a function of "searching the latest playlist PLLST to execute update processing" is set. The script sequence searches for a position where the updated latest playlist file PLLST is stored. Generally, it is often the case that the updated latest playlist file PLLST is stored in the network server NTSRV. Here, when the new playlist file PLLST exists in the network server NTSRV, download processing of the playlist file PLLST is executed (step S69). When the new playlist file PLLST does not exists, whether playback of a title is to be terminated is judged (step S68), and termination processing is executed if playback of the title should be terminated to meet a user's request. If a user permits playback based on the old playlist file PLLST, the control returns to continuous playback of the title at the step S65. A description will now be given as to download processing (step S69) of the playlist file PLLST. As shown in FIG. 1, the advanced content playback unit ADVPL exists in the information recording and playback apparatus 1 in this embodiment, and the navigation manager NVMNG exists in the advanced content playback unit ADVPL as shown in FIG. 14. The advanced application manager ADAMNG exists in the navigation manager NVMNG (see FIG. 28), and a programming engine PRGEN exists in the advanced application manager ADAMNG. If a new playlist file PLLST exists in the network server NTSRV, a script file SCRPT (the script sequence) in the advanced application ADAPL is activated in the programming engine PRGEN, and the latest playlist file PLLST is downloaded to the file cache FLCCH or the persistent storage PRSTR from the network server NTSRV. When the download processing of the latest playlist file PLLST is terminated, whether this playlist file PLLST is used for playback is then judged. If a user does not use the updated playlist file PLLST for the next playback but the updated playlist file PLLST is temporally used at step S70, the playlist file PLLST is temporarily stored in the file cache FLCCH. In this case, the current playlist file PLLST (before updating) is read for the next playback. Furthermore, if a user requests to use the latest playlist file PLLST for the next playback at the step S70, the updated playlist file PLLST must be stored in the file cache FLCCH and also stored in a specific region specified by a provider ID and a content ID in the persistent storage PRSTR as indicated at step S71. As a result, the updated playlist file PLLST is prepared to be played back in the advanced content playback unit ADVPL for the next playback. Moreover, soft reset processing must be carried out at step S72 irrespective of storage of the updated playlist file PLLST in the persistent storage PRSTR in accordance with a user's request. In order to restart a sequence of starting playback of the advanced contents ADVCT, the advanced application ADAPL must issue a soft rest API (command). The soft reset API (command) is used to register contents of the updated playlist file PLLST with respect to the advanced application manager ADAMNG (and the advanced application presentation engine AAPEN shown in FIG. 30) illustrated in FIG. 28 and reset current various parameters and playback configuration (various kinds of configuration information required for playback). Then, a system configuration is changed (processing similar to the step S62) based on contents of the updated playlist file PLLST, and the following processing is executed.

The advanced content playback unit ADVPL again stores the temporarily saved latest playlist file PLLST in the file cache FLCCH.

The advanced content playback unit ADVPL again stores an assignment information file in accordance with contents of the latest playlist file PLLST again stored in the file cache FLCCH.

After executing the soft reset processing (step S72), object mapping and initialization of a playback sequence based on a title timeline TMLE at the step S63 are subsequently carried out.

<Transition Sequence Between Advanced VTS and Standard VTS)>

Figure 52:
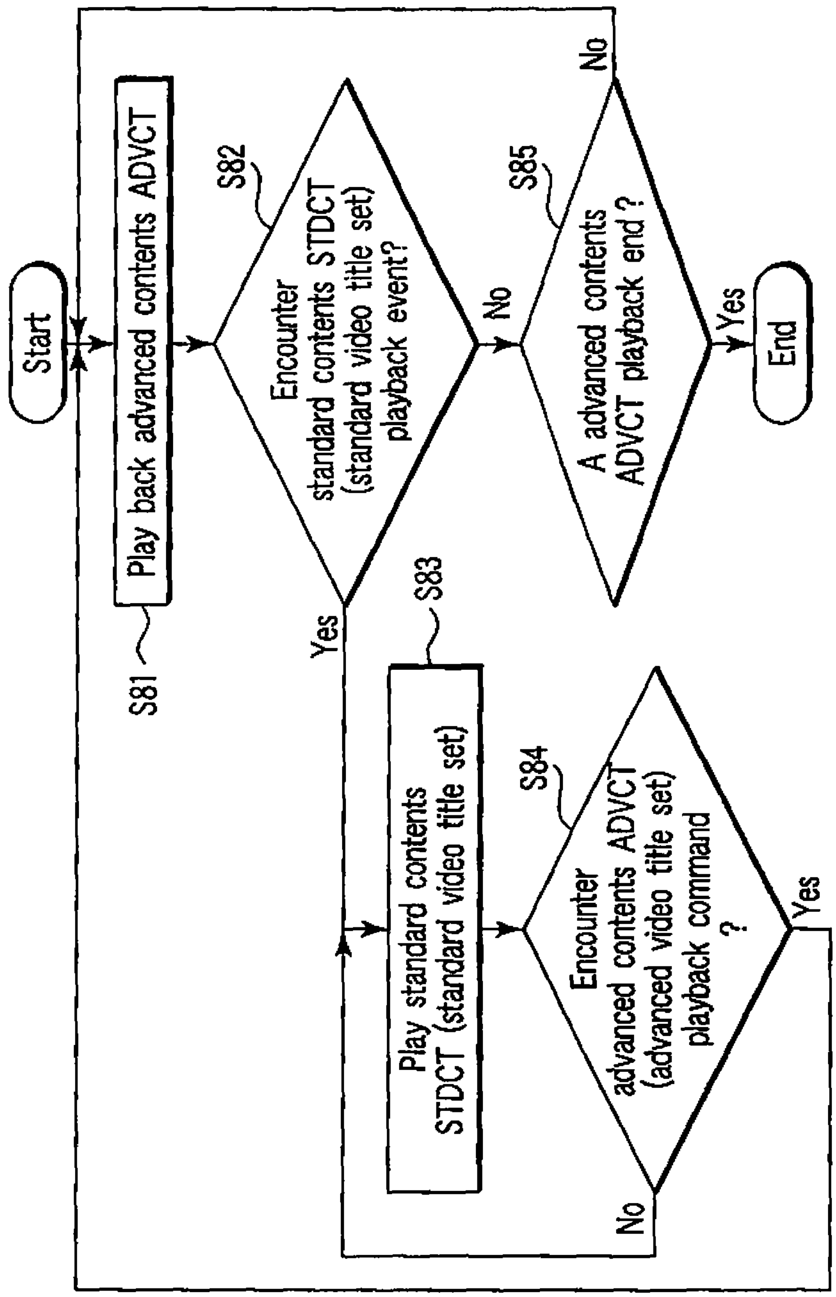
FIG. 52 is an exemplary view showing a sequence at the time of playing back both advanced contents and standard contents.

For disc category type 3 playback, it requires playback transition between Advanced VTS and Standard VTS. FIG. 52 shows a flow chart of this sequence.

Play Advanced Content

Disc category type 3 disc playback shall start from Advanced Content playback. During this phase, user input events are handled by the Navigation Manager. If any user events which should be handled by the Primary Video Player are occurred, the Playlist Manager has to guarantee to transfer them to the Primary Video Player.

Encounter Standard VTS Playback Event

Advanced Content shall explicitly specify the transition from Advanced Content playback to Standard Content playback by the play function of the StandardContentPlayer object in Advanced Navigation. The playback start position shall be decided by an argument of this function and SPRMs. When the Advanced Application Manager encounters the play function of the StandardContentPlayer object, the Advanced Application Manager requests Playlist Manager to suspend playback of Advanced VTS to Primary Video Player. In this time, player state machine moves to Suspend State. After that, the Advanced Application Manager calls the play function of the StandardContentPlayer object.

Play Standard VTS

When the Playlist Manager issues the play function of the StandardContentPlayer object, the Primary Video Player jumps to start Standard VTS from specified position. During this phase, the Navigation Manager is being suspended, so user event has to be inputted to the Primary Video Player directly. During this phase, the Primary Video Player is responsible for all playback transition among Standard VTSs based on navigation commands.

Encounter Advanced VTS Playback Command

Standard Contend shall explicitly specify the transition from Standard Content playback to Advanced Content playback by CallAdvancedContentPlayer of Navigation Command. When the Primary Video Player encounter the CallAdvancedContentPlayer command, it stops to play Standard VTS, then resumes Playlist Manager from execution point just after calling the play function of the StandardContentPlayer object. In this time, player state machine moves to Playback State or Pause State.

More intelligible explanations will be provided below.

In FIG. 6, the description has been given as to a transition relationship obtained by advanced content playback and standard content playback. A flowchart of FIG. 52 shows a transition relationship of advanced contents ADVCT playback and standard contents STDCT playback corresponding to FIG. 6 at the time of actual transition.

In an initial state immediately after starting the sequence, playback processing of the advanced contents is executed as described at step S81. Then, when generation processing of the standard contents STDCT is not encountered (step S82), playback of the advanced contents ADVCT is repeated until the playback processing of the advanced contents ADVCT is terminated (a step 85), and termination processing is started upon completion of playback of the advanced contents ADVCT. When the playback processing of the standard contents STDCT is started during playback of the advanced contents ADVCT (step S82), the control shifts to playback of the standard contents (step S83). Then, playback of the standard contents STDCT is repeated until a playback command of the advanced contents ADVCT is received (step S84). The playback command of the advanced contents ADVCT is necessarily received (the step S84) at the end of processing, and the termination processing is executed after the control returns to playback of the advanced contents ADVCT (the step S81). In this manner, the processing is started in the playback mode of the advanced contents ADVCT and terminated in the playback mode of the advanced contents ADVCT. As a result, the advanced content playback unit ADVPL (see FIG. 1) in the information recording and playback unit 1 can integrate and manage the entire sequence, thereby avoiding complication of switching control and management of playback of various contents.

When playing back data in the information storage medium DISC corresponding to Category 3 shown in (c) of FIG. 5, there is a case where both the advanced contents ADVCT and the standard contents STDCT are played back, and transition between both contents shown in FIG. 52 occurs.

Each step will now be described in detail.

<Step S81: Playback Processing of Advanced Contents ADVCT>

When playing back data in the information storage medium DISC corresponding to Category 3, playback must be started from the advanced contents ADVCT. As shown in FIG. 1, the navigation manger NVMNG exists in the advanced content playback unit ADVPL in the information recording and playback apparatus 1 as depicted in FIG. 14. The primary video player PRMVP exists in the presentation engine PRSEN (see FIG. 14) in the advanced content playback unit ADVPL as shown in FIG. 30. Further, the playlist manger PLMNG exists in the navigation manager NVMNG as shown in FIG. 28. If there is a user request which should be processed by the primary video player PRMVP, the playlist manager PLMNG must guarantee to perform data transfer of the primary enhanced video object P-EVOB recorded in the information storage medium DISC without interruption.

<Step S82: Encountering Playback Processing of Standard Contents STDCT (Standard Video Title Set)>

Playback of the advanced contents ADVCT must shift to playback of the standard contents STDCT in response to an API command called a CallStandardContentPlayer in the advanced navigation. The API command called the CallStandardContentPlayer also specifies playback start position information (information indicating a position in the standard contents STDCT from which playback is started) in the standard contents STDCT. As shown in FIG. 14, the navigation manager NVMNG and the presentation engine PRSEN exist in the advanced content playback unit ADVPL. Furthermore, the advanced application manger ADAMNG and the playlist manager PLMNG exist in the navigation manager NVMNG as shown in FIG. 28, and the primary video player PRMVP exists in the presentation engine PRSEN as depicted in FIG. 30. As indicated at the step S81, a judgment is always made upon whether playback processing of the standard contents STDCT (the standard video title set) is encountered as indicated at the step S82 during playback processing of the advanced contents ADVCT. Here, when playback processing of the standard contents STDCT is encountered, the advanced application manger ADAMNG judges upon the need to issue the CallStandard ContentPlayer API command. When a scene where the CallStandardContentPlayer API command must be issued is encountered, the advanced application manager ADAMNG requests the playlist manager PLMNG to stop playback of the advanced contents ADVCT. The primary video player PRMVP stops playback of the advanced contents ADVCT in response to the request. At the same time, the advanced application manager ADAMNG calls the CallStandardContentPlayer API command with respect to the playlist manger PLMNG.

<Step S83: Playback of Standard Contents STDCT (Standard Video Title Set)>

When the playlist manager PLMNG issues the CallStandardContentPlayer API command, the primary video player PRMVP jumps from a position where playback of the advanced contents ADVCT is interrupted to a position where playback of the standard contents STDCT is started. As shown in FIG. 1, the information recording and playback apparatus 1 includes the standard content playback unit STDPL and the advanced content playback unit ADVPL. The primary video player PRMVP exists in the advanced content playback unit ADVPL shown in FIG. 30 in this embodiment, but this embodiment is characterized in that the primary video player PRMVP is also shared in the standard content playback unit STDPL. Therefore, at the time of playback of the standard contents STDCT at the step S83, the primary video player PRMVP in the standard content playback unit STDPL executes processing to playback/display the standard contents STDCT. During this phase, a suspended state of the navigation manager NVMNG is maintained. As a result, an event specified by a user is directly input to the primary video player PRMVP. During this phase, the primary video player PRMVP copes with the transition of playback (playback position jump processing) in the standard contents STDCT in response to a command based on a navigation command.

<Step S84: Reception Confirmation of Playback Command of Advanced Contents ADVCT>

The transition from playback processing of the standard contents STDCT to playback processing of the advanced contents ADVCT is specified by a command called a "CallAdvancedContentPlayer" which is one type of the navigation commands. When the primary video player PRMVP receives the CallStandardContentPlayer API command, playback of the standard contents STDCT is stopped. Then, the playlist manager PLMNG executes processing to restart playback from a position where playback is interrupted in response to the CallStandardContentPlayer API command during playback processing of the advanced contents ADVCT.

<Presentation Clip Element and Object Mapping Information> (Again)

Figure 53:
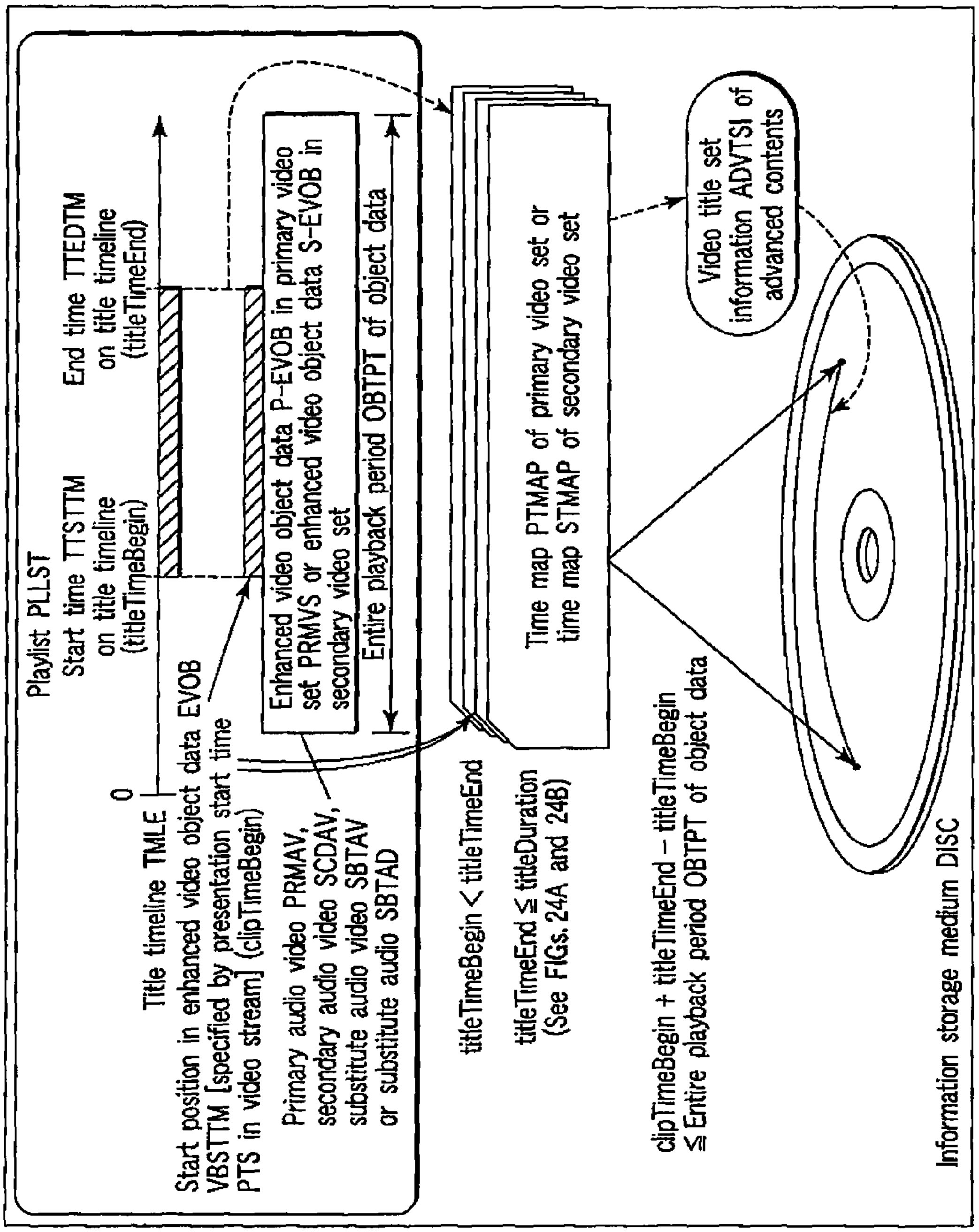
FIG. 53 is an exemplary view showing a relationship between various kinds of time information in object mapping information in a playlist.

A description will now be given as to time related information used for data in a primary audio video clip element PRAVCP tag and data in a secondary audio video clip element SCAVCP tag shown in FIGS. 54A and 54B, data in a substitute audio video clip element SBAVCP tag and data in a substitute audio clip element SBADCP tag shown in FIGS. 55A and 55B, data in an advanced subtitle segment element ADSTSG tag and data in an application segment element APPLSG tag depicted in FIGS. 56A and 56B with reference to FIG. 53.

In this embodiment, a display timing of each playback/display object for a user is written in a playlist file PLLST by using a display start time TTSTTM and an end time TTEDTM on a title timeline TMLE. The start time TTSTTM on the title timeline TMLE at this moment is written in the form of titleTimeBegin attribute information in object mapping information OBMAPI in the playlist file PLLST. Furthermore, likewise, the end time TTEDTM on the title timeline TMLE is written in the form of titleTimeEnd attribute information. Each of the start time TTSTTM and the end time TTEDTM on the title timeline TMLE in this embodiment is represented as a count number on the title timeline TMLE. As a method of displaying a time on the title timeline TMLE, an elapsed time from the start time on the title timeline TMLE is described as "HH:MM:SS:FF". That is, "HH" in the time display method means an hour unit, and a value from "00" to "23" is used. Moreover, "MM" represents a minute unit, and a numeric figure from "00" to "59" is used. Additionally, "SS" means a second unit, and a value from "00" to "59" is used. Further, "FF" means a frame rate. In case of 50 frames per second (50 fps: a PAL system), a count number from "00" to "49" is used as a value of "FF", and it is incremented as one second when "FF" reaches "50". Furthermore, when the frame rate is a 60 hertz system (60 fps; an NTSC system), a value from "00" to "59" is used for "FF" as a count value. In this case, it is regarded that one second has elapsed when a value of "FF" reaches 60, and carry to a value of second is performed. A start position in the playback/display object (the primary enhanced video object data P-EVOB, the secondary enhanced video object data S-EVOB or the like) which is started to be played back at the start time TTSTTM (titleTimeBegin) on the title timeline TMLE is represented as a start position VBSTTM (clipTimeBegin attribute information) on the enhanced video object data EVOB. A value of the start position VBSTTM (clipTimeBegin attribute information) on the enhanced video object data EVOB is described based on a presentation start time (a presentation time stamp value) PTS of a code frame in a video stream in the primary enhanced video object data P-EVOB (or the secondary enhanced video object data S-EVOB). As shown in FIG. 12, reference is made to a time map PTMAP of the primary video set or a time map STMAP of the secondary video set from the playlist PLLST, thereby accessing the enhanced video object EVOB through the time map PTMAP or STMAP. The time map PTMAP or STMAP is used to convert specified time information into relative address information in the enhanced video object EVOB. Therefore, specifying a value of the start position VBSTTM (clipTimeBegin attribute information) on the enhanced video object data EVOB based on the presentation start time (the presentation time stamp value) PTS as time information can obtain an effect of facilitating the access control.

Furthermore, an entire playback period OBTPT of the enhanced video object data P-EVOB of the primary video set PRMVS or the enhanced video object data S-EVOB of the secondary video set SCDVS as a playback/display object is defined. This embodiment defines the following conditions with respect to the four types of time information.

$$titleTimeBegin<titleTimeEnd$$

$$titleTimeEnd\leq titleDuration$$

Providing the conditions avoids the overflow of a display time and assures the easiness of time management control. Attribute information concerning titleDuration in the relational expression exists in the title element information TTELEM tag shown in FIGS. 24A and 24B, and means time length information of an entire title on the title timeline TMLE. Moreover, in this embodiment, a condition of a whole playback period OBTPT which is clipTimeBegin+titleTimeEnd−titleTimeBegin≤object data is also set. If the conditions are set, a playback time range specified on the title timeline TMLE does not go beyond the whole playback period OBTPT of the enhanced video object data EVOB, thereby guaranteeing stable playback/management. In regard to the enhanced video object data P-EVOB of the primary video set PRMVS or the enhanced video object data S-EVOB of the secondary video set as a playback/display object, reference is made to the time map file PTMAP of the primary video set PRMVS or the time map file STMAP of the secondary video set SCDVS as mentioned above (see FIG. 12). Information of the start position VBSTTM (clipTimeBegin attribute information) on the enhanced video object data EVOB is converted into physical address information indicative of a position on the information storage medium DISC where playback is started by making reference to the time map file PTMAP of the primary video set PRMVS or the time map file STMAP of the secondary video set. As a result, an optical head (not shown) existing in the information recording and playback unit 2 in the information recording and playback apparatus 1 shown in FIG. 1 directly accesses the specified address position on the information storage medium DISC, whereby playback can be started from the start position VBSTTM (clipTimeBegin attribute information) in the enhanced video object data EVOB. Further, when performing playback/display, information of a video title set information file ADVTSI of the advanced contents ADVCT can be utilized to set various kinds of conditions of the decoder engine DCDEN in the advanced content playback unit ADVPL.

Object mapping information OBMAPI has a display valid period of each of various playback/display objects on a title timeline TMLE. The display valid period means a period from a start time TTSTTM (titleTimeBegin) on a title timeline TMLE to an end time TTEDTM (titleTimeEnd) on the title timeline TMLE. When a plurality of primary audio video clip elements PRAVCP are written in the object mapping information OBMAPI on the title timeline TMLE, the primary audio video clip elements PRAVCP must not overlap each other on the title timeline TMLE. That is, in this embodiment, as shown in FIG. 37, there is only one main video decoder MVDEC corresponding to the primary audio video PRMAV. Therefore, when display periods of the plurality of primary audio video clip elements PRAVCP overlap each other on the title timeline TMLE, objects to be decoded in the main video decoder conflict with each other, and they cannot be stably played back. Therefore, setting the above-described conditions can assure stabilization of a display screen for a user. Likewise, in case of writing a plurality of secondary audio video clip elements SCAVCP in object mapping information OBMAPI on the title timeline TMLE, the respective secondary audio video clip elements SCAVCP must not overlap each other on the title timeline TMLE. The secondary audio video SCDAV managed by the secondary audio video clip element SCAVCP includes sub video SUBVD and sub audio SUBAD as shown in FIG. 10. As depicted in FIG. 37, since there is only one sub video decoder SVDEC which decodes the secondary audio video, when these elements overlap, a confusion occurs in the sub-video decoder SVDEC. Therefore, there is the restriction in order to stably display a moving image. When a plurality of substitute audio clip elements SBADCP exist on the object mapping information OBMAPI, valid periods of the respective substitute audio clip elements SBADCP must not overlap each other on the title timeline TMLE. When a plurality of substitute audio video clip elements SBAVCP exist in the object mapping information OBMAPI, likewise, valid periods of the respective substitute audio video clip elements SBAVCP must not overlap each other on the title timeline TMLE. Further, in this embodiment, a valid period of a primary audio video clip element PRAVCP on the title timeline TMLE must not overlap an valid period of a substitute audio video clip element SBAVCP on the title timeline TMLE. Furthermore, in this embodiment, likewise, valid periods of a substitute audio video clip element SBAVCP, a secondary audio video clip element SCAVCP and a substitute audio clip element SBADCP must not overlap each other on the title timeline TMLE. Setting these conditions can prevent playback/display objects to be displayed in each of various decoders from overlapping, and assure stability of a screen to be displayed for a user.

As another method of assuring stability of a screen to be displayed for a user, in this embodiment, the following ingenuities are exercised in order to decrease an access frequency of an optical head (not shown) existing in the information recording and playback unit 2 shown in FIG. 1. In FIGS. 54A, 54B, 55A and 55B, a storage position SRCTMP of a playback/display object is recorded in each of various clip element tags as src attribute information (source attribute information). In this embodiment, values of the src attribute information written in a plurality of clip elements having overlapping valid periods on the title timeline TMLE are restricted from being set in the information storage medium DISC in an overlapping manner. That is, when valid periods of the playback/display objects specified by the plurality of clip elements overlap on the title timeline TMLE, an access frequency on the same information storage medium DISC is increased, and the continuity in playing back the playback/display objects cannot be assured. Therefore, in this embodiment, not only the above-described conditions are set, but also the flowing ingenuities are exercised. That is, when display periods of a plurality of playback/display objects stored in the same information storage medium DISC overlap on the title timeline TMLE even though the above-described conditions are set, playback/display objects managed by clip elements other than the primary audio video clip element PRAVCP are temporarily stored in the data cache DTCCH in advance, and data is played back from the data cache. As a result, a frequency of access to the information storage medium DISC can be reduced, thereby assuring the continuity of playback.

In this embodiment, as contents of information written in a playlist file PLLST, there are configuration information CONFGI, medium attribute information MDATRI and title information TTINFO as shown in (a) of FIG. 23A. The title information TTINFO includes a first play title element FPTELE, title element information TTELEM concerning each title and a playlist application element PLAELE as shown in (b) in FIG. 23A, and the title element information TTELEM includes object mapping information OBMAPI, resource information RESRCI, playback sequence information PLSQI, track navigation information TRNAVI and a scheduled control information SCHECI as shown in (c) in FIG. 23A. In the object mapping information OBMAPI can be recorded a primary audio video clip element PRAVCP, a substitute audio video clip element SBAVCP, a substitute audio clip element SBADCP, a secondary audio video clip element SCAVCP, an advanced subtitle segment element ADSTSG and an application segment element APPLSG as shown in (c) of FIG. 24B. FIG. 54B (c) shows a detailed data configuration of the primary audio video clip element PRAVCP. As shown in FIG. 54A (b), a data configuration in a primary audio video clip element PRAVCP tag is constituted of ID information PRAVID of the primary audio video clip element PRAVCP and attribute information PRATRI of the primary audio video clip element PRAVCP. As shown in (c) of FIG. 54B, as to the ID information PRAVID of the primary audio video clip element PRAVCP, "id=" is written, and then the ID information PRAVID of the primary audio video clip element PRAVCP is written. Likewise, FIG. 54B (d) shows a specific data configuration of the secondary audio video clip element SCAVCP. A data configuration in a secondary audio video clip element SCAVCP is constituted of ID information SCAVID of the secondary audio video clip element SCAVCP and attribute information SCATRI of the secondary audio video clip element SCAVCP.

<PrimaryAudioVideoClip (Primary Audio Video Clip) Element>

PrimaryAudioVideoClip element is a Presentation Clip element for Primary Audio Video.

PrimaryAudioVideoClip element describes Object Mapping Information of Primary Audio Video, and Track Number Assignment of elementary streams in Primary Audio Video. PrimaryAudioVideoClip element refers a P-EVOB, or an Interleaved Block of P-EVOB as the Presentation Object. PrimaryAudioVideoClip element describes the mapping of the Presentation Object on a time period in Title Timeline and the Track Number Assignment of elementary streams in P-EVOB.

XML Syntax Representation of PrimaryAudioVideoClip Element:

```
<PrimaryAudioVideoClip
id = ID
dataSource = (Disc)
titleTimeBegin = timeExpression
clipTimeBegin = timeExpression
titleTimeEnd = timeExpression
src = anyURI
seamless = (true | false)
description = string
>
    Video *
    Audio *
    Subtitle *
    SubVideo ?
    SubAudio *
</PrimaryAudioVideoClip>
```

The src attribute describes a P-EVOB, or an Interleaved Block of P-EVOB is represented by this element. The titleTimeBegin and titleTimeEnd attribute describe the start time and end time of valid period of P-EVOB (or Interleaved Block of P-EVOB), respectively. The clipTimeBegin attribute describes the starting position of the P-EVOB.

The content of PrimaryAudioVideoClip is a list of Video element, Audio element, Subtitle element, SubVideo element and SubAudio element, which describe Track Number Assignment for elementary streams in P-EVOB.

If the PrimaryAudioVideoClip element refers to Interleaved Block of P-EVOB, Video element describes Track Number Assignment for an available angle number of an Interleaved Block of P-EVOB and an angle number shall be assigned to a P-EVOB in Interleaved Block. Otherwise at most one Video element can be present, the angle number attribute of the Video element shall be '1' and the video stream in VM_PCK of P-EVOB shall be assigned to Video Track number '1'.

Audio element describes which Audio stream in AM_PCK of P-EVOB is available and is assigned to Audio Track number.

Subtitle element describes which Sub-picture stream in SP_PCK of P-EVOB is available and is assigned to Subtitle Track number.

SubAudio element describes which Sub Audio stream in AS_PCK of P-EVOB is available and is assigned to Sub Audio Track number.

SubVideo element describes the availability of Sub Video stream in AV_PCK of P-EVOB. If SubVideo element is described, the Sub Video stream in P-EVOB is enabled and is assigned to Sub Video number '1'.

(a) dataSource Attribute

Describes the Data Source of Presentation Object. If the value is 'Disc' the P-EVOB shall be in Disc. If no dataSource attribute is presented, the dataSource shall be 'Disc'.

(b) titleTimeBegin Attribute

Describes the start time of the continuous fragment of the Presentation Object on the Title Timeline. The value shall be described in timeExpression value defined in Datatypes.

(c) titleTimeEnd Attribute

Describes the end time of the continuous fragment of the Presentation Object on the Title Timeline. The value shall be described in timeExpression value defined in Datatypes.

(d) clipTimeBegin Attribute

Describes the starting position in a Presentation Object. The value shall be described in timeExpression value defined in Datatypes. The attribute value shall be the presentation start time (PTS) of Coded-Frame of the video streams in P-EVOB (S-EVOB). The clipTimeBegin can be omitted. If no clipTimeBegin attribute is presented, the starting position shall be '00:00:00:00'.

(e) src Attribute

Describes the URI of the index information file of the Presentation Object to be referred.

(f) Seamless Attribute

Describes the seamless flag. If the value 'true' this and the one mapped directly before this satisfy the seamless conditions. The value shall be 'false' if the seamless condition is not satisfied. This attribute can be omitted. The default value is 'false'.

(g) Description Attribute

Describes additional information in the human consumable text form. This attribute can be omitted.

More intelligible explanations will be provided below.

As shown in FIG. 18, the primary audio video clip element means a playback/display clip element concerning primary audio video PRMAV. In the primary audio video clip element PRAVCP are written contents of object mapping information OBMAPI of the primary audio video PRMAV and track number assignment information of the primary audio video PRMAV. In the primary audio video clip element PRAVCP is written playback and display management information concerning a primary enhanced video object P-EVOB or an interleaved block of the primary enhanced video object P-EVOB as a playback/display object. Further, in the object mapping information OBMAPI are written a mapping status of a playback/display object (the primary enhanced video object P-EVOB) on a title timeline TMLE (see the part of the object mapping information OBMAPI in FIG. 17) and track number assignment information concerning various kinds of elementary streams in the primary enhanced video object P-EVOB. The "src attribute information (source attribute information)" in FIGS. 54B(c) and (d) means a storage position SRCTMP of an index information file (a time map file PTMAP of a primary video set) with respect to a playback/display object (primary enhanced video object data P-EVOB of the primary audio video PRMAV) managed by the PrimaryAudioVideoClip PRAVCP or a storage position SRCTMP of an index information file (a time map file STMAP of a secondary video set) with respect to a playback/display object (secondary enhanced video object S-EVOB of the secondary audio video SCDAV) managed by the SecondaryAudioVideoClip SCAVCP. The storage position SRCTMP of the index information file is written in accordance with a URI (uniform resource identifier) format.

In this embodiment, the storage position SRCTMP of the index information of a playback/display object which should be referred in the primary audio video clip element PRAVCP shown in (c) of FIG. 54B is not restricted to the above-described contents, and it is possible to set a storage position of an index information file (a time map PTMAP of a primary video set or a time map STMAP of a secondary video set) corresponding to primary enhanced video object data P-EVOB or an interleaved block of primary video enhanced video object data P-EVOB. That is, as shown in FIG. 18, a file name displayed as an index when played back/used in a primary audio video clip element PRAVCP is a time map file PTMAP of a primary video set, and a position where the time map file PTMAP of the primary video set is recorded is written in the "src attribute information". As shown in FIG. 53, a start time TTSTTM on a title timeline TMLE (titleTimeBegin attribute information) and an end time TTEDTM on the title timeline TMLE (titleTimeEnd attribute information) represents a start time and an end time of a valid period of the primary enhanced video object data P-EVOB or (an interleaved block of) the primary enhanced video object data P-EVOB, respectively. Further, a start position VBSTTM in enhanced video object data EVOB (clipTimeBegin attribute information) means a start position VBSTTM of primary enhanced video object data P-EVOB in a primary video set PRMVS, and it is represented as a presentation start time (a presentation time stamp value) PTS of a video stream existing in the primary enhanced video object data P-EVOB (see FIG. 53). The three types of time information are represented as "HH:MM:SS:FF" in a primary audio video clip element PRAVCO, and written in the form of "hour:minute:second: field (the number of frames)". As shown in FIG. 10, primary audio video PRMAV includes main video MAMVD, main audio MANAD, sub video SUBVD, sub audio SUBAD and sub-picture SUBPT. In accordance with this structure, a primary audio video clip element PRAVCP is constituted of a list of a main video element MANVD, a main audio element MANAD, a subtitle element SBTELE, a sub video element SUBVD and a sub audio element SBAD. Furthermore, the list also includes track number assignment information (track number setting information for each elementary stream) in primary enhanced video object data P-EVOBS. In this embodiment, when a plurality of sets of picture information for respective angles corresponding to multi-angle or the like are present and recorded in the information storage medium DISC, information of the primary enhanced video object data is stored in the form of an interleaved block. When management information is recorded with respect to the primary enhanced video object data P-EVOB constituting an interleaved block by the primary audio video clip element PRAVCP, a track number assignment (a track number) setting method is written in the main video element MANVD in regard to angle number information which can be indicated in the interleaved block. That is, as will be described later, an angle number (angle number information ANGLNM (angleNumber attribute information) selected in the interleaved block shown in (c) of FIG. 59C) is defined in tag information corresponding to a main video element, and it is possible to associate an angle number which should be indicated in the tag information of the main video element MANVD. The main audio element MANAD indicates which an audio stream (AM_PCK) in the primary enhanced video object data P-EVOB can be played back, and such a stream is set based on an audio track number. Moreover, the subtitle element SBTELE indicates which sub-picture stream (SP_PCK) in the enhanced video object data P-EVOB can be played back, and this stream is set based on a subtitle track number. Additionally, the sub audio element SUBAD indicates whether which sub-picture stream (SP_PCK) in the primary enhanced video object data P-EVOB can be played back, and this stream is set based on a sub-audio track number. Further, the sub video element SUBVD also indicates the possibility of display of a sub-video stream (VS_PCK) in the primary enhanced video object data P-EVOB. If the sub video element SUBVD is written in object mapping information OBMAPI in the playlist file PLLST, a sub video stream in the enhanced video object data P-EVOB of the primary video set PRMVS can be played back. In such a case, this stream is set to a sub-video number "1".

A description will now be given as to data in primary audio video clip element attribute information PRATRI. As shown in (c) of FIG. 54B, each information is written immediately after "dataSource=", "titleTimeBegin=", "clipTimeBegin=", "titleTimeEnd=", "src=", "seamless=" and "description=". As shown in FIG. 18, the primary audio video PRMAV is recorded in the information storage medium DISC. In accordance with this structure, as a value of a data source DTSORC in which a playback/display object is recorded, "Disc" must be written. When "Disc" is recorded as a value of the data source DTSORC in which the playback/display object is recorded, primary enhanced video object data P-EVOB of corresponding primary audio video PRMAV is recorded in the information storage medium DISC. The description of the data source DTSORC in which the playback/display object is recorded can be eliminated in the primary audio video clip element. However, if information of the data source DTSORC in which the playback/display object is recorded is not written, it is considered that information "Disc" is written in regard to the corresponding data source DTSORC in which the playback/display object is recorded. Further, as shown in FIG. 53, the start time TTSTTM (titleTimeBegin) on the title timeline TMLE and the start position VBSTTM (clipTimeBegin) in the enhanced video object data represent times synchronized with each other on a time axis. That is, a correspondence relationship between the start time TTSTTM (titleTimeBegin) on the title timeline TMLE expressed as a frame count number based on the notation method of "HH:MM:SS:FF" and the start position VBSTTM in the enhanced video object data EVOB represented as a presentation start time (a presentation time stamp value) PTS can be obtained from the above-described information. Therefore, the above-described relationship can be utilized to convert an arbitrary time on the title timeline TMLE in a valid period from the start time TTSTTM (titleTimeBegin) to the end time TTEDTM (titleTimeEnd) on the title timeline into a presentation start time (a presentation time stamp value) PTS in a video stream of the enhanced video object data EVOB. In the primary audio video clip element PRAVCP, information of the start position VBSTTM (clipTimeBegin) in the enhanced video object data EVOB can be eliminated. If the description of the start time VBSTTM (clipTimeBegin) in the enhanced video object data EVOB is eliminated, playback is started from a leading position of the primary enhanced video object data file P-EVOB in the primary video set PRMVS. In this embodiment, a description of additional information concerning the PrimaryAudioVideoClip can be eliminated in the primary audio video clip element tag. Furthermore, seamless flag information (seamless attribute information) means information indicative of whether seamless playback (continuous playback without interruption) of the primary audio video PRMAV managed by the primary audio video clip element PRAVCP can be guaranteed. If the value is "true", this guarantees that continuous smooth playback of pictures can be performed without interruption at boundaries between these pictures when playback of the primary audio video PRMAV mapped on the title timeline TMLE immediately before playback is directly switched to playback of different primary audio video PRMAV managed by the primary audio video clip element PRAVCP. Moreover, if the value is "false", this means that continuous playback (seamless conditions) at the boundaries is not satisfied. The description of the seamless flag information SEAMLS (seamless attribute information) can be eliminated. In such a case, the value "false" as a default value is automatically set.

This embodiment is characterized in that information written in each clip element tag in object mapping information OBMAPI is all equally written with "ID=ID information" being placed at a top position (see FIGS. 55A and 55B/FIGS. 56A and 56B). As a result, not only a plurality of same clip elements can be set in the same object mapping information OBMAPI (the same clip elements can be identified from each other based on the "ID information"), but also the respective clip elements can be easily identified by using the playlist manager PLMNG (see FIG. 28), thereby obtaining an effect of shortening a startup time before playback is started. Moreover, as shown in FIG. 82, the "ID information" can be used to specify a necessary clip element based on an API command, thereby facilitating API command processing. At the same time, this embodiment is also characterized in that, in all of information written in respective clip element tags in the object mapping information OBMAPI, "description=additional information" is written at the last position (see FIGS. 55A and 55B/FIGS. 56A and 56B). As a result, there can be obtained an effect of facilitating retrieval of "additional information" for each clip element by the playlist manager PLMNG (see FIG. 28). Additionally, in this embodiment, "titleTimeBegin=[a start time TTSTTM on a title timeline]" is first written in all of information written in each clip element tag in the object mapping information OBMAPI irrespective of a type of the clip element tag, and "titleTimeEnd=[an end time TTEDTM on a title timeline]" is arranged behind this data, whereby "clipTimeBegin=[a start time VBSTTM from a leading position in enhanced video object data]" can be inserted and arranged between these descriptions depending on each clip element tag. The description order with respect to the three types of time information are equally used in all clip element tags in this manner, thereby achieving facilitation and speedup of retrieval of relevant information in each clip element by the playlist manager PLMNG (see FIG. 28).

<SecondaryAudioVideoClip (Secondary Audio Video Clip) Element>

SecondaryAudioVideoClip element is a Presentation Clip element for Secondary Audio Video. Secondary Audio Video is in S-EVOB of Secondary Video Set, which contains Sub Audio and Sub Video.

SecondaryAudioVideoClip element describes Object Mapping Information of Secondary Audio Video in a Title, and Track Number Assignment of elementary streams in an S-EVOB of Secondary Audio Video.

Secondary Audio Video can be Disc content, network streaming, or pre-downloaded content on Persistent Storage, or File Cache.

XML Syntax Representation of SecondaryAudioVideoClip Element:

```
<SecondaryAudioVideoClip
id = ID
dataSource = (Disc | P-Storage | Network |
File Cache)
titleTimeBegin = timeExpression
clipTimeBegin = timeExpression
titleTimeEnd = timeExpression
src = anyURI
preload = timeExpression
sync = (hard | soft | none)
noCache = (true | false)
description = string
>
    NetworkSource *
    SubVideo ?
    SubAudio *
</SecondaryAudioVideoClip>
```

The src attribute describes which S-EVOB of Secondary Audio Video represented by this element. The titleTimeBegin and titleTimeEnd attribute describe the start time and end time of valid period of S-EVOB, respectively. The clipTimeBegin attribute describes the starting position of the S-EVOB.

Secondary Audio Video can be exclusively used with Sub Video and Sub Audio in Primary Video Set. Thus, in the valid period of SecondaryAudioVideoClip element, Sub Video and Sub Audio in Primary Video Set shall be treated as disabled.

The content of SecondaryAudioVideoClip element consists of SubVideo element and SubAudio element, which describe Track Number Assignment for elementary streams in S-EVOB. At least one of SubVideo element, or SubAudio element shall be described.

Sub Video Track number shall be '1'.

If SecondaryAudioVideoClip element with SubVideo element is present, Sub Video stream in VS_PCK of S-EVOB is available and shall be decoded by Secondary Video Decoder.

If SecondaryAudioVideoClip element with SubAudio element is present, Sub Audio stream in AS_PCK of S-EVOB is available and shall be decoded by Secondary Video Decoder.

NetworkSource element can be presented in this element, if and only if the dataSource attribute value is 'Network' and URI scheme of src attribute value of parent element is 'http', or 'https'. NetworkSource element describes the streaming source to be selected according to network throughput setting.

(a) dataSource Attribute

Describes the Data Source of Presentation Object. If the value is 'Disc' the S-EVOB shall be in Disc. If the value is 'P-Storage' the S-EVOB shall be in Persistent Storage as pre-downloaded content. If the value is 'Network' the S-EVOB shall be supplied as streaming from a network server. If the value is 'FileCache' the S-EVOB shall be supplied in File Cache. If no dataSource attribute is presented, the dataSource shall be 'P-Storage'.

(b) titleTimeBegin Attribute

Describes the start time of the continuous fragment of the Presentation Object on the Title Timeline. The value shall be described in timeExpression value defined in Datatypes.

(c) titleTimeEnd Attribute

Describes the end time of the continuous fragment of the Presentation Object on the Title Timeline. The value shall be described in timeExpression value defined in Datatypes.

(d) clipTimeBegin Attribute

Describes the starting position in a Presentation Object. The value shall be described in timeExpression value defined in Datatypes. The attribute value shall be the presentation start time (PTS) of Coded-Frame of the video streams in P-EVOB (S-EVOB). The clipTimeBegin can be omitted. If no clipTimeBegin attribute is presented, the starting position shall be '00:00:00:00'.

(e) src Attribute

Describes the URI of the index information file of the Presentation Object to be referred.

(f) Preload Attribute

Describes the time, on Title Timeline, when Player shall be start prefetching the Presentation Object. This attribute can be omitted.

(g) Sync Attribute

If sync attribute value is 'hard', the Secondary Audio Video is Hard-synchronized Object. If sync attribute value is 'soft', it is Soft-synchronized Object. If sync attribute value is 'none', it is Non-synchronized Object. This attribute can be omitted. Default value is 'soft'.

(h) noCache Attribute

If noCache attribute value is 'true' and dataSource attribute value is 'Network', the 'no-cache' directive shall be included in both Cache-Control and Pragma in HTTP request for the Presentation Object. If noCache attribute value is 'false' and dataSource attribute value is 'Network', 'no-cache' directive shall be included in neither Cache-Control, nor Pragma header. If dataSource attribute value is not 'Network', the noCache attribute shall be absent. The noCache attribute can be omitted. Default value is 'false'.

Description Attribute (i) Describes additional information in the human consumable text form. This attribute can be omitted.

More intelligible explanations will be provided below.

A data configuration in a secondary audio video clip element SCAVCP tag shown in (d) of FIG. 54B will now be described hereinafter. As shown in FIG. 18, the secondary audio video clip element SCAVCP represents a playback/display clip element with respect to secondary audio video SCDAV. The secondary audio video SCDAV exists in secondary enhanced video object data S-EVOB of a secondary video set SCDVS, and includes a sub video stream SBVD and a sub audio stream SUBAD. The secondary audio video clip element SCAVCP represents object mapping information OBMAPI of the secondary audio video SCDAV. At the same time, the secondary audio video clip element SCAVCP also represents track number assignment information of each elementary stream in the secondary enhanced video object data S-EVOB of the secondary audio video SCDAV. As shown in FIG. 18, the secondary audio video SCDAV can be recorded in the information storage medium DISC, the persistent storage PRSTR, the network server NTSRV and the file cache FLCCH. Therefore, not only the secondary audio video SCDAV can be recorded in the information storage medium DISC or the network server NTSR, but also it may be previously downloaded in the persistent storage PRSTR or the file cache FLCCH. SRC attribute information (source attribute information) shown in (d) of FIG. 54B is indicative of a storage position SRCTMP of an index information file concerning the secondary enhanced video object data S-EVOB. As shown in FIG. 18, a file (an index information file) to which reference is made as an index when playing back/using the secondary audio video SCDAV means a time map file STMAP in a secondary video set. Additionally, information of a start time TTSTTM (titleTimeBegin) on a title timeline and information of an end time TTEDTM (titleTimeEnd) on the title timeline represent a start time and an end time in a valid period of the secondary enhanced video object data S-EVOB, respectively. Further, as shown in FIG. 53, a start position VBSTTM (clipTimeBegin) in the enhanced video object data indicates a start position of the secondary enhanced video object data S-EVOB in the form of time information. The three types of time information are likewise represented in the form of "hour:minute:second: field (the number of frames)" which is "HH:MM:SS:FF" in the secondary audio video clip element SCAVCP. The sub video SUBVD and the sub audio SUBAD in the secondary audio video SCDAV are selectively used with respect to the sub video SUBVD and the sub audio SUBAD in the primary audio video set, and they cannot be simultaneously played back. Either the sub video SUBVD or the sub audio SUBAD alone can be played back. Therefore, in the object mapping information OBMAPI, valid periods of the sub video SUBVD and the sub audio SUBAD in the primary video set PRMVS on the title timeline TMLE and valid periods written in the secondary audio video clip element SCAVCP must be arranged in such a manner that these valid periods do not overlap each other on the title timeline TMLE. Setting a limit on the object mapping information OBMAPI in this manner can avoid a conflict of playback/display processing in the advanced content playback unit and stably display images to a user. The secondary audio video clip element SCAVCP includes a sub video element SUBVD and a sub audio element SUBAD. Furthermore, the sub video element SUBVD and the sub audio element SUBAD in the secondary audio video clip element SCAVCP are indicative of track number assignment information with respect to each elementary stream in the secondary video set enhanced video object data S-EVOB. As shown in FIG. 10, the sub video SUBVD and the sub audio SUBAD can be included in the secondary audio video SECDAV. On the other hand, in this embodiment, at least one sub video element SUBVD or one sub audio element SUBAD alone can be written in the secondary audio video clip element SCAVCP. Moreover, in this embodiment, "1" must be set to both a sub video track number and a sub audio track number. When the sub video element SUBVD is written in the secondary audio video clip element SCAVCP, this means that a sub video stream exists in VS_PCK (a secondary video pack) in the secondary enhanced video object data S-EVOB, and the sub video stream must be subjected to record processing by the secondary video recorder (see FIG. 37). Additionally, likewise, when the sub audio element SUBAD is written in the secondary audio video clip element SCAVCP, this means that a sub audio stream is included in AS_PCK (a secondary audio pack) of the secondary enhanced video object data S-EVOB, and this sub audio stream must be subjected to record processing by a decoder (see FIG. 37) corresponding to the secondary video player SCDVP. Contents of data source attribute information indicative of a data source DTSORC in which a playback/display object is recorded means the network server NTSRV. When "dataSource=Network" is written, a network source element NTSELE must be written in the secondary audio video clip element SCAVCP. Further, as a value of src attribute information indicative of an index information file storage position SRCTMP of the display/playback object which should be referred at this time, a value of address information starting from "http" or "https" must be written. Contents of a streaming source which should be selected in accordance with a throughput (a data transfer rate) of the network are written in the network source element NTSELE. As a result, there can be obtained an effect that optimum picture information can be provided to a user in accordance with a network environment (a network transfer speed) of the user. Information of one of "Disc", "P-Storage", "Network" and "FileCache" is written behind "dataSource=" in data source attribute information in which contents of a data source DTSORC having a playback/display is recorded therein is written. If "Disc" is written as this value, the secondary enhanced video object data S-EVOB must be recorded in the information storage medium DISC. If this value is written as "P-Storage", this means that the secondary enhanced video object data S-EVOB is recorded in the persistent storage PRSTR. If "Network" is written as a value of the data source attribute information, this means that the secondary enhanced video object data S-EVOB is streaming supplied from the network server NTSRV. Furthermore, if "FileCache" is written as a value of the data source attribute information, this means that information of the secondary enhanced video object data S-EVOB is stored in the file cache FLCCH. In this embodiment, the description of the src (source) attribute information can be eliminated, but a value of "P-Storage" as a default value is automatically set in such a case (which means that the data source DTSORC in which a playback/display object is recorded is stored in the persistent storage PRSTR).

In this embodiment, the description of information of a start position VBSTTM (clipTimeBegin) in the enhanced video object data can be eliminated. If the description of information of the start position VBSTTM (clipTimeBegin) in the enhanced video object data is eliminated, this means that playback is started from a leading position of the secondary enhanced video object data S-EVOB. Information is written in the src attribute information in which an index information file storage position SRCTMP of a playback/display objected to be referred is recorded in the form of an URI (a uniform resource identifier). As shown in FIG. 12 or 18, reference is made to a time map file STMAP in a secondary video set from a playlist file PLLST with respect to the secondary enhanced video object S-EVOB. Therefore, in this embodiment, a storage position SRCTMP of an index information file of a playback/display object to be referred means a storage position of a time map file STMAP in the secondary video set. Then, information (preload attribute information) of a time PRLOAD on a title timeline at which fetching a playback/display object is started is indicative of a time on the title timeline TMLE at which the advanced content playback unit ADVPL starts fetching the playback/display object (see FIG. 35A). Moreover, in this embodiment, the description of this information can be eliminated. Additionally, as a value of sync (synchronization) attribute information indicative of synchronization attribute information SYNCAT of a playback/display object, it is possible to select one of three types, i.e., "hard", "soft" and "none" in a secondary audio video clip element tag SCAVCP. If "hard" is selected as this value, this means that the secondary audio video SCDAV is a hard synchronization object. If this value is set, time progress on the title timeline TMLE is temporarily stopped (a period in which a screen pause state is displayed for a user starts) and time progress on the title timeline TMLE is restarted after completion of loading the secondary audio video SCDAV in the data cache DTCCH when loading is not completed even though a start time TTSTTM (titleTimeBegin) on the title timeline of the corresponding secondary audio video SCDAV has come. Further, if a value of the synchronization attribute information (src attribute information) is "soft", this means a soft synchronization object. If this value is set, time progress on the title time line TMLE advances without displaying the secondary audio video SCDAV and playback of the secondary audio video SCDAV is started only after completion of loading the secondary audio video SCDAV in the data cache DTCCH (at a time behind a start time TTSTTM on the title timeline) when loading is not completed even though the start time TTSTTM (titleTimeBegin) on the title timeline of the corresponding secondary audio video SCDAV has come. If a value of the sync attribute information is "none", this means that the secondary enhanced video object data S-EVOB is not synchronized with the title timeline TMLE and playback is carried out in an asynchronous state. The description of the sync attribute information SYNCAT can be eliminated in the secondary audio video clip element SCAVCP tag, and the sync attribute information value is set to "soft" which is a default value if the description is eliminated. As no-cache attribute information indicative of no-cache attribute information NOCACH, a value which is either "true" or "false" is written. The no-cache attribute information NOCACH is information concerning a communication protocol of HTTP. If this value is "true", this means that a Cash-Control header and a Pragma header must be included in a GET request message of HTTP. In description attribute information indicative of additional information concerning a secondary audio video clip element SCAVCP is written data in a text format which is often used by a user. The description of the additional information can be eliminated in the secondary audio video clip element SCAVCP.

As shown in (a) of FIG. 23A, configuration information CONFGI, media attribute information MDATRI and title information TTINFO exist in a playlist file PLLST. As shown in (b) of FIG. 23A, title element information TTELEM exists with respect to each of one or more titles in the title information TTINFO. As shown in (c) of FIG. 23A, object mapping information OBMAPI, resource information RESRCI, playback sequence information PLSQI, track navigation information TRNAVI and scheduled control information SCHECI exist in the title element information corresponding to one title. As shown in FIGS. 55A and 55B, a substitute audio video clip element SBAVCP and a substitute audio clip element SBADCP exist in the object mapping information OBMAPI. A data configuration in the substitute audio video clip element SBAVCP shown in (c) of FIG. 55B will now be described hereinafter.

<SubstituteAudioVideoClip (Substitute Audio Video Clip) Element>

SubstituteAudioVideoClip element is a Presentation Clip element for Substitute Audio Video. Substitute Audio Video is in S-EVOB of Secondary Video Set, which contains Audio and Video.

SubstituteAudioVideoClip element describes Object Mapping Information of Substitute Audio Video in a Title, and Track Number Assignment of elementary streams in an S-EVOB of Substitute Audio Video.

Substitute Audio Video can be Disc content, network streaming, or pre-downloaded content on Persistent Storage, or File Cache.

XML Syntax Representation of SubstituteAudioVideoClip Element:

```
<SubstituteAudioVideoClip
id = ID
dataSource = (Disc | P-Storage | Network |
FileCache)
titleTimeBegin = timeExpression
clipTimeBegin = timeExpression
```

-continued

```
titleTimeEnd = timeExpression
src = anyURI
preload = timeExpression
sync = (hard | none)
noCache = (true | false)
description = string
>
    NetworkSource *
    Video ?
    Audio *
</SubstituteAudioVideoClip>
```

The src attribute describes which S-EVOB of Substitute Audio Video represented by this element. The titleTimeBegin and titleTimeEnd attribute describe the start time and end time of valid period of S-EVOB, respectively. The clipTimeBegin attribute describes the starting position of the S-EVOB.

The content of SubstituteAudioVideoClip element contains Video element and Audio element, which describe Track Number Assignment for elementary streams in S-EVOB.

If Video element is present in SubstituteAudioVideoClip element, Video stream in VM_PCK of S-EVOB is available and is assigned to the specified Video Track number.

If Audio element is present in SubstituteAudioVideoClip element, Audio stream in AM_PCK of S-EVOB is available and is assigned to the specified Audio Track number.

NetworkSource element can be presented in this element, if and only if the dataSourceattribute value is 'Network' and URI scheme of src attribute value of parent element is 'http', or 'https'. NetworkSource element describes the streaming source to be selected according to network throughput setting.

(a) dataSource Attribute

Describes the Data Source of Presentation Object. If the value is 'Disc' the S-EVOB shall be in Disc. If the value is 'P-Storage' the S-EVOB shall be in Persistent Storage as pre-downloaded content. If the value is 'Network' the S-EVOB shall be supplied as streaming from a network server. If the value is 'File Cache' the S-EVOB shall be supplied in File Cache. If no dataSource attribute is presented, the dataSource shall be 'P-Storage'.

(b) titleTimeBegin Attribute

Describes the start time of the continuous fragment of the Presentation Object on the Title Timeline. The value shall be described in timeExpression value defined in Datatypes.

(c) titleTimeEnd Attribute

Describes the end time of the continuous fragment of the Presentation Object on the Title Timeline. The value shall be described in timeExpression value defined in Datatypes.

(d) clipTimeBegin Attribute

Describes the starting position in a Presentation Object. The value shall be described in timeExpression value defined in Datatypes. The attribute value shall be the presentation start time (PTS) of Coded-Frame of the video streams in P-EVOB (S-EVOB). The clipTimeBegin can be omitted. If no clipTimeBegin attribute is presented, the starting position shall be '00:00:00:00'.

(e) src Attribute

Describes the URI of the index information file of the Presentation Object to be referred.

(f) Preload Attribute

Describes the time, on Title Timeline, when Player shall be start prefetching the Presentation Object. This attribute can be omitted.

(g) Sync Attribute

If sync attribute value is 'hard', the Substitute Audio Video is Hard-synchronized Object. If sync attribute value is 'none', it is Non-synchronized Object. This attribute can be omitted. Default value is 'hard'.

(h) noCache Attribute

If noCache attribute value is 'true' and dataSource attribute value is 'Network', the 'no-cache' directive shall be included in both Cache-Control and Pragma in HTTP request for the Presentation Object. If noCache attribute value is 'false' and dataSource attribute value is Network', 'no-cache' directive shall be included in neither Cache-Control, nor Pragma header. If dataSource attribute value is not 'Network', the noCache attribute shall be absent. The noCache attribute can be omitted. Default value is 'false'.

(i) Description Attribute

Describes additional information in the human consumable text form. This attribute can be omitted.

More intelligible explanations will be provided below.

As shown in FIG. 18, a playback/display clip element concerning the substitute audio video SBTAV is referred to as a substitute audio video clip SBAVCP. As shown in FIG. 10, the substitute audio video SBTAV is included in a secondary video set SCDVS, and information of main video MANVD and main audio MANAD is included in the substitute audio video SBTAV. The substitute audio video clip element SBAVCP is indicative of object mapping information OBMAPI concerning the substitute audio video SBTAV in a title. Moreover, the substitute audio video clip element SBAVCP also indicates track number assignment information concerning each elementary stream included in secondary enhanced video object data S-EVOB of the substitute audio video SBTAV. As shown in FIG. 18, the substitute audio video SBTAV can be recorded in the information storage medium DISC, the persistent storage PRSTR, the network server NTSRV or the file cache FLCCH as an original storage position. A file name which is referred as an index when playing back/using the secondary enhanced video object data S-EVOB as a playback object concerning the substitute audio video SBTAV is a time map file STMAP in a secondary video set. Therefore, as src attribute information (source attribute information) written in the substitute audio video clip SBAVCP tag, information of the storage position SRCTMP where the time map file STMAP in the secondary video set is recorded is written in a URI (a uniform resource identifier) format. As shown in (b) of FIG. 55A, a main video element MANVD and a main audio element MANAD are included in the substitute audio video clip element SBAVCP. An explanation concerning track number assignment information (track number setting information) of each elementary stream in corresponding secondary enhanced video object data S-EVOB is written in each of the main video element MANVD and the main audio element MANAD in the substitute audio video clip element SBAVCP. If the description concerning the main video element MANVD exists in the substitute audio video clip element, this means that a video stream in a main video pack VM_PCK in the secondary enhanced video object data S-EVOB exists and the video element stream can be played back. Further, at the same time, a specified video track number is set in accordance with each video stream in the main video pack VM_PCK of the secondary enhanced video object data S-EVOB. Furthermore, if a description concerning the main audio element MANAD exists in the substitute audio video clip element SBAVCP, this means that an audio stream exists in a main audio pack VM_PCK of the secondary enhanced video object data and the audio stream can be played back. Moreover, a specified audio track number is set with respect to each audio stream in the main audio pack AM_PCK of the secondary enhanced video object data S-EVOB. Additionally, when "Network" is specified as a value of a data source DTSORC (dataSource attribute information) in which a playback/display object in the substitute audio video clip element SBAVCP shown in (c) of FIG. 55B is recorded, a description of a network source element NTSELE exists in the substitute audio video clip element SBAVCP as shown in (b) of FIG. 55A. Additionally, when a value of the data source DTSORC in which a playback/display object is recorded is "Network", address information (a path) in which a value of an index information file storage position SRCTMP (SRC attribute information) of a playback/display object to be referred starts from "http" or "https" and a file name are written. Further, as shown in (c) of FIG. 63B, a streaming source (contents of the main video MANVD or the main audio MANAD in the substitute audio video SBTAV) selected based on a throughput (an allowable minimum value of a data transfer rate in a network path) of a specified network is written in the network source element NTSELE. As a result, it is possible to load an optimum data source (the main video MANVD or the main audio MANAD) based on a network path of a user (e.g., a data transfer rate varies depending on each network path using an optical cable/ADSL, a modem or the like). For example, in a network environment where high-speed data communication can be established by using an optical cable, a picture with a high resolution can be transferred as the main video MANVD. Furthermore, on the contrary, in case of a network environment using a modem (a telephone line) or the like where a data transfer rate is low, a very long download time is required when downloading a picture with a high resolution as the main video MANVD. Therefore, in case of a network environment using the modem or the like where a data transfer rate is low, the main video MANVD having a greatly lowered resolution can be downloaded. Selecting data or a file as a download target corresponding to a plurality of network source elements NTSELE can download a network source perfect for a network environment of a user. A data source DTSORC (dataSource attribute information) in which a playback/display object is recorded represents a territory of a position where a data source of substitute audio video SBTAV as a playback/display object is recorded. As shown in FIG. 18, as a position where the substitute audio SBRAV is originally recorded, there is the information storage medium DISC, the persistent storage PRSTR, the network server NTSRV or the file cache FSCCH. In accordance with this structure, one of "Disc", "P-Storage", "Network" and "FileCache" is written as a value of the data source DTSORC in which the playback/display object is recorded. If "Disc" is set as a value of the data source DTSORC in which the playback/display object is recorded, this means that secondary enhanced video object data S-EVOB is recorded in the information storage medium DISC. Moreover, if a value of the data source DTSORC in which the playback display object is recorded is "P-Storage", the secondary enhanced video object data S-EVOB must be recorded in the persistent storage PRSTR as previously downloaded contents. If a value of the data source DTSORC in which the playback/display object is recorded is "Network", the secondary enhanced video object data S-EVOB must be supplied as streaming from the network server NTSRV. Additionally, if a value of the data source DTSORC in which the playback/display object is recorded is "FileCache", the corresponding secondary enhanced video object data S-EVOB must be supplied to the file cache FLCCH. If a value of the data source DTSORC in which the playback/display object is recorded is not written in attribute information SVATRI of the substitute audio video clip element, "P-Storage" which is a default value is automatically set as a value of the data source DTSORC in which the playback/display object is recorded. A start time TTSTTM (titleTimeBegin attribute information) on a title timeline and an end time TTEDTM (titleTimeEnd attribute information) on the title timeline represent a start time TTSTTM and an end time TTEDTM of substitute audio video SBTAV (the secondary enhanced video object data S-EVOB) as a playback/display object on the title timeline TMLE, respectively. Additionally, these times are represented as time information in the form of "HH:MM:SS:FF". The start position VBSTTM in the enhanced video object data represents a position in the secondary enhanced video object data S-EVOB (substitute audio video SBTAV) where display starts in accordance with the start time TTSTTM (titleTimeBegin) on the title timeline as shown in FIG. 53, and its value is specified based on a presentation start time (a presentation time stamp value) PTS of a video stream in the secondary enhanced video object S-EVOB. A correspondence relationship between a value of the start position TTSTTM on the title timeline and the start position VBSTTM in the enhanced video object data EVOB can be utilized to calculate the presentation start time (the presentation time stamp value) PTS in the video stream from a value on the title timeline TMLE at an arbitrary position in a valid period. The description of the information of the start position VBSTTM in the enhanced video object data EVOB can be eliminated in the substitute audio video clip element SBAVCP. When the description of the start position VBSTTM in the enhanced video object data is eliminated in attribute information SVATRI of the substitute audio video clip element in this manner, playback is started from a leading position of the corresponding secondary enhanced video object data S-EVOB. A storage position SRCTMP (SRC attribute information) of an index information file at which substitute audio video SBTAV (a secondary enhanced video object S_EVOB) as a playback/display object should be referred is written in a URI (a uniform resource identifier) format. As shown in FIG. 18, a file which is referred as the index is indicative of a position at which a time map file STMAP in a secondary video set is recorded. Further, a time PRLOAD (preload attribute information) on a title timeline at which fetching a playback/display object is started is set to a time which is the same as the start time TTSTTM on the title timeline or a preceding time, and is indicative of a loading start time when the substitute audio SBTAD is loaded in the data cache DTCCH before displaying it to a user. The description of the time PRLOAD on the title timeline at which fetching the playback/display object is started can be eliminated from the attribute information SVATRI of the substitute audio video clip element. Furthermore, one of "hard" and "none" is set as a value of synchronization attribute information SYNCAT (sync attribute information) of a playback/display object. If the value is "hard", the corresponding substitute audio video SBTAV represents a hard synchronized object. A description will now be given as to a case where new substitute audio video SBTAV must be loaded in the data cache DTCCH when displaying moving images for a user. In this case, the substitute audio video SBTAV is loaded to the data cache DTCCH from the time PRLOAD on the title timeline at which fetching a playback/display object is started. When loading is completed before the start time TTSTTM on the title timeline or the substitute audio video SBTAV can be continuously played back/displayed until the end time TTEDTM on the title timeline even during loading, playback/display of the substitute audio video SBTAV is started from the start time TTSTTM on the title timeline. On the contrary, when the loading processing cannot be finished in time or a value of synchronization attribute information SYNCAT of a playback/display object is set as "hard", time progress (count-up) on the title timeline TMLE is temporarily stopped, and moving images are held in a still state for a user. Meanwhile, loading the substitute audio video SBTAV in the data cache DTCCH is continued. When the loading processing into the data cache DTCCH is completed or when the substitute audio video SBTAV has reached a continuous playback/display enabled state until the end time TTEDTM on the title timeline even during loading, time progress (count-up) on the title timeline TMLE is restarted, moving images displayed for a user start moving, and synchronization processing of displaying the substitute audio video SBTAV for a user is began. Furthermore, when the synchronization attribute information SYNCAT of the playback/display object is "none", this means an asynchronous object, and the substitute audio SBTAD is displayed for a user independently from progress on the title timeline TMLE (in an asynchronous state). The description of the synchronization information SYNCAT of the playback/display object can be eliminated from the attribute information SVATRI of the substitute audio video clip element. In this case, "hard" as a default value is automatically set. Moreover, no-cache attribute information NOCACH is information concerning a communication protocol of HTTPT, and one of values "true" and "false" is set. In case of "true", a Cach-Control header and a Pragma header must be included in a GET request message of HTTP. Additionally, when a value of the data source DTSORC in which the playback/display object is recorded is written as "Network" and the no-cache attribute information NOCACH is specified as "false", this means that the Cach-Control header and the Pragma header are not included in the GET request message of HTTP. Further, the description of the no-cache attribute information NOCACH can be eliminated, but "false" as a default value is automatically set in this case. Additional information concerning a SubstituteAudioVideoClip is written in a text format familiar to users. Furthermore, a description of the additional information concerning the substitute audio video clip SBAVCP can be eliminated.

<SubstituteAudioClip (Substitute Audio Clip) Element>

SubstituteAudioClip element is a Presentation Clip element for Substitute Audio. Substitute Audio is in S-EVOB of Secondary Video Set and is a Main Audio selectable with Main Audio(s) in Primary Video Set.

SubstituteAudioClip element describes Object Mapping Information of Substitute Audio in a Title, and Track Number Assignment of elementary streams in an S-EVOB of Substitute Audio. Substitute Audio can be supplied from Disc, Network as Streaming, or from Persistent Storage, or File Cache as pre-downloaded content.

XML Syntax Representation of SubstituteAudioClip Element:

```
<SubstituteAudioClip
id = ID
dataSource = (Disc | P-Storage | Network |
FileCache)
titleTimeBegin = timeExpression
clipTimeBegin = timeExpression
titleTimeEnd = timeExpression
src = anyURI
preload = timeExpression
sync = (hard | soft)
noCache = (true | false)
description = string
>
    NetworkSource *
    Audio +
</SubstituteAudioClip>
```

The src attribute describes which S-EVOB of Substitute Audio represented by this element. The titleTimeBegin and titleTimeEnd attribute describe the start time and end time of valid period of S-EVOB, respectively. The clipTimeBegin attribute describes the starting position of the S-EVOB.

The content of SubstituteAudioClip shall be one Audio element, which describes the Audio Track number assignment to Main Audio stream in AM_PCK of S-EVOB.

NetworkSource element can be presented in this element, if and only if the dataSource attribute value is 'Network' and URI scheme of src attribute value of parent element is 'http', or 'https'. NetworkSource element describes the streaming source to be selected according to network throughput setting.

(a) dataSource Attribute

Describes the Data Source of Presentation Object. If the value is 'Disc' the S-EVOB shall be in Disc. If the value is 'P-Storage' the S-EVOB shall be in Persistent Storage as pre-downloaded content. If the value is 'Network' the S-EVOB shall be supplied as streaming from a network server. If the value is 'FileCache' the S-EVOB shall be supplied in File Cache. If no dataSource attribute is presented, the dataSource shall be 'P-Storage'.

(b) titleTimeBegin Attribute

Describes the start time of the continuous fragment of the Presentation Object on the Title Timeline. The value shall be described in timeExpression value defined in Datatypes.

(c) titleTimeEnd Attribute

Describes the end time of the continuous fragment of the Presentation Object on the Title Timeline. The value shall be described in timeExpression value defined in Datatypes.

(d) clipTimeBegin Attribute

Describes the starting position in a Presentation Object. The value shall be described in timeExpression value defined in Datatypes. The attribute value shall be the presentation start time (PTS) of Coded-Frame of the video streams in P-EVOB (S-EVOB). The clipTimeBegin can be omitted. If no clipTimeBegin attribute is presented, the starting position shall be '0'.

(e) src Attribute

Describes the URI of the index information file of the Presentation Object to be referred.

(f) Preload Attribute

Describes the time, on Title Timeline, when Player shall be start prefething the Presentation Object. This attribute can be omitted.

(g) Sync Attribute

If sync attribute value is 'hard', the Secondary Audio Video is Hard-synchronized Object. If sync attribute value is 'soft', it is Soft-synchronized Object. This attribute can be omitted. Default-value is 'soft'.

(h) noCache Attribute

If noCache attribute value is 'true' and dataSource attribute value is 'Network', the 'no-cache' directive shall be included in both Cache-Control and Pragma in HTTP request for the Presentation Object. If noCache attribute value is 'false' and dataSource attribute value is Network', 'no-cache' directive shall be included in neither Cache-Control, nor Pragma header. If dataSource attribute value is not 'Network', the noCache attribute shall be absent. The noCache attribute can be omitted. Default value is 'false'.

(i) Description Attribute

Describes additional information in the human consumable text form. This attribute can be omitted.

More intelligible explanations will be provided below.

As shown in FIG. 10, substitute audio SBTAD exists in secondary enhanced video object data S-EVOB in a secondary video set SCDVS. Furthermore, the substitute audio SBTAD includes information of main audio MANAD, and this information and main audio in a primary video set PRMVS are selectively (alternatively) displayed/played back. That is, in this embodiment, the main audio MANAD in the primary video set PRMVS and the main audio MANAD in the substitute audio SBTAD cannot be simultaneously displayed/played back for a user. A substitute audio clip element SBADCP is indicative of object mapping information OBMAPI concerning substitute audio SBTAD in a title. Moreover, at the same time, the substitute audio clip element SBADCP is also indicative of information of track number assignment (a track number setting) of each elementary stream in secondary enhanced video object data S-EVOB of substitute audio SBTAD. As shown in FIG. 18, the substitute audio SBTAD can be recorded in the information storage medium DISC, the persistent storage PRSTR, the network server NTSRV or the file cache FLCCH. As shown in FIGS. 55A and 55B, a plurality of main audio elements MANAD can be included in a substitute audio clip element SBADCP. Additionally, in such a case, setting information of an audio track number of a main audio stream included in a main audio pack AM_PCK of secondary enhanced video object data S-EVOB is written in the main audio element MANAD in the substitute audio clip element SBADCP. When "Network" is written as a value of a data source DTSORC in which a playback/display object shown in (d) of FIG. 55B, a network source element NTSELE is written in a corresponding substitute audio clip element SBADCP. Further, in such a case, information of a URI (a uniform resource identifier) starting from "http" or "https" is written as a value of an index information file storage position SRCTMP of a playback/display object to be referred shown in (d) of FIG. 55B. Furthermore, access destination information of a streaming source which should be optimally selected is written in the network source element NTSELE based on a throughput (a data transfer rate) in a network environment to which the information recording and playback apparatus 1 is connected. As a result, the information recording and playback apparatus 1 can automatically optimally select information of substitute audio to be displayed as described in the section of the substitute audio video clip element SBAVCP. As shown in (d) of FIG. 55B, when ID information SCAVID is written in a substitute audio clip element SBADCP tag, it is possible to set a plurality of sets of substitute audio SBTAD which should be displayed at different times on a title timeline TMLE in the same title. Moreover, as shown in FIG. 82, when ID information SBADID is given to the substitute audio clip element SBADCP, making reference to the substitute audio clip element SBADCP by an API command can be facilitated, thereby simplifying API command processing. Additionally, it is possible to set one of "Disc", "P-Storage", "Network" and "FileCache" as a value of a data source DTSORC in which a playback/display object in a substitute audio clip element SBADCP tag is recorded. If "Disc" is set as this value, this means that secondary enhanced video object data S-EVOB is stored in the information storage medium DISC. Further, when this value is "P-Storage", corresponding secondary enhanced video object data is recorded in the persistent storage PRSTR as contents downloaded in advance. Furthermore, when a value of the data source in which a playback/display object is recorded is "Network", secondary enhanced video object data S-EVOB is supplied as streaming transferred from the network server NTSRV. Moreover, when the value is "FileCache", corresponding secondary enhanced video object data S-EVOB is supplied from the file cache FLCCH. When there is no description of the data source DTSORC in which the playback/display object is recorded in attribute information of the substitute audio clip element, "P-Storage" which is a default value is automatically set as a value of the data source DTSORC in which the playback/display object is recorded. A start time TTSTTM (titleTimeBegin attribute information) on a title timeline and an end time TTEDTM (titleTimeEnd attribute information) on the title timeline written in a substitute audio clip element SBADCP tag represent start time information and end time information in a continuous block of a playback/display object (secondary enhanced video object data S-EVOB) on the title timeline, respectively. Additionally, such time information is written in the form of "HH:MM:SS:FF". Further, a start position VBSTTM (clipTimeBegin attribute information) in enhanced video object data is indicative of a start position of enhanced video object data S-EVOB in a secondary video set, and expressed as a presentation start time (a presentation time stamp value) PTS in a video stream as shown in FIG. 53. Furthermore, a description of information of a start position VBSTTM in the enhanced video object data can be eliminated in attribute information SVATRI of the substitute audio video clip element. If a description of the information is eliminated, this means that playback/display is started from a leading position of enhanced video object data S-EVOB in a secondary video set. An index information file storage position SRCTMP (SRC attribute information) of a playback/display object to be referred is written in a URI (a uniform resource identifier) format. As shown in FIG. 18, a file which is referred as an index when playing back/using an object in a substitute audio clip SBADCP represents a time map file STMAP in a secondary video set. Therefore, as the index information file storage position SRCTMP of the playback/display object to be referred, a storage position of the time map file STMAP in the secondary video set is written. Moreover, a time PRLOAD (preload attribute information) on a title timeline at which fetching a playback/display object is started represents a loading start time when loading is executed to the data cache DTCCH from the network server NTSRV prior to displaying corresponding substitute audio SBTAD on the title timeline TMLE for a user. Additionally, when the substitute audio SBTAD is stored in the information storage medium DISC or the network server NTSRV, the substitute audio SBTAD is pre-loaded in the data cache DTCCH as shown in FIG. 25, but a start time at which downloading to the data cache DTCCH in this case is started is also represented as the time PRLOAD on the title timeline at which fetching the playback/display object is started. Further, as synchronization attribute information SYNCAT (sync attribute information) of a playback/display object, it is possible to set either "hard" or "soft" in the substitute audio clip element SBADCP. If the synchronization attribute information SYNCAT of a playback/display object is set as "hard", corresponding substitute audio SBTAD is regarded as a hard synchronized object. A description will now be given as to a case where new substitute audio SBTAD must be loaded in the data cache DTCCH when displaying a playback/display object for a user. In this case, the substitute audio SBTAD is loaded into the data cache DTCCH from a time PRLOAD on a title timeline at which fetching the playback/display object is started. When loading is completed before a start time TTSTTM on the title timeline or when the substitute audio SBTAD can be continuously played back and output before an end time TTEDTM on the title timeline even during loading, playback and output of the substitute audio SBTAD are started from the start time TTSTTM on the title timeline. On the contrary, when the loading processing cannot be completed in time, or when a value of the synchronization attribute information SYNCAT of the playback/display object is set as "hard", time progress (count-up) is on the title timeline TMLE is temporarily stopped. Meanwhile, loading the substitute audio SBTAD into the data cache DTCCH is continued. When the loading processing with respect to the data cache DTCCH has been completed, or when the substitute audio SBTAD has reached a stage where continuous playback/display is possible before the end time TTEDTM on the title timeline even during loading, time progress (count-up) on the title timeline TMLE is restarted, and synchronization processing of displaying the substitute audio SBTAD to a user is started. Furthermore, when the synchronization attribute information SYNCAT of a playback/display object is set as "soft", corresponding substitute audio SBTAD is regarded as a soft synchronized object. A description will now be given as to a case where new substitute audio SBTAD must be loaded into the data cache DTCCH when displaying a playback/display object for a user. In this case, processing of loading the substitute audio SBTAD into the data cache DTCCH is started from a time PRLOAD on a title timeline at which fetching the playback/display object is started. When loading is completed before a start time TTSTTM on the title timeline, or when the substitute audio SBTAD can be continuously played back and output before an end time TTEDTM on the title timeline even during loading, playback and output of the substitute audio SBTAD is started from the start time TTSTTM on the title timeline. On the contrary, when the loading processing cannot be completed in time, or when a value of the synchronization attribute information of the playback/display object is set as "soft", time progress (count-up) on the title timeline TMLE is continued in a state where playback and output of the substitute audio SBTAD which is currently loaded are not carried out without temporarily stopping time progress (count-up) on the title timeline TMLE. Loading the substitute audio SBTAD into the data cache DTCCH is continued concurrently with continuation of time progress (count-up) on the title time line TMLE in the state where playback and output of the currently loaded substitute audio SBTAD are not executed. When loading processing with respect to the data cache DTCCH has been completed, or when the substitute audio SBTAD has reached a stage where continuous playback/display is possible before an end time TTEDTM on the title timeline even during loading, playback and output of the substitute audio SBTAD are started. When a value of the synchronization attribute information SYNCAT of the playback/display object is set as "soft" in this manner, a possibility that playback and output of the substitute audio SBTAD are started in retard of the start time TTSTTM on the title timeline is increased. In order to avoid this delay, it is desirable to previously store and load the substitute audio SBTAD in the data cache DTCCH prior to a timing at which the substitute audio SBTAD is displayed for a user and perform synchronized display (start playback of the substitute audio SBTAD from the start time TTSTTM on the title timeline) in such a manner that playback of the substitute audio SBTAD stored in the data cache DTCCH is continuously started without stopping time progress (count-up) on the title timeline TMLE. Therefore, in case of the soft synchronized object (when a value of the sync attribute information is written as "soft"), it is necessary to set a time PRLOAD on a title timeline at which fetching a playback/display object is started (write information of the time PRLOAD on the title timeline at which fetching the playback/display object is started in a substitute audio clip element SBADCP) to achieve a time (a small count value on the title timeline TMLE) preceding the start time TTSTTM on the title timeline. However, a description of information of the synchronization attribute information of the playback/display object can be eliminated in attribute information SAATRI of a substitute audio clip element. In this case, "soft" is automatically set as a default value. Therefore, when a value of the synchronization attribute information of a playback/display object is written as "soft" or its description is eliminated, it is desirable to write a time PRLOAD on a title timeline at which fetching the playback/display object is started. Further, no-cache attribute information NOCACH represents information concerning a communication protocol of HTTP. As a value which can be taken by the no-cache attribute information, it is possible to set either "true" or "false". If a value of the no-cache attribute information NOCACH is "true", a Cach-Control header and a Pragma header must be included in a GET request message of HTTP. Furthermore, if a value of the no-cache attribute information NOCACH is "false", the Cach-Control header and the Pragma header are not included in the GET request message of HTTP. Moreover, additional information concerning a SubstituteAudioClip is written in a text format familiar to people. Additionally, a description of the additional information concerning the substitute audio clip can be eliminated from attribute information SAATRI of the substitute audio clip element.

Title information TTINFO exists in a playlist file PLLST as shown in (a) of FIG. 23A, and first play title element information FPTELE, title element information TTELEM for each title and playlist application element information PLAELE exist in the title information TTINFO as shown in (b) of FIG. 23A. Further, as shown in (c) of FIG. 23A, object mapping information OBMAPI (including track number assignment information) exists in the title element information TTELEM for each title. As shown in (b) of FIG. 56A, an advanced subtitle segment element ADSTSG exists in the object mapping information OBMAPI (including the track number assignment information). A data configuration in the advanced subtitle segment element ADSTSG will now be described.

<AdvancedSubtitleSegment (Advanced Subtitle Segment) Element>

AdvancedSubtitleSegment element is a Presentation Clip element for Advanced Subtitle.

AdvancedSubtitleSegment element describes the Object Mapping Information of Advanced Subtitle in a Title and the assignment to Subtitle Track number.

XML Syntax Representation of AdvancedSubtitleSegment Element:

```
<AdvancedSubtitleSegment
id = ID
titleTimeBegin = timeExpression
titleTimeEnd = timeExpression
src = anyURI
sync = (hard | soft)
description = string
>
    Subtitle +
    ApplicationResource *
</AdvancedSubtitleSegment>
```

The src attribute describes which Advanced Subtitle Profile markup file represented by this element. The titleTimeBegin and titleTimeEnd attribute describe the start time and end time of valid period of Advanced Subtitle, respectively.

The AdvancedSubtitleSegment element contains one, or more Subtitle element, which describes the assignment of Subtitle Track number. Subtitle Track number is used to select Advanced Subtitle as a Subtitle for Main Video.

(a) titleTimeBegin Attribute

Describes the start time of the continuous fragment of the Presentation Object on the Title Timeline. The value shall be described in timeExpression value defined in Datatypes.

(b) titleTimeEnd Attribute

Describes the end time of the continuous fragment of the Presentation Object on the Title Timeline. The value shall be described in timeExpression value defined in Datatypes.

(c) src Attribute

Describes the URI of the manifest file of the Advanced Subtitle to be referred.

(d) sync Attribute

Describes Hard-Sync Application, or Soft-Sync Application, which determines the Application startup mode. This attribute can be omitted. Default value is 'hard'.

(e) Description Attribute

Describes additional information in the human consumable text form. This attribute can be omitted.

More intelligible explanations will be provided below.

As shown in FIG. 18, the advanced subtitle segment element ADSTSG is indicative of information of a playback/display clip element concerning an advanced subtitle ADSBT. The advanced subtitle segment element ADSTSG explains contents of object mapping information OBMAPI of the advanced subtitle ADSBT in a title. Furthermore, in the advanced subtitle segment element ADSTSG, a track number of a subtitle is also set. As shown in FIG. 18, a file name which is referred as an index when playing back/using the advanced subtitle ADSBT is a manifest file MNFSTS of the advanced subtitle. In accordance with this, src attribute information shown in (c) of FIG. 56B is indicative of a file name and a storage position (a path) of a markup file MRKUP concerning an advanced subtitle ADSBT corresponding to the advanced subtitle segment element ADSTSG. Moreover, attribute information of a start time TTSTTM (titleTimeBegin) on a title timeline and an end time TTEDTM (titleTimeEnd) on the title timeline represents a start time and an end time in a valid period of the advanced subtitle ADSBT. Additionally, as shown in (b) of FIG. 56A, the advanced subtitle segment element ADSTSG can include information of one or more subtitle elements SBTELE and one or more application resource elements APRELE. Further, in the subtitle element SBTELE, a number of a subtitle track is set. The subtitle track number is used to select an advanced subtitle ADSBT as a subtitle (used as a telop, a superimposed title or the like) with respect to main video MANVD. Furthermore, a manifest file storage position SRCMNF (src attribute information) of a playback/display object to be referred shown in (c) of FIG. 56B is written in the form of a URI (a uniform resource identifier). Although synchronization attribute information SYNCAT (sync attribute information) of a playback/display object means synchronization attribute information in an advanced subtitle segment element ADSTSG, it matches with a definition of a jump timing mode with respect to an application segment element APPLSG which will be described later. A jump timing model in the advanced application ADAPL is written in a descriptive text in FIG. 17. In this embodiment, either "hard" or "soft" is set as the synchronization attribute information SYNCAT of the playback/display object in the advanced subtitle segment ADSTSG. That is, in this embodiment, "none" is not set as synchronization with the advanced subtitle ADSBT, and the advanced subtitle ADSBT must be displayed in synchronization with a title timeline TMLE. When "hard" is set as a value of the synchronization attribute information SYNCAT of the playback/display object, this represents a state of hard sync jump. That is, progress (count-up) of the title timeline TMLE is temporarily stopped (a corresponding display screen is maintained in a temporarily still state) while loading of the advanced subtitle ADSBT into the file cache FLCCH is started in accordance with the start time TTSTTM on the title timeline, and progress (count-up) of the title timeline TMLE is restarted when loading processing of the advanced subtitle ADSBT has been completed. Additionally, on the contrary, when "soft" is set as the synchronization attribute information SYNCAT of the playback/display object, this means a state of soft sync jump. That is, the soft sync jump state means a synchronization method which executes (completes) the loading processing of the advanced subtitle ADSBT into the file cache FLCCH prior to displaying the advanced subtitle ADSBT, thereby terminating preparation of the next advanced subtitle ADSBT to be displayed seamlessly without stopping progress of the title timeline TMLE. Further, in this embodiment, even when "hard" is set as the synchronization attribute information SYNCAT of the playback/display object, loading a necessary resource may be started in advance. However, in this case, when previous loading is not completed even though a time on the title timeline TMLE has reached the start time TTSTTM (titleTimeBegin) on the title timeline, or when loading is not completed while continuous display is possible until the end time TTEDTM on the title timeline even though display of an advanced subtitle ADSBT is started, progress (count-up) on the title timeline TMLE is temporarily stopped (a corresponding display screen is maintained in a temporarily still state) to wait until a loading amount in the file cache FLCCH exceeds a specific value. Furthermore, in this embodiment, when "soft" is set as the synchronization attribute information SYNCAT of the playback/display object, such synchronization processing as shown in FIG. 65B may be executed. That is, loading of a resource corresponding to the advanced subtitle ADSBT is started from the start time on the title timeline (the start time TTSTTM on the title timeline is matched with a start time of a loading period LOADPE), progress (count-up) of the title timeline TMLE is continued even during loading the resource corresponding to the advanced subtitle ADSBT. When a resource data amount has been stored in file cache FLCCH to some extent and continuous display of the advanced subtitle ADSBT is enabled (in retard of the start time TTSTTM on the title timeline), playback of the corresponding advanced subtitle ADSBT is started.

Additional information concerning an AdvancedSubtitleSegment ADSTSG shown in (c) of FIG. 56B is written in a text format familiar to people. A description of the additional information concerning the advanced subtitle segment ADSTSG can be eliminated in attribute information ADATRI of the advanced subtitle segment element.

<ApplicationSegment (Application Segment) Element>

ApplicationSegment element is a Presentation Clip element for Advanced Application. Application element describes the Object Mapping Information of an Advanced Application in a Title.

XML Syntax Representation of Application Element:

```
<ApplicationSegment
id = ID
titleTimeBegin = timeExpression
titleTimeEnd = timeExpression
src = anyURI
sync = (hard | soft)
zOrder = nonNegativeInteger
language = language
appBlock = positiveInteger
group = positiveInteger
autorun = (true | false)
description = string
>
    ApplicationResource *
</ApplicationSegment>
```

The Advanced Application shall be scheduled on a specified time period of Title Timeline. The time period is the Advanced Application valid period. When time on Title Timeline enters the time period, Advanced Application shall become valid according to the Manifest file specified by src attribute. If time on Title Timeline exits from the time period, the Advanced Application in the Title shall be terminated.

The time period on Title Timeline of a Presentation Object is determined by start time and end time on Title Timeline. The start time and end time on Title Timeline are described by titleTimeBegin attribute and titleTimeEnd attribute, respectively.

Advanced Application shall be referred by the URI for the Manifest file of the initialization information of the application.

ApplicationSegment element can contain a list of ApplicationResource element, which describes the information of Resource Information par this Application.

ApplicationSegment element can have optional attributes, language attribute, appBlock attribute, group attribute and autorun attribute, which describes Application Activation Information.

(a) titleTimeBegin Attribute

Describes the start time of the continuous fragment of the Presentation Object on the Title Timeline. The value shall be described in timeExpression value defined in Datatypes.

(b) titleTimeEnd Attribute

Describes the end time of the continuous fragment of the Presentation Object on the Title Timeline. The value shall be described in timeExpression value defined in Datatypes.

(c) src Attribute

Describes the URI for the Manifest file which describes the initialization information of the application.

(d) Sync Attribute

Describes Hard-Sync Application, or Soft-Sync Application, which determines the Application startup mode. This attribute can be omitted. Default value is 'hard'.

(e) zOrder Attribute

Describes the Application z-order. Application Z-order is used by tick clock frequency used in Application z-ordering and rendering into the graphics plane.

(f) Language Attribute

Describes the application language, which consists of two-letter lowercase symbols defined in ISO-639. This attribute can be omitted. If the language attribute is absent, the language of Advanced Application is any language.

(g) appBlock Attribute

Describes the index of Application Block to which this application belongs. This attribute can be omitted. If this attribute is absent, this application does not belong to any Application Block.

(h) Group Attribute

Describes the index of Advanced Application Group to which Advanced Application belongs. This attribute can be omitted. If group attribute is absent, the Advanced Application does not belong to any Application Group.

(i) Autorun Attribute

If the value is 'true', Advanced Application shall be active when time on Title Timeline enters in a valid period. If the value is 'false', Advanced Application shall be inactive when time on Title Timeline enters in a valid period. This attribute can be omitted. The default value is 'true'.

(j) Description Attribute

Describes additional information in the human consumable text form. This attribute can be omitted.

More intelligible explanations will be provided below.

As shown in FIG. 18, an application segment element APPLSG means a playback/display clip element concerning an advanced application ADAPL. The application segment APPLSG describes contents of object mapping information OBMAPI of an advanced application ADAPL in a title. The advanced application ADAPL must be scheduled in a specific time range on a title timeline TMLE. The specific time range will be referred to as a valid period of an advanced application ADAPL. When a proceeding time (a count value) on the title timeline TMLE has reached the valid period, it is said that the advanced application ADAPL has entered the valid period. Moreover, the valid period of the advanced application ADAPL on the title timeline TMLE is set based on a start time and an end time on the title timeline TMLE. That is, a start time of the valid period is set based on a start time TTSTTM (titleTimeBegin attribute information) on the title timeline shown in (d) of FIG. 56B, and an end time of the valid period of the advanced application ADAPL is set based on an end time TTEDTM (titleTimeEnd attribute information) on the title timeline, respectively. Additionally, as shown in FIG. 12 or 18, when making reference to an advanced application ADAPL, a manifest file MNFST is referred from a playlist file PLLST. A value of src attribute information (source attribute information) representing a storage position URIMNF of a manifest file including initial setting information of an advanced application is written in the form of a URI (a uniform resource identifier). As a result, information required in an initial state of an advanced application ADAPL can be acquired. As shown in (b) of FIG. 56A, a list of application resource elements APRELE can be included in an application segment element APPLSG. The application resource element APRELE is indicative of resource information RESRCI with respect to a corresponding advanced application ADAPL (see (d) of FIG. 63C). As shown in (d) of FIG. 56B, although an application segment element APPLSG tag includes language attribute information LANGAT (language attribute information), application block attribute (an index number) information APBLT (appBlock attribute information), advanced application group attribute (an index number) information APGRAT (group attribute information) and autorun attribute information ATRNAT (autorun attribute information), these four types of attribute information are called application activation information (how to use the application activation information will be described later with reference to FIG. 58). ID information APPLID of an application segment element is written immediately after "ID=" prior to attribute information APATRI of an application segment element in an application segment element APPLSG tag. Since the ID information APPLID of the application segment element can be set in this manner, a plurality of application segment elements APPLSG can be set in object mapping information OBMAPI in this embodiment. Therefore, a plurality of advanced applications ADAPL having different display formats can be displayed in a display period of one title, thereby greatly improving an expression method for a user. Further, as shown in FIG. 82, setting the ID information can facilitate specification of a particular application segment element APPLSG using the ID information APPLID based on an API command, thus simplifying API command processing control. Furthermore, as shown in (d) of FIG. 56B, information of a start time TTSTTM (titleTimeBegin) on a title timeline and information of an end time TTEDTM on the title timeline are written at a leading part in attribute information APATRI of an application segment element. As can be understood from (c) of FIG. 56B, the start time TTSTTM and the end time TTEDTM on the title timeline are first written at a leading position of each of advanced subtitle segment element attribute information ADATRI and application segment element attribute information APATRI in an advanced subtitle segment element ADSTSG and an application segment element APPLSG. When the start/end times of a valid period on the title timeline are written first in this manner, a speed of display timing setting processing on the title timeline TMLE by the playlist manager PLMNG (see FIG. 28) can be increased. In this embodiment, one of two types of information, i.e., "hard" and "soft" can be set as synchronization attribute information SYNCAT (sync attribute information) of a playback/display object in an advanced application ADAPL. That is, when a value of the synchronization attribute information SYNCAT (sync attribute information) of the playback/display object is set to "hard", this represents a hard sync jump state as explained in the descriptive text in FIG. 17. That is, progress (count-up) on the title timeline TMLE is temporarily stopped while the advanced application ADAPL is loaded, and display of pictures to be displayed (e.g., picture information based on primary enhanced video object data P-EVOB) is also temporarily stopped, thereby providing a still picture state. When loading processing of the advanced application ADAPL has been completed, progress (count-up) of the title timeline TMLE is restarted and, at the same time, movements of the pictures are restarted, thereby displaying the corresponding advanced application ADAPL. Moreover, when the synchronization attribute information SYNCAT (sync attribute information) of the playback/display object is set to "soft", this means soft sync jump. That is, loading processing of an advanced application ADAPL is carried out in advance, and display of the advanced application ADAPL which has been completely loaded can be started while effecting seamless display without temporarily stopping progress (count-up) of the title timeline TMLE. Additionally, in this embodiment, when the synchronization attribute information SYNCAT (sync attribute information) of a playback/display object is set to "soft", the control is not restricted to the above-described contents, and synchronization processing shown in FIG. 65B may be executed. That is, the synchronization processing shown in FIG. 65B is exclusively used when a description of a time PRLOAD (preload attribute information) on a title timeline at which fetching the playback/display object begins does not exist in a clip element or a segment element, and it starts loading of a resource used in a playback/display object specified (managed) by a clip element or a segment element into the file cache FLCCH from a start time TTSTTM (a titleTimeBegin attribute information value) on a title timeline set in the clip element or the segment element (the start time TTSTTM on the title timeline is matched with a start time of a loading period LOADPE into the file cache FLCCH). Then, the loading processing of the resource into the file cache FLCCH and the time progress (count-up) on the title timeline TMLE are simultaneously continued, and processing which does not interrupt progress of moving images which are displayed for a user is executed. Display or execution of a corresponding advanced application ADAPL is started only after the loading period LOADPE of loading the resource into the file cache FLCCH has been completed, thereby entering an execution period APACPE of the advanced application. The foregoing embodiment has the following characteristics.

1) Time progress (count-up) on a title timeline TMLE continuously goes on even during loading a resource used in an advanced application ADAPL into the file cache FLCCH.

2) A start time of an execution period APACPE of an advanced application at which display or execution of the advanced application ADAPL is started is behind a value of a start time TTSTTM (titleTimeBegin attribute information) on a title timeline defined in a clip element or a segment element.

A description will now be given as to Z-order attribute (Z-index) information ZORDER arranged in an application segment element APPLSG. As shown in FIG. 16, a plurality of buttons from a help icon 33 to an FF button 38 may be displayed in a display screen for a user. As a method of displaying the plurality of buttons from the help icon 33 to the FF button 38 in the display screen, after a display region of an advanced application ADAPL is set by a manifest MNFST, display positions and display sizes of the help icon 33, a stop button 34, a play button 35, an FR button 36, a pause button 37 and the FF button 38 can be set as respective application elements in a markup MRKUP specified from the manifest MNFST (see FIG. 84). In this case, the help icon 33 corresponds to one application element (a content element or a graphic object shown in FIG. 40), and the respective buttons from the stop button 34 to the FF button 38 can be set in accordance with different application elements (content elements or graphic objects shown in FIG. 40). In this embodiment an entire display region of the advanced application ADAPL may be regarded as one advanced application ADAPL to be integrally managed based on the same application segment element APLSG. Additionally, the present invention is not restricted thereto, and the respective buttons from the stop button 34 to the FF button 38 can be regarded as different advanced applications ADAPL in accordance with a creation purpose of a content provider, and they can be managed based on the application segment elements APPLSG in units of displayed figures corresponding to the respective buttons or scripts SCRPT executed when the respective buttons are pressed. In this case, advanced applications ADAPL from the advanced application ADALP corresponding to the stop button 34 to the advanced application ADALP corresponding to the FF button 38 can be grouped in such a manner a user can simultaneously input the respective buttons from the stop button 34 to the FF button 38 (a focus state). When the advanced applications ADAPL from that corresponding to the stop button 34 to that corresponding to the FF button 38 are grouped in this manner, set values from a set value of advanced application group attribute (index number) information APGRAT (group attribute information) in an application segment element APPLSG concerning the stop button 34 to a set value of advanced application group attribute (index number) information APGRAT (group attribute information) in an application segment element APPLSG concerning the FF button 38 are all set to the same value. In FIG. 16, although the respective application elements (content elements or graphic objects shown in FIG. 40) are arranged at different positions, but the plurality of application elements (content elements or graphic objects shown in FIG. 40) can be displayed in a partially overlapping manner in this embodiment. For example, in the embodiment depicted in FIG. 16, the stop button 34 can be displayed to partially overlap the help icon 33. In this embodiment, the plurality of application elements (content elements or graphic objects shown in FIG. 40) can be displayed in a partially overlapping manner as described above. Further, when the advanced applications ADAPL are associated in accordance with the respective application elements (content elements or graphic objects shown in FIG. 40), the plurality of advanced applications ADAPL are arranged in a partially overlapping manner, and it is necessary to control to decide which advanced application ADAPL should be displayed on an "upper side". In order to enable this control, a layer is set in accordance with each advanced application ADAPL, and a data management method which performs display in a graphic plane GRPHPL (see FIG. 39) with the layers being superimposed is adopted. That is, a graphic figure (an application element, a content element or a graphic object shown in FIG. 40) corresponding to an advanced application ADAPL set as an "upper" layer is displayed on the "upper side" of a graphic figure corresponding to an advanced application ADAPL set as a "lower" layer in a screen. In accordance with this structure, it is possible to set a layer number corresponding to each advanced application ADAPL. That is, a layer number of a corresponding advanced application ADAPL in a graphic plane GRPHPL is set based on the Z-order attribute (Z-index) information ZORDER (zOrder attribute information). As a value of the layer number information, "0" or an integral value can be set. The Z-order attribute (Z-index) information ZORDER (zOrder attribute information) is used (subjected to switching control) by frequency information TKBASE (tickBase attribute information) of a tick clock used in the markup shown in (b) of FIG. 24A. The language attribute information LANGAT (language attribute information) to be written next is information which specifies a language used for characters displayed in a screen (e.g., a menu screen) or voices based on an advanced application ADAPL. When language contents specified here are different from language contents specified by application language system parameters (see FIGS. 46 to 49), there is provided an advanced application ADAPL disabled state (an inactive state) specified by this application segment element APPLSG. The language attribute information LANGAT is constituted of a language code (two-letter lowercase symbols) set in accordance with ISO-639. In this embodiment, a description of the language attribute information LANGAT can be eliminated in attribute information APATRI of the application segment element APPLSG. If the description of the language attribute information LANGAT is eliminated in this manner, a language of the advanced application ADAPL is set as an arbitrary language corresponding to a situation. Moreover, application block attribute (index number) information APBLAT (appBlock attribute information) is indicative of an index number (an integral value) of an advanced block to which an advanced application ADAPL specified by a corresponding application segment element APPLSG belongs as explained in detail in a descriptive text in FIG. 57. A description of the application block attribute (index number) information APBLAT can be eliminated in the application segment element attribute information APATRI. If the description of the application block attribute (index number) information APBLAT is eliminated, this means that a corresponding advanced application ADAPL does not belong to an application block but solely exists.

As mentioned above, advanced applications ADAPL from that corresponding to the stop button 34 shown in FIG. 16 to that corresponding to the FF button 38 can be grouped, thereby simplifying processing corresponding to user input. A target grouped in this manner will be referred to as an "advanced application group". In this embodiment, an "index number (an integral value)" is set in accordance with each advanced application group, thus enabling identification of the respective advanced application groups. A value of the index number is set (written) as advanced application group attribute (index number) information APGRAT (group attribute information) in an application segment element APPLSG. Based on an intention of a content provider, display of the buttons from the stop button 34 to the FF button 38 can be simultaneously started or terminated, or execution of any of the stop buttons 34 to the FF buttons 38 can be specified by a user (the stop button 34 to the FF button 38 can be simultaneously set in a focusing state). When the entire advanced application group constituted of the advanced application ADAPL corresponding to the stop button 34 to the advanced application ADAPL corresponding to the FF button 38 is set in an execution state (an active state), all the advanced applications ADAPL in the advanced application group are simultaneously set in the execution state (the active state). In this embodiment, all the advanced applications ADAPL do not have to belong to the advanced application group. When an advanced application ADAPL managed by an application segment element APPLSG does not belong to the advanced application group but solely exists, a description of the advanced application group attribute (index number) information APGRAT is eliminated.

As a value of autorun attribute information ATRNAT (autorun attribute information), either "true" or "false" can be set. When a count value of a title timeline TMLE enters a valid period (a range from titleTimeBegin (TTSTTM) to titleTimeEnd (TTEDTM)) and a value of the autorun attribute information is "true", an advanced application ADAPL is automatically started up (becomes active). In case of "false", this means that the active state is not provided unless a specification based on an API command is accepted. Additionally, a description of the autorun attribute information ATRNAT can be eliminated in the application segment element attribute information APATRI. When a description of the autorun attribute information ATRNAT is eliminated in this manner, "true" which is a default value of the autorun attribute information ATRNAT is automatically set. Further, additional information (description attribute information) concerning an ApplicationSegment which is written at last in an application segment element APPLSG tag is written in a text format which is comprehensible to people. A description of the additional information can be eliminated in an application segment element attribute information.

<Application Activation Information>

The ApplicationSegment element can have optional attributes, language attribute, appBlock attribute, group attribute and autorun attribute. These attributes are called by Application Activation Information.

Application Activation Information determines the Application shall be activate, or inactive, when time on Title Timeline enters the valid period of Application.

More intelligible explanations will be provided below.

As shown in (d) of FIG. 56B, language attribute information LANGAT, application block attribute (index number) information APBLAD, advanced application group attribute (index number) information APGRAT and autorun attribute information ATRNAT can be written as optional information in an application segment element APPLSG tag. The four types of attribute information is called application activation information (judgment information which is used to set whether a corresponding application is set in an execution state). It is possible to judge whether the advanced application ADAPL can be executed based on the application activation information from a start time TTSTTM (titleTimeBegin) to an end time TTEDTM (titleTimeEnd) on a title timeline set in an application segment element APPLSG (shown in (d) of FIG. 56B) in a valid period of the advanced application ADAPL on the title timeline TMLE.

<Language and Application Block>

Application can be selectively activated by menu language setting, from a set of the ApplicationSegment element, called by Application Block.

The application language of ApplicationSegment is described by language attribute.

The menu language is the value of Menu Language defined in System Parameter.

Application Block is a set of ApplicationSegment elements in a Title which have same appBlock attribute value. All ApplicationSegment elements in an Application Block shall satisfy the following conditions:

The language attribute shall be present and unique in an Application Block.

Valid period shall be same in the Application Block.

The autorun attribute shall be same in the Application Block.

The group attribute shall not be present.

An appBlock attribute shall be present if language attribute present.

The following figure is an example of Application Block and Language. In this example, if menu language is 'en', App1_en, App2_en, App3_en and App4_en are activated in their valid period.

If menu language is 'fr', App1_fr, App2_fr, App3_en and App4_en are activated in their valid period.

If menu language is 'ja', App1_ja, App2_ja, App3_en and App4_ja are activated in their valid period.

If menu language is 'zh', App1_en, App2_zh, App3_en and App4_en are activated in their valid period.

More intelligible explanations will be provided below.

Figure 57:
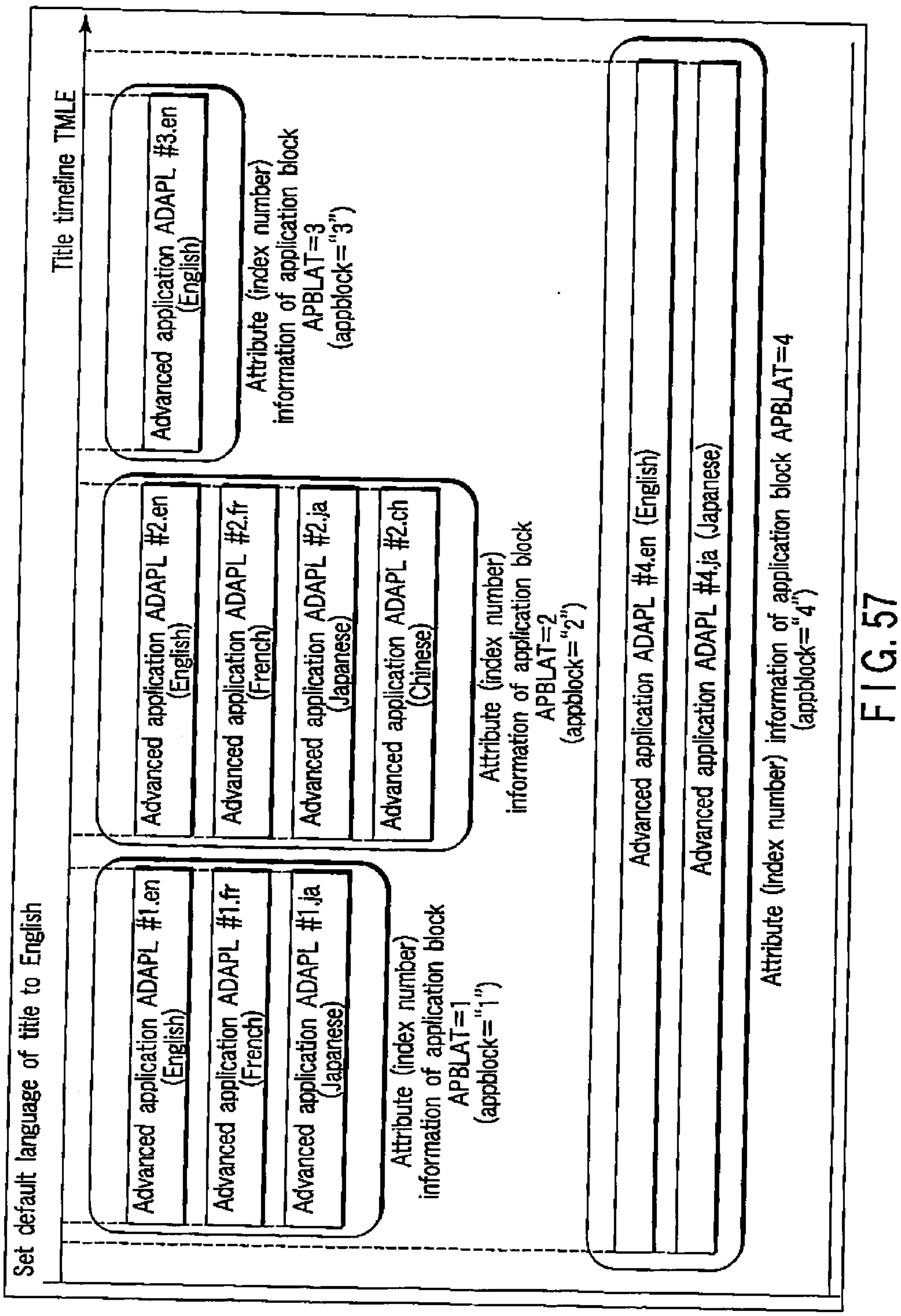
FIG. 57 is an exemplary view showing a setting example of attribute information and language attribute information of an application block.

FIG. 57 shows a relationship between the language attribute information LANGAT and the application block attribute (index number) information APBLAT as a reference used to judge whether an advanced application ADAPL can be executed. A description will be given as to a case where a default language of a title is set to English in an embodiment shown in FIG. 57 and a menu language is recorded in English as a profile parameter in FIG. 47 (the profile parameter shown in FIG. 47 is stored in a memory region included in the navigation manager NMVNG depicted in FIG. 14). As shown in FIG. 57, it is possible to provide a set of advanced applications which display the same menu contents in different menu languages. As described above, in this embodiment, a set of advanced applications ADAPL which have the same menu contents and different languages at the time of display for a user is called an application block. When an advanced application ADAPL which is expressed in a language which can be understood by (comprehensible to) a user is selectively executed (displayed) in the same application block, the same menu contents can be displayed in appropriate forms (language expressions suitable for respective people) for multiple people who got used to languages different form each other. For example, in FIG. 57, application block attribute (index number) information APBLAT having a value of 1 (appBlock="1") includes three types of applications, i.e., an advanced application ADAPL #1_en (English) in which a menu language is English, an advanced application ADAPL #1_fr (French) in which a menu language is displayed in French and an advanced application ADAPL #1_ja (Japanese) in which a menu language is displayed in Japanese, and an appropriate advanced application ADAPL can be selected and executed (displayed) in accordance with a language comprehensible to a user. Language contents displayed in a menu in an application segment element APPLSG are set based on language attribute information LANGAT depicted in (d) of FIG. 56B. Further, menu language contents which should be displayed for a user are set based on a value of a menu language (see FIG. 47) in system parameters. The application block has a combination (set) configuration of a plurality of application segment elements APPLSG in the same title. Furthermore, application block attribute (index number) information APBLAT in the application segment element APPLSG tag is set based on the same value in the same application block. Therefore, making reference to a value of the application block attribute (index number) information APBLAT in each application segment element APPLSG tag can recognize an application block to which each application segment element APPLSG belongs. In the same single application block, all application segment elements APPLSG must satisfy the following conditions.

(1) Although the language attribute information LANGAT shown in (d) of FIG. 56B is set as optional information in a normal situation, the language attribute information LANGAT must be written in a corresponding application segment element APPLSG tag when the corresponding application segment element APPLSG exists in an application block. Further, different values of the language attribute information LANGAT must be set in different application segment elements APPLSG belonging to the same application block.

That is, when a value of the language attribute information LANGAT in each application segment element APPLSG is uniquely set in the same application block, selection and extraction of an application segment element APPLSG which can be used (executed/displayed) by the playlist manager PLMNG (see FIG. 28) can be facilitated.

(2) All valid periods (each of which is a period from a start time TTSTTM on a title timeline to an end time TTEDTM on the title timeline) must match with each other between different application segment elements APPLSG belonging to the same application block.

As a result, display periods for a user become all equal to each other in all advanced applications ADAPL irrespective of display languages, thereby facilitating time management of the playlist manager PLMNG on the title timeline TMLE.

(3) The autorun attribute information ATRNAT in all different application segment elements APPLSG belonging to the same application block must be set to the same value.

For example, when the autorun attribute information ATRNAT of an advanced application ADAPL #1_en (English) in an application block "1" shown in FIG. 57 is set to "true", values of the autorun attribute information ATRNAT in other advanced applications ADAPL corresponding to French and Japanese must be set to "true". Furthermore, when the autorun attribute information ATRNAT of an advanced application ADAPL #2_en (English) included in an application block "2" is set to "false", set values of the autorun attribute information ATRNAT of corresponding advanced applications ADAPL of French, Japanese and Chinese must be also set to "false".

If a value of the autorun attribute information ATRNAT differs in accordance with each advanced application ADAPL, an advanced application displayed in a specific language is automatically started up, advanced applications which are displayed in other languages are not automatically started up, and the control does not shift to an execution state unless an API command is issued. In such a case, management/control of the playlist manager PLMNG becomes very complicated. Setting the above-described conditions can avoid the complicity, and simplify management/control of the playlist manager PLMNG.

(4) A description of advanced application group attribute (index number) information APGRAT must be eliminated in an application segment element APPLSG tag included in an application block.

The advanced application group attribute (index number) information APGRAT is obtained by grouping advanced applications ADAPL which can be simultaneously set to an execution state (active) by using an API command including a user option. When specific advanced applications ADAPL in the same block are grouped, applications having a specific language menu alone are started up in response to the API command, thereby giving discomfort to a user who cannot understand this language. Therefore, in this embodiment, completely separating an advanced application ADAPL included in an application block from an advanced application ADAPL included in an advanced application group (the same advanced application ADAPL is not included in both the application block and the advanced application group) can avoid an erroneous operation of displaying a menu in a wrong language for a user who can understand a specific language alone.

Moreover, in this embodiment, when the language attribute information LANGAT shown in (d) of FIG. 56B is written in the playlist PLLST, application block attribute (index number) information APBLAT must be also written. That is, as shown in FIG. 57, even if there is only one advanced application ADAPL #3_en (English) (there is no advanced application ADAPL corresponding to a menu language such as Japanese or French), this application is defined to solely exist in an application block "3". When a language code is set in the advanced application ADAPL in this manner, setting to necessarily configure an application block can facilitate selection processing of the advanced application ADAPL which should be displayed (executed/used) by a user in the playlist manager PLMNG (see FIG. 28).

In the embodiment shown in FIG. 57, when a default language of a title is set to English, an advanced application ADAPL #1_en (English), an advanced application ADAPL #2_en (English) and an advanced application ADAPL #3_en (English) are selected as applications to be executed/displayed in each valid period. Additionally, if a default language of a title is set to Japanese, an advanced application ADAPL #1_ja (Japanese) and an advanced application ADAPL #2_ja (Japanese) alone are extracted as advanced applications to be executed and displayed in each valid period, and display of an advanced application ADAPL is not displayed in a display period of an advanced application ADAPL #3_en (English) since there is no corresponding menu language in Japanese.

<Application Activation Information>

Figure 58:
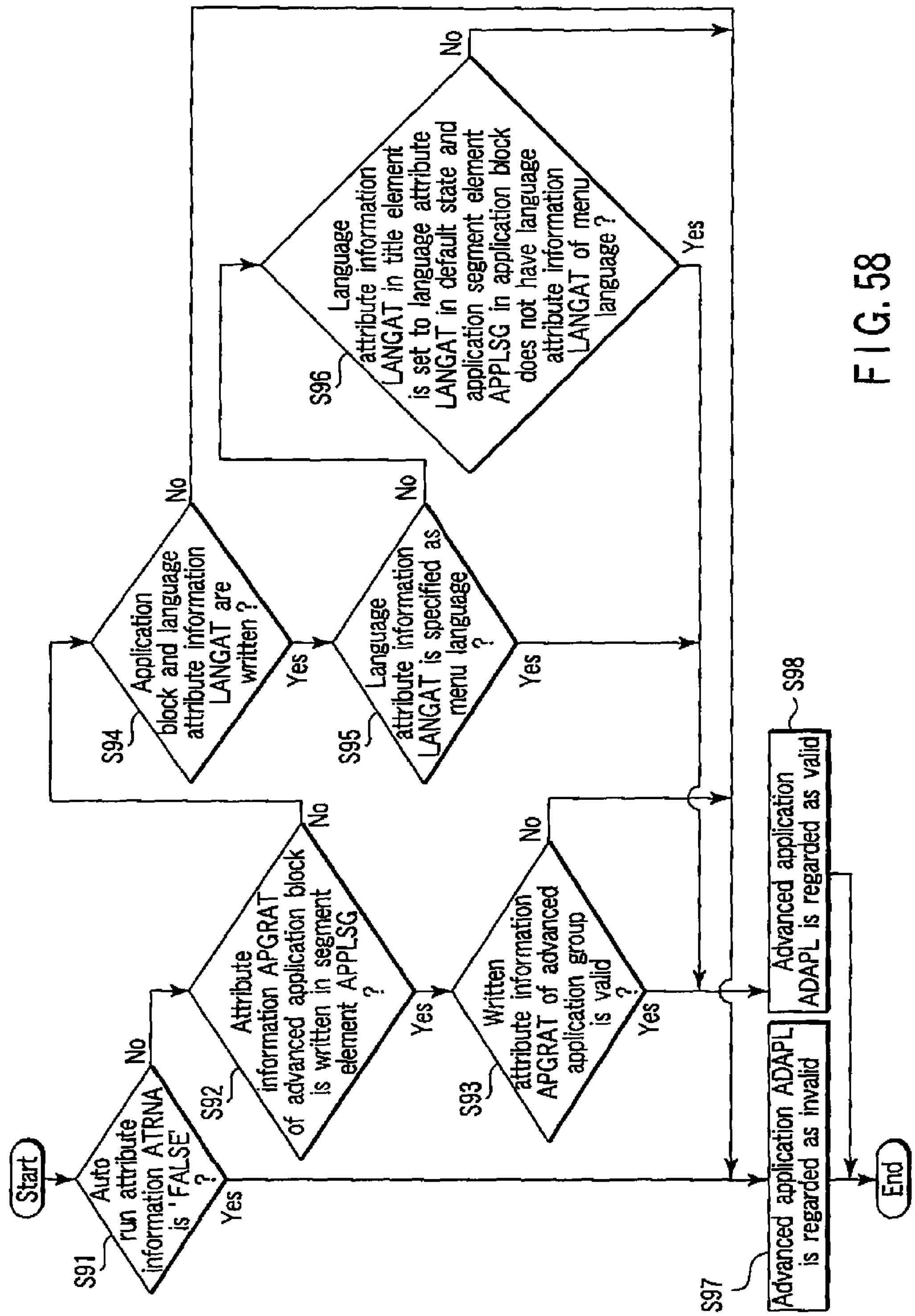
FIG. 58 is an exemplary view showing a relationship between each combination of various kinds of application activation information and a validity judgment of an advanced application.

As shown in (d) of FIG. 56B, four types of attribute information, i.e., language attribute information LANGAT, application block attribute (index number) information APBLAT, advanced application group attribute (index number) information APGRAT and autorun attribute information ATRNAT exist as optional attribute information in application segment element attribute information APATRI. These four types of attribute information are called application activation information (judgment information which is used to set whether a corresponding application is executed). It is possible to use the application activation information to judge if the advanced application ADAPL can be executed or cannot be executed in a valid period (a period from a start time TTSTTM (titleTimeBegin) to an end time TTEDTM (titleTimeEnd) on a title timeline set in an application segment element APPLSG depicted in (d) of FIG. 56B) of the advanced application ADAPL on the title timeline TMLE. FIG. 58 shows a reference which is required to judge whether a corresponding advanced application ADAPL is valid when a display time on the title timeline TMLE is in the valid period of the advanced application ADAPL. As shown in FIG. 1, the advanced content playback unit ADVPL exists in the information storage medium DISC in this embodiment. Further, as shown in FIG. 14, the navigation manager NVMNG and the presentation engine PRSEN exist in the advanced content playback unit ADVPL. Furthermore, the playlist manager PLMNG which analyzes contents of a playlist file PLLST and the advanced application manager ADAMNG which controls processing of an advanced application ADAPL exist in the navigation manager NVMNG as shown in FIG. 28. First, the playlist manager PLMNG analyzes contents of an application segment element APPLSG shown in (d) of FIG. 58B. The playlist manager PLMNG judges the validity of the advanced application ADAPL shown in FIG. 58. This embodiment is not restricted to this configuration, and the playlist manager PLMNG may extract contents of the application segment element APPLSG shown in (d) of FIG. 56B and transmits a result of this extraction to the advanced application manager ADAMNG, and the advanced application manager ADMNG may judge the validity of the advanced application ADAPL based on FIG. 58 as another embodiment. Here, when the invalidity of display of the advanced application ADAPL is determined, display (and execution processing based on this display) of the advanced application ADAPL is not carried out for a user. On the contrary, when the validity of the advanced application ADAPL is determined in the playlist manager PLMNG (or the advanced application manager ADAMNG), the advanced application manager ADAMNG controls the advanced application presentation engine AAPEN in the presentation engine PRSEN shown in FIG. 30, thereby starting display and execution processing of the advanced application ADAPL as a target (determined as valid).

As shown in FIG. 58, when a judgment on the validity of the advanced application ADAPL is started, whether autorun attribute information ATRNAT is "false" is first judged (step S91). If, the autorun attribute information ATRNAT written in (d) of FIG. 56B is determined as "false", the advanced application ADAPL is regarded as invalid (step S97), and display and execution processing for a user is not performed at all, thereby terminating the control. However, even in this state, an API (an application interface command) can be used to change a corresponding advanced application ADAPL to a valid state. Then, when the autorun attribute information ATRNAT is not "false" (when it is specified as "true") in the judgment at the step S91, a judgment is made upon whether advanced application group attribute (index number) information APGRAT described in (d) of FIG. 56B is written in the application segment element APPLSG (step S92). Here, if the advanced application group attribute (index number) information APGRAT is written in the application segment element APPLSG, a judgment is made upon whether the written advanced application group attribute (index number) information APGRAT is valid (step S93). Here, if the written advanced application group attribute (index number) information APGRAT is valid, the advanced application ADAPL is regarded as valid (step S98). In this case, a display screen of the corresponding advanced application ADAPL is displayed for a user, and execution processing of the advanced application ADAPL corresponding to a user action is started. Further, when an API command based on a user request is input, or when a valid period of the advanced application ADAPL on a title timeline TMLE is expired, the processing is terminated. Here, when the advanced application group attribute (index number) information APGRAT specified in the judgment at the step S93 is invalid, the advanced application ADAPL is regarded as invalid (step S97). However, even in this case, a valid application group can be selected or changed in response to an API command based on input by a user or a specific script. Even if the advanced application ADAPL described at the step S97 is regarded as invalid, the validity at the step S93 is changed and the advanced application ADAPL is changed to be valid in some cases as described at step S98 by application group change processing (or another selection processing) which provides the validity based on the API command. Besides the judgment on the autorun attribute information ATRNAT and the advanced application group attribute (index number) information APGRAT, the judgment on the validity of the advanced application ADAPL using language attribute information LANGAT is carried out as follows. That is, when the autorun attribute information ATRNAT based on the step S91 is "true" and the advanced application group attribute (index number) information APGRAT described at the step S92 is not written in the application segment element APPLSG, whether application block attribute (index number) information APBLAT and language attribute information LANGAT are written is judged (step S94). If the application block attribute (index number) information APBLAT and the language attribute information LANGAT are written as described at the step S94, whether the language attribute information LANGAT is specified as a menu language is judged (step S95). The description has been given as to the fact that the advanced content playback unit ADVPL exists in the information recording and playback apparatus 1. The advanced content playback unit ADVPL has a memory region in which information of system parameters can be temporarily stored. FIG. 47 shows a list of profile parameters of the system parameters temporarily stored in the advanced content playback unit ADVPL. As shown in FIG. 47, a parameter which specifies a menu language is included in the profile parameters. The menu language described at the step S95 means a menu language in the profile parameters shown in FIG. 47. The navigation manager NVMNG judges whether language information specified as the menu language matches with the language attribute information LANGAT set in (d) of FIG. 56B, and the language information is set as valid with respect to a matched advanced application ADAPL (step S98). At this time, if the language attribute information LANGAT does not match with the menu language, the language attribute information LANGAT in a title element has a language attribute LANGAT in a default state. Furthermore, when an application segment element APPLSG in an application block does not have the language attribute information LANGAT of the menu language (step S96), a corresponding advanced application ADAPL is automatically regarded as the profile parameter, and the advanced application ADAPL is regarded as valid (step S98). Moreover, in other cases, the advanced application ADAPL is regarded as invalid (step S97). Additionally, as described at step S94, when the application block and the language attribute information LANGAT are not written, the advanced application ADAPL is automatically regarded as invalid (the step S97), and the control advances to a termination step without performing display or execution processing for a user.

Figure 59B:
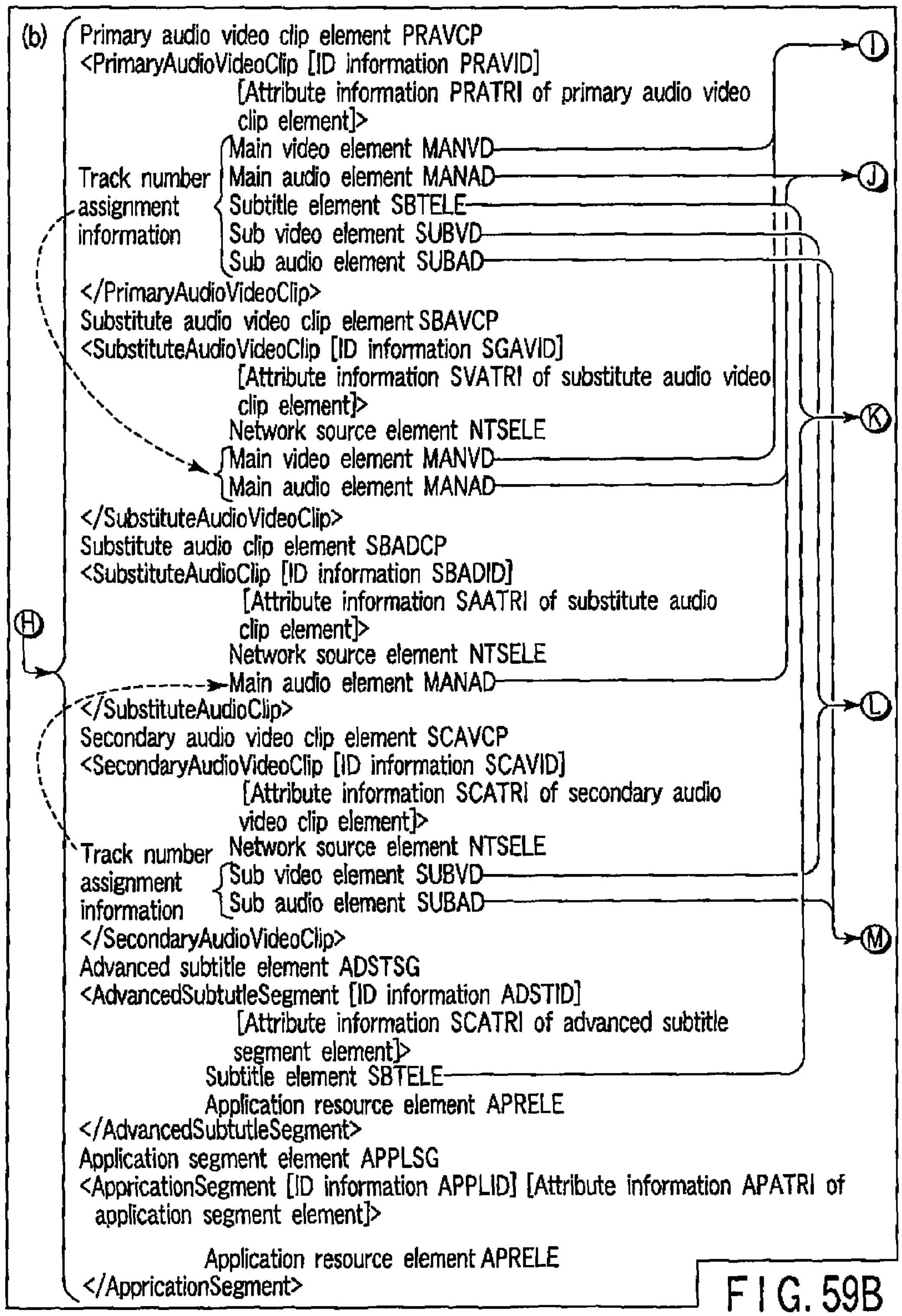

As a data configuration in a playlist PLLST, title information TTINFO exists as shown in (a) of FIG. 23A, and title element information TTELEM set in accordance with each title is written in the title information TTINFO as shown in (b) of FIG. 23A. As shown in (c) of FIG. 23A, object mapping information OBMAPI, resource information RESRCI, playback sequence information PLSQI, track navigation information TRNAVI and scheduled control information SCHECI exist in one set of title element information TTELEM. FIGS. 59A to 59C show data configurations in a main video element MANVD, a main audio element MANAD, a subtitle element SBTELE, a sub video element SUBVD and a sub audio element SUBAD existing in the object mapping information OBMAPI.

As shown in FIG. 10, primary audio video PRMAV can include main video MANVD, main audio MANAD, sub video SUBVD, sub audio SUBAD and sub-picture. In accordance with this configuration, information of a main video element MANVD, a main audio element MANAD, a subtitle element SBTELE, a sub video element SUBVD and a sub audio element SUBAD can be written in a primary audio video clip element PRAVCP as shown in (b) of FIG. 59B. Although each single element is shown in (b) of FIG. 59B, the present invention is not restricted thereto. For example, when sub video SUBVD and sub audio SUBAD do not exist in corresponding primary audio video PRMAV, a description of a sub video element SUBVD and a sub audio element SUBAD can be eliminated in accordance with absence of these members. Further, when a plurality of sets of main audio MANAD exist in the same primary audio video PRMAV, a plurality of main audio elements MANAD for respective tracks can be written in the primary audio video clip element PRAVCP. As shown in FIG. 10, in this embodiment, substitute audio video SBTAV can include main video MANVD and main audio MANAD. In accordance with this configuration, as shown in (b) of FIG. 59B, a main video element MANVD and a main audio element MANAD can be written in a substitute audio video clip element SBAVCP. Furthermore, as shown in FIG. 10, when a path through a network (the network server NTSRV) is recorded as a recording position of an object of substitute audio video SBTAV, a network source element NTSELE can be written in a substitute audio video clip element SBAVCP. Likewise, when substitute audio SBTAD and secondary audio video SCDAV are recorded in the network server NTSRV, a network source element NTSELE can be written in a substitute audio clip element SBADCP and a secondary audio video clip element SCAVCP in accordance with this configuration. Moreover, as shown in FIG. 10, in this embodiment, main audio MANAD can be included in substitute audio SBTAD, and sub video SUBVD and sub audio SUBAD can be included in secondary audio video SCDAV. Therefore, in accordance with this structure, a main audio element MANAD can be written in a substitute audio clip element SBADCP, and a sub video element SUBVD and a sub audio element SUBAD can be written in a secondary audio video clip element SCAVCP. As described in the section of the primary audio video clip element PRAVCP, when a plurality of tracks exist in each clip element, a plurality of respective elements are written in accordance with each track. A data configuration in the main video element MANVD is shown in (c) of FIG. 59C, and a data configuration in the main audio element MANAD is shown in (d) of FIG. 59C. Additionally, a data configuration in the subtitle element SBTELE is shown in (e) of FIG. 59C, a data configuration in the sub video element SUBVD is shown in (f) of FIG. 59C, and a data configuration in the sub audio element SUBAD is shown in (g) of FIG. 59C. Information in the respective element tags shown in (c) to (g) of FIG. 59C equally has the following characteristics irrespective of types of the element tags.

(1) "track=[a track number TRCKAT]" is written at a leading part in each element tag. When a track number is written first in each element tag, identification of a track number for each element tag can be facilitated, and identification can be carried out at a high speed.

(2) "description=[additional information]" is equally written (arranged) at a last part in each element tag. As shown in FIGS. 54A and 54B and FIGS. 56A and 56B, "description=[additional information]" is also written at a very last part in each clip element, thereby equalizing an arrangement in each element tag. Since an arrangement position of "description=[additional information]" is equal in this manner, a position of "description=[additional information]" can be readily extracted in the playlist manager PLMNG in the navigation manager NVMNG as shown in FIG. 28, thereby facilitating and speeding up data analysis in a playlist PLLST.

(3) "mediaAttr=[an index number MDATNM of a corresponding media attribute element in media attribute information]" is written (arranged) between the track number information TRCKAT and the additional information.

(4) "streamNumber=[a stream number]" or "angleNumber=[angle number information ANGLNM]" is written (arranged) between the track number information TRCKAT and the index number MDATNM of a corresponding medium attribute element in the medium attribute information.

When equalization of the data arrangement as described in (3) and (4) is achieved, facilitation and speed-up of retrieval of relevant information in each element tag by using the playlist manager PLMNG can be performed. A data configuration in each object element will now be described hereinafter.

<Video Element>

Video element describes the Video Track number assignment for Main Video stream in VM_PCK of a P-EVOB.

XML Syntax Representation of Video Element:

```
<Video
track = positiveInteger
angleNumber = positiveInteger
mediaAttr = positiveInteger
description = string
/>
```

Video element can be present in PrimaryAudioVideoClip element and in SubstituteAudioVideoClip element. If Video element is present in PrimaryAudioVideoClip element which refers an Interleaved Block of P-EVOB, Video element describes which P-EVOB in the Interleaved Block is available and the Video Track number assignment for Main Video in P-EVOB. Otherwise Main Video in P-EVOB shall be treated as available and assigned to Video Track number '1'.

(a) Track Attribute

Describes the Video Track number. Video Track number shall be integer from 1 to 9.

(b) angleNumber Attribute

Describe which P-EVOB in Interleaved Block is available and selected for the Video Track number, if Presentation Clip refers an Interleaved Block of P-EVOB. Otherwise angleNumber attribute shall be omitted. If parent element is PrimaryAudioVideoClip element, maximum angleNumber is '9'. If parent element is SubstituteAudioVideoClip element, streamNumber shall be '1'. Default value is '1'.

(c) mediaAttr Attribute

Describes the media attribute index of Media Attribute Information for Video stream. The attribute can be omitted. Default value is 1.

(d) Description Attribute

Describes additional information in the human consumable text form. This attribute can be omitted.

More intelligible explanations will be provided below.

A description will be first given as to a data configuration in a main video element MANVD. Information concerning a video track number set in accordance with each main video MANVD stream in a main video pack VM_PCK existing in a primary enhanced video object P-EVOB is written in the main video element MANVD. In this embodiment, the main video element MANVD can be written in a primary audio video clip element PRAVCP and a substitute audio video clip element SBAVCP. When the main video element MANVD exists in the primary audio video clip element PRAVCP which makes reference to an interleaved block of the primary enhanced video object P-EVOB, the main video element MANVD means that the primary enhanced video object exists in the interleaved block. Further, at the same time, setting information of a video track number with respect to the main video MANVD in the primary enhanced video object P-EVOB is written in the main video element MANVD. When the primary enhanced video object P-EVOB does not form an interleaved block, the main video MANVD in the primary enhanced video object P-EVOB solely exists, and a track number of the main video MANVD is set to "1". The track number information TRCKAT described in (c) of FIG. 59C means information of a video track number specified by a corresponding main video element MANVD. In this embodiment, the video track number must be set to one of positive numbers 1 to 9. A value of the track number information TRCKAT corresponds to a video track number VDTKNM (see (d) of FIG. 62B) in a video track element VDTRK tag of track navigation information TRNAVI. That is, a relationship between attribute information or angle number information of the main video MANVD written in a main video element MANVD tag in track number assignment information (object mapping information OBMAPI) and user selection enabled/disabled information written in a video track element VDTRK tag in track navigation information TRNAVI can be recognized through track number information TRCKAT and a video track number VDTKNM having a matched value. Angle number information ANGLNM selected in the interleaved block shown in (c) of FIG. 59C means that primary enhanced video object data P-EVOB exists in the interleaved block. Furthermore, when a corresponding display clip makes reference to an interleaved block of a primary enhanced video object P-EVOB based on angle number information ANGLNM selected in the interleaved block, the interleaved block is used as information required to select a video track number to be displayed. That is, when a primary enhanced video object P-EVOB exists in the interleaved block, setting angle number information ANGLNM selected in the interleaved block in accordance with each main video stream simultaneously with the track number information TRCKAT facilitates selection of an angle which is displayed by a player to a user in response to a user request. If corresponding main video MANVD does not exist in the interleaved block, a description of angle number information ANGLNM (angleNumber attribute information) selected in the interleaved block is eliminated. When the main video element MANVD is written in a primary audio video clip element PRAVCP, up to "9" can be set as angle number information ANGLNM selected in the interleaved block. Moreover, when the main video element MANVD is written in a substitute audio clip element SBADCP, a value of angle number information ANGLNM selected in the interleaved block is set to "1". In this embodiment, a default value of the angle number information ANGLNM selected in the interleaved block is set as "1". An index number MDATNM of a corresponding media attribute element in the media attribute information shown in (c) of FIG. 59C is indicative of a value of a media attribute index number of media attribute information MDATRI with respect to a corresponding main video stream. Media attribute information MDATRI exists in a playlist PLLST as shown in (a) of FIG. 79A, and a video attribute item element VABITM with respect to video is written in the media attribute information MDATRI. When attributes such as a resolution or a screen display size in a main video element MANVD and a sub video element SUBVD are all equal as shown in (b) of FIG. 59B, one video attribute item element VABITM exists in the media attribute information MDATRI as shown in (b) of FIG. 79A, a value of an index number MDATNM of a corresponding media attribute element in all sets of media attribute information is set as "1", and reference is made to common attribute information. On the other hand, when attribute information such as a resolution or a display screen size in each main video element MANVD is different from that in a sub video element SUBVD and reference is made to a plurality of respective sets of attribute information, a plurality of video attribute item elements VABITM corresponding to each attribute information are written as shown in (b) of FIG. 79A, and a number indicating which one of the plurality of video attribute item elements corresponds is written as an index number MDATNM in a corresponding media attribute element in the media attribute information shown in (c) of FIG. 59C. As described above, in this embodiment, when media attribute information MDATRI is collectively written in a region different from that of title information TTINFO in which object mapping information OBMAPI is written as information written in a playlist PLLST, not only retrieval of an attribute for each video element can be facilitated, but also an amount of data written in the playlist PLLST can be reduced by making reference to common video attribute information between different video elements. In this embodiment, it is possible to eliminate a description of an index number MDATNM of a corresponding media attribute element in the media attribute information. In such a case, "1" which is a default value is automatically set. As shown in (c) of FIG. 59C, additional information concerning a video element is written at a last part in a main video element tag in a text format which is familiar to people. A description of the additional information concerning the video element can be eliminated in a main video element tag.

<Audio Element>

Audio element describes the Audio Track number assignment for Main Audio stream in AM_PCK of a P-EVOB, or for Main Audio stream in AM PCK of an S-EVOB.

XML Syntax Representation of Audio Element:

```
<Audio
track = positiveInteger
streamNumber = positiveInteger
mediaAttr = positiveInteger
description = string
/>
```

Available Audio Track in a P-EVOB and S-EVOB shall be described by the list of Audio elements in PrimaryAudioVideoClip element and SubstituteAudioClip element, respectively.

Audio element describes the conversion information from Audio Track number to Main Audio stream.

(a) Track Attribute

Describes Audio Track number. Audio Track number shall be integer from 1 to 8.

(b) streamNumber Attribute

Describes which Audio stream in AM_PCK of P-EVOB/S-EVOB is assigned to the Audio Track number. The attribute value shall be audio $stream_{13}$ id plus 1. For Linear PCM, DD+, DTS-HD or MLP, audio $stream_{13}$ id is the least significant 3 bits of sub_stream_id. For MPEG-1 audio/MPEG-2 audio, audio $stream_{13}$ id is the least significant 3 bits of stream_id in the packet header. The streamNumber shall be integer from 1 to 8. Default value is '1'.

(c) mediaAttr Attribute

Describes the media attribute index of Media Attribute Information for Audio stream. The attribute can be omitted. Default value is '1'.

(d) Description Attribute

Describes additional information in the human consumable text form. This attribute can be omitted.

More intelligible explanations will be provided below.

A data configuration in a main audio element MANAD shown in (d) of FIG. 59C will now be described. In a main audio element MANAD is written information about a setting of an audio track number of a main audio stream in a main audio pack AM_PCK of a primary enhanced video object P-EVOB or information about a setting of an audio track number concerning a main audio stream in a main audio pack AM_PCK of a secondary enhanced video object S-EVOB. Information of audio tracks which can exist (can be used) in the primary enhanced video object P-EVOB and the secondary enhanced video object S-EVOB is written based on a list of audio elements in a primary audio video clip element PRAVCP and a substitute audio clip element SBADCP, respectively. That is, for example, when three audio tracks exist in a corresponding audio stream, three main audio elements MANAD having respective track numbers 1 to 3 being set thereto are written in the primary audio video clip element PRAVCP. Information which is converted from each audio track number into a main audio stream MANAD is written in the main audio element MANAD. That is, as shown in (d) of FIG. 59C, it is possible to extract a correspondence relationship of an audio stream number ADSTRN of a corresponding audio pack from track number information TRCKAT for each main audio MANAD. When a corresponding audio stream number ADSTRN is extracted from a specified track number, a main audio stream MANAD required for playback can be extracted by using information of an audio stream number ADSTRN set in an enhanced video object EVOB. track attribute information shown in (d) of FIG. 59C represents track number information TRCKAT. In this embodiment, a value of one of positive numbers 1 to 8 can be written as a value of the track number information TRCKAT. That is, in this embodiment, information can be recorded in up to eight tracks as the main audio MANAD. A value of the track number information TRCKAT corresponds to an audio track number ADTKNM (see (d) of FIG. 62B) in an audio track element ADTRK tag of track navigation information TRNAVI. That is, a relationship between attribute information or audio stream number information of main audio MANAD written in a main audio element MANAD tag in track number assignment information (object mapping information OBMAPI) and user selection enabled/disabled information or language code information written in an audio track element ADTRK tag in track navigation information TRNAVI can be recognized through track number information TRCKAT and an audio track number ADTKNM having the same value. Further, different audio track numbers are respectively set to audio streams in a main audio pack of a primary enhanced video object P-EVOB or a secondary enhanced video object S-EVOB, and information of an audio stream number ADSTRN in an audio pack corresponding to the track number represents the correspondence relationship. As a value of the audio stream number ADSTRN in the audio pack corresponding to the track number, a value obtained by adding "1" to an ID number of the audio stream is set. A value of an audio stream ID is represented by meaningful low-order three bits of a sub-stream ID in LineatPCM, DD+, DTS-HD or MLP. Furthermore, in MPEG1 audio or MPEG2 audio, a value of an audio stream ID is defined by meaningful (valid) low-order three bits of a stream ID in a packet header. In this embodiment, a value of the audio stream number ADSTRN is set as a positive number from 1 to 8. "1" is set as a default value of the audio stream number ADSTRN. An index number MDATNM of a corresponding media attribute element in media attribute information shown in (d) of FIG. 59C represents a media attribute index number of media attribute information MDATRI corresponding to an audio stream. The media attribute information MDATRI corresponding to the audio stream is written in an audio attribute item element AABITM in media attribute information MDATRI in a playlist PLLST as shown in (b) of FIG. 79A. As shown in (b) of FIG. 59C, when audio attribute information such as an audio compression code or a sampling frequency quantization bit number of a main audio element MANAD in object mapping information OBMAPI all matches with that of a sub audio element SUBAD in the same, one common audio attribute item element AABITM is written (b) of FIG. 79A. On the contrary, when a plurality of different pieces of attribute information such as compression code information or an audio sampling frequency are set in the main audio element MANAD and the sub audio element SUBAD shown in FIGS. 59A to 59C, audio attribute item elements AABITM whose number corresponds to the number of different audio attributes are written in (b) of FIG. 79A. When the plurality of audio attribute item elements AABITM are written, since it is necessary to specify association with each audio attribute item element AABITM, specifying media index number information INDEX written in the audio attribute item element AABITM can associate the audio attribute item element AABITM corresponding to each main audio element MANAD or sub audio element SUBAD. As described above, setting a position of media attribute information MDATRI in which audio attribute item elements AABITM are collectively written which is different from a position of title information TTINFO in which object mapping information OBMAPI is written can facilitate setting/management of the audio decoder in playback of audio information, and sharing the audio attribute item elements AABITM having common attribute information can reduce an amount of information written in a playlist PLLST. Additional information concerning an audio element shown in (d) of FIG. 59C is written in a text format familiar to people. A description of the additional information concerning the audio element can be eliminated in a main audio element MANAD tag.

<Subtitle Element>

Subtitle element describes the Subtitle Track number assignment for Sub-picture stream in SP_PCK of a P-EVOB, and for Advanced Subtitle.

XML Syntax Representation of Subtitle Element:

```
<Subtitle
track = positiveInteger
streamNumber = positiveInteger
mediaAttr = positiveInteger
description = string
/>
```

Available Sub-picture stream in a P-EVOB shall be described by the list of Subtitle elements in PrimaryAudioVideoClip element.

If Subtitle element is in PrimaryAudioVideoClip element, Subtitle element describes the conversion information from Subtitle Track number to Sub-picture stream in P-EVOB.

If Subtitle element is in AdvancedSubtitleSegment element, Subtitle element describes the corresponding segment of Advanced Subtitle is assigned to specified Subtitle Track number.

(a) Track Attribute

Describes Subtitle Track number. Subtitle Track number shall be integer from 1 to 32.

(b) streamNumber Attribute

If parent element is PrimaryAudioVideoClip element, streamNumber describes Sub-picture stream number plus '1'. Sub-picture stream number shall be converted to decoding stream number by EVOB_SPST_ATRT in accordance with display type. The decoding stream number identifies the SP_PCK in P-EVOB. The streamNumber shall be integer from 1 to 32. If the parent element is AdvancedSubtitleSegment element, streamNumber shall be omitted. Default value is '1'.

(c) mediaAttr Attribute

Describes the media attribute index of Media Attribute Information for Sub-picture stream. The attribute can be omitted. Default value is '1'. For Subtitle element for Advanced Subtitle, the mediaAttr attribute shall be ignored.

(d) Description Attribute

Describes additional information in the human consumable text form. This attribute can be omitted More intelligible explanations will be provided below.

When a subtitle element SBTELE exists in a primary audio clip element PRAVCP, information of conversion from a subtitle track number into a sub-picture stream in primary enhanced video object data P-EVOB is written in information of the subtitle element SBTELE. That is, since correspondence information between track number information TRCKAT of a subtitle and a sub-picture stream number SPSTRN in a sub-picture pack corresponding to the track number is written in (e) of FIG. 59C, it is possible to recognize information of the sub-picture stream number SPSTRN in the sub-picture pack from the track number information TRCKAT of the sub-picture specified by utilizing the correspondence information. If the subtitle element SBTELE exists in an advanced subtitle segment element ADSTSG, setting information set to a segment specified subtitle track number of a corresponding advanced subtitle is written in the subtitle element SBTELE. The track number information TRCKAT of the subtitle shown in (e) of FIG. 59C means a track number of the subtitle, and a positive number from 1 to 32 can be set as the subtitle track number in this embodiment. That is, in this embodiment, up to 32 tracks can be simultaneously set as subtitles. A value of the track number information TRCKAT corresponds to a subtitle track number STTKNM (see (d) of FIG. 62B) in a subtitle track element SBTREL of track navigation information TRNAVI. That is, a relationship between attribute information or sub-picture stream number information written in a subtitle element SBTELE tag in track number assignment information (object mapping information OBMAPI) and user selection enabled/disabled information or language code information written in a subtitle track element SBTREL tag in track navigation information TRNAVI can be recognized through track number information TRCKAT and subtitle track number STTKNM having the same value. When the subtitle element SBTELE exists in a primary audio video clip element PRAVCP, a value obtained by adding "1" to a sub-stream number is set as a value of a sub-picture stream number SPSTRN in a sub-picture pack corresponding to the track number. The sub-picture stream number must be converted into a stream number which is decoded in accordance with each display type by utilizing sub-picture stream attribute information EVOB_SPST_ATTR of an enhanced video object. Moreover, the decoding steam number is associated with a sub-picture pack SP_PCK in primary enhanced video object data P-EVOB in a one-on-one relationship. In this embodiment, a sub-picture stream number SPSTRN in the sub-picture pack must be specified as a positive value from 1 to 32. In this embodiment, information of an advanced subtitle ADSBT does not take such a multiplexed packing conformation as stored in the sub-picture pack SP_PCK. Therefore, a sub-picture stream number SPSTRN in the sub-picture pack cannot be defined. Accordingly, when a subtitle element is written in an advanced subtitle segment element ADSTSG, a description of a sub-picture stream number of the sub-picture pack is eliminated from the subtitle element SBTELE tag. When the description of a sub-picture stream number SPSTRN of the sub-picture pack is eliminated from the subtitle element SBTELE, "1" as a default value is automatically set. As shown in (b) of FIG. 79A, a sub-picture attribute item element SPAITM exists in media attribute information MDATRI in a playlist PLLST. If a plurality of sub-picture attribute item elements SPAITM exist in the media attribute information MDATRI, individual medial index number information INDEX corresponding to compression code information SPCDC of different sub-pictures are written in the form of pairs as shown in (e) of FIG. 79B. Specifying media index number information INDEX shown in (b) of FIG. 79A by an index number MDATNM of a corresponding media attribute element in the media attribute information shown in (e) of FIG. 59C can associate compression code information SPCDC of a corresponding sub-picture. As described above, index number MDATNM information of a corresponding media attribute element in the media attribute information specifies an index number of the media attribute information with respect to a sub-picture stream. In this embodiment, a description of information of the index number MDATNM of a corresponding media attribute element in the media attribute information can be eliminated in the subtitle element SBTELE. In such a case, "1" is automatically set as a default value. In the advanced subtitle ADSBT, the compression code information SPCDC of the sub-picture does not have any meaning. Therefore, when the subtitle element SBTELE is written in an advanced subtitle segment element ADSTSG, a value of the index number MDATNM of a corresponding media attribute element in the media attribute information must be ignored. Additional information concerning a subtitle element SBTELE shown in (e) of FIG. 59C is written in a text format familiar to people, and a description of the additional information can be eliminated in the subtitle element SBTELE tag.

<SubVideo (Sub Video) Element>

SubVideo element describes the Sub Video Track number assignment for Sub Video stream in VS_PCK of a P-EVOB, or for Sub Video stream in VS_PCK of an S-EVOB.

XML Syntax Representation of SubVideo Element:

```
<SubVideo
track = positiveInteger
mediaAttr = positiveInteger
description = string
/>
```

If SubVideo element is present in PrimaryAudioVideoClip element, Sub Video stream in VS_PCK of the P-EVOB is available as Sub Video. Otherwise it is not available.

If SubVideo element is present in SecondaryAudioVideoClip element, Sub Video stream in VS_PCK of the S-EVOB is available as Sub Video. Otherwise it is not available.

(a) Track Attribute

Describes Sub Video Track number. The number shall always be '1'.

(b) mediaAttr Attribute

Describes the media attribute index of Media Attribute Information for Video stream. The attribute can be omitted. Default value is '1'.

(c) Description Attribute

Describes additional information in the human consumable text form. This attribute can be omitted.

More intelligible explanations will be provided below.

A data configuration in a sub video element SUBVD shown in (f) of FIG. 59C will now be described. The sub video element SUBVD corresponds to a sub video stream in a sub video pack VS_PCK of primary enhanced video object data P-EVOB, and sub video track number setting information is written in accordance with each sub video stream. Alternatively, setting information of a sub video track number of a sub-stream recorded in a secondary video pack VS_PCK in secondary enhanced video object data S-EVOB can be written in the sub video element SUBVD. When there is a description of the sub video element SUBVD in a primary audio video clip element PRAVCP, this means that a sub video stream as sub video exists (can be played back) in a secondary video pack VS_PCK of primary enhanced video object data P-EVOB. In other cases, i.e., when a sub video element SUBVD does not exist in the primary audio video clip element PRAVCP, a sub video stream is not recorded in the form of a secondary video pack VC_PCK. If the sub video element SUBVD exists in the secondary audio video clip element SCAVCP, this means that a sub video stream exists (can be used) in the secondary video pack VS_PCK of the secondary enhanced video object data S-EVOB as sub video. In other cases, i.e., when a description of the sub video element SUBVD does not exist in the secondary audio video clip element SCAVCP, a sub video stream does not exist in the form of the secondary video pack VS_PCK. Although track number information TPRCKAT shown in (f) of FIG. 59C is indicative of a sub video track number, providing a plurality of sub video tracks is inhibited in this embodiment, and hence the track number information TRCKAT must be always set as "1". As an index number MDATNM of a corresponding media attribute element in the media attribute information shown in (f) of FIG. 59C, media index number information INDEX in a video attribute item element VABITM described in (d) of FIG. 59B is written, thereby specifying information such as a compression code, an aspect ratio, a resolution, a display screen size and others of corresponding sub video. Additional information concerning a sub video element shown in (f) of FIG. 59C is written in a text format familiar to people, and a description of this information can be eliminated in a sub video element SUBVD tag.

<SubAudio (Sub Audio) Element>

SubAudio element describes the Sub Audio Track number assignment for Sub Audio stream in AS_PCK of a P-EVOB, or for Sub Audio stream in AS_PCK of an S-EVOB.

XML Syntax Representation of SubAudio Element:

```
<SubAudio
track = positiveInteger
streamNumber = positiveInteger
mediaAttr = positiveInteger
```

-continued

```
description = string
/>
```

If SubAudio element is present in PrimaryAudioVideoClip element, Sub Audio stream in VS_PCK of the P-EVOB is available as Sub Audio. Otherwise it is not available.

If SubAudio element is present in SecondaryAudioVideoClip element, Sub Audio stream in AS_PCK of the S-EVOB is available as Sub Audio. Otherwise it is not available.

Available Sub Audio Track in a P-EVOB and S-EVOB shall be described by the list of SubAudio elements in PrimaryAudioVideoClip element and SecondaryAudioVideoClip element, respectively.

(a) Track Attribute

Describes Sub Audio Track number. Sub Audio Track number shall be integer from 1 to 8.

(b) streamNumber Attribute

Describes which Audio stream in AS_PCK in P-EVOB/S-EVOB is assigned to the Sub Audio Track number. The attribute value shall be audio stream_id plus 1. The streamNumber shall be integer from 1 to 8. Default value is '1'.

(c) mediaAttr Attribute

Describes the media attribute index of Media Attribute Information for Audio stream. The attribute can be omitted. Default value is '1'.

(d) Description Attribute

Describes additional information in the human consumable text form. This attribute can be omitted.

More intelligible explanations will be provided below.

At last, a data configuration in a sub audio element SUBAD shown in (g) of FIG. 59C will now be described. The sub audio element SUBAD is indicative of management information concerning a sub audio stream in a secondary audio pack AS_PCK of primary enhanced video object data P-EVOB. Sub audio track number setting information set in accordance with each sub audio stream is written in the sub audio element SUBAD. Further, the sub audio element SUBAD also represents management information concerning a sub audio stream in a secondary audio pack AS_PCK of secondary enhanced video object data S-EVOB in some cases. In such a case, the sub audio track number setting information set in accordance with each sub audio stream is written in the sub audio element SUBAD. If the sub audio element SUBAD exists in the primary audio video clip element PRAVCP, this means that a sub audio stream exists (can be played back) as sub audio in the secondary audio pack AS_PCK of the primary enhanced video object data P-EVOB. Besides, if the sub audio element SUBAD does not exist in the primary audio video clip element PRAVCP, this means that a sub audio stream does not exist in the secondary audio pack AS_PCK. If the sub audio element SUBAD is written in the secondary audio video clip element SCAVCP, this means that a sub audio stream exists (can be played back) as sub audio in the secondary audio pack AS_PCK of the secondary enhanced video object data S-EVOB. Besides, when there is no description of the sub audio element SUBAD in the secondary audio video clip element SCAVCP, a sub audio stream does not exist in the secondary audio pack AS_PCK. Further, sub audio tracks which can be used in the primary enhanced video object data P-EVOB and the secondary enhanced video object data S-EVOB are written as a list of sub audio elements SUBAD in the primary audio video clip element PRAVCP and the secondary audio video clip element SCAVCP, respectively. Track number information TRCKAT shown in (g) of FIG. 59C is indicative of a sub audio track number, and a positive number from 1 to 8 must be written as the sub audio track number in this embodiment. A value of the track number information TRCKAT corresponds to an audio track number ADTKNM (see (d) of FIG. 62B) in an audio track element ADTRK tag of track navigation information TRNAVI. That is, a relationship between attribute information of sub audio SUBAD or sub-audio stream number information written in the sub audio element SUBAD tag in track number assignment information (object mapping information OBMAPI) and user selection enabled/disabled information or language code information written in the audio track element ADTRK tag in the track navigation information TRNAVI is associated by track number information TRCKAT and an audio track number ADTKNM having the same value. As shown in (g) of FIG. 59C, the track number and a sub audio stream number SASTRN in a sub audio pack has a one-on-one relationship. That is, each sub audio track number is set in accordance with each audio stream recorded in the secondary audio pack AS_PCK multiplexed in the primary enhanced video object data P-EVOB or the secondary enhanced video object data S-EVOB, and each sub audio track number is written in the sub audio element SUBAD. Information of the sub-audio stream number SASTRN of a sub audio pack corresponding to the track number is set as information obtained by adding "1" to a value of an audio stream ID. Furthermore, a positive number from 1 to 8 must be set as a value of the sub audio stream number SASTRN of the sub audio pack. In this embodiment, only one track of the sub audio SUBAD can be provided in the secondary audio video SCDAV. Therefore, when the sub audio element SUBAD is written in the secondary audio video clip element SCAVCP, a description of the sub audio stream number SASTRN of the sub audio pack must be eliminated, or a value "1" must be set. In this embodiment, "1" is set as a default value of the audio stream number SASTRN of the sub audio pack. As shown in (c) of FIG. 79B, media index number information INDEX is written in an audio attribute item element AABITM, and audio attribute information such as compression code information ADCDC, a sampling frequency ADSPRT or a quantization bit number SPDPT of corresponding audio can be associated by specifying the media index number INDEX. Setting a value of the media index number information INDEX written in (c) of FIG. 79B as a value of a corresponding media attribute element index number MDATNM in the media attribute information shown in (g) of FIG. 59C can associate the audio attribute information in accordance with each sub audio element SUBAD. Additional information concerning a sub audio element shown in (g) of FIG. 59C is written in a text format familiar to people, and a description of the additional information can be eliminated in the sub audio element SUBAD tag.

<Track Number Assignment Element and Track>

Each Presentation Object assigned in Title Timeline by Object Mapping Information, have one or more elementary streams. Playlist file describes which elementary stream in each Presentation Object is enabled in a Presentation Clip element valid period.

Track is a logical entity for an elementary stream in a Presentation Object, to be selected by API, or user navigation during the Title playback. Track is identified by Track Number per a Title.

There are five types of Track: Video Track to select Angle, Audio Track to select Main Audio, Subtitle Track to select Subtitle, Sub Video Track to select Sub Video and Sub Audio Track to select Sub Audio. Relation among Track, Presentation Object and elementary stream is shown in FIG. 60.

A Presentation Clip element except for ApplicationSegment element can contains a list of element, called by Track Number Assignment element, which describes Track Number Assignment information. Track Number Assignment elements are shown in FIG. 60.

For each Track, Track number shall be assigned by Playlist file. Track number shall be a positive integer.

Track number is used by track selection from API, or User navigation described by Track Navigation Information.

Video Track number is used by Main Video Angle selection. Audio Track number is used by Main Audio selection. Subtitle Track number is used by Sub-picture and Advanced Subtitle selection. Sub Video Track number and Sub Audio Track number are used by the selection of Sub Video and Sub Audio selection.

Track Number Assignment Information describes conversion information from Track number to an Elementary Stream in Presentation Object for each time on Title Timeline.

Track Number Assignment to elementary stream in a Presentation Object shall be described in the corresponding Presentation Clip element. Assignment of Video Track number shall be described by Video element. Assignment of Audio Track number shall be described by Audio element. Assignment of Subtitle Track number shall be described by Subtitle element. Assignment of Sub Video Track number shall be described by SubVideo element. Assignment of SubAudio Track number shall be described by SubAudio element.

For each type of Track and each time in a Title Timeline, Track number shall be uniquely assigned to an elementary stream of the Presentation Clip.

Sub Video Track number shall be '1'.

More intelligible explanations will be provided below.

Playback periods of all playback/display target objects are set on a title timeline TMLE by object mapping information OBMAPI. Additionally, each playback/display object is constituted of "1" or more elementary streams. For example, as shown in FIG. 10, a primary enhanced video object P-EVOB as a playback/display target object of primary audio video PRMAV is constituted of elementary streams such as main video MANVD, main audio MANAD, sub video SUBVD, sub audio SUBAD, a sub-picture SUBPT and others. Further, a timing at which each elementary stream in each playback/display object is displayed to enter a valid period is written in a playlist file PLLST shown in (b) of FIG. 59C. As shown in FIG. 60, a logical identification unit which is set in accordance with each elementary stream in the playback/display object is called a track. For example, as shown in FIG. 10, the main audio MANAD can exist in primary audio video PRMAV, substitute audio SBTAD or substitute audio video SBTAV. It can be associated with a main audio track MATRK in accordance with an identification unit of each main audio MANAD. A track which should be displayed/played back is selected based on an API command or user specification during playback of a specific title, and the selected track is displayed/played back for a user. Each track can be discriminated from other tracks based on each track number in a title. In this embodiment, as shown in FIG. 60, it is possible to define five types of tracks consisting of a main video track MVTRK, a main audio track MATRK, a subtitle track SBTTRK, a sub video track SVTRK and a sub audio track SATRK. Specifying the track number in the advanced content playback unit ADVPL can select specific main video MANVD, main audio MANAD, sub video SUBVD, sub audio SUBAD and sub-picture SUBPT. FIG. 60 shows a relationship between a playback/display object and an elementary stream and each track corresponding to this object. The relationship corresponds to contents of the list depicted in FIG. 10. As shown in (c) to (g) of FIG. 59C, in this embodiment, track number information TRCKAT can be written in each element tag. Therefore, each of these elements is called a track number setting element (a track number assignment element). As shown in (c) to (g) of FIG. 59C, each track number is set (as track number information TRCKAT) in a playlist file PLLST in accordance with each track. Furthermore, a positive number value which is not smaller than "1" must be set as the track number TRCKAT. The track number TRCKAT is selected based on an API command or user specification, and the selected number is utilized to select a track which is displayed/played back for a user. The track number TRCKAT corresponds to various track numbers shown in (d) of FIG. 62B. Information required for selection of a track is written in the track navigation information depicted in (d) of FIG. 62B. Therefore, in the advanced content playback unit ADVPL (the playlist manager PLMNG in the navigation manager NVMNG shown in FIG. 28), the track navigation information is utilized to select a track based on an API command or user specification. Specifically, a video track number VDTKNM (see FIG. 62B or 62C) can be used to select a video angle in the main video MANVD which is displayed for a user. Moreover, an audio track number ADTKNM can be used to select a track in the main audio MANAD. Additionally, specifying a subtitle track number STTKNM can select a predetermined track of the sub-picture SUBPT or the advanced subtitle ADSBT. Further, a sub video track number and a sub audio track number can be used to select tracks of the sub video SUBVD and the sub audio SUBAD. Correspondence information of the track number information TRCKAT and an audio stream number ADSTRN of an audio pack corresponding to the track number is written in (d) of FIG. 59C, and correspondence information of the track number information TRCKAT and a sub-picture stream number SPSTRN of a sub-picture pack corresponding to the track number is written as shown in (e) of FIG. 59C. As can be understood from the above-described example, information which associates each elementary stream in a display/playback object from each track number TRCKAT is written in the track number setting information (the track number assignment information). The track number setting information (the track number assignment) corresponding to each elementary stream recorded in a playback/display object is written in a child element (e.g., a main video element MANVD) in a display/playback clip element (e.g., a primary audio video clip element PRAVCP) which manages the playback/display object. That is, as shown in (c) of FIG. 59C, as a value of the track number information TRCKAT (track attribute information) in the main video element MANVD, a value of the video track number VDTKNM of a corresponding video track element VDTRK in the track navigation information TRNAVI (see (d) of FIG. 62B) is written. Additionally, as shown in (d) of FIG. 59C, as a value of the track number information TRCKAT (the track attribute information) in the main audio element MANAD, a value of the audio track number ADTKNM of a corresponding audio track element ADTRK in the track navigation information TRNAVI (see (d) of FIG. 62B) is written. Further, as shown in (e) of FIG. 59C, as a value of the track number information TRCKAT (the track attribute information) in the subtitle element SBTELE, a value of the subtitle track number STTKNM of a corresponding subtitle track element SBTREL in the track navigation information TRNAVI (see (d) of FIG. 62B) is written. Likewise, as shown in (g) of FIG. 59C, as a value of the track number information TRCKAT (the track attribute information) in the sub audio element SUBAD, a value of the audio track number ADTKNM of a corresponding audio track element ADTRK in the track navigation information TRNAVI (see (d) of FIG. 62B) is written. Furthermore, in this embodiment, the sub video track number (track number information TRCKAT corresponding to a sub video track in (f) of FIG. 59C) must be set to "1". Moreover, in this embodiment, a track number which is different (unique) in accordance with each of different elementary streams in each playback/display clip element must be set. For example, when valid periods on title timelines specified on a plurality of different playback/display clip elements overlap each other, track numbers must be set in such a manner that the track numbers do not overlap between the elementary streams belonging to the different playback/display clip elements in a time zone in which the valid periods overlap. In this embodiment, the same track number may be set between elementary streams having different track types (types each of which indicates contents of an elementary stream such as video/audio/subtitle).

FIGS. 61A to 61C show examples of a description of track number assignment information. A setting method of a track number set in each elementary stream written in FIGS. 61A to 61C is based on a relationship depicted in FIG. 60. In an example shown in (c) of FIG. 61C, information of a time map PTMAP concerning the primary audio video PRMAV is stored under a file name AVMAP001.MAP in the information storage medium DISC. In this embodiment, a file name and a storage position of corresponding primary enhanced video object data P-EVOB also match of those of the time map file PTMAP (however, an extension alone of the file name differs like "MAP" and "EVO"). That is, a file name under which the primary enhanced video object data P-EVOB corresponding to the primary audio video PRMAV is recorded is a file name AVMAPOO1.EV0. As shown in (c) of FIG. 61C, since "clipTimeBegin="00:00:00:00"" is written in the primary audio video clip element PRAVCP, playback is started from a leading position of the primary enhanced video object data P-EVOB file when playback is performed in a playlist PLLST. In the playlist PLLST, playback is performed until 10 minutes and 21 seconds elapse from a top position on a title timeline TMLE. The main video MANVD existing in the primary audio video PRMAV is multiangled, and the video having an angle number "1" is set as a video track number "1", and the video having an angle number "2" is set as a video track number "2". Three audio tracks exist in the primary audio video PRMAV. An elementary audio stream having a stream number "0" is set to an audio track number "1", an elementary audio stream having a stream number "2" is set to an audio track number "2", and an elementary audio stream having an audio stream number "3" is set to an audio track number "3". Further, at the same time, two subtitle tracks are provided. In the embodiment shown in (c) of FIG. 61C, it is possible to playback/display substitute audio SBTAD stored in the persistent storage PRSTR in place of main audio MANAD of primary audio video PRMAV. When an audio track number in this example is set to "4", a user can selectively playback/display any main audio MANAD having one of audio track numbers from "1" to "4". Furthermore, in the embodiment shown in (c) of FIG. 61C, an advanced subtitle ADSBT stored in the persistent storage PRSTR can be simultaneously displayed at completely the same timing as a display timing of the primary audio video PRMAV. A track number of the advanced subtitle ADSBT in this case is set to "3", and the advanced subtitle is set in the primary audio video PRMAV in advance and can be selectively displayed with sub-picture SUBPT. That is, subtitle tracks "1" to "3" exist, and any subtitle track from "1" to "3" can be selectively displayed while displaying the main video MANVD having a specific angle of the main videos MANVD in the primary audio video PRMAV.

Figure 62A:
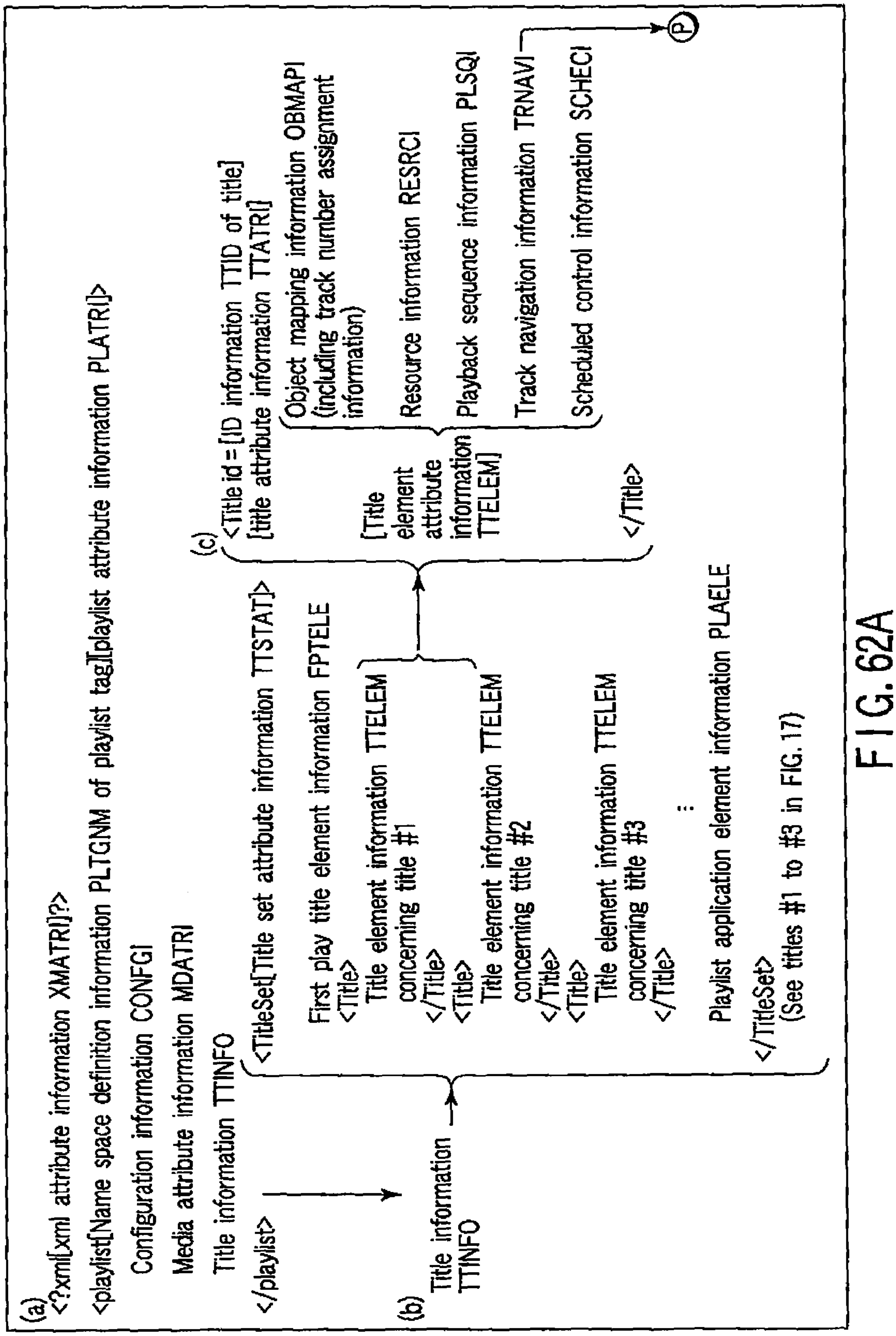

The track number assignment information shown in (c) to (g) of FIG. 59C represents the correspondence between a stream number of a corresponding stream and a track number TRCKAT and a relationship with respect to media attribute information (an index number MDATNM of a media attribute element) corresponding to each track number TRCKAT. On the other hand, contents of the track navigation information TRNAVI shown in (d) of FIG. 62B to (e) of FIG. 62C are a collective description of information required for a user to select each track number. An information link between the track number assignment information and the track navigation information TRNAVI is associated based on each track number TRCKAT. That is, the same value as the track information TRCKAT shown in (c) to (d) of FIG. 59C is set to a video track number VDTKNM, an audio track number ADTKNM and a subtitle track number shown in (d) of FIG. 62B, and the same value can be utilized to link the track number assignment information and the track navigation information TRNAVI. A description will now be given as to a position in a playlist PLLST where the track navigation information TRNAVI is written with reference to FIGS. 62A to 62C. As shown in FIGS. 62A to 62C, configuration information CONFGI, media attribute information MDATRI and title information TTINFO exist in the playlist PLLST. As shown in (b) of FIG. 62A, first play title element information FPTELE, title element information TTELEM concerning each title, and playlist application element information PLAELE exist in the title information TTINFO. As shown in (c) of FIG. 62A, the track navigation information TRNAVI exists in the title element information TTELEM for each title.

As described above, the track navigation information TRNAVI exists in the title element information TTELEM in the playlist file PLLST. The track navigation information TRNAVI is constituted of a track navigation list element as shown in (e) of FIG. 62C. A list concerning a main video track MVTRK, a main audio track MATRK, a sub audio track SATRK and a sub title track SBTTRK which can be selected by a user is written in the track navigation information TRNAVI. As shown in (d) of FIG. 62B, in the track navigation information TRNAVI, attribute information concerning the main video track MVTRK which can be selected by a user is written in a video track element VDTRK. Moreover, likewise, attribute information concerning the main audio track MATRK and the sub audio track SATRK which can be selected by a user is recorded in an audio track element ADTRK, and attribute information concerning the subtitle track SBTTRK which can be selected by a user is written in a subtitle track element SBTREL. As shown in (d) of FIG. 62B, a flag USIFLG (selectable attribute information) indicating whether user selection is enabled exists in all of the video track element VDTRK, the audio track element ADTRK and the subtitle track element SBTREL. A value shown in the flag USIFLG (the selectable attribute information) indicating whether user selection is enabled represents whether a corresponding track can be selected by a user. That is, when a value which is written after “selectable=” is “true”, this means that a corresponding track can be selected by a user. When a value which is written after “selectable=” is “false”, this means that a corresponding track cannot be selected by a user. In this manner, the main video track MVTRK, the main audio track MATRK, the sub audio track SATRK or the subtitle track SBTTRK having a value of the selectable attribute information being set as “true” is called a user selectable track. As shown in FIG. 44, a storage position of a default event handler script DEVHSP exists in the advanced application manager ADAMNG. FIG. 45 shows contents of a default input handler stored in the default even handler script DEVHSP. As shown in FIG. 45, a default input handler name changeSubtitleHandler (a virtual key code is VK_SUBTITLE) means a user input event which is a change in a subtitle track. Additionally, a default input handler name changeAudioHandler (the virtual key code is VK_AUDIO) means a user input event concerning switching of audio tracks. The user selectable track is selected based on a user operation defined by the default event handler. Further, as shown in (e) of FIG. 62C, a track having a value of “selectable=” being set as “false” is called a user non-selectable track. Furthermore, in regard to the main audio track MATRK and the sub audio track SATRK, information of an audio language code and a language code extension descriptor is set based on audio language code and audio language extension descriptor ADLCEX (language attribute information) written in an audio track element ADTRK. Further, in regard to the subtitle track SBTTRK, information of a language code and a language code extension descriptor are set based on a subtitle language code and a subtitle language code extension descriptor STLCEX (langcode attribute information) in the subtitle track element SBTREL. The language code and the language code extension descriptor are utilized by an API command which selects a track. Moreover, when a value of a flag FRCFLG (forced attribute information) attribute indicative of forced screen output which is written in the subtitle track element SBTREL, a corresponding subtitle track SBTTRK (a sub-picture SUBPT) must be forcibly output to a screen irrespective of a will of a user. On the contrary, when a value of the flag FRCFLG (the forced attribute information) indicative of the forced screen output is set to “false”, a corresponding subtitle (a sub-picture SUBPT) does not necessarily have to be output to a screen, and whether display is performed can be set by user selection. For example, when a subtitle is prevented from being displayed by user selection, forcibly displaying in a screen a subtitle in a specific region alone by an intention of a content provider improves the expression for a user in some cases. In such a case, setting a value of the flag FRCFLG (the forced attribute information) indicative of the forced screen output to “true” can improve the expression of a content provider for a user. Furthermore, additional information written in a text format can be written in accordance with each track element, and it can be also utilized for identification for each track.

<TrackNavigationList (Track Navigation List) Element>

TrackNavigationList element describes Track Information in a Title. Track Information for a Title is described in Track Information element describes the all attribute for a Track.

XMT Syntax Representation of TrackNavigationList Element:

```
<TrackNavigationList>
VideoTrack *
AudioTrack *
SubtitleTrack *
</TrackNavigationList>
```

The content of TrackNavigationList consists of a list of VideoTrack element, AudioTrack element and SubtitleTrack element. These elements are called by Track Navigation Information element.

More intelligible explanations will be provided below.

The track navigation list element explains track information in a title. Contents of the track navigation list are constituted of a list of a video track element VDTRK, an audio track element ADTRK and a subtitle track element SBTREL, and these elements are called track navigation information elements TRNAVI. Further, the track information in a title is written in the video track element VDTRK, the audio track element ADTRK and the subtitle track element SBTREL. Furthermore, the video track element VDTRK, the audio track element ADTRK and the subtitle track element SBTREL are also indicative of attribute information with respect to a track.

<VideoTrack (Video Track) Element>

VideoTrack element describes the attribute list of Video Track.

XML Syntax Representation of VideoTrack Element:

```
<VideoTrack
track = positiveInteger
selectable = (true | false)
description = string
/>
```

(a) Track Attribute

Describes the Video Track number of the representing Video Track. Video Track number shall be integer from 1 to 9.

(b) Selectable Attribute

Describes whether the Track can be selectable by User Operation, or not. If the value is "true", the Track shall be selectable by User Operation, otherwise it shall not. The value may be omitted. The default value is "true".

(c) Description Attribute

Describes additional information in the human consumable text form. This attribute can be omitted.

More intelligible explanations will be provided below.

The video track element VDTRK shown in (d) of FIG. 62B and (e) of FIG. 62C will now be described. The video track element VDTRK represents an attribute information list of a main video track MVTRK. A video track number VDTKNM (track attribute information) in the video track element VDTRK is indicative of a video track number VDTKNM which is used to identify each video track. In this embodiment, a positive number from 1 to 9 must be set as a value of the video track number VDTKNM. That is, in this embodiment, up to nine main video track MVTRK can be set, and a user can select one of these tracks. Setting up to nine user selectable main video tracks MVTRK can greatly improves the expression of a content provider for a user. Additionally, a flag USIFLG (selectable attribute information) indicating whether a corresponding main video track MVTRK can be selected by a user operation. When a value of the flag USIFLG indicating whether user selection is enabled is set to "true", this means that a corresponding main video track MVTRK can be selected by a user operation. When a value of this flag is set to "false", this means that a corresponding main video track cannot be selected by a user operation. A description of the flag USIFLG indicating whether user selection is enabled can be eliminated in the video track element VDTRK. In this case, "true" as a default value is automatically set. Although the attribute information concerning a video track is written in a text format familiar to people, a description of the additional information can be eliminated in the video track element VDTRK.

<AudioTrack (Audio Track) Element>

AudioTrack element describes the attribute list of Audio Track.

XML Syntax Representation of AudioTrack Element:

```
<AudioTrack
track = positiveInteger
selectable = (true | false)
langcode = langCode
description = string
/>
```

(a) Track Attribute

Describes the Audio Track number of the representing Audio Track. Audio Track number shall be integer from 1 to 8.

(b) Selectable Attribute

Describes whether the Track can be selectable by User Operation, or not. If the value is "true", the Track shall be selectable by User Operation, otherwise it shall not. The value may be omitted. The default value is "true".

(c) Langcode Attribute

Describes the specific code and the specific code extension for this Audio Track number. The attribute value shall be langCode data type defined in Datatypes.

(d) Description Attribute

Describes additional information in the human consumable text form. This attribute can be omitted.

More intelligible explanations will be provided below.

An audio track element ADTRK shown in (d) of FIG. 62B and (e) of FIG. 62C will now be described. The audio track element ADTRK represents an attribute list of a main audio track MATRK and a sub audio track SATRK. As an audio track number ADTKNM (track attribute information) in the audio track element ADTRK, an audio track number ADTKNM which is utilized to identify each audio track is set. A flag USIFLG (selectable attribute information) indicating whether user selection is possible indicates whether a main audio track MATRK or a sub audio track SATRK can be selected by a user operation. If a value of the flag USIFLG indicating whether the user selection is possible is "true", this means that a corresponding audio track can be selected by a user operation. If this value is "false", a corresponding audio track cannot be selected by a user operation. A description of the flag USIFLG indicating whether the user selection is possible can be eliminated in the audio track element ADTRK. In this case, "true" which is a default value is automatically set. In this embodiment, as a value of the audio track number ADTKNM, a positive number value from 1 to 8 must be used. Setting up to eight audio tracks to be selectable in this manner can greatly improve the expression of a content provider for a user. Further, as an audio language code and an audio language code extension descriptor ADLCEX (langcode attribute information), a specific code and a specific code extension descriptor for a corresponding audio track number ADTKNM are written. Here, as shown in (e) of FIG. 62C, "ja" is used as a value representing Japanese, and "en" is used as a value representing English. Furthermore, assuming that contents of an audio track differ even in the same Japanese or the same English, a colon can be arranged after a language code number and a numerical character can be set after the colon (e.g., "ja:01") as a value of the audio language code and the audio language code extension descriptor ADLCEX (langcode attribute information). Moreover, additional information concerning an audio track is written in a text format familiar to people, but a description of the additional information can be eliminated in the audio track element ADTRK.

<SubtitleTrack (Subtitle Track) Element>

SubtitleTrack element describes the attribute list of Subtitle Track.

XML Syntax Representation of SubtitleTrack Element:

```
<SubtitleTrack
track = positiveInteger
selectable = (true | false)
forced = (true | false)
langcode = langCode
description = string
/>
```

(a) Track Attribute

Describes the Subtitle Track number of the representing Subtitle Track. Subtitle Track number shall be integer from 1 to 32.

(b) Selectable Attribute

Describes whether the Track can be selectable by User Operation, or not. If the value is “true”, the Track shall be selectable by User Operation, otherwise it shall not. The value may be omitted. The default value is “true”.

(c) Langcode Attribute

Describes the specific code and the specific code extension for this Audio Track number. The attribute value shall be langCode data type defined in Datatypes.

(d) Forced Attribute

Describes whether the Subtitle Track can be forcedly displayed, or not. If the value is “true”, the Subtitle shall be forcedly displayed, otherwise it shall not. The value may be omitted. The default value is “false”.

(e) Description Attribute

Describes additional information in the human consumable text form. This attribute can be omitted.

More intelligible explanations will be provided below.

A subtitle track element SBTREL will now be described. The subtitle track element SBTREL represents an attribute list of a subtitle track SBTTRK. A subtitle track number STTKNM (track attribute information) is utilized to identify each subtitle track, and a positive number from 1 to 32 must be written as a value of the subtitle track number STTKNM. In this embodiment, setting 32 subtitle tracks SBTTRK can greatly improve the expression for a user. Additionally, a flag USIFLG (selectable attribute information) indicating whether user selection is possible indicates whether a subtitle track SBTTRK can be selected by a user operation. When the value is “true”, this means that a subtitle track SBTTRK can be selected by a user operation. If the value if “false”, this means that selection by a user operation is impossible. A description of the flag USIFLG indicating whether user selection is possible can be eliminated in the subtitle track element SBTREL. However, in this case, “true” as a default value is automatically set. A subtitle language code and a subtitle language code extension descriptor STLCEX represent a specific code and a specific code extension descriptor concerning a corresponding subtitle track SBTTRK. Further, a flag FRCFLG (forced attribute information) concerning forced screen output indicates whether a corresponding subtitle track SBTTRK is forcibly output to a screen. If the value is “true”, a corresponding subtitle track SBTTRK must be forcibly output to screen. If the value is “false”, a corresponding subtitle track does not have to be necessarily forcibly output to the screen. A description of the value (the flag FRCFLG indicating forced screen output) can be eliminated in a corresponding subtitle track element SBTREL. In this case, “false” as a default value is automatically set. Furthermore, although additional information concerning a subtitle track SBTTRK is written in a text format familiar to people, a description of the additional information can be eliminated in the subtitle track element SBTREL.

A specific example of the track navigation list shown in (e) of FIG. 62C will now be described. In (e) of FIG. 62C, three video track exists. Of these tracks, a user can select main video tracks having track numbers “1” and “2”, and cannot select a main video track MVTRK having a track number “3”. Moreover, four audio tracks are set. In the embodiment shown in (e) of FIG. 62C, track numbers of the main audio tracks MATRK and the sub audio tracks SATRK are set in such a manner that their respective audio track numbers ADTKNM do not overlap each other, and different audio track numbers ADTKNM are set for the main audio track MATRK and the sub audio track SATRK. As a result, the main audio track MATRK and the sub audio track SATRK can be selectively specified as audio tracks to be played back. An audio track having an audio track number ADTKNM “1” is displayed in English (en), and audio tracks having audio track numbers ADTKNM “2” and “3” are displayed in Japanese (ja). Although audio tracks having audio track numbers ADTKNM “1” to “3” can be selected by a user, but an audio track having an audio track number ADTKNM “4” cannot be selected by the user. Although the audio tracks having the audio track numbers ADTKNM “2” and “3” are likewise displayed in Japanese, they have different audio contents, and values of the audio language code and the audio language code extension descriptor ADLCEX are identified as “ja:01” and “ja:02”. Additionally, four subtitle tracks SBTTRK are set with subtitle track numbers STTKNM “1” to “4”. A subtitle track SBTTRK having a subtitle track number STTKNM “1” is displayed in English (en) and can be selected by a user, but the flag FRCFLG indicative of forced screen output is set to “true” for the subtitle track SBTTRK. Therefore, the subtitle track SBTTRK having the subtitle track number STTKNM “1” displayed in English must be forcibly output to a screen. Further, a subtitle track SBTTRK having a subtitle track number STTKNM “2” is displayed in Japanese (ja), and a subtitle track SBTTRK having a subtitle track number STTKNM “3” is displayed in Chinese (ch). Both subtitle tracks SBTTRK having subtitle track numbers STTKNM “2” and “3” can be selected by a user. On the other hand, a subtitle track SBTTRK having a subtitle track number STTKNM “4” cannot be selected by a user.

According to the above-described setting (writing) method of the audio track element ADTRK, the audio track number ADTKNM set in the audio track element ADTRK corresponding to the main audio track MATRK and the audio track number ADTKNM set in the audio track element ADTRK corresponding to the sub audio track SATRK must be set in such a manner that the same numbers do not overlap each other. As a result, different audio track numbers ADTKNM are set in the audio track element ADTRK corresponding to the main audio track MATRK and the audio track element ADTRK corresponding to the sub audio track SATRK. As a result, when a user selects a specific audio track number ADTKNM by using the track navigation information TRNAVI, either the main audio track MATRK or the sub audio track SATRK can be selected as audio information which is displayed/output for the user. In the embodiment, as shown in (e) of FIG. 62B, both the audio track element ADTRK corresponding to the main audio track MATRK and the audio track element ADTRK corresponding to the sub audio track SATRK are arranged (written) in the track navigation list element (the track navigation information TRNAVI). This embodiment is not restricted to the above example, and can adopt the following different application example. That is, as another application example, there is a method which sets the audio track element ADTRK corresponding to the main audio track MATRK alone but does not set the audio track element ADTRK corresponding to the sub audio track SATRK. In this case, the main audio track MATRK alone is written in a track section corresponding to the audio track element ADTRK shown in (d) of FIG. 62B, and the sub audio track SATRK is removed. In this application example, the audio track element ADTRK corresponding to the main audio track MATRK alone is arranged (written) in the track navigation list element (the track navigation information TRNAVI), and a user selects the main audio track MATRK alone as audio information to be displayed/output. In this application example, the sub audio track SATRK is automatically selected in accordance with the main audio track MATRK. For example, when a user utilizes the track navigation information TRNAVI to select a main audio track MATRK having a "track number 3", a sub audio track SATRK having a "track number 3" is automatically selected as the sub audio track SATRK to be displayed/output for a user.

Figure 63A:
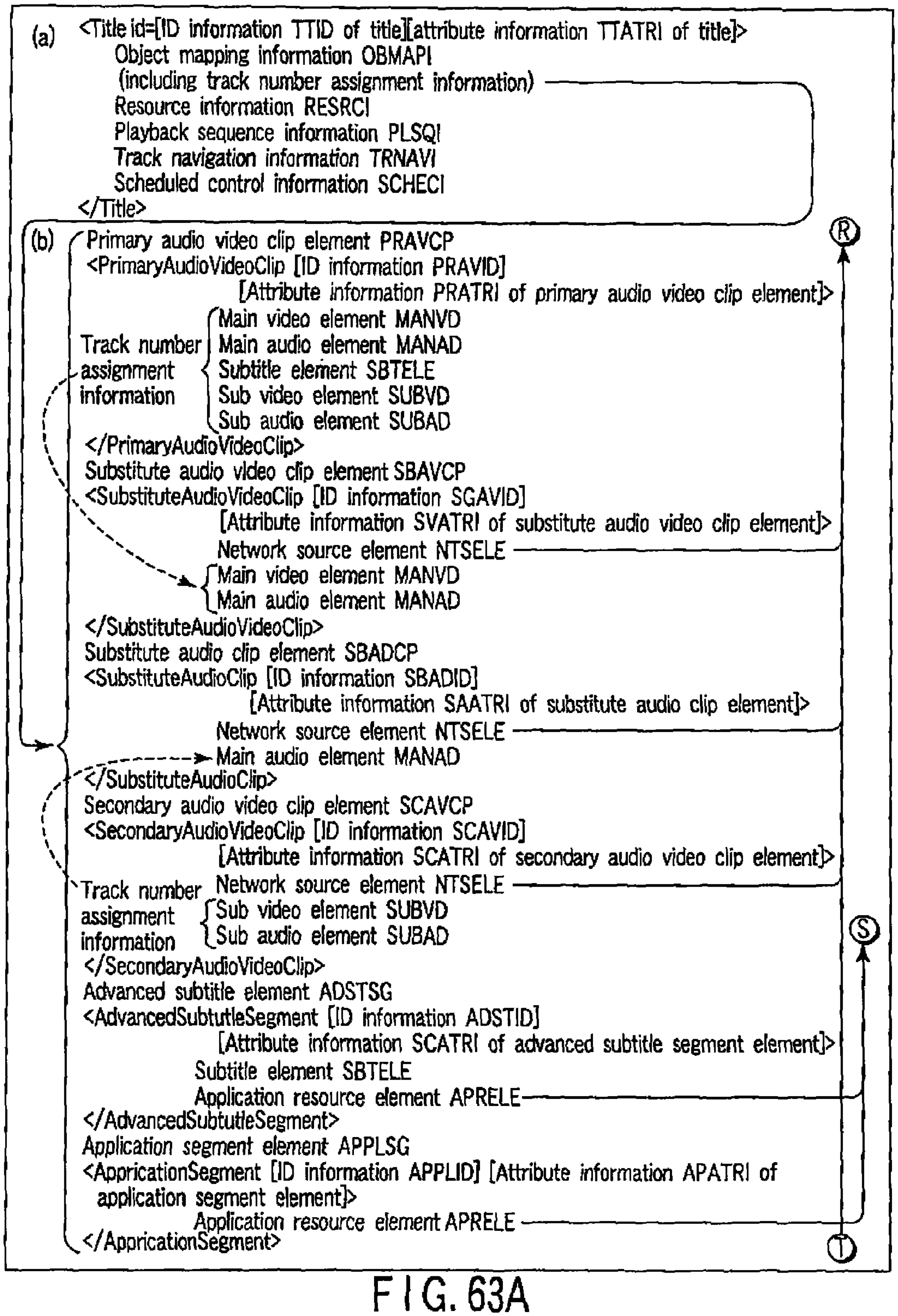
Figure 67:
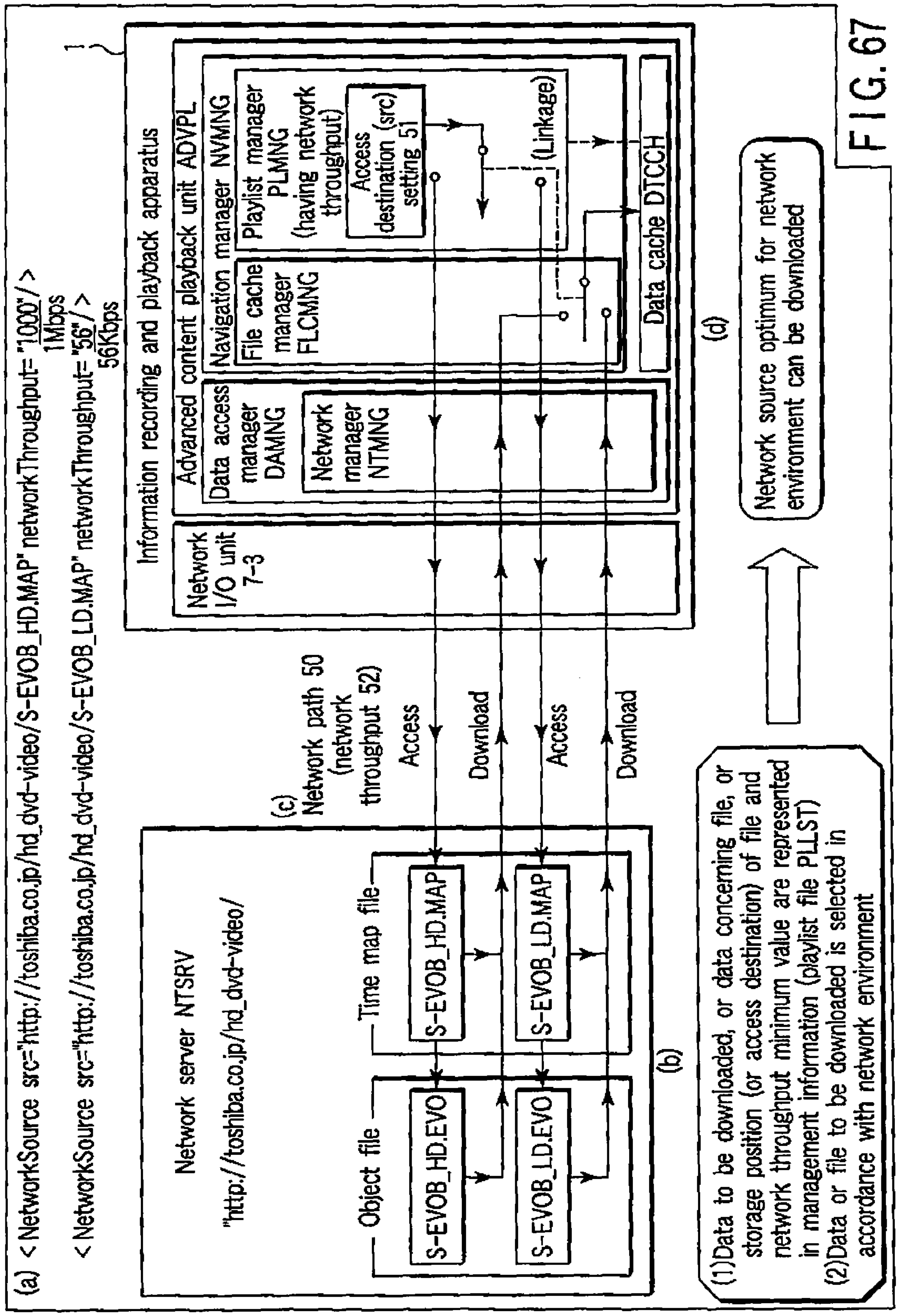
FIG. 67 is an exemplary view showing a network source extraction model optimum for a network environment using a network source element.

A data configuration of a network source element NTSELE in object mapping information OBMAPI included in a playlist PLLST is shown in (c) of FIG. 63B. Further, likewise, a data configuration of an application resource element APRELE in the object mapping information OBMAPI is shown in (d) of FIG. 63C. When a resource which is temporarily stored in the data cache DTCCH by the advanced content playback unit ADVPL in advance exists in the network server NTSRV, the network source element NTSELE can be written in the object mapping information OBMAPI. As shown in FIG. 18, as an object name with which an original recording position can be a playback/display target which can exist in the network server NTSRV, there are substitute audio video SBTAV, secondary audio video SCDAV, substitute audio SBTAD, an advanced subtitle ADSBT and an advanced application ADAPL. Therefore, as a clip element corresponding to an object which can set the network server NTSRV as an original recording position, there are a substitute audio video clip SBAVCP, a secondary audio video clip SCAVCP, a substitute audio clip SBADCP, an advanced subtitle segment ADSTSG and an application segment APPLSG. In accordance with this configuration, as shown in FIGS. 63A to 63C, the network source element NTSELE can be written in the substitute audio video clip element SBAVCP, the substitute audio clip element SBADCP and the secondary audio video clip element SCAVCP. In (b) of FIG. 63A, although one network source element NTSELE is written in accordance with each clip element, the plurality of network source elements NTSELE can be actually written in the same clip element. As shown in FIG. 67, writing one or more network source elements in the same clip element can set a resource perfect for a network environment of the information recording and playback apparatus 1.

<NetworkSource (Network Source) Element>

NetworkSource element describes a candidate of network content, or resources for the specified network throughput setting.

XML Syntax Representation of Video Element:

```
<NetworkSource
src = anyURI
networkThroughput = nonNegativeInteger
/>
```

NetworkSource element can be presented in SecondaryAudioVideoClip element, or in SubstituteAudioClip element, if and only if the dataSource attribute value is 'Network'.

NetworkSource element can be presented in ApplicationResource element, or in TitleResource element, if and only if the URI scheme of src attribute value of parent element is 'http', or 'https'.

(a) src Attribute

Describes the URI for network source for the network throughput described by networkThroughput attribute. If the parent element is SecondaryAudioVideoClip element, or SubstituteAudioClip element, the src attribute value shall be the URI of the TMAP file of the Presentation Object to be referred. If the parent element is ApplicationResource element, or TitleResource element, the src attribute value shall be the URI of an Archiving file, or a file to be loaded in File Cache. The URI scheme of the src attribute value shall be 'http', or 'https'.

(b) networkThroughput Attribute

Describes the minimum network throughput value to use this network content, or resource. The attribute value shall be nonnegative integer with unit of 1000 bps.

More intelligible explanations will be provided below.

The network source element NTSELE shown in (c) of FIG. 63B is indicative of potential network contents which are temporarily stored in the data cache DTCCH. Furthermore, information concerning network throughput conditions which guarantee a resource corresponding to the potential network contents at the time of download into the file cache FLCCH is also written in the network source element NTSELE. Moreover, when a value written in SRC attribute information in an application resource element APRELE or a title resource element starts from "http" or "https", the network source element NTSELE can be written in the application resource element APRELE or the title source element. Allowable minimum value information NTTRPR of a network throughput shown in (c) of FIG. 63B is indicative of a minimum value which is allowed as a network system in relation to a network throughput (a data transfer rate) when downloading a network source (data or a file) from a storage position specified by corresponding SRC attribute information SRCNTS. Additionally, a value of the allowable minimum value information NTTRPT of the network throughput is written in units of 1000 bps. As a value recorded in the allowable minimum value information NTTRPT of the network throughput, "0" or a value of a natural number must be recorded. A value of a storage position SRCNTS of a network source corresponding to the allowable minimum value of the network throughput is written in src attribute information in the network source element NTSELE shown in (c) of FIG. 63B, and it is written based on a URI (uniform resource information) display format. When this network source element NTSELE is set in the secondary audio video clip element SCAVCP, the substitute audio video clip element SBAVCP or the substitute audio clip element SBADCP, a storage position of a time map file STMAP of secondary enhanced video object data S-EVOB is specified. Furthermore, when the network source element NTSELE is set in the application resource element APRELE or the title resource element, src attribute information indicates a storage position of a file which is loaded to the file cache FLCCH. As concrete file contents which are loaded into the file cache FLCCH, there are a manifest file MNFST, a markup file MRKUP, a script file SCRPT, a still image file IMAGE, an effect audio file EFTAD and a font file FONT included in an advanced application directory ADAPL shown in FIG. 11, a manifest file MNFSTS of an advanced subtitle, a markup file MRKUPS of an advanced subtitle and a font file FONTS of an advanced subtitle existing in an advanced subtitle directory, and others. As shown in FIG. 10 or 25, even though the advanced application ADAPL and the advanced subtitle ADSBT are stored in the information storage medium DISC, the persistent storage PRSTR or the network server NTSRV, they must be temporarily stored in the file cache FLCCH in advance and played back/displayed from the file cache FLCCH. In this manner, information of a storage position (a path), a file name and a data size of a resource which is referred (used) from the advanced subtitle ADSBT is written in the application resource element APRELE shown in (d) of FIG. 63C. Additionally, the application resource element APRELE can be written in an advanced subtitle element ADSTSG or an application segment element APPLSG. Further, in this embodiment, it must be written as an application resource element APRELE which differs in accordance with each resource which is referred (used) for each piece of contents. For example, as shown in FIG. 12 or 11, when there are the manifest MNFSTS of the advanced subtitle, the markup MRKUPS of the advanced subtitle and the font FONTS of the advanced subtitle exist as contents constituting the advanced subtitle ADSBT, one application resource element APRELE corresponding to the manifest MNFSTS of the advanced subtitle, an application resource element APRELE corresponding to the markup MRKUPS of the advanced subtitle and an application resource element APRELE corresponding to the font FONTS of the advanced subtitle are written in the advanced subtitle segment element ADSTSG in (b) of FIG. 63A. In (b) of FIG. 63A, one application resource element APRELE alone is written in the advanced subtitle segment element ADSTSG and one application resource element APRELE is written in the application segment element APPLSG. However, in reality, the application resource element APRELE alone is written in accordance with each piece of contents constituting the advanced subtitle ADSBT, and the plurality of application resource elements APRELE are written in accordance with each resource which is referred (used) from the advanced application ADAPL. Moreover, as shown in (d) of FIG. 63C, when a resource which is managed by the application resource element APRELE is stored in the network server NTSRV, the network source element NTSELE can be written in the application resource element APRELE. As shown in the example of FIG. 67, when a plurality of resources indicative of the same contents (files representing the same contents) (which are different from each other in data size) are stored in the network server NTSRV, one or more network source elements NTSELE can be written in the same application resource element APRELE, and an optimum resource corresponding to a network environment of the information recording and playback apparatus 1 can be selected and downloaded.

<ApplicationResource (Application Resource) Element>

ApplicationResource element describes Application Associated Resource Information, such as a package archive file used in the Advanced Application, or in the Advanced Subtitle.

XML Syntax Representation of ApplicationResource Element:

```
<ApplicationResource
src = anyURI
size = positiveInteger
priority = nonNegativeInteger
multiplexed = (true | false)
loadingBegin = timeExpression
noCache = (true | false)
description = string
>
    NetworkSource *
</ApplicationResource>
```

ApplicationResource element determines which Archiving Data, or a file shall be loaded in File Cache. The src attribute refers to Archiving Data, or a file.

Player shall load the resource file into File Cache before the Application Life Cycle Start.

The valid period of the resource is implied from the valid period of the parent ApplicationSegment element.

The start time and finish time of valid period of the resource on Title Timeline is the start time and finish time of the valid period of the parent ApplicationSegment element, respectively.

Resources may be multiplexed in Primary Video Set. In this case, the loadingBegin attribute describes the start time of loading period in which, ADV_PCK of P-EVOB contains the Resource.

Resources may come from Persistent Storage indicating by URI [FIG. 20]. In this case the loadingBegin attribute describes the start time of loading period to download the Resource from Persistent Storage.

Resources may come from network server, i.e, the URI scheme of src attribute is 'http', or 'https'. In this case the loadingBegin attribute describes the start time of loading period to download the Resource.

NetworkSource element can be presented in ApplicationResource element, if and only if the URI scheme of src attribute value of parent element is 'http', or 'https'. NetworkSource element describes the Resources to be selected according to network throughput setting.

(a) src Attribute

Describes the URI for the Archiving Data, or a file to be load into Data Cache.

(b) Size Attribute

Describes the size of the Archiving Data, or a file in bytes. This attribute can be omitted.

(c) Priority Attribute

Describes the priority of removal of resources which is not referred by active Application, or Title. Priority shall be integer from 1 to $2^{31}-1$.

(d) Multiplexed Attribute

If value is 'true', the Archiving Data can be loaded from ADV_PCK of P-EVOB in the loading period of Title Timeline. If the value is 'false', Player shall preload the resource from the specified URI. This attribute can be omitted. Default value is 'true'.

(e) loadingBegin Attribute

Describes the start time of loading period on Title Timeline. If no loadingBegin attribute is present, the start time of loading period shall be the start time of valid period of the associated Advanced Application.

(f) noCache Attribute

If noCache attribute value is 'true' and URI scheme of src attribute value of parent element is 'http', or 'https', the 'no-cache' directive shall be included in both Cache-Control and Pragma in HTTP request for the resource file. If noCache attribute value is 'false' and URI scheme of src attribute value of parent element is 'http', or 'https', 'no-cache' directive shall be included in neither Cache-Control, nor Pragma header. If URI scheme of src attribute value of parent element is 'http', or 'https', the noCache attribute shall be absent. The noCache attribute can be omitted. Default value is 'false'.

(g) Description Attribute

Describes additional information in the human consumable text form. This attribute can be omitted.

More intelligible explanations will be provided below.

For example, resource information RESRCI concerning a resource which is referred (used) by an application such as an advanced subtitle ADSBT or an advanced application ADAPL is written in an application resource element APRELE shown in (d) of FIG. 63C. Further, the application resource element APRELE is indicative of a storage position (a path) and a file name (a data name) of a resource which should be stored (loaded) in the file cache FLCCH. The storage position (the path) and the file name (the data name) of the resource are written in src attribute information. The advanced content playback unit ADVPL must store a resource file specified by the application resource element APRELE in the file cache FLCCH before execution of an application such as an advanced subtitle ADSBT or an advanced application ADAPL is started. Furthermore, a valid period of the application resource element APRELE must be included in a valid period (a period from titleTimeBegin/TTSTTM to titleTimeEnd/TTEDTM shown in (d) of FIG. 56B) of the application segment element APPLSG. A start time in the valid period on a title timeline TMLE of a resource defined by the application resource element APRELE matches with a start time TTSTTM (titleTimeBegin) on the title timeline indicative of a start timing of the valid period of a corresponding application segment element APPLSG, and an end time in the valid period on the title timeline of the resource matches with an end time TTEDTM (titleTimeEnd) on the title timeline indicative of an end timing of the valid period written in a corresponding application segment element APPLSG. A state in which an advanced pack ADV_PCK is multiplexed in primary enhanced video object data P-EVOB is shown in (d) of FIG. 73A. As described above, a resource indicated by the application resource element APRELE shown in (d) of FIG. 63C may be multiplexed and recorded in a primary video set PRMVS. A time PRLOAD (loadingBegin) on a title timeline at which fetching (loading) a target resource begins represents a start time of a loading period of an advanced pack ADV_PCK of the primary enhanced video object data P-EVOB including a corresponding resource. Moreover, as a storage position of the resource, a position in the persistent storage PRSTR can be specified. In this case, a time PRLOAD (loadingBegin) on the title timeline at which fetching (loading) a target resource begins means a start time of a loading period in which the resource is downloaded from the persistent storage PRSTR. The network server NTSRV may be specified as the storage position of a resource. In this case, src attribute information is written in the form of a URI (a uniform resource identifier) starting from "http" or "https". In this case, a time PRLOAD (loadingBegin) on the title timeline at which fetching (loading) a target resource begins represents a start time of a loading period in which the corresponding resource is downloaded. When a value of src attribute information in the application resource element APRELE shown in (d) of FIG. 63C is written in the form of a URI (a uniform resource identifier) starting from "http" or "https", this means that a storage position SRCDTC of data or a file downloaded into the data cache DTCCH exists in the network server NTSRV. Additionally, in such a case, a network source element NTSELE may be written in the application resource element APRELE. As shown in FIG. 67, the network source element NTSELE represents resource information which should be selected in accordance with a setting of a network throughput. Each attribute information in an application resource element APRELE tag shown in (d) of FIG. 63C will now be described. Size information DTFLSZ of the data or the file to be loaded in the data cache is indicated by a value of a positive number in units of bytes, and a description of this information may be eliminated in the application resource element APRELE tag. Priority information PRIORT (priority attribute information) for removal of a corresponding resource represents a priority when removing from the data cache the corresponding resource which is not referred (used) from a title or an advanced application which is currently executed. That is, application resource elements APRELE which is not referred (used) by the advanced application are sequentially removed in the order of descending priorities. Further, as this value, it is possible to write a value of a positive number in a range from 1 to "$2^{31}-1$". Removal is performed from a resource having a higher value set in the priority attribute information. The application resource is divided every 2048 bytes, data for each set of 2048 bytes is packaged into the advanced pack ADV_PCK, and it is multiplexed in the primary enhanced video object data P-EVOB and recorded in the information storage medium DISC as shown in FIG. (d) of FIG. 73A in some cases. Information indicative of whether the application resource is recorded in the multiplexed form is called multiplexed attribute information MLTPLX (multiplexed attribute information). If the multiplexed attribute information MLTPLX is "true", this means that stored data is loaded from the advanced pack ADV_PCK in the primary enhanced video object P-EVOB during a loading period LOADPE on a title timeline. Furthermore, if the multiplexed attribute information MLTPLX (multiplexed attribute information) is "false", this means that stored data must be pre-loaded from an original storage position SRCDTC as a file. A description of the multiplexed attribute information MLTPLX may be removed in the application resource element APRELE. A time PRLOAD (loadingBegin attribute information) on a title timeline at which fetching (loading) a target resource begins is written in the form of "HH:MM:SS:FF". When the time PRLOAD on the title timeline at which fetching (loading) of the target resource begins is not written in the application resource element APRELE, a start time of a loading period must match with a start time (a start time TTSTTM on the title timeline shown in (d) of FIG. 56B) of a valid period of a corresponding advanced application ADAPL. When loading of an application resource starts at a start time of the advanced application ADAPL in this manner, there can be obtained an effect that loading the application resource can be finished at an earliest time in the valid period of the advanced application ADAPL and that an exploiting time of the application resource can be put ahead at a necessary timing in the advanced application ADAPL. The time PRLOAD on the title timeline at which fetching (loading) the target resource starts must be indicative of a time before a start time TTSTTM on the title timeline which is written in a parent element (an application segment element APPLSG or an advanced subtitle segment element ADSTSG) of an application resource element APRELE in which the time PRLOAD is written. Moreover, when the multiplexed attribute information MLTPLX is "true", since a resource is downloaded into the file cache FLCCH by a method shown in FIG. 65A, a description of the time PRLOAD (loadingBegin attribute information) on the title timeline at which fetching (loading) a target resource begins must not be eliminated.

Additionally, when no-cache attribute information NOCACH (noCache attribute information) is "true", this means that a Cach-Control header and a Pragma header are included in a GET request of HTTP. When this information is "false", this means that the Cach-Control header and the Pragma header are not included in the GET request of HTTP. A description of the no-cache attribute information NOCACH can be eliminated, and "false" is set as a default value in such a case. Further, description attribute information representing additional information concerning an application element is written in a text format familiar to people, and a description of this attribute information can be eliminated.

A technical point required to display/execute various playback/display objects in accordance with progress of a title timeline TMLE as expected in this embodiment will now be described. The technical point in this embodiment can be divided into a "scheme which can guarantee start of display or execution in accordance with progress of the title timeline TMLE" and a "scheme of a countermeasure when previous loading into the data cache DTCCH cannot be performed in time". The technical points in this embodiment are itemized below.

Figure 83:
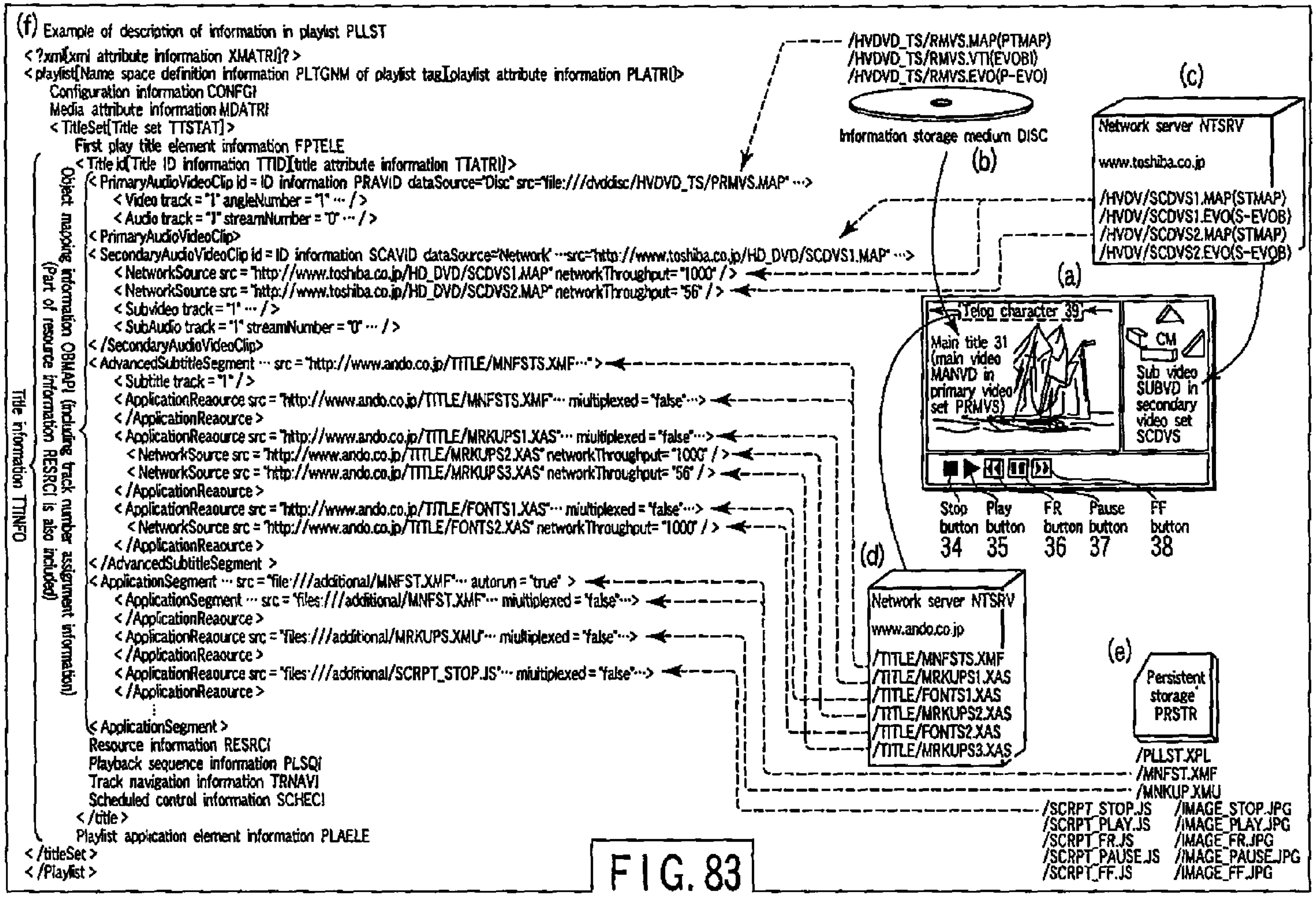
FIG. 83 is an exemplary view showing a description example in a playlist mainly focusing on a storage position of each playback/display object.

(1) The scheme which can guarantee start of display or execution in accordance with progress of the title timeline TMLE.

i) An advanced application ADAPL, an advanced subtitle ADSBT and some secondary video sets SCDVS are temporarily stored in the data cache DTCCH in advance, and data temporarily stored in the data cache DTCCH is used to carry out display or execution processing for a user (see FIG. 25).

ii) Information of a name of data or a file which should be temporarily stored in the data cache TCCH in advance and a storage position of such data or a file is written in src attribute information (source attribute information) in a playlist PLLST (in various clip elements, a network source element NTSELE, an application resource element APRELE, a title resource element, or a playlist application resource element PLRELE) (see FIG. 83).

Figure 68:
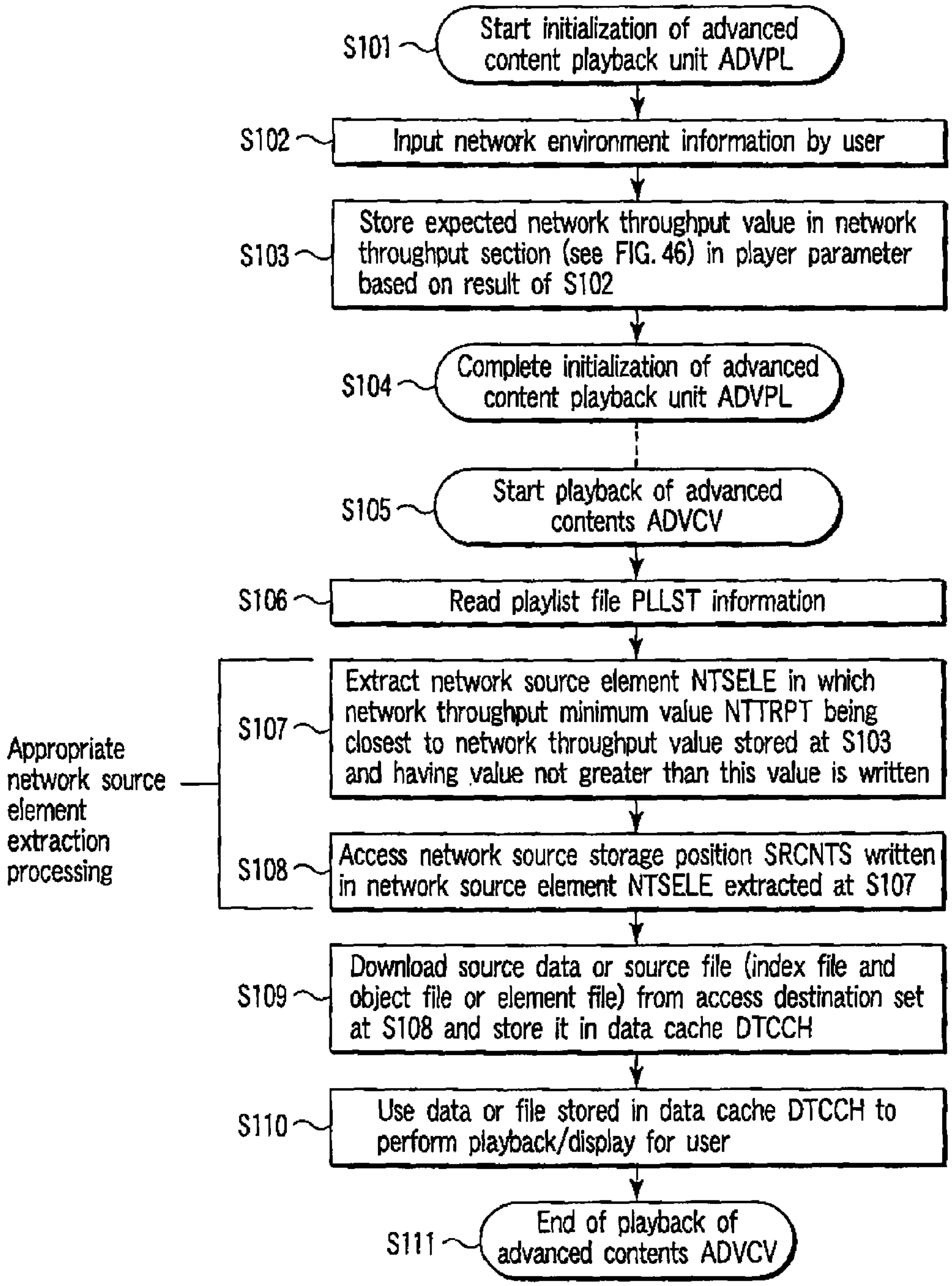
FIG. 68 is an exemplary view showing an optimal network source extraction method using a network source element.

The data or file which should be temporarily stored in the data cache in advance and an access destination of the data or file can be recognized.

iii) A timing at which previous loading into the data cache DTCCH is started is specified by a "time PRLOAD (a loadingBegin attribute or a preload attribute) on a title timeline at which fetching (loading) a target resource is started" in the playlist PLLST (in clip elements, an application resource element APRELE, or a title resource element) (see FIGS. 65A to 65D, FIGS. 54A and 54B, FIGS. 55A and 55B, FIGS. 63A to 63C and FIGS. 66A to 66C).

iv) Information which allows selection of data or a file perfect for loading in accordance with a network environment of the information recording and playback apparatus 1 is written in the playlist PLLST (a network source element NTSELE) (see FIGS. 67 and 68).

(2) A scheme of a countermeasure when previous loading into the data cache DTCCH cannot be performed in time v) A countermeasure according to a playback/display object is specified in "synchronization attribute information SYNAT (sync attribute information) of the playback/display object" in the playlist PLLS (in a clip element or in a segment element) (see FIGS. 54A and 54B, FIGS. 55A and 55B, and FIGS. 56A and 56B).

In case of sync="hard" (a hard synchronization attribute), progress of the title timeline TMLE is stopped to temporarily bring a moving image to a still state until loading is completed.

In case of sync="soft" (a soft synchronization attribute), progress of the title timeline TMLE is continued, and playback is started after completion of loading (behind a display start time TTSTTM/titleTimeBegin specified on the title timeline TMLE).

Figure 64A:
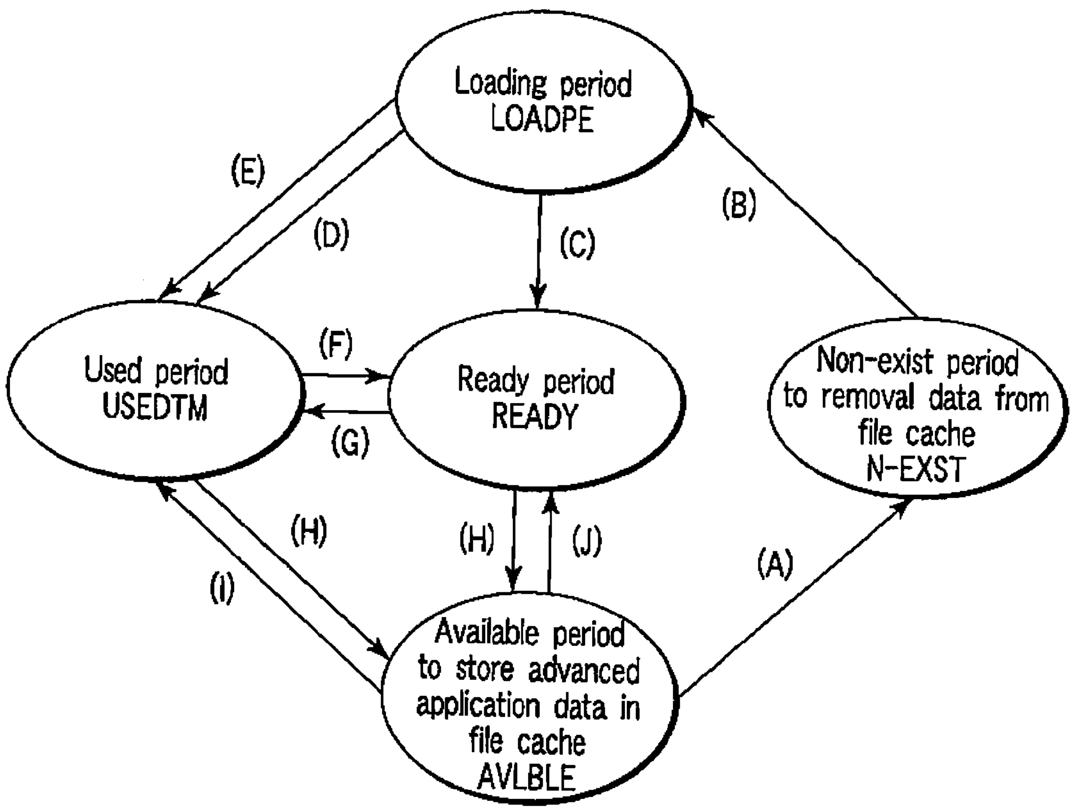

When the above-described technical points are executed, there are five states shown in FIGS. 64A and 64B as resource holding times in the file cache FLCCH.

<Resource State Machine>

FIG. 64A shows state machine of Resource in the File Cache. There are five states in the state machine, non-exist, loading, ready, used and available. This state machine is applied to all files in the File Cache.

(A) While the Resource does not exist in the File Cache, the Resource is in non-exist state. Before the title playback is started, all Resources (except Resources for Playlist Application) are in non-exist state. When the File Cache Manager discards the Resource, state machine moves to non-exist state.

(B) When the Resource loading starts, state machine moves to loading state. The File Cache Manager shall guarantee there are enough memory blocks to store the Resource in the File Cache prior to start Resource loading. When there is loadingBegin attribute in Resource Information, loading state starts from loadingBegin. When there is no loadingBegin attributes, loading state starts from titleTimeBegin. Resource loading for application will not be started if autorun attribute is false, or if application is not selected. If autorun attribute chances to false during the loading, then Resource loading will be cancelled and the already loaded resource is discarded.

(C) After the Resource loading is completed, if the application is inactive (before Title Timeline becomes valid period) the state machine moves to ready state.

(D) After the Resource loading is completed, if the application is active (that is the application will run) the state machine moves to used state. While the Resource is used by one or more active applications, the Resource is in used state.

(E) After the Resource loading is completed, if the Resource is resource for Playlist Application, then the state machine moves to used state. While the Playlist Application is available, the Resource is in used state.

(F) When an application becomes inactive (that is it is deactivated by API) but Title Timeline does not reach titleTimeEnd, state machine moves to ready state.

(G) When application becomes active, if the Resource currently in ready state the resource will move to used state.

(H) If there is no valid application referencing a resource, then the Resource will move to available state.

(I) If an application becomes active and the resource is currently in available state that resource will move to used state.

(J) If an Application becomes valid and the resource is currently in available state that resource will move to ready state.

More intelligible explanations will be provided below.

As the five states, there are a loading period LOADPE, a used period USEDTM, a ready period READY, a non-exist period N-EXST to remove data from the file cache, and an available period AVLBLE to store advanced application data in the file cache. Transition between the respective states occurs in accordance with time progress on the title timeline TMLE. A description will now be given as to transition between the states in FIGS. 64A and 64B.

(A) When a resource is not stored in the file cache FLCCH, the corresponding resource enters the state of the non-exist period N-EXST to remove data from the file cache. All resources other than a playlist application resource PLAPRS are in the state of the non-exist period N-EXST to remove data from the file cache before starting playback of a title. Moreover, even if a resource has been already stored in the file cache FLCCH, the resource enters the non-exist period N-EXST to remove data from the file cache after the file cache manager FLCMNG in the navigation manager NVMNG shown in FIG. 28 executes the resource removal processing.

(B) When loading a resource is started, the data holding state in the file cache FLCCH shifts to the state of the loading period LOADPE. As shown in FIG. 28, the file cache manager FLCMNG in the navigation manager NVMNG manages data stored in the file cache FLCCH. Prior to starting loading the resource, a memory block having an enough free area with respect to the resource which should be stored in the file cache FLCCH must be prepared, and the file manager FLCMN guarantees a setting of a free area of the memory block corresponding to the resource to be stored. In this embodiment, as shown in (c) of FIG. 66A and (d) of FIG. 66B, contents of resource information RESRCI in the playlist file PLLST mean a list of title resource elements. The present invention is not restricted thereto, and a concept of the resource information RESRCI can be expanded as another application example in this embodiment. As information included in the resource information RESRCI, three types of resource elements, i.e., not only a title resource element shown in (d) of FIG. 66B but also an application resource element APRELE and a playlist application resource element PLRELE shown in FIGS. 70 and 71 can be integrated, and the integrated element can be called resource information RESRCI. In the resource information RESRC according to the application example, when a time PRLOAD (LoadingBegin attribute information) on a title timeline at which fetching (loading) a target object begins exists in the title resource element shown in (d) of FIG. 66B and the application resource element APRELE shown in (d) of FIG. 63C, the loading period LOADPE starts from the time PRLOAD (LoadingBegin attribute information) on the title timeline at which fetching (loading) the target object begins. When a description of the time PRLOAD (LoadingBegin attribute information) on the title timeline at which fetching (loading) of the target resource begins is eliminated in the title resource element or the application resource element APRELE, the loading period LOADPE starts from a start time TTSTTM (titleTimeBegin attribute information) on the title timeline of a corresponding resource (see FIG. 65B). As shown in (d) of FIG. 56B, autorun attribute information ATRNAT exists in an application segment element APPLSG. When a value of the autorun attribute information ATRNAT is “false”, a corresponding application is not automatically executed, but it enters an active (an execution) state only after an API command is issued. When a value of the autorun attribute information is “false” in this manner, loading a resource which is referred (used) by a corresponding advanced application ADAPL is not started. As shown in (b) of FIG. 56A, information concerning a resource which is referred (used) from an advanced application ADAPL is written as a list of application resource elements APRELE, and the list of the application resource elements APRELE is arranged in an application segment element APPLSG. Therefore, when a value of the autorun attribute information ATRNAT is “false”, loading a resource managed by a corresponding application resource element APRELE is not started. When a value of the autorun attribute information ATRNAT is changed to “false” during loading a resource referred (used) by a specified advanced application ADAPL, loading of the currently loaded resource is canceled, and the resource which has been already loaded in the file cache FLCCH is removed. Additionally, as described above in conjunction with FIG. 57, an advanced application ADAPL which enters an execution (an active) state in accordance with language information to be used is selected. Further, as shown in FIG. 58, a combination of setting values of application activation information in the application segment element APPLSG is used to judge whether an advance application ADAPL is valid in accordance with a judgment shown in FIG. 58. When the advanced application ADAPL is regarded as invalid based on a procedure shown in FIG. 57 or FIG. 58, loading of a resource specified in a corresponding application segment element APPLSG is not started. Loading into the file cache FLCCH only a resource referred (used) by an advanced application ADAPL which is to be assuredly used can avoid loading of an unnecessary resource into the file cache FLCCH, thereby effectively exploiting the resource in the file cache FLCCH.

(C) When loading of a specified resource into the file cache FLCCH is completed, the data storing state in the file cache shifts to the state of the ready period READY. The ready period READY means a state (a state before the used period USEDTM) before an application which makes reference to (uses) a resource reaches a valid period VALPRD/APVAPE on a title timeline.

(D) When loading of a resource is completed and an application enters the execution/use state, the data storing state in the file cache FLCCH shifts to the state of the used period USEDTM. When the resource is used by one or more currently executed (active) applications, the resource is in the execution/use state.

(E) When loading of a resource which is referred (used) by a playlist associated advanced application PLAPL is completed, the resource enters the used period USEDTM during playback of an arbitrary title other than a first play title FRPLTT. That is because use of the resource in an arbitrary title (by an advanced application ADAPL or a title associated advanced application TTAPL) is presupposed when the playlist associated advanced application PLAPL exists.

(F) When execution of a currently used application is stopped due to, e.g., an API command, the application enters a non-execution state. If a position (a time) on a title timeline TMLE has not yet reached an end time TTEDTM (titleTimeEnd attribute information) (see FIGS. 56A and 56B) on the title timeline specified in an application segment element APPLSG or an advanced subtitle segment element ADSTSG, the data storing state in the file cache FLCCH shifts to the state of the ready period READY.

(G) When a resource in the file cache FLCCH is currently in the ready period READY and an application which makes reference to (uses) this resource enters the execution/use state, the resource shifts to the used period USEDTM.

(H) (A plurality of) applications which make reference to a resource in the file cache are all invalid, the resource enters the state of the available period AVLBLE to store advanced application data in the file cache.

(I) When a resource is in the state of the available period AVLBLE to store advanced application data in the file cache, the resource enters the used period USEDTM upon shifting of an application which makes reference to (uses) the resource to the execution/use state.

(J) When a resource is in the state of the available period AVLBLE to store advanced application data in the file cache, the resource enters the ready period READY upon shifting of an application which makes reference to (uses) the resource to a valid state.

FIGS. 64A and 64B illustrate transition of resource storing states (times) in the file cache FLCCH. FIGS. 65A to 65D show a relationship between each data storing state in the file cache FLCCH, an advanced application execution period APACPE and a valid period APVAPE and a loading/execution processing method of an advanced application ADAPL based on resource information RESRCI in accordance with FIGS. 64A and 64B. In each of FIGS. 65A, 65B and 65C, as a common transition order, the data storing state starts from the non-exist period N-EXST to remove data from the file cache, then shifts to the loading period LOADPE, the used period USEDTM, the available period AVLBLE to store advanced application data in the file cache, and the non-exist period N-EXST to remove data from the file cache, in the mentioned order. Further, the ready period READY is inserted in the transition order.

<Image of State Machine of Resource Information including LoadingBegin>

Figure 65A:
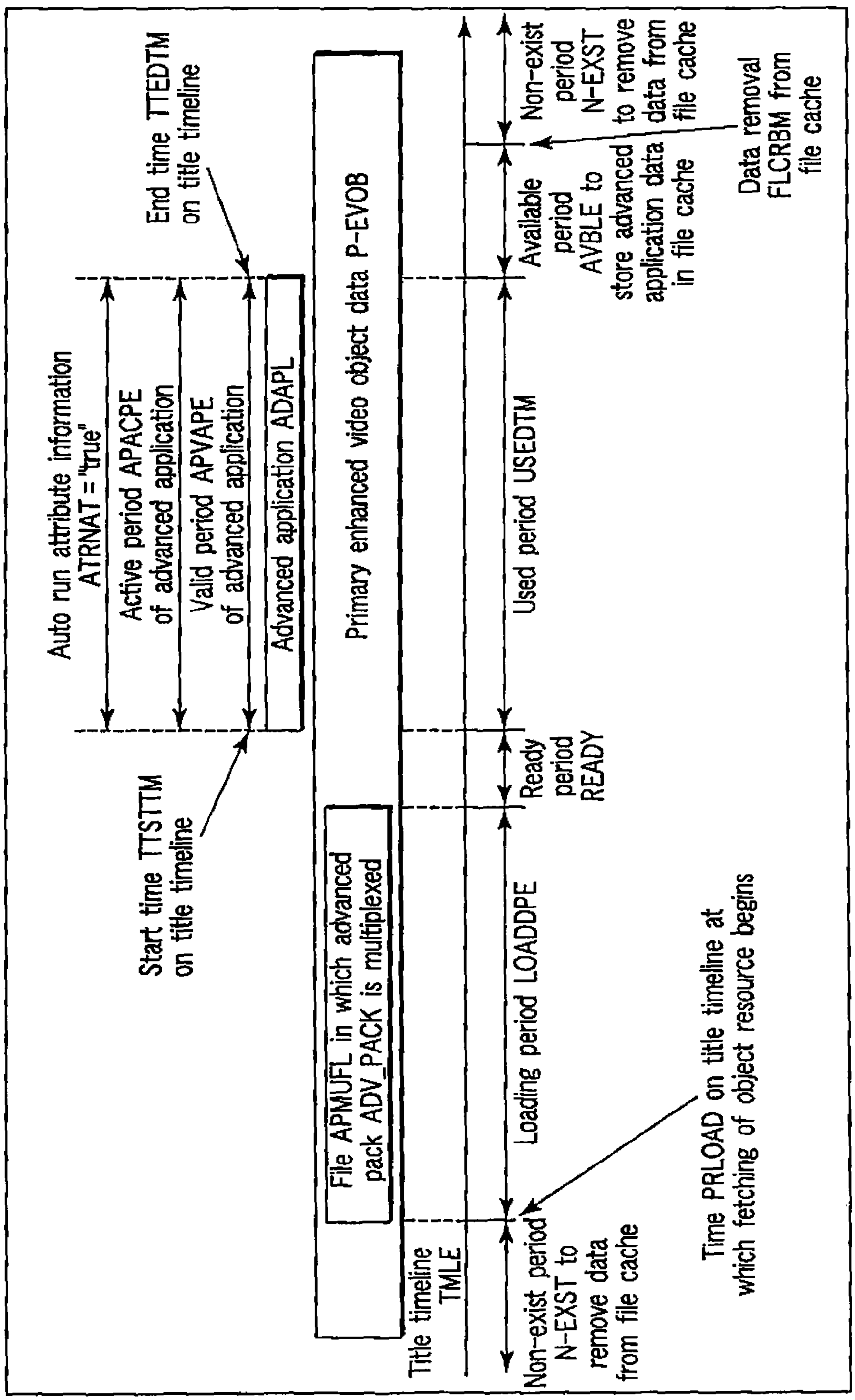
FIGS. 65A, 65B, 65C and 65D are exemplary views showing a loading/execution processing method of an advanced application based on resource information.
Figure 65B:
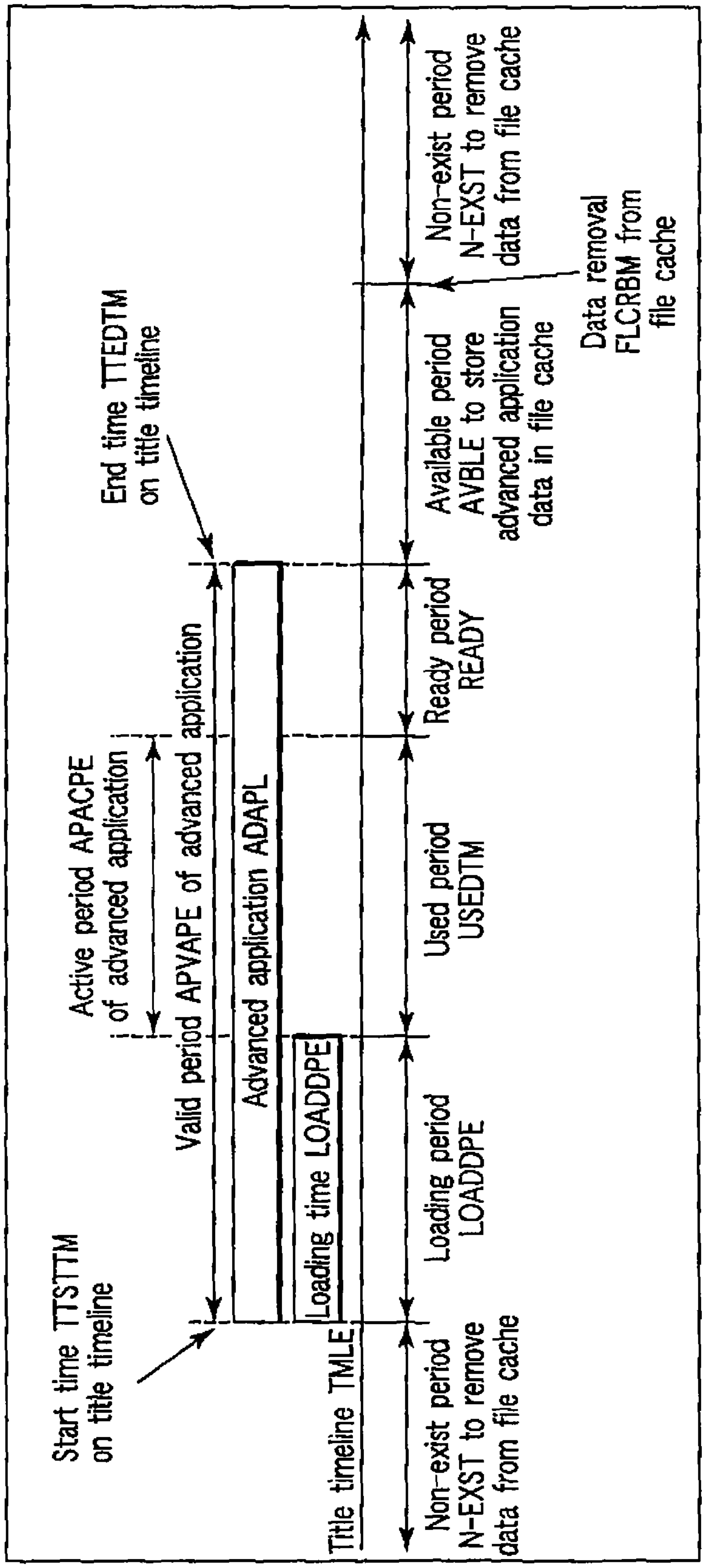

FIG. 65A shows an example of the relationship between Resource Information and state machine. The Resource has loadingBegin attribute and Advanced Application always active in its valid period. In this diagram, after finishing the loading the Resource, state machine becomes ready state. And then it enters active period of Advanced Application, state machine becomes used state. After reached to titleTimeEnd, state machine moves available state until the Resource is discarded by the File Cache Manager and moves non-exist state.

More intelligible explanations will be provided below.

Information of a time PRLOAD (LoadingBegin attribute information) on a time timeline at which fetching (loading) of a target resource begins exists in an application resource element APRELE shown in (d) of FIG. 63C or a title resource element as resource information RESRCI shown in (d) of FIG. 66B. As shown in (c) of FIG. 66A, the resource information RESRCI means a list of title resource elements in a restricted sense. However, this embodiment is not restricted thereto, and the title resource element, the application resource element APRELE shown in (d) of FIG. 63C and a playlist application resource element PLRELE shown in (d) of FIG. 69B are generically referred to as resource information in a broad sense. FIG. 65A shows "transition of resource data storing states in the file cache" and a "relationship between the advanced application valid period APVAPE and an advanced application execution period APACPE" when a "time PRLOAD (LoadingBegin attribute information) on a title timeline at which fetching (loading) of a target resource begins" is written in the resource information RESRCI (the title resource element and the application resource element APRELE). In general, the "time PRLOAD (LoadingBegin attribute information) on the title timeline at which fetching (loading) of a target resource begins" is set as a time on the title timeline TMLE which is ahead of a "start time TTSTTM (titleTimeBegion attribute information) on the title timeline of a corresponding resource". As a result, loading of a resource can be completed before the time set by the "start time TTSTTM (titleTimeBegin attribute information) on the title timeline of a corresponding resource", and playback/display/execution of, e.g., a title associated advanced application PLAPL can be started from a scheduled "start time TTSTTM (titleTimeBegin attribute information) on the title timeline of a corresponding resource".

In this case, since the loading period LOADPE in FIG. 65A is set at a position which is ahead of the valid period APVAPE of an advanced application, the valid period APVAPE of the advanced application matches with an execution period APACPE of the advanced application. In the valid period APVAPE of the advanced application, a resource in the file cache FLCCH shifts to the used period USEDTM. In the embodiment shown in FIG. 65A, autorun attribute information ATRNAT is set to "true" in an application segment element APPLSG including the application resource element APRELE shown in (d) of FIG. 63C (see (d) of FIG. 56B). Therefore, when a time on the title timeline TMLE has passed the "start time TTSTTM on the title timeline", a corresponding advanced application ADAPL is automatically started up to enter a valid state. In the embodiment shown in FIG. 65A, a resource file APMUFL stored in the file cache is divided in the form of advanced packs ADV_PCK, and the divided files are multiplexed and stored in primary enhanced video object data P-EVOB. In this case, a value of multiplexed attribute information MLTPLX (multiplexed attribute information) in the application resource element APRELE show in (d) of FIG. 63C is set to "true". In the embodiment shown in FIG. 65*a*, a region in which the advanced packs ADV_PCK are multiplexed (see (e) of FIG. 73A) in the information storage medium DISC is played back during the loading period LOADPE and transferred to the file cache FLCCH. In case of the embodiment shown in FIG. 65A, after completion of the loading processing of a corresponding resource, the ready period READY exists before reaching the used period USEDTM. This embodiment is not restricted to the above-described contents, and a resource file which is stored in, e.g., the network server NTSRV without being multiplexed may be loaded. In this case, loading starts from the "time PRLOAD on the title timeline at which fetching (loading) of a target resource" begins, and loading into the file cache FLCCH is completed during the loading period LOADPE.

When the advanced application execution period APACPE starts on the title timeline TMLE, a resource in the file cache FLCCH shifts to the used period USEDTM. Then, when a time on the title timeline TMLE reaches an end time TTEDTM on the title timeline, the current state shifts to the state of the available period AVLBLE to store advanced application data in the file cache. Subsequently, when removal processing is performed by the file cache manager FLCMNG (see FIG. 28), the state shifts to the state of the non-exist period N-EXST to remove data from the file cache.

<Image of State Machine of Resource without LoadingBegin>

FIG. 65B shows another example of the relationship between Resource Information and state machine. The Resource does not have loadingBegin attribute and Advanced Application may become active during its valid period. In this diagram, Title Timeline enters titleTimeBegin of Advanced Application, the File Cache Manager starts to load the Resource from its original data source. After finishing the loading, state machine becomes used state directly. And then Advanced Application becomes not active, state machine becomes ready state. After reached to titleTimeEnd, state machine moves available state until the Resource is discarded by the File Cache Manager.

When there are plural applications which are associated with the same Resource, the state of state machine is defined by combination of each state of among plural application.

(I) At least one application is in active state, the Resource shall be in used state.

(II) At least the Resource is treated as ready state by one application, but there is no active application, the Resource shall be in ready state.

(III) There is the Resource in File Cache, but there is no valid or active application, the Resource shall be available state.

More intelligible explanations will be provided below.

FIG. 65B shows a relationship between resource information RESRCI and each data storing state in the file cache when a description of a "time PRLOAD (LoadingBegin attribute information) on a title timeline at which fetching (loading) of a target object beings" does not exist in a title resource element or an application resource element APRELE. In this case, when a time on the title timeline TMLE has reached a start time TTSTTM (titleTimeBegin) on the title timeline of an advanced application ADAPL, loading of a resource starts. As a result, a loading period LOADPE partially overlaps a valid period APVAPE of an advanced application. In the embodiment shown in FIG. 65B, the execution/use/processing of the corresponding advanced application ADAPL starts (the execution period APACPE of the advanced application begins) only after completion of the loading period LOADPE (after completion of loading). Therefore, the execution period APACPE beings during the valid period APPVAPE of the advanced application. Therefore, the used period of a resource in the file cache FLCCH matches with the execution period ADACPE of the advanced application. Although the ready period READY exists between the loading period LOADPE and the used period USEDTM in the example shown in FIG. 65A, the loading period LOADPE directly shifts to the used period USEDTM in the example shown in FIG. 65B. Then, upon completion of the execution period APACPE of the advanced application, the resource in the file cache shifts to the state of the ready period READY. When the end time TTEDTM (titleTimeEnd) on the title timeline has passed, the state shifts to the available period AVLBLE to store advanced application data in the file cache. When the file cache manager FLCMNG performs processing of data removal FLCREM from the file cache in which the resource is stored, the current state shifts to the state of the non-exist period N-EXST to remove data from the file cache.

In a case where a plurality of applications make reference to (use) the same resource, the data storing state in the file cache is defined as follows, and it depends on a combination of respective states of the plurality of applications.

(I) When at least one application is in the execution state, it is defined that a resource which is referred (used) by the application is in the used period USEDTM.

(II) When a resource is processed on the assumption that it is in the ready period READY as seen from at least one application and all applications which make reference to (use) the resource are not in the execution state (active), it is defined that the resource is in the ready period READY.

(III) When a resource is stored in the file cache FLCCH and there is no valid application or currently executed application which makes reference to (uses) the resource, it is defined that the resource is in the available period AVLBLE to store advanced application data in the file cache.

<Image of State Machine of Overlapped Resource Information>

Figure 65C:
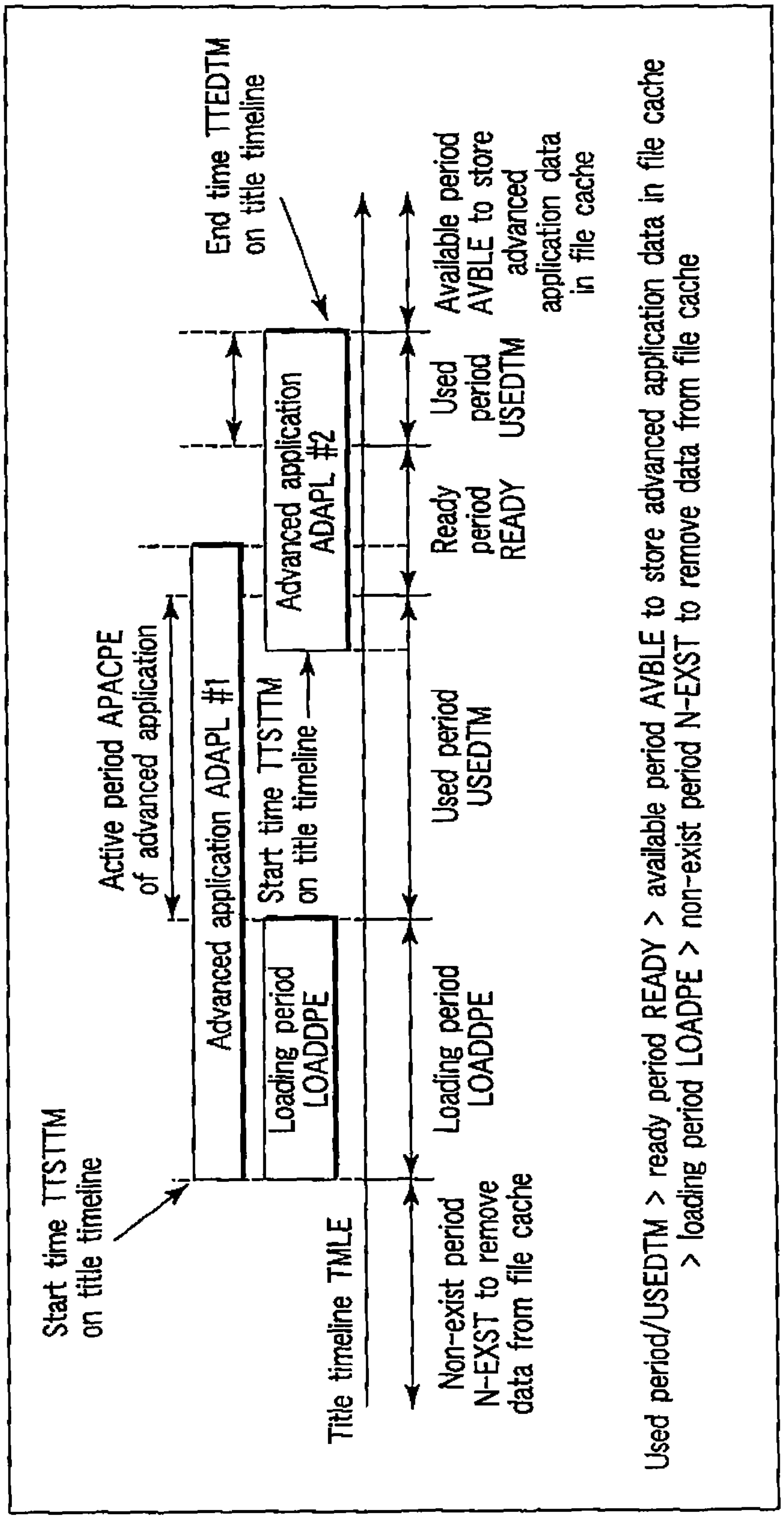

FIG. 65C shows an example of the relationship between overlapped Resource Information and state machine. It assumes that two Advanced Applications refer the same Resource. The state machine of the Resource is given by overlapping the state machines defined by condition of each Advanced Application. If there are different states among overlapped Advanced Applications, the strongest state is applied for the Resource. The state machine order is the following;

used>ready>available>loading>non-exist loading state can only be overlapped to non-exist exist state, because while the same Resource is already loaded or loading, the File Cache Manager shall not load it again.

When title is jumped one to another, all remained Resource in the File Cache moves to available state, except for the Resources that are used by new title. The priorities for these resources are defined by the new title.

More intelligible explanations will be provided below.

FIG. 65C shows a relationship between resource information RESRCI and each data storing state in the file cache FLCCH when valid periods APVAPE of a plurality of advanced applications which make reference to a resource overlap each other on a title timeline TMLE (or when a plurality of sets of resource information RESRCI meaning the same resource exist in different parent elements and ranges of valid periods APVAPE specified in the respective sets of the resource information partially overlap each other). FIG. 65C illustrates a case where two different advanced applications ADAPL make reference to (use) the same resource. Even after completion of an advanced application ADAPL #1 which makes reference to (uses) the same resource, the other advanced application ADAPL #2 is in the execution period. When the advanced application ADAPL #1 alone makes reference to (uses) the resource, the resource enters the available period AVLBLE to store advanced application data in the file cache upon completion of the advanced application ADAPL #1. However, as seen from the other advanced application ADAPL #2, the resource enters the ready period READY or the used period USEDTM. When the resource in the file cache FLCCH enters different states depending on the overlapped advanced applications ADAPL #1 and #2, the storage state of the resource in the file cache is represented (applied) as a "state with the strongest influence". Priorities of "states with the strong influence" concerning respective states of the resource in the file cache are set as follows.

USEDTM>READY>AVLBLE>LOADPE>N-EXST

In an expression showing the above-described priorities (the order showing the states with the strong influence), USEDTM represents a used period, and READY indicates a ready period. Further, AVLBLE represents an available period AVLBLE to store advanced application data in the file cache, and LOADPE indicates a period after data removal from the file cache. As shown in FIG. 65C, when valid periods APVAPE of the advanced applications ADAPL #1 and #2 overlap on the title timeline TMLE, this means that loading of the resource has been already completed or the resource is currently loaded (the file cache manager FLCMNG does not repeat loading). Therefore, there is a possibility that the loading period LOADPE overlaps the non-exist period N-EXST to remove data the file cache alone. When the loading period LOADPE overlaps the non-exist period N-EXST to remove data from the file cache, the loading period LOADPE has the stronger influence (the higher priority) than the non-exist period N-EXST to remove data from the file cache, and hence the current state is regarded as the "loading period LOADPE". Furthermore, when a title different from a currently executed/used title is played back from a resource defined by resource information RESRCI of each of a playlist application resource PLAPRS, a title resource TTRSRC and an application resource APRSRC, the current state is in the "available period AVLBLE to store advanced application data in the file cache" unless the resource is used in the new target title. When the advanced content playback unit ADVPL plays back different titles in this manner, the storage state of the resource in the file cache FLCCH is set to a state defined in the new title by priority.

<Resource Loading>

The File Cache Manager shall control Resource loading to the File Cache based on Resource Information of Object mapping Information in Playlist.

The File Cache Manager loads the Resource of Advanced Application and Advanced Subtitle, if these Application Segments do not have any Application Activation Information. If there exits Application Activation Information for some Application Segments, the File Cache Manager filters only to load the Resource of the Application Segment which is in Selected state and autorun attribute is true, or the Application Segment which is scheduled to be in active state.

Contents Author shall guarantee amount of the Resource size in the following conditions is equal to or less than 64 MB.

used state Resource loading state Resource ready state Resource

If the Streaming Buffer was described in Playlist, the memory size for Resource decreases by the size of Streaming Buffer.

More intelligible explanations will be provided below.

The file cache manager FLCMNG controls loading of a corresponding resource into the file cache FLCCH based on resource information RESRCI written in object mapping information OBMAPI in a playlist PLLST. As shown in (d) of FIG. 56B, when application activation information (language attribute information LANGAT, application block attribute (index number) information APPLAT, advanced application group attribute (index number) information APGRAT and autorun attribute information ATRNAT) does not exist in an application segment element APPLSG, processing of loading a resource specified in the application segment element APPLSG is executed. In general, the resource loading processing is controlled by the file cache manager FLCMNG. Moreover, when the application activation information exists in the application segment element APPLSG, a corresponding advanced application ADAPL is recognized as available/is selected and a value of autorun attribute information ATRNAT is "true" (when the advanced application ADAPL is automatically started up), or when the corresponding advanced application ADAPL written in the application segment element APPLSG is scheduled to be executed, the file cache manager FLCMNG controls loading of a resource alone which is referred (used) by the advanced application ADAPL scheduled to be executed. In this manner, information such as application activity information or autorun attribute information ATRNAT is utilized to load into the file cache FLCCH a resource alone which is referred (used) by an advanced application ADAPL which is scheduled to be executed. As a result, storage of unnecessary resources in the file cache FLCCH can be eliminated, and a space in the file cache FLCCH can be effectively exploited. Additionally, a content provider (an editor of an advanced application ADAPL) must consider a total size of resources to be used in such a manner that a total resource size of a resource in the used period USEDTM, a resource in the loading period LOADPE and a resource in the available period AVLBLE to store advanced application data in the file cache FLCCH becomes not greater than 64 megabytes. Applying the above-described restriction can set a data size which can be used for resource storage in the file cache FLCCH to be not greater than 64 megabytes, thereby reducing a price (reducing a memory capacity required for a built-in structure) of the advanced content playback unit ADVPL.

<Resource Mapping on Title Timeline>

Figure 65D:
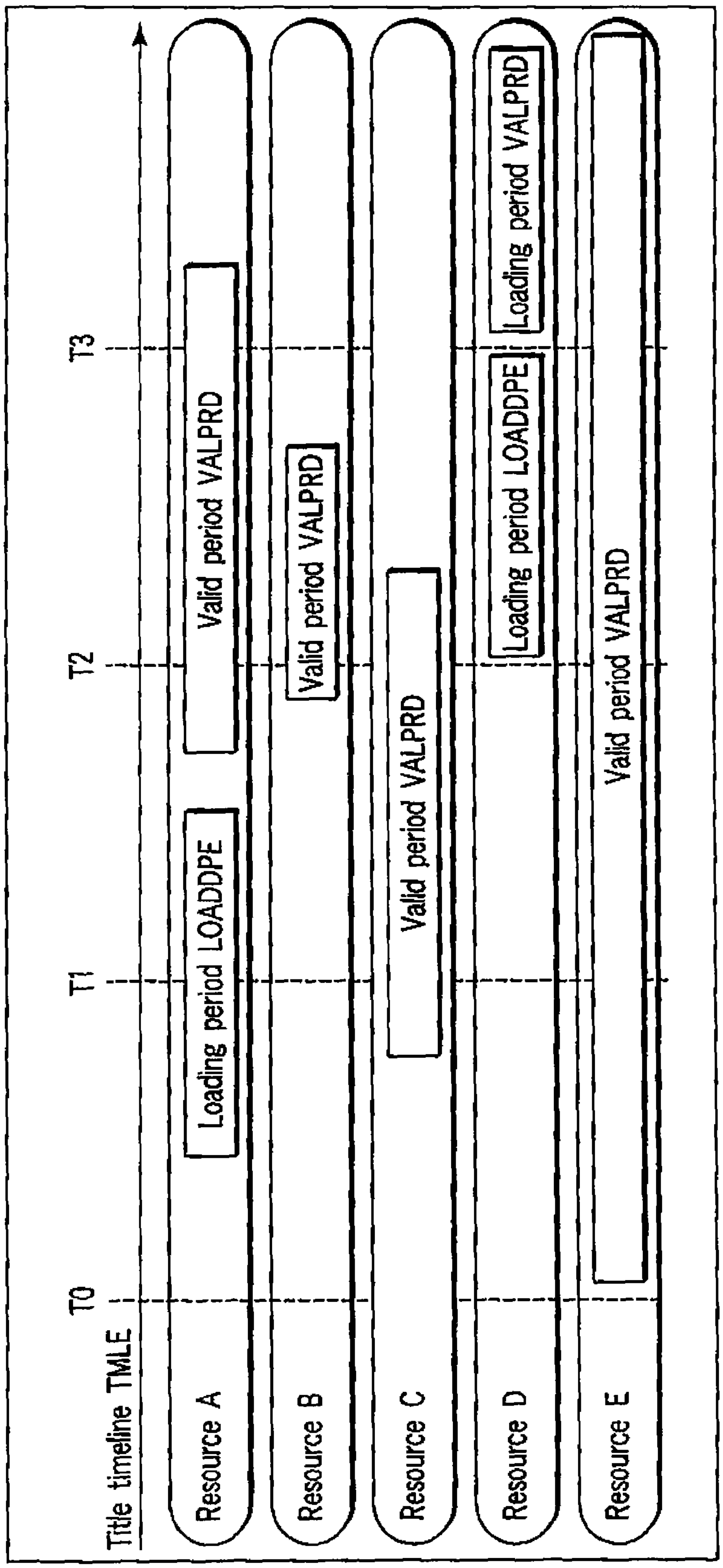

FIG. 65D shows an example of resource mapping condition on Title Timeline. It is assumed that all Resource associated applications are activate or scheduled to be activated.

When Title Timeline is jumped from T0 to T1, the File Cache Manager shall retrieve Res A, C and E in advance to start playback at T1. Regarding Res A, T1 is among loadingBegin and titleTimeBegin, it may be loading state in normal playback. In case of jumping onto T1, it shall be treated as ready state. Therefore the entire Res A file shall be retrieved.

When Title Timeline is jumped from T0 to T2, File Cache Manager shall retrieve Res A, B, C and E. When Title Timeline is jumped from T0 to T3, File Cache manager shall retrieve Res A, D and E.

More intelligible explanations will be provided below.

FIG. 65D shows an example of resource mapping on a title timeline TMLE. It is assumed that an application which makes reference to the resource is in the execution state or is scheduled to be executed. If a time on the title timeline TMLE deviates from "T0", the file cache manager FLCMNG must read a resource A, a resource C and a resource E and control to start playback from "T1". The time "T1" exists in a loading period LOADPE and between a time PRLOAD (LoadingBegin) on the title timeline at which fetching (loading) of a target resource begins and a start time TTSTTM (titleTimeBegin) on the title timeline. Therefore, the resource A can be set to a state of the loading period LOADPE during regular normal playback. The time "T1" is a time ahead of the valid period BALPRD as seen from the resource A, and it also corresponds to the ready period READY. Therefore, the resource A is transferred to the file cache FLCCH by the file cache manager FLCMNG. Besides, when the time on the title timeline TMLE shifts to "T2" from "T0", the file cache manager FLCMNG must read data of the resource A, the resource B, the resource C and the resource E. Furthermore, the data (files) of the resource A, the resource B, the resource C and the resource E are used on an application which makes reference thereto. Moreover, when the time on the title timeline shifts to "T3" from "T0", the file cache manager FLCMNG is utilized by an application which reads and makes reference to the data of the resource A, the resource D and the resource E.

As shown in (a) of FIG. 66A, configuration information CONFGI, media information MDATRI and title information TTINFO exist in a playlist PLLST. As shown in (b) of FIG. 66A, first play title element information FPTELE, one or more pieces of title element information TTELEM and playlist application element information PLAELE are written in the title information TTINFO. Additionally, as shown in (c) of FIG. 66A, object mapping information OBMAPI, resource information RESRCI, playback sequence information PLSQI, track navigation information TRNAVI and scheduled control information SCHECI are arranged in one piece of the title element information TTELEM. As shown in (d) of FIG. 66B, a list of one or more title resource elements is written as contents of the resource information RESRCI. A data configuration written in the title resource element shown in (d) of FIG. 66B will now be described.

<TitleResource (Title Resource) Element>

TitleResource element describes Title Associated Resource Information, such as a package archive file used in the Advanced Application, or in the Advanced Subtitle.

XML Syntax Representation of TitleResource Element:

```
<Title Resource
src = anyURI
size = positiveInteger
titleTimeBegin = timeExpression
titleTimeEnd = timeExpression
priority = nonNegativeInteger
```

-continued

```
multiplexed = (true | false)
loadingBegin = timeExpression
noCache = (true | false)
description = string
>
    NetworkSource *
</Title Resource>
```

TitleResource element determines which Archiving Data, or a file shall be loaded in File Cache. The src attribute refers to Archiving Data, or a file.

Player shall load the resource file into File Cache before the Application Life Cycle Start.

Resources may be multiplexed in Primary Video Set. In this case, the loadingBegin attribute describes the start time of loading period in which, ADV_PCK of P-EVOB contains the Resource.

Resources may come from Persistent Storage indicating by URI [FIG. 20]. In this case the loadingBegin attribute describes the start time of loading period to download the Resource from Persistent Storage.

Resources may come from network server, i.e., the URI scheme of src attribute is 'http', or 'https'. In this case the loadingBegin attribute describes the start time of loading period to download the Resource.

NetworkSource element can be presented in TitleResource element, if and only if the URI scheme of src attribute value of parent element is 'http', or 'https'. NetworkSource element describes the Resources to be selected according to network throughput setting.

(a) src Attribute

Describes the URI for the Archiving Data, or a file to be load into Data Cache.

(b) Size Attribute

Describes the size of the Archiving Data, or a file in bytes. This attribute can be omitted.

(c) titleTimeBegin Attribute

Describes the start time of valid period of the resource on Title Timeline.

(d) titleTimeEnd Attribute

Describes the end time of valid period of the resource on Title Timeline.

(e) Priority Attribute

Describes the priority of removal of resources which is not referred by active Application, or Title. Priority shall be integer from 0 to $2^{31}-1$.

(f) Multiplexed Attribute

If value is 'true', the Archiving Data can be loaded from ADV_PCK of P-EVOB in the loading period of Title Timeline. If the value is 'false', Player shall preload the resource from the specified URI. This attribute can be omitted. Default value is 'true'.

(g) loadingBegin Attribute

Describes the start time of loading period on Title Timeline. If no loadingBegin attribute is present, the start time of loading period shall be '00:00:00:00'.

(h) noCache Attribute

If noCache attribute value is 'true' and URI scheme of src attribute value of parent element is 'http', or 'https', the 'no-cache' directive shall be included in both Cache-Control and Pragma in HTTP request for the resource file. If noCache attribute value is 'false' and URI scheme of src attribute value of parent element is 'http', or 'https', 'no-cache' directive shall be included in neither Cache-Control, nor Pragma header. If URI scheme of src attribute value of parent element is 'http', or 'https', the noCache attribute shall be absent. The noCache attribute can be omitted. Default value is 'false'.

(i) Description Attribute

Describes additional information in the human consumable text form. This attribute can be omitted.

More intelligible explanations will be provided below.

Resource information RESRCI corresponding to a title is written in a title resource element. A resource specified by the resource information RESRCI corresponding to a title means a packaged archive file or data used in an advanced application ADAPL (including a title associated advanced application TTAPL) or an advanced subtitle ADSBT. As shown in FIG. 71, resources which are temporarily stored in the file cache FLCCH in this embodiment can be classified into a playlist association resource PLATRS, a title resource TTRSRC and an application resource APRSRC.

Figure 73A:
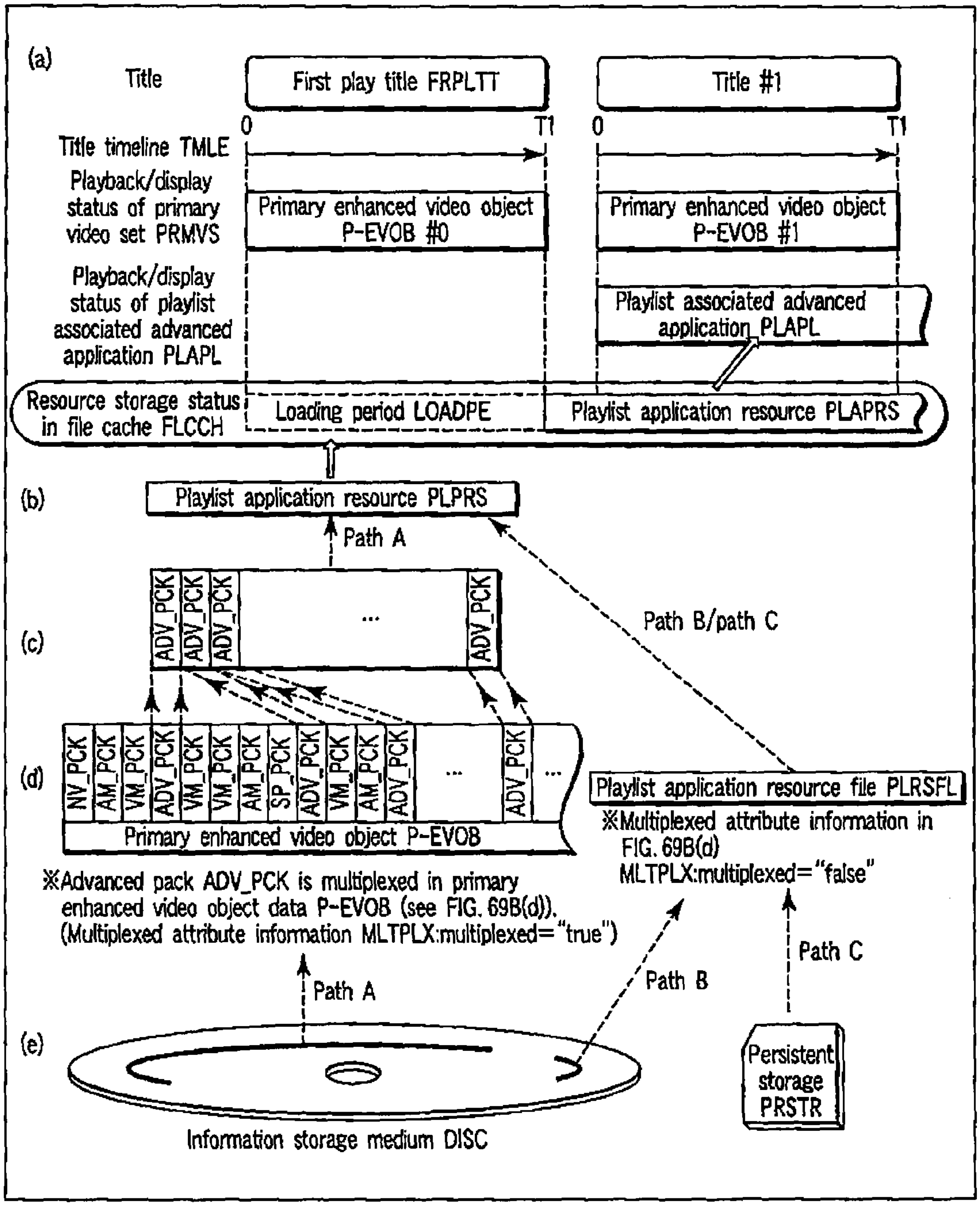

A resource managed by the title resource element shown in (d) of FIG. 66B represents a title resource TTRSRC shared by a plurality of advanced applications ADAPL in the same title. The title resource element indicates a position at which archiving data or an archiving file to be loaded in the file cache FLCCH is stored. The src attribute information (resource attribute information) represents a storage position SRCDTC of the archiving data or the archiving file. The advanced content playback unit ADVPL in this embodiment must complete loading of the resource file into the file cache FLCCH before a timing (the execution period APACPE of a corresponding application) at which a corresponding application life cycle begins. The resource can be multiplexed and stored in a primary video set PRMVS. Such an application resource APRSRC as shown in (b) of FIG. 73A (FIGS. 73A and 73B show a playlist application resource PLAPRS, but the present invention is not restricted thereto, and the same contents can be applied to a title resource TTRSRC or an application resource APRSRC used a title) is divided into each data consisting of 2048 bytes and packed in advanced packs ADV_PCK in units of 2048 bytes as shown in (c) of FIG. 73A, and the advanced packs ADV_PCK are dispersed and arranged with other packs in primary enhanced video object data P-EVOB as shown in (d) of FIG. 73A. Such a situation is called being multiplexed. In this case, as shown in FIG. 65A, a start time of a loading period LOADPE is specified by a time PRLOAD (LoadingBegin attribute information) on a title timeline at which fetching (loading) of a target resource beings. As a result, a corresponding resource can be downloaded into the file cache FLCCH from the persistent storage PRSTR. This embodiment is not restricted thereto, and a resource can be downloaded into the file cache FLCCH from the information storage medium DISC or the network server NTSRV. In case of downloading a resource from the network server NTSRV as described above, URI (universal resource identifier) information starting from "http" or "https" is written as information indicative of a storage position SRCDTC (src attribute information) of data or a file downloaded into the data cache shown in (d) of FIG. 66B. In this case, a value of the time PRLOAD (LoadingBegin attribute information) on a title timeline at which fetching (loading) of a target resource begins represents a start time of the loading period LOADPE in which a corresponding resource is downloaded from the network server NTSRV. When a corresponding resource is downloaded from the network server NTSRV and information of a storage position SRCDTC (src attribute information) of data or a file downloaded into the data cache starts from "http" or "https", a network source element NTSELE can be written in a corresponding title resource element. Based on information of the network source element NTSELE, it is possible to select an optimum resource which should be downloaded in accordance with a network throughput in a network environment of the information recording and playback apparatus 1 as shown in FIG. 67 or 68. Furthermore, size information DTFLSZ (size attribute information) of data or a file of the resource to be downloaded into the data cache is represented in the form of a positive number value in units of byte, and a description of this information can be eliminated in a title resource element. Moreover, a start time TTSTTM (titleTimeBegin attribute information) on a title timeline of a corresponding resource is indicative of a start time of a valid period VALPRD of the corresponding resource on the title timeline TMLE, and it is written in the form of "HH:MM:SS:FF". Additionally, an end time TTEDTM (titleTimeEnd attribute information) on a title timeline of a corresponding resource is indicative of an end time TTEDTM of a valid period VALPRD of the corresponding resource on the title timeline TMLE, and it is written in the form of "HH:MM:SS:FF". Further, priority information PRIORT (priority attribute information) for removal of a corresponding resource represents priority information when removing the corresponding resource which is no longer referred by a currently executed advanced application ADAPL from the data cache DTCCH, and removal is executed from a resource having a higher set value. Furthermore, as a value of this information, it is possible to write a positive number value which falls within a rage of 0 to "$2^{31}-1$". In this embodiment, a playlist application resource PLAPRS is downloaded into the file cache FLCCH during playback of a first play title FRPLTT, and it is kept being stored in the file cache FLCCH during use of the advanced content playback unit ADVPL. On the other hand, a title resource TTRSRC and an application resource APRSRC are no longer used, and they are removed from the file cache FLCCH when they are not scheduled to be used later, thereby effectively exploiting a space in the file cache FLCCH and reducing a size of the file cache FLCCH. As a result, a price of the advanced content playback unit ADVPL can be decreased. An order of removing the title resource TTRSRC and the application resource APRSRC from the file cache FLCCH at this time is specified in the priority information PRIORT (priority attribute information) for detection of corresponding resources. As described above in conjunction with (A) in FIG. 64A, the following relationship is set as a priority level concerning the title resource TTRSRC and the application resource APRSRC which are in an available period AVLBLE to store advanced application data in the file cache.

Ptitle_available>Papp_available

The above-described expression specifies the application resource APRSRC in the file cache FLCCH to be removed from the file cache FLCCH before the title resource TTRSRC by priority. In accordance with this specification, a minimum value which is set in the priority information PRIORT (priority attribute information) for removal of a corresponding resource is set to vary depending on the title resource TTRSRC and the application resource APRSRC. That is, the set minimum value of the priority information PRIORT (priority attribute information) for removal of a corresponding resource is "1" in an application resource element APRELE (see (d) of FIG. 63C) which manages the application resource APRSRC, whereas the minimum value of the priority information PRIORT (priority attribute information) for removal of a corresponding resource is "0" in a title resource element (see (d) of FIG. 66B) which manages the title resource TTRSRC. As a result, even when values of the priority information PRIORT (priority attribute information) for removal of a corresponding resource in the title resource element and that in the application resource element APRELE are respectively set to the minimum values, the value of the priority information PRIORT (priority attribute information) for removal of a corresponding resource in the application resource element APRELE becomes higher. Therefore, the application resource APRSRC can be removed from the file cache FLCCH ahead of the other resource. As a result, resource management in the file cache FLCCH can be effectively performed. Additionally, either "true" or "false" can be set as a value of multiplexed attribute information MLTPLX. In case of "true", as shown in (d) of FIG. 73A, resource data exists in an advanced pack ADV_PCK in a primary enhanced video object P-EVOB, and download processing into the file cache FLCCH must be completed during a specified loading period LOADPE. Furthermore, in case of "false", the resource data must be preloaded in the form of a definite file from the original storage position SRCDTC (a specified URI). A description of this multiplexed attribute information MLAPLX can be eliminated, and "true" as a default value is automatically set in such a case. A time PRLOAD (LoadingBegin attribute information) on a title timeline at which fetching (loading) of a target resource begins is written in the form of "HH:MM:SS:FF". A description of the time PRLOAD (LoadingBegin attribute information) on the title timeline at which fetching (loading) of the target resource begins can be eliminated in the title resource element. In such a case, the time PRLOAD on the title timeline at which fetching (loading) of the target resource begins is automatically set as "00:00:00:00" so that fetching (loading) of the target resource begins at a playback start time of a corresponding title. Further, when a value of no-cache attribute information NOCACH is "true", a Cach-Control header and Pragma header must be included in a GET request message of HTTP. On the contrary, when this value is "false", the Cach-Control header and the Pragma header are not included in the GET request message of HTTP. Although additional information for a title resource element is written in a text format which is familiar to people, a description of the additional information can be eliminated. As described above (as shown in (d) of FIG. 66B), a network source element NTSELE can be written in a title source element. As shown in (e) of FIG. 66C, a data configuration in the network source element NTSELE is formed as a set of allowable minimum value information NTTRPT of a network throughput (NetworkThroughput attribute information) and a network source storage position SRCNTS (src attribute information) corresponding to the allowable minimum value of the network throughput. The allowable minimum value information NTTRPT of the network throughput (NetworkThroughput attribute information) relates to a network throughput (a data transfer rate) when downloading a network source (data or a file) from a storage position specified in corresponding src attribute information SRCNTS, and it is represented as a minimum value allowed as a network system and written in units of 1000 bps. Furthermore, the storage position SRCNTS of the network source (src attribute information) corresponding to the allowable minimum value of the network throughput is written in the form of an URI (a uniform resource identifier). When the network source storage position SRCNTS is set in a secondary audio video clip element SCAVCP, a substitute audio video clip element SBAVCP or a substitute audio clip element SBADCP, it specifies a storage position of a time map file STMAP of secondary enhanced video object data S-EVOB. Moreover, when the src attribute information is set in an application resource element APRELE or a title resource element, it specifies a storage position of a manifest file MNFST, a markup file MRKUP, a script file SCRPT, a still image file IMAGE, an effect audio file EFTAD, a font file FONT or the like which is loaded into the file cache FLCCH.

A function and a use method of a network source element NTSELE shown in (c) of FIG. 63C or (e) of FIG. 66C will now be described hereinafter.

<NetworkSource (Network Source) Element and Selection of Contents According to Network Throughput Setting>

(I) If the data source is 'Network', the source of Presentation Object can be selected from the list of network sources according to network throughput setting. The network throughput setting is determined by Network Throughput of Player Parameter (Refer to FIG. 46).

The network sources are described by a list of NetworkSource element of a Presentation Clip element, in addition to its src attribute. Each NetworkSource element describes a source of network content, and minimum network throughput value to use this content. The src attribute and networkThroughput attribute of the NetworkSource element describes the URI of TMAP file for network content, and minimum network throughput value, respectively. The networkThroughput value of NetworkSource element shall be unique in a Presentation Clip element. The src attribute of Presentation Clip element is treated as default source, which is selected when no NetworkSource element in the Presentation Clip element satisfy the network throughput condition.

During the initialization of Title Timeline Mapping in the Startup Sequence, Playlist Manager determines the network source according to the following rule:

Network source selection rule:

Get the NetworkSource element which have the minimum network throughput value less than, or equals to Network Throughput of Player Parameter.

if (only one NetworkSource element satisfies the network throughput constraint) {

Select the source described by this element as the content source.

} else if (two, or more NetworkSource elements satisfy the network throughput constraint) {

Select the source described by the element with largest networkThroughput attribute value as the content source.

} else {

Select the source described by src attribute of Presentation Clip element as the content source.

}

(II) If the resource is located on HTTP/HTTPS server, the source of resource can be selected from the list of network sources according to network throughput setting. The network throughput setting is determined by Network Throughput of Player Parameter (Refer to FIG. 46).

The network sources are described by a list of NetworkSource element of a Resource Information element, in addition to its src attribute. Each NetworkSource element describes a source of network content, and minimum network throughput value to use this content. The src attribute and networkThroughput attribute of the NetworkSource element describes an URI of a resource file, or a file for network content, and minimum network throughput value, respectively. The networkThroughput value of NetworkSource element shall be unique in a Resource information element. The src attribute of Resource Information element is treated as default source, which is selected when no NetworkSource element in the Resource Information element satisfy the network throughput condition.

During the initialization of Title Timeline Mapping in the Startup Sequence, Playlist Manager determines the network resource according to the following rule:

Network resource selection rule:

Get the NetworkSource element which have the minimum network throughput value less than, or equals to Network Throughput of Player Parameter.

if (only one NetworkSource element satisfies the network throughput constraint) {

Select the resource described by this as the resource.

} else if (two, or more NetworkSource elements satisfy the network throughput constraint) {

Select the resource described by the element with largest networkThroughput attribute value as the resource.

} else {

Select the resource described by src attribute of Resource Information element as the resource.

}

Selected archive file, or a file shall be referred by the URI described by src attribute of Resource Information element, regardless of the URI of selected NetworkSource element.

More intelligible explanations will be provided below.

In regard to secondary audio video SCDAV managed in a secondary audio clip element SCAVCP shown in (d) of FIG. 54B, substitute audio video SBTAV managed in a substitute audio video clip element SBAVCP shown in (c) of FIG. 55B and substitute audio SBTAD managed in a substitute audio clip element SBADCP shown in (d) of FIG. 55B, a playback/display object stored in the network server NTSRV can be stored in the data cache DTCCH to be used for playback/display. When the playback/display object is stored in the network server NTSRV in this manner, a network source element NTSELE can be arranged (written) in resource information RESRCI (an application resource element APRELE or a title resource element). In this case, the advanced content playback unit ADVPL can utilize a list of the network source elements NTSELE to select a playback/display object optimum for a network environment of the information recording and playback apparatus 1 (see FIG. 1). Additionally, as shown in (d) of FIG. 63C, when a value of a "storage position SRCDTC (src attribute information) of data or a file downloaded into the data cache DTCCH" of an application resource APRSRC existing in an advanced subtitle segment element ADSTSG or an application segment element APPLSG or a value of a "storage position SRCDTC (src attribute information) of data or a file downloaded into the data cache" in a title resource element shown in (d) of FIG. 66B starts from "http" or "https", a network source element NTSELE can be arranged in the application resource element APRELE or the title resource element. A value of allowable minimum value information NTTRPT of a network throughput is written in the network source element NTSELE, and the advanced content playback unit ADVPL shown in FIG. 1 can use the network source element NTSELE to select an optimum resource from a list of the network source elements NTSELE in accordance with a value of a network throughput in a network environment where the information recording and playback apparatus 1 exists. The advanced content playback unit ADVPL shown in FIG. 1 can be aware of information of the network throughput based on the network environment where the information recording and playback apparatus 1 is placed in accordance with the following procedure. That is, at the time of initial setting of the advanced content playback unit ADVPL described at step S101 in FIG. 68, a user inputs information of the network environment as explained at step S102. Specifically, a general user does not know a value of the network throughput in the network environment. However, he/she knows information indicating whether the network to which the information recording and playback apparatus 1 is connected is a telephone line using a modem, connection using an optical cable or a network line based on ADSL. Therefore, he/she can input the network environment information on the above-described level. Then, the advanced content playback unit ADVPL calculates (estimates) an expected network throughput value based on a result of the step S102, and records the expected network throughput value in a network throughput section (networkThroughput) in a player parameter shown in FIG. 46 (step S103). As a result, making reference to a value in the network throughput section (networkTroughput) belonging to the player parameter (shown in FIG. 46) serving as a memory region set in the advanced content playback unit ADVPL allows the advanced content playback unit ADVPL to be aware of (a value of an allowable minimum value of the network throughput based on) the network environment where the corresponding information recording and playback apparatus 1 is placed. In the embodiment shown in FIG. 67(*b*), a file name under which secondary enhanced video object data S-EVOB which corresponds to a value of the network throughput and displays high-definition pictures is stored is determined as S-EVOB_HD.EV0, and a name of a time map file STMAP of a secondary video set used for this file is determined as S-EVOB_HD.MAP. Both the S-EVOB_HD.EV0 file as the object file and the S-EVOB_HD.MAP file which is the time map STMAP of the corresponding secondary video set are arranged in the same folder (a directory) in the network server NTSRV. Furthermore, an object file which corresponds to a low network throughput and in which secondary enhanced video object data S-EVOB having a low resolution is recorded is called S-EVOB_LD.EV0, and a time map STMAP of a secondary video set used for this file is determined as S-EVOB_LD.MAP. Both the S-EVOB_LD.EV0 as the object file and the corresponding time map file S-EVOB_LD.MAP are arranged in the same folder (a directory) in the network server NTSRV. In this embodiment, a file name and a storage position (a path) of a time map of a secondary video set corresponding to secondary enhanced video object data S-EVOB are written as values of src attribute information in various clip elements in a playlist file PLLST. In this embodiment, storing both the time map file STMAP of the secondary video set and the object file in the same folder (a directory) in the network server NTSRV can facilitate final access to the object file of the secondary enhanced video object data S-EVOB. Further, in this embodiment, in order to further facilitate access from the playlist file PLLST, an object file name and a time map file name corresponding to each other are matched as shown in (b) of FIG. 67 (extensions are different as ".EVOB" and ".MAP" to enable identification). Therefore, a storage position (a path) and a file name of the secondary enhanced video object data S-EVOB which should be stored in the data cache DTCCH can be recognized based on a storage position (a path) and a file name written in an index information file storage position SRCTMP (src attribute information) of the playback/display object to which reference should be made. A value of src attribute information written in the secondary audio video clip element SCAVCP tag, the substitute audio video clip element SBAVCP tag or the substitute audio clip element SBADCP tag and a value of src attribute information in each network source element NTSELE arranged in each clip element (the index information storage position SRCTMP of the playback/display object to which reference should be made) are set to different values (a storage position (a path) and a file name). Furthermore, likewise, a value of a "storage position SRCDTC (src attribute information) of data or a file to be downloaded into the data cache" written in an application resource element APRELE shown in (d) of FIG. 63C, a value of a "storage position SRCDTC (src attribute information) of data or a file to be downloaded into the data cache" written in a title resource element shown in (d) of FIG. 66B and a value of src attribute information in each network source element NTSELE arranged in the application resource element APRELE or the title resource element are different from each other. That is, a storage position SRCNTS of a network source corresponding to an allowable minimum value of a network throughput is set in addition to a "storage position SRCDTC (src attribute information) of data or a file to be downloaded into the data cache" specified in the application resource element APRELE or the title resource element. Allowable minimum value information NTTRT (networkThroughput attribute information) of a network throughput which is guaranteed when accessing a network source specified by the network source storage position SRCNTS and downloading the network source into the data cache DTCCH is written in each network source element NTSELE. Meanwhile, an URI (a uniform resource identifier) of a time map file STMAP of a secondary video set corresponding to network contents is written in an src attribute value in a network source element NTSELE arranged in a secondary audio video clip element SCAVCP shown in (d) of FIG. 54B, a substitute audio video clip element SBAVCP shown in (c) of FIG. 55B or a substitute audio clip element SBADCP shown in (d) of FIG. 55B. Further, in a network source element NTSELE arranged in an application resource element APRELE shown in (d) of FIG. 63C or a title resource element shown in (d) of FIG. 66B, a "storage position of a file corresponding to a resource file or network contents" is written in the form of an URI (a uniform resource identifier) as an src attribute information value. Furthermore, a value of allowable minimum value information NTTRPT of a network throughput (networkThroughput attribute information) must be set as a unique value (different from other values) in each presentation clip element in a network source element NTSELE arranged in a secondary audio video clip element SCAVCP shown in (d) of FIG. 54B, a substitute audio video clip element SBAVCP shown in (c) of FIG. 55B or a substitute audio clip element SBADCP shown in (d) of FIG. 55B. That is because, when values of the allowable minimum value information of the network throughput (networkSource attribute information) are equal to each other in different network source elements NTSELE, the advanced content playback unit ADVPL cannot decide which secondary enhanced video object data S-EVOB should be accessed. Therefore, providing the above-described restriction can facilitate selection of the secondary enhanced video object data S-EVOB (a time map STMAP) which should be accessed by the advanced content playback unit ADVPL. For the same reason, in a network source element NTSELE arranged in an application resource element APRELE shown in (d) of FIG. 63C or a title resource shown in (d) of FIG. 66B, the allowable minimum value information NTTRPT of the network throughput (a networkThroughput attribute information value) must be uniquely set in the same resource information element (as a value which differs depending on a different network source element NTSELE).

Moreover, when a value of the allowable minimum value information NTTRPT of the network throughput written in the network source element does not satisfy conditions of the network throughput in a network environment in which the information recording and playback apparatus 1 is placed (e.g., when the network throughput is very low since the network environment of the information recording and playback apparatus 1 uses a telephone line and it is lower than a value of the allowable minimum value information NTTRPT of the network throughput specified in the network source NTSELE), this embodiment recommends the following countermeasures.

The src attribute information defined in each presentation clip element (a secondary audio video clip element SCAVCP, a substitute audio video clip element SBAVCP, or a substitute audio clip element SBADCP) is regarded as a source in a default state, and utilized for downloading into the data cache DTCCH.

An access to a position defined in the src attribute information written in the network source element NTSELE for downloading into the file cache is not made, but the src attribute information written in the resource information element (an application resource element APRELE or a title resource element) is processed as a default source which is a resource target to be downloaded into the file cache FLCCH.

A specific embodiment utilizing information of the network source element NTSELE will now be described with reference to FIG. 67. As shown in (a) of FIG. 67, according to a list of network source elements NTSELE in which a time map file S-EVOB_HD.MAP which makes reference to an object file S-EVOB_HD.EV0 having high-definition secondary enhanced video object data S-EVOB stored therein is set as src attribute information, a network throughput which is at least 100 Mbps must be guaranteed in order to download the S-EVOB_HD.EV0 file through a network path 50. Additionally, according to a list of network source elements NTSELE in which a time map file S-EVOB_LD.MAP which makes reference to an object file S-EVOB_LD.EV0 having low-resolution secondary enhanced video object data S-EVOB recorded therein is specified by the src attribute information, a network throughput which is 56 Kbps or above can suffice when downloading the object file S-EVOB_LD.EV0 through the network path 50. As shown in FIG. 67(*d*), the playlist manager PLMNG in the navigation manager NVMNG has information of an average network throughput based on a network environment of the information recording and playback apparatus 1 in a network throughput (networkThroughput) section of the player parameter shown in FIG. 46. Therefore, the list of the network source elements NTSELE shown in FIG. 67(*a*) is interpreted, and the playlist manger PLMNG judges which object file should be accessed for downloading. Based on a result of the judgment, the playlist manager PLMNG accesses the network server NTSRV through the network manager NTMNG in the data access manager DAMNG and an network I/O unit 7-3. Consequently, the object file stored in the set network server NTSRV is downloaded into the data cache DTCCH through the network I/O unit 7-3 and the network manager NTMNG in the data access manager DAMNG. Data concerning data or a file to be downloaded in this manner or information of a storage position (or an access destination) of a file and a network throughput minimum value are recorded as a network source element NTSELE in management information (a playlist file PLLST). This embodiment is characterized in that data or a file to be downloaded can be selected in accordance with a network environment. As a result, a network source optimum for the network environment can be downloaded.

FIG. 68 shows a method of selecting an optimum resource (including an object file or a time map file) selected by the playlist manager PLMNG depicted in FIG. 67(*d*) when a list of the network source elements NTSELE is written as shown in FIG. 67(*a*).

In a startup sequence for starting playback of advanced contents ADVCT, the playlist manager PLMNG selects a network resource to be downloaded into the file cache FLCCH in a period where mapping initial setting in a title timeline TMLE is performed. A basic concept in this example will now be described. First, when the advanced content playback unit ADVPL starts initial setting (step S101), the advanced content playback unit ADVPL requests a user to input information of a network environment in which the information recording and playback apparatus 1 is placed. The user selects, e.g., a telephone line using a modem, an ADSL line, or the network path 50 using an optical cable as the network environment. As a result, the user inputs the network environment information (step S102). Based on the result, the navigation manager NVMNG calculates an expected network throughput value in the information recording and playback apparatus 1, and stores it in a network throughput section in the player parameter shown in FIG. 46 (step S103). The player parameter shown in FIG. 46 is stored in a memory region in the advance content playback unit ADVPL. As a result, initial setting of the advanced content playback unit ADVPL is completed (step S104). Then, when playback of the advanced contents ADVCT is started, the playlist manager PLMNG reads a network throughput value in the player parameter (step S105). Then, the playlist manager PLMNG reads information of a playlist file PLLST (step S106). Subsequently, at steps S107 and S108, contents of a network source element NTSELE in the playlist file PLAT are interpreted, and extraction processing of an optimum network source element NTSELE is executed. As specific contents concerning the extraction processing of an optimum network source element NTSELE, as described in the step S107, network source elements NTSELE in which a value of network throughput allowable minimum value information NTTRPT (networkThroughput attribute information) takes a value which is not smaller than a network throughput value written in the network throughput section in the player parameter are solely extracted. In the extracted network source elements NTSELE, when there is only one network source element NTSELE satisfying network throughput conditions corresponding to the information recording and playback apparatus 1, this network source element NTSELE is selected to access src attribute information written in the network source element NTSELE, thereby downloading a corresponding resource, object file or time map file STMAP into the data cache DTCCH. Further, as different from the above example, in the extracted network source elements NTSELE, when there are two or more (a plurality of) network source elements NTSELE satisfying the network throughput conditions based on the network environment where the information recording and playback apparatus 1, a network source having the largest value of the network throughput allowable minimum value information NTTRPT (networkThroughput attribute information) with respect to a resource, an object file or a time map file to be accessed is selected, and src attribute information written in the selected network source element NTSELE is accessed, thereby downloading a corresponding network source, object file or time map file into the data cache DTCCH (steps S107 to S109). Furthermore, as different from the above two conditions, when a network source element NTSELE satisfying the network throughput conditions corresponding to the information recording and playback apparatus 1 is not extracted, an access is made to a storage position written in the form of a value of src attribute information in a presentation clip element, an application source element APRELE or a title source element which is a parent element of the network source element NTSELE to store a corresponding resource, object file or time map file into the data cache DTCCH. Moreover, when appropriate network source element NTSELE is extracted by the above-described method but there is no expected resource file even though an access is made to a position written in src attribute information in the extracted network source element NTSELE, an access is made to a position written in src attribute information in an application resource element APRELE or a title resource element which is a parent element of the network source element NTSELE to perform download processing into the data cache DTCCH in place of utilizing information of the network source element NTSELE. After completion of downloading the resource data or the resource file, the data or the file stored in the data cache DTCCH is used to effect playback/display for a user (step S110). Upon termination of playback of the advanced contents ADVCT, playback termination processing is executed (step S111).

As shown in (a) of FIG. 69A, configuration information CONFGI, media information MDATRI and title information TTINFO exist in a playlist PLLST. As shown in (b) of FIG. 69A, first play title element information FPTELE and one or more pieces of title element information TTELEM exist in the title information TTINFO, and playlist application element information PLAELE is arranged at the end of the title information TTINFO.

<PlaylistApplication (Playlist Application) Element and Playlist Associated Advanced Application>

PlaylistApplication element in TitleSet element describes the Object Mapping Information of Playlist Associated Advanced Application. Playlist Associated Advanced Application is a special type of Advanced Application. The life time of Playlist Associated Advanced Application is all of the entire Title Timeline of all Title in a Playlist, while the life time of other Advanced Application is some time interval, or entire Title Timeline of a Title. Advanced Application other than Playlist Associated Advanced Application is called by title Associated Advanced Application.

The dataSource of Playlist Associated Advanced Application shall be Disc, or Persistent Storage. Playlist Associated Advanced Application is always Hard-Sync Application.

The Markup in Playlist Associated Advanced Application shall not use title clock.

All PlaylistApplication elements belong to the same Application Block. The language attribute shall be present and unique in a Playlist. Only one PlaylistApplication element may be activated in accordance with Menu Language System Parameter.

More intelligible explanations will be provided below.

Object mapping information OBMAPI of a playlist associated advanced application PLAPL is written based on playlist application element information PLAELE in a title set element (title information TTINFO). As shown in FIGS. 70 and 71, the playlist associated advanced application PLAPL is one type of advanced applications ADAPL, and it is classified as a special type of the advanced applications ADAPL. A life time (a valid period APVAPE) of the playlist associated advanced application PLAPL is set in all title timeline TMLE regions in all titles defined in a playlist PLLST. That is, as shown in FIG. 70, an execution (display) period APACPE of the playlist associated advanced application PLAPL becomes valid on all title timelines TMLE in all titles defined in the playlist PLLST excluding the first play title FRPLTT, and the playlist associated advanced application PLAPL can be used at an arbitrary time in an arbitrary title. In comparison with this configuration, as shown in FIG. 70, a title associated advanced application TTAPL becomes valid on all title timelines TMLE in one title, and a valid period ADVAPE of the title associated advanced application TTAPL (an advanced application ADAPL #B) matches with set periods of all title timelines TMLE in a corresponding title #2. Further, the title associated advanced application TTAPL does not necessarily become valid in different type (e.g., a title #1 or a title #3), and a title resource TTRSRC which is referred (used) by the title associated advanced application TTAPL may be removed in playback of, e.g., the title #1 or the title #3 in some cases. Furthermore, as compared with the valid period APVAPE of the playlist associated advanced application PLAPL, a valid period APVAPE of a general advanced application ADAPL corresponds to a specific time interval in a specific title alone. Moreover, data of an application resource APRSRC which is referred (used) by the general advanced application ADAPL may be removed from the file cache FLCCH in a period other than the valid period APVAPE of the advanced application ADAPL in some cases. The advanced application ADAPL #B which has a valid period APVAPE in a title timeline TMLE of a title except the playlist associated advanced application PLAPL is called a title associated advanced application TTAPL. A playlist application resource PLAPRS (a data source) as a resource which is referred (used) by the playlist associated advanced application PLAPL is stored in the information storage medium DISC or the persistent storage PRSTR. Synchronization attribute information SYNCAT of the playlist associated advanced application PLAPL is always a hard sync (hard synchronization) type application. That is, progress of a title timeline TMLE is temporarily stopped until loading a playlist application resource PLAPRS which is referred (used) by the playlist associated advanced application PLAPL into the file cache FLCCH is completed, and progress of the title timeline TMLE is allowed only after completion of loading the playlist application resource PLAPRS. It is assumed that downloading the playlist application resource PLAPRS into the file cache FLCCH is completed during playback of a later-described first play title FRPLTT. Therefore, even if the playlist advanced application PLAPL is a hard sync (hard synchronization) application, the title timeline TMLE is hardly stopped during playback of a title other than the first play title. However, when loading of the playlist application resource PLAPRS into the file cache FLCCH is not completed even though the first play title FRPLTT is finished, playback of the title is stopped (progress of the title timeline TMLE is stopped) until the loading is completed. In this embodiment, a selection attribute (a user operation response enabled/disabled attribute (selectable attribute information)) of the first play title FRPLTT is temporarily set to “false” so that jump to another title or fast-forward of the first play title FRPLTT by a user is basically prevented from being executed during playback of the first play title FRPLTT. However, when jump to another title is performed before completion of loading the playlist application resource PLAPRS during playback of the first play title FRPLTT due to any setting error, since the playlist associated advanced application PLAPL is a hard sync (hard synchronization) application, a title timeline TMLE of the title as a jump destination is stopped until loading of the playlist application resource PLAPRS into the file cache FLCCH is completed. A tick clock must not be used for markup MRKUP which is utilized in the playlist associated advanced application PLAPL. All of playlist application element information PLAELE written in a playlist PLLST belong to the same application block. Language attribute information LANGAT (language attribute information) in the playlist application element information PLAELE shown in (c) of FIG. 69B must be written (a description of this information cannot be eliminated), and a value of the language attribute information LANGAT must be uniquely (equally) set in the same playlist PLLST. For example, when the language attribute information LANGAT (language attribute information) is set to Japanese in the playlist application element information PLAELE, the playlist associated advanced application PLAPL must be all used as Japanese in the same playlist PLLST. Although one piece of playlist application element information PLAELE is written in (b) of FIG. 69A, a plurality of pieces of playlist application element information PLAELE which are respectively set in different languages in the language attribute information LANGAT (language attribute information) are actually written. A memory region in the advanced content playback unit ADVPL has a region in which information of a profile parameter shown in FIG. 47 is written. The profile parameter shown in FIG. 47 has a position where information of a menu language (menulanguage) is recorded. The playlist application element information PLAELE which is displayed/executed is selected in accordance with a menu language (menulanguage) set in the memory region in this advanced content playback unit ADVPL. That is, the playlist application element information PLAELE having a value of language attribute information LANGAT (language attribute information) shown in (c) of FIG. 69B matched with language information recorded in the menu language (menulanguage) shown in FIG. 47 is solely extracted as valid information and used for display/execution.

<PlaylistApplication (Playlist Application) Element>

PlaylistApplication element describes the Object Mapping Information for Playlist Associated Advanced Application, which is a special type of Advanced Application whose life time is all of entire Title.

XML Syntax Representation of PlaylistApplication Element:

```
<PlaylistApplication
id = ID
src = anyURI
zOrder = nonNegativeInteger
language = language
description = string
>
    PlaylistApplicationResource *
</PlaylistApplication>
```

The Playlist Associated Advanced Application shall be scheduled on entire Title Timeline of all Title in a Playlist, except for First Play Title.

Playlist Associated Advanced Application shall be referred by the URI for the Manifest file of the initialization information of the application.

PlaylistApplication element can contain a list of PlaylistApplicationResource element, which describes the information of Resource Information per this Playlist Associated Advanced Application.

All PlaylistApplication elements belong to the same Application Block. Only one PlaylistApplication element may be activated in accordance with Menu Language System Parameter.

(a) src Attribute

Describes the URI for the Manifest file which describes the initialization information of the application.

(b) zOrder Attribute

Describes the Application z-order. Application z-order is used by tick clock frequency.

(c) Language Attribute

Describes the application language, which consists of two-letter lowercase symbols defined in ISO-639. This attribute shall be present.

(d) Description Attribute

Describes additional information in the human consumable text form. This attribute can be omitted.

More intelligible explanations will be provided below.

The playlist associated advanced application PLAPL is scheduled to be valid in all time regions set in title timelines TMLE in all titles except a first play title FRPLTT. The src attribute information (source attribute information) written in playlist application element information PLAELE which manages the playlist associated advanced application PLAPL is specified as a manifest file storage position URIMNF including initial setting information of a corresponding application. That is, information referred by playlist application element information PLAELE is referred as a playlist associated advanced application PLAPL to retrieve a storage position of a manifest file MNFST, and this information is written in the form of a URI (a uniform resource identifier). The manifest file MNFST includes initial setting information of a corresponding application. As shown in (c) of FIG. 69B, the playlist application element information PLAELE includes a list of playlist application resource elements PLRELE. Information of the playlist application resource element PLRELE is written about resource information RESRCI used in the playlist associated advanced application PLAPL. As shown in (c) of FIG. 68B, although the playlist application element information PLAELE includes playlist application ID information PLAPID, providing the playlist application ID information PLAPID in the playlist application element information PLAELE as shown in FIG. 82 can facilitate reference using an API command. Further, in regard to Z-order attribute (Z-index) information ZORDER, a number of a layer in which applications or application elements are superimposed and arranged in a graphic plane GRPHPL is specified, and "0" or a positive number value is set as this value. Furthermore, the layer number is used (subjected to setting change) in accordance with a frequency of a check clock. The language attribute information LANGAT (language attribute information) is utilized when selecting a specific one from a plurality of pieces of playlist application element information PLAELE in accordance with a menu language in the profile parameter as described above. Moreover, this information specifies a languages used for characters displayed in a screen (e.g., a menu screen) or voices. Therefore, a description of the language attribute information LANGAT (language attribute information) cannot be eliminated in the playlist application element information PLAELE, and it must be written. Additionally, additional information concerning a playlist application which can be arranged at a last position is written in a text format familiar to people, but a description of the additional information can be eliminated.

<PlaylistApplicationResource (Playlist Application Resource) Element)>

PlaylistApplicationResource element describes Playlist Associated Resource Information, such as a package archive file used in the Playlist Associated Advanced Application.

XML Syntax Representation of PlaylistApplicationResource Element:

```
<PlaylistApplicationResource
src = anyURI
size = positiveInteger
multiplexed = (true | false)
description = string
/>
```

PlaylistApplicationResource element determines which Archiving Data, or a file shall be loaded in File Cache. The src attribute refers to Archiving Data in Disc, or Persistent Storage.

Player shall load the resource file into Data Cache before the life cycle of the corresponding Playlist Associated Advanced Application.

The valid period of Playlist Application Associated Resource is the entire Title Timeline of all Title in a Playlist, except for First Play Title.

The loading period of Playlist Application Associated Resource is the Title duration of First Play Title if it presented, or from '00:00:00:00' to '00:00:00:00' in Title 1.

The src attribute shall refer to Disc, or Persistent Storage. Disc or Persistent Storage are identified by URI [FIG. 20].

(a) src Attribute

Describes the URI for the Archiving Data, or a file to be load into Data Cache. The URI shall not refer to API Managed Area of File Cache, or Network.

(b) Size Attribute

Describes the size of the Archiving Data, or a file in bytes. This attribute can be omitted.

(c) Multiplexed Attribute

If value is 'true', the Archiving Data can be loaded from ADV_PCK of P-EVOB in the loading period. If the value is 'true', the First Play Title shall be described. The loading period of Playlist Application Associated Resource is the Title duration of the First Play Title. If the value is 'false', Player shall preload the resource from the specified URI. This attribute can be omitted. Default value is 'true'.

(d) Description Attribute

Describes additional information in the human consumable text form. This attribute can be omitted.

More intelligible explanations will be provided below.

Management information concerning a playlist application resource PLAPRS is written in a playlist application resource element PLRELE whose detailed configuration is shown in (d) of FIG. 69B. A packaged archive file or archive data used in a playlist associated advanced application PLAPL corresponds to the playlist application resource PLAPRS. The playlist application resource element PLRELE specifies (defines) archiving data or an archiving file which should be downloaded in the file cache FLCCH. The src attribute information indicative of a storage position SRCDTC of data or a file which is downloaded into the data cache is written in the form of a URI (a uniform resource identifier), and can make reference to archiving data or an archiving file stored in the information storage medium DISC or a persistent storage PRSTR. In this embodiment, an API management region in the file cache or a position in the network must not be specified as the storage position SRCDTC (src attribute information) of data or a file which is downloaded into the corresponding data cache. Preventing data stored in the network server NTSRV in the network from being specified guarantees completion of downloading a playlist application resource PLAPRS within a download period LOADPE. As a result, download of the playlist application resource PLAPRS is completed during playback of the first play title FRPLTT. A network throughput in a network environment of the information recording and playback apparatus 1 greatly depends on a network environment of a user. For example, when data is transferee by using a modem (a telephone line) in the network environment, a network throughput is very low. When download of a playlist application resource PLAPRS is attempted in such a network environment, it is very difficult to complete download during playback of a first play title FRPLTT. This embodiment is characterized in that download from the network server NTSRV is prohibited and such a risk is eliminated. Further, although size information DTFLSZ (size attribute information) of the data or the file which is loaded into the data cache is written in bytes, a description of the attribute information can be eliminated. Furthermore, when a value of multiplexed attribute information MLTPLX is "true", corresponding archiving data must be loaded from an advanced pack ADV_PCK in primary enhanced video object data P-EVOB within a loading period LOADPE (see (d) of FIG. 73A). Moreover, in this case (in case of "true"), first play title element information FPTELE which manages a first play title FRPLTT must be written in a playlist PLLST. When the first play title element information FPTELE is written in the playlist PLLST in this manner, a loading period LOADPE of a playlist application resource PLAPRS corresponds to a playback period of the first play title FRPLTT. Additionally, when a value of the multiplexed attribute information MLTPLX is "false", the advanced content playback unit ADVPL must preload a corresponding resource from a position specified by the src attribute information. Further, although a description of the multiplexed attribute information MLTPLX can be eliminated, a value of the multiplexed attribute information MLTPLX is automatically set to "true" in such a case. Furthermore, additional information concerning the playlist application resource PLAPRS is written in a text format familiar to people, but a description of the additional information can be eliminated.

playlist application element information PLAELE having a data configuration depicted in (c) of FIG. 69B manages a playlist associated advanced application PLAPL. Moreover, a resource referred (used) by the playlist associated advanced application PLAPL is managed by a playlist application resource element PLRELE having a data configuration shown in (d) of FIG. 69B. Additionally, an advanced subtitle segment element ADSTSG having a data configuration shown in (c) of FIG. 56B manages an advanced subtitle ADSBT, and an application segment element APPLSG having a data configuration shown in (d) of FIG. 56B manages an advanced application ADAPL. Further, a resource referred (used) by the advanced subtitle ADSBT or the advanced application ADAPL is called an application resource APRSRC, and managed by an application resource element APRELE having a data configuration shown in (d) of FIG. 63C. Furthermore, a title resource element having a data configuration shown in (d) of FIG. 66B manages a title resource TTRSRC. The title resource TTRSRC is referred (used) by a title associated advanced application TTAPL. The application segment element APPLSG corresponds to information which manages the title associated advanced application TTAPL. A relationship (a difference) between the playlist application resource PLAPRS, the title resource TTRSRC and the application resource APRSRC mentioned above will now be described with reference to FIGS. 70 and 71. Moreover, a relationship (a difference) between the playlist associated advanced application PLAPL, the title associated advanced application TTAPL and the advanced application ADAPL will be also described with reference to FIGS. 70 and 71. In the embodiment shown in FIG. 70, a description is given as to playback from a title #1, but it is often the case that a first play title FRPLTT shown in FIG. 17 is first set prior to the title #1. According to this embodiment, in a use example where the playlist associated advanced application PLAPL is used and loading of a playlist application resource PLAPRS used in this application PLAPL into the file cache FLCCH is completed before playback of the title #1, the first play title FRPLTT must be played back (at the very beginning) at the time of start of playback of the playlist PLLST as shown in FIG. 17. Therefore, the explanatory view of FIG. 70 assumes that the first play title FRPLTT is played back prior to playback of the title #1, and eliminates a playback period of the first play title FRPLTT. As shown in FIG. 70, the playlist associated advanced application PLAPL can be executed (displayed) in all titles except the first play title FRPLTT. That is, an execution (display) period APACPE of the playlist associated advanced application PLAPL spreads to playback periods of all titles except the first play title FRPLTT. In comparison to this, the title associated advanced application TTAPL is effective in the same title alone as shown in FIG. 70. Therefore, an execution (display) period APACE of the title associated advanced application TTAPL spreads from a time "T3" on a title timeline TMLE in the same title (which means a title #2 in the embodiment shown in FIG. 70) to end of the title. In comparison with this configuration, as shown in FIG. 70, an execution (display) period APACPE of the advanced application ADAPL is set in a specific period restricted in the same title. In this embodiment, the playlist associated advanced application PLAPL and the title associated advanced application TTAPL belong to an extensive advanced application ADAPL, and the playlist associated advanced application PLAPL and the title associated advanced application TTAPL are defined as special cases in the extensive advanced application ADAPL. FIG. 71 shows a relationship between various kinds of resources referred (used) by the various kinds of advanced applications ADAPL. A playlist application resource PLAPRS means a resource which is equally used by an arbitrary advanced application ADAPL while cutting across titles. The playlist application resource PLAPRS can be referred (used) by not only the playlist associated advanced application PLAPL but also the title associated advanced application TTAPL or the advanced application ADAPL. The playlist application resource PLAPRS is loaded into the file cache FLCCH in a playback period of a first play title FRPLTT as described above, and kept being stored in the file cache FLCCH over playback periods of a plurality of titles until the advanced contents ADVCT are finished. Therefore, the playlist application resource PLAPRS is in a valid period APVAPE in playback periods and between the playback periods (a position α and a position β) of all titles except the first play title FRPLTT in the file cache FLCCH. As a result, the playlist associated advanced application PLAPL which refers (uses) the playlist application resource PLAPRS can be equally used (displayed for a user) between different titles. A resource element name in the playlist PLLST which manages the playlist application resource PLAPRS becomes a playlist application resource element PLRELE having a data configuration shown in (d) of FIG. 69B. In this embodiment, when the playlist application resource PLAPRS is set and the playlist associated advanced application PLAPL which refers (uses) this resource is set, the playlist associated advanced application PLAPL can be continuously displayed for a user during transition between different titles (a period α and a period β in FIG. 70). Further, the loading period of the playlist application resource PLAPRS into the file cache FLCCH is not necessary during periods except a playback period of the first play title FRPLTT, and hence there can be obtained an effect that display can be started or switched at a high speed. Furthermore, the title resource TTRSRC can be not only referred (used) by the title associated advanced application TTAPL and the advanced application ADAPL in a title, but also it can be shared by a plurality of advanced applications ADAPL in the same title. A resource element name in a playlist PLLST which manages the title resource TTRSRC is a title resource element having a data configuration shown in (d) of FIG. 66B. A timing of storing the title resource TTRSRC in the file cache FLCCH will now be described. As shown in (d) of FIG. 66B, a time PRLOAD (loadingBegin attribute information) on a title timeline at which fetching (loading) a target resource into a title resource element begins can be set. When the time PRLOAD (loadingBegin attribute information) on the title timeline at which fetching (loading) the target resource into the title resource element begins is written, loading is started at such a timing as shown in FIG. 65A. That is, a value of the time PRLOAD on the title timeline at which fetching (loading) of the target resource begins is indicative of a time ahead of a value of a start time TTSTTM (titleTimeBegin attribute information) on a title timeline of a corresponding resource, and loading starts at a time which is earlier than an execution start time of the title resource TTRSRC. On the other hand, when a description of the time PRLOAD (loadingBegin attribute information) on the title timeline at which fetching (loading) of a target resource begins shown in (d) of FIG. 66B is eliminated, loading is started at a timing of the start time TTSTTM on the title timeline as shown in FIG. 65B, and an execution period APACPE of a title associated advanced application TTAPL which refers (uses) the title resource TTRSRC begins immediately after completion of loading. The embodiment shown in FIG. 70 has been described based on the method depicted in FIG. 65B. As shown in FIG. 70, after completion of the title #2, the title resource TTRSRC enters a state of the non-exist period N-EXST to remove data from the file cache. That is, although the title resource TTRSRC is kept being stored in the file cache FLCCH as long as a playback target title is not changed, it is removed from the file cache FLCCH when the playback target title is changed (shifted to another title). When the title resource TTRSRC is utilized, continuous display in the same title becomes possible. Further, in a case where contents are constituted of a plurality of titles, a title is removed from the file cache FLCCH when shifted to another title, thereby effectively utilizing the file cache FLCCH. Furthermore, an application resource APRSRC is a resource which is uniquely used in accordance with each advanced application ADAPL, and utilized in a specific advanced application ADAPL alone in a title. An application resource element APRELE corresponds to a resource element name in a playlist PLLST which manages the application resource APRSRC as shown in (d) of FIG. 63C. A time PRLOAD (loadingBegin attribute information) on a title timeline at which fetching (loading) of a target resource begins can be written in the application resource element APRELE as shown in (d) of FIG. 63C. When the loadingBegin attribute information is written, a loading timing into the file cache FLCCH is a timing shown in FIG. 65A. On the contrary, when the loadingBegin attribute information is not written, loading into the file cache FLCCH is effected at a timing shown in FIG. 65B. Moreover, when this information is written, a value of the loadingBegin attribute information is set to a time which is ahead of a value of a start time TTSTTM (titleTimeBegin attribute information) on a title timeline set in a parent element (an advanced subtitle segment element ADSTSG or an application segment element APPLSG) to which the application resource element APRELE belongs. A loading timing of the application resource APRSRC into the file cache FLCCH shown in FIG. 70 is based on FIG. 65B. As shown in FIG. 70, after end of an execution (display) period APACPE of an advanced application ADAPL #C which refers (uses) the application resource APRSRC, the non-exist period N-EXST to remove data from the file cache begins. That is, the application resource APRSRC is stored in the file cache FLCCH before use (execution) of each advanced application ADAPL, and it is removed from the file cache FLCCH after use (execution) of the advanced application ADAPL. In this embodiment, utilizing the application resource APRSRC allows removal of a corresponding resource after use (execution) of a specific advanced application ADAPL, thereby obtaining an effect that the file cache FLCCH can be effectively utilized. As a result, there can be acquired a merit that a necessary memory size of the file cache FLCCH can be reduced and hence a price of the apparatus can be decreased.

Figure 72:
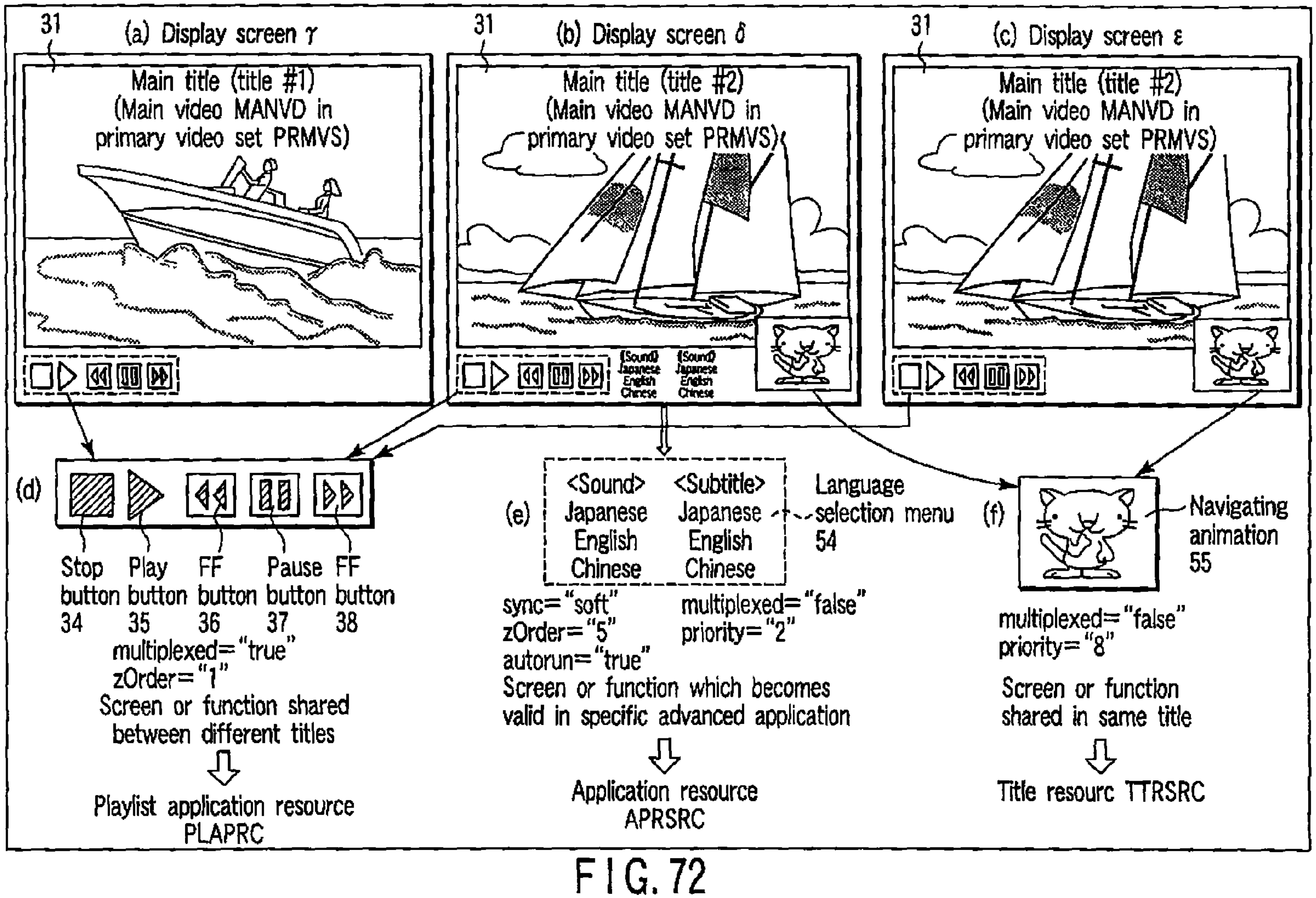
FIG. 72 is an exemplary view showing specific examples of displays screens γ, β and ϵ based on the example of FIG. 70.

More specific contents concerning contents shown in FIGS. 70 and 71 will now be described with reference to a display screen example depicted in FIG. 72. As shown in FIG. 70, in playback of the title #2, primary enhanced video object data P-EVOB #1 which is used to display a primary video set PRMVS is played back, and a playlist associated advanced application PLAPL is simultaneously displayed. A display screen example at this time is represented by a symbol y and shown in FIG. 72(*a*). As illustrated in FIG. 72, the title #1 (main title) represents primary enhanced video object data P-EVOB #1, and a screen in which various kinds of buttons from a stop button 34 to an FF button 38 displayed on a lower side of the screen are arranged is displayed by the playlist associated advanced application PLAPL. The screen shown in FIG. 72(*d*) is equally displayed in a display screen δ illustrated in FIG. 72(*b*) and a display screen ϵ depicted in FIG. 72(*c*). That is, the screen displayed by the playlist associated advanced application PLAPL shown in FIG. 72(*d*) is a screen shared by different titles, and functions demonstrated in this screen are also shared. A still image IMAGE constituting the screen and a script SCRPT, a manifest MNFST and a markup MRKUP realizing functions serve as a playlist application resource PLAPRS. In a playlist application resource element PLRELE which manages the playlist application resource PLAPRS and has a data configuration shown in (d) of FIG. 69B, a value of multiplexed attribute information MLTPLX is "true" in the example shown in FIG. 72(*d*). In this case, as apparent from the illustrations of FIGS. 73A and 73B, the playlist application resource PLAPRS is multiplexed and stored in primary enhanced video object data P-EVOB #0 which is used when playing back a first play title FRPLTT. As shown in (c) of FIG. 69B, Z-order attribute (Z-index) information ZORDER exists in playlist application element information PLAELE which manages a playlist associated advanced application PLAPL which refers (uses) the playlist application resource PLAPRS, and a value of this information is set to "1" in the example shown in FIG. 72(*d*). Since the playlist application resource PLAPRS is equally used (displayed) between different resources, when it overlaps, e.g., a screen displayed in a title associated advanced application TTAPL or a screen displayed in an advanced application ADAPL in the display screen, it is desirable for the screen of this resource to be displayed below such a screen. Therefore, in the embodiment shown in FIG. 72(*d*), a value of the Z-order attribute (Z-index) information ZORDER is set to a low value. Then, in playback of the title #2 shown in FIG. 70, primary enhanced video object data P-EVOB #2 which is used to display a primary video set PRMVS, a playlist associated advanced application PLAPL and a title associated advanced application TTAPL are simultaneously displayed when a time on a title timeline TMLE is between "T4" and "T2". A screen at this moment is indicated by a display screen ϵ and shown in FIG. 72(*c*). That is, a screen displayed by the title associated advanced application TTAPL means navigating animation 55 shown in FIG. 72(*f*). In recent Windows Office, a dolphin character appears as help animation to support usage. Likewise, the navigating animation 55 shown in FIG. 72(*f*) can be used to guide screen operations. Furthermore, the present invention is not restricted thereto, and the navigating animation 55 can be used for explanation of screen contents displayed in the title #2 (main title). The navigating animation 55 shows screens or functions equally used in the same title (i.e., title #2), and uses a title resource TTRSRC. As shown in (d) of FIG. 66B, multiplexed attribute information MLTPLX exists in a title resource element which manages the title resource TTRSRC, and a value of this information is set to "false" in the embodiment shown in FIG. 72(*f*). That is, this case means that the title resource TTRSRC is not multiplexed in the form of an advanced pack ADV_PCK but stored at a specified position in the form of a specific file. As described in conjunction with FIGS. 70 and 71, when a playback position has shifted from the title (i.e., title #2) where the title resource TTRSRC is used to another title, the title resource TTRSRC can be eliminated from the file cache FLCCH. Priorities of removal at this moment are specified by priority information PRIORT (priority attribute information) with respect to removal of a corresponding resource shown in (d) of FIG. 66B. As shown in (d) of FIG. 66B, since removal is performed from a resource having the higher value by priority, a value "8" in the embodiment shown in FIG. 72(*f*) means that removal can be performed on a relatively earlier stage. When a time on a title timeline TMLE during playback of the title #2 shown in FIG. 72(*f*) is between "T3" and "T4", screens of the primary enhanced video object data P-EVOB #2 displaying the primary video set PRMVS, the playlist associated advanced application PLAPL, the title associated advanced application TTAPL and the advanced application ADAPL are combined and displayed, and FIG. 72(*b*) shows a display screen δ at this moment. As shown in FIG. 72(*e*), the screen displayed by the advanced application shows a language selection menu 54. A screen or a function which becomes valid in a specific advanced application alone shown in FIG. 72(*e*) is realized by utilizing an application resource APRSCR. As shown in (d) of FIG. 63C, multiplexed attribute information MLTPLX can be written in an application resource element APRELE which manages the application resource APRSRC. In the embodiment shown in FIG. 72(*e*), a value of this information is set to "false", and this means that the application resource APRSRC is not multiplexed and stored in the form of an advanced pack ADV_PCK but solely exists as a specific file. Moreover, a value of priority information PRIORT (priority attribute information) for removal of a corresponding resource specified in the application resource element APRELE is set as a value "2". As shown in (d) of FIG. 63C, since removal is performed from a resource having the higher value, the value "2" means that its resource is stored in the file cache FLCCH as long as possible. Since the priority attribute value is set to "8" in FIG. 72(*f*) and this value is set to "2" in FIG. 72(*e*), it seems that removal can be performed from a resource of the navigating animation 55 shown in FIG. 72(*f*) when the priority attribute values alone are compared. However, as described above in conjunction with FIGS. 64A and 64B, since a priority level of the application resource APRSRC is lower than a priority level of the title resource TTRSRC, the application resource APRSRC corresponding to the language selection menu 54 shown in FIG. 72(*e*) is actually removed from the file cache FLCCH by priority. The autorun attribute information ATRNAT can be written in an application segment element APPLSG which is a parent element including an application resource element APRELE which manages the application resource APRSRC. In the embodiment shown in FIG. 72(*e*), a value of this information is set to "true", and loading of the application resource APRSRC begins simultaneously with start of playback of the title #2 as shown in FIG. 70. Additionally, in the embodiment shown in FIG. 70, as a loading method of the application resource APRSRC, a method shown in FIG. 65(*c*) is adopted. Further, in the embodiment shown in FIG. 72(*e*), a value of synchronization attribute information SYNCAT (sync attribute information) of a playback/display object included in (d) of FIG. 56B is set to "soft". Therefore, in the embodiment shown in FIG. 70, although loading of the application resource APRSRC begins simultaneously with start of playback of the title #2, time progress on a title timeline TMLE is continued without displaying the screen shown in FIG. 72(*e*) to a user when loading of the application resource APRSRC is not completed even though a time "T3" on the title timeline TMLE at which a loading scheduled period LOADPE is terminated has been reached, and the language selection menu 54 is displayed only after completion of loading. Furthermore, in the embodiment shown in FIG. 72(*e*), a value of Z-order attribute (Z-index) information ZORDER shown in (d) of FIG. 56B is set to "5", and it is larger than a value "1" of the same attribute information shown in FIG. 72(*d*). Therefore, if a screen of various buttons shown in FIG. 72(*d*) and a display position of a screen of the language selection menu 54 shown in FIG. 72(*e*) partially overlap in the display screen, the language selection menu 54 having a larger value of the Z-order attribute (Z-index) information ZORDER is displayed on the upper side. When screens to be displayed in different advanced applications ADAPL overlap each other on the same screen, setting a value of the Z-order attribute (Z-index) information ZORDER can automatically set a screen which is displayed on the upper side, thereby improving the expression of a content provider for a user.

A first play title FRPLTT shown in (a) of FIG. 73A represents a title which is played back/displayed for a user first, and it is managed by first play title element information FPTELE in title information TTINFO in a playlist PLLST as shown in (c) of FIG. 74B. Furthermore, in regard to a playlist associated advanced application PLAPL, as shown in FIG. 70, its execution (display) period APACPE is assured over a plurality of titles, and this application can be displayed/executed in an arbitrary title except the first play title FRPLTT. Moreover, a resource referred (used) by the playlist associated advanced application PLAPL is called a playlist application resource PLAPRS. This embodiment is characterized in that loading of the playlist application resource PLAPRS into the file cache FLCCH is completed during playback of the first play title FRPLTT. As a result, display/execution of the playlist associated advanced application PLAPL can be started at the time of start of playback of an arbitrary title other than the first play title FRPLTT. In the embodiment shown in (a) of FIG. 73A, primary enhanced video object data P-EVOB #1 is played back at the time of playback of the first play title FRPLTT. This period becomes a loading period LOADPE of the playlist application resource PLAPRS. As a result, storage of the playlist application resource PLAPRS in the file cache FLCCH is completed at a playback end time (a time "T0" on a title timeline TMLE) of the first play title FRPLTT. As a result, at a playback start time of a title #1, a playlist associated advanced application PLAPL can be played back simultaneously with the primary enhanced video object data P-EVOB #1. As acquisition paths of a playlist application resource PLAPRS ((b) of FIG. 73A) which is stored in the file cache FLCCH, there are a plurality of paths, i.e., a path A, a path B and a path C as shown in FIG. 73A. In the path A according to this embodiment, the playlist application resource PLAPRS is multiplexed in a primary enhanced video object P-EVOB #0 utilized for playback of a first play title FRPLTT. That is, a playlist application resource PLAPRS is divided into each data consisting of 2048 bytes, and packed in an advanced pack ADV_PCK every 2048 bytes. The advanced pack ADV_PCK is multiplexed with other main audio pack AM_PCK, main video pack VM_PCK, sub-picture pack SP_PCK and others to constitute primary enhanced video object data P-EVOB. A playlist application resource PLAPRS used in the playlist application element information PLAELE is managed by a playlist application resource element PLRELE as shown in (d) of FIG. 69B. Multiplexed attribute information MLTPLX exists in the playlist application resource element PLRELE as shown in (d) of FIG. 69B. Whether the acquisition path of the playlist application resource PLAPRS shown in (b) of FIG. 73A goes through the path A or the later-described path B or path C can be judged based on a value of the multiplexed attribute information MLTPLX. That is, when a value of the multiplexed attribute information MLTPLX is "true", the path A is used to acquire a corresponding playlist application resource PLAPRS as shown in FIGS. 73A and 73B. When a value of the multiplexed attribute information MLTPLX is "true", a storage position SRCDTC of data or a file which is downloaded into the data cache is indicative of a storage position of a primary enhanced video object P-EVOB #0 which displays a first play title FRPLTT shown in (a) of FIG. 73A. In this case, management information of the first play title FRPLTT is displayed, and a primary audio video clip element PRAVCP is arranged in first play title element information FPTELE shown in (c) of FIG. 74B. A storage position (a path) and a file name of a time map PTMAP of the primary enhanced video object data P-EVOB #0 which displays the first play title FRPLTT shown in (a) of FIG. 73A are written in an index information file storage position SRCTMP (src attribute information) of a playback/display object which is shown in (c) of FIG. 54B and should be referred in the primary audio video clip element PRAVCP arranged in the playlist application element information PLAELE. Although the storage position (the path) and the file name alone of the time map PTMAP are written in the primary audio video clip element PRAVCP, a storage position (a path) of the corresponding primary enhanced video object data P-EVOB #0 matches with the storage position (a path) of the time map PTMAP in this embodiment, and a file name of the primary enhanced video object data P-EVOB #0 file matches with that of the time map PTMAP (however, their extensions ".MAP" and "EV0" are different from each other), thereby facilitating access to the primary enhanced video object data P-EVOB #0 file. Additionally, when a value of the multiplexed attribute information MLTPLX in the playlist application resource element PLRELE shown in (d) of FIG. 69B is "false", a path (the path B or the path C) different from the path A shown in FIG. 73A is used to load the playlist application resource PLAPRS into the file cache FLCCH. That is, in the path B, the playlist application resource file PLRSFL is stored in the information storage medium DISC, and data is played back from the information storage medium DISC simultaneously with playback of the primary enhanced video object P-EVOB #0 which is used to display the first play title FRPLTT, and the data is stored in the file cache FLCCH. Further, in the path C, the playlist application resource file PLRSFL is stored in the persistent storage PRSTR, and the playlist application resource file PLRSFL stored in the persistent storage PRSTR is loaded into the file cache FLCCH concurrently with playback of the first play title FRPLTT. If the playlist application resource file PLRSFL is stored in the network server NTSRV, there is a risk that a network trouble occurs during download and loading data into the file cache FLCCH cannot be completed before end of playback of the first play title FRPLTT. Therefore, this embodiment is considerably characterized in that a storage position of the playlist application resource file PLRSFL is set outside the network server NTSRV to guarantee completion of loading during a playback period of the first play title FRPLTT. This embodiment is remarkably characterized in that the multiplexed attribute information MLTPLX is arranged (written) in the playlist application resource element PLRELE in this manner. As a result, preliminary preparation of a demultiplexer DEMUX in the primary video player PRMVP shown in FIG. 36 can be performed, thereby reducing a loading period LOADPE of the playlist application resource PLAPRS. Furthermore, this embodiment sets many restricting conditions, e.g., setting the number of video tracks and the number of audio tracks as one with respect to the first play title FRPLTT, thus further assuring completion of loading during a playback period of the first play title FRPLTT.

<FirstPlay Title (i.e., First Play Title)>

TitleSet element may contain a FirstPlayTitle element. FirstPlayTitle element describes the First Play Title.

First Play Title is a special Title:

(a) First Play Title shall be played before the Title 1 playback if presented.

(b) First Play Title consists of only one or more Primary Audio Video and/or Substitute Audio Video.

(c) First Play Title is played from the start to the end of Title Timeline in normal speed only.

(d) Only Video Track number 1 and Audio Track number 1 is played during the First Play Title.

(e) Playlist Application Associated Resource may be loaded during the First Play Title.

In FirstPlayTitle element the following restrictions shall be satisfied:

- FirstPlayTitle element contains only PrimaryAudioVideoClip and/or SubstituteAudioVideoClip elements.
- Data Source of SubstituteAudioVideoClip element shall be File Cache, or Persistent Storage.
- Only Video Track number and Audio Track number may be assigned, and Video Track number and Audio Track number shall be '1'. Subtitle, Sub Video and Sub Audio Track number shall not assigned in First Play Title.
- No title Number, parental Level, type, tick Base Divisor, selectable, display Name, on End and description attributes.

First Play Title may be used for the loading period of the Playlist Application Associated Resource. During the First Play Title playback, the Playlist Application Associated Resource may be loaded from P-EVOB in Primary Audio Video as multiplexed data if the multiplexed flag in the PlaylistApplicationResource element is set.

More intelligible explanations will be provided below.

In this embodiment, first play title element information FPTELE exists in a title set element (title information TTINFO). That is, configuration information CONFGI, media attribute information MDATRI and title information TTINFO exist in a play title PLLST as shown in (a) of FIG. 74A, and the first play title element information FPTELE is arranged at a first position in the title information TTINFO as shown in (b) of FIG. 74A. Management information concerning a first play title FRPLTT is written in the first play title element information FPTELE. Moreover, as shown in FIG. 17, the first play title FRPLTT is regarded as a special title. In this embodiment, the first play title element information FPTELE has the following characteristics.

- When the first play title FRPLTT exists, the first play title FRPLTT must be played back before playback of a title #1. That is, prior to playback of the title #1, playing back the first play title FRPLTT at the start assures a time to download a playlist application resource PLAPRS.
- The first play title FRPLTT must be constituted of one or more pieces of primary audio video PRMAV and subtitle audio video (or either one of these types of video). Restricting types of playback/display objects constituting the first play title FRPLTT in this manner facilitates loading processing of an advanced pack ADV_PCK multiplexed in the first play title FRPLTT.
- The first play title FRPLTT must be kept being played back from a start position to an end portion on a title timeline TMLE at a regular playback speed. When all of the first play title FRPLTT is played back at a standard speed, a download time of a playlist application resource PLAPRS can be assured, and a playback start time of a playlist associated advanced application PLAPL in another title can be shortened.
- In playback of the first play title FRPLTT, a video track number 1 and an audio track number 1 alone can be played back. Restring the number of video tracks and the number of audio tracks in this manner can facilitate download from an advanced pack ADV_PCK in primary enhanced video object data P-EVOB constituting the first play title FRPLTT.
- A playlist application resource PLAPRS can be loaded during playback of the first play title FRPLTT.

Additionally, in this embodiment, the following restrictions must be satisfied with respect to the first play title element information FPTELE.

- The first play title element information FPTELE includes a primary audio video clip element PRAVCP or a substitute audio video clip element SBAVCP alone.
- A data source DTSORC defined by the substitute audio video clip element SBAVCP is stored in the file cache FLCCH or the persistent storage PRSTR.
- A video track number and an audio track number alone can be set, and both the video track number and the audio track number ADTKNM must be set to "1". Further, a subtitle, sub video and sub audio track numbers must not be set in the first play title FRPLTT.
- Title number information TTNUM shown in (b) of FIG. 24A, parenta level information (parentaLevel attribute information), title type information TTTYPE, a damping ratio TICKDB of a processing clock with respect to an application tick clock in the advanced application manager, a selection attribute: a user operation response enabled/disabled attribute (selectable attribute information), title name information displayed by the information playback apparatus, number information (on End attribute information) of a title which should be displayed after end of this title, and attribute information concerning the title (description attribute information) are not written in the first play title element information FPTELE.

A playback period of the first play title FRPLTT can be used as a loading period LOADPE of a playlist application resource PLAPRS. When multiplexed attribute information MLTPLX in a playlist application resource element PLRELE shown in (d) of FIG. 69B is set to "true", a multiplexed advanced pack ADV_PCK can be extracted from primary enhanced video object data P-EVOB in primary audio video PRMAV and loaded into the file cache FLCCH as a playlist application resource PLAPRS as shown in (d) of FIG. 73A.

<FirstPlayTitle (First Play Title) Element>

The FirstPlayTitle element describes information of a First Play Title for Advanced Contents, which consists of Object Mapping Information and Track Number Assignment for elementary stream.

XML Syntax Representation of FirstPlayTitle Element:

```
<FirstPlayTitle
titleDuration = timeExpression
alternativeSDDisplayMode = (panscanOrLetterbox
| panscan | letterbox)
xml:base = anyURI
>
    (PrimaryAudioVideoClip |
    SubstituteAudioVideoClip) *
</FirstPlayTitle>
```

The content of FirstPlayTitle element consists of list of Presentation Clip element. Presentation Clip elements are PrimaryAudioVideoClip and SubstituteAudioVideoClip.

Presentation Clip elements in FirstPlayTitle element describe the Object Mapping Information in the First Play Title.

The dataSource of SubstituteAudioVideoClip element in First Play Title shall be either File Cache, or Persistent Storage.

Presentation Clip elements also describe Track Number Assignment for elementary stream. In First Play Title, only Video Track and Audio Track number are assigned, and Video Track number and Audio Track number shall be '1'. Other Track Number Assignment such as Subtitle, Sub Video and Sub Audio shall not be assigned.

(a) titleDuration Attribute

Describes the duration of the Title Timeline. The attribute value shall be described by timeExpression. The end time of all Presentation Object shall be less than the duration time of Title Timeline.

(b) alternativeSDDisplayMode Attribute

Describes the permitted display modes on 4:3 monitor in the First Play Title playback. 'panscanOrLetterbox' allows both Pan-scan and Letterbox, 'panscan' allows only Pan-scan, and 'letterbox' allows only Letterbox for 4:3 monitor. Player shall output into 4:3 monitor forcedly in allowed display modes. This attribute can be omitted. The default value is 'panscanOrLetterbox'.

(c) xml:Base Attribute

Describes the base URI in this element. The semantics of xml:base shall follow to XML-BASE.

More intelligible explanations will be provided below.

Management information of the first play title FRPLTT with respect to advanced contents ADVCT is written in first playtitle element information FPTELE whose detailed configuration is shown in (c) of FIG. 74B. Further, object mapping information OBMAPI and track number settings (track number assignment information) with respect to an elementary stream are also configured in the first play title element information FPTELE. That is, as shown in (c) of FIG. 74B, a primary audio video clip element PRAVCP and a substitute audio video clip element SBAVCP can be written in the first playtitle element information FPTELE. Written contents of the primary audio video clip element PRAVCP and the substitute audio video clip element SBAVCP constitute a part of the object mapping information OBMAPI (including the track number assignment information). In this manner, contents of the first play title element information FPTELE are constituted of a list of display/playback clip elements (a list of primary audio video clip elements PRAVCP and substitute audio video clip elements SBAVCP). Furthermore, a data source DTSORC used in a substitute audio video clip element SBAVCP in the first play title FRPLTT must be stored in either the file cache FLCCH or the persistent storage PRSTR. A playback/display clip element formed of a primary audio video clip element PRAVCP or a substitute audio video clip element SBAVCP describes track number assignment information (track number setting information) of an elementary stream. In (c) of FIG. 74B, time length information TTDUR (titleDuration attribute information) of an entire title on a title timeline is written in a format "HH:MM:SS:FF". Although an end time of a playback/display object displayed in the first play title FRPLTT is defined by an end time TTEDTM (titleTimeEnd attribute information) on the title timeline in a primary audio video clip element PRAVCP as shown in (c) of FIG. 54B and an end time TTEDTM (titleTimeEnd attribute information) on the title timeline in a substitute audio video clip element SBAVCP as shown in (c) of FIG. 55B, a value of the end time TTEDTM on all the title timelines must be set by a value smaller than a value set in the time length information TTDUR (titleDuration attribute information) of an entire title on the title timeline. As a result, each playback/display object can be consistently displayed in the first play title FRPLTT. Allowable display mode information SDDISP (alternative SDDisplay Mode attribute information) on a 4:3 TV monitor will now be described. The allowable display mode information on the 4:3 TV monitor represents a display mode which is allowed at the time of display in the 4:3 TV monitor in playback of the first play title FRPLTT. When a value of this information is set to "Panscan Or Letterbox", both a panscan mode and a letterbox mode are allowed at the time of display in the 4:3 TV monitor. Moreover, when a value of this information is set to "Panscan", the panscan mode alone is allowed at the time of display in the 4:3 TV monitor. Additionally, when "Letterbox" is specified as this value, display in the letterbox mode alone is allowed at the time of display in the 4:3 TV monitor. The information recording and playback apparatus 1 must forcibly perform screen output to the 4:3 TV monitor in accordance with the set allowable display mode. In this embodiment, a description of this attribute information can be eliminated, but "Panscan Or Letterbox" as a default value is automatically set in such a case. Further, a storage position FPTXML (xml: base attribute information) of a main (basic) resource used in the first play title element is written in the form of a URI (a uniform resource identifier) in the first play title element information FPTELE.

As shown in (a) of FIG. 75A, configuration information CONFGI, media attribute information MDATRI and title information TTINFO exist in a playlist PLLST. As shown in (b) of FIG. 75A, the title information TTINFO is constituted of a list of first play title element information FPTELE, one or more pieces of title element information TTELEM and playlist application element information PLAELE. Furthermore, as shown in (c) of FIG. 75A, object mapping information OBMAPI (including track number assignment information), resource information RESRCI, playback sequence information PLSQI, track navigation information TRNAVI and scheduled control information SCHECI are written as a data configuration in the title element information TTELEM. The scheduled control information SCHECI shown in (c) of FIG. 75A will now be described.

<ScheduledControlList (Scheduled Control List) Element and Scheduled Control>

ScheduledControlList element describes following Scheduled Control in Title playback:

Scheduled Pause of Title Timeline at the specified time

Event Firing for Advanced Application at the specified time

The positions of PauseAt and Event elements in a Title Timeline described in a ScheduledControlList element shall be monotonically increased according to the document order in ScheduledControlList element.

The positions shall not be same to others in a ScheduledControlList element.

Note: Even though event firing is scheduled, Advanced Application may handle the event after the described time, because the script execution time is not guaranteed.

More intelligible explanations will be provided below.

The scheduled control information SCHECI is constituted of a scheduled control list element. Management information about the following scheduled control at the time of playback of a title is written in the scheduled control list element.

Scheduled pause at a specified time on a title timeline TMLE (pause processing)

Figure 75B:
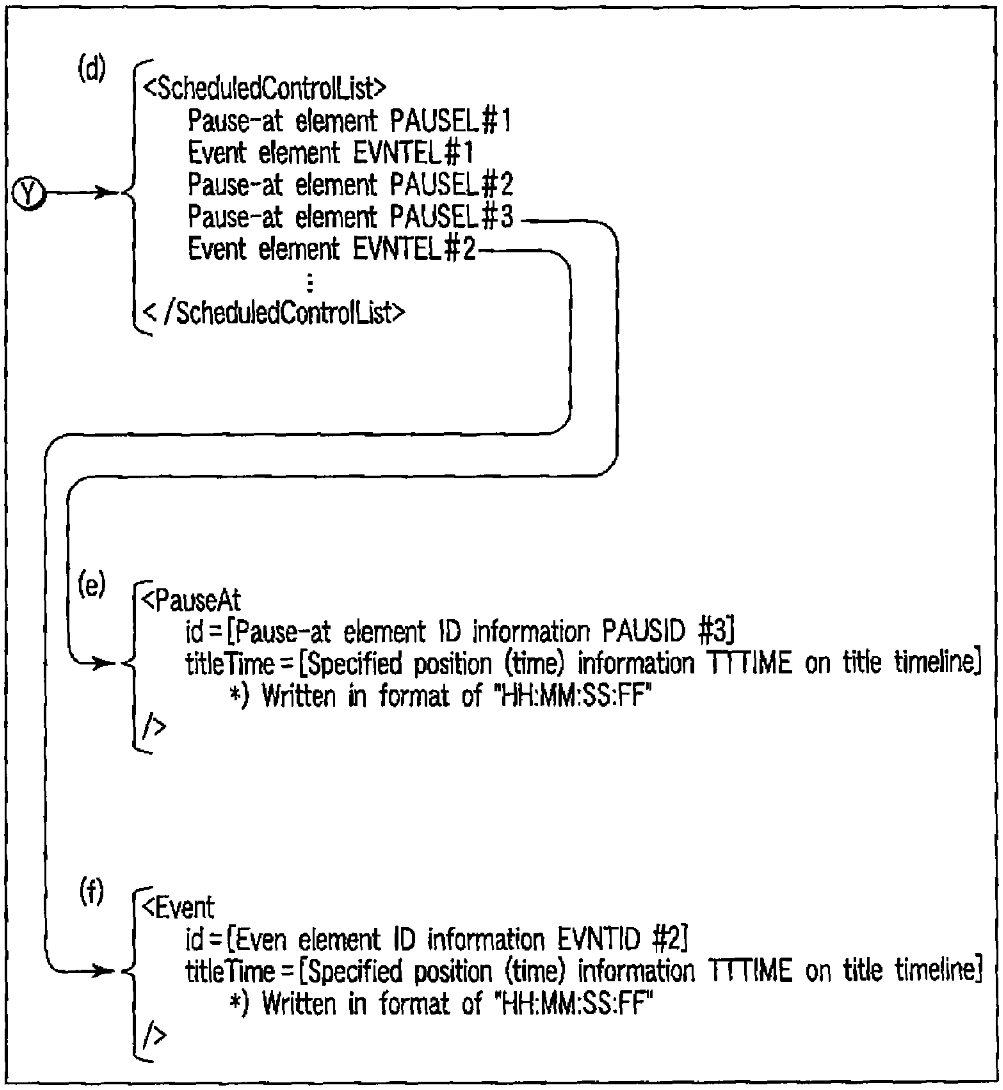

Event execution processing for an advanced application ADAPL at a specified time The scheduled control information SCHECI constituted of the scheduled control list element is formed of a list of a pause-at element PAUSEL and an event element EVNTEL as shown in (d) of FIG. 75B. The pause-at element PAUSEL and the even element EVNTEL which are written in the scheduled control list element and subjected to time setting based on the title timeline TMLE are sequentially arranged from a leading position (a front position) in the scheduled control list element in accordance with an order along progress of specified position (time) information TTTIME on the title timeline specified by each pause-at element PAUSEL and each event element EVNTEL. That is, a value of the specified position (time) information TTTIME on the title timeline specified by each of the pause-at element PAUSEL and the event element EVNTEL which are sequentially written from the front position in the scheduled control list element is indicative of a sequential increase in elapsed time according to the arrangement order. When the pause-at element PAUSEL and the event element EVNTEL are sequentially arranged in line with time progress on the title timeline TMLE in the scheduled control list element in this manner, the playlist manager PLMNG in the navigation manager NVMNG shown in FIG. 28 can perform execution processing in line with time progress on the title timeline TMLE by just effecting execution processing in the arrangement order of the respective elements written in the schedule control list element. As a result, schedule management processing by the playlist manager PLMNG can be extremely facilitated. Different pieces of specified position (time) information TTTIME on the title timeline specified by different pause-at elements PAUSEL or different even elements EVNTEL in the scheduled control list element must not overlap each other. Moreover, the specified position (time) information TTTIME on the title timeline specified by the pause-at element PAUSEL and the specified position (time) information TTTIME on the title timeline specified by the even element EVNTEL must not overlap each other. That is because, when a value of the specified position (time) information TTTIME on the title timeline specified by a pause-at element PAUSEL #1 matches with a value of the specified position (time) information TTTIME on the title timeline specified by the even element EVNTEL #1 in a description example shown in (d) of FIG. 75B, for instance, the playlist manager PLMNG shown in FIG. 28 cannot decide which one of pause-at (pause) processing and event execution processing for an advanced application ADAPL should be selected, and processing of the playlist manager PLMNG fails.

In this embodiment, there is a case where a script SCRPT is activated to perform complicated processing during execution (during playback) of an advanced application ADAPL. For example, when a user instructs execution of an advanced application ADAPL, it is possible to set a delay time of the script SCRPT in such a manner that actual execution is started only after a specific time has elapsed. Therefore, the advanced application ADAPL may start execution of an event at a time behind a time set in the specified position (time) information TTTIME on the title timeline in the event element EVNTEL.

<ScheduledControlList (Scheduled Control List) Element>

ScheduledControlList element describes the Scheduled Control Information for the Title. Scheduled Control Information defines the scheduled pauses and event firings of the Title playback.

XML Syntax Representation of ScheduledControlList Element:

```
<ScheduledControlList>
(PauseAt | Event)+
</ScheduledControlList>
```

The ScheduledControlList element consists of a list of PauseAt and/or Event element. PauseAt element describes the time of the pause in the Title playback. Event element describes the event firing time in the Title playback.

More intelligible explanations will be provided below.

The scheduled control information SCHECI defines timings of scheduled pause processing and event execution in playback of a title. Additionally, a scheduled control list element in which contents of the scheduled control information SCHECI are written is formed of a list of paused-at elements PAUSEL or event elements EVNTEL. A time of pause processing in playback of a title is written in the pause-at element PAUSE, and an event execution start time in playback of a title is written in the even element EVNTEL.

<PauseAt (Pause-At) Element>

PauseAt element describes the pause position in a Title playback.

XML Syntax Representation of PauseAt Element:

```
<PauseAt
id = ID
titleTime = timeExpression
/>
```

PauseAt element shall have a title Time attribute. A timeExpression value of titleTime attribute describes a scheduled pause position of the Title Timeline.

titleTime Attribute

Describes the pause position on Title Timeline. The value shall be described in timeExpression value defined in Datatypes. If the pause position is in some valid period of the synchronized Presentation Clip element for P-EVOB, or S-EVOB, the pause position shall be the corresponding value of the presentation start time (PTS) of Coded-Frame of the video streams in P-EVOB (S-EVOB).

More intelligible explanations will be provided below.

A data configuration in the pause-at element PAUSEL is shown in (e) of FIG. 75B. pause-at element ID information PAUSID (id attribute information) exists in the pause-at element PAUSEL, and specification of the pause-at element PAUSEL by an API command can be facilitated as shown in FIG. 82. Further, the pause-at element PAUSEL includes specified position (time) information TTTIME (titleTime attribute information) on a title timeline. The specified position (time) information TTTIME (titleTime attribute information) on the title timeline is indicative of a pause processing position on the title timeline. A value of this information is written in a format of "HH:MM:SS:FF" (hours:minutes: seconds:frame number (a count value)). According to this embodiment, in a playback/display object belonging to a primary video set PRMVS and a secondary video set SCDVS, as shown in FIG. 53, a timing of a start time TTSTTM (titleTimeBegin) on a title timeline matches with a timing of a start position VBSTTM (clipTimeBegin) on enhanced video object data EVOB in a corresponding clip element. Therefore, there can be derived a relationship (a correspondence) between a time on a title timeline and a presentation start time (a presentation time stamp value) PTS set on a video stream in primary enhanced video object data P-EVOB or secondary enhanced video object data S-EVOB based on the above-described information. As a result, when a pause position specified by specified position (time) information TTTIME (titleTime) on a title timeline specified in (e) of FIG. 75B is specified in a valid period VALPRD of the playback/display object (the enhanced video object EVOB), the pause position is associated with a corresponding value of the presentation start time (the presentation time stamp value) PTS on a video stream in the primary enhanced video object data P-EVOB (or the secondary enhanced video object data S-EVOB). The playlist manager PLMNG of the navigation manager NVMNG shown in FIG. 28 utilizes the above-described relationship to convert a value of the specified position (time) information TTTIME (titleTime attribute information) on the title timeline in the pause-at element PAUSEL into a value of the presentation start time (the presentation time stamp value), and the playlist manager PLMNG can transfer the converted result to the presentation engine PRSEN shown in FIG. 30. The decoder engine DCDEN shown in FIG. 30 can execute decoding processing using the presentation start time (the presentation time stamp value) PTS, thereby facilitating correspondent processing of the decoder engine DCDEN.

<Event Element>

Event element describes the event firing position in a Title playback.

XML Syntax Representation of Event Element:

```
<Event
id = ID
titleTime = timeExpression
/>
```

Event element shall have a title Time attribute. The Timecode of titleTime attribute describes a event firing position of Title Timeline.

Note: Advanced Application may handle the event after the described time, because the script execution time is not guaranteed.

(a) titleTime Attribute

Describes the time on Title Timeline, at which Playlist Manager fires the Playlist Manager Event. The value shall be described in timeExpression value.

More intelligible explanations will be provided below.

A data configuration in an event element EVNTEL shown in (f) of FIG. 75B will now be described. In case of an event element EVNTEL, an event element ID information EVNTID (id attribute information) is likewise first written in an event element EVNTEL tag, and making reference to the event element EVNTEL based on an API command is facilitated as shown in FIG. 82. Specified position (time) information TTTIME (titleTime attribute information) on a title timeline in the event element EVNTEL is indicative of a time on the title timeline TMLE when the playlist manager PLMNG in the navigation manager NVMNG shown in FIG. 28 executes a playlist manager even (Describes the time on Title Timeline, at which PlaylistManager fires the PlaylistManagerEvent). This value is set in a format of "HH:MM:SS:FF" (hours:minutes:seconds:frame number).

Figure 76A:
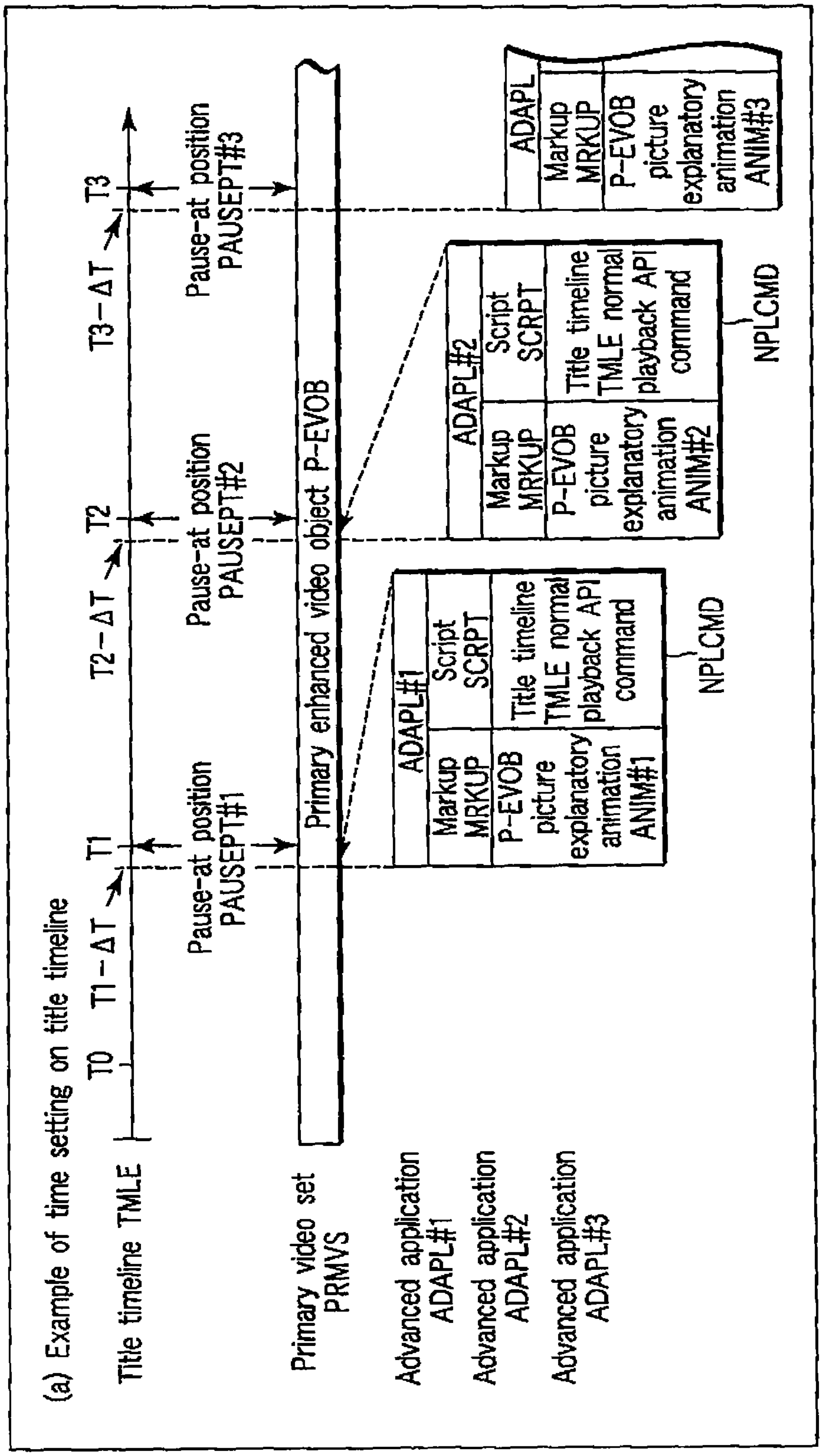

A function and a use example of the pause-at element PAUSEL having the data configuration shown in (e) of FIG. 75B will now be described with reference to FIGS. 76A and 76B. In this embodiment, in a case where scheduled control information SCHECI shown in (d) of FIG. 75B does not exist, when time progress on the title timeline TMLE with respect to a playback/display object such as primary enhanced video object data P-EVOB which is displayed for a user is tried to be stopped, a lag time is produced in API command processing even though pausing is tried by using an API command, and specifying an accurate pause position in frames (fields) is difficult. On the contrary, in this embodiment, setting the scheduled control information SCHECI and also setting the pause-at element PAUSEL can specify an accurate pause position in fields (frames) of a moving image. Furthermore, generally, it is often the case that a tick clock (a page clock or an application clock) is used with respect to a display timing of an advanced subtitle ADSBT, an advanced application ADAPL, a playlist associated advanced application PLAPL or a title associated advanced application TTAPL. In this case, since the tick clock works independently from a media clock corresponding to progress on the title timeline TMLE, there is a problem that a pause indication for the time timeline TMLE is hard to be set from the application. On the other hand, setting the pause-at element PAUSEL in the scheduled control information SCHECI can achieve synchronization between a display timing of the application and that of the title timeline. A use example in which the pause-at element is utilized is shown in (a) of FIG. 76A. For example, a consideration will be given on a case where main video MANVD in a primary video set PRMVS is displayed in a screen as a main title 31 at a time "T0" on the title timeline TMLE in (a) of FIG. 76A as depicted in (b) of FIG. 76B. There is a case that a content provider pauses (sets a still image state) display of a main title 31 in a specific frame (a specific field) in the main title 31 and uses animation to give an explanation of the paused screen. In this case, the main title 31 is paused to provide a still image state at a time "T1" on a title timeline TMLE, descriptive animation ANIM #1 is simultaneously displayed as shown in (c) of FIG. 76B, and the picture descriptive animation ANIM #1 is allowed to give an explanation of frame contents of still main video MANVD while maintaining the still image state of the main title 31. Further, as shown in (a) of FIG. 76A, at times "T2" and "T3", the main title 31 can be likewise temporarily stopped (a still image state is provided), and moving image descriptive animation ANIM #2 and #3 can be operated to give an explanation by voice. As a mapping method on the title timeline TMLE which enables such an operation, a method shown in (a) of FIG. 76A can be adopted. That is, a screen of a primary video set PRMVS is displayed by using primary enhanced video object data P-EVOB in accordance with progress of the title timeline TMLE, an advanced application ADAPL is activated (started to be executed) at a time "T1-ΔT" which is slightly ahead of the time "T1" on the title timeline TMLE, and the picture descriptive animation ANIM #1 of the primary enhanced video object data P-EVOB is displayed by using markup MRKUP in the advanced application ADAPL #1.

When playback/display of the picture descriptive animation ANIM #1 is completed, a script SCRPT starts to operate, thereby issuing an API command NPLCMD which switches time progress on the title timeline TMLE from pausing to normal playback. As a result, time progress on the title timeline TMLE returns to normal playback so that time progress (count-up) is restarted as usual. Furthermore, likewise, an advanced application ADAPL #2 is activated (started to be executed) at a time "T2-ΔTt". The script SCRPT starts to operate immediately after completion of playback/display of the picture descriptive animation ANIN #2, and the API command NPLCMD which allows normal playback on the title timeline TMLE is issued to restart time progress on the title timeline TMLE.

Figure 77A:
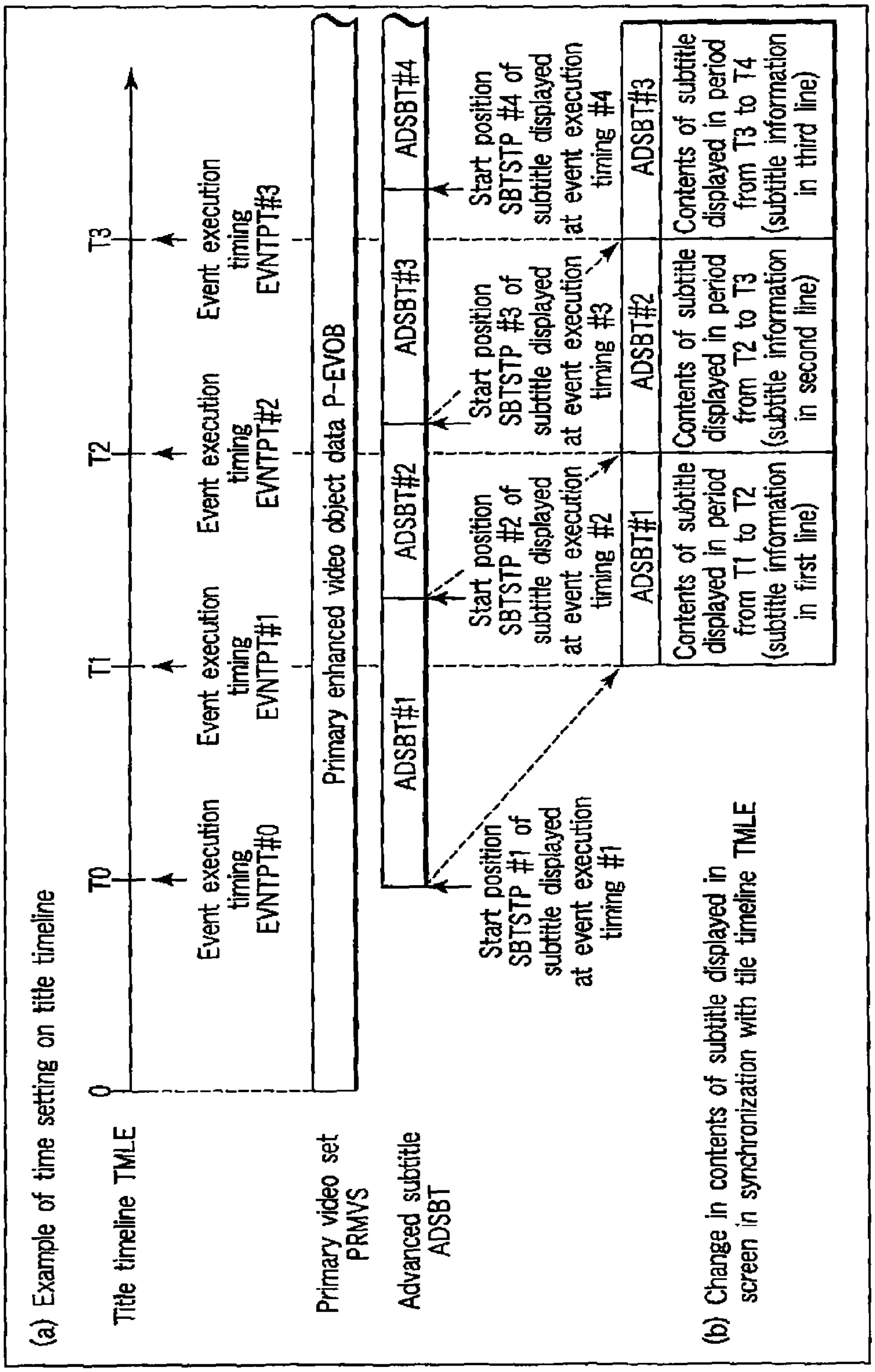

FIGS. 77A and 77B show characteristics of a function and specific use example of the event element EVNTEL having a configuration depicted in (f) of FIG. 75B. Like characteristics of the pause-at element function shown in (d) of FIG. 76B, basic characteristics of the event element EVNTEL lie in that a tick clock which drives various kinds of applications by event elements EVNTEL in scheduled control information SCHECI is synchronized with a title timeline TMLE and that an event start time can be set with an accuracy in frames (fields) of a moving image as a countermeasure for timing deviance due to delay in API command processing. In this embodiment, as shown in FIG. 16, an explanatory title or telop characters 39 can be displayed by using an advanced subtitle ADSBT. As a method of displaying the superimposed title or telop characters 39 by using the advanced subtitle ADSBT, markup MRKUPS of the advanced subtitle can be used for expression. However, as another application example, when using an event element EVNTEL shown in FIGS. 77A and 77B can perform further flexible display of an superimposed title. A mapping method on the title timeline TMLE when displaying a specific superimposed title is shown in (a) of FIG. 77A. An advanced subtitle ADSBT is arranged in line with display progress on the title timeline TMLE of primary enhanced video object data P-EVOB which displays a primary video set PRMVS, and display of the advanced subtitle ADSBT is started (switched) in accordance with each event execution timing EVNTPT. That is, an advanced subtitle ADSBT #1 is displayed as a superimposed title in a period from a time "T1" to a time "T2" on the title timeline TMLE, and then an advanced subtitle ADSBT #2 is displayed as a superimposed title in a period from the time "T2" to a time "T3" on the title timeline TMLE. A data configuration in a font file FONTS of an advanced subtitle in this embodiment is shown in (c) of FIG. 77B. Advanced subtitle general information SBT_GI exists at a top position in the file, and font file ID information FTFLID, language attribute information FTLANG of a font and subtitle line number information FTLN_Ns are recorded in this information. A start address FTLN_SA of each subtitle information is written in the form of a relative byte number and a data size FTLN_SZ of each subtitle information is written in the form of a byte number in each subtitle search pointer FT_SRPT. Moreover, subtitle information FTLNDT for each line is written in the subtitle information FONTDT.

Figure 78:
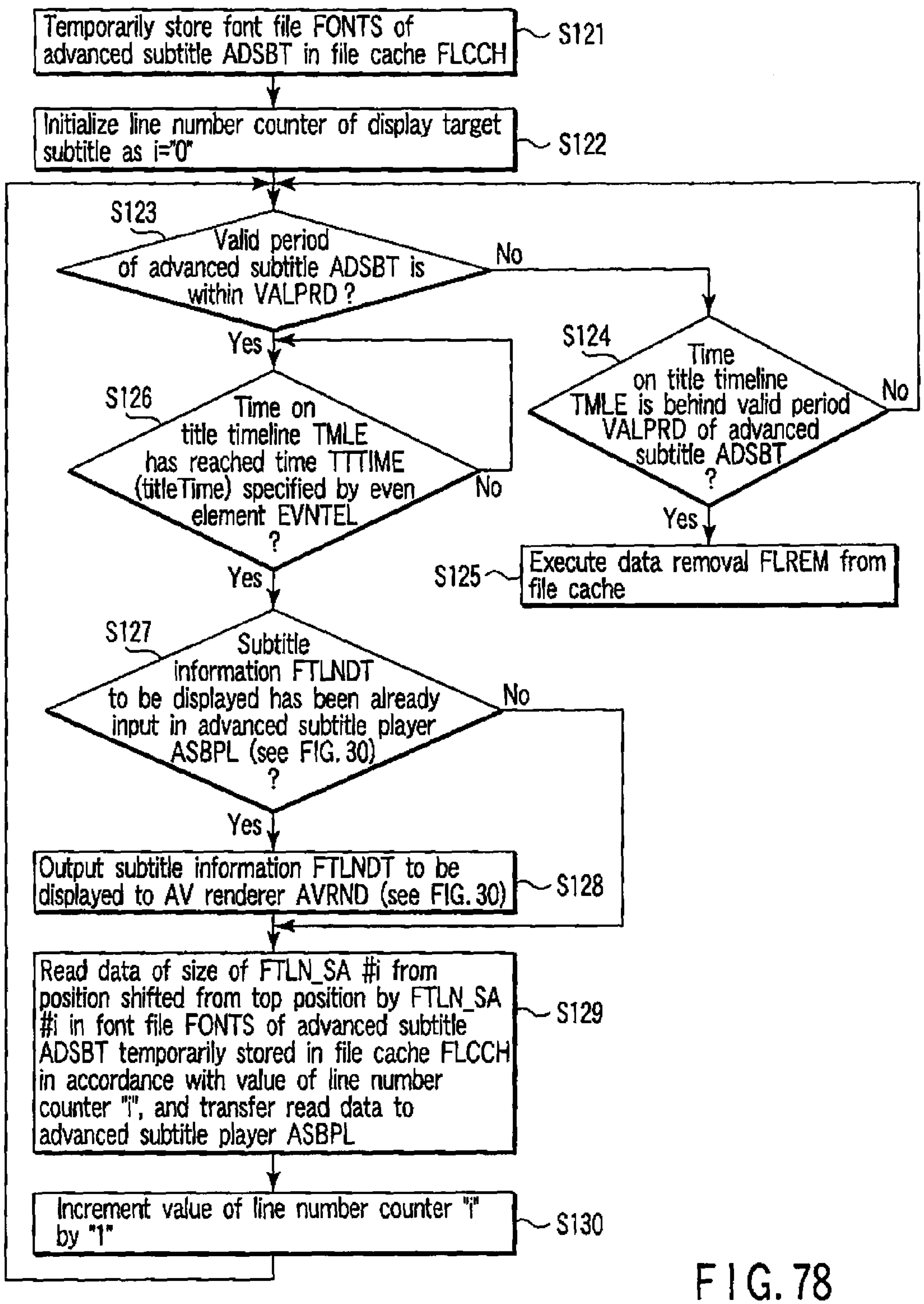
FIG. 78 is an exemplary view showing a method of displaying an advanced subtitle in synchronization with a title timeline based on the example of FIGS. 77A and 77B.

FIG. 78 shows a flowchart illustrating a method of displaying the advanced subtitle ADSBT in synchronization with the title timeline TMLE based on the example depicted in FIGS. 77A and 77B. The flowchart is processed in the playlist manager PLMNG (see FIG. 28). First, a font file FONT of the advanced subtitle ADSBT is temporarily stored in the file cache FLCCH (step S121). Then, a line number counter of a display target subtitle is initialized as i="0" (step S122). Subsequently, whether a time on the title timeline TMLE exists in a valid period VALPRD of the advanced subtitle ADSBT is judged (step S123). When the time on the title timeline TMLE exists in the valid period VALPRD of the advanced subtitle ADSBT, whether the time on the title timeline TMLE has reached a time TTTIME (titleTime) specified by the event element EVNTEL is judged (step S126). If the time on the title timeline TMLE has not reached the time TTTIME (titleTime) specified by the event element EVNTEL, the control waits until the time reaches the specified time. Additionally, when the time on the title timeline TMLE has reached the time TTTIME (titleTime) specified by the event element EVNTEL, whether subtitle information FTLNDT which should be displayed has been input to the advanced subtitle player ASBPL (see FIG. 30) is judged (step S127). If it is not input, the control jumps to step S129. Further, if it has been input, the subtitle information FTLNDT to be displayed is output to an AV renderer AVRND (see FIG. 30) (step S128). Then, data of a size of FTLN_SA #i is read from a position shifted by FTLA_SA #i from a top position in the font file FONTS of the advanced subtitle temporarily stored in the file cache FLCCH in accordance with a value of the line number counter "i", and the read data is transferred to the advanced subtitle player ASBPL (step S129). Subsequently, the value of the line number counter "i" is incremented by "1" (step S130). Then, the control returns to the step S123. When the time on the title timeline TMLE is out of the valid period VALPRD of the advanced subtitle ADSBT at the step S123, whether the time on the title timeline TMLE is behind the valid period VALPRD of the advanced subtitle ADSBT is judged (step S124). If it is not behind, the control returns to the step S123. If it is behind, data removal FLCREM is executed from the file cache (step S125).

Figure 79A:
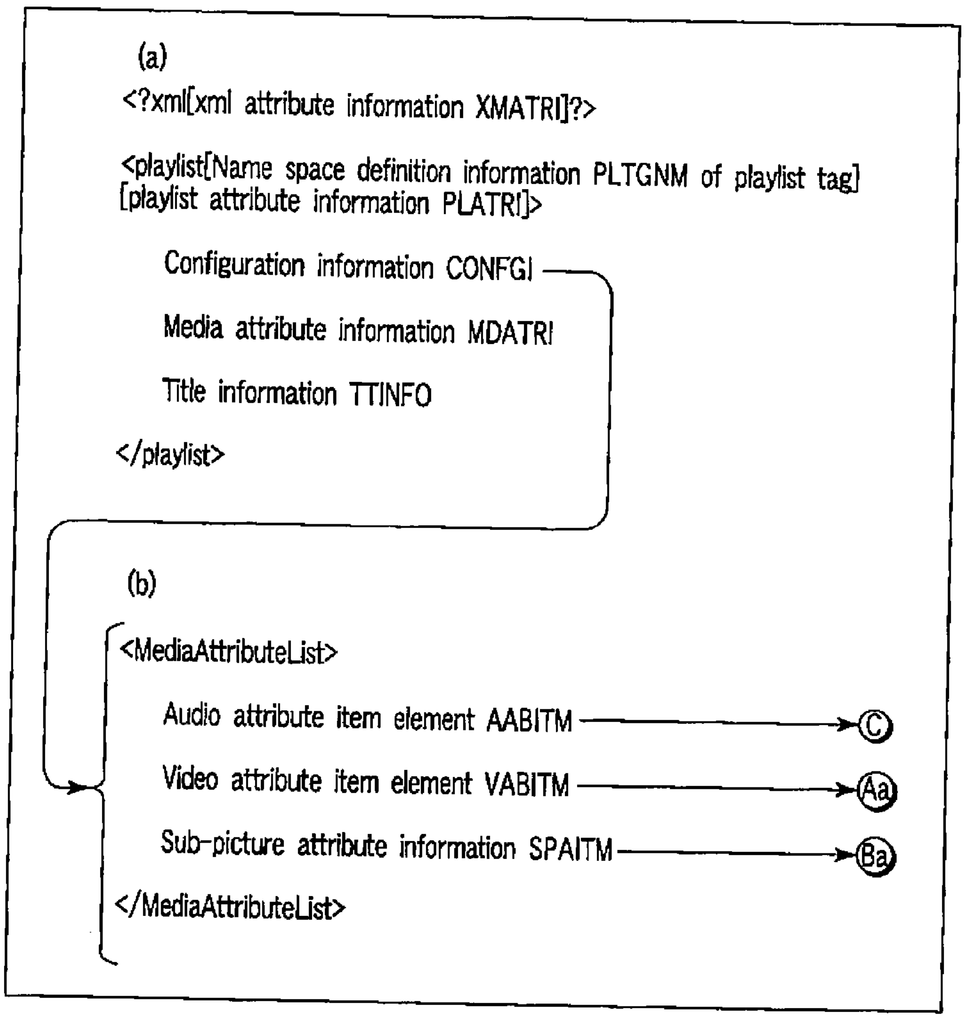

As shown in (a) of FIG. 79A, configuration information CONFGI, media attribute information MDATRI and title information TTINFO are written in a playlist PLLST. An audio attribute item element AABITM indicative of an attribute of audio data, an video attribute item element VABITM indicative of attribute information of video data and a sub-picture attribute item element SPAITM indicative of an attribute of sub-picture data can be recorded in the media attribute information MDATRI shown in (a) of FIG. 79A. Although each item element is written in attribute information of each data in a drawing shown in (b) of FIG. 79A, the present embodiment is not restricted thereto, and a plurality of attribute item elements are written in accordance with different attribute information of each playback/display object specified in a playlist PLLST. As shown in (c) to (g) of FIG. 59C, when each attribute item element in media attribute information MDATRI shown in (a) of FIG. 79A is specified with respect to attribute information concerning a main video element MANVD, a main audio element MANAD, a subtitle element SBTELE, a sub video element SUBVD and a sub audio element SUBAD, each attribute information can be shared. When respective pieces of attribute information of various playback/display objects defined in the playlist PLLST are collectively written in the media attribute information MDATRI and information in the media attribute information MDATRI is referred (specified) from object mapping information OBMAPI in title information TTINFO, an overlapping description concerning common media attribute information in the object mapping information OBMAPI (including track number assignment information) in the title information TTINFO can be avoided. As a result, it is possible to reduce an amount of written data of the object mapping information OBMAPI and a total information amount written in the playlist PLLST. Consequently, processing of the playlist manager PLMNG (see FIG. 28) can be also simplified.

<MediaAttribute (Media Attribute) Element and Media Attribute Information>

MediaAttributeList element in Title element contains a list of element, called by Media Attribute element.

Media Attribute element describes Media Attribute Information for elementary streams. The mandatory attribute is 'codec', other attributes are optional. If the Media Attribute value is described, the media attribute value shall be same with the corresponding value in EVOB_VTS_ATR, or EVOB_ATR.

Media Attribute element is referred by Track Number Assignment elements by mediaAttr attribute. Media Attribute element has a Media Attribute index described by index attribute. The Media Attribute index should be unique for each type of media attribute in the Media Attribute List element. It means, for example, AudioAttributeltem and VideoAttributeltem can have a same media attribute index, especially for 1. The mediaAttr attribute can be omitted. Default value is '1'.

More intelligible explanations will be provided below.

The media attribute information MDATRI is constituted of a list of respective elements called attribute item elements. The media attribute item element belongs to one of an audio attribute item element AABITM indicative of attribute information of audio data, a video attribute item element VABITM indicative of attribute information of video data, and a sub-picture attribute item element SPAITM indicative of attribute information of a sub-picture. Further, it can be said that each media attribute item element represents media attribute information MDATRI concerning each elementary stream constituting enhanced video object data EVOB. The attribute information which must be written in the media attribute item element is data code information or compression code information, and a description of other attribute information can be eliminated in the media attribute item element. Information of EVOB_VTS_ATR or EVOB_ATR is written in the enhanced video object information EVOBI shown in FIG. 12 or an attribute information recording region in a time map STMAP of a secondary video set. A value of each attribute information in the media attribute item element must match with information contents set in EVOB_VTS_ATR or EVOB_ATR. As a result, a relationship between the media attribute information MDATRI in the playlist PLLST, the media attribute information MDATRI written in the enhanced video object information EVOBI and the media attribute information MDATRI written in the time map STMAP of the secondary video set can have integrity, thereby assuring stableness of playback/control processing in the presentation engine PRSEN in the advanced content playback unit ADVPL shown in FIG. 14. As described above, respective media attribute item elements shown in (c) to (e) in FIG. 79B are referred (specified) from the main video element MANVD, the main audio element MANAD, the subtitle element SBTELE, the sub video element SUBVD and sub audio element SUBAD in the track number assignment information (the track number setting information). The referring (specifying) method will now be described. As shown in (c) to (e) of FIG. 79B, media index number information INDEX (index attribute information) exists in every media item elements, i.e., the audio attribute item element AABITM, the video attribute item element VABITEM and the sub-picture attribute item element SPAIPM. Further, as shown in (c) to (g) of FIG. 59C, a description section for a corresponding media attribute element index number MDATNM (mediaAttr attribute information) in media attribute information equally exists in the main video element MANVD, the main audio element MANAD, the subtitle element SBTELE, the sub video element SUBVD and the sub audio element SUBAD in the track number assignment information (object mapping information OBMAPI). The index number MDATNM (mediaAttr attribute information) of a corresponding medial attribute element in the media attribute information is used to specify media index number information INDEX (index attribute information) shown in (c) to (e) of FIG. 79B to make reference to a corresponding media attribute item element. As conditions to guarantee the association, the media index number information INDEX (a value of the index attribute information) must be set uniquely (without overlapping) in accordance with each of types of different media attributes (each type, i.e., an audio attribute, a video attribute or a sub-picture attribute) in the media attribute information MDATRI (a media attribute list element). In this embodiment, the media index number information INDEX (a value of the index attribute information) in the audio attribute item element AABITM and the media index number information INDEX (a value of the index attribute information) in the video attribute item element VABITM can be equally set to the same value "1". Furthermore, a description of the media index number information INDEX (index attribute information) can be eliminated in each media attribute item element. In this case, "1" as a default value is automatically set.

<AudioAttributeltem (Audio Attribute Item) Element>

AudioAttributeltem element describes an attribute of Main and Sub Audio stream. The attribute value shall be same with the corresponding value in EVOB_VTS_ATR, or EVOB_ATR.

XML Syntax Representation of AudioAttributeItem Element:

```
<AudioAttributeItem
index = positiveInteger
codec = string
sampleRate = positiveInteger
sampleDepth = positiveInteger
channels = positiveInteger
bitrate = positiveInteger
/>
```

(a) Index Attribute

Describes the Media Index for the attribute.

(b) Codec Attribute

Describes codec. The value shall be LPCM, DD+, DTS-HD, MLP, MPEG, or AC-3. AC-3 may be described only for Interoperable Content.

(c) sampleRate Attribute

Describes sample rate. It is expressed as the number of kilohertz. This attribute can be omitted.

(d) sampleDepth Attribute

Describes sample depth. This attribute can be omitted.

(e) Channels Attribute

Describes number of audio channels in positive number. It shall be same value described in EVOB_AMST_ATRT. The "0.1 ch" is defined as "1 ch". (e.g. In case of 5.1 ch, enter '6' (6 ch).) This attribute can be omitted.

(f) Bitrate Attribute

Describes bit rate. It is expressed as the number of kilobits per second. This attribute can be omitted.

More intelligible explanations will be provided below.

A data configuration in the audio attribute item element AABITM shown in (c) of FIG. 79B will now be described. The audio attribute item element AABITM is written about attribute information concerning a main audio stream MANAD and sub audio stream SUBAD. As described above, contents set in EVOB_VTS_ATR or EVOB_ATR must match with a value of each attribute information written in the audio attribute item element AABITM. As described above, the media index number information INDEX (index attribute information) is referred by the main audio element MANAD and the sub audio element SUBAD as shown in (d) and (g) of FIG. 59C. Then, as a value of audio compression code information ADCDC (codex), "LPCM (linear PCM)", "DD+", "DTS-HD", "MLP", "MPEG" or "AC-3" can be selected in this embodiment. In particular, "AC-3" is used for interoperable contents alone. Moreover, a sample frequency ADSPRT (sampleRate attribute information of an audio stream represents a sample rate of an audio stream, and a description of this attribute information can be eliminated. Additionally, sample depth information or a quantization bit number SPDPT (sampleDepth attribute information) represents sample depth information, and a description of this attribute information can be eliminated. Further, audio channel number information ADCLN (channels attribute information) represents an audio channel number, and its value is written in the form of a positive number. As described above, contents set for EVOB_AMST_ATRT existing in enhanced video object information EVOBI or an attribute information recording region in a time map of a secondary video set must match with a value of the audio channel number information ADCNL (channels attribute information). If the audio channel number ADCNL has a fractional figure, a value of this attribute information must be written in the form of a positive number obtained by rounding up to the whole number. For example, in case of a 5.1 channel, a fractional figure is rounded up, and "6" is set as a value of the audio channel number information ADCNL. Further, a description of the attribute information can be eliminated. Furthermore, a description of BITRATE attribute information indicative of data bit rate (data transfer rate) information DTBTRT may be eliminated in the audio attribute item element AABITM.

<VideoAttributeItem (Video Attribute Item) Element>

VideoAttributeItem element describes an attribute of Main and Sub Video stream. The attribute value should be same with the corresponding value in EVOB_VTS_ATR, or EVOB_ATR.

XML Syntax Representation of VideoAttributeItem Element:

```
<VideoAttributeItem
index = positiveInteger
codec = string
sampleAspectRatio = (16:9 | 14:3)
horizontalResolution = positiveInteger
verticalResolution = positiveInteger
encodedFrameRate = positiveInteger
sourceFrameRate = positiveInteger
bitrate = positiveInteger
activeAreaX1 = nonnegativeInteger
activeAreaY1 = nonnegativeInteger
activeAreaX2 = nonnegativeInteger
activeAreaY2 = nonnegativeInteger
/>
```

(a) Index Attribute

Describes the Media Index for the attribute.

(b) Codec Attribute

Describes codec. The value shall be MPEG-2, VC-1, AVC, or MPEG-1. MPEG-1 may be described only for Interoperable Content.

(c) sampleAspectRatio Attribute

Describes the shape of encoded samples or "pixels". This attribute can be omitted.

(d) horizontalResolution Attribute

Describes the number of horizontal samples encoded, not the number of pixels that may be generated from decoding. This attribute can be omitted.

(e) verticalResolution Attribute

Describes the number of vertical samples encoded, not the number of pixels that may be generated from decoding. This attribute can be omitted.

(f) encodedFrameRate Attribute

Describes encoded frame rate, which is expressed in frames, not fields (i.e. 30 interlaced frames, not 60 fields). This attribute can be omitted.

(g) sourceFrameRate Attribute

Describes the approximate frame rate of the captured source content. For instance, film would typically indicated "24", but would have an actual video rate of 23.976 Hz, and may be encoded with repeat field flags at 29.970 Hz. This attribute can be omitted.

(h) Bitrate Attribute

Describes the approximate average bit rate adequate to allow application selection between different streams available based on each player's available network bandwidth. It is expressed as the number of kilobits per second. This attribute can be omitted.

(i) activeAreaX1, activeAreaY1, activeAreaX2 and activeAreaY2 Attributes Describes the active image area in an encoded frame in the case where a solid color fills the encoded area not filled by the image. The active image rectangle is specified based in full screen display coordinates. This attribute can be omitted.

More intelligible explanations will be provided below.

A data configuration in the video attribute item element VABITM shown in (d) of FIG. 79B will now be described. The video attribute item element VABITM is written about attribute information of a main video stream MANVD and a sub video stream SUBVD. As described above, contents set in EVOB_VTS_ATR or EVOB_ATR must match with a value set in each attribute information in the video attribute item element VABITM. Media index number information INDEX (a value of index attribute information) in the video attribute item element VABITM matches with an index number MDATNM (a value of mediaAttr attribute information) of a corresponding media attribute element in the media attribute information written in (c) or (f) of FIG. 59C, and referred (specified) by a main video element MANVD and a sub video element SUBVD. Moreover, as a value of codec attribute information representing compression code information VDCDC of video, one of "MPEG-2", "VC-1", "AVC" and "MPEG-1" can be selected. The MPEG-1 is used for interoperable contents alone. Additionally, aspect ratio information ASPRT (sampleAspectRatio attribute information) represents an encoded screen displayed for a user or a shape (an aspect ratio) of pixels. As a value which can be taken by the aspect ratio information ASPRT, one of "4:3" indicative of a standard screen size/screen shape and "16:9" indicative of a shape of a wide screen is set. A description of the aspect ratio information ASPRT can be eliminated in the video attribute item element VABITM. Next horizontal resolution attribute information HZTRL (horizontalResolution attribute information) represents the number of samples (the number of pixels) in the horizontal direction of an encoded picture. The value does not represent the number of pixels which can be generated by decoding. Vertical resolution attribute information VTCRL (verticalResolution attribute information) written after HZTRL represents the number of samples (the number of pixels) in the vertical direction of an encoded picture. The value does not represent the number of pixels which can be obtained as a result of decoding. A description of information concerning the horizontal resolution attribute information HZTRL and the vertical resolution attribute information VTCRL can be eliminated. Additionally, encodedFrameRate attribute information represents frame rate attribute information ENFRRT at the time of display for a user. This information is indicative of an encoded frame rate, it is not represented in the form of the number of frames rather than the number of fields. For example, in an interlace display mode in NTSC, 60 fields exist in one second and correspond to 30 frames. Although the number of fields and the number of frames are different from each other in the interlace display mode in this manner, the frame rate attribute information ENFRRT at the time of display for a user represents a frame rate in frames rather than the number of fields. Further, a description of the frame rate attribute information ENFRRT at the time of display for a user can be eliminated. Next source frame rate attribute information SOFRRT (sourceFrameRate attribute information) to be written represents an "approximate" frame rate of fetched source contents. That is, although a source frame rate of a picture film which is displayed in a movie theater is indicated as "24", an actual video rate is 23.976 Hz. Furthermore, the picture film displayed in the movie theater can be encoded by using a repeat field flag at 29.970 Hz. In this embodiment, as a value of the source frame rate attribute information SOFRRT, a value of "23.976 or 29.970 is not written, but a value of "24" or "30" which is as an approximate frame rate is written. Moreover, a description of this information can be eliminated. In this embodiment, as shown in FIGS. 67 and 68, an appropriate network source can be selected and transferred to a network from a plurality of network sources based on a network bandwidth corresponding to a network environment in which the information recording and playback apparatus 1 including the advanced content playback unit ADVPL is placed. Data bit rate (data transfer rate) information DTBTRT (bitrate attribute information) represents an approximate value with respect to an average value of respective bit rates when different playback/display object streams selected in accordance with a network environment (a network bandwidth) in which each information recording and playback apparatus 1 is placed are transferred. The value (the data bit rate information DTBTRT (bitrate attribute information)) will now be described with reference to an example shown in FIG. 67. In a network source element NTSELE in a playlist PLLST is written src attribute information (a storage position (a path) and a file name of a resource) corresponding to each network throughput. Exploiting a list of the network source elements NTSELE can select an optimum object file corresponding to a network throughput in each network environment. For example, in case of modem communication using a telephone line, a network throughput of 56 Kbps alone can be obtained. In this case, S-EVOB_LD.EV0 becomes an object file optimum for the network environment as a file in which a playback/display object stream is recorded. Furthermore, in case of a network environment using optical communication or the like, 1 Mbps can be guaranteed as a network throughput. Data transfer of an E-EVOB_HD.DV0 file having high-definition picture information is appropriate for a user having a network environment with such a high network throughput. An optimum source to be selected varies depending on each network environment in this manner, and an approximate value of an average value with respect to 1 Mbps and 56 Kbps is (1000+56)÷2=528≅500. Therefore, the value "500" is written in the source frame rate attribute information SOFRRT. As described above, a value of the source frame rate attribute information SOFRRT is represented in the form of a numeric figure in Kbit/s. Information of active area coordinates from activeAreaX1 attribute information to activeAreaY2 attribute information written in the video attribute item element VABITM is indicative of an active image area in a frame which is displayed for a user after encoding. The active image area of a frame which is encoded and displayed for a user is not filled with an image, but it includes a region which is filled with a fixed homochromatic color, e.g., black. For example, when a standard screen is displayed in a TV wide screen, black stripes may be displayed on both sides of the TV wide screen in some cases. In this example, a region corresponding to the TV wide screen including the black stripes on both sides rather than the standard screen (an image region) represents the "active image region in a frame which is encoded and displayed for a user". A square region of the active image is defined as a region specified in a display coordinate system (a canvas coordinate system CNCRD shown in FIG. 40) of a full screen. Furthermore, display of the attribute information can be eliminated. In the active image region, ActiveAreaX1 attribute information represents an X coordinate value APARX1 at an upper left end position of a video display screen in an aperture;

ActiveAreaY1 attribute information represents a Y coordinate value APARY1 at an upper left end position of the video display screen in the aperture;

ActiveAreaX2 attribute information represents an X coordinate value APARX2 at a lower right end position of the video display screen in the aperture; and ActiveAreaY2 attribute information represents a Y coordinate value APARY2 at a lower right end position of the video display screen in the aperture.

Figure 84:
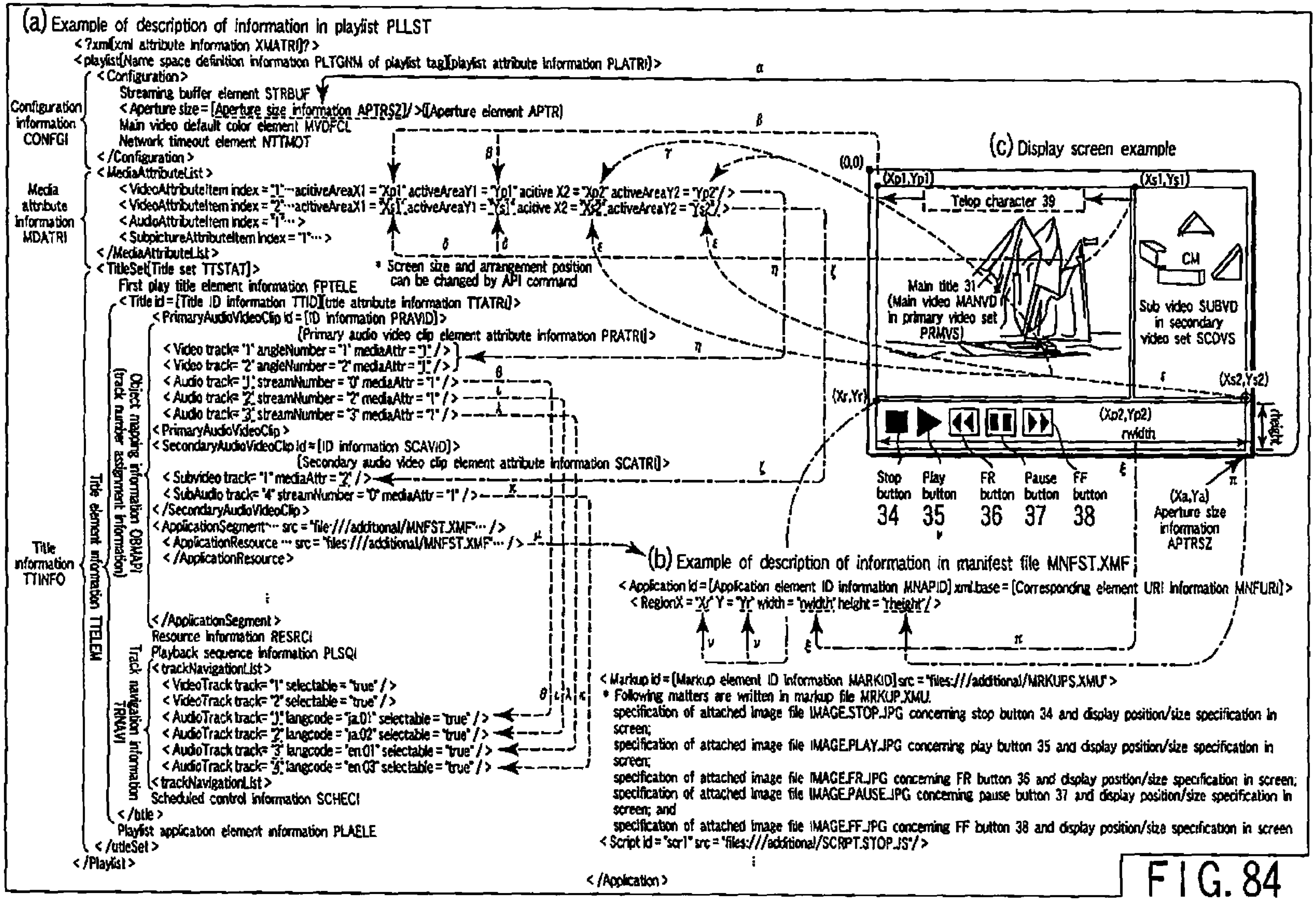
FIG. 84 is an exemplary view showing a description example of management information mainly focusing on a display screen of each playback/display object.

A specific image concerning the attribute information will now be described with reference to FIG. 84(*c*). In a display screen example shown in FIG. 84(*c*), it is assumed that a coordinate position at an upper left end of a screen of a main title 31 constituted of main video MANVD in a primary video set PRMVS is represented as (Xp1, Yp1), and a coordinate position at a lower right end of the main title 31 is represented as (Xp2, Yp2). In a description example of FIG. 84(*a*), the coordinate values at the upper left end and the lower right end are written in a video attribute item element VABITM in which media index number information INDEX (index attribute information) in media attribute information MDATRI has a value "1" (a correspondence relationship with FIG. 84(*c*) is indicated by a broken line β and a broken line γ). Further, as shown in FIG. 84(*c*), a consideration will be given as to a case where a coordinate at an upper left end of a screen of sub video SUBVD in a secondary video set SCDVS is defined as (Xs1, Ys1) and a coordinate at a lower right end of the same is specified as (Xs2, Ys2). In the description example of FIG. 84(*a*), the coordinate values are written in a video attribute item element VABITM in which a value of media index number information INDEX (index attribute information) is set to "2" in the media attribute information MDATRI. A correspondence relationship between the coordinate values specified in FIG. 84(*c*) and the coordinate values written in FIG. 84(*a*) is indicated by a broken line δ and a broken line ϵ. Then, when a value of an index number MDATNM (mediaAttr attribute information) of a corresponding media attribute element in media attribute information of a main video element MANVD in a primary audio video clip element PRAVCP is set to "1" in object mapping information OBMAPI (track number assignment information) included in title element information TTELEM in title information TTINFO shown in FIG. 84(*a*), a value of the media index number information INDEX is associated with the video attribute item element VABITM in accordance with a relationship indicated by an alternate long and short dash line η. As a result, a display screen region of the main video element MANVD written in the primary audio video clip element PRAVCP is set as a region of the main title 31 shown in FIG. 84(*c*). Moreover, likewise, when a value of an index number MDATNM (mediaAttr attribute information) of a corresponding media attribute element in media attribute information in a sub video element SUBVD is set to "2" in a secondary audio video clip element SCAVCP, the media index number information INDEX (a value of the index attribute information) is linked with a video attribute item element VABITM set as "2" as shown in a correspondence relationship indicated by an alternate long and short dash line ξ. As a result, a screen display size of the sub video element SUBVD written in the secondary audio video clip element SCAVCP is set as a region of the sub video element SUBVD in the secondary video set SCDVS shown in FIG. 84(*c*).

<SubpictureAttributeItem (Sub-Picture Attribute Item) Element>

SubpictureAttributeItem element describes an attribute of Sub-picture stream. The attribute value shall be same with the corresponding value in EVOB_VTS_ATR, or EVOB_ATR.

XML Syntax Representation of SubpictureAttributeItem Element:

```
<SubpictureAttributeItem
index = positiveInteger
codec = string
/>
```

(a) Index Attribute

Describes the Media Index for the attribute.

(b) Codec Attribute

Describes codec of the codec. The value is 2 bitRLC, or 8 bitRLC.

More intelligible explanations will be provided below.

A data configuration in a sub-picture attribute item element SPAITM shown in (e) of FIG. 79B will now be described. The sub-picture attribute item element SPAITM describes attribute information of a sub-picture stream (a sub-picture stream SUBPT). Each attribute information value written in the sub-picture attribute item element SPAITM must match with contents set in EVOB_VTS_ATR or EVOB_ATR as mentioned above. Media index number information INDEX (index attribute information) in the sub-picture attribute item element SPAITM is referred by using a sub-picture stream number SPSTRN (streamNumber attribute information) of a sub-picture pack corresponding to a track number shown in (e) of FIG. 59C. Additionally, as a value set for compression code information SPCDC (codec attribute information) of a sub-picture, one of "2 bitRLC (run-length compression)" and "8 bitRLC (run-length compression)" is set.

As shown in FIG. 80(*a*), a playlist file PLLST includes configuration information CONFGI. Information concerning systematic configuration parameters is written in the configuration information CONFGI.

Configuration Element>

The Configuration element consists of a set of System Configuration for Advanced Content.

XML Syntax Representation of Configuration Element:

```
<Configuration>
StreamingBuffer
Aperture
MainVideoDefaultColor
NetworkTimeout ?
</Configuration>
```

Content of Configuration element shall be a list of system configuration.

More intelligible explanations will be provided below.

FIG. 80(*b*) shows a data configuration in the configuration information CONFGI. The configuration information CONFGI is written in the form of a configuration element. The configuration element is constituted of set information of a system configuration concerning advanced contents ADVCT. Further, contents of the configuration element are formed of a list of information concerning system information. The list concerning the system configuration is made up of various kinds of elements, i.e., a streaming buffer element STRBUF, an aperture element APTR, a main video default color element MVDFCL and a network timeout element NTTMOT.

FIG. 80(*c*) shows a data configuration in the streaming buffer element STRBUF. Required size information of a streaming buffer STRBUF in the data cache DTCCH is written in the streaming buffer element STRBUF. As shown in FIG. 25, a secondary video set SCDVS stored in the network server NTSRV must be temporarily stored in the streaming buffer STRBUF in the data cache DTCCH before played back/displayed for a user by the advanced content playback unit ADVPL. When the advanced content playback unit ADVPL actually displays the secondary video set SCDVS, the secondary video set SCDVS temporarily stored in the streaming buffer STRBUF is read, and display processing for a user is executed while transferring the read set to the secondary video player SCDVP. At this time, as shown in FIG. 25, a playback/display object temporarily stored in the streaming buffer STRBUF is the secondary video set SCDVS alone, and many other display/playback objects are temporarily stored in the file cache FLCCH in the data cache DTCCH. Therefore, when the secondary video set SCDVS is not included in advanced contents ADVCT supplied by a content provider, a setting region for the streaming buffer STRBUF does not have to be provided in the data cache DTCCH. When the streaming buffer element STRBUF is arranged in the configuration information CONFGI, it is possible to recognize a memory region size of the streaming buffer STRBUF required for storage of the secondary video set SCDVS (see FIG. 25) which is previously transferred from the network server NTSRV before display for a user, thereby smoothly executing transfer processing of the secondary video set SCDVS. In this manner, a memory size of the streaming buffer STRBUF which must be set in advanced in the data cache DTCCH requested by a creator (a content provider) who creates advanced contents ADVCT with respect to the advanced content playback unit ADVPL becomes a "streaming buffer size STBFSZ (size attribute information) which must be previously set" shown in FIG. 80(*c*). The advanced content playback unit ADVPL changes a configuration (a memory space allocated to the streaming buffer STRBUF) in the data cache DTCCH during sequence processing at the time of startup. Setting of the configuration (the memory spaced allocated to the streaming buffer STRBUF) in the data cache DTCCH is carried out as a part of the processing described at the step S62 in FIG. 51. A value of the "streaming buffer size STBFSZ (size attribute information)

which must be previously set" is written in a unit of "kilobyte (1024 bytes)". For example, when 1 Mb must be set as the streaming buffer STRBUF size, a value "1024" is set as a value of the streaming buffer size STBFSZ (size attribute information) which must be previously set. Since a unit of the value to be written is the unit of 1024 bytes as described above, when byte conversion of the total streaming buffer STRBUF size is performed, a value of 1024×1024 bytes is obtained, which is substantially equal to 1 MB. Furthermore, a value written in the "streaming buffer size STBFSZ (size attribute information) which must be previously set" must be written in the form of a positive number value (a fractional figure is rounded up to be displayed). Moreover, this value must be set as an even number. That is because setting of the memory space of the data cache DTCCH in the advanced content playback unit ADVPL is performed in bits (bytes). Therefore, setting a value of the "streaming buffer size STBFSZ which must be previously set" to an even number value in accordance with processing in bits can facilitate processing in the advanced content playback units ADVPL in bytes.

<Aperture Element>

Aperture element describes the full visible image size.

XML Syntax Representation of Aperture Element:

```
<Aperture
size = (1920×1080 | 1280×720)
/>
```

(a) Size Attribute

Describes the full visible image size.

More intelligible explanations will be provided below.

FIG. 80(*d*) shows a data configuration in an aperture element APTR in the configuration information CONFGI. The aperture element APTR represents full-size information of an image which can be displayed (seen) in a screen to be displayed for a user. The aperture size information APTRSZ (size attribute information) represents information of a full image size which can be seen (displayed) by a user as described above, and one of "1920×1080" and "1280×720" can be set. The aperture size information APTRSZ is indicative of a full size of an aperture APTR (a graphic region) in a graphic plane shown in FIG. 40. In FIG. 40, (1920, 1080) is written as a coordinate value at a lower right position of a bold frame showing the aperture APTR (the graphic region), and a value "1920×1080" is set as a value of the aperture size information APTRSZ in this case. FIG. 84 shows a specific embodiment of setting the aperture size information APTRSZ. In a display screen example shown in FIG. 84(*c*), a coordinate at an upper left position of an entire screen enclosed with a black frame is (0, 0), and a coordinate value at a lower right position of the same is (Xa, Ya). The coordinate (Xa, Ya) is the aperture size information APTRSZ, and this value is written in the aperture size information APTRSZ in the aperture element APTR in accordance with a correspondence line indicated by a broken line α. As a description example in this case, a value "Xa×Ya" is set.

<MainVideoDefaultColor (Main Video Default Color) Element>

MainVideoDefaultColor element describes the Outer Frame Color for Main Video, which is the color of Main Video plane out side of the Main Video.

XML Syntax Representation of MainVideoDefaultColor Element:

```
<MainVideoDefaultColor
color = string
/>
```

(a) Color Attribute

Describes the Y Cr Cb color in 6 hex digits. The value shall be in following format:

color=Y Cr Cb

Y, Cr, Cb:=[0-9A-F][0-9A-F]

where 16≤Y≤235, 16<Cb≤240, 16≤Cr≤240.

More intelligible explanations will be provided below.

FIG. 80(*e*) shows a data configuration in a main video default color element MVDFCL included in the configuration information CONFGI. The main video default color element MVDFCL describes contents of an outer frame color with respect to main video MANVD. The outer frame color with respect to the main video MANVD means an outer background color in a main video plane MNVDPL (see FIG. 39) concerning the main video MANVD. For example, a size of a screen which is displayed for a user is set in a video attribute item element VABITM based on information of activeAreaX1 to activeAreaY2 described in (d) of FIG. 79B, and an index number MDATNM (mediaAttr attribute information) of a corresponding media attribute element in media attribute information shown in (c) of FIG. 59C is used to establish a link with the video attribute item element VABITM based on the corresponding main video MANVD, thereby setting the display screen size of the main video MANVD. If a user watches a television having a screen with a wider lateral width (a wide screen) than a screen which is actually displayed, both ends of the television screen become regions where the display screen of the main video MANVD does not exist. This region means an outer part in the main video plane MNVDPL, and a color of the region where the picture (the main video MANVD) is not displayed is set by "outer frame attribute information COLAT (color attribute information) with respect to the main video". A value set for the outer frame attribute information COLAT (color attribute information) with respect to the main video represents colors Y, Cr and Cb in the form of six hexagonal digital data. A specific set value is written in the following format.

Color=Y Cr Cb

Y, Cr, Cb:=[0-9A-F][0-9A-F]

where, conditions as values set for Y, Cb and Cr are set as follows.

16≤Y≤235, 16≤Cb≤240, 16≤Cr≤240

In this embodiment, the "outer frame attribute information COLAT (color attribute information) with respect to the main video" is not simply set to red or blue, but it is represented in the form of colors Y, Cr and Cb, thereby displaying richly expressive colors for a user.

<NetworkTimeout (Network Timeout) Element>

Timeout element describes the timeout of network request.

XML Syntax Representation of Timeout Element:

```
<NetworkTimeout
timeout = nonNegativeInteger
/>
```

(a) Timeout Attribute

Describes the milliseconds for timeout.

More intelligible explanations will be provided below.

FIG. 80(*f*) shows a data configuration in a network timeout element NTTMOT existing in the configuration information CONFGI. The network timeout element NTTMOT is indicative of a timeout period required in the network. In this embodiment, a necessary playback/display object and its management information are downloaded from the network server NTSRV through the network. When network communication is disabled due to a problem in a network environment, a network communication line must be automatically disconnected. A time taken until the network line is disconnected after network communication is disabled is defined as a timeout period. Timeout setting information NTCNTO (timeout attribute information) at the time of network connection is written in a unit of mS.

Figure 81:
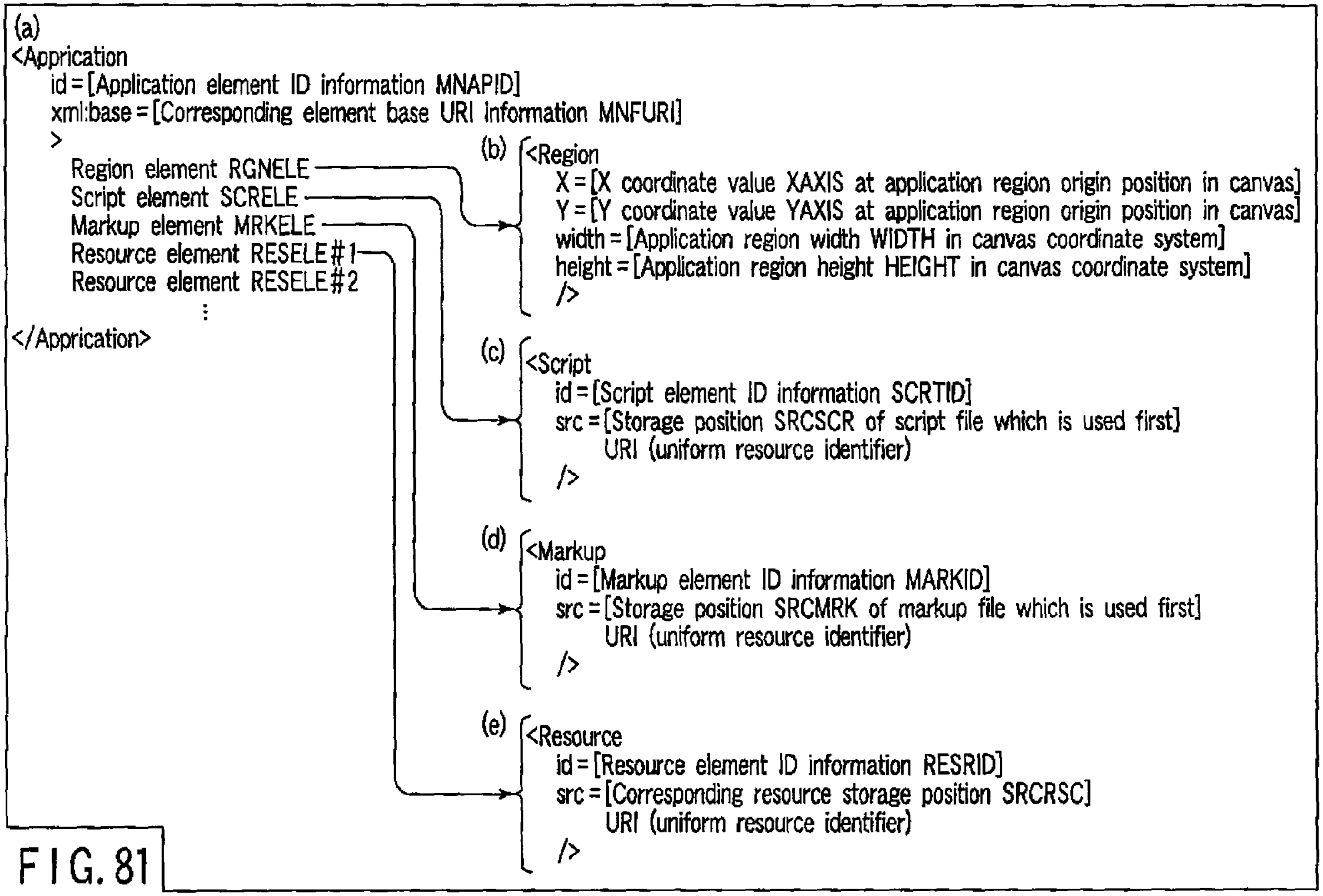
FIG. 81 is an exemplary view showing a data structure in a manifest file.

As shown in FIG. 12, a manifest MNFST or a manifest MNFSTS of an advanced subtitle is referred by a playlist PLLST. This situation is illustrated in detail in FIG. 18. That is, a file name referred as an index at the time of playback/use by an AdvancedSubtitleSegment ADSTSG which manages the advanced subtitle ADSBT is a manifest file MNFSTS. Moreover, a file which is referred as an index at the time of playback/use by an ApplicationSegment APPLSG which manages an advanced application ADAPL is a manifest file MNFST of the advanced application. FIG. 81 shows data configurations in the manifest file MNFSTS of the advanced subtitle and the manifest file MNFST of the advanced application.

<Manifest File>

The Manifest File is the initialization information of the Advanced Application for a Title. Player shall launch an Advanced Application in accordance with the information in the Manifest file. The Advanced Application consists of a presentation of Markup file and execution of Script.

The initialization information described in a Manifest file is as follows:

Initial Markup file to be executed

Script file(s) to be executed in the Application Startup Process

Manifest File shall be encoded as well-formed XML, subject to the rules in XML Document File. The document type of the Playlist file shall follow in this section.

More intelligible explanations will be provided below.

The manifest file MNFST is indicative of initial (initial setting) information of an advanced application ADAPL corresponding to a title. The advanced content playback unit ADVPL in the information recording and playback apparatus 1 shown in FIG. 1 performs execution/display processing of the advanced application ADAPL based on information written in the manifest file MNFST. The advanced application ADAPL is made up of display processing based on markup MRKUP and execution processing based on a script SCRPT. The initial (initial setting) information written in the manifest MNFST represents the following contents.

A first markup file MRKUP to be executed.

A script file SCRPT which should be executed in startup processing of an application.

The manifest file MNFST is written based on XML, and encoded based on XML grammar. A data configuration in the manifest file MNFST is formed of an application element shown in FIG. 81(*a*). The application element tag is formed of application element ID information MNAPID and base URI information MNFURI (xml: base attribute information) of a corresponding element. When the application element ID information MNAPID is provided in the application element tag, reference can be made to the application element ID information MNAPID based on an API command as shown in FIGS. 59A to 59C, thereby facilitating retrieval of a corresponding application element based on the API command. Additionally, a region element RGNELE, a script element SCRELE, a markup element MRKELE and a resource element RESELE can be included as child elements in the application element.

<Region Element>

The region element defines a layout region within a layout plan.

XML Syntax Representation of Application Element:

```
<Region
x = nonNegativeInteger
y = nonnegativeInteger
width = nonNegativeInteger
height = nonnegativeInteger
/>
```

Content elements are laid out in this region.

(a) x Attribute

Describes the x axis value of the initial position of the region on the Canvas.

(b) y Attribute

Describes the y axis value of the initial position of the region on the Canvas.

(c) Width Attribute

Describes the width of the region in Canvas coordinates.

(d) Height Attribute

Describes the height of the region in Canvas coordinates.

More intelligible explanations will be provided below.

FIG. 81(*b*) shows a data configuration in a region element RGNELE which can be arranged in an application element depicted in FIG. 81(*a*). As shown in FIG. 39, respective layers, i.e., a main video plane MNVDPL, a sub video plane SBVDPL, a sub-picture plane SBPCPL, a graphic plane GRPHPL and a cursor plane CRSRPL exist in a display screen which is displayed for a user, and a composite screen in which the respective layers are combined is displayed for a user as shown in a lower part of FIG. 39. Of the respective layers, the graphic plane GRPHPL is processed as a display screen layer concerning an advanced application ADAPL in this embodiment. An entire screen of the graphic plane GRPHPL shown in FIG. 39 is defined as an aperture APTR (a graphic region). Further, as shown in a lower screen in FIG. 39, a region where respective buttons from a help icon 33 to FF button 38 are arranged is defined as an application region APPRGN as shown in the graphic plane GRPHPL. The application region APPRGN represents a screen region in which advanced contents ADVCT corresponding to an advanced application are displayed in this embodiment, and an arrangement position and a region dimension of the application region APPRGN in the aperture APTR (the graphic region) are written in a region element RGNELE shown in FIG. 81(*b*). A method of arranging the application region APPRGN in the aperture APTR (the graphic region) will now be described in detail with reference to FIG. 40. As shown in FIG. 40, a region in the graphic plane GRPHPL is called a canvas. Furthermore, a coordinate system which specifies an arrangement position of each application region APPRGN on the canvas is defined as a canvas coordinate CNVCRD. In the embodiment shown in FIG. 40, application regions APPRGN #1 to #3 are set on the canvas coordinate CNVCRD. An outline part in the application region APRGN #1 is called a position of a graphic object. In this embodiment, the graphic object may be called a content element in some cases. One graphic object (a content element) corresponds to each icon or button such as a help icon 33 or a stop button 34 shown in a lower part of FIG. 39 in a one-on-one relationship. That is, an arrangement position and a display screen size of the help icon 33 or the stop button 34 in the application region APPRGN #1 are defined by a coordinate value (x1, y1) in the application region APPRGN #1. The arrangement position and a display size of the graphic object (the content element) such as a help icon 33 or a stop button 34 in the application region APPRGN #1 are respectively written in a markup file MRKUP.XMU as described with an asterisk below the markup element MRKELE in FIG. 84(*b*). As shown in FIG. 40, an X axis in the canvas coordinate CNVCRD represents a lateral direction of a screen which is displayed to a user, and a right-hand direction is a plus direction. A unit of a coordinate value in the X axis direction is indicated as a value of the number of pixels from an origin position. Further, a Y axis in the canvas coordinate CNVCRD represents a vertical direction of the screen which is displayed for a user, and a lower direction is a plus direction. A unit of a coordinate value in the X axis direction is also indicated as a value of the number of pixels from the origin position. An upper left end position of the aperture APTR (the graphic region) in this embodiment is the origin position of the canvas coordinate CNVCRD (a position of (0, 0) in the canvas coordinate system). As a result, a screen size of the aperture APPTR (the graphic region) is specified by the canvas coordinate CNVCRD at a lower right end in the aperture APTR (the graphic region). In the example shown in FIG. 40, a screen displayed for a user has a size of 1920×1080, and a canvas coordinate value at a lower right end position in the aperture APTR (the graphic region) becomes (1920, 1080). An arrangement position of the application region APPRGN #1 in the aperture APTR (the graphic region) is defined by a value of the canvas coordinate CNVCRD (X, Y) at an upper left end position in the application region APPRGN #1. In accordance with this definition, as X attribute information in the region element RGNELE shown in FIG. 81(*b*), an X coordinate value XAXIS (see FIG. 40) at a starting point position of the application region in the canvas is set. Further, likewise, as a Y attribute value in the region element RGNELE, a Y coordinate value YAXIS at the starting point position of the application region in the canvas is set. Furthermore, as shown in FIG. 40, an upper left end position of the application region APPRGN #1 is defined as an origin (0, 0) in the coordinate system in the application region, and values of a width and a height in the application region APPRGN #1 are specified based on a coordinate (x2, y2) at a lower right end position in the application coordinate system in the application region APPRGN #1. That is, a width of the application region APPRGN #1 is defined by "x2", and a height of the application region APPRGN #1 is defined by a value of "y2". In accordance with this definition, a display size of the application region APPRGN is defined by a "width" and a "height" in this embodiment. That is, width attribute information in the region element RGNELE shown in FIG. 81(*b*) represents a width WIDTH of the application region in the canvas coordinate system. Moreover, height attribute information in the region element RGNELE shown in FIG. 81(*b*) represents a height HEIGHT of the application region in the canvas coordinate system. If descriptions of an X coordinate value XAXIS at the starting point position of the application region and a Y coordinate value YAXIS at the starting point position of the application region in the canvas are eliminated in the region element RGNELE, a default value "0" is set as a value of the X coordinate value at the starting point position of the application region in the canvas, and a default value "0" is automatically set as a value of the Y coordinate value YAXIS at the starting point position of the application region in the canvas. In this case, as apparent from FIG. 40, since a coordinate value (X, Y) at the starting point of the corresponding application region APPRGN #1 becomes (0, 0), the application region APPRGN attaches on an upper left end of the aperture APTR (the graphic region). Additionally, in this embodiment, as shown in FIG. 81(*b*), descriptions of the width WIDTH of the application region in the canvas coordinate system and the height HEIGHT of the application region in the canvas coordinate system can be eliminated in the region element RGNELE. When the description of the width WIDTH of the application region in the canvas coordinate system is eliminated in this manner, a value of the width WIDTH of the application region in the canvas coordinate system matches with a width size of the aperture APTR (the graphic region) as a default value. Further, when the description of the height HEIGHT of the application region in the canvas coordinate system is eliminated, a value of the height HEIGHT of the application region in the canvas region is automatically set to a height of the aperture APTR as a default value. Therefore, when the descriptions of the width WIDTH of the application region in the canvas coordinate system and the height HEIGHT of the application region in the canvas coordinate system are eliminated, a size of the application region APPRGN #1 matches with a size of the aperture APTR (the graphic region). Matching default values when the descriptions are eliminated with a position and a size of the aperture APTP (the graphic region) can facilitate a display size/display position setting method for each graphic object (a content element) in the markup MRKUP (in a case where the descriptions of the information are eliminated).

<Script Element>

The Script element describes a Script file for the Advanced Application to be evaluated as global code in the Application Startup Process.

XML Syntax Representation of Script Element:

```
<Script
id = ID
src = anyURI
/>
```

At the application startup, Script Engine shall load the script file referred by URI in the src attribute, and then execute it as global code. [ECMA 10.2.10]

(a) src Attribute

Describes the URI for the initial script file.

More intelligible explanations will be provided below.

FIG. 81(*c*) shows a data configuration in a script element SCRELE. The script SCRPT in this embodiment is based on Global Code (ECMA 10.2.10) which is set in the international standardization of ECMA. The script element SCRELE describes contents of a script file SCRPT concerning an advanced application ADAPL carried out in startup processing of an application. When an application is started up, the navigation manager NVMNG shown in FIG. 44 makes reference to a URI (a uniform resource identifier) written in src attribute information to download a script file SCRPT which is used first. Immediately after this operation, an ECMA script processor ECMASP interprets information of the downloaded script file SCRPT based on Global Code (an ECMA script defined in ECMA 10.2.10), and performs execution processing in accordance with a result of interpretation. As shown in FIG. 81(*c*), script element ID information SCRTID and src attribute information are written in the script element SCRELE. Since the script element ID information SCRTID exists in the script element SCRELE, reference can be readily made to a specific script element SCRELE by using an API command, thereby facilitating API command processing. Further, the src attribute information represents a storage position SRCSCR of a script file which is used first, and it is written in the form of a URI (a uniform resource identifier).

<Markup Element>

The Markup element describes the initial Markup file for the Advanced Application.

XML Syntax Representation of Markup Element:

```
<Markup
id = ID
src = anyURI
/>
```

In the application startup, after the initial Script file execution if it exists, Advanced Navigation shall load the Markup file referred by URI in the src attribute.

(a) src Attribute

Describes the URI for the initial Markup file.

More intelligible explanations will be provided below.

A markup element MRKELE whose data configuration is shown in FIG. 81(*d*) in detail is indicative of a file name and a storage position (a path) of a markup file which is displayed first with respect to an advanced application ADAPL. As shown in an example of FIG. 81(*a*), when a script element SCRELE is written in an application element, an initial script file defined in the script element SCRELE is executed first at the time of starting up an application. Then, the advanced application manager ADAMNG in the navigation manager NVMNG shown in FIG. 28 makes reference to a URI (a uniform resource identifier) specified in src attribute information defined in the markup element MRKELE to load a corresponding markup file MRKUP. In this manner, the src attribute information shown in FIG. 81(*c*) represents a storage position SRCSCR (a storage position (a path) and a file name) of a script file which is used first, and it is written in the form of a URI (a uniform resource identifier). Furthermore, as shown in FIG. 82, when markup element ID information MARKID depicted in FIG. 81(*d*) is utilized to make reference to the markup element MRKELE based on an API command, API command processing can be facilitated.

<Resource Element>

The Resource element describes the resource used by the Advanced Application. All Resource used by Advanced Application shall be described by Resource element, except for API Managed Area.

XML Syntax Representation of Resource Element:

```
<Resource
id = ID
src = anyURI
/>
```

Playlist Manager shall activate the Advanced Application after all Resources in Manifest are loaded into File Cache.

(a) src Attribute

Describes the URI for the source location of the Resource. The value shall be the absolute URI for one of the src attribute value described in Resource Information element in Playlist. Relative URI shall not be used for this value.

More intelligible explanations will be provided below.

A resource element RESELE whose data configuration is shown in FIG. 81(*e*) in detail will now be described. The resource element RESELE represents information of a resource used in an advanced application ADAPL. Moreover, all resources used in the advanced application ADAPL except an API management region must be written in a list of the resource elements RESELE. A resource specified in a list of the resource elements RESELE in the manifest MNFST is loaded into the file cache FLCCH. Then, the playlist manager PLMNG in the navigation manager NVMNG allows a corresponding advanced application ADAPL to enter an execution state. The src attribute information in the resource element RESELE shown in FIG. 81(*e*) represents a storage position SRCRSC (a storage position (a path) and a file name) of a corresponding resource, and it is written in the form of a URI (a uniform resource identifier). A value of the storage position SRCRSC of the corresponding resource must be written by using a later-described URI (a uniform resource identifier) indicative of a position where the resource has been originally stored, and it represents one of src attribute information values written in resource information elements (resource information RESRCI) defined in a playlist PLLST. That is, when a list of network source elements NTSELE is provided in the resource information RESRCI shown in (c) of FIG. 63B or (e) of FIG. 66C, an optimum resource according to a network throughput in a network environment of the information recording and playback apparatus 1 of a user can be selected with respect to the same contents as shown in FIG. 67 or 68. In this manner, the network source elements NTSELE having src attribute information in which respective storage positions (paths) and file names of resources are written are respectively set with respect to the plurality of resources having the same advanced contents ADVCT (having different detailed attributes such as resolutions or modified statuses of a display screen). A value of a URI (a uniform resource identifier) specified in the src attribute information in a parent element (a title resource element shown in (d) of FIG. 66B or an application resource element APRELE shown in (d) of FIG. 63C) in which the network source element NTSELE is set must be set as a value of a storage position SRCRCS of a corresponding resource shown in FIG. 81(*e*). As described above in conjunction with FIG. 68, when the network environment of the information recording and playback apparatus 1 does not satisfy network throughput conditions specified in the network source element NTSELE, a storage position (a path) and a file name specified in the src attribute information in the title resource element or the application resource element APRELE are accessed, and hence setting the storage position SRCRCS of the corresponding resource shown in FIG. 81(*e*) by the above-described method can make access irrespective of the network environment of the information recording and playback apparatus 1. As a result, access control concerning the manifest MNFST by the advanced content playback unit ADVPL can be facilitated.

At last, FIG. 84 shows a relationship between a data configuration in a manifest file MNFST depicted in FIG. 81 and a layout in a display screen which is displayed for a user.

FIG. 84(*c*) shows an example of a display screen displayed for a user. According to the display example shown in FIG. 84(*c*), various kinds of buttons from a play button 34 to an FF button 38 are arranged on a lower side of the screen. An entire region in which the various buttons from the play button 34 to the FF button 38 are arranged is defined as an application region APPRGN. The display screen example shown in FIG. 84(*c*) corresponds to a canvas coordinate system CNVCR, and an upper left end position of the screen corresponds to a coordinate (0, 0) in the canvas coordinate system CNVCRD. Based on the canvas coordinate system CNVCRD, a coordinate at an upper left end of the application region APPRGN is expressed as (Xr, Yr). As described above, an arrangement position of the application region APPRGN is written in a region element RGNELE in the manifest file MNFST. The above-described (Xr, Yr) coordinate value is written in the form of "Xr" and "Yr" in the region element RGNELE as shown in FIG. 84(*b*), and a correspondence relationship is indicated by a broken line ν. Additionally, in the display screen example shown in FIG. 84(*c*), a width of the application region APPRGN is denoted by rwidth, and a height of the same is defined as rheight. The width rwidth of the application region APPRGN is written as a value of a width WIDTH of an application region in the canvas coordinate system in the region element RGNELE as indicated by a broken line ξ, and a value of the height rheight of the application region APPRGN is likewise written as a value of a height HEIGHT of the application region in the canvas coordinate system in the region element RGNELE as indicated by a broken line π. Further, an arrangement position and a display size of the stop button 34 or the play button 35 in the application region APPRGN shown in FIG. 84(*c*) are specified in a corresponding markup file MRKUP.XMU as indicated by a description following an asterisk "*" written immediately after the markup element MRKELE depicted in FIG. 84(*b*). Further, a file name and a storage position (a path) with respect to the markup file MRKUP.XMU indicative of an arrangement and a size of the stop button 34 or the play button 35 are set as values of src attribute information in the markup element MRKELE.

According to this embodiment, in various kinds of elements arranged in a playlist PLLST, each of a title element TTELEM, a playlist application element PLAELE, a primary audio video clip element PRAVCP, a secondary audio video clip element SCAVCP, a substitute audio video clip element SBAVCP, a substitute audio clip element SBADCP, an advanced subtitle segment element ADSTSG, an application segment element APPLSG, a chapter element, a pause-at element PAUSEL and an event element EVNTEL has ID information therein as shown in FIG. 82(*a*), and each of various elements from a streaming buffer element STRBUF to a scheduled control list element does not have ID information therein as shown on a right-hand side in FIG. 82(*a*). In this embodiment, as shown in FIG. 82(*c*), ID information is set at a leading position of an element to which reference is made relatively often in response to an API command. In accordance with this configuration, the ID information is used to make reference to a specific element from the API command. As a result, access control processing with respect to each element based on the API command becomes easy, thereby facilitating access control/processing with respect to each element based on the API command. Furthermore, since the ID information is arranged at the top of each element, the playlist manager PLMNG (see FIG. 28) can readily retrieve the ID information in each element. Moreover, this embodiment is characterized in that the "ID information" is utilized for identification of each element in place of specifying a "number". As shown in FIG. 51 or FIGS. 3A and 3B, a playlist PLLST can be updated. If a "number" is given for identification of each element, processing to shift the number is required every time the playlist PLL is updated. On the other hand, when the "ID information" is specified for identification of each element, the ID information does not have to be changed at the time of updating the playlist PLLST. Therefore, there can be obtained characteristics that change processing at the time of updating the playlist can be facilitated. FIG. 82(*b*) shows a utilization example of the ID information in each element based on an API command. As a position utilizing example according to this embodiment, title ID information TTID (see (b) of FIG. 24A) can be specified based on an API command to execute transition processing of titles. Moreover, as another utilization example, chapter element ID information CHPTID (see (d) of FIG. 24B) can be specified based on an API command to effect control over access to a specific chapter.

A storage position of data or a file which is stored in the data cache DTCCH and a download method corresponding to the storage position are described in conjunction with FIGS. 64A and 64B, FIGS. 65A to 65D, FIG. 70, FIG. 71, FIGS. 54A and 54B, FIGS. 55A and 55B, FIGS. 56A and 56B, FIGS. 63A to 63C, FIGS. 66A to 66C and FIG. 67, respectively. For the purpose of summing up the contents mentioned above, a description example in a playlist focusing on a description about a storage position of each playback/display object and handling of a storage position of each playback/display object corresponding to this description example will now be explained with reference to FIG. 83. FIG. 83(*a*) shows an example of a screen displayed for a user. In a screen displayed for a user, a main title 31 displayed by main video MANVD in a primary video set PRMVS is displayed on an upper left side, and sub video SUBVD in a secondary video set SCDVS is displayed on an upper right side. Further, various buttons from the stop button 34 to the FF button 38 corresponding to an advanced application ADAPL are arranged on a lower side of the screen, and a telop character 39 constituted of an advanced subtitle ADSBT is displayed on an upper side in the main title 31. In the example shown in FIG. 83, the main video MANVD in the primary video set PRMVS constituting the main title 31 and its relevant information are stored in the information storage medium DISC as shown in FIG. 83(*b*). The information concerning the main video MANVD in the primary video set PRMVS is stored at a directory (a folder) /HVDVD_TS/ in the primary video set PRMVS, a file name corresponding to a time map PTMAP of the primary video set is RMVS.MAP, a file name corresponding to enhanced video object information EVOBI is PRMVS.VTI, and a file name corresponding to a primary enhanced video object P-EVOB is PRMVS.VE0. Furthermore, it is assumed that a relevant file of the sub video SUBVD in the secondary video set SCDVS is stored in the network server as shown in FIG. 83(*c*). An address of the corresponding network server NTSRV in the network (URL: uniform resource location) is www.toshiba.co.jp, and a relevant file is stored at a directory (a folder) of HD_DVD. As shown in FIG. 83(*c*), there are an SCDVS1.EV0 file having a high resolution and a high network throughput required at the time of transfer and an SCDVS2.EV0 file which has a low resolution, may have a low network throughput at the time of transfer and has a secondary enhanced video object S-EVOB recorded therein as corresponding sub video SUBVD, and each of SCDVS1.MAP and SCDVS2.MAP are stored as a time map STMAP of a secondary video set used in each secondary enhanced video object S-EVOB file. In this embodiment, the secondary enhanced video object S-EVOB and the file of the time map STMAP of the secondary video set which is used for this object (makes reference to the file) are stored at the same directory (a folder) in the same network server NTSRV together, and their file names excluding extensions are set to match with each other. Additionally, a file concerning an advanced subtitle ADSBT which represents the telop character 39 is stored in the network server NTSRV shown in FIG. 83(*d*). It is assumed that an address name of the network server NTSRV (URL: uniform resource location) is www.ando.co.jp and various kinds of files are stored in a title TITLE folder (a directory) at this address. A file name of a manifest file MNFST used when accessing the advanced subtitle ADSBT is MNFSTS.XMF, there are three markup MRKUPS files of the advanced subtitle in which a display character when displaying the telop character 39, its display position and its display size are defined, and file names of these files are set as MRKUPS1.XAS, MRKUPS2.XAS and MRKUPS3.XAS, respectively. A display situation and modification of the telop character 39 which is displayed in accordance with a network environment of a user vary depending on each markup file MRKUP, and a value of a network-throughput required for download in the file cache FLCCH also varies. A font conversion table used in the MRKUPS1.XAS is recorded in FONTS1.XAS, and a font file used in the MRKUPS2.XAS is MRKUPS2.XAS. Additionally, a resource file concering the advanced application ADAPL from the stop button 34 to the FF button 38 shown in FIG. 83(*a*) is stored in a route in the persistent storage PRSTR depicted in FIG. 83(*e*), and a playlist file of a playlist PLLST having a data configuration illustrated in FIG. 83(*f*) is stored in the same persistent storage PRSTR under a file name PLLST.XPL. Further, a file name of a manifest file MNFST stored in the persistent storage PRSTR is MNFST.XMF, and a file name of a corresponding markup file MRKUP is MRKUP.XMU. Furthermore, images of respective buttons from the stop button 34 to the FF button 38 shown in FIG. 83(*a*) are stored in the form of JPG, and each of these images is stored under a file name IMAGE_*.JPG. Furthermore, a script file SCRPT corresponding to processing provoked when a user sets the various kinds of buttons is stored in the form of SCRPT_$$$.JS. A file name and storage destination information of a time map file STMAP (PRMVS.MAP) stored in the information recording medium DISC in accordance with the main video MANVD in the primary video set PRMVS representing the main title 31 are written in a description section of an index information file storage position SRCTMP (src attribute information) of a playback/display object to be referred in a primary audio video clip element PRAVCP existing in title information TTINFO in a playlist PLLST as shown in FIG. 83**(*f*). In this embodiment, as shown in FIG. 12, a time map PTMAP (PRMVS.MAP) of the primary video set is first accessed in accordance with a storage position SRCPMT written in the src attribute information in the primary audio video clip element PRAVCP. Then, a file name (PRMVS.VTS) of enhanced video object information EVOBI which is referred is extracted from the time map PTMAP (a PRMVS.MAP file) in the primary video set, and this file is accessed. Subsequently, a file name (PRMVS.EVOB) of a primary enhanced video object P-EVOB which is referred is read in the enhanced video object information EVOBI (a PRMVS.VTI file), a PRMS.EV0 file in which the primary enhanced video object P-EVOB is recorded is accessed, and this file is downloaded into the data cache DTCCH. Furthermore, a storage position of one time map file (SCDVS.MAP) in a plurality of time map files STMAP shown in FIG. 83(*c*) is written in an index information file storage position SRCPTM (src attribute information) of a playback/display object to be referred in a secondary audio video clip element SCAVCP. Moreover, file names (SCDVS2.MAP) of the remaining time maps STMAP in the secondary video set are written in src attribute information in a network source element NTSELE arranged in a corresponding secondary audio video clip element SCAVCP. Allowable minimum value information NTTRPT (networkThroughput attribute information) of a network throughput which is guaranteed when downloading a corresponding secondary enhanced video object S-EVOB into the data cache DTCCH is written in the network source element NTSELE. As shown in FIG. 67, the playlist manager PLMNG in the navigation manager NVMNG previously has information of a network throughput in a network environment where the information recording and playback apparatus 1 is placed. The playlist manager PLMNG reads a value of the allowable minimum value information NTTRPT (the networkThroughput attribute information) of a network throughput in the network source element NTSELE written in the secondary audio video clip element SCAVCP, selects a file name of a secondary enhanced video object S-EVOB which should be loaded into the data cache DTCCH in accordance with a judgment rule shown in FIG. 68, and performs control to access a time map STMAP of a secondary video set which is stored in the same folder and has the same file name except an extension. At the time of download into the data cache DTCCH, the selected time map STMAP file of the secondary video set is first downloaded, a name of a secondary enhanced video object S-EVOB file referred in the time map STMAP of the secondary video set is read, and then the secondary enhanced video object S-EVOB file is downloaded in accordance with the read file name. Moreover, a storage position (a path) and a file name of the manifest file MNFSTS (MNSFTS.XMF) shown in FIG. 83(*d*) are written in manifest file storage position SRCMNF (src attribute information) information of an advanced subtitle in an advanced subtitle segment element ADSTSG. File names and storage positions (paths) of files other than the manifest file MNFST stored in the network server NTSRV shown in FIG. 83(*d*) are written in src attribute information in an application resource element APRELE or a network source element NTSELE in the advanced subtitle segment element ADSTSG. As described above, a plurality of markup files MRKUPS (MRKUPS1.XAS, MRKUPS2.XAS and MRKUPS3.XAS) having different network throughputs in data transfer in accordance with a modifying situation or a font when displaying an advanced subtitle are recorded in the network server NTSRV, and a plurality of font files FONTS (FONTS1.XAS and FONTS2.XAS) also exist in the network server NTSRV. Allowable minimum value information NTTRPT of a network throughput required when downloading each markup file MRKUP and each font file FONT into the file cache FLCCH is written in a network source element NTSELE in the advanced subtitle segment element ADSTSG. For example, according to information of the network source element NTSELE in the advanced subtitle segment element ADSTSG shown in FIG. 83(*f*), allowable minimum value information NTTRPT of a network throughput guaranteed when downloading MRKUPS3.XAS as a markup file MRKUPS into the file cache is 56 Kbps, and a value of allowable minimum value information NTTRPT of a network throughput required when downloading the MRKUPS2.XAS file into the file cache FLCCH is 1 Mbps. The playlist manager PLMNG in the navigation manger NVMNG makes reference to a value of the network throughput 52 in a network path 50 in a network environment where the information recording and playback apparatus 1 is placed, sets an optimum markup file MRKUPS which should be downloaded into the data cache DTCCH based on a selection rule shown in FIG. 68, and accesses the markup file MRKUPS to download this file into the data cache DTCCH. At this time, a corresponding font file FONTS is also simultaneously downloaded into the data cache DTCCH. As described above, it is assumed that a playlist file PLLST having data information shown in FIG. 83(*f*) is stored under a file name PLLST.XPL in the persistent storage PRSTR as shown in FIG. 83(*e*). The playlist manager PLMNG in the navigation manager NVMNG first reads the playlist file PLLST (PLLST.XPL) stored in the persistent storage PRSTR. A file name and a storage position (a path) of a manifest file MNFST (MNF- ST.XMF) stored in the persistent storage PRSTR are written in a manifest file storage position URIMNF (src attribute information) including initial setting information of an advanced application in an application segment element APPLSG in object mapping information OBMAPI existing in title information TTINFO in the playlist PLLST shown in FIG. 83(*f*). Further, file names and storage positions of a markup file MRKUP (MRKUP.XMU), various kinds of script files SCRPT (SCRPT_$$$.JS) and still images file IMAGE (IMAGE_***.JPG) concerning the manifest file are written in a storage position SRCDTC (src attribute information) of data or a file which is downloaded into the data cache in an application resource element APRELE in the application segment element APPLSG. The playlist manager PLMNG in the navigation manager NVMNG can read a list of the application resource elements APRELE in the application segment element APPLSG to be aware of a name and an original storage position of a resource file which should be previously stored in the file cache FLCCH before displaying a corresponding advanced application ADAPL in the screen. When information of a resource which should be stored in the file cache FLCCH is written in the application resource element APRELE list in the application segment element APPLSG of the playlist file PLLST in this manner, the navigation manager NVMNG can efficiently store a necessary resource in the data cache DTCCH at a high speed in advance.

FIG. 84 shows a relationship between an example of a display screen which is displayed for a user and a data configuration in a playlist PLLST in this embodiment. The relationship between the display screen and the data configuration in the playlist has been described in conjunction with each of FIGS. 79A, 79B and 81. However, describing the relationship between the display screen example which is displayed for a user and the data configuration in each of the playlist PLLST and the manifest file MNFST with reference to FIG. 84 can systematically comprehend the whole. An entire screen region which is displayed for a user shown in FIG. 84(*c*) is called an aperture APTR. Further, a coordinate value at a lower right position of the aperture APTR in the canvas coordinate system CNVCRD can be represented in the form of (Xa, Ya), and the coordinate value corresponds to aperture size information APTRSZ. As a broken line α indicates a correspondence relationship, the aperture size information APTRSZ is written in an aperture element APTR in the configuration information CONFGI in the playlist PLLST. Furthermore, an upper left end coordinate of a screen showing a main title 31 representing main video MANVD in a primary video set PRMVS is expressed as (Xp1, Yp1), and a canvas coordinate CNVCRD value at a lower right end position is expressed as (Xp2, Yp2). A screen size of the main title 31 is defined by a video attribute item element VABITM which is indicated as "1" by media index number information INDEX in a video attribute item element VABITM in media attribute information MDATRI in the playlist PLLST. Broken lines β and γ indicate a relationship between an X coordinate value APARX1 at an upper left end position and a Y coordinate value APARY1 at an upper left end position and a relationship between an X coordinate value APARX2 at a lower right end position and a Y coordinate value APARY2 at a lower right end position of a video display screen in the aperture set by the video attribute item element VABITM which is set as "1" by a value of the media index number information INDEX. Moreover, as shown in FIG. 84(*c*), a value of the canvas coordinate CNVCRD at an upper left end is represented as (Xs1, Yx1) and a value of the canvas coordinate CNVCRD at a lower right end is represented as (Xs2, Ys2) in the display screen of sub video SUBVD in a secondary video set SCDVS. Display screen region information of the sub video SUBVD in the secondary video set SCDVS is written in a video attribute item element VABITM which is set as "2" by a value of the media index number information INDEX as shown in FIG. 84(*a*), and a correspondence relationship is set as indicated by broken lines δ and ϵ. A display position and a display size of a playback/display object (included in a primary video set PRMVS and a secondary video set SCDVS) indicative of picture information on a display screen in this manner are written by using the video attribute item element VABITM. As shown in FIG. 10, main video MANVD and sub video SUBVD exist as moving pictures displayed to a user exist in the primary video set PRMVS and the secondary video set SCDVS. A display screen position and size information in a screen displayed for a user in each of the main video MANVD and the sub video SUBVD can be specified by making reference to the corresponding video attribute item element VABITM from a main video element MANVD and a sub video element SUBVD in object mapping information OBMAPI (track number assignment information). That is, as shown in FIG. 84(*a*), when a value of an index number MDATNM of a corresponding media attribute element in media attribute information is specified as "1" in the main video element MANVD in the primary audio video clip element PRAVCP written in the object mapping information OBMAPI in title element information TTELEM existing in title information TTINFO in a playlist PLLST, the video attribute item element VABITM having a value of the media index number information being set to "1" can be specified as indicated by a broken line η. As a result, a display screen size and a display position of the main video MANVD are set as shown in FIG. 84(*c*). Likewise, in regard to a display screen size and a display position concerning sub video SUBVD in a secondary video set SCDVS, when a value of an index number MDATNM of a corresponding media attribute element in media attribute information in a sub video element SUBVD written in a secondary audio video clip element SCAVCP is set to "2", reference is made to a video attribute item element VABITM having a value of media index number information INDEX being set to "2" as shown in a relationship indicated by a broken line ξ, thereby specifying the display screen size and the display screen position of the corresponding sub video SUBVD in a screen displayed for a user as shown in FIG. 84(*c*). Moreover, in regard to audio information, likewise, when a value of media index number information INDEX in an audio attribute item element AABITM is specified in an main audio element MANAD or a sub audio element SUBAD, an attribute of the audio information can be specified. In a specific description example shown in FIG. 84(*a*), there is only one audio attribute item element AABITM existing in media attribute information MDATRI for convenience's sake, and a value of its media index number information INDEX is set to "1". In accordance with this configuration, three main audio elements MANAD each having a value of an index number MDATNM of a corresponding media attribute element in media attribute information being set to "1" are set in a primary audio video clip element PRAVCP, and respective pieces of track number information TRCKAT "1" to "3" are set with respect to the main audio elements MANAD. Additionally, likewise, a sub audio element SUBAD in which a value of an index number MDATNM of a corresponding media attribute element in media attribute information is set to "1" and a value of track number information TRCKAT is set to "4" is set in a secondary audio video clip element SCAVCP. Four audio track elements ADTRK are arranged in track navigation information TRNAVI in accordance with the track number information TRCKAT set in each of the main audio element MANAD and the sub audio element SUBAD, and an audio language code, an audio language code extension descriptor ADLCEX and a flag USIFLG indicative of whether user selection is enabled are written in each audio track element ADTRK, thereby facilitating selection of an audio track by a user. It is to be noted that each main audio element MANAD and each sub audio element SUBAD in the object mapping information OBMAPI (the track number assignment information) and the audio track element ADTRK in the track navigation information TRNAVI are linked to each other through the track number information TRCKAT (the audio track number ADTKNM), and such an associating relationship as indicated by broken lines θ, ι, λ and κ is provided. Further, a position and a size of the application region APPRGN representing the advanced application ADAPL in the display screen shown in FIG. 84(*c*) are written in the manifest file MNFST. That is, a value of a canvas coordinate CNVCRD at an upper left end position of the application region APPRGN shown in FIG. 84(*c*) is expressed as (Xr, Yr). Furthermore, as shown in FIG. 84(*c*), a width in the application region APPRGN is represented as rwidth, and a height in the same is represented as rheight. A coordinate value (Xr, Yr) of the canvas coordinate system CNVCRD at an upper left end of the application region APPRGN is written as "Xr" and "Yr" in the region element RGNELE in the manifest file MNFST.XMF as indicated by a broken line ν. Furthermore, likewise, the width rwidth and the height rheight of the application region APPRGN are written in the form of a value of width attribute information and a value of height attribute information in the region element RGNELE in the application element, and an association relationship is indicated by alternate long and short dash lines ξ and π. Moreover, information of a file name and a storage position (a path) of the manifest file MNFST shown in FIG. 84(*b*) is written in an application resource element APRELE written in an ApplicationSegment APPLSG in object mapping information OBMAPI written in title element information TTELEM existing in title information TTINFO in a playlist PLLST depicted in FIG. 84(*a*), and FIG. 84 shows its relationship by an alternate long and short dash line μ. Additionally, a display position and a display size of each graphic object (a content element) in each application region APPRGN from the play button 35 to the FF button 38 shown in FIG. 84(*c*) are written in a markup file MRKUP. Further, a file name and a storage position (a path) of the markup file MRKUP.XMU are written in src attribute information in a markup element MRKELE in a manifest file MNFST (an application element).

Effects of the above-described embodiments can be simply summed up as follows.

1. Fetching necessary contents at a predetermined timing in advance in accordance with management information can effect simultaneous playback/display of a plurality of playback/display objects without interrupting playback/display for a user.

2. Providing timing control information for playback/display according to a time axis in the management information enables complicated programming concerning a display start/display end timing of moving pictures or a switching timing of moving pictures/animation, and the expression for a user can be greatly improved as compared with a current web page screen.

Figure 85:
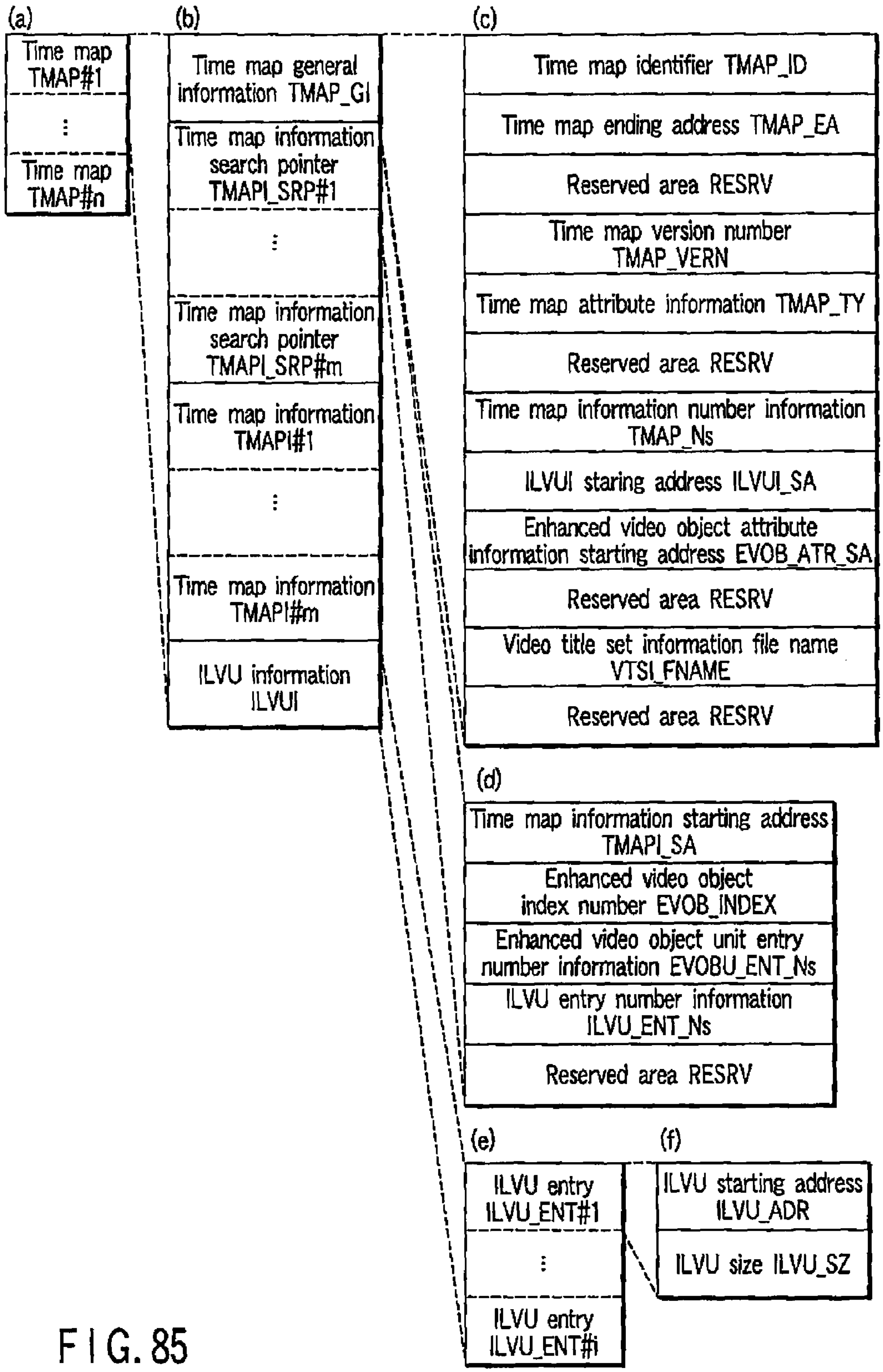
FIG. 85 is a diagram to help explain the data structure of the time map in a primary video set according to the embodiment.

As shown in FIG. 12, the present embodiment has such a structure that the playlist PLLST refers to the time map PTMAP of the primary video set and the time map PTMAP of the primary video set refers to enhanced video object information EVOBI. Moreover, the embodiment has such a structure that the enhanced video object information EVOBI can refer to a primary enhanced video object P-EVOB and that accessing is done sequentially by way of the path of playlist PLLST→time map PTMAP of primary video set→enhanced video object information EVOBI→primary enhanced video object P-EVOB and then the reproduction of the primary enhanced video object data P-EVOB is started. The concrete contents of the time map PTMAP in the primary video set referred to by the playlist PLLST of FIG. 12 will be explained. As shown in FIG. 54(*c*), a field in which an index information file storage location SRCTMP (src attribute information) of a representation object to be referred to is to be written exists in a primary audio-video clip element PRAVCP in the playlist PLLST. In information to be written in the index information file storage location SRCTMP (src attribute information) of the representation object to be referred to, the storage location (path) of the time map PTMAP of the primary video set and its file name are to be written as shown in FIG. 18. This makes it possible to refer to the time map PTMAP of the primary video set. FIG. 85 shows a detailed data structure of the time map PTMAP of the primary video set.

<Video Title Set Time Map Information (VTS TMAP)>

Video Title Set Time Map Information (VTS_TMAP) consists of one or more Time Map (TMAP) which is composed of a file, as shown in FIG. 85(*a*).

The TMAP consists of TMAP General Information (TMAP_GI), one or more TMAPI Search Pointer (TMAPI_SRP), same number of TMAP Information (TMAPI) as TMAPI_SRP and ILVU Information (ILVUI), if this TMAP is for Interleaved Block.

TMAP Information (TMAPI), an element of TMAP, is used to convert from a given presentation time inside an EVOB to the address of an EVOBU or a TU. A TMAPI consists of one or more EVOBU/TU Entries. One TMAPI for one EVOB which belongs to Contiguous Block shall be stored in one file, and this file is called as TMAP.

On the other hand, TMAPIs for EVOBs which belong to the same Interleaved Block shall be stored in one same file.

The TMAP shall be aligned on the boundary between Logical Blocks. For this purpose each TMAP may be followed by up to 2047 bytes (containing '00h')

More intelligible explanations will be provided below.

Information written in the time map file PTMAP of the primary video set shown in FIG. 12 is called video title set time map information VTS_TMAP. In the embodiment, the video title set time map information VTS_TMAP is composed of one or more time maps TMAP (PTMAP) as shown in FIG. 85(*a*). Each of the time maps TMAP (PTMAP) is composed of a file. As shown in FIG. 85(*b*), in the time map TMAP (PTMAP), there exist time map general information TMAP_GI, one or more time map information search pointers TMAPI_SRP, and as many pieces of time map information TMAPI as there are time map information search pointers TMAPI_SRP. When the time map TMAP (PTMAP) corresponds to the time map TMAP (PTMAP) of an interleaved block, ILVU information ILVUI exists in the time map TMAP (PTMAP). Time map information TMAPI constituting a part of the time map TMAP (PTMAP) is used to convert the display time specified in the corresponding primary enhanced video object data P-EVOB into a primary enhanced video object unit P-EVOBU or the address of a time unit TU. Although the contents of the time map information are not shown, they are composed of one or more enhanced video object unit entries EVOBU_ENT or one or more time unit entries. In the enhanced video object unit entry EVOBU_ENT, information on each enhanced video object unit EVOBU is recorded. That is, in an enhanced video object unit entry EVOBU_ENT, the following three types of information are recorded separately:

1. Size information 1STREF_SZ on a first reference picture (e.g., I picture) in the corresponding enhanced video object unit: Written in the number of packs 2. Playback time EVOBU_PB_TM of the corresponding enhanced video object unit EVOBU: Expressed in the number of video fields 3. Size EVOBU_SZ information on the corresponding enhanced video object unit: Expressed in the number of packs.

A piece of time map information TMAPI corresponding to a primary enhanced video object P-EVOB recorded as a continuous "block" in an information storage medium DISC has to be recorded as a single file. The file is called a time map file TMAP (PTMAP). In contrast, each piece of time map information TMAPI corresponding to a plurality of primary enhanced video objects constituting the same interleaved block has to be recorded collectively in a single file for each interleaved block.

<TMAP General Information (TMAP_GI)>

(1) TMAP ID

Describes "HDDVD_TMAP00" to identify Time Map file with character set code of ISO 8859-1.

(2) TMAP EA

Describes the end address of this TMAP with RLBN from the first LB of this TMAP.

(3) TMAP VERN

Describes the version number of this TMAP.

TMAP version . . . 0001 0000b: version 1.0

Others: reserved (4) TMAP TY

Application type . . . 0001b: Standard VTS

0010b: Advanced VTS

001lb: Interoperable VTS

Others: reserved

ILVUI . . . 0b: ILVUI doesn't exist in this TMAP, i.e. this TMAP is for Contiguous Block or others.

1b: ILVUI exists in this TMAP, i.e. this TMAP is for Interleaved Block.

ATR . . . 0b: EVOB_ATR doesn't exist in this TMAP, i.e. this TMAP is for Primary Video Set.

1b: EVOB_ATR exists in this TMAP, i.e. this TMAP is for Secondary Video Set. (This value is not allowed in TMAP for Primary Video Set.)

Angle . . . 00b: No Angle Block

01b: Non Seamless Angle Block

10b: Seamless Angle Block

11b: reserved

Note: The value '01b' or '10b' in "Angle" may be set if the value of "Block" in ILVUI='1b'.

(5) TMAPI_Ns

Describes the number of the TMAPIs in this TMAP.

Note: If this TMAPI is for an EVOB which belongs to Contiguous Block in Standard VTS or Advanced VTS, or to Interoperable VTS, this value shall be set to '1'.

(6) ILWI_SA

Describes the start address of the ILVUI with RBN from the first byte of this TMAP.

If the ILVUI does not exist in this TMAP (i.e. the TMAP is for Contiguous Block in Standard VTS or Advanced VTS, or for Interoperable VTS), this value shall be filled with '1b'.

(7) EVOB_ATR_SA

Describes the start address of the EVOB_ATR with RBN from the first byte of this TMAP.

This value shall be filled with '1b' because this TMAP for Primary Video Set (Standard VTS and Advanced VTS) and Interoperable VTS doesn't include EVOB_ATR.

(8) VTSI_FNAME

Describes the filename of VTSI which this T IAP refers, in ISO 8859-1.

Note: If the length of filename is less than 255, unused fields shall be filled with '0b.

More intelligible explanations will be provided below.

FIG. 85(*c*) shows the data structure of time map general information TMAP_GI shown in FIG. 85. A time map identifier TMAP_ID is information written at the beginning of the time map file of a primary video set. Therefore, as information to identify the file as a time map file PTMAP, "HDDVD_TMAP00" is written in the time map identifier TMAP_ID. The time map end address TMAP_EA is written using the number of relative logical blocks RLBN (Relative Logical Block Number), counting from the first logical block. In the case of the contents corresponding to the HD-DVD-Video written standards version 1.0, "0001 000b" is set as the value of the time map version number TMAP_VERN. In time map attribute information TMAP_TY, application type, ILVU information, attribute information, and angle information are written. When "0001b" is written as application type information in the time map attribute information TMAP_TY, this indicates that the corresponding time map is a standard video title set VTS. When "0010b" is written, this indicates that the corresponding time map is an advanced video title set VTS. When "0011b" is written, this indicates that the corresponding time map is an interoperable video title set. In the embodiment, an interoperable video title set can rewrite the images recorded according to the HD_VR standard to ensure the compatibility with the HD_VR standard, a video recording standard capable of recording, reproducing, and editing, differently from the HD_DVD-Video standard, a playback-only video standard, and make the resulting data structure and management information reproducible under the playback-only HD_DVD-Video standards. What is obtained by rewriting the management situation and a part of the object information related to the video information and its management information recorded according to the HD_VR standard which enables recording and editing is called interoperable content. Its management information is called an interoperable video title set VTS. (For details, refer to the captions in FIG. 87.) When the value of ILVU information ILVUI in the time map attribute information TMAP_TY is "0b," this indicates that ILVU information ILVUI does not exist in the corresponding time map TMAP (PTMAP). In this case, the time map TMAP (PTMAP) indicates a time map TMAP (PTMAP) corresponding to primary enhanced video object data P-EVOB recorded in a form other than consecutive blocks or interleaved blocks. When the value of the ILVU information ILVUI is "1b," this indicates that ILVU information ILVUI exists in the corresponding time map TMAP (PTMAP) and that the corresponding time map TMAP (PTMAP) corresponds to an interleaved block. When the value of attribute information ATR in the time map attribute information TMAP_TY is "0b," this indicates that enhanced video object attribute information EVOB_ATR does not exist in the corresponding time map TMAP (PTMAP) and that the corresponding time map TMAP (PTMAP) corresponds to a primary video set PRMVS. When the value of attribute information ATR in the time map attribute information TMAP_TY is "1b," this indicates that enhanced video object attribute information EVOB_ATR exists in the corresponding time map TMAP and that the corresponding time map TMAP corresponds to the time map STMAP corresponding to a secondary video set SCDVS. Moreover, when the value of angle information ANGLE in time map attribute information TMAP_TY is "00b," this indicates that there is no angle block. When the value of angle information ANGLE is "01b," this indicates that the angle block is not seamless (or such that the angle cannot be changed continuously at the time of angle change). When the value of angle information ANGLE is "10b," this indicates that the angle block is seamless (or such that the angle can be changed seamlessly (continuously). A value of "11b" is reserved for a reserved area. When the value of ILVU information ILVUI in the time map attribute information TMAP_TY is set to "1b," the value of the angle information ANGLE is set to "01b" or "10b." The reason is that, when there is no multi-angle in the embodiment (or when there is no angle block), the corresponding primary enhanced video object P-EVOB does not constitute an interleaved block. In contrast, when a primary enhanced video object P-EVOB has multi-angle video information (or there is an angle block), the corresponding primary enhanced video object P-EVOB constitutes an interleaved block. Information on the number of pieces of time map information TMAPI_Ns indicates the number of pieces of time map information TMAPI in a time map TMAP (PTMAP). In the embodiment of FIG. 85(*b*), since an n number of pieces of time map information TMAPI exist in time map TMAP (PTMAP) #1, "n" is set in the value of the information on the number of pieces of time map information TMAPI_Ns. In the embodiment, under the following conditions, "1" must be set in the value of the information on the number of pieces of time map information TMAPI_Ns:

- When time map information TMAPI is shown for a primary enhanced video object P-EVOB belonging to consecutive blocks in a standard video title set
- When time map information TMAPI corresponds to a primary enhanced video object P-EVOB included in consecutive blocks in an advanced video title set
- When time map information TMAPI corresponds to a primary enhanced video object P-EVOB belonging to an interoperable video title set Specifically, in the embodiment, when a primary enhanced video object P-EVOB constitutes an interleaved block, not consecutive blocks, time map information TMAPI is set in each interleaved unit or at each angle, enabling conversion into an address to be accessed (from specified time information) for each interleaved unit or at each angle, which enhances the convenience of access.

Furthermore, the starting address ILVUI_SA of ILVUI is written in the number of relative bytes (Relative Byte Number), counting from the first byte in the corresponding time map file TMAP (PTMAP). If ILVU information ILVUI is absent in the corresponding time map TMAP (PTMAP), the value of the starting address ILVUI_SA of ILVUI has to be filled in with the repetition of "1b." That is, in the embodiment, the field ILVUI_SA of the starting address of ILVUI is supposed to be written in 4 bytes. Accordingly, when ILVU information is not present in the corresponding time map TMAP (PTMAP) as described above, all the first 4-byte field is filled with "1b." Moreover, as described above, when ILVU information ILVUI is not present in the time map TMAP (PTMAP) as described above, this means the time map TMAP (PTMAP) corresponding to consecutive blocks in a standard video title set or advanced video title set, or interoperable video title set. The starting address EVOB_ATR_SA of enhanced video object attribute information arranged next is written in the number of relative bytes RBN (Relative Byte Number), counting from the starting byte in the corresponding time map file TMAP (PTMAP). In the embodiment, since there is no enhanced video object attribute information EVOB_ATR in the time map TMAP (PTMAP) of the primary video set PRMVS, all the field (4 bytes) of the starting address EVOB_ATR_SA of the enhanced video object attribute information has to be filled with "1b." Although the space in the starting address EVOB_ATR_SA of the enhanced video object attribute information is seemingly meaningless, the data structure of time map general information TMAP_GI shown in FIG. 85(*c*) is caused to coincide with the data structure of time map general information TMAP_GI in the time map of the secondary video set shown in FIG. 88(*c*), thereby making the data structure common to both of them, which helps simplify the data processing in the advanced content playback section ADVPL. Using FIG. 12, explanation has been given to the case where the time map PTMAP of the primary video set can refer to the enhanced video object information EVOBI. As information used to refer to the enhanced video object information EVOBI, the file name VTSI_FNAME of video title set information shown FIG. 85(*c*) exists. The fill-in space of the file name VTSI_FNAME of video title set information is set to 255 bytes. If the length of the file name VTSI_FNAME of video title set information is shorter than 255 bytes, all the remaining part of the 255-byte space must be filled with "0b."

<TMAPI Search Pointer (TMAPI_SRP)>

(1) TMAPI_SA

Describes the start address of the TMAPI with RBN from the first byte of this TMAP.

(2) EVOB_INDEX

Describes the index number of this EVOB which this TMAPI refers. This value shall be same as that of EVOB_INDEX in VTS_EVOBI of the EVOB which the TMAPI refers, and shall be different from that of other TMAPIs.

Note: This value shall be '1' to '1998'.

(3) EVOBU_ENT_Ns

Describes the number of EVOBU_ENT for the TMAPI.

(4) ILVU_ENT_Ns

Describes the number of ILVU_ENT for the TMAPI.

If the ILVUI does not exist in this TMAP (i.e. the TMAP is for Contiguous Block in Standard VTS or Advanced VTS, or Interoperable VTS), this value shall be set to '0'.

More intelligible explanations will be provided below.

FIG. 85(*d*) shows the data structure of a time map information search pointer TMAPI_SRP shown in FIG. 85(*b*). The starting address TMAPI_SA of time map information is written in the number of relative bytes RBN (Relative Byte Number), counting from the starting byte in the corresponding time map file TMAP (PTMAP). The index number EVOB_INDEX of the enhanced video object represents the index number of the enhanced video object EVOB referred to by the corresponding time map information TMAPI. The value of the index number EVOB_INDEX of the enhanced video object shown in FIG. 85(*d*) is caused to coincide with the value set in the index number EVOB_INDEX of the enhanced video object in video title set enhanced video object information VTS_EVOBI shown in FIG. 86(*d*). Moreover, the index number EVOB_INDEX of the enhanced video object shown in FIG. 85(*d*) has to be set to a value different from the value set according to different time map information TMAPI. This causes a unique value (or a different value from the value set in another time map information search pointer TMAPI_SRP) to be set in each time map information search pointer TMAPI_SRP. Here, any value in the range from "1" to "1998" has to be set as the value of the index number EVOB_INDEX of the enhanced video object. In the following information on the number of enhanced video object unit entries EVOBU_ENT_Ns, information on the number of enhanced video object unit entries EVOBU_ENT present in the corresponding time map information TMAPI is written. Moreover, in information on the number of ILVU entries ILVU_ENT_Ns, information on the number of ILVU entries ILVU_ENT_Ns written in the corresponding time map TMAP (PTMAP) is written. In the example of FIG. 85(*e*), since an i number of ILVU entries are present in time map TMAP (PTMAP) #1, a value of "i" is set as the value of information on the number of IVLU entries ILVU_ENT_Ns. For example, when a time map TMAP (PTMAP) corresponding to consecutive blocks (or uninterleaved blocks) in an advanced video title set or consecutive blocks in a standard video title set or an interoperable video title set has been written, there is no ILVU information ILVUI in the time map TMAP (PTMAP). Therefore, the value of information on the number of ILVU entries ILVU_ENT_Ns is set to "0." FIG. 85(*e*) shows the data structure of ILVU information ILVUI.

<ILVU Information (ILVUI)>

ILVU Information is used to access each Interleaved Unit (ILVU).

ILVUI starts with one or more ILVU Entries (ILVU_ENTs). This exists if the TMAPI is for Interleaved Block.

More intelligible explanations will be provided below.

The ILVU information ILVUI is used to access each interleaved unit ILVU. The ILVU information ILVUI is composed of one or more ILVU entries ILVU_ENT. The ILVU information ILVUI exists only in the time map TMAP (PTMAP) which manages the primary enhanced video objects P-EVOB constituting an interleaved block. As shown in FIG. 85(*f*), each ILVU entry ILVU_ENT is composed of a combination of the starting address ILVU_ADR of ILVU and the ILVU size ILVU_SZ. The starting address of ILVU is represented by a relative logical block number RLBN, counting from the first logical block in the corresponding primary enhanced video object P-EVOB. The ILVU size ILVU_SZ is written using the number of the enhanced video object units EVOBU constituting an ILVU entry ILVU_ENT.

Figure 86:
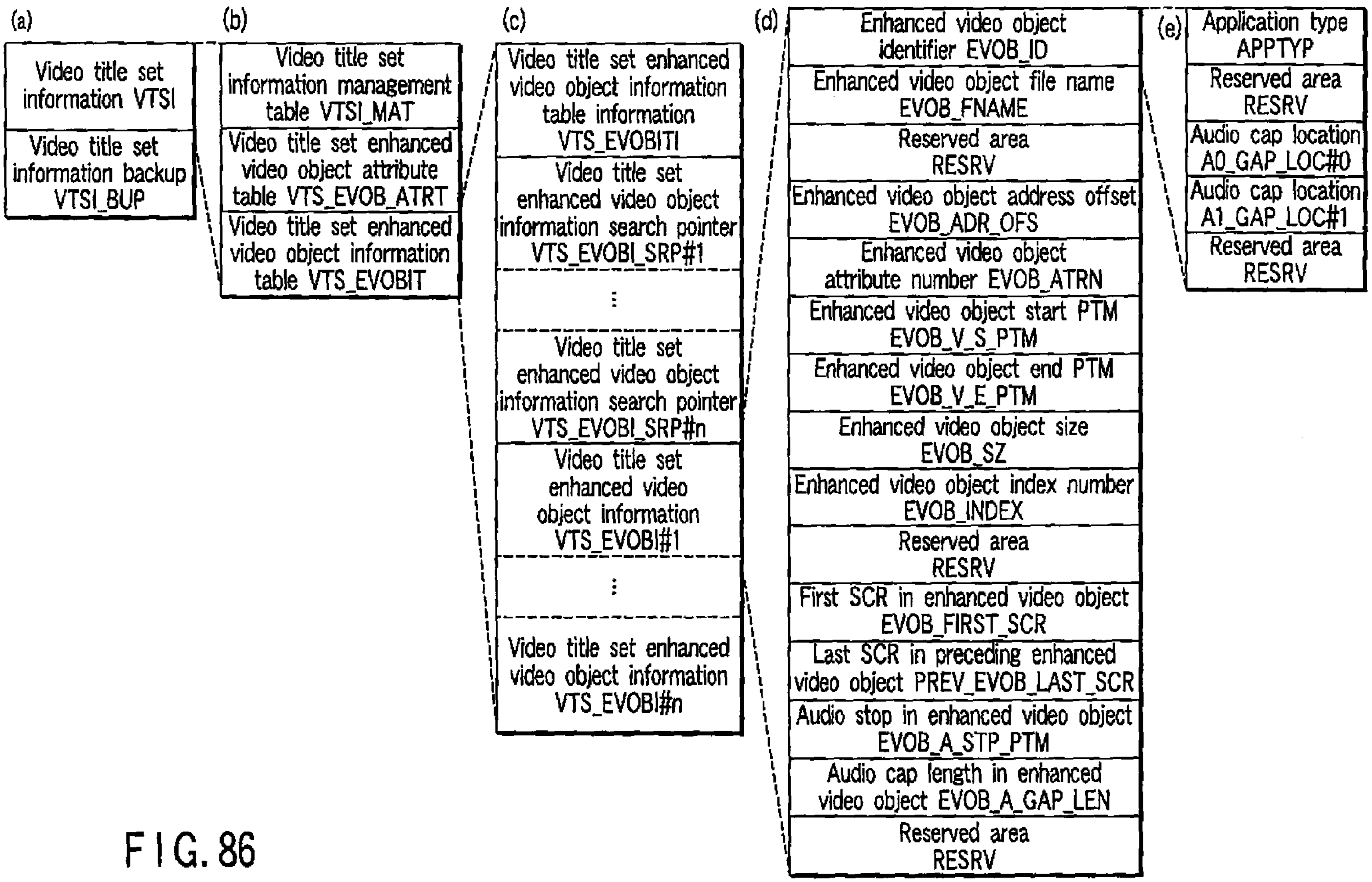
FIG. 86 is a diagram to help explain the data structure of management information in a primary video set according to the embodiment.

As shown in FIG. 12, to reproduce the data in the primary enhanced video object P-EVOB, the playlist PLLST refers to the time map PTMAP of the primary video set and then further refers to enhanced video object information EVOBI in the time map PTMAP of the primary video set. The enhanced video object information EVOBI referred to by the time map PTMAP of the primary video set includes the corresponding primary enhanced video object P-EVOB, which makes it possible to reproduce the primary enhanced video object data P-EVOB. FIG. 85 shows the data structure of the time map PTMAP of the primary video set. The data in the enhanced video object information EVOBI has a data structure as shown in FIG. 86(*d*). In the embodiment, the enhanced video object information EVOBI shown in FIG. 12 means the same thing as that meant by the video title set enhanced video object information VTS_EVOBI shown in FIG. 86(*c*). The primary video set PRMVS is basically stored in an information storage medium DISC as shown in FIG. 10 or FIG. 25. As shown in FIG. 10, the primary video set PRMVS is composed of primary enhanced video object data P-EVOB showing primary audio video PRMAV and its management information.

<Primary Video Set>

Primary Video Set may be located on a disc.

Primary Video Set consists of Video Title Set Information (VTSI) (see 6.3.1 Video Title Set Information (VTSI)), Enhanced Video Object Set for Video Title Set (VTS_EVOBS), Video Title Set Time Map Information (VTS TMAP), backup of Video Title Set Information (VTSI_BUP) and backup of Video Title Set Time Map Information (VTS_TMAP_BUP).

More intelligible explanations will be provided below.

Figure 87:
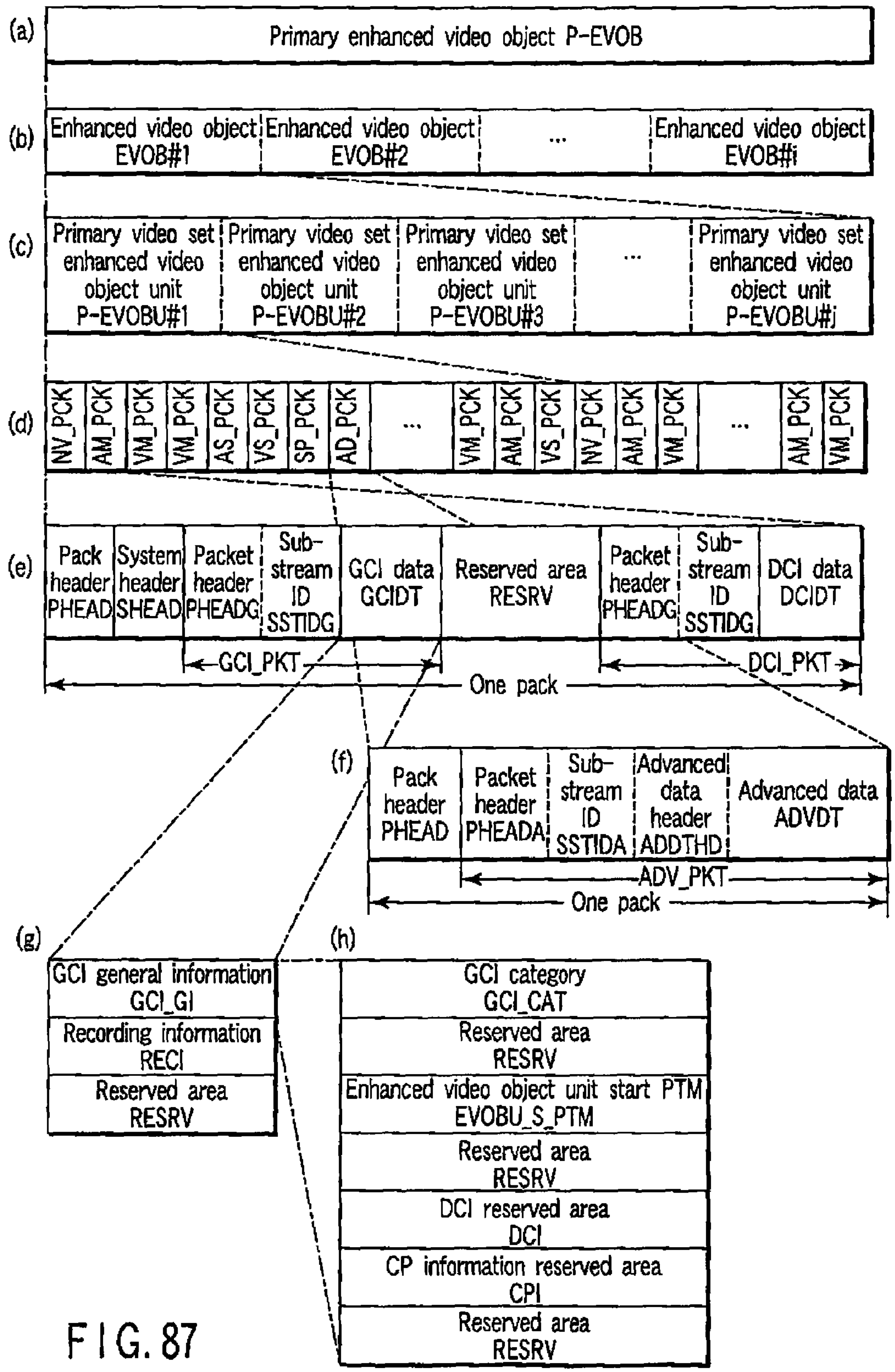
FIG. 87 is a diagram to help explain the data structure of a primary enhanced video object according to the embodiment.

The primary video set PRMVS is composed of video title set information VTSI having a data structure shown in FIG. 86, enhanced video object data P-EVOB having a data structure shown in FIG. 87 (an enhanced video object set VTS_EVOBS in a video title set), video title set time map information VTS_TMAP having a data structure shown in FIG. 85, and video title set information backup VTSI_BUP shown in FIG. 86(*a*). In the embodiment, the data type related to the primary enhanced video object P-EVOB shown in FIG. 87(*a*) is defined as primary audio video PRMAV shown in FIG. 10. All of the primary enhanced video objects P-EVOB constituting a set are defined as an enhanced video object set VTS_EVOBS in a video title set.

<Video Title Set Information (VTSI)>

VTSI describes information for one Video Title Set, such as attribute information of each EVOB.

The VTSI starts with Video Title Set Information Management Table (VTSI_MAT), followed by Video Title Set Enhanced Video Object Attribute Information Table (VTS_EVOB ATRT), followed by Video Title Set Enhanced Video Object Information Table (VTS EVOBIT).

Each table shall be aligned on the boundary between Logical Blocks.

For this purpose each table may be followed by up to 2047 bytes (containing '00h').

More intelligible explanations will be provided below.

For example, information about a video title set in which attribute information on each primary enhanced video object P-EVOB is placed is written in video title set information VTSI shown in FIG. 86(*a*). As shown in FIG. 86(*b*), a video title set information management table VISI_MAT is placed at the beginning of the video title set information VTSI, followed by a video title set enhanced video object attribute table VTS_EVOB_ATRT. At the end of video title set information VTSI, a video title set enhanced video object information table VTS_EVOBIT is arranged. The boundary positions of various pieces of information shown in FIG. 86(*b*) have to coincide with the boundary positions of logical blocks. For each piece of information to end at the boundary between the logical blocks, for example, "00h" is inserted into all the remaining part of the number so that the number may end just at a logical block when a number in each table has exceeded 2047 bytes, which sets the beginning position of each piece of information in such a manner that it never fails to coincide with the beginning position of the logical block. In the video title set information management table VISI_MAT shown in FIG. 86(*b*), the following pieces of information are written:

1. Size information about video title set and video title set information VTSI

2. Starting address information about each piece of information in video title set information VTSI 3. Attribute information about an enhanced video object set EVOBS in a video title set VTS Furthermore, in the video title set enhanced video object attribute table VTS_EVOB_ATRT shown in FIG. 86(*b*), attribute information defined in each primary enhanced video object P-EVOB in a primary video set PRMVS is written.

<Video Title Set Enhanced Video Object Information Table (VTS EVOBIT)>

In this table the information for every EVOB under the Primary Video Set shall be described.

The table starts with VTS EVOBIT Information (VTS EVOBITI) followed by VTS_EVOBI Search Pointers (VTS_EVOBI_SRPs), followed by VTS_EVOB Information (VTS_ EVOBIs).

The contents of VTS EVOBITI, one VTS EVOBI_SRP and one VTS EVOBI are shown in FIG. 86.

More intelligible explanations will be provided below.

In the video title set enhanced video object information table VTS_EVOBIT shown in FIG. 86(*b*), management information about each item of primary enhanced video object data P-EVOB in a primary video set PRMVS is written. As shown in FIG. 86(*c*), the structure of the video title set enhanced video object information table is such that video title set enhanced video object information table information VTS_EVOBITI is placed at the beginning, followed by a video title set enhanced video object information search pointer VTS_EVOBI_SRP and video title set enhanced video object information VTS_EVOBI in that order.

FIG. 86(*d*) shows the structure of the video title set enhanced video object information VTS_EVOBI. FIG. 86(*e*) shows an internal structure of an enhanced video object identifier EVOB_ID written at the beginning of the video title set enhanced video object information VTS_EVOBI shown in FIG. 86(*d*). At the beginning of the enhanced video object identifier EVOB_ID, information on the application type APPTYP is written. When "0001b" is written in this field, this means that the corresponding enhanced object is Standard VTS (standard video title set). When "0010b" is written in the field, this means that the corresponding enhanced object is Advanced VTS (advanced video title set). When "0011b" is written in the field, this means that the corresponding enhanced object is interoperable VTS (interoperable title set). A value other than these is set as a reserved value. In audio gap locations A0_GAP_LOC, A1_GAP_LOC, information on a 0-th audio stream is written in audio gap location #0A0_GAP_LOC#1. Information on an audio gap related to a first audio stream is written in audio gap location #1A1_GAP_LOC#0. When the values of the audio gap locations AO GAP LOC#0, A1_GAP_LOC#1 are "00b," this means that there is no audio gap. When the values are "01b," this means that there is an audio gap in the first enhanced video object unit EVOBU of the corresponding enhanced video object EVOB. When the values are "10b," this means that there is an audio gap in the second enhanced video object unit EVOBU counted from the beginning of the enhanced video object. When the values are "11b," this means that there is an audio gap in the third enhanced video object unit EVOBU counted from the beginning of the enhanced video object.

As shown in FIG. 12, a file in which primary enhanced video object data P-EVOB to be reproduced has been recorded is specified in the enhanced video object information EVOBI. This has been explained already. As shown in FIG. 12, a primary enhanced video object file P-EVOB is specified using the enhanced video object file name EVOB_FNAME written in the second place of FIG. 86(*d*) in the enhanced video object information EVOBI (video title set enhanced video object information VTS_EVOBI). On the basis of the information, enhanced video object information EVOBI (video title set enhanced video object information VTS_EVOBI) is related to the primary enhanced video object file P-EVOB. This makes not only the playback process easier but also makes the editing process very easy, since the primary enhanced video object file P-EVOB to be reproduced can be changed easily by just changing the value of the enhanced video object file name EVOB_FNAME. If the data length of a file name written in the enhanced video object file name EVOB_FNAME is 255 bytes or less, the remaining blank space in which the file name has not been written has to be filled with "0b." Moreover, if the primary enhanced video object data P-EVOB specified as the enhanced video object file name EVOB_FNAME is composed of a plurality of files in the standard video title set VTS, only a file name in which the smallest number has been set is specified. If the corresponding primary enhanced video object data P-EVOB is included in a standard video title set VTS or an interoperable video title set VTS in the enhanced video object address offset EVOB_ADR_OFS, the starting address of the corresponding primary enhanced video object P-EVOB is written using a relative logical block number RLBN from the logical block first set in the corresponding enhanced video object set EVOBS. In the embodiment, as shown in FIG. 87(*d*), each pack PCK unit coincides with the logical block unit and 2048 bytes of data are recorded in one logical block. Moreover, if the corresponding primary enhanced video object data P-EVOB is included in the advanced video title set VTS, all of the field of the enhanced video object address offset EVOB_ADR_OFS is filled with "0b."

In the enhanced video object attribute number EVOB_ATRN, the enhanced video object attribute number EVOB_ATRN used in the corresponding primary enhanced video object data P-EVOB is set. Any value in the range from "1" to "511" must be written as the set number. Moreover, in the enhanced video object start PTM EVOB_V_S_PTM, the presentation start time of the corresponding primary enhanced video object data P-EVOB is written. The time representing the presentation start time is written in units of 90 kHz. In addition, the enhanced video object end PTM EVOB_V_E_PTM represents the presentation end time of the corresponding primary enhanced video object data P-EVOB and is expressed in units of 90 kHz.

The following enhanced video object size EVOB_SZ represents the size of the corresponding primary enhanced video object data P-EVOB and is written using the number of logical blocks.

The following enhanced video object index number EVOB_INDEX represents information on the index number of the corresponding primary enhanced video object data P-EVOB. The information must be the same as the enhanced video object index number EVOB_INDEX in the time map information search pointer TMAPI_SRP of the time map information TMAPI. Any value in the range from "1" to "1998" must be written as the value.

Furthermore, in the first SCR EVOB_FIRST_SCR in the enhanced video object, the value of SCR (system clock) set in the first pack in the corresponding primary enhanced video object data P-EVOB is written in units of 90 kHz. If the corresponding primary enhanced video object data P-EVOB belongs to an interoperable video title set VTS or an advanced video title set VTS, the value of the first SCR EVOB_FIRST_SCR in the enhanced video object becomes valid and the value of seamless attribute information (see FIG. 54(*c*)) in the playlist is set to "true." In the "last-minute enhanced video object last SCR PREV_EVOB_LAST_SCR" written next, the value of SCR (system clock) written in the last pack of the primary enhanced video object data P-EVOB to be reproduced at the last minute is written in units of 90 kHz. Moreover, only when the primary enhanced video object P-EVOB belongs to an interoperable video title set VTS, the value becomes valid and seamless attribute information in the playlist is set to "true." In addition, the audio stop PTM EVOB_A_STP_PTM in the enhanced video object represents the audio stop time in an audio stream and is expressed in units of 90 kHz. Moreover, the audio gap length EVOB_A_GAP_LEN in the enhanced video object represents the audio gap length for the audio stream.

FIG. 87 shows the data structure of the primary enhanced video object P-EVOB referred to by the enhanced video object information as shown in FIG. 12.

The primary enhanced video object P-EVOB shown in FIG. 87(*a*) is composed of one or more enhanced video objects EVOB as shown in FIG. 87(*b*). The enhanced video object EVOB is composed of enhanced video object units P-EVOBU in one or more (a plurality of) primary video sets. Each of the enhanced video object units P-EVOBU in the primary video set is a collection of various 2048-byte packs. Various streams are multiplexed in packs. As shown in FIG. 87(*d*), at the head of the enhanced video object unit P-EVOBU of each primary video set, a navigation pack NV_PCK never fails to be placed. As shown in FIG. 10, the primary audio video PRMAV constituting a primary video set PRMVS has such a structure as includes a main video stream MANVD, a main audio stream MANAD, a sub-video stream SUBVD, a sub-audio stream SUBAD, and a sub-picture stream SUBPT. The main video stream MANVD is multiplexed in such a manner that it is packed in the main video pack VM_PCK. The main audio stream MANAD is recorded in the main audio pack AM_PCK. The sub-video stream SUBVD is recorded in a sub-video pack VS_PCK. The sub-audio stream SUBAD is recorded in a sub-audio pack AS_PCK. The sub-picture stream SUBPT is recorded in a sub-picture pack SP_PCK. In an advanced pack ADV_PCK shown in FIG. 87(*d*), information about the advanced application ADAPL or advanced subtitle ADSBT in the advanced content ADVCT is recorded in a distributed manner. As shown in FIG. 87(*f*), in the data structure of the advanced pack ADV_PCK, a pack header PHEAD, a packet header PHEADA, a sub-stream corresponding to an advanced pack ADV_PCK, an advanced data header ADDTHD, and advanced data ADVDT are arranged in that order. Moreover, as shown in FIG. 87(*e*), the data structure of the navigation pack NV_PCK is such that a pack header PHEAD is placed at the head, followed by a system header SHEAD. Behind the system header, a packet header PHEADG corresponding to GCI data GCIDT and a sub-stream IDSSTIDG corresponding to the GCI data GCIDT are arranged in that order. At the end of the navigation pack NV_PCK, DSI data DSIDT is placed. In front the DSI data, a sub-stream IDSSTIDD corresponding to the DSI data DSIDT and a packet header PHEADD corresponding to the DSI data DSIDT are arranged in that order. Moreover, as shown in FIG. 87(*g*), in the GCI data GCIDT, data on GCI general information GCI_GI and recording information RECI are recorded. In the recording information RECI, information on ISRC (international standard recording code) related to video data, audio data, and sub-picture data are written. The GCI general information GCI_GI shown in FIG. 87(*g*) is composed of a GCI category GCI_CAT, enhanced video object unit start PTMEVOBU_S_PTM, DCI reserved area DCI, and CP information reversed area CPI as shown in FIG. 87(*h*).

The embodiment is characterized in that a GCI (general control information) packet GCI_PKT is set in the navigation pack NV_PCK. The details of the effect produced by this setting will be explained below.

As shown in FIG. 1, the information recording and reproducing apparatus 1 of the embodiment comprises:

Advanced content playback section ADVPL which reproduces advanced contents ADVCT Standard content playback section STDPL which reproduces standard contents STDCT Recording and reproducing section 4 which is for recording, reproducing, and editing video contents that can be recorded, reproduced, and edited The advanced content playback section ADVPL has the structure explained in FIG. 14 to FIG. 44. The playlist PLLST, playback management information in the advanced content ADVCT, has a data structure as explained in FIG. 21 to FIG. 84. The standard content STDCT has a data structure giving importance to the compatibility with the existing DVD-Video standard (or has a similar structure to a data structure where both management information and object data are based on the existing DVD-Video standard, which makes it easier to ensure compatibility). In the embodiment, it is assumed that there exists an HD_VR (High Definition Video Recording) standard that prescribes the data structure of a video object the information recording and reproducing apparatus 1 can record, reproduce, or edit and the data structure of management information about the video object (or used to manage playback sequence or the like). The HD_VR standard has not become publicly known yet. The existence of an HD_VR standard which enables high-quality (or high-resolution) images to be recorded, reproduced, or edited is assumed and technical improvements are made to ensure the compatibility between the HD_VR standard and representation object data and the data structure related to its management information. This is a part of the characteristic of the embodiment. As a standard which enables standard picture-quality (or standard resolution) images to be recorded, reproduced, or edited, there exists the Video Recording standard laid down in a DVD forum. The data structure prescribed there has been disclosed in, for example, Jpn. Pat. No. 3,050,317. The HD_VR standard assumed in the embodiment has a similar structure to the existing Video Recording standard, thereby ensuring high compatibility. A dedicated playback standard for standard picture quality (or standard resolution) has already been set as the DVD-Video standard in the DVD forum. The data structure prescribed in the existing DVD-Video standard has a structure as shown in, for example, Jpn. Pat. No. 2,875,233, which causes the problem of low-degree of compatibility with the existing Video Recording standard. To solve the problem and improve the compatibility between the advanced content ADVCT and the content prescribed in the HD_VR standard, the embodiment combines the following:

1. Setting a GCI (general control information) packet GCI_PKT

2. Setting an interoperable video title set

3. Setting flags for distiguishing an advanced video title set, an interoperable video title set, and a standard video title set The concrete locations in which the flags for discriminating between an advanced video title set, an interoperable video title set, and a standard video title set are placed correspond to, for example, "application type information" set in time map attribute information TMAP_TY of FIG. 85(*c*), "application type information APPTYP" set in the enhanced video object identifier EVOB_ID of FIG. 86(*e*), and "application type information" set in time map attribute information TMAP_TY of FIG. 88(*c*) (refer to the description of each figure for details). Recognizing the contents of the discrimination flag in advance makes it possible to promptly know the difference between the data structures of various objects or between the data structures of their management information in the advanced content playback section ADVPL. As a result, it is possible to advance the playback start time of the target content in the advanced content playback section ADVPL.

Next, the setting of an interoperable video title set will be explained. The recording and reproducing section 4 of the information recording and reproducing apparatus 1 of FIG. 1 records, reproduces, and edits the video object and its management information recorded on an information storage medium DISC according to the HD_VR standard assumed in the embodiment. The embodiment is characterized in that, at that time, the advanced content playback section ADVPL converts the video object and its management information recorded according to the HD_VR standard in the recording and reproducing section 4 at the user's request into a reproducible format. A representation object and its management information after the conversion of the video object and its management information recorded according to the HD_VR standard by the advanced content playback section ADVPL into a reproducible format are collectively called "an interoperable video title set." In the embodiment, as playback management information after the conversion, a playlist PLLST having a data structure as explained in FIG. 21 to FIG. 84 is newly created in the recording and reproducing section 4. This improves the compatibility between the advanced content ADVCT and the content prescribed in the HD_VR standard.

As described above, a playlist PLLST can be created with relative ease in the recording and reproducing section 4. However, it takes huge amounts of time to change the data structure of the video object recorded in the information storage medium DISC. The embodiment is characterized in that, to save the huge amounts of time, setting a GCI (general control information) packet GCI_PKT causes the data structure of the video object recorded according to the HD_VR standard to coincide with that of the representation object in the advanced content ADVCT. As in the existing Video Recording standard, in a video object in the HD_VR standard, there is an RDI (Real-time Data Information) pack at the head of an enhanced video object unit EVOBU. In the RDI pack, a pack header, a system header, and a GCI packet are arranged in that order, beginning from the head. According to this, in a representation object reproducible in the advanced content playback section ADVPL of the embodiment (or a representation object in an interoperable video title set), there is a navigation pack NV_PCK at the head of an enhanced video object unit P-EVOBU of the primary video set as shown in FIG. 87(*d*) and FIG. 87(*e*). In the navigation pack NV_PCK, a pack header PHEAD, a system header SHEAD, and a GCI packet GCI_PKT are arranged in that order, beginning from the head. In the HD_VR standard, an RDI (Real-time Data Information) packet is placed immediately behind the GCI packet GCI_PKT, followed by a padding packet. In a representation object in the interoperable video title set, the PDI packet location is set in a reserved area RESRV as shown in FIG. 87(*e*), followed by a DSI (Data Search Information) packet DSI_PKT. With this arrangement, even if the representation object recorded according to the HD_VR standard is changed directly to a representation object in the interoperable video title set (without any modification), the RDI packet location is regarded as a reserved area RESRV when viewed from the primary enhanced video object P-EVOB and the DSI packet DSI_PKT is considered to be absent, which enables the advanced content playback section ADVPL to carry out a reproducing process. The embodiment is not limited to the above method and may use the following method: information to be recorded in a DSI (Data Search Information) packet DSI_PKT is recorded in the RDI packet in advance when a video object is recorded onto an information storage medium DISC according to the HD_VR standard, information in the DSI packet DSI_PKT is created using information recorded in the RDI packet when the information is changed to a representation object in the interoperable video title set, and the DSI packet DSI_PKT may be additionally recorded in the representation object already recorded on the information storage medium DISC. The DSI packet DSI_PKT additionally recorded this way is composed of a packet header PHEADD, a sub-stream IDSSTIDD, and DSI data DSIDT as shown in FIG. 87(*e*).

The GCI packet GCI_PKT in the HD_VR standard is composed of a packet header, a sub-stream ID, and GCI data. In the GCI data, there is GCI general information. In the GCI general information, GCI category information, the start presentation time of a video object unit, display control information, and content protection information are recorded. To ensure the compatibility with a video object recorded according to the HD_VR standard, a primary enhanced video object P-EVOB of the embodiment (a representation object or an interoperable content in the interoperable video title set) is composed of a packet header PHEADG, a sub-stream IDSSTIDG, and GCI data GCIDT as shown in FIG. 81(*e*). As shown in FIG. 87(*g*), in the primary enhanced video object P-EVOB of the embodiment (the representation object in the interoperable video title set), not only GCI general information GCI_GI but also recording information RECI are placed in the GCI data GCIDT as in the HD_VR standard. Moreover, in the GCI general information GCI_GI in the primary enhanced video object P-EVOB of the embodiment (the representation object or the interoperable content in the interoperable video title set), not only are a GCI category GCI_CAT and the start PTM (presentation time) of an enhanced video object unit EVOBU_S_PTM recorded, but also a DCI (display control information) reserved area DCI and a CP (content protection or copy protection) information reserved area CPI exist according to the HD_VR standard. In the embodiment, in the DCI (display control information) reserved area DCI, display control information DCI complying with the HD_VR standard may be recorded. At the same time, content protection CP information is allowed to be recorded in the CP (content protection or copy protection) information reserved area CPI. The data structure of a representation object in an interoperable video title set has been explained. A primary enhanced video object P-EVOB (representation object) in an advanced content ADVCT (advanced content video title set) has also a GGI packet GCI_PKT structure shown in FIG. 87(*e*) to FIG. 87(*h*). Accordingly, the data structure of a representation object in the advanced video title set coincides with the data structure of a representation object in the interoperable video title set, which produces the effect of ensuring the compatibility between them during the reproduction.

<GCI General Information (GCI_GI)>

GCI_GI is the information on GCI.

(1) GCI_CAT

Describes the EVOBU category of this GCI.

EVOBU_CAT

00b: This EVOBU belongs to Standard Content.

01b: This EVOBU belongs to Advanced Content.

10b: This EVOBU belongs to Interoperable Content.

11b: reserved (2) EVOBU_S_PTM

Describes the presentation start time of the video data in EVOBU in which this GCI is included by a predetermine format. This is the presentation start time of the first picture in display order of the first PAU (Picture Access Unit) in EVOBU. When video data does not exist in the EVOBU, the presentation start time of imaginary video data is described. This time is aligned on a grid defined by the video field period.

Presentation start time=EVOBU_S_PTM [31. .0]/90000 [second]

(3) DCI

Describes Display Control Information in case of Interoperable Content. This field shall be set to '0' in case of Standard Content and Advanced Content.

(4) CPI

Describes Content Protection Information.

More intelligible explanations will be provided below.

In the GCI category GCI_CAT, the category related to an enhanced video object unit in the corresponding primary video set is written. Specifically, if the value written in the GCI category GCI_CAT is "00b," this means that an enhanced video object unit P-EVOBU in the corresponding primary video set belongs to standard contents STDCT. If the value is "01b," this means that an enhanced video object unit P-EVOBU in the corresponding primary video set belongs to advanced contents ADVCT. If the value is "10b," this means that an enhanced video object unit P-EVOBU in the corresponding primary video set belongs to interoperable contents. Start PTM EVOBU_S_PTM of the enhanced video object unit represents the presentation time of video data in an enhanced video object unit P-EVOBU of the primary video set including the GCI data GCIDT. The value is expressed in units of 90 kHz. If there is no video data in the corresponding enhanced video object unit P-EVOBU (or if only audio information is included as playback data), the presentation start time for virtual video data is written as the value. Hereinafter, a DCI reserved area DCI will be explained. If an enhanced video object EVOB including the GCI data GCIDT is interoperable content, display control information is written in the DCI reserved area DCI. If an enhanced video object EVOB including the GCI data GCIDT is standard content STDCT or advanced content ADVCT, all of the DCI reserved area DCI is filled with "0." In the CP information reserved area CPI, information to prevent the unauthorized copying of the corresponding content (or copy protection information or content protection information) is written. As a result, it is possible to prevent an unauthorized copy of the corresponding content using the information written in the CP information reserved area CPI, which makes it possible to ensure the reliability of the user or content provider who has stored the contents.

As shown in FIG. 12, in the primary video set PRMVS, a primary enhanced video object P-EVOB is reached by way of the time map PTMAP of the primary video set and enhanced video object information EVOBI, starting from the playlist. A part of the management information used to manage object information in the existing DVD-Video has a similar structure to that of the enhanced video object information EVOBI shown in FIG. 12. Accordingly, setting enhanced video object information EVOBI and a primary enhanced video object P-EVOB separately in the primary video set PRMVS makes it possible to use a structure similar to a structure that combines object information and management information in the existing DVD-Video, which provides the advantage of making it easy to ensure the compatibility between the primary video set PRMVS and the existing DVD-Video. As shown in FIG. 10, the recording place of the representation objects in the primary video set PRMVS is limited to the inside of the information storage medium DISC. Therefore, it is relatively easy to reproduce the time map PTMAP of the primary video set, enhanced video object information EVOBI, and primary enhanced video objects P-EVOB from the same storage medium DISC. In contrast, as shown in FIG. 10, the secondary video set SCDVS enables representation objects to be recorded into not only the information storage medium DISC but also a persistent storage PRSTR or a network server NTSRV. As shown in FIG. 25, the secondary video set SCDVS is stored temporarily in the data cache DTCCH before reproduction and then is read from the data cache into the secondary video player SCDVP, which plays back the secondary video set. In this way, the secondary video set SCDVS may be taken in by the data cache DTCCH in advance. Therefore, the smaller the number of various files constituting the secondary video set SCDVS, the easier the process of storing data into the data cache DTCCH. That is, as in the primary video set PRMVS of FIG. 12, various files, including the time map PTMAP of the primary video set, enhanced video object information EVOBI, and primary enhanced video objects P-EVOB, are arranged, which makes complicated the process of storing data into the data cache DTCCH temporarily. As shown in FIG. 12, the embodiment is characterized in that, in the secondary video set SCDVS, the information in the time map file PTMAP of the primary video set PRMVS and the information in the enhanced video object information file EVOBI in the primary video set PRMVS are put together and recorded into a time map file STMAP of a secondary video set, thereby reducing the number of hierarchical levels by one (or reducing the three hierarchical levels to two hierarchical levels) as compared with the primary video set PRMVS. This improves the convenience of the process of storing data temporarily into the data cache DTCCH of the secondary video set SCDVS. Specifically, in the embodiment, as shown in FIG. 12, the time map STMAP of the secondary video set is referred to from the playlist PLLST in the secondary video set SCDVS and the secondary enhanced video object S-EVOB is referred to directly from the time map STMAP of the secondary video set.

Figure 88:
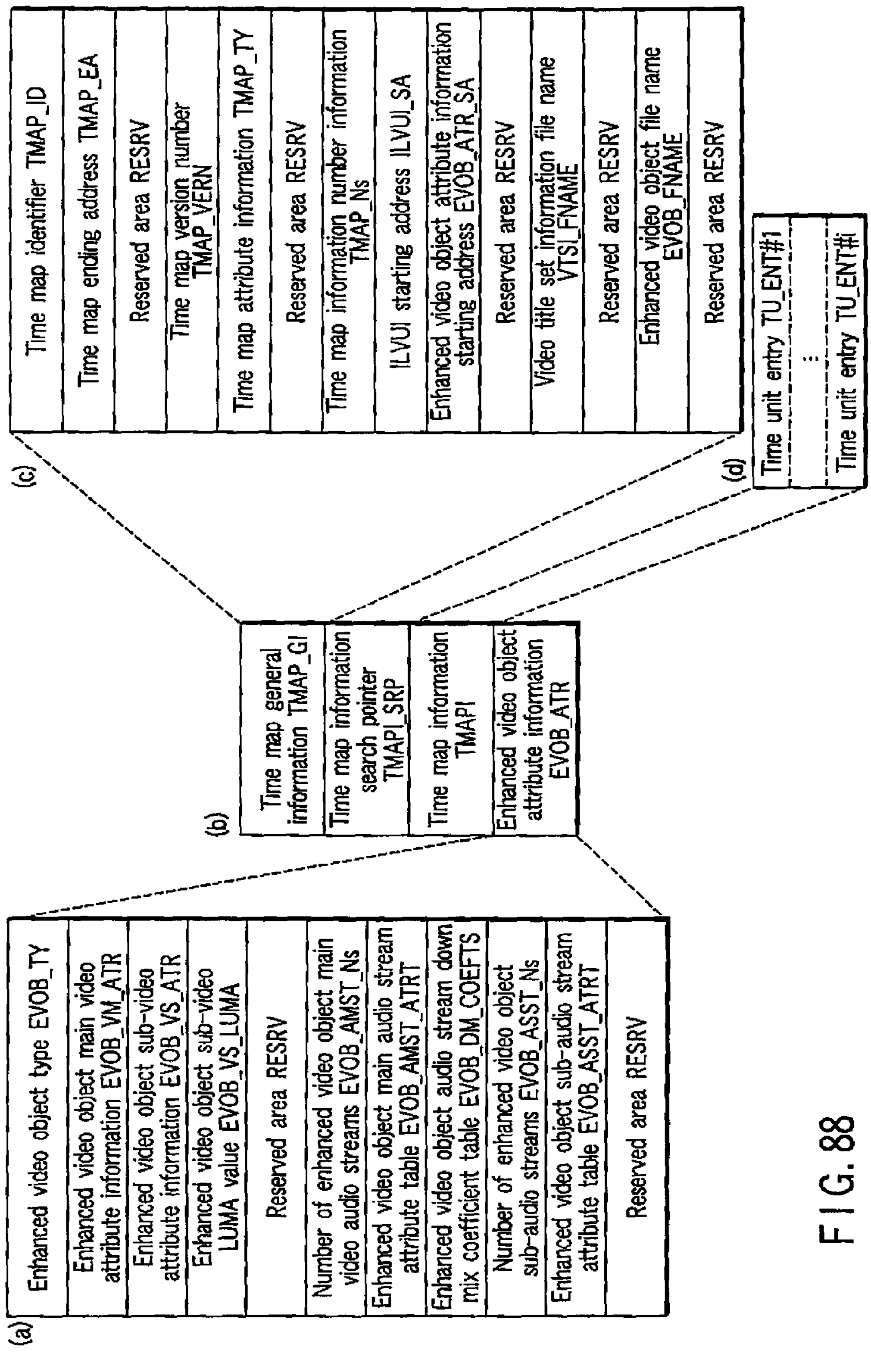
FIG. 88 is a diagram to help explain the data structure of the time map in a secondary video set according to the embodiment.

Hereinafter, a method of referring to the time map STMAP of the secondary video set from the playlist PLLST will be explained. As shown in FIG. 10, the secondary video set SCDVS includes substitute audio video SBTAV, substitute audio SBTAD, and secondary audio video SCDAV. As shown in FIG. 18, management information about the secondary audio video SCDAV is written using a secondary audio video clip SCAVCP in the playlist PLLST. A substitute audio clip element SBADCP that manages the substitute audio SBTAD is written in the playlist PLLST. A substitute audio video clip SBAVCP that manages the substitute audio video SBTAV is written in the playlist PLLST. As shown in FIG. 54(*d*) and FIGS. 55(*c*) and 55(*d*), in each of the secondary audio video clip element SCAVCP, substitute audio video clip element SBAVCP, and substitute audio clip element SBADCP, there is a field in which "index information file storage SRCTMP (src attribute information) for a representation object to be referred to" is to be written. As shown in FIG. 18, in the "index information file storage SRCTMP (src attribute information) for a representation object to be referred to," the storage location (path) of the time map file STMAP of the secondary video set and a file name are written. As shown in FIG. 88(*c*), the time map STMAP in the secondary video set includes information on the file name EVOB_FNAME of the enhanced video object. Using the file name EVOB_FNAME of the enhanced video object makes it possible to refer to the corresponding secondary enhanced video object S-EVOB from the time map STMAP of the secondary video set as shown in FIG. 12. FIG. 88 shows a detailed data structure of the time map STMAP of the secondary video set.

<Time Map (TMAP)>

Time Map (IMAP) consists of TMAP General Information (TMAP_GI), zero or one TMAPI Search Pointer (TMAPI_SRP), same number of TMAP Information (TMAPI) as TMAPI_SRP and one EVOB Attribution (EVO-B_ATR).

More intelligible explanations will be provided below.

As shown in FIG. 88(*b*), the time map STMAP of the secondary video set is composed of time map general information TMAP_GI, no or one time map information search pointer TMAPI_SRP, as many pieces (no or one) of time map information TMAPI as the number of the time map information search pointers TMAPI_SRP, and one piece of enhanced video object attribute information EVOB_ATR.

FIG. 88(*c*) shows a detailed structure of the time map general information TMAP_GI shown in FIG. 88(*b*). The data structure of the time map general information TMAP_GI of FIG. 88(*c*) is such that the file name EVOB_FNAME of the enhanced video object is added to the time map general information TMAP_GI in the time map TMAP (PTMAP) corresponding to the primary video set shown in FIG. 85(*c*). A time map identifier TMAP_ID shown in FIG. 88(*c*) is information put at the beginning of the time map file STMAP in the secondary video set. In the time map identifier TMAP_ID, "HDDVD_TMAP00" is written, which makes it possible to identify the time map file STMAP of the secondary video set as a time map file. The ending address TMAP_EA of the time map is written using RLBN (relative Logical Block Number) representing the number of logical blocks relative to the first logical block in the corresponding time map file STMAP. As shown in FIG. 87 or FIG. 89, the individual video streams and audio streams in a representation object are recorded in each pack PCK in such a manner that they are packaged and multiplexed. The size of each of the packs PCK coincides with the logical block size and is set in units of 2048 bytes. Therefore, RLBN (Relative Logical Block Number) representing the number of relative logical blocks represents the length of a 1048-byte unit.

The version number of the corresponding STMAP can be known from the version number TMAP VERN of the time map. As in the time map attribute information TMAP_TY of FIG. 85(*c*), in time map attribute information TMAP_TY, application type APPTYP, ILVU information ILVUI, attribute information ATR, and angle information ANGLE are written. According to the time map STMAP of the secondary video set, "0100b" has to be set as information on the application type APPTYP. Since in the embodiment, ILVU (an interleaved unit in an interleaved block) is not defined in the secondary video set SCDVS, "0b" has to be set as the value of the ILVU information ILVUI. As for the attribute information ATR, "1b" has to be set to show the time map STMAP of the secondary video set. Moreover, since in the embodiment, the concept of multi-angle is not determined in the secondary video set SCDVS, "00b" has to be set as the angle information ANGLE in the time map STMAP of the secondary video set. As described above, since no or only one piece of time map information TMAPI can be placed in the time map STMAP of the secondary video set, either "0" or "1" has to be set as the value set in information on the number of time map information TMAPI_Ns. In the embodiment, for example, when streaming related to music live contents is written in the secondary video set SCDVS, time map information TMAPI may be unnecessary. Therefore, it is possible to set "0" as the value set in information on the number of time map information TMAPI_Ns. Moreover, since the concept (interleaved block) of interleaved units ILVU is not set in the secondary video set SCDVS, all of the starting address ILVUI_SA (4 bytes) of ILVUI has to be filled with "1b. The starting address EVOB_ATR_SA of the enhanced video object attribute information is written using the number of relative bytes RBN (Relative Byte Number), counting from the first byte in the corresponding time map STMAP. The aforementioned RLBN (Relative Logical Block Number) is written using the number of logical blocks in each of which 2048 bytes of data can be recorded, whereas the RBN (Relative Byte Number) is written using the number of relative bytes.

Next, the file name VTSI_FNAME of the video title set information shown in FIG. 88(*c*) will be explained. As described above, the data structure of the time map general information TMAP_GI of FIG. 88(*c*) in the time map STMAP of the secondary video set is such that the file name EVOB_FNAME of the enhanced video object is added to the data structure of the time map general information TMAP_GI in the time map TMAP (PTMAP) of the primary video set. This makes the data structure common to the time map TMAP (PTMAP) of the primary video set and the time map STMAP of the secondary video set, which causes the advanced content playback section ADVPL to use the reproducing process in both of the time maps and simplify the process. As shown in FIG. 12, in the time map PTMAP of the primary video set, enhanced video object information EVOBI is referred to, whereas in the time map STMAP of the secondary video set, the secondary enhanced video object S-EVOB is directly referred to. Therefore, information on the file name VTSI_VNAME of the video title set information is meaningless in the time map STMAP of the secondary video set. Accordingly, in the embodiment, as the value of the file name VTSI_FNAME of the video title set information of FIG. 88(*c*), "1b" is put repeatedly in the 255-byte field in which data is to written.

Furthermore, the file name EVOB_FNAME of the enhanced video object of FIG. 88(*c*) represents the file name of the secondary enhanced video object S-EVOB referred to by the time map STMAP of the corresponding secondary video set and is designed to be written in 255 bytes. When the length of the secondary enhanced video object file S-EVOB is shorter than 255 bytes, "0b" is put repeatedly in the remaining part of the file name written.

<TMAPI Search Pointer (TMAPI_SRP)>

Note: This data doesn't exist in the TMAP if the value of TMAPI_Ns='0'.

(1) TMAPI_SA

Describes the start address of the TMAPI with RBN from the first byte of this TMAP.

(2) EVOBU_ENT_Ns

Describes the number of EVOBU_ENT (for EVOB including Video stream) or TU_ENT (for EVOB excluding Video stream) for the TMAPI.

More intelligible explanations will be provided below.

In addition, the structure of the information in the time map information search pointer TMAPI_SRP of FIG. 88(*b*) is simplified in such a manner that only the starting address TMAP_A of the time map information in the time map information search pointer TMAPI_SRP of the time map TMAP (PTMAP) of the primary video set shown in FIG. 85(*d*) and information on the number of secondary video sets EVO-BU_ENT_Ns are written, thereby reducing the amount of data in the time map STMAP of the secondary video set. The starting address TMAP_SA of the time map information is written using RBN (Relative Byte Number), the number of relative bytes counted from the first byte of the time map file STMAP of the secondary video set. Moreover, in the information on the number EVOBU_ENT_Ns of enhanced video object unit entries, information on the number of enhanced video object unit entries EVOBU_ENT included in the corresponding time map information TMAPI is written (when a video stream is included in the secondary enhanced video object S-EVOB) or information on the number of time unit entries TU_ENT is written (when no video stream is included in the secondary enhanced video object S-EVOB).

<TMAP Information (TMAPI)>

In case of EVOB including Video stream, TMAPI consists of one or more EVOBU Entries (EVOBU_ENTs). In case of EVOB excluding Video stream, TMAPI consists of one or more TU Entries.

Note: This data doesn't exist in the TMAP if the value of TMAPI_Ns='0'.

More intelligible explanations will be provided below.

When there is a video stream in the secondary enhanced video object S-EVOB referred to by the time map STMAP of the secondary video set, one or more enhanced video object unit entries EVOBU_ENT (not shown) are written in the time map information TMAPI shown in FIG. 88(*b*). In contrast, when there is no video stream in the secondary enhanced video object S-EVOB referred to by the time map STMAP of the secondary video set, the time map information TMAPI is composed of one or more time unit entries TU_ENT as shown in FIG. 88(*d*).

<EVOBU Entry (EVOBU ENT)>

1STREF_SZ . . . Describes the size of the 1st Reference Picture of this EVOBU. The size of the 1st Reference Picture is defined as the number of packs from the first pack of this EVOBU to the pack which includes the last byte of the first encoded reference picture (the first I-Coded-Frame) of this EVOBU.

EVOBU_PB_TM . . . Describes the Playback Time of this EVOBU, which is specified by the number of video fields in this EVOBU.

EVOBU_SZ . . . Describes the size of this EVOBU, which is specified by the number of packs in this EVOBU.

More intelligible explanations will be provided below.

When the time map information TMAPI is composed of one or more enhanced video object unit entries EVOBU_ENT, size information on a first reference picture (I picture frame) 1STREF_SZ included in the corresponding enhanced video object unit, playback time EVOBU_PB_TM of the corresponding enhanced video object unit EVOBU, and data size EVOBU_SZ of the corresponding enhanced video object unit EVOBU are written in the enhanced video object unit entry EVOBU_ENT as described in FIG. 85.

<TU Entry (TU_ENT)>

TU DIFF . . . Describes the Playback Time of this TU in 90 kHz unit. Playback Time means the difference between PTS of first frame in this TU and PTS of first frame in next TU. If this TU is last TU in the EVOB, Playback is defined as the difference between PTS of first frame in this TU and PTS of last frame in this TU.

TU_SZ . . . Describes the size of this TU, which is specified by the number of packs in this TU.

More intelligible explanations will be provided below.

In a time unit entry TU_ENT shown in FIG. 88(*d*), playback time TU_DIFF of the corresponding time unit entry and the data size TU_SZ of the time unit are written. The playback time TU_DIFF of the time unit is represented using the count in units of 90 kHz. As the playback time in the time unit, the difference value between the value of a presentation time stamp PTS set in the first frame in the corresponding time unit and a presentation time stamp PTS set in the first frame in the next time unit TU is written. When the time unit TU corresponding to the time unit entry TU_ENT is the time unit TU placed at the end of the secondary enhanced video object S-EVOB, the value of the playback time TU_DIFF is set as the difference value between the presentation time stamp value PTS of the first frame in the corresponding time unit and the presentation time stamp value of the last frame in the same time unit TU. Moreover, size information TU_SZ on the time unit TU is represented by the number of various packs constituting the corresponding time unit TU.

<EVOB Attribution (EVOB_ATR)>

(1) EVOB_TY

Describes the type of Secondary Video Set and existence of Sub Video stream and Sub Audio stream.

CONT_TY . . . 0001b: Substitute Audio including AM_PCK

0010b: Secondary Audio Video including VS_PCK

0100b: Secondary Audio Video including AS_PCK

0110b: Secondary Audio Video including VS_PCK/AS_PCK

1001b: Substitute Audio Video including VM_PCK/AM_PCK

Others: reserved

Note: Substitution of Audio Video is used for substitution of Main Video stream and Main Audio in Primary Video Set. Substitution Audio is used for substitution of Main Audio stream in Primary Video Set. Secondary Audio Video is used for addition or substitution of Sub Video stream and Sub Audio stream in Primary Video Set.

(2) EVOB_VM_ATR

Describes the Main Video attribute of the EVOB, which is defined for Main Video stream attribute in VTS_EVOB_ATR (2) EVOB_VM_ATR.

If Main Video stream does not exist in the EVOB, this field shall be filled with '0b'.

(3) VOB_VS_ATR

Describes the Sub Video attribute of the EVOB, which is defined for Sub Video stream attribute in VTS_EVOB_ATR (3) EVOB_VS_ATR.

If Sub Video stream does not exist in the EVOB, this field shall be filled with 'Ob'.

(4) EVOB_VS_LUMA

Describes luma value for Sub Video stream, which is defined in VTS_EVOB_ATR (4) EVOB_VS_LUMA.

This value is valid only in case that this EVOB contains Sub Video stream and its luma attribute, 'Luma flag' in EVOB_VS_ATR is '1b'. Otherwise, this field shall be filled with 'Ob'.

(5) EVOB_AMST Ns

Describes the number of Main Audio streams in an EVOB, which is defined in VTS_EVOBATR (5) EVOB_AMST_Ns.

If Main Audio stream does not exist in the EVOB, this field shall be filled with 'Ob'.

(6) EVOB_AMST_ATRT

Describes each Main Audio attribute of the EVOB, which is defined for Main Audio stream attribute in VTS_EVOB_ATR (6) EVOB_AMST_ATRT.

If Main Audio stream does not exist in the EVOB, this field shall be filled with '0b'.

(7) EVOB_DM_COEFT

Describes down-mix coefficient table for Audio stream, which is defined in VTS_EVOB_ATR (7) EVOB_DM_COEPTS.

On the area of the Audio stream whose "Number of Audio channels" is not 'multichannel', this field shall be filled with '0b'.

(8) EVOB_ASST_Ns

Describes the number of Sub Audio streams in an EVOB, which is defined in VTS_EVOB_ATR (8) EVOB_ASST_Ns.

(9) EVOB_ASST_ATRT

Describes each Sub Audio attribute of the EVOB, which is defined for Sub Audio stream attribute in VTS_EVOB_ATR (9) EVOB_ASST_ATRT.

If Sub Audio stream does not exist in the EVOB, this field shall be filled with '0b'.

More intelligible explanations will be provided below.

FIG. 88(*a*) shows the data structure of enhanced video object attribute information EVOB_ATR shown in FIG. 88(*b*). In enhanced video object type EVOB_TY placed at the beginning of the enhanced video object attribute information EVOB_ATR, type information on the secondary video set SCDVS, information on the presence or absence of a sub-video stream SUBVD, and information on the presence or absence of a sub-audio stream SUBAD are written. In the enhanced video object type EVOB_TY, there is control type information CONT_TY. If the value of the control type information CONT_TY is "0001b," the corresponding secondary enhanced video object S-EVOB is substitute audio SBTAD, which means that the substitute audio SBTAD includes a main audio pack AM_PCK in which main audio MANAD is written. If the value of the control type information CONT_TY is "0010b," this means that the corresponding secondary enhanced video object S-EVOB is secondary audio video SCDAV and the secondary audio video SCDAV includes sub-video SUBVD, which means that the secondary audio video includes a sub-video pack VS_PCK in which the sub-video SUBVD is recorded. Furthermore, if the value of the control type information CONT_TY is "0100b," this means that the corresponding secondary enhanced video object S-EVOB is secondary audio video SCDAV and the secondary audio video SCDAV includes a sub-audio stream SUBAD, which means that the secondary audio video includes a sub-audio pack AS_PCK in which the sub-audio stream SUBAD is recorded. Moreover, if the value of the control type information CONT_TY is "0110b," the corresponding secondary enhanced video object S-EVOB is secondary audio video SCDAV, which means that the secondary audio video SCDAV includes both a sub-video stream SUBVD and a sub-audio stream SUBAD and the sub-video stream SUBVD is recorded in a sub-video pack VS_PCK and the sub-audio stream SUBAD is recorded in a sub-audio pack AS_PCK (meaning that the sub-video pack VS_PCK and sub-audio pack AS_PCK are included in the secondary audio video SCDAV). In addition, if the value of the control type information CONT_TY is "1001b," the corresponding secondary enhanced video object S-EVOB is substitute audio video SBTAV, which means that the substitute audio video SBTAV includes both a main video stream MANVD and a main audio stream MANAD and the main video stream MANVD is recorded in a main video pack VM_PCK and the main audio stream MANAD is recorded in a main audio pack AM_PCK (meaning that the main video pack VM_PCK and main audio pack AM_PCK are included in the substitute audio video SBTAV). As shown in FIG. 10, the substitute audio video SBTAV can include only a main video stream MANVD and a main audio stream MANAD. Therefore, when the secondary enhanced video object S-EVOB referred to by the time map STMAP of the secondary video set indicates substitute audio video SBTAV, main video attribute information EVOB_VM_ATR on the enhanced video object shown in FIG. 88(*a*) and attribute information on the corresponding main video stream MANVD and main audio stream MANAD in the main audio stream attribute table EVOB_AMST_ATRT of enhanced video objects are written. As described above, since the substitute audio video SBTAV includes neither a sub-video stream SUBVD nor a sub-audio stream SUBAD, sub-video attribute information EVOB_VS_ATR on enhanced video objects and the sub-audio stream attribute table EVOB_ASST_ATRT of enhanced video objects are meaningless, each of them is filled with "0b." Moreover, as shown in FIG. 10, since the substitute audio SBTAD includes only main audio MANAD, when the secondary enhanced video object S-EVOB referred to by the time map STMAP of the secondary video set corresponds to substitute audio SBTAD, attribute information on the corresponding main audio stream MANAD is written in the main audio stream attribute table EVOB_AMST_ATRT of the enhanced video object. Since the main video attribute information EVOB_VM_ATR on enhanced video objects, sub-video attribute information EVOB_VS_ATR on enhanced video objects, and the sub-audio stream attribute table EVOB_ASST_ATRT of enhanced video objects are meaningless and are therefore all filled with "0b." Similarly, the secondary audio video SCDAV includes only sub-video streams SUBVD and sub-audio streams SUBAD and can include neither main video streams MANVD nor main audio streams MANAD. Therefore, when the secondary enhanced video object S-EVOB referred to by the time map STMAP of the secondary enhanced video set corresponds to secondary audio video SCDAV, sub-video attribute information EVOB_VS_ATR on enhanced video objects, attribute information on the sub-video stream SUBVD corresponding only to the sub-audio stream attribute table EVOB_ASST_ATRT of enhanced video objects, and attribute information on the corresponding sub-audio stream SUBAD are written. In this case, since meaningful data is not written in the main video attribute information EVOB_VM_ATR on enhanced video objects and in the main audio stream attribute table EVOB_AMST_ATRT of enhanced video objects, all of them are filled with "0b." Next, only when the corresponding secondary enhanced video object S-EVOB includes a sub-video stream SUBVD, a valid value is written in LUMA value EVOB_VS_LUMA related to sub-video of enhanced video objects. As shown in FIG. 10, only secondary audio video SCDAV exists in the secondary enhanced video object S-EVOB including a sub-video stream SUBVD. Therefore, when the second enhanced video object S-EVOB is composed of substitute audio video SBTAV or substitute audio SBTAD, all of the LUMA value EVOB_VS_LUMA related to sub-video of the enhanced video object has to be filled with "0b." If the corresponding secondary enhanced video object S-EVOB is secondary audio video SCDAV including sub-video SUBVD, the value of the control type information CONT_TY is set to "0010b" or "0110b" as described above, the LUMA attribute value of the sub-video stream SUBVD is written in the LUMA value EVOB_VS_LUMA related to sub-video of the enhanced video object, and the value of "LUMA flag" in the sub-video attribute information EVOB_VS_ATR on the enhanced video object is set to "1b." Moreover, if the secondary enhanced video object S-EVOB referred to by the time map STMAP of the secondary video set is substitute audio video SBTAV or substitute audio SBTAD including main audio streams MANAD, the number of main audio streams MANAD included there is written in the number of main audio streams EVOB_AMST_Ns of the enhanced video object.

Next, a down mix coefficient table EVOB_DM_COEFTS related to the audio streams of the enhanced video object shown in FIG. 88(*a*) will be explained. When the number of channels of the audio streams included in the secondary enhanced video object S-EVOB is "3" or more and an environment shown to the user has two channels (or is stereo), a down mix process has to be carried out. Information about the down mix coefficients necessary for the down mix process is written in a down mix coefficient table EVOB_DM_COEFTS related to audio streams of the enhanced video object.

Furthermore, if the secondary enhanced video object S-EVOB referred to by the time map STMAP of the secondary video set is secondary audio video SCDAV, information on the number of sub-audio streams SUBAD included in the secondary audio video SCDAV is written in the number of sub-audio streams EVOB_ASST_Ns of the enhanced video object. Next, information on the sub-audio stream attribute table EVOB_ASST_ATRT of the enhanced video object shown in FIG. 88(*a*) will be explained. As shown in FIG. 10, it is only in secondary audio video SCDAV that sub-audio streams SUBAD are included in the secondary enhanced video object S-EVOB. Only in this case, valid information is recorded in the sub-audio stream attribute table EVOB_ASST_ATRT of enhanced video objects. In other cases (or in a case where there is no sub-audio SUBAD in the secondary audio video SCDAV), since the sub-audio stream attribute table EVOB_ASST_ATRT of the enhanced video object has no meaningful information, it is all filled with "0b."

FIG. 89 shows the data structure of the secondary enhanced video object S-EVOB in the embodiment. FIG. 89(*a*) shows the data structure of a secondary enhanced video object S-EVOB including video streams. FIG. 89(*b*) shows the data structure of a secondary enhanced video object S-EVOB not including video streams. In both cases, when they are compared with the data structure of the primary enhanced video object P-EVOB shown in FIG. 87, neither a sub-picture pack SP_PCK nor an advanced pack ADV_PCK exists. As shown in FIG. 89(*a*), when a video stream is included, the secondary enhanced video object S-EVOB is composed of a collection of enhanced video object units S-EVOBU as is the primary enhanced video object P-EVOB shown in FIG. 87. As shown in FIG. 10, the secondary enhanced video object S-EVOB including video streams corresponds to either substitute audio video SBTAV or secondary audio video SCDAV. When the secondary enhanced video object S-EVOB is substitute audio video SBTAV, the substitute audio video SBTAV includes only main video streams MANVD and main audio streams MANAD as shown in FIG. 10, it is composed of only navigation packs NV_PCK, main audio packs AM_PCK, and main video packs VM_PCK as shown at the second row from the bottom of FIG. 89(*a*). When the secondary enhanced video object S-EVOB is secondary audio video SCDAV, only sub-video streams SUBVD and sub-audio streams SUBAD are included as shown in FIG. 10, the secondary enhanced video object S-EVOB is composed of only navigation packs NV_PCK, sub-audio packs AS_PCK, and sub-video packs VS_PCK as shown at the bottom row of FIG. 89(*a*).

Furthermore, when the secondary enhanced video object S-EVOB includes no video stream as shown in FIG. 89(*b*), the concept of enhanced video object units EVOBU does not hold. Therefore, in this case, data is managed using a time unit STUNIT for a secondary video set composed of a set of packs included in each specific time as a management unit in place of a secondary enhanced video object unit S-EVOBU. Therefore, the secondary enhanced video object S-EVOB not including video streams is composed of a set of secondary enhanced video set time units STUNIT as shown in FIG. 89(*b*). When the secondary enhanced video object S-EVOB is substitute audio video SBTAV or substitute audio SBTAD, the secondary enhanced video object S-EVOB includes only main audio streams MANAD. In this case, the secondary enhanced video object S-EVOB is composed of only navigation packs NV_PCK and main audio packs AM_PCK as shown at the second row from the bottom in FIG. 89(*b*). In contrast, when the secondary enhanced video object S-EVOB is secondary audio video SCDAV, the secondary audio video SCDAV includes only sub-audio streams SUBAD as shown in FIG. 10 (in a case where no video stream is included). In this case, the secondary enhanced video object S-EVOB is composed of only navigation packs NV_PCK and sub-audio packs AS_PCK as shown at the bottom row of FIG. 89(*b*).

The characteristic of the data structure of one element (xml descriptive sentence) written in the markup MRKUP of the embodiment will be explained using FIG. 90. FIG. 90(*c*) shows the basic data structure of a basic element (xml descriptive sentence). At the beginning of the first half of an element, content model information CONTMD is written, which makes it possible to identify the contents of each element. In the embodiment, FIG. 90 shows the description of the content model information CONTMD. The individual elements of the embodiment can be roughly classified into three types of vocabulary: a content vocabulary CNTVOC, a style vocabulary STLVOC, and a timing vocabulary TIMVOC. The content vocabulary CNTVOC includes area element AREAEL written as "area" in the writing location in the content model information CONTMD, body element BODYEL written as "body," br element BREKEL written as "br," button element BUTNEL written as "button," div element DVSNEL written as "div," head element HEADEL written as "head," include element INCLEL written as "include," input element INPTEL written as "input," meta element METAEL written as "meta," object element OBJTEL written as "object," p element PRGREL written as "p," root element ROOTEL written as "root," and span element SPANEL written as "span." The style vocabulary STLVOC includes styling element STNGEL written as "styling" in the writing location in the content model information CONTMD and style element STYLEL written as "style." The timing vocabulary TIMVOC includes animate element ANIMEL written as "animate" in the writing location in the content model information CONTMD, cue element CUEELE written as "cue," event element EVNTEL written as "event," defs element DEFSEL written as "defs," g element GROPEL written as "g," link element LINKEL written as "link," par element PARAEL written as "par," seq element SEQNEL written as "seq," set element SETELE written as "set," and timing element TIMGEL written as "timing." To indicate the range of the element, "</content model information CONTMD>" is placed as a back tag as shown in FIG. 90(*c*) at the end of the element. While in the structure of FIG. 90(*c*), the front tag and the back tag are separated in the same element, the element may be written using one tag. In this case, content model information CONTMD is written at the head of the tag and "/>" is placed at the end of the tag.

In the embodiment, content information CONTNT is written in the area sandwiched between the front tag and the back tag as shown in FIG. 90(*c*). As the content information CONTNT, the following two types of information can be written:

1. Specific element information
2. PC data (#PCDATA)

In the embodiment, as shown in FIG. 90(*a*), "1. Specific element information (xml descriptive sentence)" can be set as content information CONTNT. In this case, the element set as content information CONTNT is called "child element," whereas the element including the content information CONTNT is called "parent element." Combining attribute information on the parent element and attribute information on the child element makes it possible to represent various functions efficiently. As shown in FIG. 90(*c*), attribute information (attributes) is placed in the front tag in an element (xml descriptive sentence), thereby making it possible to set the attribute of the element. In the embodiment, the attribute information (attributes) is classified into "required attribute information RQATRI" and "optional attribute information OPATRI." The "required attribute information RQATRI" has contents that have to be written in a specified element. In the "optional attribute information OPATRI," the following two types of information can be recorded:

Attribute information which is set as standard attribute information in a specified element and may not be written in the element (xml descriptive sentence)

Information additionally written in the element (xml descriptive sentence) by extracting arbitrary attribute information from an attribute information table defined as optional information As shown in FIG. 90(*b*), the embodiment is characterized in that display or execution timing on the time axis can be set on the basis of "required attribute information RQATRI" in a specific element (xml descriptive sentence). Specifically, Begin attribute information represents the starting time MUSTTM of an execution (or display) period, dur attribute information is used to set the time interval MUDRTM of the execution (or display) period, and end attribute information is used to set the ending time MUENTM of the execution (or display) period. These pieces of information used to set display or execution time on the time axis makes it possible to set timing minutely in synchronization with a reference clock in displaying or executing the information corresponding to each element. With a conventional markup MRKUP, animations or moving pictures could be displayed and the timing of accelerating or slowing the playback time of the animations or moving pictures could be set. However, with the conventional display method, detailed control along a specific time axis (e.g., appearance or disappearance in the middle of processing or execution start or end in the middle of processing) could not be performed. Moreover, when a plurality of moving pictures and animations were displayed on a markup page MRKUP, the synchronous setting of the display timing of individual moving pictures and animations could not be done. In contrast, the embodiment is characterized in that, since display or execution timing on the time axis can be set minutely on the basis of "required attribute information RQATRI" in a specific element (xml descriptive sentence), minute control along the time axis can be performed, which was impossible in the conventional markup page MRKUP. Furthermore, in the embodiment, when a plurality of animations and moving pictures are displayed at the same time, they can be displayed in synchronization with one another, which assures the user of more detailed expressions. In the embodiment, as a reference time (reference clock) in setting the starting time MUSTTM (Begin attribute information) and ending time MUENTM (end attribute information) of the execution (or display) period or the time interval MUDRTM (dur attribute information) of the execution (or display) period, any one of the following can be set:

1. "Media clock" (or "title clock) representing a reference clock serving as a reference of the title timeline TMLE explained in FIG. 17

It is defined by the frame rate information FRAMRT (timeBase attribute information) in a title set element as shown in FIG. 23B(d)

2. "Page clock" set for each markup page MRKUP (the advance of time (the counting up of clocks) is started from when the corresponding markup page MRKUP goes into the active state)

It is defined by frequency information TKBASE (tickBase attribute information) on tick clocks used in a markup page as shown in FIG. 23B(d)

3. "Application clock" set for each application (the advance of time (the counting up of clocks) is started from when the corresponding application goes into the active state)

In the embodiment, primary enhanced video object data P-EVOB and secondary enhanced video object data S-EVOB make progress along the title timeline TMLE on the basis of the media clock (title clock). Therefore, for example, when the user presses "Pause" button to stop the advance of time on the title timeline TMLE temporarily, the frame advance of primary enhanced video object data P-EVOB and secondary enhanced video object data S-EVOB is stopped in synchronization with the pressing of the button, which produces a still image displaying state. In contrast, both of the page clock and application clock advance in time (or the counting up of the clocks progresses) in synchronization with the tick clock. In the embodiment, the media clock and the tick clock advance in time independently (or the counting up of the media clock and that of the tick clock are done independently). Therefore, when the page clock or application clock is selected as a reference time (clock) in setting display or execution timing on the time axis on the basis of the "required attribute information RQATRI," this produces the effect of being capable of continuing playback (the advance of time) with the markup MRKUP under no influence even if the advance of time on the title timeline stops temporarily. For example, the markup MRKUP enables special playback (e.g., fast forward or rewind) to be carried out on the title timeline TMLE, while displaying animations or news (or weather forecast) in tickers at standard speed, which improves the user's convenience remarkably. The reference time (clock) in setting display or execution timing on the time axis on the basis of the "required attribute information RQATRI" is set in a timing element TIMGEL in the head element HEADEL shown in FIG. 91A (a). Specifically, it is set as the value of clock attribute information (indicated by an underline over a) in a timing element TIMGEL placed in the head element HEADEL shown in FIG. 92(*f*). (Since in the example of FIG. 92(*f*), an advanced subtitle ADSBT is displayed, the title clock (media clock) is set as the reference time (clock) in setting display or execution timing on the time axis on the basis of the "required attribute information RQATRI."

Furthermore, the embodiment is characterized by FIG. 90(*d*). Specifically, arbitrary attribute information STNSAT defined in a style name space can be used (or set) as optional attribute information PRATRI in many elements (xml descriptive sentences). This enables the arbitrary attribute information STNSAT defined in the style name space not only to set display and representation methods (forms) in a markup page MRKUP but also to prepare a very wide range of options. As a result, use of the characteristic of the embodiment improves the representational power in the markup page MRKUP remarkably as compared with conventional equivalents.

Using FIGS. 91A and 92B, the structure of a markup MARKUP descriptive sentence in the embodiment will be explained. As shown in FIG. 91A(a), the embodiment is characterized in that a timing element TIMGEL and a styling element STNGEL are arranged in the head element HEADEL of the root element ROOTEL in the markup MRKUP descriptive sentence. Specifically, a timing element TIMGEL is set in the head element HEADEL, thereby defining a time sheet corresponding to the corresponding markup MRKUP. This makes it possible to specify minute display timing for the common contents in the markup MRKUP. The embodiment is characterized by not only specifying the common display timing minutely in the corresponding markup MRKUP by defining a time sheet using the timing element TIMGEL but also being capable of using the contents of the time sheet set in the timing element TIMGEL in a body element BODYEL explained later. Moreover, various elements in the timing vocabulary TIMVOC shown in FIG. 91B(c) can be written in the timing element TIMGEL in the head element HEADEL.

The contents of the timing vocabulary TIMVOC written in the timing element TIMGEL in the head element HEADEL will be explained in detail using FIG. 91B(c). The timing vocabulary TIMVOC includes animate elements ANIMEL, cue elements CUEELE, event elements EVNTEL, defs elements DEFSEL, g elements GROPEL, link elements LINKEL, par elements PARAEL, seq elements SEQNEL, set elements SETELE, and timing elements TIMGEL. Specifically, the animate element ANIMEL sets animations or specifies the change of setting conditions. The cue element CUEELE has the function of selecting a child element on the basis of the specified condition and carrying out an executing process (or a replacing process) with specific timing. The event element EVNTEL generates an event handled by a script. The defs element DEFSEL defines a set (or a group) of specific animation elements. The g element GROPEL defines the grouping of animation elements. The link element LINKEL loads a specified resource and sets a hyperlink that carries out a replacing process. The par element PARAEL defines a parallel progress of time. The seq element SEQNEL defines a sequential progress of time. The set element SETELE sets various attribute conditions and characteristic conditions. The timing element TIMGEL sets timing conditions for all of the advanced applications.

A styling element STNGEL in the head element HEADEL will be explained. The embodiment is characterized in that a styling element STNGEL is placed in the head element HEADEL. Use of a styling element STNGEL makes it possible to define a style sheet for the corresponding markup MRKUP. The style sheet for the corresponding markup MRKUP is defined by the styling element STNGEL in the head element HEADEL, thereby specifying a display format for all of the corresponding markup MARUP. In the embodiment, the styling element STNGEL in the head element HEADEL sets various display formats (or styles) equally and the set display formats (or styles) are referred to in a body element BODYEL explained later, thereby making it possible to standardize display formats in the individual descriptive sentences in the body element BODYEL. Moreover, referring to a part of the styling element STNGEL of the head element HEADEL in the body element BODYEL makes it possible not only to reduce the amount of writing in the body element BODYEL and therefore the amount of descriptive text in all of the markup descriptive sentences, but also to simplify the displaying method at the advanced content playback section ADVPL using the markup descriptive sentence. In the styling element STNGEL in the head element HEADEL, the elements included in the style vocabulary STLVOC can be written as shown in FIG. 91B(d). The elements included in the style vocabulary STLVOC that can be written in the styling element STNGEL include a styling element STNGEL and a style element STYLEL as shown in FIG. 91B(d). The styling element STNGEL has the function of setting a style sheet. The style element STYLEL has the function of collectively setting display formats (or styles).

Furthermore, as shown in FIG. 91A(a), in the body element BODYEL put behind the head element HEADEL in the root element ROOTEL, various elements belonging to the content vocabulary CNTVOC included in a list shown in FIG. 91A(b) can be written. In the embodiment, not only neither the timing vocabulary TIMVOC of FIG. 91B(c) nor the style vocabulary STLVOC of FIG. 91B(d) is written in the body element BODYEL, but also neither the style vocabulary STLVOC nor the content vocabulary CNTVOC is written in the timing element TIMGEL. Moreover, in the styling element STNGEL, neither various elements in the timing vocabulary TIMVOC of FIG. 91B(c) nor various elements included in the content vocabulary CNTVOC of FIG. 91B(b) are written. As described above, in the embodiment, the contents of the elements written in the timing element TIMGEL, styling element STNGEL, and body element BODYEL are determined separately, thereby clarifying the information writing range in various elements and assigning the contents, which simplifies the data analyzing process of the advanced content playback section ADVPL which reproduces the markup MRKUP (specifically, a programming engine PRGEN placed in an advanced application manager ADAMNG in the navigation manager NVMNG shown in FIG. 28). Hereinafter, various elements included in the content vocabulary CNTVOC placed (or written) in the body element BODYEL will be explained. As shown in FIG. 91B(b), the content vocabulary CNTVOC includes area elements AREAEL, br elements BREKEL, button elements BUTNEL, div elements DVSNEL, include elements INCLEL, input elements INPTEL, meta elements METAEL, object elements OBJTEL, p elements PRGREL, param elements PRMTEL, and span elements SPANEL. The contents of the individual elements will be described concretely below. The area element AREAEL is classified into a "transition to execution" class and determines an area on a screen for which transition to execution (or an active state) (by clips or the like) can be specified. The br element BREKEL is classified into a "display" class and carries out forced display and output. The button element BUTNEL is classified into a "state" class and sets a user input button. The div element DVSNEL is classified into an "operation" class and sets the divisions of block splitting of elements belonging to the same block type. The include element INCLEL is classified into an "nondisplay" class and specifies a document to be referred to. The input element INPTEL is classified into the "state" class and sets a text box the user can input. The meta element METAEL is classified into the "nondisplay" class and sets (a combination of) elements representing the contents of an advanced application. The object element OBJTEL is classified into the "display" class and sets an object file name and display format attached to a markup page. The p element PRGREL is classified into the "operation" class and sets the display timing and display format of paragraph blocks (or text extending over a plurality of rows). The param element PRMTEL is classified into the "nondisplay" class and sets parameters for object elements. The span element SPANEL is classified into the "operation" and sets the display timing and display format for one row of content (or text) (in a block).

Figure 92:
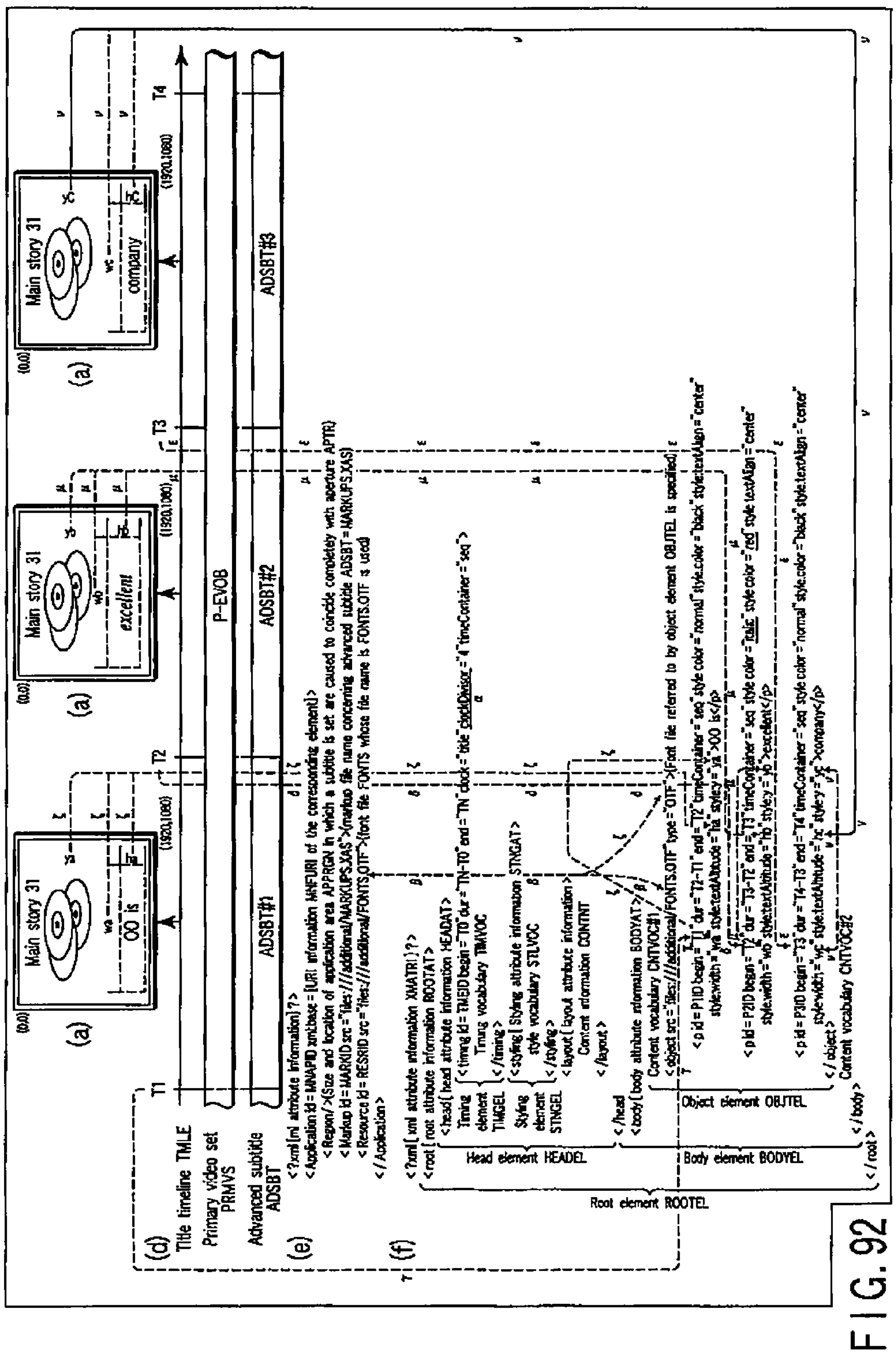
FIG. 92 is a diagram to help explain a display example of a subtitle (or ticker) on a markup according to the embodiment.

As shown in FIG. 16, the embodiment is characterized in that a telop character 39 or a subtitle can be displayed on a screen shown to the user by using an advanced subtitle ADSBT. To reproduce the advanced subtitle ADSBT and display it on the screen, the manifest MNFSTS of the advanced subtitle is referred to from the playlist PLLST as shown in FIG. 12 and then the markup MRKUPS of the advanced subtitle is referred to from the manifest MNFSTS of the advanced subtitle. The markup MRKUPS of the advanced subtitle is such that the font FONTS of the advanced subtitle is referred to, thereby displaying the characters based on specific fonts on the user screen. As a method of showing subtitles or tickers to the user by using the concept of the advanced subtitle ADSBT, the method of using event elements EVNTEL shown in FIGS. 77 and 78 has already been explained. As another embodiment of the method of reproducing subtitles or tickers by using event elements EVNTEL of FIGS. 77 and 78, a method of writing subtitle characters or telop characters using markup MRKUPS descriptive sentences as shown in FIG. 92(*f*) will be explained. The method of FIG. 92 is superior in scalability and versatility to the method shown in FIGS. 77 and 78. In the embodiment, showing subtitles or tickers by the method of FIG. 92 is recommended. The technique for displaying animations on a home page in the Internet and changing displayed images as time advances has been used. In contrast, the embodiment of FIG. 92 is characterized in that the title timeline TMLE is used as a reference and that subtitles or tickers can be displayed or switched in such a manner that subtitles or tickers are caused to synchronize with a primary video set PRMVS for displaying the main story 31, using such very small units as fields or frames. As shown in FIG. 17, in the embodiment, a title timeline TMLE serving as a reference of the progress of time is set for each title and a primary video set PRVS and an advanced subtitle ADSBT indicating subtitles or tickers are mapped on the title timeline TMLE (specifying the timing of starting and ending display along the progress of time on the title timeline TMLE). This makes it possible to display a plurality of representation objects (meaning the primary video set PRMVS and advanced subtitle ADSBT in the embodiment of FIG. 92) at the same time in such a manner that they are synchronized with one another on the time axis. The mapping state of the individual representation objects on the title timeline TMLE is written in the playlist PLLST. The playlist PLLST is used to manage the playback display timing of the individual representation objects. FIG. 92(*d*) shows the mapping state of the primary video set PRMVS indicating the contents of the main story 31 mapped along the progress of time on the title timeline TMLE and the advanced subtitle ADSBT having information on subtitles (or tickers). FIG. 92(*a*) shows the contents of the subtitles (or tickers) displayed from "T1" to "T2" on the title timeline TMLE. Similarly, FIG. 92(*b*) shows the contents of the subtitles (or tickers) displayed from "T2" to "T3" on the title timeline TMLE. FIG. 92(*c*) shows the contents of the subtitles (or tickers) displayed from "T3" to "T4" on the title timeline TMLE. That is, as shown in FIG. 92(*a*) to FIG. 92(*d*), setting is done so that the contents of subtitles (or tickers) may be switched at time "T2," "T3," and "T4" on the title timeline TMLE. In the embodiment of FIG. 92, the size of subtitles (or tickers), display position on the screen, and colors and fonts (e.g., normal or italic letters) switched at time "T2" and "T3" on the title timeline TMLE can be changed and set minutely. The contents of the timing of various representation objects mapped on the title timeline TMLE shown in FIG. 92(*d*) are written in object mapping information OBMAPI in the playlist PLLST (for example, see FIG. 24(*a*)). As shown in FIG. 12, the advanced subtitle ADSBT displaying subtitles or tickers is composed of the manifest MNFSTS of the advanced subtitle and markup MRKUPS of the advanced subtitle, and fonts FONTS of the advanced subtitle as needed.

FIG. 92(*e*) shows a part of the contents of information written in the manifest MNFSTS of the advanced subtitle of FIG. 12. In the contents of information written in the manifest MNFST of the advanced subtitle, area element RGNELE in an application element, markup element MRKELE, resource element RESELE, and others are written (see FIG. 81(*a*)). In the description example in FIG. 92(*e*), the following values are omitted in the area element RGNFLE: the X coordinate value XAXIS (X attribute value) of the application area specifying position on the canvas," the Y coordinate value YAXIS (Y attribute value) of the application area specifying position on the canvas," the width WIDTH (width attribute information) of the application area in the canvas coordinates," and "the height HEIGHT (height attribute information) of the application area in the canvas coordinates." As explained in FIG. 81(*b*), when the description of these values is omitted in the area element RGNELE, this means that the size and location of the application area APPRGN in which subtitles are set are caused to coincide completely with the aperture APRT (the full size of each screen shown in FIGS. 92(*a*) to 92(*c*)). This enables the subtitle or ticker to be placed in any position on the full screen shown to the user. As shown in FIG. 12, the manifest MNFSTS of the advanced subtitle refers to the markup MRKUPS of the advanced subtitle. The information referred to is written in "the storage location SRCMRK (src attribute information) of a markup file used first." In the embodiment of FIG. 92(*e*), the markup file MRKUPS of the advanced subtitle is stored under the file name of MRKUPS.XAS" in a recordable persistent storage PRSTR. In addition, the file name and storage location (path) of the font file FONT of the advanced subtitle shown in FIG. 12 are stored in the recordable persistent storage PRSTR under the name of "FONTS.OTF" in the description example of FIG. 92(*e*).

Next, FIG. 92(*f*) shows an example of the contents written in markup MRKUPS of the advanced subtitle shown in FIG. 12. As already explained in FIG. 91A(a), timing element TIMGEL is arranged in the head element HEADEL in the root element ROOTEL and the display timing related information on the corresponding markup MRKUPS is set in a sharing manner. In the embodiment, three types of clock, media clock (title clock), application clock, and page clock, are set as a reference clock representing a reference time in displaying the advanced subtitle ADSBT. The page clock and application clock are set so as to synchronize with the tick clock and are caused to progress in time (or are counted up) independently of the media clock serving as a reference of the title timeline TMLE. Clock attribute information (value information set by "clock=": the part indicated by an underline over a) in the timing element TIMGEL shown in FIG. 92(*f*) is used to set a part where which one of the clocks is to be used in the corresponding markup MRKUPS is set. Since in the embodiment of FIG. 92, a subtitle or a ticker to be displayed is displayed in synchronization with the progress of the primary video set PRMVS indicating the main story 31, the media clock using the title timeline TMLE as a reference has to be used as a reference clock of the advanced subtitle ADSBT. Therefore, "title" meaning the media clock (media clock limited to the title timeline TMLE in the title) is set. As described above, the embodiment is characterized in that clock attribute information is set to the media clock in synchronization with the title timeline TMLE in the timing element TIMGEL set in the head element HEADEL in which the timing information corresponding to the markup MRKUPS of the advanced subtitle is set. This makes it possible to set the synchronization of the primary video set PRMVS with the display timing of the advanced subtitle ADSBT, with the title timeline TMLE as a reference. Therefore, even if the playback display of the main story 31 (primary video set PRMVS) is set to pause, FF (fast forward), or FR (fast rewind) by the user action, the display timing of a subtitle or a ticker can be changed accordingly.

Furthermore, as information set in the timing element TIMGEL of FIG. 92(*f*), the subtitle or ticker is displayed with the timing from "T0" to "TN" and the time display timing is set as sequential (timeContainer="seq"). Although not used in actually displaying a subtitle or a ticker, the reference frequency of the tick clock serving as a reference of the page clock or advanced clock is reduced to one-fourth of the reference frequency of the media clock acting as a reference of the title timeline TMLE (clockDivisor="4"). FIGS. 91A(b) to 91B(d) show the individual element names used in the descriptive sentence in the markup MRKUPS and their contents in the embodiment. The embodiment is characterized in that a subtitle or a ticker changing in synchronization with the screen is set using a span element SPANEL or a p element PRGREL (or a combination of a span element SPANEL or a p element PRGREL with an object element OBJTEL) in each element shown in FIGS. 91A(b) to 91B(d). That is, use of a span element SPANEL or a p element PRGREL enables a subtitle or a ticker to be displayed most effectively by a simple process. In addition, as shown in FIG. 91A(b), an object file name and a display format attached to a markup page MRKUPS can be set in an object element OBJTEL. Thus, combining the span element SPANEL or p element PRGREL with the object element OBJTEL makes it possible to specify a font file FONTS used in the markup MRKUPS. That is, combining the span element SPANEL or p element PRGREL with the object element OBJTEL (or setting the relationship between a parent element and a child element) makes it possible to show the user the contents of the subtitle or ticker set in the span element SPANEL or p element PRGREL in the font style on the basis of the font file FONTS set in the object element OBJTEL. As described above, with the method of setting the font file FONTS to be referred to by the object element OBJTEL, a subtitle or a ticker can be shown to the user using an arbitrary font, which improves the representation power of the subtitle or ticker to the user remarkably. In an embodiment shown in FIG. 92(*f*), a file whose file name is "FONTS.OTF" in the persistent storage PRSTR is referred to using the src attribute information in the object element OBJTEL and a font file FONTS is specified as the file type using type attribute information. As shown in FIG. 92(*e*), the font file FONTS is specified in the resource element RESELE in the manifest file MNFSTS. The correspondence of the font file FONTS with the font file FONTS specified in the markup file MRKUPS is shown by a broken line β of FIG. 92.

Furthermore, the timing of staring to display each subtitle or ticker is set by the value of begin attribute information in the p element PRGREL. That is, as in the relationship shown by a broken line Y of FIG. 92, the p element PRGREL set in ID information "P1ID" starts to be reproduced at time "T1." Moreover, as in the relationship shown by a broken line δ of FIG. 92, the p element PRGREL set in ID information "P2ID" starts to be reproduced at time "T2." In addition, as in the relationship shown by a broken line ϵ of FIG. 92, the p element PRGREL set in ID information "P3ID" starts to be reproduced at time "T3." The display period is set using dur attribute information in each p element PRGREL and the playback end time is set by the value of end attribute information. As described in FIG. 90(*b*), the embodiment is characterized in that setting attribute information indicating the display timing in essential attribute information RQATRI (required attributes) in the element makes it possible to set the timing of displaying an advanced subtitle ADSBT which represents a subtitle (or a ticker) with very high accuracy. Since in the example of FIG. 92, one type of subtitle or ticker is changed as time advances, timeContainer attribute information is set as a sequential progress of time ("seq").

Furthermore, as shown in FIG. 90(*d*), arbitrary attribute information STNSAT defined in a style name space can be set as optional attribute information in many elements (xml descriptive sentences), which produces the effect of improving the power of expression in the markup page MRKUPS remarkably. In the example of FIG. 92(*e*), style:fontStyle attribute information, style:color attribute information, style:textAlign attribute information, style:width attribute information, style:textAltitude attribute information, and style:y attribute information are set as optional attribute information OPATRI in the p element PRGREL, thereby setting the display screen size, display color, and font format of each subtitle or ticker on a screen shown to the user. As described above, since arbitrary attribute information STNSAT defined in the style name space can be set for each p element PRGREL, a subtitle or a ticker can be displayed in a style differing from one p element PRGREL to another. That is, on the screens shown in FIGS. 92(*a*) and 92(*c*), the display size of a subtitle or ticker is relatively small and the subtitle or ticker is represented in black using a standard font, whereas on the screen shown in FIG. 92(*b*), the size of the subtitle or ticker is made larger and the subtitle or ticker is made italic and a specific subtitle or ticker is highlighted by representing them in red.

The contents of various types of attribute information written in the p element PRGREL shown in FIG. 92(*f*) and the relationship with differences on each screen will be explained below. First, style:fontStyle attribute information indicates the font style. Since the font style is set to a normal style ("normal") in the p element PRGREL in "P1ID" and "P3ID" and to italic ("italic") in the p element PRGREL in "P2ID," the subtitle or ticker is represented in italic characters on the screen of FIG. 92(*b*). Moreover, style:color attribute information represents the color of a subtitle or ticker to be displayed. "Black" is specified in the p element PRGREL in "P1ID" and "P3ID" and "red" is specified in the p element PRGEL in "P2ID", thereby highlighting the display to the user. In addition, style:textAlign attribute information indicates the display location of the subtitle or ticker on the screen. In the writing example of FIG. 92(*f*), setting is done so that either of them may be displayed in the center ("center"). Moreover, style:width attribute information and style:textAltitude attribute information determines the character size of the subtitle or ticker on the screen shown to the user. Furthermore, style:y attribute information determines the location in the vertical direction of the subtitle or ticker on the screen shown to the user. Specifically, as in the relationship shown by a broken line ζ, information on the character size of the subtitle or ticker on the screen of FIG. 92(*a*) and on the location in the vertical direction of them is written in style:width attribute information, style:textAltitude attribute information, and style:y attribute information in the p element PRGREL of "P1ID." Moreover, as in the relationship shown by a broken line μ, information on the character size of the subtitle or ticker on the screen of FIG. 92(*b*) and on the location in the vertical direction of them is written in style:width attribute information, style:textAltitude attribute information, and style:y attribute information in the p element PRGREL in "P2ID."Similarly, as in the relationship shown by a broken line ν, information on the character size of the subtitle or ticker on the screen of FIG. 92(*c*) and on the location in the vertical direction of them is written in style:width attribute information, style:textAltitude attribute information, and style:y attribute information in the p element PRGREL in "P3ID."

The embodiment makes possible the following:

1. The compatibility between the playback-only HD_DVD-Video standard and the recording and reproducing HD_VR standard is improved.

2. A playback-only HD_DVD-Video data management structure excellent in the compatibility with the existing Video Recording standard is provided.

As shown in FIG. 90(*c*) in the embodiment, in an element (xml descriptive sentence), required attribute information RQATRI and optional attribute information OPATRI can be written behind content model information CONTMD written at the beginning of the front tag. As shown in FIG. 91(*a*), in a body element BODYEL existing in a position different from the head element HEADEL in the root element ROOTEL, various elements (or content elements) belonging to a content vocabulary CNTVOC of FIG. 91(*b*) can be arranged. The contents of the required attribute information RQATRI or optional attribute information OPATRI written in the content element are listed in a table shown in FIG. 93. Using FIG. 93, various types of attribute information used in the content element will be explained.

<Attributes>

This section defines the common and content element specific attributes employed by Advanced Application element types. For each attribute, a value type and implied value is specified, with value types being expressed as XML Schema datatypes.

In FIG. 93, "accessKey" indicates attribute information for setting specified key information for going into an execution state. The "accessKey" is used as required attribute information RQATRI. The contents of "value" to be set as "accessKey" are "key information list." An initial value (Default) is not set. The state of value change is regarded as being "fixed." "coords" next to "accessKey" is attribute information for setting a shape parameter in an area element. The "coords" is used as optional attribute information OPATRI. The contents of "value" to be set as "coords" are "shape parameter list." An initial value (Default) is not set. The state of value change is regarded as being "fixed." "id" next to "coords" is attribute information for setting identification data (ID data) about each element. The "id" is used as optional attribute information OPATRI. The contents of "value" to be set as "id" are "identification data (ID data)." An initial value (Default) is not set. The state of value change is regarded as being "fixed." "condition" next to "id" is attribute information for defining use conditions in an include element. The "condition" is used as required attribute information RQATRI. The contents of "value" to be set as "condition" are "boolean representation." An initial value (Default) is not set. The state of value change is regarded as being "fixed." "mode" next to "condition" is attribute information for defining user input format in an input element. The "mode" is used as required attribute information RQATRI. The contents of "value" to be set as "mode" are one of "password," "one line," "plural lines," and "display." An initial value (Default) is not set. The state of value change is regarded as being "fixed." "name" next to "mode" is attribute information for setting a name corresponding to a data name or an event. The "name" is used as required attribute information RQATRI. The contents of "value" to be set as "name" are "name information." An initial value (Default) is not set. The state of value change is regarded as being "fixed." "shape" next to "name" is attribute information for specifying an area shape defined in an area element. The "shape" is used as optional attribute information OPATRI. The contents of "value" to be set as "shape" are one of "circle," "square," "continuous line," and "default." An initial value (Default) is not set. The state of value change is regarded as being "fixed." "src" next to "shape" is attribute information for specifying a resource storage location (path) and a file name. The "src" is used as optional attribute information OPATRI. The contents of "value" to be set as "src" are one of "URI (Uniform Resource Identifier)." An initial value (Default) is not set. The state of value change is regarded as being "fixed." "type" next to "src" is attribute information for specifying a file type (MIME type). The "type" is used as required attribute information RQATRI. The contents of "value" to be set as "type" are "MIME type information." An initial value (Default) is not set. The state of value change is regarded as being "fixed." "value" next to "type" is attribute information for setting the value (variable value) of name attribute information. The "value" is used as optional attribute information OPATRI. The contents of "value" to be set as "value" are "variable value." An initial value (Default) is set using a variable value. The state of value change is regarded as being "variable." "xml:base" next to "value" is attribute information for specifying reference resource information about the element/child element. The "xml:base" is used as optional attribute information OPATRI. The contents of "value" to be set as "xml:base" are "URI (Uniform Resource Identifier)." An initial value (Default) is not set. The state of value change is regarded as being "fixed." "xml:lang" next to "xml:base" is attribute information for specifying text language code in the element/child element. The "xml:lang" is used as optional attribute information OPATRI. The contents of "value" to be set as "xml:lang" are "language code information." An initial value (Default) is not set. The state of value change is regarded as being "fixed." "xml:space" next to "xml:lang" is attribute information for putting a blank column (or blank row) just in front. The "xml:space" is used as optional attribute information OPATRI. The contents of "value" to be set as "xml:space" are "nil." An initial value (Default) is not set. The state of value change is regarded as being "fixed."

As shown in FIG. 90(*c*), required attribute information RQATRI and optional attribute information OPATRI can be written in an element (xml descriptive sentence). Moreover, as shown in 91(*a*), in the head element HEADEL in the root element ROOTEL, a timing element TIMGEL can be placed. In the timing element TIMGEL, various elements belonging to a timing vocabulary TIMVOC shown in FIG. 91(*c*) can be placed. FIG. 94 shows a list of required attribute information RQATRI or optional attribute information OPATRI which can be written in various elements belonging to the timing vocabulary TIMVOC shown in FIG. 91(*c*).

<Attributes>

This section defines the timing specific attributes employed by Advanced Application element types. For each attribute, a value type and implied value is specified, with value types being expressed as XML Schema data types.

<additive>

Values: sum replace

Default: replace

Animation: none

The value sum specifies that the animation will add to the underlying value of the attribute or any pre-existing animation of the property.

The value replace specifies that the animation will override any pre-existing animation of the property.

This attribute is ignored if the target property does not support additive animation.

<begin>

Values: <timeExpression>|<pathExpression>

Default: Os

Animation: none

Defines the start of the active interval, relative to its parent or sibling active interval as defined above. The use of a <pathExpression> is restricted to timing elements whose clock base is not 'tide', use of path expressions in timing elements whose clock base is 'tide' is a well formed error.

<calc Mode>

Values: linear|discrete

Default: linear

Animation: none

Specifies the interpolation mode for the animation, discrete meaning that the animation may only take key values specified in the animation, linear meaning that the animation will interpolate values between the key values.

In FIG. 94, as for attribute information used in various elements belonging to the timing vocabulary TIMVOC, "additive" is an attribute for setting whether to add a variable value to an existing value or to replace a variable value with an existing value. Either "addition" or "replacement" can be set as the contents of a value to be set. In the embodiment, "replacement" is set as an initial value (default value) of "additive." The state of value change is in the fixed state. The "additive" attribute information belongs to required attribute information RQATRI shown in FIG. 90(*c*). In addition, "begin" is an attribute for defining the beginning of execution (according to a specified time or a specific element). Either "time information" or "specific element specification" can be set as the contents of a value to be set. If setting is done according to "time information," the value is written in the format "HH:MM:SS:FF" (HH is hours, MM is minutes, SS is seconds, and FF is the number of frames). In the embodiment, an initial value (default value) of "begin" is set using "variable value." The state of value change is in the fixed state. The "begin" attribute information belongs to required attribute information RQATRI shown in FIG. 90(*c*). "calcMode" next to "begin" is an attribute for setting a calculation mode (continuous value/discrete value) for variables. Either "continuous value" or "discrete value" can be set as the contents of a value to be set. In the embodiment, "continuous value" is set as an initial value (default value) of "calcMode." The state of value change is in the fixed state. The "calcMode" attribute information belongs to required attribute information RQATRI shown in FIG. 90(*c*). In addition, "dur" is an attribute for setting the length of an execution period of the corresponding element. As the contents of a value to be set, "time information (TT:MM:SS:FF)" can be set. In the embodiment, "variable value" is set as an initial value (default value) of "dur." The state of value change is in the fixed state. The "dur" attribute information belongs to optional attribute information OPATRI shown in FIG. 90(*c*). Moreover, "end" is an attribute for setting the ending time of the execution period of the corresponding element. Either "time information" or "specific element specification" can be set as the contents of a value to be set. If the value is set according to "time information," the value is written in the format "HH:MM:SS:FF" (HH is hours, MM is minutes, SS is seconds, and FF is the number of frames). In the embodiment, "variable value" is set as an initial value (default value) of "end." The state of value change is in the fixed state. The "end" attribute information belongs to optional attribute information OPATRI shown in FIG. 90(*c*). In FIG. 94, as for attribute information used in various elements belonging to the timing vocabulary TIMVOC, "fill" is an attribute for setting the state of a subsequent change when the element is terminated before the ending time of the parent element. Either "cancel" or "remaining unchanged" can be set as the contents of a value to be set. In the embodiment, "cancel" is set as an initial value (default value) of "fill." The state of value change is in the fixed state. The "fill" attribute information belongs to optional attribute information OPATRI shown in FIG. 90(*c*). Moreover, in FIG. 94, as for attribute information used in various elements belonging to the timing vocabulary TIMVOC, "select" is an attribute for selecting and specifying a content element to be set or to be changed. "specific element" can be set as the contents of a value to be set. In the embodiment, "nil" is set as an initial value (default value) of "select." The state of value change is in the fixed state. The "select" attribute information belongs to required attribute information RQATRI shown in FIG. 90(*c*). The "select" attribute information plays an important role in showing the relationship between the contents of the content vocabulary CNTVOC in the body element BODYEL and the contents of the timing vocabulary TIMVOC in the timing element TIMGEL or of the style vocabulary STLVOC in the styling element STNGEL (see FIG. 91(*a*)), thereby improving the efficiency of the work of creating a new markup MRKUP or of editing a markup MRKUP. The concrete roles and effects of the "select" attribute information are described in FIGS. 101A and 101B, or 102A and 102B and in its captions. In FIG. 94, "clock" next to "select" is an attribute for defining a reference clock determining a time attribute in the element. As the contents of a value to be set, any one of "title (title clock)," "page (page clock)," and "application (application clock)" can be set. In the embodiment, an initial value (default value) for "clock" changes according to the condition of each use. The state of value change is in the fixed state. The "clock" attribute information belongs to required attribute information RQATRI shown in FIG. 90(*c*). Moreover, as shown in FIG. 100, the "clock" attribute information is written as required attribute information RQATRI in the timing element TIMGEL, thereby defining a reference clock for time progress in a markup page MRKUP. In the embodiment, as shown in FIG. 17, in the playlist PLLST that manages the procedure for reproducing and displaying advanced contents ADVCT for the user, time progress for each title and the timing of reproducing and displaying for each presentation object (or each object in an advanced content ADVCT) on the basis of the time progress are managed. As a reference for determining the timing of reproducing and displaying, a title timeline TMLE is defined for each title. In the embodiment, time progress on the title time line TMLE is represented by "hours:minutes:seconds:the count of frames (or the aforementioned "HH:MM:SS:FF"). As a reference clock for the count of frames, medium clock is defined. The frequency of the medium clock is, for example, "60 Hz" in the NTSC system (even in the case of interlaced display) and "50 Hz" in the PAL system (even in the case of interlaced display). As described above, since the title timeline TMLE is set separately title by title, the medium clock is also called "title clock." Therefore, the frequency of the "title clock" coincides with the frequency of medium clock used as a reference on the title timeline TMLE. When "title (title clock)" is set as the value of the "clock" attribute information, time progress on the markup MRKUP completely synchronizes with time progress on the title timeline TMLE. Accordingly, in this case, a value set as "begin" attribute information, "dur" attribute information, or "end" attribute information is set so as to be consistent with the elapsed time on the title timeline TMLE. In contrast, in "page clock" or "application clock," a unique clock system called "tick clock" is used. While the frequency of the medium clock is "60 Hz" or "50 Hz," the frequency of the "tick clock" is the value obtained by dividing the frequency of the "medium clock" by the value set as "clockDivisor" attribute information described later. As described above, decreasing the frequency of the "tick clock" makes it possible to ease the burden on the advanced application manager ADAMNG in the navigation manager NVMNG shown in FIG. 28 and on the advanced application presentation engine AAPEN in the presentation engine PRSEN shown in FIG. 30, which enables power consumption in the advanced content playback section ADVPL to be reduced. Accordingly, when "page (page clock)" or "application (application clock)" is set as the value of the "clock" attribute information, the reference clock frequency serving as the reference for time progress on the markup MRKUP coincides with the frequency of the "tick clock." In the embodiment, the screen shown to the user during the execution period of the same application (advanced application ADAPL) can be switched between markups MRKUP (or transferred from one markup to another). When "application (application clock)" is set as the value of the "clock" attribute information, although the value of "application clock" is reset to "0" at the same time of the start of the execution of the advanced application ADAPL, the counting up (time progress) of the "application clock" is continued, regardless of the transition of the screen between markups MRKUP. In contrast, "page (page clock)" is set as the value of the "clock" attribute information, the value of "page clock" is reset to "0" each time the screen is transferred from one markup MRKUP to another. As described above, the embodiment is characterized in that the best reference clock is set according to the purpose of use (or intended use) of a markup MRKUP or an advanced application ADAPL, thereby enabling display time management most suitable for the purpose of use (or intended use).

In FIG. 94, as for attribute information used in various elements belonging to the timing vocabulary TIMVOC, "clockDivisor" is an attribute for setting the value of [frame rate (title clock frequency)]/[tick clock frequency]. As the contents of a value to be set, "an integer equal to or larger than 0" can be set. In the embodiment, "1" is set as an initial value (default value) of the "clockDivisor." The state of value change is in the fixed state. The "clockDivisor" attribute information is treated as required attribute information RQATRI used in a timing element TIMGEL as shown in FIG. 100.

Furthermore, "timeContainer" is an attribute for determining a timing (time progress) state used in an element. As the contents of a value to be set, either "parallel simultaneous progress" or "simple sequential progress" can be set. In the embodiment, "parallel simultaneous progress" is set as an initial value (default value) of the "timeContainer." The state of value change is in the fixed state. The "timeContainer" attribute information belongs to optional attribute information OPATRI shown in FIG. 90(*c*). For example, as shown in FIGS. 92(*f*) and 102B(e), a screen on which a representation continues to change according to time progress as in a subtitle display or ticker display is displayed, "simple sequential progress (sequence)" is specified for the value of the "timeContainer." In contrast, when a plurality of processes are carried out in parallel simultaneously in the same period of time in, for example, "displaying an animation to the user and making up the user's bonus score according to the contents of the user's answers," "parallel simultaneous progress (parallel) is set at the value of "timeContainer." As described above, processing sequence conditions for time progress are specified in advance in a markup MRKUP, enabling advance preparation before the execution of the programming engine PRGEN in the advanced application manager ADAMNG shown in FIG. 28, which makes more efficient the processing in the programming engine PRGEN.

The last attribute "use" is an attribute for referring to a group of animate elements or a group of animate elements and event elements. As the contents of a value to be set, "element identifying ID data" can be set. In the embodiment, "nil" is set as an initial value (default value) of the "use." The state of value change is in the fixed state. The "use" attribute information belongs to optional attribute information OPATRI shown in FIG. 90(*c*).

As shown in FIG. 90(*c*), in the embodiment, as the basic data structure of an element (xml descriptive sentence), optional attribute information OPATRI can be written in the element. As shown in FIG. 90(*d*), arbitrary attribute information STNSAT defined in a style name space can be used as the optional attribute information OPATRI in many elements (xml descriptive sentences). In the embodiment, as arbitrary attribute information STNSAT defined in a style name space, a very wide range of options are prepared as shown in FIGS. 95A to 97B. As a result, the embodiment is characterized in that the power of expression in the markup page MRKUP has been improved much more greatly than before. The description of various attributes defined as options in the style name space is shown in FIGS. 95A to 97B.

<Attributes>

<style:anchor>

The anchor attribute sets the anchor property.

The anchor property is defined as follows:

Domain: startBefore|centerBefore|endBefore|
StartCenter|center|endCenter|
StartAfter|centerAfter|endAfter Initial: startBefore Applies to: positioned elements Inherited: no Percentages: no Media: visual Animation: discrete The anchor property is used to control how the x, y, width and height properties are converted into the XSL top-position, left-position, right-position and bottom-position traits.

If the computed value of the relative-position property of the element is absolute, then the left-position, right-position, top-position and bottom-position are calculated as defined in this section, and the area is positioned following XSL section 4.9.1. Otherwise, the anchor, x, and y properties are ignored and the default XSL positioning applies.

In "style:anchor" attribute information, an attribute information name defined in the style space name, a method of converting x, y, width and height attributes into "XSL" positions is described. As a value to be set as the "style:anchor" attribute information, any one of "startBefore," "centerBefore," "afterBefore," "startCenter," "center," "afterCenter," "startAfter," "centerAFter," and "endAfter" can be set. As an initial value, "startBefore" can be set. There is no continuity of the contents of a value to be set as the attribute information. In the embodiment, the "style:anchor" attribute information can be used in a "position specifying element." In "style: backgroundColor" attribute information, a background color is set (or changed). As a value to be set as the "style:backgroundColor" attribute information, any one of "color," "transparency," and "takeover" can be set. As an initial value, "transparency" can be set. There is no continuity of the contents of a value to be set as the attribute information. In the embodiment, the "style:backgroundColor" attribute information can be used in a "content element." In "style:background-Frame" attribute information, a background frame is set (or changed). As a value to be set as the "style:backgroundColor" attribute information, either "integer" or "takeover" can be set. As an initial value, "0" can be set. There is no continuity of the contents of a value to be set as the attribute information. In the embodiment, the "style:backgroundFrame" attribute information can be used in an "area element AREAEL, a "body element BODYEL," a "div element DVSNEL," a "button element BUTNEL," an "input element INPTEL," or an "object element OBJTEL." In "style:backgroundImage" attribute information, a background image is set. As a value to be set as the "style:backgroundImage" attribute information, either "URI specification," "nil," or "takeover" can be set. As an initial value, "nil" can be set. There is no continuity of the contents of a value to be set as the attribute information. In the embodiment, the "style:backgroundImage" attribute information can be used in an "area element AREAEL, a "body element BODYEL," a "div element DVSNEL," a "button element BUTNEL," an "input element INPTEL," or an "object element OBJTEL." In "style:backgroundPositionHorizontal" attribute information, the horizontal position of a still image is set. As a value to be set as the "style:backgroundPositionHorizontal" attribute information, any one of "%," "length," "left," "center," "right," and "takeover" can be set. As an initial value, "0%" can be set. There is no continuity of the contents of a value to be set as the attribute information. In the embodiment, the "style:backgroundPositionHorizontal" attribute information can be used in an "area element AREAEL, a "body element BODYEL," a "div element DVSNEL," a "button element BUTNEL," an "input element INPTEL," or an "object element OBJTEL." In "style:backgroundPositionVertical" attribute information, the vertical position of a still image is set. As a value to be set as the "style:backgroundPositionVertical" attribute information, any one of "%," "length," "left," "center," "right," and "takeover" can be set. As an initial value, "0%" can be set. There is no continuity of the contents of a value to be set as the attribute information. In the embodiment, the "style:backgroundPositionVertical" attribute information can be used in an "area element AREAEL, a "body element BODYEL," a "div element DVSNEL," a "button element BUTNEL," an "input element INPTEL," or an "object element OBJTEL." In style:backgroundRepeat" attribute information, a specific still image is repeatedly pasted in a background area. As a value to be set as the "style:backgroundRepeat" attribute information, any one of "repeating," "nonrepeating," and "takeover" can be set. As an initial value, "nonrepeating" can be set. There is no continuity of the contents of a value to be set as the attribute information. In the embodiment, the "style:backgroundRepeat" attribute information can be used in an "area element AREAEL, a "body element BODYEL," a "div element DVSNEL," a "button element BUTNEL," an "input element INPTEL," or an "object element OBJTEL." In "style:blockProgressionDimension" attribute information, the distance between the front edge and back edge of a square content area is set (or changed). As a value to be set as the "style:blockProgressionDimension" attribute information, any one of "automatic setting" "length," "%," and "takeover" can be set. As an initial value, "automatic setting" can be set. There is no continuity of the contents of a value to be set as the attribute information. In the embodiment, the "style:blockProgressionDimension" attribute information can be used in a "specified position element, a "button element BUTNEL," an "object element OBJTEL", or an "input element INPTEL." In "style:border" attribute information, the width, style, and color at the edge border of each of front/back/start/end are set. As a value to be set as the "style:border" attribute information, any one of "width" "style," "color," and "takeover" can be set. As an initial value, "nil" can be set. There is no continuity of the contents of a value to be set as the attribute information. In the embodiment, the "style:border" attribute information can be used in a "block element." In "style:borderAfter" attribute information, the width, style, and color at the border of the back edge of a block area are set. As a value to be set as the "style:borderAfter" attribute information, any one of "width" "style," "color," and "takeover" can be set. As an initial value, "nil" can be set. There is no continuity of the contents of a value to be set as the attribute information. In the embodiment, the "style:borderAfter" attribute information can be used in a "block element." In "style:borderBefore" attribute information, any one of the width, style, and color at the border of the front edge of a block area is set. As a value to be set as the "style:borderBefore" attribute information, any one of "width" "style," "color," and "takeover" can be set. As an initial value, "nil" can be set. There is no continuity of the contents of a value to be set as the attribute information. In the embodiment, the "style:borderBefore" attribute information can be used in a "block element." In "style:borderEnd" attribute information, the width, style, and color at the border of the end edge of a block area are set. As a value to be set as the "style:borderEnd" attribute information, any one of "width" "style," "color," and "takeover" can be set. As an initial value, "nil" can be set. There is no continuity of the contents of a value to be set as the attribute information. In the embodiment, the "style:borderEnd" attribute information can be used in a "block element." In "style:borderStart" attribute information, the width, style, and color at the border of the start edge of a block area are set. As a value to be set as the "style:borderStart" attribute information, any one of "width" "style," "color," and "takeover" can be set. As an initial value, "nil" can be set. There is no continuity of the contents of a value to be set as the attribute information. In the embodiment, the "style:borderStart" attribute information can be used in a "block element." In "style:breakAfter" attribute information, setting (or changing) is done so as to force a specific row to appear immediately after the execution of the corresponding element. As a value to be set as the "style:breakAfter" attribute information, any one of "automatic setting," "specified row," and "takeover" can be set. As an initial value, "automatic setting" can be set. There is no continuity of the contents of a value to be set as the attribute information. In the embodiment, the "style:breakAfter" attribute information can be used in an "inline element." In "style:breakBefore" attribute information, setting (or changing) is done so as to force a specific row to appear immediately before the execution of the corresponding element. As a value to be set as the "style:breakBefore" attribute information, any one of "automatic setting," "specified row," and "takeover" can be set. As an initial value, "automatic setting" can be set. There is no continuity of the contents of a value to be set as the attribute information. In the embodiment, the "style:breakBefore" attribute information can be used in an "inline element." In "style:color" attribute information, the color characteristic of content is set (or changed). As a value to be set as the "style:color" attribute information, any one of "color" "transparency," and "takeover" can be set. As an initial value, "white color" can be set. There is a continuity of the contents of a value to be set as the attribute information. In the embodiment, the "style:color" attribute information can be used in an "input element INPTEL," a "p element PRGREL," a "span element SPANEL," or an "area element AREAEL." In "style:contentWidth" attribute information, the width characteristic of content is set (or changed). As a value to be set as the "style:contentWidth" attribute information, any one of "automatic setting," "overall display," "length," "%," and "takeover" can be set. As an initial value, "automatic setting" can be set. There is no continuity of the contents of a value to be set as the attribute information. In the embodiment, the "style:contentWidth" attribute information can be used in an "area element AREAEL," a "body element BODYEL," a "div element DVSNEL," a "button element BUTNEL," an "input element INPTEL," or an "object element OBJTEL." In "style:contentHeight" attribute information, the height characteristic of content is set (or changed). As a value to be set as the "style:contentHeight" attribute information, any one of "automatic setting," "overall display," "length," "%," and "takeover" can be set. As an initial value, "automatic setting" can be set. There is no continuity of the contents of a value to be set as the attribute information. In the embodiment, the "style:contentHeight" attribute information can be used in an "area element AREAEL," a "body element BODYEL," a "div element DVSNEL," a "button element BUTNEL," an "input element INPTEL," or an "object element OBJTEL."

In "style:crop" written following FIGS. 95A and 95B, the act of clipping (or trimming) into a square shape is set (or changed). As a value to be set as the "style:crop" attribute information, either "clipping dimension (positive value)" or "automatic setting" can be set. As an initial value, "automatic setting" can be set. There is a continuity of the contents of a value to be set as the attribute information. In the embodiment, the "style:crop" attribute information can be used in an "area element AREAEL," a "body element BODYEL," a "div element DVSNEL," a "button element BUTNEL," an "input element INPTEL," or an "object element OBJTEL." In "style:direction" attribute information, a direction characteristic is set (or changed). As a value to be set as the "style:direction" attribute information, any one of "ltr" "rtl," and "takeover" can be set. As an initial value, "ltr" can be set. There is a continuity of the contents of a value to be set as the attribute information. In the embodiment, the "style:direction" attribute information can be used in an "input element INPTEL," a "p element PRGREL," or a "span element SPANEL." In "style:display" attribute information, a display format (including block/inline) is set (or changed). As a value to be set as the "style:display" attribute information, any one of "automatic setting" "nil," and "takeover" can be set. As an initial value, "automatic setting" can be set. There is no continuity of the contents of a value to be set as the attribute information. In the embodiment, the "style:display" attribute information can be used in a "content element." In "style:displayAlign" attribute information, an aligned display method is set (or changed). As a value to be set as the "style:displayAlign" attribute information, any one of "automatic setting," "left-aligned," "centering," "right-aligned," and "takeover" can be set. As an initial value, "automatic setting" can be set. There is a continuity of the contents of a value to be set as the attribute information. In the embodiment, the "style:displayAlign" attribute information can be used in a "block element." In "style:endIndent" attribute information, the amount of displacement between the edge positions set by the related elements is set (or changed). As a value to be set as the "style:endIndent" attribute information, any one of "length," "%," and "takeover" can be set. As an initial value, "0px" can be set. There is a continuity of the contents of a value to be set as the attribute information. In the embodiment, the "style:endIndent" attribute information can be used in a "block element." In "style:flip" attribute information, a moving characteristic of a background image is set (or changed). As a value to be set as the "style:flip" attribute information, any one of "fixed," "moving row by row," "moving block by block," and "moving in both" can be set. As an initial value, "fixed" can be set. There is no continuity of the contents of a value to be set as the attribute information. In the embodiment, the "style:flip" attribute information can be used in a "position specifying element." In "style:font" attribute information, a font characteristic is set (or changed). As a value to be set as the "style:font" attribute information, either "font name" or "takeover" can be set. As an initial value, "nil" can be set. There is a continuity of the contents of a value to be set as the attribute information. In the embodiment, the "style:font" attribute information can be used in an "input element INPTEL," a "p element PRGREL," or a "span element SPANEL." In "style:fontSize" attribute information, a font size characteristic is set (or changed). As a value to be set as the "style:fontSize" attribute information, any one of "size," "%," "40%," "60%," "80%," "90%," "100%," "110%," "120%," "140%," "160%," and "takeover" can be set. As an initial value, "100%" can be set. There is a continuity of the contents of a value to be set as the attribute information. In the embodiment, the "style:fontSize" attribute information can be used in an "input element INPTEL," a "p element PRGREL," or a "span element SPANEL." In "style:fontStyle" attribute information, a font style characteristic is set (or changed). As a value to be set as the "style:fontStyle" attribute information, any one of "standard," "italic," "others," and "takeover" can be set. As an initial value, "standard" can be set. There is a continuity of the contents of a value to be set as the attribute information. In the embodiment, the "style:fontStyle" attribute information can be used in an "input element INPTEL," a "p element PRGREL," or a "span element SPANEL." In "style:height" attribute information, a height characteristic is set (or changed). As a value to be set as the "style:height" attribute information, any one of "automatic setting," "height," "%," and "takeover" can be set. As an initial value, "automatic setting" can be set. There is no continuity of the contents of a value to be set as the attribute information. In the embodiment, the "style:height" attribute information can be used in a "position specifying element," a "button element BUTNEL," an "object element OBJTEL," or an "input element INPTEL." In "style:inlineProgressionDimension" attribute information, the spacing between the front edge and back edge of a content square area is set (or changed). As a value to be set as the "style:inlineProgressionDimension" attribute information, any one of "automatic setting," "length," "%," and "takeover" can be set. As an initial value, "automatic setting" can be set. There is no continuity of the contents of a value to be set as the attribute information. In the embodiment, the "style:inlineProgressionDimension" attribute information can be used in a "position specifying element," a "button element BUTNEL," an "object element OBJTEL," or an "input element INPTEL." In "style:linefeedTreatment" attribute information, a line spacing process is set (or changed). As a value to be set as the "style:linefeedTreatment" attribute information, any one of "neglect," "keeping," "treating as a margin," "treating as a margin width of 0," and "takeover" can be set. As an initial value, "treating as a margin" can be set. There is a continuity of the contents of a value to be set as the attribute information. In the embodiment, the "style: linefeedTreatment" attribute information can be used in a "p element PRGREL" or an "input element INPTEL." In "style:lineHeight" attribute information, the characteristic of the height of one row (or line space) is set (or changed). As a value to be set as the "style:lineHeight" attribute information, any one of "automatic setting," "height," "%," and "takeover" can be set. As an initial value, "automatic setting" can be set. There is a continuity of the contents of a value to be set as the attribute information. In the embodiment, the "style:lineHeight" attribute information can be used in a "p element PRGREL" or an "input element INPTEL." In "style:opacity" attribute information, the transparency of a specified mark to the background color with which the mark overlaps is set (or changed). As a value to be set as the "style:opacity" attribute information, either "alpha value" or "takeover" can be set. As an initial value, "1.0" can be set. There is no continuity of the contents of a value to be set as the attribute information. In the embodiment, the "style:opacity" attribute information can be used in a "content element." In "style:padding" attribute information, the insertion of a margin area is set (or changed). As a value to be set as the "style:padding" attribute information, any one of "front margin length," "lower margin length," "back margin length," "upper margin length," and "takeover" can be set. As an initial value, "0px" can be set. There is no continuity of the contents of a value to be set as the attribute information. In the embodiment, the "style:padding" attribute information can be used in a "block element." In "style:paddingAfter" attribute information, the insertion of a back margin area is set (or changed). As a value to be set as the "style:paddingAfter" attribute information, either "back margin length" or "takeover" can be set. As an initial value, "0px" can be set. There is no continuity of the contents of a value to be set as the attribute information. In the embodiment, the "style:paddingAfter" attribute information can be used in a "block element." In "style:paddingBefore" attribute information, the insertion of a front margin area is set (or changed). As a value to be set as the "style: paddingBefore" attribute information, either "front margin length" or "takeover" can be set. As an initial value, "0px" can be set. There is no continuity of the contents of a value to be set as the attribute information. In the embodiment, the "style: paddingBefore" attribute information can be used in a "block element." In "style:paddingEnd" attribute information, the insertion of a lower margin area is set (or changed). As a value to be set as the "style:paddingEnd" attribute information, either "lower margin length" or "takeover" can be set. As an initial value, "0px" can be set. There is no continuity of the contents of a value to be set as the attribute information. In the embodiment, the "style:paddingEnd" attribute information can be used in a "block element."

In "style:paddingStart" attribute information written following FIGS. 95A, 95B, 96A, and 96B, the insertion of an upper margin area is set (or changed). As a value to be set as the "style:paddingStart" attribute information, either "upper margin length" or "takeover" can be set. As an initial value, "0px" can be set. There is no continuity of the contents of a value to be set as the attribute information. In the embodiment, the "style:paddingStart" attribute information can be used in a "block element." In "style:position" attribute information, a method of defining the starting point position of a specified area in the corresponding element is set (or changed). As a value to be set as the "style:position" attribute information, any one of "static value," "relative value," "absolute value," and "takeover" can be set. an initial value, "static value" can be set. There is no continuity of the contents of a value to be set as the attribute information. In the embodiment, the "style:position" attribute information can be used in a "position specifying element." In "style:scaling" attribute information, whether an image complying with the corresponding element keeps a specified aspect ratio or not is set (or changed). As a value to be set as the "style:scaling" attribute information, any one of "aspect ratio compatible," "aspect ratio incompatible," and "takeover" can be set. As an initial value, "aspect ratio incompatible" can be set. There is no continuity of the contents of a value to be set as the attribute information. In the embodiment, the "style:scaling" attribute information can be used in an "area element AREAEL," a "body element BODYEL," a "div element DVSNEL," a "button element BUTNEL," an "input element," or an "object element OBJTEL." In "style:startIndex" attribute information, the distance between the starting point positions of the corresponding square area and the adjacent square area is set (or changed). As a value to be set as the "style:startIndex" attribute information, any one of "length," "%," and "takeover" can be set. As an initial value, "0px" can be set. There is a continuity of the contents of a value to be set as the attribute information. In the embodiment, the "style:startIndex" attribute information can be used in a "block element." In "style:suppressAtLineBreak" attribute information, whether to "decrease" or "keep as-is" the character spacing in the same line is set (or changed). As a value to be set as the "style: suppressAtLineBreak" attribute information, any one of "automatic setting," "deceasing," "keeping as-is," and "takeover" can be set. As an initial value, "automatic setting" can be set. There is no continuity of the contents of a value to be set as the attribute information. In the embodiment, the "style:suppressAtLineBreak" attribute information can be used in an "inline element including only PC data content." In "style:textAlign" attribute information, a location in a row in a text area is set (or changed). As a value to be set as the "style:textAlilgn" attribute information, any one of "left-aligned," "centering," "right-aligned," and "takeover" can be set. As an initial value, "left-aligned" can be set. There is a continuity of the contents of a value to be set as the attribute information. In the embodiment, the "style:textAlign" attribute information can be used in a "p element PRGREL" or an "input element INPTEL." In "style:textAltitude" attribute information, the height of a text area in a row is set (or changed). As a value to be set as the "style:textAltitude" attribute information, any one of "automatic setting," "height," "%," and "takeover" can be set. As an initial value, "automatic setting" can be set. There is no continuity of the contents of a value to be set as the attribute information. In the embodiment, the "style:textAltitude" attribute information can be used in a "p element PRGREL," an "input element INPTEL," or a "span element SPANEL." In "style:textDepth" attribute information, a depth of text information displayed in a raised manner is set (or changed). As a value to be set as the "style:textDepth" attribute information, any one of "automatic setting," "length," "%," and "takeover" can be set. As an initial value, "automatic setting" can be set. There is no continuity of the contents of a value to be set as the attribute information. In the embodiment, the "style:textDepth" attribute information can be used in a "p element PRGREL," an "input element INPTEL," or a "span element SPANEL." In "style:textIndent" attribute information, the amount of bend of the entire text character string displayed in a line is set (or changed). As a value to be set as the "style:textIndent" attribute information, any one of "length," "%," and "takeover" can be set. As an initial value, "0px" can be set. There is a continuity of the contents of a value to be set as the attribute information. In the embodiment, the "style:textIndent" attribute information can be used in a "p element PRGREL" or an "input element INPTEL." In "style:visibility" attribute information, a method of displaying a background to a foreground (or the transparency of a foreground) is set (or changed). As a value to be set as the "style:visibility" attribute information, any one of "displaying the background," "hiding the background," and "takeover" can be set. As an initial value, "displaying the backgound" can be set. There is a continuity of the contents of a value to be set as the attribute information. In the embodiment, the "style:visibility" attribute information can be used in a "content element." In "style:whiteSpaceCollapse" attribute information, a white space squeezing process is set (or changed). As a value to be set as the "style:whiteSpaceCollapse" attribute information, any one of "no white space squeezing," "white space squeezing," and "takeover" can be set. As an initial value, "white space squeezing" can be set. There is a continuity of the contents of a value to be set as the attribute information. In the embodiment, the "style:whiteSpaceCollapse" attribute information can be used in an "input element INPTEL" or a "p element PRGREL." In "style:whiteSpaceTreatment"

attribute information, white space processing is set (or changed). As a value to be set as the "style:whiteSpaceTreatment" attribute information, any one of "ignoring," "maintaining the white space," "ignoring the front white space," "ignoring the back white space," "ignoring the peripheral white space, and "takeover" can be set. As an initial value, "ignoring the peripheral white space" can be set. There is a continuity of the contents of a value to be set as the attribute information. In the embodiment, the "style:whiteSpaceTreatment" attribute information can be used in an "input element INPTEL" or a "p element PRGREL." In "style:width" attribute information, the width of a square area is set (or changed). As a value to be set as the "style:width" attribute information, any one of "automatic setting," "width," "%," and "takeover" can be set. As an initial value, "initial setting" can be set. There is no continuity of the contents of a value to be set as the attribute information. In the embodiment, the "style:width" attribute information can be used in an "position specifying element," a "button element BUNTNEL," an "object element OBJTEL," or an "input element INPTEL." In "style:wrapOption" attribute information, whether to skip one row in front of and behind a specified row by automatic setting is set (or changed). As a value to be set as the "style:wrapOption" attribute information, any one of "continuing," "skipping one row," and "takeover" can be set. As an initial value, "skipping one row" can be set. There is a continuity of the contents of a value to be set as the attribute information. In the embodiment, the "style:wrapOption" attribute information can be used in an "input element INPTEL," a "p element PRGREL," or a "span element SPANEL." In "style:writingMode" attribute information, a direction in which characters are written in a block or a row is set (or changed). As a value to be set as the "style:writingMode" attribute information, any one of "lr-tb," "rl-tb," "tb-rl," and "takeover" can be set. As an initial value, "lr-tb" can be set. There is a continuity of the contents of a value to be set as the attribute information. In the embodiment, the "style:writingMode" attribute information can be used in a "div element DVSNEL" or an "input element INPTEL." In "style:x" attribute information, an x-coordinate value of the starting point position of a square area is set (or changed). As a value to be set as the "style:x" attribute information, any one of "coordinate value," "%," "automatic setting," and "takeover" can be set. As an initial value, "automatic setting" can be set. There is no continuity of the contents of a value to be set as the attribute information. In the embodiment, the "style:x" attribute information can be used in a "position specifying element." In "style:y" attribute information, a y-coordinate value of the starting point position of a square area is set (or changed). As a value to be set as the "style:y" attribute information, any one of "coordinate value," "%," "automatic setting," and "takeover" can be set. As an initial value, "automatic setting" can be set. There is no continuity of the contents of a value to be set as the attribute information. In the embodiment, the "style:y" attribute information can be used in a "position specifying element." In "style:zIndex" attribute information, a z index (an anteroposterior relationship in a stacked representation) of a specified area is set (or changed). As a value to be set as the "style:zIndex" attribute information, any one of "automatic setting," "z index (positive) value," and "takeover" can be set. As an initial value, "automatic setting" can be set. There is no continuity of the contents of a value to be set as the attribute information. In the embodiment, the "style:zIndex" attribute information can be used in a "position specifying element."

As shown in FIG. 91(*a*), there is a head element HEADEL in the root element ROOTEL. Then, there are a timing element TIMGEL and a styling element STNGEL in the head element HEADEL. As shown in FIG. 91(*c*), in the timing element TIMGEL, various elements belonging to the timing vocabulary TIMVOC are written, thereby constituting a time sheet. As shown in FIG. 91(*d*), in the styling element STNGEL existing in the head element HEADEL, various elements belonging to the style vocabulary STLVOC are written, thereby constituting a style sheet. In the markup MRKUP descriptive sentence of the embodiment, a body element BODYEL exists in a position different from the head element HEADEL (or behind the head element). As shown in FIG. 91(*b*), in the body element BODYEL, each element (or content element) belonging to the content vocabulary is included. In the embodiment, various types of attribute information defined in a state name space shown in FIG. 98 can be written in each element (or content element) belonging to the content vocabulary CNTVOC. As shown in FIG. 90(*c*), there is a place in which "optional attribute information OPATRI" can be written in the basic data structure in an element (xml descriptive sentence). In FIG. 90(*d*), an arbitrary piece of attribute information STNSAT defined in the style name space can be used in the "optional attribute information OPATRI," whereas various types of attribute information defined in the state name space can be used in the "optional attribute information OPATRI."

<General>

Content elements expose their interaction state as attributes in the state namespace.

The styling and timesheet can use these values in pathExpressions, to control the look of the element and as event triggers.

The author can set the initial values of these properties through attributes, the presentation engine however changes these values based on user interaction, therefore for the following attributes state: foreground, state: pointer, state: actioned setting the value in markup using <animate> or <set> or script (using the animatedElement API) has no effect. For the attributes state: focused, state: enabled and state: value, the value may be set in markup or script and this value will override the value which would otherwise be set by the presentation engine.

Each element maintains a set of states. The following table summarizes the interactive states and shows their applicability to the element groups.

As described above, various types of attribute information written in FIG. 98 can be written optionally in the descriptive area of "optional attribute information OPATRI" in each type of element (or content element) in the content vocabulary CNTVOC written in the body element BODYEL. Each type of attribute information written in FIG. 98 is defined in the state name space.

A method of using attribute information defined in the state name space of FIG. 98 from a time sheet written in the timing element TIMGEL and a style sheet written in the styling element STNGEL in the head element HEADEL of FIG. 91(*a*) will be explained below. In various elements belonging to the timing vocabulary TIMVOC of FIG. 91(*c*) or in various elements belonging to the style vocabulary STLVOC of FIG. 91(*d*), "pathExpressions" (information for specifying a specific element written in the body element BODYEL shown in FIG. 91(*a*)) can be written as a value set as "required attribute information RQATRI" or as "optional attribute information OPATRI" shown in FIG. 90(*c*). Using "pathExpressions," various elements (or content elements) included in the content vocabulary CNTVOC are specified, which makes it possible to use the contents of the attribute information written in FIG. 98 from the time sheet or style sheet.

The content creator (or content provider) can set the value of the attribute information in the markup page MRKUP. Various setting values set in "state:focused," "state:enabled," and "state:value" can be set in the markup MRKUP or script SCRPT. Each type of element (or content element) in the content vocabulary CNTVOC shown in FIG. 91(*b*) continues holding the state set determined in each type of attribute information specified in FIG. 98. As shown in FIG. 1, in the embodiment, the information recording and reproducing apparatus 1 includes an advanced content playback section ADVPL. As shown in FIG. 14, the advanced content playback section ADVPL houses a presentation engine PRSEN on a standard scale. On the basis of a user interaction (or user specification), the presentation engine PRSEN (particularly, the advanced application presentation engine AAPEN or the advanced subtitle player ASBPL shown in FIG. 30) can change the setting value of each type of attribute information shown in FIG. 98. As for the values of "state:focused," "state:enabled," and "state:value" set in the markup MRKUP or script SCRPT, the setting values can be changed by the presentation engine PRSEN (particularly, the advanced application presentation engine AAPEN or advanced subtitle player ASBPL).

Hereinafter, the contents of various types of attribute information defined in the state name space shown in FIG. 98 will be explained. In FIG. 98, "state:foreground" usable in the body element BODYEL describes that the screen specified by an element is arranged in the foreground. As a setting value of the "state:foreground" attribute information, either "true" or "false" is set. If the description of the attribute information is omitted, "false" is specified as a default value. In the "state:foreground," the setting value cannot be changed by the presentation engine PRSEN (particularly by the advanced application presentation engine AAPEN or advanced subtitle player ASBPL shown in FIG. 30). Next, "state:enabled" usable in elements (br elements BREKEL and object elements OBJTEL) classified as a "display" class in FIG. 91(*b*) indicates whether the target element can be executed. As a setting value of the "state:enabled" attribute information, either "true" or "false" is set. If the description of the attribute information is omitted, "true" is specified as a default value. In the "state:enabled," the setting value can be changed by the presentation engine PRSEN (particularly by the advanced application presentation engine AAPEN or advanced subtitle player ASBPL shown in FIG. 30). "state:focused" indicates that the target element is in the user input (or user specifying) state. As a setting value of the "state:focused" attribute information, either "true" or "false" is set. If the description of the attribute information is omitted, "false" is specified as a default value. In the "state:focused," the setting value can be changed by the presentation engine PRSEN (particularly by the advanced application presentation engine AAPEN or advanced subtitle player ASBPL shown in FIG. 30). Moreover, "state:actioned" indicates that the target element is executing a process. As a setting value of the "state:actioned" attribute information, either "true" or "false" is set. If the description of the attribute information is omitted, "false" is specified as a default value. When the setting value of the attribute information is changed by another method using the presentation engine PRSEN of FIG. 14 (particularly by the advanced application presentation engine AAPEN or advanced subtitle player ASBPL shown in FIG. 30), the setting value of the "state:actioned" can be changed by the presentation engine PRSEN (particularly by the advanced application presentation engine AAPEN or advanced subtitle player ASBPL shown in FIG. 30). Next, "state:pointer" indicates whether the cursor position is within or outside an element specifying position. As a setting value of the "state:pointer" attribute information, either "true" or "false" is set. If the description of the attribute information is omitted, "false" is specified as a default value. In the "state:pointer," the setting value cannot be changed by the presentation engine PRSEN (particularly by the advanced application presentation engine AAPEN or advanced subtitle player ASBPL shown in FIG. 30). Finally, "state:value" usable in elements (area elements AREAEL, button elements BUTNEL, and input elements INPTEL) classified as the "state" class in FIG. 91(*b*) sets a variable value in the target element. As a setting value of the "state:value" attribute information, "variable value" is set. If the description of the attribute information is omitted, "variable value" is specified as a default value. In the "state:value," the setting value can be changed by the presentation engine PRSEN (particularly by the advanced application presentation engine AAPEN or advanced subtitle player ASBPL shown in FIG. 30).

In the embodiment, as shown in FIG. 90(*c*), required attribute information RQATRI, optional attribute information OPATRI, and content information CONTNT can be arranged in an element (xml descriptive sentence). The contents of the required attribute information RQATRI or optional attribute information OPATRI are written in FIG. 93, FIGS. 95A to 97B, FIG. 98, and FIG. 94. As the contents of the content information CONTNT, various elements belonging various vocabularies and PC data shown in FIG. 91(*b*) to FIG. 91(*d*) can be written. As shown in FIG. 91(*a*), in a markup MRKUP descriptive sentence, various elements belonging to the content vocabulary CNTVOC of FIG. 91 can be arranged in the body element BODYEL in the root element ROOTEL. FIG. 99 shows the contents of required attribute information RQATRI, optional attribute information OPATRI, and content information CONTNT settable in various elements (or content elements) belonging to the content vocabulary CNTVOC of FIG. 91(*b*).

In an area element AREAEL, "accesskey" attribute information has to be written as required attribute information RQATRI. Writing the "accesskey" attribute information in the area element AREAEL makes it possible to establish, via the "accesskey" attribute information, the relationship (or link condition) with another element in which the value of the same "accesskey" attribute information has been written. As a result, a method of using an area on the screen specified by the area element AREAEL can be set using another element. As seen from the row of "accesskey" attribute information of FIG. 99, the "accesskey" attribute information has to be written not only in the area element AREAEL but also in a button element BUTNEL for setting a user input button (see FIG. 91(*b*)) and an input element INPTEL for setting a text box the user can input (see FIG. 91(*b*)) in the embodiment. This makes it possible to realize advanced processes, including the process of "setting an area set as a button on the markup screen MRKUP in a transition-to-active-state specifying area (or the linkage process between an area element AREAEL and a button element BUTNEL) and the process of "setting an area the user can input as a text box in a transition-to-active-state specifying area (or the linkage process between an area element AREAEL and an input element INPTEL), which improves the convenience of the user remarkably. In the area element AREAEL, not only can various types of attribute information, such as "coords," "shape," "class," or "id," be written as optional attribute information OPATRI, but also arbitrary attribute information in the style name space and arbitrary attribute information can be arranged. Arbitrary attribute information in the style name space means arbitrary attribute information defined as an option in the style name space shown in FIGS. 95A to 97B.

In the body element BODYEL, not only can various types of attribute information, such as "begin," "class," "id," "dur," "end," "timeContainer," "xml:lang," or "xml:space," be written as optional attribute information OPATRI, but also arbitrary attribute information in the style name space and arbitrary attribute information can be arranged. Moreover, as content information CONTNT directly written in the body element BODYEL, a "div element DVSNEL," an "include element INCLEL," a "meta element METAEL," or an "object element OBJTEL" can be arranged. In addition to this, the element may be used as a parent element and another type of a child element may be placed in the parent element. In the embodiment, a div element DVSNEL for setting divisions for classifying elements belonging to the same block type into blocks is placed in the body element BODYEL (see FIG. 91(*b*)), which makes it easy to construct a hierarchical structure in an element description (such a generation hierarchy as parent element/child element/grandchild element). As a result, the embodiment makes it easy not only to look at what has been written in the markup MRKUP but also to create and edit a new descriptive sentence in the markup MRKUP.

In a br element BREKEL next to the body element, there is no required attribute information RQATRI. In the br element, not only can various types of attribute information, such as "class," "id," "xml:lang," or "xml:space" be written as optional attribute information OPATRI, but also arbitrary attribute information can be arranged.

In a button element BUTNEL, "accesskey" attribute information has to be written as required attribute information RQATRI. Via "accesskey" attribute information in which the same value has been written as described above, the contents set in the button element BUNTNEL can be related to the contents set in the area element AREAEL, which improves the power of expression for the user in the markup page MRKUP. In addition to this, it is possible to fulfill the linkage function between various functions set in an input element INPTEL or the like via the "accesskey" attribute information in which the same value has been written. In the button element BUTNEL, not only can various types of attribute information, such as "class," "id," "xml:lang," or "xml:space," be written as optional attribute information OPATRI, but also arbitrary attribute information in the style name space and arbitrary attribute information can be arranged. Moreover, as content information CONTNT in the button element BUTNEL, a "meta element METAEL," and a "p element PRGREL" can be arranged. Placing in the button element BUTNEL a p element PRGREL (see FIG. 91(*b*)) for setting the timing of displaying paragraph blocks (text extending over a plurality of rows) and the display format enables text information (describing the contents of the button) to be displayed on the button shown to the user, which provides the user with an easier-to-understand representation. In addition, placing a meta element METAEL (see FIG. 91(*b*)) for setting (a combination of) elements representing the contents of an advanced application in the button element BUTNEL makes it easy to relate the button shown to the user to the advanced application ADAPL.

Furthermore, in the div element DVSNEL, not only can various types of attribute information, such as "begin," "class," "id," "dur," "end," "timeContainer," "xml:lang," or "xml:space," be written as optional attribute information OPATRI, but also arbitrary attribute information in the style name space and arbitrary attribute information can be arranged. Moreover, as content information CONTNT in the div element DVSNEL, a "button element BUTNEL," a "div element DVSNEL," an "input element INPTEL," a "meta element METAEL," an "object element OBJTEL," and a "p element PRGREL" can be arranged. This makes it possible to combine a "button element BUTNEL," a "div element DVSNEL," an "input element INPTEL," a "meta element METAEL," an "object element OBJTEL," and a "p element PRGREL" to set a block, which makes it easy not only to look at what has been written in the markup MRKUP but also to create and edit a new descriptive sentence in the markup MRKUP. In the embodiment, another div element DVSNEL can be placed as a "child element" in the div elemant DVSNEL, enabling the levels of hierarchy in block classification to be made multilayered, which makes it easier not only to look at what has been written in the markup MRKUP but also to create and edit a new descriptive sentence in the markup MRKUP.

In the head element HEADEL, there is no required attribute information RQATRI. In the head element HEADEL, not only can various types of attribute information, such as "id," "xml:lang," or "xml:space" be written as optional attribute information OPATRI, but also arbitrary attribute information can be arranged. Moreover, as content information CONTNT in the head element HEADEL, an "include element INCLEL," a "meta element METAEL," a "timing element TIMGEL," and a "styling element" can be arranged. In the embodiment, as shown in FIG. 91(*a*), placing a "timing element TIMGEL" in the head element HEADEL to configure a time sheet enables timing shared in the markup page MRKUP to be set. Placing a "styling element STNGEL" to configure a style sheet enables a representation format shared in the markup page MRKUP to be set. Separating the functions that way makes it easy to create and edit a new markup page MRKUP.

In an include element INCLEL explained below, "condition" attribute information has to be written as required attribute information RQATRI. This makes it possible to define use conditions in an include element INCLEL (see FIG. 93), clarifying a method of specifying a document to be referred to (see FIG. 91(*b*)), which makes easy a method of displaying a markup screen about what has been written in the markup descriptive sentence. In the include element INCLEL, not only can various types of attribute information, such as "id" or "href," be written as optional attribute information OPATRI, but also arbitrary attribute information can be arranged.

In the input element INPTEL, "accesskey" attribute information and "mode" attribute information have to be written as required attribute information RQATRI. As described above, via "accesskey" attribute information in which the same value has been written, it is possible to fulfill the linkage function between various functions set in an area element AREAEL, a button element BUTNEL, or the like. In the input element INPTEL, not only can various types of attribute information, such as "class," "id," "xml:lang," or "xml:space," be written as optional attribute information OPATRI, but also arbitrary attribute information in the style name space and arbitrary attribute information can be arranged. Moreover, as content information CONTNT in the input element INPTEL, a "meta element METAEL," and a "p element PRGREL" can be arranged. Placing a p element PRGREL (see FIG. 91(*b*)) for setting the timing of displaying paragraph blocks (text extending over a plurality of rows) and the display format in the input element INPTEL (see FIG. 91(*b*)) for setting a text box the user can input makes it possible to set the display timing of the text box itself the user can input and the display format. This enables the text box the user can input to be controlled minutely, which improves user-friendliness more.

In the meta element METAEL, there is no required attribute information RQATRI. In the meta element METAEL, not only can various types of attribute information, such as "id," "xml:lang," or "xml:space," be written as optional attribute information OPATRI, but also arbitrary attribute information can be arranged. Moreover, as content information CONTNT in the meta element METAEL, an arbitrary element in the range from an "area element AREAEL" to a "style element STYLEL" can be arranged as shown in FIG. 99.

In the object element OBJTEL next to the meta element, "type" attribute information has to be written as required attribute information RQATRI. In the object element OBJTEL, not only can various types of attribute information, such as "class," "id," "xml:lang," "xml:space," "src," or "content," be written as optional attribute information OPATRI, but also arbitrary attribute information in the style name space and arbitrary attribute information can be arranged. Moreover, as content information CONTNT in the object element OBJTEL, an "area element AREAEL," a "meta element," a "p element PRGREL," and a "param element PRMTEL" can be arranged. A param element PRMTEL capable of setting parameters is placed in the object element OBJTEL, which makes it possible to set fine parameters for various objects to be pasted on the markup page MRKUP (or to be linked with the markup page MRKUP). This makes it possible to set conditions for fine objects and further paste and link a wide variety of object files, which improves the power of expression to the user remarkably. Moreover, placing a p element PRGREL (see FIG. 91(*b*)) for setting the timing of displaying paragraph blocks (or text extending over a plurality of rows) and the display format and a param element PRMTEL (see 91(*b*)) for setting the timing of displaying one row of text (in a block) and the display format in the object element OBJTEL makes it possible to specify a font file FONT used in displaying the text data written as PC data in the p element PRGREL or param element PRMTEL on the basis of src attribute information in the object element OBJTEL (see FIG. 92(*f*) or FIG. 102B(e)). This makes it possible to give a text representation in the markup page MRKUP in an arbitrary font format, which improves the power of expression to the user remarkably. In the embodiment, as shown in FIG. 12, a still image file IMAGE, an effect audio FETAD, and a font file FONT can be referred to from the markup MRKUP. When the still image file IMAGE, effect audio EFTAD, or font file FONT is referred to from the markup MRKUP, the object element OBJTEL is used. Specifically, URI (uniform resource identifier) can be written as the value of src attribute information in the object element OBJTEL. Using the URI, the storage location (path) or file name of a still image file IMAGE, effect audio FETAD, or font file FONT is specified, which makes it possible to set the pasting or linking of various files into or with the markup MRKUP.

Furthermore, in the p element PRGREL, not only can various types of attribute information, such as "begin," "class," "id," "dur," "end," "timeContainer," "xml:lang," or "xml:space," be written as optional attribute information OPATRI, but also arbitrary attribute information in the style name space and arbitrary attribute information can be arranged. Moreover, as content information CONTNT in the p element PRGREL, a "br element BREKEL," a "button element BUTNEL," an "input element INPTEL," a "meta element METAEL," an "object element OBJTEL," and a "span element SPANEL" can be arranged. Placing a button element BUTNEL and an object element OBJTEL in the p element PRGREL (see FIG. 91(*b*)) capable of setting the display timing and display format of text extending over a plurality of rows enables text information to be displayed so as to overlap with the button or still image IMAGE displayed on the markup page MRKUP, which provides the user with an easier-to-understand representation. Placing a span element SPANEL (see FIG. 91(*b*)) capable of setting the timing of displaying text row by row in the p element PRGREL (see FIG. 91(*b*)) capable of setting the display timing and display format of text extending over a plurality of rows makes it possible to set minutely the timing of displaying text row by row and the display format in text extending over a plurality of rows. This makes it possible to perform fine display control of display text synchronizing with the time progress of the moving image and sound (such as a primary video set PRMVS or a secondary video set SCDVS) reproduced and displayed simultaneously as "a part (the color or highlighted part) of the words of the song in karaoke is changed to accompaniment," which improves the power of expression and the convenience of the user remarkably. Moreover, in the p element PRGREL, "PC data" can be arranged as content information CONTNT. Placing, for example, text data as PC data in the p element PRGREL makes it possible not only to display text data to be displayed in the markup page MRKUP in the optimum display format with the best timing, but also to display subtitles or tickers in synchronization with video information (or a primary video set PRMVS or a secondary video set SCDVS) as shown in FIGS. 92(*f*) or FIG. 102B(e).

In the param element PRMTEL, "name" attribute information has to be written as required attribute information RQATRI. The "name" attribute information is used to specify "variable name" defined in the pram element PRMTEL. Since an arbitrary name can be used as the "variable name" in the embodiment, a large number of variables (or variable names) can be set at the same time, which enables complex control in the markup MRKUP. In the param element PRMTEL, not only can various types of attribute information, such as "id," "xml:lang," or "value," be written as optional attribute information OPATRI, but also arbitrary attribute information can be arranged. In the embodiment, "variable value" input to "variable name" set by the "name" attribute information using the "value" attribute information can be set. In the embodiment, the param element PRMTEL is set in the event element EVNTEL and a combination of "name" attribute information and "value" attribute information is written in the param element PRMTEL, which enables the occurrence of an event to be defined in the markup MRKUP. Moreover, the values of the "name" attribute information and "value" attribute information are used in an API command (or function) defined in the script SCRIPT. In the param element PRMTEL, "PC data" can be placed as content information CONTNT, which makes it possible to set complex parameters using PC data.

Furthermore, in the root element ROOTEL, there is no required attribute information RQATRI. In the root element ROOTEL, various types of attribute information, such as "id," "xml:lang," or "xml:space," can be written as optional attribute information OPATRI. Moreover, in the root element ROOTEL, a "body element BODEL" and a "head element HEADEL" can be arranged as content information CONTNT. As shown in FIG. 91(*a*), arranging a "body element BODEL" and a "head element HEADEL" in the root element ROOTEL makes it possible to separate the written part of the body content from that of the head content, which makes it easy to reproduce and display the markup MRKUP. In the embodiment, as shown in FIG. 91(*a*), not only is a timing element TIMGEL placed in the head element HEADEL to configure a time sheet, thereby managing the timing of the descriptive content of the body element BODYEL, but also a styling element STNGEL is placed in the head element HEADEL to configure a style sheet, thereby managing the display format of the descriptive content of the body element BODYEL, which improves the convenience of creating or editing a new markup MRKUP as shown in FIGS. 101A and 101B.

In a span element SPANEL written at the end, not only can various types of attribute information, such as "begin," "class," "id," "dur," "end," "timeContainer," "xml:lang," or "xml:space," be written as optional attribute information OPATRI, but also arbitrary attribute information in the style name space and arbitrary attribute information can be arranged. Moreover, as content information CONTNT in the span element SPANEL, a "br element BREKEL," a "button element BUTNEL," an "input element INPTEL," a "meta element METAEL," an "object element OBJTEL," and a "span element SPANEL" can be arranged. Placing a button element BUTNEL and an object element OBJTEL in the span element SPANEL (see FIG. 91(*b*)) in which the display timing and display format of a row of text can be set enables text information to be displayed so as to overlap with the button or still image IMAGE displayed on the markup page MRKUP, which provides the user with an easier-to-understand representation. Moreover, in the span element SPANEL, "PC data" can be arranged as content information CONTNT. Placing, for example, text data as PC data in the span element SPANEL makes it possible not only to display a row of text data to be displayed in the markup page MRKUP, but also to display subtitles or tickers in synchronization with video information (or a primary video set PRMVS or a secondary video set SCDVS) as shown in FIGS. 92(*f*) or FIG. 102B(e).

As shown in FIG. 99, arbitrary attribute information defined in the style name space of FIGS. 95A and 95B can be set as optional attribute information OPATRI, such as an "area element AREAEL," a "body element BODYEL," a "button element BUTNEL," a "div element DVSNEL," an "input element INPTEL," an "object element OBJTEL," a "p element PRGREL," or a "span element SPANEL." As seen from FIGS. 95A and 95B, since the display format can be set on the basis of attribute information defined in the style name space in a wide variety of markup pages MRKUP, the display formats of the various elements can be set variedly. Moreover, as shown in FIG. 99, in all the content elements excluding the root element ROOTEL, "arbitrary attribute information" can be set as optional attribute information OPATRI. The "arbitrary attribute information" means not only the attribute information written in FIGS. 95A and 95B but also any one of the pieces of attribute information written in FIGS. 93, 94, and 98. This makes it possible to set various conditions, including timing setting and display format setting in all the content elements excluding the root element ROOTEL, which improves the power of expression and various setting functions in the markup page MRKUP remarkably.

In the embodiment, as shown in FIG. 90(*c*), in an element (xml descriptive sentence), required attribute information RQATRI, optional attribute information OPATRI, and content information CONTNT can be set. In each of the required attribute information RQATRI and optional attribute information OPATRI, any one of the various types of attribute information shown in FIG. 93, FIGS. 95A to 97B, FIG. 89, or FIG. 94 can be written (or placed). In the content information CONTNT, various elements shown in FIGS. 91(*b*) to 91(*d*) can be arranged. As shown in FIG. 91(*a*), in the head element HEADEL in the root element ROOTEL, a timing element TIMGEL can be placed. In the timing element TIMGEL, various elements (see FIG. 91(*c*)) belonging to the timing vocabulary TIMVOC can be written. FIG. 100 shows required attribute information RQATRI, optional attribute information OPATRI, and content information CONTNT which can be set in various elements belonging to the timing vocabulary TIMVOC.

In an animate element ANIMEL, "additive" attribute information and "calcMode" attribute information have to be written as required attribute information RQATRI. Moreover, in the animate element ANIMEL, "id" attribute information can be written as optional attribute information OPATRI. Furthermore, in the animate element ANIMEL, "arbitrary attribute information" and "arbitrary attribute information in the content, style, and state name space can be written. The animate element ANIMEL is an element used in setting the display of animation. When the animation is set, it is necessary to set the style (or display format) shown to the user and further set the state of animation. Therefore, in the animate element ANIMEL, arbitrary attribute information in the content, style, and state name space is made settable, enabling a wide range of expression forms for the animation set in the animate element ANIMEL to be specified, which improves the power of expression to the user.

In the cue element CUEELE, "begin" attribute information and "select" attribute information have to be written as required attribute information RQATRI. In the embodiment, the cue element CUEELE is an element used to select a specific content element and set the timing and change the condition. Therefore, as shown in FIGS. 101A and 101B, a specific content element can be specified using "select" attribute information. The embodiment is characterized in that the cue element CUEELE enables specification start timing to be set in a specific content element by using "begin" attribute information as required attribute information RQATRI set in the cue element CUEELE. When "time information" is set as the value set in the "begin" attribute information, a dynamic change of the markup page MRKUP can be represented according to the passage of time. When "pass information" is set as the value set in the "begin" attribute information, "the specification of a specific content element" and "the specification of state" of the content element can be performed at the same time. As a result, for example, since a case where the user selects a specific button set on the markup page MRKUP (or when the button element BUTNEL is "in the middle of processing") can be used in setting the specification start timing of a specific content element, which improves the user interface function of the markup page MRKUP remarkably. In the cue element CUEELE, "id" attribute information," "dur" attribute information, "end" attribute information, "fill" attribute information, and "use" attribute information can be written as optional attribute information OPATRI. Moreover, in the cure element CUEELE, "arbitrary attribute information" can be written. Moreover, in the cue element CUEELE, an "animate element ANIMEL," an "event element EVNTEL," a "link element LINKEL," and a "set element SETELE" can be arranged as content information CONTNT. When an "animate element ANIMEL" is set as content information CONTNT, animation display can be set in the content element specified by the cue element CUEELE. When an "event element EVNTEL" is set as content information CONTNT, an event can be generated on the basis of a change in the state of the content element specified by the cue element CUEELE. When a "link element LINKEL" is set as content information CONTNT, hyperlinks can be set in the content element specified by the cue element CUEELE. When a set element SETELE is set as content information CONTNT in the cue element CUEELE, detailed attribute conditions and characteristic conditions can be set in the content element set in the cue element CUEELE. As described above, placing the various elements shown in FIG. 100 in the content information CONTNT in the cue element CUEELE makes it possible to set a wide variety of functions in the content element put in the body element BODYEL.

Furthermore, in the event element EVNTEL, "name" attribute information has to be written as required attribute information RQATRI. Setting "name EVNTNM corresponding to an event to which an arbitrary name can be given" as the value of the "name" attribute information makes it possible to set an arbitrarily namable event corresponding to an event. Since information on the "name EVNTNM corresponding to an event to which an arbitrary name can be given" is used in the event listener EVTLSN in the script SCRPT, the "name EVNTNM corresponding to an event to which an arbitrary name can be given" is an important value to secure the relationship with the script SCRPT. Moreover, in the event element EVNTEL, "id" attribute information can be written as optional attribute information OPATRI. Furthermore, in the event element EVNTEL, "arbitrary attribute information" can be written. In addition, a "parm element PRMTEL" can be arranged as content information CONTNT in the event element EVNTEL. Placing a param element PRMTEL in the event element EVNTEL makes it easier to set conditions in the script SCRPT. Specifically, the value of "name" attribute information and "value" attribute information used in the param element PRMTEL are used in an "API command function descriptive sentence APIFNC" in the script SCRIPT.

In the def element DEFSEL, there is no required attribute information RQATRI. In the def element DEFSEL, "id" attribute information can be written as optional attribute information OPATRI. Moreover, in the def element DEFSEL, "arbitrary attribute information" can be written. As content information CONTNT placeable in the def element DEFSEL, an "animate element ANIMEL," an "event element EVNTEL," a "g element GROPEL," a "link element LINKEL," and a "set element SETELE" can be arranged. The def element DEFSEL is an element used in defining a specific animate element ANIMEL element (group) as shown in FIG. 91(*c*). Placing an event element EVNTEL in the def element DEFSEL enables an event to be generated when there is a change in the state of all of the set (or group) of animation elements. Moreover, placing a link element LINKEL in the def element DEFSEL makes it possible to set hyperlinks simultaneously in a set (or group) of specific animation elements. Setting particularly a set element SETELE in the def element DEFSEL makes it possible to set detailed attribute conditions and characteristic conditions simultaneously in a set (or group) of specific animation elements, which helps simplify the description in the markup MRKUP.

In the g element GROPEL, there is no required attribute information RQATRI. In the g element GROPEL, "id" attribute information can be written as optional attribute information OPATRI. Moreover, in the g element GROPEL, "arbitrary attribute information" can be written. As content information CONTNT placeable in the g element GROPEL, an "animate element ANIMEL," an "event element EVNTEL," a "g element GROPEL," and a "set element SETELE" can be arranged. The setting of content information CONTNT in the g element GROPEL defining the grouping of animation elements produces the same effect as that of the defs element DEFSEL. Specifically, placing an event element EVNTEL in the g element GROPEL enables an event to be generated when there is a change in the state of the group of animation elements. In the embodiment, placing particularly a g element GROPEL as a child element in the g element GROPEL enables sets (or groups) of animation elements to be hierarchized, which makes it possible to structure the descriptive content in the markup MRKUP. As a result, the efficiency in creating a new markup page MRKUP can be improved.

In the link element LINKEL, there is no required attribute information RQATRI. In the link element LINKEL, "xml:base" attribute information and "href" attribute information can be written as optional attribute information OPATRI.

In a par element PARAEL and a seq element SEQNEL, "begin" attribute information has to be written as required attribute information RQATRI. Moreover, in the par element PARAEL and seq element SEQNEL, "id" attribute information, "dur" attribute information, and "end" attribute information can be written as optional attribute information OPATRI. In the par element PARAEL defining simultaneous parallel time progress or in the seq element SEQNEL progressing sequentially in one direction, "begin" attribute information, "dur" attribute information, or "end" attribute information is written, making it possible to specify "a range on the time axis defining simultaneous parallel time progress" or "a range on the time axis defining time progress going on sequentially in one direction, which enables the time progress method to be switched minutely on the time axis. Moreover, in the par element PARAEL and seq element SEQNEL, "arbitrary attribute information" can be written. As content information CONTNT placeable in the par element PARAEL and seq element SEQNEL, a "cue element CUEELE," a "par element PARAEL," and a "seq element SEQNEL" can be arranged. Setting a cue element CUEELE in the par element PARAEL or seq element SEQNEL enables a specific content element to be specified in simultaneous parallel time progress or time progress going on sequentially in one direction. Using particularly "begin" attribute information or "end" attribute information in the cue element CUEELE, the timing of specifying a content element in the time progress can be set minutely. The embodiment is characterized in that, since a par element PARAEL and a seq element SEQNEL can be arranged in each of the par element PARAEL and seq element SEQNEL independently, a wide variety of time transition representations can be given on the basis of the passage of time in the markup page MRKUP.

In the embodiment, it is possible to give complex time transition representations, such as setting a hierarchical structure with respect to sequential (or parallel) time progress, setting partially parallel time progress in sequential time progress, or setting partially sequential time progress in parallel time progress.

In the set element SETELE, there is no required attribute information RQATRI. In the set element SETELE, "id" attribute information can be written as optional attribute information OPATRI. Moreover, in the set element SETELE, "arbitrary attribute information" and "arbitrary attribute information in content, style, and state name space" can be written.

Finally, in the timing element TIMGEL, "begin" attribute information, "clock" attribute information, and "clockDivisor" attribute information have to be written as required attribute information RQATRI. Moreover, in the timing element TIMGEL, "id" attribute information, "dur" attribute information, "end" attribute information, and "timeContainer" attribute information can be written as optional attribute information OPATRI. Arranging "begin" attribute information, "dur" attribute information, and "end" attribute information in the timing element TIMGEL clarifies the time setting range specified in the time sheet (see FIG. 91(*a*)) set in the head element HEADEL. In addition, setting "clockDivisor" attribute information in the timing element TIMGEL makes it possible to set the ratio of the tick clock frequency to the frame frequency serving as a reference clock in the title timeline TMLE. In the embodiment, the value of the "clock-Divisor" attribute information is used to decrease the tick clock frequency with respect to the frame rate remarkably, which makes it possible to ease the burden of the processing of the advanced application manager ADAMNG (see FIG. 28) in the navigation manager NVMNG. Moreover, specifying the value of "clock" attribute information in the timing element TiMGEL makes it possible to specify a reference clock in the time sheet corresponding to the markup page MRKUP, which enables the best clock to be employed according to the contents of the markup MRKUP shown to the user. Moreover, in the timing element TIMGEL, "arbitrary attribute information" can be written. As content information placeable in the timing element TIMGEL, a "defs element DEFSEL," a "par element PARAEL," and a "seq element SEQNEL" can be arranged. Arranging a "par element PARAEL or a "seq element SEQNEL in the timing element TiMGEL enables a complex time progress path to be set in the time sheet, which enables a dynamic representation corresponding to the passage of time to be given to the user.

As shown in FIG. 94, attribute information used in each element belonging to the timing vocabulary, there is "select" attribute information for selecting and specifying a content element to be set or to be changed. As shown in FIG. 100, the "select" attribute information belongs to required attribute information RQATRI and can be used in the cue element CUEELE. In the embodiment, making good use of the "select" attribute information makes it possible to create a descriptive sentence in a markup MRKUP efficiently. As shown in FIG. 101A, the embodiment is characterized in that, as descriptive sentences in the markup MRKUP, a head element HEADEL descriptive area and a body element BODYEL descriptive area exist separately in the root element ROOTEL and a timing element TIMGEL descriptive area exists in the head element HEADEL, thereby describing the contents of a time sheet. The embodiment is further characterized in that a styling element STNGEL is written in the head element HEADEL, thereby setting the contents of a style sheet. The time sheet written in the timing element TIMGL and the style sheet written in the styling element STNGEL are written in an area different from the body element BODYEL. As shown in FIG. 101A, in the timing element TIMGEL, a cue element CUEELE is written. As required attribute information RQATRI in the cue element CUEELE, "select" attribute information is written. In the "select" attribute information, specific element specifying information SLCTEL in the body element can be written. On the basis of the "select" attribute information, a specific element to be written in the body element BODYEL is specified, which enables timing control information about the element specified in the time sheet to be shared and written in the time sheet (or in the timing element TIMGEL). Similarly, as shown in FIGS. 101A and 101B, in the style sheet written in the styling element STNGEL, a style element STYLEL is written. In the style element STYLEL, "select" attribute information is written. As described above, in the "select" attribute information, specific element specifying information SLCTEL in the body element can be written. This makes it possible to specify a common display style for specific elements written in the body element BODYEL.

Using FIG. 101B, a method of writing specific element specifying information SLCTEL in the body element set as the value of the "select" attribute information will be explained.

In method 1] of the embodiment explained first, a specific element in the body element BODYEL and the element name to which the specific element belongs are specified at the same time. Specifically, when a specific element in the body element BODYEL and the element name to which the specific element belongs are specified at the same time, the following description method is used:

Select="//[content model information CONTMD]
[@id=[identification data ELEMID on the specific element]

That is, the content model information CONTMD specifies the corresponding element name (see FIG. 90(*c*)) and identification data ELEMID on the specific element written just behind "id=" specifies (the value of "id" attribute information specified in) the specific element. The condition is based on the assumption that, in the content element written in the body element BODYEL, identification data (the value of "id" attribute information shown in FIG. 93) is written for each element to be specified. That is, as shown in FIG. 93, "id" attribute information for setting identification data (ID data) about each element in the content element can be written in the content element. Moreover, as shown in FIG. 99, the "id" attribute information for setting identification data (ID data) about each element belongs to optional attribute information OPATRI and can be set in all of the content elements. In the embodiment, as shown in FIG. 101B, identification data (ID data) about each element specified by the "id" attribute information is specified by "specific element identification data ELEMID" in "select" attribute information. An example of concrete description of specific element specifying information SLCTEL in the body element corresponding to item 1] is shown in item 4] of FIG. 101B. The part (select="//p[@id='P1ID']") underlined in 4] and shown by [1] is written by the description method of 1] of FIG. 101B.

In the description method shown of 2] of FIG. 101B in the embodiment, all of the elements by the same element name (having the same content model information CONTMD) in the body element can be specified at the same time. In this case, the following is written:

select="//[content model information CONTMD]"

All of the elements in the body element BODYEL corresponding to the same content model information CONTMD can be specified at the same time. An example of concrete description using the description method of 2] is shown in the area (select="//p") specified by [2] underlined in 4] of FIG. 101B.

Furthermore, in the embodiment, as shown in 3] of FIG. 101B, when only a specific element in the body element BODYEL is specified, the following is written:

Select="//*[@id=[identification data ELEMID on a specific element]]"

On the basis of the "identification data ELEMID on a specific element," identification data (ID data) on each element specified by "id" attribute information in the specific element described in the body element BODYEL can be specified. A concrete example of the description method is shown in the part (select="//*[@id='P1ID']") underlined in 4] of FIG. 101B and shown by [3].

Figure 102A:
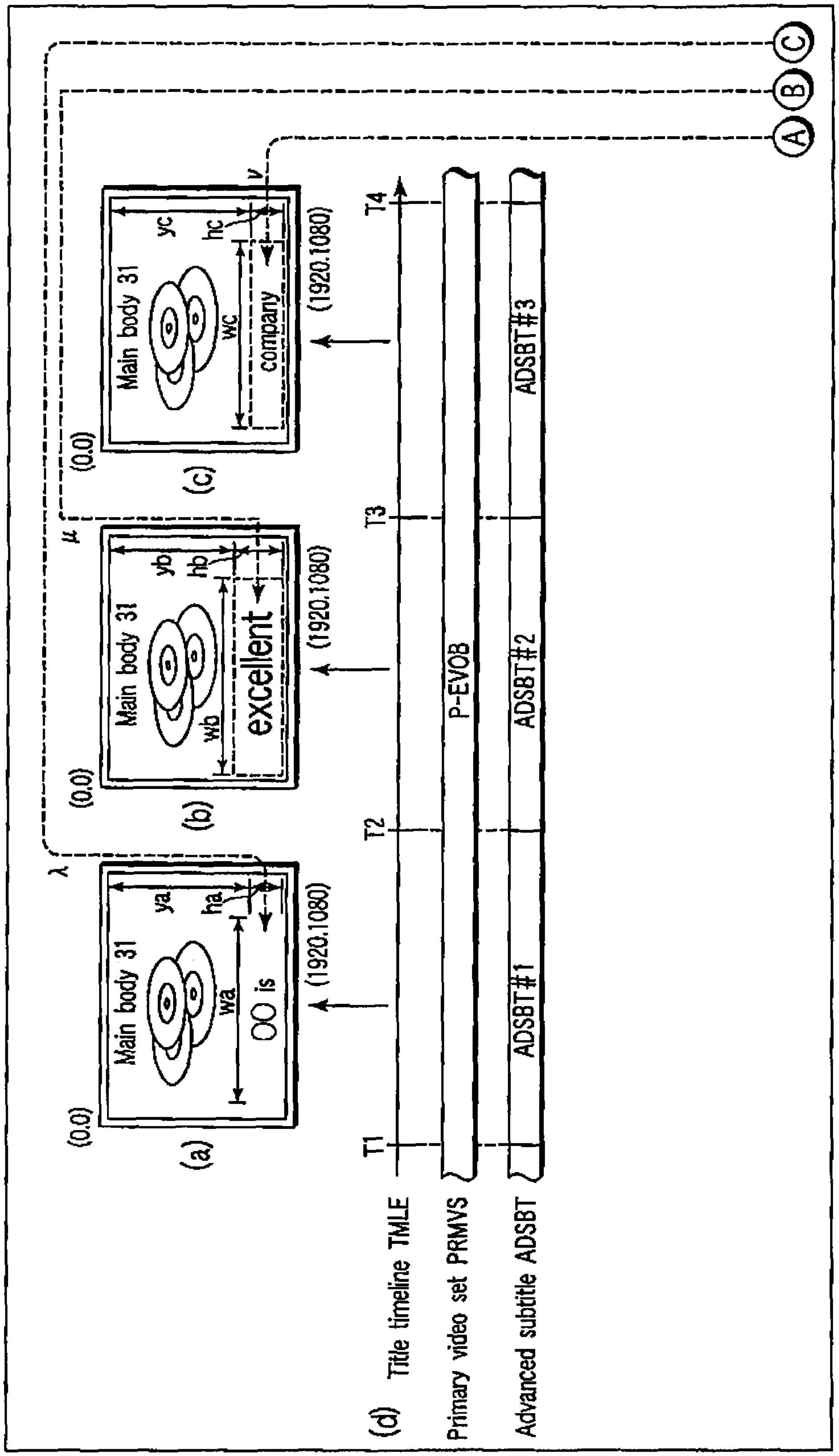

FIGS. 102A and 102B show an example of rewriting the example of description of the markup MRKUP of FIG. 92(*f*) on the basis of the select attribute information shown in FIGS. 101A and 101B. In FIG. 92(*f*), three p elements PRGREL are written in an object element OBJTEL. As attribute information in the object element, the following is written repeatedly for each p element PRGREL:

style:textAlign="center"

In contrast, in the description method of FIG. 102B(e), the following is written only in a style element STYLEL written first in the styling element (see broken line Y):

<style select="//p" style:textAlign="center"/>

In the description method related to "specific element specifying information SLCTEL in the body element" for the select attribute information, all of the p elements PRGREL in the body element BODYEL are specified at the same time using the description method shown in 2] of FIG. 101B. As a result, the following is set in all of the p elements PRGREL in the body element BODYEL:

Style:textAlign="center"

By the above description method, repetitive descriptions are eliminated in each p element PRGREL, which helps simplify the descriptive sentence in the markup MRKUP. In the next and later style elements STYLEL written in the styling element STNGEL of FIG. 102B(e), the description method in 3] of FIG. 101B is used as the method of writing "specific element specifying information SLCTEL in the body element" about select attribute information, thereby referring to each item of identification data (ID data) about each p element PRGREL written in the body element BODYEL. Specifically, as shown in the correspondence between broken line δ, broken line ϵ, and broken line ζ, the value of id attribute information in each p element PRGREL is referred to on the basis of select attribute information in each style element STYLEL. In FIG. 92(*f*), each piece of attribute information defined as an option in the style name space is written separately in each p element PRGREL in the body element BODYEL. In contrast, use of the description method of FIG. 102B(e) substantially simplifies the descriptive sentence related to attribute information in the p element PRGREL. As shown in FIG. 102B(e), the description method in 3] of FIG. 101B is applied to the value of select attribute information in the cue element CUEELE written in the timing element TIMGEL. Specifically, as shown in the correspondence between broken line δ, broken line ϵ, and broken line ζ, the value of id attribute information in each p element PRGREL is referred to in the corresponding cue element CUEELE. In FIG. 92(*f*), "begin" attribute information for defining various types of attribute information defined as options in the style name space and the execution start, "dur" attribute information for setting the length of the execution period of the corresponding element, and "end" attribute information (see FIG. 94) for setting the ending time of the execution period of the corresponding element are written separately in each p element PRGREL in the body element BODYEL. In contrast, in an example of description of FIG. 102B(e), since cue elements can be distributed in the style element STYLEL and cue element CUEELE according to the contents of attribute information to be written, the descriptive content in the p element PRGREL can be simplified. As a result, the work of creating a new markup MRKUP or of editing a markup MRKUP can be simplified. In FIG. 92(*f*), timeContainer="seq" has been written in each p element PRGREL. In contrast, in the description method of FIG. 102B(e), timeContainer="seq" is written so as to be shared in a timing element TIMGEL including a plurality of cue elements CUEELE. In the embodiment, using the relationship between a parent element and a child element as shown by broken line β, timeContainer="seq" can be applied to the cue elements CUEELE serving as all of the child elements. Accordingly, with the common description of timeContainer="seq", the descriptive sentence of the markup MRKUP of FIG. 92(*f*) is simplified remarkably. In addition to this, clock="title" (underline α) is written in the timing element TIMGEL in the embodiment, which indicates that the reference clock used to display the markup MRKUP is a title clock (or medium clock). Thus, the time progress of the markup MRKUP is displayed in synchronization with the title timeline TMLE for each title. For example, even if the user performs fast-forward (FF) or fast-rewind (FR) and, according to this, the time progress of the title timeline TMLE changes, the markup MRKUP is displayed in synchronization with the title timeline TMLE. Moreover, as shown in FIG. 102B(e), PC data written as content information in each p element PRGREL is displayed as subtitles shown in FIGS. 102A(a) to 102A(c). Specifically, as content information CONTNT in a p element PRGREL of FIG. 102B(e), the phrase "Toshba is" is displayed in the relationship shown by broken line λ in FIG. 102A(a). The word "excellent" is displayed in the relationship shown by broken line μ in FIG. 102A(b), and the word "company" is displayed in the relationship shown by broken line ν in FIG. 102A(c).

FIG. 102B(f) shows the effect produced by using the "select" attribute information in the embodiment. Attribute information that would be written repeatedly in the individual elements in the body element BODYEL can be written in one place (shown by broken line β and broken line Y) so as to be shared in a style sheet (in a styling element STNGEL) or in a timing sheet (in a timing element TIMGEL). This helps reduce the total amount of descriptive sentence in the markup MRKUP, which makes it easy to download data into a file cache FLCCH that stores the markup MRKUP temporarily. Since the writing locations of attribute information can be distributed by content into a style sheet/a time sheet/a body element BODYEL, the process of changing the descriptive content of the markup MRKUP can be simplified, which produces the effect of facilitating program editing.

As shown in FIG. 12, in the embodiment, the following are possible:

1. From the playlist PLLST that manages the playback sequence of moving images (or primary enhanced video objects P-EVOB or secondary enhanced video objects S-EVOB) (specifically, in object mapping information as shown in FIG. 17), the markup MRKUP is referred to at the same level as that of the moving images, thereby managing the reproduction and display and the timing of reproduction and display simultaneously on the same screen (see FIG. 16). As a result, not only can a plurality of presentation objects (including moving images and the markup screen MRKUP) be reproduced and displayed simultaneously without interrupting the reproduction and display for the user, but also control can be performed so as to synchronize (or interlock) the reproduction and display timing of the moving images with that of the markup screen MRKUP, which improves a screen representation for the user remarkably.

2. Instead of referring to the markup MRKUP directly from the playlist PLLST, the manifest MNFST is referred to directly from the playlist PLLST and a markup MRKUP to be displayed first is specified from the manifest MNFST. As shown in FIG. 81(*e*), in the resource element RESELE in the manifest MNEFT, URI information about all of the markups MRKUP which are not shown at first, are transferred as a result of the user selection or a script process, and are to be shown to the user has been written. Consequently, before displaying the first markup MRKUP, the navigation manager NVMNG (see FIG. 28) in the advanced content playback section ADVPL can store "all of the markup information MRKUP to be shown to the user as a result of transition and a resource file to be used for the purpose (including still images IMAGE, effect audio EFTAD, and fonts FONT)" temporarily into the file cache FLCCH. Therefore, even when the user selection or a script process takes place, the markup screen MRKUP can be changed immediately without keeping the user waiting.

Furthermore, in the embodiment, the following are possible:

3. Any one of "title clock," "page clock," and "application clock" can be selected on the basis of "clock attribute information" shown in FIG. 94 in the timing element TIMGEL of FIG. 91(*c*). This makes it possible to flexibly set the application of moving images (or primary enhanced video objects P-EVOB or secondary enhanced video objects S-EVOB) or the reproduction and display timing of a markup MRKUP.

For example, adapting the value of "clock attribute information" to "title clock" causes the reproduction and display timing of an application or a markup MRKUP to coincide completely with that of moving images. Accordingly, for example, when "subtitles or tickers" are displayed in the markup MRKUP, or when moving images are reproduced in a special manner (such as, fast-forward or fast-rewind), subtitles or tickers can be changed in synchronization with the special reproduction.

Furthermore, setting the value of "clock attribute information" to "page clock" or "application clock" enables a screen displayed in a markup MRKUP, such as an animation screen, to be reproduced at a standard speed without being affected by the special reproduction, even when moving images are reproduced in a special manner (such as, fast-forward or fast-rewind).

Next, a method for an "event process" (event handle) in the embodiment will be explained. As shown in FIG. 1, the information recording and reproducing apparatus 1 includes an advanced content playback section ADVPL. Moreover, as shown in FIG. 14, the advanced content playback section ADVPL includes a navigation manager NVMNG which manages and controls the reproduction of advanced contents ADVCT. In the embodiment, "notice information" getting up to the navigation manager NVMNG is called an "event" and issuing the "notice information" is called "occurrence of an event."

<Definitions>

User Events:

User events are events fired by a user interaction. For example a remote control event. It is important to note that user events are sent to script first then to the DOM (markup). In markup user events are processed via the accessKey mechanism.

System Events:

System events are events fired by the player. System events are sent to script only. They are not sent to the DOM (markup).

Therefore only script has the opportunity to handle a system event. However it is possible for markup to respond to a system event via the XPath playState variable.

System events are placed into the event queue by three causes. One is caused by the definition in Playlist and the progress of time on Title Timeline, another is caused by API call, and final one is caused by changes of Player device (controllers and Persistent Storages). When system event is caused by the progress of time on Title Timeline, it is fired in head of tick event and may be executed by this tick event. This table also shows the order of system event occurrence. When system events occur at the same time by the progress of time on Title Timeline, events are fired in same order of this table. For example, Video Track event shall be fired before Audio Track event. When system events are caused by API, this rule shall not be applied. In case of API, order of events shall be same as an order of API calls.

The following elements are used.

Event Name: name of system events

Content: explanation for system events, it indicates when the event is fired.

Trick Play: During trick play (not play state), part of system events shall not be fired. This column is shown what system events is fired.

F: This system events shall be fired even during trick play.

N: This system events shall not be fired during trick play.

In the embodiment, as for the "event," the following five types of events are defined:

1. User event
2. System event
3. Application event
4. DOM event
5. Canceling event Hereinafter, each of the events will be explained.

1. User Event

A user event occurs when the user inputs data. As an example, a remote control event occurs when the user does setting on a remote controller. The embodiment is characterized in that the user event is sent first to a script SCRPT and then sent to DOM (markup MRKUP). This is very important for user events. An user event in the markup MRKUP is processed using an "access key" (the value of the accessKey attribute shown in FIG. 93 or 99). As shown in FIG. 14, in the advanced content playback section ADVPL of the embodiment, the navigation manager NVMNG exists. A user operation UOPE based on the user input is input to the navigation manager NVMNG. As shown in FIG. 44, in the navigation manager NVMNG, there is a user interface engine UIENG. Receiving the user operation UOPE, the user interface engine UIENG issues a user interface event UIEVT. As shown in FIG. 44, when a programming engine PRGEN existing in the advanced application manager ADAMNG in the navigation manager NVMNG receives the user interface event UIEVT, an ECMA script processor ECMASP searches the script ADAPLS of the advance application for the corresponding processing method. When having found an API command to be issued according to the script ADAPLS of the advanced application, the ECMA script processor ECMASP issues each function in the API command shown in FIGS. 106A to 110B to the playlist manager PLMNG or presentation engine PRSEN. If having failed to find an API command to be issued according to the user interface event UIEVT in the script ADAPLS of the advanced application, the ECMA processor ECMASP then searches a default event hander script DEVHSP. In the default event hander script DEVHSP, a list of information about default input handlers shown in FIG. 49 has been stored. If having found the contents (the corresponding event handler) to be processed according to the user interface event UIEVT in the default event handler script DEVHSP, the ECMA processor ECMASP issues information about the default input hander to the playlist manager PLMNG or presentation engine PRSEN.

2. System Event

A system event means an event issued from the advanced content playback section ADVPL. A system event is transferred only to a script SCRPT. Therefore, the system event is not issued to DOM (markup MRKUP). Accordingly, only the script SCRPT is waiting for an opportunity to handle the system event. However, using "Xpath playState" variable, the markup MRKUP can respond to the system event. FIGS. 103A and 103B show a table listing the contents of all system events in the embodiment. In the embodiment, the system events can be caused to occur in the following three cases:

a) When a system event is defined in a playlist PLLST (a system event occurs on the basis of a specific time progress on the title timeline TMLE)

b) A system event occurs on an API call c) A system event occurs on the change of the storage medium (or the recording location of the advanced content) used by the advanced content playback section ADVPL If the system event occurs on the basis of the time progress on the title timeline TMLE, the system event occurs at the starting position of a tick event and the system event is executed by the corresponding tick event. In the table of the contents of various system events shown in FIGS. 103A and 103B, they are listed in the order of frequency at which a system event occurs. In the embodiment, if a plurality of system events have occurred on the basis of the time progress on the title timeline TMLE, they are designed to be handled (or managed) sequentially by the event handler in the order in which they are listed in FIGS. 103A and 103B. For example, a video track even occurs before an audio track event. If a system event has occurred in response to an API command, the above priority does not hold. If a system event has occurred on the basis of an API command, the order in which system events occur must be made equal to the order of the corresponding API calls. While notice information getting up to the navigation manager NVMNG (see FIG. 14) is called an "event," the process corresponding to the event content and the process of managing (or handling) the process content are called "event handler." In the embodiment, the "event handler" is handled (or executed and managed) by the navigation manager NVMNG.

3. Application Event

Figure 105:
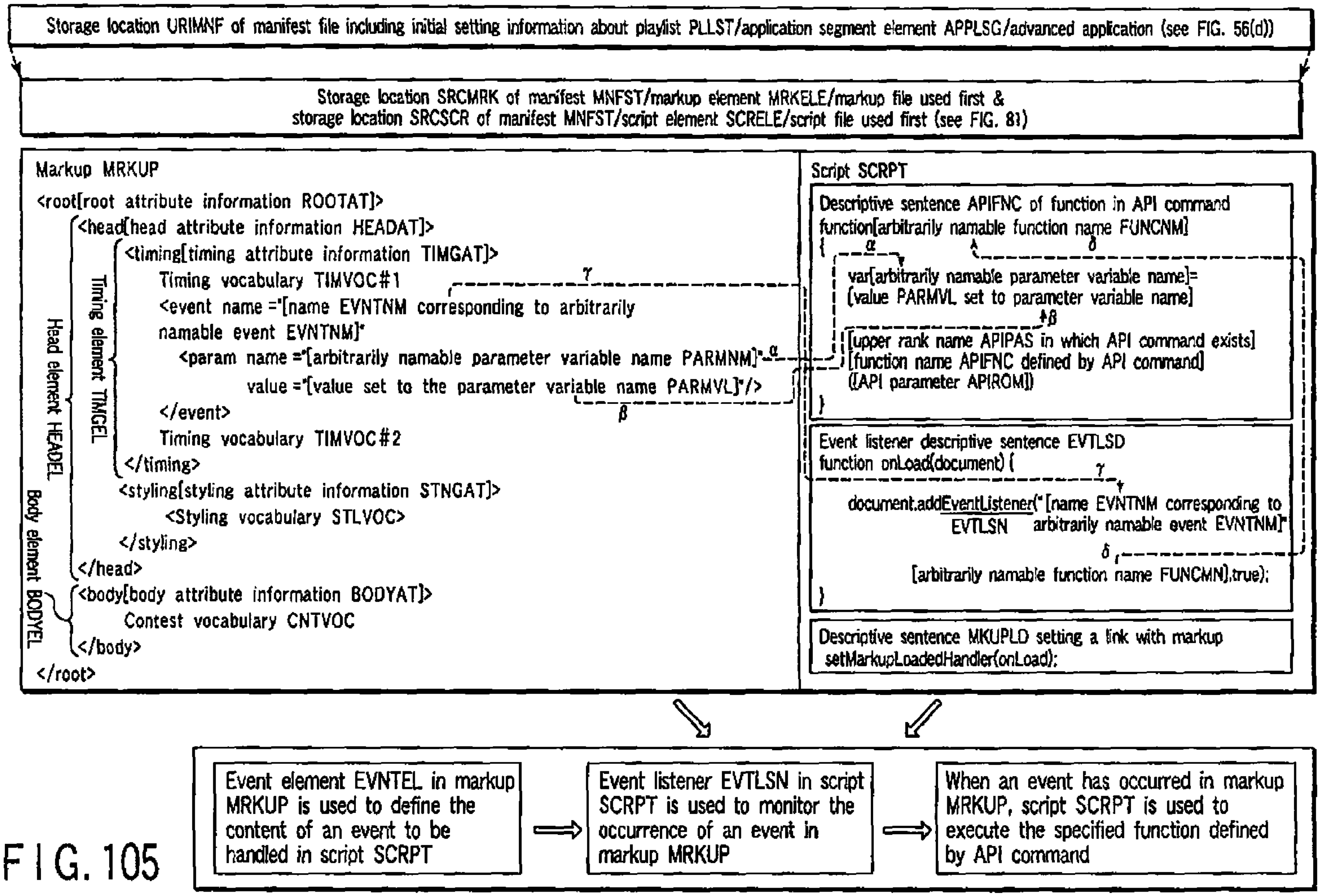
FIG. 105 shows a relationship between markups/scripts and API commands in the embodiment.

In the embodiment, an application event is caused to occur by an advanced application ADAPL. The application event occurs on the basis of a script SCRPT or a markup MRKUP. If the application event is caused to occur by the markup MRKUP, it occurs on the basis of an event element EVNTEL as shown in FIG. 105. These application events are handled only by the script SCRPT.

4. DOM Event

A DOM event is an event occurring when the domain is changed. That is, the DOM is changed as a result of the occurrence of transition of the domain.

5. Canceling Event

A canceling event is used to cancel an event process. When the canceling event specifies the cancellation of stop propagation, such a process as taking in images is stopped. Moreover, when the canceling event is cancelled as a result of suppressing the default state, the default state (or initial setting state) of the event is cancelled.

The above item 2. The table of the contents of various system events described in the system event will be explained below.

A "title begin event," which is a system event for starting the reproduction of a title, indicates a starting state as an event state. The setting value set in the title begin event is the value of "title_begin." Next, a "title end event," which is a system event for ending the reproduction of a title, indicates an end state as an event state. The setting value set in the title end event is the value of "title_end." A "scheduled event," which is a system event for executing events scheduled in advance, indicates an event state as an event state. The setting value set in the scheduled event is the value of "scheduled event." A "chapter event," which is a system event for changing the chapter to be reproduced, indicates a change state as an event state. The setting value set in the chapter event is the value of "chapter." Next, a "click begin event," which is a system event for starting the reproduction of a presentation object (or starting the reproduction of various clip elements in the playlist PLLST (see FIG. 54(*b*)), indicates a start state as an event state. The setting value set in the clip begin event is the value of "clip_begin." A "click end event," which is a system event for ending the reproduction of a presentation object (or ending the reproduction of various clip elements in the playlist PLLST (see FIG. 54(*b*)), indicates an end state as an event state. The setting value set in the clip end event is the value of "clip_end." A "video track event," which is a system event for changing the video track number to be reproduced and displayed, indicates a change state as an event state. The setting value set in the video track event is the value of "video_track." A "audio track event" changes the audio track number to be reproduced and displayed. The setting value set in the audio track event is the value of "audio_track." Next, a "subtitle track event," which is a system event for changing the subtitle track number to be reproduced and displayed, indicates a change state as an event state. The setting value set in the subtitle track event is the value of "subtitle_track." Next, an "application end event," which is a system event for ending the execution of an application, indicates an end state as an event state. The setting value set in the application end event is the value of "application_end." A "play state event," which is a system event for changing the reproducing state, indicates a change state as an event state. The setting value set in the play state event is the value of "play_state." A "play speed event," which is a system event for changing the reproducing speed, indicates a change state as an event state. The setting value set in the play speed event is the value of "play_speed." A "controller event," which is a system event for showing the connected state of a controller (or the start of connection with a controller), indicates a connected state as an event state. The setting value set in the controller event is the value of "controller_connected." Next, a "controller event," which is a system event for showing the disconnected state of a controller (or the stop of connection with a controller), indicates a disconnected state as an event state. The setting value set in the controller event is the value of "controller_disconnected." Next, a "persistent storage event," which is a system event for changing a persistent storage unit to be set, indicates a change state as an event state. The setting value set in the persistent storage event is the value of "persistent_storage." A "network time-out event," which is a system event for carrying out a time-out process of a network line (or disconnecting a network line corresponding to the time-out time), indicates time-out as an event state. The setting value set in the network time-out event is the value of "network_timeout." Next, a "resource-not-found event," which is a system event for showing a state where a resource storage location is unconfirmed, indicates an unconfirmed state as an event state. The setting value set in the resource-not-found event is the value of "resource_not_found." A "streaming buffer empty event," which is a system event for showing that the streaming buffer is empty, indicates an empty state as an event state. The setting value set in the streaming buffer empty event is the value of "buffer_empty." A "streaming buffer restart event," which is a system event for restarting a streaming buffer, indicates a restarting state as an event state. The setting value set in the streaming buffer restart event is the value of "buffer_restart." Next, a "network connection event," which is a system event for connecting a network line, indicates a connection state as an event state. The setting value set in the network connection event is the value of "network_connection." A "stop request event," which is a system event for requesting a stop, indicates a stop state as an event state. The setting value set in the stop request event is the value of "stop_request."

The terms in the embodiment, including "API," "script SCRPT," and "function," will be explained. European Conference on Standardization (ECMA) has already standardized a method of describing a script SCRPT. The standardized script has been called "ECMA script." For the ECMA script, API commands newly defined in the embodiment are shown in FIGS. 106A to 110B. Unless otherwise specified, (narrowly-defined) API commands in the embodiment indicate the API commands having the contents shown in FIGS. 106A to 110B. In contrast, in the embodiment, the API commands defined in FIGS. 106A to 110B and the API commands defined in the ECMA script are generically called "broadly-defined API commands." Moreover, the contents of the process when each of a part of the API commands is actually executed are called "function." As described in FIGS. 103A and 103B, notice information getting up to the navigation manager NVMNG (see FIG. 14) in the advanced content playback section ADVPL is called an "event." In the embodiment, a combination of the API described above and a combination (or program) of a series of commands defined in the ECMA script are called a "script SCRPT." In the embodiment, the "function" is executed on the basis of the "event" explained in FIGS. 103A and 103B. The "event" and the contents (or program) of handling the "function" are defined in a "script SCRPT." As for the contents of a concrete "script SCRPT," the following have been programmed as illustrated in the "script SCRPT" in FIG. 105 (for details, refer to the description of FIG. 105):

- A part in which the contents of an "event" to be monitored are clearly specified
  - Event listener descriptive sentence EVTLSD including an event listener EVTLSN
- A part in which the contents of the "function" of an API command to be executed are shown
  - Descriptive sentence APIFNC of a function in the API command and information (e.g., event listener EVTLSN) that relates an "event" to a "function."

According to the contents written in the "script SCRPT," the navigation manager NVMNG handles the execution of the "function" (or controls and manages the execution process). More specifically, as shown in FIG. 44, the ECMA script processor ECMASP is included in the programming engine PRGEN in the navigation manager NVMNG. The ECMA script processor ECMASP controls the execution at the advanced content playback concerning (a series of) "function" according to the contents specified in the "script SCRPT"

Regarding a "script SCRPT" referred to (or used) by the ECMA script processor ECMASP, the following two types of script SCRPT are defined in the embodiment:

A) Default Event Hander Script DEVHSP

In the embodiment, a (handler) script for handling a specific event is defined in the default state in advance. Specifically, this means the contents corresponding to the "default input handler" shown in FIG. 49. Information about the default event handler script DEVHSP is recorded in advance in the "default event handler script DEVHSP in the programming engine PRGEN as shown in FIG. 44.

B) Script ADAPLS of Advanced Application

A script SCRPT (see FIG. 14) belonging to the advanced application ADAPL has a data structure shown in the script SCRPT of FIG. 105. As shown in FIG. 81(*c*), according to "the storage location SRCSCR for a script file to be used first" (src attribute information) written in the script element SCRELE in the manifest MNFST and "the storage location SRCRSC for the corresponding resource" (src attribute information) written in the resource element RESELE, the storage location (or path) of the script file SCRPT belonging to the advanced application ADAPL and the file name are written. As shown in FIG. 25, information about all of the advanced applications ADAPL including script files SCRPT is stored temporarily into a file cache FLCCH. In the embodiment of FIG. 44, "the storage location for a script SDAPLS of the advanced application" exists in the programming engine PRGEN. The script file SCRPT stored in the file cache FLCCH is copied into the storage location as needed for subsequent use. Alternatively, the programming engine PRGEN may not include "the storage location for a script SDAPLS of the advanced application" and the ECMA script processor ECMASP may access the storage location of the script file SCRPT in the file cache FLCCH as needed by way of the file cache manager FLCMNG in the navigation manager NVMNG, thereby acquiring script information SCRPT necessary for processing control by the ECMA script processor ECMASP.

Figure 104:
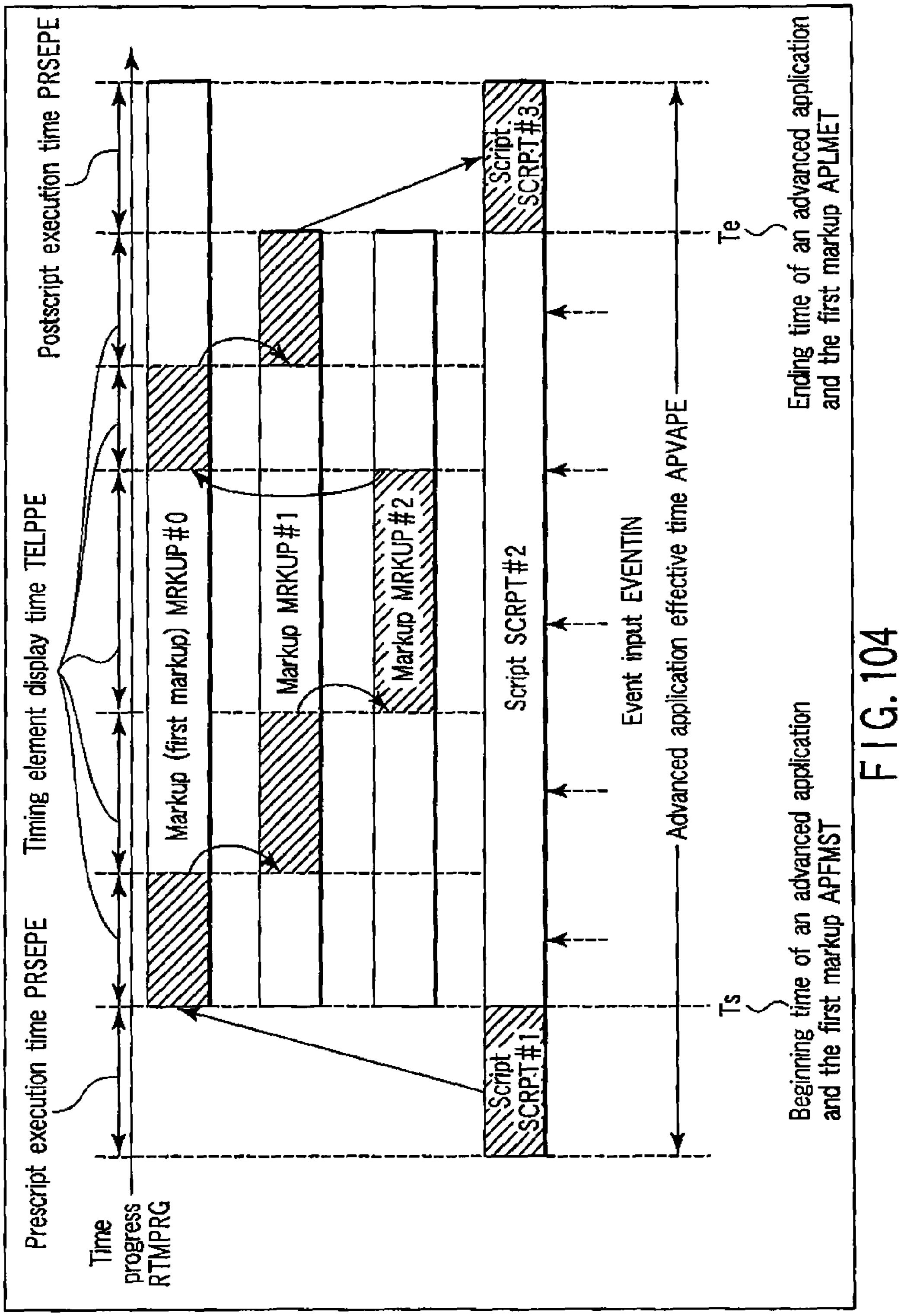
FIG. 104 shows a relationship between markups and scripts in an advanced application according to the embodiment.

As shown in FIG. 104, the contents of (a series of) "function" to be carried out when the event (or event input EVNTIN) specified for monitoring in script SCRPT#2 has occurred are written in script#2. There are five types of event input EVENTIN (event occurrence) in the embodiment as explained in FIGS. 103A and 103B:

1. User input event
2. System event input
3. Application event input
4. DOM event input
5. Canceling event input First, 1. The correspondence with scrip SCRPT#2 when a user input event has been input will be explained. When the user enters a user input using a remote controller or a mouse, a user operation UOPE is input to the navigation manager NVMNG in the advanced content playback section ADVPL as shown in FIG. 14. As shown in FIG. 28, the user interface engine UIENG in the navigation manager NVMNG includes a remote controller RMCCTR for controlling the remote controller and a mouse controller MUSCTR for controlling the mouse. Information about the user input event (or user interface event UIEVT) to the user operation UOPE generated by the functions of the remote controller and mouse controller is transferred to the advanced application manager ADAMNG. In the embodiment, all of the user input events are handled first by the programming engine PRGEN in the advanced application manager ADAMNG. As described above, "user event handler" (or the program for handling the execution of (a series of) "function" corresponding to "user input event") defined in the script SCRPT (or script SCRPT#2) belonging to the advanced application ADAPL is stored (or copied from the file cache FLCCH) temporarily into the programming engine PRGEN. As another embodiment, as described above, instead of storing the "user event handler" temporarily into the programming engine PRGEN, the "user event handler" temporarily stored in the file cache FLCCH may be used (or referred to) directly. When the ECMA script processor ECMASP of FIG. 44 receives information about the user input event (or user interface event UIEVT), the ECMA script processor ECMASP checks whether the "user event handler" in which the process contents ((a series of) "function" contents) corresponding to the user input event (or user interface event UIEVT) have been written has been stored temporarily in the file cache FLCCH. If having found the corresponding "user event handler," the ECMA script processor ECMASP carries out (or controls) the processing (or (a series of) "function" contents) according to the contents written in the user event handler." If having failed to find the corresponding "user event handler" in the programming engine PRGEN or in the file cache FLCCH, the ECMA script processors searches the "default event handler script DEVHSP storage location" to check whether the default input handler" (or default event handler script DEVHSP) corresponding to the user input event (or user interface event UIEVT) exists. If the corresponding default input handler" (or default event handler script DEVHSP), the ECMA script processor ECMASP carries out (or controls) the process according to the contents written in the default input handler" (or default event handler script DEVHSP).

Furthermore, in the executing method based on the descriptive content written in script SCRPT#2 for the other four types of event inputs EVNTIN (i.e., system event input, application event input, DOM event input, and canceling event input), the ECMA script process ECMASP controls the execution as described above. The four types of event inputs EVNTIN differ from each other in the method of inputting data to the corresponding programming engine PRGEN.

That is, 2. A system input event means the contents of "other events OTEVT" and the advanced content playback section ADVPL causes an "event" to occur. Specifically, when any one of the various "system events" shown in FIGS. 103A and 103B have occurred, a system input event occurs.

Next, 3. An application event input has an event defined by an event element EVNTEL in the markup MRKUP shown in FIG. 105. For example, the contents of an event element EVNTEL are set (or written) so that an event may occur when the user specifies (or activates) a specific button on the screen represented in the markup page MRKUP. The relationship between the specific button in the markup page MRKUP and the event element EVNTEL can be set (or written) as follows. For example, "id" attribute information for setting each piece of identification data (ID data) in the button element BUTNEL for setting a specific button is added (see FIG. 93 or 99) and the value of the "id" attribute information is specified by "select" attribute information in the cue element CUEELE as shown in FIGS. 101A and 101B, thereby forming a link between the button element BUTNEL and the cue element CUEELE. Then, the parent-child relationship between the cut element CUEELE and the event element EVNTEL is formed, thereby setting the correspondence between the specific button set by the button element BUTNEL and the event element EVNTEL. The parent-child relationship between the cut element CUEELE and the event element EVNTEL means that, for example, the event element EVNTEL is placed as a child element in the location of content information CONTNT in the cue element CUEELE (see FIG. 90(*c*)). In the embodiment, an event element EVNTEL can be placed as a child element in the location of content information CONTNT in a cue element CUEELE as shown in FIG. 100. However, a cue element CUEELE cannot be placed as a child element in the location of content information CONTNT in an event element EVNTEL as shown in FIG. 100. As described above, for example, in a case where the contents of an event element EVNTEL are set (or written) so that an event may occur when the user specifies (or activates) a specific button on the screen represented in the markup page MRKUP, when the user specifies (or activates) the specific button, then the corresponding event occurs. The event listener EVTLSN in an event listener descriptive sentence EVTLSD written in the script SCRPT of FIG. 105 is monitoring the occurrence of an event in the markup MRKUP. When the event listener EVTLSN has detected an event occurred from the event element EVNTEL, the execution of the "function" (see FIG. 105) specified in the function descriptive sentence APIFNC in the API command in the script SCRPT is specified. The executing process in the advanced content playback section ADVPL according to the contents written in the script SCRPT is controlled by the ECMA script processor ECMASP as described above. The storage location (or path) of (a plurality of) script files SCRPT and the file name used in an advanced application ADAPL are written on the basis of "the storage location SRCSCR of a script file to be used first" (src attribute information) written in the script element SCRELE in the manifest MNFST and "the storage location SRCRSC of the corresponding resource" (src attribute information) of FIG. 81(*c*). In the embodiment, as shown in FIG. 25, before the advanced application ADAPL is reproduced and displayed for the user, all of the script files SCRPT used in the advanced application ADAPL are stored temporarily in the file cache FLCCH. In FIG. 105, only one script SCRPT is displayed next to a markup MRKUP. In FIG. 104, script SCRPT#2 is displayed as if only script SCRPT#2 existed in the period during which an advanced application is being executed (of displayed). However, in the embodiment, in many cases, a plurality of script files SCRPT used in an advanced application ADAPL are stored temporarily into the file cache FLCCH. Accordingly, when an event has occurred on the basis of a specific event element in the markup MRKUP, the ECMA script processor ECMASP searches for all of the script files SCRPT stored temporarily in the file cache FLCCH and finds the script SCRPT in which the "function" content corresponding to the event has been written. That is, the script SCRPT in which the "function" content corresponding to the event has been written means a script SCRPT where "the name EVNTNM corresponding to an event to which an arbitrary name can be given" has been written in the event listener EVTLSN. When having found the script SCRPT in which the "function" content corresponding to the event has been written, the ECMA script processor ECMASP performs control so that an executing process according to the function name APIFNC defined in the API command" may be carried out in the advanced content playback section.

<Timing Model for Advanced Application>

Advanced Application (ADV APP) consists of one or plural Markup(s) files which can have one-directional or bi-directional links each other, script files which shares a name space belonging to the Advanced Application, and Advanced Element files which are used by the Markup (s) and Script(s).

Valid period of each Markup file in one Advanced Application is the same as the valid period of Advanced Application which is mapped on Title Timeline.

During the presentation of one Advanced Application, active Markup is always only one. An active Markup jumps one to another.

The valid period one Application is divided to three major periods; pre-script period, Markup presentation period and post-script period.

In the embodiment, as shown in FIG. 14, an advanced application ADAPL is composed of one or more script files SCRPT and still image files IMAGE, effect audio files EFTAD, and font files FONT which are advanced files referred to by the script files. In the embodiment, a plurality of markup files MRKUP are linked with one another in one-way direction or a two-way direction, which enables the transition of the markups MRKUP linked with one another in such a manner that markup (or the first markup) MRKUP#0 changes to markup MRKUP#1 and then to markup#2, and further changes to markup (or the first markup) MRKUP#0 again, and then to markup#1 again as shown in FIG. 104. In the embodiment, as shown in FIG. 14, the markup MRKUP is accessed via the manifest MNFST from the playlist PLLST. In the embodiment, as shown in FIG. 56(*d*), "the storage location URIMNF of a manifest file including initial setting information on an advanced application" (src attribute information) can be written in the application segment element APPLSG written in the object mapping information OBMAPI in the playlist PLLST. From the information, the location (or path) of the manifest file MNFST and its file name can be known. In the manifest file MNFST, a markup element MRKELE is written as shown in FIG. 81(*a*). In the markup element MRKELE, "the storage location SRCMRK of a markup file to be used first" (src attribute information) is written as shown in FIG. 81(*d*). From the information, the location (or path) of the file corresponding to markup (or the first markup) MRKUP#0 shown in FIG. 104 and its file name can be known. Moreover, in the manifest MNFST, a resource element RESELE can be written as shown in FIG. 81(*a*). From the storage location SRCRSC of the corresponding resource" (src attribute information) (see FIG. 81(*e*)) in the resource element RESELE, markup file MRKP#1, the storage location (or path) of markup file MRKUP #2, and its file name can be known. In the script SCRPT shown in FIG. 14, the name space belonging to the same advanced application ADAPL can be shared. As described above, in the embodiment, an advance application ADAPL always requires only one markup MRKUP (or markup MRKUP in the active state (or in execution)) to be displayed. That is, as shown in FIG. 104, in showing the markup MRKUP (in the active state) to the user, one markup MRKUP is transited to another, thereby displaying only one markup MRKUP. In FIG. 104, the areas painted green show the state (or the active state) displayed to the user. A plurality of markups MRKUP will not be painted green at the same time within the same time frame on the title timeline TMLE. As shown in FIG. 56(*d*), in the application segment element APPLSG written in the object mapping information OBMAPI in the playlist PLLST, "beginning time TTSTTM on the title timeline" (titleTimeBegin attribute information) and "ending time TTEDTM on the title timeline" (titleTimeEnd attribute information) are written. The range of the information corresponds to the effective time APVAPE of the advanced application shown in FIG. 104. In the embodiment, the effective time APVAPE of the advanced application is divided into the execution time PRSEPE of a prescript, the presentation time of a markup MRKUP, and the execution time POSEPE of the postscript. In the embodiment, in the range of the presentation time of the markup MRKUP, a markup MRKUP to be displayed is transited. As shown in FIG. 91(*a*), a timing element TIMGEL exists in the head element HEADEL in the descriptive sentence in the markup MRKUP, thereby creating time sheet information. The display time TELPPE written in the timing element TIMGEL coincides with the presentation period of the markup MRKUP. Specifically, in the embodiment, when the effective period of an advanced application ADAPL starts, it is possible to execute a specific script SCRPT#1 called a prescript before the markup MRKUP is displayed. Immediately after the processing of script SCRPT#1 called the prescript has been done, the beginning time APFMST of the advanced application and the first markup is started. Immediately after the ending time APLMET of the advanced application and the last markup has elapsed, script SCRPT#3 called the postscript can be executed. As a result, when the advanced application ADAPL is made active, a specific script SCRPT is caused to run immediately before and after the markup MRKUP is displayed, thereby improving the power of expression to the user more. In the embodiment, like script SCRPT#2 used in the display period of the markup MRKUP, a prescript (script SCRPT#1) and a postscript (script SCRPT#3) have a description format similar to that in the script SCRPT of FIG. 105. When the contents written in the prescript (script SCRPT#1) and the contents written in the postscript (script SCRPT#3) are executed at the advanced content playback section ADVPL (e.g., the "function" content is executed), the ECMA script processor ECMASP performs control similarly.

<The Valid Interval>

The playlist defines how a number of Advanced Applications can be active simultaneously. The playlist defines when an application is "valid". Valid means that the application can run. The valid interval is defined by the start and end times of the <ApplicationSegment>element on the title. An application is valid when the Title Timeline is within the interval. Applications whose autorun flag is set to true are launched automatically at the start of the ApplicationSegment.

The time interval over which an application is valid cannot be manipulated from script.

Application execution is not allowed until the application is valid. This means that execution of any top-level code in the script shall not be done in advance as part of pre-fetching or preloading the script.

The processing lifecycle of a single Advanced Application is as follows:

Read manifest file
Read script file(s)
Execute scripts (creation of execution context)
* Repeat while application is valid
Read the first (or next) xml file
Decode Advanced Navigation files
Presentation and Interaction of Markup page until navigation
Loop to*
Execute post-scripts (execution of event handlers)
Unload execution context An application can be activated when the title time in the current title is within the valid interval of the application as defined by the playlist, and cannot be activated when the title time is outside the valid interval.

The manifest file defines the set of files to create the application execution context. During this initial script execution period no markup file is presented.

After the script is loaded, the first markup page is decoded and presented. The start of the presentation period for the first markup page defines the zero for the application clock. This means the application clock is reset at the start of the presentation period of its first markup page.

This application clock continually increments until the end of the presentation period of the last markup page, this coincides with the end of the active interval of the application as defined by the playlist.

After the last markup page is unloaded, the script context will persist until all pending event handlers have executed. This is the 'trailing event period'. Note during the initial and trailing execution periods the 'document' property of the global object in the script context will be set to undefined, and access to the host API objects may have other restrictions. As each page is loaded the document property is set to a value of type Document and provides access to the DOM of the loaded page.

The onset of each presentation period for markup pages resets to zero the page clock for the application.

In the transition period between one markup page and another while the new page is being decoded, the last frame of the outgoing markup page is maintained on screen.

Note: The presentation engine may optionally use pre-decoding techniques to minimize transition periods between markup pages.

<Presentation of Markup Page>

Decode Advanced Navigation files is broken down as follows:

1. Set processing state to Loading
2. Load XML unit and construct the corresponding DOM
3. Process DOM head element
a. Include referenced style sheets into DOM
b. Include referenced time sheets into DOM
c. Process style sheets to create initial style sheet set
d. Process time sheets to create time sheet set
4. Process DOM body element
a. Include referenced body elements into DOM
b. If no time sheets set loaded, perform inline timing processing to create time sheet set
c. Process inline style attributes to update style sheet set
d. Process inline state attributes to update state property set
5. load images and other external resources referenced from DOM
6. Create style processor with style sheet set
a. Create style override block for each element in the DOM
7. Create animation processor with time sheet set
a. Create animation override for each DOM element
b. Create interval set from time sheet set
8. Set processing state to Interacting During the loading, the DOM may be in an invalid state, no tick or animation processing is carried out while in the Loading state. If after processing the page and the final DOM is invalid, the behaviour of the application is not guaranteed and may terminate. Implementations may optimize the behaviour described above provided the final layout and behaviour is equivalent to using this processing sequence.

"Presentation and Interaction of Markup page until navigation" is broken down as follows:

On each tick the animation engine must behave as if it performed the following algorithm:

1. Evaluate script handler queue
a. Check for any updated script override blocks
2. Evaluate the style sheet set to update the style override block for each element
3. Perform any interval activation band inactivation based on the tick clock values
a. Update each animation override block with values in active intervals
4. Perform unresolved time interval expression evaluation
a. Update each animation override block with values in newly active intervals
5. Determine whether steps above caused computed style changes
a. If there were computed style changes, reformat and redraw document
6. Test whether application is in foreground state property accordingly Reformat and redraw creates an area tree as follows:

1. Start recursive descent from <body>
2. Construct the appropriate formatter for the node
3. Determine the computed value of display for the node
a. If display=noe, ignore node and its descendants
b. If display=none, format node recursively
4. Perform computed style extraction
5. Format code
6. Display area tree after all nodes have been formatted FIG. 104 shows the effective period APVAPE of an advanced application. To execute an advanced application ADAPL corresponding to the effective period APVAPE of an advanced application, it is necessary to set the advanced application ADAPL in the execution state. Specifically, as shown in FIG. 56(*d*), auto run attribute information ATRNAT can be written in an application segment element APPLSG. In a case where the auto run attribute information ATRNAT is set to "true," if the time on the title timeline TMLE has reached the time specified by "the beginning time TTSTTM on the title timeline" (titleTimeBegin attribute information), the advanced application ADAPL goes into the execution state automatically. In a case where the auto run attribute information ATRNAT is set to "false," even if the time on the title timeline TMLE has reached the beginning time TTSTTM, the advanced application ADAPL does not go into the execution state. In this case, only when an API command is used to change to the execution state, the corresponding advanced application ADAPL goes into the execution state. The script SCRPT of FIG. 14 is not executed unless the application has reached the effective time APVAPE. Accordingly, only when the time on the title timeline TMLE has reached the "beginning time TTSTTM on the title timeline" and auto run attribute information ATRNAT is "true," a script SCRPT including a prescript can be executed. In the embodiment, the process of executing an advanced application is carried out according to the following procedure:

1. Reproducing a manifest file MNFST
2. Reproducing a script file SCRPT

As shown in FIG. 81(*a*), a script element SCRELE can be written in the manifest MNFST. As shown in FIG. 81(*c*), from "the storage location SRCSCR of a script file to be used first" (src attribute information) in the script element SCRELE, the file name of the storage location (or path) of a script file to be used first in the stage where the advanced application ADAPL is executed can be known. As described above, a plurality of script files SCRPT can be executed in the same advanced application ADAPL. Accordingly, the storage locations of script files to be used from this point on are defined in a resource element RESELE shown in FIG. 81(*a*):

3. Executing a Script SCRPT
4. Repeating the following situations during the effective period APVAPE of an advanced application a. The first (or next) XML file is read. In the embodiment, the XML file is analyzed at the parser PARSER (see FIG. 28) in the navigation manager NVMNG.

b. The advanced navigation file (markup files MRKUP and script files SCRPT) are decoded. The decoding process is carried out by the programming engine PRGEN (see FIG. 28) in the advanced application manager ADAMNG existing in the navigation manager NVMNG.

c. A specified markup page MRKUP is reproduced and displayed and, as for the markup pages MRKUP, one markup page is transited to another. The reproducing and displaying process of the specified markup page MRKUP is carried out in the advanced application presentation engine AAPEN in the presentation engine PRSEN as shown in FIG. 30.

5. A postscript is executed.
6. Various resource files needed for the advanced application ADAPL are deleted from the data cache DTCCH. The process of deleting the resource files from the data cache DTCCH is carried out by the file cache manager FLCMNG according to the instruction of the playlist manager PLMNG in the navigation manager NVMNG as shown in FIG. 28.

In the embodiment, the following three types of clocks can be selected as a reference clock in executing an advanced application ADAPL:

1) Medium clock (title clock)

A clock which synchronizes with the time progress of the title timeline TMLE and is tuned to the clock (frame clock) of the title timeline 2) Application clock A clock which is shared in the same advanced application ADAPL and synchronizes with the tick clock. In the embodiment, the ratio of the tick clock frequency to the frame frequency used in the title timeline TMLE is specified by "clockDivisor attribute information" shown in FIG. 100.

3) Page clock

A clock which is set for each markup page MRKUP and synchronizes with the tick clock The contents of the clock used in each markup MRKUP are ser by "clock" attribute information (see FIG. 100) in the timing element TIMGEL. When the time progress PRTMPRG of FIG. 104 has reached "the beginning time APFMST of the advanced application and the first markup" and the reproducing and displaying of markup (first markup) MRKUP#0 are started, the setting value of the page clock and that of the application clock are both reset to "0." In FIG. 104, when markup (first markup) MRKUP#0 is transited to markup MRKUP#1, the value of the application clock remains unchanged without being affected by the transition. In contrast, the value of the page clock is reset to "0" each time one markup MRKUP is transited to another. As shown in FIG. 65, after the effective period APVAPE of the advanced application has expired, the resource files related to the corresponding advanced application ADAPL are deleted from the file cache FLCCH (after the data has been deleted from the file cache, time N-EXST is set). However, even after the resource files have been deleted from the file cache FLCCH (after the data has been deleted from the file cache, time N-EXST is set), information on the script SCRPT remains in the file cache FLCCH until the execution of the event hander (or API command) in the middle of processing (or in the pending state) has been completed. This period is called a "trailing event period."

<Relationship to Title Timeline>

Within the valid interval of the application each markup page has a relationship to the title clock as follows:

when transfer is controlled to a new Advanced Application markup page, that page is valid for the entire active interval of the application, thus elements within it that are synchronized to the Title Timeline are adjusted based on the current title time. The title clock is always computed as the current difference between the Title Timeline position and the valid interval start time of the application.

In the effective period APVAPE of the advanced application shown in FIG. 104, each markup page MRKUP has the relationship with the title clock (or medium clock) as follows. When the markup page MRKUP has been transited to the markup page MRKUP of a new advanced application, the display of the markup page MRKUP after the transition becomes effective within the effective time of the advanced application. The display time TELPPE of the timing element written in the markup MRKUP corresponds to the time progress of the present title timeline TMLE.

When "title" is specified as the value of "clock attribute information" written in the timing element TIMGEL of FIG. 100, the reference clock of the markup page MRKUP defined in the timing element TIMGEL synchronizes with the title clock (or media clock). In this case, from the relationship between the beginning time of the effective time APVAPE of the advanced application and the beginning time on the title timeline TMLE, the corresponding value of the title clock (or the corresponding value of the medium clock) is calculated and estimated, when the advanced application ADAPL is in progress.

In contrast, when "page" or "application" is specified as the value of "clock attribute information" in the timing element TIMGEL of FIG. 100, the clock serving as a reference in the markup MRKUP determined in the timing element TIMGEL is set as a page clock or an application clock. In FIG. 104, when the time progress PRMPRG has reached "the beginning time APFMST of the advanced application and the first markup," the display of the markup MRKUP corresponding to the advanced application ADAPL is started and, at the same time, the values of the page clock and application clock are reset to "0" as described above. Immediately after that, the value of the application clock or page clock is added up (or counted up) on the basis of the tick clock. The adding (or counting up) of the clock value continues until the application ADAPL or markup has been completed. If the (active) markup page MRKUP shown to the user is changed (or if the markup page MRKUP is transited), the markup clock is reset "0." In the case of the application clock, the time progress keeps going on without being affected by the change of the markup page. In the embodiment, when the value of "clock attribute information" in the timing element TIMGEL of FIG. 100 has been set to "page (page clock)" or "application (application clock)," the synchronization of each clock with the title timeline TMLE collapses. Accordingly, for example, even if the time progress of the title timeline TMLE is advanced for the fast-forward reproduction of main video MANVD, the page clock or application clock is not affected and therefore the markup MRKUP (e.g., animation) of the advanced application can be caused to progress at a conventional speed, which makes it possible to provide the user with a flexible display of the advanced application ADAPL.

FIGS. 106A to 110B show tables listing the contents of API commands defined in the embodiment. As shown in FIG. 14, in an advanced application ADAPL of the embodiment, there are a markup MRKUP and a script SCRPT. In the script SCRPT, combinations of API commands shown FIGS. 106A to 110B can be defined. The various API commands defined in FIGS. 106A to 110B of the embodiment and the relationship between the markup MRKUP and script SCRPT shown in FIG. 14 will be explained using FIG. 105.

As shown in FIG. 14, in the embodiment, a manifest MNFST belonging to an advanced application ADAPL is referred to from the playlist PLLST. Then, from the manifest MNFST, a markup MRKUP and a script SCRPT are referred to. As shown in FIG. 56(*a*), in the playlist PLLST of the embodiment, object mapping information OBMAPI exists. As shown in FIG. 56(*b*), in the object mapping information OBMAPI, an application segment element APPLSG can be written. Moreover, as shown in FIG. 56(*d*), in the application segment element APPLSG, "the storage location URIMNF of a manifest file including initial setting information about an advanced application" can be written. From the information, the storage location (or path) of a manifest file MNFST corresponding to the application segment element APPLSG and its file name are known. As shown in FIG. 81(*a*), in the manifest MNFST, there are a script element SCRELE and a markup element MRKELE. As shown in FIG. 81(*d*), in the markup element MRKELE, the storage location SRCMRK (src attribute information) of a markup file to be used first is written. From the information, the storage location (or path) of a markup MRKUP to be displayed first and its file name are known. As shown in FIG. 81(*c*), in the script element SCRELE, the storage location SRCSCR (src attribute information) of a script file to be used first is written. From the information, the storage location (or path) of a script file SCRPT to be displayed first and its file name are known. The storage location (or path) of a script file SCRPT used second and later, not first, and its file name, or the storage location (or path) of a file of another markup MRKUP to which the markup MRKUP displayed first is transited during the execution of the same advanced application ADAPL and its file name, are written in the resource element RESELE shown in FIG. 81(*a*).

The method of writing a markup MRKUP in the embodiment is characterized in that a timing element TIMGEL is written in the head element HEADEL in the root element ROOTEL as shown in FIG. 91(*a*), thereby forming a time sheet. The method is further characterized in that the timing element TIMGEL exists in the head element HEADEL, a different area from the body element BODYEL. In the timing vocabulary TIMVOC written in the timing element TIMGEL, there is an event element EVNTEL as written in FIG. 91(*c*) in the embodiment. As shown in 90(*c*), in an element (xml descriptive sentence), not only can required attribute information RQATRI and optional attribute information OPATRI be written, but also content information CONTNT can be placed. In the embodiment, as shown in FIG. 100, "name" attribute information is written as required attribute information RQATRI in the event element EVNTEL. As shown in FIG. 105, in "name" attribute information, "name EVNTNM corresponding to an arbitrarily namable event" can be written. Moreover, as shown in FIG. 100, there exists a param element PRMTEL as content information CONTNT writable in the event element EVNTEL. In required attribute information RQATRI in the param element PRMTEL, "name" attribute information is written. As optional attribute information OPATRI, "value" attribute information can be written. That is, the event element EVNTEL is an element for generating an event handled by a script as shown in FIG. 91(*c*). Moreover, the param element PRMTEL is an element to be used to set a parameter for an object element or an event element as shown in FIG. 91(*d*). As the param element PRMTEL, a parameter variable name ("name" attribute information) for setting a parameter and a value ("value" attribute information) set to the parameter variable name can be set. Therefore, as shown in FIG. 105, from "name" attribute information in the param element PRMTEL, "arbitrarily settable parameter variable name PARMNM" can be set. In addition, from "value" attribute information, "value PARMVL to be set to the parameter variable name" can be set. The event element EVNTEL and the parm element PRMTEL have the relationship described below. The event element EVNTEL causes an "event" to occur in the markup MRKUP. The "event" and a "function" executed according to the event (the contents of the function specified by "function name APIFNC defined by an API command" shown in FIG. 105) are handled in a script SCRPT.

The param element PRMTEL sets "parameter variable name" related to the "event" and "the value to be set in the parameter variable name." As shown in FIG. 105, in the script SCRPT, a descriptive sentence APIFNC for a function in an API command, an event listener descriptive sentence EVTLSD, and a descriptive sentence MKUPLD for setting a markup load process can be written. In the embodiment, in a descriptive sentence MKUPLD for setting a markup and a load process in the script SCRPT, "setMarkupLoadedHandler (on Load)" (see FIGS. 106A to 110B) is written, thereby setting not only a markup and a load process but also a callback function for calling when the present markup page is loaded. Specifically, when the present markup page is loaded, "on Load" is called back. After the process of loading the markup has been set, the contents of the event listener descriptive sentence EVTLSD are used. In the embodiment, the contents to be written in "{ }" written immediately after "function on Load(document)" is specified in the event listener descriptive sentence EVTLSD in the script SCRPT. That is, "document.addEventListener" is written in the "{ }," thereby defining an event listener EVTLSN. In the event listener EVTLSN, "name EVNTNM corresponding to an arbitrarily namable event" is set, which forms a relationship with "name EVNTNM corresponding to an arbitrarily namable event" in the markup MRKUP as shown by broken line Y. In the event listener EVTLSN, "arbitrarily namable function name FUNCNM" is defined and further "true" is to be written. The event listener EVTLSN in the event listener descriptive sentence EVTLSD is monitoring the occurrence of an "event" defined in the event element EVNTEL in the markup MRKUP. In the script SCRPT, an "event" and a "function" in the script SCRPT are handled (or a method of handling an "event" and a "function" is written) in such a manner that, if an "event" has occurred in the markup MRKUP, the various "functions" in the API commands defined in FIGS. 106A to 110B are executed. As shown in FIG. 105, in the event listener EVTLSN, when an "event" corresponding to "name EVNTNM corresponding to an arbitrarily namable event" has occurred, the execution of "an arbitrarily namable function name FUNCMN" is specified. A descriptive sentence APIFNC of a function in an API command, a sentence for causing a function in the API command to be executed, is such that, immediately after "function" is written first, "an arbitrarily namable function name FUNCMN" is specified, and then, a "function" corresponding to "an arbitrarily namable function name FUNCMN" and a parameter variable used there and its parameter value are set in "{ }." As the "function," the various functions defined in the API command in the embodiment (or the contents written in the column "Function name" in FIGS. 106A to 110B) or a combination of the functions are specified. The "arbitrarily namable function name FUNCMN" written in the descriptive sentence APIFNC of a function in the API command coincides with the "arbitrarily namable function name FUNCMN" specified in the event listener EVTLSN in the event listener descriptive sentence EVTLSD and has the correspondence shown by the broken line δ. Specifically, in the event listener EVTLSN in the event listener descriptive sentence EVTLSD, a function name FUNCNM is defined. The defined function name FUNCNM is quoted in a descriptive sentence APIFNC in the API command. As a concrete content corresponding to the "arbitrarily namable function name FUNCNM," a variable name is defined immediately behind "var" in "{ }" placed immediately behind FUNCNM. The variable name specifies "arbitrarily namable parm element name PARMNM" and coincides with "arbitrarily namable parameter variable name PARMNM" defined in the parm element PRMTEL in the markup MRKUP, thereby forming the correspondence shown by the broken line α. As the value set corresponding to the variable name just behind "var," "value PARMVL set to a parameter variable name" is specified. The same value as that of "value PARMVL set to a parameter variable name" in the param element PRMTEL is specified for the "value PARMVL set to a parameter variable name," which forms the correspondence shown by the broken line β. The contents of a "function" corresponding to "arbitrarily namable function name FUNCNM" defined in a descriptive sentence APIFNC in a function in an API command are such that, after an upper rank name APIPAS is written, any one of the names of the "functions" written in the column of "Function name" of FIGS. 106A to 110B is specified. Then, in "( )" just behind that, the API parameter APIPRM is written. Here, in the upper rank name APIPAS in which an API command exists, API type names written in the column "API type" and object names written in the column "object name" shown in FIGS. 106A to 110B are written. For example, in FIGS. 106A to 110B, when "function" of "jumpOnChapter" is specified as Function name belonging to "Player API" as API type and belonging to "playlist object" as object name, "Player.playlist obtained by connecting API type and object name with a period (.) is written in a part of the upper rank name APIPAS in which the API command exists." In this case, "jumpOnChPter" is written as the function name APIFNC defined in the API command. In the function name APIFNC defined in the API command, any one of the names of the "functions" written in the column "Function name" of FIGS. 106A to 110B is specified. The embodiment is not limited to this. In the function name APIFNC defined in the API command, a "function name defined in an ECMA script determined by European Conference on Standardization ECMA" may be specified.

The relationship between the markup MRKUP/script SCRPT and API commands in the embodiment explained above will be collectively described. As described in the lower part of FIG. 105, the contents of an event handled in the script SCRPT are defined using the event element EVNTEL in the markup MRKUP. Next, the event listener EVTLSN in the script SCRPT is monitoring the occurrence of an event in the markup MRKUP. Then, when an event has occurred in the markup MRKUP, the contents of the specified function defined in the API command to be executed are written in the script SCRPT. The function at this time corresponds to the function defined by API in the embodiment shown in FIGS. 106A to 110B. That is, any one of the function names in "function name" shown in FIGS. 106A to 110B is written in "the function name APIFNC defined in API command" written in the descriptive sentence APIFNC of the function in the API command in the script SCRPT. In the embodiment, the number of (functions of) API commands specified in the same script SCRPT is not limited to one and a combination of two or more (functions of) API command may be set.

FIGS. 106A to 110B show an overview list of various API commands defined in this embodiment. The advanced content playback unit ADVPL in the information recording and playback apparatus 1 of this embodiment has the internal structure shown in FIG. 14. Various function names described in a column "function name" shown in FIGS. 106A to 110B are described in "function name APIFNC defined by API command" in descriptive sentences APIFNC of functions in API commands in the script SCRPT, as shown in FIG. 105.

Figure 111:
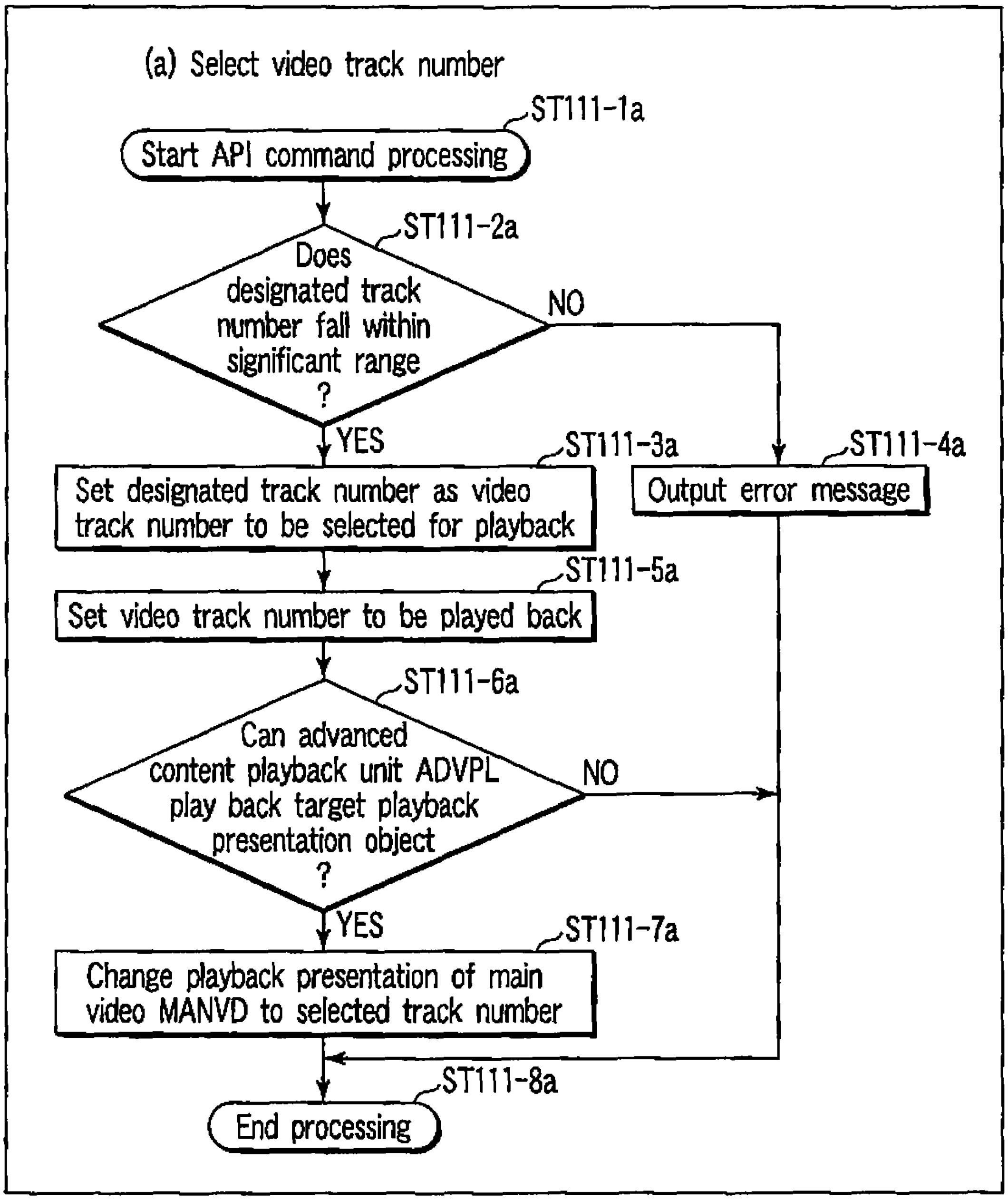
FIG. 111 is flowchart No. 1 showing the function contents in API commands according to the embodiment.
Figure 112:
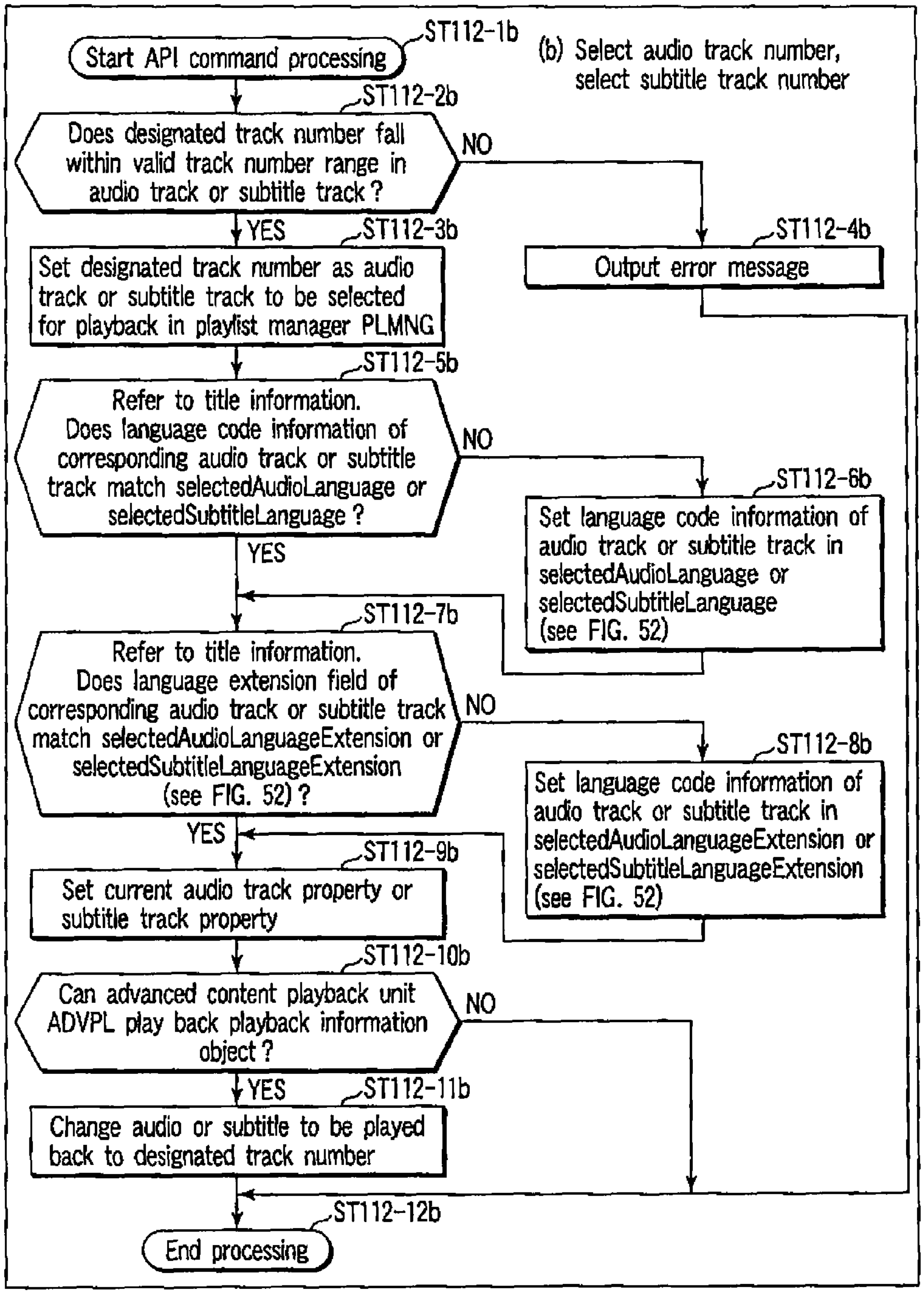
FIG. 112 is flowchart No. 2 showing the function contents in API commands according to the embodiment.
Figure 113:
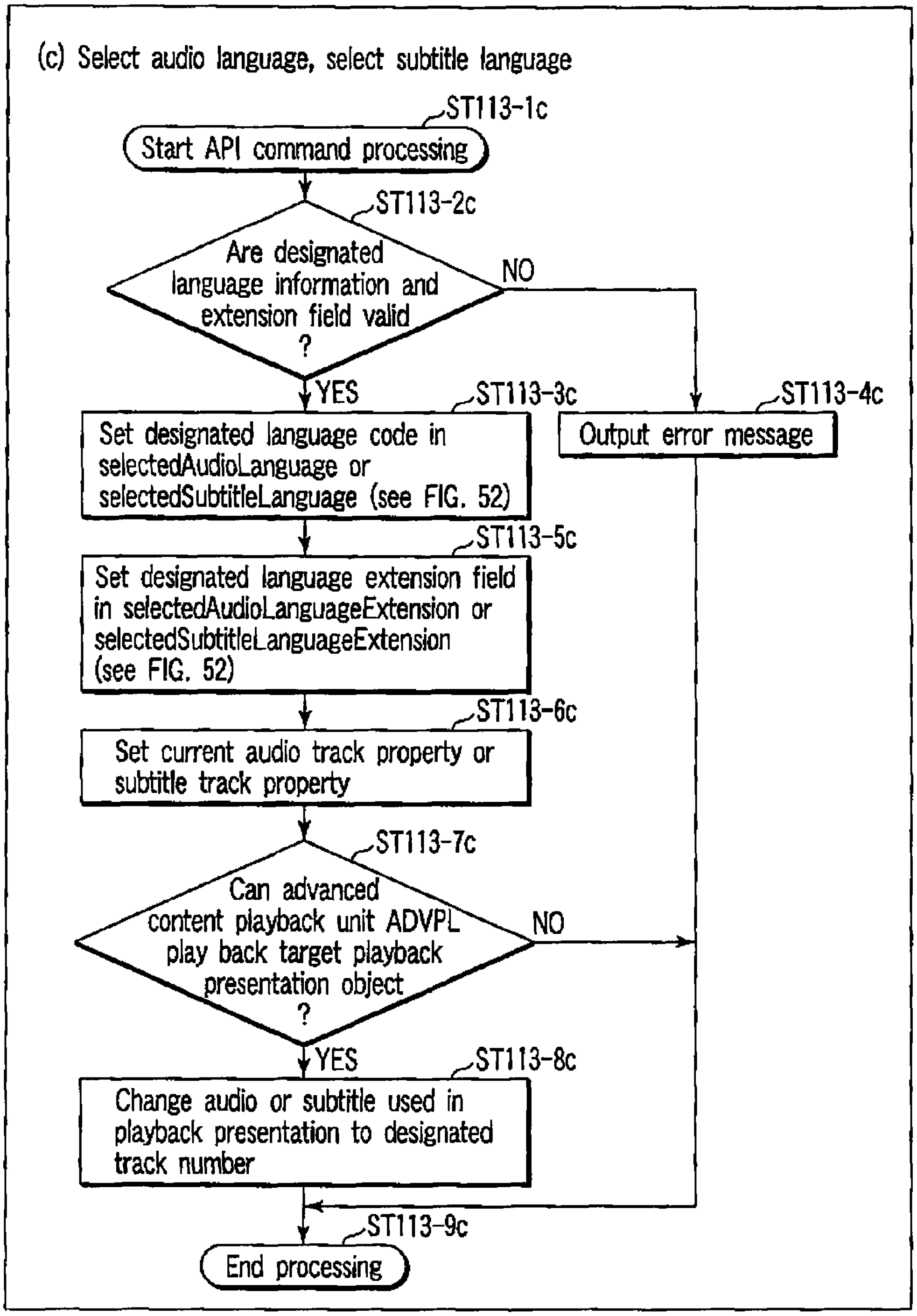
FIG. 113 is flowchart No. 3 showing the function contents in API commands according to the embodiment.
Figure 114:
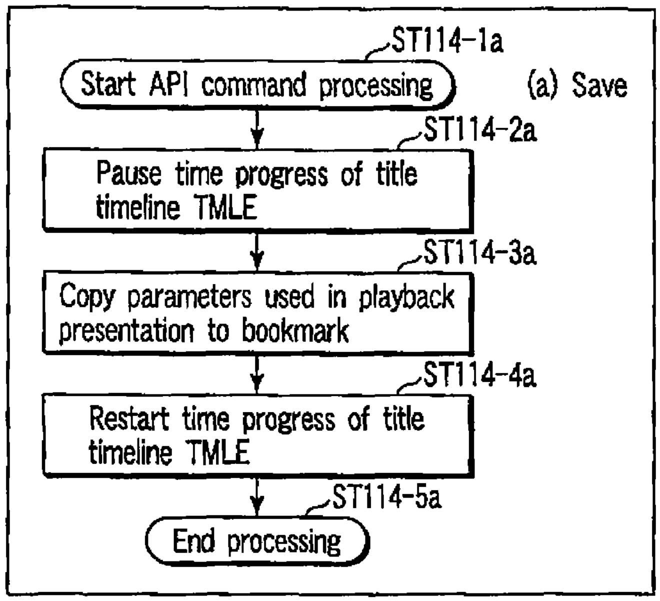
FIG. 114 is flowchart No. 4 showing the function contents in API commands according to the embodiment.
Figure 115:
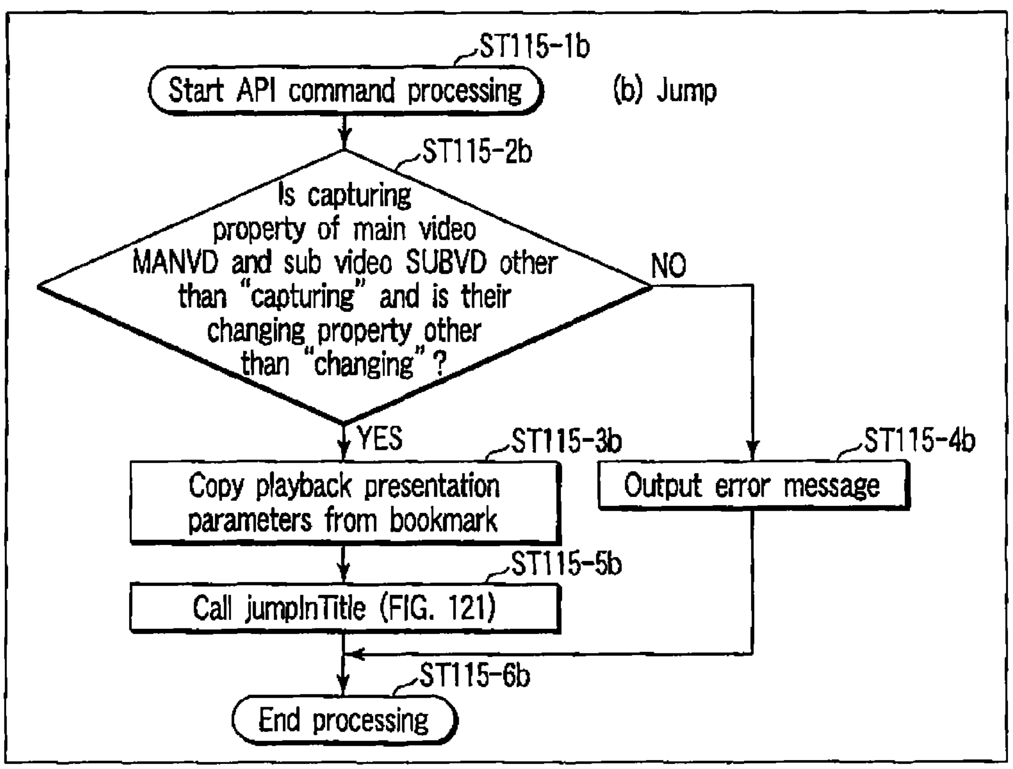
FIG. 115 is flowchart No. 5 showing the function contents in API commands according to the embodiment.
Figure 116:
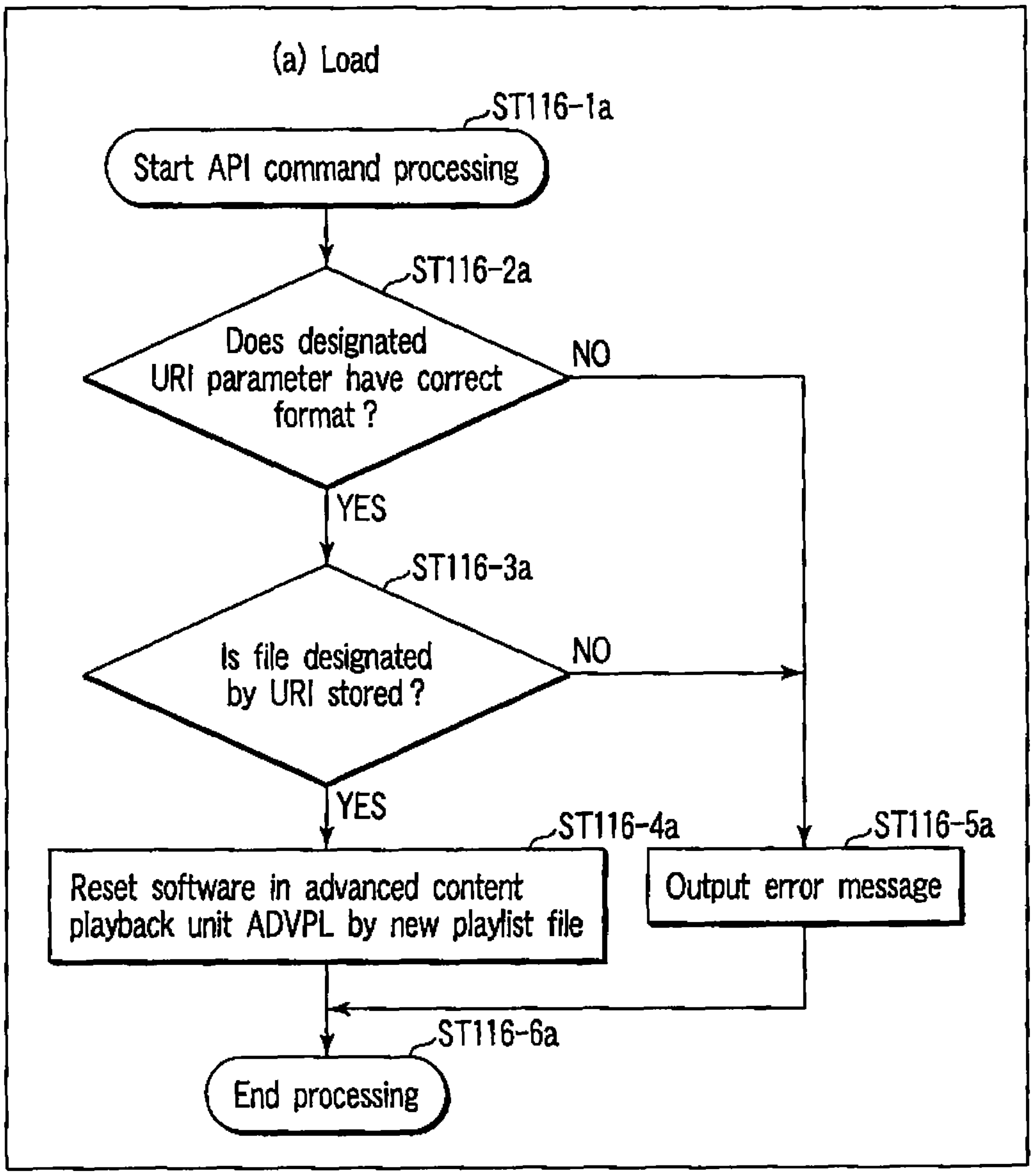
FIG. 116 is flowchart No. 6 showing the function contents in API commands according to the embodiment.
Figure 117:
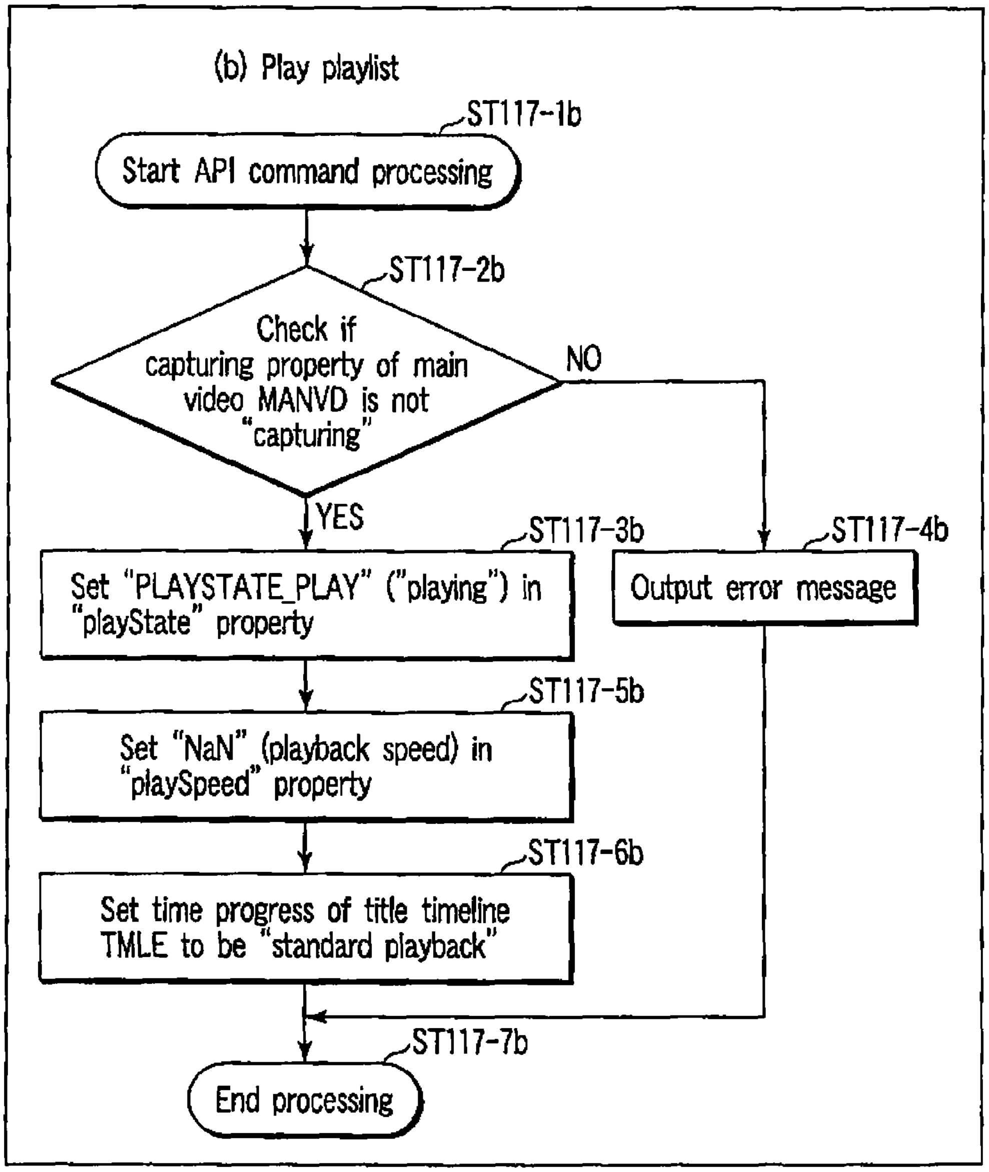
FIG. 117 is flowchart No. 7 showing the function contents in API commands according to the embodiment.
Figure 118:
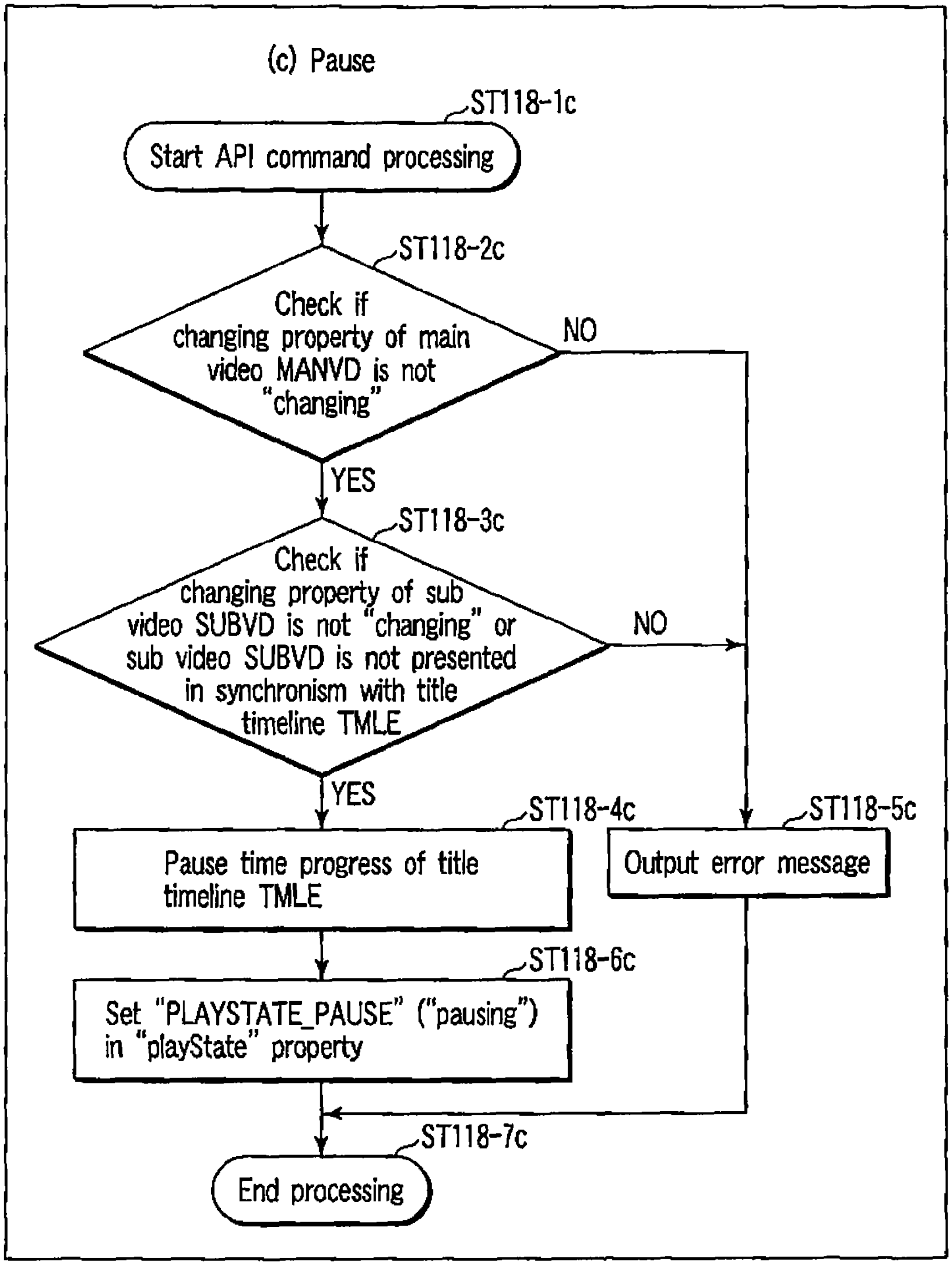
FIG. 118 is flowchart No. 8 showing the function contents in API commands according to the embodiment.
Figure 119:
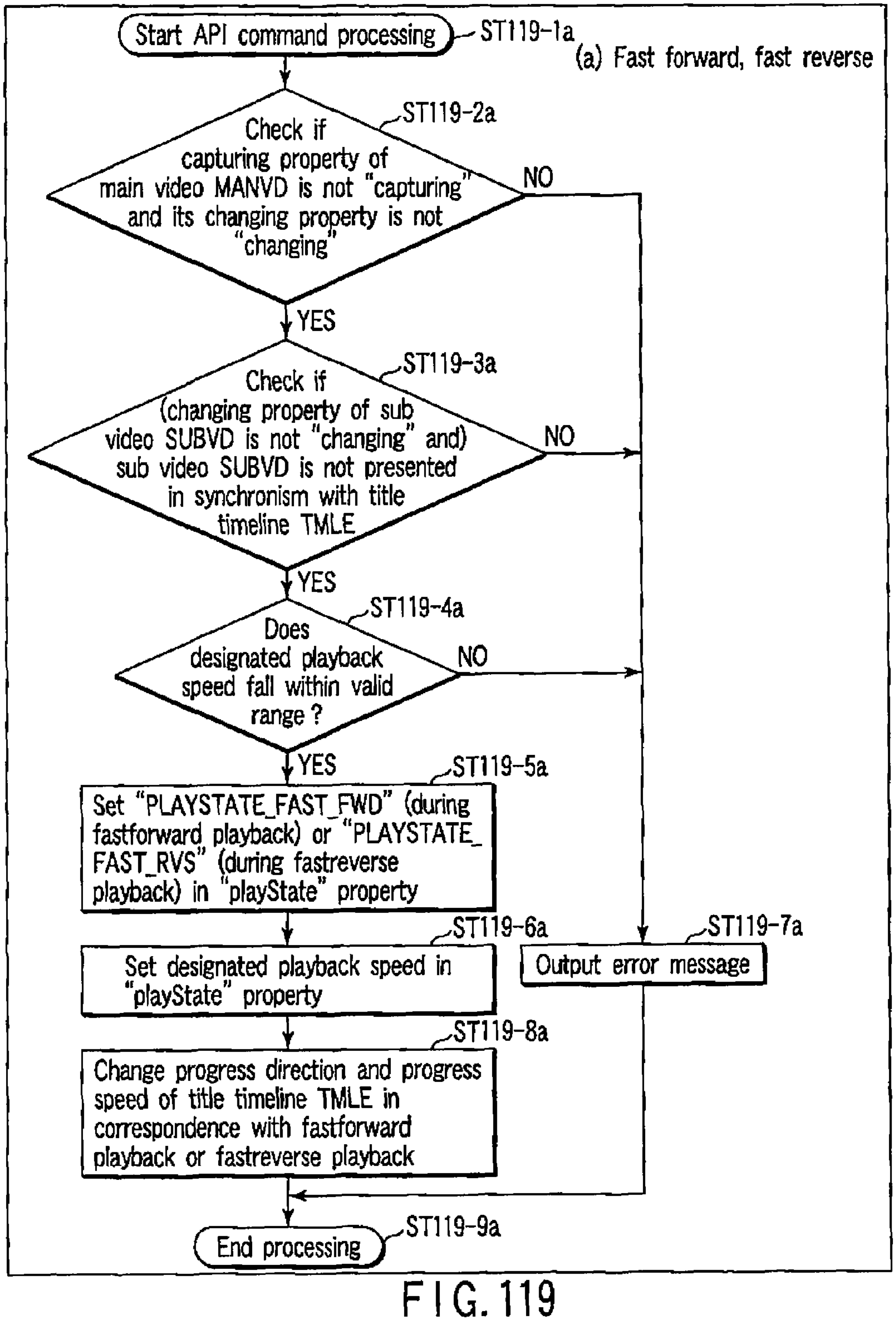
Figure 120:
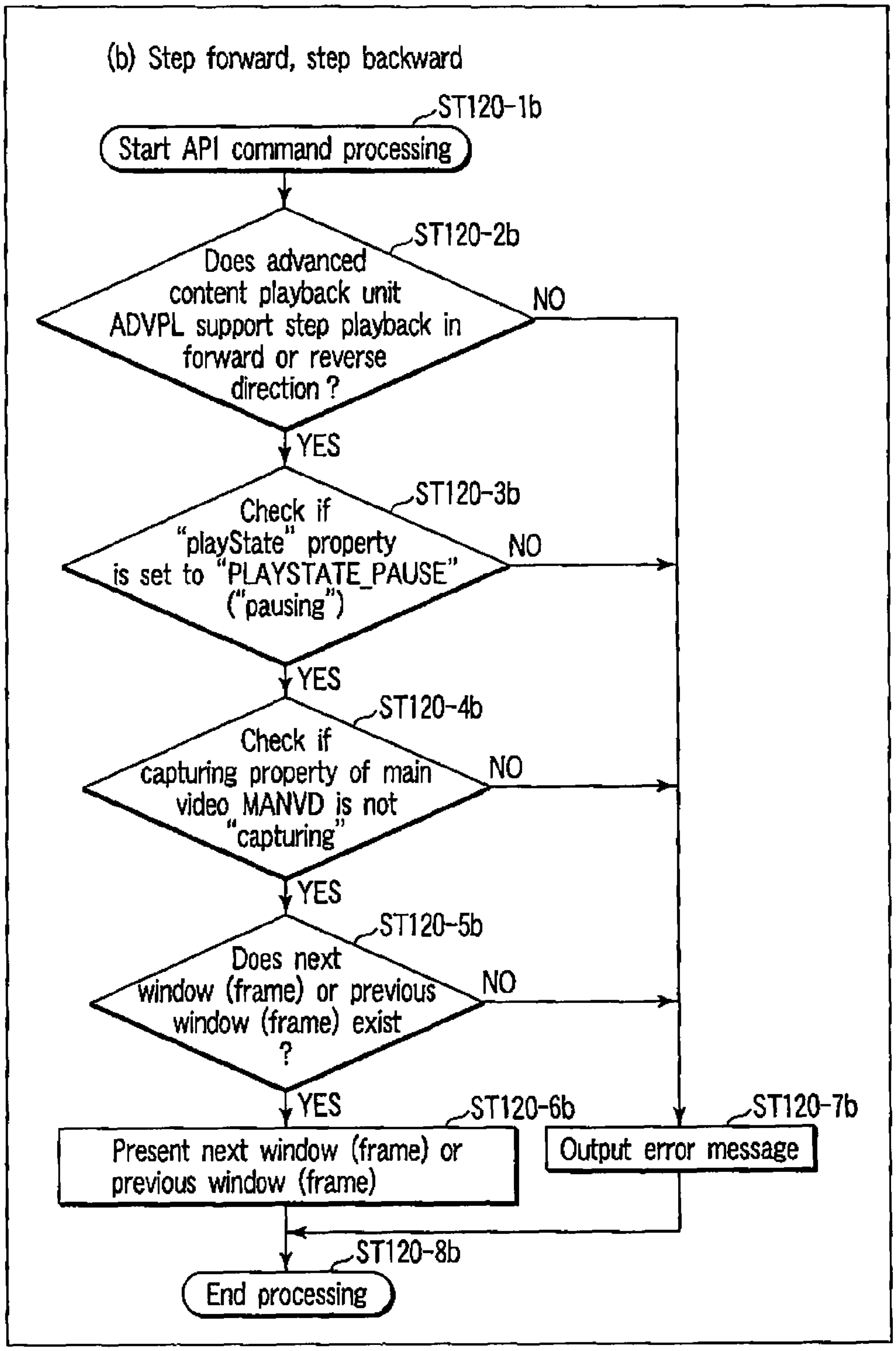
Figure 121:
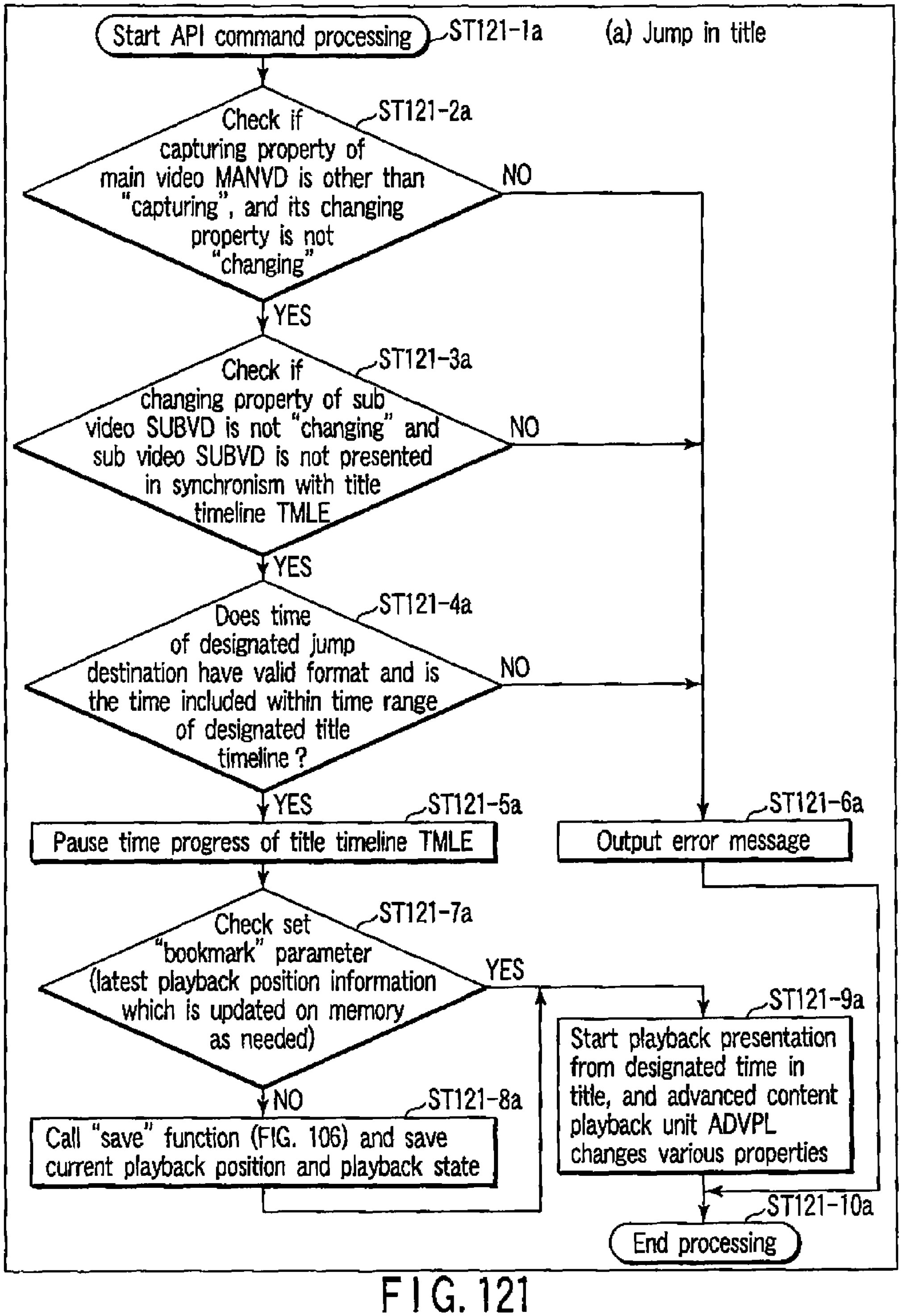
Figure 122:
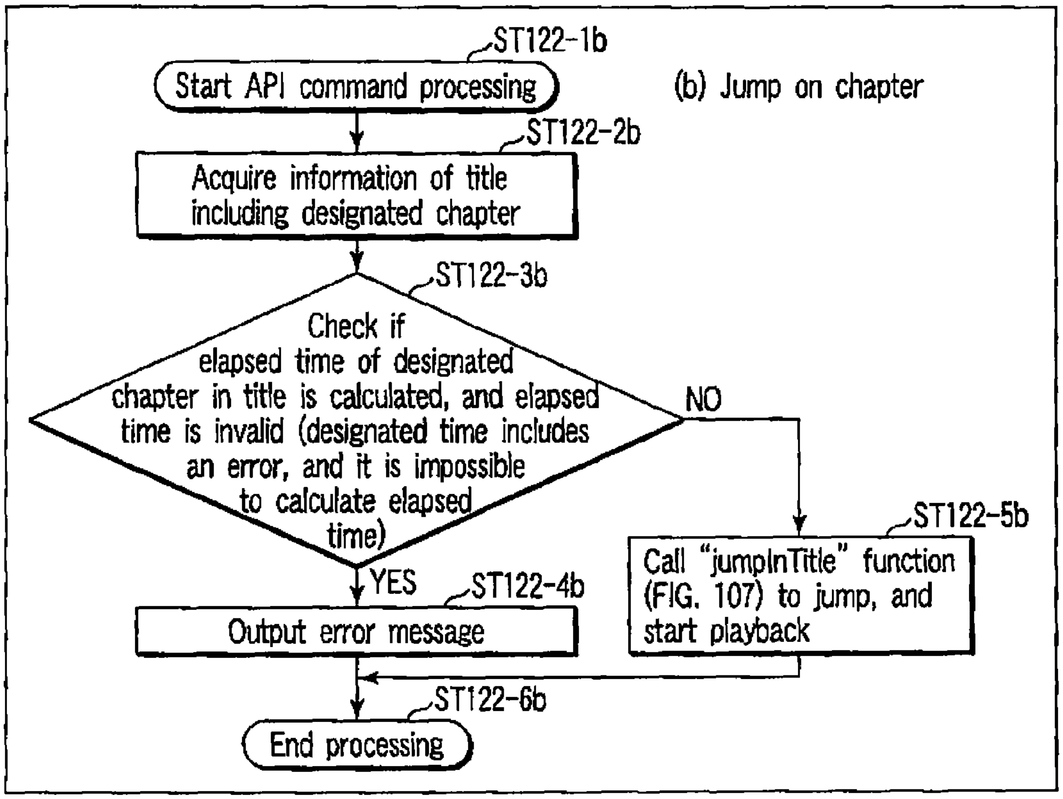
Figure 123:
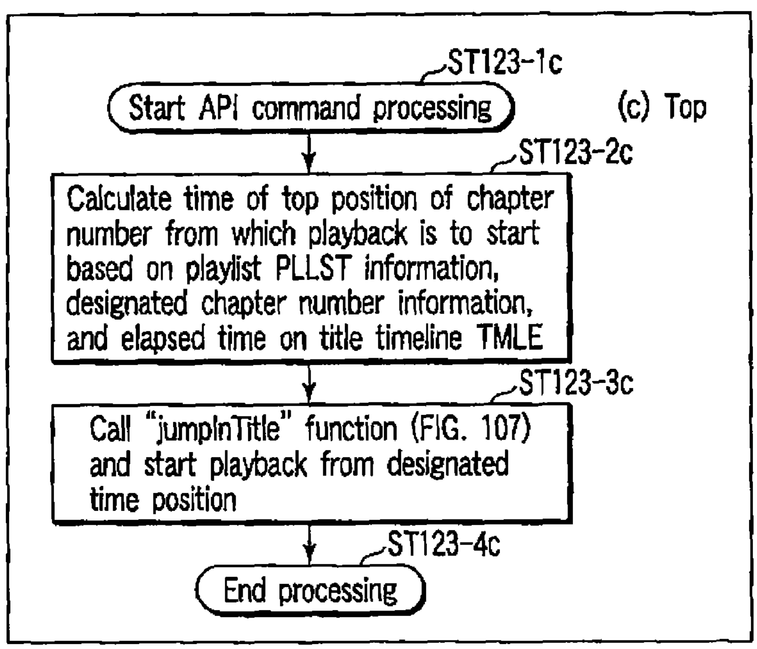
Figure 124:
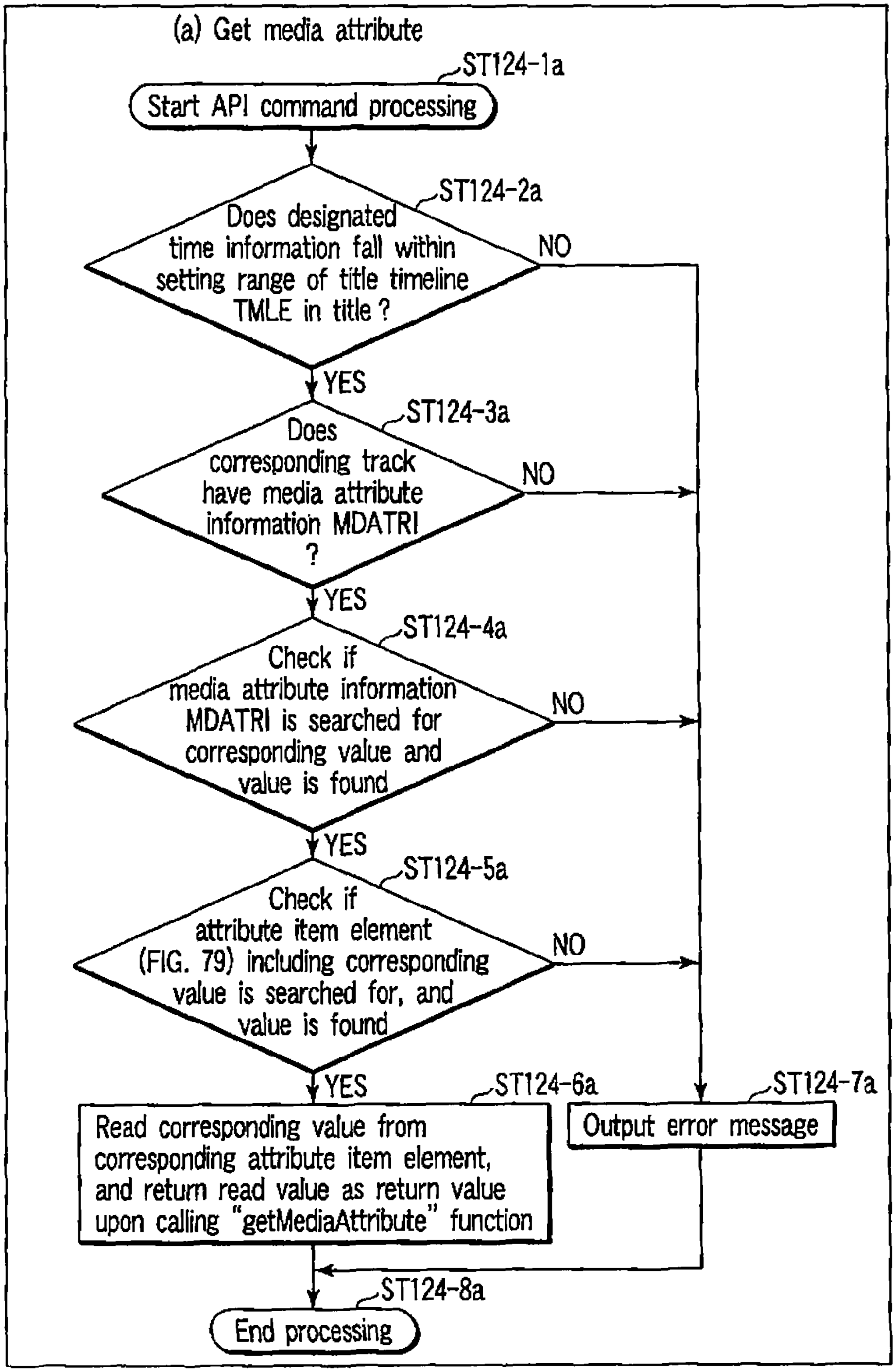
Figure 125:
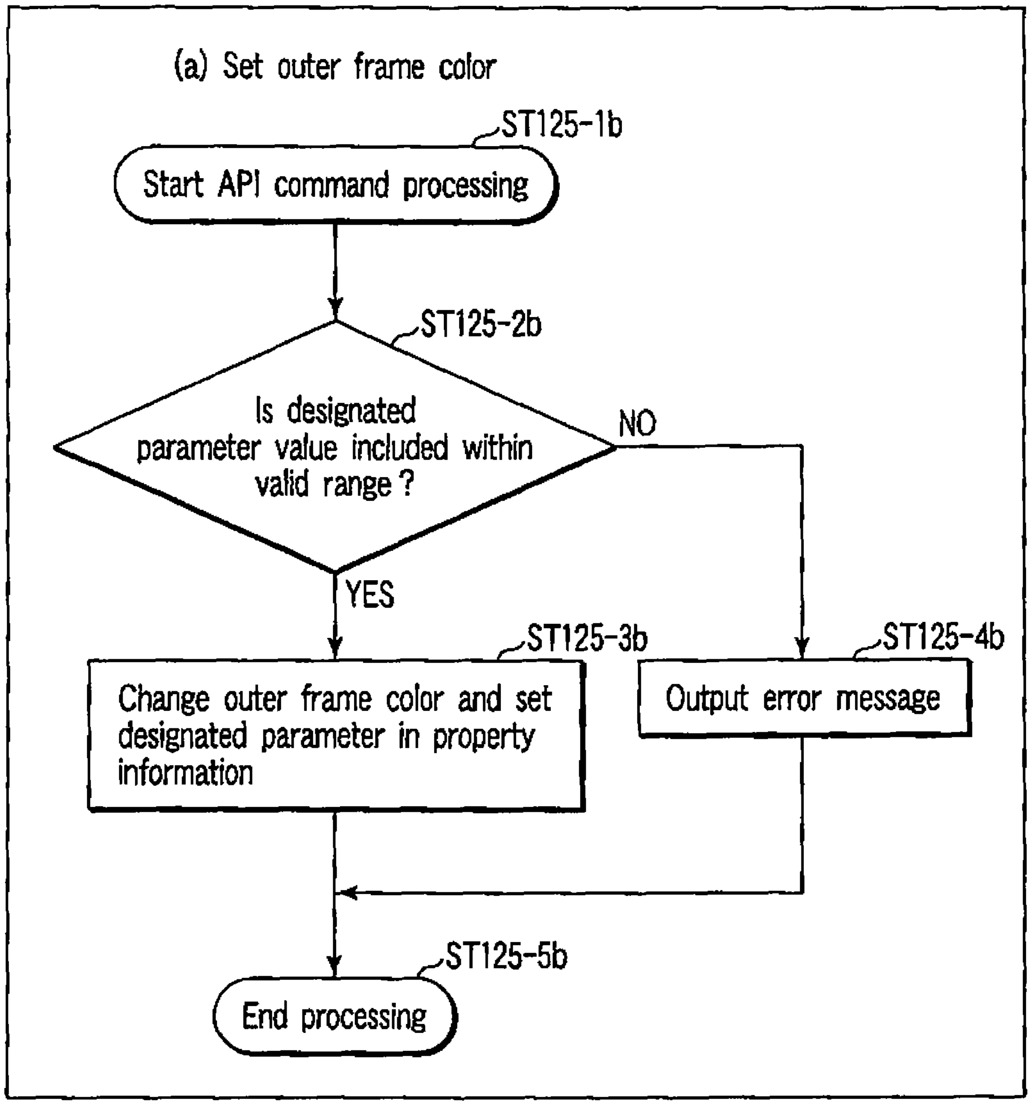
Figure 126:
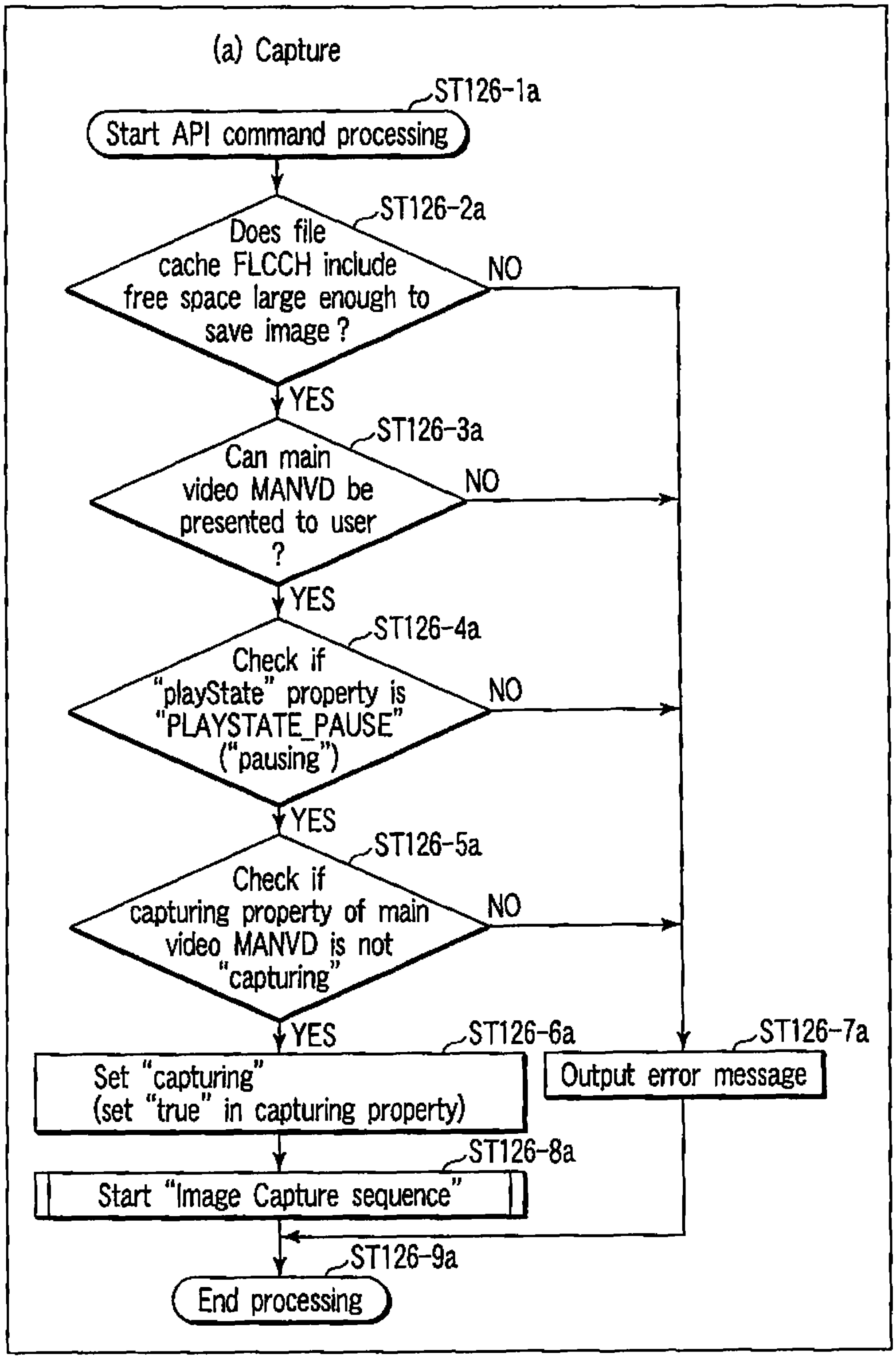
Figure 127:
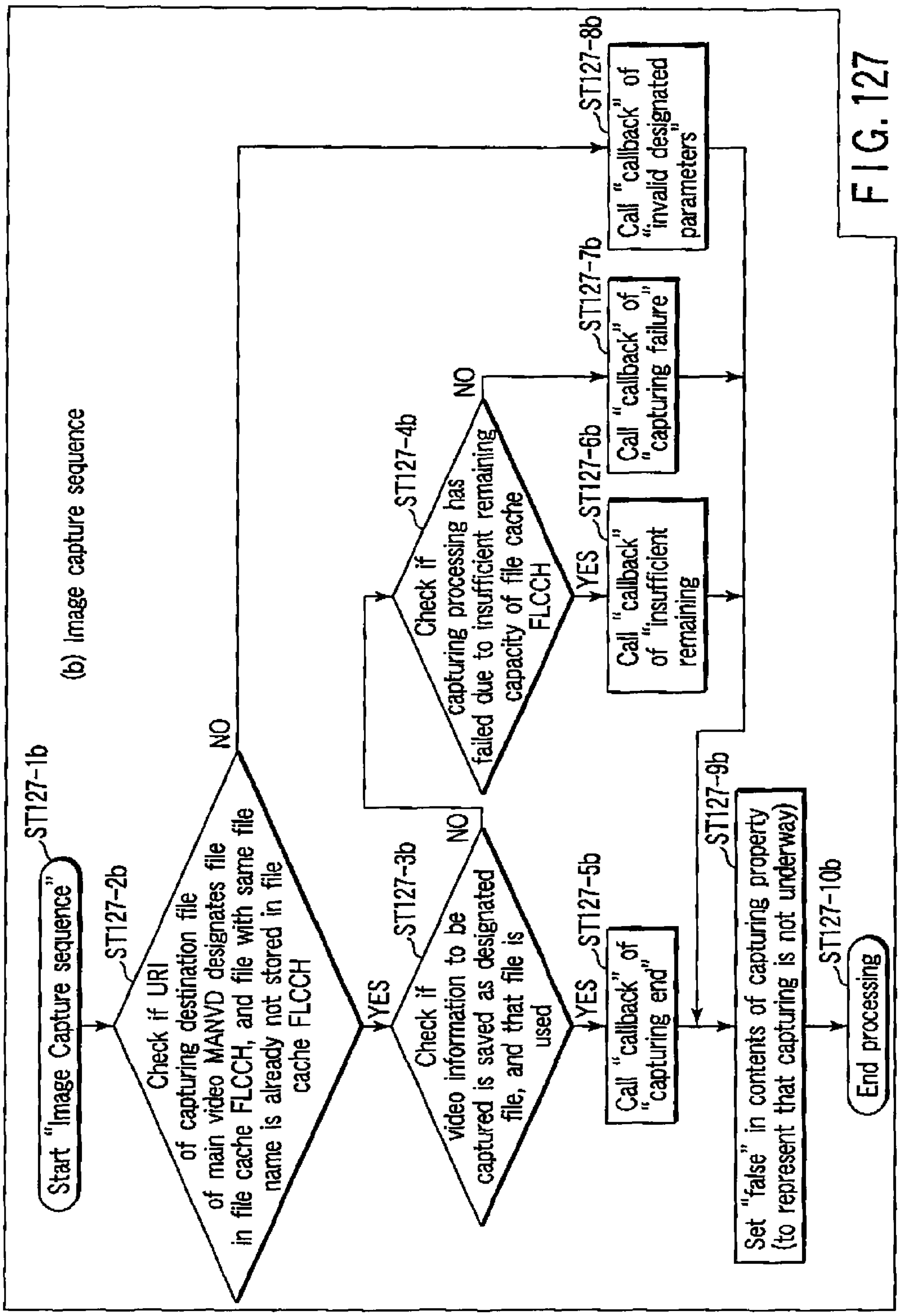
Figure 129:
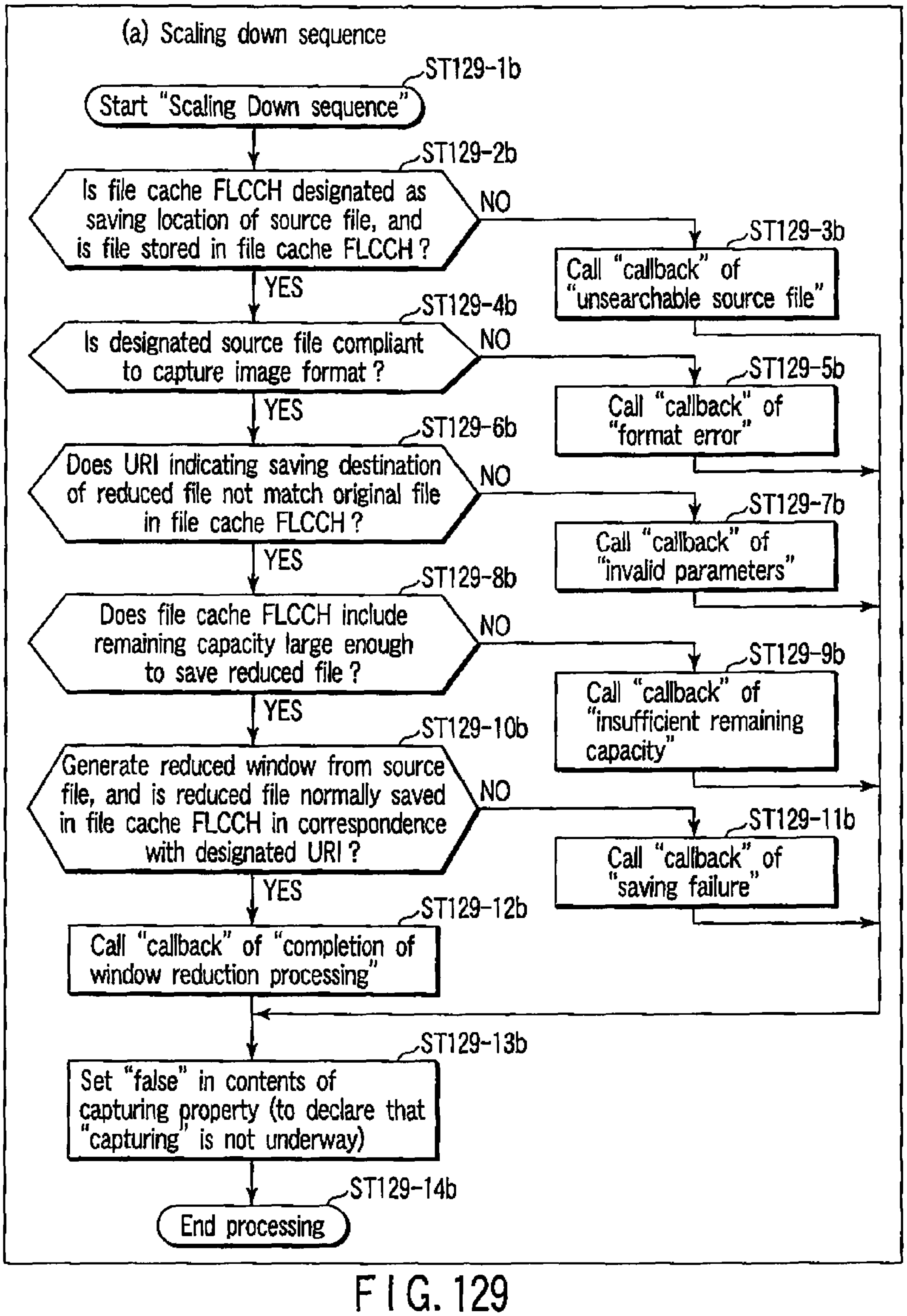
Figure 130:
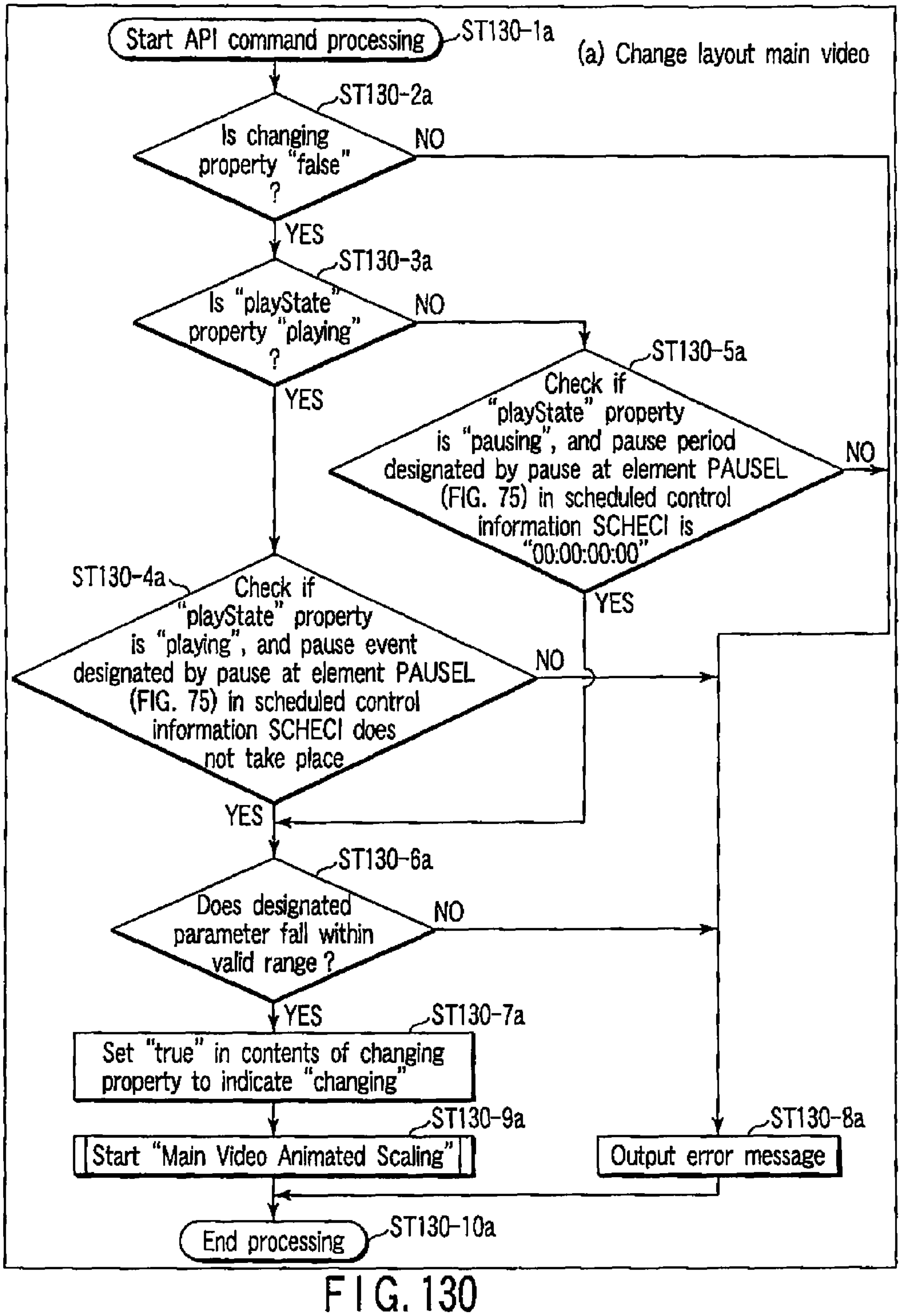

An overview of various API commands will be described below using FIGS. 106A to 110B. API types include a player API, data cache API, application API, and XMLAPI. Functions included in the player API will be described first. A "selectVideoTrackNumber" function exists in a track selection object, and has a function of setting a video track number which is to undergo playback presentation. The "selectVideoTrackNumber" function has a setting parameter "main video track number", but does not have any return value. FIG. 111 is a flowchart showing the contents of the "selectVideoTrackNumber". A "selectAudioTrackNumber" function described next exists in the track selection object, and has a function of designating an audio track number. The "selectAudioTrackNumber" function has a setting parameter "main audio track number", but does not have any return value. FIG. 112 is a flowchart showing the contents of the "selectAudioTrackNumber". A "selectAudioLanguage" function exists in the track selection object, and has a function of specifying a main audio language code and changing a main audio track. The "selectAudioLanguage" function has setting parameters "language code" and "language code extension", but does not have any return value. FIG. 113 is a flowchart showing the contents of the "selectAudioLanguage". The next "selectSubtitleTrackNumber" function exists in the track selection object, and has a function of specifying a subtitle track number, and changing a presentation state. The "selectSubtitleTrackNumber" function has a setting parameter "subtitle track number", but does not have any return value. FIG. 112 is a flowchart showing the contents of the "selectSubtitleTrackNumber". A "selectSubtitleLanguage" function exists in the track selection object, and has a function of specifying a subtitle language code, and changing a subtitle track. The "selectSubtitleLanguage" function has setting parameters "language code" and "language code extension", but does not have any return value. FIG. 113 is a flowchart showing the contents of the "selectSubtitleLanguage". A "save" function exists in a bookmark object, and has a function of saving the current playback position and the current playback state. The "save" function does not have any parameter and return value. FIG. 114 is a flowchart showing the contents of the "save". A "jump" function described next exists in the bookmark object, and has a function of interrupting the current playback, restarting playback from the recorded (designated) position, and changing the state of a bookmark (latest playback position information which is kept periodically updated on a memory). The "jump" function does not have any setting parameter and return value. FIG. 115 is a flowchart showing the contents of the "jump". A "load" function exists in a playlist object, and has a function of changing a playlist and resetting a player. The "load" function has a setting parameter "URI (Uniform Resource Identifier)", but does not have any return value. FIG. 116 is a flowchart showing the contents of the "load". The next "playPlaylist" function exists in the playlist object, and has a function of making playback at a standard speed. The "playPlaylist" function does not have any setting parameter and return value. FIG. 117 is a flowchart showing the contents of the "playPlaylist". A "pause" function exists in the playlist object, and has a function of pausing the current playback. The "pause" function does not have any setting parameter and return value. FIG. 118 is a flowchart showing the contents of the "pause". The next "stopPlaylist" function exists in the playlist object, and has a function of stopping the processing of the advanced content playback unit. The "stopPlaylist" function does not have any setting parameter and return value. The next "fastForward" function exists in the playlist object, and has a function of making fastforward playback. The "fastForward" function has a setting parameter "playback speed", but does not have any return value. FIG. 119 is a flowchart showing the contents of the "fastForward". A "fastReverse" function exists in the playlist object, and has a function of making fastreverse playback. The "fastReverse" function has a setting parameter "reverse playback speed", but does not have any return value. FIG. 119 is a flowchart showing the contents of the "fastReverse". A "slowForward" function described next exists in the playlist object, and has a function of making low-speed playback in the forward direction. The "slowForward" function has a setting parameter "playback speed", but does not have any return value. A "slowReverse" function described next exists in the playlist object, and has a function of making low-speed playback in the reverse direction. The "slowReverse" function has a setting parameter "playback speed", but does not have any return value. A "stepForward" function described next exists in the playlist object, and has a function of making step playback in the forward direction. The "stepForward" function does not have any setting parameter and return value. FIG. 120 is a flowchart showing the contents of the "stepForward". A "stepBackward" function described next exists in the playlist object, and has a function of making step playback in the backward direction. The "stepBackward" function does not have any setting parameter and return value. FIG. 120 is a flowchart showing the contents of the "stepBackward". A "jumpInTitle" function exists in a title object, and has a function of changing the playback time on a title timeline in a single title. The "jumpInTitle" function has setting parameters "change time" and "bookmark", but does not have any return value. FIG. 121 is a flowchart showing the contents of the "jumpInTitle". The next "jumpOnChapter" function exists in a chapter object, and has a function of starting playback from the designated time in a single chapter. The "jumpOnChapter" function has setting parameters "playback start time" and "bookmark", but does not have any return value. FIG. 122 is a flowchart showing the contents of the "jumpOnChapter". A "top" function described next exists in the chapter object, and has a function of restarting playback from the top position in the chapter. The "top" function does not have any setting parameter and return value. FIG. 123 is a flowchart showing the contents of the "top". The next "getMediaAttribute" function exists in an audio track object, and has a function of acquiring a media attribute value of a corresponding track from a playlist. The "getMediaAttribute" function has setting parameters "time on title timeline" and "media attribute name", and a return value "designated media attribute value". FIG. 124 is a flowchart showing the contents of the "getMediaAttribute". The next "capture" function exists in a main video object, and has a function of saving the current main video image in a file cache. The "capture" function has setting parameters "URI (Uniform Resource Identifier) of video image file" and "callback function", but does not have any return value. FIGS. 126 and 127 are flowcharts showing the contents of the "capture". A "changeImageSize" function exists in the main video object, and has a function of reducing the presentation size of an image file captured in a file cache. The "changeImageSize" function has setting parameters "URI (Uniform Resource Identifier) of source file", "URI (Uniform Resource Identifier) of file after reduction", "denominator value and numerator value indicating reduction ratio", and "callback function", but does not have any return value. FIGS. 128 and 129 are flowcharts showing the contents of the "changeImageSize". The next "setOuterFrameColor" function exists in the main video object, and has a function of changing the outer frame color of a main video. The "setOuterFrameColor" function has setting parameters "Y value", "Cr value", and "Cb value", but does not have any return value. FIG. 125 is a flowchart showing the contents of the "setOuterFrameColor". A "changeLayoutMainVideo" function exists in the main video object, and has a function of changing the layout of a main video. The "changeLayoutMainVideo" function has setting parameters (1) "canvas X-coordinate value of main video", (2) "canvas Y-coordinate value of main video", (3) "scaling size of main video", (4) "cropX value of main video", (5) "cropY value of main video", (6) "cropWidth value of main video", (7) "cropHeight value of main video", and (8) "presentation period of cropped main video", but does not have any return value. FIGS. 130 and 131 are flowcharts showing the contents of the "changeLayoutMainVideo". A "changeLayoutSubVideo" function exists in a sub video object, and has a function of changing the layout of a sub video. The "changeLayoutSubVideo" function has setting parameters (1) "canvas X-coordinate value of sub video", (2) "canvas Y-coordinate value of sub video", (3) "scaling size of sub video", (4) "cropX value of sub video", (5) "cropY value of sub video", (6) "cropWidth value of sub video", (7) "cropHeight value of sub video", and (8) "presentation period of cropped sub video", but does not have any return value. FIGS. 132 and 133 are flowcharts showing the contents of the "changeLayoutSubVideo". The next "setVolume" function exists in a main audio object, and has a function of changing an audio volume value. The "setVolume" function has setting parameters (1) "volume value of left speaker", (2) "volume value of right speaker", (3) "volume value of center speaker", (4) "volume value of left surround speaker", (5) "volume value of right surround speaker", (6) "volume value of left rear speaker", (7) "volume value of right rear speaker", and (8) "volume value of sub woofer", but does not have any return value. FIG. 134 is a flowchart showing the contents of the "setVolume". The next "setMixingSubAudio" function exists in a sub audio object, and has a function of making downmix processing of sub audio channels. The "setMixingSubAudio" function has setting parameters (1) "downmix value to left speaker", (2) "downmix value to right speaker", (3) "downmix value to center speaker", (4) "downmix value to left surround speaker", (5) "downmix value to right surround speaker", (6) "downmix value of left rear speaker", (7) "downmix value of right rear speaker", and (8) "downmix value of sub woofer" of right and left sub audio channels, but does not have any return value. FIG. 135 is a flowchart showing the contents of the "setMixingSubAudio". The next "playEffectAudio" function exists in an effect audio object, and has a function of making playback presentation of effect audio. The "playEffectAudio" function has setting parameters "URI (Uniform Resource Identifier) of effect audio file", "playback repeat count of effect audio file", and "callback function", but does not have any return value. FIGS. 137 and 138 are flowcharts showing the contents of the "playEffectAudio". A "stopEffectAudio" function exists in the effect audio object, and has a function of stopping playback presentation of effect audio. The "stopEffectAudio" function does not have any setting parameter and return value. FIG. 136 is a flowchart showing the contents of the "stopEffectAudio". The next "setMixingEffectAudio" function exists in the effect audio object, and has a function of making downmix processing of effect audio channels. The "setMixingEffectAudio" function has setting values (1) "downmix value to left speaker", (2) "downmix value to right speaker", (3) "downmix value to center speaker", (4) "downmix value to left surround speaker", (5) "downmix value to right surround speaker", (6) "downmix value of left rear speaker", (7) "downmix value of right rear speaker", and (8) "downmix value of sub woofer" of right and left effect audio channels, but does not have any return value. The next "playStandardContentPlayer" function exists in a standard content player object, and has a function of changing the playback state from an advanced content playback state to a standard content playback state. The "playStandardContentPlayer" function has a setting parameter "domain name of standard content", but does not have any return value. FIG. 139 is a flowchart showing the contents of the "playStandardContentPlayer". A "playSecondaryVideoPlayer" function exists in a secondary video player object, and has a function of starting playback of a secondary video player. The "playSecondaryVideoPlayer" function has setting parameters (1) "URI (Uniform Resource Identifier) of time map file", (2) "time until playback start of secondary video player", (3) "offset time to playback start position in secondary video set", (4) "playback end time in secondary video set", and (5) "callback function", but does not have any return value. FIGS. 140, 141, 142, and 143 are flowcharts showing the contents of the "playSecondaryVideoPlayer". A "pauseOn" function exists in the secondary video player object, and has a function of restarting playback presentation of a secondary video set. The "pauseOn" function does not have any setting parameter and return value. FIG. 144 is a flowchart showing the contents of the "pauseOn". A "pauseOff" function exists in the secondary video player object, and has a function of restarting playback presentation of a secondary video set from a paused state. The "pauseOff" function does not have any setting parameter and return value. FIG. 145 is a flowchart showing the contents of the "pauseOff". The next "stopSecondaryVideoPlayer" function exists in the secondary video player object, and has a function of stopping playback presentation of a secondary video set. The "stopSecondaryVideoPlayer" function does not have any setting parameter and return value. FIG. 146 is a flowchart showing the contents of the "stopSecondaryVideoPlayer". A "getValue" function exists in a general parameter object, and has a function of getting a general parameter value designated by a specific key. The "getValue" function has a setting parameter "key information", and a return value "general parameter value corresponding to specific key". FIG. 147 is a flowchart showing the contents of the "getValue". The next "setValue" function exists in the general parameter object, and has a function of saving a general parameter value together with a specific key. The "setValue" function has setting parameters "key information" and "general parameter value corresponding to specific key", but does not have any return value. FIG. 148 is a flowchart showing the contents of the "setValue".

Next, functions included in the data cache API will be described below. A "getPriority" function exists in a data cache, and has a function of acquiring the delete priority order of files in a file cache. The "getPriority" function has a setting parameter "URI (Uniform Resource Identifier)", and a return value "delete priority order number". FIG. 149 is a flowchart showing the contents of the "getPriority". The next "setPriority" function exists in the data cache, and has a function of setting the delete priority order of files in a file cache. The "setPriority" function has setting parameters "URI (Uniform Resource Identifier)" and "priority order number", but does not have any return value. FIG. 150 is a flowchart showing the contents of the "setPriority".

Next, functions included in the application API will be described below. A "moveToTop" function exists in an application object, and has a function of moving and presenting the current application to the frontmost side. The "moveToTop" function does not have any setting parameter and return value. FIG. 151 is a flowchart showing the contents of the "moveToTop". A "moveToBottom" function exists in the application object, and has a function of moving and presenting the current application to the backmost side. The "moveToBottom" function does not have any setting parameter and return value. FIG. 152 is a flowchart showing the contents of the "moveToBottom". A "link" function exists in the application object, and has a function of replacing the currently activated markup page by a linked markup page. The "link" function has a setting parameter "URI (Uniform Resource Identifier)", but does not have any return value. FIGS. 153 and 154 are flowcharts showing the contents of the "link". A "setMarkupLoadedHandler" function described next exists in the application object, and has a function of setting a callback function to be called upon loading the current markup page. The "setMarkupLoadedHandler" function does not have any setting parameter and return value. An "activate" function exists in an advanced application object, and has a function of activating an application. The "activate" function does not have any setting parameter and return value. FIG. 155 is a flowchart showing the contents of the "activate". An "inactivate" function defined next exists in the advanced application object, and has a function of inactivating an application. The "inactivate" function does not have any setting parameter and return value. FIG. 156 is a flowchart showing the contents of the "inactivate". A "moveBefore" function exists in the advanced application object, and has a function of moving and presenting the designated application to a position immediately before a target application. The "moveBefore" function has a setting parameter "Z-order value of target application", but does not have any return value. FIG. 157 is a flowchart showing the contents of the "moveBefore". The next "moveAfter" function exists in the advanced application object, and has a function of moving and presenting the designated application to a position immediately after a target application. The "moveAfter" function has a setting parameter "Z-order value of target application", but does not have any return value. FIG. 158 is a flowchart showing the contents of the "moveAfter".

Finally, functions included in the XMLAPI will be described below. A "parse" function exists in an XML parser object, and has a function of loading an XML document and parsing its contents. The "parse" function has setting parameters "URI (Uniform Resource Identifier)" and "callback function", but does not have any return value. FIGS. 159, 160A, and 160B are flowcharts showing the contents of the "parse". Furthermore, a "parseString" function exists in the XML parser object, and has a function of parsing specific data as an XML document. The "parseString" function has a setting parameter "designation information of data to be parsed", but does not have any return value.

This embodiment is characterized in that various API commands shown in FIGS. 106A to 110B are set to allow more systematic and efficient processing in the advanced content playback unit ADVPL. There are two different use methods of the API commands in this embodiment: a method of using the commands in interface (exchange) among parts in the advanced content playback unit ADVPL in FIG. 14, and a method of describing the commands in the script SCRPT. When the API commands are used as the script SCRPT, the functions shown in FIGS. 106A to 110B are activated by designating various function names shown in FIGS. 106A to 110B in the script file SCRPT, as shown in FIG. 12. The processing procedures of "selectVideoTrackNumber" to "SelectSubtitleLanguage" shown in FIGS. 106A to 110B will be described below using FIGS. 111 to 113. As the method of using various API commands (functions) shown in FIGS. 111 to 113 in exchange among parts in the advanced content playback unit ADVPL shown in FIG. 14, they can be used as:

1. commands which are issued from the user interface engine UIENG shown in FIG. 28 to the presentation engine PRSEN;

2. commands which are issued from the playlist manager PLMNG in FIG. 28 to the presentation engine PRSEN based on the contents described in the playlist PLLST;

3. commands used in internal processing based on the contents described in the playlist PLLST in the playlist manager PLMNG shown in FIG. 28; and the like.

The invention is not limited to the above embodiment. As another application example, the ECMA script processor ECMASP in the advanced application manager ADAMNG shown in FIG. 44 may execute, as a main body, processing based on the following sequence:

1. an event is generated (the event is input to the navigation manager NVMNG);

2. the ECMA script processor ECMASP searches the advanced application manager ADAMNG and file cache FLCCH for a script SCRPT that describes the processing method (function contents) corresponding to the event;

3. the ECMA script processor ECMASP controls to perform activation processing of (a series of) functions in the advanced content playback unit ADVPL in accordance with the contents of the extracted script SCRPT; and 4. the activation processing contents controlled by the ECMA script processor ECMASP follow the flowchart contents for the functions to be described below.

FIG. 111 shows the procedure associated with the function processing of "selectVideoTrackNumber" described first in FIGS. 106A and 106B, and is used as processing for setting the track number of a video which is to undergo playback presentation. FIG. 112 shows the processing procedure for activating the "selectAudioTrackNumber" function or "selectSubtitleTrackNumber" function described in the second or fourth column in FIGS. 106A and 106B, so as to execute processing for changing the audio or subtitle track number. FIG. 113 shows the processing procedure which corresponds to the "selectAudioTrackNumber" function or "selectSubtitleLanguage" function described in the third or fifth column in FIGS. 106A and 106B, and executes processing for specifying a main audio or subtitle language code, and changing a main audio or subtitle track.

<Function Properties> selectVideoTrackNumber

The selectVideoTrackNumber function is used to specify the track number of Video.

Parameters:

track of type unsigned int

Specifies the track number of the Main Video.

Valid Range: 1-99

Return Value: None

Exceptions:

HDDVD_E_ARGUMENT

Detailed processing is as follows:

1) Check whether the assigned argument track is within valid range.

If the assigned argument track is within available Main Video track numbers:

2) Go to step 3).

Otherwise:

2) Stop this sequence and throw

HDDVD_E_ARGUMENT.

3) Assign the argument track to the selectedVideoTrackNumber property.

4) Set the currentVideoTrackNumber property. For selection algorithm.

5) Check whether this object is member of the Player object.

If this object is member of the Player object:

6) Change the presentation of Main Video with the selected track number and return.

Otherwise

6) Return.

FIG. 111 shows the function contents of "selectVideoTrackNumber" as an API command. The "selectVideoTrackNumber" is an API command for setting the track number of a video which is to undergo playback presentation, and is basically the one which is issued from the navigation manager NVMNG in the advanced content playback unit ADVPL to the presentation engine PRSEN, as shown in FIG. 14. Alternatively, the API command may be described as function contents in the script SCRPT shown in FIG. 14, an event may be generated based on the event element EVNTEL (see FIG. 91C) in the markup MRKUP shown in FIG. 14, and an event listener may detect generation of the event in the script SCRPT shown in FIG. 14 based on the event, thus activating the "selectVideoTrackNumber" function. Upon starting API command processing in ST111-1*a*, it is checked if the designated track number falls within a significant range (ST111-2*a*). If it is determined that the designated track number falls outside the significant range, an error message is output in ST111-4*a*, and the process advances to end processing (ST111-8*a*). If the designated track number falls within the significant range, it is set as a video track number to be selected for playback in ST111-3*a*. Next, the designated track number is set in the current video track number property in ST111-5*a*. After that, it is checked in ST111-6*a* if a target presentation playback object can be played back by the advanced content playback unit ADVPL. If the target presentation playback object cannot be played back by the advanced content playback unit ADVPL, the process jumps to the end processing (ST111-8*a*); otherwise, the playback presentation of a main video MANVD is changed to the selected track number (ST111-7*a*). After the playback presentation of the main video MANVD is changed to the selected track number in ST111-7*a*, the "selectVideoTrackNumber" function processing ends (ST111-8*a*).

<selectAudioTrackNumber> selectAudioTrackNumber

The selectAudioTraekNumber is used to specify the track number of Audio in current title. This function change not only selected track number but also selected language code and this extension.

Parameters:

track of type unsigned hit

Specifies the track number of the Main Audio.

Valid Range: 1-99

Return Value: None

Exceptions:

HDDVD_E_ARGUMENT

Detailed processing is as follows:

1) Check whether the assigned argument buck is within valid track numbers for Audio Track.

If it is valid:

2) Go to step 3).

Otherwise:

2) Stop this sequence and throw HDDVD_E_ARGUMENT.

3) Assign the argument track to the selectedAudioTrack property.

4) Get referenceTitle.audioTracks[tmck]languageCode.

If returned value is not "*":

5) Assign the returned value to the selectedAudioLanguageCode property.

Otherwise:

5) Go to 6).

6) Get refetenceTitle.audioTracks[track]languageCodeExtension.

If returned value is not NAN:

7) Assign the returned value to the selectedAudioLanguageCodeExtension property.

Otherwise:

7) Go to 8).

8) Set the currentAudioTrack property. For selection algorithm, refer to 4.3.19.4.2 The rule of selection of Audio and Subtitle in Advanced Contents.

9) Check whether this object is member of the Player object.

<selectSubtitleTrackNumber> selectSubtitleTrackNumber

The selectSubtitleTrackNumber function is-used to specify the track number of Subtitle, and change presentation.

Parameters:

track of type unsigned int

Specifies the track number of Subtitle.

Valid Range: 1-99

Return Value: None

Exceptions:

HDDVD_E_ARGUMENT

Detail behavior is same as selectAudioTrackNumber function except that this function control Subtitle track instead of Audio track.

FIG. 112 shows the function contents of "selectAudioTrackNumber" and "selectSubtitleTrackNumber" as API commands. The "selectAudioTrackNumber" is an API command that designates the track number of an audio track, and the "selectSubtitleTrackNumber" means an API command which specifies a subtitle track number to change the presentation state. These API commands are normally used as those which are issued from the navigation manager NVMNG in the advanced content playback unit ADVPL shown in FIG. 14 to the presentation engine PRSEN. However, the invention is not limited to this. For example, a name corresponding to an event may be generated in the event element EVNTEL (see FIG. 91C) in the markup MRKUP, as shown in FIG. 14, and an event listener detects the name corresponding to that event in the script SCRPT shown in FIG. 14, thus activating the "selectAudioTrackNumber" or "selectSubtitleTrackNumber" function. Alternatively, in this embodiment, the API command may be generated in the navigation manager NVMNG in response to a user interface event UIEVT issued by the user interface engine UIENG based on a user operation UOPE, as shown in FIG. 28. Upon starting the API command processing of the "selectAudioTrackNumber" or "selectSubtitleTrackNumber" in ST112-1*b*, it is checked if the designated track number falls within the valid track number range on an audio track or subtitle track (ST112-2*b*). If the designated track number falls outside the valid track number range, an error message is output (ST112-4*b*), and the API processing ends (ST112-12*b*). If it is determined in ST112-2*b* that the designated track number falls within the valid track number range on the audio track or subtitle track, the designated track number is set as the audio track or subtitle track to be selected for playback in the playlist manager PLMNG in ST112-3*b*. It is checked in ST112-5*b* with reference to title information if the language code information of the corresponding audio track or subtitle track matches "selectedAudioLanguage" or "selectedSubtitleLanguage" (ST112-5*b*). If the language code information of the corresponding audio track or subtitle track does not match, the language code information of the audio track or subtitle track is set in "selectedAudioLanguage" or "selectedSubtitleLanguage" (see FIG. 48) in ST112-6*b*. As shown in FIG. 14, the navigation manager NVMNG in the advanced content playback unit ADVPL includes a temporary saving memory, which temporarily stores various parameters. These parameters include presentation parameters as those which correspond to playback presentation, and the presentation parameters with the contents shown in FIG. 48 are stored. The "selectedAudioLanguage" parameter and "selectedSubtitleLanguage" parameter shown in FIG. 48 are mainly used by the playlist manager PLMNG. As the presentation parameter value, the corresponding presentation parameter value is set in ST112-6*b*. If the language code information to be referred to of the audio track or subtitle track matches "selectedAudioLanguage" or "selectedSubtitleLanguage", the process advances to ST112-7*b*. That is, the playlist manager PLMNG in the navigation manager NVMNG refers to title information in the playlist PLLST if the language code information of the audio track or subtitle track matches "selectedAudioLanguageExtension" or "selectedSubtitleLanguageExtension" (see FIG. 48) as an extension field of the language of the corresponding audio track or subtitle track. If the language code information does not match, the language code information of the audio track or subtitle track is set in "selectedAudioLanguageExtension" or "selectedSubtitleLanguageExtension" (see FIG. 48) (ST112-8*b*). On the other hand, if the language code information matches, the current audio track property or subtitle track property is set to be the designated value in ST112-9*b*. It is checked in ST112-10*b* if a playback presentation object can be played back by the advanced content playback unit ADVPL. If the object cannot be played back, the process advances to the API command end processing (ST112-12*b*); otherwise, the audio or subtitle to be played back is changed to the designated track number (ST112-11*b*). After the track number is changed, the "selectAudioTrackNumber" or "selectSubtitleTrackNumber" function ends (ST112-12*b*).

FIG. 113 shows the function contents of "selectAudioLanguage" or "selectSubtitleLanguage" as an API command. The API command "selectAudioLanguage" specifies the language code of a main audio, and changes a main audio track. Also, the API command "selectSubtitleLanguage" specifies the language code of a subtitle and changes a subtitle track.

<selectAudioLanguage> selectAudioLanguage

The selectAudioLanguage is used to specify the Language Code for Main Audio, and change Main Audio track.

Parameters:

languageCode of type String

Specifies the preferable Language Code for Main Audio.

languageExtension of type unsigned int

Specifies the preferable Language Code extension for the Main Audio.

Valid Range: 00h-FFh

Return Value: None

Exceptions:

HDDVD_E_ARGUMENT

Detailed processing is as follows:

1) Check whether the assigned arguments language and Ianguage Extenrion are valid.

If both they are valid:

2) Go to step 3).

Otherwise:

2) Stop this sequence and throw HDDVD_E_ARGUMENT.

3) Assign the argument languageCode to the selectedAudioLanguage property.

4) Assign the argument languageExtension to the selectedAudioLanguageExtension property.

5) Set the currentAudioTrack property. The rule of selection of Audio and Subtitle in Advanced Contents.

6) Check whether this object is member of the Player object.

If this object is member of the Player object:

7) Change Audio presentation with selected track number and return.

Otherwise

7) Return.

<selectSubtitleLanguage> selectSubtitleLanguage

The selectSubtitleLanguage function is used to specify the Language Code of Subtitle, and change Subtitle track.

Parameters:

languageCode of type String

Specifies the preferable Language Code for Subtitle. languageCodeExtension of type unsigned int Specifies the preferable Language Code extension for Subtitle.

Valid Range: 00h-FFh

Return Value: None

Exceptions:

HDDVD_E_ARGUMENT

Detail behavior is same as selectAudioLanguage function except that this function controls Subtitle track instead of Audio track.

Upon starting the processing of the "selectAudioLanguage" or "selectSubtitleLanguage" function as the API command (ST113-1*c*), it is checked in ST113-2*c* if the designated language information and extension field are valid. If the designated language information and extension field are invalid, an error message is output (ST113-4*c*), and the processing of the function ends (ST113-9*c*). If the designated language information and extension field are valid, the designated language code is set in "selectedAudioLanguage" or "selectedSubtitleLanguage" as the presentation parameter used by the playlist manager PLMNG shown in FIG. 48 in ST113-3*c*. Next, in ST113-5*c*, information of the designated language extension field is set in "selectedAudioLanguageExtension" or "selectedSubtitleLanguageExtension" as the presentation parameter shown in FIG. 48. In ST113-6*c*, the current audio track property or subtitle track property is set according to the designated value. After that, it is checked in ST113-7*c* if a target playback presentation object can be played back by the advanced content playback unit ADVPL. If the object cannot be played back, the process advances to the function end processing. On the other hand, if the object can be played back, the audio or subtitle which is to undergo playback presentation is changed to the designated track (ST113-8*c*), and the process then advances to the end processing (ST113-9*c*) of the corresponding function.

FIG. 114 shows the contents of the "save" function as one type of API commands. As shown in FIG. 14, the advanced content playback unit ADVPL includes the navigation manager NVMNG. The navigation manager NVMNG includes a temporary saving memory area. A field that describes information corresponding to a bookmark (to be described later) is assured in the temporary saving memory area, and the processing for saving parameters used in playback presentation as the bookmark corresponds to the "save" function shown in FIG. 114. That is, the "save" function as the API command has a function of saving the current playback position and the current playback state. The "save" function is basically used as an API command issued inside the navigation manager NVMNG in many cases. There are two main situations in which the "save" function is used.

1. When the user instructs to record in a bookmark based on a user operation UOPE, an event designated by the user in the user interface engine UIENG is detected, and is issued as a user interface event UIEVT, as shown in FIG. 28. Based on this event, processing is executed in the playlist manager PLMNG.

2. The "save" function is used when the API command is periodically issued in the navigation manager NVMNG, and internal processing is executed. That is, the processing of the advanced content playback unit ADVPL is often interrupted during playback of the advanced content ADVCT by user processing or some accident. In this case, the latest playback location is periodically updated in the temporary saving memory area in the navigation manager NVMNG during playback of the advanced content ADVCT, so that when the processing of the advanced content playback unit ADVPL is restarted, playback of the advanced content ADVCT can be restarted from the interrupted position.

The invention is not limited to the above embodiment. As another application example, the ECMA script processor ECMASP in the advanced application manager ADAMNG shown in FIG. 44 may execute, as a main body, processing based on the following sequence:

1. an event is generated (the event is input to the navigation manager NVMNG);

2. the ECMA script processor ECMASP searches the advanced application manager ADAMNG and file cache FLCCH for a script SCRPT that describes the processing method (function contents) corresponding to the event;

3. the ECMA script processor ECMASP controls to perform activation processing of (a series of) functions in the advanced content playback unit ADVPL in accordance with the contents of the extracted script SCRPT; and 4. the activation processing contents controlled by the ECMA script processor ECMASP follow the flowchart contents for the functions to be described below.

<Save>

The save function saves the current presentation position and selected track information.

Parameters: None

Return Value: None

Exceptions: None

Detailed processing is as follows:

1) Hold Title Timeline.

2) Copy presentation parameters to Bookmark object.

Copy the track property of the Player object to the track property

Copy the currentTitle property of the Playlist object to the title property

Copy Player.playlist.currentTitle.elapsedTime to the elapsedTime property

3) Restart Title Timeline.

In the advanced content playback unit ADVPL of this embodiment, the "save" function is mainly used in process 2. The practical contents of the "save" function will be described below. Upon starting the API command processing (ST114-1*a*), the time progress of a title timeline TMLE is paused (ST114-2*a*). Next, parameters used in playback presentation are copied to a bookmark in ST114-3*a*. At this time, the contents to be copied to the bookmark are as follows.

The track property (various kinds of track number information) played back by the advanced content playback unit ADVPL is copied as track attribute information.

The title property (title number) which is being currently played back in the playlist PLLST is recorded as a title property.

The playlist PLLST includes title information TTINFO, as shown in FIG. 62B. When one playlist PLLST includes a plurality of titles, title element information TTELEM for each title is described in the title information TTINFO. The description order of a plurality of pieces of title element information TTELEM described in the title information TTINFO corresponds to the title number.

The progress time information on the title timeline TMLE in the title which is being played back is recorded as a time property.

Upon completion of copying of various kinds of information to the bookmark in ST114-3*a*, the time process of the title timeline TMLE is restarted in ST114-4*a*, and the processing of the "save" function ends (ST114-5*a*). FIG. 115 is a flowchart of the "jump" function as an API command. The "jump" function executes processing for interrupting the current playback, and restarting playback from the recorded (designated) position, and also processing for changing the state of the bookmark (latest playback position information which is kept periodically updated on a memory). As described in process 2 as the use method of the "save" function, the latest playback position information is periodically and repetitively updated on the memory as a bookmark in this embodiment. In the "jump" function shown in FIG. 115, the update processing of the latest playback position information as a bookmark is executed in step ST115-3*b*. The "jump" function is mainly used in the following cases.

1. The user interface engine UIENG in the navigation manager NVMNG shown in FIG. 28 generates a corresponding user interface event UIEVT in response to a user operation UOPE, and the "jump" function is generated in the navigation manager NVMNG based on that event.

2. The "jump" function is generated in the navigation manager NVMNG to execute internal processing.

3. An event as a trigger to generate the "jump" function is generated in the event element EVNTEL (see FIG. 91C) in the markup MRKUP shown in FIG. 14, and the "jump" function is defined and executed in the script SCRPT after the event listener in the script SCRPT shown in FIG. 14 detects the event as the trigger.

<jump>

The jump function stops the current presentation, initiates playback from the recorded position, and change status to bookmarked one. A bookmark is set when the following Script APIs are called.

Parameters: None

Return Value: None

Exceptions:

HDDVD_E_INVALIDCALL

Detailed processing is as follows:

1) Check the capturing property of the MainVideo object, the changing property of the MainVideo object and the changing property of the SubVideo object.

If all properties are "false":

2) Go to step 3).

Otherwise:

2) Throw HDDVD_E_INVALIDCALL and return immediately.

3) Copy presentation parameters from Bookmarked object.

Copy the track property to the track property of the Player object.

4) Call title. Jump (elapsedTime, false);

When exception is thrown from this function call, Player shall not catch it and shall throw it to caller.

The contents of the "jump" function will be described below. Upon starting the API command processing in ST115-1*b*, it is checked if the capturing property of a main video MANVD and sub video SUBVD is other than "capturing" and the changing property is other than "changing" (ST115-2*b*). If the capturing property is "capturing" or the changing property is "changing", an error message is output in ST115-4*b*, and the processing of the "jump" function ends (ST115-6*b*). In this embodiment, if the capturing property is "capturing" or the changing property is "changing", activation of the "jump" function is inhibited. If the capturing property of the main video MANVD and sub video SUBVD is other than "capturing" and the changing property is other than "changing", copy processing of playback presentation parameters from the bookmark is executed in ST115-3*b*. More specifically, the track property indicating the track numbers and the like is copied to that in the advanced content playback unit ADVPL. Next, "jumpInTitle" shown in FIG. 121 is called (ST115-5*b*), and upon completion of the "jumpInTitle" processing, the API command processing ends (ST115-6*b*).

FIG. 116 is a flowchart showing the contents of the "load" function as an API command. The "load" function is used when the playlist is changed to reset the player. The update processing of the playlist file PLLST of the playlist has already been described using FIG. 51. During the processing in FIG. 51, the "load" function as the API command is used. The "load" function is mainly issued inside the navigation manager NVMNG shown in FIG. 28. However, this embodiment is not limited to this. In a rare case, the API command may be issued by designation from the user. That is, when the user instructs to change the playlist by a user operation UOPE, this instruction is coped with inside the navigation manager NVMNG, the user interface engine UIENG issues a user request as the user interface event UIEVT, and the API command is generated in the navigation manager NVMNG in response to that request, as shown in FIG. 28. The invention is not limited to the embodiment. As another application example, the ECMA script processor ECMASP in the advanced application manager ADAMNG shown in FIG. 44 may execute, as a main body, processing based on the following sequence:

1. an event is generated (the event is input to the navigation manager NVMNG);

2. the ECMA script processor ECMASP searches the advanced application manager ADAMNG and file cache FLCCH for a script SCRPT that describes the processing method (function contents) corresponding to the event;

3. the ECMA script processor ECMASP controls to perform activation processing of (a series of) functions in the advanced content playback unit ADVPL in accordance with the contents of the extracted script SCRPT; and 4. the activation processing contents controlled by the ECMA script processor ECMASP follow the flowchart contents for the functions to be described below.

<Load>

The load function is used to change Playlist and reset Player.

Parameters:

uri of type String

Specifies the full URI including the file name of new Playlist file. This parameter shall follow URI rule. Referencing Return Value: None Exceptions:

HDDVD_E_FILENOTFOUND

HDDVD_E_ARGUMENT

Detailed processing is as follows:

1) Check whether the assigned argument uri is valid or not. "valid" means uri is right format.

If it is valid:

2) Go to step 3)

Otherwise:

2) Throw HDDVD_E_ARGUMENT and return immediately.

3) Check whether the file specified by uri exists.

If the file exists:

4) Go to step 5)

Otherwise:

4) Throw HDDVD_E_FILENOTFOUND and return immediately.

5) Soft Reset Player with the new Playlist file.

The flowchart of the "load" function will be described below using FIG. 116. Upon starting the API command processing (ST116-1*a*), it is checked in ST116-2*a* if the designated URI parameter has a correct format. If the designated URI parameter does not have a correct format, an error message is output in ST116-5*a*, and the end processing of the "load" function is then executed (ST116-6*a*). If it is determined in ST116-2*a* that the designated URI parameter has a correct format, it is checked in ST116-3*a* if a file designated by the URI actually exists. If there is no file at the location designated by the URI, an error message is output (ST116-5*a*), and the processing ends (ST116-6*a*). If the file designated by the URI actually exists, software in the advanced content playback unit ADV is reset by a new playlist file in ST116-4*a*. Upon completion of this processing, the "load" function end processing is executed. In step ST116-3*a* of checking if the file designated by the URI exists, the navigation manager NVMNG in the advanced content playback unit ADVPL shown in FIG. 14 controls the data access manager DAMNG to inquire of the advanced content playback unit as to the presence/absence of each file. As a result, if the file exists, the data access manager DAMNG sends back a return value indicating the presence of the file to the navigation manager NVMNG. After that, the navigation manager NVMNG controls the data access manager DAMNG to execute download processing of a new playlist file PLLST from the recording location where the new playlist file PLLST exists to the data cache DTCCH via the data access manager DAMNG. This transfer processing corresponds to the download processing of the playlist file PLLST in ST69 in FIG. 51. The software reset processing in the advanced content playback unit ADVPL in ST116-4*a* in FIG. 116 corresponds to occurrence of the software reset processing in ST72 in FIG. 51. FIG. 117 is a flowchart corresponding to the "playPlaylist" function as an API command. The procedure contents of the "playPlaylist" function as an API command shown in FIG. 117 will be described below.

<Play>

The play function is to forward playback at 1×-speed for the purpose of the return from trick play, such as Fast Forward, Fast Reverse, and so on.

Parameters: None

Return Value: None

Exceptions:

HDDVD_E_INVALIDCALL

Detailed processing is as follows:

1) Check the capturing property of the MainVideo object.

If the capturing property of the MainVideo object is "true":

2) Throw HDDVD_E_INVALIDCALL and return immediately.

Otherwise:

2) Go to step 3).

3) Assign the PLAYSTATE_PLAY property to the playState property.

4) Assign NaN to the playSpeed property.

5) Change time progress speed of Title Timeline to normal speed, and playback direction to forward.

In this embodiment, if the capturing property of the main video MANVD is in a "capturing" mode, playback of the playlist is inhibited. In this way, simultaneous occurrence of capturing and playback of the main video MANVD is presented, and stable processing in the advanced content playback unit ADVPL is guaranteed. More specifically, upon starting the API command processing in ST117-1*b*, it is checked in ST117-2*b* if the capturing property of the main video MANVD is "capturing". If the capturing property of the main video MANVD is in a "capturing" mode, an error message is output (ST117-4*a*), as described above, and the "playPlaylist" function ends immediately (ST117-7*b*). If the capturing property of the main video MANVD is not "capturing", "PLAYSTATE_PLAY" (representing that playback is underway) is set in a "playState" property (ST117-3*b*). After that, a playback speed is set in ST117-5*b*. That is, "NaN" representing the playback speed is set in a "playSpeed" property. At this time, a standard speed is set as the playback speed to be set in the "playSpeed" property. In ST117-6*b*, the time progress of the title timeline TMLE is set to be "standard playback", thus starting playback of the main video MANVD. Also, in ST117-6*b*, the time progress direction of the title timeline TMLE (playback direction of the main video MANVD) is set to be the forward direction (feed direction). After that, upon completion of playback of the playlist, the end processing is executed in ST117-7*b*. Next, FIG. 118 is a flowchart of the "pause" function of the API commands. The "pause" function is used to pause the current playback, and is an API command which is issued from the navigation manager NVMNG (the playlist manager PLMNG in it) in FIG. 28 to the presentation engine PRSEN. The trigger of the "pause" function issued from the navigation manager NVMNG to the presentation engine PRSEN is created by one of methods of:

1. responding to a user operation UOPE; and 2. setting this function in the markup MRKUP and script SCRPT, and generating it based on their contents.

In case of method 1, the user interface engine UIENG generates a pause request from the user as a user interface event UIEVT based on the user operation UOPE. As shown in FIG. 44, the programming engine PRGEN included in the advanced application manager ADAMNG in the navigation manager NVMNG generates the "pause" function in response to the user interface event UIEVT. In case of method 2, the event element EVNTEL (FIG. 91C) in the markup MRKUP shown in FIG. 14 generates an event corresponding to a pause request, and generation of the event is detected by the event listener in the script SCRPT shown in FIG. 14. After that, the "pause" function is launched, and playback pause processing is executed. The contents of the flowchart of the "pause" function shown in FIG. 118 will be described below.

<Pause>

The pause function suspends the current presentation (the progress of Title Timeline).

Parameters: None

Return Value: None

Exceptions:

HDDVD_E_INVALIDCALL

Detailed processing is as follows:

1) Check the changing property of the MainVideo object.

If it is "false":

2) Go to step 3).

Otherwise:

2) Throw HDDVD E INVALIDCALL and return immediately.

3) Check the changing property of the SubVideo object and Sub Video is synchronized to Title Timeline.

If it is "false", or Sub Video is not synchronized:

4) Go to step 5).

Otherwise:

4) Throw HDDVD_E_INVALIDCALL and return immediately.

5) Hold the progress of Title Timeline.

6) Assign the PLAYSTATE_PAUSE property to the playState property.

In this embodiment, the pause processing is inhibited:

1. when the contents of the main video MANVD are being changed; and 2. when the contents of the sub video SUBVD are being changed.

However, in this embodiment, when the contents of the sub video SUBVD are being changed, if the sub video SUBVD is not synchronized with the main video MANVD, the pause processing can be executed. Therefore, these determination processes are executed first. That is, upon starting the API command processing in ST118-1*c*, it is checked in ST118-2*c* if the changing property of the main video MANVD is not "changing". If the changing property of the main video MANVD is "changing", an error message is output in ST118-5*c*, and the "pause" function ends (ST118-7*c*). Next, if the main video MANVD is not being changed (i.e., if changing property of the main video MANVD is not "changing"), the status of the sub video SUBVD is checked in ST118-3*c*. That is, it is checked if the changing property of the sub video SUBVD is not "changing", or if the sub video SUBVD is not presented in synchronism with the title timeline TMLE (i.e., the main video MANVD). If the changing property of the sub video SUBVD is not "changing", or if the sub video SUBVD is not synchronously presented, the time progress of the title timeline TMLE is paused (ST118-4*c*). If the above condition is not satisfied, an error message is output in ST118-5*c*, and the processing of the "pause" function ends (ST118-7*c*), as described above. If the time progress of the title timeline TMLE is stopped in ST118-4*c*, "PLAYSTATE_PAUSE" that means a pause state is set in the "playState" property (ST118-6*c*), and the "pause" function then ends (ST118-7*c*).

FIG. 119 is a flowchart showing the contents of the "fastForward" function or "fastReverse" function as an API command used in this embodiment. FIG. 120 is a flowchart showing the contents of the "stepForward" function or "stepBackward" function used in an API command of this embodiment. The "fastForward" and "fastReverse" function shown in FIG. 119 represents a fastforward or fastreverse play mode of a video picture, and the "stepForward" or "stepBackward" shown in FIG. 120 represents a step play mode. These functions mean the contents changes in playback method of a moving image (video picture). The API commands shown in FIGS. 119 and 120 execute the following processes.

1. Issue API command toward presentation engine PRSEN

By using the API command from the navigation manager NVMNG to the presentation engine PRSEN, as shown in FIG. 14, the presentation processing method in the presentation engine PRSEN is changed.

2. Processing data transfer method of advanced content ADVCT toward presentation engine PRSEN When the presentation engine PRSEN performs special playback for the advanced content ADVCT, the data transfer method of the advanced content ADVCT data input to the presentation engine PRSEN need be changed accordingly. A location to which the API command is to be issued varies depending on the saving locations of the advanced content ADVCT, which are used immediately before playback of the advanced content ADVCT.

2.1 Control for information storage medium DISC or persistent storage PRSTR

When data is played back from the advanced content ADVCT saved in the information storage medium DISC or persistent storage PRSTR, and undergoes presentation processing by the presentation engine PRSEN, the API command is issued from the navigation manager NVMNG to the data access manager DAMNG. The data access manager DAMNG performs corresponding control for the information storage medium DISC or persistent storage PRSTR in response to the API command.

2.2 Control of data transfer from data cache DTCCH to presentation engine PRSEN

When advanced content ADVCT temporarily saved in the data cache DTCCH is transferred to the presentation engine PRSEN, and undergoes presentation processing in the presentation engine PRSEN, the API command is issued from the navigation manager NVMNG toward the data cache DTCCH. The data cache DTCCH appropriately transfers required advanced content ADVCT data toward the presentation engine PRSEN at the required timing in response to that API command.

The generation timing of the API command shown in FIG. 119 or 120 will be described below.

A) Issue API Command in Response to User Input

When the user wants to make a fastforward or fastreverse play, or step play during playback presentation of the advanced content ADVCT, he or she often issues a fastforward or fastreverse processing instruction, or step processing instruction using a remote controller or the like toward the information recording and playback apparatus 1 shown in FIG. 15. In such case, a user operation UOPE is generated toward the advanced content playback unit ADVPL, as shown in FIG. 14. In this case, a user interface event UIEVT is transferred into the advanced application manager ADAMNG in the navigation manager NVMNG via the user interface engine UIENG, as shown in FIG. 44. The advanced application manager ADAMNG issues the API command shown in FIG. 119 or 120 toward the presentation engine PRSEN or playlist manager PLMNG.

B) Systematic Processing in Advanced Content Playback Unit ADVPL

The navigation manager NVMNG issues the API command in FIG. 119 or 120 based on the contents defined in the playlist PLLST or a call by the API command as needed.

C) Issue API Command According to Contents Set in Advance in Markup MRKUP or Script SCRPT As shown in FIG. 14, in this embodiment, the advanced application ADAPL is premised on processing based on the markup MRKUP and script SCRPT. A specific event is defined in the event element EVNTEL in the markup MRKUP shown in FIG. 91C, and the event listener in the script SCRPT shown in FIG. 14 detects generation of the event. After that, the function shown in FIG. 119 or 120 is designated, thus executing the API command.

The "fastForward" function shown in FIG. 119 means a fastforward play mode, and the "fastReverse" function means a fastreverse play mode, as shown in FIGS. 106A to 110B. The "stepForward" function shown in FIG. 120 means processing for executing step playback in the forward direction, and the "stepBackward" function means processing for executing step playback in the backward direction, as shown in FIGS. 106A to 110B. The processing contents of the "fastForward" or "fastReverse" function will be described below using FIG. 119.

The invention is not limited to the above embodiment. As another application example, the ECMA script processor ECMASP in the advanced application manager ADAMNG shown in FIG. 44 may execute, as a main body, processing based on the following sequence:

1. an event is generated (the event is input to the navigation manager NVMNG);

2. the ECMA script processor ECMASP searches the advanced application manager ADAMNG and file cache FLCCH for a script SCRPT that describes the processing method (function contents) corresponding to the event;

3. the ECMA script processor ECMASP controls to perform activation processing of (a series of) functions in the advanced content playback unit ADVPL in accordance with the contents of the extracted script SCRPT; and 4. the activation processing contents controlled by the ECMA script processor ECMASP follow the flowchart contents for the functions to be described below.

<FastForward>

The fastForward function is to change the progress speed of Title Timeline to the specific speed, and the progress direction to forward. The speed is specified by index that is provided by fastForwardSpeed property.

Parameters:

speed of type unsigned int

Specifies the fast forward speed. Selectable values are specified by fastForwardSpeed property, and it shall be specified by index, not speed.

Return Value: None

Exceptions:

HDDVD_E_ARGUMENT

HDDVD_E_INVALIDCALL

Detailed processing is as follows:

1) Check the capturing property of the MainVideo object and the changing property of the MainVideo object.

If all properties are "false":

2) Go to step 3).

Otherwise:

2) Throw HDDVD_E_INVALIDCALL and return immediately.

3) Check the changing property of the SubVideo object and Sub Video is synchronized to Title Timeline.

If it is "false", or Sub Video is not synchronized:

4) Go to step 5).

Otherwise:

4) Throw HDDVD_E_INVALIDCALL and return immediately.

5) Check whether assigned argument speed within the valid range.

If it is valid:

6) Go to step 7).

Otherwise:

6) Throw HDDVD_E_ARGUMENT and return immediately.

7) Assign the PLAYSTATE_FAST_FWD property to the playState property.

8) Assign the argument speed to the playSpeed property.

9) Change the direction and the speed of Title Timeline as ForwardScan.

<fastReverse>

The fastReverse function is to change the progress speed of Title Timeline to the specific speed, and the progress direction to backward. The speed is specified by index that is provided by fastReverseSpeed property.

Parameters:

speed of type unsigned int

Specifies the fast reverse speed. Selectable values are specified by fastReverseSpeed property, and it shall be specified by index, not speed.

Return Value: None

Exceptions: HDDVD_E_ARGUMENT

HDDVD_E_INVALIDCALL

Detailed behavior is same as fastForward function except that this function changes the playback direction to backward.

In this embodiment, the processing of the "fastForward" or "fastReverse" function is inhibited during capturing of main video data or during changing of the main video playback method. Likewise, this function is inhibited from being used when the sub video SUBVD is presented in synchronism with the title timeline TMLE. For example, in case of the example shown in FIG. 16, when the main title 31 and independent window 32 for a commercial are parallelly presented and played back to the user, and the user designates a fastforward or fastreverse play mode to only the main title 31, if the independent window 32 for a commercial also undergoes fastforward or fastreverse playback, the user finds it disrupting. Therefore, under only the condition in which the sub video SUBVD is not synchronized with the main video MANVD, this embodiment can give convenience for the user to make special playback of a specific window by executing the fastforward or fastreverse playback or step playback. The aforementioned use condition is selected first. That is, upon starting the API command processing in ST119-1*a*, it is checked in ST119-2*a* if the capturing property of the main video MANVD is not "capturing" and the changing property of the main video MANVD is not "changing". If the main video MANVD is being captured or its playback property is being changed, an error message is output in ST119-7*a*, and the processing then ends (ST119-9*a*). If the main video MANVD is not being captured, and the playback property of the main video MANVD is not being changed, it is then confirmed in ST119-3*a* if the changing property of the sub video SUBVD is not "changing" and the sub video SUBVD is not presented in synchronism with the title timeline TMLE. If the conditions are not satisfied, an error message is similarly output in ST119-7*a*, thus ending the processing. If the changing property of the sub video SUBVD is not "changing" and the sub video SUBVD is not presented in synchronism with the title timeline TMLE, or the sub video SUBVD is not presented in synchronism with the main video MANVD, it is checked in ST119-4*a* as the next step if the designated playback speed falls with a valid range (ST119-4*a*). If the designated playback speed falls within the valid range, "PLAYSTATE_FAST_FWD" (during fastforward playback) is set in the "playState" property for the "fastForward" function in the API command in ST119-5*a*. In case of the "fastReverse" function in the API command of this embodiment, "PLAYSTATE_FAST_RVS" (during fastforward playback) is set in the "playState" property in ST119-5*a*. Next, the designated playback speed is set in the "playState" property (ST119-6*a*). Upon completion of the setting of the "playState" property, in case of the "fastForward" function, a normal playback direction is set as the progress direction of the title timeline TMLE, and the designated playback speed is designated as a playback speed, thus changing the playback processing (special playback). In case of the "fastReverse" function in the API command, the processing for changing the playback processing method (special playback) is executed while setting the reverse (rewind) direction as the progress direction of the title timeline TMLE and adjusting the designated playback speed to the progress speed in ST119-8*a*. Upon completion of a series of special playback processes described above, the API command processing ends in step ST119-9*a*.

The contents of the "stepForward" function or "stepBackward" function shown in FIG. 120 will be described below.

<StepForward>

The stepForward function is to display the next still picture by step forward. Only when Playlist Manager is in pause state, Application is able to call this function. This function shall not change title. This function is optional, Player may not support this function.

Parameters: None

Return Value: None

Exceptions:

HDDVD_E_INVALIDCALL

HDDVD_E_NOTSUPPORTED

Detailed processing is as follows:

1) Check whether Player supports a step forward function.

If Player supports this function:

2) Go to 3).

Otherwise:

2) Throw HDDVD_E_NOTSUPPORTED and return immediately.

3) Check the playState property.

If the playState property is the value of the PLAYSTATE PAUSE property:

4) Go to 5).

Otherwise:

4) Throw HDDVD_E_INVALIDCALL and return immediately.

5) Check the capturing property of the MainVideo object.

If it is "false":

6) Go to step 7).

Otherwise:

6) Throw HDDVD_E_INVALIDCALL and return immediately.

7) Check whether next still picture exists.

If next still picture exists:

8) Go to 9).

Otherwise (this means current picture is last one in the current title):

8) Throw HDDVD_E_INVALIDCALL and return immediately.

9) Display next still picture.

10) According to displayed picture, this behavior is same as jump function.

<stepBackward>

The stepBackward function is to display the previous still picture by step backward. This function is same as stepForward function except a direction. This function is optional, Player may not support this function.

Parameters: None

Return Value: None

Exceptions:

HDDVD_E_INVALIDCALL

HDDVD_E_NOTSUPPORTED

Detailed behavior is same as stepForward function except a direction.

In this embodiment, the "stepForward" function or "stepBackward" function can be executed only while the video playback is paused. In this embodiment, the "stepForward" function or "stepBackward" function cannot be executed during capturing of the main video MANVD. In this way, by inhibiting simultaneous parallel processing of capturing of the main video MANVD and the aforementioned step playback processing, the processing in the advanced content playback unit ADVPL is simplified. Upon starting the API command processing in ST120-1*b*, it is checked first in ST120-2*b* if the advanced content playback unit ADVPL supports the step playback in the forward or backward direction. The navigation manager NVMNG in the advanced content playback unit ADVPL shown in FIG. 14 recognizes the supported processing function contents of the advanced content playback unit ADVPL. In this way, the navigation manager NVMNG checks in ST120-2*b* if the step playback in the forward or backward direction is supported, and executes the relevant processing. More specifically, if the step playback mode is not supported, an error message is output in ST120-7*b*, and the API command processing ends (ST120-8*b*). If the advanced content playback unit ADVPL supports the step playback mode, a series of determination processes are made to see if the step playback processing can be executed. That is, it is checked in ST120-3*b* if the "playState" property is set to "PLAYSTATE_PAUSE" (playback is paused). If the "playState" property is not set, an error message is similarly output (ST120-7*b*), thus ending the processing. If the playback is paused, it is checked in ST120-4*b* if the capturing property of the main video MANVD is "capturing". If the capturing property of the main video MANVD is "capturing", since the step playback is inhibited, an error message is output (ST120-7*b*), thus ending the processing. If the main video MANVD is not being captured, it is checked in ST120-5*b* if the step playback is physically possible. For example, in case of the "stepForward" function, it is checked in ST120-5*b* if a window (frame) to be presented next exists with respect to the current window (frame). If the window (frame) to be played back next exists, the next window (frame) is played back and presented to the user in ST120-6*b*. On the other hand, in case of the "stepBackward" function, it is checked in ST120-5*b* if a window (frame) immediately before the currently presented window exists. If the immediately preceding window (frame) exists, the immediately preceding window (frame) is played back and presented to the user in ST120-6*b*. After the designated window (frame) is presented in ST120-6*b*, the API command processing ends in ST120-8*b*.

The "jumpInTitle" function of API commands used in this embodiment executes the change processing of the playback time on the title timeline TMLE in a single title, as shown in FIGS. 106A to 110B, and FIG. 121 shows the detailed flowchart contents. The "jumpOnChapter" function of API commands used in this embodiment has a function of starting playback from the designated time in a single chapter, as shown in FIGS. 106A to 110B, and FIG. 122 is a flowchart showing the detailed function contents. Furthermore, the "top" function of API commands has a function of starting playback from the top position in a chapter, as shown in FIGS. 106A to 110B, and FIG. 123 is a flowchart showing the detailed function contents. These functions are normally executed by user's designation during playback of the advanced content ADVCT. In this case, for example, when the user inputs a jump instruction in a title, a chapter change instruction, or a chapter head search processing instruction using the remote control controller RMCCTR, the remote control controller RMCCTR of the user interface engine UIENG operates, and issues a user interface event UIEVT to the advanced application manager ADAMNG in the navigation manager NVMNG, as shown in FIG. 28. Upon reception of the user interface event UIEVT, the advanced application manager ADAMNG searches the advanced application scripts ADAPLS initially, as shown in FIG. 44. If no corresponding script is found, the advanced application manager ADAMNG searches the default event handler scripts DEVHSP, and issues function calls (API commands) shown in FIGS. 21 to 23 to the presentation engine PRSEN or playlist manager PLMNG based on the search result. In case of the jump processing in the title timeline TMLE or the chapter head search processing shown in FIGS. 21 to 23, the contents of the advanced content ADVCT to be input to the presentation engine PRSEN are often largely changed. Therefore, in this case, command processing is generated from the navigation manager NVMNG toward the data access manager DAMNG or data cache DTCCH. For example, when the advanced content ADVCT is saved in the persistent storage PRSTR or information storage medium DISC, and is played back from there, the data access manager DAMNG acquires advanced content information of a jump destination from the persistent storage PRSTR or information storage medium DISC, and transfers the result to the presentation engine PRSEN. When the advanced content ADVCT is temporarily saved in advanced in the data cache DTCCH, and required data is transferred from the data cache DTCCH to the presentation engine PRSEN, data of the advanced content ADVCT corresponding to a jump destination is transferred from the data cache DTCCH to the presentation engine PRSEN in response to a command from the navigation manager NVMNG. The invention is not limited to the above embodiment. As another application example, the ECMA script processor ECMASP in the advanced application manager ADAMNG shown in FIG. 44 may execute, as a main body, processing based on the following sequence:

1. an event is generated (the event is input to the navigation manager NVMNG);

2. the ECMA script processor ECMASP searches the advanced application manager ADAMNG and file cache FLCCH for a script SCRPT that describes the processing method (function contents) corresponding to the event;

3. the ECMA script processor ECMASP controls to perform activation processing of (a series of) functions in the advanced content playback unit ADVPL in accordance with the contents of the extracted script SCRPT; and 4. the activation processing contents controlled by the ECMA script processor ECMASP follow the flowchart contents for the functions to be described below.

The contents of the "jumpInTitle" function will be described in detail below using FIG. 121.

<jump>

The jump function stops the current presentation, initiates playback from the recorded position, and change status to bookmarked one. A bookmark is set when the following Script APIs are called.

Parameters: None

Return Value: None

Exceptions:

HDDVD_E_INVALIDCALL

Detailed processing is as follows:

2) Check the capturing property of the MainVideo object, the changing property of the MainVideo object and the changing property of the SubVideo object.

If all properties are "false":

2) Go to step 3).

Otherwise:

2) Throw HDDVD_E_INVALIDCALL and return immediately.

3) Copy presentation parameters from Bookmarked object.

Copy the track property to the track property of the Player object.

4) Call title. Jump (elapsedTime, false);

When exception is thrown from this function call, Player shall not catch it and shall throw it to caller.

In this embodiment, the "jumpInTitle" function is inhibited from being executed under the four following conditions:

1. during capturing of the main video MANVD;

2. during changing of the playback contents of the main video MANVD;

3. during changing of the playback properties of the sub video SUBVD; and 4. when the sub video SUBVD is presented in synchronism with the title timeline TMLE.

By setting activation inhibition limitations of the "jumpInTitle" function, the processing in the advanced content playback unit ADVPL can be simplified, and the reliability of the playback property for the user can be greatly improved. Upon starting the API command processing in ST121-1*a*, the aforementioned inhibition conditions are checked. That is, it is checked in ST121-2*a* if the capturing property of the main video MANVD is other than "capturing", and its changing property is not "changing". If the capturing property is "capturing" or the changing property is "changing", an error message is output in ST121-6*a*, and the command processing ends (ST121-10*a*). It is checked in ST121-3*a* if the changing property of the sub video SUBVD is not "changing", and the sub video SUBVD is not presented in synchronism with the title timeline TMLE. If it is confirmed that the changing property of the sub video SUBVD is not "changing", and the sub video SUBVD is not presented in synchronism with the title timeline TMLE and the sub video element SUBVD is not synchronized with the main video MANVD, either, the process can advance to step ST121-4*a*. It is checked in step ST121-4*a* if the time of the designated jump destination has a valid format, and is included in the designated time range of the title timeline TMLE. If the time of the designated jump destination has a valid format and is included in the time range of the title timeline TMLE, the time progress of the title timeline TMLE is paused in ST121-5*a*. Next, the contents of a bookmark are checked. When playback is interrupted due to some sudden accident such as a power failure or power OFF operation by the user during playback of the advanced content ADVCT, the advanced content playback unit ADVPL periodically executes data recording and update processing of playback location information in a memory area included in the navigation manager NVMNG as a bookmark so as to restart playback from the playback interrupted location immediately after the sudden accident is repaired. With this processing, even after interruption of playback of the advanced content ADVCT due to such sudden accident, playback can be restarted from the playback interrupted location. In ST121-7*a*, the set bookmark parameters (the aforementioned latest playback position information appropriately updated in the memory included in the navigation manager NVMNG) are checked. If the information recorded in the bookmark is not the latest playback position information, the "save" function (see FIGS. 106A to 110B or FIG. 114) is called, and the current playback position and playback state are saved in the bookmark (ST121-8*a*). In this way, after the latest playback position and playback state are saved in the bookmark by the processes in ST121-7*a* and ST121-8*a*, playback presentation is started from the designated time in the title, and the advanced content playback unit ADVPL executes change processing of various kinds of property information in ST121-9*a*. After the playback presentation has started and various properties have been changed, the API command end processing is done in ST121-10*a*. The contents of the "jumpOnChapter" function in FIG. 122 will be described below.

<Jump>

The jump function initiates playback for the specified time on this chapter. This function behavior is same as jump function of Title object.

Parameters:

time of type String

Specifies the time to jump from the beginning of specified chapter. This argument shall be specified by Timecode.

bookmark of type Boolean

Specifies whether presentation information is bookmarked during an execution of this function. When this property is "true", Player shall save bookmark information.

Return Value: None

Exceptions:

HDDVD_E_ARGUMENT

HDDVD_E_INVALIDCALL

Detailed processing is same as jump function of Title object.

1) Acquire the title object to which this chapter is belonging.

2) Calculate elapredrime.

If elapsedTime is not able to calculate, because the time argument is wrong value:

3) Throw exception, HDDVD_E_ARGUMENT.

Otherwise:

3) Call title.jump (elapsedTime, bookmark).

Upon starting the API command processing in ST122-1*b*, the information of a title including a designated chapter (by the user) is acquired in ST122-2*b*. In ST122-3*b*, an elapsed time of the designated chapter in the title is calculated, and it is checked if the elapsed time is valid or invalid. The invalid elapsed time means a case in which a designated time includes an error or it is impossible to calculate the elapsed time. If it is determined in ST122-3*b* that the calculated elapsed time of the designated chapter is invalid, an error message is output in ST122-4*b*, and the API command processing ends (ST122-6*b*). By contrast, if it is determined in ST122-3*b* that the elapsed time is valid, the "jumpInTitle" function (see FIGS. 106A to 110B and FIG. 121) is called (ST122-5*b*), and the playback position is jumped to start playback. After the playback is started since the jump, the API command processing ends (ST122-6*b*). Next, the contents of the "top" function shown in FIG. 123 will be described below.

<top>

The top function restarts the presentation from top of the chapter. When the elapsedTime property is very small, Player changes chapter to the previous one. This decision is made by Player.

Parameters: None

Return Value: None

Exceptions: HDDVD_E_INVALIDCALL

Detailed processing is as follows:

1) Calculate chapter number for top from Playlist, Player-.playlist.currentChapter.number and Player.playlist.currentChapter.elapsedTime.

2) Call Player.currentTitle.chapters[chapter number for top].jump("00:00:00:00", false).

Upon starting the API command processing in ST123-1*c*, the time of the top position of the chapter number to be played back and presented is calculated based on the playlist PLLST information, the designated chapter number information, and the elapsed time on the title timeline TMLE in ST123-2*c*. As shown in FIG. 17, in this embodiment, title timelines TMLE are uniquely set for respective titles and are managed together in the playlist PLLST. As shown in FIG. 23A, in this embodiment, the playlist PLLST includes title information TTINFO. As shown in FIG. 23B, title element information TTELEM for each title is allocated in the title information TTINFO. The title element information TTELEM for each title includes object mapping information OBMAPI that represents the playback presentation timings of respective playback presentation objects on the title timeline TMLE, and playback sequence information PLSQI that represents information of the respective chapters, as shown in FIG. 24. In the playback sequence information PLSQI, chapter elements defined for respective chapters are allocated, as shown in FIG. 24D, and the chapter numbers are set according to the allocation order of chapter elements described in the playback sequence information PLSQI. As shown in FIG. 24D, "titleTimeBegin" in each chapter element describes time information CHSTTM of the top position of each chapter on the title timeline. Therefore, the "top" function shown in FIG. 123 is processed using the information shown in FIG. 24D. After the time of the top position of each chapter is calculated in ST123-2*c*, the "jumpInTitle" function (see FIGS. 106A to 110B and FIG. 121) is called in ST123-3*c* to start playback from the designated time position. After the playback from the designated time position has succeeded, the API command processing ends in ST123-4*c*.

FIG. 124 is a flowchart showing the contents of "getMediaAttribute" function of API commands. The "getMediaAttribute" function is used when media attribute information MDATRI of a corresponding track is to be acquired from the playlist PLLST. In the advanced content playback unit ADVPL of this embodiment shown in FIG. 14, the presentation engine PRSEN executes playback presentation processing of playback presentation objects using the media attribute values. Upon execution of this processing, the presentation engine PRSEN issues the API command "getMediaAttribute" to the navigation manager NVMNG so as to acquire required media attribute values. As shown in FIG. 28, the playlist manager PLMNG in the navigation manager NVMNG interprets the contents of the playlist PLLST to check the requested media attribute values, and returns them to the presentation engine PRSEN. The detailed contents of the "getMediaAttribute" function in FIG. 124 mean the processing procedure in the playlist manager PLMNG. As shown in FIG. 79, the playlist PLLST includes configuration information CONFGI, media attribute information MDATRI, and title information TTINFO. The media attribute information MDATRI means information recorded in the media attribute information MDATRI shown in FIG. 79A, includes an audio attribute item element AABITM corresponding to audio information, a video attribute item element VABITM corresponding to video information, a sub-picture attribute item element SPAITM corresponding to sub-picture information, as shown in FIG. 79B, and describes information shown in FIGS. 79C to 79E. The invention is not limited to the above embodiment. As another application example, the ECMA script processor ECMASP in the advanced application manager ADAMNG shown in FIG. 44 may execute, as a main body, processing based on the following sequence:

1. an event is generated (the event is input to the navigation manager NVMNG);

2. the ECMA script processor ECMASP searches the advanced application manager ADAMNG and file cache FLCCH for a script SCRPT that describes the processing method (function contents) corresponding to the event;

3. the ECMA script processor ECMASP controls to perform activation processing of (a series of) functions in the advanced content playback unit ADVPL in accordance with the contents of the extracted script SCRPT; and 4. the activation processing contents controlled by the ECMA script processor ECMASP follow the flowchart contents for the functions to be described below.

<GetMediaAttribute>

The getMediaAttribute function is used to get media attribute value of this track from Playlist.

Parameters:

time of type String

Specifies the time on Title Timeline.

name of type String

Specifies the name of media attribute.

Return Value:

value of type String

Indicates the value of the specified media attribute.

Exceptions:

HDDVD_E_INVALIDCALL

HDDVD_E_ARGUMENT

Detailed processing is as follows:

1) Check whether the assigned parameter time is within this title.

If the assigned parameter time is valid:

2) Go to step 3)

If the assigned parameter time is invalid:

2) Throw an exception, HDDVD_E_ARGUMENT.

3) Check whether this track has mediaAttr attribute.

If this track has it:

4) Go to step 5)

Otherwise:

4) Throw HDDVD_E_INVALIDCALL and return immediately.

5) Search the Media Attribute Information with corresponding value of mediaAttr.

If it is found:

6) Go to step 7)

Otherwise:

6) Throw an exception, HDDVD_E_INVALIDCALL.

7) Search the Media Attribute element with corresponding value of name.

If it is found:

8) Return this value.

Otherwise:

8) Throw an exception, HDDVD_E_ARGUMENT.

As shown in FIG. 124, upon starting the API command processing (ST124-1*a*), it is checked in ST124-2*a* if the designated time information falls within the setting range of the title timeline TMLE in a title. If the designated time information falls outside the range of the title timeline TMLE, an error message is output in ST124-7*a*, and the API command processing ends (ST124-8*a*). If the designated time information falls within the setting range of the title timeline TMLE in the title, it is checked in ST124-3*a* if a corresponding track has media attribute information MDATRI. In this state, whether the corresponding track is an audio, video, or sub-picture track is determined, and whether or not the media attribute information MDATRI described in FIG. 79C to 79E is described is determined accordingly. If the corresponding track has the media attribute information MDATRI, the media attribute information MDATRI is searched for corresponding values in ST124-4*a* (to search for corresponding values in FIGS. 79C to 79E) to see if values are found. Next, the attribute item element (see FIG. 79) including the corresponding value is searched in ST125-5*a* to see if the values are found. If the values are found in ST125-5*a*, the corresponding values are read from the corresponding attribute item element, and are returned to the presentation engine PRSEN as return values upon calling the "getMediaAttribute" function (ST124-6*a*). If each determination condition is not satisfied in checking steps ST124-2*a* to 124-5*a* in the procedure, a corresponding error message is output in ST124-7*a*. After the return values upon calling the "getMediaAttribute" function are returned in ST124-6*a*, the API command processing ends in ST124-8*a*. FIG. 125 is a flowchart showing the contents of the "setOuterFrameColor" function as an API command. The "setOuterFrameColor" function is an API command (function) used when the outer frame color of the main video MANVD is to be changed. The outer frame color of the main video MANVD is set in advance in the playlist PLLST. That is, as shown in FIG. 80A, the playlist PLLST includes the configuration information CONFGI, media attribute information MDATRI, and title information TTINFO. The configuration information CONFGI includes a main video default color element MVDFCL, as shown in FIG. 80B, and includes a field for setting outer frame color attribute information COLAT corresponding to the main video as color attribute information in the main video default color element MVDFCL, as shown in FIG. 80E. As shown in FIG. 28, the playlist manager PLMNG included in the navigation manager NVMNG in the advanced content playback unit ADVPL in this embodiment reads and automatically sets the outer frame color attribute information COLAT corresponding to the main video in the playlist PLLST. The automatically set outer frame color attribute information COLAT corresponding to the main video can be changed by a user operation UOPE. In this embodiment, the outer frame color attribute information COLAT may be changed by the markup MRKUP and script SCRPT in rare cases. A situation in which the outer frame color of the main video MANVD is to be changed using the "setOuterFrameColor" function will be explained below. As described above, the outer frame color is automatically set based on the playlist PLLST. When the user wants to change the outer frame color, he or she sets to change the outer frame color by a user operation UOPE using the remote controller, front panel, or the like. When the user's setting has been done using the remote control controller RMCCTR or front panel controller FRPCTR, or the keyboard controller KBDCTR or mouse controller MUSCTR in the user interface engine UIENG in the navigation manager NVMNG shown in FIG. 28, a user interface event UIEVT is generated. Upon generation of the user interface event UIEVT, the programming engine PRGEN in the advanced application manager ADAMNG in the navigation manager NVMNG interprets the advanced application script ADAPLS (if no API command is set in the script ADAPLS of the advanced application, it may refer to the default event handler script DEVHSP), and interprets the "setOuterFrameColor" function, as shown in FIG. 44, it issues an outer frame color change instruction to the presentation engine PRSEN based on that function. Therefore, the "setOuterFrameColor" function is normally generated and processed in the navigation manager NVMNG. As described above, as a rare case, as shown in FIG. 14, when the event element EVNTEL in the markup MRKUP shown in FIG. 91C defines an outer frame color change event, the event listener in the script SCRPT shown in FIG. 14 detects that event, and executes the "setOuterFrameColor" function in response to that detection. In this case, the "setOuterFrameColor" function is defined in the script SCRPT. The detailed procedure showing the contents of the "setOuterFrameColor" function will be explained below using FIG. 125.

<setOuterFrameColor>

The setOuterFrameColor function is used to change the Outer Frame Color for Main Video.

Parameters:

y of type unsigned int

Specifies the luminance signal of Outer Frame Color for Main Video Plane.

Valid Range: 16-235 cr of type unsigned int

Specifies the digitized version of the analogue component (R-Y) of Outer Frame Color for Main Video Plane.

Valid Range: 16-240 cb of type unsigned int

Specifies the digitized version of the analogue component (R-B) of Outer Frame Color for Main Video Plane.

Valid Range: 16-240

Return Value: None

Exceptions:

HDDVD_E_ARGUMENT

Detailed processing is as follows:

1) Check whether an assigned parameters are within valid range.

If all parameters are within valid range:

2) Go to step 3).

Otherwise:

2) Stop this sequence and throw HDDVD_E_ARGUMENT.

3) Change Outer Frame Color setting and Assign parameters to properties.

Assign parametery to the OuterFrameColorY property.

Assign parameter cr to the OuterFrameColorCr property.

Assign parameter cb to the OuterFrameColorCb property.

Upon starting the API command processing in ST125-1*b*, the processing begins with checking in ST125-2*b* if the designated parameters fall within the valid range. If the designated parameters fall outside the valid range, an error message is output in ST125-4*b*, and end processing is executed in ST125-5*b*. If the designated parameters fall within the valid range (ST125-2*b*), the outer frame color is changed, and the designated parameters are set in property information in ST125-3*b*. The outer frame color attribute information COLAT (color attribute information) for the main video in the main video default color element MVDFCL shown in FIG. 80E is expressed by Y, Cr, and Cb values. Therefore, the values to be set as the property information in ST125-3*b* are also set using the Y, Cr, and Cb values as parameters of the outer frame color. After the outer frame color has been changed, and the designated parameters are set in the property information (ST125-3*b*), the API command end processing is executed (ST125-5*b*).

FIG. 126 is a flowchart showing the contents of the "capture" function as an API command. FIG. 127 shows the detailed procedure in an "Image Capture sequence" used as a subroutine in the "capture" function. The "capture" function indicates processing for saving an image of the current main video MANVD in the file cache FLCCH. As shown in FIG. 25, in this embodiment, some data of a secondary video set SCDVS in the information storage medium DISC, some data of a secondary video set SCDVS saved in the network server NTSRV, and a secondary video set SCDVS saved in the persistent storage PRSTR are temporarily saved in the file cache FLCCH in the data cache DTCCH before they are played back and presented to the user, and they are sequentially read out from the file cache FLCCH to the secondary video player SCDVP and undergo playback presentation to the user. As shown in FIG. 10, a playback presentation object which belongs to a substitute audio video SBTAV includes a main video MANVD image in the secondary video set SCDVS saved in the file cache FLCCH. Therefore, the "capture" function means an API command used when the main video MANVD in the substitute audio video SBTAV (including the main audio MANAD in some cases) is captured in advance into the file cache FLCCH in the data cache DTCCH. Playback presentation timing control information associated with the substitute audio video SBTAV is described in a substitute audio video clip element SBAVCP, as shown in FIG. 54C. The capture timing of the main video MANVD of the substitute audio video SBTAV is described in a playback presentation object capture start time PRLOAD (preload attribute information) on the title timeline shown in FIG. 54C. Therefore, the playlist manager PLMNG included in the navigation manager NVMNG in the advanced content playback unit ADVPL in this embodiment shown in FIG. 28 reads information of the playback presentation object capture start time PRLOAD (preload attribute information) on the title timeline in the substitute audio video clip element SBAVCP in the playlist PLLST, and executes the "capture" function to be described later at the designated time. Therefore, the "capture" function as the API command is generated in the playlist manager PLMNG in the navigation manager NVMNG shown in FIG. 28. The invention is not limited to the above embodiment. As another application example, the ECMA script processor ECMASP in the advanced application manager ADAMNG shown in FIG. 44 may execute, as a main body, processing based on the following sequence:

1. an event is generated (the event is input to the navigation manager NVMNG);

2. the ECMA script processor ECMASP searches the advanced application manager ADAMNG and file cache FLCCH for a script SCRPT that describes the processing method (function contents) corresponding to the event;

3. the ECMA script processor ECMASP controls to perform activation processing of (a series of) functions in the advanced content playback unit ADVPL in accordance with the contents of the extracted script SCRPT; and 4. the activation processing contents controlled by the ECMA script processor ECMASP follow the flowchart contents for the functions to be described below.

The contents of the "capture" function shown in FIG. 126 will be described below.

<Capture>

The capture function is used to save current Main Video image to File Cache. This function shall be called only in pause state. When Main Video is scaled or clipped, the captured image shall be same as the scaled and clipped image.

Parameters:

uri of type String

Specifies uri of the file name to store the video image. The video image is able to be saved only in File Cache. This parameter shall be follow URI rule.

callback of type Function

Specifies the callback function for the state change. The function shall be the following interface:

void callback(status : int, uri : String);

Parameters:

status of type int:

Player.FINISHED: Capture succeeded

Player.INVALID_PARAMETER: The assigned parameter uri does not indicate File Cache Player.NOT_ENOUGH_SPACE: There is not enough space to create image capture file in File Cache.

Player.FAILED: Capture failed uri of type String:

This parameter indicates the file to store a captured image.

Return Value: None

Exceptions:

HDDVD_E_NOTENOUGHSPACE

HDDVD E INVALIDCALL

Detailed processing is as follows:

1) Check whether there is an enough space to store captured image in File Cache.

If there is an enough space:

2) Go to step 3).

Otherwise:

2) Stop this sequence and throw HDDVD_E NOTENOUGHSPACE.

3) Check whether Main Video is visible.

If Main Video is visible:

4) Go to step 5).

Otherwise:

4) Stop this sequence and throw HDDVD_E INVALIDCALL.

5) Check the playState property of the Playlist object.

If the value is same as the PLAYSTATE_PAUSE property of the Playlist object:

6) Go to step 7).

Otherwise:

6) Stop this sequence and throw HDDVD_E_INVALIDCALL.

7) Check the capturing property.

If it is "false":

8) Go to step 9).

Otherwise:

8) Stop this sequence and throw HDDVD_E_INVALIDCALL.

9) Assign "true" to the capturing property.

10) Start an Image Capture sequence.

11) Return immediately.

Image Capture sequence is as follows:

1) Check whether the parameter uri specify File Cache or the file specified by uri already exists.

If the file is able to be created:

2) Go to step 4).

Otherwise:

2) Call callback with parameter as:

callback (Player.INVALID_PARAMETER, un);

3) Go to step 6).

4) Save current image data to the file specified by URI.

If saving file has been achieved:

4) Call callback with parameter as:

callback (Player-FINISHED, un);

The "capture" function cannot execute capture processing during playback of the main video MANVD, but it can execute capture processing only while the main video MANVD is paused. At the same time, when another main video MANVD is captured, a plurality of main videos MANVD cannot be captured simultaneously. In this way, as a big characteristic feature, simultaneous playback and capturing of the main video MANVD is avoided, and simultaneous capturing of a plurality of main videos MANVD is avoided, thus simplifying the processing of the advanced content playback unit ADVPL, and improving the capturing precision of the main video MANVD. Capturing of the main video MANVD is valid only when presentation to the user is allowed, and is premised on that the file cache FLCCH includes a free area large enough to save the main video MANVD. As a result, the main video MANVD can be efficiently captured into the file cache FLCCH. In the "capture" function shown in FIG. 126, whether or not the aforementioned conditions are satisfied is checked first. That is, upon starting the API command processing in ST126-1a, it is confirmed in ST126-2a if the file cache FLCCH includes a free area large enough to save an image. As shown in FIG. 28, the navigation manager NVMNG in the advanced content playback unit ADVPL includes the file cache manager FLCMNG, which manages the file cache FLCCH. Therefore, when the playlist manager PLMNG reaches the capture start timing in correspondence with the preload attribute information described in the substitute audio video clip element SBAVCP in the playlist PLLST, the playlist manager PLMNG which read that information inquires the file cache manager FLCMNG about whether or not a sufficient free area exists. If no sufficient free area exists, an error message is output in ST126-7a, and the main video MANVD capturing processing ends (ST126-9a). If the file cache FLCCH includes a sufficient free area in ST126-2a, the playlist manager PLMNG interprets the contents of the playlist PLLST in ST126-3a to see if the main video MANVD can be presented to the user. If the main video MANVD can be presented to the user, the process advances to the next step. As described above, since the main video MANVD can be captured while it is paused, and capturing is valid only when no other main video MANVD is being captured, it is checked in ST126-4a if the "playState" property is "PLAYSTATE_PAUSE" (playback is paused), and in ST126-5a if the capturing property of the main video MANVD is not "capturing". If the aforementioned conditions are not satisfied, an error message is output in ST126-7a, and the capturing processing ends (ST126-9a).

If the aforementioned conditions are satisfied, it is declared that capturing of the main video MANVD is underway, and a practical capturing sequence is started. That is, in ST126-6a, as the method of setting "capturing", the capturing property is set to be "true". After that, the "Image Capture sequence" shown in FIG. 127 is started. Upon completion of the "Image Capture sequence", the processing ends in ST126-9a. In the "Image Capture sequence" shown in FIG. 127, the captured main video MANVD is saved as a file in the file cache FLCCH, and the secondary video player SCDVP (see FIG. 25) reads the main video MANVD to perform playback presentation of that main video MANVD by designating the file name. Also, it is always checked if the remaining capacity of the file cache FLCCH is insufficient, and if the remaining capacity becomes insufficient, processing for making a callback as needed is executed. That is, upon starting the "Image Capture sequence" in ST127-1b, it is confirmed in ST127-2b if the URI of a capturing destination file of the main video MANVD designates a file in the file cache FLCCH, and a file with the same name has not already been stored in the file cache FLCCH (capturing of the main video MANVD into the file cache FLCCH is incomplete). If the condition in ST127-3b is not satisfied, whether or not the capturing processing has failed due to an insufficient remaining capacity of the file cache FLCCH as a cause of a capturing failure is checked in ST127-4b. If capturing has failed due to that cause, "callback" of "insufficient remaining capacity" is called (ST127-6b). If capturing has failed due to a cause other than the insufficient remaining capacity, "callback" of "capturing failure" is called in ST127-7b. If it is determined in ST127-2b that the conditions are not satisfied, "callback" of "invalid designated parameters" is called in ST127-8b. If all the aforementioned conditions are satisfied, and the process passes ST127-3b to allow capturing, the playlist manager PLMNG shown in FIG. 28 controls the file cache manager FLCMNG, and also controls the data access manager DAMNG shown in FIG. 14 to execute data transfer processing of the required main video MANVD from an original saving location into the file cache FLCCH in the data cache DTCCH. Upon completion of the capturing processing, "callback" of "capturing end" is called in ST127-5b. After that, in order to declare that capturing is not underway, the contents of the capturing property are set to be "false" in ST127-9a, thus ending the "Image Capture sequence" (ST127-10b).

FIGS. 128 and 129 are flowcharts showing the contents of the "changeImageSize" function defined in API commands. The "changeImageSize" function executes reduction processing of an image file size captured in the file cache FLCCH. In this embodiment, as shown in FIG. 16, windows of the main video MANVD and sub video SUBVD of those which are presented to the user can be simultaneously presented, or only the main video MANVD can be presented on the full window (or the sub video SUBVD can be presented on the full window). For example, this embodiment allows the following use method. That is, the main video MANVD that represents the main title 31 is presented on the full window to be presented to the user first, the size of the main video MANVD is reduced at a given timing, as shown in FIG. 16, and the sub video SUBVD is presented in the neighborhood of the window to be presented to the user. As methods of presenting, on a window, the main video MANVD or sub video SUBVD to be originally presented on the full window while reducing the size, this embodiment can execute two different methods: a method of reducing and presenting video information (main video MANVD or sub video SUBVD) on a window without changing the original video information contents; and a method of reducing the window size by changing secondary enhanced video object data S-EVOB itself in the file cache FLCCH which temporarily captures and saves video information (sub video SUBVD or the like), and then presenting the reduced window to the user. As the method of changing the size on the window to be presented to the user without changing original video information (primary enhanced video object data P-EVOB or secondary enhanced video object data S-EVOB), "changeLayoutMainVideo" (to change the window size upon presenting the main video MANVD) and "changeLayoutSubVideo" (to change the window size upon presenting the sub video SUBVD) in API commands shown in FIGS. 106A to 110B are defined in this embodiment. As the method of reducing the image size of video information (secondary enhanced video object data S-EVOB) itself in the file cache FLCCH, "changeImageSize" in API commands shown in FIGS. 106A to 110B is available. An embodiment of the latter API command means the function contents shown in the flowcharts of FIGS. 128 and 129, and has a function of reducing the size of an image file captured in the file cache FLCCH. As the practical contents, as shown in FIG. 25, data of secondary video set SCDVS temporarily saved in the file cache FLCCH is read from the file cache FLCCH to generate a reduced image, and the reduced image is re-saved in the file cache FLCCH to have another file name. In the description given so far, as an object whose image size is to be reduced, the secondary enhanced video object data S-EVOB which forms the secondary video set SCDVS has been mainly explained. This embodiment is not limited to such specific data, and the "changeImageSize" function can be executed for the advanced application ADAPL and advanced subtitle ADSBT as images temporarily saved in the file cache FLCCH. As call timings of the "changeImageSize" function, there are three different conditions:

1. a user request;

2. a systemic reason in the advanced content playback unit ADVPL; or 3. to be called in response to processing which is designated in advance by the markup MRKUP and script SCRPT (see FIG. 14).

In case of condition 1, when the user makes a user operation UOPE, the user interface engine UIENG shown in FIG. 28 issues a user interface event UIEVT, and the programming engine PRGEN in the advanced application manager ADAMNG shown in FIG. 44 issues a call "changeImageSize" to the playlist manager PLMNG or file cache manager FLCMNG (see FIG. 28) in response to that event. As a systemic situation in condition 2, in most cases, the playlist manager PLMNG issues the "changeImageSize" function to the file cache manager FLCMNG. When the function call is pre-programmed by the markup MRKUP and script SCRPT in condition 3, the programming engine PRGEN in the advanced application manager ADAMNG receives information of the markup MRKUP and script SCRPT from the playlist manager PLMNG shown in FIG. 28, and issues an instruction of the "changeImageSize" function to the playlist manager PLMNG or file cache manager FLCMNG. In any of these cases, the file cache manager FLCMNG manages reduced image generation processing for an image file captured in the file cache FLCCH and saving processing of the reduced file in the file cache FLCCH. The invention is not limited to the above embodiment. As another application example, the ECMA script processor ECMASP in the advanced application manager ADAMNG shown in FIG. 44 may execute, as a main body, processing based on the following sequence:

1. an event is generated (the event is input to the navigation manager NVMNG);

2. the ECMA script processor ECMASP searches the advanced application manager ADAMNG and file cache FLCCH for a script SCRPT that describes the processing method (function contents) corresponding to the event;

3. the ECMA script processor ECMASP controls to perform activation processing of (a series of) functions in the advanced content playback unit ADVPL in accordance with the contents of the extracted script SCRPT; and 4. the activation processing contents controlled by the ECMA script processor ECMASP follow the flowchart contents for the functions to be described below.

<ChangeImageSize>

The changeImageSize function is used to scale down a size of an image captured file in File Cache. The scale down ratio is specified by two parameters, one is denominator and the other is numerator.

These two parameters shall meet the following conditions.

1<=numerator<=16

1<=denominator<=16 numerator<=denominator

Parameters:

srcUri of type String

Specifies uri of the scale down source file. The specified file format shall follow Capture Image Format and exist in File Cache.

dstUri of type String

Specifies uri of the scale down destination file. This uri shall indicate in File Cache. And when a file specified by this uri exists, this function shall throw exception.

numerator of type unsigned int denominator of type unsigned int

Specify the scaling size. It is determined by numerator/denominator.

callback of type Function

Specifies the callback function for the state change. The function shall be the following interface:

void callback(status : int, uri : String);

Parameters:

status of type int:

Player.SUCCEEDED: Scale down succeeded

Player.FILE_NOT_FOUND: Specified file is not found

Player.NOT_ENOUGH_SPACE: There is not enough space

Player.WRONG_FORMAT: The specified file is not CIF file.

uri of type String:

This parameter indicates the uri for destination file.

Return Value: None

Exceptions:

HDDVD_E_ARGUMENT

Detailed processing is as follows:

1) Check whether assigned parameters (numerator and denominator) meet conditions.

If they meet conditions:

2) Go to step 3).

Otherwise:

2) Stop this sequence and throw HDDVD_E_ARGUMENT.

3) Start an Scaling Down sequence.

4) Check whether assigned parameters srcUri and dstUri indicate different places.

If they indicates different:

5) Go to step 6).

Otherwise:

5) Stop this sequence and throw HDDVD_E_ARGUMENT.

6) Assign "true" to the changing property.

7) Start an Scaling Down sequence.

8) Return immediately.

Scaling Down sequence is as follows:

1) Check whether the parameter srcUri specify File Cache and the specified file exists.

If the file is able to be created:

2) Go to step 4).

Otherwise:

2) Call callback with parameter as:

callback (Player.FILE_NOT_FOUND, srcUriz);

3) Go to step 15).

4) Check whether the specified source file follows Capture Image Format.

If the file follows Capture Image Format:

5) Go to step 7).

Otherwise:

5) Call callback with parameter as:

callback (Player.WRONG_FORMAT, srcUri);

6) Go to step 15).

7) Check whether the assigned parameter dstUri does not specify File Cache.

If dstUri does not specify File Cache:

8) Go to step 10).

Otherwise:

Call callback with parameter as:

callback (Player.INVALID_PARAMETER, dstUri);

9) Go to step 15).

10) Check whether there is an enough space to create the scale downed file.

If dstUri does not specify File Cache:

11) Go to step 13).

Otherwise:

Call callback with parameter as:

callback (Player.NOT_ENOUGH_SPACE, dstUri);

12) Go to step 15).

13) Scale down the image stored in the file specified by the assigned parameter srcUri and save it to the file specified by the assigned parameter dstUri.

If saving file has been achieved:

14) Call callback with parameter as:

callback (Player.FINISHED, dstUri);

Otherwise:

14) Call callback with parameter as:

callback (Player.FAILED, dstUri);

15) Assign "false" to the changing property.

The contents of the "changeImageSize" function will be described below using FIG. 128. When image size reduction processing is executed, an original image file and an image file after reduction often have different file names (different URIs). Upon starting the API command processing in ST128-1*a*, it is checked in ST128-2*a* if the set parameters (denominator and numerator values which represent the reduction ratio) satisfy a condition that can be processed by the advanced content playback unit ADVPL. If the condition is not satisfied, an error message is output in ST128-6*a*, and end processing is executed (ST128-7*a*). If it is determined in ST128-2*a* that the set parameters satisfy the condition that can be processed by the advanced content playback unit ADVPL, it is checked in ST128-3*a* if the URI of the source file and that of a reduced file indicate different locations (file names). If the URI of the source file matches that of the reduced file, the source file is overwritten by the reduced file, and the contents of the source file may be erased. Therefore, the files before and after the reduction must have different file names (different URIs). If the URIs have the same value, an error message is output in ST128-6*a*. If it is determined in ST128-3*a* that the two files have different URI values, the contents of the changing property is set to be "true" in ST128-4*a* to indicate "changing". After the contents of the changing property are set, a "Scaling Down sequence" shown in FIG. 129 is started (ST128-5*a*). Upon completion of the "Scaling Down sequence", the API command processing ends (ST128-7*a*). FIG. 129 shows the contents of the "Scaling Down sequence" used in FIG. 128. Upon starting the "Scaling Down sequence" in ST129-1*b*, it is checked first in ST129-2*b* if the saving location of a source file is designated as the file cache FLCCH, and that file is stored in the file cache FLCCH. In this embodiment, since the reduction processing of the file size is executed in the file cache FLCCH, it is the prerequisite that the source file is stored in the file cache FLCCH, as described above. If the source file is not stored in the file cache FLCCH, "callback" of "unsearchable source file" is called (ST129-3*b*). If the source file is stored in the file cache FLCCH, it is determined in ST129-4*b* if the designated source file is compliant to a capture image format. If the source file is not compliant to the capture image format, "callback" of "format error" is called (ST129-5*b*). If it is determined in ST129-4*b* that the designated source file is compliant to the capture image format, it is checked again in ST129-6*b* if the URI indicating the saving destination of a reduced file does not match that of the source file in the file cache FLCCH at all. If the URI values perfectly match, "callback" of "invalid parameters" is called in ST129-7*b*. If it is confirmed in ST129-6*b* that the URI of the reduced file is different from that of the source file, it is checked in ST129-8*b* if the file cache FLCCH has a remaining capacity large enough to save the reduced file. If the file cache FLCCH does not have any sufficient remaining capacity, "callback" of "insufficient remaining capacity" is called in ST129-9*b*. If it is confirmed in ST129-8*b* that the file cache FLCCH has a sufficient free area, an image is read from the source file, a reduced window for the image is generated, and the generated reduced image is saved as a file in the file cache FLCCH. It is checked in ST129-10*b* if the window reduction processing is made from the source file, and the reduced file is normally saved in the file cache FLCCH in correspondence with the designated URI. If the reduction processing or saving processing has failed, "callback" of "saving failure" is called in ST129-11*b*. If the reduced window can be normally generated, and the generated reduced window can be saved in the file cache FLCCH, "callback" of "completion of window reduction processing" is called in ST129-12*b*. Upon completion of the window reduction processing of the image, the contents of the capturing property are set to be "false" to declare that "capturing" is not underway (ST129-13*b*), and the "Scaling Down sequence" ends (ST129-14*b*). The control then returns to the procedure of "changeImageSize" in FIG. 128.

As shown in FIG. 16, in this embodiment, the main video MANVD that represents the main title 31, the sub video SUBVD that represents the independent window 32, the advanced application ADAPL, and the like can be presented side by side on a single screen. FIG. 84 shows a description example of the layout information used upon laying out various kinds of video information on the screen, as shown in FIG. 16. As shown in FIG. 84C, the layout of respective windows is described in the video attribute item element VABITM described in the media attribute information MDATRI in the playlist PLLST, as shown in FIG. 79D. In order to change the layout of windows presented to the user, a layout change can be programmed in advance in the playlist PLLST by utilizing a reference method of the media attribute information MDATRI in the playlist PLLST, as shown in the example of FIG. 84. As described above, even when the layout of windows is set in advance based on the playlist PLLST, the user wants to change the layout of windows shown in, e.g., FIG. 16. For example, when the main video MANVD that represents the main title 31 and the sub video SUBVD that represents the independent window 32 are parallelly presented, as shown in FIG. 16, and when the user wants to focus on the main title 31, he or she wants to present the main video MANVD that represents the main title 31 on the full presentation screen in an enlarged scale. In this way, when a layout different from the window layout which is set in advance in the playlist PLLST is to be presented, the API command "changeLayoutMainVideo" shown in FIG. 130 can be utilized. As has been described above using FIGS. 128 and 129, the API command "changeLayoutMainVideo" has a function of changing only the window size upon presenting to the user without changing any primary enhanced video object data P-EVOB. In this embodiment, the "changeLayoutMainVideo" function can be utilized not only by user designation but also by the system processing in the advanced content playback unit ADVPL or the processing of the markup MRKUP and script SCRPT. However, in case of this embodiment, the window layout is changed based on a user's instruction in most cases, as described above. For example, a control method will be explained below taking as an example a case in which when the main video MANVD that represents the main title 31 and the sub video SUBVD that represents the independent window 32 are parallelly presented on a single screen, as shown in FIG. 16, the user wants to enlarge the window size of the main video MANVD that represents the main title 31 and to present it on the full presentation screen. As shown in FIG. 28, in this embodiment, the navigation manager NVMNG includes the user interface engine UIENG, and also includes control software modules of various input devices such as the remote control controller RMCCTR, mouse controller MUSCTR, and the like. For example, when the user operates to enlarge the window size of the main video MANVD using a mouse, remote controller, or the like, the mouse controller MUSCTR or remote control controller RMCCTR issues a user interface event UIEVT in response to the user's operation. Then, as shown in FIG. 44, the programming engine PRGEN included in the advanced application manager ADAMNG in the navigation manager NVMNG receives the user interface event UIEVT, and begins to search the contents of API commands corresponding to the event. Initially, the programming engine PRGEN searches the advanced application scripts ADAPLS for a corresponding API command. If such API command is not found, the programming engine PRGEN then searches the default event handler script DEVHSP for a corresponding handler script. With the above method, the programming engine PRGEN extracts the function of an API command to be issued in response to the user interface event UIEVT. As a result, the programming engine PRGEN transfers the obtained "changeLayoutMainVideo" function to the playlist manager PLMNG and presentation engine PRSEN. The presentation engine PRSEN incorporates the decoder engine DCDEN, as shown in FIG. 30, and the decoder engine DCDEN includes the scaler SCALER, as shown in FIG. 37. When the presentation engine PRSEN receives the API command of the "changeLayoutMainVideo" function, the scaler SCALER shown in FIG. 37 works to change the presentation window size of the main video MANVD. The invention is not limited to the above embodiment. As another application example, the ECMA script processor ECMASP in the advanced application manager ADAMNG shown in FIG. 44 may execute, as a main body, processing based on the following sequence:

1. an event is generated (the event is input to the navigation manager NVMNG);
2. the ECMA script processor ECMASP searches the advanced application manager ADAMNG and file cache FLCCH for a script SCRPT that describes the processing method (function contents) corresponding to the event;
3. the ECMA script processor ECMASP controls to perform activation processing of (a series of) functions in the advanced content playback unit ADVPL in accordance with the contents of the extracted script SCRPT; and
4. the activation processing contents controlled by the ECMA script processor ECMASP follow the flowchart contents for the functions to be described below.

FIG. 130 is a flowchart showing the contents of the "changeLayoutMainVideo" function executed by the navigation manager NVMNG.

<ChangeLayout>

The changeLayout function is used to change the layout of Main Video. When the state of Player is the play state, Application is able to call this function with the duration argument. When the state of Player is the pause state, Application is able to call this function, but in this case, the duration argument shall be "00:00:00:00", and this change is reflected after resuming from pause state. In other status, Player shall not call this function. The duration argument indicates that a main video frame changes over this time, and a starting time shall be decided by Player.

Parameters:

X of type int

Specifies the x value of the origin of Main Video in Canvas coordinate system. This property shall be even number.

Valid Range: −231 to 231-1 y of type int

Specifies the y value of the origin of Main Video in Canvas coordinate system. This property shall be even number.

Valid Range: −231 to 231-1

Scale of Type VideoScale

Specify the scaling size of Main Video. It is determined by numerator/denominator.

cropX of Type Unsigned int

Specify the x-coordinate value of cropping rectangle of Main Video in Main Video coordinate system. The value of this property shall be even number.

cropY of Type Unsigned int

Specify the x-coordinate value of cropping rectangle of Main Video in Main Video coordinate system. The value of this property shall be even number.

cropWidth of Type Unsigned int

Specify the width of cropping rectangle of Main Video in Main Video coordinate system. The value of this property shall be even number.

cropHeight of Type Unsigned int

Specify the height of cropping rectangle of Main Video in Main Video coordinate system. The value of this property shall be even number.

Duration of Type String

Specify the duration time for changing Main Video size.

Valid Range: "00:00:00:00"-"00:00:03:00"

Return Value: None

Exceptions:

HDDVD_E_INVALIDCALL

DDVD_E_ARGUMENT

Detailed processing is as follows:

1) Check the changing property.

If it is "false":

2) Go to step 3).

Otherwise:

2) Stop this sequence and throw HDDVD_E_INVALIDCALL.

3) Check the playState property of the Playlist object.

If the value is same as the PLAYSTATE_PLAY property of the Playlist object.

4) Whether Scheduled Pause does not occur during the changing scaling:

If it does not occur:

5) Go to step 6).

Otherwise:

5) Stop this sequence and throw HDDVD_E_INVALIDCALL.

If the value is same as the PLAYSTATE_PAUSE property of the Playlist object and the duration argument is "00:00:00:00":

4) Go to step 6).

Otherwise:

4) Stop this sequence and throw HDDVD_E_INVALIDCALL.

6) Check assigned parameters are within the valid range.

If all parameters are within valid range:

7) Go to step 8).

Otherwise:

7) Stop this sequence and throw HDDVD_E_ARGUMENT.

8) Assign "true" to the changing property.

9) Start Main Video Animated Scaling process.

10) Return immediately.

Main Video Animated Scaling process is as follows:

1) Change Main Video layout from current setting (position, crop and scale) to specified setting for specified duration. During changing, Player may change position, scale and crop properties.

2) After changing, change properties.

Assign the parameter x to the x property.

Assign the parameter y to the y property.

Assign the parameter scale to the scale property.

Assign the parameter cropX to the cropX property.

Assign the parameter cropY to the cropY property.

Assign the parameter cropWlidth to the cropWidth property.

Assign the parameter cropHeight to the cropHeight property.

3) Assign "false" to the changing property.

The "changeLayoutMainVideo" function is utilized only to change the layout of the main video MANVD. As the conditions for changing the layout of the main video MANVD, this embodiment has the following three conditions:

1. when the changing property of another video is not "changing";

2. when the playback state of the main video MANVD is "playing", and no setting is made in a pause at element PAUSEL in the scheduled control information SCHECI; and 3. when the playback state is "pausing", and the pause period is "0".

Upon starting the API command processing in ST130-1*a*, it is initially checked if the above three conditions are satisfied. If at least one of these conditions is not satisfied, an error message is issued in ST130-8*a*, and the API command end processing (ST130-10*a*) is executed. That is, it is checked in ST130-2*a* if the changing property is "false" to see if another video is not "changing". It is then checked in ST130-3*a* if the "playState" property is "playing". If the "playState" property is "playing", it is further checked in ST130-4*a* if a pause event designated by the pause at element PAUSEL in the scheduled control information SCHECI takes place. In this embodiment, the title information TTINFO in the playlist PLLST can describe the scheduled control information SCHECI, as shown in FIG. 75, and has a structure in which the time progress (count-up) of the title timeline can be paused at a time that matches the designated position (time) information TTTIME on the title timeline designated in the pause at element PAUSEL during playback of a specific title, as shown in FIG. 75E. When such pause event takes place during changing of the window size of the main video MANVD presented on the screen in accordance with a user's request, the processing in the advanced content playback unit ADVPL readily causes a trouble. Even if the advanced content playback unit ADVPL works normally, the user may find it disrupting (when the window is paused while changing the window size of the main video MANVD to be presented, the user may think that some trouble has occurred). Therefore, if a pause event occurs in ST130-4*a*, it is set to inhibit activation of the "changeLayoutMainVideo" function. If it is determined in ST130-3*a* that the "playState" property is not "playing", it is checked first in ST130-5*a* if the "playState" property is "pausing". If the "playState" property is "pausing", only when the pause period is "00:00:00:00", the layout of the main video MANVD is allowed to be changed. In this manner, when the user intentionally pauses playback, even if the window of the main video MANVD changes, he or she does not find it disrupting. However, when the pause period is set to have a specific time period in ST130-5*a*, since the time progress (count-up) of the title timeline TMLE restarts after an elapse of the designated time period, if the video picture begins to move at an instance when the user changes the size of the main video MANVD, he or she may think that a trouble has occurred. In this embodiment, by imposing the conditions of ST130-4*a* and ST130-5*a*, the user can be prevented from finding the presentation disrupting upon changing the presentation size of the main video MANVD, and the processing in the advanced content playback unit ADVPL can be simplified, thus improving the reliability of the processing. If all the aforementioned conditions are satisfied, it is checked in ST130-6*a* if the designated parameters fall within the valid range. If the designated parameters fall within the valid range, the contents of the changing property are set to be "true" in ST130-7*a* to clearly specify "changing". With this setting, the size change processing of another video (e.g., sub video SUBVD) is inhibited from being simultaneously executed. In this embodiment, by executing the processing in ST130-7*a*, the size change processing of a plurality of different video pictures and simultaneous processing of a plurality of different API commands are prevented, thus simplifying the processing in the advanced content playback unit ADVPL and improving the reliability. After "changing" is clearly specified in ST130-7*a*, "Main Video Animated Scaling" shown in FIG. 131 starts (ST130-9*a*). Upon completion of the processing of the "Main Video Animated Scaling", the API command processing ends in ST130-10*a*. FIG. 131 is a flowchart showing the contents of the "Main Video Animated Scaling". Upon starting the "Main Video Animated Scaling" in ST131-1*b*, the change processing of the layout of the main video MANVD is executed in ST131-2*b*. After the layout is changed, various kinds of property information are changed in ST131-3*b*. As the contents changed by the advanced content playback unit ADVPL in this embodiment, the presentation location and presentation position of the main video MANVD, and the presentation location and presentation size of the window after bordering (trimming) are changed. That is, the detailed contents of property information to be changed in ST131-3*b* are summarized as follows:

the X-coordinate value on the canvas coordinate system CNVCRD of the start point position of the window of the main video MANVD (see FIG. 40);

the Y-coordinate value on the canvas coordinate system CNVCRD of the start point position of the window of the main video MANVD (see FIG. 40);

the presentation window size of the main video MANVD;

the X-coordinate value on the canvas coordinate system CNVCRD of the start point position of the window after bordering (trimming) of the main video MANVD;

the Y-coordinate value on the canvas coordinate system CNVCRD of the start point position of the window after bordering (trimming) of the main video MANVD;

the width value of the window after bordering (trimming) of the main video MANVD; and the height value of the window after bordering (trimming) of the main video MANVD.

After the various kinds of property information are changed in ST131-3*b*, the changing property is set to be "false" in ST131-4*b* to indicate that "changing" is not underway. In this way, execution of another processing (e.g., the window size change processing of the sub video SUBVD or the like) is permitted. Upon completion of a series of steps of the "Main Video Animated Scaling", the processing ends in ST131-5*b*, and the control returns to the procedure of "changeLayoutMainVideo" shown in FIG. 130.

As shown in FIG. 16, in this embodiment, the main video MANVD that represents the main title 31, the sub video SUBVD that represents the independent window 32, and the advanced application ADAPL that represents various buttons, can be simultaneously presented on a single screen. The presentation locations and presentation sizes of respective windows shown in FIG. 16 are set in advance in the playlist PLLST, as shown in FIG. 84. That is, the playlist PLLST includes the media attribute information MDATRI, as shown in FIG. 79A, and the media attribute information MDATRI includes a video attribute item element VABITM, as shown in FIG. 79B. As shown in FIG. 79D, the video attribute item element VABITM designates the presentation size and presentation position of the designated video picture in the window. As shown in FIG. 84A, when the object mapping information OBMAPI and track number assignment information included in the title information TTINFO in the playlist PLLST refer to the video attribute item element VABITM, the window size and layout position on the window to be presented to the user for each sub video track can be designated. In FIG. 16, when the main video MANVD that represents the main title 31, and the sub video SUBVD that represents the independent window 32 for a commercial are simultaneously displayed, and a user's favorite commercial is presented, if the user wants to watch the commercial contents in more detail, he or she desires to present the sub video SUBVD that forms the independent window 32 for a commercial in an enlarged scale on the full screen, and to focus on the specific commercial. Therefore, upon changing the window size and presentation window position of the sub video SUBVD, which are set in advance in the playlist PLLST, using a user interface or the like, the user can use the API command function "changeLayoutSubVideo" shown in FIG. 132. As shown in FIG. 28, the navigation manager NVMNG in the advanced content playback unit ADVPL in this embodiment has the user interface engine UIENG, which includes the remote control controller RMCCTR and front panel controller FRPCTR, or the keyboard controller KBDCTR, mouse controller MUSCTR, and the like as standard components. When the user inputs to change the presentation window size and presentation position of the sub video SUBVD using the keyboard, mouse, or remote controller, a user operation UOPE is generated. The user interface engine UIENG transfers a user interface event UIEVT based on the user operation UOPE to the advanced application manager ADAMNG in the navigation manager NVMNG. Upon reception of the user interface event UIEVT, the programming engine PRGEN in the advanced application manager ADAMNG shown in FIG. 44 begins to search for API command contents to be issued in response to the user interface event UIEVT using the advanced application script ADAPLS. If the advanced application script ADAPLS does not include any API command contents to be issued in response to the user interface event UIEVT, the programming engine PRGEN searches the default handler script DEVHSP to finally extract the corresponding function in API commands. Based on the extraction result, the advanced application manager ADAMNG issues the API command function "changeLayoutSubVideo" toward the playlist manager PLMNG and presentation engine PRSEN. The processing contents of the "changeLayoutSubVideo" function in the API command shown in FIG. 132 are executed by the aforementioned playlist manager PLMNG or by collaboration of the playlist manager PLMNG and presentation manager PRSEN. As described above, the "changeLayoutSubVideo" function is issued based on the user operation UOPE in most cases. However, this embodiment is not limited to such case. For example, the above API command may be automatically issued by systematic processing in the advanced content playback unit ADVPL or the "changeLayoutSubVideo" function may be issued based on the contents programmed in advance by collaboration of the markup MRKUP and script SCRPT, as shown in FIG. 105. The invention is not limited to the above embodiment. As another application example, the ECMA script processor ECMASP in the advanced application manager ADAMNG shown in FIG. 44 may execute, as a main body, processing based on the following sequence:

1. an event is generated (the event is input to the navigation manager NVMNG);

2. the ECMA script processor ECMASP searches the advanced application manager ADAMNG and file cache FLCCH for a script SCRPT that describes the processing method (function contents) corresponding to the event;

3. the ECMA script processor ECMASP controls to perform activation processing of (a series of) functions in the advanced content playback unit ADVPL in accordance with the contents of the extracted script SCRPT; and 4. the activation processing contents controlled by the ECMA script processor ECMASP follow the flowchart contents for the functions to be described below.

The flowchart showing the contents of the "changeLayoutSubVideo" function as an API command will be described below using FIG. 132.

<ChangeLayout>

The changeLayout function is used to change the layout of Sub Video. When Sub Video is synchronized to Title Timeline, the calling restriction is same as the changeLayout function of MainVideo. When Sub Video is not synchronized to Title Timeline, Application is able to use this function even during trick play. However, in such case, Application is not able to control Secondary Video Player during the scaling.

Parameters:

X of type int

Specifies the x value of the origin of Sub Video in Canvas coordinate system. This property shall be even number.

Valid Range: −231 to 231-1 y of type int

Specifies the y value of the origin of Sub Video in Canvas coordinate system. This property shall be even number.

Valid Range: −231 to 231-1 scale of type VideoScale

Specify the scaling size of Sub Video. It is determined by numerator/denominator.

cropX of type unsigned int

Specify the x-coordinate value of cropping rectangle of Sub Video in Sub Video coordinate system. The value of this property shall be even number.

cropY of type unsigned int

Specify the x-coordinate value of cropping rectangle of Sub Video in Sub Video coordinate system. The value of this property shall be even number.

cropWidth of type unsigned int

Specify the width of cropping rectangle of Sub Video in Sub Video coordinate system. The value of this property shall be even number.

cropHeight of type unsigned int

Specify the height of cropping rectangle of Sub Video in Sub Video coordinate system. The value of this property shall be even number.

duration of type unsigned int

Specify the duration time for changing Sub Video size. This argument is represented by Timecode.

Valid Range: "00:00:00:00"-"00:00:03:00"

Return Value: None

Exceptions:

HDDVD_E_INVALIDCALL

HDDVD_E_ARGUMENT

Detailed processing is as follows:

1) Check the changing property of the SubVideo object.

If all parameters are "false":

2) Go to step 3).

Otherwise:

2) Stop this sequence and throw HDDVD_E_INVALIDCALL.

3) Check whether Sub Video is synchronized to Title Timeline.

If Sub Video is synchronized to Title Timeline:

4) Check the playState property of the Playlist object.

If the value is same as the PLAYSTATE_PLAY property of the Playlist object:

4) Whether Scheduled Pause does not occur during the changing scaling:

If it does not occur:

5) Go to step 7).

Otherwise:

5) Stop this sequence and throw HDDVD_E_INVALIDCALL.

6) Go to step 7).

If the value is same as the PLAYSTATE_PAUSE property of the Playlist object and the duration argument is "00:00:00:00":

5) Go to step 7).

Otherwise:

5) Stop this sequence and throw HDDVD_E_INVALIDCALL.

Otherwise:

4) Check the playState property of the SecondaryVideoPlayer object.

If the value is same as the PLAYSTATE_PLAY property of the SecondaryVideoPlayer object:

5) Go to step 7).

If the value is same as the PLAYSTATE_PAUSE property of the SecondaryVideoPlayer object and the duration argument is "00:00:00:00":

5) Go to step 7).

Otherwise:

5) Stop this sequence and throw HDDVD_E_INVALIDCALL.

7) Check assigned parameters are within the valid range.

If all arguments are within valid range:

8) Go to step 9).

Otherwise:

8) Stop this sequence and throw HDDVD_E_ARGUMENT.

9) Assign "true" to the changing property of the SubVideo object.

10) Start Sub Video Animated Scaling process.

11) Return immediately.

Sub Video Animated Scaling process is same as Main Video Animated Scaling process except that this process control the scaling of Sub Video instead of Main Video.

The "changeLayoutSubVideo" function is used to change the layout of the sub video SUBVD. When the sub video SUBVD whose layout is to be changed is synchronized with the title timeline TMLE, the limitation conditions used to check if the "changeLayoutSubVideo" function is to be executed are the same as those used upon activation of the function for changing the layout of the main video MANVD shown in FIG. 130. The checking contents of the limitation conditions correspond to steps ST132-4*a* to ST132-7*a* shown in FIG. 132. By contrast, when the sub video SUBVD whose layout is to be changed is not presented and played back in synchronism with the title timeline TMLE, the "changeLayoutSubVideo" function can be used only during a trick play mode. However, in this case as well, the secondary video player SCDVP (see FIG. 35) cannot be controlled during size changing of the sub video SUBVD. That is, as shown in FIG. 30, the presentation engine PRSEN includes the secondary video player SCDVP and decoder engine DCDEN. Also, the decoder engine DCDEN includes the scaler SCALER, as shown in FIG. 37, and the window size and layout position of the sub video SUBVD to be presented to the user are changed by changing only the processing of this scaler SCALER upon activation of the "changeLayoutSubVideo" function. Therefore, the "changeLayoutSubVideo" function need not perform any control for the secondary video player SCDVP. The "changeLayoutSubVideo" function cannot be executed during changing the window of the sub video SUBVD, and it must be confirmed that the presentation window of the sub video SUBVD is not being changed for some other reasons. Therefore, immediately after the API command processing starts in ST132-1*a*, it is checked in ST132-2*a* if the changing property of the sub video SUBVD is "false" (not "changing). If the presentation window of the sub video SUBVD is being changed, an error message is output in ST132-14*a*, and the API command processing ends (ST132-15*a*). Next, it is checked if the sub video SUBVD is presented in synchronism with the title timeline TMLE. If the sub video SUBVD is synchronously played back, the process advances to ST132-4*a*; otherwise, the process advances to ST132-8*a*. If the sub video SUBVD is presented in synchronism with the title timeline TMLE, the same processing as that for confirming the limitation conditions in the "changeLayoutMainVideo" function for the main video MANVD shown in FIG. 130 is executed, as described above. That is, the "playState" property in the playlist PLLST is checked to see if it indicates "playing" or "pausing". If the "playState" property indicates "playing" (ST132-4*a*), it is confirmed in ST132-5*a* if no pause event takes place during playback. On the other hand, if the "playState" property in the playlist PLLST indicates "pausing" (ST132-6*a*), it is checked in ST132-7*a* if the pause period is "00:00:00:00" to confirm the condition that presentation of the sub video SUBVD does not start during changing of the presentation window size and presentation position of the sub video SUBVD while the playback is paused. As has been described using FIG. 130, when the presentation window size or presentation position of the sub video SUBVD is changed while the time on the title timeline TMLE progresses at a normal speed, or the time progress is paused, the situation must remain unchanged. This is because when the time progress situation of the title timeline TMLE changes during changing of the window size or presentation window position of the sub video SUBVD, the user may think that some trouble has occurred, thus finding it disrupting. In this way, since the progress situation of the title timeline TMLE is fixed during changing of the layout of the sub video SUBVD, the user can be prevented from finding the presentation disrupting, and the processing of the advanced content playback unit ADVPL is simplified, thus assuring high reliability for the processing of the advanced content playback unit ADVPL. Next, if it is determined in ST132-3*a* that the sub video SUBVD is not presented in synchronism with the title timeline TMLE, it is checked in ST132-8*a* if the "playState" property of the secondary video player SCDVP is "playing". If the "playState" property is "playing", the layout change processing of the sub video SUBVD is executed. If the "playState" property is not "playing", but it is "pausing" (ST132-9*a*), only when the pause period is "00:00:00:00" (ST132-10*a*), the layout of the sub video SUBVD is allowed to be changed. Even when the sub video SUBVD is presented asynchronous with the title timeline TMLE, the playback mode (playing or pausing) of the sub video SUBVD must be basically prevented from being changed during layout changing of the sub video SUBVD. When the sub video SUBVD is presented asynchronous with the title timeline TMLE, it is not influenced by the control of the pause at element PAUSEL in ST132-5*a*. Hence, if the "playState" property of the secondary video player is "PLAYSTATE_PLAY" (playing) in ST132-8*a*, since the sub video SUBVD is never stopped during playback, the process can directly jump to ST132-11*a*. The contents in ST132-5*a* will be described below. As shown in FIG. 75, the scheduled control information SCHECI is defined in the title information TTINFO in the playlist PLLST, and the time progress (count-up) of the title timeline can be paused at a time that matches the designated position (time) information TTTIME on the title timeline designated in the pause at element PAUSEL during playback of a specific title, as shown in FIG. 75E. Since the pause at element PAUSEL controls the time progress of the title timeline TMLE, when the sub video SUBVD is played back and presented asynchronous with the title timeline TMLE, it is not influenced by information designated by the pause at element PAUSEL. When various determination conditions are checked in ST132-3*a* to ST132-10*a*, and some condition is not satisfied, an error message is output in ST132-14*a*, and the API command processing ends (ST132-15*a*). If the series of determination conditions are satisfied, it is checked in ST132-11*a* if the designated parameter values fall within the valid range. If the designated parameter values fall within the valid range, the changing property of the SUBVD is set to be "true" to indicate "changing" of the sub video SUBVD (ST132-12*a*). After that, "Sub Video Animated Scaling" in ST132-13*a* starts. Upon completion of the processing of the "Sub Video Animated Scaling", the API command processing ends in ST132-15*a*. FIG. 133 shows the processing contents of the "Sub Video Animated Scaling" in ST132-13*a*. The processing of the "Sub Video Animated Scaling" shown in FIG. 133 corresponds to that in which the playlist manager PLMNG (or the programming engine PRGEN in the advanced application manager ADAMNG in rare cases) controls the presentation engine PRSEN. Upon changing the layout of the sub video SUBVD, the scaler SCALER in the presentation engine PRSEN is controlled to change the layout of the sub video SUBVD to be presented to the user, as shown in FIG. 37. Upon starting the processing of the "Sub Video Animated Scaling" in ST133-1*b*, the layout of the sub video SUBVD is changed from the currently presented one to the designated conditions in ST133-2*b*. After that, various kinds of property information are changed in ST133-3*b*. Various kinds of property information in ST133-3*b* correspond to the content of ST131-3*b* in FIG. 131. More specifically, various kinds of property information correspond to the presentation position information and presentation size of the sub video SUBVD, and the presentation position and presentation size of the window after bordering. That is, various kinds of property information include:

- the X-coordinate value on the canvas coordinate system CNVCRD shown in FIG. 40 of the start point position of the window of the sub video SUBVD;
- the Y-coordinate value on the canvas coordinate system CNVCRD shown in FIG. 40 of the start point position of the window of the sub video SUBVD;
- the presentation size information of the sub video SUBVD;
- the X-coordinate value on the canvas coordinate system CNVCRD shown in FIG. 40 of the start point position of the window after bordering (trimming) of the sub video SUBVD;
- the Y-coordinate value on the canvas coordinate system CNVCRD shown in FIG. 40 of the start point position of the window after bordering (trimming) of the sub video SUBVD;
- the width information of the window after bordering (trimming) of the sub video SUBVD; and
- the height information of the window after bordering (trimming) of the sub video SUBVD.

Upon completion of changing of the layout and various kinds of property information of the sub video SUBVD, the changing property of the sub video SUBVD is set to be "false" in ST133-4*b* to indicate that the sub video SUBVD is not "changing". After that, the processing ends in ST135-5*b*, and the control returns to the "changeLayoutSubVideo" function in FIG. 132.

FIGS. 134 to 136 show API commands used to control audio information of those defined in this embodiment together. The "setVolume" function shown in FIG. 134 is used to change the audio volume value. The "setMixingSubAudio" function shown in FIG. 135 is used upon execution of downmix processing of sub audio channels. Furthermore, the "stopEffectAudio" function shown in FIG. 136 is used when playback presentation of an effect audio EFTAD is stopped. In these cases, a trigger upon issuance of a corresponding API command is often obtained under the following three conditions:

1. user's designation;
2. when the corresponding function is programmed in advance in the markup MRKUP and script SCRPT; or
3. a case based on a systematic trigger generated in the advanced content playback unit ADVPL.

In this embodiment, the contents of condition 1 of the above triggers have a highest frequency of occurrence. In case of an API command corresponding to the audio control, the user normally makes control using the remote controller. As shown in FIG. 28, the user interface engine UIENG in the navigation manager NVMNG of this embodiment incorporates the remote control controller RMCCTR. When the user tries to change an audio to be played back and presented to the user (when he or she controls the remote controller), a user operation UOPE is generated. Based on this operation, the user interface engine UIENG issues a corresponding user interface event UIEVT to the advanced application manager ADAMNG. Then, as shown in FIG. 44, the programming engine PRGEN in the advanced application manager ADAMNG extracts the function contents corresponding to that event from the advanced application script ADAPLS or default event handler script DEVHSP, and issues various API commands shown in FIGS. 134 to 136 to the presentation engine PRSEN and playlist manager PLMNG based on the extraction result. Upon issuance of the API commands shown in FIGS. 134 to 136, the playlist manager PLMNG and presentation engine PRSEN execute collaboration processing to execute these commands. Upon changing an audio to be finally played back and presented to the user, the "setVolume" function shown in FIG. 134 controls the audio decoder in the decoder engine DCDEN shown in FIG. 37. The "setMixingSubAudio" function shown in FIG. 135 applies processing control to the audio mixing engine ADMXEN shown in FIG. 38. The "stopEffectAudio" function shown in FIG. 136 controls the sound decoder SNDDEC in the advanced application presentation engine AAPEN shown in FIG. 42 to execute processing. The invention is not limited to the above embodiment. As another application example, the ECMA script processor ECMASP in the advanced application manager ADAMNG shown in FIG. 44 may execute, as a main body, processing based on the following sequence:

1. an event is generated (the event is input to the navigation manager NVMNG);
2. the ECMA script processor ECMASP searches the advanced application manager ADAMNG and file cache FLCCH for a script SCRPT that describes the processing method (function contents) corresponding to the event;
3. the ECMA script processor ECMASP controls to perform activation processing of (a series of) functions in the advanced content playback unit ADVPL in accordance with the contents of the extracted script SCRPT; and
4. the activation processing contents controlled by the ECMA script processor ECMASP follow the flowchart contents for the functions to be described below.

<SetVolumes>

The setVolumes function is used to change audio volume for each speaker.

Parameters:

1 of type unsigned int
Specifies the audio volume of Left output.
Valid Range: 0-255
r of type unsigned int
Specifies the audio volume of Right output.
Valid Range: 0-255
c of type unsigned int
Specifies the audio volume of Center output.
Valid Range: 0-255
Is of type unsigned int
Specifies the audio volume of Left Surround output.
Valid Range: 0-255
rs of type unsigned int
Specifies the audio volume of Right Surround output.
Valid Range: 0-255
lb of type unsigned int
Specifies the audio volume of Left Back output.
Valid Range: 0-255
rb of type unsigned int
Specifies the audio volume of Right Back output.
Valid Range: 0-255
Ife of type unsigned int
Specifies the audio volume of Sub Woofer output.
Valid Range: 0-255

Return Value: None

Exceptions:

HDDVD_E_ARGUMENT

Detailed processing is as follows:

1) Check whether all assigned arguments are less or equal than 255, and meets Total Volume Condition If they meet conditions:

2) Assign arguments to properties of Volume object for Main Audio.

Assign argument I to Player.audio.main. channels ['left']
Assign argument r to Player.audio.main.channels ['right']
Assign argument c to Player.audio.main.channels ['center']
Assign argument is to Player.audio.main.channels ['leftS']
Assign argument rs to Player.audio.main.channels ['rightS']
Assign argument lb to Player. audio.main.channels ['leftB']
Assign argument rb to Player.audio.main.channels ['rightB']
Assign argument lfe to Player.audio.main.channels ['lfe']

3) Change volume settings.

Otherwise:

2) Throw an exception, HDDVD_E_ARGUMENT

FIG. 134 is a flowchart showing the contents of the "setVolume" function of API commands. In this embodiment, the volume value of a tone volume to be output to each speaker is set to be a value ranging from 0 to 255. Therefore, a value smaller than 0 or a value exceeding 255 as a volume value to be set cannot be used to set a speaker volume value. Thus, immediately after the API command processing starts in ST134-1*a*, it is checked in ST134-2*a* if all the designated parameter values are equal to or smaller than 255. Furthermore, it is checked if all the designated parameter values meet overall volume conditions. If all the designated parameter values do not meet the overall volume conditions, an error message is output in ST134-4*a*, and the processing ends in ST134-6*a*. If all the designated parameter values meet the conditions in ST135-2*b*, the designated parameter values are as volume property values of the main video MANVD in ST134-3*a*. The parameter values in this embodiment include:

the volume setting value of a left speaker;
the volume setting value of a right speaker;
the volume setting value of a center speaker;
the volume setting value of a left surround speaker;
the volume setting value of a right surround speaker;
the volume setting value of a left rear speaker;
the volume setting value of a right rear speaker; and
the volume setting value of a woofer;

After the parameter values are set in ST134-3*a*, audio output values are changed in correspondence with the volume property values in ST134-5*a*. As described above, the processing in ST134-5*a* changes the values of the audio decoder shown in FIG. 37 or that in the decoder engine DCDEN shown in FIG. 42.

<SetMixing>

The setMixing function is used to mix Sub Audio channel down into audio output channel.

Parameters:

ltoL of type unsigned int

Specifies the mixing volume from Sub Audio Left channel down into Left output channel.

Valid Range: 0-255 ltoR of type unsigned int

Specifies the mixing volume from Sub Audio Left channel down into Right output channel.

Valid Range: 0-255 ltoC of type unsigned int

Specifies the mixing volume from Sub Audio Left channel down into Center output channel.

Valid Range: 0-255 ltoLs of type unsigned int

Specifies the mixing volume from Sub Audio Left channel down into Left Surround output channel.

Valid Range: 0-255 ltoRs of type unsigned int

Specifies the mixing volume from Sub Audio Left channel down into Right Surround output channel.

Valid Range: 0-255 ltoLb of type unsigned int

Specifies the mixing volume from Sub Audio Left channel down into Left Back output channel.

Valid Range: 0-255 ltoRb of type unsigned int

Specifies the mixing volume from Sub Audio Left channel down into audio output Right Back output channel.

Valid Range: 0-255 ltoLfe of type unsigned int

Specifies the mixing volume from Sub Audio Left channel down into Sub Woofer output channel.

Valid Range: 0-255 rtoL of type unsigned int

Specifies the mixing volume from Sub Audio Right channel down into Left output channel.

Valid Range: 0-255 rtoR of type unsigned int

Specifies the mixing volume from Sub Audio Right channel down into Right output channel.

Valid Range: 0-255 rtoC of type unsigned int

Specifies the mixing volume from Sub Audio Right channel down into Center output channel.

Valid Range: 0-255 rtoLs of type unsigned int

Specifies the mixing volume from Sub Audio Right channel down into Left Surround output channel.

Valid Range: 0-255 rtoRs of type unsigned int

Specifies the mixing volume from Sub Audio Right channel down into Right Surround output channel.

Valid Range: 0-255 rtoLb of type unsigned int

Specifies the mixing volume from Sub Audio Right channel down into Left Back output channel.

Valid Range: 0-255 rtoRb of type unsigned int

Specifies the mixing volume from Sub Audio Right channel down into Right Back output channel.

Valid Range: 0-255 rtoLfe of type unsigned int

Specifies the mixing volume from Sub Audio Right channel down into Sub Woofer output channel.

Valid Range: 0-255

Return Value: None

Exceptions:

HDDVD_E_ARGUMENT

Detailed processing is as follows:

1) Check whether all assigned arguments are less or equal than 255, and meets Total Volume Condition If they meet conditions:

2) Assign arguments to properties of Audio object for Sub Audio.

Assign argument ItoL to Player.audio.sub.channels [‘left’] .mix[‘left’]

Assign argument ltoR to Player.audio.sub.channels[‘left’] .mix[‘right’]

Assign argument ltoC to Player.audio.sub.channels [‘left’] .mix[‘center’]

Assign argument ltoLs to Player.audio.sub.channels [‘left’].mix[‘leftS’]

Assign argument ltoRs to Player.audio.sub.channels [‘left’].mix[‘rightS’]

Assign argument ltoLb to Player.audio.sub.channels [‘left’].mix[‘left’]

Assign argument ltoRb to Player.audio.sub.channels [‘left’].mix[‘rightR’]

Assign argument ltoLfe to Player.audio.sub.channels [‘left’].mix[‘lfe’]

Assign argument rtoL to Player.audio.sub.channels [‘right’].mix[‘left’]

Assign argument rtoR to Player.audio.sub.channels [‘right’].mix[‘right’]

Assign argument rtoC to Player.audio.sub.channels [‘right’].mix[‘center’]

Assign argument rtoL to Player.audio.sub.channels [‘right’].mix[‘leftS’]

Assign argument rtoRs to Player.audio.sub.channels [‘right’].mix[‘rightS’]

Assign argument rtoLb to Player.audio.sub.channels [‘right’].mix[‘leftB’]

Assign argument rtoRb to Player.audio.sub.channels [‘right’].mix[‘rightB’]

Assign argument rtoLfe to Player.audio.sub.channels [‘right’].mix[‘lfe’]

3) Change mixing down volume setting.

Otherwise

2) Throw an exception, HDDVD_E_ARGUMENT

FIG. 135 is a flowchart showing the contents of the "setMixingSubAudio" function of API commands. Since each speaker volume value is set to have a value ranging from 0 to 255, the volume value must be set to be equal to or smaller than 255 in FIG. 135. Hence, immediately after the API command processing starts in ST135-1*b*, it is checked if all the designated parameter values are equal to or smaller than 255. Furthermore, it is checked in ST135-2*b* if all the designated parameter values meet overall volume conditions. If the conditions are not satisfied, an error message is output in ST135-4*b*, and the process advances to processing end step ST135-6*b*. If all the designated parameter values are equal to or smaller than 255 and meet the overall volume conditions in ST135-2*b*, the designated parameter values are set as audio property values of the sub audio SUBAD. The audio property values at this time have the following contents:

the downmix value used when an audio to be originally presentation-output to the left speaker is downmixed and is presentation-output to the left speaker;

the downmix value used when an audio to be originally presentation-output to the center speaker is downmixed and is presentation-output to the left speaker;

the downmix value used when an audio to be originally presentation-output to the left surround speaker is downmixed and is presentation-output to the left speaker;

the downmix value used when an audio to be originally presentation-output to the right surround speaker is downmixed and is presentation-output to the left speaker;

the downmix value used when an audio to be originally presentation-output to the left rear speaker is downmixed and is presentation-output to the left speaker;

the downmix value used when an audio to be originally presentation-output to the right rear speaker is downmixed and is presentation-output to the left speaker;

the downmix value used when an audio to be originally presentation-output to the woofer is downmixed and is presentation-output to the left speaker;

the downmix value used when an audio to be originally presentation-output to the left speaker is downmixed and is presentation-output to the right speaker;

the downmix value used when an audio to be originally presentation-output to the right speaker is downmixed and is presentation-output to the right speaker;

the downmix value used when an audio to be originally presentation-output to the center speaker is downmixed and is presentation-output to the right speaker;

the downmix value used when an audio to be originally presentation-output to the left surround speaker is downmixed and is presentation-output to the right speaker;

the downmix value used when an audio to be originally presentation-output to the right surround speaker is downmixed and is presentation-output to the right speaker;

the downmix value used when an audio to be originally presentation-output to the left rear speaker is downmixed and is presentation-output to the right speaker;

the downmix value used when an audio to be originally presentation-output to the right rear speaker is downmixed and is presentation-output to the right speaker; and the downmix value used when an audio to be originally presentation-output to the woofer is downmixed and is presentation-output to the right speaker.

After the parameter values are set in ST135-3*b*, the downmix volume values are changed in correspondence with the audio property values in ST135-5*b*. The processing in ST135-5*b* controls the audio decoder in the decoder engine DCDEN shown in FIG. 37 or that in the decoder engine DCDEN shown in FIG. 42, or the sound mixer SNDMIX in the audio mixing engine ADMXEN in the AV renderer AVRND shown in FIG. 42. After the downmix volume values are changed in ST135-5*b*, the processing ends in ST135-6*b*.

<Stop>

The stop function is used to stop the Effect Audio.

Parameters: None

Return Value: None

Exceptions:

HDDVD_E_INVALIDCALL

Detailed processing is as follows:

1) Check the value of the playing property.

If it is "true":

2) Go to step 3).

Otherwise:

2) Stop this sequence and throw HDDVD_E_INVALIDCALL

3) Stop the presentation of Effect Audio.

4) Assign false to the playing property of this object.

FIG. 136 is a flowchart showing the contents of the "stopEffectAudio" function of API commands. The "stopEffectAudio" function performs processing for stopping playback presentation of an effect audio EFTAD. The processing of this API function serves its purpose only during playback presentation of the effect audio EFTAD. Therefore, immediately after the API command processing starts in ST136-1*c*, it is checked in ST136-2*c* if a "playing" property is "true". If the "playing" property is "false", this means that the effect audio EFTAD is not played back. Hence, since the API command processing does not serve its purpose, an error message is output in ST136-4*c*, and the processing ends in ST136-6*c*. By contrast, if the "playing" property is "true" in ST136-2*c*, since the playback state of the corresponding effect audio EFTAD is "playing", the playback presentation of the effect audio EFTAD is stopped in ST136-3*c*. After that, "false" is set in the "playing" property in ST136-5*c* to indicate that the playback state is not "playing", and the API command processing ends in ST136-6*c*.

FIGS. 137 and 138 are flowcharts showing the contents of the "playEffectAudio" function of API commands. The "playEffectAudio" function performs playback presentation of the effect audio EFTAD. A big characteristic feature of this embodiment lies in that playback of the effect audio EFTAD is guaranteed. The effect audio EFTAD can be used in the advanced application ADAPL, and is linked from the markup MRKUP, as shown in FIG. 16. FIG. 16 shows a screen example to be presented to the user in this embodiment. Various buttons from the help icon 33 to the FF button 38 which are located on the lower side in FIG. 16 are presented by the advanced application ADAPL. For example, when the user presses the play button 35 or stop button 34, a specific sound is generated immediately after the user presses the button, so as to indicate pressing of that button to the user, thus informing the user of this fact in this embodiment. For example, an audio that informs the user of pressing upon pressing of each button is called an effect audio EFTAD. As shown in FIG. 14, the effect audio EFTAD used in the advanced application ADAPL is stored as an independent audio file, which records audio information in the format of a WAV file. In the markup MRKUP, as shown in FIG. 91, an object element OBJTEL described in a body element BODYEL refers to the effect audio file EFTAD, thus pasting the effect audio EFTAD in the markup MRKUP. In this way, in this embodiment, an audio output of the effect audio EFTAD is programmed in advance in the markup MRKUP. However, the audio output of the effect audio EFTAD may irritate some users, and such users may want to inhibit the audio output of the effect audio EFTAD. In such case, by issuing the API command "stopEffectAudio" shown in FIG. 136 based on a user's input, the effect audio EFTAD can be stopped. Meanwhile, after a specific user sets to inhibit the audio output of the effect audio EFTAD by executing the "stopEffectAudio" function shown in FIG. 136, another user may want to change the setting to permit the audio output of the effect audio EFTAD upon playing back the identical advanced content playback unit ADVPL. In such case, by executing the "playEffectAudio" function shown in FIGS. 137 and 138, that user can resume the audio output of the effect audio EFTAD again. In the description of this embodiment, the setting of the "playEffectAudio" function is mainly issued in response to a user's input as a trigger. However, the invention is not limited to this. For example, the "playEffectAudio" function may be issued as a systemic condition in the advanced content playback unit ADVPL as follows. That is, during playback of a specific area of the main title 31 (main video MANVD), the audio output of the effect audio EFTAD is stopped according to a climax scene. Upon completion of playback of the specific area (upon completion of the climax scene), the audio output of the effect audio EFTAD is resumed. The advanced content playback unit ADVPL in this embodiment includes the sound decoder SNDDEC in the advanced application presentation engine AAPEN in the presentation engine PRSEN, as shown in FIG. 42. Both the "playEffectAudio" function shown in FIGS. 137 and 138 and the "stopEffectAudio" function shown in FIG. 136 can control the ON/OFF state of the audio output of the effect audio EFTAD by controlling the output of the sound decoder SNDDEC by the API command issuance processing. The invention is not limited to the above embodiment. As another application example, the ECMA script processor ECMASP in the advanced application manager ADAMNG shown in FIG. 44 may execute, as a main body, processing based on the following sequence:

1. an event is generated (the event is input to the navigation manager NVMNG);

2. the ECMA script processor ECMASP searches the advanced application manager ADAMNG and file cache FLCCH for a script SCRPT that describes the processing method (function contents) corresponding to the event;

3. the ECMA script processor ECMASP controls to perform activation processing of (a series of) functions in the advanced content playback unit ADVPL in accordance with the contents of the extracted script SCRPT; and 4. the activation processing contents controlled by the ECMA script processor ECMASP follow the flowchart contents for the functions to be described below.

The operation of the flowchart showing the contents of the "playEffectAudio" function will be described below using FIG. 137.

<Play>

The play function is used to play Effect Audio.

Parameters:

uri of type String

Specifies URI of the file name to play Effect Audio. This file shall be WAV file in File Cache. This parameter shall be follow URI rule. For details of URI rule, refer to 6.2.2 Content Referencing.

repeat of type unsigned int

Specifies the repeat count for playing Effect Audio.

Valid Range: 1-99 callback of type Function

Specify the callback function for the state change. The function shall be the following interface:

void callback(status : int).;

Parameters:

status of type int:

Player.FILE_NOT_FOUND:Specified file is not found

Player.WRONG_FORMAT :Specified file is not WAV file.

Player.FINISHED:Effect Audio is finished

Return Value: None

Exceptions:

HDDVD_E_INVALIDCALL

HDDVD_E_ARGUMENT

Detailed processing is as follows:

1) Check the value of the playing property.

If it is "true":

2) Stop this sequence and throw HDDVD_E_INVALIDCALL.

Otherwise:

2) Go to step 3).

4) Check whether the assigned argument uri is valid. "Valid" means uri is right format. This step does not check whether the specific file exists.

If it is valid:

5) Go to step 6).

Otherwise:

5) Stop this sequence and throw HDDVD_E_ARGUMENT.

6) Assign "true" to the playing property.

7) Start Play Effect Audio process.

8) Return immediately.

Play Effect Audio process is as follows:

1) Check whether the file specified by URI exists.

If the file exists:

2) Go to step 5)

If the file does not exist:

2) Assign "false" to the playing property.

3) Call the callback function with parameter as:

callback (Player.FILE_NOT_FOUND);

4) Finish.

5) Check whether this file is WAV format.

If the file is WAV format:

6) Go to step 9).

Otherwise:

6) Assign "false" to playing property of this object.

7) Call the callback function with parameter as:

callback (Player.WRONG_FORMAT);

8) Go to step 9).

9) Play the specific file by Audio Decoder in Advanced Element Presentation Engine. When argument is more than one, Player shall repeat audio the number of times.

10) After finishing Effect Audio, assign "false" to the playing property.

11) Call the callback function with parameter as:

callback (Player.FINISHED);

12) Finish.

Activation of the "playEffectAudio" function serves its purpose only when playback of the effect audio EFTAD is stopped. Therefore, immediately after the API command processing starts in ST137-1*a*, it is confirmed in ST137-2*a* if the "playing" property is "false" to check if the playback state of the effect audio EFTAD is not "playing". If the playback state of the effect audio EFTAD is "playing", an error message is output in ST137-5*a*, and the process advances to API command end processing in ST137-7*a*. If the "playing" property is "false", it is checked in ST137-3*a* if the description format of a URI as the designated parameter is correctly described. If the format is not correctly described, an error message is output in ST137-5*a*; otherwise, "true" is set in the "playing" property in ST137-4*a* to indicate that the playback state is "playing". After that, "Play Effect Audio" starts in ST137-6*a*. Upon completion of the "Play Effect Audio", the API command end processing is executed (ST137-7*a*). FIG. 138 shows the detailed contents of the "Play Effect Audio" in ST137-6*a*. Upon starting the "Play Effect Audio" in ST138-1*b*, it is checked in ST138-2*b* if a file corresponding to the designated URI is stored. If no file is stored, "false" is set in the "playing" property in ST138-6*b*, and "callback" of "no file" (FILE_NOT_FOUND) is called in ST138-9*b*. After that, the processing of the "Play Effect Audio" ends in ST138-11*b*. As described above, this embodiment postulates a WAV file as the effect audio EFTAD. Therefore, if a file is stored at the designated URI, it is checked in ST138-3*b* if the designated file has the "WAV" format. If the file is described using a format other than the "WAV" format, "false" is set in the "playing" property in ST138-5*b*, and "callback" of "format error" (WRONG_FORMAT) is called in ST138-8*b*. After that, the process advances to the end processing in ST138-11*b*. If the designated file has the "WAV" format, playback processing of the designated file is executed in ST138-4*b*. In this embodiment, the advanced content playback unit ADVPL includes the sound decoder SNDDEC in the advanced application presentation engine AAPEN, as shown in FIG. 31 or 42. In response to the playback processing of the designated file in ST138-4*b*, the audio output of the sound decoder SNDDEC is allowed. After the playback presentation of the corresponding effect audio EFTAD is output, "false" is set in the "playing" property in ST138-7*b* to indicate that the playback state of the effect audio EFTAD is not "playing". After that, "callback" of "end of playback" (FINISHED) is called in ST138-10*b*, and the "Play Effect Audio" processing ends in ST138-11*b*. The control then returns to the "playEffectAudio" function shown in FIG. 137.

As shown in FIG. 5C, the information storage medium DISC compliant to category 3 can record both the advanced content ADVCT and standard content STDCT. This embodiment allows the following processing: while the information recording and playback apparatus 1 plays back the advanced content ADVCT initially, it transits to playback of the standard content STDCT. As shown in FIG. 15, in this embodiment, the information recording and playback apparatus 1 incorporates both the advanced content playback unit ADVPL that plays back the advanced content ADVCT, and the standard content playback unit STDPL that plays back the standard content STDCT. When the advanced content ADVCT is played back initially, the advanced content playback unit ADVPL is active, and the standard content playback unit STDPL is in a standby state. Next, upon transition from playback of the advanced content ADVCT to that of the standard content STDCT, the advanced content playback unit ADVPL is set in the standby state, and the standard content playback unit STDPL is activated. Transition from the advanced content playback state ADVPS to the standard content playback state STDPS is attained based on a command MSCMD corresponding to the markup and script, as shown in FIG. 6. The command MSCMD corresponding to the markup and script means the "playStandardContentPlayer" function shown in FIG. 139 of API commands defined in this embodiment. The mixed playback sequence between the advanced content playback state ADVPS and the standard content playback state STDPS starts from playback processing ST81 of the advanced content ADVCT and ends with playback end processing ST85 of the advanced content ADVCT, as shown in FIG. 52. Therefore, the standard content playback state STDPS is always inserted in the middle of the advanced content playback state ADVPS (see ST82). In this embodiment, the standard content STDCT can be played back in an advanced content ADVCT playback mode by referring to the standard content STDCT in the advanced content ADVCT playback mode, as shown in FIG. 9. However, in some information storage media DISC shown in FIG. 5C, the advanced content does not refer to the standard content STDCT in rare cases. In such case, the playback state may transit from the advanced content playback state ADVPS to the standard content playback state STDPS in response to a user's request. As described above, when the user requests transition from the advanced content playback state ADVPS to the standard content playback state STDPS, a user operation UOPE is generated. In response to this operation, the user interface engine UIENG issues a user interface event UIEVT to the advanced application manager ADAMNG, as shown in FIG. 28. The advanced application manager ADAMNG searches the advanced application script ADAPLS or default handler script DEVHSP, and issues an API command corresponding to the "playStandardContentPlayer" function shown in FIG. 139 to the playlist manager PLMNG. The invention is not limited to the above embodiment. As another application example, the ECMA script processor ECMASP in the advanced application manager ADAMNG shown in FIG. 44 may execute, as a main body, processing based on the following sequence:

1. an event is generated (the event is input to the navigation manager NVMNG);

2. the ECMA script processor ECMASP searches the advanced application manager ADAMNG and file cache FLCCH for a script SCRPT that describes the processing method (function contents) corresponding to the event;

3. the ECMA script processor ECMASP controls to perform activation processing of (a series of) functions in the advanced content playback unit ADVPL in accordance with the contents of the extracted script SCRPT; and 4. the activation processing contents controlled by the ECMA script processor ECMASP follow the flowchart contents for the functions to be described below.

In this embodiment, transition from the advanced content playback state ADVPS to the standard content playback state STDPS is allowed only when the advanced content ADVCT is set in a pause mode. As shown in FIG. 32, there are eight different states of the advanced content playback unit ADVPL. In only the pause state PSEST of these states, transition from the advanced content playback state ADVPS to the standard content playback state STDPS is allowed.

<Play>

The play function is used to change presentation from Advanced Content Navigation to Standard Content Navigation. When disc does not have Standard Content, Player shall throw HDDVD_E_INVALIDCALL. Application is able to call this function only at pause state. After the presentation of Standard Content Player is finished by CallAdvancedContentPlayer command, this function shall be returned.

Parameters:

domain of type unsigned int

Specifies what domain of Standard Content is selected for presentation. This parameter shall be assigned by Domain type properties. Starting point of Standard Content is specified by this parameter and SPRM.

Return Value: None

Exceptions:

HDDVD_E_ARGUMENT

HDDVD_E_INVALIDCALL

Detailed processing is as follows:

1) Check whether the assigned argument is within valid range.

If it is within valid range:

2) Go to step 3).

Otherwise:

2) Throw HDDVD_E_ARGUMENT.

3) Check the playState property of the Playlist object.

If the value is same as the PLAYSTATE_PAUSE property of the Playlist object:

4) Go to step 5).

Otherwise:

4) Throw HDDVD_E_INVALIDCALL.

5) Check whether Disc has Standard Content.

If Disc has Standard Content:

6) Go to step 7).

Otherwise:

6) Throw HDDVD_E_INVALIDCALL.

7) Suspend Advanced Content Player and transit to Standard Content Player. If Player is not able to start Standard Content, return to presentation of Advanced Content immediately.

Referring to FIG. 139, upon starting the API command processing corresponding to the "playStandardContentPlayer" function in ST139-1, it is checked in ST139-2 if the designated parameters fall within the valid range. If the designated parameters fall outside the valid range, an error message is output in ST139-6, and the API command processing ends in ST139-10. If the designated parameters fall within the valid range, it is checked in ST139-3 if the "playState" property is set to be "PLAYSTATE_PAUSE" (pausing). As described above, in this embodiment, since the "playStandardContentPlayer" function is executed in only "pausing", an error message is output in ST139-6 for other states. In case of "pausing", it is checked in ST139-4 if the information storage medium DISC records the standard content STDCT to confirm if the information storage medium DISC is compliant to "category 3" shown in FIG. 5C. In case of a medium of "category 2", an error message is output in ST139-6. If the corresponding information storage medium DISC is compliant to "category 3", the processing of the advanced content playback unit ADVPL is interrupted, and that of the standard content playback unit STDPL starts in ST139-5. At this time, it is checked in ST139-7 if the standard content playback unit STDPL can immediately start playback of the standard content STDCT. If the standard content playback unit STDPL cannot immediately start playback, the processing of the advanced content playback unit ADVPL restarts to start playback presentation of the advanced content ADVCT in ST139-9. If the standard content playback unit STDPL can immediately start playback of the standard content STDCT in ST139-7, the standard content playback processing is continued in ST139-8. When the playback presentation of the standard content playback unit STDPL is ended by a playback start call of the advanced content playback unit ADVPL using a command NCCMD of navigation commands, as shown in FIG. 6, the advanced content playback processing (ST4.3.22-3-2) must be resumed, as shown in FIG. 52. Therefore, after the end of continuation of the standard content playback processing in ST139-8, the processing of the advanced content playback unit ADVPL restarts to start the playback presentation of the advanced content ADVCT in ST139-9. After that, the API command processing corresponding to the "playStandardContentPlayer" function ends in ST139-10.

FIG. 140 is a flowchart showing the contents of the "playSecondaryVideoPlayer" function of API commands. The "playSecondaryVideoPlayer" function is an API command used to start playback of the secondary video player SCDVP. As shown in FIG. 16, a big characteristic feature of this embodiment lies in that video pictures of the main video MANVD that represents the main title 31 and the sub video SUBVD that represents the independent window 32 can be simultaneously presented side by side on a single screen to the user. In this embodiment, a video picture which can be presented to the user simultaneously with the main video MANVD that represents the main title 31 is limited to the sub video SUBVD, and a plurality of main videos MANVD cannot be simultaneously presented to the user. As shown in FIG. 10, the sub video SUBVD is included only in the primary audio video PRMAV in the primary video set PRMVS, or in the secondary audio video SCDAV in the secondary video set SCDVS. Of API commands defined in this embodiment, the "playSecondaryVideoPlayer" function shown in FIG. 140 means an API command used to start playback of the sub video SUBVD included in the secondary audio video SCDAV. As shown in FIG. 25, when the secondary audio video SCDAV in the secondary video set SCDVS is saved in advance in the information storage medium DISC or persistent storage PRSTR, it is temporarily saved in the file cache FLCCH in advance before playback presentation to the user. Then, the data of the secondary audio video SCDAV is transferred from the FLCCH to the secondary video player SCDVP, thus allowing presentation of the sub video SUBVD. By contrast, when the secondary video set SCDVS that includes the secondary audio video SCDAV is recorded in the network server NTSRV, it is saved in advance in the streaming buffer STRBUF before playback presentation to the user. Then, data of the secondary audio video SCDAV is transferred from the streaming buffer STRBUF to the secondary video player SCDVP, thus allowing presentation of the sub video SUBVD. Therefore, the processing procedure changes depending on the original recording location of the secondary audio video SCDAV in the "playSecondaryVideoPlayer" function shown in FIG. 140. That is, when the secondary audio video SCDAV is saved in advance in the information storage medium DISC or persistent storage PRSTR, "play Secondary Video Set" (FIG. 141) that goes through the file cache FLCCH is used. When the secondary audio video SCDAV is saved in advance in the network server NTSRV, processing based on "Streaming Secondary Video Set" (see FIGS. 142 and 143) that goes through the streaming buffer STRBUF is executed. As for the presentation method of the main video MANVD that represents the main title 31 and the sub video SUBVD in the secondary video set SCDVS (secondary audio video SCDAV) that represents the independent window 32, as shown in FIG. 16, the presentation timings are mapped in advance in the playlist PLLST, as shown in FIG. 17. That is, the playback timing of the sub video SUBVD that represents the independent window 32 shown in FIG. 16 in a single title is defined by a "start time TTSTTM on the title timeline" (titleTimeBegin attribute information) and an "end time TTEDTM on the title timeline" (titleTimeEnd attribute information) in a secondary audio video clip element SCAVCP in the object mapping information OBMAPI shown in FIG. 54D. The presentation location of the sub video SUBVD that represents the independent window 32 in the window on the screen to be presented to the user is set by designating the window size and the window presentation position in the video attribute item element VABITM described in the media attribute information MDATRI in the playlist PLLST, as shown in FIG. 79D, and designating the video attribute item element VABITM by the sub video element SUBVD in the track number assignment information, as shown in FIG. 6.2.3.12-4F. In this manner, the playlist PLLST sets in advance the presentation timings and window layout on the screen of the main video MANVD that represents the main title 31 and the sub video SUBVD that represents the independent window 32. Meanwhile, when a commercial that the user does not want to watch is presented on the independent window 32 for a commercial, and the main title 31 reaches a climax scene, the user may want to temporarily stop playback of the sub video SUBVD that represents the independent window 32 and to focus on the main title 31. In this case, by calling the "stopSecondaryVideoPlayer" function shown in FIG. 146, playback of the sub video SUBVD can be temporarily stopped. After that, when the climax scene of the main title 31 ends, and the user wants to simultaneously present the independent window 32, playback presentation of the sub video SUBVD can be restarted by executing the "playSecondaryVideoPlayer" function shown in FIG. 140. The user often inputs the start or stop processing of the playback presentation of the sub video SUBVD that represents the independent window 32 mainly using the remote controller or mouse. As shown in FIG. 14, the advanced content playback unit ADVPL in this embodiment has the navigation manager NVMNG, which directly receives the user's designation (user operation UOPE). As shown in FIG. 28, the navigation manager NVMNG includes the user interface engine UIENG, which issues a user interface event UIEVT to the advanced application manager ADAMNG in response to the user operation UOPE. Upon reception of the user interface event UIEVT, the programming engine PRGEN in the advanced application manager ADAMNG issues a corresponding script (an API command or a combination of API commands) to the playlist manager PLMNG or presentation engine PRSEN with reference to the advanced application script ADAPLS or default event handler script DEVHSP. In this way, the "playSecondaryVideoPlayer" function shown in FIG. 140 is handled (undergoes processing control) in the navigation manager NVMNG. The invention is not limited to the above embodiment. As another application example, the ECMA script processor ECMASP in the advanced application manager ADAMNG shown in FIG. 44 may execute, as a main body, processing based on the following sequence:

1. an event is generated (the event is input to the navigation manager NVMNG);

2. the ECMA script processor ECMASP searches the advanced application manager ADAMNG and file cache FLCCH for a script SCRPT that describes the processing method (function contents) corresponding to the event;

3. the ECMA script processor ECMASP controls to perform execution processing of (a series of) functions in the advanced content playback unit ADVPL in accordance with the contents of the extracted script SCRPT; and 4. the execution processing contents controlled by the ECMA script processor ECMASP follow the flowchart contents for the functions to be described below.

<Play>

The play function is used to start the presentation of Secondary Video Player. This function shall be used only for Secondary Audio Video, not for Substitute Audio Video and Substitute Audio.

Parameters:

uri of type String

Specifies the TMAP file to indicate Secondary Video Set in the Persistent Storage, Disc, File Cache and Network. This parameter shall be follow URI rule.

start of type String

Specifies the time until beginning the presentation of Secondary Video Player. This value is indicated by Timecode. When this parameter is undefined, Player shall play as soon as possible.

offset of type String

Specifies the offset time in the Secondary Video Set that the presentation starts. This value is indicated by Timecode. When this parameter is undefined, Player shall play a presentation from the beginning.

stop of type String

Specifies the time in the Secondary Video Set that the presentation is finished. This value is indicated by Timecode. When this parameter is undefined, Player shall play this presentation to last.

callback of type Function

Specify the callback function for the state change. The function shall be the following interface:

void callback(status : int);

Return Value: None

Exceptions:

HDDVD_E_ARGUMENT

HDDVD_E_INVALIDCALL

Detailed processing is as follows:

1) Check the playState property.

If the value is same as the PLAYSTATE_STOP property:

2) Go to step 3).

Otherwise:

2) Stop this sequence and throw HDDVD_E_INVALIDCALL.

3) Assign the PLAYSTATE_INIT property to the playState property.

4) Check whether the assigned argument uri is valid. "Valid" means uri is right format. This step does not check whether the specific file exists.

If it is valid:

5) Go to step 6).

Otherwise:

5) Stop this sequence and throw HDDVD_E_ARGUMENT.

6) Check the uri schema.

If uri schema is http or https:

7) Start Streaming Secondary Video Set sequence.

If uri schema is file:

7) Start Play Secondary Video Set sequence.

Otherwise:

7) Stop this sequence and throw HDDVD_E_ARGUMENT.

8) Return immediately.

Play Secondary Video Set sequence is as follows:

1) Check whether a resource file is in disc and disc is not used by other module.

If the specified resource file exist in disc and disc in used by other module:

2) Assign the PLAYSTATE_STOP property to the playState property.

3) Call the callback function with parameter as:

callback (Player.INVALID_CALL);

4) Finish.

If the file does not exist:

2) Go to step 5).

5) Check whether the file specified by URI exists.

If the file exists:

6) Go to step 9).

If the file does not exist:

6) Assign the PLAYSTATE_STOP property to the playState property.

7) Call the callback function with parameter as:

callback (Player.FILE_NOTFOUND);

8) Finish.

9) Check whether this file is playable format.

If the specified resource file is playable format:

10) Go to step 14).

Otherwise:

11) Assign the PLAYSTATE_STOP property to the playState property.

12) Call the callback function with parameter as:

callback (Player.WRONG_FORMAT);

13) Finish.

14) Check the assigned parameter offset is within the time span of Secondary Video Set, using TMAP information.

If offset is valid value:

15) Go to step 18).

Otherwise:

15) Assign the PLAYSTATE_STOP property to the playState property.

16) Call the callback function with parameter as:

callback (Player.INVALID_PARAMETER);

17) Finish.

18) Wait for the time specified by the assigned parameter start.

19) Play the specific file by Secondary Video Player.

20) Assign the PLAYSTATE_PLAY property to the playState property.

21) When finish the presentation, assign the PLAYSTATE_STOP property to the playState property.

22) Call the callback function with parameter as:

callback (Player.FINISH);

23) Finish.

Streaming Secondary Video Set sequence is as follows:

1) Check whether network is connected to the player or not.

If network is connected:

2) Go to step 5).

If network is not connected:

2) Assign the PLAYSTATE_STOP property to the playState property.

3) Call the callback function with parameter as:

callback (Player.NETWORK_PROBLEM);

4) Finish.

5) Download the TMAP file by complete downloading,

If the download succeeded:

6) Go to step 9).

If timeout (timeout period is specified by NetworkTimeout element in Playlist) or some other network error occurs:

6) Assign the PLAYSTATE_STOP property to the playState property.

7) Call the callback function with parameter as:

callback (Player.NETWORK_PROBLEM);

8) Finish.

If there is not enough space to store the downloaded TMAP:

6) Assign the PLAYSTATE_STOP property to the playState property.

7) Call the callback function with parameter as:

callback (Player.NOT_ENOUGH_SPACE);

8) Finish.

9) Check the assigned argument offset is within the time span of Secondary Video Set, using TMAP information.

If it is valid value:

10) Go to step 13).

Otherwise:

10) Assign the PLAYSTATE_STOP property to the playState property.

11) Call the callback function with parameter as:

callback (Player.INVALID_PARAMETER);

12) Finish.

13) Assign the PLAYSTATE_STREAMING_PRELOAD property to the playState property.

14) Begin preloading of the specified S-EVOB file. When offset is nonzero, partial GET is used for downloading to specify offset.

If any network error does not occur before the time specified by the assigned argument start 15) Go to step 18).

If timeout (timeout period is specified by NetworkTimeout element in Playlist) or some other network error occurs before the time specified by the assigned argument start:

15) Assign the PLAYSTATE_STOP property to the playState property.

16) Call the callback function with parameter as:

callback (Player.NETWORK_PROBLEM);

17) Finish.

18) Check whether this file is playable format.

If the file is playable format:

19) Go to step 22).

Otherwise:

19) Assign the PLAYSTATE_STOP property to the playState property.

20) Call the callback function with parameter as:

callback (Player.WRONG_FORMAT);

21) Finish.

22) Wait for the time specified by the assigned argument start. 23) P Play the specified file from the time.

24) Assign the PLAYSTATE_STREAMING_PLAY property to the playState property.

If any. network error does not occur before the presentation finishes:

25) Go to step 28).

If timeout (timeout period is specified by NetworkTimeout element in Playlist) or some other network error occurs before the presentation finishes:

25) Assign the PLAYSTATE_STOP property to the playState property.

26) Call the callback function with parameter as:

callback (Player.NETWORK_PROBLEM);

27) Finish.

28) When finish the presentation, assign the PLAYSTATE_STOP property to the playState property.

29) Call the callback function with parameter as:

callback (Player.FINISH);

30) Finish.

As shown in FIG. 10, in this embodiment, three different types of playback presentation objects, i.e., a substitute audio video SBTAV, substitute audio SBTAD, and secondary audio video SCDAV can be defined in the secondary video set SCDVS. The "playSecondaryVideoPlayer" function is a function of using only the secondary audio video SCDAV, but cannot be used for the substitute audio video SBTAV or substitute audio SBTAD. Also, the API command can be executed in only the stop state STOPST that means "stop" of various states of the advanced content player shown in FIG. 31. Therefore, immediately after the API command processing starts in ST140-1*a*, it is checked in ST140-2*a* if the "playState" property is set to be "PLAYSTATE_STOP" ("stop"). If the "playState" property indicates a state other than "stop", an error message is output in ST140-9*a*, and the API command processing ends in ST140-10*a*. If it is determined in ST140-2*a* that the "playState" property indicates "stop", "PLAYSTATE_INIT" (initial setting) is set in the "playState" property in ST140-3*a*. After that, it is checked in ST140-4*a* if a URI as the designated parameter is described in a correct format. If the URI is not described in the correct format, an error message is output in ST140-9*a*. If the URI is described in the correct format, it is checked in ST140-5*a* if the data structure in the URI as the designated parameter starts with "http" or "https". If the data structure in the URI starts with "http" or "https", since it indicates that the playback presentation object to be played back is saved in the network server NTSRV, "Streaming Secondary Video Set" starts in ST140-6*a*. If it is determined in ST140-5*a* that the data structure in the URI does not start with "http" or "https", it is determined that the corresponding playback presentation object is stored in one of the persistent storage PRSTR, information storage medium DISC, and data cache DTCCH. In this case, it is checked in ST140-7*a* if the contents of the URI as the designated parameter indicate a file recorded in the information storage medium DISC, persistent storage PRSTR, or data cache DTCCH. If the URI is not correctly described, an error message is output in ST140-9*a*. If the designated URI value is correctly described, "play Secondary Video Set" starts in ST140-8*a*. As shown in FIG. 10, the secondary audio video SCDAV recorded in the network server NTSRV is temporarily saved in the streaming buffer STRBUF before the beginning of playback, and its data is transferred from the streaming buffer STRBUF to the secondary video player SCDVP, thus starting the playback presentation. The sequence processing corresponding to this route corresponds to the "Streaming Secondary Video Set" sequence shown in FIGS. 142 and 143. By contrast, as shown in FIG. 25, the secondary audio video SCDAV recorded in the information storage medium DISC or persistent storage PRSTR is temporarily saved in the file cache FLCCH, and its data is transferred from the file cache FLCCH to the secondary video player SCDVP, thus starting the playback presentation of the secondary audio video SCDAV. The processing corresponding to this route corresponds to the "play Secondary Video Set" sequence shown in FIG. 141. Upon completion of the processing of the "Streaming Secondary Video Set" in ST140-6*a* or the "play Secondary Video Set" in ST140-8*a*, the API command processing ends in ST140-10*a*.

FIG. 141 is a flowchart showing the contents of the "Play Secondary Video Set" sequence used in the "playSecondaryVideoPlayer" function. As shown in FIG. 25, when the secondary audio video SCDAV including the sub video SUBVD is saved in advance in the information storage medium DISC or persistent storage PRSTR, data of the secondary audio video SCDAV is transferred to the secondary video player SCDVP via the file cache FLCCH using the "Play Secondary Video Set" sequence. In this case, the "Play Secondary Video Set" sequence shown in FIG. 141 is used. As shown in FIG. 25, in this embodiment, the information storage medium DISC records both the secondary audio video SCDAV of the primary video set PRMVS and that of the secondary video set SCDVS. However, the loading processing of the secondary audio video SCDAV toward the file cache FLCCH and the playback processing of the primary video set PRMVS recorded in the information storage medium DISC cannot be simultaneously executed. As a big characteristic feature of this embodiment, the reliability of the processing of the information recording and playback unit 2 is improved by inhibiting simultaneous parallel execution of a plurality of kinds of processing of the information recording and playback unit in consideration of the access performance of an optical head included in the information recording and playback unit (see FIG. 15) that plays back data from the information storage medium DISC by imposing the above limitation conditions. Therefore, this embodiment inhibits simultaneous execution of a plurality of use applications with respect to the information storage medium DISC. Hence, another processing is inhibited during the loading processing of the secondary video set SCDVS (secondary audio video SCDAV), which is recorded in the information storage medium DISC, to the file cache FLCCH. For this reason, immediately after the "Play Secondary Video Set" starts in ST141-1*b*, it is checked in ST141-2*b* if the designated resource file is recorded in the information storage medium DISC and the information storage medium DISC is not used for another purpose. If the information storage medium DISC is used for another use application such as playback of the primary video set PRMVS, "PLAYSTATE_STOP" ("stop") is set in the "playState" property in ST141-3*b* to indicate "stop". After that, "callback" of "invalid" (INVALID) is called in ST141-4*b*, and the processing of the "Play Secondary Video Set" sequence ends in ST141-19*b*. If it is determined based on the conditions in ST141-2*b* that the designated resource file is not recorded in the information storage medium DISC, or the resource file is recorded in the information storage medium DISC and the corresponding information storage medium DISC is not used for another use application, it is checked in ST141-5*b* if the resource file designated by the URI is stored. In this case, the resource file designated by the URI mainly indicates a case wherein the file is stored in the persistent storage PRSTR or information storage medium DISC. However, this embodiment is not limited to such case, and supports a case wherein the resource file is stored in the data cache DTCCH. If the resource file designated by the URI is not stored in ST141-5*b*, "PLAYSTATE_STOP" is set in the "playState" property in ST141-6*b* to indicate "stop". After that, "callback" of "no file" (FILE_NOT_FOUND) is called in ST141-7*b*, and the control then advances to the end in ST141-19*b*. If the resource file designated by the URI is stored in ST141-5*b*, download processing of the secondary video set SCDVS (secondary audio video SCDAV) recorded in the information storage medium DISC or persistent storage PRSTR into the file cache FLCCH is executed, although not shown in FIG. 141. Upon completion of the download processing into the file cache FLCCH, it is checked in ST141-8*b* if the resource file designated by the URI is recorded in a format that allows playback. If the resource file is not recorded in the format that allows playback, "PLAYSTATE_STOP" ("stop") is set in the "playState" property in ST141-9*b*, and "callback" of "wrong format" (WRONG_FORMAT) is called in ST141-10*b*. If it is determined in ST141-8*b* that the resource file is recorded in the format that allows playback, it is checked as a result of determination using time map information STMAP in ST141-11*b* if the designated offset value falls within the playback time range of the secondary video set SCDVS. If the designated offset value exceeds the playback time range, "PLAYSTATE_STOP" is set in the "playState" property in ST141-12*b* to indicate "stop". After that, "callback" of "invalid parameter" (INVALID_PARAMETER) is called in ST141-13*b*, and the control advances to the end processing in ST141-19*b*. If it is determined in ST141-11*b* that the designated offset value falls within the playback time range of the secondary video set SCDVS, playback starts from the middle of the secondary video set SCDVS (secondary audio video SCDAV) in ST141-14*b*, and continues until the designated playback presentation start position. If the secondary video set SCDVS (secondary audio video SCDAV in this embodiment) is not synchronized with the time progress on the title timeline TMLE, the designated playback presentation start location means the value of the start time TTSTTM on the title timeline (titleTimeBegin attribute information) in the secondary audio video clip element SCAVCP described in the object mapping information OBMAPI in the playlist PLLST shown in FIG. 54. Next, playback presentation starts from the playback presentation start location of the file designated by the secondary video set SCDVS (see FIG. 30) in ST141-15*b*. Then, "PLAYSTATE_PLAY" is set in the "playState" property in ST141-16*b* to indicate "playing". Upon completion of the playback processing of the secondary video set SCDVS (secondary audio video SCDAV in this embodiment), "PLAYSTATE_STOP" is set in the "playState" property in ST141-17*b* to indicate "stop". After completion of the setting, "callback" of "end of playback" (FINISH) is called in ST141-18*b*, and the "Play Secondary Video Set" sequence ends in ST141-19*b*. The control then returns to the "playSecondaryVideoPlayer" function shown in FIG. 140.

FIGS. 142 and 143 are flowcharts showing the contents of the "Streaming Secondary Video Set" sequence in ST140-6*a* shown in FIG. 140. As shown in FIG. 25, in this embodiment, the secondary video set SCDVS in the network server NTSRV is temporarily saved in the streaming buffer STRBUF before playback presentation to the user, and its data is transferred from the streaming buffer STRBUF to the secondary video player SCDVP, thus performing the playback presentation of the secondary video set SCDVS to the user. As described above using FIG. 140, the "playSecondaryVideoPlayer" function is executed for only the secondary audio video SCDAV in the secondary video set SCDVS. Therefore, the "Streaming Secondary Video Set" sequence shown in FIGS. 142 and 143 is used in only the playback processing of the secondary audio video SCDAV. If the "Streaming Secondary Video Set" sequence starts in ST142-1c, it is checked in ST142-2c if the network is connected to the information playback apparatus 1. If no network is connected to the information playback apparatus 1, "PLAYSTATE_STOP" ("stop") is set in the "playState" property in ST142-3c, and "callback" of "network error" (NETWORK_PROBLEM) is called in ST142-4c. After that, the control jumps to the end processing of the "Streaming Secondary Video Set" sequence in ST143-30c. If it is determined in ST142-2c that the network is connected to the information playback apparatus 1, a time map STMAP of the secondary video set is downloaded, and it is checked in ST142-5c if the download processing has succeeded. It is determined in step S142-5c that the download processing of the time map STMAP of the secondary video set has failed, when a time-out time of the network is exceeded, in case of a problem of a free space in the data cache DTCCH, and the like. The time-out time will be explained first. When a network error has occurred at the time of network connection, network data transfer may be temporarily stopped. When a network error continues after an elapse of a specific time period, and a time period required until outgoing information returns exceeds the specific time period in a general network communication, in many cases a time-out is determined and network connection is automatically disconnected. In this embodiment, the time-out time based on a network error is set in the playlist PLLST, and the network connection is disconnected when no network response returns after an elapse of the set time-out time. The setting information of the time-out time in the playlist PLLST is set, as shown in FIG. 80F. That is, in this embodiment, the playlist PLLST includes the configuration information CONFGI, as shown in FIG. 80A, and the configuration information CONFGI includes a network time-out element NTTMOT, as shown in FIG. 80B. In the network time-out element NTTMOT, time-out setting information NTCNTO (timeout attribute information) upon network connection can be set, as shown in FIG. 80F. In this embodiment, when no network response returns after an elapse of a time period set based on the time-out setting information NTCNTO (timeout attribute information), if the time-out time has elapsed or another network error has occurred in ST142-6c, "PLAYSTATE_STOP" ("stop") is set in the "playState" property in ST142-7c, and "callback" of "network error" (NETWORK_PROBLEM) is called in ST142-8c. After that, the control jumps to the end processing of the "Streaming Secondary Video Set" sequence in ST143-30c. As the condition for determining a download failure in ST142-5c in addition to the time-out time, the state of a free space of the data cache DTCCH is used. In this case, it is checked in ST142-9c if the data cache DTCCH does not have any free space large enough to save the time map STMAP of the secondary video set. If the data cache DTCCH does not have any sufficient free space, "PLAYSTATE_STOP" ("stop") is set in the "playState" property in ST142-10c, and "callback" of "insufficient free space" (NOT_ENOUGH_SPACE) is called in ST142-11c. After that, the control jumps to the end processing in ST143-30c. If the download processing has failed in ST142-5c when the data cache DTCCH has an enough free space in the determination condition in ST142-9c and the time-out time has not elapsed in ST142-6c, the process advances to "N" in ST142-9c, thus jumping to the end processing in ST143-30c. It is checked in ST142-9c if the data cache DTCCH does not have any free space large enough to save the time map STMAP of the secondary video set. However, this embodiment is not limited to this. For example, if the data cache DTCCH does not have any free space large enough to save secondary enhanced video object data S-EVOB to be referred to by the time map STMAP, the process similarly advances to the process in ST142-10c. That is, as shown in FIG. 88C, time map general information TMAP_GI (see FIG. 88B) in the time map STMAP of the secondary includes file name EVOB_FNAME of an enhanced video object shown in FIG. 88C. In this embodiment, the time map STMAP of the secondary video set, and the secondary enhanced video object files S-EVOB are saved at the same saving location (the pass field in the URI). Therefore, the file name of the secondary enhanced video object files S-EVOB to be saved in the data cache DTCCH are designated by the information of the file names EVOB_FNAME of the enhanced video objects, and the size of the secondary enhanced video object files S-EVOB can be detected based on file system information. Therefore, it is checked in ST142-9c if the data cache DTCCH has a free space large enough to save all secondary video object files S-EVOB. If the data cache DTCCH does not have any sufficient free space, the process advances to ST142-10c. If it is determined based on the determination condition in ST142-5c that the time map STMAP of the secondary video set is downloaded, and the download processing has succeeded, it is checked in ST142-12c as a result of checking using the time map STMAP of the secondary video set if the designated offset parameter falls within the playback presentation time in the secondary video set SCDVS. As shown in FIG. 54D, in this embodiment, the playlist PLLST includes the object mapping information OBMAPI, which includes the secondary audio video clip element SCAVCP (see FIG. 54D). The secondary audio video clip element SCAVCP includes information of a start position VBSTTM (clipTimeBegin attribute information) on the enhanced video object data, as shown in FIG. 54D. When the "playSecondaryVideoPlayer" function shown in FIG. 140 is executed, playback starts from the designated time (that is, the designated offset parameter in ST142-12c) in ST143-23c. With the determination method in ST142-12c, both of the information of the start position VBSTTM (clipTimeBegin attribute information) on the enhanced video object data, and information of time map information TMAPI in the time map STMAP of the secondary video set shown in FIG. 88B are used to check if the value of the designated time (designated offset parameter) falls within the playback presentation time in the secondary video set SCDVS. If it is determined based on the determination condition in ST142-12c that the designated offset parameter falls outside the playback presentation time in the secondary video set SCDVS, "PLAYSTATE_STOP" ("stop") is set in the "playState" property in ST142-14c, and "callback" of "invalid parameter" (INVALID_PARAMETER) is called in ST142-15c. After that, the control jumps to the end processing of the "Streaming Secondary Video Set" sequence in ST143-30c. If it is determined in ST142-12c as a result of determination using the time map STMAP of the secondary video set that the designated offset parameter falls within the playback presentation time in the secondary video set SCDVS, "PLAYSTATE_STREAMING_PRELOAD" ("preloading of streaming") is set in the "playState" property in ST142-13c, thus starting preloading of the designated secondary enhanced video object file S-EVOB. A big characteristic feature of this embodiment lies in that playback of the secondary video set SCDVS (secondary audio video SCDAV) can start before completion of loading of all the secondary audio video data SCDAV into the streaming buffer STRBUF upon loading of the secondary video set SCDVS (secondary audio video SCDAV in FIGS. 140 to 142) to be saved in the streaming buffer STRBUF into the streaming buffer STRBUF, as shown in FIG. 163 or 164. Therefore, the determination condition in ST142-16*c* is not used to determine that no network error occurs before completion of loading of the secondary video set SCDVS (secondary audio video SCDAV) into the streaming buffer STRBUF, but the determination condition in ST143-16*c* is used to determine that no network error occurs before the time of the designated start parameter. If a network error has occurred before the time of the designated start parameter after the beginning of preloading, "PLAYSTATE_STOP" ("stop") is set in the "playState" property in ST143-17*c*, and "callback" of "network error" (NETWORK_PROBLEM) is called in ST143-18*c*. After that, the end processing of the "Streaming Secondary Video Set" sequence is executed (ST143-30*c*). If it is determined in ST143-16*c* that no network error occurs before the time of the designated start parameter, it is checked in ST143-19*c* if the preloaded file has a format that allows playback. If the preloaded file does not have any format that allows playback, "PLAYSTATE_STOP" ("stop") is set in the "playState" property in ST143-20*c*, and "callback" of "wrong format" (WRONG_FORMAT) is called in ST143-21*c*. After that, the control jumps to the end processing in ST143-30*c*. If it is determined in ST143-19*c* that the preloaded file has a format that allows playback, playback starts from the middle of the downloaded secondary video set SCDVS, and continues until the playback position reaches the designated time in ST143-22*c*. In this case, presentation to the user is not performed. If the playback position has reached the time of the designated start parameter, playback presentation of a corresponding file starts from the designated time in ST143-23*c*. After that, "PLAYSTATE_STREAMING_PLAY" ("playing") is set in the "playState" property in ST143-24*c*. After "playing" is set in ST143-24*c*, the playback presentation of the secondary audio video SCDAV to the user continues while transferring the secondary audio video SCDAV saved in the streaming buffer STRBUF to the secondary video player SCDVP parallel to preloading of the secondary audio video SCDAV into the streaming buffer STRBUF, as shown in FIG. 163 or 164. When the playback presentation approaches an end, it is checked in ST143-25*c* if any network error has occurred before completion of the playback presentation. If any network error has occurred during the playback presentation, "PLAYSTATE_STOP" ("stop") is set in the "playState" property in ST143-28*c*, and "callback" of "network error" (NETWORK_PROBLEM) is called in ST143-29*c*. If no network error has occurred before completion of the playback presentation in the determination condition in ST143-25*c*, the playback presentation of the secondary audio video SCDAV is completed, and "PLAYSTATE_STOP" ("stop") is set in the "playState" property in ST143-26*c* upon completion of the playback presentation. After that, "callback" of "end of playback" (FINISH) is called (ST143-27*c*). With the above process, after the playback of the secondary audio video SCDAV ends and "end of playback" is called in ST143-27*c*, the processing of the "Streaming Secondary Video Set" sequence ends in ST143-30*c*, and the control returns to the "playSecondaryVideoPlayer" function shown in FIG. 140.

The "pauseOn" function and "pauseOff" function, and "stopSecondaryVideoPlayer" function (FIGS. 144, 145, and 146) associated with playback presentation of the secondary video set SCDVS (see FIG. 30) of API commands defined in this embodiment will be described below. The "pauseOn" function shown in FIG. 144 has a function of pausing playback presentation of the secondary video set SCDVS. The "pauseOff" function shown in FIG. 145 is an API command used upon restarting the playback presentation of the secondary video set from a paused state. The "stopSecondaryVideoPlayer" function shown in FIG. 146 is an API command used upon ending the playback presentation of the secondary video set SCDVS. This embodiment has a structure in which the primary video set PRMVS and secondary video set SCDVS which are saved in the information storage medium DISC, as shown in FIG. 10, and can be played back and presented to the user with high-resolution image quality. In this embodiment, the substitute audio video SBTAV and substitute audio SBTAD in the secondary video set SCDVS are saved in the information storage medium DISC, persistent storage PRSTR, or network server NTSRV, and are used when they are presented to the user by replacing the main video MANVD or main audio MANAD of the primary audio video PRMAV in the primary video set PRMVS. Likewise, the secondary audio video SCDAV in the secondary video set SCDVS shown in FIG. 10 is originally saved in the information storage medium DISC, persistent storage PRSTR, or network server NTSRV, and is presented in place of the sub video SUBAD and sub audio SUBAD of the primary audio video PRMAV or is played back and presented simultaneously with the main video MANVD and main audio MANAD in the primary audio video PRMAV. The advanced content playback unit ADVPL in the information recording and playback apparatus 1 in this embodiment includes the navigation manager NVMNG and presentation engine PRSEN, as shown in FIG. 14. The presentation engine PRSEN incorporates the secondary video player SCDVP, as shown in FIG. 30. The secondary video player SCDVP executes playback processing of the aforementioned secondary video set SCDVP. All of the "pauseOn" function, "pauseOff" function, and "stopSecondaryVideoPlayer" function shown in FIGS. 144, 145, and 146 are API commands used to control the secondary video player SCDVP (pausing, pause canceling, or stopping processing). Therefore, the "pauseOn" function, "pauseOff" function, and "stopSecondaryVideoPlayer" function are API commands issued from the navigation manager NVMNG in FIG. 14 to the secondary video player SCDVP in the presentation engine PRSEN, and the navigation manager NVMNG handles the processing of the API commands. The API commands are issued at any of timings:

1. based on a user operation UOPE;
2. based on a systemic reason in the advanced content playback unit ADVPL; or
3. according to the pre-programmed contents based on the markup MRKUP and script SCRPT shown in FIG. 14.

The invention is not limited to the above embodiment. As another application example, the ECMA script processor ECMASP in the advanced application manager ADAMNG shown in FIG. 44 may execute, as a main body, processing based on the following sequence:

1. an event is generated (the event is input to the navigation manager NVMNG);
2. the ECMA script processor ECMASP searches the advanced application manager ADAMNG and file cache FLCCH for a script SCRPT that describes the processing method (function contents) corresponding to the event;
3. the ECMA script processor ECMASP controls to perform execution processing of (a series of) functions in the advanced content playback unit ADVPL in accordance with the contents of the extracted script SCRPT; and 4. the execution processing contents controlled by the ECMA script processor ECMASP follow the flowchart contents for the functions to be described below.

In this embodiment, the eight different states shown in FIG. 32 can be defined in the secondary video player SCDVP shown in FIG. 30. The "pauseOn" function shown in FIG. 144 is an API command which is valid only in the playback state PBKST, or the startup state STUPST/update state UPDTST of the states in the secondary video player SCDVP. The "pauseOff" function shown in FIG. 145 is an API command which is valid in only the pause state PSEST in FIG. 32. Furthermore, the "stopSecondaryVideoPlayer" function shown in FIG. 146 is an API command which is valid in only the playback state PBKST, the startup state STUPST/update state UPDTST, or the pause state PSEST in FIG. 32.

<pauseOn>

The pauseOn function is used to suspend the Secondary Video presentation.

Parameters: None

Return Value: None

Exceptions:

HDDVD_E_INVALIDCALL

Detailed processing is as follows:

1) Check SecondaryVideoPlayer.playState.

If the playState property is the PLAYSTATE_PLAY property or the PLAYSTATE_INIT property:

2) Assign the PLAYSTATE_PAUSE property to the playState property.

3) Go to step 4).

If the playState property is the PLAYSTATE_STREAMING_PLAY property or the PLAYSTATE_STREAMING PRELOAD property:

2) Assign the PLAYSTATE_STREAMINGPAUSE property to the playState property.

3) Go to step 4).

Otherwise:

2) Stop this sequence and throw HDDVD_E_INVALIDCALL.

4) Suspend the presentation of Secondary Video Player.

In FIG. 144, "PLAYSTATE_INIT" ("initial setting") corresponds to the startup state STUPST/update state UPDTST in FIG. 32. Therefore, in this embodiment, the "pauseOn" function is valid only during playing or INIT (playback state PBKST or startup state STUPST/update state UPDTST). Therefore, upon starting the API command processing in ST144-1*a*, it is checked in ST144-2*a* if the value of the "playState" property is "PLAYSTATE_PLAY" ("playing") or "PLAYSTATE_INIT" ("initial setting"). If the value of the "playState" property is not "PLAYSTATE_PLAY" or "PLAYSTATE_INIT", it is checked in ST144-4*a* whether or not the value of the "playState" property is "PLAYSTATE_STREAMING_PLAY" ("streaming playing") or "PLAYSTATE_STREAMING_PRELOAD" ("preloading of streaming"). If neither of these conditions are met, an error message is output in ST144-6*a*, and the processing of the "pauseOn" function ends (ST144-8*a*). If it is determined in ST144-4*a* that the value of the "playState" property is "PLAYSTATE_STREAMING_PLAY" ("streaming playing") or "PLAYSTATE_STREAMING_PRELOAD" ("preloading of streaming"), "PLAYSTATE_STREAMING_PAUSE" ("streaming pausing") is set in the "playState" property in ST144-5*a*, and the playback presentation of the secondary video player SCDVP is paused in ST144-7*a*. On the other hand, if it is determined in ST144-2*a* that the value of the "playState" property is "PLAYSTATE_PLAY" ("playing") or "PLAYSTATE_INIT" ("initial setting"), "PLAYSTATE_PAUSE" ("pausing") is set in the "playState" property in ST144-3*a*, and the playback presentation of the secondary video player SCDVP is paused in ST144-7*a*. Immediately after the playback presentation is paused, the end processing of the "pauseOn" function is executed in ST144-8*a* in this embodiment.

<pauseOff>

The pauseOff function is used to resume the Secondary Video presentation from pause state.

Parameters: None

Return Value: None

Exceptions:

HDDVD_E_INVALIDCALL

Detailed processing is as follows:

1) Check the playState property:

If the playState property is the PLAYSTATE PAUSE property:

2) Assign the PLAYSTATE_PLAY property to the playState property.

3) Go to step 4).

If the playState property is the PLAYSTATE_STREAMING_PAUSE property:

2) Assign the PLAYSTATE_STREAMING_PLAY property to the playState property.

3) Go to step 4).

Otherwise:

2) Stop this sequence and throw HDDVD_E_INVALIDCALL.

4) Restart the presentation of Secondary Video Player.

The "pauseOff" function shown in FIG. 145 is valid only when the pause state PSEST of the eight states shown in FIG. 32 as those of the secondary video player SCDVP included in the presentation engine PRSEN in the advanced content playback unit ADVPL shown in FIG. 30 is set. Therefore, immediately after the API command processing starts in ST145-1*b*, it is checked in ST145-2*b* if the value of the "playState" property is "PLAYSTATE_PAUSE" ("pausing"). If the value of the "playState" property does not indicate "pausing", it is checked in ST145-4*b* if the "playState" property is "PLAYSTATE_STREAMING_PAUSE" ("streaming pausing"). At this time, if the "playState" property is neither the "PLAYSTATE_PAUSE" nor "PLAYSTATE_STREAMING_PAUSE", an error message is output in ST145-6*b*, and the processing of the "pauseOff" function ends in ST148-8*b*. By contrast, if the "playState" property is "PLAYSTATE_STREAMING_PAUSE" ("streaming pausing") in ST145-4*b*, "PLAYSTATE_STREAMING_PLAY" ("streaming playing") is set in the value of the "playState" property in ST145-5*b* to restart the playback presentation of the secondary video player SCDVP in ST145-7*b*. On the other hand, referring back to ST145-2*b*, if the value of the "playState" property is "PLAYSTATE_PAUSE" ("pausing"), "PLAYSTATE_PLAY" ("playing") is set in the value of the "playState" property in ST145-3*b* to restart the playback presentation of the secondary video player SCDVP in ST145-7*b*. Immediately after the playback presentation of the secondary video player SCDVP restarts in ST145-7*b*, the processing of the "pauseOff" function ends in ST145-8*b*. In this way, since the processing of the "pauseOff" function ends immediately after the playback presentation of the secondary video player SCDVP restarts, the mapping state (see FIG. 17) of respective playback presentation objects on the title timeline TMLE returns to a default state, as shown in the default state (the object mapping information OBMAPI in the playlist PLLST (see FIG. 24A)). If the playback presentation of the secondary video set SCDVS is to pause with respect to the default state, the API command indicated by the "pauseOn" function shown in FIG. 144 is issued. When the playback presentation processing of the secondary video player SCDVP (see FIG. 30) that plays back the secondary video set SCDVS of this embodiment shown in FIG. 10 is to be stopped, an API command of the "stopSecondaryVideoPlayer" function shown in FIG. 146 need to be issued. FIG. 146 is a flowchart showing the contents of the "stopSecondaryVideoPlayer" function defined as an API command of this embodiment.

<Stop>

The stop function is used to stop the Secondary Video Set presentation.

Parameters: None

Return Value: None

Exceptions:

HDDVD_E_INVALIDCALL

Detailed processing is as follows:

1) Check the playState property.

If the playState property is the PLAYSTATE_PLAY property, the PLAYSTATE_INIT property, the PLAYSTATE_PAUSE property:

2) Go to step 4)

If the playState is the PLAYSTATE_STREAMING PRELOAD property, the PLAYSTATE_STREAMING_PLAY property or the PLAYSTATE_STREAMING_PAUSE property:

2) Stop downloading.

3) Go to step 4).

Otherwise:

2) Stop this sequence and throw HDDVD_E_INVALIDCALL.

4) Assign the PLAYSTATE_STOP property to the playState property.

5) Stop the presentation of Secondary Video Player.

There are eight different states shown in FIG. 32 as those of the secondary video player SCDVP shown in FIG. 30. The API command of the "stopSecondaryVideoPlayer" function shown in FIG. 146 serves its purpose in only of one of the playback state PBKST that means "playing", the startup state STUPST/update state UPDTST that means "initial setting" (INIT: initial state), and the pause state PSEST that represents "pausing". Therefore, upon starting the API command processing in ST146-1*c*, it is checked in ST146-2*c* if the value of the "playState" property is "PLAYSTATE_PLAY" ("playing"), "PLAYSTATE_INIT" ("initial setting"), or "PLAYSTATE_PAUSE" ("pausing"). If the value of the "playState" property indicates a state other than the above states, it is checked in ST146-3*c* if the "playState" property is "PLAYSTATE_STREAMING_PRELOAD" ("streaming preloading"), "PLAYSTATE_STREAMING_PLAY" ("streaming playing"), or "PLAYSTATE_STREAMING_PAUSE" ("streaming pausing"). If neither of the conditions are met, since the "stopSecondaryVideoPlayer" cannot be executed, an error message is output in ST146-5*c*, and the processing ends in ST146-7*c*. If the "playState" property is one of "streaming preloading", "streaming playing", and "streaming pausing" in ST146-3*c*, the download processing of the secondary video set SCDVS to the streaming buffer STRBUF is stopped in ST146-4*c*. As has been explained in the paragraph of the "pauseOn" function in FIG. 144, or as shown in FIG. 163 or 164, when the secondary video set SCDVS is to be temporarily saved in the streaming buffer STRBUF, the loading processing of the secondary video set SCDVS onto the streaming buffer STRBUF and the processing for performing playback presentation of the secondary video set SCDVS to the user by the secondary video player SCDVP can be simultaneously executed parallel to each other. Therefore, upon execution of the "stopSecondaryVideoPlayer" function shown in FIG. 146, the download processing of the secondary video set SCDVS from the network server NTSRV to the streaming buffer STRBUF may be parallelly executed simultaneously with the playback presentation of the secondary video set SCDVS by the secondary video player SCDVP. For this reason, upon execution of the "stopSecondaryVideoPlayer" function shown in FIG. 146, the processing of the secondary video player SCDVP need be stopped to stop the playback presentation of the secondary video set SCDVS to the user, and the download processing need be stopped in ST146-4*c*. After the download processing is stopped in ST146-4*c*, "PLAYSTATE_STOP" ("stop") is set in the "playState" property in ST146-6*c*, and the processing of the "stopSecondaryVideoPlayer" command ends in ST146-7*c*. On the other hand, referring back to the determination condition in ST146-2*c*, if the value of the "playState" property is one of "playing", "initial setting", and "pausing", "PLAYSTATE_STOP" ("stop") is set in the "playState" property in ST146-6*c*, and the processing of the "stopSecondaryVideoPlayer" function ends in ST146-7*c*.

FIGS. 147 and 148 are flowcharts showing the contents of the "getValue" function and "setValue" function defined as API commands in this embodiment. The advanced content playback unit ADVPL included in the information recording and playback unit 1 of this embodiment includes the navigation manager NVMNG, as shown in FIG. 14. The navigation manager NVMNG incorporates a temporary memory (temporary saving area), which can record a general parameter value which is appropriately set according to the advanced content ADVCT. The "getValue" function shown in FIG. 147 is an API command used to acquire the value of a general parameter designated by a specific key. The "setValue" function shown in FIG. 148 is an API command used to save the general parameter value together with the specific key. These API commands are mainly issued in the navigation manager NVMNG. As triggers upon issuing the API commands, in rare cases, a corresponding general parameter value is acquired based on a user operation UOPE, or a general parameter value is set in the temporary memory. However, in many cases, triggers for issuing the API commands are obtained by script processing based on a combination of the markup MRKUP and script SCRPT in the advanced application ADAPL shown in FIG. 14. A practical example corresponds to a case wherein the advanced application ADAPL provides a video game to the user. For example, during playing of the video game by the user, if a score need be incremented or decremented, the value of the score of the user as a result of the increment or decrement must be saved in the temporary memory as the general parameter. In this case, the API command is issued by the processing of the script SCRPT corresponding to the video game, so as to execute processing for reading out the general parameter value or saving the general parameter value. The invention is not limited to the above embodiment. As another application example, the ECMA script processor ECMASP in the advanced application manager ADAMNG shown in FIG. 44 may execute, as a main body, processing based on the following sequence:

1. an event is generated (the event is input to the navigation manager NVMNG);

2. the ECMA script processor ECMASP searches the advanced application manager ADAMNG and file cache FLCCH for a script SCRPT that describes the processing method (function contents) corresponding to the event;

3. the ECMA script processor ECMASP controls to perform execution processing of (a series of) functions in the advanced content playback unit ADVPL in accordance with the contents of the extracted script SCRPT; and 4. the execution processing contents controlled by the ECMA script processor ECMASP follow the flowchart contents for the functions to be described below.

<getValue>

The getValue function is used to get General Parameter that is specified by key.

Parameters:

key of type String Specifies the key string which indicates requested General Parameter Return Value:

value of type String

Returns the information value for assigned key string.

Exceptions:

HDDVD_E_ARGUMENT

Detailed processing is as follows:

1) Check whether the length of the assigned argument key is within valid range.

If the length of key is less or equal to the limit.

2) Go to step 3).

Otherwise:

2) Throw HDDVD E ARGUMENT and return immediately.

3) Check whether the value specified by argument key exists.

If there is the value:

4) Return this value.

Otherwise:

4) Return undefined.

The contents of the "getValue" function in this embodiment will be explained below using FIG. 147.

Upon starting the API command processing in ST147-1*a*, it is checked in ST147-2*a* if the designated key parameter length falls with the valid range. If it is determined that the designated key parameter length exceeds the valid range, an error message is output in ST147-3*a*, and the processing of the "getValue" function ends in ST147-7*a*. On the other hand, if it is determined in ST147-2*a* that the designated key parameter length falls within the valid range, it is checked in ST147-4*a* if the value set as the key parameter is stored. If no value set as the key parameter is stored in the temporary memory in the navigation manager NVMNG, it is determined in ST147-6*a* that the key parameter value is not set, and the processing ends in ST147-7*a*. By contrast, if it is determined in ST147-4*a* that the value set as the key parameter is stored in the temporary memory in the navigation manager NVMNG, that value is read, and the read value is returned to that before issuance of the API command in ST147-5*a*. After that, the processing of the "getValue" function ends in ST147-7*a*.

<SetValue>

The setValue function is used to store value with the specific key.

Parameters:

key of type String

Specifies the key string.

value of type String

Specifies the General Parameter value for assigned key string. When undefined is specified as this parameter, the key shall be removed.

Return Value: None

Exceptions:

HDDVD_E_NOTENOUGHSPACE

HDDVD_E_ARGUMENT

Detailed processing is as follows:

1) Check the number of General Parameter is less than max number of keys.

If it is less than max:

2) Go to step 3).

Otherwise:

2) Throw HDDVD_E_NOTENOUGHSPACE and return immediately.

3) Check assigned arguments key and value within valid length.

If the key and value are valid and value is not undefined:

If the key does not exist in General Parameter:

4) Add the key and value to General Parameters

5) Add 1 to the availableNumber property.

Otherwise:

4) Update this key with assigned value

If the key is valid and value is undefined:

4) Remove this key from General Parameters.

5) Subtract 1 from the availableNumber property.

Otherwise:

4) Throw HDDVD_E_ARGUMENT and return immediately.

FIG. 148 shows the execution method of the "setValue" function defined as an API command in this embodiment. In the "setValue" function, it must be checked first if the contents of the designated key are already defined as a general parameter. If the contents of the designated key are already defined as a general parameter, the designated value is set as the value of the general parameter. However, if contents of the designated key are not defined as a general parameter, a new general parameter is defined. It is then checked if a value to be set in the general parameter is defined. If the value is defined, that value is added; otherwise, processing for deregistering the general parameter is executed. In any case, in the "setValue" function, the general parameter need be added or deleted. In this embodiment, an upper limit value is set for the number of general parameters set in the temporary memory (temporary storage area) used in the navigation manager NVMNG in the advanced content playback unit ADVPL shown in FIG. 14. Therefore, upon repetition of the processing of the advanced content playback unit ADVPL, the number of general parameters to be set in the temporary memory area must be controlled not to exceed the upper limit value. Therefore, upon starting the API command processing in ST148-1*b*, it is checked in ST148-2*b* if the number of general parameters is less than the maximum number of key parameters. At this time, if the number of general parameters is equal to or larger than the maximum number of key parameters, an error message is output in ST148-11*b*, and the processing ends in ST148-12*b*. By contrast, if it is determined in ST148-2*b* that the number of general parameters is less than the maximum number of key parameters, it is checked in ST148-3*b* if the designated key parameter and its value fall within the valid length, and the key parameter value has already been defined. If it is determined in ST148-3*b* that the key parameter value has not already been defined, it is checked in ST148-8*b* if the designated key parameter and its value are valid, and the key value is undefined. If the key value is not valid, since the value cannot be set as a general parameter, an error message is output in ST148-11*b*, and the processing ends (ST148-12*b*). If it is determined in ST148-8*b* that the key value is undefined, the contents of the designated key are excluded from general parameters in ST148-9*b*, and "1" is subtracted from information of the number of available general parameter in ST148-10*b* so as to reduce the number of general parameters set in the temporary memory (temporary storage area). If it is determined in ST148-3*b* that the designated key parameter and its value fall within the valid length, and the key parameter value has already been defined, it is checked in ST148-4*b* if the key contents are included in general parameters. If it is determined in ST148-4*b* that the key contents are not included in general parameters, the key contents and designated key value are added to general parameters in ST148-6*b*, and "1" is added to the information of the number of available general parameters in ST148-7*b*. If the key contents are included in general parameters in ST148-4*b*, the key value is updated to the designated value in ST148-5*b*, and the processing of the "setValue" function then ends in ST148-12*b*.

As shown in FIG. 65, when viewed from the inside of the file cache FLCCH, the process starts from a data deletion time N-EXST from the file cache, and a loading time LOADPE required upon loading specific data into the file cache FLCCH, thus completing download of playback presentation objects required for playback presentation in the file cache FLCCH. After that, an advanced application active period APACPE corresponds to the duration of an activation and use time USEDTM, and after an elapse of an advanced application data save time AVLBLE in the file cache, the process returns to the data deletion time N-EXST from the file cache via data deletion FLCREM from the file cache. The deletion priority upon deleting resource files from the file cache FLCCH has been explained using FIG. 64. As described using FIG. 64, the priority order of deletion (priority) is set, and deletion processing is executed in turn from resource files with higher priority levels in this embodiment. As in this embodiment, since the deletion priority levels are set for respective resource files, unwanted resource files can be efficiently deleted from the file cache FLCCH. Information of the deletion priority order is described in "priority order information PRIORT for corresponding resource deletion" (priority attribute information) in an application resource element APRELE described in the object mapping information OBMAPI in the playlist PLLST, as shown in FIG. 63D. In addition, information of the deletion priority order is described in "priority order information PRIORT for corresponding resource deletion" (priority attribute information) in a title resource element described in resource information RESRCI in the playlist PLLST, as shown in FIG. 66D. FIGS. 149 and 150 show API commands used to read the deletion priority order value for each resource file in the file cache FLCCH and to change its value. The "getPriority" function shown in FIG. 149 of API commands defined in this embodiment is a function used to get the deletion priority order of a resource file in the file cache FLCCH. The "setPriority" function shown in FIG. 150 is an API command used to set the deletion priority order of a resource file in the file cache FLCCH (or to change the value designated in advance in the playlist PLLST). As issuance timings, these API commands are normally issued in the advanced content playback unit ADVPL in the information recording and playback apparatus 1. As shown in FIG. 25, the secondary video set SCDVS or the advanced application ADAPL and advanced subtitle ADSBT saved in the information storage medium DISC, persistent storage PRSTR, or network server NTSRV are often saved in advance in the file cache FLCCH before playback presentation to the user. When the advanced content ADVCT is saved in advance in the file cache FLCCH, the "capture" function shown in FIGS. 106A to 110B or FIG. 126 is issued, thus temporarily saving the advanced content ADVCT in the file cache FLCCH in advance. In this case, as shown in FIG. 14, the required advanced content ADVCT is saved from the saving location of the advanced content ADVCT such as the persistent storage, network server NTSRV, information storage medium DISC, or the like in the file cache FLCCH in the data cache DTCCH via the data access manager DAMNG. At this time, the remaining capacity (free capacity) in the file cache FLCCH may be insufficient, and the capturing processing may not be performed in ST127-4*b* described in FIG. 127. In the embodiment shown in FIG. 127, in such case, after "callback" of "insufficient remaining capacity" is called in ST127-6*b*, the API command processing ends (ST126-9*a*). Upon reception of "callback" of "insufficient remaining capacity" after completion of the "capture" function, the navigation manager NVMNG (see FIG. 14) executes deletion processing of unwanted resource files in the file cache FLCCH in the data cache DTCCH. At this time, the deletion processing is appropriately executed in turn from resource files with higher deletion priority levels based on the aforementioned deletion priority order. When a plurality of resource files having the same deletion priority level value remain undeleted although resource files need be deleted to assure a specific remaining capacity, the navigation manager NVMNG is unable to make a decision about which of resource files is to be deleted first. At this time, the "getPriority" function shown in FIG. 149 is called to read individual deletion priority level information of each resource file to be deleted, and to raise the deletion priority level of a specific resource file based on the description contents in the playlist PLLST. After that, by issuing the "setPriority" function shown in FIG. 150, the deletion priority level of the specific resource file in the navigation manager NVMNG is raised, and the resource file with a highest deletion priority level that remains in the file cache FLCCH in the data cache DTCCH can be deleted based on that deletion priority level. In this manner, the API commands shown in FIGS. 149 and 150 are normally handled in the navigation manager NVMNG, and are used as a part of the systematic processing. The invention is not limited to the above embodiment. As another application example, the ECMA script processor ECMASP in the advanced application manager ADAMNG shown in FIG. 44 may execute, as a main body, processing based on the following sequence:

1. an event is generated (the event is input to the navigation manager NVMNG);
2. the ECMA script processor ECMASP searches the advanced application manager ADAMNG and file cache FLCCH for a script SCRPT that describes the processing method (function contents) corresponding to the event;
3. the ECMA script processor ECMASP controls to perform execution processing of (a series of) functions in the advanced content playback unit ADVPL in accordance with the contents of the extracted script SCRPT; and
4. the execution processing contents controlled by the ECMA script processor ECMASP follow the flowchart contents for the functions to be described below.

FIG. 149 shows the detailed processing contents of the "getPriority" function.

<GetPriority>

The getPriority function is used to get a discarding priority of file in File Cache. Application is able to specify only a file in 'temp' directory under the root directory of File Cache.

Parameters:

uri of type String

Specifies the full URI that indicate file to test. This parameter shall be follow URI rule.

Return Value:

priority of type unsigned int

Returns the priority of specified file.

Valid Range: 0 to 231-1

Exceptions:

HDDVD_E_ARGUMENT

HDDVD_E_FILENOTFOUND

Detailed processing is as follows:

1) Check whether the assigned argument uri is valid or not. "valid" means uri is right format and specified file exists in temp directory in File Cache.

If it is valid:

2) Go to step 3)

Otherwise:

2) Throw HDDVD_E_ARGUMENT and return immediately.

3) Check whether the file specified by uri exists.

If the file exists:

4) Go to step 5)

Otherwise:

4) Throw HDDVD_E_FILENOTFOUND and return immediately.

5) Return the discarding priority of the specified file.

The "getPriority" function is a function used to get the deletion priority level of a resource file in the file cache FLCCH. Upon starting the API command processing in ST149-1*a*, it is checked in ST149-2*a* if the designated URI parameter is described in a correct format, and the designated file is saved in the file cache FLCCH. If the designated file is not saved in the file cache FLCCH, an error message is output in ST149-4*a*, and the processing of the "getPriority" function ends in ST149-5*a*. If it is determined in ST149-2*a* that the designated URI parameter is described in a correct format, and the designated file is saved in the file cache FLCCH, a reply of the deletion priority level of the designated file is made in ST149-3*a*, and the processing of the "getPriority" function then ends in ST149-5*a*.

<SetPriority>

The setPriority function is used to set a discarding priority of file in File Cache. Application is able to specify only a file in 'temp' directory under the root directory of File Cache.

Parameters:

uri of type String

Specifies the full URI that indicate file to set. This parameter shall be follow URI rule.

Specifies the discarding priority of specified file.

Valid Range: 0 to 231-1

Return Value: None

Exceptions:

HDDVD_E_ARGUMENT

HDDVD_E_FILENOTFOUND

Detailed processing is as follows:

1) Check whether the assigned argument uri is valid or not. "valid" means uri is right format and specified file exists in temp directory in File Cache.

If it is valid:

2) Go to step 3)

Otherwise;

2) Throw HDDVD_E_ARGUMENT and return immediately.

3) Check whether the file specified by uri exists.

If the file exists:

4) Go to step 5)

Otherwise:

4) Throw_HDDVD_E_FILENOTFOUND and return immediately.

5) Set the discarding priority to the specified file.

Upon starting the API command processing in ST150-1*b*, it is checked in ST150-2*b* if the designated URI parameter is described in a correct format, and the designated file is saved in the file cache FLCCH. If the designated file is not saved in the file cache FLCCH, an error message is output in ST150-5*b*, and the processing of the "setPriority" function ends in ST150-6*b*. By contrast, if it is determined in ST150-2*b* that the designated URI parameter is described in a correct format, and the designated file is saved in the file cache FLCCH, it is checked in ST150-3*b* if the deletion priority level value of the designated file falls within the valid range. As shown in FIG. 70B, resource files to be temporarily saved in the file cache FLCCH in this embodiment include three different types of resources, i.e., a playlist application resource PLAPRS, title resource TTRSRC, and application resource APRSRC. The resource files to be deleted from the file cache FLCCH currently include the title resource TTRSRC and application resource APRSRC of those described above. The deletion priority level value which can be set for each resource is designated as follows. That is, the value range of the deletion priority level for the title resource TTRSRC is described in the "priority order information PRIORT for corresponding resource deletion" (priority attribute information) in the title resource element described in the resource information RESRCI in the playlist PLLST, as shown in FIG. 66D. As the range to be set, positive numerical values ranging from 0 to 231-1 can be described, and resources with larger values can be deleted first. The valid range for the application resource APRSRC is described in the "priority order information PRIORT for corresponding resource deletion" (priority attribute information) in the application resource element APRELE in the playlist PLLST, as shown in FIG. 63D. As values to be set, positive numerical values ranging from 1 to 231-1 can be described, and resources with larger values can also be deleted first. The valid range of the deletion priority level value in ST150-3*b* is designated in advance as the aforementioned range, and it is checked in ST150-3*b* if the deletion priority level value of the designated file falls within the above range. As a result of checking, if the value falls outside the valid range, an error message is output in ST150-5*b*, and the processing of the "setPriority" function ends in ST150-6*b*. By contrast, if it is determined in ST150-3*b* that the deletion priority level value of the designated file falls within the valid range, the deletion priority level value of the designated file is set in ST150-4*b* (to change the value set in advance in the playlist PLLST). After the above setting change, the processing of the "setPriority" function ends in ST150-6*b*.

The "moveToTop" function shown in FIG. 151 of API commands defined in this embodiment is an API command used to move and present the current application to the frontmost side. The "moveToBottom" function shown in FIG. 152 is an API command used to move and present the current application to the rearmost side. FIG. 16 shows a presentation example of the advanced content ADVCT used in this embodiment. As shown in FIG. 16, in this embodiment, various buttons from the help icon 33 to the FF button 38 which belong to the advanced application ADAPL line up on the lower side. In FIG. 16, the respective buttons are laid out at separate position without overlapping each other. However, depending on the settings of a contents provider, various buttons may be set to partially overlap each other. When various buttons overlap each other in this way, information used to set which of buttons is to be presented on the upper side (front side) is called "Z-order". The "Z-order" value is programmed and set in advance by "Z-order attribute" (Z-index information (zOrder attribute information) in an application segment element APPLSG described in the object mapping information OBMAPI in the playlist PLLST. Such layout order of buttons to be presented to the user can be changed by the "moveToTop" function or "moveToBottom" function. For example, when a plurality of buttons (applications) are presented to partially overlap each other, if a specific button (application) is to be laid out at the frontmost side, the user moves the cursor to the button (application) position to be designated, and designates (focuses) it by double clicking or the like, thus moving the corresponding button (application) to the frontmost side in many cases. Therefore, the "moveToTop" function or "moveToBottom" function shown in FIG. 151 or 152 is executed for a button (application) based on a user operation UOPE to move it to the frontmost side or rearmost side. The processing contents will be described in detail below. As shown in FIG. 14, the information recording and playback apparatus 1 in this embodiment includes the advanced content playback unit ADVPL, which includes the navigation manager NVMNG. When user's input processing is done, the aforementioned information is input to the navigation manager NVMNG as a user operation UOPE. That is, as shown in FIG. 28, the navigation manager NVMNG includes the user interface engine UIENG, which includes the mouse controller MUSCTR. When the user moves the cursor to a specific button (application) position using the mouse and double-clicks the mouse button, the mouse controller MUSCTR issues a user interface event UIEVT to the advanced application manager ADAMNG in response to that operation. When the user interface event UIEVT is issued, the ECMA script processor ECMASP in the programming engine searches the advanced application script ADAPLS, as shown in FIG. 44. As a result, if it is determined that the button (application) designated by the user need be shifted to the frontmost side, information of the "moveToTop" function saved in advance in the advanced application script ADAPLS is read, and the aforementioned API command is transferred to the presentation engine PRSEN or playlist manager PLMNG. In this manner, the "moveToTop" function shown in FIG. 151 is normally issued in the navigation manager NVMNG when a specific button (application) is focused based on the user operation UOPE. The invention is not limited to the above embodiment. As another application example, the ECMA script processor ECMASP in the advanced application manager ADAMNG shown in FIG. 44 may execute, as a main body, processing based on the following sequence:

1. an event is generated (the event is input to the navigation manager NVMNG);

2. the ECMA script processor ECMASP searches the advanced application manager ADAMNG and file cache FLCCH for a script SCRPT that describes the processing method (function contents) corresponding to the event;

3. the ECMA script processor ECMASP controls to perform execution processing of (a series of) functions in the advanced content playback unit ADVPL in accordance with the contents of the extracted script SCRPT; and 4. the execution processing contents controlled by the ECMA script processor ECMASP follow the flowchart contents for the functions to be described below.

<moveToTop>

This function moves the current application to the top of the application z-order.

Parameters: None

Return Value: None

Exceptions: None

Detailed Processing is as follows:

1) Check whether current application is top of z-order. When it is top, return immediately.

2) Change z-order of current Application to top, and subtract one from z-order other application.

3) Application event handling order shall reflect the new z-order immediately. Any events currently in the event queue shall be processed by applications according to the new z-order.

FIG. 151 shows the detailed processing contents of the "moveToTop" function.

Upon starting the API command processing in ST151-1*a*, it is checked in ST151-2*a* if the corresponding application is laid out at the frontmost side in the Z-order. If the corresponding application is laid out at the frontmost side, since the processing of the "moveToTop" function does not make any sense, the processing of the "moveToTop" function ends in ST151-5*a*. By contrast, if it is determined in ST151-2*a* that the corresponding application is not laid out at the frontmost side in the Z-order, the Z-order of the corresponding application is moved to the frontmost side, and the Z-order values of all other applications are decremented by one in ST151-3*a*. In this embodiment, applications with smaller Z-order values are laid out at the rear side, and an application with a largest Z-order value is presented on the front side with respect to the user. Therefore, when a specific application is moved to the frontmost side, the layout order of all other applications which are laid out at the front side of the specific application need to be shifted to the rear side. Therefore, the Z-order values designated in the playlist PLLST for all the corresponding applications are decremented by one to change their positions. After completion of the processing in ST151-3*a*, the application event handling order is reflected in new Z-order values in ST151-4*a*. As shown in FIG. 16, in this embodiment, various applications from the help icon 33 to the FF button 38 which belong to the advanced application ADAPL can be presented side by side in the single markup MRKUP. When the user designates a specific button (in an active state) in the advanced application ADAPL shown in FIG. 16, event information is set for each button (application) to be able to issue the API command in response to that designation. That is, as shown in FIG. 105, a timing element TIMGEL is allocated in a head element HEADEL in the markup MRKUP, an event element EVNTEL is described in that timing element TIMGEL, and an event corresponding to each button (application) can be set using "name" attribute information in the event element EVNTEL. As shown in FIG. 105, the script SCRPT describes, in a descriptive sentence APIFNC of a function in an API command, that a corresponding API command can be issued in response to an event generated in the markup MRKUP. For example, when the user designates a specific button (application), an event is generated by an event element EVNTEL in response to that designation, an event listener EVTLSN monitors that event, and the designated function defined by an API command is executed based on the result. In this case, the "moveToTop" function is described at the position of the function name where the API command is described in the descriptive sentence APIFNC of the function in the API command in the script SCRPT described in FIG. 105. This embodiment is not limited to this. For example, by specifying various API commands designated in FIGS. 106A to 110B in the column of the function name defined by an API command in the descriptive sentence APIFNC of the function in the API command, arbitrary function processing (application event handling) can be taken place. In this embodiment, as shown in FIG. 56D, "advanced application group attribute (index number) information APGRAT" (group attribute information) can be specified in the application segment element APPLSG. By utilizing the value of this information, a plurality of applications having the same value of the "advanced application group attribute (index number) information APGRAT" can be grouped as an identical group, and the plurality of applications in the identical group can simultaneously be transited to an active state. Application event handlings (script SCRPT processing designated by a set of API commands) generated when the plurality of applications in the identical group are simultaneously transited to an active state are executed in the aforementioned order of "Z-order". That is, when a plurality of buttons (applications) overlap each other, the application event handlings (script SCRPT designated by a set of API commands) are executed in turn from a button (application) which is laid out on the front side viewed from the user. Reflecting the order of application event handlings in new Z-order values in ST151-4*a* means that the application event handlings (script SCRPT designated by a set of API commands) are executed in turn based on the order of Z-order sorted in ST151-3*a*. Upon completion of the setting in ST151-4*a*, the processing of the "moveToTop" function ends in ST151-5*a*.

<moveToBottom>

This function moves the current application to the bottom of the application z-order.

Parameters: None

Return Value: None

Exceptions: None

Detailed Processing is same as the moveToTop function, except the difference between going to top and bottom.

The processing contents of the "moveToBottom" function will be explained using FIG. 152. The "moveToBottom" function indicates the contents exactly the opposite to the aforementioned "moveToTop" function. That is, upon starting the API command processing in ST152-1*b*, it is checked in ST152-2*b* if a corresponding application is laid out at the rearmost side in the Z-order. If the application is laid out at the rearmost side, since the "moveToBottom" function does not make any sense, the processing ends in ST152-5*b*. By contrast, if it is determined in ST152-2*b* that the corresponding application is not laid out at the rearmost side in the Z-order, the Z-order of the corresponding application is moved to the rearmost side, and the Z-order values of all remaining applications are incremented by 1 in ST152-3*b*. As described above, an application having a smaller Z-order value is laid out at a rear side. Therefore, when the designated application is laid out at the rearmost side, since the Z-order value of the designated application is set to be a smallest value, the Z-order values of all other applications are incremented by one to shift the applications to the front side. After that, the application event handling order is reflected in new Z-order values in ST152-4*b*. When a plurality of applications, which are grouped, as described above, are simultaneously executed, the application event handlings (script SCRPT based on an API command sequence) are sequentially executed in turn from the front side. Upon completion of the reflecting processing, the processing of the "moveToBottom" function ends in ST152-5*b*. The "link" function shown in FIG. 153 is an API command used upon replacing the currently executed markup page by a linked markup page. As shown in FIG. 104, transition among a plurality of markup files MRKUP is allowed within a valid time APVAPE of an identical advanced application. As shown in FIG. 81A, the manifest file MNFST includes a markup element MRKELE, and a "saving location SRCMRK of a markup file to be used first" (src attribute information) in the markup element MRKELE describes the saving location (path) and file name of a file corresponding to markup (first markup) MRKUP#0 shown in FIG. 104, as shown in FIG. 81D. As for markup MRKUP#1 and markup MRKUP#2, their saving locations and file names are described in a resource element RESELE shown in FIG. 81A. That is, a "saving location SRCRSC of a corresponding resource" (src attribute information) shown in FIG. 81E describes the saving locations (paths) and file names of files of the markup MRKUP#1 and markup MRKUP#2 shown in FIG. 104. Before playback presentation of the corresponding advanced application ADAPL, all pieces of information of markup MRKUP files are saved in advance in the file cache FLCCH. Therefore, transition among the markup files MRKUP can be instantaneously made within the valid time APVAPE of the advanced application shown in FIG. 104 without making the user wait. The "link" function shown in FIG. 153 is mainly programmed in advance in the script SCRPT corresponding to the markup MRKUP. The "link" function is issued according to a program of the script SCRPT, and transition among markup files MRKUP is normally executed. That is, as shown in FIG. 105, the timing element TIMGEL in the head element HEADEL in the markup MRKUP can describe an event element EVNTEL, and "name attribute information" in the event element EVNTEL can set a "name EVNTNM corresponding to an event which can be arbitrarily termed". Along with the progress of the markup MRKUP, when transition between markup files MRKUP takes place, an event is generated in correspondence with the event element EVNTEL. In response to this event, the event listener EVTLSN in the script SCRPT shown in FIG. 105 monitors generation of an event, and executes the "link" function based on the descriptive sentence APIFNC of the function in the API command in the script SCRPT upon generation of the event. In the field of the descriptive sentence APIFNC of the function in the API command in the script SCRPT shown in FIG. 105, in a current use example, "link" is described in the field of the descriptive sentence APIFNC of the function in the API command. In this manner, transition among markup files MRKUP takes place based on the "link" function defined in the script SCRPT. Therefore, the "link" function shown in FIG. 153 has a function of replacing the currently executed markup page with a markup page MRKUP at a link destination. FIG. 153 shows the contents of the "link" function in detail.

<Link>

Replaces the current active mark up page with the page linked to. Destination URI shall be a well formed Markup. When this Markup is not well formed, Player shall not change Markup page. Player shall not wait Markup loading.

Parameters:

uri of type String

The URI of the page to link to. This file shall exist in API Managed Area.

Return Value: None

Exceptions:

HDDVD_E_ARGUMENT

Detailed processing is as follows:

1) Check whether the assignment argument uri is valid format.

If it follow valid format:

2) Start Load Markup sequence.

Otherwise:

2) Throw an exception, HDDVD_E_ARGUMENT.

Load Markup sequence is as follows:

3) Load and validate specified Markup file.

If it is well formed:

2) Change Markup page and call Markup loaded handler. This handler is set by setMarkupLoadedHandler function.

Otherwise:

2) Finish.

Upon starting the API command processing in ST153-1*c*, it is checked in ST153-2*c* if the designated URI information has a valid format. If the designated URI information does not have a valid format, an error message is output in ST153-4*c*, and the control advances to the end processing in ST153-5*c*. If it is determined in ST153-2*c* that the designated URI information has a valid format, a "Load Markup" sequence starts in ST153-3*c*. Upon completion of the "Load Markup" sequence, the processing of the "link" function ends in ST153-5*c*. FIG. 154 shows the processing procedure of the "Load Markup" sequence used in ST153-3*c* in FIG. 153. Upon starting the "Load Markup" sequence in ST154-1*d*, it is checked in ST154-2*d* if the designated markup file is loaded and the loaded markup file is valid. If the designated markup file is loaded and the loaded markup file is invalid, the control directly jumps to the end processing in ST154-4*d*. By contrast, if the designated markup file is loaded and the loaded markup file is valid, the markup page to be presented is replaced, and "markup loaded handler" (setMarkupLoadedHandler) is called in ST154-3*d*. After that, the processing of the "Load Markup" sequence ends in ST154-4*d*, and the control returns to the "link" function shown in FIG. 153. The contents of "markup loaded handler" (setMarkupLoadedHandler) in ST154-3*d* mean an API command that sets a callback function to be called when the current markup page is loaded, as shown in FIGS. 106A to 110B.

As shown in FIG. 57, a big characteristic feature of this embodiment lies in that a plurality of advanced applications ADAPL having information with different languages to be presented are provided with respect to identical contents, and an appropriate advanced application ADAPL is activated from these applications based on the language used by the user and is presented to the user. In the embodiment shown in FIG. 57, a plurality of advanced applications ADAPL are prepared in advance in correspondence with different languages to be presented to the user. However, the invention is not limited to this. For example, a plurality of advanced applications ADAPL are prepared in advance, and an appropriate advanced application ADAPL is activated in accordance with the use conditions of the user and is presented to the user. FIG. 58 shows a method of selecting an advanced application ADAPL to be activated from a plurality of advanced applications ADAPL prepared in advance. Autorun information ATRNAT in ST6.2.3.9-3-2 in FIG. 58 is described in FIG. 56D. That is, the application segment element APPLSG described in the object mapping information OBMAPI in the playlist PLLST in this embodiment includes auto-run information ATRNAT, as shown in FIG. 56D. As shown in ST6.2.3.9-3-2 in FIG. 58 or FIG. 56D, when the time on the title timeline TMLE to be presented to the user falls within the range defined between the start time TTSTTM on the title timeline (titleTimeBegin attribute information) and the end time TTEDTM on the title timeline (titleTimeEnd attribute information), and when the auto-run information ATRNAT is "true", the corresponding advanced application ADAPL is automatically activated. By contrast, when the value of the auto-run information ATRNAT is set to be "false", even when the playback time on the title timeline TMLE falls within the above time range, the corresponding advanced application ADAPL is not activated. At this time, an API command that activates the corresponding advanced application ADAPL is the "activate" function shown in FIG. 155. As described above, when the value of the auto-run information ATRNAT is "true", the corresponding advanced application ADAPL is automatically activated. In this case, when the corresponding advanced application ADAPL is to be inactivated halfway through, the "inactivate" function shown in FIG. 156 is issued to transit the active state of the advanced application ADAPL to an inactive state. Of the API commands defined in this embodiment, the "activate" function has a function of activating a corresponding advanced application ADAPL, and the "inactivate" function has a function of inactivating the corresponding advanced application ADAPL. The "activate" function and "inactivate" function shown in FIGS. 155 and 156 are normally set by the script SCRPT. More specifically, as shown in FIG. 14, the advanced application ADAPL in this embodiment includes the script SCRPT. The script SCRPT is programmed in advance to transit the designated advanced application ADAPL to an active or inactive state based on specific conditions. When the specific conditions are satisfied, the "activate" function or "inactivate" function is issued to transit the corresponding advanced application ADAPL between the active and inactive states. The invention is not limited to the above embodiment. As another application example, the ECMA script processor ECMASP in the advanced application manager ADAMNG shown in FIG. 44 may execute, as a main body, processing based on the following sequence:

1. an event is generated (the event is input to the navigation manager NVMNG);

2. the ECMA script processor ECMASP searches the advanced application manager ADAMNG and file cache FLCCH for a script SCRPT that describes the processing method (function contents) corresponding to the event;

3. the ECMA script processor ECMASP controls to perform execution processing of (a series of) functions in the advanced content playback unit ADVPL in accordance with the contents of the extracted script SCRPT; and 4. the execution processing contents controlled by the ECMA script processor ECMASP follow the flowchart contents for the functions to be described below.

<Activate>

This function is used to activate the application. When this function is called, Player shall activate the this application only if all conditions for application execution are met. Specifically, 1. Application is valid: ie. Title Time>=Title Time Begin and Title Time<Title Time End and 2. Application Segment is selected—current language and group.

If not, Player shall throw an exception, HDDVD_E_INVALIDOPERATION. And this function does not wait the starting of specified Application.

Parameters: None Return

Value: None

Exceptions: HDDVD_E_INVALIDOPERATION

Detailed processing is as follows.

1) Check conditions described in the remarks section, above.

2) If one or more of the conditions described in the Remarks section, above, are not met raise HDDVD_B_INVALIDOPERATION exception and return.

3) If all conditions described in the Remarks section above are met, load application (if not loaded) and begin application execution immediately.

4) Return.

The processing contents of the "activate" function will be described below using FIG. 155.

Upon starting the API command processing in ST155-1*a*, it is checked in ST155-2*a* if the current playback time in the title timeline TMLE has a value equal to or larger than titleTimeBegin, it has a value smaller than titleTimeEnd, and an application segment that matches the current language information and group is selected. "titleTimeBegin" in ST155-2*a* means the start time TTSTTM on the title timeline in the application segment element APPLSG shown in FIG. 54D. Also, "titleTimeEnd" in ST155-2*a* means the end time TTEDTM on the title timeline (titleTimeEnd attribute information) in the application segment element APPLSG shown in FIG. 54D. Furthermore, "a match with the current language information and group" means that the application segment corresponds to the language described in FIG. 57, and that it matches the determination conditions shown in FIG. 58. If the selected application segment does not match such determination conditions, an error message is output in ST155-4$a$, and the processing of the "activate" function ends in ST155-5$a$. By contrast, if all the determination conditions in ST155-2$a$ are satisfied, and if a corresponding advanced application ADAPL is not downloaded yet, the corresponding advanced application ADAPL is downloaded and is activated in ST155-3$a$. Immediately after the corresponding advanced application ADAPL is activated, the processing of the "activate" function ends in ST155-5$a$. The contents of the "inactivate" function will be described below using FIG. 156.

<Inactivate>

This function is used to inactivate the application. The function does not alter the auto run property of the application in the Play list. The function is not able to inactivate the Play list Application.

Parameters: None

Return Value: None

Exceptions: HDDVD_E_INVALIDOPERATION

Detailed processing is as follows:

1) Check if application is currently executing, if not running, raise

HDDVD_E_INVALIDOPERATION exception and exit immediately.

2) Check if application is the Play list Application, if it is, raise HDDVD_E_INVALIDOPERATION exception and exit immediately.

3) If application is currently active, begins the application shutdown process.

4) Return.

Upon starting the API command processing in ST156-1$b$, it is checked in ST156-2$b$ if the corresponding advanced application ADAPL is currently active. If the corresponding advanced application ADAPL is currently "inactive", an error message is output in ST156-4$b$, and the processing ends in ST156-5$b$. If it is determined in ST156-2$b$ that the corresponding advanced application ADAPL is currently active, shutdown processing of the current application is executed in ST156-3$b$ to "inactivate" it. Immediately after the corresponding advanced application ADAPL is "inactivated", the processing of the "inactivate" function ends in ST156-5$b$.

As shown in FIG. 16, in this embodiment, the help icon 33 to the FF button 38, which belong to the advanced application ADAPL, are laid out side by side, and can be designated from the user. In the embodiment shown in FIG. 16, the respective buttons (applications) are avoided from overlapping neighboring buttons (applications). Alternatively, depending on the window design of a contents provider, the sizes of the help icon 33 to the FF button 38 may be increased, and the respective buttons (applications) may be presented to partially overlap each other. When a plurality of buttons (or presentation windows of applications) partially overlap each other, "Z-order" is set as a parameter indicating which of buttons is to be presented on the front side in this embodiment. That is, in the embodiment shown in FIG. 16, "Z-order" values are set for various buttons (or presentation windows of applications), i.e., the help icon 33 to the FF button 38, when these buttons (or the presentation windows of the advanced applications ADAPL) overlap each other, a button with a larger "Z-order" value can be set to be presented on the front side. In this embodiment, the "Z-order" value can be set in advance in the playlist PLLST. That is, as shown in FIG. 56, in this embodiment, the playlist PLLST includes the object mapping information OBMAPI, which can describe the application segment element APPLSG that indicates management information for each advanced application ADAPL. As shown in FIG. 56D, the application segment element APPLSG can describe the value of Z-order attribute (Z-index) information ZORDER. With this information, a unique "Z-order" value can be set for each advanced application ADAPL. In this way, "Z-order" values are defined in advance in the playlist PLLST for respective advanced applications ADAPL. When the "Z-order" value defined in advance is to be changed, the "Z-order" value which is set in advance can be changed by issuing the "moveBefore" function or "moveAfter" function shown in FIG. 157 or 158. That is, the "moveBefore" function has a function of shifting the designated application to a position immediately before a target application. The "moveAfter" function serves to shift the designated application to a position immediately after the target application. Of both of these API commands, the application event handling order is set based on new "Z-order" values set after issuance of the API command. As shown in FIG. 56D, the application segment element APPLSG can describe "advanced application group attribute (index number) information APGRAT" (group attribute information). All advanced applications ADAPL set with the same value of the "advanced application group attribute (index number) information APGRAT" (group attribute information) form an identical group. When a specific group is activated by, e.g., a user input or the like, all the advanced applications ADAPL which belong to that group are activated at the same time. At that time, in the application event handling order which is used to invoke activation in practice and is set according to new "Z-order" values which are set after the "moveBefore" function or "moveAfter" function is issued, the application event handlings begin to be activated in turn from the front side viewed from the user. The execution contents of the "moveBefore" function will be described below using FIG. 157.

<moveBefore>

Moves the z-order of the application identified to before the z-order of the target application.

Parameters:

target of type AdvancedApplication indicates the z-order of the target application Return Value: None Remarks: Insert before refers to insertion numerically before the target application.

Ex. 1 application calling method on currently has a z-order of 3, applicationTarget has a z-order of 6. Calling this method on application changes it's z-order to 5, all others are re-ordered to accommodate.

Ex. 2 application y calling method on currently has a z-order of 6, applicationTarget has a z-order of 3. Calling this method on application changes its z-order to 3, and z-order of applicationTarget to 4, all others are re-ordered to accommodate.

Exceptions:

HDDVD_E_ARGUMENT

HDDVD_E_INVALIDOPERATION

Detailed Processing is as follows:

1) Compare z-order of current application to z-order of targetApplication in Navigation Manager.

2) If parameter is invalid, raise HDDVD_E ARGUMENT exception.

3) If the zOrder property of targetApplication object is NaN, raise HDDVD E INVALIDOPERATION exception.

4) If z-orders are equal, exit.

5) If z-orders are different, change z-order of current application to targetApplication −1, re-order other application's z-orders if necessary to accommodate.

6) The change in z-order is instantaneous upon execution of the moveBefore call. Application event handling order shall reflect the new z-order immediately upon execution of the moveBefore call. Any events currently in the event queue shall be processed by applications according to the new z-order.

Upon starting the API command processing in ST157-1*a*, it is checked in ST157-2*a* based on the comparison result of Z-order values of an application designated by the navigation manager NVMNG (see FIG. 14) and a target application if the Z-order values of the two applications are valid, and the Z-order value of the target application is not an upper limit value. If either of the Z-order values of the two applications is invalid, or if the Z-order value of the target application is an upper limit value, an error message is output in ST157-3*a*, and the processing of the "moveBefore" function ends in ST157-8*a*. By contrast, if it is determined in ST157-2*a* that the Z-order values of both the designated application and the target application are valid, and the Z-order value of the target application is not an upper limit value, it is checked in ST157-4*a* if the Z-order values of the designated application and the target application are not equal to each other. If the Z-order values of the two applications are equal to each other, the processing immediately ends in ST157-8*a*. If it is determined in ST157-4*a* that the Z-order values of the designated application and the target application are not equal to each other, the Z-order value of the designated application is changed to a value larger by "1" than that of the target application in ST157-5*a*. Upon completion of the processing in ST157-5*a*, it is checked in ST157-6*a* if the Z-order values of other applications are required. If the Z-order values of other applications are not required, the control immediately advances to the end processing in ST157-8*a*; if it is determined in ST157-6*a* that the Z-order values of other applications are required, the Z-order values of required other applications are changed in ST157-7*a*, and the processing of the "moveBefore" function ends in ST157-8*a*. The processing contents of the "moveAfter" function will be described below using FIG. 158.

<moveAfter>

Moves the z-order of the application to after the z-order of the target application.

Parameters:

target of type AdvancedApplication indicates the z-order of the target application Return Value: None Remarks: Insert after refers to insertion numerically after the target application.

Ex. 1 application currently has a z-order of 3, applicationTarget has a z-order of 6. Calling this method on application changes it's z-order to 6. All other application's z-orders are re-ordered to accommodate.

Ex. 2 application currently has a z-order of 6, applicationTarget has a z-order of 3. Calling this method on application changes its z-order to 4, all others are re-ordered to accommodate.

Exceptions:

HDDVD_E_ARGUMENT

HDDVD_E_INVALIDOPERATION

Detailed Processing is as follows:

1) Compare z-order of current application to z-order of targetApplication in Navigation Manager.

2) If parameter is invalid, raise HDDVD E ARGUMENT exception.

3) If the zOrder property of targetApplication object is NaN, raise HDDVD E INVALIDOPERATION exception.

4) If z-orders are equal, exit.

5) If z-orders are different, change z-order of current application to targetApplication +1, re-order other application's z-orders if necessary to accommodate.

6) The change in z-order is instantaneous upon execution of the moveAfter call. Application event handling order shall reflect the new z-order immediately upon execution of the moveAfter call. Any events currently in the event queue shall be processed by applications according to the new z-order.

Upon starting the API command processing in ST158-1*b*, it is checked in ST158-2*b* based on the comparison result of Z-order values of an application designated by the navigation manager NVMNG (see FIG. 14) and a target application if the Z-order values of the two applications are valid, and the Z-order value of the target application is not a lower limit value. If either of the Z-order values of the two applications is invalid, or if the Z-order value of the target application is a lower limit value (ST158-2*b*), an error message is output in ST158-3*b*, and the processing of the "moveAfter" function ends in ST158-8*b*. If it is determined in ST158-2*b* that the Z-order values of both the designated application and the target application are valid, and the Z-order value of the target application is not a lower limit value, it is checked in ST158-4*b* if the Z-order values of the designated application and the target application are not equal to each other. If the Z-order values of the two applications are equal to each other, the processing immediately ends in ST158-8*b*. By contrast, if it is determined in ST158-4*b* that the Z-order values of the designated application and the target application are not equal to each other, the Z-order value of the designated application is changed to a value smaller by "1" than that of the target application in ST158-5*b*. Upon completion of the processing in ST158-5*b*, it is checked in ST158-6*b* if the Z-order values of other applications are required. If the Z-order values of other applications are not required, the control immediately advances to the end processing in ST158-8*b*; if it is determined in ST158-6*b* that the Z-order values of other applications are required, the Z-order values of required other applications are changed in ST158-7*b*, and the processing of the "moveAfter" function ends in ST158-8*b*.

As shown in FIG. 14, the entire playback management information of the advanced content ADVCT in this embodiment is integrated in the playlist PLLST. Also, the management information of playback presentation associated with the advanced application ADAPL in the advanced content ADVCT is configured by the playlist PLLST, markup MRKUP, script SCRPT, and the like. As shown in FIG. 83F or FIG. 84A, in this embodiment, the playlist PLLST is described by an "XML" description method. Also, as shown in FIG. 92F or 102B(e), the contents of the markup MRKUP are described by the "XML" description method. The advanced content playback unit ADVPL included in the information recording and playback apparatus 1 in this embodiment incorporates the navigation manager NVMNG, as shown in FIG. 14. The navigation manager NVMNG includes the parser PARSER, as shown in FIG. 28. The parser PARSER parses the description contents of "XML", and sends the parsing result to the playlist manager PLMNG or advanced application manager ADAMNG. In this embodiment, especially, the parser PARSER transfers the "XML" parsing result of the playlist PLLST to the playlist manager PLMNG, and transfers the "XML" parsing result of the markup MRKUP to the advanced application manager ADAMNG. In this embodiment, the playlist PLLST and markup MRKUP are recorded in advance in the persistent storage PRSTR, network server NTSRV, or information storage medium DISC, as shown in FIG. 14. The recorded playlist PLLST and markup MRKUP are transferred into the navigation manager NVMNG via the data access manager DAMNG, as shown in FIG. 14. In the navigation manager NVMNG, the parser PARSER parses "XML" description documents associated with the transferred playlist PLLST and markup MRKUP. A command for "XML" parsing of the parser PARSER corresponds to the "parse" function shown in FIG. 159. As shown in FIG. 28, upon reception of the "parse" function, the parser PARSER executes "XML" parsing processing according to the flowchart shown in FIG. 159. That is, the "parse" function defined as an API command in this embodiment executes processing for loading an "XML" document into the file cache FLCCH, and parsing its contents.

<Parse>

The parse function asynchronously loads a XML Document from the specified file and parses to DOM Document object. The parse function shall not validate the document. This function shall return immediately without waiting for the stream data, or parsing.

Parameters:

uri of type String

Specifies uri of the file name from which XML Document is loaded. The XML Document is able to be loaded only from the API Managed Area of File Cache, Disc, or Provider ID directory in Persistent Storage. This parameter shall be follow URI rule.

callback of type Function

Specify the callback function for the state change. The function shall be the following interface:

void callback (status: int, document: Document);

Parameters:

status of type int:

The status parameter is set XMLParser.OK if parsing is successes. Otherwise it is set to XMLParser.PARSING_ERR.

XMLParser. FILE_NOT_FOUND_ERR if the file is not found XMLParser. FILECACHE_ERR if the file cache copy is failed because, it has no enough space, or same file is exist XMLParser.PARSING_ERR if the file is not well-formed.

document of type Document:

The document parameter is set to the result DOM Document object of type Document if parsing is successes. Otherwise it is set to null.

Return Value: None

Exceptions:

HDDVD_E_INVALIDOPERATION

HDDVD_E_ARGUMENT

Detailed processing is as follows:

If the uri is invalid 1) throw HDDVD_E_ARGUMENT

If XMLParser current status is not XMLParser.READY, then 2) throw the HDDVD_E_INVALIDOPERATION error.

3) Set the XMLParser current status to XMLParser.PARSING.

4) Create an Document object document of type Document which is empty document.

5) Start Parsing sequence to parse asynchronously.

6) Return

Parsing sequence is as follows:

If the uri is on File Cache:

1) Open the file specified uri

If open is failed:

2) Go to 24)

Otherwise

If the 'file:///filecache' has a file with same filename indicated by uri

4) Go to 28)

5) Copy file specified uri into 'file:///filecache/'

If the copy is failed by not found:

6) Go to 24)

If the copy is failed by file cache full:

7) Go to 28)

8) Open the copied file

9) Read chunk of stream data from the file, and incrementally parse the read chuck into document object.

If read data, or incremental parsing is failed,

10) Go to 19)

If the file has more data:

11) Go to 9)

12) Check the parsing is succeeded

If the file is well-formed, and parsing is succeeded

13) Remove the copied file if exist:

14) Call callback with parameter as:

callback (XMLParser.OK,document);

15) Set the XML Parser current status to XML.Parser.READY

16) Close the file

17) Stop the Parsing sequence.

Otherwise:

18) Go to 19)

(Parse Error)

19) Remove the copied file if exist:

20) Call callback with parameter as:

callback (XMLParser. PARSE_ERR, null);

21) Set the XML Parser current status to XML.Parser.READY

22) Close the file

23) Stop the Parsing sequence.

(File open error)

24) Remove the copied file if exist

25) Call callback function with parameter as:

callback (XMLParser. FILE_NOT_FOUND_ERR, null);

26) Set the XML Parser current status to XMT.Parser.READY

27) Stop the Parsing sequence.

(File cache copy error)

28) Remove the copied file if exist

29) Call callback function with parameter as:

callback (XMLParser. FILECACHE_ERR, null);

30) Set the XML Parser current status to XML.Parser.READY

31) Stop the Parsing sequence.

The processing contents of the "parse" function will be described below using FIG. 159. Upon starting the processing of the "parse" function in ST159-1*a*, it is checked in ST159-2*a* if the description format of a URI associated with an XML document is correct. If it is determined in ST159-2*a* that the description format of the URI is incorrect, an error message is output ST159-7*a*, and the processing of the "parse" function ends in ST159-8*a*. If it is determined based on the determination condition in ST159-2*a* that the description format associated with the XML document is correct, it is checked in ST159-3*a* if preparation of the parser PARSER (see FIG. 28) is complete. If preparation of the parser PARSER in the navigation manager NVMNG shown in FIG. 30 is not complete, an error message is output ST159-7*a*, and the processing ends in ST159-8*a*. If it is confirmed based on the determination condition in ST159-3*a* that preparation of the parser PARSER is complete, the current status of the XML parser PARSER is set to be "XMLParser.PARSING" ("parsing") in ST159-4*a*, and a document used to save data after parsing is created in ST159-5*a*. In the state in ST159-5*a*, the document used to save data after parsing is empty since parsing is not done currently. After that, a "Parsing" sequence starts in ST159-6*a* to asynchronously execute parsing processing. Upon completion of the "Parsing" sequence in ST159-6*a*, the processing of the "parse" function ends in ST159-8*a*. FIGS. 160A and 160B shows the detailed processing contents in the "Parsing" sequence in ST159-6*a*. The "Parsing" sequence shown in FIGS. 160A and 160B executes processing for parsing an XML document before parsing, which is saved in the file cache FLCCH, and saving the parsing result in the file cache FLCCH. Therefore, in the "Parsing" sequence, the XML document to be parsed need be saved in the file cache FLCCH in advance. Furthermore, after completion of parsing of the XML document or after completion of the "Parsing" sequence, the XML document to be parsed need be deleted from the file cache FLCCH, and the status of the XML parser PARSER (see FIG. 28) need be set to be "preparation completion". The detailed processing contents shown in FIGS. 160A and 160B will be described below. Upon starting the "Parsing" sequence in ST160-1*b*, it is checked in ST160-2*b* if the designated URI designates a file in the file cache FLCCH. If it is determined in ST160-2*b* that the designated URI designates media other than the file cache FLCCH, it is checked in ST160-7*b* if a file having the same file name as that of the XML document to be parsed designated by the URI is already stored in the file cache FLCCH. If it is determined in ST160-7*b* that the file having the same file name as that of the XML document to be parsed designated by the URI is already stored in the file cache FLCCH, a copy file stored in the file cache FLCCH is deleted from the file cache FLCCH in ST160-22*b*, and "callback" of "file cache copy error" ("FILECACHE_COPY_ERR") is called in ST160-23*b*. After that, the current status of the XML parser PARSER is set to be "XMLParser.READY" in ST160-24*b* to indicate "preparation completion", and the processing of the "Parsing" sequence ends in ST160-25*b*. Unlike such case, if it is determined in ST160-7*b* that no file having the same file name as that of the XML document to be parsed designated by the URI is stored in the file cache FLCCH, a file designated by the URI is copied into the file cache FLCCH in ST180-8*b*. As has already been described above, the "Parsing" sequence executes processing for saving the XML document to be parsed in advance in the file cache FLCCH, and saving its parsing result in the file cache FLCCH. In this way, the reliability of access to an XML document to be parsed, which is being processed by the XML parser PARSER, improves, and smooth XML parsing can be guaranteed. This is because when, for example, an XML document to be parsed is stored on the network server NTSRV, a network line error may occur during parsing of the XML document, and information of the XML document in the middle of parsing cannot be acquired. In such case, it is impossible to attain stable XML parsing on the XML parser PARSER. Therefore, in this embodiment, the XML document to be parsed is copied in advance into the file cache FLCCH in ST160-8*b*. In this case, an XML document which describes the playlist PLLST and markup MRKUP shown in FIG. 14 is saved in the persistent storage PRSTR, network server NTSRV, or information storage medium DISC, which is designated by the URI. When the XML document to be parsed is copied into the file cache FLCCH in ST160-8*b*, (the parser PARSER in) the navigation manager NVMNG issues a file copy instruction to the data access manager DAMNG and data cache DTCCH, as shown in FIG. 14. Based on the instruction, the data access manager DAMNG reads data from the location (path) designated by the URI in the persistent storage PRSTR, network server NTSRV, or information storage medium DISC, and transfers the read XML document to be parsed into the file cache FLCCH in the data cache DTCCH. At this time, the data access manager DAMNG controls to save a copy file of the XML document to be parsed at a predetermined location in the file cache FLCCH. After the series of processes, it is checked in ST160-9*b* if the copy processing of the XML document to be parsed has succeeded. If it is determined in ST160-9*b* that the copy processing into the file cache FLCCH has failed, it is checked in ST160-10*b* if a file which was to be copied is not found in the file cache FLCCH. If no file which was to be copied into the FLCCH is stored in the file cache FLCCH (ST160-10*b*), "callback" of "no file" ("FILE_NOT_FOUND_ERR") is called in ST160-21*b*. After that, the current status of the XML parser PARSER is set to be "XMLParser.READY" in ST160-24*b* to indicate "preparation completion", and the processing of the "Parsing" sequence ends in ST160-25*b*. The control then returns to the "parse" function shown in FIG. 159. By contrast, as the reason for the copy failure of the XML document to be parsed into the file cache FLCCH as the determination result in ST160-9*b*, except for the absence of a copied file in the file cache FLCCH in ST160-10*b*, it is checked in ST160-11*b* if the copying processing has failed due to an insufficient remaining capacity of the file cache FLCCH. If the determination condition in ST160-11*b* is met, i.e., the copying processing has failed due to an insufficient remaining capacity of the file cache FLCCH, and if a copy file is already stored in the file cache FLCCH, that copy file is deleted from the file cache FLCCH in ST160-22*b*, and "callback" of "file cache copy error" ("FILECACHE_COPY_ERR") is called in ST160-23*b*. After that, the current status of the XML parser PARSER is set to be "XMLParser.READY" in ST160-24*b* to indicate "preparation completion", and the processing of the "Parsing" sequence ends in ST160-25*b*. If a cause for the copy failure of the XML document to be parsed into the file cache FLCCH in the determination condition in ST160-9*b* is neither a mismatch of the condition of the absence of the copied file in the file cache FLCCH in ST160-10*b* nor a copy failure due to an insufficient remaining capacity in the file cache FLCCH in ST160-11*b*, "callback" of "file cache copy error" ("FILECACHE_COPY_ERR") is called in ST160-23*b*. After that, the current status of the XML parser PARSER is set to be "XMLParser.READY" in ST160-24*b* to indicate "preparation completion", and the processing of the "Parsing" sequence ends in ST160-25*b*. Meanwhile, if a document file of the XML document to be parsed designated by the URI is copied into the file cache FLCCH in ST160-8*b*, and the copying processing has succeeded in ST160-9*b*, the copied file is opened in ST160-12*b*. After that, some stream data (data in the XML document to be parsed) are read from the opened file in ST160-4*b*, their contents are parsed sequentially, and the parsing result is stored in the document created in ST159-5*a*. In the parsing processing, if reading of data from the opened file or parsing has failed in ST160-5*b*, the copy file of the XML document to be parsed which is already stored in the file cache FLCCH is deleted from the file cache FLCCH in ST160-18*b*, and "callback" of "parsing error" ("PARSE_ERR") is then called in ST160-19*b*. After that, the current status of the XML parser PARSER is set to be "XMLParser.READY" in ST160-16*b* to indicate "preparation completion", and the document file of the parsing result is closed in ST160-17*b*. Immediately after the file is closed, the processing of the "Parsing" sequence ends in ST160-25*b*. If reading of data from the opened file or parsing has succeeded in ST160-5*b*, it is checked in ST160-6*b* if data to be parsed still remain in the copy file of the XML document to be parsed. If data to be parsed still remain, the parsing processing is continued. By contrast, if it is determined in ST160-6*b* that no data to be parsed remains in the copy file of the XML document to be parsed, it is checked in ST160-13*b* if the data in the coy file of the XML document to be parsed, which is copied into the file cache FLCCH and is opened, are described in a correct format, and parsing has succeeded. If the data are not described in a correct format and parsing has failed in ST160-13*b*, the copy file of the XML document, which is already stored in the file cache FLCCH, is deleted from the file cache FLCCH in ST160-18*b*, and "callback" of "parsing error" ("PARSE_ERR") is then called in ST160-19*b*. By contrast, if it is determined in ST160-13*b* that the data in the coy file of the XML document to be parsed, which is copied into the file cache FLCCH and is opened, are described in a correct format, and parsing by the parser PARSER has succeeded, the copy file of the XML document to be parsed, which is copied in the file cache FLCCH, is deleted in ST160-14*b*. As shown in FIGS. 160A and 160B, the XML document including the playlist PLLST, manifest MNFST, markup MRKUP, and the like is temporarily saved in the file cache FLCCH, and is parsed. However, this embodiment is not limited to this. As shown in FIG. 25, the file cache FLCCH also temporarily saves files of the secondary video set SCDVS, advanced application ADAPL, advanced subtitle ADSBT, and the like. Therefore, upon completion of parsing in ST160-14*b*, the copy file of the XML document to be parsed is deleted from the file cache FLCCH, thus allowing effective use of the file cache FLCCH. Upon completion of the processing in ST160-14*b*, "callback" of "parsing completion" (XMLParser.OK) is called in ST160-15*b*. After that, the status of the XML parser PARSER is set to be "XMLParser.READY" in ST160-16*b* to indicate "preparation completion". The document file that stores the parsing result is closed in ST160-17*b*, and the processing of the "Parsing" sequence ends in ST160-25*b*. The control then returns to the "parse" function shown in FIG. 159.

As shown in FIG. 25, a big characteristic feature lies in that some data of the secondary video set SCDVS, advanced application ADAPL, and advanced subtitle ADSBT are temporarily saved in the file cache FLCCH before playback presentation to the user. After that, the saved data are transferred from the file cache FLCCH to the secondary video player SCDVP, advanced application presentation engine AAPEN, and advanced subtitle player ASBPL, thus playing back and presenting these data to the user. By contrast, as shown in FIG. 25, a big characteristic feature of this embodiment lies in that some data of the secondary video set saved in the network server NTSRV are temporarily saved in the streaming buffer STRBUF. After that, data are transferred from the streaming buffer STRBUF to the secondary video player SCDVP, thus playing back and presenting the secondary video set SCDVS to the user.

FIGS. 161 to 163 show buffer models upon temporarily saving data in the file cache FLCCH or streaming buffer STRBUF.

A period used upon loading data to the file cache FLCCH in advance is called a loading period LOADPE, as shown in FIG. 64, which is set prior to the advanced application active period APACPE, as shown in FIG. 65. The loading periods LOADPE shown in FIGS. 161, 162, and 163 indicate the same contents as those of the aforementioned loading period LOADPE. In FIGS. 161 to 163, the horizontal axis plots an elapsed time period TIME with reference to the target resource capturing start time PRLOAD on the title timeline, and the vertical axis plots a saved data size FCOCUP in the file cache FLCCH or a saved data size SBOCUP in the streaming buffer STRBUF. The information of the "target resource capturing start time PRLOAD on the title timeline" is described in a "playback presentation object capturing start time PRLOAD on the title timeline" (preload attribute information) in the substitute audio video clip element SBAVCP or substitute audio clip element SBADCP described in the object mapping information OBMAPI in the playlist PLLST, as shown in FIGS. 54C and 54D, and is also described in a "playback presentation object capturing start time PRLOAD on the title timeline" (preload attribute information) in the secondary audio video clip element SCAVCP described in the object mapping information OBMAPI in the playlist PLLST, as shown in FIG. 54D. When the target playback presentation object is the advanced application ADAPL or advanced subtitle ADSBT, the information of the "target resource capturing start time PRLOAD on the title timeline" shown in FIGS. 161 to 163 is described in a "target resource capturing (loading) start time PRLOAD on the title timeline" (loadingBegin attribute information) allocated in the advanced subtitle segment element ADSTSG or application segment element APPLSG described in the object mapping information OBMAPI in the playlist PLLST, as shown in FIG. 63. An "activation period start time ACSTTM" and "activation time end time ACEDTM" shown in FIGS. 161 and 162 match the "start time TTSTTM on the title timeline" (titleTimeBegin attribute information) and "end time TTEDTM on the title timeline" (titleTimeEnd attribute information) described in the advanced subtitle segment element ADSTGS or application segment element APPLSG shown in FIGS. 56C and 56D. A period sandwiched between the "activation period start time ACSTTM" and "activation time end time ACEDTM" shown in FIGS. 161 and 162 corresponds to the advanced application active period APACPE. Furthermore, a start time TTSTTM on the title timeline shown in FIG. 163 corresponds to not only the "start time TTSTTM on the title timeline" (titleTimeBegin attribute information) described in the substitute audio video clip element SBAVCP or substitute audio clip element SBADCP shown in FIGS. 54C and 54D, but also the "start time TTSTTM on the title timeline" (titleTimeBegin attribute information) described in the secondary audio video clip element SCAVCP shown in FIG. 54D. Moreover, information of an allowable minimum value NTTRPT of the network throughput described in FIGS. 162 and 163 is described in allowable minimum value information NTTRPT of the network throughput (networkThroughput attribute information) in a network source element NTSELE described in the object mapping information in the playlist PLLST, as shown in FIG. 63C. As shown in FIG. 161 or 162, a big characteristic feature of this embodiment lies in that when data is temporarily saved in the file cache FLCCH, playback presentation of a playback presentation object to the user starts only after a time margin TIMMRG is assured upon temporary saving (loading) is completed. By contrast, as shown in FIG. 163, a big characteristic feature of this embodiment also lies in that when data is temporarily saved on the streaming buffer STRBUF, playback presentation of a playback presentation object to the user can start before completion of temporary saving (loading) of data in the streaming buffer STRBUF. The detailed contents of the drawings shown in FIGS. 161 to 163 will be explained below.

<Buffer Model for Complete Downloading (File Cache)>

For complete download scheduling, the behavior of File Cache is completely specified by the following data input/output model and action timing model.

Data Input/Output Model

Data input rate for single session is equal to the minimum throughput of the player (networkThroughput). If there are two or more sessions, data input rate is not specified.

The downloaded data is removed from the File Cache when the application valid period ends. This rule is used only for download scheduling.

Action Timing Model

Download start time is defined as follows:

When the download trigger is Playlist, download starts at the time specified by loadingBegin attribute of TitleResource or ApplicationResource element. If loadingBegin attribute is not present in the element, download shall start at the start time of the valid period of the element.

When the download trigger is Script (Network APIs), download starts at the time the script for downloading is evaluated.

Presentation start time is defined as follows:

When the download trigger is Playlist, presentation starts at the time specified by titleTimeBegin attribute if the download of the resource has completed. If the download has not completed, the behavior depends on the resource attribute.

When the download trigger is Script (Network APIs), presentation starts when the download completes.

If an Advanced Application is scheduled to be active at the beginning of its valid period, network access shall be scheduled so that downloading completes before the valid period. This condition is equivalent to the condition that the time-margin calculated by the following formula is positive.

time_margin=(valid_period start_time−download-start-time−data size)/networkThroughput Here, time-margin is a margin for absorbing network throughput variation.

As shown in FIG. 161, upon temporarily saving (loading) data in the file cache FLCCH, loading into the file cache FLCCH must be completed before playback presentation to the user, as described above. In order to completely finish download, as described above, buffer processing need be executed in the file cache FLCCH based on a data input/output model and activation timing model to be described below.

A) Data Input/Output Model

The transfer rate of data input to the file cache FLCCH matches the "allowable minimum value NTTRPT of the network throughput".

As shown in FIG. 65 or 64, after completion of the activation and use time USEDTM for the advanced application ADAPL, resource files (downloaded data) used by the completed advanced application ADAPL must be deleted from the file cache FLCCH.

B) Activation Timing Model

The download start time is defined under the following conditions.

If the download start timing is given by the playlist PLLST, the download start time is designated by loadingBegin attribute information described in the title resource element or application resource element APRELE. As described above, as shown in FIG. 63D, the information is described in the "target resource capturing (loading) start time PRLOAD on the title timeline" (loadingBegin attribute information) in the application resource element APRELE described in the object mapping information OBMAPI in the playlist PLLST. As shown in FIG. 66D, this information is also described in the "target resource capturing (loading) start time PRLOAD on the title timeline" (loadingBegin attribute information) in the title resource element in the resource information RESRCI. If no loadingBegin attribute information is described in the application resource element APRELE or title resource element, download starts from the start time of the valid period of the corresponding application resource element APRELE or title resource element.

If the download timing is given in the script SCRPT (for example, if download is executed based on the "capture" function shown in FIG. 126 or FIGS. 106A to 110B), the download start time corresponds to an activation time period of the "capture" function.

The playback presentation start time is defined as follows.

If a download trigger is designated by the playlist PLLST, the playback presentation start time is designated by the "titleTimeBegin attribute information" as download of resource files into the file cache FLCCH is complete. That is, as described above, this time means the start time TTSTTM on the title timeline (titleTimeBegin attribute information) in the advanced subtitle segment element ADSTSG or application segment element APPLSG, as shown in FIG. 56C or 56D. If saving of resource files in the file cache FLCCH is not complete even at the start time TTSTTM on the title timeline (titleTimeBegin attribute information), the following processing method is adopted. That is, processing in such case is done according to the value set in synchronization attribute information SYNCAT (sync attribute information) of a playback presentation object in the advanced subtitle segment element ADSTSG or application segment element APPLSG shown in FIG. 56C or 56D. The processing method will be described later in detail using FIGS. 166 and 167.

If a download trigger is based on the script SCRPT (API commands shown in FIGS. 106A to 110B), playback presentation starts immediately after download of source files (source data) in the file cache FLCCH is finished.

As shown in FIG. 161, when the advanced application begins to be activated from the activation period start time ACSTTM, data access control to the network server NTSRV must be made so as to complete download into the file cache FLCCH before the advanced application activation period APACPE. In order to satisfy the above condition, the time margin TIMMRG must satisfy the condition given by:

(Time margin TIMMRG)={(activation period start time ACSTTM)−(target resource capturing start time PRLOAD on title timeline)−(data size DATASZ)}÷allowable minimum value NTTRPT of network throughput The time margin TIMMRG given by the above equation is set as a margin for absorbing a change in network throughput.

FIG. 162 shows a buffer model in the file cache which guarantees prevention of any overflow in the file cache FLCCH as another model of the buffer model shown in FIG. 161. The buffer model shown in FIG. 162 represents a state wherein all files are saved in advance in the file cache FLCCH at the target resource capturing start time PRLOAD on the title timeline, and unnecessary resource files are sequentially deleted until the beginning of the advanced application activation period APACPE. Therefore, during the loading period LOADPE, the delete processing of unnecessary resource files is simultaneously executed parallel to loading of resource files to be loaded. As a result, the saved data size FCOCUP in the file cache is nearly kept constant macroscopically during the loading period LOADPE. When the network throughput is sufficiently high in this model, unnecessary data in the file cache are deleted at a time at a specific time in the loading period LOADPE, and resource files to be used by the next advanced application ADAPL to be used can be captured into the file cache FLCCH at a time immediately after the delete processing while the throughput is sufficiently high. In the model shown in FIG. 162, it is required to create a content so as not to cause any overflow in the file cache. When this condition is not met, overflow in the file cache FLCCH may occur, and download of resource files used in the advanced application ADAPL may fail.

<Buffer Model for Streaming (Streaming Buffer)>

For streaming scheduling, the behavior of Streaming Buffer is completely specified by the following data input/output model and action timing model.

Data Input/Output Model

Data input rate for single session is equal to the minimum throughput of the player (networkThroughput). If there are two or more sessions, data input rate is not specified.

After the presentation time, data is output from the buffer at the rate of video bitrate.

When the Streaming Buffer is full, data transmission stops.

Streaming Buffer is cleared when Streaming Buffer is allocated in Data Cache and when random access (jump) occurs Action Timing Model Streaming start time is defined as follows:

When the streaming trigger is Playlist, streaming starts at the time specified by preload attribute. If preload attribute is not present, streaming shall start at the time specified by titleTimeBegin attribute of the element.

When the streaming trigger is Script (Player APIs), streaming starts at the time the script for downloading is evaluated.

Presentation start time is defined as follows:

When the streaming trigger is Playlist, presentation starts at the time specified by titleTimeBegin attribute.

When the streaming trigger is Script (Player APIs), presentation starts when the offset time specified in SecondaryVideoPlayer.play( ) function passed from the streaming start time.

In the case of streaming, time margin calculated by the following formula should be positive.

Time_margin=presentation_start_time−download_start_time

The size of Streaming Buffer, which is described in configuration in Playlist, should satisfy the following condition.

Streaming_buffer_size>=time_margin×networkThroughput>=prebuffering_size

Here, pre-buffering_size is the amount of pre-buffering data required by the streaming content for continuous decoding. In addition to these conditions, the following trivial condition must be met.

networkThroughput>=video bitrate

These are the conditions to guarantee not to cause buffer underflow.

FIG. 163 shows a buffer model upon downloading the secondary video set SCDVS from the network server NTSRV into the streaming buffer STRBUF in this embodiment. A data input/output model and activation timing model in this case have the following states.

A) Data Input/Output Model

The data transfer rate of data input to the streaming buffer STRBUF matches the allowable minimum value NTTRPT of the network throughput.

After the beginning of playback of a playback presentation object, the saved data are output from the streaming buffer STRBUF according to the “video bit rate”.

When the streaming buffer STRBUF is full of saved data, data transfer (playback presentation to the user) is interrupted.

When the area of the streaming buffer STRBUF is assured in the data cache DTCCH, and a random access (jump processing) occurs, the streaming buffer STRBUF is cleared.

B) Activation Timing Model

The temporary saving start timing of data in the streaming buffer STRBUF is defined as follows.

When a trigger of data temporary saving into the streaming buffer STRBUF is given by the playlist PLLST, loading starts based on the preload attribute information described in the playlist PLLST. This value corresponds not only to the “playback presentation object capturing start time PRLOAD on the title timeline” (preload attribute information) in the substitute audio video clip element SBAVCP or substitute audio clip element SBADCP, as shown in FIG. 54C or 54D, but also to the “playback presentation object capturing start time PRLOAD on the title timeline” (preload attribute information) described in the secondary audio video clip element SCAVCP shown in FIG. 54D.

When temporary saving into the streaming buffer STRBUF starts based on the script SCRPT (or API commands shown in FIGS. 106A to 110B), the download processing into the streaming buffer STRBUF starts at the start time of the script SCRPT.

The playback presentation start timing of a playback presentation object is defined as follows.

When download into the streaming buffer STRBUF is defined in the playlist PLLST, the playback presentation start time is designated by the titleTimeBegin attribute information in the playlist PLLST. This value corresponds not only to the start time TTSTTM on the title timeline (titleTimeBegin attribute information) in the substitute audio video clip element SBAVCP or substitute audio clip element SBADCP shown in FIG. 54C or 54D, but also to the start time TTSTTM on the title timeline (titleTimeBegin attribute information) in the secondary audio video clip element SCAVCP shown in FIG. 54D.

If a trigger of temporary saving in the streaming buffer STRBUF is given by the script SCRPT or an API command shown in FIGS. 106A to 110B, playback presentation starts from the time designated by the “playSecondaryVideoPlayer” function shown in FIG. 140 or FIGS. 106A to 110B.

In the buffer model shown in FIG. 163, the time margin TIMMRG can be calculated by:

(Time margin TIMMRG)=(start time TTSTTM on title timeline)−(target resource capturing start time PRLOAD on title timeline)

In this embodiment, the playlist PLLST can describe the configuration information CONFGI, as shown in FIG. 80A, and the configuration information CONFGI can describe the streaming buffer element STRBUF, as shown in FIG. 80B. As shown in FIG. 80C, the streaming buffer element STRBUF can describe a streaming buffer size STBFSZ which can be set in advance. The size STBFSZ of the streaming buffer STRBUF, which is set based on this value, must meet the following condition.

(Streaming buffer size STBFSZ)≥(time margin TIMMRG)×(network throughput)≥(pre-buffering size)

In the above inequality, "pre-buffering size" indicates a pre-buffering data size, which is required by a streaming content so as to execute continuous decode processing. In addition to the above conditional formula, the following relatively moderate condition is also required.

(Network throughput)≥(video bit rate)

This conditional formula guarantees not to cause any underflow in the streaming buffer STRBUF.

As shown in FIG. 25, a big characteristic feature of this embodiment lies in that the secondary video set recorded in the network server NTSRV is temporarily saved in the streaming buffer STRBUF, and is transferred from the streaming buffer STRBUF to the secondary video player SCDVP, thus allowing the playback presentation of the secondary video set SCDVS to the user. FIG. 163 shows a buffer model upon saving the secondary video set SCDVS in the streaming buffer STRBUF. FIG. 164 is a view for explaining the loading timing and playback presentation timing of the secondary video set SCDVS to be focused on them in association with similar contents. As shown in FIG. 164, loading of a time map STMAP of the secondary video set starts at the target resource capturing start time PRLOAD on the title timeline (the loading start time into the streaming buffer STRBUF). Immediately after the time map STMAP of the secondary video set is loaded into the streaming buffer STRBUF, the contents of the time map STMAP of the secondary video set are parsed. As shown in FIG. 88C, time map general information TMAP_GI in the time map STMAP of the secondary video set describes a file name EVOB_FNAME of an enhanced video object. By parsing the file name EVOB_FNAME of an enhanced video object, a secondary enhanced video object S-EVOB saved at the same saving location (path) as the time map STMAP of the secondary video set can be downloaded. Therefore, in this embodiment, as shown in FIG. 164, after completion of download of the time map STMAP of the secondary video set, the file name EVOB_FNAME of an enhanced video object described in the time map STMAP of the secondary video set is extracted. After an elapse of a time period required until the secondary enhanced video object file S-EVOB is accessed, loading processing of the secondary enhanced video object S-EVOB to the streaming buffer STRBUF starts. As shown in FIG. 164, the playback presentation start time of the substitute audio SBTAD is designated by the "titleTimeBegin" attribute information. In the embodiment shown in FIG. 164, the playback start time is "00:03:00". Therefore, as shown in FIG. 164, playback presentation of the substitute audio SBTAD starts from "00:03:00" on the elapsed time TIME. In the embodiment shown in FIG. 164, since the value of the "clipTimeBegin" attribute information is "00:00:00:00", the playback presentation to the user starts from the head position of the secondary enhanced video object S-EVOB at the start time of the substitute audio SBTAD, as shown in FIG. 164. In order to play back and present, to the user, the secondary video set SCDVS downloaded in the streaming buffer STRBUF in synchronism with the time progress of the title timeline TMLE, the access processing to the network server NTSRV need be scheduled in advance. The network access schedule to the network server NTSRV is described in advance by the download start time (LoadingBegin attribute information or preload attribute information) in the playlist PLLST. More specifically, the above value corresponds to the "playback presentation object capturing start time PRLOAD on the title timeline" (preload attribute information) in the substitute audio video clip element SBAVCP or substitute audio clip element SBADCP described in the object mapping information OBMAPI in the playlist PLLST, as shown in FIG. 54C or 54D. This embodiment is not limited to such specific value. The above value corresponds to the "playback presentation object capturing start time PRLOAD on the title timeline" (preload attribute information) in the secondary audio video clip element SCAVCP described in the playlist PLLST, as shown in FIG. 54D. As in the embodiment shown in FIG. 15, in order to establish connection of the advanced content playback unit ADVPL in the information recording and playback apparatus 1 to the network serer NTSRV, network connection processing must be established as an overhead. By contrast, the "playback presentation object capturing start time PRLOAD on the title timeline" does not include a time required to establish network connection of necessity. Therefore, in this embodiment, an overhead time (time required to establish network connection) required for network connection need be set in advance before the time set based on the "playback presentation object capturing start time PRLOAD on the title timeline". This embodiment assumes the following condition for the network access schedule to the network server NTSRV.

The network throughput value is postulated to always be constant.

The access processing to the network server NTSRV, the URI of which starts from "http" or "https", is premised on the use of only a single session and is premised on the inhibition of a "multi-session". Therefore, upon execution of the authoring processing of the advanced content ADVCT in this embodiment, data download assumes only one type of data, but does not assume scheduling for simultaneous download of "2" or more (exceeding "1") data.

As for download of the secondary video set SCDVS into the streaming buffer STRBUF, download of the time map STMAP of the secondary video set is indispensable prior to that of the secondary enhanced video object S-EVOB, as shown in FIG. 164.

Pre-scheduling must be done so as to prevent any overflow and underflow in the streaming buffer STRBUF and file cache FLCCH in the model that makes download into the streaming buffer STRBUF shown in FIG. 163 or the model that completes download into the file cache FLCCH before the advanced application activation period APACPE shown in FIG. 161 or 162.

Schedule information used to access the network server NTSRV in advance is described in the target resource capturing (loading) start time PRLOAD on the title timeline" (LoadingBegin attribute information) in the title resource element (see FIG. 66D) or in the target resource capturing (loading) start time PRLOAD on the title timeline" (LoadingBegin attribute information) described in the application resource element APRELE (see FIG. 63D). By contrast, schedule information used to download data in the streaming buffer STRBUF is specified by only the "playback presentation object capturing start time PRLOAD on the title timeline" (preload attribute information) in the substitute audio video clip element SBAVCP (see FIG. 54C), the "playback presentation object capturing start time PRLOAD on the title timeline" (preload attribute information) in the substitute audio clip element SBADCP (see FIG. 54D), or the "playback presentation object capturing start time PRLOAD on the title timeline" (preload attribute information) in the secondary audio video clip element SCAVCP (see FIG. 54D). The lower side of FIG. 164 describes an explanatory example that specifies the network access schedule to the network server NTSRV upon downloading the secondary video set SCDVS to the streaming buffer STRBUF. As described above, before download of the secondary enhanced video object S-EVOB starts, the download processing of the time map STMAP of the secondary video set must be completed. Unlike in the embodiment shown in FIG. 164, when the advanced content downloaded in the data cache DTCCH is to be played back and presented asynchronously, the network access to the network server NTSRV need not be pre-scheduled. Therefore, a description of information of the aforementioned pre-scheduled download start time (the playback presentation object capturing start time PRLOAD on the title timeline or the like) can be omitted in the playlist PLLST. In this case, a description of the download start time in the playlist PLLST is omitted, and the advanced content playback unit ADVPL starts download processing immediately after a playback presentation event of a corresponding content is generated. In this manner, when the playback presentation processing of a playback presentation object synchronized with the title timeline TMLE is not required, network download using a "multi-session" is permitted. However, in this embodiment, network connection of eight sessions or more (network download processing of eight or more different types of data) is not permitted. By setting the upper limit value like in this embodiment, high reliability of the download processing into the data cache DTCCH in the advanced content playback unit ADVPL via the network connection is assured, and stable playback of the advanced content ADVCT for the user can be guaranteed.

As shown in FIG. 23A, in this embodiment, the playlist PLLST can describe the configuration information CONFGI, media attribute information MDADRI, and title information TTINFO. As shown in FIG. 23B, the title information TTINFO includes the title element information TTELEM associated with a specific title. As shown in FIG. 24, the title element information for each title describes the object mapping information OBMAPI, which can describe the primary audio video clip element PRAVCP, substitute audio video clip element SBAVCP, substitute audio clip element SBADCP, secondary audio video clip element SCAVCP, advanced subtitle segment element ADSTSG, and application segment element APPLSG. As shown in FIG. 54D, the secondary audio video clip element SCAVCP can describe synchronization attribute information SYNCAT (sync attribute information) of a playback presentation object, and one of values "hard", "soft", and "none" can be set. As shown in FIG. 54C, the substitute audio video clip element SBAVCP can describe synchronization attribute information SYNCAT (sync attribute information) of a playback presentation object, and one of values "hard" and "none" can be set. Furthermore, as shown in FIG. 54D, the substitute audio clip element SBADCP can describe synchronization attribute information SYNCAT (sync attribute information) of a playback presentation object, and one of values "hard" and "soft" can be set. In this embodiment, as shown in FIG. 56D, the application segment element APPLSG can describe synchronization attribute information SYNCAT (sync attribute information) of a playback presentation object, and one of values "hard" and "soft" can be set. FIG. 165 shows a correspondence list of values which can be set as the synchronization attribute information SYNCAT (sync attribute information) of a playback presentation object.

The right column in FIG. 165 describes the names of clip elements as management information associated with the aforementioned secondary video set SCDVS, and the central column describes the contents of broadly-defined resource information RESRCI. An application resource APRSRC and title resource TTRSRC included in the broadly-defined resource information RESRCI are temporarily saved in the file cache FTCCT before playback presentation to the user, as shown in FIG. 25. In this case, the playback presentation to the user can start only after pre-download into the file cache FLCCH is completely finished, as shown in FIG. 161 or 162. A playback presentation object which belongs to the secondary video set SCDVS is often saved in advance in the file cache FLCCH or streaming buffer STRBUF depending on individual conditions before playback presentation to the user, as shown in FIG. 25. As shown in FIG. 25, the secondary video set SCDVS saved in advance in the file cache FLCCH starts playback presentation to the user only after pre-download in the file cache FLCCH is completely finished, as shown in FIG. 161 or 162. By contrast, as shown in FIG. 25, a given secondary video set SCDVS saved in the network server NTSRV is temporarily saved in the streaming buffer STRBUF before playback presentation to the user. In this case, as shown in FIG. 163 or 164, playback presentation of the secondary video set SCDVS to the user can start from the middle of pre-download to the streaming buffer STRBUF (before completion of the download processing).

<Network Access Model for Jump (Random Access)>

Jump to an arbitrary time on Title Timeline shall be supported for contents downloaded by both complete downloading and streaming. When the jump is requested, complete downloading is operated at first to prepare resources needed to start playback. Then the data for streaming is downloaded. The procedures for network resource preparation and the control of Title Timeline when a jump (random access) is requested are as follows. Note that only the resources described in Playlist are the scope of the following procedure because the resource downloading by Script is executed on demand.

1. If downloading of a resource described in Playlist is in progress, stop the downloading if one of the following conditions is satisfied.

There are resources to be downloaded by complete downloading at the destination time on Title Timeline.

The downloading resource in progress is not necessary at the destination time on Title Timeline.

2. Change the time on Title Timeline to the destination time and specify the all resources to be downloaded by complete downloading and by streaming. Then, start resource loading from the HD DVD Disc and Persistent Storage and execute the following downloading procedure in parallel.

3. If data resources of Hard-Synchronization Presentation Object and/or resources of Hard-Sync Application need to be downloaded, stop the progress of Title Timeline. Then, do the following process.

i. If there are resources of Hard-Sync Application to be downloaded, download the resources by complete downloading. Then, activate the Advanced Application.

ii. If there is no data resource of Hard-Synchronized Presentation Object to be downloaded, start the progress of Title Timeline.

4. Download resources of Soft-Sync Application by complete downloading if exist. Then, activate the Advanced Application.

5. If there is a data resource of Hard-Synchronization Presentation Object to be downloaded, download the TMAP by complete downloading and start downloading of the S-EVOB specified by the TMAP by streaming. The part of the S-EVOB shall be downloaded. The first byte position to be downloaded is the position of which presentation time is the destination time on Title Timeline. The progress of Title Timeline and presentation of the Presentation Object can be started only if preloading has completed. The conditions that preloading completes are:

If preload attribute exists, preloading completes when data of ([value of titleBeginTime attribute]−[value of preload attribute])×networkThroughput kilo bits are downloaded.

If preload attribute does not exist, preloading completes when the streaming buffer becomes full.

Regardless of the existence of preload attribute, preloading completes when the last byte is downloaded.

6. If there is a data resource of Soft-Synchronization to be downloaded, download the TMAP by complete downloading and start downloading of the S-EVOB specified by the TMAP by streaming. The part of the resource shall be downloaded. The first byte position to be downloaded is the position of which presentation time is [current time on Title Timeline]+[value of titleBeginTime attribute]−[value of preload attribute] (if this value exceeds the presentation end time, this resource is not downloaded at all). Presentation of the Presentation Object can be started after preloading has completed. The conditions that preloading completes are:

If preload attribute exists, preloading completes when data of ([value of titleBeginTime attribute]−[value of preload attribute])×networkThroughput kilo bits are downloaded.

If preload attribute does not exist, preloading completes when the streaming buffer becomes full.

Regardless of existence of preload attribute, preloading completes when the last byte is downloaded.

If there is a data resource of Non-Synchronized Presentation Object to be downloaded, downloaded the TMAP by complete downloading and start downloading of the S-EVOB specified by the TMAP by streaming. The first byte position to be downloaded is the position of which the beginning of the presentation time. Presentation of the Presentation Object can be started after preloading has completed. The conditions that preloading completes are:

If preload attribute exists, preloading completes when data of ([value of titleBeginTime attribute]−[value of preload attribute])×networkThroughput kilo bits are downloaded If preload attribute does not exist, preloading completes when the streaming buffer becomes full.

Regardless of the existence of preload attribute, preloading completes when the last byte is downloaded.

During the above process, if the loading of resources of Hard-Sync Application from the HD DVD Disc or President Storage is not finished, the progress of Title Timeline does not start.

In the preliminary processing shown in FIG. 25, this embodiment calls pre-download into the file cache FLCCH as "downloading", and pre-download into the streaming buffer STRBUF as "streaming" to clarify their differences. In either case, a big characteristic feature lies in that the downloading or streaming processing of the advanced content ADVCT supports jump processing (random access) to an arbitrary position on the title timeline TMLE. If the jump processing (random access) is necessary, the download processing of a first corresponding resource file must be completed before the beginning of playback after the jump processing (random access). As described above using FIG. 165, in case of streaming, the playback presentation of the secondary enhanced video object data S-EVOB can start before completion of download. However, in order to guarantee playback presentation from an arbitrary position by the jump processing (random access), download must be completed even in streaming.

In this embodiment, in order to instantaneously start playback after the jump processing (random access), the following conditions are required for pre-download preparation of network sources, and a control method on the title timeline. However, since the "capture" function (see FIGS. 106A to 110B or FIG. 126) that designates the activation method of the resource file download processing based on the script SCRPT according to this embodiment may occur at an arbitrary time, the following conditions are limited to a case wherein resource files are downloaded in advance according to the contents described in the playlist PLLST.

1) When the download processing of resource files is executed according to the contents described in the playlist PLLST, the download processing ends when one of the following conditions is satisfied:

when complete download processing ends and saving of resource files to be downloaded in the data cache DTCCH is completed before the time designated on the title timeline TMLE (the start time of playback presentation to the user); and when download of resource files is no longer required before the necessary time on the title timeline TMLE (the start time of playback presentation to the user).

2) The current time to be played back on the title timeline TMLE is changed to a time designated as a jump destination (random access destination), and resources to be downloaded by downloading or streaming are clarified. After that, the download processing from the information storage medium DISC or persistent storage PRSTR starts. In this embodiment, at this time, the download processing from the persistent storage PRSTR and that from the information storage medium DISC can be executed parallelly.

3) As shown in FIGS. 166 and 167, in case of a Hard-Synchronized playback presentation object or Hard-Sync application, the time progress (count-up) of the title timeline TMLE is paused, as shown in FIG. 167.

In case of a Hard-Sync application, the advanced application ADAPL can transit to an active state only after pre-download into the file cache FLCCH is completely finished.

In case of a Hard-Synchronized playback presentation object, the time progress (count-up) on the title timeline TMLE can start even when download of some data of the secondary video set SCDVS to be saved in the data cache DTCCH is incomplete (in case of streaming processing of data to be temporarily saved in the streaming buffer STRBUF).

4) In case of a Soft-Sync application, the advanced application ADAPL can transit to an active state after download into the file cache FLCCH is completely finished.

5) In case of a Hard-Synchronized playback presentation object, Soft-Synchronized playback presentation object, or non-Synchronized playback presentation object, as shown in FIG. 164, first of all, after downloading of the time map STMAP of the secondary video set is completely finished, downloading of the secondary enhanced video object S-EVOB designated in the time map STMAP of the secondary video set starts. In this case, at least some data of the secondary enhanced video object S-EVOB need be downloaded in the streaming buffer STRBUF. The playback time of the downloaded secondary enhanced video object S-EVOB has to include that of a jump destination (random access destination) on the title timeline TMLE. As another embodiment, as shown in FIG. 164, the first position of the downloaded secondary enhanced video object S-EVOB may match the playback start time (the time indicated by a broken line β in FIG. 164) of a jump destination on the title timeline TMLE. In this embodiment, in order to allow to immediately start playback at an arbitrary jump destination (random access destination), the playback of the playback presentation object can start and the time progress of the title timeline TMLE can start only when the download processing into the streaming buffer STRBUF is completely finished. This embodiment requires the following conditions to determine completion of preloading.

When the playlist PLLST describes the preload attribute information, the relational expression associated with the network throughput shown in FIG. 161 is satisfied.

When the playlist PLLST does not describe any preload attribute information, the streaming buffer STRBUF is full of the corresponding secondary video set SCDVS to be saved.

When the playlist PLLST does not describe any preload attribute information by mistake, the last byte of the secondary video set SCDVS to be saved in the streaming buffer STRBUF is saved in the streaming buffer STRBUF.

In the aforementioned processing, upon loading the Hard-Sync application from the information storage medium DISC or persistent storage PRSTR, the time progress of the title timeline TMLE never restarts unless loading is completely finished (see FIG. 167).

FIGS. 166 and 167 specify the Hard-Sync application and Soft-Sync application. The Hard-Sync application and Soft-Sync application will be described below.

<Application Sync Model>

There are two kind of application which has following two Sync Models:

Soft-Sync Application

Hard-Sync Application

The information of sync type is defined by sync attribute of application segment in Playlist. In Soft-Sync Application and Hard-Sync Application, the behavior to Title Timeline differs at the time of execution preparation of application. Execution preparation of application is resource loading and other startup process (such as script global code execution). Resource loading is reading resource from storage (DISC, Persistent Storage and Network Server) and store to the File Cache. (*) Every application shall not execute before all resource loading is finished.

This embodiment specifies two different types of advanced applications ADAPL, i.e., a Hard-Sync application and Soft-Sync application. The information associated with the sync type is defined by the synchronization attribute information SYNCAT (sync attribute information) of a playback presentation object (see FIG. 56D) in the application segment element APPLSG in the playlist PLLST. That is, in case of the Hard-Sync application, a "hard" value is set as the sync attribute information value. In case of the Soft-Sync application, a "soft" value is set as the sync attribute information value. The Hard-Sync application and Soft-Sync application have different playback presentation methods of the corresponding advanced applications ADAPL on the title timeline TMLE. In this embodiment, the activation preparation stage of the advanced application ADAPL requires loading of required resource files and another startup processing such as activation of a script global code and the like. The loading processing of the resource files loads resource files from the information storage medium DISC, persistent storage PRSTR, or network server NTSRV, and the saving processing into the file cache FLCCH is required. All advanced applications ADAPL in this embodiment can undergo activation processing only after the loading processing of resource files is completed. As shown in FIG. 63B, resource files, which are used in the advanced application ADAPL and need be temporarily saved in the file cache FLCCH, are described as a list of application resource elements APRELE in the application segment element APPLSG (used to perform management) associated with each individual advanced application ADAPL. This embodiment is not limited to this. For example, the advanced application ADAPL can use the title resource TTRSRC and playlist application resource PLAPRS, as shown in FIG. 70. Furthermore, as shown in FIG. 63D, each application resource element APRELE describes the "target resource capturing (loading) start time PRLOAD on the title timeline" (loadingBegin attribute information). Likewise, as shown in FIG. 66D, the title resource element associated with the title resource TTRSRC can describe the "target resource capturing (loading) start time PRLOAD on the title timeline" (loadingBegin attribute information). When the application resource element APRELE or the title resource element describes the "target resource capturing (loading) start time PRLOAD on the title timeline" (loadingBegin attribute information), loading of the required application resource APRSRC or title resource TTRSRC starts from the "target resource capturing (loading) start time PRLOAD on the title timeline" (loadingBegin attribute information), as shown in FIG. 65A. By contrast, when the application resource element APRELE or the title resource element describes no "target resource capturing (loading) start time PRLOAD on the title timeline" (loadingBegin attribute information), loading starts from the start time TTSTTM on the title timeline, and the advanced application activation period APACPE starts from the end of the loading period LOADPE (after the loading is completely finished), as shown in FIG. 65B. The start time TTSTTM on the title timeline shown in FIG. 65B is defined in the application segment element APPLSG in the playlist PLLST, as shown in FIG. 56D. When information of the "target resource capturing (loading) start time PRLOAD on the title timeline" (loadingBegin attribute information) is not described, both the Hard-Sync application and Soft-Sync application basically execute processing according to the procedure shown in FIG. 65D ("the loading period LOADPE starts at the start time TTSTTM on the title timeline"→"the advanced application activation period APACPE starts after the end of the loading period LOADPE"). The basic difference between the two applications lies in the time progress processing method of the title timeline TMLE during the loading period LOADPE. That is, as shown in FIG. 166, in case of the Soft-Sync application, the time progress of the title timeline TMLE is continued even during the loading period LOADPE. When loading (loading period LOADPE) of corresponding resource files ends during continuation of the time progress of the title timeline TMLE, activation of the advanced application starts immediately after the end of loading, and the advanced application activation period APACPE starts. By contrast, in case of the Hard-Sync application, the time progress (count-up) of the title timeline TMLE is paused during the loading period LOADPE, as shown in FIG. 167. Immediately after the end of the loading processing (loading period LOADPE) of resource files in the file cache FLCCH, the time progress (count-up) of the title timeline TMLE restarts, and activation of the advanced application ADAPL starts, thus starting the advanced application activation period APACPE. In this embodiment, when special playback such as fastforward FF, fastreverse FR, or the like is to be executed, the aforementioned processing starts immediately after the special playback ends, and the playback mode returns to a standard playback mode. As shown in FIG. 166, in case of the Soft-Sync application, during, e.g., fastforward playback FSTFWD as the special playback mode, resource loading processing is not performed, and the loading processing of resource files to the file cache FLCCH starts from a transition timing (position of a point α) to the normal playback mode, thus starting the loading period LOADPE. When the loading processing (loading period LOADPE) ends during normal playback NRMPLY, activation of the advanced application starts, thus starting the advanced application activation period APACPE. By contrast, as shown in FIG. 167, in case of the Hard-Sync application, during, e.g., fastforward playback FSTFWD as the special playback mode, loading processing is not performed, and loading of resources into the file cache FLCCH starts at a return timing (position of a point α) to the normal playback mode. At this time, the title timeline TMLE is paused, and loading of resource files into the file cache FLCCH starts. In case of the Hard-Sync application, as shown in FIG. 167, the time progress of the title timeline TMLE is kept paused during the loading period LOADPE to the file cache FLCCH. Immediately after the loading processing (loading period LOADPE) of resource files to the file cache FLCCH ends, activation of the advanced application starts in the form of normal playback NRMPLY (in the normal playback mode), thus starting the advanced application activation period APACPE. As shown in FIGS. 166 and 167, during special playback such as fastforward playback FSTFWD, the loading processing is not performed, and it starts only when the playback mode returns from the special playback mode to the standard playback mode (position of the point α). In this way, not only efficient loading processing in the advanced content playback unit ADVPL can be implemented, but also the processing in the advanced content playback unit ADVPL can be simplified, thus assuring high reliability of the playback presentation processing in the advanced content playback unit ADVPL.

<Soft-Sync Application>

Soft-Sync Application gives preference to seamless proceeding of Title Timeline over execution preparation. If 'autoRun' attribute is 'true' and application is selected then resources will load into the File Cache by soft synced mechanism. (*) Soft-Sync Application is activated after that all resources loading into the File Cache. The resource which cannot read without Title Timeline stopping shall not be defined as a resource of Soft-Sync Application.

In case, Title Timeline jump into the valid period of Soft-Sync Application, the Application may not execute. And also, during the varied period of Soft-Sync Application, playback mode changes trick play to normal playback, the Application may not run.

FIG. 166 shows an example of the relation of the progress of the real time and progress of Title Timeline, in Soft-Sync Application. A horizontal axis shows the real time and the vertical axis shows Title Timeline. One Soft-Sync Application is mapped. The Valid Period of Application is between TitleTimeBegin to TitleTimeEnd. (1) shows the case where a normal speed playback is continued. (2) shows the case where playback speed go back to normal speed from fast forward speed within the valid period of the application. Both cases, the TitleTimeline is not hold while preparing execution of application.

As shown in FIG. 166, the Soft-Sync application selects the continuous time progress of the title timeline TMLE throughout the activation preparation period. As shown in FIG. 56D, auto-run attribute information ATRNAT can be set in the application segment element APPLSG. If the value of the auto-run attribute information ATRNAT is set to be "true", and activation processing of the corresponding advanced application ADAPL is selected, the Soft-Sync mechanism is adopted as loading processing into the file cache FLCCH. When corresponding resource files cannot be loaded without stopping the count-up of the time progress of the title timeline TMLE, these files cannot be defined (used) as those of the Soft-Sync application. That is, as shown in FIG. 166, all resource files (resource files specified by the application resource elements APRELE in the application segment element APPLSG shown in FIG. 63B) used in the Soft-Sync application must not stop the time progress of the title timeline TMLE. In this embodiment, when the time on the title timeline TMLE jumps into the Soft-Sync application valid period APVAPE by special playback such as fastforward playback FSTFWD or the like, jump processing (random access), or the like, activation of the corresponding advanced application ADAPL need not always start immediately (immediately after the end of jump). The horizontal axis in FIG. 166 means a real elapsed time RLTIME (actual elapsed time), and the horizontal axis represents the time progress on the title timeline TMLE. The left line in FIG. 166 indicates a case wherein standard playback NRMPLY (continuous playback in the normal playback mode) continues, and the right line indicates a case wherein the playback mode returns from special playback such as fastforward playback FSTFWD to the normal playback mode during the advanced application valid period APVAPE, and normal playback NRMPLY starts. In either case, the time progress of the title timeline TMLE never stops during the loading period LOADPE for executing the loading processing of resource files to be used.

<Hard-Sync Application>

Hard-Sync Application gives preference to execution preparation over seamless progress of Title Timeline. Hard-Sync Application is activated after all resources loading into the File Cache. If 'autoRun' attribute is 'true' and application is selected then resources will load into the File Cache by hard synced mechanism. (*) Hard-Sync Application holds the Title Timeline during the resource loading and execution preparation of application.

FIG. 167 shows an example of the relation of the progress of the real time and progress of Title Timeline, in Hard-Sync Application. A horizontal axis shows the real time and the vertical axis shows Title Timeline. One Hard-Sync Application is mapped. The Valid Period of Application is between TitleTimeBegin to TitleTimeEnd. (1) shows the case where a normal speed playback is continued. (2) shows the case where playback speed go back to normal speed from fast forward speed within the valid period of the application. Both cases, the TitleTimeline is hold while preparing execution of application.

The Hard-Sync application shown in FIG. 167 transits to an active state only after the loading processing of resource files to be used by that application into the file cache FLCCH is completed. As shown in FIG. 56D, when the value of the auto-run attribute information ATRNAT in the application segment element APPLSG in the playlist PLLST is set to be "true" and activation of the corresponding advanced application ADAPL is selected, the loading processing of required resource files into the file cache FLCCH is executed based on the Hard-Sync mechanism shown in FIG. 167. That is, during the loading processing of resource files to be used in the advanced application ADAPL (during preparation of the advanced application ADAPL), the time progress of the title timeline TMLE is paused, thus pausing count-up on the title timeline TMLE. In FIG. 167 as well, the horizontal axis represents a real elapsed time RLTIME (actual elapsed time), and the vertical axis represents the time progress on the title timeline TMLE. The left line in FIG. 167 indicates a case wherein normal playback NRMPLY continues at a normal speed. The right line indicates a case wherein the playback mode returns from the special playback mode such as fast-forward playback FSTFWD or the like to the standard playback mode (transits to normal play NRMPLY) during the advanced application valid period APVAPE. In either case, the time progress of the title timeline TMLE is paused during the loading period LOADPE in which loading of resource files into the file cache FLCCH is executed to prepare for the advanced application ADAPL. Immediately after completion of the loading processing (loading period), the advanced application activation period APACPE for activating the advanced application ADAPL starts. In this way, by changing the corresponding synchronization processing method depending on advanced applications ADAPL, the contents provider can select the most effective playback presentation method for the user, thus improving the expressive power to the user.

As shown in FIG. 14, according to this embodiment, the following effects are expected.

1. In a markup MRKUP, a name corresponding to an event is defined, and an event listener monitors the defined name corresponding to the event in a script SCRPT, thus detecting generation of the event. The contents of a function to be executed upon generation of the event is defined in the script SCRPT. The advanced application manager ADAMNG (see FIG. 28) in the navigation manager NVMNG incorporated in the advanced content playback unit ADVPL in this embodiment activates the function contents designated in the script SCRPT and manages the function contents upon generation of the event.

1-1. Since this embodiment defines a wide variety of API commands, various functions can be activated, thus providing acute expressive power to the user.

1-2. As shown in FIG. 28, in the advanced content playback unit ADVPL, the presentation engine PRSEN assigned to moving picture presentation, the playlist manager PLMNG that manages moving picture presentation, and the advanced application manager ADAMNG that executes the script processing are independent from each other. For this reason, since the moving picture presentation and script processing can be parallelly executed at a time, more flexible expression can be provided to the user.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modification as would fall within the scope and spirit of the inventions.

What is claimed is:

1. A processing method using management information comprising a first item or a second item and using first information stored in a first file or second information stored in a second file, wherein the first information and the second information relate to a presentation object, the first and second files are transferable based on respective first and second Uniform Resource Identifiers (URIs) via a network, the first information corresponds to a first transfer rate and the second information corresponds to a second transfer rate different from the first transfer rate, and the method is configured to be executed by a computer, the method comprising:

transmitting the first information by referencing the first item according to the first transfer rate and the first URI or transmitting the second information by referencing the second item according to the second transfer rate and the second URI, wherein the first information relates to the second information.

2. A method of reproducing a presentation object relating to first information stored in a first file or second information stored in a second file, the first information relating to the second information, the method using management information comprising a first item or a second item, wherein the first and second files are transferable based on respective first and second Uniform Resource Identifiers (URIs) via a network, the first information corresponds to a first transfer rate, the second information corresponds to a second transfer rate different from the first transfer rate, the first information is transmittable by referencing the first item according to the first transfer rate and the first URI, the second information is transmittable referencing the second item according to the second transfer rate and the second URI, and the method is configured to be executed by a computer, the method comprising:

reproducing the presentation object.

3. An information processing apparatus configured to execute the method of claim 1.

4. A method of describing a script for management information comprising a first item or a second item and for first information to be stored in a first file or second information to be stored in a second file, wherein the first information and the second information relate to a presentation object, the first and second files are transferable based on respective first and second Uniform Resource Identifiers (URIs) via a network, the first information corresponds to a first transfer rate and the second information corresponds to a second transfer rate different from the first transfer rate, and the method is configured to be executed by a computer, the method comprising:

describing the management information to enable the computer to transfer the first information by referencing the first item according to the first transfer rate and the first URI or the second information by referencing the second item according to the second transfer rate and the second URI, wherein the first information relates to the second information.

5. An information service method using management information as defined by a method according to claim 4, the method comprising:

providing a service of sending the first information by referencing the first item according to the first transfer rate and the first URI or the second information by referencing the second item according to the second transfer rate and the second URI.

6. A method of displaying information configured to use the management information as defined by a method according to claim 4, the method comprising:

displaying a content of the first or second information.

7. A recording method using the management information as defined by a method according to claim 4, the method comprising:

recording a content of the presentation object.

8. A transferring method using management information comprising a first item or a second item and using first information stored in a first file or second information stored in a second file, wherein the first information and the second information relate to a presentation object, the first and second files are transferable based on respective first and second Uniform Resource Identifiers (URIs) via a network, the first information corresponds to a first transfer rate and the second information corresponds to a second transfer rate different from the first transfer rate, and the method is configured to be executed by a computer, the method comprising:

transferring the first information by referencing the first item according to the first transfer rate and the first URI or the second information by referencing the second item according to the second transfer rate and the second URI, wherein the first information relates to the second information.

9. An information server configured to execute the method of claim 8.

10. A system comprising the server of claim 9.

11. An information processing apparatus configured to execute the method of claim 8.

* * * * *

UNITED STATES PATENT AND TRADEMARK OFFICE

CERTIFICATE OF CORRECTION

PATENT NO. : 8,601,149 B2
APPLICATION NO. : 13/482395
DATED : December 3, 2013
INVENTOR(S) : Hideo Ando et al.

It is certified that error appears in the above-identified patent and that said Letters Patent is hereby corrected as shown below:

On the title page, Item (54), and in the specification, Column 1, the Title is incorrect. Item (54) and Column 1 should read:

--INFORMATION PROCESSING REGARDING DIFFERENT TRANSFER RATES--

Signed and Sealed this
Twenty-fifth Day of February, 2014

Michelle K. Lee

Michelle K. Lee
*Deputy Director of the United States Patent and Trademark Office*